US005809322A

United States Patent [19]

Akerib

[11] Patent Number: 5,809,322

[45] Date of Patent: Sep. 15, 1998

[54] APPARATUS AND METHOD FOR SIGNAL PROCESSING

[75] Inventor: Avidan Akerib, Holon, Israel

[73] Assignee: Associative Computing Ltd., Raanana, Israel

[21] Appl. No.: 353,612

[22] Filed: Dec. 9, 1994

[30] Foreign Application Priority Data

Dec. 12, 1993 [IL] Israel ........................................ 107996
May 26, 1994 [IL] Israel ........................................ 109801

[51] Int. Cl.[6] .............................. G06F 15/04; G06F 3/05; G11C 15/04

[52] U.S. Cl. ................................ 395/800.14; 395/800.19; 395/853

[58] Field of Search .................................... 395/800, 411, 395/385, 595, 114, 733, 823, 183.01, 555, 446, 416, 410, 185.09, 850, 200.44, 800.11, 800.16; 365/230.05, 230.02, 49, 231, 113; 364/413.18, DIG. 1, DIG. 2, 748, 736, 491, 489, 490; 348/167, 203; 382/293, 324, 304, 303; 377/54; 347/254; 370/462

[56] References Cited

U.S. PATENT DOCUMENTS

| | | | |
|---|---|---|---|
| 3,828,323 | 8/1974 | Heitman et al. | 395/114 |
| 3,970,993 | 7/1976 | Finnila | 395/800 |
| 4,178,510 | 12/1979 | Wagner | 364/413.18 |
| 4,404,653 | 9/1983 | Ruhman et al. | 365/49 |
| 4,482,902 | 11/1984 | Bailey et al. | 347/254 |
| 4,491,932 | 1/1985 | Ruhman et al. | 364/900 |
| 4,546,428 | 10/1985 | Morton | 395/800 |
| 4,686,691 | 8/1987 | Deal et al. | 377/54 |
| 4,733,393 | 3/1988 | Morton | 395/183.01 |
| 4,763,192 | 8/1988 | Moore et al. | 348/167 |
| 4,792,982 | 12/1988 | Dews et al. | 382/324 |
| 4,964,040 | 10/1990 | Wilcox | 395/823 |
| 4,992,933 | 2/1991 | Taylor | 395/800 |
| 5,268,856 | 12/1993 | Wilson | 364/748 |
| 5,282,177 | 1/1994 | McLaury | 365/230.05 |
| 5,361,312 | 11/1994 | Kuchel | 382/293 |

OTHER PUBLICATIONS

Akerib, A.J. & Ruhman, S., "Associative Contour Processing", MVP 1990, IAPR Workshop on Machine Vision Applications, Nov. 28–30, 1990, Tokyo, pp. 125–128.

Akerib, A.J. & Ruhman, S., "Associative Geometric Algorithms: The Voronoi Diagram and Convex Hull", Weizmann Institute of Science, Rehovoy, Israel, pp. 1–9.

Akerib, A. J. & Ruhman, S., "Real Time Associative Vision Machine", Proc. 7th Israel Conf. on Artif. Intel., Vision & Pattern Recg. Elsevier, Dec. 1990, pp. 441–453.

*Primary Examiner*—Daniel H. Pan
*Attorney, Agent, or Firm*—Mark M. Friedman

[57] ABSTRACT

Associative signal processing apparatus for processing an incoming signal including a plurality of samples, the apparatus including a two-dimensional array of processors, each processor including a multiplicity of content addressable memory cells, each sample of an incoming signal being processed by at least one of the processors, and a register array including at least one register operative to store responders arriving from the processors and to provide communication, within a single cycle, between non-adjacent processors.

11 Claims, 20 Drawing Sheets

| IN | | OUT | |
|---|---|---|---|
| GROUP | STATE | STATE | INCREMENT |
| 1 | $S_0$ | $S_1$ | 0 |
| 1 | $S_1$ | $S_1$ | 1/2 |
| 2 | ∅ | $S_0$ | 1/2 |
| 3 | $S_0$ | $S_0$ | 1/2 |
| 3 | $S_1$ | $S_0$ | 1 |
| 4 | ∅ | $S_0$ | 12 |
| 5 | ∅ | $S_0$ | 6 |

FIG. 20A

| | | |
|---|---|---|
| 1 | 1 | 1 |
| 1 | 0 | 1 |
| 1 | 1 | 1 |

FIG. 20B

| | | |
|---|---|---|
| 0 | 0 | 0 |
| 0 | p | 0 |
| 1 | 1 | X |

FIG. 20C

| | | |
|---|---|---|
| 0 | 0 | 0 |
| 0 | p | 0 |
| X | 1 | 1 |

FIG. 20D

| | | | |
|---|---|---|---|
| | 0 | 0 | 0 |
| 1 | 0 | p | 0 |
| | 1 | 0 | 0 |
| | | 1 | |

FIG. 20E

| | | |
|---|---|---|
| X | 0 | X |
| 1 | P | 1 |
| X | 1 | X |

FIG. 20F

| | | |
|---|---|---|
| 0 | 0 | X |
| X | P | 1 |
| X | 1 | X |

FIG. 20G

| | | |
|---|---|---|
| X | 0 | 0 |
| 1 | P | X |
| X | 1 | X |

| FLags | | Optical flow Output | | local Averages | | Temporary Accumulators | | Partial Derivatives | | | Input Images | |
|---|---|---|---|---|---|---|---|---|---|---|---|---|
| mr | tm | V | U | Vav | Uav | Ac | Sc | Et | Ey | Ex | En1 | En |
| 1 | 1 | 10 | 10 | 9 | 9 | 19 | 18 | 11 | 11 | 11 | 8 | 8 |

APPARATUS AND METHOD FOR SIGNAL PROCESSING

FIELD OF THE INVENTION

The present invention relates to methods and apparatus for signal processing.

BACKGROUND OF THE INVENTION

State of the art computer vision systems and methods and state of the art associative processing methods are described in the following publications, the disclosure of which is hereby incorporated by reference:

C. C. Foster, "Content addressable parallel processors", Van Nostrand Reinhold Co., 1976, chs. 2 and 5, S. Ruhman, I. Scherson, "Associative processor for tomographic image reconstruction", Proc. Medcomp 82 (1982 IEEE Comp. Soc. Int. Conf. on Medical Comp. Sc./Computational Medicine), pp. 353–358, C. Weems, E. Riseman, A. Hanson, A. Rosenfeld, "IU parallel processing benchmark", Proc. Comp. Vision & Pattern Recogn., pp. 673–688, 1988, I. Scherson, "Multioperand associative processing and application to tomography and computer graphics", Ph.D. Thesis, Computer Sciences, Weizman Institute of Science, 1983, Canny, J. "Computational approach to edge detection", IEEE Trans. on pattern analysis and machine Int., November 1986, pp. 679–698, and Sha'ashua, A. and S. Ullman, "Structural saliency: the detection of global salient structures using a local connected network", Proc. ICCV Conf., pp, 321–327, Florida, 1988, and Akerib, A. J. and Shmil Ruhman, "Associative contour processing", MVP 1990 IAPR Workshop on Machine Vision cations, Nov. 28–30, 1990, Tokyo.

Image processing techniques and other subject matter useful for associative signal processing are described in the following references:

References

[1] W. D. Hillis, "*The Connection Machine*", MIT Press, 1985.

[2] C. C. Weems, Jr., "*Image Processing on a Content Addressable Array Parallel Processor*", Ph.D. Thesis, Computer and Information Sciences, University of Massachusetts at Amherst, 1984.

[3] C. C. Foster, "*Content Addressable Parallel Processors*", Van Nostrand Reinhold Co., 1976, chs. 2 & 5.

[4] S. Ruhman, I. Scherson, "*Associative Processor for Tomographic Image Reconstruction*", Proc. Medcomp 82 (1982 IEEE Comp. Soc. Int. Conf. on Medical Comp. Sc./Computational Medicine), pp 353–358.

[5] S. Ruhman, I. Scherson, "*Feasibility Study of Associative Radar Signal Processing*", Internal Report, Weizmann Institute of Science, October 1984.

[6] S. Ruhman, I. Scherson, "*Associative Processor Particularly Useful for Tomographic Image Reconstruction*", U.S. Pat. No. 4,491,932, filed Oct. 1, 1981, issued Jan. 1, 1985.

[7] C. Weems, E. Riseman, A. Hanson, A. Rosenfeld, "*IU Parallel Processing Benchmark*", Proc. Comp. Vision & Pattern Recogn. pp 673–688, 1988.

[8] D. C. Marr, E. Hildreth, "*Theory of Edge Detection*", Proc. R. Soc. London, Vol. B 207, pp 187–217, 1980.

[9] W. E. L. Grimson, "*A Computer Implementation of a Theory of Human Stereo Vision*", Phil. Trans. Royal Soc. of London, Vol. B 292, pp 217–253, 1981.

[10] B. K. P. Horn, B. G. Schunck, "*Determining Optical Flow*", Artificial Intelligence Vol. 17, pp 185–203, 1981.

[11] V. Cantoni, C. Guerra and S. Levialdi, "*Towards an Evaluation of an Image Processing System*". In: Computing Structures for Image Processing, Academic Press, 1983, ch. 4.

[12] M. J. Flynn, "*Very high-speed computer systems*", Proc. IEEE, Vol. 54, pp 1901–1909, 1966.

[13] B. Lindskog "*PICAP, An SIMD architecture for multi-dimensional signal processing*", Dissertation No. 176, Dept. of El. Eng., Linkoping University, Sweden, 1988.

[14] S. S. Wilson, "*One dimensional SIMD architectures—the AIS*-5000", Multicomputer Vision, Academic Press, pp. 131–149.

[15] D. Juvini, J. L. Basille, H. Essafi, J. Y. Latil, "*Sympati 2, a 1.5D processor array for image application*", EUSIPCO IV, Theories and applications, North-Holland, pp. 311–314, 1988.

[16] I. N. Robinson and W. R. Moore, "*A parallel processor array architecture and its implementation in silicon*", Proc. IEEE Custom Integrated Circuit Conf. pp 41–45, 1982.

[17] M. J. B. Duff, "*CLIP4: A large scale integrated circuit array parallel processor*", Proc. IJCPR, pp. 728–733, 1976.

[18] K. E. Batcher, "*Design of a massively parallel processor*", IEEE Trans. Comp., Vol. C-29, pp. 836–840, 1980.

[19] S. F. Reddaway, "*DAP—A flexible number cruncher*", Proc. LASL Workshop on Vector and Parallel Processors, pp. 233–234, 1978.

[20] D. E. Shaw, "*The NON-VON supercomputer*", Computer Science Dept., Columbia University, New York, N.Y., 1982.

[21] V. Cantoni and S. Levialdi, "*PAPIA: A case history,*", Parallel Computer Vision, L. Uhr, Ed. New York, N.Y.: Academic Press, 1987, pp. 3–13.

[22] L. I. Hungwen and M. Maresca. "*Polymorphic-Torus Architecture for Computer Vision*", IEEE Trans. PAMI, Vol. 11, No. 3, 1989.

[23] S. R. Sternberg, "*Biomedical image processing*", Computer, Vol. 16, pp. 22–35, 1983.

[24] E. W. Kent, M. O. Shneier, and R. Lumia, "*PIPE: Pipeline image processing engine*", Parallel and Distributed Computing, Vol. 2, pp. 50–78, 1985.

[25] Max Video product literature, Datacube Corp., Peabody, Mass., 1987.

[26] T. Gross, H. T. Kung, M. S. Lam, and J. A. Webb, "*Warp as a machine for low-level vision*", Proc. of the 1985 Int. Conf. on Robotics and Automation, 1985.

[27] W. W. Wucke, R. C. Booth, D. A. Brown, D. G. Shea, and F. T. Tong, "*Design and application of an experimental multiprocessor*", IBM RC 12604, 1987.

[28] C. Withby-Strevens, "*The Transputer*", Proc. 12th ACM Int. Symp. on Computer Architectures, pp. 292–300, 1985.

[29] L. Erman, "*The Hearsay-II Speech-Understanding System: integrating knowledge to revsolve uncertainty*", Computing Surveys Vol. 12, pp. 213–253, 1980.

[30] H. P. Nii, "*The blackboard model of problem solving and the evaluation of blackboard architectures*", AI Magazine, Vol. 7, No. 2, pp. 38–53, 1986.

[31] B. A. Draper, R. T. Collins, J. Brohio, J. Griffith, A. R. Hanson, and E. M. Riseman, "*Tools and experiments in*

*the knowledge-directed interpretation of road scenes"*, Proc. Image Understanding Workshop, Morgan Kaufmann: Los Altos, Calif., 1987.

[32] NCube Corp, Promotional literature, Beaverton, Oreg., 1985.

[33] C. Fernstrom, I. Kruzela, B. Svensson, "*LUCAS Associative Array Processor*", Springer-Verlag, 1985, ch. 2.

[34] B. Ruhman, I. Scherson, "*Associative Memory Cell and Memory Unit Including Same*", U.S. Pat. No. 4,404,653, filed Oct. 1, 1981, issued Sep. 13, 1983.

[35] I. Scherson, "*Multioperand Associative Processing and Application to Tomography and Computer Graphics*", Ph.D. thesis, Computer Sciences, Weizmann Institute of Science, 1983.

[36] J. Worlton, "*Some Patterns Technology Change in High-Performance Computers*", Proc. Supercomputing, pp 312–320, November 1988.

[37] I. Scherson, S. Ruhman, "*Multi-Operand Associative Arithmetic*", Proc. 6th Symp. on Computer Arithmetic, Aarhus 1983, pp 124–128.

[38] I. Scherson, S. Ruhman, "*Multi-Operand Arithmetic in a Partitioned Associative Architecture*", J. of Parallel & Distr. Comp., Vol. 5., pp 655–668, 1988.

[39] D. C. Marr, E. Hildreth, "*Theory of Edge Detection*", Proc. R. Soc. London, Vol. B 207, pp 187–217, 1980.

[40] John Canny, "*Computational Approach to Edge Detection*", IEEE Trans. on Pattern Analysis & Machine Int., November 1986, pp. 679–698.

[41] E. R. Davis and A. P. N. Plummer, *Thinning Algorithms: A Critique and New Methodology*, Pattern Recognition 14: 53–63, 1981.

[42] R. T. Chin, H. K. War, D. L. Stover, and R. D. Iverson, *A One-Pass Thinning Algorithm and its Parallel Implementation,* Comp. Vision, Graph. & Image Proc. 40: 30–40, 1987.

[43] W. E. L. Grimson, "*A Computer Implementation of a Theory of Human Stereo Vision*", Phil. Trans. Royal Soc. of London, Vol. B 292, pp 217–253, 1981.

[44] D. Marr, T. Poggio, "*A Computational Theory of Human Stereo Vision*", Proc. Royal Soc. London B 204, pp 301–324, 1979.

[45] B. K. P. Horn, B. G. Schunck, *Determining Optical Flow,* Artificial Intelligence, Vol. 17, pp 185–203, 1981.

[46] Amnon Sha'ashua and Shimon Ullman, "*Structural Saliency: The Detection of Global Salient Structures Using a Local Connected Network*", Proc. ICCV Conf., pp. 321–327, Florida, 1988.

[47] Amnon Sha'ashua, "*Structural Saliency: The detection of globally salient structures using a locally connected network*", M.Sc thesis, Dept. of Applied Math., Weizmann Inst. of Science, 1988.

[48] Amnon Sha'ashua, AI Lab., MIT, Private Communication, May 1991. [49] Duda R. O. and Hart P. E., "*Use of the Hough transformation to detect lines and curves in pictures*", Comm. ACM Vol. 15, Num. 1, pp. 11–15, Jan. 1972.

[50] O'Gorman, F. and M. B. Clowes "*Finding picture edge through collinearity of feature points*", Proc. Int. Joint Conf. on Artif. Intel., pp. 543–55, 1973.

[51] A. Rosenfeld, A. C. Kak, "*Digital Picture Processing*", Academic Press, 1982.

[52] Robert Sedgewick, "*Algorithms",* Addison-Wesley, 1988.

[53] Preston, K., "*The Abingdon Cross benchmark survey*", IEEE Computer 22(7), pp 9–18, 1989.

[54] S. Siegel and S. Waltings, "*MaxVideo's Performance of the Abingdon Cross Bench-Mark,*", Proc. Vision '87, Society of Manufacturing Engineers, Dearborn, Mich., pp 2–17, 1987.

[55] W. B. Teeuw and R. P. W. Duin, "*An algorithm for benchmarking an SIMD pyramid with the Abingdon Cross*", Pattern Recognition Letters 11, pp 501–506, 1990.

[56] K. Preston Jr., "*Benchmark Results—The Abingdon Cross*", Evaluation of Multicomputers for Image Processing, L. Uhr et al., eds., Academic Press, Cambridge, Mass., 1986.

[57] A. J. Akerib, S. Ruhman, S. Ullman, "*Real Time Associative Vision Machine*", Proc. 7th Israel Conf. on Artif. Intel., Vision & Pattern Recog. Elsevier, December 1990.

[58] Avidan J. Akerib and Smil Ruhman, "*Associative Contour Processing*", MVP'90 IAPR Workshop on Machine Vision Applications, Nov. 28–30, 1990, Tokyo.

[59] Avidan J. Akerib and Smil Ruhman "*Associative Array and Tree Algorithms in Stereo Vision*", Proc. 8th Israel Conf. on Artif. Intel. Vision & Pattern Recog., Elsevier, December 1991.

All of the above references and publications cited therein are hereby incorporated by reference. Numbers in square brackets in the text are references to the above documents.

SUMMARY OF THE INVENTION

The present invention seeks to provide improved methods and apparatus for signal processing.

The Associative Signal Processing (ASP) approach is now compared to a conventional serial computer's structure which includes a memory and a CPU. The CPU is responsible for computation, while the memory is a simple device which only stores data.

The ASP architecture is totally different. The computation is carried out on an "intelligent memory" while the CPU is replaced by a simple controller that manages this "intelligent" memory. In addition to its capability to read and write, each cell or word in this memory can identify its contents and change it according to instructions received from the controller.

For example, assume an array of a million numbers between 1 and 5. The requirement is to add 3 to the array.

In conventional serial computers, a number is transferred from the addressable memory to the CPU, 3 is then added, and the result is returned to the memory. The process takes 1–3 machine cycles for each specific number, for a total of 1–3 million machine cycles for the whole array.

In the associative approach the one million numbers are stored in the "intelligent memory". The controller has to ask five questions and generate five answers as follows: "Who is 5?" Please identify yourself." This takes one machine cycle. The controller instructs all those who identified themselves, to become "8". The controller continues to ask "Who is 4" and instruct "You are 7!" and so on, until it covers all the combinations.

This operation takes only 10 machine cycles in comparison to 1–3 million machine cycles with conventional serial computers. Using this basic instruction set of read, identify and write, all the arithmetical and logical operations can be performed.

There is thus provided, in accordance with a preferred embodiment of the present invention, associative signal processing apparatus for processing an incoming signal, the apparatus including an array of processors, each processor including a multiplicity of associative memory cells, each sample of an incoming signal being processed by at least one of the processors, a register array including at least one register operative to store responders arriving from the processors and to provide communication between processors, and an I/O buffer register for inputting and outputting a signal, wherein the processor array, the register array and the I/O buffer register are arranged on a single module.

There is also provided, in accordance with a preferred embodiment of the present invention, associative signal processing apparatus including an array of processors, each processor including a multiplicity of associative memory cells, at least one of the processors being operative to process a plurality of samples of an incoming signal, a register array including at least one register operative to store responders arriving from the processors and to provide communication between processors, and an I/O buffer register for inputting and outputting a signal.

Further in accordance with a preferred embodiment of the present invention, the processor array, the register array and the I/O buffer register are arranged on a single chip.

Still further in accordance with a preferred embodiment of the present invention, the register array is operative to perform at least one multicell shift operation.

There is also provided, in accordance with a preferred embodiment of the present invention, signal processing apparatus including an array of associative memory words, each word including a processor, each sample of an incoming signal being processed by at least one of the processors, a register array including at least one register operative to provide communication between words and to perform at least one multicell shift operation, and an I/O buffer register for inputting and outputting a signal.

Further in accordance with a preferred embodiment of the present invention, the register array is also operative to perform single cell shift operations.

Still further in accordance with a preferred embodiment of the present invention, the I/O buffer register and the processors are operative in parallel.

Additionally in accordance with a preferred embodiment of the present invention, the word length of the I/O buffer register is increasable by decreasing the wordlength of the associative memory cells.

Further in accordance with a preferred embodiment of the present invention, the apparatus is operative in video real time.

Still further in accordance with a preferred embodiment of the present invention, the signal includes an image.

Further in accordance with a preferred embodiment of the present invention, at least one word in the array of words includes at least one nonassociative memory cell.

Still further in accordance with a preferred embodiment of the present invention, at least one word in the array of words includes at least one column of nonassociative memory cells.

Further in accordance with a preferred embodiment the present invention, the array, the register array and the I/O buffer register are arranged on a single module.

Still further in accordance with a preferred embodiment of the present invention, the module has a bus which receives instructions and also performs at least one multicell shift operation.

Additionally in accordance with a preferred embodiment of the present invention, the module has a first bus which performs at least one multicell shift operation and a second bus which performs at least one single cell shift operation.

There is also provided, in accordance with a preferred embodiment of the present invention, an array of processors which communicate by multicell and single cell shift operations, the array including a plurality of processors, a first bus connecting at least a pair of the processors which is operative to perform at least one multicell shift operation, and a second bus connecting at least a pair of the processors which is operative to perform single cell shift operations.

There is additionally provided, in accordance with a preferred embodiment of the present invention, a signal processing method including:

for each consecutive pair of first and second signal characteristics within a sequence of signal characteristics, counting the number of samples having the first signal characteristic, and subsequently, counting the number of samples having the second signal characteristic.

Further in accordance with a preferred embodiment of the present invention, counting includes generating a histogram.

Still further in accordance with a preferred embodiment of the present invention, the signal includes a color image.

Still further in accordance with a preferred embodiment of the present invention, at least one characteristic includes at least one of the following group of characteristics: intensity, noise, and color density.

Further in accordance with a preferred embodiment of the present invention, the method also includes scanning a medium bearing the color image.

Still further in accordance with a preferred embodiment of the present invention, the image includes a color image.

There is also provided, in accordance with a preferred embodiment of the present invention, an edge detection method including identifying a first plurality of edge pixels and a second plurality of candidate edge pixels, identifying, in parallel, all candidate edge pixels which are connected to at least one edge pixel as edge pixels, and repeating the second identifying step at least once.

There is additionally provided, in accordance with a preferred embodiment of the present invention, a signal processing method including storing an indication that a first plurality of first samples has a first characteristic, storing, in parallel for all individual samples which are connected to at least one sample having the first characteristic, an indication that the connected samples have the first characteristic, and repeating the second step at least once.

Further in accordance with a preferred embodiment of the present invention, the signal includes an image and the first characteristic of the first samples is that the first samples are edge pixels.

There is also provided, in accordance with a preferred embodiment of the present invention, a feature labeling method in which a signal is inspected, the signal including at least one feature, the feature including a set of connected samples, the method including storing a plurality of indices for a corresponding plurality of samples, replacing, in parallel for each individual sample from among the plurality of samples, the stored index of the individual sample by an index of a sample connected thereto, if the index of the connected sample is ordered above the index of the individual sample, and repeating the replacing step at least once.

Further in accordance with a preferred embodiment of the present invention, replacing is repeated until only a small number of indices are replaced in each iteration.

Still further in accordance with a preferred embodiment of the present invention, the signal includes an image.

Additionally in accordance with a preferred embodiment of the present invention, the signal includes a color image.

Still further in accordance with a preferred embodiment of the present invention, the samples include pixels, the first characteristic includes at least one color component and adjacency of pixels at least partly determines connectivity of samples.

Additionally in accordance with a preferred embodiment of the present invention, the pixels form an image in which a boundary is defined and repeating is performed until the boundary is reached.

Further in accordance with a preferred embodiment of the present invention, repeating is performed a predetermined number of times.

There is also provided, in accordance with a preferred embodiment of the present invention, a method for image correction including computing a transformation for an output image imaged by a distorting lens, such as an HDTV lens, which compensates for the lens distortion, and applying the transformation in parallel to each of a plurality of pixels in the output image.

There is also provided associative signal processing apparatus including a plurality of comparing memory elements each of which is operative to compare the contents of memory elements other than itself to respective references in accordance with a user-selected logical criterion, thereby to generate a responder if the comparing memory element complies with the criterion, and a register operative to store the responders.

Further in accordance with a preferred embodiment of the present invention, the criterion includes at least one logical operand.

Still further in accordance with a preferred embodiment of the present invention, at least one logical operand includes a reference for at least one memory element other than the comparing memory element itself. For example, a plurality of memory elements may be respectively responsible for a corresponding plurality of pixels forming a color image. The references may include three specific pixel values A, B and C and the user-selected logical criterion may be that an individual pixel have a value of A, OR that its upper right neighbor has a value of B and its lower left neighbor has a value of C.

Further in accordance with a preferred embodiment of the present invention, each memory element includes at least one memory cell.

Still further in accordance with a preferred embodiment of the present invention, the plurality of comparing memory elements are operative in parallel to compare the contents of a memory element other than themselves to an individual reference.

There is also provided, in accordance with a preferred embodiment of the present invention, an associative memory including an array of PEs (processor elements) including a plurality of PE's, wherein each PE includes a processor of variable size, and a word of variable size including an associative memory cell, wherein all of the associative memory cells from among the plurality of associative memory cells included in the plurality of PE's are arranged in the same location within the word and wherein the plurality of words included in the plurality of PE's together form a FIFO.

Further in accordance with a preferred embodiment of the present invention, the word of variable size includes more than one associative memory cell.

There is also provided, in accordance with a preferred embodiment of the present invention, a method for modifying contents of a multiplicity of memory cells and including performing, once, an arithmetic computation on an individual value stored in a plurality of memory cells and storing the result of the arithmetic computation in a plurality of memory cells which contain the individual value.

Further in accordance with a preferred embodiment of the present invention, storing is carried out in all memory cells in parallel.

Also described herein is a chip for multimedia and image processing applications. It is suitable for low-cost, low power consumption, small size and high-performance real-time image processing for consumer applications and high-end powerful image processing for multimedia and communication applications.

The chip is a general purpose, massively parallel processing chip, in which typically 1024 associative processors are crowded onto one chip, enabling the processing of 1024 digital words in one machine cycle of the computer clock.

The chip was designed to allow the performance of a wide range of image processing and multimedia applications in real-time video rate. In comparison, existing general purpose, serial computing chips and digital signal processing chips (DSPs) enable the processing of only 1–16 words in one machine cycle.

The chip's major instruction set is based on four basic commands that enable the performance of all arithmetic and logic instructions. This is another design advantage that allows more than a thousand processors to be crowded onto a single chip.

A single chip typically performs the equivalent of 500–2000 million instructions per second (MIPS). A system based on the chip's architecture can reach multimedia performance of high-end computers at only a small fraction of the price of typical high-end computers.

The chip is based on a modular architecture, and enables easy connection of more than one chip in order to gain high performance (in a linear ratio). Thus, a large number of the chips can be connected in parallel in order to linearly increase overall performance to the level of the most sophisticated supercomputers.

Existing CPU chips and DSPs require a dedicated operating system when more than one chip is connected in parallel. The performance increases in ratio to the square root of the number of chips connected together. Connecting more than two chips requires the architecture of a supercomputer.

The chip's architecture allows massively parallel processing in concurrence with data input and output transactions. As an associative processor, each of the 1024 chips has its own internal memory and data path. The chip's data path architecture provides parallel loading of data into the internal processors, thereby eliminating the bottleneck between memory and CrU that can cause severe performance degradation in ser i al computers.

The chip uses an average of 1 watt to perform the equivalent of 500 MIPS which is 10–25 times better than existing general purpose and DSP chips.

There is also provided in accordance with another preferred embodiment of the present invention associative signal processing apparatus for processing an incoming signal comprising a plurality of samples, the apparatus including a two-dimensional array of processors, each processor including a multiplicity of content addressable memory cells, each sample of an incoming signal being processed by at least one of the processors, and a register array including at least one register operative to store responders arriving from the processors and to provide communication, within a single cycle, between non-adjacent processors.

There is also provided in accordance with another preferred embodiment of the present invention associative signal processing apparatus including an array of processors, each processor including a multiplicity of associative memory cells, at least one of the processors being operative to process a plurality of samples of an incoming signal, a register array including at least one register operative to store responders arriving from the processors and to provide communication between processors, and an I/O buffer register operative to input an incoming signal and to output an outgoing signal.

Further in accordance with a preferred embodiment of the present invention the processor array, the register array and the I/O buffer register are arranged on a single chip.

Still further in accordance with a preferred embodiment of the present invention the register array is operative to perform at least one multicell shift operation.

Additionally in accordance with a preferred embodiment of the present invention the register array is operative to perform at least one multicell shift operation.

There is also provided in accordance with another preferred embodiment of the present invention associative apparatus including a plurality of comparing memory elements each of which is operative to compare the contents of memory elements other than itself to respective references in accordance with a user-selected logical criterion, thereby to generate a responder if the comparing memory element complies with the criterion, and a register operative to store the responders.

Further in accordance with a preferred embodiment of the present invention the criterion includes at least one logical operand.

Still further in accordance with a preferred embodiment of the present invention the I/O buffer register and the processors are operative in parallel.

Additionally in accordance with a preferred embodiment of the present invention the word length of the I/O buffer register is increasable by decreasing the wordlength of the associative memory cells.

Further in accordance with a preferred embodiment of the present invention the apparatus is operative in video real time.

Still further in accordance with a preferred embodiment of the present invention the signal includes an image.

Additionally in accordance with a preferred embodiment of the present invention the at least one logical operand includes a reference for at least one memory element other than the comparing memory element itself.

Moreover in accordance with a preferred embodiment of the present invention each memory element includes at least one memory cell.

Further in accordance with a preferred embodiment of the present invention the plurality of comparing memory elements are operative in parallel to compare the contents of a memory element other than themselves to an individual reference.

There is also provided in accordance with another preferred embodiment of the present invention a method for image correction including computing a transformation for an output image imaged by a distorting lens which compensates for the lens distortion, and applying the transformation in parallel to each of a plurality of pixels in the output image.

Further in accordance with a preferred embodiment of the present invention the distorting lens includes an HDTV lens.

There is also provided in accordance with a preferred embodiment of the present invention an array of processors which communicate by multicell and single cell shift operations, the array including a plurality of processors, a first bus connecting at least a pair of the processors which bus is operative to perform at least one multicell shift operation, and a second bus connecting at least a pair of the processors which bus is operative to perform single cell shift operations.

There is also provided in accordance with another preferred embodiment of the present invention a signal processing method for processing a signal including for each consecutive pair of first and second signal characteristics within a sequence of signal characteristics, counting in parallel the number of samples having the first signal characteristic, and subsequently, counting in parallel the number of samples having the second signal characteristic.

Further in accordance with a preferred embodiment of the present invention the counting includes generating a histogram.

Still further in accordance with a preferred embodiment of the present invention the signal includes a color image.

Additionally in accordance with a preferred embodiment of the present invention at least one characteristic includes at least one of the following group of characteristics: intensity, noise, and color density.

Moreover in accordance with a preferred embodiment of the present invention the method also includes scanning a medium bearing the color image.

Further in accordance with a preferred embodiment of the present invention the image includes a color image.

There is also provided in accordance with another preferred embodiment of the present invention an edge detection method including identifying a first plurality of edge pixels and a second plurality of candidate edge pixels, identifying, in parallel, all candidate edge pixels which are connected to at least one edge pixel as edge pixels, and repeating the identifying in parallel at least once.

There is also provided in accordance with another preferred embodiment of the present invention a feature labeling method in which a signal is inspected, the signal including at least one feature, the feature including a set of connected samples, the method including storing a plurality of indices for a corresponding plurality of samples, in parallel for each individual sample from among the plurality of samples, replacing the stored index of the individual sample by an index of a sample connected thereto, if the index of the connected sample is ordered above the index of the individual sample, and repeating the replacing at least once.

Further in accordance with a preferred embodiment of the present invention the replacing is repeated until only a small number of indices are replaced in each iteration.

Still further in accordance with a preferred embodiment of the present invention the signal includes an image.

Additionally in accordance with a preferred embodiment of the present invention the signal includes a color image.

There is also provided in accordance with another preferred embodiment of the present invention image correction apparatus including a transformation computer operative to compute a transformation for an output image imaged by a distorting lens which transformation compensates for the lens distortion, an in-parallel transformer operative to apply the transformation in parallel to each of a plurality of pixels in the output image.

There is also provided in accordance with another preferred embodiment of the present invention an associative memory including an array of PEs including a plurality of PEs, wherein each PE includes a processor of variable size, and a word of variable size including an associative memory cell, wherein all of the associative memory cells from among the plurality of associative memory cells included in the plurality of PE's are arranged in the same location within the word and wherein the plurality of words included in the plurality of PE's together form a FIFO.

Further in accordance with a preferred embodiment of the present invention the word of variable size includes more than one associative memory cell.

There is also provided in accordance with another preferred embodiment of the present invention a method for modifying contents of a multiplicity of memory cells and including performing, once, an arithmetic computation on an individual value stored in a plurality of memory cells, storing the result of the arithmetic computation in a plurality of memory cells which contain the individual value.

Further in accordance with a preferred embodiment of the present invention the storing is carried out in all memory cells in parallel.

There is also provided in accordance with another preferred embodiment of the present invention a method for constructing associative signal processing apparatus for processing an incoming signal, the method including arranging, on a module, an array of processors, each processor including a multiplicity of associative memory cells, each sample of an incoming signal being processed by at least one of the processors, arranging, on the same module, a register array including at least one register operative to store responders arriving from the processors and to provide communication between processors, and arranging, on the same module, an I/O buffer register for inputting and outputting a signal.

Further in accordance with a preferred embodiment of the present invention at least one sample is processed by two or more of the processors.

Still further in accordance with a preferred embodiment of the present invention at least one of the processors processes more than one sample.

Additionally in accordance with a preferred embodiment of the present invention the register array includes a plurality of registers.

Moreover in accordance with a preferred embodiment of the present invention the order in which the I/O buffer inputs an image differs from the row/column order of the image.

Further in accordance with a preferred embodiment of the present invention the order in which the I/O buffer inputs the samples differs from the order of the samples within the incoming signal.

Still further in accordance with a preferred embodiment of the present invention the register array includes a plurality of registers operative to store responders arriving from the processors.

Additionally in accordance with a preferred embodiment of the present invention the at least one register provides communication between the processors.

Moreover in accordance with a preferred embodiment of the present invention the at least one register provides communication between processors which are processing nonadjacent samples.

Further in accordance with a preferred embodiment of the present invention the apparatus also includes an I/O buffer register operative to input and output a signal.

Still further in accordance with a preferred embodiment of the present invention the processor array, the register array and the I/O buffer register are arranged on a single module.

Additionally in accordance with a preferred embodiment of the present invention the processor array, the register array and the I/O buffer register are arranged on a single silicon die.

Moreover in accordance with a preferred embodiment of the present invention the I/O buffer register includes a plurality of buffer register cells whose number is at least equal to the number of processors in the two-dimensional processor array.

BRIEF DESCRIPTION OF THE DRAWINGS

The present invention will be understood and appreciated from the following detailed description, taken in conjunction with the drawings in which:

FIG. 13 is a simplified pictorial illustration of interprocessor communication within a portion of the apparatus of FIG. 11;

FIGS. 20A–20G are simplified pictorial illustrations of test templates illustrating an implementation of a method of thinning utilizing the apparatus of FIG. 11;

Attached herewith are the following appendices which aid in the understanding and appreciation of one preferred embodiment of the invention shown and described herein:

Appendix A is a description of preferred methods and systems for associative signal processing;

Appendix B is a listing of a preferred associative signal processing method for generating a histogram;

Appendix C is a listing of a preferred associative signal processing method for 1D convolution;

Appendix D is a listing of a preferred associative signal processing method for a low pass filter application of 2D convolution;

Appendix E is a listing of a preferred associative signal processing method for a Laplacian filter application of 2D convolution;

Appendix F is a listing of a preferred associative signal processing method for a Sobel filter application of 2D convolution;

Appendix G is a listing of a preferred associative signal processing method for curve propagation;

Appendix H is a listing of a preferred associative signal processing method for optical flow;

Appendix I is a listing of a preferred associative signal processing method for performing an RGB to YUV transformation;

Appendix J is a listing of a preferred associative signal processing method for corner and line detection;

Appendix K is a listing of a preferred associative signal processing method for contour labeling;

Appendix L is a listing of a preferred associative signal processing method for saliency networking;

Appendix M is a listing of a preferred associative signal processing method for performing a Hough transform on a signal which is configured as a line;

Appendix N is a listing of a preferred associative signal processing method for performing a Hough transform on a signal which is configured as a circle;

Appendix O is a listing of a preferred associative signal processing method for generating a Voronoi diagram signal; and Appendix P is a listing of a subroutine called "sub.rtn" which is called in each of the listings of Appendices B–O.

DETAILED DESCRIPTION OF PREFERRED EMBODIMENTS

Figure 1:
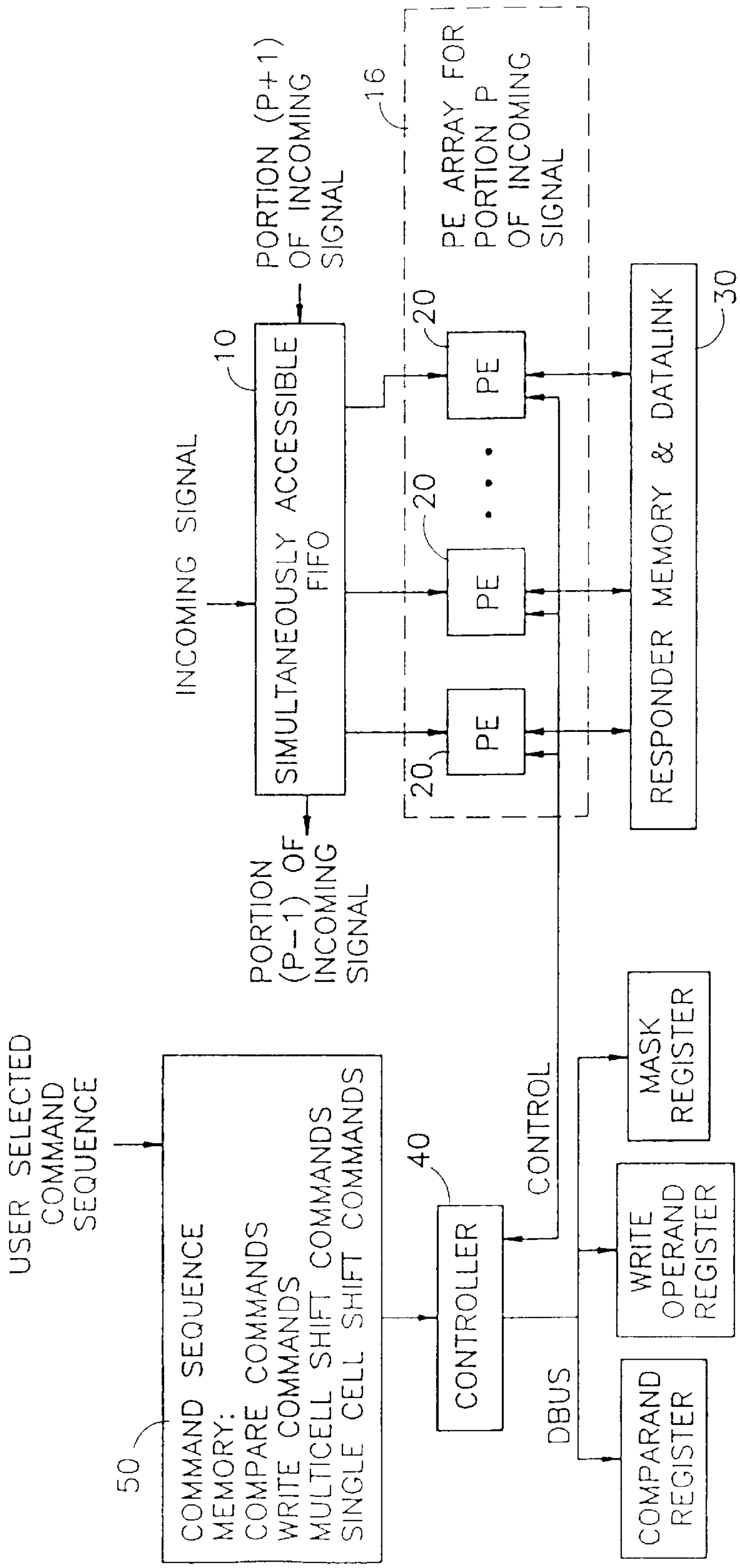
FIG. 1 is a simplified functional block diagram of associative signal processing apparatus constructed and operative in accordance with a preferred embodiment of the present invention.

Reference is now made to FIG. 1 which is a simplified functional block diagram of associative signal processing apparatus constructed and operative in accordance with a preferred embodiment of the present invention.

The apparatus of FIG. 1 includes a simultaneously accessible FIFO 10, or, more generally, any simultaneously accessible memory, which stores at least a portion of an incoming signal which arrives over a bus termed herein the DBUS. The simultaneously accessible FIFO 10 feeds onto a PE (processor element) array 16 including a plurality of PE's 20 which feed onto a datalink 30 which preferably also serves as a responder memory. Alternatively, a separate responder memory may be provided.

Each PE includes at least one associative memory cell, more typically a plurality of associative memory cells such as, for example, 72 associative memory cells. Each PE 20 stores and processes a subportion of the image, such that the subportions stored and processed by all of the PE's 20 forms the portion of the incoming signal stored at a single time in the simultaneously accessible FIFO 10.

For example, there may be 1024 PE's 20. If the processing task is simple enough to allow each FE to process 2 pixels at a time, then the FIFO may, at a single time, store a block of 2048 pixels within the color image. If the processing task is so complex that two PEs are required to process each pixel, then the FIFO may, at a single time, store a smaller block of only 512 pixels within the color image.

The PE's 20 are controlled by a controller 40 which is typically connected in parallel to all the PE's.

Figure 2:
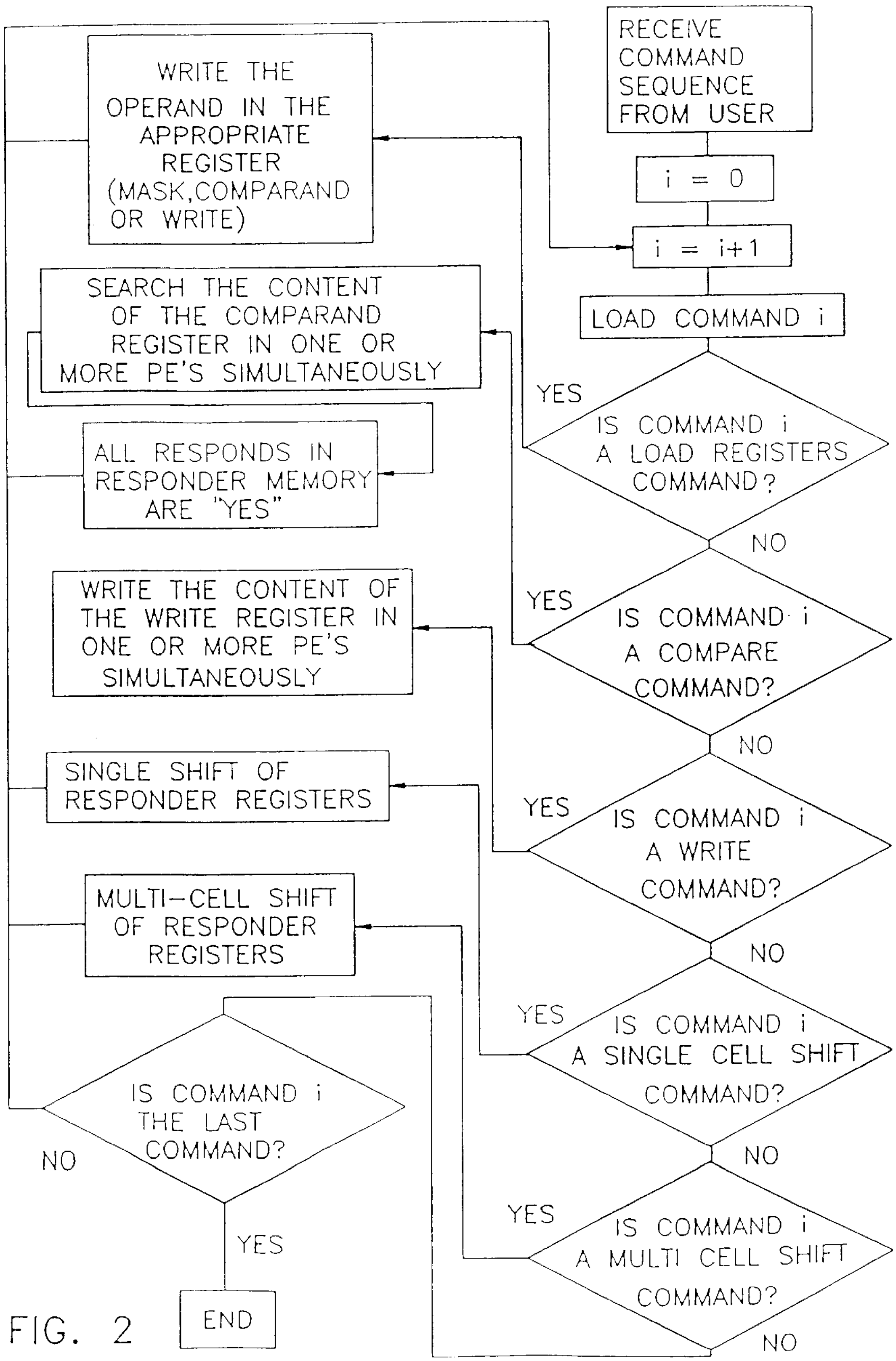
FIG. 2 is a simplified flowchart of a preferred method for employing the apparatus of FIG. 1.

Reference is also made to FIG. 2 which is a simplified flowchart of a preferred method for employing the apparatus of FIG. 1. The first step of the method of FIG. 2 is step 54. In step 54, the system receives a user selected command sequence which is to be processed for each pixel of a current block of the color image. The command sequence is stored in command sequence memory 50. Typically, a command sequence comprises commands of some or all of the following types:

a. Compare—Each of one or more PE's compares its contents to a comparand and generates an output indicating whether or not its contents is equivalent to the comparand.

b. Write—Each of one or more PE's if its own contents and/or the contents of other PE's in its vicinity comply with a logical criterion preceding the write command, changes its contents in accordance with a provided writing operand.

c. Single cell shift—The contents of each of one or more PE's shifts, via the datalink 30, into respectively adjacent one or more PE's.

d. Multicell shift—The contents of each of one or more PE's shifts, via the datalink 30, directly into respectively non-adjacent one or more PE's.

Also in step 54, the first block of the incoming signal is received by simultaneously accessible FIFO 10.

The command sequence is then processed, command by command, as shown in FIG. 2.

Figure 3:
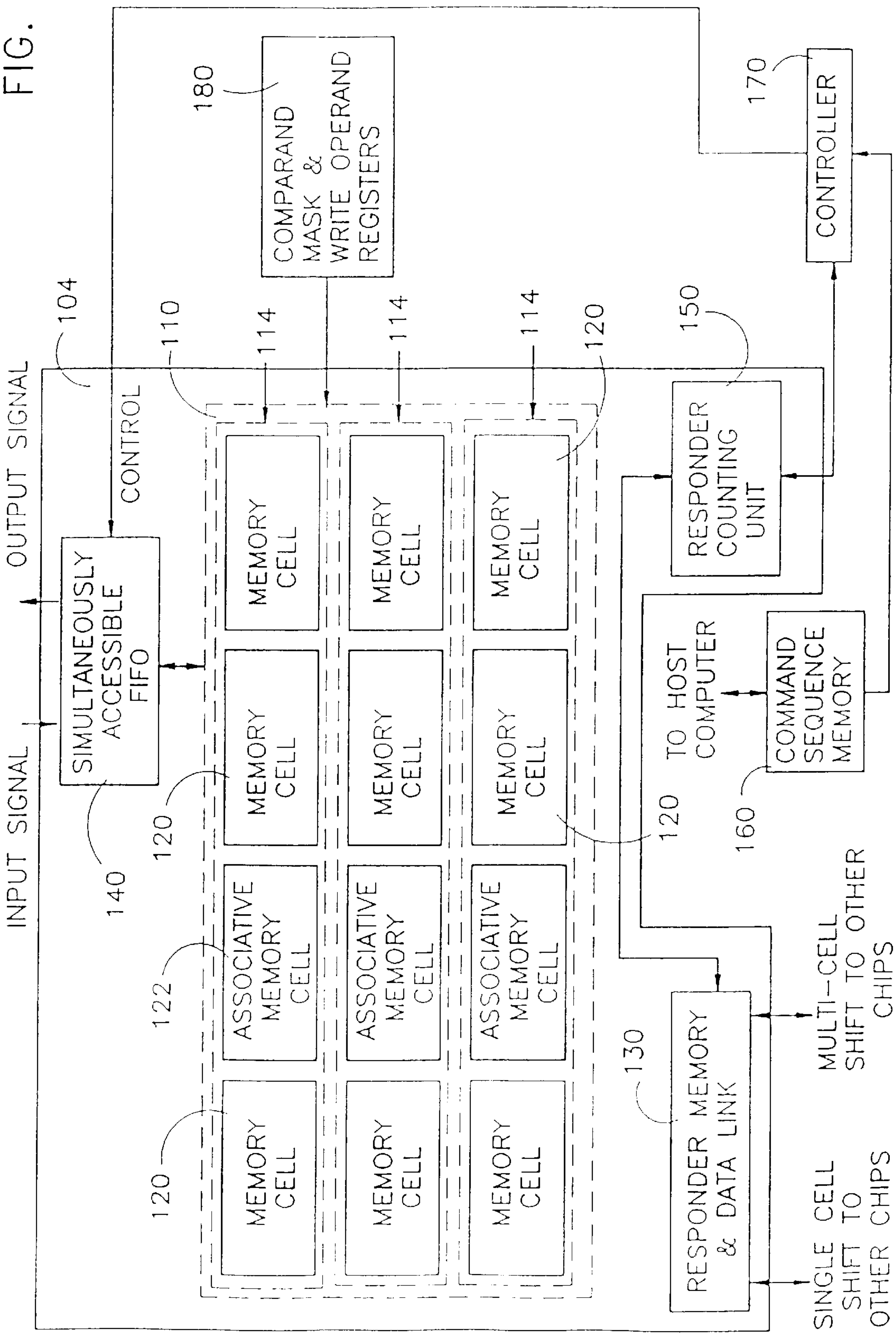
FIG. 3 is a simplified block diagram of associative signal processing apparatus for processing an incoming signal which is constructed and operative in accordance with a preferred embodiment of the present invention.

Reference is now made to FIG. 3 which is a simplified block diagram of associative signal processing apparatus for processing an incoming signal which is constructed and operative in accordance with a preferred embodiment of the present invention. The signal processing apparatus of FIG. 3 includes the following elements, all of which are arranged on a single module 104 such as a single chip:

a. An array 110 of processors or PE's 114, of which, for simplicity, three are shown. Each processor 114 includes a multiplicity of memory cells 120, of which, for simplicity, four are shown. From among each multiplicity of memory cells 120, at least one memory cell (exactly one, in the illustrated embodiment) is an associative memory cell 122. The associative memory cell or cells 122 of each processor are all arranged in the same location or locations within their respective processors, as shown. As an example, there may be 1K processors 114 each including 72 memory cells 120, all of which are associative.

Preferably, at least one of the processors is operative to process more than one sample of an incoming signal.

b. A responder memory 130 including one or more registers which are operative to store responders arriving from the processors 120 and, preferably, to serve as a datalink therebetween. Alternatively, a separate datalink between the processors may be provided. Preferably, the datalink function of memory 130 allows at least one multicell shift operation, such as a 16-cell per cycle shift operation, to be performed. The datalink function of memory 130 also preferably performs single cell shift operations in which a shift from one cell to a neighboring cell or from one PE to a neighboring PE is performed in each cycle.

c. A simultaneously accessible FIFO 140, or, more generally a simultaneously accessible memory, which inputs and outputs a signal.

d. A responder counting unit 150 which is operative to count the number of "YES" responders in responder memory 130.

e. Comparand, mask and write operand registers 180, as described above with reference to FIG. 1.

A command sequence memory 160, which may be similar to the command sequence memory 50 of FIG. 1, and a controller 170 are typically external to the module 104. The controller 170 is operative to control the command sequence memory 160.

Preferred methods for associative signal processing are now described, including:

a. Low level associative signal processing methods—histogram generation, 1D and 2D convolution, curve propagation, optical flow, and transformations between color spaces such as RGB to YUV transformations; and b. Mid-level associative signal processing methods—corner and line detection; contour labeling, saliency networking, Hough transform, and geometric tasks such as convex hull generation and Voronoi diagram generation.

Each of the above associative signal processing methods are now described.

Histogram generation

A preferred histogram generation method is now described with reference to Appendix B which is a listing of one software implementation of a histogram generation method. The method of Appendix B includes a very short loop repeated for each gray level. A COMPARE instruction tags all the pixels of that level and a COUNTAG tallies them up. The count is automatically available at the controller, which accumulates the histogram in an external buffer.

Convolution

Low level vision, particularly edge-detection, involves the application of various filters to the image, which are most conveniently executed by convolution. The image may be considered as a simple vector of length N×M or as a concatenation of N row vectors, each of length M. Convolution of an N-element data vector by a P-element filter results in a vector of length N+P-1, but only the central N-P+1 elements, representing the area of full overlap between the two vectors, are typically of interest.

The convolution filter vector [f], of length P and precision 8, is applied as an operand by the controller, one element at a time. The result may, for example, be accumulated in a field [fd] of length 8+8+log2 (P). A "temp" bit is used for temporary storage of the carry that propagates through field [fd]. A "mark" bit serves to identify the area of complete overlap by the filter vector.

An example of a row convolution method is provided in Appendix C.

An example of a 2D convolution method which implements a low pass filter is provided in Appendix D.

An example of a 2D convolution method which implements a Laplacian filter is given in Appendix E.

An example of a 2D convolution method which implements the Sobel method of edge detection is given in Appendix F.

Curve Propoagation

Curve propagation is useful in that it eliminates weak edges due to noise, but continues to trace strong edges as they weaken. On the basis of signal statistics and an estimate of noise in the image, two thresholds on gradient magnitude may be computed—"low" and "high" . Edge candidates with gradient magnitude under "low" are eliminated, while those above "high" are considered edges. Candidates with values between "low" and "high" are considered edges if they can be connected to a pixel above "high" through a chain of pixels above "low". All other candidates in this interval are eliminated.

The process involves propagation along curves. Associative implementation, a method for which is set forth in detail in Appendix G, uses three flags:

i. "E", which initially marks candidates above "high" threshold (unambiguous edge points), and eventually designates all selected edge points;

ii. "OE" (Old Edges)—to keep track of confirmed edges at the last iteration; and iii. "L" to designate candidates above "low".

At every iteration, each "L" candidate is examined to see if at least one of its 8-neighbors is an edge, in which case it is also declared an edge by setting "E". Before moving "E" into "OE", the two flags are compared to see if steady state has been reached, in which case the process terminates.

Optical Flow

Optical flow assigns to every point in the image a velocity vector which describes its motion across the visual field. The potential applications of optical flow include the areas of target tracking, target identification, moving image compression, autonomous robots and related areas. The theory of computing optical flow is typically based on two constraints: the brightness of a particular point in the image remains constant, and the flow of brightness patterns varies smoothly almost everywhere.

Horn & Schunck derived an iterative process to solve the constrained minimization problem. The flow velocity has two components (u,v). At each iteration, a new set of velocities [u(n+1),v(n+1)] can be estimated from the average of the previous velocity estimates. A method for implementing the Horn and Schunk method associatively is given in Appendix H.

Color Space Transformation

One of the major task in color image processing is to transform the 24 bit space of the conventional Red (R), Green (G) and Blue (B) color components, to another space such as a (Y,U,V) space which is more suited for color image compression. A preferred associative method for color space transformation is set forth in Appendix I.

Detection of Corners and Line Direction

An important feature for middle and higher level processing is the ability to distinguish corners and line direction. In Canny edge detection, line orientation is generated during the process. On the other hand, the M&H algorithm is not directional, and the edge bit-map it produces must be further processed to detect line orientation. According to the preferred embodiment of the present invention, an edge bit-map of a 9×9 neighborhood around each pixel is used to distinguish segment direction. The resulting method can typically discriminate 120 different lines and corners. A program listing of this method is set forth as Appendix J.

Contour Tracing and Labeling

A preparation step labels each contour point with its x,y coordinates. The process is generally iterative and operates on a 3×3 neighborhood of all contour points in parallel. Every contour point looks at each one of its 8 neighbors in turn and adopts the neighbor's label if smaller than its own. The circular sequence in which neighbors are handled appreciably enhances label propagation.

Iteration stops when all labels remain unchanged, leaving each contour identified by its lowest coordinates. The point of lowest coordinates in each contour is the only one to retain its original label. The lowest coordinate points have been kept track of and are now counted to obtain the number of contours in the image. A preferred associative method for performing this method is set forth in Appendix K.

Associative Saliency Networking

Salient structures in an image can be perceived at a glance without the need for an organized search or prior knowledge about their shape. Such a structure may stand out even when embedded in a cluttered background or when its elements are fragmented. Sha'ashua & Ullman have proposed a global saliency measure for curves based on their length, continuity and smoothness.

The image is considered as a network of N×N grid points, with d orientation elements segments or gaps coming into each point from its neighbors, and as many going out to its neighbors. A curve of length L in this image is a connected sequence of orientation elements p(i),p(i+1), . . . , p(i+L), each element representing a line-segment or a gap in the image. An associative implementation of this method is set forth in Appendix L.

Hough Transform

The Hough transform detects a curve whose shape is described by a parametric equation, such as a straight line or a conic section, even if there are gaps in the curve. Each point of the figure in image space is transformed to a locus in parameter space. After splitting the parameters into suitable ranges, a histogram is generated giving the distribution of locus points in parameter space. Occurrence of the object curve is marked by a distinct peak in the histogram (intersection of many loci).

In the case of a straight line the normal parameterization may be used and given by: Xcos(A)+Ysin(A)=R which specifies the line by R and the angle A, and the histogram includes a straight line in every direction of A. But if the candidate points are the result of edge detection by a method that yields direction, then the angle A is known. An associative implementation of this method is set forth in Appendix M.

EXAMPLE

The major steps required to perform a Hough transform operation for a sample image of 256×256 pixels are now described: The 256×256 image with the origin at its center is arranged linearly pixel after pixel and row after row in multiple chips, each in one processor. For example, if the chip includes 1K processors, 64 chips may be used to hold the 256×256=64K. The x-y coordinates are given by 8 bits in absolute value and sign. Angle A from 0 to pi (3.1415 . . . ) is given to a matching precision of 10 bits (excluding sign of gradient). The sine and cosine are evaluated by table look-up. Preferably, the table size is recued four-fold to take into account the symmetry of these functions. After comparing A, the histogram is evaluated and read-out element by element using a "countag" command.

EXAMPLE

A circle with given radius R and center x0,y0 is to be detected. The direction of the gradient is employed to simplify the process. dy/dx−(x-x0)/(y-y0)=tan(T−pi/2), by differentiation, where T is the gradient direction. Solving for x0 and y0:

$$x0=x\pm R\sin(T-pi/2);$$

and $$y0=y\pm R\cos(T-pi/2).$$

A histogram is generated for x0,y0. An associative implementation of a preferred Hough transform is set forth in Appendix N.

Voronoi Diagram

This type of diagram is useful for proximity analysis. Starting with a given set of L points in the plane, P(i), i=1,2, . . . , L, the Voronoi diagram surrounds each point P(i) by a region, R(i), such that every point in R(i) is closer to P(i) than to any other point in the set, P(j),j=1,2, . . . L and i not equal to j. The boundaries of all these regions, R(i), constitute the Voronoi diagram.

An associative method based on the "brush fire" technique is presented in Appendix O. Each of the given points acts as a source of "fire" that spreads uniformly in all directions. The boundaries consist of those points at which fires from two (or three) sources meet. Every point in the given set is initially marked with a different color, such as its own xy-coordinates. Each point in the image looks at its 8-neighbors. A blank (uncolored) point that sees a colored neighbor will copy its color. If both are colored, the point will compare colors, marking itself as a Voronoi (boundary) point if the colors are different. This process is iterated until all points are colored.

The following are basic associative signal processing steps which are frequently used in the methods of Appendices B to O. Any of the steps categorized as Group 1 may be carried out in parallel with any of the steps from Group 3. Also, any of the steps from Group 1, any of the steps from Group 2 and any of the steps from Group 4 may be carried out in parallel.

| Number | Step (abbreviation) | Step (full description) |
|---|---|---|
| | | Group 1 |
| 1 | LETM | Load mask register |
| 2 | LETC | Load comparand register |
| 3 | LETMC | Load mask and comparand |
| 4 | LMCC | Load mask clear comparand |
| 5 | LMCCXX | Load mask clear comparand exclusive |
| 6 | LCSM | Load comparand set mask |
| 7 | LMX | Load mask exclusive |
| 8 | LCX | Load comparand exclusive |
| 9 | LMSC | Load mask set comparand |
| 10 | SMX | Set mask exclusive |
| 11 | SCX | Set comparand exclusive |
| | | Group 2 |
| 12 | SETAG | Set all responders to "1" (yes) |
| | | Group 3 |
| 13 | SHUP | Single cell shift up |
| 14 | SHDN | Single cell shift down |
| 15 | LGUP | Multiple cell shift up |
| 16 | SHUP | Multiple cell shift down |
| | | Group 4 |
| 17 | COMPARE | Search for a specific value |
| 18 | WRITE | Write a value to one or more processors simultaneously |
| | | Group 5 |
| 19 | READ | Read data from one processor |
| 20 | COUNTAG | Count all responders |
| 21 | FIRSEL | Mark the first responder |
| 22 | CONFIGURE FIFO | Select I/O bit/s for FIFO |
| 23 | NOP | No operation |

To employ any of the methods described in any of Appendices B to O, the listings of Appendices B to O may be run on any "C" language compiler such as the Borland "C++" compiler, using the CLASS function.

As already described, each of the methods of Appendices B to O includes the following steps:

a. a basic memory size defining step;

b. a basic associative word length defining step;

c. step in which the subroutine of Appendix P is called; and d. Steps which are specific to the individual application. is appreciated that the particular embodiment described in the Appendices is intended only to provide an extremely detailed disclosure of the present invention and is not intended to be limiting.

One implementation of an associative signal processing chip is now described. The implementation is termed herein ASP100.

1. Introduction

The ASP100 is an associative processing chip. It is intended to serve as part of the Vision Associative Computer, most likely in an array of multiple ASP100 chips.

The ASP100 consists of an associative memory array of 1K×72 bits, peripheral circuitry, image FIFO I/O buffer, and control logic.

2. Modes of Operation

The ASP100 can be operated as a single chip (Single Chip Mode) or as part of an array of ASP100 chips (Array Mode).

2.1 Single Chip Mode

Figure 4:
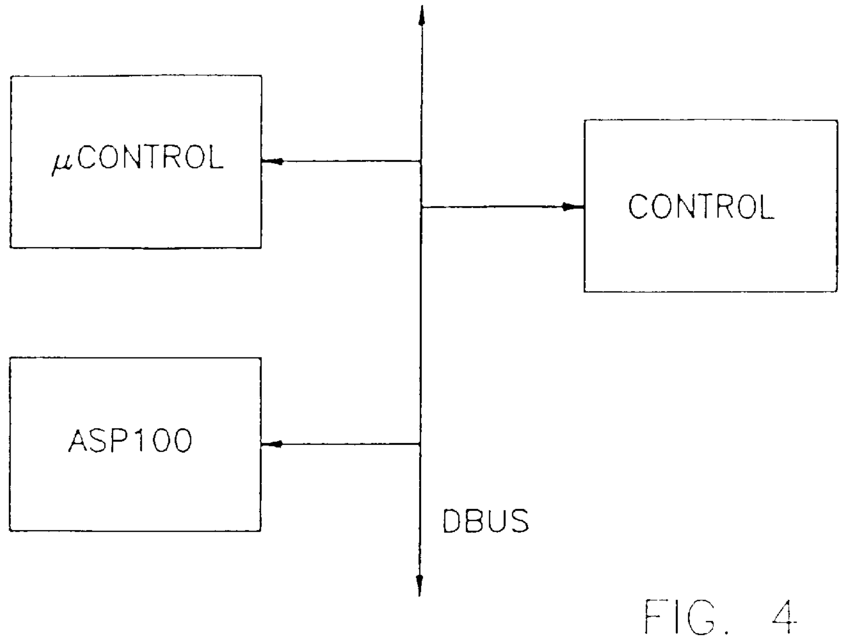
FIG. 4 is simplified block diagram of a preferred implementation of the apparatus of FIG. 1.

The Single Chip Mode is shown in FIG. 4. In this mode a single ASP100 is operated in conjunction with a controller.

2.2 Array Mode

Figure 5:
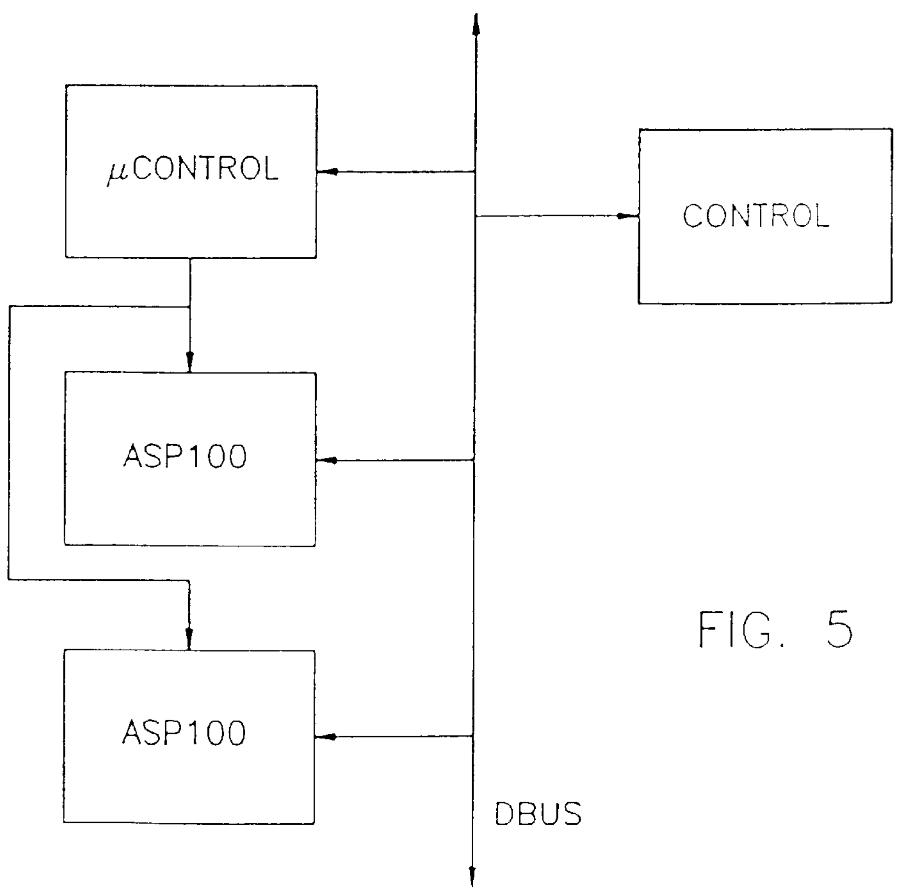
FIG. 5 is a simplified block diagram of an alternative preferred implementation of the apparatus of FIG. 1.

The Array mode is shown in FIG. 5. An array of ASP100 chips are interconnected in parallel, constituting a linear array. A single controller chip, or a suitable circuit, controls the array.

3. Pinout 3.1 Basic Pinout

The ASP100 may be packaged in a 160 pin PQFP package. All output and I/O pins are 3-state, and can be disabled by CS. Following is the complete list of pins:

| Pin Name | Description | I/O | # pins |
|---|---|---|---|
| DBUS[0:31] | Data bus. serves shifts and read | I/O | 32 |
| VIN[0:23] | Video In Bus | I | 24 |
| VOUT[0:23] | Video Out Bus | O | 24 |
| NORTH | Data shift north | I/O | 1 |
| SOUTH | Data shift south | I/O | 1 |
| CTAG | Count Tag Serial Output | O | 1 |
| CTAGVAL | CTAG Valid | O | 1 |
| RSP | RSP (response exists) | O | 1 |
| RESET | (Active low Asynchronous Reset | I | 1 |
| CLKIN | Fast Clock(50 MHz) | I | 1 |
| DCLKIN | Clock Sync (25 MHz) | I | 1 |
| RSTFIFO | Reset FIFO Address Generator | I | 1 |
| FINIT | FIFO init - start FIFO I/O | I | 1 |
| FFUL | FIFO Full (Image I/O Completed for the chip) | O | 1 |
| FIRSTIN | Input to First-select chain | I | 1 |
| VDD[0:15] | Vdd | Vdd | 16 |
| GND[0:15] | Ground | Gnd | 16 |
| CS | Chip Select (enables 3-state outputs) | I | 1 |
| | The following Control Signals Originate in the Microcontroller | | |
| LIN | Shift input from Low side | I | 1 |
| HIN | Shift input from High side | I | 1 |
| WE | Write Enable | I | 1 |
| LDM | Load Mask | I | 1 |
| LDC | Load Comparand | I | 1 |
| RSTM | Reset Mask | I | 1 |
| RSTC | Reset Comparand | I | 1 |
| SETM | Set Mask | I | 1 |
| SETC | Set Comparand | I | 1 |
| EXM | Exclusive Load Mask (together with LDM) or Set Mask (together with SETM) | I | 1 |
| EXC | Exclusive Load Comparand (together with LDC) or Set Comparand (together with SETC) | I | 1 |
| LDFC | Load FIFO Configuration | I | 1 |
| SCT[1:0] | Sector Number | I | 2 |
| SETAG | Set Tag | I | 1 |
| MUX[0:2] | Select input to TAG | I | 3 |
| CNTINIT | Initialize Response Counter | I | 1 |
| RSTADDR | Reset Address Generator of Response Counter | I | 1 |
| CMP | Compare: Precharge Match Lines | I | 1 |
| CVA | Bit lines is Constant (equal to CBA) (on CVA=0) or Variable from Comparand (CVA=1) | I | 1 |
| CBA | Bit lines and Inverse Bit lines are precharged for Read (CBA=1) or discharged for Compare (CBA=0) (active when CVA=0) | I | 1 |
| RDA | Bit lines float (RDA=0) | I | 1 |
| LDOR | Load Output Register (end of Read) | I | 1 |
| SELRS | Select Read or Shift - controls I/O mux connecting to DBUS | I | 1 |

-continued

| Pin Name | Description | I/O | # pins |
|---|---|---|---|
| PRSP | Precharge RSP line I I | I | 1 |
| FIRCNTEN | Connects tag to first-sel and count-tag circuits | I | 1 |
| FENB | Enable FIFO I/O | I | 1 |
| total # of pins | | | 150. |

3.2 Test Pinout

The following is a list of the pins which serve as a test points. They can be ignored while packing the production version:

| Pin Name | Description | # pins |
|---|---|---|
| ML01 | Analog precharged Match line 0, section 1 | 1 |
| ML02 | Analog precharged Match line 0, section 2 (line #342) | 1 |
| ML03 | Analog precharged Match line 0, section 3 (line #683) | 1 |
| BL01 | Analog precharged Bit line 0 ("rightmost"), section 1 | 1 |
| BL02 | Analog precharged Bit line 0 ("rightmost"), section 2 | 1 |
| BL03 | Analog precharged Bit line 0 ("rightmost"), section 3 | 1 |
| IBL01 | Analog precharged Inverse Bit line 0 ("rightmost"), section 1 | |
| IBL02 | Analog precharged Inverse Bit line 0 ("rightmost"), section 2 | 1 |
| IBL03 | Analog precharged Inverse Bit line 0 ("rightmost"), section 3 | 1 |
| RSP1 | Analog precharged RSP before SA, section 1 | 1 |
| RSP2 | Analog precharged RSP before SA, section 2 | 1 |
| RSP3 | Analog precharged RSP before SA, section 3 | 1 |
| REFML | Reference level for ML | 1 |

4. Architecture and Operation 4.1 Top-Level View

Figure 6:
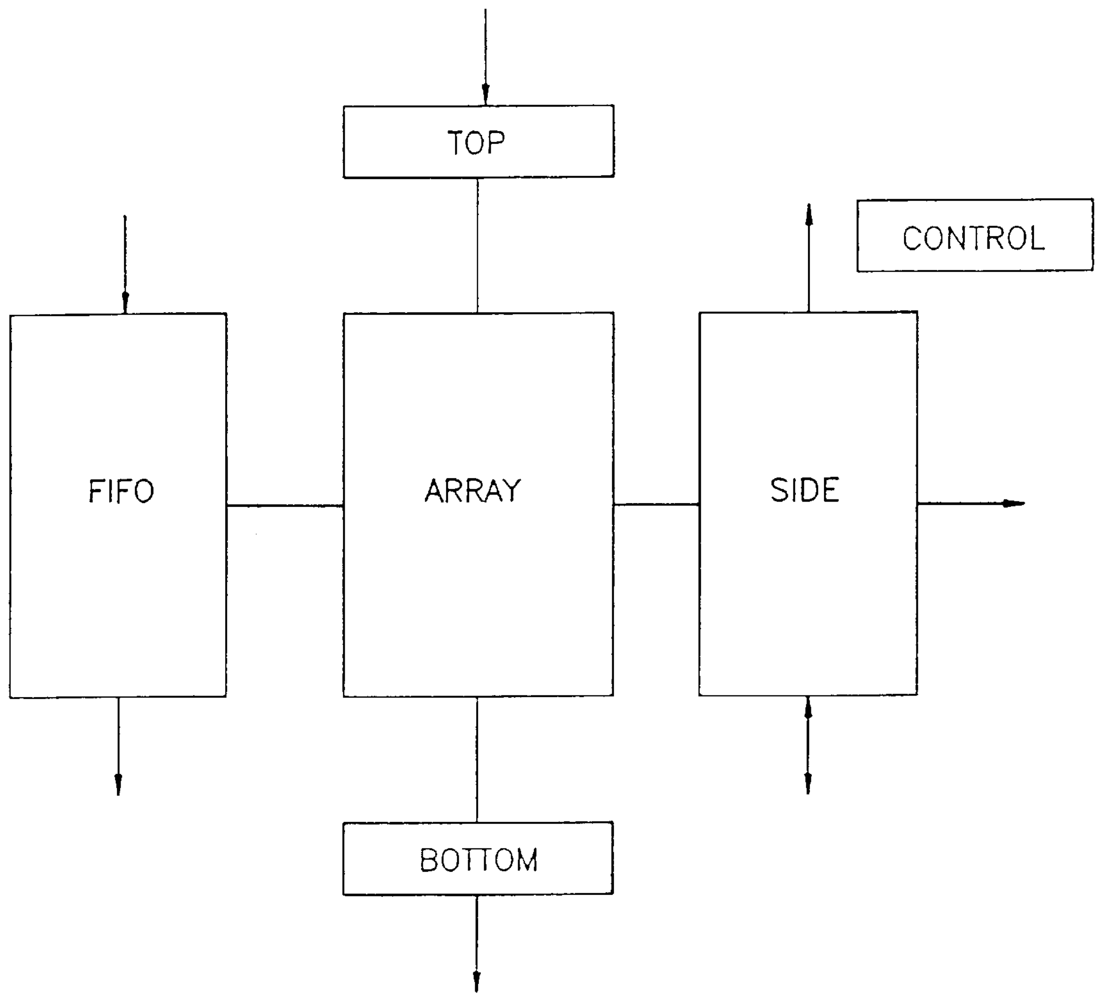
FIG. 6 is a simplified block diagram of a portion of the apparatus of FIG. 5.

The top-level view is shown in FIG. 6. ARRAY is the main associative array. FIFO is the image input/output fifo buffer. SIDE is the side-array, consisting of the tag, the tag logic, the tag count, the select-first, the row drivers (of WriteLine and MatchLine) and sense amplifiers, and the shift units.

TOP consists of the mask and comparand registers, and the column drivers (of BitLine, InverseBitLine, and MaskLine). BOTTOM contains the output register and sense amplifiers. CONTROL is the control logic for the chip. Microcontrol is external in this version.

4.2 ARRAY Architecture

The Array consists of 1024×72 associative processing elements (APEs), organized in three columns of 24 APEs wide each, and physically split into three blocks of 342×72 APEs. This six-way split achieves square aspect ratio of the layout and also helps contain the load of the vertical bus wires.

As is explained in Section 4.3 below, one 24 bit sector of the array is reconfigurable as follows (by means of the "CONFIFO" Configure Fifo instruction):

1. All 24 bits serve as FIFO (total ARRAY width is 48).
2. 16 bits FIFO, 8 bits ARRAY (total ARRAY width is 56).
3. 8 bits FIFO, 16 bits ARRAY (total ARRAY width is 64).

The Associative Processing Element (APE) is a Content Addressable Memory (CAM) cell. It consists of three components:

Storage element;

Write device;

Match device.

There are three vertical incident buses and four horizontal incident buses in the APE:

Vertical

Bit Line (BL)

Inverse Bit Line (IL)

Mask Line (MASK)

Horizontal

Write Line (WL)

Match Line (ML)

VDD

VSS (GND)

The Storage element consists of two cross coupled CMOS inverters.

The Write device implements the logical AND of MASK and WL, so that it can support the MASKED WRITE operation.

The Match device implements a dynamic EXCLUSIVE OR (XOR) logic. This technique allows area efficient and reliable implementation of the COMPARE operation.

4.3 FIFO Architecture

Figure 7:
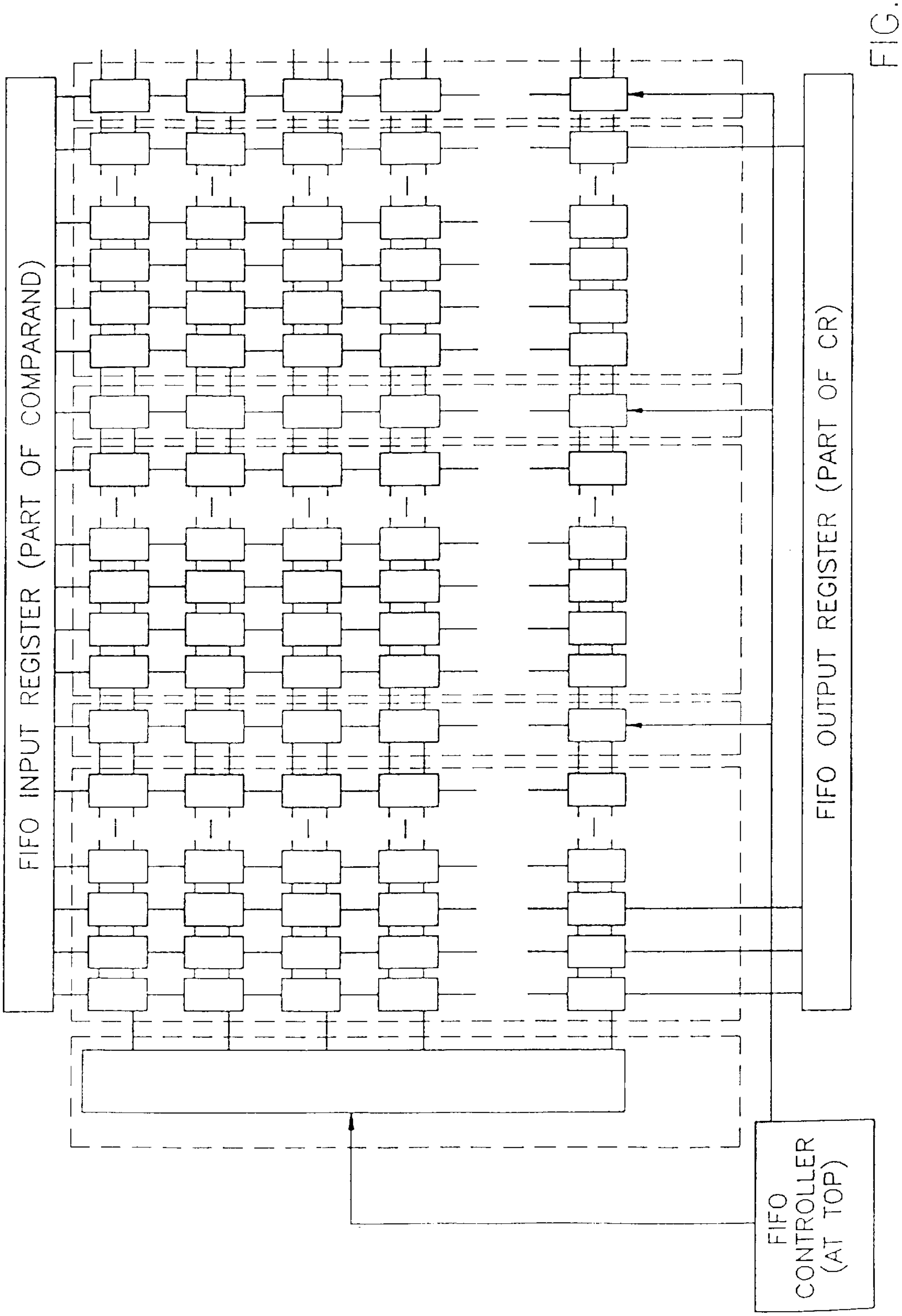
FIG. 7 is a simplified block diagram of a portion of the apparatus of FIG. 6.

Reference is now made to FIG. 7. The FIFO is designed to input and output image data in parallel with computations carried out on the ARRAY. It consists of a reconfigurable MATRIX of 1024×[24 or 16 or 8] APEs 190, three columns 192 each of 1024 bi-directional Switches, and Address Generator 194. The corresponding section of the Comparand register, in TOP, serves as the FIFO input register, and the corresponding section of the Output Register, in BOTTOM, serves as the FIFO Output Register. The FIFO Controller FC resides in TOP.

The FIFO is configured by the CONFIFO instruction, he three LSBs of the operand are:

6 for 8 bit FIFO, 5 for 16 bit FIFO, 3 for 24 bit FIFO, and 7 for no FIFO.

When FIFO is 8 bits wide, inputs VIN[0:7] and outputs VOUT[0:7] are routed to bits [0:7] of the FIFO, where bit 0 is the "leftmost" bit. When FIFO is 16 bits wide, inputs VIN[0:15] and outputs VOUT[0:15] are routed to FIFO bits [0:15], such that the least significant byte (0:7) is the same routing as in the previous case. Similarly, when the FIFO is 24 bits wide, the least significant 2 bytes are routed in the same way as in the case of a FIFO 16 bits wide.

The Address Generator 194 consists of a shift register and implements a sequential addressing mode. It selects a currently active FIFO word line.

The FIFO has two modes of operation, IMAGE I/O Mode and IMAGE EXCHANGE Modes. The bi-directional Switches (one column of the three) disconnect the MATRIX from the ARRAY in IMAGE I/O Mode (see below) and connects the MATRIX to the ARRAY in IMAGE EXCHANGE Mode, creating a combined array of APEs. The Input and Output Registers serve as buffer registers for the image I/O. IMAGE I/O Mode In IMAGE I/O Mode, a new image is read into the FIFO, while the processed (preceding) image is written out. The FIFO Controller (FC) controls the FIFO as follows: Pixel I/O is synchronous with the CLK. External control input RSTFIFO resets (clears) the Address Generator 194. FENB (asserted for at least 2 CLK cycles) enables the input (and output) of the next pixel (on the positive edge of CLK). Once all pixels entered (and output), FFUL is asserted for 2 CLK cycles. This I/O activity is performed asynchronously of the computation in the rest of the chip.

The basic operation of IMAGE I/O mode is carried out as follows. The pixel at the VIN pins is entered into the FIFO Input Register (the FIFO section of the comparand register). The Address Generator 194 enables exactly one word line. The corresponding word is written into the FIFO Output Register (the FIFO section of the Output Register), and through it directly to the VOUT pins, in an operation similar to Read execution. Subsequently, the word in the FIFO Input Register is written into the same word, similar to a Write execution.

Note that VOUT pins are 3-state. They are enabled and disabled internally as needed.

This sequence of operations is carried out in a loop 1024 times in order to fill the 1024 processors with data.

Multiple ASP100 chips can be chained together with a FENB/FFUL chain, where the first ASP100 receives the FENB from an external controller (true for 2 cycles), the FFUL of each ASP100 (true for 2 cycles) is connected directly to the FENB input of the next chip, and the last FFUL goes back to the controller.

IMAGE EXCHANGE Mode

In IMAGE EXCHANGE Mode, the image previously loaded into the FIFO is transferred into the ARRAY for subsequent processing, and the previously processed image from the ARRAY is transferred to the FIFO for subsequent output. These transfers are carried out via the TAG register of the SIDE block by a sequence of COMPARE and WRITE operations, as follows: IMAGE IN A destination bit slice of the ARRAY is masked by MASK register and is then reset by a chain of SETAG; ClearComparand,WRITE operations (which can all be executed in one cycle). A source bit slice of the FIFO MATRIX is masked by the MASK register. The contents of the bit slice are passed to the TAG register as a result of the COMPARE operation. The destination bit slice is masked again and then the contents of the TAG register are passed to the destination bit slice by a SetComparand, WRITE operation. In summary, the following five cycles are employed:

FOR (all bit slices of FIFO)

LMCC(sector 0/1/2, destination ARRAY bit); SETAG; WRITE /* reset destination bit slice in the proper array sector */ LETMC(sector 2, source FIFO MATRIX bit); COMPARE /* copy source slice (FIFO sector) to TAG */ LETMC(sector 0/1/2, destination ARRAY bit); WRITE /* copy TAG to destination in the proper sector */

IMAGE OUT

This operation is carried out in exactly the same way as IMAGE IN, except that a destination bit slice is allocated in the FIFO MATRIX while a source bit slice is allocated in the ARRAY. Note that IMAGE EXCHANGE operation requires two different fields in the ARRAY (a first field for allocation of a new image, and a second one for temporary storage of the processed image). The two operations (IMAGE IN & OUT) can be combined in one loop.

4.4 SIDE Architecture

Figure 8:
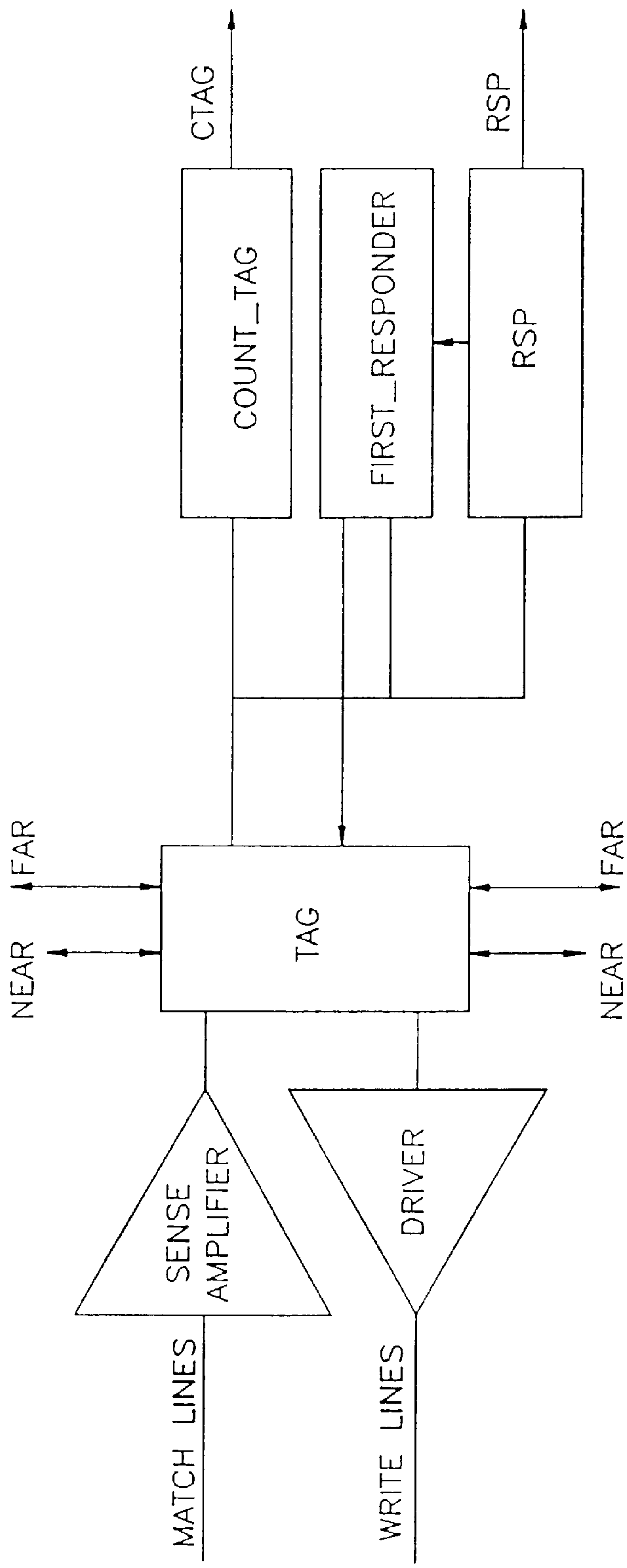
FIG. 8 is a simplified block diagram of another portion of the apparatus of FIG. 6.

Reference is now made to FIG. 8 which illustrates a preferred implementation of the SIDE block of FIG. 6. The SIDE block is shown to include the TAG register, the NEAR neighbor connections, the FAR neighbor connections, the COUNT_TAG counter, the FIRST_RESPONDER circuit, the RSP circuit, and the required horizontal bus drivers and sense amplifiers.

The TAG register consists of a column of 1024 TAG_CELLs. The TAG register is implemented by D flip flop with a set input and non-inverse output. The input is selected by means of a 8-input multiplexer, with the following inputs: FarNorth, NearNorth, FarSouth, NearSouth, MatchLine (via sense amp), TAG (feedback loop), GND (for tag reset), and FirstResponder output. The mux is controlled by MUX[0:2].

The NEAR neighbor connections interconnect the TAG_CELLs in an up/down shift register manner to nearest neighbors. They are typically employed for neighborhood operations along an image line, since pixels are stored consecutively by lines. The FAR connections interconnect TAG_CELLs 16 apart, for faster shifts of many steps. They are typically used for neighborhood operations between image lines.

The following instructions affect TAG: SETAG, SHUP, SHDN, LGUP, LGDN, video load up and video load down microcode signals termed herein VLUP and VLDN respectively and described in Appendix A, COMPARE, FIRSEL.

The COUNT_TAG counter counts the number of TAG_CELLs containing '1'. It consists of three iterative logic arrays of 1×342 cells each. The side inputs of the counter are fed from the TAG register outputs. The counter operates in a bit-serial mode, starting with the least significant bits. In each cycle, the carry bits are retained in the FF (memory cell flip-flop) for the next cycle, and the sum is propagated down to the next stage. The counter is partitioned into pipeline stages. The output of all six columns are added by a summation stage, which generates the final result in a bit-serial manner. The serial output appears on the CTAG outputs and signal CTAGVAL (CTAG valid) is generated by the controller. COUNT-TAG counter is activated by the COUNTAG instruction.

The FIRST_RESPONDER circuit finds the first TAG CELL containing '1', and resets all other TAG_CELLs to '0'. It is activated by the FIRSEL instruction. The beginning of the chain is fed from a FIRSTIN input, wherein FIRSTIN is a microcode command according to which the first arriving datum is the first datum to enter the chip memory. If FIRSTIN is '0', then all TAG_CELLs are reset to '0'. This is intended to chain the FIRST_SELECT operation over all ASP100s interconnected together, and the OR of the RSP outputs of the lower-numbered ASP100 should be input into FIRSTIN.

The TAG outputs can be disconnected from the FIRST_RESPONDER and COUNT_TAG circuits, in order to save power, by pulling the FIRCNTEN control input to '0'.

The RSP circuit generates '1' on the RSP output pin after COMPARE instruction, if there is at least one '1' TAG value. This output is registered.

4.5 TOP Architecture

The TOP block consists of the COMPARAND and MASK registers and their respective logic, and the vertical bus drivers. The COMPARAND register contains the word which is compared against the ARRAY. It is 72 bits long, and is partitioned according to FIFO configuration (see Section 4.3) It is affected by the following instructions: LETC, LETMC, LMCC, LMSC, LCSM. All these instructions affect only one of the three sectors at a time, according to the sector bits. The FIFO section of the COMPARAND operates differently, as described in Section 4.3.

The MASK registers masks (by '0') the bits of the COMPARAND which are to be ignored during comparison and write. The BitLines and InverseBitLines of the masked bits are kept at '0' to conserve power. It is affected by the following instructions: LETM, LETMC, LMCC, LMSC, LCSM, LMX, SMX. The former five instructions affect only one sector at a time, whereas LMX and SMX also clear the mask bits of the non-addressed sectors. The FIFO section of the MASK operates differently, as described in Section 4.3.

The 24 bit data input from DBUS (the operand) are pipelined by three stages, so as to synchronize the operand and the corresponding control signals.

4.6 BOTTOM Architecture

BOTTOM contains the BitLine and InverseBitLine sense amplifiers, the Output Register and its multiplexor, the DBUS multiplexors, and the DBUS I/O buffers. Since the ARRAY is physically organized in three columns, the output of the three sense amplifiers must be resolved. A logic unit selects which column actually generated the output, as follows: READ: Select the column whose RSP is true. FIFO OUT: Select the column in which the address token is in.

The Output Register is 72 bits long. 8 or 16 or 24 bits serve the FIFO and are connected to the VOUT pins. On READ operation, one of the three sectors (according to the sector bits) is connected to 24 bits of DBUS via a multiplexor. DBUS multiplexors allow two configurations:

1. SHIFT: Connects the south long shift (from rows 1008:1023) to DBUS[31:I6] and the north long shift lines (from rows 0:15) to DBUS[15:0].
2. READ: Connects bits [15:0] (bit 0 is LSB) of the Output Register to DBUS[15:0], and bits [23:16] of the OR to DBUS[23:16].

The DBUS I/O buffers control whether the DBUS is connected as input or output, and are controlled by the HIN and LIN control signals:

| Instruction | LIN | HIN |
|---|---|---|
| SHUP, LCUP, VLUP | 1 | 0 |
| SHDN, LGDN, VLDN | 0 | 1 |
| READ | 0 | 0 |
| other | 1 | 1 |

Since, in SHIFT mode, lines DBUS[31:16] of one ASP100 chip must be connected to lines DBUS[15:0] of the next ASP100 chip, the external connections are not simply bused but should be switched as necessary.

4.7 CONTROL Architecture

The ASP100 is controlled by means of an external micro-coded state machine, and it receives the decoded control lines. The external microcontroller allows horizontal micro-programming with parallel activities.

The combined operation of APS100, its microcontroller, and the external controller is organized in a five-stage instruction pipeline, consisting of the following stages: Fetch, Decode, microFetch, Comparand, and Execute. In the Fetch stage, the instruction is fetched from the external program memory, and is transferred over the system bus to the IR (instruction register).

Figure 9:
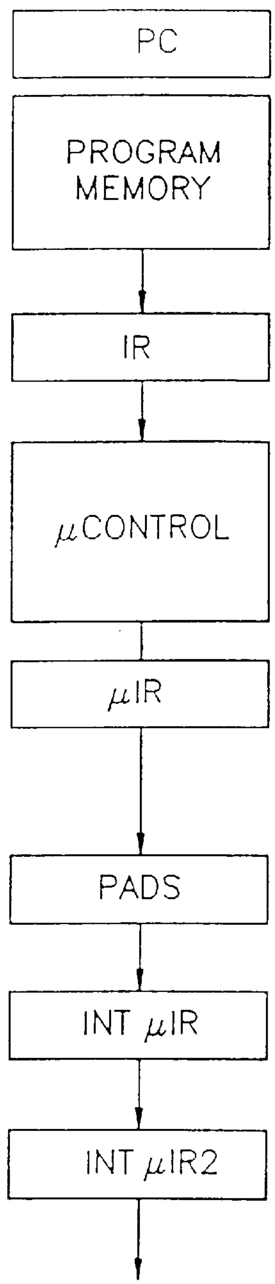
FIG. 9 is a simplified flowchart illustrating the operation of the apparatus of FIG. 5.

In the Decode stage, the instruction (from the IR) is decoded by the microcontroller and stored in the μIR. In the μFetch stage, the control codes are transferred from the external μIR, through the input pads, into the internal μIR. In the Comparand stage, parts of the execution which affect the Comparand register are carried out, and the control codes move from the internal μIR to the internal μIR2. In the Execute stage, execution in the ARRAY and other parts takes place. See FIG. 9.

Note that more pipeline stages separate the ASP100 from the External Program Memory, necessary for instruction transfer from the memory via the bus to the IR inside the microcontroller.

Pipeline breaks occur during SHIFT and READ, when DBUS is used for data transfer rather than instructions, and as a result of branches. Branches are handled by the external controller, and are interpreted as NOP by the APS100 microcontroller. Similarly, operations belonging to the controller are treated as NOPs.

4.8 Initialization

On Reset (active low), all ASP100 internal registers are set to zero, except for TAG and the memory array.

4.9 Operation Notes

1. Write is designed so that while WRITE;COMPARE; WRITE: . . . can be done, two consecutive WRITEs and two consecutive COMPAREs cannot.

2. In all instructions which include SETs, such as SETAG, the corresponding control signal LETM and/or LETC must be set high. This is required since the set and reset of the comparand and mask registers is synchronous.

4.10 Clock Generator

Figure 10:
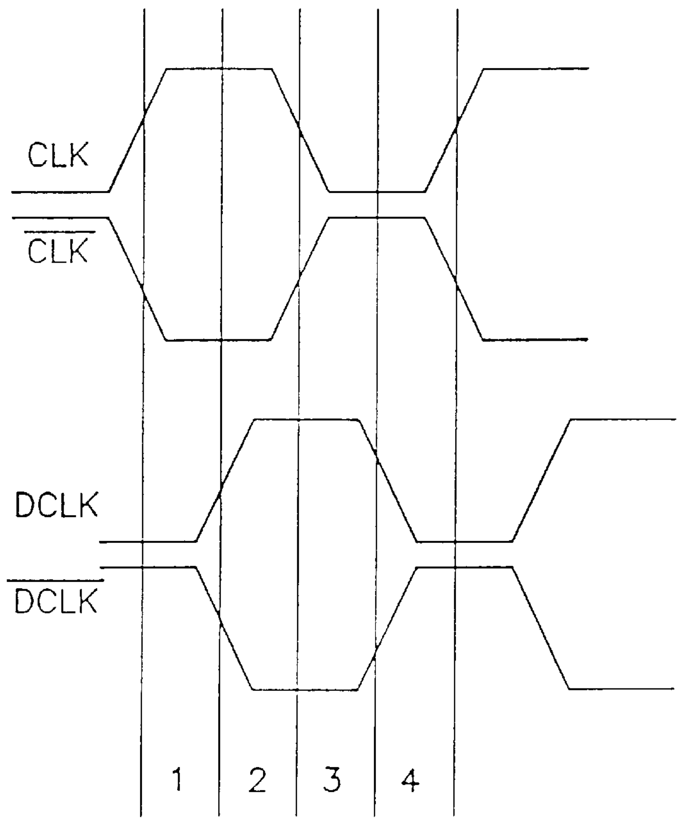
FIG. 10 is a simplified pictorial diagram illustrating the operation of a portion of the apparatus of FIG. 5.

Preferably, a single 50 MHz CLKIN clock is input into the ASP100. In addition, a clock synchronization control DCKIN signal is also input. The CLKIN signal serves as the clock of the generator circuit. DCLKIN is an input signal (abiding by the required setup and hold timing). The circuit creates two clocks of, for example, 25 MHz, CLK and DCLK, delayed by ¼ cycle relative to each others. CLK is fed back into a clock-generating pad, to provide the required drive capability. CLK, DCLK and their complements provide for four-phase clocking, as shown in FIG. 10.

5. Programming Model 5.1 Instruction Set

An example of an instruction set is now described. Two instruction formats are employed. Instruction format A is used for Group 1 and READ instructions, and instruction format B is used for all other groups. It contains one bit for NOP, five OpCode bits, two sector bits, and 24 operand bits.

Instruction format B contains one bit for NOP, seven OpCode bits, and 24 operand bits.

As presented here, these formats do not allow parallel execution of multiple instructions. It is appreciated that, in an alternative implementation of the instruction set format, parallel execution of multiple instructions could be included.

In the following table, d(n) is a n-bit argument, n≦24, and s(2) is a 2-bit sector number.

| No. | Instruction | Format | Cycles |
|---|---|---|---|
| | Group 1 | | |
| 1 | Load Mask | LM s(2),d(24) | 1 |
| 2 | Load Comparand | LC s(2),d(24) | 1 |
| 3 | Load Mask and Comparand | LMC s(2),d(24) | 1 |
| 4 | Load Mask, Clear Comparand | LMCC s(2),d(24) | 1 |
| 5 | Load Mask, Clear Comparand Both Exclusive | LMCCXX s(2),d(24) | 1 |
| 6 | Load Comparand, Set Mask | LCSM s(2),d(24) | 1 |
| 7 | Load Mask Exclusive (clear other sectors) | LMX s(2),d(24) | 1 |
| 8 | Load Comparand Exclusive | LCX s(2), d(24) | 1 |
| 9 | Load Mask, Set Comparand (presently unused) | LMSC s(2), d(24) | 1 |
| 10 | SetMask Exclusive (clear other sectors, presently unused) | SMX s(2) | 1 |
| 11 | Set Comparand Exclusive presently unused) | SCX s(2) | 1 |
| | Group 2 | | |
| 11 | Set Tag | SETAG | 1 |
| | Group 3 | | |
| 12 | Shift Up | SHUP | 2 |
| 13 | Shift Down | SHDN | 2 |
| 14 | Long Shift Up (16 places) | LGUP | 2 |
| 15 | Long Shift Down (16 places) | LGDN | 2 |
| 16 | Very Long Shift Up (64, depends on microprogram) | VLUP | (5) |

-continued

| No. | Instruction | Format | Cycles |
|---|---|---|---|
| 17 | Very Long Shift Down (64, depends on microprogram) | VLDN | (5) |
| | Group 4 | | |
| 18 | Compare | COMPARE | 1 |
| 19 | Write | WRITE | 1 |
| | Group 5 | | |
| 20 | Read | READ s(2) | 3 |
| 21 | Count Tag | COUNTAG | (>20) |
| 22 | First Select | FIRSEL | (>20) |
| 23 | Configure FIFO | CONFIFO d(2:0) | 1 |
| | Group 6 | | |
| 24 | No Op | NOP | 1 |

Parallel ("Horizontal") Execution

1. Groups 1,3 instructions can be carried out in parallel.
2. Groups 1,2,4 instructions can be carried out in parallel.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

Further preferred methods and systems for associative signal processing are described in Appendix A.

Associative real time vision research vision research findings of Dr. Avidan Akerib, which were submitted to the Weizman Institute of Science, Rehovot, Israel, in the framework of a doctoral thesis, are now described with reference to FIGS. 11–34.

The ARTVM Architecture

The Associative Real Time Vision Machine (ARTVM) was endowed with a number of characteristics which enable it to meet the vision requirements. In describing the structure of the machine and its primitive operations these attributes will be emphasized.

Figure 11:
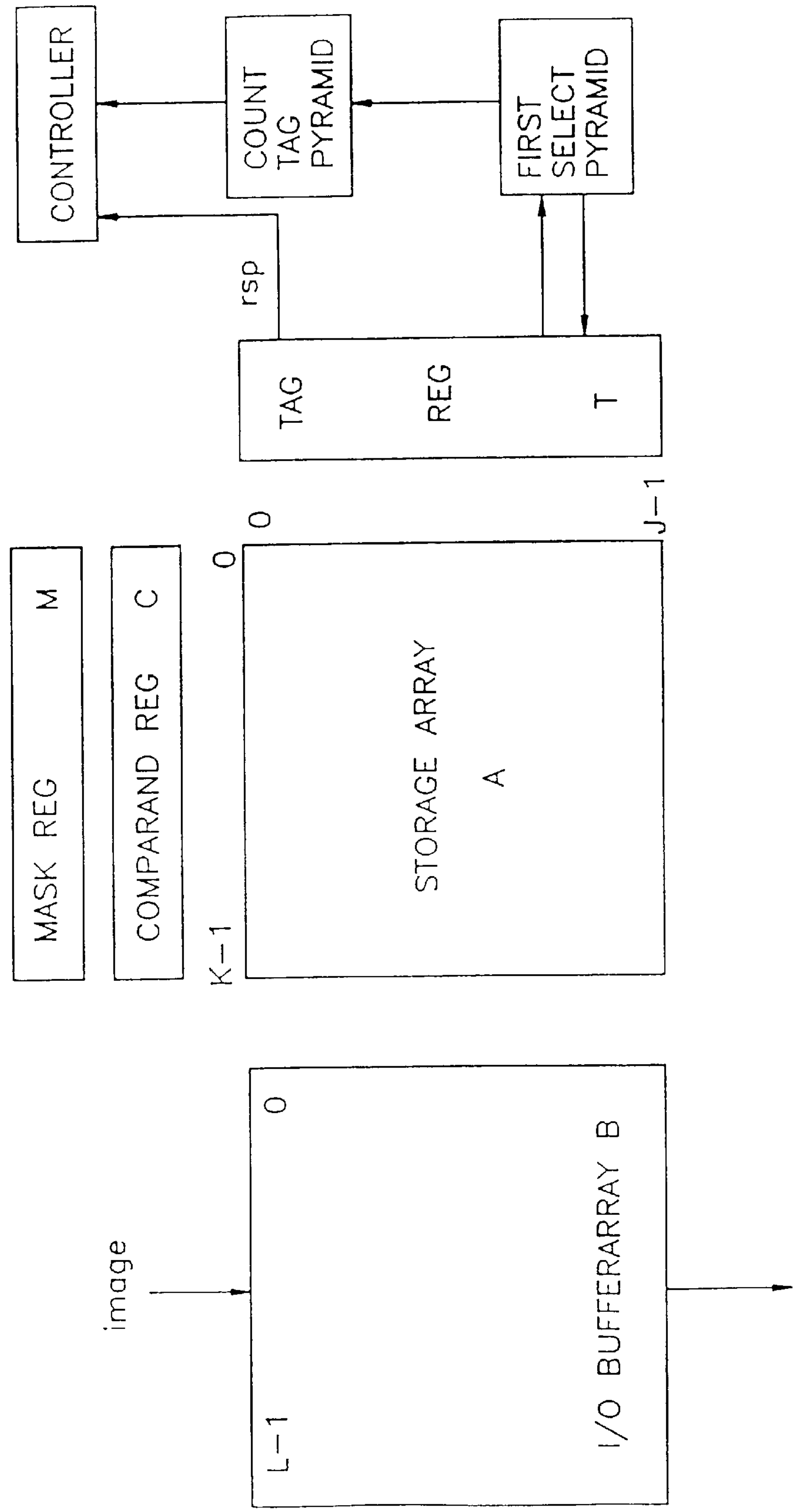
FIG. 11 is a simplified block diagram of associative real-time vision apparatus constructed and operative in accordance with an alternative preferred embodiment of the present invention.
Figure 12:
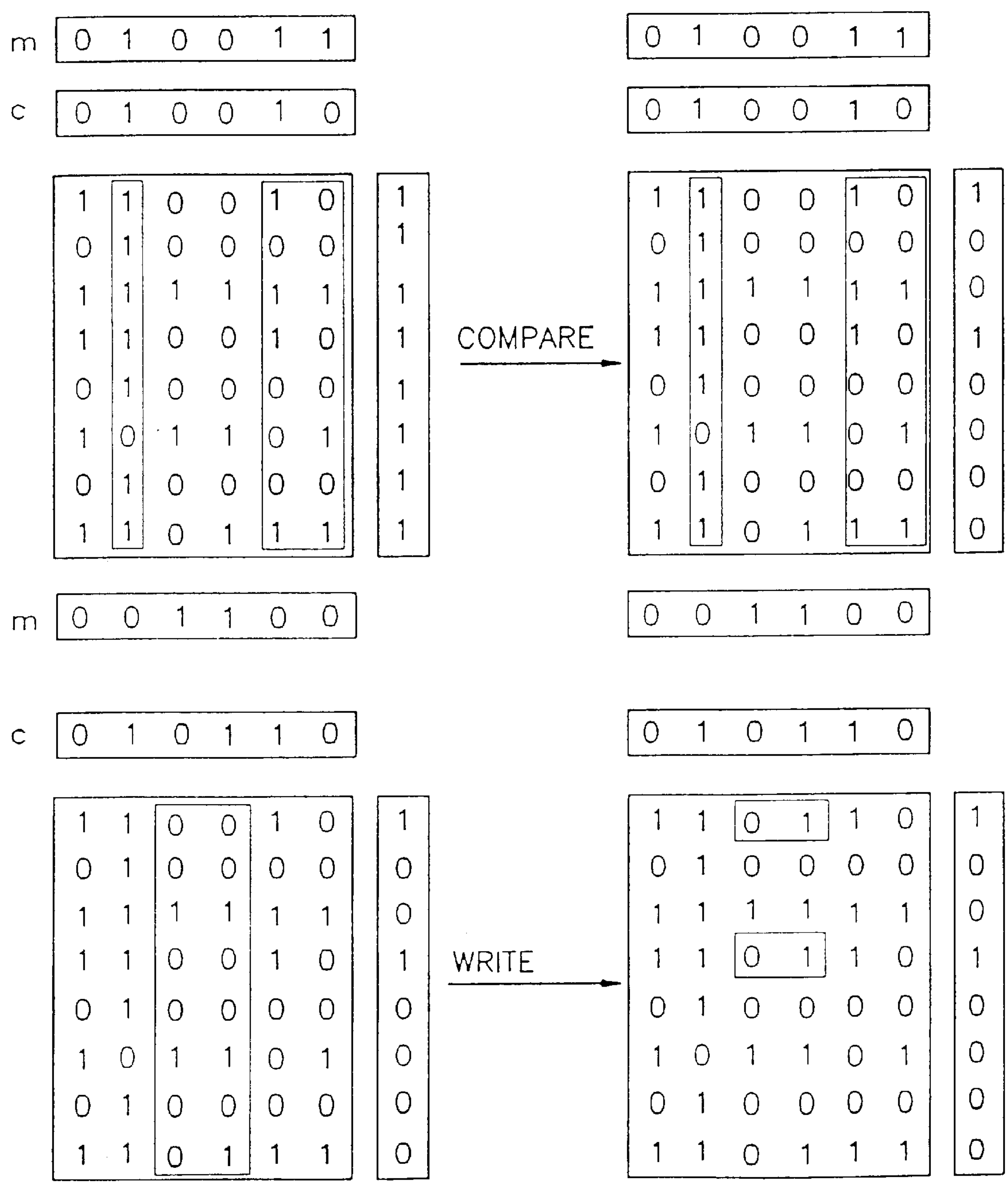
FIG. 12 is a simplified pictorial illustration of the operation of the apparatus of FIG. 11 during compare and FIG. 13 is a si

Referring to FIG. 11, the core of the machine is a basic, classical, associative processor that is parallel by bit as well as by word. The main associative primitive is COMPARE. The comparand register is matched against all words of memory simultaneously and agreement is indicated by setting the corresponding tag bit. The comparison is only carried out in the bits indicated by the mask register and the words indicated by the tag register. Status bit rsp signals that there was at least one match (FIG. 12). The WRITE primitive operates in a similar manner. The contents of the comparand are simultaneously written into all words indicated by the tag and all bits indicated by the mask (FIG. 12). The READ command is normally used to bring out a single word, the one pointed to by the tag. Since the combination COMPARE-WRITE is of the type "if condition then action", all logical and arithmetic functions can be executed [3]. Hence the associative machine may be regarded as an array of simple processors, one for each word in memory. ARTVM provides N×N words, one for each pixel in the image to be processed, and the pixels are arranged linearly, row after row. The full machine instruction set is given in the following table.

Figure 13:
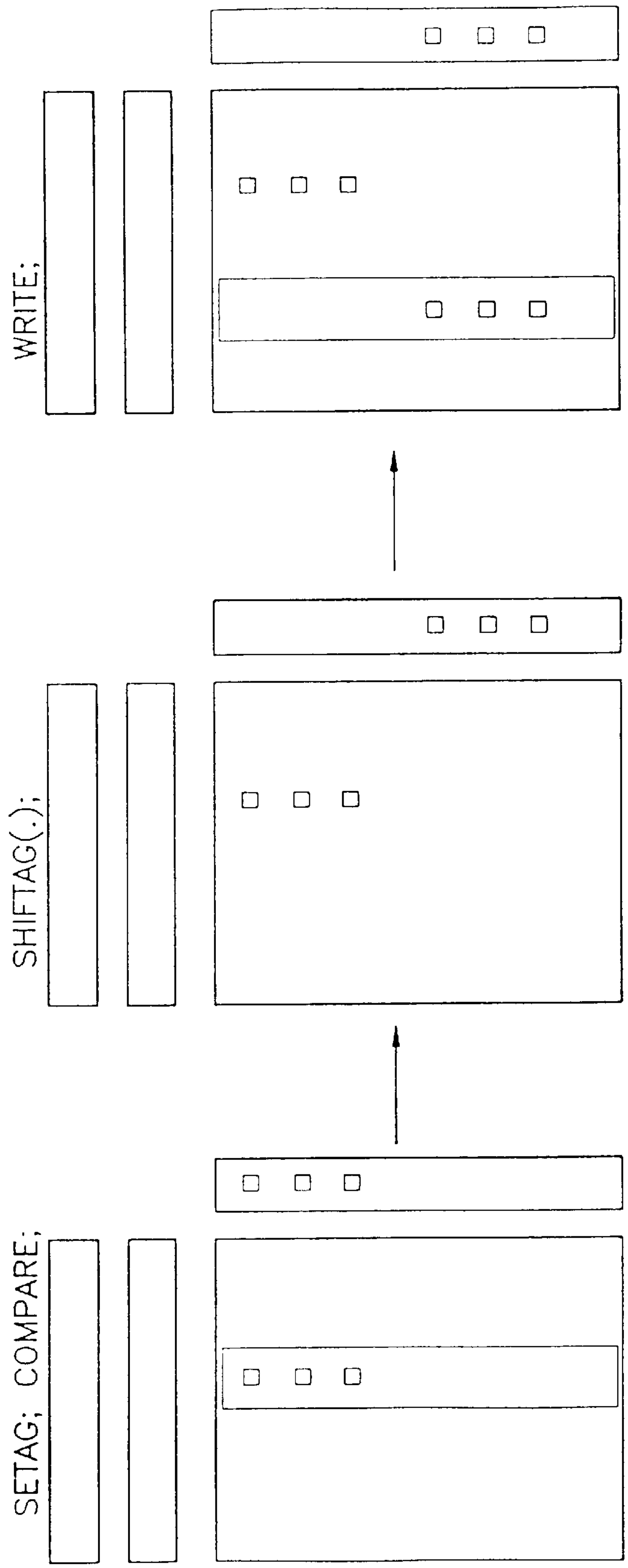

Neighborhood operations which play an important role in vision algorithms, require bringing data from "neighboring" pixels. Data communication is carried out a bit slice at a time via the tag register, by means of the SHIFTAG primitives, as shown in FIG. 13. The number of shifts applied determines the distance or relation between source and destination. When this relation is uniform, communication between all processors is simultaneous. Fortunately, neighborhood algorithms only require a uniform communication pattern. Since the image is two-dimensional while the tag register is only one-dimensional, communication between neighbors in adjacent rows requires N shifts. To facilitate these long shifts a multiple shift primitive, SHIFTAG(±b), was implemented in hardware, where b is a sub-multiple of N. The time complexity in cycles for shifting an N×N image k places is given by M/2[5+k−⌊k/b(b−1)⌋], where M is the precision and b is the extent of the multiple-shift primitive.

Loading data images into associative memory and outputting computed results could take up much valuable processor time. This can be avoided by distributing a frame buffer within associative memory and giving it access to the tag register [33]. That is the function of the I/O Buffer Array which consists of a 16-bit shift register attached to each word. A stereo image frame can be shifted into the buffer array as it is received and digitized, without interfering with associative processing. During vertical blanking, the stereo image frame is transferred into associative memory, a bit slice at a time, using $\forall j = 0, 1, 2, \ldots, J-1$ $\forall k = 0, 1, 2, \ldots, K-1$ and $\forall l = 1, 2, 3, \ldots, L-1$ Tag Operations SETAG: $T_n \leftarrow 1$ SHIFTAG(±1): $T_{n\pm 1} \leftarrow T_n$ (One-Place Shift)

SHIFTAG(±*b*): $T_{n\pm b} \leftarrow T_n$ (Long Shift)

TAGXCH: $T_j \leftarrow B_{j0}, B_{j(l-1)} \leftarrow B_{jl}, B_{j(L-1)} \leftarrow T_j$ COUNTAG: $S \leftarrow \sum_n T_n$ FIRSEL: $T_n \leftarrow \begin{cases} 1 & \text{if } T_n \text{ is the first "1" of } T \\ 0 & \text{otherwise111} \end{cases}$ Comparand and Mask Initialization Let $X$ denote any one of the following:
$M$ (Mask), $C$ (Comparand), $MC$ (Mask & Comparand)
SETX: $X_k \leftarrow 1$
LETX *opt*1 *opt*2 *opt*3
Where:
$opt1 = d(r_1), d(r_2), \ldots, d(r_s)$
$opt2 = dseq(u_1, u_2)$
$opt3 = dvar(v_1, v_2, p)$
and options can be intermingled in any order. Then:

$$X_k \leftarrow \begin{cases} 1 & \forall k = r_1 \ldots r_s & \text{if } opt1 \text{ defined} \\ 1 & \forall k = u_1 \ldots u_2 & \text{if } opt2 \text{ defined} \\ p_{k-v_1} & \forall k \in [v_1, v_2] & \text{if } opt3 \text{ defined} \\ 0 & & \text{otherwise} \end{cases}$$

Compare Operation

COMPARE: $T_n \leftarrow T_j \overline{\biguplus_k M_k(A_{jk} \oplus C_k)}$ $rsp \leftarrow \biguplus_j T_j$ Read Write Operations

READ: $R \leftarrow \biguplus_k A_{nk} T_n$

WRITE: $A_{nk} \leftarrow \overline{T}_n A_{nk} \uplus T_n(M_k C_k + \overline{M}_k A_{nk})$

The symbols $\uplus$, $\oplus$ and $\biguplus$ stand for or, exclusive-or and or-expansion, respectively.

the TAGXCH (TAG eXCHange) primitive. Under this command, the buffer array is rotated right circularly via the tag register. If results of computation on the previous frame are available for output, they can be entered into the tag by a compare instruction before executing the tagxch, which will now put out a bit-slice at the same time that it brings one in hence the name tag exchange for this primitive. For a full stereo image this operation must be repeated 16 times. During the next frame time, both input and output proceed in parallel with processing without interference. The following routine will exchange the contents of the buffer array with those of a 16-bit field in associative memory starting at bit position i0,

```
for(i=i0;i<i0+16;i++)
  {
    letmc d(i); setag; compare;   /* load tag with memory bit slice */
    letc; write;                  /* clear bit alice in memory */
    tagxch;                       /* exchange bit slice with buffer
                                     array */
    letmc d(i); write;            /* load memory with bit slice from
                                     buffer */
}
```

Execution time is 64 machine cycles (under 2 μs), which is negligible compared to the vertical blanking period (1.8 ms). While the sample routine exchanges data between the buffer array and a continuous field in memory, it should be noted that the tagxch primitive is quite flexible, can fetch data from one field and put to another, and both fields can be distributed.

Up to four operations may be done concurrently during a given memory cycle: SETAG or SHIFTAG; loading M (SETX, LETX); loading C (SETX, LETX); and COMPARE, READ or WRITE. FIRSEL resolves multiple responses in 6 cycles. COUNTAG is used to compile statistics and executes in 12 cycles. Control functions are given in the C language, and are carried out in parallel with the associative operations, hence do not contribute to the execution time.

To illustrate parallel processing capability, suppose that associative memory contains two data vectors, A and B, each having J elements and M-bit precision. We wish to replace vector field B by the sum A+B. The associative operation is carried out sequentially, a bit slice at a time, starting with the least significant bit. In each step, the three slices $A_i$,$B_i$ and C (i=0,1, . . . , M−1, and C is the carry slice) are compared in parallel to an input combination of the applicable truth table by means of the statement [letm d(.); letc d(.); setag; compare], followed by a parallel replacement of B and C with the appropriate output combination by means of the statement [letc d(.) write]. A full description of the routine is given in The Machine Simulator. The execution time of addition in machine cycles is 8.5M which is seen to be independent of vector size J. It follows that for a 512×512 image ($J=2^{18}$) and a machine cycle of 30 nanoseconds (see VLSI Chip Implementation and Interconnection), the machine executes 125 billion 8-bit additions per second. Associative subtraction operates on the same principle and also takes 8.5M cycles. It is easy to extend addition to multiplication ($8.5M^2$ cycles), and subtraction to division ($15.5M^2$ cycles). Multiplication techniques will be discussed in detail in Vision Algorithms. ARTVAM was seen to be microprogrammed, hence it can operate at just the precision needed in each phase and produce just the significant bits required in the result. In many vision algorithms precision is quite low, and this gives the ARTVM an additional speed advantage over conventional machines.

As mentioned earlier, each word in memory acts as a simple processor so that memory and processor are indistinguishable. Input, output and processing go on simultaneously in different fields of the same word. The field to be accessed or processed, is completely flexible, depending on application. Hence, processing capabilities (families of vision algorithms) may be expanded by increasing word length K. It will be shown in Vision Algorithms that for K=152 all the vision algorithms we considered will run in real time, while K=32 is sufficient for many simple image processing applications (such as histogram evaluation, convolution, morphological operations etc.).

VLSI Chip Implementation and Interconnection

Ruhman and Scherson [34, 35] devised a static associative cell and used it to lay out an associative memory chip. After evaluating its performance by circuit level simulation, they conservatively estimated the area ratio between associative memory and static RAM at 4. Considering that 4 megabits of static RAM is now commercially available on a chip area less than 100 $mm^2$, associative memory chip capacity becomes 1M bits. The proposed chip for ARTVM stores 4K words×152 bits, which is only 59 percent of capacity. Conservative extrapolation of cycle time to a 0.5 micron technology yields 30 nanoseconds. This value was used in computing execution time of associative vision algorithms.

Figure 14:
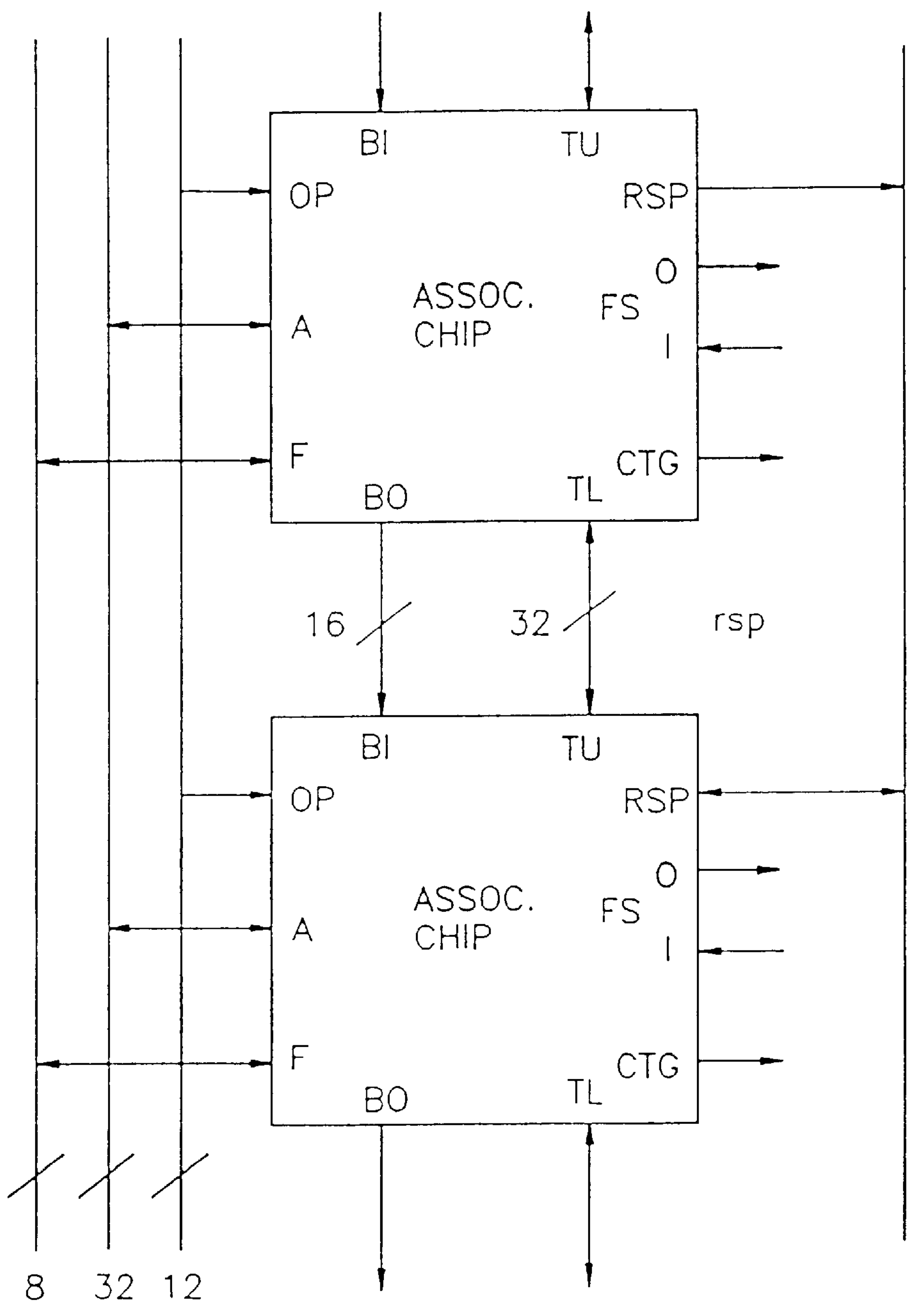
FIG. 14 is a simplified block diagram illustrating chip interface and interconnections within a portion of the apparatus of FIG. 11.

Loading an entire comparand or mask word would require a bus 152 bits wide. Fortunately, associative algorithms only operate on one or two short fields and on a number of flag bits at a time. Hence the word was partitioned into four 32-bit sectors and an 8-bit flag field. Buses are provided for simultaneous access to the flag field and one sector. FIG. 14 describes the chip interface, and shows how 64 such chips can be interconnected to make up the associative memory of ARTVM. Considering the exponential growth of chip capacity by a factor of 10 every five years [36], the ARTVM may be reduced to 8 chips around 1995. Since the bulk of the machine is associative memory, upgrading is simple and inexpensive.

As indicated in FIG. 11, a control unit is required to generate a sequence of microinstructions and constants (mask and comparand) for associative memory as well as to receive and test its outputs (count and rsp). This unit may be realized using high speed bit-slice components, or may be optimized by the design of one or more VLSI chips. The functions of the control unit will become apparent from the associative algorithms that follow.

See FIG. 14, for the notation employed.

The Machine Simulator

A simulator for the ARTVM was created, which enables the user to check out associative implementations of vision algorithms and to evaluate their performance. It was written in the "C" language and is referred to as "asslib.h". The vision machine simulator consists of an associative instruction modeler and an execution time evaluator.

Associative Instruction Modeler

The main features are:

The dimensions of associative memory have been defined as variables mem_size and word-length, hence must be initialized in the application program by # define commands.

The contents of associative memory and its registers are defined as external parameters called:

```
A[MEM_SIZE][WORD_LENGTH]
mask [WORD_LENGTH]
comparand [WORD_LENGTH]
tag[MEM_SIZE]
```

All are members of a structure called parameters.

The associative instructions defined in The ARTVM Architechure were implemented as "C" functions which get their inputs from, and write their results to the external structure parameters.

Three instructions were added: load, save and print-cycles. The load command initializes the array A[.][.] with data from the file ass.inp, while the save command writes into file ass.out the contents of memory array A[.][.] at the end of the application program.

The print_cycles command displays the number of machine cycles required to execute the simulated program.

Program control functions are written directly in "C".

The general format of an application program is as follows:

```
# define MEM_SIZE mmm
# define WORD_LENGTH www
# include "asslib.h"
main()
{
      load;
      BODY
      save;
      print_cycles;
}
```

Execution Time Evaluator

Speed evaluation was achieved by modeling the machine as a simplified Finite Automaton (F.A.) in which a cost, in machine cycles, was assigned to each state transition. The machine has only two states: $S_0$ and $S_1$. The input alphabet was selected by grouping the instructions into 5 categories called $I_i$,i=1, . . . , 5, where:

$$I_1 = \text{one of} \left\{ \begin{array}{lll} letm & d(.) & \\ letc & d(.) & \\ letmc & d(.) & \\ letm & d(.) & letc \\ letm & d(.) & setc \end{array} \right\}$$

$$I_2 = \text{one of} \left\{ \begin{array}{c} \text{setag} \\ \text{shiftag}(\pm 1) \\ \text{shiftag}(\pm b) \end{array} \right\}$$

$$I_3 = \text{one of} \left\{ \begin{array}{c} \text{compare} \\ \text{write} \\ \text{read} \end{array} \right\}$$

$I_4$ = countag $I_5$ = firsel

Figure 15:
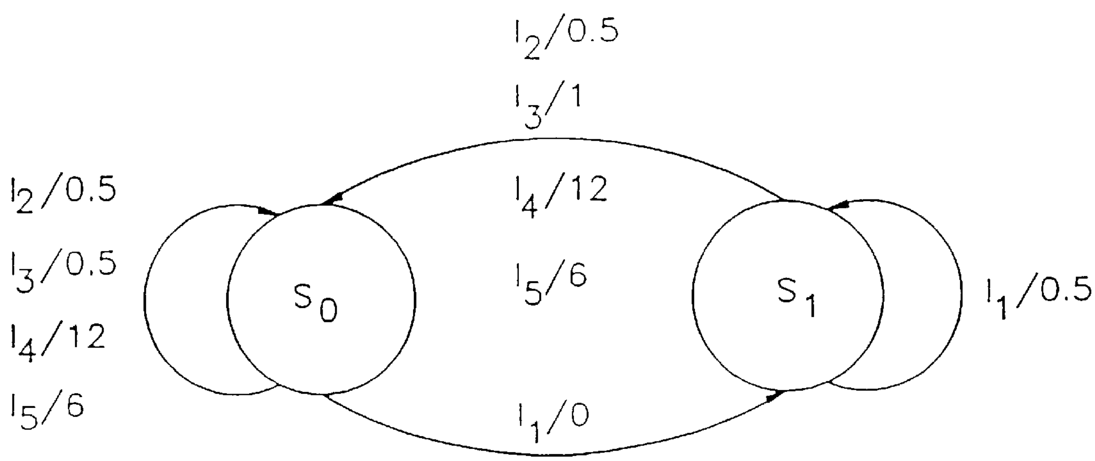
FIG. 15 is a simplified pictorial illustration of an automaton used to evaluate the complexity of the apparatus of FIG. 11.

FIG. 15 presents the transition table and diagram. At initialization we reset a cycle counter (called cycles) to zero, then increment it at each state transition by the assigned cost in cycles (appears as output in the diagram).

| In | | Out | |
|---|---|---|---|
| Group | State | State | Increment |
| 1 | $S_0$ | $S_1$ | 0 |
| 1 | $S_1$ | $S_1$ | 1/2 |
| 2 | $\phi$ | $S_0$ | 1/2 |
| 3 | $S_0$ | $S_0$ | 1/2 |
| 3 | $S_1$ | $S_0$ | 1 |
| 4 | $\phi$ | $S_0$ | 12 |
| 5 | $\phi$ | $S_0$ | 6 |

This speed model reflects the fact that any instruction from group $I_1$ can execute simultaneously with one from group $I_2$, and they can both be overlapped by an instruction from group $I_3$. The cost of countag ($I_4$) is conservatively estimated at 12 cycles on the basis of implementing it on-chip by a pyramid of adders, and summing the partial counts off-chip in a two-dimensional array. The cost of firsel ($I_5$) is conservatively estimated at 6 cycles on the basis of implementing it by a pyramid of OR gates whose depth is $\log_2 N-1$, part of which is on-chip is on-chip and the rest off-chip. In the worst case, the pyramid must be traversed twice and then a tag flip-flop must be reset. The simplicity of the model for speed evaluation imposes a mild restriction on the programmer. Instructions that are permitted to proceed concurrently must be written in the order $I_1$, $I_2$, $I_3$.

To illustrate the instruction set and assembly language used by the simulator, we present below a listing of the vector addition program discussed earlier (The ARTVM Architecture).

```
/*********** ASSOCIATIVE ADDITION PROGRAM ************/
/* The process adds two 8-bit vectors A and B according to the truth   */
/* table given below, and replaces field B with the sum (A+B).          */

/*********** WORD FORMAT and TRUTH TABLE *************/
/*        |----------------------------|-----|----------------------|     */
/*        |-------------A--------------|-C--|---------B-----------|     */
/*                                     <---------A + B ---------->     */

/* |================|=============|=============|   */
/* |=======IN=======|=====OUT=====|   order of  |   */
/* | Aij   Cj   Bij | Cj  (A+B)ij |  execution  |   */
/* |================|=============|=============|   */
/* |  0    0    0   |  0     0    |      —      |   */
/* |  0    0    1   |  0     1    |      —      |   */
/* |  0    1    0   |  0     1    |      1      |   */
/* |  0    1    1   |  1     0    |      2      |   */
/* |  1    0    0   |  0     1    |      4      |   */
/* |  1    0    1   |  1     0    |      3      |   */
/* |  1    1    0   |  1     0    |      —      |   */
/* |  1    1    1   |  1     1    |      —      |   */
/* |================|=============|=============|   */
#define MEM_SIZE 16
#define WORD_LENGTH 17
#include "asslib.h"
main( )
{
     int cnt;
     int c_bit = 8;
     load;
     for(cnt=0; cnt<8; cnt++)
       {
         letm d(cnt) d( c_bit) d( cnt+c_bit+1);          /* 0.5 cycle   */
         letc d(c_bit); setag; compare;                  /* 1.0 cycles  */
         letc d(cnt); write;                             /* 1.0 cycle   */
         letc d(cnt) d( c_bit); setag; compare;          /* 1.0 cycle   */
         letc d(c_bit); write;                           /* 1.0 cycle   */
         letc d(cnt) d( cnt+c_bit+1); setag; compare;    /* 1.0 cycle   */
         letc d(c_bit) d( cnt+c_bit+1) ; write;          /* 1.0 cycle   */
         letc d(cnt+c_bit+1); setag; compare;            /* 1.0 cycle   */
         letc d(cnt) d( cnt+c_bit+1); write;             /* 1.0 cycle   */
     }                                                   /*============*/
     save                                                /* 8.5 cycles per bit */
     print_cycles;
}
```

Vision Algorithms

To test the flexibility and speed of the proposed associative architecture ARTVM, a broad range of vision functions were implemented. They included low level algorithms such as histogram generation, convolution, edge detection, thinning, stereo matching and optical flow. Mid-level functions were also implemented, including contour tracing and labeling, Hough transforms, saliency mapping, and such geometric tasks as the convex hull and Voronoi diagram. Our simulator was used to test the associative algorithms and to verify their complexity.

Before describing the associative algorithms it might be helpful to recall briefly the configuration of the machine, the value of some parameters and the data structure employed. The image resolution is taken to be 512×512 (N=512), hence associative memory capacity is 256K words (one word per pixel). The data is arranged linearly in memory, in the order of the video scan, row after row of pixels, starting at the top left hand corner of the image. Incoming data is given to 8-bit precision (M=8), and although the processing is all fixed-point, the algorithms are designed to retain the full inherent accuracy. The long shift instruction was provided for communication between rows, and its extent was denoted by b, where b is a submultiple of the row length, N. In our model of the machine, the extent of long shift is taken to be 32 places (b=32). Algorithm complexity will be expressed in cycle times; the machine cycle was conservatively estimated in VLSI Chip Implementation and Interconnection at 30 ns., and this value will be used to compute execution time.

Low Level Vision

Histogram

The associative nature of ARTVM and its relatively fast countag instruction facilitate histogram evaluation. The program is given in Listing 1. It consists of a very short loop repeated for each gray level: a compare instruction tags all the pixels of that level, and a countag tallies them up. The count is automatically available at the controller, which accumulates the histogram in an external buffer. Accordingly, the time complexity in machine cycles is given by, $$T_{hist}=0.5+(13)2^M \tag{1}$$

where M is the gray level precision and is taken to be 8 bits in our model. Hence the histogram is executed in under 3330 machine cycles or nearly 100 $\mu$s.

LISTING 1: Associative Computation of Image Histogram

```
main( )
{
    int gray_level;
    long int histogram_array[256];
    letm dseq(0,7);       /* sets the first 8 bits in the mask */
```

-continued

LISTING 1: Associative Computation of Image Histogram

```
    for(gray_level=0; gray_level<256; gray_level++)
        {
            letc dvar(0,7,gray_level); setag; compare;
            histogram_array[gray_level] = countag;
        }
}
```

Convolution

Figure 16:
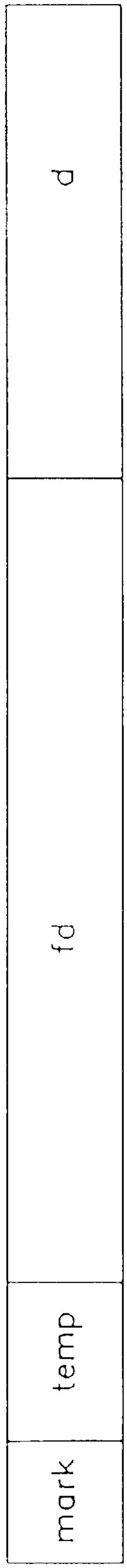
FIG. 16 is a simplified block diagram illustrating word format of associative memory within a portion of the apparatus of FIG. 11.
Figure 17:
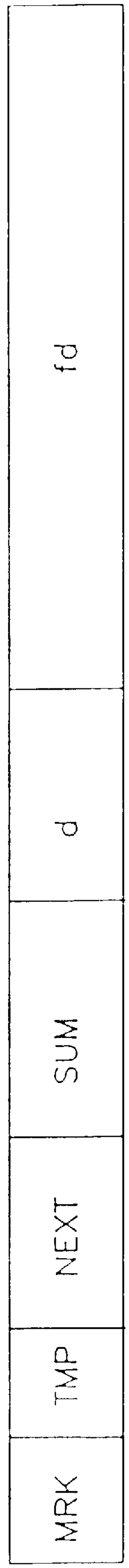
FIG. 17 is a simplified block diagram illustrating another word format of associative memory within a portion of the apparatus of FIG. 11.

Low level vision, particularly edge-detection, involves the application of various filters to the image, which are most conveniently executed by convolution. The image may be considered as a simple vector of length $N^2$ or as a concatenation of N row vectors, each of length N. Convolution of an N-element data vector by a P-element filter results in a vector of length N+P−1, but only the central N−P+1 elements, representing the area of full overlap between the two vectors, are of interest here. We developed several techniques to implement convolution associatively, depending on filter characteristics such as dimensional separability, and symmetry. We start with the multiply-and-shift approach given by Ruhman & Scherson [6, 37, 38]. The word format in associative memory is depicted in FIG. 16.

The convolution filter vector [f] of length P and precision 8 is applied as operand from the machine controller, one element at a time. The result is accumulated in field [fd] of length $8+8+\log_2(P)$. Bit temp is used for temporary storage of the carry that propagates through field [fd]. The mark bit serves to identify the area of complete overlap by the filter vector.

The program for row convolution is given in Listing 2. Field [d] is multiplied by successive elements of vector [f] and the results accumulated in field [fd]. Between multiplications, data field [d] is shifted down one word position for row convolution; down N word positions for column convolution. The f-element acts as multiplier, each of its bits is tested by the controller, and if set will cause field [d] to be added into field [fd] starting at bit position add-offset. After each addition the carry is propagated to the highest bit of [fd]. For column convolution, only the last program line must be changed, replacing "shiftag(1)" by "for(i=0;i>N/b;i++) shiftag(b)".

LISTING 2: 1-3 Image Convolution

```
/********************** ASSOCIATIVE CONVOLUTION PROGRAM *******************/
main( )
{
    /* . . . declarations */
    for(f_index=0; f_index<f_size; f_index++)
        {
        /************************ Summed Multiplication ************************/
        /* add [d] to [fd] if the bit at position bit_count of f[f_index] is ONE */
            for (add_offset=0; add_offset<n; add_offset++)
                if( BIT(add_offset) OF_WORD f[f_index]) /*test if bit is ONE */
                    {
                    /************ add ***************/
                        for(bit_count=0; bit_count<n; bit_count++)
                            {
                                fd_bitcnt = add_offset + bit_count;
                                letm d(fd_bitcnt) d(temp) d(d_offset+bit_count) d(mark);
                                letc d(temp) d(mark); setag; compare;
                                letc d(fd_bitcnt) d(mark); write;
                                letc d(fd_bitcnt) d(temp) d(mark) setag; compare;
```

-continued

LISTING 2: 1-3 Image Convolution

```
                    letc d(temp) d(mark); write;
                    letc d(fd_bitcnt) d(d_offset+bit_count) d(mark); setag; compare;
                    letc d(temp) d(d_offset+bit_count) d(mark); write;
                    letc d(d_offset+bit_count) d(mark); setag; compare;
                    letc d(fd_bitcnt) d(d_offset+bit_count) d(mark); write;
                }
            /****** propagate carry *******/
            letc d(mark) d(temp);
            while(fd_bitcnt < 2*n +3 )
                {
                    letm d(fd_bitcnt) d(mark) d(temp); setag; compare;
                    letc d(fd_bitcnt) d(mark); write;
                    letc d(fd_bitcnt) d(mark) d(temp); setag; compare;
                    letc d(mark) d(temp); write;
                    bit_count++;
                }
        }
    /********* shift [d] field down *********/
    for(bit_count=mark+1; bit_count<=mark+n; bit_count++)
        {
            letmc d(bit_count); setag; compare; letc; write;
            letc d(bit_count); shiftag(1); write;
        }
    }
```

The time complexity for 1–d convolution in machine cycles is given by, $$T_{1d}=PM[\alpha(Mt_a+T_p^{1d})+t_s] \quad (2)$$

where $t_a$,$t_s$ are the per-bit addition and shift complexity, and $T_p^{1d}$ is the complexity of carry propagation over field [fd]. Since addition and carry propagation are only executed for a ONE digit in the multiplier (filter element), time complexity is a function of a, the ratio of ONE digits in the filter vector elements, whose range is $_M/^1\leqq\alpha\leqq 1$. From the program listing, addition time $t_a$ is 8.5 cycles. Carry propagation takes 4 cycles per bit, and the average propagation distance is $\rceil\log_2 P\lceil+M+1/2$, hence $T_p^{1d}=4(\rceil\log_2 P\lceil+M+1/2)$. The program time to shift a field, excluding shiftag( ), is 3 cycles per bit. Therefore, to move a pixel field over to the next column takes $t_s^c=3$ cycles per bit, and to the next row $t_s^r=3+0.5(N/b-1)$ per bit. Extending the above algorithm to 2–d gives, $$T_{2d}=\alpha P^2M(t_a+T_p^{2d})+M(P-1)(t_s^r+Pt_s^c) \quad (3)$$

where $T_p^{2d}=4(\rceil\log_2 P^2\lceil+M+1/2)$ is the average carry propagation for 2–d convolution. By substitution of $t_a$,$T_p^{2d}$ and $t_s$ into 11, we get:

$$T_{2d}= \alpha P^2M(10.5M+4\lceil\log_2 P^2\rceil+2)+M(P-1)\left(3P+\frac{N}{2b}+2.5\right) \quad (4)$$

This simple algorithm is quite efficient for 1–d convolution, particularly if the filters used are inherently of low precision (α<<1). But for a wide 2–d filter, say 31×31, execution time may still exceed half a video frame (20 ms). Several approaches will be considered for reducing the time complexity.

Some 2–d filters are separable into two 1–d convolutions. Thus the 2–d Gaussian can be effected by successive application of a 1–d filter in the two coordinate directions. Reduction to 1–d convolution leads to a drastic improvement in execution time. Equation 11 can be written as:

$$2T_{1d}=PM[\alpha(Mt_a+T_p^{1d})+t_s^r]+PM[\alpha(Mt_a+T_p^{1d})+t_s^c], \quad (5)$$

and by substitution of $t_a$,$T_p^{1d}$ and $t_s$ it reduces to, $$2T_{1d}=PM\left[\alpha(21M+8\lceil\log_2 P\rceil+4)+\frac{N}{2b}+5.5\right]. \quad (6)$$

The filters we deal with all have symmetry about the origin. The Gaussian has even symmetry, while the derivative of the Gaussian has odd symmetry. This brings up the interesting question of how far one can exploit symmetry to improve execution time. Consider first convolution in one dimension with a filter of even symmetry and length P=2L+1 applied at point $d_m$, $$y_m^{even}=f_0d_0+\sum_{i=1}^{L}f_i(d_{m+i}+d_{m-i})$$

where the filter elements $f_i$, on either side of the center element $f_0$, are equal. Using the following word format, the algorithm for 1–d convolution with an even function is given in FIG. 17.

For convolution in the x-direction, all shifts are one-place, "shiftag(±1)"; in the y-direction each one is N/b long shifts, "for(i=0;i<N/b;i++) shiftag(±b);". Applying this algorithm to a separable 2–d filter with even symmetry, such as the Gaussian, the time complexity becomes, $$2T_{1d}^{even}= M\left[(17\alpha-4)+\alpha LM(21M+30+8\lceil\log_2 P\rceil)+LM\left(\frac{N}{b}+11\right)\right]. \quad (7)$$

For odd symmetry, $f_0=0$, and $f_i$ is the absolute value of the filter elements on either side of it. Hence the convolution formula reduces to, $$y_m^{odd}=\sum_{i=1}^{L}f_i(d_{m+i}-d_{m-i}),$$

and two modifications are required in the algorithm: to remove step 1 of the program (evaluation of $d\cdot f_0$); and change step 1 of the loop from NEXT+d to NEXT–d. Time complexity of the odd symmetry filter, applied in both directions, becomes, $$2T_{1d}^{odd} = \alpha LM(21M + 30 + 8\lceil \log_2 P \rceil) + LM\left(\frac{N}{b} + 11\right) - 4M. \tag{8}$$

Figure 18:
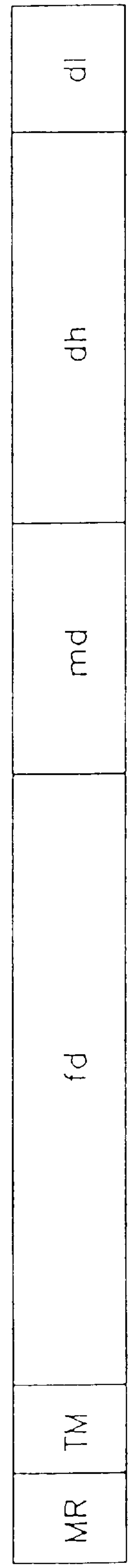
FIG. 18 is a simplified block diagram illustrating an additional word format of associative memory within a portion of the apparatus of FIG. 11.

The methods for reducing convolution time that were considered so far, all take advantage of particular properties of the filter: symmetry, element bit statistics, and separability of 2–d filter. We now a consider an enhancement that applies to the most general filter, treats the pixel data as multiplier, and speeds up multiplication by applying 4 bits of the multiplier at a time. Referring to the following algorithm and word format as illustrated in FIG. 18, the 8-bit data field is partitioned into a high ($d_h$) and low ($d_L$) nibble. A 12-bit field, md, is provided for the partial product of the current filter element by the current data nibble. To fill in all the partial products by table look-up requires 15 compare-write cycles (no action required for all-ZERO nibble).

Using the enhanced multiplication algorithm, the time complexity of general 2–d image convolution becomes, $$T_{2d}^{enh}=P^2(T_m+3Mt_a+T_{p1}^{2d}+T_{p2}^{2d})+M(P-1)(t_s^r+Pt_s^c), \tag{9}$$

and that of 1–d convolution in both directions, $$2T_{1d}^{enh}=P[2(T_m+3Mt_a+T_{p1}^{1d}+T_{p2}^{1d})+M(t_s^r+t_s^c)]. \tag{10}$$

$T_m$ is the time (2×15×2.5 cycles) to generate the two partial products by table look-up, and $T_{p1}$,$T_{p2}$ are their carry propagation times following addition into field fd. Substituting for $T_m$,$t_a$ and $t_s$, and evaluating $T_{p1}$,$Tp_2$, the time complexities reduce to, $$T_{2d}^{enh} = 295P^2 + 8P^2\lceil \log_2 P^2 \rceil + 8(P-1)\left(3P + \frac{N}{2b} + 2.5\right) \tag{11}$$

and $$2T_{1d}^{enh} = 634P + 16P\lceil \log_2 P \rceil + 4P\frac{N}{b}. \tag{12}$$

The following table compares all the convolution methods discussed for filters of size of 7×7, 15×15 and 31×31. Enhanced multiplication $T^{enh}$ is seen to be the fastest method to compute general convolution, achieves this at a 12-bit increase in word-length. For particular filter characteristics, other methods offer a modest advantage, but those exploiting symmetry require an even larger increment in word length (17 bits).

| Method | | Word Length | Filter Size 7 × 7 | 15 × 15 | 31 × 31 |
|---|---|---|---|---|---|
| $T_{2d}$ | $\alpha$= 1 | 26 + $\lceil \log_2 P^2 \rceil$ | 1.38 | 6.56 | 30 |
| $T_{2d}$ | $\alpha$= 0.5 | 26 + $\lceil \log_2 P^2 \rceil$ | 0.67 | 3.37 | 15 |
| $T_{2d}$ | $\alpha$= 0.125 | 26 + $\lceil \log_2 P^2 \rceil$ | 0.2 | 0.98 | 4.38 |
| $2T_{1d}$ | $\alpha$= 1 | 26 + $\lceil \log_2 P \rceil$ | 0.35 | 0.78 | 1.68 |
| $2T_{1d}$ | $\alpha$= 0.5 | 26 + $\lceil \log_2 P \rceil$ | 0.29 | 0.41 | 0.89 |
| $2T_{1d}$ | $\alpha$= 0.125 | 26 + $\lceil \log_2 P \rceil$ | 0.064 | 0.14 | 0.3 |
| $2T_{1d}^{even}$ | $\alpha$= 1 | 43 + $\lceil \log_2 P \rceil$ | 0.21 | 0.46 | 0.98 |
| $2T_{1d}^{even}$ | $\alpha$= 0.5 | 43 + $\lceil \log_2 P \rceil$ | 0.13 | 0.27 | 0.56 |
| $2T_{1d}^{even}$ | $\alpha$= 0.125 | 43 + $\lceil \log_2 P \rceil$ | 0.071 | 0.125 | 0.235 |
| $2T_{1d}^{odd}$ | $\alpha$= 1 | 43 + $\lceil \log_2 P \rceil$ | 0.18 | 0.43 | 0.95 |
| $2T_{1d}^{odd}$ | $\alpha$= 0.5 | 43 + $\lceil \log_2 P \rceil$ | 0.11 | 0.25 | 0.54 |
| $2T_{1d}^{odd}$ | $\alpha$= 0.125 | 43 + $\lceil \log_2 P \rceil$ | 0.067 | 0.121 | 0.231 |
| $T_{2d}^{enh}$ | | 38 + $\lceil \log_2 P^2 \rceil$ | 0.55 | 2.6 | 11.5 |
| $2T_{1d}^{enh}$ | | 38 + $\lceil \log_2 P \rceil$ | 0.16 | 0.34 | 0.72 |

Marr & Hildreth Edge Detection

This algorithm [39] detects the Zero Crossings, ZC, of the Laplacian of the Gaussian filtered image, and can be written as:

$$ZC(\nabla^2 G_\sigma * I) \tag{13}$$

where I is the original image, $G_\sigma$ is the 2–d Gaussian filter of scale $\sigma$ and $\nabla^2$ is the Laplacian operator. The M&H algorithm consists of two steps:

1. Approximate $\nabla^2G*I$ by the Difference Of two Gaussians DOG(I).
2. Detect the ZC in the DOG(I) output.

The DOG filter has the following form:

$$DOG(x,y) = \frac{1}{2\pi\sigma_p^2} e^{-\frac{x^2+y^2}{2\sigma_p^2}} - \frac{1}{2\pi\sigma_n^2} e^{-\frac{x^2+y^2}{2\sigma_n^2}} \tag{14}$$

where $\sigma_p$ and $\sigma_n$ are the space constants of the positive and negative Gaussian respectively, and their ratio $\sigma p/\sigma p \approx 1.6$ for closest agreement with the Laplacian of the Gaussian ($\nabla^2$G) operator.

Implementation of the DOG filter requires four 1–d convolutions, a row and a column convolution for each space constant. The complexity of associative DOG execution is, $$T_{dog}=2T_{1d}(P_p)+2T_{1d}(P_n)+T_{diff} \tag{15}$$

where $P_p$ and $P_n$ are the appropriate filter sizes for space constants $\sigma_p$ and $\sigma_n$ respectively, and $T_{diff}$ is the complexity of M-bit subtraction and borrow propagation into the sign bit. The speed of associative subtraction is the same as that of addition, hence, $$T_{diff}=8.5M+2. \tag{16}$$

Assuming the fastest general convolution method $T_{1d}^{enh}$, we substitute eqs. 20 and 16 with M=8 in eq. 15 to obtain, $$T_{dog} = (P_p + P_n)\left(634 + 4\frac{N}{b}\right) + 16(P_p\lceil \log_2 P_p \rceil + P_n\lceil \log_2 P_n \rceil) + 70. \tag{17}$$

$P_p$,$P_n$ and DOG complexity (in cycles and milliseconds) are tabulated below for the three filters corresponding to $\sigma$=0.5, 1 and 2 respectively, where $P_p$ and $P_n$ are the filter vector lengths.

| $P_p$ | $P_n$ | Cycles | Time (ms) |
|---|---|---|---|
| 9 | 5 | 10658 | 0.320 |
| 19 | 11 | 23234 | 0.697 |
| 39 | 23 | 48930 | 1.468 |

The second step of the M&H algorithm, zero cross detection, operates on a 3×3 neighborhood. The center pixel is considered to be an edge point if one of the four directions (horizontal, vertical and the two diagonals) yields a change in sign. Specifically, we test if one item of a pair (about the center) exceeds a positive threshold T while the other is less than −T. The associative implementation of ZC for each space filter is outlined below.

1. Compare all pixels (resulting from the DOG function) concurrently against the thresholds T and −T, and assign two bits in memory to indicate the results.
2. Shift and write all pairs of indicator bits concurrently from the 8 neighbors of each pixel into a 16-bit field of its word in memory.
3. Use the 16-test all 4 directions for a ZC and mark the edge-points.

The associative algorithm to detect zero crossings shows a time complexity of 165 cycles or 4.95 microseconds. It should be noted that the M&H algorithm generates edge points without gradient direction. This parameter can be computed by operating on a larger neighborhood (9×9)

around each edge point. An associative algorithm to detect 16 segment directions (and corners) was developed and is described below. Its time complexity is 1010 cycles or 30.3 microseconds.

Canny Edge Detection

Canny's algorithm [40] has three stages

1. Directional derivatives of Gaussian filter ($\nabla G*I$).
2. Non-maximum suppression.
3. Threshold with hysteresis.

The general form of the Gaussian derivative of scale σ in direction n is:

$$\frac{\partial}{\partial n} G_\sigma = \frac{-n}{\sqrt{2\pi}\ \sigma^3} e^{-\frac{n^2}{2\sigma^2}} \tag{18}$$

The x and y derivatives of the Gaussian filter can be obtained by convolving the image with ∂x/∂ and $\partial y/\partial G_\sigma$ respectively. Applying the enhanced multiplication method, the execution time $2T_{1d}^{enh}$ for a typical set of filter sizes becomes:

| Filter Size (P) | Cycles | Time (ms) |
|---|---|---|
| 7 | 5222 | 0.157 |
| 15 | 11430 | 0.343 |
| 31 | 24118 | 0.724 |

Non-maximum suppression selects as edge candidates pixels for which the gradient magnitude is maximal. For optimum sensitivity, the test is carried out in the direction of the gradient. Since a 3×3 neighborhood provides only 8 directions, interpolation is used to double this number to 16. To determine if maximal, the gradient value at each pixel is compared with those on either side of it. Associative implementation requires somewhat fewer operations than that of zero-cross detection discussed earlier.

Thresholding with hysteresis eliminates weak edges that may be due to noise, but continues to trace strong edges as they become weaken. On the basis of signal statistics and an estimate of noise in the image, two thresholds on gradient magnitude are computed—low and high. Edge candidates with gradient magnitude under low are eliminated, while those above high are considered edges. Candidates with values between low and high are considered edges if they can be connected to a pixel above high through a chain of pixels above low. All other candidates in this interval are eliminated. The process involves propagation along curves.

Figure 19:
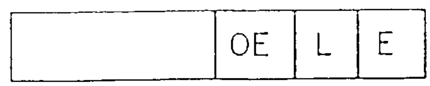
FIG. 19 is a simplified block diagram illustrating an implementation of a method of thresholding utilizing the apparatus of FIG. 11.

Associative implementation (Listing 3) uses three flags as shown in FIG. 19: E, which initially marks candidates above high threshold (unambiguous edge points), and at the end designates all selected edge points; OE (Old Edges) to keep track of confirmed edges at the last iteration; and L to designate candidates above low. At every iteration, each L candidate is examined to see if at least one of its 8-neighbors is an edge, in which case it is also declared an edge by setting E. Before moving E into OE, the two flags are compared to see if steady state has been reached. in which case the process terminates.

LISTING 3: Curve Propagation

```
main( )
{
    /* . . . declarations */
    letm d(OE); letc; setag; write; /* clear OE */
    letmc d(E); setag; compare; letmc d(OE); write; /* copy E into OE */
    while ( rsp )
```

-continued

LISTING 3: Curve Propagation

```
        {
            letmc d(E); setag; compare; /* load Tag with E */
            /* OR the three northern unambiguous edges into E */
                shiftag(-b); shiftag(-1); write;
                shiftag(1); write; shiftag(1); write;
                save_new_edges( );
            /* OR the left and right unambiguous edges into E */
                shiftag(1); write; shiftag(-1); shiftag(-1); write;
                save_new_edges( );
            /* OR the three southern unambiguous edges into E */
                shiftag(b); shiftag(1); write;
                shiftag(-1); write; shiftag(-1); write;
                save_new_edges( );
            letm d(OE); letc; compare; setc; write;
        }
}
/* Find new edges by ANDing L into E */
save_new_edges( )
{
            setag; compare; letc; write;
            letmc d(L); compare; letmc d(E); write;
}
```

Program time complexity is given by, $$T_{pro} = I\left(23.5 + \frac{N}{b}\right) \tag{19}$$

where I is the number of iterations, 23.5 is the time to examine the state of 8 neighbors, and N/b accounts for long shifts to bring in edge points from neighboring rows. The upper bound of I, given by the longest propagation chain, is nearly $N^2/2$, but for a representative value of 100 iterations the complexity of curve propagation becomes 3950 cycles or 119 microseconds.

Thinning

The propagation algorithm presented above produces a curve that may not be thin. A multipass thinning algorithm is proposed, consisting of a pre-thinning phase and an iterative thinning phase. Referring to FIG. 20A–20G, which comprises respectively templates a–g, the pre-thinning phase fills a single gap by applying template a, and removes some border noise by clearing point P if one of templates b,c or d holds. Multi-pass implies that the templates are applied first in the north direction, then in the south, east and west directions, in succession—except for template a which is fully symmetrical and need only be applied once. All templates are shown in the north direction and use an X to denote a "don't care" (ONE or ZERO). Similarly, the thinning phase tests templates e,f and g in each of the 4 directions successively, and clears point P when agreement is found. This 4-pass sequence is iterated until there is no further change. Particularly worthy of note is the quality of the skeleton produced by this simple local process. The most precise definition of a skeleton is based on the medial axis. Davies and Plummer [41] proposed a very elaborate algorithm to produce such a skeleton, and chose 8 images for testing it. Our thinning algorithm was applied to these images and produced interesting results: the skeletons agree virtually exactly with those of Davies and Plummer; any discrepancy, not at an end-point, occurs at a point of ambiguity and constitutes an equally valid result. The removal of border noise in the prethinning phase prevents the formation of extraneous spurs in the skeleton. Time complexity of the algorithm is given by, $$T_t = 70 + \frac{5N}{b} + I\left(150 + \frac{4N}{b}\right),$$

where the first two terms account for the prethinning phase. Execution times are 150 cycles (4.5 μs) for prethinning and 214 cycles (6.4 μs) per thinning iteration. For edge thinning 3 iterations will suffice, giving a completion time of 24 microseconds.

Single-pass thinning was considered and found to be rather critical. The algorithm proposed by Chin et alia [42] appears to be optimal, yet it does not yield an ideal skeleton, and application of their own preliminary phase of noise-trimming leads to amputation of some main branches during thinning.

Stereo Vision

Stereo vision must solve the correspondence problem: for each feature point in the left image, find its corresponding point in the right image, and compute their disparity. Since stereo has been a major research topic in computer vision over the past decade, a large number of approaches have been proposed, too many to attempt to implement them all associatively. Instead, we concentrate on the Grimson [43] algorithm. This also has some similarity with the hierarchical structure of human vision, and it can use its input edges producted by the M&H or Canny edge detection schemes discussed above.

Assume edge detection was carried out on both the left and the right image, and the results are sitting side by side in memory. The edge points are marked and their orientation given to a 4-bit precision over 2π radians or a resolution of 22.5 degrees. The stereo process uses the left image as reference, and matches edge points with gradient of equal sign and roughly the same orientation. Edge lines near the horizontal (within ±33.75 degrees) are excluded in order to minimize disparity error. The Grimson algorithm consists of the following steps:

Locate an edge-point (of acceptable orientation) in the left image.

Divide the region about the corresponding point in the right image into three pools.

Assign a match to the edge-point based on the potential matches within the pools.

Disambiguate any ambiguous matches.

Assign disparity values.

The associative memory word format for the matching process is given below. Input fields DL, DR label edge points of the left and right images, respectively, while DIR_L, DIR_R give their orientations. The resulting value of disparity will be recorded in output field DISP. The associative algorithm is outlined in FIG. 21.

Search the neighborhood of ±W pixels divided into three pools, A, B and C, where pools A and C are equal in size and represent the divergent and convergent regions, respectively. The smaller pool B, is the region about zero disparity.

Shift fields DIR_E and DR (of the right image) W word positions down (corresponding to a shift in the right image of W pixels to the right).

For edge points (DR,DL=1), compare field DIR_R against DIR_L within a tolerance of ±1. After each comparison, shift the right image fields up one word position, until position+W is reached. The results of the comparison are registered in fields PX and TX(X=A,B or C). A PX value of 00 indicates no match, 01 indicates one match, and 11 more than one match in pool X. The TX fields temporarily store disparity in each pool for use in case of ambiguity. Note that disparity is the net shift of the right image at the time the match was found.

Edge points with unambiguous disparity (01 in some PX, 00 in all PY where Y≠X) are selected and their disparity assigned in field DISP (DISP:=TX).

An attempt is made to disambiguate matches in more than one pool by use of the dominant disparity in the neighborhood. If there is a dominant pool in the neighborhood, and the ambiguous point has a potential match in the same pool, then that is chosen as the match. Otherwise, the match at that point remains ambiguous. To test a neighborhood for dominant disparity we start by counting all its edge points (field DL) into the COUNT field. Then, for each pool in turn, we count into field COUNT_P just its unambiguous matches over the same neighborhood. If COUNT_P>COUNT/2 the pool is dominant and a match in the same pool will have its disparity copied from TX into DISP. If no pool is dominant or there is no match in the dominant pool, DISP will not be updated and the point in question will stay marked as ambiguous in bit MR.

The last step tests whether disparity is within range. Marr & Poggio show that for a region within range, more than 70 percent of its edge points will be matched. Unmatched edge points are labeled in MR and counted over the neighborhood into field COUNT_P. If COUNT_P>COUNT/4, all edge points in the neighborhood are labeled as unmatched and their disparity cleared.

The time complexity of the associative stereo algorithm is given by, $$T_{stereo}=T_{sh}+T_{mat}+T_{dis}+T_{or} \tag{20}$$

where $T_{sh}$ accounts for shifting the right image, $T_{mat}$ is the time to evaluate matches within the pools, $T_{dis}$ the disambiguation time, and $T_{or}$ the time to find and remove out-of-range disparity. The shift time in cycles is given by, $$T_{sh}=2\times 5\left(3+\frac{W-1}{2}\right)+5\times 3\times 2W+(2+8W) \tag{21}$$

The first term accounts for the initial and final W-place shift-up of fields DR, DIR_R (5 bits). The second term covers the one-place shift-down between successive matching operations. And the last term is due to the generation and update of a border flag for handling row end effects. Consider now the matching complexity $T_{mat}$. It requires an 8-cycle comparison for every disparity (2W+1) and every orientation (10) with a tolerance of ±1. Hence $$T_{mat}=8\times 3\times 10(2W+1)+13.5 \tag{22}$$

where the second term accounts for final processing of the comparison results.

The disambiguation process consists of the following steps:

Count the edge points over every L×L neighborhood.

For each of three pools:

Count the unambiguous matches over the same neighborhoods.

Compare this result to half the edge count.

Copy disparity from match in dominant pool.

Hence we may write, $$T_{dis}=T_{cnt}+3(T_{cnt}+T_{gt}+T_{cpy}+3.5) \tag{23}$$

where $T_{cnt}$ is the time to count labeled pixels over a neighborhood, $T_{gt}$ to compare for greater than, and Tcpy to copy disparity, respectively. $T_{cnt}$ is the subject of the next section, while the other two are given by, $$T_{gt}=1+4.5(\rceil \log_2 L^2\lceil -1) \tag{24}$$

$$T_{cpy}=4+2(\rceil \log_2 L^2\lceil -1) \tag{25}$$

The disambiguation algorithm is listed below.

LISTING 4: Attempt to Resolve Ambiguous Matches

```
count__flag__to__field(DL,COUNT); /* count edge points in L X L neighborhood */
for(pool=PA; pool<= PA+4; pool+=2)
    { /* Flag unambiguous points in TEMP */
        letm d(TEMP); letc; setag; write; /* clear TEMP */
        letm dseq(PA,PA+5); letc d(pool); setag; compare;
        letmc d(TEMP); write;
        count__flag__to__field(TEMP,COUNT__P);
        /*********** Test if COUNT__P > COUNT/2 ****************/
        letm d(TEMP); letc; setag; write; /* clear TEMP */
        /* Starting with COUNT__P+2k−2, compare bit i of COUNT__P to bit i+1 of
            COUNT. COUNT__P+2k−1 used as GTF */
        for(bit__count=2*k−2; bit__count>=0; bit__count--)
          { next__bit = COUNT + bit__count + 1;
            next__bit__p = COUNT__P + bit__count;
            letm d(MARK) d(TEMP) d(GTF) d(next__bit) d(next__bit__p);
            letc d(MARK) d(next__bit); setag; compare;
            letc d(MARK) d(TEMP) d(next__bit); write;
            letc d(MARK) d(next__bit__p); setag; compare;
            letc d(MARK) d(GTF) d(next__bit__p); write;
          }
        /********** Copy disparity of dominant pool to DISP **************/
        letmc d(GTF); setag; compare;
        letm dseq(DISP,DISP+k−1); letc; write; /* clear DISP field marked by GTF */
        letmc d(GTF) d(MARK) d(pool); setag; compare;
        letc d(GTF) d(pool); write; /* clear MARK of disambiguated points */
        for(bit__count=0; bit__count<k; bit__count++)
            { letmc d(GTF) d(2*(pool−PA)+TA+bit__count; setag; compare;
                letmc d(DISP+bit__count); write;
            }
    }
```

Lastly, the time to test and register out-of-range disparity is given by, $$T_{or}=4.5+T_{cnt}+T_{lt}+T_{rm} \tag{26}$$

where the constant term accounts for grouping unmatched edge points and labelling them in MR; $T_{cnt}$ is the time to count the unmatched edge points over the neighborhood; $T_{lt}$ covers comparison of this count to ¼ the number of edge points in the neighborhood; and $T_{rm}$ is the time to label and clear disparity of edge points in out-of-range neighborhoods.

$$T_{lt} = 3 + 4.5(\lceil \log_2 L^2 \rceil - 2) \tag{27}$$

$$T_{rm} = 2L^2 + \frac{3N-b}{4b}(L-1) + 0.5 \tag{28}$$

Stereo matching is performed for each of the spatial frequency channels. From the Marr and Poggio [44] model of stereo vision, $$W=P \text{ and } L=2W+1$$

where P is the filter size (vector length) of the channel. If we choose P of the form $2^i-1$, then L has the same form, $$L=2^{i+1}-1=2^k-1 \text{ with } k=\log_2(L+1)$$

Substituting 21–28 into equation 20, using the relations between P, W and L, and applying the above definition of k, we obtain, $$T_{stereo} = 5T_{cnt} + 2L^2 + \left(1025 + \frac{3N}{b}\right)\left(\frac{L-1}{4}\right) + 48k + \frac{575}{2}. \tag{29}$$

The algorithm complexity excluding neighborhood counts, is tabulated below in cycles and milliseconds for three channels of spatial frequency.

| P = W | L = 2W + 1 | Cycles | Time (ms) |
|---|---|---|---|
| 7 | 15 | 4753 | 0.143 |
| 15 | 31 | 10645 | 0.319 |
| 31 | 63 | 25453 | 0.764 |

We now consider the problem of counting labeled pixels over a sizable neighborhood, a function that is executed five times during stereo evaluation, hence could come to dominate its time complexity.

Linear Summation

The straightforward approach to count labeled pixels over a neighborhood about each pixel would be to provide a count field in each word and let the neighboring labels increment it as they are entered in some convenient sequence. For an L×L neighborhood the maximum count is $L^2$, and for L odd, the count field length is $2\log_2 L$. The program listing follows, where "flag" labels the pixels to be counted, and "feild" points to the beginning (LSB) of the count fieldcount field. The word format is in FIG. 22.

LISTING 5: Linear Summation Over L × L with L Odd

```
count__flag__to__field(flag,field)
int flag, field;
{ /* . . . declarations*/
letm d(TEMP) d(CY) dseq(field,field−1+ceiling(Log2(L*L)));
letc; setag; write; /*clear count field, TEMP & Carry*/
/* Shift flag (L−1)/2 lines and columns down and enter in TEMP */
letmc d(flag); setag; compare;
for(index=0; index<(L−1)/2; index++) {shiftag(1); shiftag(b);}
letmc d(TEMP) d(CY); write; /* move flag to TEMP & Carry*/
for(line__count=0; line__count<L; line__count++)
  { for (pixel__count=0; pixel__count<L; pixel__count++)
     { for(bit=field; bit<field+ceiling(Log2(L*L)); bit++)
```

-continued

LISTING 5: Linear Summation Over L × L with L Odd

```
        { letm d(bit) d(CY); /* increment COUNT */
        letc d(CY); setag; compare; letc d(bit); write;
        letc d(bit) d(CY); setag; compare; letc d(CY); write;
        }
        if (pixel__count < L−1)
        { letmc d(TEMP); setag; compare; letc; write;
        if(BIT(0) OF__WORD line__count) shiftag(1); else shiftag(−1)
        letmc d(TEMP) d(CY); write;
        }
        }
    if(line__count<L−1)
    { letmc d(TEMP); setag; compare; letc; write;
shiftag(-b); letmc d(TEMP) d(CY); write;
    }
      }
```

Execution time in machine cycles is given by, $$T_{cnt1} = \frac{3N-b}{4b}(L-1) + (3+9k)L^2 \tag{30}$$

Where $k=\log_2(L+1)$, hence it grows as $L^2\log L$. Incorporation of this program in the stereo algorithm completely swamps its execution time, which, for the coarsest channel, now exceeds video frame time. This is illustrated in the following table, which gives all times in milliseconds. For the comparison, stereo execution time excluding neighborhood counts is repeated here under $T_{st\text{-}cnts}$.

| L | $T_{cnt1}$ | $T_{st-cnts}$ | $T_{stereo}$ |
|---|---|---|---|
| 15 | 0.25 | 0.14 | 1.4 |
| 31 | 1.39 | 0.32 | 7.3 |
| 63 | 6.81 | 0.76 | 34.8 |

2-d Summation

In the linear summation program, every row of L labels was actually counted L times, once in each of the vertically overlapping neighborhoods. By taking advantage of the two-dimensional structure of the neighborhood, the count may be carried out in two stages: first the neighboring labels within each row are tallied up, and then the vertically neighboring row sums are accumulated as they are entered in some convenient sequence. That requires an additional "rows" field of length logL, and yields the following program, where the word format is as in FIG. 23 and $k_r=\rceil\log_2 L\lceil$ and $k_c=\rceil\log_2 L^2\lceil$ LISTING 6: 2-d Summation Over L × L with L Odd

```
count__flag__to__field(flag,field)
int flag, field;
{ /* . . . declarations */
letm d(cy) dseq(rows,flag−1); letc; setag; write; /* clear cy, rows &
count fields */
/* Shift flag (L−1)/2 lines & columns down into "field" */
letmc d(flag); setag; compare;
for(index=0; index<(L−1)/2; index++) {shiftag(1); shiftag(b);}
tmp__cnt=field+kc−1; /* pointer */
/* Move flag to "tmp__cnt", "rows" and "field" to avoid the
first row summation */
letmc d(tmp__cnt) d(field) d(rows); write;
/******************** Rows Summation *****************/
for (shift__count=0; shift__count<L−1; shift__count++)
  { /* Shift "tmp__cnt" up and enter into "tmp__cnt" and "cy" */
    letmc d(tmp__cnt); setag; compare; letc; write;
    letmc d(tmp__cnt) d(cy); shiftag(−1); write;
    for(bit__count=0; bit__count<kr; bit__count++)
```

-continued

LISTING 6: 2-d Summation Over L × L with L Odd

```
    { /* Increment rows and count fields */
        rows__next=rows+bit__count;
        field__next=field+bit__count;
        letm d(rows__next) d(field__next) d(cy);
        letc d(cy); setag; compare; letc d(rows__next)
        d(field__next); write;
        letc d(rows__next) d(field__next); d(cy); setag; compare; letc
        d(cy); write;
        }
}
/******************** Columns Summation *****************/
letm d(tmp__cnt); letc; setag; write; /* clear "tmp__cnt" */
for(shift__count=0; shift__count<L−1; shift__count++)
  {
    for (bit__count=rows; bit__count<rows+kr; bit__count++)
    { letmc d(bit__count); setag; compare; letc write;
        letc d(bit__count); shiftag(-b); write;
    }
    /* count field <-- count field + rows field */
    for (bit__count=0; bit__count<kr; bit__count++)
    { rows__next=rows+bit__count;
        field__next=field+bit__count;
        letm d(field__next) d(cy) d(rows__next);
        letc d(cy,); setag; compare; letc d(field__next); write;
        letc d(field__next) d(cy); setag; compare; letc d(cy); write;
        letc d(field__next) d(rows__next); setag; compare; letc d(cy)
        d(rows__next); write;
        letc d(rows__next); setag; compare; letc d(field__next)
        d(rows__next); write;
    }
    /****** propagate carry *******/
    letc d(cy);
    while(++field__next < field+kc )
    { letm d(field__next) d(cy); setag; compare; letc d(field__next); write;
        letc d(field__next) d(cy); setag; compare; letc d(cy); write;
    }
  }
}
```

Execution time in machine cycles is given by, $$T_{cnt2} \approx \left(\frac{N+15b}{4b} + 4k_c + \frac{N+23b}{2b}k_r\right)(L-1).$$

For our case, in which the filter vector lengths were chosen to be of the form $2^i-1$, it was show earlier that L is also of the form $2^k-1$. Hence we may write, $k_r=k=log_2(L+1)$ and $k_c 2k$ and $T_{cnt2}$ becomes, $$T_{cnt2} \approx \left(\frac{N+15b}{4b} + \frac{N+39b}{2b}k\right)(L-1). \tag{31}$$

Execution time now grows as L log L. This count algorithm brings stereo complexity well within real-time video limits, as indicated by the following table, listing execution times in milliseconds.

| L | $T_{cnt2}$ | $T_{st-cnts}$ | $T_{stereo}$ |
|---|---|---|---|
| 15 | 0.050 | 0.14 | 0.39 |
| 31 | 0.131 | 0.32 | 0.97 |
| 63 | 0.321 | 0.76 | 2.37 |

2-d Tree Summation

Although 2-d summation reduces stereo time complexity sufficiently to meet real-time requirements, the question arises whether this result is optimal or can be improved significantly. While retaining the two-dimensional summation approach (first by rows and then by columns), consider handling each dimension in binary tree fashion, summing elements in pairs, then pairing results and adding again until the dimension is covered. Since L is of the form $2^k-1$, an extra row and column are added to complete the tree. The extra element denoted by "tail", is remembered and subtracted from the sum, hence a k-bit "tail" field is provided for temporary storage of the extra row sum. The program listing is given below. The word format is in FIG. 24.

LISTING 7: 2-d Summation Over L × L with L Odd

```
count__flag__to__field(flag,field)
int flag, field;
{ /* . . . declarations */
letm dseq(tail,flag−1); letc; setag; write; /* clear count & tail fields */
/* Shift flag (L+1)/2 rows & columns down into "tail" and "field" */
letmc d(flag); setag; compare;
for(index=0; index<(L+1)/2; index++) {shiftag(1); shiftag(b);}
letmc d(tail) d(field); write; /* enter flag in "tail" and "field" */
/********************** Rows Summation ******************/
tree__step=0;
for(shift__count=1; shift__count<=(L+1)/2; shift__count*=2)
   {cy = field+tree__step+1;
     for (bit__count=field; bit__count<cy; bit__count++)
     {letm d(tmp); letc; setag; write; /* clear tmp */
          letmc d(bit__count); setag; compare;
          for(index=0; index<shift__count; index++) shiftag(−1);
          letmc d(tmp); write; /* move flag to tmp */
          add__bits(tmp,bit__count ,cy);
     }
     tree__step++;
   }
/*** Subtract "tail" from row sum, write results into tail field ***/
letm d(tmp); letc; setag; write; /* clear tmp (use it as borrow) */
letm d(temp) d(tail); letc d(temp); write;
for (bit__count=0; bit__count<k+1; bit__count++)
   {letmc d(tmp) d(field+bit__count); setag; compare; letc; write;
     letc d(tmp); setag; compare; letc d(tmp) d(field+bit__count); write;
     letmc d(field+bit__count); setag; compare; letmc
     d(tail+bit__count) ; write;
   }
/******************* Columns Summation *****************/
tree__step=0;
for(shift__count=1; shift__count<=(L+1)/2; shift__count*=2)
   { cy = field+k+tree__step;
     for(bit__count=field; bit__count<cy; bit__count++)
     { letm d(tmp); letc; setag; write; /* clear tmp */
          letmc d(bit__count); setag; compare;
          for (index=0; index<shift__count; index++) shiftag(−b);
          letmc d(tmp); write; /* slave flag to tmp */
          add__bits(tmp,bit__count,cy);
     }
     tree__step++;
   }
/*** Subtract tail field from summation ***/
letm d(tmp); letc; setag; write; /*clear temp*/
for (bit__count=0; bit__count<k; bit__count++)
   { letm d(tail+bit__count) d(field+bit__count) d(tmp);
     letc d(tail+bit__count); setag; compare;
     letc d(tail+bit__count) d(field+bit__count) d(tmp); write;
     letc d(field+bit__count) d(tmp); setag; compare; letc; write;
     letc d(field+bit__count) d(tail+bit__count); setag; compare;
     letc d(tail+bit__count); write; letc d(tmp); setag; compare;
     letc d(field+bit__count) d(tmp); write;
     }
     /** propagate borrow **/
     for(; bit__count<2*k; bit__count++)
     { letmc d(field+bit__count) d(tmp); setag; compare; letc; write;
          letc d(tmp); setag; compare; letc d(field+bit__count)
          d(tmp); write;
     }
}
/****** ADD BITS FUNCTION *******/
add__bits(tmp,bit__count,cy)
int tmp, bit__count, cy;
{ letm d(bit__count) d(tmp) d(cy);
     letc d(cy) ; setag; compare; letc d(bit__count) ; write;
     letc d(cy) d(bit__count) setag; compare; letc d(cy) ; write;
     letc d(tmp) d(bit__count); setag; compare; letc d(cy) d(tmp) ; write;
```

-continued

LISTING 7: 2-d Summation Over L × L with L Odd

```
     letc d(tmp); setag; compare; letc d(tmp) d(bit__count); write;
}
```

Execution time is given by, $$T_{cnt2t}=\frac{27}{2}+\frac{37}{2}k+\frac{69k}{4}(k+1)+\frac{(N+b)}{4b}(L+1)+\frac{1}{2}\sum_{i=0}^{k-1}(i+1)2^i+\frac{N}{2b}\sum_{i=0}^{k-1}(i+k)2^i \tag{32}$$

and since $\sum_{i=0}^{k-1} i2^i = 2(k2^{k-1}-2^k+1)$, $$T_{cnt2t}=14+\frac{N}{4b}+\left(\frac{143}{4}+\frac{N}{2b}\right)k+\frac{69}{4}k^2+(2k-1)2^{k-2}+\frac{NL}{4b}(4k-3).$$

The results are tabulated below for the three channels defined earlier.

| L | $T_{cnt2t}$ | $T_{st\text{-}cnts}$ | $T_{stereo}$ |
|---|---|---|---|
| 15 | 0.038 | 0.14 | 0.33 |
| 31 | 0.085 | 0.32 | 0.75 |
| 63 | 0.191 | 0.76 | 1.72 |

Count complexity is still seen to grow as L log L in equation 32, but the table indicates an improvement of 40 percent over 2–d summation (for the largest neighborhood), and a resulting improvement in stereo complexity of 27.5 percent. The improvement stems mostly from the fact that at each level of the tree, arithmetic is carried out just to the precision required, which is known in advance.

Discussion of Stereo Results

Figure 25:
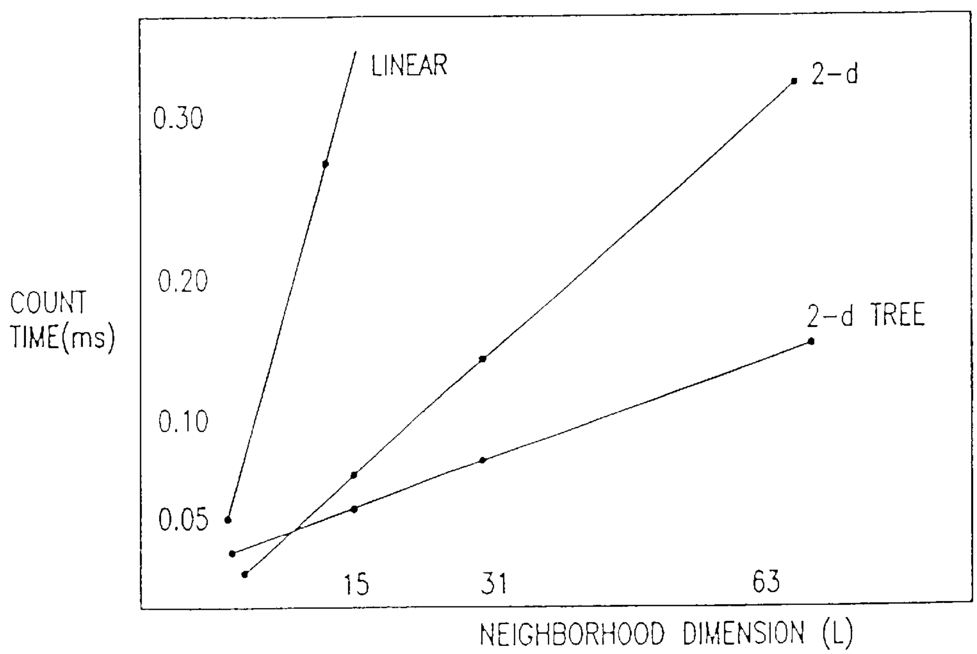
FIG. 25 is a graphical illustration of comparative execution time for alternative implementations of a stereo method utilizing the apparatus of FIG. 11.
Figure 26:
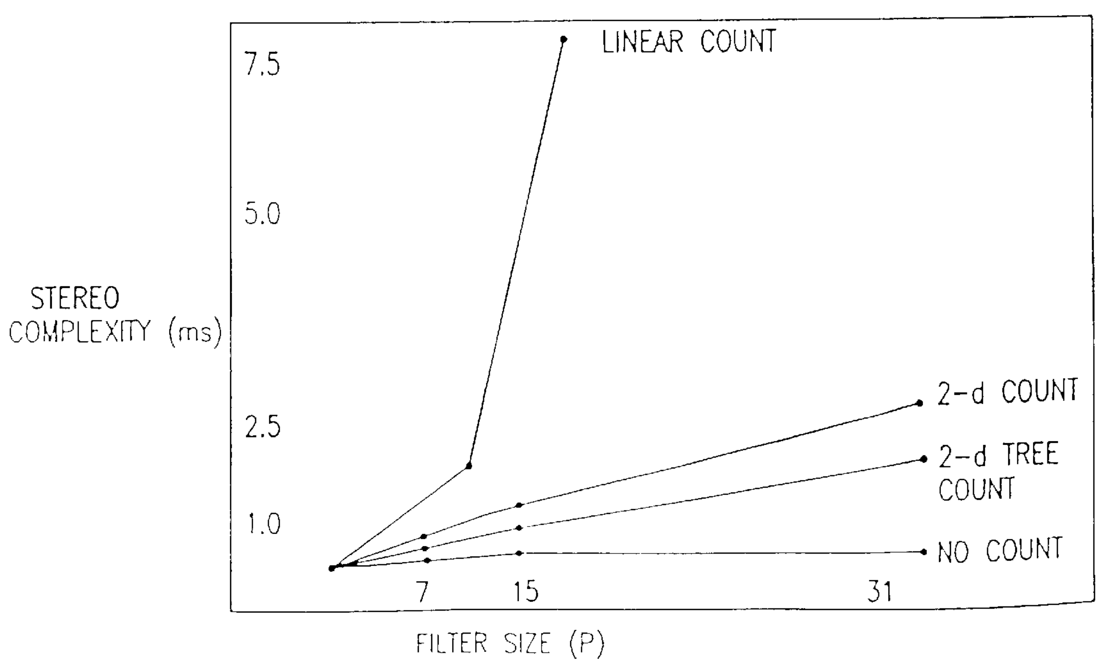
FIG. 26 is graphical illustration of comparative complexity for alternative implementations of a stereo method utilizing the apparatus of FIG. 11.
Figure 21:
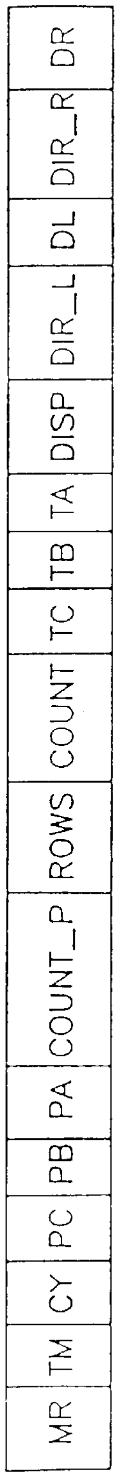
FIG. 21 is a simplified block diagram illustrating an implementation of a method of matching utilizing the apparatus of FIG. 11.
Figure 22:
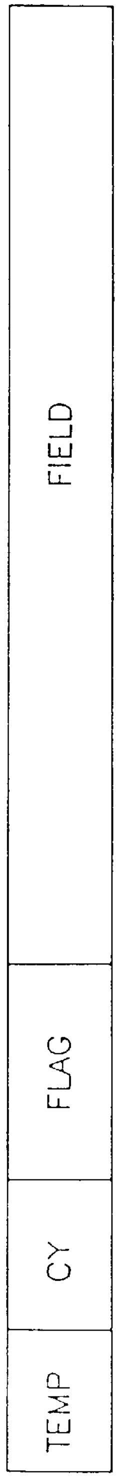
FIG. 22 is a simplified block diagram illustrating still another word format of associative memory within a portion of the apparatus of FIG. 11.
Figure 23:
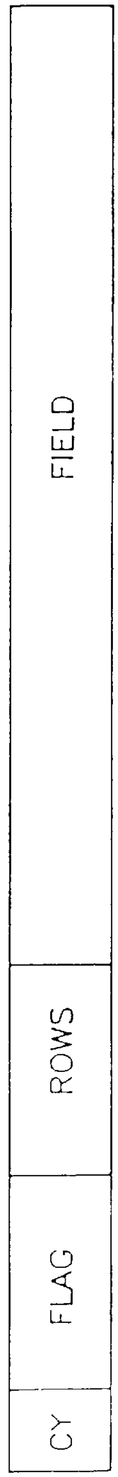
FIG. 23 is a simplified block diagram illustrating an additional word format of associative memory within a portion of the apparatus of FIG. 11.
Figure 24:
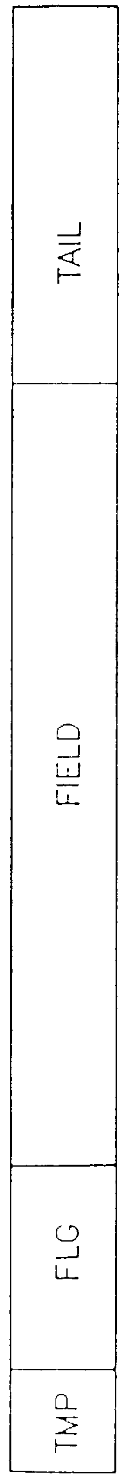
FIG. 24 is a simplified block diagram illustrating another word format of associative memory within a portion of the apparatus of FIG. 11.
Figure 29:
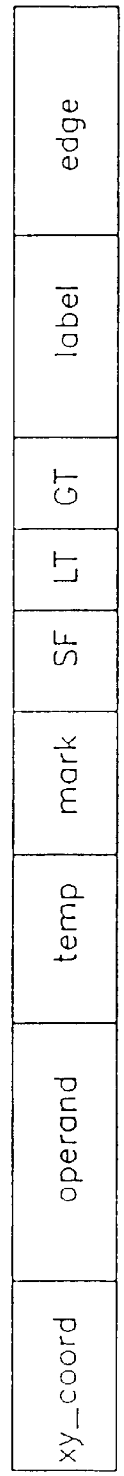
FIG. 29 is a simplified block diagram illustrating another word format of associative memory within a portion of the apparatus of FIG. 11.

Real time stereo vision by associative processing was considered and the problematic function was identified as the counting of labeled pixels over a large neighborhood. This function occurs four times in the resolution of ambiguous matches, and once in the handling of out-of-range disparity. Implementation of the count function in a straightforward (linear) manner pushes stereo execution time beyond real-time (video) limits. It was shown how associative array and tree techniques can be applied to great advantage; indeed, they bring stereo complexity well within real-time limits. To illustrate the results graphically, we present two comparative plots. FIG. 25 gives execution time as a function of neighborhood dimension for the three implementations described: the linear, the two-dimensional, and the two-dimensional tree. FIG. 26 presents stereo complexity without neighborhood counts, and with neighborhood counts by each of the three methods, all as a function of neighborhood dimension.

Optical Flow

Optical flow assigns to every point in the image a velocity vector which describes its motion across the visual field. The potential applications of optical flow include the areas of target tracking, target identification, moving image compression, autonomous robots and related areas. The theory of computing optical flow is based on two constraints: the brightness of a particular point in the image remains constant, and the flow of brightness patterns varies smoothly almost everywhere. Horn & Schunck [45] derived an iterative process to solve the constrained minimization problem. The flow velocity has two components (u,v). At each iteration, a new set of velocities $(u^{n+1},v^{n+1})$ can be estimated from the average of the previous velocity estimates $(\bar{u}^n,\bar{v}^n)$ by, $$u^{n+1}=\bar{u}^n-E_x[E_x\bar{u}^n+E_y\bar{v}^n+E_t]/(\alpha^2+E_x^2+E_y^2),$$

$$v^{n+1}=\bar{v}^n-E_y[E_x\bar{u}^n+E_y\bar{v}^n+E_t]/(\alpha^2+E_x^2+E_y^2) \qquad (33)$$

where $\alpha$ is a weighting factor dependent on noise in the measurement. The partial derivatives $E_x$, $E_y$ and $E_t$ in (33) are estimated as an average of four first differences taken over adjacent measurements in a cube, $$Ex \approx \frac{1}{4}\,[E_{i,j+1,k}-E_{i,j,k}+E_{i+1,j+1,k}-E_{i+1,j,k}+E_{i,j+1,k+1}-E_{i,j,k+1}+E_{i+1,j+1,k+1}-E_{i+1,j,k+1}] \qquad (34)$$

$$Ey \approx \frac{1}{4}\,[E_{i+1,j,k}-E_{i,j,k}+E_{i+1,j+1,k}-E_{i,j+1,k}+E_{i+1,j,k+1}-E_{i,j,k+1}+E_{i+1,j+1,k+1}-E_{i,j+1,k+1}]$$

$$Et \approx \frac{1}{4}\,[E_{i,j,k+1}-E_{i,j,k}+E_{i+1,j,k+1}-E_{i+1,j,k}+E_{i,j+1,k+1}-E_{i,j+1,k}+E_{i+1,j+1,k+1}-E_{i+1,j+1,k}].$$

$E_{i,j,k}$ is the pixel value at the intersection of row i and column j in frame k. Indices i,j increase from top to bottom and left to right, respectively. Local averages $\bar{u}$ and $\bar{v}$ in (33) are defined as follows:

$$\bar{u}_{i,j,k}=\frac{1}{6}\,[u_{i-1,j,k}+u_{i,j+1,k}+u_{i+1,j,k}+u_{i,j-1,k}]+\frac{1}{12}\,[u_{i-1,j-1,k}+u_{i-1,j+1,k}+u_{i+1,j+1,k}+u_{i+1,j-1,k}] \qquad (35)$$

$$\bar{v}_{i,j,k}=\frac{1}{6}\,[v_{i-1,j,k}+v_{i,j+1,k}+v_{i+1,j,k}+v_{i,j-1,k}]+\frac{1}{12}\,[v_{i-1,j-1,k}+v_{i-1,j+1,k}+v_{i+1,j+1,k}+v_{i+1,j-1,k}]$$

There is the practical matter of how to interlace the iterations with the time steps. A good initial guess for the optical flow velocities is usually available from the previous time step (video frame time). In the case of high speed motion, one iteration per time step may not be enough to get a stabilized value of optical flow, and there is a necessity to iterate several times before advancing to the next frame.

To implement the above equations associatively, the memory word was partitioned into multiple fields, each holding input data, output data, or intermediate results. The format is given in FIG. 27.

The flow is computed from two successive video frames: $E_n$ and $E_1$. Each frame contains 512×512 pixels whose grey level is given to 8-bit precision. During vertical blanking (time interval between frames), the current image is moved to $E_{n1}$, and a new image from the I/O buffer array (FIG. 15) is written into field $E_n$. During the frame time, one or more iterations of the algorithm are executed, enough to obtain a reasonable approximation of the optical flow for use with the next frame.

Equation 33 can be rewritten as, $$u^{n+1}=\bar{u}^n-D_x(E_x\bar{u}^n+E_y\bar{v}^n+E_t)$$

$$v^{n+1}=\bar{v}^n-D_y(E_x\bar{u}^n+E_y\bar{v}^n+E_t), \qquad (36)$$

where $D_x=E_x/P$, $D_y=E_y/P$ and $P=\alpha^2+E_x^2+E_y^2$. It will be noted that the partial derivatives $E_x$, $E_y$ and $E_t$, as well as $D_x$ and $D_y$, remain fixed during a given frame and are not involved in the iterative process between frames. Hence computation of these parameters is referred to as the "fixed part" of the algorithm.

Fixed Part

The first stage computes the partial derivatives $E_x$, $E_y$ and $E_t$.

Clear fields $E_x$, $E_y$ and $E_t$.

Shift $E_n$, $E_{n1}$, one row up and one column to the left (N+1 words up) to furnish $E_{i+1,j+1,n}$ and $E_{i+1,j+1,n+1}$.

Enter $E_{n+1}$ into $E_x$, $E_y$, $E_t$; add or subtract $E_n$ into the derivative fields as indicated in the following table, step 2.

Shift $E_n$, $E_{n1}$ one column to the right (one word down), to furnish $E_{i+1,j,n}$ and $E_{i+1,j,n+1}$.

Accumulate $E_n$, $E_{n1}$ as shown in the following table, steps 3,4:

| Shift Positions of Input Images | Operation $E_x$ | Operation $E_y$ | Operation $E_t$ | Order Of Execution |
|---|---|---|---|---|
| $E_{i+1,j+1,n+1}$ | + | + | + | 1 |
| $E_{i+1,j+1,n}$ | + | + | − | 2 |
| $E_{i+1,j,n}$ | − | + | − | 3 |
| $E_{i+1,j,n+1}$ | − | + | + | 4 |
| $E_{i,j,n}$ | − | − | − | 5 |
| $E_{i,j,n+1}$ | − | − | + | 6 |
| $E_{i,j+1,n}$ | + | − | − | 7 |
| $E_{i,j+1,n+1}$ | + | − | + | 8 |

Shift $E_n$, $E_{n1}$ one row (N words) down, and accumulate as shown in the above table, steps 5,6.

Shift $E_n$, $E_{n1}$ one column to the left (one word up) and accumulate as shown in the above table, steps 7,8.

Shift $E_n$, $E_{n1}$ to their original position (one word down).

The next stage in is to evaluate $D_x$ and $D_y$:

Use a look up table to compute $\alpha^2+E_x^2$, enter it in field $S_c$.

Use another look up table to compute $E_y^2$, enter it in field $A_c$.

Add field $A_c$ into field $S_c$ to obtain P.

Divide field $E_x$ by field $S_c$ placing the quotient in field U.

Divide field $E_y$ by field $S_c$ placing the quotient in field V.

Copy $D_x$ from field U to the right side (9 least significant bits) of field $S_c$.

Copy $D_y$ from field V to the left side of field $S_c$.

Before executing another division, the dividend $E_x$ or $E_y$ is ZERO extended to the left for proper scaling with respect to divisor P. It then follows from $\alpha<0$ that $D_x$, $D_y>1$, hence the quotient will not overflow. The complexity of the "fixed part" was evaluated as, $$T_{fix}=1829+\left(337+\frac{2N}{b}\right)M+64M^2. \qquad (37)$$

Iterative Part

Compute local average of u component (field U) as prescribed in equation 44, and place the result $(\bar{u})$ in field $U_{av}$. The neighboring values of u are accessed by shifting the U-field up and down in an optimal sequence and summing into field $A_c$. The 4-neighbors are given double weight by adding them in one place to the left. The value accumulated in $A_c$ is divided by 3 and the result placed in field $U_{av}$.

Similarly, compute local average of v component (field V) as prescribed in equation 44 and place the result $(\bar{v})$ in field $V_{av}$.

Copy $E_t$ into field $A_c$ with sign extension.

Multiply $E_x$ by $U_{av}$ placing the product in field U.

Add field U into field $A_c$

Multiply $E_y$ by $V_{av}$ placing the product in field $A_c$.

Add field U into field $A_c$ to obtain the term $E_x\bar{u}+E_y\bar{v}+E_t$.

Multiply field $A_c$ by the right side of field $S_c$ to obtain $D_x[E_x\bar{u}+E_y\bar{v}+E_t]$. Place the result in field U.

Multiply field $A_c$ by the left side of field $S_c$ to obtain $D_y[E_x\bar{u}+E_y\bar{v}+E_t]$. Place the result in field V.

Compute the u component of optical flow by evaluating $U_{av}-U$ into field U.

Compute the v component of optical flow by evaluating $V_{av}-V$ into field V.

The complexity of this part in machine cycles per iteration is given by, $$T_{itr} = 809 + 372M + 34M^2 + \frac{4N}{b}(M+1) \tag{38}$$

Hence the overall complexity of optical flow can now be evaluated as, $$T_{OF} = T_{fix} + IT_{itr} = 1829 + \left(337 + \frac{2N}{b}\right)M + 64M^2 + I\left[809 + 372M + 34M^2 + \frac{4N}{b}(M+1)\right] \tag{39}$$

where I denotes the number of iterations required for the flow to converge. Evaluating the above expression, the fixed part takes 266 $\mu$s., and each iteration requries an additional 196 $\mu$s. The execution time for different values of I is given in the following table:

| I Iter. | Cycles | Time (ms) |
|---|---|---|
| 1 | 15222 | 0.46 |
| 8 | 60981 | 1.84 |
| 16 | 113277 | 3.40 |
| 32 | 217869 | 6.54 |

Mid-Level Vision

Detection of Corners and Line Direction

An important feature for middle and higher level processing is the ability to distinguish corners and line direction. In the case of Canny Edge Detection, line orientation was generated during the process. On the other hand, the M&H algorithm is not directional, and the edge bit-map it produces must be further processed to detect line orientation. We proposed to use the edge bit-map of a 9×9 neighborhood around each pixel to distinguish segment direction. The resulting algorithm can discriminate 120 different lines and corners. The approach is outlined below.

Figures 27, 30:
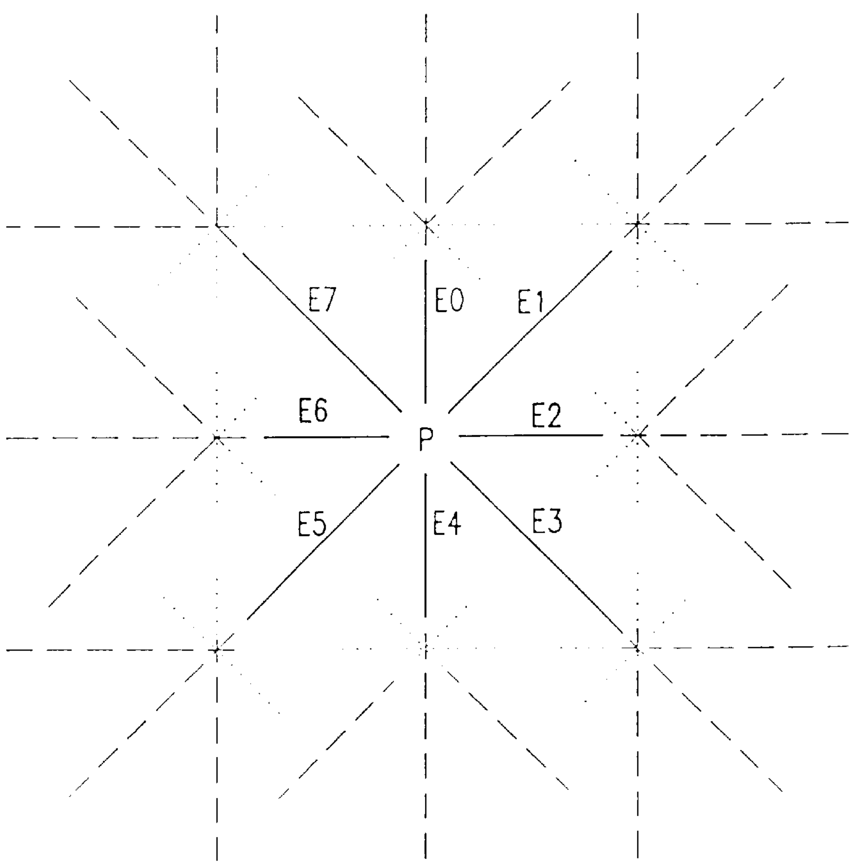
FIG. 27 is a simplified block diagram illustrating another word format of associative memory within a portion of the apparatus of FIG. 11.
FIG. 30 is a simplified pictorial illustration of pixels used within a method for processing an associative saliency network utilizing the apparatus of FIG. 11.
Figure 28:
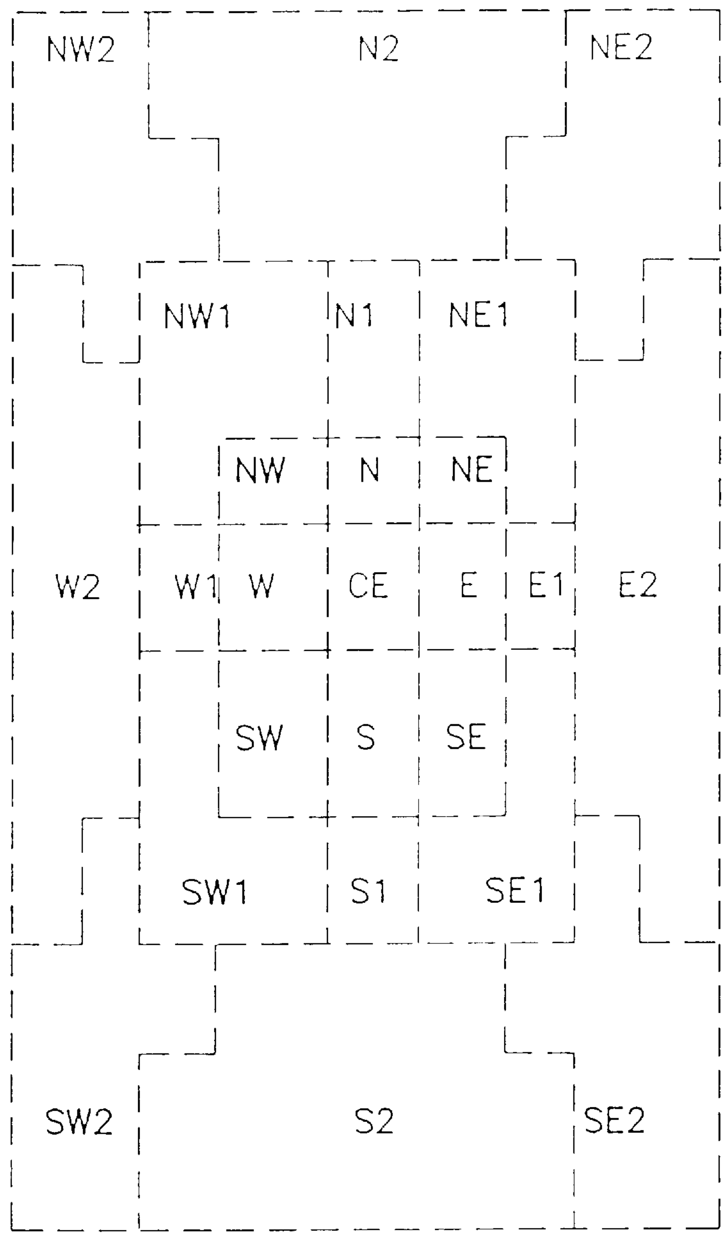
FIG. 28 is a simplified block diagram illustrating a portion of a method for edge detection utilizing the apparatus of FIG. 11.
Figure 31:
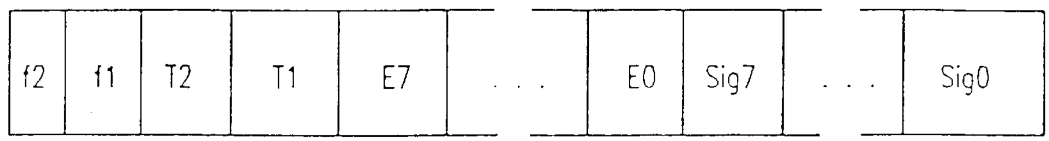
FIG. 31 is a simplified block diagram illustrating another word format of associative memory within a portion of the apparatus of FIG. 11.
Figure 32:
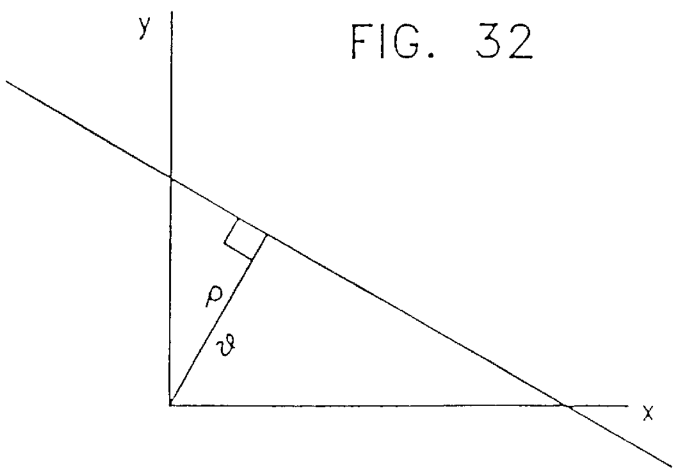
FIG. 32 is a graphical illustration of normal parameterization of a line used within a method for computing a Hough transform utilizing the apparatus of FIG. 11.

1. Since a 9×9 neighborhood involves too many patterns to handle directly, it was partitioned into 24 sectors as shown in FIG. 27. To maintain angular accuracy, sector size increases with distance from the center. The sector evaluation function is here defined as the logical OR of its edge point indicators, and a 24-bit field was assigned to the sector values. Evaluation is carried out by shifting in neighboring edge point indicators and OR'ing them directly into the corresponding sector values.
2. Sector partitioning was based on π/8 angular resolution, and defines 16 equally spaced segments or rays around the circle. Each segment (direction) is characterized by a required code in a prescribed subset of the segment values, and a maximum Hamming distance of 1 is permitted. The sector value field is now compared against each of the 16 codes and the results registered in a 16-bit field to mark the presence of each segment direction.
3. Simplification of segment characterization and testing introduces a measure of ambiguity in each triplet about one of the 8 main compass directions. Additional sector values are now used to resolve this uncertainty and the few cases of inherent ambiguity are settled arbitrarily.
4. The 16-bit segment field can now be tested for any pair of segments representing a given line or corner. The sample program selects all pairs without distinction.

From simulation, the complexity of this algorithm was found to be 1010 cycles or 30.3 $\mu$s. It should be noted that the concept of this algorithm can be extended to a broad range of functions depending on the choice of sector boundaries, of the evaluation function, and of pattern characterization.

Contour Tracing and Labeling

A preparation step labels each contour point with its x-y coordinates. The main process is iterative and operates on a 3×3 neighborhood of all contour points in parallel. Every contour point looks at each one of its 8 neighbors in turn and adopts the neighbor's label if smaller than its own. The circular sequence in which neighbors are handled appreciably enhances label propagation. Iteration stops when all labels remain unchanged, leaving each contour identified by its lowest coordinates. The point of lowest coordinates in each contour is the only one to retain its original label. These points were kept track of and are now counted to obtain the number of contours in the image. Listing 8 presents the program in associative memory. The input fields are [xy-coord] to specify pixel position and [edge] to identify contour points. The output fields are contour [label] and contour starting point [mr]. The word format is in FIG. 29.

LISTING 8: Contour Tracing and Labeling

```
main()
{
. . . declarations
/** Clear working fields **/
letm dseq(label,mark); letc; setag; write;
/*** Mark and label all edge points ***/
letmc d(edge); setag; compare;
letmc d(mark) ; write;
for(bit__count=0; bit__count<label__size; bit__count++)
   {
     letmc d(xy__coord+bit__count) d(edge); setag; compare;
     letmc d(label+bit__count); write;
   }
while( new__condition > growth__threshold)
   {
     letm d(sf) letc; setag; write; /*clear switch flag */
     /****** CONNECTIVITY TESTING ******/
     for(window__index=0; window__index<8; window__index++)
         {
     /* Shift "edge" and "label" into "temp" and "operand" */
     letm dseq(temp,operand+label__size−1); letc; setag; write;
     for (bit__count=0; bit__count<label__size+1; bit__count++)
         {
            letmc d(edge+bit__count); setag; compare;
            letmc d(temp+bit__count);
            general__shift(window__index}; write;
         }
     /** Test if "operand" < "label" **/
     letm d(gt) d(lt); letc; setag; write;
     /* clear greater & less than flags */
     for (bit__count=labels__size−1; bit__count)=0; bit__count--)
     {
     letm d(edge) d(temp) d(gt) d(lt)
```

-continued

LISTING 8: Contour Tracing and Labeling

```
        d(operand+bit_count) d(label+bit_count);
    letc d(edge) d(temp) d(operand+bit_count);
        setag; compare;
    letc d(edge) d(temp) d(gt) d(operand+bit_count); write;
    letc d(edge) d(temp) d(label+bit_count); setag; compare;
    letc d(edge) d(temp) d(lt) d(label+bit_count); write;
    }
    letmc d(lt); setag; compare;
    /* clear "label" and "mark" , set switch flag */
    letm dseq(label,label+label_size−1) d(mark) d(sf);
    letc d(sf); write;
    /* copy "operand" into "label" */
    for (bit_count=0; bit_count<label_size; bit_count++)
      {
        letmc d(operand+bit_count) d(it); setag; compare;
        letmc d(label+bit_count); write;
      }
    }
    /** Test for termination **/
    letmc d(sf); setag; compare;
    new_condition = countag;
  }
/** Find number of contours **/
letmc d(mark); setag; compare; countag;
}
general_shift (index)
int index;
{
if(index<=2) shiftag(b);
if(index>=4 && index<=6) shiftag(−b);
if(index==0 || index==6 |51 index==7) shiftag(−1);
if(index>=2 && index<=4) shiftag(1);
}
```

The time complexity of the algorithm (in machine cycles) is given by, $$T_l = 16 + 4\log_2 N + I\left[65 + \frac{3N}{b} + 2\log_2 N\left(67 + \frac{3N}{b}\right)\right].$$

The upper bound of I is nearly $N^2/2$, but for a representative value of 100 iterations, execution time becomes 218 kilo-cycles or 6.6 milliseconds. A good approximation to the time complexity is, $$T_l = I\left(67 + \frac{3N}{b}\right)(1 + 2\log_2 N).$$

A list of contours, giving label and length (in pixels), may be generated in relatively short order (24 cycles per contour).

Associative Saliency Network

Salient structures in an image can be perceived at a glance without the need for an organized search or prior knowledge about their shape. Such a structure may stand out even when embedded in a cluttered background or when its elements are fragmented. Sha'ashua & Ullman [46] have proposed a global saliency measure for curves based on their length, continuity and smoothness. Consider the image as a network of N×N grid points, with d orientation elements (segments or gaps) coming into each point from its neighbors, and as many going out to its neighbors. A curve of length L in this image is a connected sequence of orientation elements $p_i, p_{i+1}, \ldots, p_{i+L}$, each element representing a line-segment or a gap in the image, and the saliency measure of the curve is defined as, $$\sum_{j=i}^{i+L} c_{i,j}\rho_{i,j}\sigma_j \tag{40}$$

where the local saliency σ is assigned the value unity for an active element (real segment), and zero for a virtual element (gap). The attenuation function $\rho_{i,j}$ provides a penalty for gaps, $$\rho_{i,j} = \prod_{k=i+1}^{j} \rho_k, \tag{41}$$

where the attenuation factor ρ approaches unity for an active element and is appreciably less than unity (here taken to be 0.7) for a virtual element. The first factor, $c_{i,j}$, is a discrete approximation to a bounded measure of the inverse of total curvature, $$c_{i,j} = \prod_{k=i}^{j-1} f_{k,k+1} \qquad f_{k,k+1} = e^{-\frac{2\alpha_k \tan(\alpha_k/2)}{\Delta S}} \tag{42}$$

where $\alpha_k$ denotes the difference in orientation from the k-th element to its successor, and ΔS, the length of an orientation element.

It will be noted that this measure is global in nature, being evaluated over a curve of L orientation elements, any number of which may be gaps. Hence, to find the maximum value at a given segment, one must evaluate all $d^L$ possible curves starting with this segment, where d is the (discrete) number of directions considered at each point. This exponential complexity cannot be reduced by pyramid techniques, since parts of a salient curve are not necessarily salient. Nevertheless, Sha'ashua and Ullman reduced complexity to order dL by maximizing repeatedly over shorter curves. Let $E_i$ be a state variable associated with element $\rho_i$, then the iterative process is defined by, $$E_i^{(0)} = \sigma_i \tag{43}$$
$$E_i^{(n+1)} = \sigma_i + \rho_i \max E_j^{(n)} f_{i,j}$$

where $E_j$ is the state variable of $p_j$, one of the d possible neighbors of $p_i$; the superscript of E is the iteration number; and $f_{i,j}$ is the inverse curvature factor from $p_i$ to $\rho_j$. After L iterations the state variable becomes equivalent to the saliency measure defined earlier, $$E^{(L)} = \max \sum_{j=i}^{i+L} c_{i,j}\rho_{i,j}\sigma_j. \tag{44}$$

The proof is sketched in [46] and detailed in [47]. The final state variables of all the orientation elements (segments or gaps) in the N×N grid constitute a saliency map of the image.

In our associative architecture, the pixels constitute the grid points, and d=8 orientation elements connect each pixel to its neighbors (FIG. 30). In FIG. 30, the following notation is employed:

solid line: Ei element for which saliency is computed broken line: Successors used in computation dotted line: Successors ignored in computation For d discrete directions, angle α is given in increments of 360/d=45 degrees, and $f_{i,j}$ takes on the following values:

| α: | −180 | −135 | −90 | −45 | 0 | 45 | 90 | 135 | 180 |
|---|---|---|---|---|---|---|---|---|---|
| $f_{i,j}$: | 0 | 0.000011 | 0.043 | 0.52 | 1 | 0.52 | 0.043 | 0.000011 | 0 |

It can be seen that only three values of a are significant, −45, 0, and 45, hence only successors with these values of α will be considered in the computation. Since the initial image is given as edge points, a preprocessing step is required to identify active elements as any pair of edge points that are 8-neighbors. The program outline is given in Listing 9. The memory word format is in FIG. 31.

LISTING 9: Associative Saliency Network

```
main()
{
. . . declarations
for(i=0; i<8; i++) { /* updates Ei with first iteration */
  letmc d(Sig+i); setag; compare; letmc d(E[i]+3); write; }
for(iteration=1; iteration<MaxIteration; iteration++)
  {
    for(i=0; i<8; i++)
      {
        letm dseq(T1,T2+8); letc; setag; write; /* clear "T1" and "T2 */
        shift_and_do(i,0,T2);        /*performs Ej*Fij-->T2 for j=0*/
        for(j=1; j<3; j++)
          {
            shift_and_do(i,j,T2);   /* Ej*Fij --> T2              */
            max_field(T2,T1);       /* maximum(T2,T1) --> T1      */
          }
        Sum_Acc(i);          /* SIGi + ROi*MAX(Ej*Fij) -->Ei */
      }
  }
}
```

It may be worth noting that as active ρ approaches unity, it becomes possible to distinguish between different degrees of high saliency, but a larger number of iterations is required. The algorithm requires a word length of 90 bits and its time complexity in cycles is given by, $$T_{sal} = 42 + \frac{N}{b} + I\left(12354 + 66\frac{N}{b}\right) \tag{45}$$

where I denotes the number of iterations. Evaluating the expression in parentheses, execution time becomes 0.4 ms. per iteration. An execution time of 500 ms. per iteration was reported for the Connection Machine [48].

Hough Transform

The Hough transform can detect a curve whose shape is described by a parametric equation, such as the straight line or conic section, even if there are gaps in. the curve. Each point of the figure in image space is transformed to a locus in parameter space. After splitting the parameters into suitable ranges, a histogram is generated giving the distribution of locus points in parameter space. Occurrence of the object curve is marked by a distinct peak in the histogram (intersection of many loci).

In the case of a straight line (FIG. 32), we use the normal parameterization suggested by Duda & Hart [49]:

$$x\cos\theta + y\sin\theta = \rho$$

which specifies the line by ρ and θ, and the histogram includes a straight line in every direction of θ. But if the candidate points are the result of edge detection by a method that yields direction, then θ is known. Following O'Gorman & Clowes [50], this information was applied to effect a major reduction of both hardware (word-length) and time complexity. For a 511×511 image with the origin at its center, the x-y coordinates are given by 9 bits in absolute value and sign. Angle θ from 0 to π is given to a matching precision of 10 bits (excluding sign of gradient). The sine and cosine are evaluated by table look-up. Advantage is taken of the symmetry of these functions to reduce the table size four-fold. After comparing ρ, the histogram is evaluated and read-out element by element using the COUNTAG primitive. This algorithm requires a 52-bit word length and has a time complexity of, $$T_l = 1870 + 13t(r-1)$$

machine cycles, where t,r are the resolutions of ρ,θ respectively in the histogram. The second term accounts for histogram evaluation and dominates $T_l$ at t,r≧32. At a resolution of 16 in both θ and ρ (t,r=16), the execution time is only 150 μs per frame, and grows to just 6.4 ms at a resolution of 128.

Consider now detection of a circle with given radius R. Its equation may be written as:

$$(x-x_0)^2+(y-y_0)^2-R^2,$$

where $x_0$, $y_0$ are the coordinates of the center. As in the case of the straight line, we wish to use the direction of the gradient to simplify the process. Differentiating the circle equation we obtain, $$\frac{dy}{dx} = -\frac{x-x_0}{y-y_0} = \tan\left(\theta - \frac{\pi}{2}\right),$$

where θ is the gradient direction. Solving for $x_0$, $y_0$, $$x_0 = x \pm R\sin\left(\theta - \frac{\pi}{2}\right) \quad y_0 = y \pm R\cos\left(\theta - \frac{\pi}{2}\right).$$

These equations are implemented and a histogram generated for $x_0$, $y_0$. The algorithm uses gradient polarity to distinguish between bright circles on a dark background and dark circles on a light background, generating a separate histogram for each case. Assuming R less than 32 pixels, the word length required is 62 bits and the time complexity in cycles is given by, $$T_c = 1550 + 26r_x r_y, \tag{46}$$

where $r_x$, $r_y$ are the range resolutions of $x_0$, $y_0$ in the histogram. For a resolution of 128 in both $x_0$ and $y_0$, the execution time is 10.8 ms per frame. Mixed circles that are partly black on white, partly white on black, may be detected by summing the two histograms (in the host) before thresholding. If the search is restricted to bright circles on a dark background (or vice-versa), the complexity reduces to $$T_c = 1280 + 13r_x r_y, \tag{47}$$

and the execution time drops to 6.4 ms.

Geometric Problems

Convex Hull

It is sometimes interesting or useful to find the boundary of a set of points in the image. When looking at such a point set, one has little trouble distinguishing the inside points from those on the boundary. These natural boundary points are the vertices of the convex hull, which is defined mathematically as the smallest convex polygon containing the point set. Equivalently, the convex hull is the (unique) convex polygon containing the point set, whose vertices belong to the point set. Hence it is also the shortest path surrounding the point set.

The approach chosen for associative implementation is known as the package-wrapping method [51]. Starting with a point guaranteed to be on the convex hull, say the lowest one in the set (smallest y coordinate), take a horizontal ray in the positive direction and swing it upward (counterclockwise) until it hits another point in the set; this point must also be on the hull. Then anchor the ray at this point and continue swinging to the next points, until the starting point is reached, when the package is fully wrapped.

Figure 33:
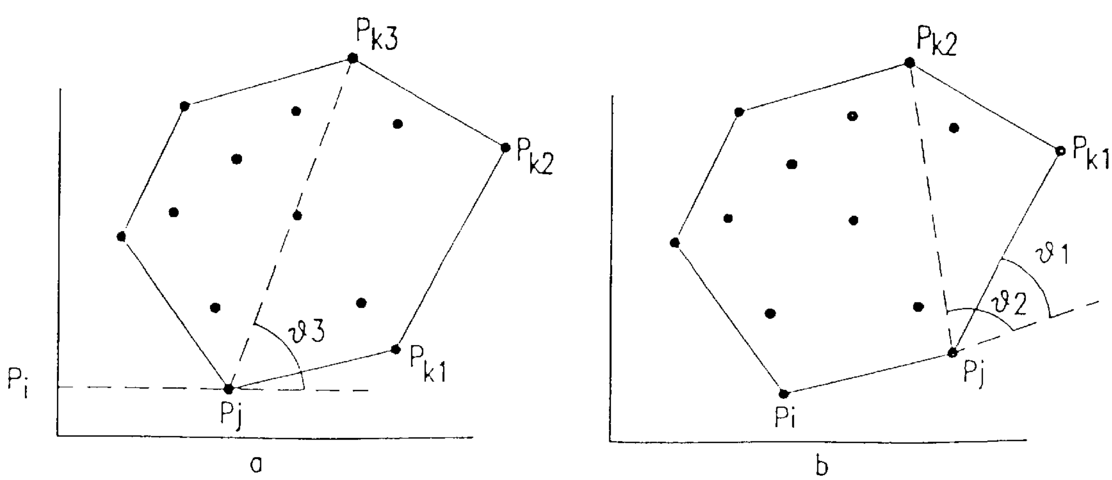
FIG. 33 is a graphical illustration of a portion of a method for Convex Hull generation utilizing the apparatus of FIG. 11.

For convenience we choose the coordinate system so that the entire image (and point set) is in the first quadrant. The lowest point $P_j$ is located by searching for the minimum y-coordinate in the set; it is on the hull and is labeled as such. We take as reference the extension of segment $P_iP_j$, such that $x_i=0$ and $y_i=y_j$, and consider the angle θ it forms with every $P_jP_k$, where $P_k$ is anyone of the other points in the set. The next point on the convex hull is the one for which θ is a minimum (FIG. 33). Denoting vector $P_iP_j$ by $V_1$ and vector $P_jP_k$ by $V_2$, their scalar product becomes, $$V_1V_2=|V_1||V_2|\cos\theta. \quad (48)$$

Hence, $$\cos\theta=\frac{a_1a_2+b_1b_2}{\sqrt{a_1^2+b_1^2}\sqrt{a_2^2+b_2^2}} \quad (49)$$

Where $a_1=x_j-x_i;\quad a_2=x_k-x_j;$
$b_1=y_j-y_i;\quad b_2=x_k-x_j;$

To avoid taking square roots, we use $\cos^2\theta$, $$\cos^2\theta=\frac{(a_1a_2+b_1b_2)^2}{(a_1^2+b_1^2)(a_2^2+b_2^2)} \quad (50)$$

Since θ ranges from 0 to π, before squaring the numerator $a_1a_2+b_1b_2$, we test for any positive values. If there are, we mark them and look for the maximum $\cos^2\theta$ value among them. Otherwise, if all numerators of cosθ are negative, we look for the minimum value of $\cos^2\theta$. The $P_k$ corresponding to the selected θ is on the hull and is labeled as such. To continue the process, $P_j$ becomes the new $P_i$, and the chosen $P_k$ becomes the new $P_j$ (FIG. 33). The process terminates when it returns to the initial (lowest) point.

Two special cases may arise. In the first step, when looking for the lowest point, we may find two or more points having the same minimum y-coordinate. We choose among them the point with highest x-coordinate as $P_j$, the one with lowest x-coordinate as $P_i$, and $P_iP_j$ becomes the first reference segment. During the iterative part, when looking for the point that makes θ a minimum, we may find two or more points, $P_{k1}$, $P_{k2}$ . . . $P_{ks}$, yielding the same minimum value. Clearly, lines $P_jP_{k1}$, $P_jP_{k2}$, . . . , $P_jP_{ks}$ are collinear, and the point to be chosen is the most distant from $P_j$, the one having maximum $|x_k-x_j|$. Should all $x_k-x_j$ equal zero, the choice is made on the basis of maximum $|y_k-y_j|$.

Analysis of the algorithm implementation shows on ARTVM gives execution time in machine cycles, $$T_{CHull}=60+105V \quad (51)$$

where V is the number of vertices of the complex hull. Hence time complexity is independent of the number of points in the set. For 1000 vertices in the hull, execution time becomes 3.15

Voronoi Diagram

This is a classical mathematical object that has become an important tool in computational geometry for dealing with proximity problems. Starting with a given set of L points in the plane, of $P_i$, i=1,2, . . . L, the Voronoi diagram surrounds each point $P_i$ by a region, $R_i$, such that every point in $R_i$ is closer to $P_i$ than to any other point in the set, $P_j$, j=1,2, . . . L and i≠j. The boundaries of all these regions, $R_i$, constitute the Voronoi diagram.

An associative algorithm based on the brush fire technique is presented in Listing 10. Each of the given points acts as a source of fire that spreads uniformly in all directions. The boundaries consist of those points at which fires from two (or three) sources meet. Every point in the given set is initially marked with a different color—actually its xy-coordinates. Each point in the image looks at its 8-neighbors. A blank (uncolored) point that sees a colored neighbor will copy its color. If both are colored, the point will compare colors, marking itself as a Voronoi (boundary) point if the colors are different. This process is iterated until all points are colored.

One more cycle of color comparison with the neighbors is necessary to complete demarcation of the boundaries. The order of processing the 8-neighbors was chosen to optimize boundary precision. Not unexpectedly, it alternates between opposite compass directions: N,S,E,W,NE,SW,NW,SE. Analysis of the algorithm yields the time complexity in cycles as, $$T_{vor}=2+I\left(1533+\frac{60N}{b}\right), \quad (52)$$

or an execution time of 75 μs per iteration. The regions grow diagonally at a rate of 2 pixels per iteration, hence up to 103 iterations may be required. But for a representative value of I=20, execution time is 1.5 ms.

The algorithm yields boundaries that are almost thin. One round of thinning in all 4 directions (south, north, west, east) with the following template will suffice.

```
X 1 X
1 P 0
X 0 0
```

Figure 34:
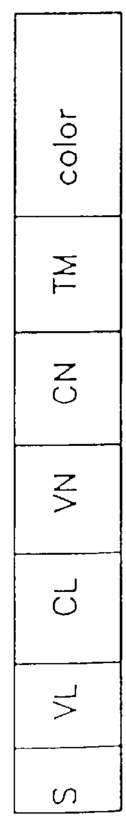
FIG. 34 is a simplified block diagram illustrating a method for processing an associative Voronoi diagram utilizing the apparatus of FIG. 11.

Note that the template is shown in its initial southern orientation and that the order within each pair of opposite directions has been reversed. This reversal appears essential for maintaining boundary precision. A pixel removed from the boundary is recolored by examining its 4-neighbors in turn and copying the first one that is not a boundary point. Since thinning and recoloring are not iterative processes, they do not affect execution time significantly. FIG. 34 is useful in understanding Listing 10.

LISTING 10: Associative Voronoi Diagram

```
main()
{
/* . . . declarations */
/** Mark the seed points as colored **/
letm d(CL) d(VL); letc; setag; write;
letmc d(S); setag; compare; letac d(CL); write;
/****** BRUSH FIRE ******/
while(rsp)
  {
    for (window__index=0; window__index<8; window__index++)
      {
        /** Bring in CN and VN **/
        letm d(CN) d(VN); letc; setag; write;
        letmc d(CL); setag; compare;
        letmc d(CN); general__shift(window__index); write;
        letmc d(VL); setag; compare;
        letmc d(VN); general__shift(window__index); write;
        process();
      }
    letm d(CL) letc; setag; compare;
```

-continued

LISTING 10: Associative Voronoi Diagram

```
  }
  process();
}
process()
{
for(i=0; i<colour_size; i++)
  {
    letm d(TM); letc; setag; write;
    letmc d(color+i); setag; compare;
    letmc d(TM); general_shift(window_index);
    write;
    letm dseq(CL,TM) d(color+i); letc d(CL) d(CN) d(TM); setag;
    compare;
    letmc d(VL); write;
    letm dseq(CL,Th) d(color+i); letc d(CL) d(CN) d(color+i);
    setag; compare;
    letac d(VL); write;
    letm dseq(CL,TM) d(color+i); etc d(CL) d(TM); setag; compare;
    letmc d(color+i); write;
  }
}
general_shift(index)                    /* 6 0 4 */
int index;                              /* 3 P 2 */
{                                       /* 5 1 7 */
if(index == 4 || index == 0 || index ==6) shiftag(b);
if(index == 5 || index == 1 || index ==7) shiftag(-b);
if(index == 6 || index == 3 || index ==5) shiftag(1);
if(index == 4 || index == 2 || index ==7) shiftag(-1);
}
```

The associative Voronoi algorithm was designed for quick access of statistical data. Thus it would take only 13 machine cycles to read out the length (in pixels) of the Voronoi Diagram or the area (in pixels) of any Voronoi region identified by its seed coordinates.

Word Length

This section estimates the associative memory word length (K), required to compute vision algorithms. Consider the machine model described, for monochrome computer stereo vision in three channels. Its input is M bits for each of the incoming images, left and right. The machine generates parameters in three channels for use in higher level processes. The parameters are: disparity of bit length $]\log_2(2W_i+1)[$; slope orientation and edge designation (of length 4 and 1 respectively) for the left data is reimages; and a one bit match label. Assuming input data is retained for further processing, the final word size is given by, $$K_{final} = 2M + \sum_{i=1}^{3} \log_2(2W_i + 1) + 3(2(4 + 1) + 1) = 64 \quad (53)$$

for M=8 and W=P=7,15,31. Additional word space is required for temporary storage of intermediate results, and this fluctuates dynamically during execution of the various algorithms. The maximum word length depends on the order of execution. The best order in our case is to compute each channel in turn, starting with the coarsest. Examination of the various processing phases indicates that maximum word length is reached during computation of disparity for the last channel. Accordingly, the maximum word length is expressed by, $$K_{max}=2M+K_{ch_{1,2}}+K_{sp} \quad (54)$$

where the first term is for the input data, and $K_{ch_{1,2}}$ accounts for the results of the first two channels.

$$K_{ch_{1,2}}=2(2(4+1)+\log_2(2W_3+1)+\log_2(2W_2+1)=33 \quad (55)$$

$K_{sp}$ is the working space to compute the last channel disparity and is given by (see Stereo Vision), $$K_{sp}=3\times2+2\ ]\log_2(2W_1+1)^2[+5\ ]\log_2(2W_1+1)[=42 \quad (56)$$

where $K_{sp}$ does not include fag bits. Hence $K_{max}$ becomes 91 bits.

Let us expand our model to include most of the visual algorithms implemented above. As before, the minimum word length required depends on the order of execution. The recommended order is:

Optical Flow.

Edge detection and contour processing.

Hough transform, saliency mapping.

Stereo matching.

The critical process appears to be optical flow with 132 bits (including an additional byte of pixel data for stereo). By sharing or reusing fields En1, Uav and Vav, the word length required drops to 106. Providing some spare capacity for new algorithms, the ARTVM word length was fixed at 128 (four 32-bit sectors), plus an 8-bit flag bit, or 136 bits. This only considers associative storage—if the 16-bit image buffer is included, the total word length becomes 152.

Results and Conclusions of the Akerib Thesis

A low cost, general purpose vision architecture was proposed here which could carry out any vision algorithm at video rate. The proposed machine is a classical associative structure adapted to computer vision and VLSI implementation. It is designated Associative Real Time Vision Machine (ARTVM), and uses an up-down shift mechanism in the tag register to enhance operations on a local neighborhood. An internal frame buffer virtually eliminates computer I/O time, and permits simultaneous input, output and computation. To reduce chip interface without materially affecting speed, the word is partitioned into four sectors, only one of which can be accessed at a time, and a flag field that is always accessible. The major hardware complement to handle a 512×512 image is shown to consist of 256K words ×152 bits of associative memory. Extrapolation of earlier experiments to 0.5 micron technology yields a capacity of 1M bits of associative memory on a chip area of 100 $mm^2$ and a cycle time of 30 nanoseconds. The proposed chip stores 4K words×152 bits, which is 59 percent of capacity, and 64 of these chips make up the associative memory.

A simulator of ARTVM was generated in the C language for use in developing associative micro-software and evaluating its time complexity. Convolution in the x and y directions with a 15-element filter takes 0.34 ms, hence Canny edge detection executes in 0.5 ms, and the Marr & Hildreth method runs nearly twice as long. Likewise computation of stereo disparity by the Grimson method over a range of ±15 pixels, including disambiguation and out-of-range test, completes in under one ms. This stereo performance was only attained by virtue of an array algorithm for counting labeled pixels over a neighborhood. Optical flow by the Horn & Schunck method executes in less than 0.5 ms. Curve propagation, thinning and contour tracing take 1.5, 6.4 and 66 μs per iteration, respectively. The linear Hough transform takes 150 μs for a resolution of 16 in direction and distance from the origin. An interesting result was obtained for the global saliency mapping of Sha'ashua & Ullman. It takes 0.4 ms per iteration, which is three orders of magnitude faster than the Connection Machine. Geometric problems were also implemented: the convex hull takes 3.15 μs per vertex, and the Voronoi diagram executes in 0.15 ms per iteration by the brush-fire technique.

Two methods were selected for comparative evaluation of ARTVM performance. In the first we compared our architecture to an SIMD array of up to 256 high performance processors (Inmos T800/Intel 860), and found it to have a speed advantage of 2–3 orders of magnitude. The speed advantage was lowest for neighborhood arithmetic operations of higher precision, such as convolution (factor of 97), and reached a peak for neighborhood logic operations such as curve propagation (factor of 2500). The second method was the Abingdon cross benchmark for which test results were available on several of the better known vision architectures. The ARTVM was found to lead by 2–6 orders of magnitude in price-performance.

The ARTVM configuration used throughout this investigation assumed a long shift of 32 places (b=32). This added 64 pins to the associative chip, for a total interface of 160 pins. Reducing b to 16 would save 32 pins at the expense of a 17% loss in average speed. It was indicated earlier that the architecture is flexible with respect to advances in technology and can take full advantage of higher chip density. There is equal flexibility in image resolution if memory chip count is varied linearly with this parameter. Thus for a 1024×1024 image, the chip count will grow by a factor of 4, with a small loss in speed and, perhaps, a minor increase in word length.

In the vision algorithms described above, which the data base is inherently pixel oriented or such orientation offers a decided advantage. Exceptions are the Hough transforms and convex hull. For higher level vision functions, dealing with more complex image elements, an associative architecture is expected to offer even greater advantages.

This work has important commercial implications.

The apparatus and methods shown and described above are useful in a variety of applications, such as but not limited to: video telephony implementing the H.261 standard; video teleconferencing for CIF resolution and QCIF resolution; compression and decompression of video games; color image enhancement and manipulation for desk top publishing; optical character recognition (OCR); virtual reality; image animation such as computer generated cartoons; 2 or 3 dimensional B/W or color image inspection and processing; video detecting for traffic control; medical imaging such as 3D reconstructions and back projection filtering; real time normalized gray scale correlation; TV tracking of more than one object such as tracking of vehicles for traffic control purposes; other traffic applications such as identification of license numbers; inspection of manufactured objects such as agricultural produce; wood and metal products and microelectronic products; acceleration of computer arithmetics; neural network applications; fuzzy logic applications; post processing the quality of compressed images; photography with video, digital or analog cameras, with or without image compression, with or without special effects such as autofocus, gamma correction, photomontages, bluescreen, aperture correction, exposure correction, real time morphing, and correction of geometrical distortions; television applications such as HDTV (high definition television), satellite TV, cable TV; infotainment; speech recognition; kiosks for banking, travel, shopping and other purposes; special effects and enhancement of automated office equipment such as facsimile machines, printers, scanners, and photocopiers; compression applications such as compression of faces, fingerprints or other information onto smart cards for driver licenses, ID cards and membership cards; communication applications such as digital filtering, Viterbi decoding and dynamic programming; and training, educational, and entertainment applications.

Video and picture editing applications include acceleration of desk top publishing functions such as blurring, sharpening, rotations and other geometrical transformations, and median filtering.

CD ROM (compact disc read-only-memory) uses include compression such as MPEG-I, MPEG-II, JPEG, fractal compression, and wavelet compression, with or without enhancement such as video sharpening, for a wide variety of applications such as archiving images for medical, real estate, travel, research, and journalistic purposes.

Examples of facsimile applications include canceling out a colored background so as to sharpen the appearance of a text superimposed on the colored background, filling in gaps in letters such as Kanji characters, OCR, facsimile data compression.

An example of a photocopier application is automatically superimposing a template stored in memory, such as a logo, onto a photocopy.

Security applications for home, workplace, banks, and receptacles for valuables and proprietary information, include the following: recognition of personnel, as by face recognition, fingerprint recognition, iris recognition, voice recognition, and handwriting recognition such as signature recognition;

Camera features which may be accelerated by use of the embodiments shown and described herein include the following:

1. Gamma correction: A LUT (look up table) is employed which includes 256 cells, respectively including a value i (i=0, . . . , 255) raised to the power of gamma. Gamma may, for example, be 0.36 or 0.45. The same LUT may be employed for all three color components (R, G and B) and gamma correction may be performed in parallel for all three components.
2. Rapid color-base conversions such as color transformation in which luminance and chrominance are separated before further processing. For example, it is often desirable to transform RGB values or CMYK values into YCrCb values which can be compressed by reducing the number of bits devoted to the Cr and Cb components. Eventually, the compressed YCrCb values are transformed back into RGB or CMYK.
3. Low pass filtering of luminance chrominance signals with 5–15 tap filters.
4. Aperture correction. For example, the following stages may be performed:
   a. Extract a high frequency component of the original signal representing the photographed scene;
   b. Apply two separable filters, each of which may, for example, be: [−0.25 0.5 −0.25] to the columns and rows respectively.
   c. Generate a correction signal by shifting the horizontal point signal by K=0, 1, 2 or 4 pixels.
   d. Generate corrected output by adding the correction signal to the original signal.
5. Autofocus and autoexposure computations:

For example, the focus of the camera may be adjusted by a predetermined amount in a first direction. Then, the proportion of high frequency components may be computed using the embodiments shown and described above to determine whether this proportion has increased or decreased as a result of the adjustment. If there is an increase, the focus is again adjusted by a predetermined amount in the first direction. If there is a decrease, the focus is adjusted by a predetermined amount in the second direction.

6. Auto color correction computations, such as auto gain control and auto white balance. For example, the following stages may be performed:

a. Adjust black levels until the darkest parts of each R, G or B signal reaches a predetermined level.

b. Adjust differential gains so as to equalize the means of the three signals.

c. Adjust overall gain such that the most positive of the peaks of the three waveforms just reaches white level. This may be done by computing the maximum, minimum and mean levels of each color.

7. Chroma-keying:

a. Key generator: X=Cb cos(z)+Cr sin(z); Z=Cr cos(z) s+Cb sin(z)

$$K=X-a|Z|,\ K=0 \text{ if } Z<a|Z|,\ a=1/2,\ 1,\ 2,\ 4$$

b. Foreground suppression:

Cb'=Cb−K cos(z)

Cr'=Cr−K sin(z)

Y'=Y−YsK, Y'=0 if YsK>Y. Ys−adjustable constant c. Key processing:

Kbg=0 for wanted foreground, Kbg=1 for wanted background picture.

Kbg=(K−K1)Kg for the transition band.

c. Mixer

8. Noise Reduction

Weighted averaging of two successive images with weights 1/K, 1−1/K, K=2,4,8

9. Movement Protection (Avoid smearing of moving objects).

10. Creation of composite and S-video signals:

Chrominance modulation and alternating lines: Usin (wt)+Vsin(wt) Usin(wt)−Vsin(wt) done for frequencies of 13.5 MHz.

It will be appreciated by persons skilled in the art that the present invention is not limited to what has been particularly shown and described hereinabove. Rather, the scope of the present invention is defined only by the claims that follow:

08/353612
U 10027-4

APPENDIX A

RE30-72310

```
file: SOMA.VHD
-- Date of netlist generation: Nov-21-93

----------------------------------------------------------------------

library IEEE;
use IEEE.STD_LOGIC_1164.ALL;

library COMPASS_LIB;
use COMPASS_LIB.COMPASS.ALL;

entity amos is

   port ( I2 : in Std_Logic := 'U';
        ex : in Std_Logic := 'U';
        I1 : in Std_Logic := 'U';
        I0 : in Std_Logic := 'U';

        p0 : out Std_Logic := 'U';
        p1 : out Std_Logic := 'U';
        p2 : out Std_Logic := 'U' );

end amos;

----------------------------------------------------------------------

architecture amos OF amos is

   signal U9_Z : Std_Logic;
   signal U6_Z : Std_Logic;
   signal U2_Z : Std_Logic;

begin

   U9: or02d1
      port map ( A1 => I1, A2 => I0, Z => U9_Z );

   U6: or02d1
      port map ( A1 => I2, A2 => I0, Z => U6_Z );

   U2: or02d1
      port map ( A1 => I2, A2 => I1, Z => U2_Z );

   U13: an02d1
      port map ( A1 => ex, A2 => U9_Z, Z => p2 );

   U12: an02d1
      port map ( A1 => ex, A2 => U6_Z, Z => p1 );

   U11: an02d1
      port map ( A1 => ex, A2 => U2_Z, Z => p0 );

end amos;
```

```
file: ARRAY341.VHD
library ieee;
use ieee.std_logic_1164.all;
library more_std;
use more_std.std_logic_arith.all;

entity array341_m is
        port(
                wl : in std_logic_vector (340 downto 0);
                rspen : in std_logic_vector (340 downto 0);
                fwl : in std_logic_vector (340 downto 0);
                fsaen : in std_logic;
                asaen : in std_logic;
                prsp : in std_logic;
                prech : in std_logic;
                bl : in std_logic_vector (71 downto 0);
                disch : in std_logic;
                f0,f1,f2 : in std_logic := '0';
                ibl : in std_logic_vector (71 downto 0);
                if0,if1,if2 : in std_logic;
                mask : in std_logic_vector (71 downto 0);
                msaen : in std_logic;
                ml : out std_logic_vector (340 downto 0) := (others => 'U');
                rsao : out std_logic_vector (71 downto 0);
                rsp : out std_logic
        );
end array341_m;

architecture behavioral of array341_m is

        function event (signal s : std_ulogic) return boolean is
        begin
                return(s /= s'LAST_VALUE);
        end event;

        function last_value (signal s : std_ulogic) return std_logic is
        begin
                return(s'LAST_VALUE);
        end last_value;

        function is_forcing (mvl9 : in std_logic) return boolean is
        begin
                if ((mvl9='1') or (mvl9='0')) then
                        return TRUE;
                else
                        return FALSE;
                end if;
        end is_forcing;

        signal rout : std_logic_vector (71 downto 0);
        signal rspc,mlpc : std_logic := '0';
        signal blpc : std_logic_vector (71 downto 0) := (others => '0');
        constant clk_period : time := 100 ns;
        signal fifo_down : integer := 72;

begin
        fifo_select:process(f0,f1,f2)
        begin
```

```
        if ((f0='0') and (f1='0') and (f2='0')) then
                fifo_down <= 72;
                assert FALSE
                report "ASP100: No FIFO configuration"
                severity note;
        elsif ((f0='0') and (f1='1') and (f2='1')) then
                fifo_down <= 64;
                assert FALSE
                report "ASP100: 8 bit FIFO configuration"
                severity note;
        elsif ((f0='1') and (f1='0') and (f2='1')) then
                fifo_down <= 56;
                assert FALSE
                report "ASP100: 16 bit FIFO configuration"
                severity note;
        elsif ((f0='1') and (f1='1') and (f2='0')) then
                fifo_down <= 48;
                assert FALSE
                report "ASP100: 24 bit FIFO configuration"
                severity note;
        else
                assert FALSE
                report "Illegal combination of f0,f1,f2"
                severity error;
        end if;
    end process fifo_select;

    main_loop:process(fwl,wl,bl,ibl,mask,mlpc,blpc)
        type mem_data is array(340 downto 0 , 71 downto 0) of std_logic;
        variable mem : mem_data;
    begin
    for row in 340 downto 0 loop
        for col in 71 downto fifo_down loop
                -- Cell behavioral description
                if (event(fwl(row)) or event(bl(col)) or event(ibl(col)) or event(mask(col))
or event(blpc(col)) or event(mlpc)) then
                        if ((bl(col) xor ibl(col)) = '1') then
                                rout(col) <= bl(col) after 1 ns;
                                --if (mlpc = '1') then
                                        -- Compare
                                --      if (bl(col)=mem(row,col)) then
                                --              ml(row) <= '0' after 1 ns;
                                --      end if;
                                --else
                                --      ml(row) <= 'Z' after 1 ns;
                                --end if;

                                if ((fwl(row) and mask(col)) = '1') then
                                        -- Write
                                        mem(row,col) := bl(col);
                                        rout(col) <= bl(col) after 1 ns;
                                end if;
                        end if;

                        if (((bl(col)='Z') and is_forcing(ibl(col))) or ((ibl(col)='Z') and
is_forcing(bl(col)))) then
                                rout(col) <= 'X' after 1 ns;
                                assert FALSE
```

```
                        report "One bl is forced, the other is Z"
                        severity warning;
                end if;

                if ((not(bl(col) xor ibl(col)))='1') then
                        rout(col) <= 'X' after 1 ns;
                        --if(mlpc = '1') then
                        --      if ((bl(col) and ibl(col))='1') then
                        --              assert (row /= 0)
                        --              report "ML is precharged and
BL=IBL=1"
                        --              severity warning;
                        --              ml(row) <= '0' after 1 ns;
                                -- else
                                        -- Mask Compare
                        --              ml(row) <= 'Z' after 1 ns;
                        --      end if;
                        --end if;
                        if ((fwl(row) and mask(col))='1') then
                                assert (row /= 0)
                                report "BL=IBL while WL=MASK=1"
                                severity error;
                        end if;
                end if;

                if ((bl(col)='Z') and (ibl(col)='Z')) then
                        ml(row) <= 'Z' after 1 ns;
                        if ((blpc(col) = '1') and ((fwl(row) and mask(col))='1'))
then
                                -- Read
                                rout(col) <= mem(row,col) after 1 ns;
                        end if;
                end if;
        end if;
        -- End of cell
end loop;

for col in (fifo_down-1) downto 0 loop
        -- Cell behavioral description
        if (event(wl(row)) or event(bl(col)) or event(ibl(col)) or event(mask(col)) or
event(blpc(col)) or event(mlpc)) then
                if ((bl(col) xor ibl(col)) = '1') then
                        rout(col) <= bl(col) after 1 ns;
                        if (mlpc = '1') then
                                -- Compare
                                if (bl(col)=mem(row,col)) then
                                        ml(row) <= '0' after 1 ns;
                                end if;
                        else
                                ml(row) <= 'Z' after 1 ns;
                        end if;

                        if ((wl(row) and mask(col)) = '1') then
                                -- Write
                                mem(row,col) := bl(col);
                                rout(col) <= bl(col) after 1 ns;
                        end if;
                end if;
```

```
                        if (((bl(col)='Z') and is_forcing(ibl(col))) or ((ibl(col)='Z') and is_forcing(bl(col)))) then
                                rout(col) <= 'X' after 1 ns;
                                assert (row /= 0)
                                report "One bl is forced, the other is Z"
                                severity warning;
                        end if;

                        if ((not(bl(col) xor ibl(col)))='1') then
                                rout(col) <= 'X' after 1 ns;
                                if(mlpc = '1') then
                                        if ((bl(col) and ibl(col))='1') then
                                                assert (row /= 0)
                                                report "ML is precharged and BL=IBL=1"

                                                severity warning;
                                                ml(row) <= '0' after 1 ns;
                                        -- else
                                                -- Mask Compare
                                        --      ml(row) <= 'Z' after 1 ns;
                                        end if;
                                end if;
                                if ((wl(row) and mask(col))='1') then
                                        assert (row /= 0)
                                        report "BL=IBL while WL=MASK=1"
                                        severity error;
                                end if;
                        end if;

                        if ((bl(col)='Z') and (ibl(col)='Z')) then
                                ml(row) <= 'Z' after 1 ns;
                                if ((blpc(col) = '1') and ((wl(row) and mask(col))='1')) then
                                        -- Read
                                        rout(col) <= mem(row,col) after 1 ns;
                                end if;
                        end if;
                end if;
                -- End of cell
        end loop;
end loop;
end process main_loop;

-- Array output enable
out_en:process (asaen,fsaen,rout)
begin
        if (fsaen = '1') then
                rsao(71 downto fifo_down) <= rout(71 downto fifo_down) after 1 ns;
        else
                rsao(71 downto fifo_down) <= (others => 'Z') after 1 ns;
        end if;

        if (asaen = '1') then
                rsao(fifo_down-1 downto 0) <= rout(fifo_down-1 downto 0) after 1 ns;
        else
                rsao(fifo_down-1 downto 0) <= (others => 'Z') after 1 ns;
        end if;
```

```
end process out_en;

-- Precharge/Discharge ml
prec_ml:process (prech,disch,bl,ibl)
begin
        if ((prech = '0') and (disch = '1')) then
                assert FALSE
                report "Precharge and Discharge are both active"
                severity error;
        end if;

        if (prech = '0') then
                if ((bl(fifo_down-1 downto 0) /= conv_std_logic_vector('0',fifo_down)) or
(ibl(fifo_down-1 downto 0) /= conv_std_logic_vector('0',fifo_down))) then
                        assert FALSE
                        report "Precharging ML when BL or IBL != 0"
                        severity error;
                end if;
                ml <= transport (others => '1') after 1 ns;
        end if;

        if (rising_edge(prech)) then
                ml <= transport (others => 'H') after 8 ns;
                ml <= transport (others => 'Z') after clk_period;
                mlpc <= transport '1' after 8 ns;
                mlpc <= transport '0' after clk_period;
        end if;

        if (disch = '1') then
                ml <= transport (others => '0') after 1 ns;
                mlpc <= transport '0' after 1 ns;
        end if;
end process prec_ml;

-- RSP circuitry
rsp_ckt:process (prsp,rspc,rspen)
begin

        -- Detect RSP precharge sequence
        if (rising_edge(prsp)) then
                rspc <= transport '1' after 1 ns;
                rspc <= transport '0' after 2*clk_period;
        end if;

        if (rspc = '1') then
                if (rspen = conv_std_logic_vector('0',341)) then
                        rsp <= '1' after 1 ns;
                else
                        rsp <= '0' after 1 ns;
                end if;
        else
                rsp <= 'Z' after 1 ns;
        end if;

        if((prsp = '0') and (rspen /= conv_std_logic_vector('0',341))) then
                assert FALSE
                report "Precharging rsp when rspen != 0"
                severity error;
```

```
            end if;
        end process rsp_ckt;

        -- Detect BL precharge sequence
        prec_bl:process (bl,ibl)
        begin
            for i in 71 downto 0 loop
                if ((last_value(bl(i)) = '1') and (last_value(ibl(i)) = '1') and (bl(i) = 'Z') and
(ibl(i) = 'Z') and (event(bl(i)) or event(ibl(i)))) then
                    blpc(i) <= transport '1' after 1 ns;
                    blpc(i) <= transport '0' after clk_period;
                end if;
            end loop;
        end process prec_bl;

end behavioral;
```

```
file: ARRAY342.VHD
library ieee;
use ieee.std_logic_1164.all;
library more_std;
use more_std.std_logic_arith.all;

entity array342_m is
        port(
                wl : in std_logic_vector (341 downto 0);
                rspen : in std_logic_vector (341 downto 0);
                fwl : in std_logic_vector (341 downto 0);
                fsaen : in std_logic;
                asaen : in std_logic;
                prsp : in std_logic;
                prech : in std_logic;
                bl : in std_logic_vector (71 downto 0);
                disch : in std_logic;
                f0,f1,f2 : in std_logic := '0';
                ibl : in std_logic_vector (71 downto 0);
                if0,if1,if2 : in std_logic;
                mask : in std_logic_vector (71 downto 0);
                msaen : in std_logic;
                ml : out std_logic_vector (341 downto 0) := (others => 'U');
                rsao : out std_logic_vector (71 downto 0);
                rsp : out std_logic
        );
end array342_m;

architecture behavioral of array342_m is

        function event (signal s : std_ulogic) return boolean is
        begin
                return(s /= s'LAST_VALUE);
        end event;

        function last_value (signal s : std_ulogic) return std_logic is
        begin
                return(s'LAST_VALUE);
        end last_value;

        function is_forcing (mvl9 : in std_logic) return boolean is
        begin
                if ((mvl9='1') or (mvl9='0')) then
                        return TRUE;
                else
                        return FALSE;
                end if;
        end is_forcing;

        signal rout : std_logic_vector (71 downto 0);
        signal rspc,mlpc : std_logic := '0';
        signal blpc : std_logic_vector (71 downto 0) := (others => '0');
        constant clk_period : time := 100 ns;
        signal fifo_down : integer := 72;

begin
        fifo_select:process(f0,f1,f2)
        begin
```

```
		if ((f0='0') and (f1='0') and (f2='0')) then
			fifo_down <= 72;
			assert FALSE
			report "ASP100: No FIFO configuration"
			severity note;
		elsif ((f0='0') and (f1='1') and (f2='1')) then
			fifo_down <= 64;
			assert FALSE
			report "ASP100: 8 bit FIFO configuration"
			severity note;
		elsif ((f0='1') and (f1='0') and (f2='1')) then
			fifo_down <= 56;
			assert FALSE
			report "ASP100: 16 bit FIFO configuration"
			severity note;
		elsif ((f0='1') and (f1='1') and (f2='0')) then
			fifo_down <= 48;
			assert FALSE
			report "ASP100: 24 bit FIFO configuration"
			severity note;
		else
			assert FALSE
			report "Illegal combination of f0,f1,f2"
			severity error;
		end if;
	end process fifo_select;

	main_loop:process(fwl,wl,bl,ibl,mask,mlpc,blpc)
		type mem_data is array(341 downto 0 , 71 downto 0) of std_logic;
		variable mem : mem_data;
	begin
	for row in 341 downto 0 loop
		for col in 71 downto fifo_down loop
			-- Cell behavioral description
			if (event(fwl(row)) or event(bl(col)) or event(ibl(col)) or event(mask(col))
or event(blpc(col)) or event(mlpc)) then
				if ((bl(col) xor ibl(col)) = '1') then
					rout(col) <= bl(col) after 1 ns;
					-- if (mlpc = '1') then
						-- Compare
					--	if (bl(col)=mem(row,col)) then
					--		ml(row) <= '0' after 1 ns;
					--	end if;
					-- else
					--	ml(row) <= 'Z' after 1 ns;
					-- end if;

					if ((fwl(row) and mask(col)) = '1') then
						-- Write
						mem(row,col) := bl(col);
						rout(col) <= bl(col) after 1 ns;
					end if;
				end if;

				if (((bl(col)='Z') and is_forcing(ibl(col))) or ((ibl(col)='Z') and
is_forcing(bl(col)))) then
					rout(col) <= 'X' after 1 ns;
					assert FALSE
```

```
                                        report "One bl is forced, the other is Z"
                                        severity warning;
                              end if;

                              if ((not(bl(col) xor ibl(col)))='1') then
                                        rout(col) <= 'X' after 1 ns;
                                        if(mlpc = '1') then
                                                  if ((bl(col) and ibl(col))='1') then
                                                            assert (row /= 0)
                                                            report "ML is precharged and
BL=IBL=1"
                                                            severity warning;
                                                            ml(row) <= '0' after 1 ns;
                                                  -- else
                                                            -- Mask Compare
                                                  --        ml(row) <= 'Z' after 1 ns;
                                                  end if;
                                        end if;
                                        if ((fwl(row) and mask(col))='1') then
                                                  assert (row /= 0)
                                                  report "BL=IBL while WL=MASK=1"
                                                  severity error;
                                        end if;
                              end if;

                              if ((bl(col)='Z') and (ibl(col)='Z')) then
                                        ml(row) <= 'Z' after 1 ns;
                                        if ((blpc(col) = '1') and ((fwl(row) and mask(col))='1'))
then
                                                  -- Read
                                                  rout(col) <= mem(row,col) after 1 ns;
                                        end if;
                              end if;
                    end if;
                    -- End of cell
          end loop;

          for col in (fifo_down-1) downto 0 loop
                    -- Cell behavioral description
                    if (event(wl(row)) or event(bl(col)) or event(ibl(col)) or event(mask(col)) or
event(blpc(col)) or event(mlpc)) then
                              if ((bl(col) xor ibl(col)) = '1') then
                                        rout(col) <= bl(col) after 1 ns;
                                        if (mlpc = '1') then
                                                  -- Compare
                                                  if (bl(col)=mem(row,col)) then
                                                            ml(row) <= '0' after 1 ns;
                                                  end if;
                                        else
                                                  ml(row) <= 'Z' after 1 ns;
                                        end if;

                                        if ((wl(row) and mask(col)) = '1') then
                                                  -- Write
                                                  mem(row,col) := bl(col);
                                                  rout(col) <= bl(col) after 1 ns;
                                        end if;
                              end if;
```

```
                        if (((bl(col)='Z') and is_forcing(ibl(col))) or ((ibl(col)='Z') and
is_forcing(bl(col)))) then
                                rout(col) <= 'X' after 1 ns;
                                assert (row /= 0)
                                report "One bl is forced, the other is Z"
                                severity warning;
                        end if;

                        if ((not(bl(col) xor ibl(col)))='1') then
                                rout(col) <= 'X' after 1 ns;
                                if(mlpc = '1') then
                                        if ((bl(col) and ibl(col))='1') then
                                                assert (row /= 0)
                                                report "ML is precharged and
BL=IBL=1"
                                                severity warning;
                                                ml(row) <= '0' after 1 ns;
                                        -- else
                                                -- Mask Compare
                                        --      ml(row) <= 'Z' after 1 ns;
                                        end if;
                                end if;
                                if ((wl(row) and mask(col))='1') then
                                        assert (row /= 0)
                                        report "BL=IBL while WL=MASK=1"
                                        severity error;
                                end if;
                        end if;

                        if ((bl(col)='Z') and (ibl(col)='Z')) then
                                ml(row) <= 'Z' after 1 ns;
                                if ((blpc(col) = '1') and ((wl(row) and mask(col))='1'))
then
                                        -- Read
                                        rout(col) <= mem(row,col) after 1 ns;
                                end if;
                        end if;
                end if;
                -- End of cell
        end loop;
    end loop;
    end process main_loop;

    -- Array output enable
    out_en:process (asaen,fsaen,rout)
    begin
        if (fsaen = '1') then
                rsao(71 downto fifo_down) <= rout(71 downto fifo_down) after 1 ns;
        else
                rsao(71 downto fifo_down) <= (others => 'Z') after 1 ns;
        end if;

        if (asaen = '1') then
                rsao(fifo_down-1 downto 0) <= rout(fifo_down-1 downto 0) after 1 ns;
        else
                rsao(fifo_down-1 downto 0) <= (others => 'Z') after 1 ns;
        end if;
```

```
end process out_en;

-- Precharge/Discharge ml
prec_ml:process (prech,disch,bl,ibl)
begin
        if ((prech = '0') and (disch = '1')) then
                assert FALSE
                report "Precharge and Discharge are both active"
                severity error;
        end if;

        if (prech = '0') then
                if ((bl(fifo_down-1 downto 0) /= conv_std_logic_vector('0',fifo_down)) or
(ibl(fifo_down-1 downto 0) /= conv_std_logic_vector('0',fifo_down))) then
                        assert FALSE
                        report "Precharging ML when BL or IBL != 0"
                        severity error;
                end if;
                ml <= transport (others => '1') after 1 ns;
        end if;

        if (rising_edge(prech)) then
                ml <= transport (others => 'H') after 8 ns;
                ml <= transport (others => 'Z') after clk_period;
                mlpc <= transport '1' after 8 ns;
                mlpc <= transport '0' after clk_period;
        end if;

        if (disch = '1') then
                ml <= transport (others => '0') after 1 ns;
                mlpc <= transport '0' after 1 ns;
        end if;
end process prec_ml;

-- RSP circuitry
rsp_ckt:process (prsp,rspc,rspen)
begin

        -- Detect RSP precharge sequence
        if (rising_edge(prsp))  then
                rspc <= transport '1' after 1 ns;
                rspc <= transport '0' after 2*clk_period;
        end if;

        if (rspc = '1') then
                if (rspen = conv_std_logic_vector('0',342)) then
                        rsp <= '1' after 1 ns;
                else
                        rsp <= '0' after 1 ns;
                end if;
        else
                rsp <= 'Z' after 1 ns;
        end if;

        if((prsp = '0') and (rspen /= conv_std_logic_vector('0',342))) then
                assert FALSE
                report "Precharging rsp when rspen != 0"
                severity error;
```

```
		end if;
	end process rsp_ckt;

	-- Detect BL precharge sequence
	prec_bl:process (bl,ibl)
	begin
		for i in 71 downto 0 loop
			if ((last_value(bl(i)) = '1') and (last_value(ibl(i)) = '1') and (bl(i) = 'Z') and
(ibl(i) = 'Z') and (event(bl(i)) or event(ibl(i)))) then
				blpc(i) <= transport '1' after 1 ns;
				blpc(i) <= transport '0' after clk_period;
			end if;
		end loop;
	end process prec_bl;

end behavioral;
```

```
file: ASP100.VHD
-- Date of netlist generation:  Nov-18-93

----------------------------------------------------------------------

library IEEE;
use IEEE.STD_LOGIC_1164.ALL;

library COMPASS_LIB;
use COMPASS_LIB.COMPASS.ALL;

entity asp100 is


   port ( finit : in Std_Logic := 'U';
            fenb : in std_logic := 'U';
        LdFC : in Std_Logic := 'U';
        rstfifo : in Std_Logic := 'U';
        vin : in Std_Logic_Vector(23 downto 0) := (others => 'U');
        ldor : in Std_Logic := 'U';
        ex : in Std_Logic := 'U';
        exc : in Std_Logic := 'U';
        selr_s : in Std_Logic := 'U';
        setag : in Std_Logic := 'U';
        prsp : in Std_Logic := 'U';
        fir_in : in Std_Logic := 'U';
        lin : in Std_Logic := 'U';
        hin : in Std_Logic := 'U';
        rstaddr : in Std_Logic := 'U';
        cntinit : in Std_Logic := 'U';
        sct : in Std_Logic_Vector(1 downto 0) := (others => 'U');
        ldm : in Std_Logic := 'U';
        rstm : in Std_Logic := 'U';
        setm : in Std_Logic := 'U';
        cmp : in Std_Logic := 'U';
        fircnten : in Std_Logic := 'U';
        cva : in Std_Logic := 'U';
        cba : in Std_Logic := 'U';
        setc : in Std_Logic := 'U';
        rstc : in Std_Logic := 'U';
        ldc : in Std_Logic := 'U';
        rda : in Std_Logic := 'U';
        we : in Std_Logic := 'U';
        mux : in Std_Logic_Vector(2 downto 0) := (others => 'U');
        -- reset : in Std_Logic := 'U';
        chipsel : in Std_Logic := 'U';
        ckin : in Std_Logic := 'U';
        idckin : in Std_Logic := 'U';
        dclk : in Std_Logic := 'U';
        clk : in Std_Logic := 'U';

        fful : out Std_Logic := 'U';
        vout : out Std_Logic_Vector(23 downto 0) := (others =>
'U');
        ctag : out Std_Logic := 'U';
        rsp : out Std_Logic := 'U';
        -- areset : out Std_Logic := 'U';
```

```
        -- cs : out Std_Logic := 'U';

        dbus : inout Std_Logic_Vector(31 downto 0) := (others =>
'Z');
        north : inout Std_Logic := 'U';
        south : inout Std_Logic := 'U' );

end asp100;

-----------------------------------------------------------------------

architecture asp100 OF asp100 is


   component top2
      port ( setc : in Std_Logic;
           rstc : in Std_Logic;
           ldc : in Std_Logic;
           cba : in Std_Logic;
           cv : in Std_Logic;
           cmp : in Std_Logic;
           setM : in Std_Logic;
           rstM : in Std_Logic;
           LdM : in Std_Logic;
           vvin : in Std_Logic_Vector(23 downto 0) := (others =>
'U');
           dd : in Std_Logic_Vector(23 downto 0) := (others =>
'U');
           LdFifoConf : in Std_Logic;
           we : in Std_Logic;
           rda : in Std_Logic;
           setag : in Std_Logic;
           rstaddr : in Std_Logic;
           mux : in Std_Logic_Vector(2 downto 0) := (others =>
'U');
           sinit : in Std_Logic;
           rstfifo : in Std_Logic;
           ldor : in Std_Logic;
           prsp : in Std_Logic;
           selr_s : in Std_Logic;
           hin : in Std_Logic;
           lin : in Std_Logic;
           ex : in Std_Logic;
           sct : in Std_Logic_Vector(1 downto 0) := (others =>
'U');
           finit : in Std_Logic;
           exc : in Std_Logic;
           fz : in Std_Logic;
           fircnten : in Std_Logic;
           fir_in : in Std_Logic;
               fenb : in std_logic;

           bl : out Std_Logic_Vector(71 downto 0) := (others =>
'U');
           ibl : out Std_Logic_Vector(71 downto 0) := (others =>
'U');
           mask : out Std_Logic_Vector(71 downto 0) := (others =>
```

```
'U');
        f : out Std_Logic_Vector(2 downto 0) := (others =>
'U');
        wenb : out Std_Logic;
        cmpt : out Std_Logic;
        wenbf : out Std_Logic;
        sinitt : out Std_Logic;
        rstaddrt : out Std_Logic;
        setagt : out Std_Logic;
        finitf : out Std_Logic;
        rstfifof : out Std_Logic;
        muxt : out Std_Logic_Vector(2 downto 0) := (others =>
'U');
        s : out Std_Logic_Vector(1 downto 0) := (others =>
'U');
        ldort : out Std_Logic;
        ldorf : out Std_Logic;
        venbf : out Std_Logic;
        prspt : out Std_Logic;
        carryt : out Std_Logic;
        firt : out Std_Logic;
        selr_st : out Std_Logic;
        hint : out Std_Logic;
        lint : out Std_Logic;
        n_in : out Std_Logic;
        s_in : out Std_Logic;
        rb : out Std_Logic_Vector(4 downto 0) := (others =>
'U');
        exen : out Std_Logic;
        msaen : out Std_Logic;
        disch : out Std_Logic;
        fircntent : out Std_Logic;
        foen : out Std_Logic );
  end component;


  component core
     port ( wenf : in Std_Logic;
        rstfifoaddr : in Std_Logic;
        venf : in Std_Logic;
        ldorf : in Std_Logic;
        f1 : in Std_Logic;
        f0 : in Std_Logic;
        s0 : in Std_Logic;
        s1 : in Std_Logic;
        bl : in Std_Logic_Vector(71 downto 0) := (others =>
'U');
        mask : in Std_Logic_Vector(71 downto 0) := (others =>
'U');
        ibl : in Std_Logic_Vector(71 downto 0) := (others =>
'U');
        ldor : in Std_Logic;
        we : in Std_Logic;
        cmp : in Std_Logic;
        setag : in Std_Logic;
        prsp : in Std_Logic;
        resp_in : in Std_Logic;
        cntinit : in Std_Logic;
```

```
        mux1 : in Std_Logic;
        mux2 : in Std_Logic;
        rstaddr : in Std_Logic;
        finit : in Std_Logic;
        si : in Std_Logic_Vector(15 downto 0) := (others =>
'U');
        mux0 : in Std_Logic;
        f2 : in Std_Logic;
        ssi : in Std_Logic;
        nni : in Std_Logic;
        rd : in Std_Logic_Vector(4 downto 0) := (others =>
'U');
        ni : in Std_Logic_Vector(15 downto 0) := (others =>
'U');
        exen : in Std_Logic;
        msaen : in Std_Logic;
        disch : in Std_Logic;
        fircnten : in Std_Logic;
        fir_in : in Std_Logic;

        fful : out Std_Logic;
        so : out Std_Logic_Vector(15 downto 0) := (others =>
'U');
        no : out Std_Logic_Vector(15 downto 0) := (others =>
'U');
        vout : out Std_Logic_Vector(23 downto 0) := (others =>
'U');
        outt : out Std_Logic_Vector(23 downto 0) := (others =>
'U');
        rsp : out Std_Logic;
        ctag : out Std_Logic;
        nno : out Std_Logic;
        sso : out Std_Logic );
    end component;


    component clock_gen
      port ( idckin : in Std_Logic;
        ckin : in Std_Logic;

        dck : out Std_Logic;
        ck : out Std_Logic );
    end component;


    signal U466_fful : Std_Logic;
    signal U474_Z : Std_Logic;
    signal U430_foen : Std_Logic;
    signal U551_Z : Std_Logic;
    signal U430_s_in : Std_Logic;
    signal U539_C : Std_Logic;
```

```
signal U466_nno : Std_Logic;
signal U552_Z : Std_Logic;
signal U540_C : Std_Logic;
signal U430_n_in : Std_Logic;
signal orr : Std_Logic_Vector(23 downto 0);
signal U466_vout : Std_Logic_Vector(23 downto 0);
signal U466_rsp : Std_Logic;
signal U550_Z : Std_Logic;
signal U562_dck : Std_Logic;
signal U564_C : Std_Logic;
signal U562_ck : Std_Logic;
signal U563_C : Std_Logic;
signal U466_sso : Std_Logic;
signal U475_Z : Std_Logic;
signal U476_Z : Std_Logic;
signal U430_rstfifof : Std_Logic;
signal U430_venbf : Std_Logic;
signal U477_Z : Std_Logic;
signal U430_finitf : Std_Logic;
signal U479_Z : Std_Logic;
signal U462_Z : Std_Logic;
signal U463_Z : Std_Logic;
signal U430_f : Std_Logic_Vector(2 downto 0);
signal U464_Z : Std_Logic;
signal U543_Z : Std_Logic;
signal U430_wenbf : Std_Logic;
signal U430_ldorf : Std_Logic;
signal U430_ibl : Std_Logic_Vector(71 downto 0);
signal U430_mask : Std_Logic_Vector(71 downto 0);
signal U430_bl : Std_Logic_Vector(71 downto 0);
signal U508_C : Std_Logic;
signal U506_C : Std_Logic;
signal U506_fenb_C : Std_Logic;
signal U507_C : Std_Logic;
signal U509_C : Std_Logic;
signal U510_C : Std_Logic;
signal U511_C : Std_Logic;
signal U50523_C : Std_Logic;
signal U50522_C : Std_Logic;
signal U50521_C : Std_Logic;
signal U50520_C : Std_Logic;
signal U50519_C : Std_Logic;
signal U50518_C : Std_Logic;
signal U50517_C : Std_Logic;
signal U50516_C : Std_Logic;
signal U50515_C : Std_Logic;
signal U50514_C : Std_Logic;
signal U50513_C : Std_Logic;
signal U50512_C : Std_Logic;
signal U50511_C : Std_Logic;
signal U50510_C : Std_Logic;
signal U5059_C : Std_Logic;
signal U5058_C : Std_Logic;
signal U5057_C : Std_Logic;
signal U5056_C : Std_Logic;
signal U5055_C : Std_Logic;
signal U5054_C : Std_Logic;
signal U5053_C : Std_Logic;
```

```
signal U5052_C : Std_Logic;
signal U5051_C : Std_Logic;
signal U5050_C : Std_Logic;
signal U330_Z : Std_Logic;
signal U329_Z : Std_Logic;
signal U494_Z : Std_Logic;
signal U430_fircntent : Std_Logic;
signal U481_Z : Std_Logic;
signal U480_Z : Std_Logic;
signal U4734_Z : Std_Logic;
signal U4733_Z : Std_Logic;
signal U4732_Z : Std_Logic;
signal U4731_Z : Std_Logic;
signal U4730_Z : Std_Logic;
signal U430_exen : Std_Logic;
signal U430_rb : Std_Logic_Vector(4 downto 0);
signal U430_ldort : Std_Logic;
signal U430_s : Std_Logic_Vector(0 to 1);
signal U482_Z : Std_Logic;
signal U430_wenb : Std_Logic;
signal s : Std_Logic_Vector(15 downto 0);
signal S1 : Std_Logic;
signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal d : Std_Logic_Vector(15 downto 0);
signal U530_C : Std_Logic;
signal U531_C : Std_Logic;
signal U532_C : Std_Logic;
signal U529_C : Std_Logic;
signal U512_C : Std_Logic;
signal U533_C : Std_Logic;
signal S9 : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal S17 : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal n : Std_Logic_Vector(15 downto 0);
signal U466_ctag : Std_Logic;
signal S25 : Std_Logic;
signal S26 : Std_Logic;
signal S27 : Std_Logic;
signal S28 : Std_Logic;
```

```
signal S29 : Std_Logic;
signal S30 : Std_Logic;
signal S31 : Std_Logic;
signal S32 : Std_Logic;
signal I : Std_Logic_Vector(15 downto 8);
signal U430_selr_st : Std_Logic;
signal U549_Z : Std_Logic;
signal U430_lint : Std_Logic;
signal U496_Z : Std_Logic;
signal U495_Z : Std_Logic;
signal U488_Z : Std_Logic;
signal U487_Z : Std_Logic;
signal U486_Z : Std_Logic;
signal U485_Z : Std_Logic;
signal U484_Z : Std_Logic;
signal U483_Z : Std_Logic;
signal U430_disch : Std_Logic;
signal U430_msaen : Std_Logic;
signal U430_firt : Std_Logic;
signal U430_carryt : Std_Logic;
signal U430_muxt : Std_Logic_Vector(0 to 2);
signal U430_rstaddrt : Std_Logic;
signal U430_sinitt : Std_Logic;
signal U430_cmpt : Std_Logic;
signal U526_C : Std_Logic;
signal U527_C : Std_Logic;
signal U528_C : Std_Logic;
signal U525_C : Std_Logic;
signal U524_C : Std_Logic;
signal U523_C : Std_Logic;
signal U520_C : Std_Logic;
signal U5172_C : Std_Logic;
signal U5171_C : Std_Logic;
signal U5170_C : Std_Logic;
signal U521_C : Std_Logic;
signal U519_C : Std_Logic;
signal U518_C : Std_Logic;
signal U5221_C : Std_Logic;
signal U5220_C : Std_Logic;
signal S33 : Std_Logic;
signal S34 : Std_Logic;
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal U430_hint : Std_Logic;
signal U489_Z : Std_Logic;
signal U490_Z : Std_Logic;
```

```
    signal U430_prspt : Std_Logic;
    signal U430_setagt : Std_Logic;
    signal U392_Z : Std_Logic;
    signal U39115_Z : Std_Logic;
    signal U39114_Z : Std_Logic;
    signal U39113_Z : Std_Logic;
    signal U39112_Z : Std_Logic;
    signal U39111_Z : Std_Logic;
    signal U39110_Z : Std_Logic;
    signal U3919_Z : Std_Logic;
    signal U3918_Z : Std_Logic;
    signal U3917_Z : Std_Logic;
    signal U3916_Z : Std_Logic;
    signal U3915_Z : Std_Logic;
    signal U3914_Z : Std_Logic;
    signal U3913_Z : Std_Logic;
    signal U3912_Z : Std_Logic;
    signal U3911_Z : Std_Logic;
    signal U3910_Z : Std_Logic;
    signal U513_C : Std_Logic;
    signal U515_C : Std_Logic;
    signal U514_C : Std_Logic;
    signal U516_C : Std_Logic;
    signal U548_Z : Std_Logic;

begin

    U528: pc6d00
      port map ( PAD => cva, C => U528_C );

    U430: top2
      port map ( setc => U530_C, rstc => U531_C, ldc => U532_C, cba
            => U529_C, cv => U528_C, cmp => U527_C, bl(71) =>
            U430_bl(71), bl(70) => U430_bl(70), bl(69) =>
            U430_bl(69), bl(68) => U430_bl(68), bl(67) =>
            U430_bl(67), bl(66) => U430_bl(66), bl(65) =>
            U430_bl(65), bl(64) => U430_bl(64), bl(63) =>
            U430_bl(63), bl(62) => U430_bl(62), bl(61) =>
            U430_bl(61), bl(60) => U430_bl(60), bl(59) =>
            U430_bl(59), bl(58) => U430_bl(58), bl(57) =>
            U430_bl(57), bl(56) => U430_bl(56), bl(55) =>
            U430_bl(55), bl(54) => U430_bl(54), bl(53) =>
            U430_bl(53), bl(52) => U430_bl(52), bl(51) =>
            U430_bl(51), bl(50) => U430_bl(50), bl(49) =>
            U430_bl(49), bl(48) => U430_bl(48), bl(47) =>
            U430_bl(47), bl(46) => U430_bl(46), bl(45) =>
            U430_bl(45), bl(44) => U430_bl(44), bl(43) =>
            U430_bl(43), bl(42) => U430_bl(42), bl(41) =>
            U430_bl(41), bl(40) => U430_bl(40), bl(39) =>
            U430_bl(39), bl(38) => U430_bl(38), bl(37) =>
            U430_bl(37), bl(36) => U430_bl(36), bl(35) =>
            U430_bl(35), bl(34) => U430_bl(34), bl(33) =>
            U430_bl(33), bl(32) => U430_bl(32), bl(31) =>
            U430_bl(31), bl(30) => U430_bl(30), bl(29) =>
            U430_bl(29), bl(28) => U430_bl(28), bl(27) =>
            U430_bl(27), bl(26) => U430_bl(26), bl(25) =>
            U430_bl(25), bl(24) => U430_bl(24), bl(23) =>
```

U430_bl(23), bl(22) => U430_bl(22), bl(21) => U430_bl(21), bl(20) => U430_bl(20), bl(19) => U430_bl(19), bl(18) => U430_bl(18), bl(17) => U430_bl(17), bl(16) => U430_bl(16), bl(15) => U430_bl(15), bl(14) => U430_bl(14), bl(13) => U430_bl(13), bl(12) => U430_bl(12), bl(11) => U430_bl(11), bl(10) => U430_bl(10), bl(9) => U430_bl(9), bl(8) => U430_bl(8), bl(7) => U430_bl(7), bl(6) => U430_bl(6), bl(5) => U430_bl(5), bl(4) => U430_bl(4), bl(3) => U430_bl(3), bl(2) => U430_bl(2), bl(1) => U430_bl(1), bl(0) => U430_bl(0), ibl(71) => U430_ibl(71), ibl(70) => U430_ibl(70), ibl(69) => U430_ibl(69), ibl(68) => U430_ibl(68), ibl(67) => U430_ibl(67), ibl(66) => U430_ibl(66), ibl(65) => U430_ibl(65), ibl(64) => U430_ibl(64), ibl(63) => U430_ibl(63), ibl(62) => U430_ibl(62), ibl(61) => U430_ibl(61), ibl(60) => U430_ibl(60), ibl(59) => U430_ibl(59), ibl(58) => U430_ibl(58), ibl(57) => U430_ibl(57), ibl(56) => U430_ibl(56), ibl(55) => U430_ibl(55), ibl(54) => U430_ibl(54), ibl(53) => U430_ibl(53), ibl(52) => U430_ibl(52), ibl(51) => U430_ibl(51), ibl(50) => U430_ibl(50), ibl(49) => U430_ibl(49), ibl(48) => U430_ibl(48), ibl(47) => U430_ibl(47), ibl(46) => U430_ibl(46), ibl(45) => U430_ibl(45), ibl(44) => U430_ibl(44), ibl(43) => U430_ibl(43), ibl(42) => U430_ibl(42), ibl(41) => U430_ibl(41), ibl(40) => U430_ibl(40), ibl(39) => U430_ibl(39), ibl(38) => U430_ibl(38), ibl(37) => U430_ibl(37), ibl(36) => U430_ibl(36), ibl(35) => U430_ibl(35), ibl(34) => U430_ibl(34), ibl(33) => U430_ibl(33), ibl(32) => U430_ibl(32), ibl(31) => U430_ibl(31), ibl(30) => U430_ibl(30), ibl(29) => U430_ibl(29), ibl(28) => U430_ibl(28), ibl(27) => U430_ibl(27), ibl(26) => U430_ibl(26), ibl(25) => U430_ibl(25), ibl(24) => U430_ibl(24), ibl(23) => U430_ibl(23), ibl(22) => U430_ibl(22), ibl(21) => U430_ibl(21), ibl(20) => U430_ibl(20), ibl(19) => U430_ibl(19), ibl(18) => U430_ibl(18), ibl(17) => U430_ibl(17), ibl(16) => U430_ibl(16), ibl(15) => U430_ibl(15), ibl(14) => U430_ibl(14), ibl(13) => U430_ibl(13), ibl(12) => U430_ibl(12), ibl(11) => U430_ibl(11), ibl(10) => U430_ibl(10), ibl(9) => U430_ibl(9), ibl(8) => U430_ibl(8), ibl(7) => U430_ibl(7), ibl(6) => U430_ibl(6), ibl(5) => U430_ibl(5), ibl(4) => U430_ibl(4), ibl(3) => U430_ibl(3), ibl(2) => U430_ibl(2), ibl(1) => U430_ibl(1), ibl(0) => U430_ibl(0), setM => U526_C, rstM => U525_C, LdM => U524_C, mask(71) => U430_mask(71), mask(70) => U430_mask(70), mask(69) => U430_mask(69), mask(68) => U430_mask(68), mask(67) => U430_mask(67), mask(66) => U430_mask(66), mask(65) => U430_mask(65), mask(64) => U430_mask(64), mask(63) => U430_mask(63), mask(62) => U430_mask(62), mask(61) => U430_mask(61), mask(60) => U430_mask(60), mask(59) => U430_mask(59), mask(58) => U430_mask(58), mask(57) => U430_mask(57), mask(56) =>

U430_mask(56), mask(55) => U430_mask(55), mask(54) => U430_mask(54), mask(53) => U430_mask(53), mask(52) => U430_mask(52), mask(51) => U430_mask(51), mask(50) => U430_mask(50), mask(49) => U430_mask(49), mask(48) => U430_mask(48), mask(47) => U430_mask(47), mask(46) => U430_mask(46), mask(45) => U430_mask(45), mask(44) => U430_mask(44), mask(43) => U430_mask(43), mask(42) => U430_mask(42), mask(41) => U430_mask(41), mask(40) => U430_mask(40), mask(39) => U430_mask(39), mask(38) => U430_mask(38), mask(37) => U430_mask(37), mask(36) => U430_mask(36), mask(35) => U430_mask(35), mask(34) => U430_mask(34), mask(33) => U430_mask(33), mask(32) => U430_mask(32), mask(31) => U430_mask(31), mask(30) => U430_mask(30), mask(29) => U430_mask(29), mask(28) => U430_mask(28), mask(27) => U430_mask(27), mask(26) => U430_mask(26), mask(25) => U430_mask(25), mask(24) => U430_mask(24), mask(23) => U430_mask(23), mask(22) => U430_mask(22), mask(21) => U430_mask(21), mask(20) => U430_mask(20), mask(19) => U430_mask(19), mask(18) => U430_mask(18), mask(17) => U430_mask(17), mask(16) => U430_mask(16), mask(15) => U430_mask(15), mask(14) => U430_mask(14), mask(13) => U430_mask(13), mask(12) => U430_mask(12), mask(11) => U430_mask(11), mask(10) => U430_mask(10), mask(9) => U430_mask(9), mask(8) => U430_mask(8), mask(7) => U430_mask(7), mask(6) => U430_mask(6), mask(5) => U430_mask(5), mask(4) => U430_mask(4), mask(3) => U430_mask(3), mask(2) => U430_mask(2), mask(1) => U430_mask(1), mask(0) => U430_mask(0), vvin(23) => U50523_C, vvin(22) => U50522_C, vvin(21) => U50521_C, vvin(20) => U50520_C, vvin(19) => U50519_C, vvin(18) => U50518_C, vvin(17) => U50517_C, vvin(16) => U50516_C, vvin(15) => U50515_C, vvin(14) => U50514_C, vvin(13) => U50513_C, vvin(12) => U50512_C, vvin(11) => U50511_C, vvin(10) => U50510_C, vvin(9) => U5059_C, vvin(8) => U5058_C, vvin(7) => U5057_C, vvin(6) => U5056_C, vvin(5) => U5055_C, vvin(4) => U5054_C, vvin(3) => U5053_C, vvin(2) => U5052_C, vvin(1) => U5051_C, vvin(0) => U5050_C, dd(23) => s(7), dd(22) => s(6), dd(21) => s(5), dd(20) => s(4), dd(19) => s(3), dd(18) => s(2), dd(17) => s(1), dd(16) => s(0), dd(15) => d(15), dd(14) => d(14), dd(13) => d(13), dd(12) => d(12), dd(11) => d(11), dd(10) => d(10), dd(9) => d(9), dd(8) => d(8), dd(7) => d(7), dd(6) => d(6), dd(5) => d(5), dd(4) => d(4), dd(3) => d(3), dd(2) => d(2), dd(1) => d(1), dd(0) => d(0), LdFifoConf => U507_C, f(2) => U430_f(2), f(1) => U430_f(1), f(0) => U430_f(0), we => U512_C, rda => U533_C, wenb => U430_wenb, cmpt => U430_cmpt, wenbf => U430_wenbf, setag => U516_C, rstaddr => U520_C, mux(2) => U5172_C, mux(1) => U5171_C, mux(0) => U5170_C, sinit => U521_C, sinitt => U430_sinitt, rstaddrt =>

```
            U430_rstaddrt, setagt => U430_setagt, rstfifo =>
            U508_C, finitf => U430_finitf, rstfifof =>
            U430_rstfifof, muxt(2) => U430_muxt(2), muxt(1) =>
            U430_muxt(1), muxt(0) => U430_muxt(0), s(1) =>
            U430_s(1), s(0) => U430_s(0), ldor => U511_C,
            ldort => U430_ldort, ldorf => U430_ldorf, venbf =>
            U430_venbf, prsp => U514_C, prspt => U430_prspt,
            carryt => U430_carryt, firt => U430_firt, selr_s
            => U515_C, selr_st => U430_selr_st, hin => U519_C,
            hint => U430_hint, lin => U518_C, lint =>
            U430_lint, ex => U510_C, sct(1) => U5221_C, sct(0)
            => U5220_C,
                fenb => U506_fenb_C, finit => U506_C, exc => U509_C, n_in =>
            U430_n_in, s_in => U430_s_in, rb(4) => U430_rb(4),
            rb(3) => U430_rb(3), rb(2) => U430_rb(2), rb(1) =>
            U430_rb(1), rb(0) => U430_rb(0), fz => U474_Z,
            exen => U430_exen, msaen => U430_msaen, disch =>
            U430_disch, fircnten => U523_C, fircntent =>
            U430_fircntent, fir_in => U513_C, foen =>
            U430_foen );

U529: pc6d00
   port map ( PAD => cba, C => U529_C );

U482: ni01d3
   port map ( I => U430_wenb, Z => U482_Z );

U466: core
   port map ( fful => U466_fful, wenf => U543_Z, rstfifoaddr =>
            U476_Z, venf => U475_Z, ldorf => U479_Z, f1 =>
            U463_Z, f0 => U464_Z, s0 => U330_Z, s1 => U329_Z,
            bl(71) => U430_bl(71), bl(70) => U430_bl(70),
            bl(69) => U430_bl(69), bl(68) => U430_bl(68),
            bl(67) => U430_bl(67), bl(66) => U430_bl(66),
            bl(65) => U430_bl(65), bl(64) => U430_bl(64),
            bl(63) => U430_bl(63), bl(62) => U430_bl(62),
            bl(61) => U430_bl(61), bl(60) => U430_bl(60),
            bl(59) => U430_bl(59), bl(58) => U430_bl(58),
            bl(57) => U430_bl(57), bl(56) => U430_bl(56),
            bl(55) => U430_bl(55), bl(54) => U430_bl(54),
            bl(53) => U430_bl(53), bl(52) => U430_bl(52),
            bl(51) => U430_bl(51), bl(50) => U430_bl(50),
            bl(49) => U430_bl(49), bl(48) => U430_bl(48),
            bl(47) => U430_bl(47), bl(46) => U430_bl(46),
            bl(45) => U430_bl(45), bl(44) => U430_bl(44),
            bl(43) => U430_bl(43), bl(42) => U430_bl(42),
            bl(41) => U430_bl(41), bl(40) => U430_bl(40),
            bl(39) => U430_bl(39), bl(38) => U430_bl(38),
            bl(37) => U430_bl(37), bl(36) => U430_bl(36),
            bl(35) => U430_bl(35), bl(34) => U430_bl(34),
            bl(33) => U430_bl(33), bl(32) => U430_bl(32),
            bl(31) => U430_bl(31), bl(30) => U430_bl(30),
            bl(29) => U430_bl(29), bl(28) => U430_bl(28),
            bl(27) => U430_bl(27), bl(26) => U430_bl(26),
            bl(25) => U430_bl(25), bl(24) => U430_bl(24),
            bl(23) => U430_bl(23), bl(22) => U430_bl(22),
            bl(21) => U430_bl(21), bl(20) => U430_bl(20),
            bl(19) => U430_bl(19), bl(18) => U430_bl(18),
```

bl(17) => U430_bl(17), bl(16) => U430_bl(16), bl(15) => U430_bl(15), bl(14) => U430_bl(14), bl(13) => U430_bl(13), bl(12) => U430_bl(12), bl(11) => U430_bl(11), bl(10) => U430_bl(10), bl(9) => U430_bl(9), bl(8) => U430_bl(8), bl(7) => U430_bl(7), bl(6) => U430_bl(6), bl(5) => U430_bl(5), bl(4) => U430_bl(4), bl(3) => U430_bl(3), bl(2) => U430_bl(2), bl(1) => U430_bl(1), bl(0) => U430_bl(0), mask(71) => U430_mask(71), mask(70) => U430_mask(70), mask(69) => U430_mask(69), mask(68) => U430_mask(68), mask(67) => U430_mask(67), mask(66) => U430_mask(66), mask(65) => U430_mask(65), mask(64) => U430_mask(64), mask(63) => U430_mask(63), mask(62) => U430_mask(62), mask(61) => U430_mask(61), mask(60) => U430_mask(60), mask(59) => U430_mask(59), mask(58) => U430_mask(58), mask(57) => U430_mask(57), mask(56) => U430_mask(56), mask(55) => U430_mask(55), mask(54) => U430_mask(54), mask(53) => U430_mask(53), mask(52) => U430_mask(52), mask(51) => U430_mask(51), mask(50) => U430_mask(50), mask(49) => U430_mask(49), mask(48) => U430_mask(48), mask(47) => U430_mask(47), mask(46) => U430_mask(46), mask(45) => U430_mask(45), mask(44) => U430_mask(44), mask(43) => U430_mask(43), mask(42) => U430_mask(42), mask(41) => U430_mask(41), mask(40) => U430_mask(40), mask(39) => U430_mask(39), mask(38) => U430_mask(38), mask(37) => U430_mask(37), mask(36) => U430_mask(36), mask(35) => U430_mask(35), mask(34) => U430_mask(34), mask(33) => U430_mask(33), mask(32) => U430_mask(32), mask(31) => U430_mask(31), mask(30) => U430_mask(30), mask(29) => U430_mask(29), mask(28) => U430_mask(28), mask(27) => U430_mask(27), mask(26) => U430_mask(26), mask(25) => U430_mask(25), mask(24) => U430_mask(24), mask(23) => U430_mask(23), mask(22) => U430_mask(22), mask(21) => U430_mask(21), mask(20) => U430_mask(20), mask(19) => U430_mask(19), mask(18) => U430_mask(18), mask(17) => U430_mask(17), mask(16) => U430_mask(16), mask(15) => U430_mask(15), mask(14) => U430_mask(14), mask(13) => U430_mask(13), mask(12) => U430_mask(12), mask(11) => U430_mask(11), mask(10) => U430_mask(10), mask(9) => U430_mask(9), mask(8) => U430_mask(8), mask(7) => U430_mask(7), mask(6) => U430_mask(6), mask(5) => U430_mask(5), mask(4) => U430_mask(4), mask(3) => U430_mask(3), mask(2) => U430_mask(2), mask(1) => U430_mask(1), mask(0) => U430_mask(0), ibl(71) => U430_ibl(71), ibl(70) => U430_ibl(70), ibl(69) => U430_ibl(69), ibl(68) => U430_ibl(68), ibl(67) => U430_ibl(67), ibl(66) => U430_ibl(66), ibl(65) => U430_ibl(65), ibl(64) => U430_ibl(64), ibl(63) => U430_ibl(63), ibl(62) => U430_ibl(62), ibl(61) => U430_ibl(61), ibl(60) => U430_ibl(60), ibl(59) => U430_ibl(59), ibl(58) => U430_ibl(58), ibl(57)

=> U430_ibl(57), ibl(56) => U430_ibl(56), ibl(55) => U430_ibl(55), ibl(54) => U430_ibl(54), ibl(53) => U430_ibl(53), ibl(52) => U430_ibl(52), ibl(51) => U430_ibl(51), ibl(50) => U430_ibl(50), ibl(49) => U430_ibl(49), ibl(48) => U430_ibl(48), ibl(47) => U430_ibl(47), ibl(46) => U430_ibl(46), ibl(45) => U430_ibl(45), ibl(44) => U430_ibl(44), ibl(43) => U430_ibl(43), ibl(42) => U430_ibl(42), ibl(41) => U430_ibl(41), ibl(40) => U430_ibl(40), ibl(39) => U430_ibl(39), ibl(38) => U430_ibl(38), ibl(37) => U430_ibl(37), ibl(36) => U430_ibl(36), ibl(35) => U430_ibl(35), ibl(34) => U430_ibl(34), ibl(33) => U430_ibl(33), ibl(32) => U430_ibl(32), ibl(31) => U430_ibl(31), ibl(30) => U430_ibl(30), ibl(29) => U430_ibl(29), ibl(28) => U430_ibl(28), ibl(27) => U430_ibl(27), ibl(26) => U430_ibl(26), ibl(25) => U430_ibl(25), ibl(24) => U430_ibl(24), ibl(23) => U430_ibl(23), ibl(22) => U430_ibl(22), ibl(21) => U430_ibl(21), ibl(20) => U430_ibl(20), ibl(19) => U430_ibl(19), ibl(18) => U430_ibl(18), ibl(17) => U430_ibl(17), ibl(16) => U430_ibl(16), ibl(15) => U430_ibl(15), ibl(14) => U430_ibl(14), ibl(13) => U430_ibl(13), ibl(12) => U430_ibl(12), ibl(11) => U430_ibl(11), ibl(10) => U430_ibl(10), ibl(9) => U430_ibl(9), ibl(8) => U430_ibl(8), ibl(7) => U430_ibl(7), ibl(6) => U430_ibl(6), ibl(5) => U430_ibl(5), ibl(4) => U430_ibl(4), ibl(3) => U430_ibl(3), ibl(2) => U430_ibl(2), ibl(1) => U430_ibl(1), ibl(0) => U430_ibl(0), ldor => U480_Z, we => U482_Z, cmp => U488_Z, setag => U489_Z, prsp => U490_Z, resp_in => U430_carryt, cntinit => U483_Z, mux1 => U486_Z, mux2 => U485_Z, rstaddr => U484_Z, finit => U477_Z, so(15) => S33, so(14) => S34, so(13) => S35, so(12) => S36, so(11) => S37, so(10) => S38, so(9) => S39, so(8) => S40, so(7) => S41, so(6) => S42, so(5) => S43, so(4) => S44, so(3) => S45, so(2) => S46, so(1) => S47, so(0) => S48, no(15) => n(15), no(14) => n(14), no(13) => n(13), no(12) => n(12), no(11) => n(11), no(10) => n(10), no(9) => n(9), no(8) => n(8), no(7) => n(7), no(6) => n(6), no(5) => n(5), no(4) => n(4), no(3) => n(3), no(2) => n(2), no(1) => n(1), no(0) => n(0), si(15) => s(15), si(14) => s(14), si(13) => s(13), si(12) => s(12), si(11) => s(11), si(10) => s(10), si(9) => s(9), si(8) => s(8), si(7) => s(7), si(6) => s(6), si(5) => s(5), si(4) => s(4), si(3) => s(3), si(2) => s(2), si(1) => s(1), si(0) => s(0), vout(23) => U466_vout(23), vout(22) => U466_vout(22), vout(21) => U466_vout(21), vout(20) => U466_vout(20), vout(19) => U466_vout(19), vout(18) => U466_vout(18), vout(17) => U466_vout(17), vout(16) => U466_vout(16), vout(15) => U466_vout(15), vout(14) => U466_vout(14), vout(13) => U466_vout(13), vout(12) => U466_vout(12), vout(11) => U466_vout(11), vout(10) => U466_vout(10), vout(9) => U466_vout(9), vout(8) => U466_vout(8), vout(7) => U466_vout(7), vout(6) => U466_vout(6), vout(5) => U466_vout(5), vout(4)

```
            => U466_vout(4), vout(3) => U466_vout(3), vout(2)
            => U466_vout(2), vout(1) => U466_vout(1), vout(0)
            => U466_vout(0), outt(23) => orr(23), outt(22) =>
            orr(22), outt(21) => orr(21), outt(20) => orr(20),
            outt(19) => orr(19), outt(18) => orr(18), outt(17)
            => orr(17), outt(16) => orr(16), outt(15) =>
            orr(15), outt(14) => orr(14), outt(13) => orr(13),
            outt(12) => orr(12), outt(11) => orr(11), outt(10)
            => orr(10), outt(9) => orr(9), outt(8) => orr(8),
            outt(7) => orr(7), outt(6) => orr(6), outt(5) =>
            orr(5), outt(4) => orr(4), outt(3) => orr(3),
            outt(2) => orr(2), outt(1) => orr(1), outt(0) =>
            orr(0), mux0 => U487_Z, rsp => U466_rsp, ctag =>
            U466_ctag, f2 => U462_Z, ssi => U539_C, nno =>
            U466_nno, sso => U466_sso, nni => U540_C, rd(4) =>
            U4734_Z, rd(3) => U4733_Z, rd(2) => U4732_Z, rd(1)
            => U4731_Z, rd(0) => U4730_Z, ni(15) => d(15),
            ni(14) => d(14), ni(13) => d(13), ni(12) => d(12),
            ni(11) => d(11), ni(10) => d(10), ni(9) => d(9),
            ni(8) => d(8), ni(7) => d(7), ni(6) => d(6), ni(5)
            => d(5), ni(4) => d(4), ni(3) => d(3), ni(2) =>
            d(2), ni(1) => d(1), ni(0) => d(0), exen => U481_Z,
            msaen => U495_Z, disch => U496_Z, fircnten =>
            U494_Z, fir_in => U430_firt );

U475: ni01d3
  port map ( I => U430_venbf, Z => U475_Z );

U476: ni01d3
  port map ( I => U430_rstfifof, Z => U476_Z );

U477: ni01d3
  port map ( I => U430_finitf, Z => U477_Z );

U330: ni01d5
  port map ( I => U430_s(0), Z => U330_Z );

U479: ni01d3
  port map ( I => U430_ldorf, Z => U479_Z );

U462: ni01d5
  port map ( I => U430_f(2), Z => U462_Z );

U463: ni01d5
  port map ( I => U430_f(1), Z => U463_Z );

U464: ni01d5
  port map ( I => U430_f(0), Z => U464_Z );

U329: ni01d5
  port map ( I => U430_s(1), Z => U329_Z );

U494: ni01d3
  port map ( I => U430_fircntent, Z => U494_Z );

U481: ni01d3
  port map ( I => U430_exen, Z => U481_Z );
```

```
U480: ni01d3
   port map ( I => U430_ldort, Z => U480_Z );

U4734: ni01d2
   port map ( I => U430_rb(4), Z => U4734_Z );

U4733: ni01d2
   port map ( I => U430_rb(3), Z => U4733_Z );

U4732: ni01d2
   port map ( I => U430_rb(2), Z => U4732_Z );

U4731: ni01d2
   port map ( I => U430_rb(1), Z => U4731_Z );

U4730: ni01d2
   port map ( I => U430_rb(0), Z => U4730_Z );

U489: ni01d3
   port map ( I => U430_setagt, Z => U489_Z );

U496: ni01d3
   port map ( I => U430_disch, Z => U496_Z );

U495: ni01d3
   port map ( I => U430_msaen, Z => U495_Z );

U488: ni01d3
   port map ( I => U430_cmpt, Z => U488_Z );

U487: ni01d3
   port map ( I => U430_muxt(0), Z => U487_Z );

U486: ni01d3
   port map ( I => U430_muxt(1), Z => U486_Z );

U485: ni01d3
   port map ( I => U430_muxt(2), Z => U485_Z );

U484: ni01d3
   port map ( I => U430_rstaddrt, Z => U484_Z );

U483: ni01d3
   port map ( I => U430_sinitt, Z => U483_Z );

U490: ni01d3
   port map ( I => U430_prspt, Z => U490_Z );

U543: ni01d5
   port map ( I => U430_wenbf, Z => U543_Z );

U551: or02d1
   port map ( A1 => chipsel, A2 => U430_s_in, Z => U551_Z );

U540: pt6o12
   port map ( PAD => north, I => U466_sso, OEN => U551_Z, C =>
         U540_C );
```

```
U545: pt6o02
  port map ( PAD => rsp, I => U466_rsp, OEN => chipsel );

U546: pt6o02
  port map ( PAD => fful, I => U466_fful, OEN => chipsel );

U53823: pt6o02
  port map ( PAD => vout(23), I => U466_vout(23), OEN => U550_Z
        );

U53822: pt6o02
  port map ( PAD => vout(22), I => U466_vout(22), OEN => U550_Z
        );

U53821: pt6o02
  port map ( PAD => vout(21), I => U466_vout(21), OEN => U550_Z
        );

U53820: pt6o02
  port map ( PAD => vout(20), I => U466_vout(20), OEN => U550_Z
        );

U53819: pt6o02
  port map ( PAD => vout(19), I => U466_vout(19), OEN => U550_Z
        );

U53818: pt6o02
  port map ( PAD => vout(18), I => U466_vout(18), OEN => U550_Z
        );

U53817: pt6o02
  port map ( PAD => vout(17), I => U466_vout(17), OEN => U550_Z
        );

U53816: pt6o02
  port map ( PAD => vout(16), I => U466_vout(16), OEN => U550_Z
        );

U53815: pt6o02
  port map ( PAD => vout(15), I => U466_vout(15), OEN => U550_Z
        );

U53814: pt6o02
  port map ( PAD => vout(14), I => U466_vout(14), OEN => U550_Z
        );

U53813: pt6o02
  port map ( PAD => vout(13), I => U466_vout(13), OEN => U550_Z
        );

U53812: pt6o02
  port map ( PAD => vout(12), I => U466_vout(12), OEN => U550_Z
        );

U53811: pt6o02
  port map ( PAD => vout(11), I => U466_vout(11), OEN => U550_Z
        );
```

```
U53810: pt6o02
   port map ( PAD => vout(10), I => U466_vout(10), OEN => U550_Z
         );

U5389: pt6o02
   port map ( PAD => vout(9), I => U466_vout(9), OEN => U550_Z );

U5388: pt6o02
   port map ( PAD => vout(8), I => U466_vout(8), OEN => U550_Z );

U5387: pt6o02
   port map ( PAD => vout(7), I => U466_vout(7), OEN => U550_Z );

U5386: pt6o02
   port map ( PAD => vout(6), I => U466_vout(6), OEN => U550_Z );

U5385: pt6o02
   port map ( PAD => vout(5), I => U466_vout(5), OEN => U550_Z );

U5384: pt6o02
   port map ( PAD => vout(4), I => U466_vout(4), OEN => U550_Z );

U5383: pt6o02
   port map ( PAD => vout(3), I => U466_vout(3), OEN => U550_Z );

U5382: pt6o02
   port map ( PAD => vout(2), I => U466_vout(2), OEN => U550_Z );

U5381: pt6o02
   port map ( PAD => vout(1), I => U466_vout(1), OEN => U550_Z );

U5380: pt6o02
   port map ( PAD => vout(0), I => U466_vout(0), OEN => U550_Z );

U474: ni01d5
   port map ( I => U466_fful, Z => U474_Z );

U539: pt6o12
   port map ( PAD => south, I => U466_nno, OEN => U552_Z, C =>
         U539_C );

U552: or02d1
   port map ( A1 => chipsel, A2 => U430_n_in, Z => U552_Z );

U550: or02d1
   port map ( A1 => U430_foen, A2 => chipsel, Z => U550_Z );

U50523: pc6d00
   port map ( PAD => vin(23), C => U50523_C );

U50522: pc6d00
   port map ( PAD => vin(22), C => U50522_C );

U50521: pc6d00
   port map ( PAD => vin(21), C => U50521_C );

U50520: pc6d00
   port map ( PAD => vin(20), C => U50520_C );
```

```
U50519: pc6d00
  port map ( PAD => vin(19), C => U50519_C );

U50518: pc6d00
  port map ( PAD => vin(18), C => U50518_C );

U50517: pc6d00
  port map ( PAD => vin(17), C => U50517_C );

U50516: pc6d00
  port map ( PAD => vin(16), C => U50516_C );

U50515: pc6d00
  port map ( PAD => vin(15), C => U50515_C );

U50514: pc6d00
  port map ( PAD => vin(14), C => U50514_C );

U50513: pc6d00
  port map ( PAD => vin(13), C => U50513_C );

U50512: pc6d00
  port map ( PAD => vin(12), C => U50512_C );

U50511: pc6d00
  port map ( PAD => vin(11), C => U50511_C );

U50510: pc6d00
  port map ( PAD => vin(10), C => U50510_C );

U5059: pc6d00
  port map ( PAD => vin(9), C => U5059_C );

U5058: pc6d00
  port map ( PAD => vin(8), C => U5058_C );

U5057: pc6d00
  port map ( PAD => vin(7), C => U5057_C );

U5056: pc6d00
  port map ( PAD => vin(6), C => U5056_C );

U5055: pc6d00
  port map ( PAD => vin(5), C => U5055_C );

U5054: pc6d00
  port map ( PAD => vin(4), C => U5054_C );

U5053: pc6d00
  port map ( PAD => vin(3), C => U5053_C );

U5052: pc6d00
  port map ( PAD => vin(2), C => U5052_C );

U5051: pc6d00
  port map ( PAD => vin(1), C => U5051_C );
```

```
  U5050: pc6d00
     port map ( PAD => vin(0), C => U5050_C );

  U564: pc6d00
     port map ( PAD => idckin, C => U564_C );

  U563: pc6d00
     port map ( PAD => ckin, C => U563_C );

--  U560: pc6d00
--     port map ( PAD => chipsel, C => cs );

--  U561: pc6d00
--     port map ( PAD => reset, C => areset );

  U508: pc6d00
     port map ( PAD => rstfifo, C => U508_C );

  U506: pc6d00
     port map ( PAD => finit, C => U506_C );

  U506_fenb: pc6d00
     port map ( PAD => fenb, C => U506_fenb_C );

  U507: pc6d00
     port map ( PAD => LdFC, C => U507_C );

  U509: pc6d00
     port map ( PAD => exc, C => U509_C );

  U510: pc6d00
     port map ( PAD => ex, C => U510_C );

  U511: pc6d00
     port map ( PAD => ldor, C => U511_C );

--  U568: lscc00
--     port map ( C => U562_dck, INN => dclk );

--  U567: pc6c32
--     port map ( CP => clk, CLK => U562_ck );

--  U562: clock_gen
--     port map ( idckin => U564_C, dck => U562_dck, ck => U562_ck,
--              ckin => U563_C );

  U533: pc6d00
     port map ( PAD => rda, C => U533_C );

  U532: pc6d00
     port map ( PAD => ldc, C => U532_C );

  U531: pc6d00
     port map ( PAD => rstc, C => U531_C );

  U530: pc6d00
     port map ( PAD => setc, C => U530_C );
```

```
U512: pc6d00
  port map ( PAD => we, C => U512_C );

U54215: pt6o14
  port map ( PAD => dbus(31), I => l(15), OEN => U549_Z, C =>
        s(15) );

U54214: pt6o14
  port map ( PAD => dbus(30), I => l(14), OEN => U549_Z, C =>
        s(14) );

U54213: pt6o14
  port map ( PAD => dbus(29), I => l(13), OEN => U549_Z, C =>
        s(13) );

U54212: pt6o14
  port map ( PAD => dbus(28), I => l(12), OEN => U549_Z, C =>
        s(12) );

U54211: pt6o14
  port map ( PAD => dbus(27), I => l(11), OEN => U549_Z, C =>
        s(11) );

U54210: pt6o14
  port map ( PAD => dbus(26), I => l(10), OEN => U549_Z, C =>
        s(10) );

U5429: pt6o14
  port map ( PAD => dbus(25), I => l(9), OEN => U549_Z, C =>
        s(9) );

U5428: pt6o14
  port map ( PAD => dbus(24), I => l(8), OEN => U549_Z, C =>
        s(8) );

U5427: pt6o14
  port map ( PAD => dbus(23), I => n(7), OEN => U549_Z, C =>
        s(7) );

U5426: pt6o14
  port map ( PAD => dbus(22), I => n(6), OEN => U549_Z, C =>
        s(6) );

U5425: pt6o14
  port map ( PAD => dbus(21), I => n(5), OEN => U549_Z, C =>
        s(5) );

U5424: pt6o14
  port map ( PAD => dbus(20), I => n(4), OEN => U549_Z, C =>
        s(4) );

U5423: pt6o14
  port map ( PAD => dbus(19), I => n(3), OEN => U549_Z, C =>
        s(3) );

U5422: pt6o14
  port map ( PAD => dbus(18), I => n(2), OEN => U549_Z, C =>
        s(2) );
```

```
U5421: pt6o14
   port map ( PAD => dbus(17), I => n(1), OEN => U549_Z, C =>
         s(1) );

U5420: pt6o14
   port map ( PAD => dbus(16), I => n(0), OEN => U549_Z, C =>
         s(0) );

U549: or02d1
   port map ( A1 => chipsel, A2 => U430_lint, Z => U549_Z );

U3807: mx21d1
   port map ( I0 => orr(23), I1 => n(15), S => U430_selr_st, Z
         => l(15) );

U3806: mx21d1
   port map ( I0 => orr(22), I1 => n(14), S => U430_selr_st, Z
         => l(14) );

U3805: mx21d1
   port map ( I0 => orr(21), I1 => n(13), S => U430_selr_st, Z
         => l(13) );

U3804: mx21d1
   port map ( I0 => orr(20), I1 => n(12), S => U430_selr_st, Z
         => l(12) );

U3803: mx21d1
   port map ( I0 => orr(19), I1 => n(11), S => U430_selr_st, Z
         => l(11) );

U3802: mx21d1
   port map ( I0 => orr(18), I1 => n(10), S => U430_selr_st, Z
         => l(10) );

U3801: mx21d1
   port map ( I0 => orr(17), I1 => n(9), S => U430_selr_st, Z =>
         l(9) );

U3800: mx21d1
   port map ( I0 => orr(16), I1 => n(8), S => U430_selr_st, Z =>
         l(8) );

U544: pt6o02
   port map ( PAD => ctag, I => U466_ctag, OEN => chipsel );

U516: pc6d00
   port map ( PAD => setag, C => U516_C );

U5172: pc6d00
   port map ( PAD => mux(2), C => U5172_C );

U5171: pc6d00
   port map ( PAD => mux(1), C => U5171_C );

U5170: pc6d00
   port map ( PAD => mux(0), C => U5170_C );
```

```
U39115: mx21d1
   port map ( I0 => orr(15), I1 => S33, S => U392_Z, Z =>
         U39115_Z );

U39114: mx21d1
   port map ( I0 => orr(14), I1 => S34, S => U392_Z, Z =>
         U39114_Z );

U39113: mx21d1
   port map ( I0 => orr(13), I1 => S35, S => U392_Z, Z =>
         U39113_Z );

U39112: mx21d1
   port map ( I0 => orr(12), I1 => S36, S => U392_Z, Z =>
         U39112_Z );

U39111: mx21d1
   port map ( I0 => orr(11), I1 => S37, S => U392_Z, Z =>
         U39111_Z );

U39110: mx21d1
   port map ( I0 => orr(10), I1 => S38, S => U392_Z, Z =>
         U39110_Z );

U3919: mx21d1
   port map ( I0 => orr(9), I1 => S39, S => U392_Z, Z => U3919_Z
         );

U3918: mx21d1
   port map ( I0 => orr(8), I1 => S40, S => U392_Z, Z => U3918_Z
         );

U3917: mx21d1
   port map ( I0 => orr(7), I1 => S41, S => U392_Z, Z => U3917_Z
         );

U3916: mx21d1
   port map ( I0 => orr(6), I1 => S42, S => U392_Z, Z => U3916_Z
         );

U3915: mx21d1
   port map ( I0 => orr(5), I1 => S43, S => U392_Z, Z => U3915_Z
         );

U3914: mx21d1
   port map ( I0 => orr(4), I1 => S44, S => U392_Z, Z => U3914_Z
         );

U3913: mx21d1
   port map ( I0 => orr(3), I1 => S45, S => U392_Z, Z => U3913_Z
         );

U3912: mx21d1
   port map ( I0 => orr(2), I1 => S46, S => U392_Z, Z => U3912_Z
         );

U3911: mx21d1
```

```
   port map ( I0 => orr(1), I1 => S47, S => U392_Z, Z => U3911_Z
         );

U3910: mx21d1
   port map ( I0 => orr(0), I1 => S48, S => U392_Z, Z => U3910_Z
         );

U5221: pc6d00
   port map ( PAD => sct(1), C => U5221_C );

U5220: pc6d00
   port map ( PAD => sct(0), C => U5220_C );

U523: pc6d00
   port map ( PAD => fircnten, C => U523_C );

U524: pc6d00
   port map ( PAD => ldm, C => U524_C );

U525: pc6d00
   port map ( PAD => rstm, C => U525_C );

U526: pc6d00
   port map ( PAD => setm, C => U526_C );

U527: pc6d00
   port map ( PAD => cmp, C => U527_C );

U521: pc6d00
   port map ( PAD => cntinit, C => U521_C );

U520: pc6d00
   port map ( PAD => rstaddr, C => U520_C );

U519: pc6d00
   port map ( PAD => hin, C => U519_C );

U518: pc6d00
   port map ( PAD => lin, C => U518_C );

U515: pc6d00
   port map ( PAD => selr_s, C => U515_C );

U514: pc6d00
   port map ( PAD => prsp, C => U514_C );

U513: pc6d00
   port map ( PAD => fir_in, C => U513_C );

U392: ni01d5
   port map ( I => U430_selr_st, Z => U392_Z );

U54115: pt6o14
   port map ( PAD => dbus(15), I => U39115_Z, OEN => U548_Z, C
         => d(15) );

U54114: pt6o14
   port map ( PAD => dbus(14), I => U39114_Z, OEN => U548_Z, C
```

```
        => d(14) );

U54113: pt6o14
   port map ( PAD => dbus(13), I => U39113_Z, OEN => U548_Z, C
        => d(13) );

U54112: pt6o14
   port map ( PAD => dbus(12), I => U39112_Z, OEN => U548_Z, C
        => d(12) );

U54111: pt6o14
   port map ( PAD => dbus(11), I => U39111_Z, OEN => U548_Z, C
        => d(11) );

U54110: pt6o14
   port map ( PAD => dbus(10), I => U39110_Z, OEN => U548_Z, C
        => d(10) );

U5419: pt6o14
   port map ( PAD => dbus(9), I => U3919_Z, OEN => U548_Z, C =>
        d(9) );

U5418: pt6o14
   port map ( PAD => dbus(8), I => U3918_Z, OEN => U548_Z, C =>
        d(8) );

U5417: pt6o14
   port map ( PAD => dbus(7), I => U3917_Z, OEN => U548_Z, C =>
        d(7) );

U5416: pt6o14
   port map ( PAD => dbus(6), I => U3916_Z, OEN => U548_Z, C =>
        d(6) );

U5415: pt6o14
   port map ( PAD => dbus(5), I => U3915_Z, OEN => U548_Z, C =>
        d(5) );

U5414: pt6o14
   port map ( PAD => dbus(4), I => U3914_Z, OEN => U548_Z, C =>
        d(4) );

U5413: pt6o14
   port map ( PAD => dbus(3), I => U3913_Z, OEN => U548_Z, C =>
        d(3) );

U5412: pt6o14
   port map ( PAD => dbus(2), I => U3912_Z, OEN => U548_Z, C =>
        d(2) );

U5411: pt6o14
   port map ( PAD => dbus(1), I => U3911_Z, OEN => U548_Z, C =>
        d(1) );

U5410: pt6o14
   port map ( PAD => dbus(0), I => U3910_Z, OEN => U548_Z, C =>
        d(0) );
```

```
U548: or02d1
   port map ( A1 => chipsel, A2 => U430_hint, Z => U548_Z );

  dbus(31) <= 'Z';
  dbus(30) <= 'Z';
  dbus(29) <= 'Z';
  dbus(28) <= 'Z';
  dbus(27) <= 'Z';
  dbus(26) <= 'Z';
  dbus(25) <= 'Z';
  dbus(24) <= 'Z';
  dbus(23) <= 'Z';
  dbus(22) <= 'Z';
  dbus(21) <= 'Z';
  dbus(20) <= 'Z';
  dbus(19) <= 'Z';
  dbus(18) <= 'Z';
  dbus(17) <= 'Z';
  dbus(16) <= 'Z';
  dbus(15) <= 'Z';
  dbus(14) <= 'Z';
  dbus(13) <= 'Z';
  dbus(12) <= 'Z';
  dbus(11) <= 'Z';
  dbus(10) <= 'Z';
  dbus(9) <= 'Z';
  dbus(8) <= 'Z';
  dbus(7) <= 'Z';
  dbus(6) <= 'Z';
  dbus(5) <= 'Z';
  dbus(4) <= 'Z';
  dbus(3) <= 'Z';
  dbus(2) <= 'Z';
  dbus(1) <= 'Z';
  dbus(0) <= 'Z';
  north <= 'Z';
  south <= 'Z';

end asp100;
```

```
file: BBUF.VHD
-- Date of netlist generation: Nov-19-93

----------------------------------------------------------------------

library IEEE;
use IEEE.STD_LOGIC_1164.ALL;

library COMPASS_LIB;
use COMPASS_LIB.COMPASS.ALL;

entity bbuf is


   port ( r : in Std_Logic_Vector(4 downto 0) := (others => 'U');
        i : in Std_Logic_Vector(71 downto 0) := (others => 'U');

        o : out Std_Logic_Vector(71 downto 0) := (others => 'U') );

end bbuf;


----------------------------------------------------------------------

architecture bbuf OF bbuf is

   component double_tri
      port ( rd : in Std_Logic;
           i : in Std_Logic;

           o : out Std_Logic );
   end component;


begin


   U257: double_tri
      port map ( rd => r(2), i => i(55), o => o(55) );

   U256: double_tri
      port map ( rd => r(2), i => i(54), o => o(54) );

   U255: double_tri
      port map ( rd => r(2), i => i(53), o => o(53) );

   U254: double_tri
      port map ( rd => r(2), i => i(52), o => o(52) );

   U253: double_tri
      port map ( rd => r(2), i => i(51), o => o(51) );

   U252: double_tri
      port map ( rd => r(2), i => i(50), o => o(50) );

   U251: double_tri
      port map ( rd => r(2), i => i(49), o => o(49) );
```

```
U250: double_tri
  port map ( rd => r(2), i => i(48), o => o(48) );

U2623: double_tri
  port map ( rd => r(1), i => i(47), o => o(47) );

U2622: double_tri
  port map ( rd => r(1), i => i(46), o => o(46) );

U2621: double_tri
  port map ( rd => r(1), i => i(45), o => o(45) );

U2620: double_tri
  port map ( rd => r(1), i => i(44), o => o(44) );

U2619: double_tri
  port map ( rd => r(1), i => i(43), o => o(43) );

U2618: double_tri
  port map ( rd => r(1), i => i(42), o => o(42) );

U2617: double_tri
  port map ( rd => r(1), i => i(41), o => o(41) );

U2616: double_tri
  port map ( rd => r(1), i => i(40), o => o(40) );

U2615: double_tri
  port map ( rd => r(1), i => i(39), o => o(39) );

U2614: double_tri
  port map ( rd => r(1), i => i(38), o => o(38) );

U2613: double_tri
  port map ( rd => r(1), i => i(37), o => o(37) );

U2612: double_tri
  port map ( rd => r(1), i => i(36), o => o(36) );

U2611: double_tri
  port map ( rd => r(1), i => i(35), o => o(35) );

U2610: double_tri
  port map ( rd => r(1), i => i(34), o => o(34) );

U269: double_tri
  port map ( rd => r(1), i => i(33), o => o(33) );

U268: double_tri
  port map ( rd => r(1), i => i(32), o => o(32) );

U267: double_tri
  port map ( rd => r(1), i => i(31), o => o(31) );

U266: double_tri
  port map ( rd => r(1), i => i(30), o => o(30) );
```

```
U265: double_tri
   port map ( rd => r(1), i => i(29), o => o(29) );

U264: double_tri
   port map ( rd => r(1), i => i(28), o => o(28) );

U263: double_tri
   port map ( rd => r(1), i => i(27), o => o(27) );

U262: double_tri
   port map ( rd => r(1), i => i(26), o => o(26) );

U261: double_tri
   port map ( rd => r(1), i => i(25), o => o(25) );

U260: double_tri
   port map ( rd => r(1), i => i(24), o => o(24) );

U2723: double_tri
   port map ( rd => r(0), i => i(23), o => o(23) );

U2722: double_tri
   port map ( rd => r(0), i => i(22), o => o(22) );

U2721: double_tri
   port map ( rd => r(0), i => i(21), o => o(21) );

U2720: double_tri
   port map ( rd => r(0), i => i(20), o => o(20) );

U2719: double_tri
   port map ( rd => r(0), i => i(19), o => o(19) );

U2718: double_tri
   port map ( rd => r(0), i => i(18), o => o(18) );

U2717: double_tri
   port map ( rd => r(0), i => i(17), o => o(17) );

U2716: double_tri
   port map ( rd => r(0), i => i(16), o => o(16) );

U2715: double_tri
   port map ( rd => r(0), i => i(15), o => o(15) );

U2714: double_tri
   port map ( rd => r(0), i => i(14), o => o(14) );

U2713: double_tri
   port map ( rd => r(0), i => i(13), o => o(13) );

U2712: double_tri
   port map ( rd => r(0), i => i(12), o => o(12) );

U2711: double_tri
   port map ( rd => r(0), i => i(11), o => o(11) );

U2710: double_tri
```

```
   port map ( rd => r(0), i => i(10), o => o(10) );

U279: double_tri
   port map ( rd => r(0), i => i(9), o => o(9) );

U278: double_tri
   port map ( rd => r(0), i => i(8), o => o(8) );

U277: double_tri
   port map ( rd => r(0), i => i(7), o => o(7) );

U276: double_tri
   port map ( rd => r(0), i => i(6), o => o(6) );

U275: double_tri
   port map ( rd => r(0), i => i(5), o => o(5) );

U274: double_tri
   port map ( rd => r(0), i => i(4), o => o(4) );

U273: double_tri
   port map ( rd => r(0), i => i(3), o => o(3) );

U272: double_tri
   port map ( rd => r(0), i => i(2), o => o(2) );

U271: double_tri
   port map ( rd => r(0), i => i(1), o => o(1) );

U270: double_tri
   port map ( rd => r(0), i => i(0), o => o(0) );

U247: double_tri
   port map ( rd => r(3), i => i(63), o => o(63) );

U246: double_tri
   port map ( rd => r(3), i => i(62), o => o(62) );

U245: double_tri
   port map ( rd => r(3), i => i(61), o => o(61) );

U244: double_tri
   port map ( rd => r(3), i => i(60), o => o(60) );

U243: double_tri
   port map ( rd => r(3), i => i(59), o => o(59) );

U242: double_tri
   port map ( rd => r(3), i => i(58), o => o(58) );

U241: double_tri
   port map ( rd => r(3), i => i(57), o => o(57) );

U240: double_tri
   port map ( rd => r(3), i => i(56), o => o(56) );

U237: double_tri
   port map ( rd => r(4), i => i(71), o => o(71) );
```

```
  U236: double_tri
    port map ( rd => r(4), i => i(70), o => o(70) );

  U235: double_tri
    port map ( rd => r(4), i => i(69), o => o(69) );

  U234: double_tri
    port map ( rd => r(4), i => i(68), o => o(68) );

  U233: double_tri
    port map ( rd => r(4), i => i(67), o => o(67) );

  U232: double_tri
    port map ( rd => r(4), i => i(66), o => o(66) );

  U231: double_tri
    port map ( rd => r(4), i => i(65), o => o(65) );

  U230: double_tri
    port map ( rd => r(4), i => i(64), o => o(64) );

end bbuf;
```

```
file: BUFER.VHD
-- Date of netlist generation:  Nov-19-93

-----------------------------------------------------------------------

library IEEE;
use IEEE.STD_LOGIC_1164.ALL;

library COMPASS_LIB;
use COMPASS_LIB.COMPASS.ALL;

entity bufer is


   port ( a : in Std_Logic := 'U';

        b : out Std_Logic := 'U' );

end bufer;

-----------------------------------------------------------------------

architecture bufer OF bufer is


begin


   U8: ni01d5
      port map ( I => a, Z => b );

end bufer;
```

```
file: CLOCK_GE.VHD
-- Date of netlist generation:  Nov-18-93

------------------------------------------------------------------------

library IEEE;
use IEEE.STD_LOGIC_1164.ALL;

library COMPASS_LIB;
use COMPASS_LIB.COMPASS.ALL;

entity clock_gen is


   port ( idckin : in Std_Logic := 'U';
        ckin : in Std_Logic := 'U';

        dck : out Std_Logic := 'U';
        ck : out Std_Logic := 'U' );

end clock_gen;

------------------------------------------------------------------------

architecture clock_gen OF clock_gen is



   signal ck_local: Std_Logic;
   signal U2_QN : Std_Logic;
   signal U7_Z : Std_Logic;
   signal U1_QN : Std_Logic;
   signal U8_ZN : Std_Logic;

begin

   U1: dfntnb
      port map ( D => U7_Z, CP => ckin, Q => ck_local, QN => U1_QN
            );

   U7: an02d1
      port map ( A1 => U2_QN, A2 => idckin, Z => U7_Z );

   U8: in01d1
      port map ( I => ckin, ZN => U8_ZN );

   U2: dfntnb
      port map ( D => ck_local, CP => U8_ZN, Q => dck, QN => U2_QN
            );

   ck <= ck_local;

end clock_gen;
```

```
file: COL341_C.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity col341_c is


   port ( si : in Std_Logic_Vector(15 downto 0) := (others => 'U');
        ni : in Std_Logic_Vector(15 downto 0) := (others => 'U');
        prsp : in Std_Logic := 'U';
        setag : in Std_Logic := 'U';
        resp_in : in Std_Logic := 'U';
        fir_in : in Std_Logic := 'U';
        mux0 : in Std_Logic := 'U';
        mux1 : in Std_Logic := 'U';
        mux2 : in Std_Logic := 'U';
        rstaddr : in Std_Logic := 'U';
        cntinit : in Std_Logic := 'U';
        we : in Std_Logic := 'U';
        ibl : in Std_Logic_Vector(71 downto 0) := (others => 'U');
        bl : in Std_Logic_Vector(71 downto 0) := (others => 'U');
        venb : in Std_Logic := 'U';
        rstfifoaddr : in Std_Logic := 'U';
        wenf : in Std_Logic := 'U';
        finit : in Std_Logic := 'U';
        cmp : in Std_Logic := 'U';
        rd : in Std_Logic_Vector(4 downto 0) := (others => 'U');
        exen : in Std_Logic := 'U';
        nni : in Std_Logic := 'U';
        ssi : in Std_Logic := 'U';
        mask : in Std_Logic_Vector(71 downto 0) := (others => 'U');
        f0 : in Std_Logic := 'U';
        f1 : in Std_Logic := 'U';
        f2 : in Std_Logic := 'U';
        asaen : in Std_Logic := 'U';
        fsaen : in Std_Logic := 'U';
        disch : in Std_Logic := 'U';
        msaen : in Std_Logic := 'U';
        fircnten : in Std_Logic := 'U';

        fful : out Std_Logic := 'U';
        so : out Std_Logic_Vector(15 downto 0) := (others => 'U');
        no : out Std_Logic_Vector(15 downto 0) := (others => 'U');
        count_out : out Std_Logic := 'U';
        sso : out Std_Logic := 'U';
        nno : out Std_Logic := 'U';
        rdsao : out Std_Logic_Vector(71 downto 0) := (others =>
'U');
        rsp : out Std_Logic := 'U' );
```

```
end col341_c;

------------------------------------------------------------------------

architecture col341_c OF col341_c is

   component tag341
      port ( prsp : in Std_Logic;
         setag : in Std_Logic;
         cntinit : in Std_Logic;
         rstaddr : in Std_Logic;
         mux2 : in Std_Logic;
         mux1 : in Std_Logic;
         mux0 : in Std_Logic;
         fir_in : in Std_Logic;
         resp_in : in Std_Logic;
         we : in Std_Logic;
         fn : in Std_Logic_Vector(340 downto 0) := (others =>
'U');
         nn : in Std_Logic_Vector(340 downto 0) := (others =>
'U');
         ns : in Std_Logic_Vector(340 downto 0) := (others =>
'U');
         fs : in Std_Logic_Vector(340 downto 0) := (others =>
'U');
         ml : in Std_Logic_Vector(340 downto 0) := (others =>
'U');
         fircnten : in Std_Logic;

         count : out Std_Logic;
         tag : out Std_Logic_Vector(340 downto 0) := (others =>
'U');
         rspen : out Std_Logic_Vector(340 downto 0) := (others
=> 'U');
         wl : out Std_Logic_Vector(340 downto 0) := (others =>
'U') );
   end component;


   component array341_m
      port ( wl : in Std_Logic_Vector(340 downto 0) := (others =>
'U');
         rspen : in Std_Logic_Vector(340 downto 0) := (others
=> 'U');
         fwl : in Std_Logic_Vector(340 downto 0) := (others =>
'U');
         fsaen : in Std_Logic;
         asaen : in Std_Logic;
         prsp : in Std_Logic;
         prech : in Std_Logic;
         bl : in Std_Logic_Vector(71 downto 0) := (others =>
'U');
         disch : in Std_Logic;
         f0 : in Std_Logic;
         f1 : in Std_Logic;
         f2 : in Std_Logic;
         ibl : in Std_Logic_Vector(71 downto 0) := (others =>
```

```
'U');
        if0 : in Std_Logic;
        if1 : in Std_Logic;
        if2 : in Std_Logic;
        mask : in Std_Logic_Vector(71 downto 0) := (others =>
'U');
        msaen : in Std_Logic;

        ml : out Std_Logic_Vector(340 downto 0) := (others =>
'U');
        rsao : out Std_Logic_Vector(71 downto 0) := (others =>
'U');
        rsp : out Std_Logic );
  end component;



  component fitag341
     port ( finit : in Std_Logic;
        venb : in Std_Logic;
        rstfifoaddr : in Std_Logic;
        wenf : in Std_Logic;
        exen : in Std_Logic;

        fful : out Std_Logic;
        fwl : out Std_Logic_Vector(340 downto 0) := (others =>
'U') );
  end component;

  component bbuf
     port ( r : in Std_Logic_Vector(4 downto 0) := (others => 'U');
        i : in Std_Logic_Vector(71 downto 0) := (others =>
'U');

        o : out Std_Logic_Vector(71 downto 0) := (others =>
'U') );
  end component;

  component double_buf
     port ( i : in Std_Logic;

        o : out Std_Logic );
  end component;


  signal so15_local, so14_local, so13_local, so12_local, so11_local,
      so10_local, so9_local, so8_local, so7_local, so6_local,
      so5_local, so4_local, so3_local, so2_local, so1_local,
      sso_local, nno_local, no14_local, no13_local, no12_local,
      no11_local, no10_local, no9_local, no8_local, no7_local,
      no6_local, no5_local, no4_local, no3_local, no2_local,
      no1_local, no0_local: Std_Logic;
  signal U482_Z : Std_Logic;
  signal U480_Z : Std_Logic;
  signal U481_Z : Std_Logic;
  signal U484_ZN : Std_Logic;
  signal if0 : Std_Logic;
  signal if2 : Std_Logic;
```

```
signal U469_fwl : Std_Logic_Vector(340 downto 0);
signal U451_o : Std_Logic_Vector(71 downto 0);
signal U462_Z : Std_Logic;
signal U463_Z : Std_Logic;
signal U492_o : Std_Logic;
signal U465_Z : Std_Logic;
signal U487_Z : Std_Logic;
signal U490_Z : Std_Logic;
signal U468_wl : Std_Logic_Vector(340 downto 0);
signal U468_rspen : Std_Logic_Vector(340 downto 0);
signal U496_ml : Std_Logic_Vector(340 downto 0);
signal U489_Z : Std_Logic;
signal U488_Z : Std_Logic;
signal U460_Z : Std_Logic;
signal U461_Z : Std_Logic;
signal U452_o : Std_Logic_Vector(71 downto 0);
signal m : Std_Logic_Vector(71 downto 0);
signal U4944_Z : Std_Logic;
signal U4943_Z : Std_Logic;
signal U4942_Z : Std_Logic;
signal U4941_Z : Std_Logic;
signal U4940_Z : Std_Logic;
signal U453_Z : Std_Logic;
signal S1 : Std_Logic;
signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal S9 : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal fn : Std_Logic_Vector(340 downto 32);
signal S17 : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal S25 : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
signal S33 : Std_Logic;
signal S34 : Std_Logic;
```

```
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal S49 : Std_Logic;
signal S50 : Std_Logic;
signal S51 : Std_Logic;
signal S52 : Std_Logic;
signal S53 : Std_Logic;
signal S54 : Std_Logic;
signal S55 : Std_Logic;
signal S56 : Std_Logic;
signal S57 : Std_Logic;
signal S58 : Std_Logic;
signal S59 : Std_Logic;
signal S60 : Std_Logic;
signal S61 : Std_Logic;
signal S62 : Std_Logic;
signal S63 : Std_Logic;
signal S64 : Std_Logic;
signal S65 : Std_Logic;
signal S66 : Std_Logic;
signal S67 : Std_Logic;
signal S68 : Std_Logic;
signal S69 : Std_Logic;
signal S70 : Std_Logic;
signal S71 : Std_Logic;
signal S72 : Std_Logic;
signal S73 : Std_Logic;
signal S74 : Std_Logic;
signal S75 : Std_Logic;
signal S76 : Std_Logic;
signal S77 : Std_Logic;
signal S78 : Std_Logic;
signal S79 : Std_Logic;
signal S80 : Std_Logic;
signal S81 : Std_Logic;
signal S82 : Std_Logic;
signal S83 : Std_Logic;
signal S84 : Std_Logic;
signal S85 : Std_Logic;
signal S86 : Std_Logic;
signal S87 : Std_Logic;
signal S88 : Std_Logic;
signal S89 : Std_Logic;
signal S90 : Std_Logic;
signal S91 : Std_Logic;
signal S92 : Std_Logic;
```

```
signal S93 : Std_Logic;
signal S94 : Std_Logic;
signal S95 : Std_Logic;
signal S96 : Std_Logic;
signal S97 : Std_Logic;
signal S98 : Std_Logic;
signal S99 : Std_Logic;
signal S100 : Std_Logic;
signal S101 : Std_Logic;
signal S102 : Std_Logic;
signal S103 : Std_Logic;
signal S104 : Std_Logic;
signal S105 : Std_Logic;
signal S106 : Std_Logic;
signal S107 : Std_Logic;
signal S108 : Std_Logic;
signal S109 : Std_Logic;
signal S110 : Std_Logic;
signal S111 : Std_Logic;
signal S112 : Std_Logic;
signal S113 : Std_Logic;
signal S114 : Std_Logic;
signal S115 : Std_Logic;
signal S116 : Std_Logic;
signal S117 : Std_Logic;
signal S118 : Std_Logic;
signal S119 : Std_Logic;
signal S120 : Std_Logic;
signal S121 : Std_Logic;
signal S122 : Std_Logic;
signal S123 : Std_Logic;
signal S124 : Std_Logic;
signal S125 : Std_Logic;
signal S126 : Std_Logic;
signal S127 : Std_Logic;
signal S128 : Std_Logic;
signal S129 : Std_Logic;
signal S130 : Std_Logic;
signal S131 : Std_Logic;
signal S132 : Std_Logic;
signal S133 : Std_Logic;
signal S134 : Std_Logic;
signal S135 : Std_Logic;
signal S136 : Std_Logic;
signal S137 : Std_Logic;
signal S138 : Std_Logic;
signal S139 : Std_Logic;
signal S140 : Std_Logic;
signal S141 : Std_Logic;
signal S142 : Std_Logic;
signal S143 : Std_Logic;
signal S144 : Std_Logic;
signal S145 : Std_Logic;
signal S146 : Std_Logic;
signal S147 : Std_Logic;
signal S148 : Std_Logic;
signal S149 : Std_Logic;
signal S150 : Std_Logic;
```

```
signal S151 : Std_Logic;
signal S152 : Std_Logic;
signal S153 : Std_Logic;
signal S154 : Std_Logic;
signal S155 : Std_Logic;
signal S156 : Std_Logic;
signal S157 : Std_Logic;
signal S158 : Std_Logic;
signal S159 : Std_Logic;
signal S160 : Std_Logic;
signal S161 : Std_Logic;
signal S162 : Std_Logic;
signal S163 : Std_Logic;
signal S164 : Std_Logic;
signal S165 : Std_Logic;
signal S166 : Std_Logic;
signal S167 : Std_Logic;
signal S168 : Std_Logic;
signal S169 : Std_Logic;
signal S170 : Std_Logic;
signal S171 : Std_Logic;
signal S172 : Std_Logic;
signal S173 : Std_Logic;
signal S174 : Std_Logic;
signal S175 : Std_Logic;
signal S176 : Std_Logic;
signal S177 : Std_Logic;
signal S178 : Std_Logic;
signal S179 : Std_Logic;
signal S180 : Std_Logic;
signal S181 : Std_Logic;
signal S182 : Std_Logic;
signal S183 : Std_Logic;
signal S184 : Std_Logic;
signal S185 : Std_Logic;
signal S186 : Std_Logic;
signal S187 : Std_Logic;
signal S188 : Std_Logic;
signal S189 : Std_Logic;
signal S190 : Std_Logic;
signal S191 : Std_Logic;
signal S192 : Std_Logic;
signal S193 : Std_Logic;
signal S194 : Std_Logic;
signal S195 : Std_Logic;
signal S196 : Std_Logic;
signal S197 : Std_Logic;
signal S198 : Std_Logic;
signal S199 : Std_Logic;
signal S200 : Std_Logic;
signal S201 : Std_Logic;
signal S202 : Std_Logic;
signal S203 : Std_Logic;
signal S204 : Std_Logic;
signal S205 : Std_Logic;
signal S206 : Std_Logic;
signal S207 : Std_Logic;
signal S208 : Std_Logic;
```

```
signal S209 : Std_Logic;
signal S210 : Std_Logic;
signal S211 : Std_Logic;
signal S212 : Std_Logic;
signal S213 : Std_Logic;
signal S214 : Std_Logic;
signal S215 : Std_Logic;
signal S216 : Std_Logic;
signal S217 : Std_Logic;
signal S218 : Std_Logic;
signal S219 : Std_Logic;
signal S220 : Std_Logic;
signal S221 : Std_Logic;
signal S222 : Std_Logic;
signal S223 : Std_Logic;
signal S224 : Std_Logic;
signal S225 : Std_Logic;
signal S226 : Std_Logic;
signal S227 : Std_Logic;
signal S228 : Std_Logic;
signal S229 : Std_Logic;
signal S230 : Std_Logic;
signal S231 : Std_Logic;
signal S232 : Std_Logic;
signal S233 : Std_Logic;
signal S234 : Std_Logic;
signal S235 : Std_Logic;
signal S236 : Std_Logic;
signal S237 : Std_Logic;
signal S238 : Std_Logic;
signal S239 : Std_Logic;
signal S240 : Std_Logic;
signal S241 : Std_Logic;
signal S242 : Std_Logic;
signal S243 : Std_Logic;
signal S244 : Std_Logic;
signal S245 : Std_Logic;
signal S246 : Std_Logic;
signal S247 : Std_Logic;
signal S248 : Std_Logic;
signal S249 : Std_Logic;
signal S250 : Std_Logic;
signal S251 : Std_Logic;
signal S252 : Std_Logic;
signal S253 : Std_Logic;
signal S254 : Std_Logic;
signal S255 : Std_Logic;
signal S256 : Std_Logic;
signal S257 : Std_Logic;
signal S258 : Std_Logic;
signal S259 : Std_Logic;
signal S260 : Std_Logic;
signal S261 : Std_Logic;
signal S262 : Std_Logic;
signal S263 : Std_Logic;
signal S264 : Std_Logic;
signal S265 : Std_Logic;
signal S266 : Std_Logic;
```

```
signal S267 : Std_Logic;
signal S268 : Std_Logic;
signal S269 : Std_Logic;
signal S270 : Std_Logic;
signal S271 : Std_Logic;
signal S272 : Std_Logic;
signal S273 : Std_Logic;
signal S274 : Std_Logic;
signal S275 : Std_Logic;
signal S276 : Std_Logic;
signal S277 : Std_Logic;
signal S278 : Std_Logic;
signal S279 : Std_Logic;
signal S280 : Std_Logic;
signal S281 : Std_Logic;
signal S282 : Std_Logic;
signal S283 : Std_Logic;
signal S284 : Std_Logic;
signal S285 : Std_Logic;
signal S286 : Std_Logic;
signal S287 : Std_Logic;
signal S288 : Std_Logic;
signal S289 : Std_Logic;
signal S290 : Std_Logic;
signal S291 : Std_Logic;
signal S292 : Std_Logic;
signal S293 : Std_Logic;
signal S294 : Std_Logic;
signal S295 : Std_Logic;
signal S296 : Std_Logic;
signal S297 : Std_Logic;
signal S298 : Std_Logic;
signal S299 : Std_Logic;
signal S300 : Std_Logic;
signal S301 : Std_Logic;
signal S302 : Std_Logic;
signal S303 : Std_Logic;
signal S304 : Std_Logic;
signal S305 : Std_Logic;
signal S306 : Std_Logic;
signal S307 : Std_Logic;
signal S308 : Std_Logic;
signal S309 : Std_Logic;
signal S310 : Std_Logic;
signal S311 : Std_Logic;
signal S312 : Std_Logic;
signal S313 : Std_Logic;
signal S314 : Std_Logic;
signal S315 : Std_Logic;
signal S316 : Std_Logic;
signal S317 : Std_Logic;
signal S318 : Std_Logic;
signal S319 : Std_Logic;
signal S320 : Std_Logic;
signal S321 : Std_Logic;
signal S322 : Std_Logic;
signal S323 : Std_Logic;
signal S324 : Std_Logic;
```

```
signal S325 : Std_Logic;
signal S326 : Std_Logic;
signal S327 : Std_Logic;
signal S328 : Std_Logic;
signal S329 : Std_Logic;
signal S330 : Std_Logic;
signal S331 : Std_Logic;
signal S332 : Std_Logic;
signal S333 : Std_Logic;
signal S334 : Std_Logic;
signal S335 : Std_Logic;
signal S336 : Std_Logic;
signal S337 : Std_Logic;
signal S338 : Std_Logic;
signal S339 : Std_Logic;
signal S340 : Std_Logic;
signal S341 : Std_Logic;
signal S342 : Std_Logic;
signal S343 : Std_Logic;
signal S344 : Std_Logic;
signal S345 : Std_Logic;
signal S346 : Std_Logic;
signal S347 : Std_Logic;
signal S348 : Std_Logic;
signal S349 : Std_Logic;
signal S350 : Std_Logic;
signal S351 : Std_Logic;
signal S352 : Std_Logic;
signal S353 : Std_Logic;
signal S354 : Std_Logic;
signal S355 : Std_Logic;
signal S356 : Std_Logic;
signal S357 : Std_Logic;
signal S358 : Std_Logic;
signal S359 : Std_Logic;
signal S360 : Std_Logic;
signal S361 : Std_Logic;
signal S362 : Std_Logic;
signal S363 : Std_Logic;
signal S364 : Std_Logic;
signal S365 : Std_Logic;
signal S366 : Std_Logic;
signal S367 : Std_Logic;
signal S368 : Std_Logic;
signal S369 : Std_Logic;
signal S370 : Std_Logic;
signal S371 : Std_Logic;
signal S372 : Std_Logic;
signal S373 : Std_Logic;
signal S374 : Std_Logic;
signal S375 : Std_Logic;
signal S376 : Std_Logic;
signal S377 : Std_Logic;
signal S378 : Std_Logic;
signal S379 : Std_Logic;
signal S380 : Std_Logic;
signal S381 : Std_Logic;
signal S382 : Std_Logic;
```

```
signal S383 : Std_Logic;
signal S384 : Std_Logic;
signal S385 : Std_Logic;
signal S386 : Std_Logic;
signal S387 : Std_Logic;
signal S388 : Std_Logic;
signal S389 : Std_Logic;
signal S390 : Std_Logic;
signal S391 : Std_Logic;
signal S392 : Std_Logic;
signal S393 : Std_Logic;
signal S394 : Std_Logic;
signal S395 : Std_Logic;
signal S396 : Std_Logic;
signal S397 : Std_Logic;
signal S398 : Std_Logic;
signal S399 : Std_Logic;
signal S400 : Std_Logic;
signal S401 : Std_Logic;
signal S402 : Std_Logic;
signal S403 : Std_Logic;
signal S404 : Std_Logic;
signal S405 : Std_Logic;
signal S406 : Std_Logic;
signal S407 : Std_Logic;
signal S408 : Std_Logic;
signal S409 : Std_Logic;
signal S410 : Std_Logic;
signal S411 : Std_Logic;
signal S412 : Std_Logic;
signal S413 : Std_Logic;
signal S414 : Std_Logic;
signal S415 : Std_Logic;
signal S416 : Std_Logic;
signal S417 : Std_Logic;
signal S418 : Std_Logic;
signal S419 : Std_Logic;
signal S420 : Std_Logic;
signal S421 : Std_Logic;
signal S422 : Std_Logic;
signal S423 : Std_Logic;
signal S424 : Std_Logic;
signal S425 : Std_Logic;
signal S426 : Std_Logic;
signal S427 : Std_Logic;
signal S428 : Std_Logic;
signal S429 : Std_Logic;
signal S430 : Std_Logic;
signal S431 : Std_Logic;
signal S432 : Std_Logic;
signal S433 : Std_Logic;
signal S434 : Std_Logic;
signal S435 : Std_Logic;
signal S436 : Std_Logic;
signal S437 : Std_Logic;
signal S438 : Std_Logic;
signal S439 : Std_Logic;
signal S440 : Std_Logic;
```

```
signal S441 : Std_Logic;
signal S442 : Std_Logic;
signal S443 : Std_Logic;
signal S444 : Std_Logic;
signal S445 : Std_Logic;
signal S446 : Std_Logic;
signal S447 : Std_Logic;
signal S448 : Std_Logic;
signal S449 : Std_Logic;
signal S450 : Std_Logic;
signal S451 : Std_Logic;
signal S452 : Std_Logic;
signal S453 : Std_Logic;
signal S454 : Std_Logic;
signal S455 : Std_Logic;
signal S456 : Std_Logic;
signal S457 : Std_Logic;
signal S458 : Std_Logic;
signal S459 : Std_Logic;
signal S460 : Std_Logic;
signal S461 : Std_Logic;
signal S462 : Std_Logic;
signal S463 : Std_Logic;
signal S464 : Std_Logic;
signal S465 : Std_Logic;
signal S466 : Std_Logic;
signal S467 : Std_Logic;
signal S468 : Std_Logic;
signal S469 : Std_Logic;
signal S470 : Std_Logic;
signal S471 : Std_Logic;
signal S472 : Std_Logic;
signal S473 : Std_Logic;
signal S474 : Std_Logic;
signal S475 : Std_Logic;
signal S476 : Std_Logic;
signal S477 : Std_Logic;
signal S478 : Std_Logic;
signal S479 : Std_Logic;
signal S480 : Std_Logic;
signal S481 : Std_Logic;
signal S482 : Std_Logic;
signal S483 : Std_Logic;
signal S484 : Std_Logic;
signal S485 : Std_Logic;
signal S486 : Std_Logic;
signal S487 : Std_Logic;
signal S488 : Std_Logic;
signal S489 : Std_Logic;
signal S490 : Std_Logic;
signal S491 : Std_Logic;
signal S492 : Std_Logic;
signal S493 : Std_Logic;
signal S494 : Std_Logic;
signal S495 : Std_Logic;
signal S496 : Std_Logic;
signal S497 : Std_Logic;
signal S498 : Std_Logic;
```

```
signal S499 : Std_Logic;
signal S500 : Std_Logic;
signal S501 : Std_Logic;
signal S502 : Std_Logic;
signal S503 : Std_Logic;
signal S504 : Std_Logic;
signal S505 : Std_Logic;
signal S506 : Std_Logic;
signal S507 : Std_Logic;
signal S508 : Std_Logic;
signal S509 : Std_Logic;
signal S510 : Std_Logic;
signal S511 : Std_Logic;
signal S512 : Std_Logic;
signal S513 : Std_Logic;
signal S514 : Std_Logic;
signal S515 : Std_Logic;
signal S516 : Std_Logic;
signal S517 : Std_Logic;
signal S518 : Std_Logic;
signal S519 : Std_Logic;
signal S520 : Std_Logic;
signal S521 : Std_Logic;
signal S522 : Std_Logic;
signal S523 : Std_Logic;
signal S524 : Std_Logic;
signal S525 : Std_Logic;
signal S526 : Std_Logic;
signal S527 : Std_Logic;
signal S528 : Std_Logic;
signal S529 : Std_Logic;
signal S530 : Std_Logic;
signal S531 : Std_Logic;
signal S532 : Std_Logic;
signal S533 : Std_Logic;
signal S534 : Std_Logic;
signal S535 : Std_Logic;
signal S536 : Std_Logic;
signal S537 : Std_Logic;
signal S538 : Std_Logic;
signal S539 : Std_Logic;
signal S540 : Std_Logic;
signal S541 : Std_Logic;
signal S542 : Std_Logic;
signal S543 : Std_Logic;
signal S544 : Std_Logic;
signal S545 : Std_Logic;
signal S546 : Std_Logic;
signal S547 : Std_Logic;
signal S548 : Std_Logic;
signal S549 : Std_Logic;
signal S550 : Std_Logic;
signal S551 : Std_Logic;
signal S552 : Std_Logic;
signal S553 : Std_Logic;
signal S554 : Std_Logic;
signal S555 : Std_Logic;
signal S556 : Std_Logic;
```

```
signal S557 : Std_Logic;
signal S558 : Std_Logic;
signal S559 : Std_Logic;
signal S560 : Std_Logic;
signal S561 : Std_Logic;
signal S562 : Std_Logic;
signal S563 : Std_Logic;
signal S564 : Std_Logic;
signal S565 : Std_Logic;
signal S566 : Std_Logic;
signal S567 : Std_Logic;
signal S568 : Std_Logic;
signal S569 : Std_Logic;
signal S570 : Std_Logic;
signal S571 : Std_Logic;
signal S572 : Std_Logic;
signal S573 : Std_Logic;
signal S574 : Std_Logic;
signal S575 : Std_Logic;
signal S576 : Std_Logic;
signal S577 : Std_Logic;
signal S578 : Std_Logic;
signal S579 : Std_Logic;
signal S580 : Std_Logic;
signal S581 : Std_Logic;
signal S582 : Std_Logic;
signal S583 : Std_Logic;
signal S584 : Std_Logic;
signal S585 : Std_Logic;
signal S586 : Std_Logic;
signal S587 : Std_Logic;
signal S588 : Std_Logic;
signal S589 : Std_Logic;
signal S590 : Std_Logic;
signal S591 : Std_Logic;
signal S592 : Std_Logic;
signal S593 : Std_Logic;
signal S594 : Std_Logic;
signal S595 : Std_Logic;
signal S596 : Std_Logic;
signal S597 : Std_Logic;
signal S598 : Std_Logic;
signal S599 : Std_Logic;
signal S600 : Std_Logic;
signal S601 : Std_Logic;
signal S602 : Std_Logic;
signal S603 : Std_Logic;
signal S604 : Std_Logic;
signal S605 : Std_Logic;
signal S606 : Std_Logic;
signal S607 : Std_Logic;
signal S608 : Std_Logic;
signal S609 : Std_Logic;
signal S610 : Std_Logic;
signal S611 : Std_Logic;
signal S612 : Std_Logic;
signal S613 : Std_Logic;
signal S614 : Std_Logic;
```

```
signal S615 : Std_Logic;
signal S616 : Std_Logic;
signal S617 : Std_Logic;
signal S618 : Std_Logic;
signal S619 : Std_Logic;
signal S620 : Std_Logic;
signal S621 : Std_Logic;
signal S622 : Std_Logic;
signal S623 : Std_Logic;
signal S624 : Std_Logic;
signal S625 : Std_Logic;
signal S626 : Std_Logic;
signal S627 : Std_Logic;
signal S628 : Std_Logic;
signal S629 : Std_Logic;
signal S630 : Std_Logic;
signal S631 : Std_Logic;
signal S632 : Std_Logic;
signal S633 : Std_Logic;
signal S634 : Std_Logic;
signal S635 : Std_Logic;
signal S636 : Std_Logic;
signal S637 : Std_Logic;
signal S638 : Std_Logic;
signal S639 : Std_Logic;
signal S640 : Std_Logic;
signal S641 : Std_Logic;
signal S642 : Std_Logic;
signal S643 : Std_Logic;
signal S644 : Std_Logic;
signal S645 : Std_Logic;
signal S646 : Std_Logic;
signal S647 : Std_Logic;
signal S648 : Std_Logic;
signal S649 : Std_Logic;
signal S650 : Std_Logic;
signal S651 : Std_Logic;
signal S652 : Std_Logic;
signal S653 : Std_Logic;
signal S654 : Std_Logic;
signal S655 : Std_Logic;
signal S656 : Std_Logic;
signal S657 : Std_Logic;
signal S658 : Std_Logic;
signal S659 : Std_Logic;
signal S660 : Std_Logic;
signal S661 : Std_Logic;
signal S662 : Std_Logic;
signal S663 : Std_Logic;
signal S664 : Std_Logic;
signal S665 : Std_Logic;
signal S666 : Std_Logic;
signal S667 : Std_Logic;
signal S668 : Std_Logic;
signal S669 : Std_Logic;
signal S670 : Std_Logic;
signal S671 : Std_Logic;
signal S672 : Std_Logic;
```

```
signal S673 : Std_Logic;
signal S674 : Std_Logic;
signal S675 : Std_Logic;
signal S676 : Std_Logic;
signal S677 : Std_Logic;
signal S678 : Std_Logic;
signal S679 : Std_Logic;
signal S680 : Std_Logic;
signal S681 : Std_Logic;
signal S682 : Std_Logic;
signal S683 : Std_Logic;
signal S684 : Std_Logic;
signal S685 : Std_Logic;
signal S686 : Std_Logic;
signal S687 : Std_Logic;
signal S688 : Std_Logic;
signal S689 : Std_Logic;
signal S690 : Std_Logic;
signal S691 : Std_Logic;
signal S692 : Std_Logic;
signal S693 : Std_Logic;
signal S694 : Std_Logic;
signal S695 : Std_Logic;
signal S696 : Std_Logic;
signal S697 : Std_Logic;
signal S698 : Std_Logic;
signal S699 : Std_Logic;
signal S700 : Std_Logic;
signal S701 : Std_Logic;
signal S702 : Std_Logic;
signal S703 : Std_Logic;
signal S704 : Std_Logic;
signal S705 : Std_Logic;
signal S706 : Std_Logic;
signal S707 : Std_Logic;
signal S708 : Std_Logic;
signal S709 : Std_Logic;
signal S710 : Std_Logic;
signal S711 : Std_Logic;
signal S712 : Std_Logic;
signal S713 : Std_Logic;
signal S714 : Std_Logic;
signal S715 : Std_Logic;
signal S716 : Std_Logic;
signal S717 : Std_Logic;
signal S718 : Std_Logic;
signal S719 : Std_Logic;
signal S720 : Std_Logic;
signal S721 : Std_Logic;
signal S722 : Std_Logic;
signal S723 : Std_Logic;
signal S724 : Std_Logic;
signal S725 : Std_Logic;
signal S726 : Std_Logic;
signal S727 : Std_Logic;
signal S728 : Std_Logic;
signal S729 : Std_Logic;
signal S730 : Std_Logic;
```

```
signal S731 : Std_Logic;
signal S732 : Std_Logic;
signal S733 : Std_Logic;
signal S734 : Std_Logic;
signal S735 : Std_Logic;
signal S736 : Std_Logic;
signal S737 : Std_Logic;
signal S738 : Std_Logic;
signal S739 : Std_Logic;
signal S740 : Std_Logic;
signal S741 : Std_Logic;
signal S742 : Std_Logic;
signal S743 : Std_Logic;
signal S744 : Std_Logic;
signal S745 : Std_Logic;
signal S746 : Std_Logic;
signal S747 : Std_Logic;
signal S748 : Std_Logic;
signal S749 : Std_Logic;
signal S750 : Std_Logic;
signal S751 : Std_Logic;
signal S752 : Std_Logic;
signal S753 : Std_Logic;
signal S754 : Std_Logic;
signal S755 : Std_Logic;
signal S756 : Std_Logic;
signal S757 : Std_Logic;
signal S758 : Std_Logic;
signal S759 : Std_Logic;
signal S760 : Std_Logic;
signal S761 : Std_Logic;
signal S762 : Std_Logic;
signal S763 : Std_Logic;
signal S764 : Std_Logic;
signal S765 : Std_Logic;
signal S766 : Std_Logic;
signal S767 : Std_Logic;
signal S768 : Std_Logic;
signal S769 : Std_Logic;
signal S770 : Std_Logic;
signal S771 : Std_Logic;
signal S772 : Std_Logic;
signal S773 : Std_Logic;
signal S774 : Std_Logic;
signal S775 : Std_Logic;
signal S776 : Std_Logic;
signal S777 : Std_Logic;
signal S778 : Std_Logic;
signal S779 : Std_Logic;
signal S780 : Std_Logic;
signal S781 : Std_Logic;
signal S782 : Std_Logic;
signal S783 : Std_Logic;
signal S784 : Std_Logic;
signal S785 : Std_Logic;
signal S786 : Std_Logic;
signal S787 : Std_Logic;
signal S788 : Std_Logic;
```

```
signal S789 : Std_Logic;
signal S790 : Std_Logic;
signal S791 : Std_Logic;
signal S792 : Std_Logic;
signal S793 : Std_Logic;
signal S794 : Std_Logic;
signal S795 : Std_Logic;
signal S796 : Std_Logic;
signal S797 : Std_Logic;
signal S798 : Std_Logic;
signal S799 : Std_Logic;
signal S800 : Std_Logic;
signal S801 : Std_Logic;
signal S802 : Std_Logic;
signal S803 : Std_Logic;
signal S804 : Std_Logic;
signal S805 : Std_Logic;
signal S806 : Std_Logic;
signal S807 : Std_Logic;
signal S808 : Std_Logic;
signal S809 : Std_Logic;
signal S810 : Std_Logic;
signal S811 : Std_Logic;
signal S812 : Std_Logic;
signal S813 : Std_Logic;
signal S814 : Std_Logic;
signal S815 : Std_Logic;
signal S816 : Std_Logic;
signal S817 : Std_Logic;
signal S818 : Std_Logic;
signal S819 : Std_Logic;
signal S820 : Std_Logic;
signal S821 : Std_Logic;
signal S822 : Std_Logic;
signal S823 : Std_Logic;
signal S824 : Std_Logic;
signal S825 : Std_Logic;
signal S826 : Std_Logic;
signal S827 : Std_Logic;
signal S828 : Std_Logic;
signal S829 : Std_Logic;
signal S830 : Std_Logic;
signal S831 : Std_Logic;
signal S832 : Std_Logic;
signal S833 : Std_Logic;
signal S834 : Std_Logic;
signal S835 : Std_Logic;
signal S836 : Std_Logic;
signal S837 : Std_Logic;
signal S838 : Std_Logic;
signal S839 : Std_Logic;
signal S840 : Std_Logic;
signal S841 : Std_Logic;
signal S842 : Std_Logic;
signal S843 : Std_Logic;
signal S844 : Std_Logic;
signal S845 : Std_Logic;
signal S846 : Std_Logic;
```

```
signal S847 : Std_Logic;
signal S848 : Std_Logic;
signal S849 : Std_Logic;
signal S850 : Std_Logic;
signal S851 : Std_Logic;
signal S852 : Std_Logic;
signal S853 : Std_Logic;
signal S854 : Std_Logic;
signal S855 : Std_Logic;
signal S856 : Std_Logic;
signal S857 : Std_Logic;
signal S858 : Std_Logic;
signal S859 : Std_Logic;
signal S860 : Std_Logic;
signal S861 : Std_Logic;
signal S862 : Std_Logic;
signal S863 : Std_Logic;
signal S864 : Std_Logic;
signal S865 : Std_Logic;
signal S866 : Std_Logic;
signal S867 : Std_Logic;
signal S868 : Std_Logic;
signal S869 : Std_Logic;
signal S870 : Std_Logic;
signal S871 : Std_Logic;
signal S872 : Std_Logic;
signal S873 : Std_Logic;
signal S874 : Std_Logic;
signal S875 : Std_Logic;
signal S876 : Std_Logic;
signal S877 : Std_Logic;
signal S878 : Std_Logic;
signal S879 : Std_Logic;
signal S880 : Std_Logic;
signal S881 : Std_Logic;
signal S882 : Std_Logic;
signal S883 : Std_Logic;
signal S884 : Std_Logic;
signal S885 : Std_Logic;
signal S886 : Std_Logic;
signal S887 : Std_Logic;
signal S888 : Std_Logic;
signal S889 : Std_Logic;
signal S890 : Std_Logic;
signal S891 : Std_Logic;
signal S892 : Std_Logic;
signal S893 : Std_Logic;
signal S894 : Std_Logic;
signal S895 : Std_Logic;
signal S896 : Std_Logic;
signal S897 : Std_Logic;
signal S898 : Std_Logic;
signal S899 : Std_Logic;
signal S900 : Std_Logic;
signal S901 : Std_Logic;
signal S902 : Std_Logic;
signal S903 : Std_Logic;
signal S904 : Std_Logic;
```

```
signal S905 : Std_Logic;
signal S906 : Std_Logic;
signal S907 : Std_Logic;
signal S908 : Std_Logic;
signal S909 : Std_Logic;
signal S910 : Std_Logic;
signal S911 : Std_Logic;
signal S912 : Std_Logic;
signal S913 : Std_Logic;
signal S914 : Std_Logic;
signal S915 : Std_Logic;
signal S916 : Std_Logic;
signal S917 : Std_Logic;
signal S918 : Std_Logic;
signal S919 : Std_Logic;
signal S920 : Std_Logic;
signal S921 : Std_Logic;
signal S922 : Std_Logic;
signal S923 : Std_Logic;
signal S924 : Std_Logic;
signal S925 : Std_Logic;
signal S926 : Std_Logic;
signal S927 : Std_Logic;
signal S928 : Std_Logic;
signal S929 : Std_Logic;
signal S930 : Std_Logic;
signal S931 : Std_Logic;
signal S932 : Std_Logic;
signal S933 : Std_Logic;
signal S934 : Std_Logic;
signal S935 : Std_Logic;
signal S936 : Std_Logic;
signal S937 : Std_Logic;
signal S938 : Std_Logic;
signal S939 : Std_Logic;
signal S940 : Std_Logic;
signal S941 : Std_Logic;
signal S942 : Std_Logic;
signal S943 : Std_Logic;
signal S944 : Std_Logic;
signal S945 : Std_Logic;
signal S946 : Std_Logic;
signal S947 : Std_Logic;
signal S948 : Std_Logic;
signal S949 : Std_Logic;
signal S950 : Std_Logic;
signal S951 : Std_Logic;
signal S952 : Std_Logic;
signal S953 : Std_Logic;
signal S954 : Std_Logic;
signal S955 : Std_Logic;
signal S956 : Std_Logic;
signal S957 : Std_Logic;
signal S958 : Std_Logic;
signal S959 : Std_Logic;
signal S960 : Std_Logic;
signal S961 : Std_Logic;
signal S962 : Std_Logic;
```

```
signal S963 : Std_Logic;
signal S964 : Std_Logic;
signal S965 : Std_Logic;
signal S966 : Std_Logic;
signal S967 : Std_Logic;
signal S968 : Std_Logic;
signal S969 : Std_Logic;
signal S970 : Std_Logic;
signal S971 : Std_Logic;
signal S972 : Std_Logic;
signal S973 : Std_Logic;
signal S974 : Std_Logic;
signal S975 : Std_Logic;
signal S976 : Std_Logic;
signal S977 : Std_Logic;
signal S978 : Std_Logic;
signal S979 : Std_Logic;
signal S980 : Std_Logic;
signal S981 : Std_Logic;
signal S982 : Std_Logic;
signal S983 : Std_Logic;
signal S984 : Std_Logic;
signal S985 : Std_Logic;
signal S986 : Std_Logic;
signal S987 : Std_Logic;
signal S988 : Std_Logic;
signal S989 : Std_Logic;
signal S990 : Std_Logic;
signal S991 : Std_Logic;
signal S992 : Std_Logic;
signal S993 : Std_Logic;
signal S994 : Std_Logic;
signal S995 : Std_Logic;
signal S996 : Std_Logic;
signal S997 : Std_Logic;
signal S998 : Std_Logic;
signal S999 : Std_Logic;
signal S1000 : Std_Logic;
signal S1001 : Std_Logic;
signal S1002 : Std_Logic;
signal S1003 : Std_Logic;
signal S1004 : Std_Logic;
signal S1005 : Std_Logic;
signal S1006 : Std_Logic;
signal S1007 : Std_Logic;
signal S1008 : Std_Logic;
signal S1009 : Std_Logic;
signal S1010 : Std_Logic;
signal S1011 : Std_Logic;
signal S1012 : Std_Logic;
signal S1013 : Std_Logic;
signal S1014 : Std_Logic;
signal S1015 : Std_Logic;
signal S1016 : Std_Logic;
signal S1017 : Std_Logic;
signal S1018 : Std_Logic;
signal S1019 : Std_Logic;
signal S1020 : Std_Logic;
```

```
signal S1021 : Std_Logic;
signal S1022 : Std_Logic;
signal S1023 : Std_Logic;
signal S1024 : Std_Logic;
signal S1025 : Std_Logic;
signal S1026 : Std_Logic;
signal S1027 : Std_Logic;
signal S1028 : Std_Logic;
signal S1029 : Std_Logic;
signal S1030 : Std_Logic;
signal S1031 : Std_Logic;
signal S1032 : Std_Logic;
signal S1033 : Std_Logic;
signal S1034 : Std_Logic;
signal S1035 : Std_Logic;
signal S1036 : Std_Logic;
signal S1037 : Std_Logic;
signal S1038 : Std_Logic;
signal S1039 : Std_Logic;
signal S1040 : Std_Logic;
signal S1041 : Std_Logic;
signal S1042 : Std_Logic;
signal S1043 : Std_Logic;
signal S1044 : Std_Logic;
signal S1045 : Std_Logic;
signal S1046 : Std_Logic;
signal S1047 : Std_Logic;
signal S1048 : Std_Logic;
signal S1049 : Std_Logic;
signal S1050 : Std_Logic;
signal S1051 : Std_Logic;
signal S1052 : Std_Logic;
signal S1053 : Std_Logic;
signal S1054 : Std_Logic;
signal S1055 : Std_Logic;
signal S1056 : Std_Logic;
signal S1057 : Std_Logic;
signal S1058 : Std_Logic;
signal S1059 : Std_Logic;
signal S1060 : Std_Logic;
signal S1061 : Std_Logic;
signal S1062 : Std_Logic;
signal S1063 : Std_Logic;
signal S1064 : Std_Logic;
signal S1065 : Std_Logic;
signal S1066 : Std_Logic;
signal S1067 : Std_Logic;
signal S1068 : Std_Logic;
signal S1069 : Std_Logic;
signal S1070 : Std_Logic;
signal S1071 : Std_Logic;
signal S1072 : Std_Logic;
signal S1073 : Std_Logic;
signal S1074 : Std_Logic;
signal S1075 : Std_Logic;
signal S1076 : Std_Logic;
signal S1077 : Std_Logic;
signal S1078 : Std_Logic;
```

```
signal S1079 : Std_Logic;
signal S1080 : Std_Logic;
signal S1081 : Std_Logic;
signal S1082 : Std_Logic;
signal S1083 : Std_Logic;
signal S1084 : Std_Logic;
signal S1085 : Std_Logic;
signal S1086 : Std_Logic;
signal S1087 : Std_Logic;
signal S1088 : Std_Logic;
signal S1089 : Std_Logic;
signal U457_Z : Std_Logic;
signal U458_Z : Std_Logic;
signal U456_Z : Std_Logic;
signal U455_Z : Std_Logic;
signal U459_Z : Std_Logic;
signal U491_Z : Std_Logic;

begin

U468: tag341
port map ( prsp => U460_Z, setag => U459_Z, cntinit =>
        cntinit, rstaddr => U455_Z, mux2 => U456_Z, mux1
        => U457_Z, mux0 => U458_Z, fir_in => fir_in,
        resp_in => resp_in, we => U453_Z, count =>
        count_out, fn(340) => fn(340), fn(339) => fn(339),
        fn(338) => fn(338), fn(337) => fn(337), fn(336) =>
        fn(336), fn(335) => fn(335), fn(334) => fn(334),
        fn(333) => fn(333), fn(332) => fn(332), fn(331) =>
        fn(331), fn(330) => fn(330), fn(329) => fn(329),
        fn(328) => fn(328), fn(327) => fn(327), fn(326) =>
        fn(326), fn(325) => fn(325), fn(324) => fn(324),
        fn(323) => fn(323), fn(322) => fn(322), fn(321) =>
        fn(321), fn(320) => fn(320), fn(319) => fn(319),
        fn(318) => fn(318), fn(317) => fn(317), fn(316) =>
        fn(316), fn(315) => fn(315), fn(314) => fn(314),
        fn(313) => fn(313), fn(312) => fn(312), fn(311) =>
        fn(311), fn(310) => fn(310), fn(309) => fn(309),
        fn(308) => fn(308), fn(307) => fn(307), fn(306) =>
        fn(306), fn(305) => fn(305), fn(304) => fn(304),
        fn(303) => fn(303), fn(302) => fn(302), fn(301) =>
        fn(301), fn(300) => fn(300), fn(299) => fn(299),
        fn(298) => fn(298), fn(297) => fn(297), fn(296) =>
        fn(296), fn(295) => fn(295), fn(294) => fn(294),
        fn(293) => fn(293), fn(292) => fn(292), fn(291) =>
        fn(291), fn(290) => fn(290), fn(289) => fn(289),
        fn(288) => fn(288), fn(287) => fn(287), fn(286) =>
        fn(286), fn(285) => fn(285), fn(284) => fn(284),
        fn(283) => fn(283), fn(282) => fn(282), fn(281) =>
        fn(281), fn(280) => fn(280), fn(279) => fn(279),
        fn(278) => fn(278), fn(277) => fn(277), fn(276) =>
        fn(276), fn(275) => fn(275), fn(274) => fn(274),
        fn(273) => fn(273), fn(272) => fn(272), fn(271) =>
        fn(271), fn(270) => fn(270), fn(269) => fn(269),
        fn(268) => fn(268), fn(267) => fn(267), fn(266) =>
        fn(266), fn(265) => fn(265), fn(264) => fn(264),
        fn(263) => fn(263), fn(262) => fn(262), fn(261) =>
```

fn(261), fn(260) => fn(260), fn(259) => fn(259), fn(258) => fn(258), fn(257) => fn(257), fn(256) => fn(256), fn(255) => fn(255), fn(254) => fn(254), fn(253) => fn(253), fn(252) => fn(252), fn(251) => fn(251), fn(250) => fn(250), fn(249) => fn(249), fn(248) => fn(248), fn(247) => fn(247), fn(246) => fn(246), fn(245) => fn(245), fn(244) => fn(244), fn(243) => fn(243), fn(242) => fn(242), fn(241) => fn(241), fn(240) => fn(240), fn(239) => fn(239), fn(238) => fn(238), fn(237) => fn(237), fn(236) => fn(236), fn(235) => fn(235), fn(234) => fn(234), fn(233) => fn(233), fn(232) => fn(232), fn(231) => fn(231), fn(230) => fn(230), fn(229) => fn(229), fn(228) => fn(228), fn(227) => fn(227), fn(226) => fn(226), fn(225) => fn(225), fn(224) => fn(224), fn(223) => fn(223), fn(222) => fn(222), fn(221) => fn(221), fn(220) => fn(220), fn(219) => fn(219), fn(218) => fn(218), fn(217) => fn(217), fn(216) => fn(216), fn(215) => fn(215), fn(214) => fn(214), fn(213) => fn(213), fn(212) => fn(212), fn(211) => fn(211), fn(210) => fn(210), fn(209) => fn(209), fn(208) => fn(208), fn(207) => fn(207), fn(206) => fn(206), fn(205) => fn(205), fn(204) => fn(204), fn(203) => fn(203), fn(202) => fn(202), fn(201) => fn(201), fn(200) => fn(200), fn(199) => fn(199), fn(198) => fn(198), fn(197) => fn(197), fn(196) => fn(196), fn(195) => fn(195), fn(194) => fn(194), fn(193) => fn(193), fn(192) => fn(192), fn(191) => fn(191), fn(190) => fn(190), fn(189) => fn(189), fn(188) => fn(188), fn(187) => fn(187), fn(186) => fn(186), fn(185) => fn(185), fn(184) => fn(184), fn(183) => fn(183), fn(182) => fn(182), fn(181) => fn(181), fn(180) => fn(180), fn(179) => fn(179), fn(178) => fn(178), fn(177) => fn(177), fn(176) => fn(176), fn(175) => fn(175), fn(174) => fn(174), fn(173) => fn(173), fn(172) => fn(172), fn(171) => fn(171), fn(170) => fn(170), fn(169) => fn(169), fn(168) => fn(168), fn(167) => fn(167), fn(166) => fn(166), fn(165) => fn(165), fn(164) => fn(164), fn(163) => fn(163), fn(162) => fn(162), fn(161) => fn(161), fn(160) => fn(160), fn(159) => fn(159), fn(158) => fn(158), fn(157) => fn(157), fn(156) => fn(156), fn(155) => fn(155), fn(154) => fn(154), fn(153) => fn(153), fn(152) => fn(152), fn(151) => fn(151), fn(150) => fn(150), fn(149) => fn(149), fn(148) => fn(148), fn(147) => fn(147), fn(146) => fn(146), fn(145) => fn(145), fn(144) => fn(144), fn(143) => fn(143), fn(142) => fn(142), fn(141) => fn(141), fn(140) => fn(140), fn(139) => fn(139), fn(138) => fn(138), fn(137) => fn(137), fn(136) => fn(136), fn(135) => fn(135), fn(134) => fn(134), fn(133) => fn(133), fn(132) => fn(132), fn(131) => fn(131), fn(130) => fn(130), fn(129) => fn(129), fn(128) => fn(128), fn(127) => fn(127), fn(126) => fn(126), fn(125) => fn(125), fn(124) => fn(124), fn(123) => fn(123), fn(122) => fn(122), fn(121) => fn(121), fn(120) => fn(120), fn(119) => fn(119), fn(118) => fn(118), fn(117) => fn(117), fn(116) => fn(116), fn(115) => fn(115), fn(114) => fn(114), fn(113) => fn(113), fn(112) => fn(112), fn(111) => fn(111), fn(110) => fn(110), fn(109) => fn(109), fn(108) => fn(108), fn(107) => fn(107), fn(106) => fn(106), fn(105) => fn(105), fn(104) => fn(104), fn(103) => fn(103), fn(102) => fn(102), fn(101) => fn(101), fn(100) => fn(100), fn(99) => fn(99), fn(98) => fn(98), fn(97) => fn(97), fn(96) => fn(96), fn(95) => fn(95), fn(94) => fn(94), fn(93) => fn(93), fn(92) => fn(92), fn(91) => fn(91), fn(90) => fn(90), fn(89) => fn(89), fn(88) => fn(88), fn(87) => fn(87), fn(86) => fn(86), fn(85) => fn(85), fn(84) => fn(84), fn(83) => fn(83), fn(82) => fn(82), fn(81) => fn(81), fn(80) => fn(80), fn(79) => fn(79), fn(78) => fn(78), fn(77) => fn(77), fn(76) => fn(76), fn(75) => fn(75), fn(74) => fn(74), fn(73) => fn(73), fn(72) => fn(72), fn(71) => fn(71), fn(70) => fn(70), fn(69) => fn(69), fn(68) => fn(68), fn(67) => fn(67), fn(66) => fn(66), fn(65) => fn(65), fn(64) => fn(64), fn(63) => fn(63), fn(62) => fn(62), fn(61) => fn(61), fn(60) => fn(60), fn(59) => fn(59), fn(58) => fn(58), fn(57) => fn(57), fn(56) => fn(56), fn(55) => fn(55), fn(54) => fn(54), fn(53) => fn(53), fn(52) => fn(52), fn(51) => fn(51), fn(50) => fn(50), fn(49) => fn(49), fn(48) => fn(48), fn(47) => fn(47), fn(46) => fn(46), fn(45) => fn(45), fn(44) => fn(44), fn(43) => fn(43), fn(42) => fn(42), fn(41) => fn(41), fn(40) => fn(40), fn(39) => fn(39), fn(38) => fn(38), fn(37) => fn(37), fn(36) => fn(36), fn(35) => fn(35), fn(34) => fn(34), fn(33) => fn(33), fn(32) => fn(32), fn(31) => so15_local, fn(30) => so14_local, fn(29) => so13_local, fn(28) => so12_local, fn(27) => so11_local, fn(26) => so10_local, fn(25) => so9_local, fn(24) => so8_local, fn(23) => so7_local, fn(22) => so6_local, fn(21) => so5_local, fn(20) => so4_local, fn(19) => so3_local, fn(18) => so2_local, fn(17) => so1_local, fn(16) => sso_local, fn(15) => ni(15), fn(14) => ni(14), fn(13) => ni(13), fn(12) => ni(12), fn(11) => ni(11), fn(10) => ni(10), fn(9) => ni(9), fn(8) => ni(8), fn(7) => ni(7), fn(6) => ni(6), fn(5) => ni(5), fn(4) => ni(4), fn(3) => ni(3), fn(2) => ni(2), fn(1) => ni(1), fn(0) => ni(0), nn(340) => no14_local, nn(339) => no13_local, nn(338) => no12_local, nn(337) => no11_local, nn(336) => no10_local, nn(335) => no9_local, nn(334) => no8_local, nn(333) => no7_local, nn(332) => no6_local, nn(331) => no5_local, nn(330) => no4_local, nn(329) => no3_local, nn(328) => no2_local, nn(327) => no1_local, nn(326) => no0_local, nn(325) => fn(340), nn(324) => fn(339), nn(323) => fn(338), nn(322) => fn(337), nn(321) => fn(336), nn(320) => fn(335), nn(319) => fn(334), nn(318) => fn(333), nn(317) => fn(332), nn(316) => fn(331), nn(315) => fn(330), nn(314) => fn(329), nn(313) => fn(328), nn(18) => fn(33), nn(17) => fn(32), nn(16) => so15_local, nn(15) => so14_local, nn(14) => so13_local, nn(13) => so12_local, nn(12) => so11_local, nn(11) => so10_local, nn(10) => so9_local, nn(9) => so8_local, nn(8) => so7_local, nn(7) => so6_local, nn(6) => so5_local, nn(5) => so4_local, nn(4) => so3_local, nn(3) => so2_local, nn(2) => so1_local, nn(1) => sso_local, nn(0) => nni, tag(340) => nno_local, tag(339) => no14_local, tag(338) => no13_local, tag(337) => no12_local, tag(336) => no11_local, tag(335) => no10_local, tag(334) => no9_local, tag(333) => no8_local, tag(332) => no7_local, tag(331) => no6_local, tag(330) => no5_local, tag(329) => no4_local, tag(328) => no3_local, tag(327) => no2_local, tag(326) => no1_local, tag(325) => no0_local, tag(324) => fn(340), tag(323) => fn(339), tag(322) => fn(338), tag(321) => fn(337), tag(320) => fn(336), tag(319) => fn(335), tag(318) => fn(334), tag(317) => fn(333), tag(316) => fn(332), tag(315) => fn(331), tag(314) => fn(330), tag(313) => fn(329), tag(312) => fn(328), tag(311) => fn(327), tag(310) => fn(326), tag(309) => fn(325), tag(308) => fn(324), tag(307) => fn(323), tag(306) => fn(322), tag(305) => fn(321), tag(304) => fn(320), tag(303) => fn(319), tag(302) => fn(318), tag(301) => fn(317), tag(300) => fn(316), tag(299) => fn(315), tag(298) => fn(314), tag(297) => fn(313), tag(296) => fn(312), tag(295) => fn(311), tag(294) => fn(310), tag(293) => fn(309), tag(292) => fn(308), tag(291) => fn(307), tag(290) => fn(306), tag(289) => fn(305), tag(288) => fn(304), tag(287) => fn(303), tag(286) => fn(302), tag(285) => fn(301), tag(284) => fn(300), tag(283) => fn(299), tag(282) => fn(298), tag(281) => fn(297), tag(280) => fn(296), tag(279) => fn(295), tag(278) => fn(294), tag(277) => fn(293), tag(276) => fn(292), tag(275) => fn(291), tag(274) => fn(290), tag(273) => fn(289), tag(272) => fn(288), tag(271) => fn(287), tag(270) => fn(286), tag(269) => fn(285), tag(268) => fn(284), tag(267) => fn(283), tag(266) => fn(282), tag(265) => fn(281), tag(264) => fn(280), tag(263) => fn(279), tag(262) => fn(278), tag(261) => fn(277), tag(260) => fn(276), tag(259) => fn(275), tag(258) => fn(274), tag(257) => fn(273), tag(256) => fn(272), tag(255) => fn(271), tag(254) => fn(270), tag(253) => fn(269), tag(252) => fn(268), tag(251) => fn(267), tag(250) => fn(266), tag(249) => fn(265), tag(248) => fn(264), tag(247) => fn(263), tag(246) => fn(262), tag(245) => fn(261), tag(244) => fn(260), tag(243) => fn(259), tag(242) => fn(258), tag(241) => fn(257), tag(240) => fn(256), tag(239) => fn(255), tag(238) => fn(254), tag(237) => fn(253), tag(236) => fn(252), tag(235) => fn(251), tag(234) => fn(250), tag(233) => fn(249), tag(232) => fn(248), tag(231) => fn(247), tag(230) => fn(246), tag(229) => fn(245), tag(228) => fn(244), tag(227) => fn(243), tag(226) => fn(242), tag(225) => fn(241), tag(224) => fn(240), tag(223) => fn(239), tag(222) => fn(238), tag(221) => fn(237), tag(220) => fn(236), tag(219) => fn(235), tag(218) => fn(234), tag(217) => fn(233), tag(216) => fn(232), tag(215) => fn(231), tag(214) => fn(230), tag(213) => fn(229), tag(212) => fn(228), tag(211) => fn(227), tag(210) => fn(226), tag(209) => fn(225), tag(208) => fn(224), tag(207) => fn(223), tag(206) => fn(222), tag(205) => fn(221), tag(204) => fn(220), tag(203) => fn(219), tag(202) => fn(218), tag(201) => fn(217), tag(200) => fn(216), tag(199) => fn(215), tag(198) => fn(214), tag(197) => fn(213), tag(196) => fn(212), tag(195) => fn(211), tag(194) => fn(210), tag(193) => fn(209), tag(192) => fn(208), tag(191) => fn(207), tag(190) => fn(206), tag(189) => fn(205), tag(188) => fn(204), tag(187) => fn(203), tag(186) => fn(202), tag(185) => fn(201), tag(184) => fn(200), tag(183) => fn(199), tag(182) => fn(198), tag(181) => fn(197), tag(180) => fn(196), tag(179) => fn(195), tag(178) => fn(194), tag(177) => fn(193), tag(176) => fn(192), tag(175) => fn(191), tag(174) => fn(190), tag(173) => fn(189), tag(172) => fn(188), tag(171) => fn(187), tag(170) => fn(186), tag(169) => fn(185), tag(168) => fn(184), tag(167) => fn(183), tag(166) => fn(182), tag(165) => fn(181), tag(164) => fn(180), tag(163) => fn(179), tag(162) => fn(178), tag(161) => fn(177), tag(160) => fn(176), tag(159) => fn(175), tag(158) => fn(174), tag(157) => fn(173), tag(156) => fn(172), tag(155) => fn(171), tag(154) => fn(170), tag(153) => fn(169), tag(152) => fn(168), tag(151) => fn(167), tag(150) => fn(166), tag(149) => fn(165), tag(148) => fn(164), tag(147) => fn(163), tag(146) => fn(162), tag(145) => fn(161), tag(144) => fn(160), tag(143) => fn(159), tag(142) => fn(158), tag(141) => fn(157), tag(140) => fn(156), tag(139) => fn(155), tag(138) => fn(154), tag(137) => fn(153), tag(136) => fn(152), tag(135) => fn(151), tag(134) => fn(150), tag(133) => fn(149), tag(132) => fn(148), tag(131) => fn(147), tag(130) => fn(146), tag(129) => fn(145), tag(128) => fn(144), tag(127) => fn(143), tag(126) => fn(142), tag(125) => fn(141), tag(124) => fn(140), tag(123) => fn(139), tag(122) => fn(138), tag(121) => fn(137), tag(120) => fn(136), tag(119) => fn(135), tag(118) => fn(134), tag(117) => fn(133), tag(116) => fn(132), tag(115) => fn(131), tag(114) => fn(130), tag(113) => fn(129), tag(112) => fn(128), tag(111) => fn(127), tag(110) => fn(126), tag(109) => fn(125), tag(108) => fn(124), tag(107) => fn(123), tag(106) => fn(122), tag(105) => fn(121), tag(104) => fn(120), tag(103) => fn(119), tag(102) => fn(118), tag(101) => fn(117), tag(100) => fn(116), tag(99) => fn(115), tag(98) => fn(114), tag(97) => fn(113), tag(96) => fn(112), tag(95) => fn(111), tag(94) => fn(110), tag(93) => fn(109), tag(92) => fn(108), tag(91) => fn(107), tag(90) => fn(106), tag(89) => fn(105), tag(88) => fn(104), tag(87) => fn(103), tag(86) => fn(102), tag(85) => fn(101), tag(84) => fn(100), tag(83) => fn(99), tag(82) => fn(98), tag(81) => fn(97), tag(80) => fn(96), tag(79) => fn(95), tag(78) => fn(94), tag(77) => fn(93), tag(76) => fn(92), tag(75) => fn(91), tag(74) => fn(90), tag(73) => fn(89), tag(72) => fn(88), tag(71) => fn(87), tag(70) => fn(86), tag(69) => fn(85), tag(68) => fn(84), tag(67) => fn(83), tag(66) => fn(82), tag(65) => fn(81), tag(64) => fn(80), tag(63) => fn(79), tag(62) => fn(78), tag(61) => fn(77), tag(60) => fn(76), tag(59) => fn(75), tag(58) => fn(74), tag(57) => fn(73), tag(56) => fn(72), tag(55) => fn(71), tag(54) => fn(70), tag(53) => fn(69), tag(52) => fn(68), tag(51) => fn(67), tag(50) => fn(66), tag(49) => fn(65), tag(48) => fn(64), tag(47) => fn(63), tag(46) => fn(62), tag(45) => fn(61), tag(44) => fn(60), tag(43) => fn(59), tag(42) => fn(58), tag(41) => fn(57), tag(40) => fn(56), tag(39) => fn(55), tag(38) => fn(54), tag(37) => fn(53), tag(36) => fn(52), tag(35) => fn(51), tag(34) => fn(50), tag(33) => fn(49), tag(32) => fn(48), tag(31) => fn(47), tag(30) => fn(46), tag(29) => fn(45), tag(28) => fn(44), tag(27) => fn(43), tag(26) => fn(42), tag(25) => fn(41), tag(24) => fn(40), tag(23) => fn(39), tag(22) => fn(38), tag(21) => fn(37), tag(20) => fn(36), tag(19) => fn(35), tag(18) => fn(34), tag(17) => fn(33), tag(16) => fn(32), tag(15) => so15_local, tag(14) => so14_local, tag(13) => so13_local, tag(12) => so12_local, tag(11) => so11_local, tag(10) => so10_local, tag(9) => so9_local, tag(8) => so8_local, tag(7) => so7_local, tag(6) => so6_local, tag(5) => so5_local, tag(4) => so4_local, tag(3) => so3_local, tag(2) => so2_local, tag(1) => so1_local, tag(0) => sso_local, ns(340) => ssi, ns(339) => nno_local, ns(338) => no14_local, ns(337) => no13_local, ns(336) => no12_local, ns(335) => no11_local, ns(334) => no10_local, ns(333) => no9_local, ns(332) => no8_local, ns(331) => no7_local, ns(330) => no6_local, ns(329) => no5_local, ns(328) => no4_local, ns(327) => no3_local, ns(326) => no2_local, ns(325) => no1_local, ns(324) => no0_local, ns(323) => fn(340), ns(322) => fn(339), ns(321) => fn(338), ns(320) => fn(337), ns(319) => fn(336), ns(318) => fn(335), ns(317) => fn(334), ns(316) => fn(333), ns(315) => fn(332), ns(314) => fn(331), ns(313) => fn(330), ns(312) => fn(329), ns(311) => fn(328), ns(310) => fn(327), ns(309) => fn(326), ns(308) => fn(325), ns(307) => fn(324), ns(306) => fn(323), ns(305) => fn(322), ns(304) => fn(321), ns(303) => fn(320), ns(302) => fn(319), ns(301) => fn(318), ns(300) => fn(317), ns(299) => fn(316), ns(298) => fn(315), ns(297) => fn(314), ns(296) => fn(313), ns(295) => fn(312), ns(294) => fn(311), ns(293) => fn(310), ns(292) => fn(309), ns(291) => fn(308), ns(290) => fn(307), ns(289) => fn(306), ns(288) => fn(305), ns(287) => fn(304), ns(286) => fn(303), ns(285) => fn(302), ns(284) => fn(301), ns(283) => fn(300), ns(282) => fn(299), ns(281) => fn(298), ns(280) => fn(297), ns(279) => fn(296), ns(278) => fn(295), ns(277) => fn(294), ns(276) => fn(293), ns(275) => fn(292), ns(274) => fn(291), ns(273) => fn(290), ns(272) => fn(289), ns(271) => fn(288), ns(270) => fn(287), ns(269) => fn(286), ns(268) => fn(285), ns(267) => fn(284), ns(266) => fn(283), ns(265) => fn(282), ns(264) => fn(281), ns(263) => fn(280), ns(262) => fn(279), ns(261) => fn(278), ns(260) => fn(277), ns(259) => fn(276), ns(258) => fn(275), ns(257) => fn(274), ns(256) => fn(273), ns(255) => fn(272), ns(254) => fn(271), ns(253) => fn(270), ns(252) => fn(269), ns(251) => fn(268), ns(250) => fn(267), ns(249) => fn(266), ns(248) => fn(265), ns(247) => fn(264), ns(246) => fn(263), ns(245) => fn(262), ns(244) => fn(261), ns(243) => fn(260), ns(242) => fn(259), ns(241) => fn(258), ns(240) => fn(257), ns(239) => fn(256), ns(238) => fn(255), ns(237) => fn(254), ns(236) => fn(253), ns(235) => fn(252), ns(234) => fn(251), ns(233) => fn(250), ns(232) => fn(249), ns(231) => fn(248), ns(230) => fn(247), ns(229) => fn(246), ns(228) => fn(245), ns(227) => fn(244), ns(226) => fn(243), ns(225) => fn(242), ns(224) => fn(241), ns(223) => fn(240), ns(222) => fn(239), ns(221) => fn(238), ns(220) => fn(237), ns(219) => fn(236), ns(218) => fn(235), ns(217) => fn(234), ns(216) => fn(233), ns(215) => fn(232), ns(214) => fn(231), ns(213) => fn(230), ns(212) => fn(229), ns(211) => fn(228), ns(210) => fn(227), ns(209) => fn(226), ns(208) => fn(225), ns(207) => fn(224), ns(206) => fn(223), ns(205) => fn(222), ns(204) => fn(221), ns(203) => fn(220), ns(202) => fn(219), ns(201) => fn(218), ns(200) => fn(217), ns(199) => fn(216), ns(198) => fn(215), ns(197) => fn(214), ns(196) => fn(213), ns(195) => fn(212), ns(194) => fn(211), ns(193) => fn(210), ns(192) => fn(209), ns(191) => fn(208), ns(190) => fn(207), ns(189) => fn(206), ns(188) => fn(205), ns(187) => fn(204), ns(186) => fn(203), ns(185) => fn(202), ns(184) => fn(201), ns(183) => fn(200), ns(182) => fn(199), ns(181) => fn(198), ns(180) => fn(197), ns(179) => fn(196), ns(178) => fn(195), ns(177) => fn(194), ns(176) => fn(193), ns(175) => fn(192), ns(174) => fn(191), ns(173) => fn(190), ns(172) => fn(189), ns(171) => fn(188), ns(170) => fn(187), ns(169) => fn(186), ns(168) => fn(185), ns(167) => fn(184), ns(166) => fn(183), ns(165) => fn(182), ns(164) => fn(181), ns(163) => fn(180), ns(162) => fn(179), ns(161) => fn(178), ns(160) => fn(177), ns(159) => fn(176), ns(158) => fn(175), ns(157) => fn(174), ns(156) => fn(173), ns(155) => fn(172), ns(154) => fn(171), ns(153) => fn(170), ns(152) => fn(169), ns(151) => fn(168), ns(150) => fn(167), ns(149) => fn(166), ns(148) => fn(165), ns(147) => fn(164), ns(146) => fn(163), ns(145) => fn(162), ns(144) => fn(161), ns(143) => fn(160), ns(142) => fn(159), ns(141) => fn(158), ns(140) => fn(157), ns(139) => fn(156), ns(138) => fn(155), ns(137) => fn(154), ns(136) => fn(153), ns(135) => fn(152), ns(134) => fn(151), ns(133) => fn(150), ns(132) => fn(149), ns(131) => fn(148), ns(130) => fn(147), ns(129) => fn(146), ns(128) => fn(145), ns(127) => fn(144), ns(126) => fn(143), ns(125) => fn(142), ns(124) => fn(141), ns(123) => fn(140), ns(122) => fn(139), ns(121) => fn(138), ns(120) => fn(137), ns(119) => fn(136), ns(118) => fn(135), ns(117) => fn(134), ns(116) => fn(133), ns(115) => fn(132), ns(114) => fn(131), ns(113) => fn(130), ns(112) => fn(129), ns(111) => fn(128), ns(110) => fn(127), ns(109) => fn(126), ns(108) => fn(125), ns(107) => fn(124), ns(106) => fn(123), ns(105) => fn(122), ns(104) => fn(121), ns(103) => fn(120), ns(102) => fn(119), ns(101) => fn(118), ns(100) => fn(117), ns(99) => fn(116), ns(98) => fn(115), ns(97) => fn(114), ns(96) => fn(113), ns(95) => fn(112), ns(94) => fn(111), ns(93) => fn(110), ns(92) => fn(109), ns(91) => fn(108), ns(90) => fn(107), ns(89) => fn(106), ns(88) => fn(105), ns(87) => fn(104), ns(86) => fn(103), ns(85) => fn(102), ns(84) => fn(101), ns(83) => fn(100), ns(82) => fn(99), ns(81) => fn(98), ns(80) => fn(97), ns(79) => fn(96), ns(78) => fn(95), ns(77) => fn(94), ns(76) => fn(93), ns(75) => fn(92), ns(74) => fn(91), ns(73) => fn(90), ns(72) => fn(89), ns(71) => fn(88), ns(70) => fn(87), ns(69) => fn(86), ns(68) => fn(85), ns(67) => fn(84), ns(66) => fn(83), ns(65) => fn(82), ns(64) => fn(81), ns(63) => fn(80), ns(62) => fn(79), ns(61) => fn(78), ns(60) => fn(77), ns(59) => fn(76), ns(58) => fn(75), ns(57) => fn(74), ns(56) => fn(73), ns(55) => fn(72), ns(54) => fn(71), ns(53) => fn(70), ns(52) => fn(69), ns(51) => fn(68), ns(50) => fn(67), ns(49) => fn(66), ns(48) => fn(65), ns(47) => fn(64), ns(46) => fn(63), ns(45) => fn(62), ns(44) => fn(61), ns(43) => fn(60), ns(42) => fn(59), ns(41) => fn(58), ns(40) => fn(57), ns(39) => fn(56), ns(38) => fn(55), ns(37) => fn(54), ns(36) => fn(53), ns(35) => fn(52), ns(34) => fn(51), ns(33) => fn(50), ns(32) => fn(49), ns(31) => fn(48), ns(30) => fn(47), ns(29) => fn(46), ns(28) => fn(45), ns(27) => fn(44), ns(26) => fn(43), ns(25) => fn(42), ns(24) => fn(41), ns(23) => fn(40), ns(22) => fn(39), ns(21) => fn(38), ns(20) => fn(37), ns(19) => fn(36), ns(18) => fn(35), ns(17) => fn(34), ns(16) => fn(33), ns(15) => fn(32), ns(14) => so15_local, ns(13) => so14_local, ns(12) => so13_local, ns(11) => so12_local, ns(10) => so11_local, ns(9) => so10_local, ns(8) => so9_local, ns(7) => so8_local, ns(6) => so7_local, ns(5) => so6_local, ns(4) => so5_local, ns(3) => so4_local, ns(2) => so3_local, ns(1) => so2_local, ns(0) => so1_local, fs(340) => si(15), fs(339) => si(14), fs(338) => si(13), fs(337) => si(12), fs(336) => si(11), fs(335) => si(10), fs(334) => si(9), fs(333) => si(8), fs(332) => si(7), fs(331) => si(6), fs(330) => si(5), fs(329) => si(4), fs(328) => si(3), fs(327) => si(2), fs(326) => si(1), fs(325) => si(0), fs(324) => nno_local, fs(323) => no14_local, fs(322) => no13_local, fs(321) => no12_local, fs(320) => no11_local, fs(319) => no10_local, fs(318) => no9_local, fs(317) => no8_local, fs(316) => no7_local, fs(315) => no6_local, fs(314) => no5_local, fs(313) => no4_local, fs(312) => no3_local, fs(311) => no2_local, fs(310) => no1_local, fs(309) => no0_local, fs(308) => fn(340), fs(307) => fn(339), fs(306) => fn(338), fs(305) => fn(337), fs(304) => fn(336), fs(303) => fn(335), fs(302) => fn(334), fs(301) => fn(333), fs(300) => fn(332), fs(299) => fn(331), fs(298) => fn(330), fs(297) => fn(329), fs(296) => fn(328), fs(295) => fn(327), fs(294) => fn(326), fs(293) => fn(325), fs(292) => fn(324), fs(291) => fn(323), fs(290) => fn(322), fs(289) => fn(321), fs(288) => fn(320), fs(287) => fn(319), fs(286) => fn(318), fs(285) => fn(317), fs(284) => fn(316), fs(283) => fn(315), fs(282) => fn(314), fs(281) => fn(313), fs(280) => fn(312), fs(279) => fn(311), fs(278) => fn(310), fs(277) => fn(309), fs(276) => fn(308), fs(275) => fn(307), fs(274) => fn(306), fs(273) => fn(305), fs(272) => fn(304), fs(271) => fn(303), fs(270) => fn(302), fs(269) => fn(301), fs(268) => fn(300), fs(267) => fn(299), fs(266) => fn(298), fs(265) => fn(297), fs(264) => fn(296), fs(263) => fn(295), fs(262) => fn(294), fs(261) => fn(293), fs(260) => fn(292), fs(259) => fn(291), fs(258) => fn(290), fs(257) => fn(289), fs(256) => fn(288), fs(255) => fn(287), fs(254) => fn(286), fs(253) => fn(285), fs(252) => fn(284), fs(251) => fn(283), fs(250) => fn(282), fs(249) => fn(281), fs(248) => fn(280), fs(247) => fn(279), fs(246) => fn(278), fs(245) => fn(277), fs(244) => fn(276), fs(243) => fn(275), fs(242) => fn(274), fs(241) => fn(273), fs(240) => fn(272), fs(239) => fn(271), fs(238) => fn(270), fs(237) => fn(269), fs(236) => fn(268), fs(235) => fn(267), fs(234) => fn(266), fs(233) => fn(265), fs(232) => fn(264), fs(231) => fn(263), fs(230) => fn(262), fs(229) => fn(261), fs(228) => fn(260), fs(227) => fn(259), fs(226) => fn(258), fs(225) => fn(257), fs(224) => fn(256), fs(223) => fn(255), fs(222) => fn(254), fs(221) => fn(253), fs(220) => fn(252), fs(219) => fn(251), fs(218) => fn(250), fs(217) => fn(249), fs(216) => fn(248), fs(215) => fn(247), fs(214) => fn(246), fs(213) => fn(245), fs(212) => fn(244), fs(211) => fn(243), fs(210) => fn(242), fs(209) => fn(241), fs(208) => fn(240), fs(207) => fn(239), fs(206) => fn(238), fs(205) => fn(237), fs(204) => fn(236), fs(203) => fn(235), fs(202) => fn(234), fs(201) => fn(233), fs(200) => fn(232), fs(199) => fn(231), fs(198) => fn(230), fs(197) => fn(229), fs(196) => fn(228), fs(195) => fn(227), fs(194) => fn(226), fs(193) => fn(225), fs(192) => fn(224), fs(191) => fn(223), fs(190) => fn(222), fs(189) => fn(221), fs(188) => fn(220), fs(187) => fn(219), fs(186) => fn(218), fs(185) => fn(217), fs(184) => fn(216), fs(183) => fn(215), fs(182) => fn(214), fs(181) => fn(213), fs(180) => fn(212), fs(179) => fn(211), fs(178) => fn(210), fs(177) => fn(209), fs(176) => fn(208), fs(175) => fn(207), fs(174) => fn(206), fs(173) => fn(205), fs(172) => fn(204), fs(171) => fn(203), fs(170) => fn(202), fs(169) => fn(201), fs(168) => fn(200), fs(167) => fn(199), fs(166) => fn(198), fs(165) => fn(197), fs(164) => fn(196), fs(163) => fn(195), fs(162) => fn(194), fs(161) => fn(193), fs(160) => fn(192), fs(159) => fn(191), fs(158) => fn(190), fs(157) => fn(189), fs(156) => fn(188), fs(155) => fn(187), fs(154) => fn(186), fs(153) => fn(185), fs(152) => fn(184), fs(151) => fn(183), fs(150) => fn(182), fs(149) => fn(181), fs(148) => fn(180), fs(147) => fn(179), fs(146) => fn(178), fs(145) => fn(177), fs(144) => fn(176), fs(143) => fn(175), fs(142) => fn(174), fs(141) => fn(173), fs(140) => fn(172), fs(139) => fn(171), fs(138) => fn(170), fs(137) => fn(169), fs(136) => fn(168), fs(135) => fn(167), fs(134) => fn(166), fs(133) => fn(165), fs(132) => fn(164), fs(131) => fn(163), fs(130) => fn(162), fs(129) => fn(161), fs(128) => fn(160), fs(127) => fn(159), fs(126) => fn(158), fs(125) => fn(157), fs(124) => fn(156), fs(123) => fn(155), fs(122) => fn(154), fs(121) => fn(153), fs(120) => fn(152), fs(119) => fn(151), fs(118) => fn(150), fs(117) => fn(149), fs(116) => fn(148), fs(115) => fn(147), fs(114) => fn(146), fs(113) => fn(145), fs(112) => fn(144), fs(111) => fn(143), fs(110) => fn(142), fs(109) => fn(141), fs(108) => fn(140), fs(107) => fn(139), fs(106) => fn(138), fs(105) => fn(137), fs(104) => fn(136), fs(103) => fn(135), fs(102) => fn(134), fs(101) => fn(133), fs(100) => fn(132), fs(99) => fn(131), fs(98) => fn(130), fs(97) => fn(129), fs(96) => fn(128), fs(95) => fn(127), fs(94) => fn(126), fs(93) => fn(125), fs(92) => fn(124), fs(91) => fn(123), fs(90) => fn(122), fs(89) => fn(121), fs(88) => fn(120), fs(87) => fn(119), fs(86) => fn(118), fs(85) => fn(117), fs(84) => fn(116), fs(83) => fn(115), fs(82) => fn(114), fs(81) => fn(113), fs(80) => fn(112), fs(79) => fn(111), fs(78) => fn(110), fs(77) => fn(109), fs(76) => fn(108), fs(75) => fn(107), fs(74) => fn(106), fs(73) => fn(105), fs(72) => fn(104), fs(71) => fn(103), fs(70) => fn(102), fs(69) => fn(101), fs(68) => fn(100), fs(67) => fn(99), fs(66) => fn(98), fs(65) => fn(97), fs(64) => fn(96), fs(63) => fn(95), fs(62) => fn(94), fs(61) => fn(93), fs(60) => fn(92), fs(59) => fn(91), fs(58) => fn(90), fs(57) => fn(89), fs(56) => fn(88), fs(55) => fn(87), fs(54) => fn(86), fs(53) => fn(85), fs(52) => fn(84), fs(51) => fn(83), fs(50) => fn(82), fs(49) => fn(81), fs(48) => fn(80), fs(47) => fn(79), fs(46) => fn(78), fs(45) => fn(77), fs(44) => fn(76), fs(43) => fn(75), fs(42) => fn(74), fs(41) => fn(73), fs(40) => fn(72), fs(39) => fn(71), fs(38) => fn(70), fs(37) => fn(69), fs(36) => fn(68), fs(35) => fn(67), fs(34) => fn(66), fs(33) => fn(65), fs(32) => fn(64), fs(31) => fn(63), fs(30) => fn(62), fs(29) => fn(61), fs(28) => fn(60), fs(27) => fn(59), fs(26) => fn(58), fs(25) => fn(57), fs(24) => fn(56), fs(23) => fn(55), fs(22) => fn(54), fs(21) => fn(53), fs(20) => fn(52), fs(19) => fn(51), fs(18) => fn(50), fs(17) => fn(49), fs(16) => fn(48), fs(15) => fn(47), fs(14) => fn(46), fs(13) => fn(45), fs(12) => fn(44), fs(11) => fn(43), fs(10) => fn(42), fs(9) => fn(41), fs(8) => fn(40), fs(7) => fn(39), fs(6) => fn(38), fs(5) => fn(37), fs(4) => fn(36), fs(3) => fn(35), fs(2) => fn(34), fs(1) => fn(33), fs(0) => fn(32), rspen(340) => U468_rspen(340), rspen(339) => U468_rspen(339), rspen(338) => U468_rspen(338), rspen(337) => U468_rspen(337), rspen(336) => U468_rspen(336), rspen(335) => U468_rspen(335), rspen(334) => U468_rspen(334), rspen(333) => U468_rspen(333), rspen(332) => U468_rspen(332), rspen(331) => U468_rspen(331), rspen(330) => U468_rspen(330), rspen(329) => U468_rspen(329), rspen(328) => U468_rspen(328), rspen(327) => U468_rspen(327), rspen(326) => U468_rspen(326), rspen(325) => U468_rspen(325), rspen(324) => U468_rspen(324), rspen(323) => U468_rspen(323), rspen(322) => U468_rspen(322), rspen(321) => U468_rspen(321), rspen(320) => U468_rspen(320), rspen(319) => U468_rspen(319), rspen(318) => U468_rspen(318), rspen(317) => U468_rspen(317), rspen(316) => U468_rspen(316), rspen(315) => U468_rspen(315), rspen(314) => U468_rspen(314), rspen(313) => U468_rspen(313), rspen(312) => U468_rspen(312), rspen(311) => U468_rspen(311), rspen(310) => U468_rspen(310), rspen(309) => U468_rspen(309), rspen(308) => U468_rspen(308), rspen(307) => U468_rspen(307), rspen(306) => U468_rspen(306), rspen(305) => U468_rspen(305), rspen(304) => U468_rspen(304), rspen(303) => U468_rspen(303), rspen(302) => U468_rspen(302), rspen(301) => U468_rspen(301), rspen(300) => U468_rspen(300), rspen(299) => U468_rspen(299), rspen(298) => U468_rspen(298), rspen(297) => U468_rspen(297), rspen(296) => U468_rspen(296), rspen(295) => U468_rspen(295), rspen(294) => U468_rspen(294), rspen(293) => U468_rspen(293), rspen(292) => U468_rspen(292), rspen(291) => U468_rspen(291), rspen(290) => U468_rspen(290), rspen(289) => U468_rspen(289), rspen(288) => U468_rspen(288), rspen(287) => U468_rspen(287), rspen(286) => U468_rspen(286), rspen(285) => U468_rspen(285), rspen(284) => U468_rspen(284), rspen(283) => U468_rspen(283), rspen(282) => U468_rspen(282), rspen(281) => U468_rspen(281), rspen(280) => U468_rspen(280), rspen(279) => U468_rspen(279), rspen(278) => U468_rspen(278), rspen(277) => U468_rspen(277), rspen(276) => U468_rspen(276), rspen(275) => U468_rspen(275), rspen(274) => U468_rspen(274), rspen(273) => U468_rspen(273), rspen(272) => U468_rspen(272), rspen(271) => U468_rspen(271), rspen(270) => U468_rspen(270), rspen(269) => U468_rspen(269), rspen(268) => U468_rspen(268), rspen(267) => U468_rspen(267), rspen(266) => U468_rspen(266), rspen(265) => U468_rspen(265), rspen(264) => U468_rspen(264), rspen(263) => U468_rspen(263), rspen(262) => U468_rspen(262), rspen(261) => U468_rspen(261), rspen(260) => U468_rspen(260), rspen(259) => U468_rspen(259), rspen(258) => U468_rspen(258), rspen(257) => U468_rspen(257), rspen(256) => U468_rspen(256), rspen(255) => U468_rspen(255), rspen(254) => U468_rspen(254), rspen(253) => U468_rspen(253), rspen(252) => U468_rspen(252), rspen(251) => U468_rspen(251), rspen(250) => U468_rspen(250), rspen(249) => U468_rspen(249), rspen(248) => U468_rspen(248), rspen(247) => U468_rspen(247), rspen(246) => U468_rspen(246), rspen(245) => U468_rspen(245), rspen(244) => U468_rspen(244), rspen(243) => U468_rspen(243), rspen(242) => U468_rspen(242), rspen(241) => U468_rspen(241), rspen(240) => U468_rspen(240), rspen(239) => U468_rspen(239), rspen(238) => U468_rspen(238), rspen(237) => U468_rspen(237), rspen(236) => U468_rspen(236), rspen(235) => U468_rspen(235), rspen(234) => U468_rspen(234), rspen(233) => U468_rspen(233), rspen(232) => U468_rspen(232), rspen(231) => U468_rspen(231), rspen(230) => U468_rspen(230), rspen(229) => U468_rspen(229), rspen(228) => U468_rspen(228), rspen(227) => U468_rspen(227), rspen(226) => U468_rspen(226), rspen(225) => U468_rspen(225), rspen(224) => U468_rspen(224), rspen(223) => U468_rspen(223), rspen(222) => U468_rspen(222), rspen(221) => U468_rspen(221), rspen(220) => U468_rspen(220), rspen(219) => U468_rspen(219), rspen(218) => U468_rspen(218), rspen(217) => U468_rspen(217), rspen(216) => U468_rspen(216), rspen(215) => U468_rspen(215), rspen(214) => U468_rspen(214), rspen(213) => U468_rspen(213), rspen(212) => U468_rspen(212), rspen(211) => U468_rspen(211), rspen(210) => U468_rspen(210), rspen(209) => U468_rspen(209), rspen(208) => U468_rspen(208), rspen(207) => U468_rspen(207), rspen(206) => U468_rspen(206), rspen(205) => U468_rspen(205), rspen(204) => U468_rspen(204), rspen(203) => U468_rspen(203), rspen(202) => U468_rspen(202), rspen(201) => U468_rspen(201), rspen(200) => U468_rspen(200), rspen(199) => U468_rspen(199), rspen(198) => U468_rspen(198), rspen(197) => U468_rspen(197), rspen(196) => U468_rspen(196), rspen(195) => U468_rspen(195), rspen(194) => U468_rspen(194), rspen(193) => U468_rspen(193), rspen(192) => U468_rspen(192), rspen(191) => U468_rspen(191), rspen(190) => U468_rspen(190), rspen(189) => U468_rspen(189), rspen(188) => U468_rspen(188), rspen(187) => U468_rspen(187), rspen(186) => U468_rspen(186), rspen(185) => U468_rspen(185), rspen(184) => U468_rspen(184), rspen(183) => U468_rspen(183), rspen(182) => U468_rspen(182), rspen(181) => U468_rspen(181), rspen(180) => U468_rspen(180), rspen(179) => U468_rspen(179), rspen(178) => U468_rspen(178), rspen(177) => U468_rspen(177), rspen(176) => U468_rspen(176), rspen(175) => U468_rspen(175), rspen(174) => U468_rspen(174), rspen(173) => U468_rspen(173), rspen(172) => U468_rspen(172), rspen(171) => U468_rspen(171), rspen(170) => U468_rspen(170), rspen(169) => U468_rspen(169), rspen(168) => U468_rspen(168), rspen(167) => U468_rspen(167), rspen(166) => U468_rspen(166), rspen(165) => U468_rspen(165), rspen(164) => U468_rspen(164), rspen(163) => U468_rspen(163), rspen(162) => U468_rspen(162), rspen(161) => U468_rspen(161), rspen(160) => U468_rspen(160), rspen(159) => U468_rspen(159), rspen(158) => U468_rspen(158), rspen(157) => U468_rspen(157), rspen(156) => U468_rspen(156), rspen(155) => U468_rspen(155), rspen(154) => U468_rspen(154), rspen(153) => U468_rspen(153), rspen(152) => U468_rspen(152), rspen(151) => U468_rspen(151), rspen(150) => U468_rspen(150), rspen(149) => U468_rspen(149), rspen(148) => U468_rspen(148), rspen(147) => U468_rspen(147), rspen(146) => U468_rspen(146), rspen(145) => U468_rspen(145), rspen(144) => U468_rspen(144), rspen(143) => U468_rspen(143), rspen(142) => U468_rspen(142), rspen(141) => U468_rspen(141), rspen(140) => U468_rspen(140), rspen(139) => U468_rspen(139), rspen(138) => U468_rspen(138), rspen(137) => U468_rspen(137), rspen(136) => U468_rspen(136), rspen(135) => U468_rspen(135), rspen(134) => U468_rspen(134), rspen(133) => U468_rspen(133), rspen(132) => U468_rspen(132), rspen(131) => U468_rspen(131), rspen(130) => U468_rspen(130), rspen(129) => U468_rspen(129), rspen(128) => U468_rspen(128), rspen(127) => U468_rspen(127), rspen(126) => U468_rspen(126), rspen(125) => U468_rspen(125), rspen(124) => U468_rspen(124), rspen(123) => U468_rspen(123), rspen(122) => U468_rspen(122), rspen(121) => U468_rspen(121), rspen(120) => U468_rspen(120), rspen(119) => U468_rspen(119), rspen(118) => U468_rspen(118), rspen(117) => U468_rspen(117), rspen(116) => U468_rspen(116), rspen(115) => U468_rspen(115), rspen(114) => U468_rspen(114), rspen(113) => U468_rspen(113), rspen(112) => U468_rspen(112), rspen(111) => U468_rspen(111), rspen(110) => U468_rspen(110), rspen(109) => U468_rspen(109), rspen(108) => U468_rspen(108), rspen(107) => U468_rspen(107), rspen(106) => U468_rspen(106), rspen(105) => U468_rspen(105), rspen(104) => U468_rspen(104), rspen(103) => U468_rspen(103), rspen(102) => U468_rspen(102), rspen(101) => U468_rspen(101), rspen(100) => U468_rspen(100), rspen(99) => U468_rspen(99), rspen(98) => U468_rspen(98), rspen(97) => U468_rspen(97), rspen(96) => U468_rspen(96), rspen(95) => U468_rspen(95), rspen(94) => U468_rspen(94), rspen(93) => U468_rspen(93), rspen(92) => U468_rspen(92), rspen(91) => U468_rspen(91), rspen(90) => U468_rspen(90), rspen(89) => U468_rspen(89), rspen(88) => U468_rspen(88), rspen(87) => U468_rspen(87), rspen(86) => U468_rspen(86), rspen(85) => U468_rspen(85), rspen(84) => U468_rspen(84), rspen(83) => U468_rspen(83), rspen(82) => U468_rspen(82), rspen(81) => U468_rspen(81), rspen(80) => U468_rspen(80), rspen(79) => U468_rspen(79), rspen(78) => U468_rspen(78), rspen(77) => U468_rspen(77), rspen(76) => U468_rspen(76), rspen(75) => U468_rspen(75), rspen(74) => U468_rspen(74), rspen(73) => U468_rspen(73), rspen(72) => U468_rspen(72), rspen(71) => U468_rspen(71), rspen(70) => U468_rspen(70), rspen(69) => U468_rspen(69), rspen(68) => U468_rspen(68), rspen(67) => U468_rspen(67), rspen(66) => U468_rspen(66), rspen(65) => U468_rspen(65), rspen(64) => U468_rspen(64), rspen(63) => U468_rspen(63), rspen(62) => U468_rspen(62), rspen(61) => U468_rspen(61), rspen(60) => U468_rspen(60), rspen(59) => U468_rspen(59), rspen(58) => U468_rspen(58), rspen(57) => U468_rspen(57), rspen(56) => U468_rspen(56), rspen(55) => U468_rspen(55), rspen(54) => U468_rspen(54), rspen(53) => U468_rspen(53), rspen(52) => U468_rspen(52), rspen(51) => U468_rspen(51), rspen(50) => U468_rspen(50), rspen(49) => U468_rspen(49), rspen(48) => U468_rspen(48), rspen(47) => U468_rspen(47), rspen(46) => U468_rspen(46), rspen(45) => U468_rspen(45), rspen(44) => U468_rspen(44), rspen(43) => U468_rspen(43), rspen(42) => U468_rspen(42), rspen(41) => U468_rspen(41), rspen(40) => U468_rspen(40), rspen(39) => U468_rspen(39), rspen(38) => U468_rspen(38), rspen(37) => U468_rspen(37), rspen(36) => U468_rspen(36), rspen(35) => U468_rspen(35), rspen(34) => U468_rspen(34), rspen(33) => U468_rspen(33), rspen(32) => U468_rspen(32), rspen(31) => U468_rspen(31), rspen(30) => U468_rspen(30), rspen(29) => U468_rspen(29), rspen(28) => U468_rspen(28), rspen(27) => U468_rspen(27), rspen(26) => U468_rspen(26), rspen(25) => U468_rspen(25), rspen(24) => U468_rspen(24), rspen(23) => U468_rspen(23), rspen(22) => U468_rspen(22), rspen(21) => U468_rspen(21), rspen(20) => U468_rspen(20), rspen(19) => U468_rspen(19), rspen(18) => U468_rspen(18), rspen(17) => U468_rspen(17), rspen(16) => U468_rspen(16), rspen(15) => U468_rspen(15), rspen(14) => U468_rspen(14), rspen(13) => U468_rspen(13), rspen(12) => U468_rspen(12), rspen(11) => U468_rspen(11), rspen(10) => U468_rspen(10), rspen(9) => U468_rspen(9), rspen(8) => U468_rspen(8), rspen(7) => U468_rspen(7), rspen(6) => U468_rspen(6), rspen(5) => U468_rspen(5), rspen(4) => U468_rspen(4), rspen(3) => U468_rspen(3), rspen(2) => U468_rspen(2), rspen(1) => U468_rspen(1), rspen(0) => U468_rspen(0), wl(340) => U468_wl(340), wl(339) => U468_wl(339), wl(338) => U468_wl(338), wl(337) => U468_wl(337), wl(336) => U468_wl(336), wl(335) => U468_wl(335), wl(334) => U468_wl(334), wl(333) => U468_wl(333), wl(332) => U468_wl(332), wl(331) => U468_wl(331), wl(330) => U468_wl(330), wl(329) => U468_wl(329), wl(328) => U468_wl(328), wl(327) => U468_wl(327), wl(326) => U468_wl(326), wl(325) => U468_wl(325), wl(324) => U468_wl(324), wl(323) => U468_wl(323), wl(322) => U468_wl(322), wl(321) => U468_wl(321), wl(320) => U468_wl(320), wl(319) => U468_wl(319), wl(318) => U468_wl(318), wl(317) => U468_wl(317), wl(316) => U468_wl(316), wl(315) => U468_wl(315), wl(314) => U468_wl(314), wl(313) => U468_wl(313), wl(312) => U468_wl(312), wl(311) => U468_wl(311), wl(310) => U468_wl(310), wl(309) => U468_wl(309), wl(308) => U468_wl(308), wl(307) => U468_wl(307), wl(306) => U468_wl(306), wl(305) => U468_wl(305), wl(304) => U468_wl(304), wl(303) => U468_wl(303), wl(302) => U468_wl(302), wl(301) => U468_wl(301), wl(300) => U468_wl(300), wl(299) => U468_wl(299), wl(298) => U468_wl(298), wl(297) => U468_wl(297), wl(296) => U468_wl(296), wl(295) => U468_wl(295), wl(294) => U468_wl(294), wl(293) => U468_wl(293), wl(292) => U468_wl(292), wl(291) => U468_wl(291), wl(290) => U468_wl(290), wl(289) => U468_wl(289), wl(288) => U468_wl(288), wl(287) => U468_wl(287), wl(286) => U468_wl(286), wl(285) => U468_wl(285), wl(284) => U468_wl(284), wl(283) => U468_wl(283), wl(282) => U468_wl(282), wl(281) => U468_wl(281), wl(280) => U468_wl(280), wl(279) => U468_wl(279), wl(278) => U468_wl(278), wl(277) => U468_wl(277), wl(276) => U468_wl(276), wl(275) => U468_wl(275), wl(274) => U468_wl(274), wl(273) => U468_wl(273), wl(272) => U468_wl(272), wl(271) => U468_wl(271), wl(270) => U468_wl(270), wl(269) => U468_wl(269), wl(268) => U468_wl(268), wl(267) => U468_wl(267), wl(266) => U468_wl(266), wl(265) => U468_wl(265), wl(264) => U468_wl(264), wl(263) => U468_wl(263), wl(262) => U468_wl(262), wl(261) => U468_wl(261), wl(260) => U468_wl(260), wl(259) => U468_wl(259), wl(258) => U468_wl(258), wl(257) => U468_wl(257), wl(256) => U468_wl(256), wl(255) => U468_wl(255), wl(254) => U468_wl(254), wl(253) => U468_wl(253), wl(252) => U468_wl(252),
wl(251) => U468_wl(251), wl(250) => U468_wl(250),
wl(249) => U468_wl(249), wl(248) => U468_wl(248),
wl(247) => U468_wl(247), wl(246) => U468_wl(246),
wl(245) => U468_wl(245), wl(244) => U468_wl(244),
wl(243) => U468_wl(243), wl(242) => U468_wl(242),
wl(241) => U468_wl(241), wl(240) => U468_wl(240),
wl(239) => U468_wl(239), wl(238) => U468_wl(238),
wl(237) => U468_wl(237), wl(236) => U468_wl(236),
wl(235) => U468_wl(235), wl(234) => U468_wl(234),
wl(233) => U468_wl(233), wl(232) => U468_wl(232),
wl(231) => U468_wl(231), wl(230) => U468_wl(230),
wl(229) => U468_wl(229), wl(228) => U468_wl(228),
wl(227) => U468_wl(227), wl(226) => U468_wl(226),
wl(225) => U468_wl(225), wl(224) => U468_wl(224),
wl(223) => U468_wl(223), wl(222) => U468_wl(222),
wl(221) => U468_wl(221), wl(220) => U468_wl(220),
wl(219) => U468_wl(219), wl(218) => U468_wl(218),
wl(217) => U468_wl(217), wl(216) => U468_wl(216),
wl(215) => U468_wl(215), wl(214) => U468_wl(214),
wl(213) => U468_wl(213), wl(212) => U468_wl(212),
wl(211) => U468_wl(211), wl(210) => U468_wl(210),
wl(209) => U468_wl(209), wl(208) => U468_wl(208),
wl(207) => U468_wl(207), wl(206) => U468_wl(206),
wl(205) => U468_wl(205), wl(204) => U468_wl(204),
wl(203) => U468_wl(203), wl(202) => U468_wl(202),
wl(201) => U468_wl(201), wl(200) => U468_wl(200),
wl(199) => U468_wl(199), wl(198) => U468_wl(198),
wl(197) => U468_wl(197), wl(196) => U468_wl(196),
wl(195) => U468_wl(195), wl(194) => U468_wl(194),
wl(193) => U468_wl(193), wl(192) => U468_wl(192),
wl(191) => U468_wl(191), wl(190) => U468_wl(190),
wl(189) => U468_wl(189), wl(188) => U468_wl(188),
wl(187) => U468_wl(187), wl(186) => U468_wl(186),
wl(185) => U468_wl(185), wl(184) => U468_wl(184),
wl(183) => U468_wl(183), wl(182) => U468_wl(182),
wl(181) => U468_wl(181), wl(180) => U468_wl(180),
wl(179) => U468_wl(179), wl(178) => U468_wl(178),
wl(177) => U468_wl(177), wl(176) => U468_wl(176),
wl(175) => U468_wl(175), wl(174) => U468_wl(174),
wl(173) => U468_wl(173), wl(172) => U468_wl(172),
wl(171) => U468_wl(171), wl(170) => U468_wl(170),
wl(169) => U468_wl(169), wl(168) => U468_wl(168),
wl(167) => U468_wl(167), wl(166) => U468_wl(166),
wl(165) => U468_wl(165), wl(164) => U468_wl(164),
wl(163) => U468_wl(163), wl(162) => U468_wl(162),
wl(161) => U468_wl(161), wl(160) => U468_wl(160),
wl(159) => U468_wl(159), wl(158) => U468_wl(158),
wl(157) => U468_wl(157), wl(156) => U468_wl(156),
wl(155) => U468_wl(155), wl(154) => U468_wl(154),
wl(153) => U468_wl(153), wl(152) => U468_wl(152),
wl(151) => U468_wl(151), wl(150) => U468_wl(150),
wl(149) => U468_wl(149), wl(148) => U468_wl(148),
wl(147) => U468_wl(147), wl(146) => U468_wl(146),
wl(145) => U468_wl(145), wl(144) => U468_wl(144),
wl(143) => U468_wl(143), wl(142) => U468_wl(142),
wl(141) => U468_wl(141), wl(140) => U468_wl(140),
wl(139) => U468_wl(139), wl(138) => U468_wl(138), wl(137) => U468_wl(137), wl(136) => U468_wl(136),
wl(135) => U468_wl(135), wl(134) => U468_wl(134),
wl(133) => U468_wl(133), wl(132) => U468_wl(132),
wl(131) => U468_wl(131), wl(130) => U468_wl(130),
wl(129) => U468_wl(129), wl(128) => U468_wl(128),
wl(127) => U468_wl(127), wl(126) => U468_wl(126),
wl(125) => U468_wl(125), wl(124) => U468_wl(124),
wl(123) => U468_wl(123), wl(122) => U468_wl(122),
wl(121) => U468_wl(121), wl(120) => U468_wl(120),
wl(119) => U468_wl(119), wl(118) => U468_wl(118),
wl(117) => U468_wl(117), wl(116) => U468_wl(116),
wl(115) => U468_wl(115), wl(114) => U468_wl(114),
wl(113) => U468_wl(113), wl(112) => U468_wl(112),
wl(111) => U468_wl(111), wl(110) => U468_wl(110),
wl(109) => U468_wl(109), wl(108) => U468_wl(108),
wl(107) => U468_wl(107), wl(106) => U468_wl(106),
wl(105) => U468_wl(105), wl(104) => U468_wl(104),
wl(103) => U468_wl(103), wl(102) => U468_wl(102),
wl(101) => U468_wl(101), wl(100) => U468_wl(100),
wl(99) => U468_wl(99), wl(98) => U468_wl(98),
wl(97) => U468_wl(97), wl(96) => U468_wl(96),
wl(95) => U468_wl(95), wl(94) => U468_wl(94),
wl(93) => U468_wl(93), wl(92) => U468_wl(92),
wl(91) => U468_wl(91), wl(90) => U468_wl(90),
wl(89) => U468_wl(89), wl(88) => U468_wl(88),
wl(87) => U468_wl(87), wl(86) => U468_wl(86),
wl(85) => U468_wl(85), wl(84) => U468_wl(84),
wl(83) => U468_wl(83), wl(82) => U468_wl(82),
wl(81) => U468_wl(81), wl(80) => U468_wl(80),
wl(79) => U468_wl(79), wl(78) => U468_wl(78),
wl(77) => U468_wl(77), wl(76) => U468_wl(76),
wl(75) => U468_wl(75), wl(74) => U468_wl(74),
wl(73) => U468_wl(73), wl(72) => U468_wl(72),
wl(71) => U468_wl(71), wl(70) => U468_wl(70),
wl(69) => U468_wl(69), wl(68) => U468_wl(68),
wl(67) => U468_wl(67), wl(66) => U468_wl(66),
wl(65) => U468_wl(65), wl(64) => U468_wl(64),
wl(63) => U468_wl(63), wl(62) => U468_wl(62),
wl(61) => U468_wl(61), wl(60) => U468_wl(60),
wl(59) => U468_wl(59), wl(58) => U468_wl(58),
wl(57) => U468_wl(57), wl(56) => U468_wl(56),
wl(55) => U468_wl(55), wl(54) => U468_wl(54),
wl(53) => U468_wl(53), wl(52) => U468_wl(52),
wl(51) => U468_wl(51), wl(50) => U468_wl(50),
wl(49) => U468_wl(49), wl(48) => U468_wl(48),
wl(47) => U468_wl(47), wl(46) => U468_wl(46),
wl(45) => U468_wl(45), wl(44) => U468_wl(44),
wl(43) => U468_wl(43), wl(42) => U468_wl(42),
wl(41) => U468_wl(41), wl(40) => U468_wl(40),
wl(39) => U468_wl(39), wl(38) => U468_wl(38),
wl(37) => U468_wl(37), wl(36) => U468_wl(36),
wl(35) => U468_wl(35), wl(34) => U468_wl(34),
wl(33) => U468_wl(33), wl(32) => U468_wl(32),
wl(31) => U468_wl(31), wl(30) => U468_wl(30),
wl(29) => U468_wl(29), wl(28) => U468_wl(28),
wl(27) => U468_wl(27), wl(26) => U468_wl(26),
wl(25) => U468_wl(25), wl(24) => U468_wl(24),
wl(23) => U468_wl(23), wl(22) => U468_wl(22),

```
wl(21) => U468_wl(21), wl(20) => U468_wl(20),
wl(19) => U468_wl(19), wl(18) => U468_wl(18),
wl(17) => U468_wl(17), wl(16) => U468_wl(16),
wl(15) => U468_wl(15), wl(14) => U468_wl(14),
wl(13) => U468_wl(13), wl(12) => U468_wl(12),
wl(11) => U468_wl(11), wl(10) => U468_wl(10),
wl(9) => U468_wl(9), wl(8) => U468_wl(8), wl(7) =>
U468_wl(7), wl(6) => U468_wl(6), wl(5) =>
U468_wl(5), wl(4) => U468_wl(4), wl(3) =>
U468_wl(3), wl(2) => U468_wl(2), wl(1) =>
U468_wl(1), wl(0) => U468_wl(0), ml(340) =>
U496_ml(340), ml(339) => U496_ml(339), ml(338) =>
U496_ml(338), ml(337) => U496_ml(337), ml(336) =>
U496_ml(336), ml(335) => U496_ml(335), ml(334) =>
U496_ml(334), ml(333) => U496_ml(333), ml(332) =>
U496_ml(332), ml(331) => U496_ml(331), ml(330) =>
U496_ml(330), ml(329) => U496_ml(329), ml(328) =>
U496_ml(328), ml(327) => U496_ml(327), ml(326) =>
U496_ml(326), ml(325) => U496_ml(325), ml(324) =>
U496_ml(324), ml(323) => U496_ml(323), ml(322) =>
U496_ml(322), ml(321) => U496_ml(321), ml(320) =>
U496_ml(320), ml(319) => U496_ml(319), ml(318) =>
U496_ml(318), ml(317) => U496_ml(317), ml(316) =>
U496_ml(316), ml(315) => U496_ml(315), ml(314) =>
U496_ml(314), ml(313) => U496_ml(313), ml(312) =>
U496_ml(312), ml(311) => U496_ml(311), ml(310) =>
U496_ml(310), ml(309) => U496_ml(309), ml(308) =>
U496_ml(308), ml(307) => U496_ml(307), ml(306) =>
U496_ml(306), ml(305) => U496_ml(305), ml(304) =>
U496_ml(304), ml(303) => U496_ml(303), ml(302) =>
U496_ml(302), ml(301) => U496_ml(301), ml(300) =>
U496_ml(300), ml(299) => U496_ml(299), ml(298) =>
U496_ml(298), ml(297) => U496_ml(297), ml(296) =>
U496_ml(296), ml(295) => U496_ml(295), ml(294) =>
U496_ml(294), ml(293) => U496_ml(293), ml(292) =>
U496_ml(292), ml(291) => U496_ml(291), ml(290) =>
U496_ml(290), ml(289) => U496_ml(289), ml(288) =>
U496_ml(288), ml(287) => U496_ml(287), ml(286) =>
U496_ml(286), ml(285) => U496_ml(285), ml(284) =>
U496_ml(284), ml(283) => U496_ml(283), ml(282) =>
U496_ml(282), ml(281) => U496_ml(281), ml(280) =>
U496_ml(280), ml(279) => U496_ml(279), ml(278) =>
U496_ml(278), ml(277) => U496_ml(277), ml(276) =>
U496_ml(276), ml(275) => U496_ml(275), ml(274) =>
U496_ml(274), ml(273) => U496_ml(273), ml(272) =>
U496_ml(272), ml(271) => U496_ml(271), ml(270) =>
U496_ml(270), ml(269) => U496_ml(269), ml(268) =>
U496_ml(268), ml(267) => U496_ml(267), ml(266) =>
U496_ml(266), ml(265) => U496_ml(265), ml(264) =>
U496_ml(264), ml(263) => U496_ml(263), ml(262) =>
U496_ml(262), ml(261) => U496_ml(261), ml(260) =>
U496_ml(260), ml(259) => U496_ml(259), ml(258) =>
U496_ml(258), ml(257) => U496_ml(257), ml(256) =>
U496_ml(256), ml(255) => U496_ml(255), ml(254) =>
U496_ml(254), ml(253) => U496_ml(253), ml(252) =>
U496_ml(252), ml(251) => U496_ml(251), ml(250) =>
U496_ml(250), ml(249) => U496_ml(249), ml(248) =>
U496_ml(248), ml(247) => U496_ml(247), ml(246) =>
```

U496_ml(246), ml(245) => U496_ml(245), ml(244) =>
U496_ml(244), ml(243) => U496_ml(243), ml(242) =>
U496_ml(242), ml(241) => U496_ml(241), ml(240) =>
U496_ml(240), ml(239) => U496_ml(239), ml(238) =>
U496_ml(238), ml(237) => U496_ml(237), ml(236) =>
U496_ml(236), ml(235) => U496_ml(235), ml(234) =>
U496_ml(234), ml(233) => U496_ml(233), ml(232) =>
U496_ml(232), ml(231) => U496_ml(231), ml(230) =>
U496_ml(230), ml(229) => U496_ml(229), ml(228) =>
U496_ml(228), ml(227) => U496_ml(227), ml(226) =>
U496_ml(226), ml(225) => U496_ml(225), ml(224) =>
U496_ml(224), ml(223) => U496_ml(223), ml(222) =>
U496_ml(222), ml(221) => U496_ml(221), ml(220) =>
U496_ml(220), ml(219) => U496_ml(219), ml(218) =>
U496_ml(218), ml(217) => U496_ml(217), ml(216) =>
U496_ml(216), ml(215) => U496_ml(215), ml(214) =>
U496_ml(214), ml(213) => U496_ml(213), ml(212) =>
U496_ml(212), ml(211) => U496_ml(211), ml(210) =>
U496_ml(210), ml(209) => U496_ml(209), ml(208) =>
U496_ml(208), ml(207) => U496_ml(207), ml(206) =>
U496_ml(206), ml(205) => U496_ml(205), ml(204) =>
U496_ml(204), ml(203) => U496_ml(203), ml(202) =>
U496_ml(202), ml(201) => U496_ml(201), ml(200) =>
U496_ml(200), ml(199) => U496_ml(199), ml(198) =>
U496_ml(198), ml(197) => U496_ml(197), ml(196) =>
U496_ml(196), ml(195) => U496_ml(195), ml(194) =>
U496_ml(194), ml(193) => U496_ml(193), ml(192) =>
U496_ml(192), ml(191) => U496_ml(191), ml(190) =>
U496_ml(190), ml(189) => U496_ml(189), ml(188) =>
U496_ml(188), ml(187) => U496_ml(187), ml(186) =>
U496_ml(186), ml(185) => U496_ml(185), ml(184) =>
U496_ml(184), ml(183) => U496_ml(183), ml(182) =>
U496_ml(182), ml(181) => U496_ml(181), ml(180) =>
U496_ml(180), ml(179) => U496_ml(179), ml(178) =>
U496_ml(178), ml(177) => U496_ml(177), ml(176) =>
U496_ml(176), ml(175) => U496_ml(175), ml(174) =>
U496_ml(174), ml(173) => U496_ml(173), ml(172) =>
U496_ml(172), ml(171) => U496_ml(171), ml(170) =>
U496_ml(170), ml(169) => U496_ml(169), ml(168) =>
U496_ml(168), ml(167) => U496_ml(167), ml(166) =>
U496_ml(166), ml(165) => U496_ml(165), ml(164) =>
U496_ml(164), ml(163) => U496_ml(163), ml(162) =>
U496_ml(162), ml(161) => U496_ml(161), ml(160) =>
U496_ml(160), ml(159) => U496_ml(159), ml(158) =>
U496_ml(158), ml(157) => U496_ml(157), ml(156) =>
U496_ml(156), ml(155) => U496_ml(155), ml(154) =>
U496_ml(154), ml(153) => U496_ml(153), ml(152) =>
U496_ml(152), ml(151) => U496_ml(151), ml(150) =>
U496_ml(150), ml(149) => U496_ml(149), ml(148) =>
U496_ml(148), ml(147) => U496_ml(147), ml(146) =>
U496_ml(146), ml(145) => U496_ml(145), ml(144) =>
U496_ml(144), ml(143) => U496_ml(143), ml(142) =>
U496_ml(142), ml(141) => U496_ml(141), ml(140) =>
U496_ml(140), ml(139) => U496_ml(139), ml(138) =>
U496_ml(138), ml(137) => U496_ml(137), ml(136) =>
U496_ml(136), ml(135) => U496_ml(135), ml(134) =>
U496_ml(134), ml(133) => U496_ml(133), ml(132) =>
U496_ml(132), ml(131) => U496_ml(131), ml(130) =>

U496_ml(130), ml(129) => U496_ml(129), ml(128) =>
U496_ml(128), ml(127) => U496_ml(127), ml(126) =>
U496_ml(126), ml(125) => U496_ml(125), ml(124) =>
U496_ml(124), ml(123) => U496_ml(123), ml(122) =>
U496_ml(122), ml(121) => U496_ml(121), ml(120) =>
U496_ml(120), ml(119) => U496_ml(119), ml(118) =>
U496_ml(118), ml(117) => U496_ml(117), ml(116) =>
U496_ml(116), ml(115) => U496_ml(115), ml(114) =>
U496_ml(114), ml(113) => U496_ml(113), ml(112) =>
U496_ml(112), ml(111) => U496_ml(111), ml(110) =>
U496_ml(110), ml(109) => U496_ml(109), ml(108) =>
U496_ml(108), ml(107) => U496_ml(107), ml(106) =>
U496_ml(106), ml(105) => U496_ml(105), ml(104) =>
U496_ml(104), ml(103) => U496_ml(103), ml(102) =>
U496_ml(102), ml(101) => U496_ml(101), ml(100) =>
U496_ml(100), ml(99) => U496_ml(99), ml(98) =>
U496_ml(98), ml(97) => U496_ml(97), ml(96) =>
U496_ml(96), ml(95) => U496_ml(95), ml(94) =>
U496_ml(94), ml(93) => U496_ml(93), ml(92) =>
U496_ml(92), ml(91) => U496_ml(91), ml(90) =>
U496_ml(90), ml(89) => U496_ml(89), ml(88) =>
U496_ml(88), ml(87) => U496_ml(87), ml(86) =>
U496_ml(86), ml(85) => U496_ml(85), ml(84) =>
U496_ml(84), ml(83) => U496_ml(83), ml(82) =>
U496_ml(82), ml(81) => U496_ml(81), ml(80) =>
U496_ml(80), ml(79) => U496_ml(79), ml(78) =>
U496_ml(78), ml(77) => U496_ml(77), ml(76) =>
U496_ml(76), ml(75) => U496_ml(75), ml(74) =>
U496_ml(74), ml(73) => U496_ml(73), ml(72) =>
U496_ml(72), ml(71) => U496_ml(71), ml(70) =>
U496_ml(70), ml(69) => U496_ml(69), ml(68) =>
U496_ml(68), ml(67) => U496_ml(67), ml(66) =>
U496_ml(66), ml(65) => U496_ml(65), ml(64) =>
U496_ml(64), ml(63) => U496_ml(63), ml(62) =>
U496_ml(62), ml(61) => U496_ml(61), ml(60) =>
U496_ml(60), ml(59) => U496_ml(59), ml(58) =>
U496_ml(58), ml(57) => U496_ml(57), ml(56) =>
U496_ml(56), ml(55) => U496_ml(55), ml(54) =>
U496_ml(54), ml(53) => U496_ml(53), ml(52) =>
U496_ml(52), ml(51) => U496_ml(51), ml(50) =>
U496_ml(50), ml(49) => U496_ml(49), ml(48) =>
U496_ml(48), ml(47) => U496_ml(47), ml(46) =>
U496_ml(46), ml(45) => U496_ml(45), ml(44) =>
U496_ml(44), ml(43) => U496_ml(43), ml(42) =>
U496_ml(42), ml(41) => U496_ml(41), ml(40) =>
U496_ml(40), ml(39) => U496_ml(39), ml(38) =>
U496_ml(38), ml(37) => U496_ml(37), ml(36) =>
U496_ml(36), ml(35) => U496_ml(35), ml(34) =>
U496_ml(34), ml(33) => U496_ml(33), ml(32) =>
U496_ml(32), ml(31) => U496_ml(31), ml(30) =>
U496_ml(30), ml(29) => U496_ml(29), ml(28) =>
U496_ml(28), ml(27) => U496_ml(27), ml(26) =>
U496_ml(26), ml(25) => U496_ml(25), ml(24) =>
U496_ml(24), ml(23) => U496_ml(23), ml(22) =>
U496_ml(22), ml(21) => U496_ml(21), ml(20) =>
U496_ml(20), ml(19) => U496_ml(19), ml(18) =>
U496_ml(18), ml(17) => U496_ml(17), ml(16) =>
U496_ml(16), ml(15) => U496_ml(15), ml(14) =>

```
            U496_ml(14), ml(13) => U496_ml(13), ml(12) =>
            U496_ml(12), ml(11) => U496_ml(11), ml(10) =>
            U496_ml(10), ml(9) => U496_ml(9), ml(8) =>
            U496_ml(8), ml(7) => U496_ml(7), ml(6) =>
            U496_ml(6), ml(5) => U496_ml(5), ml(4) =>
            U496_ml(4), ml(3) => U496_ml(3), ml(2) =>
            U496_ml(2), ml(1) => U496_ml(1), ml(0) =>
            U496_ml(0), fircnten => U491_Z );

U465: ni01d5
   port map ( I => exen, Z => U465_Z );

U488: ni01d5
   port map ( I => disch, Z => U488_Z );

U489: ni01d5
   port map ( I => asaen, Z => U489_Z );

U491: ni01d5
   port map ( I => fircnten, Z => U491_Z );

U496: array341_m
   port map ( wl(340) => U468_wl(340), wl(339) => U468_wl(339),
            wl(338) => U468_wl(338), wl(337) => U468_wl(337),
            wl(336) => U468_wl(336), wl(335) => U468_wl(335),
            wl(334) => U468_wl(334), wl(333) => U468_wl(333),
            wl(332) => U468_wl(332), wl(331) => U468_wl(331),
            wl(330) => U468_wl(330), wl(329) => U468_wl(329),
            wl(328) => U468_wl(328), wl(327) => U468_wl(327),
            wl(326) => U468_wl(326), wl(325) => U468_wl(325),
            wl(324) => U468_wl(324), wl(323) => U468_wl(323),
            wl(322) => U468_wl(322), wl(321) => U468_wl(321),
            wl(320) => U468_wl(320), wl(319) => U468_wl(319),
            wl(318) => U468_wl(318), wl(317) => U468_wl(317),
            wl(316) => U468_wl(316), wl(315) => U468_wl(315),
            wl(314) => U468_wl(314), wl(313) => U468_wl(313),
            wl(312) => U468_wl(312), wl(311) => U468_wl(311),
            wl(310) => U468_wl(310), wl(309) => U468_wl(309),
            wl(308) => U468_wl(308), wl(307) => U468_wl(307),
            wl(306) => U468_wl(306), wl(305) => U468_wl(305),
            wl(304) => U468_wl(304), wl(303) => U468_wl(303),
            wl(302) => U468_wl(302), wl(301) => U468_wl(301),
            wl(300) => U468_wl(300), wl(299) => U468_wl(299),
            wl(298) => U468_wl(298), wl(297) => U468_wl(297),
            wl(296) => U468_wl(296), wl(295) => U468_wl(295),
            wl(294) => U468_wl(294), wl(293) => U468_wl(293),
            wl(292) => U468_wl(292), wl(291) => U468_wl(291),
            wl(290) => U468_wl(290), wl(289) => U468_wl(289),
            wl(288) => U468_wl(288), wl(287) => U468_wl(287),
            wl(286) => U468_wl(286), wl(285) => U468_wl(285),
            wl(284) => U468_wl(284), wl(283) => U468_wl(283),
            wl(282) => U468_wl(282), wl(281) => U468_wl(281),
            wl(280) => U468_wl(280), wl(279) => U468_wl(279),
            wl(278) => U468_wl(278), wl(277) => U468_wl(277),
            wl(276) => U468_wl(276), wl(275) => U468_wl(275),
            wl(274) => U468_wl(274), wl(273) => U468_wl(273),
            wl(272) => U468_wl(272), wl(271) => U468_wl(271),
            wl(270) => U468_wl(270), wl(269) => U468_wl(269),
```

wl(268) => U468_wl(268), wl(267) => U468_wl(267),
wl(266) => U468_wl(266), wl(265) => U468_wl(265),
wl(264) => U468_wl(264), wl(263) => U468_wl(263),
wl(262) => U468_wl(262), wl(261) => U468_wl(261),
wl(260) => U468_wl(260), wl(259) => U468_wl(259),
wl(258) => U468_wl(258), wl(257) => U468_wl(257),
wl(256) => U468_wl(256), wl(255) => U468_wl(255),
wl(254) => U468_wl(254), wl(253) => U468_wl(253),
wl(252) => U468_wl(252), wl(251) => U468_wl(251),
wl(250) => U468_wl(250), wl(249) => U468_wl(249),
wl(248) => U468_wl(248), wl(247) => U468_wl(247),
wl(246) => U468_wl(246), wl(245) => U468_wl(245),
wl(244) => U468_wl(244), wl(243) => U468_wl(243),
wl(242) => U468_wl(242), wl(241) => U468_wl(241),
wl(240) => U468_wl(240), wl(239) => U468_wl(239),
wl(238) => U468_wl(238), wl(237) => U468_wl(237),
wl(236) => U468_wl(236), wl(235) => U468_wl(235),
wl(234) => U468_wl(234), wl(233) => U468_wl(233),
wl(232) => U468_wl(232), wl(231) => U468_wl(231),
wl(230) => U468_wl(230), wl(229) => U468_wl(229),
wl(228) => U468_wl(228), wl(227) => U468_wl(227),
wl(226) => U468_wl(226), wl(225) => U468_wl(225),
wl(224) => U468_wl(224), wl(223) => U468_wl(223),
wl(222) => U468_wl(222), wl(221) => U468_wl(221),
wl(220) => U468_wl(220), wl(219) => U468_wl(219),
wl(218) => U468_wl(218), wl(217) => U468_wl(217),
wl(216) => U468_wl(216), wl(215) => U468_wl(215),
wl(214) => U468_wl(214), wl(213) => U468_wl(213),
wl(212) => U468_wl(212), wl(211) => U468_wl(211),
wl(210) => U468_wl(210), wl(209) => U468_wl(209),
wl(208) => U468_wl(208), wl(207) => U468_wl(207),
wl(206) => U468_wl(206), wl(205) => U468_wl(205),
wl(204) => U468_wl(204), wl(203) => U468_wl(203),
wl(202) => U468_wl(202), wl(201) => U468_wl(201),
wl(200) => U468_wl(200), wl(199) => U468_wl(199),
wl(198) => U468_wl(198), wl(197) => U468_wl(197),
wl(196) => U468_wl(196), wl(195) => U468_wl(195),
wl(194) => U468_wl(194), wl(193) => U468_wl(193),
wl(192) => U468_wl(192), wl(191) => U468_wl(191),
wl(190) => U468_wl(190), wl(189) => U468_wl(189),
wl(188) => U468_wl(188), wl(187) => U468_wl(187),
wl(186) => U468_wl(186), wl(185) => U468_wl(185),
wl(184) => U468_wl(184), wl(183) => U468_wl(183),
wl(182) => U468_wl(182), wl(181) => U468_wl(181),
wl(180) => U468_wl(180), wl(179) => U468_wl(179),
wl(178) => U468_wl(178), wl(177) => U468_wl(177),
wl(176) => U468_wl(176), wl(175) => U468_wl(175),
wl(174) => U468_wl(174), wl(173) => U468_wl(173),
wl(172) => U468_wl(172), wl(171) => U468_wl(171),
wl(170) => U468_wl(170), wl(169) => U468_wl(169),
wl(168) => U468_wl(168), wl(167) => U468_wl(167),
wl(166) => U468_wl(166), wl(165) => U468_wl(165),
wl(164) => U468_wl(164), wl(163) => U468_wl(163),
wl(162) => U468_wl(162), wl(161) => U468_wl(161),
wl(160) => U468_wl(160), wl(159) => U468_wl(159),
wl(158) => U468_wl(158), wl(157) => U468_wl(157),
wl(156) => U468_wl(156), wl(155) => U468_wl(155),
wl(154) => U468_wl(154), wl(153) => U468_wl(153), wl(152) => U468_wl(152), wl(151) => U468_wl(151),
wl(150) => U468_wl(150), wl(149) => U468_wl(149),
wl(148) => U468_wl(148), wl(147) => U468_wl(147),
wl(146) => U468_wl(146), wl(145) => U468_wl(145),
wl(144) => U468_wl(144), wl(143) => U468_wl(143),
wl(142) => U468_wl(142), wl(141) => U468_wl(141),
wl(140) => U468_wl(140), wl(139) => U468_wl(139),
wl(138) => U468_wl(138), wl(137) => U468_wl(137),
wl(136) => U468_wl(136), wl(135) => U468_wl(135),
wl(134) => U468_wl(134), wl(133) => U468_wl(133),
wl(132) => U468_wl(132), wl(131) => U468_wl(131),
wl(130) => U468_wl(130), wl(129) => U468_wl(129),
wl(128) => U468_wl(128), wl(127) => U468_wl(127),
wl(126) => U468_wl(126), wl(125) => U468_wl(125),
wl(124) => U468_wl(124), wl(123) => U468_wl(123),
wl(122) => U468_wl(122), wl(121) => U468_wl(121),
wl(120) => U468_wl(120), wl(119) => U468_wl(119),
wl(118) => U468_wl(118), wl(117) => U468_wl(117),
wl(116) => U468_wl(116), wl(115) => U468_wl(115),
wl(114) => U468_wl(114), wl(113) => U468_wl(113),
wl(112) => U468_wl(112), wl(111) => U468_wl(111),
wl(110) => U468_wl(110), wl(109) => U468_wl(109),
wl(108) => U468_wl(108), wl(107) => U468_wl(107),
wl(106) => U468_wl(106), wl(105) => U468_wl(105),
wl(104) => U468_wl(104), wl(103) => U468_wl(103),
wl(102) => U468_wl(102), wl(101) => U468_wl(101),
wl(100) => U468_wl(100), wl(99) => U468_wl(99),
wl(98) => U468_wl(98), wl(97) => U468_wl(97),
wl(96) => U468_wl(96), wl(95) => U468_wl(95),
wl(94) => U468_wl(94), wl(93) => U468_wl(93),
wl(92) => U468_wl(92), wl(91) => U468_wl(91),
wl(90) => U468_wl(90), wl(89) => U468_wl(89),
wl(88) => U468_wl(88), wl(87) => U468_wl(87),
wl(86) => U468_wl(86), wl(85) => U468_wl(85),
wl(84) => U468_wl(84), wl(83) => U468_wl(83),
wl(82) => U468_wl(82), wl(81) => U468_wl(81),
wl(80) => U468_wl(80), wl(79) => U468_wl(79),
wl(78) => U468_wl(78), wl(77) => U468_wl(77),
wl(76) => U468_wl(76), wl(75) => U468_wl(75),
wl(74) => U468_wl(74), wl(73) => U468_wl(73),
wl(72) => U468_wl(72), wl(71) => U468_wl(71),
wl(70) => U468_wl(70), wl(69) => U468_wl(69),
wl(68) => U468_wl(68), wl(67) => U468_wl(67),
wl(66) => U468_wl(66), wl(65) => U468_wl(65),
wl(64) => U468_wl(64), wl(63) => U468_wl(63),
wl(62) => U468_wl(62), wl(61) => U468_wl(61),
wl(60) => U468_wl(60), wl(59) => U468_wl(59),
wl(58) => U468_wl(58), wl(57) => U468_wl(57),
wl(56) => U468_wl(56), wl(55) => U468_wl(55),
wl(54) => U468_wl(54), wl(53) => U468_wl(53),
wl(52) => U468_wl(52), wl(51) => U468_wl(51),
wl(50) => U468_wl(50), wl(49) => U468_wl(49),
wl(48) => U468_wl(48), wl(47) => U468_wl(47),
wl(46) => U468_wl(46), wl(45) => U468_wl(45),
wl(44) => U468_wl(44), wl(43) => U468_wl(43),
wl(42) => U468_wl(42), wl(41) => U468_wl(41),
wl(40) => U468_wl(40), wl(39) => U468_wl(39),
wl(38) => U468_wl(38), wl(37) => U468_wl(37), wl(36) => U468_wl(36), wl(35) => U468_wl(35),
wl(34) => U468_wl(34), wl(33) => U468_wl(33),
wl(32) => U468_wl(32), wl(31) => U468_wl(31),
wl(30) => U468_wl(30), wl(29) => U468_wl(29),
wl(28) => U468_wl(28), wl(27) => U468_wl(27),
wl(26) => U468_wl(26), wl(25) => U468_wl(25),
wl(24) => U468_wl(24), wl(23) => U468_wl(23),
wl(22) => U468_wl(22), wl(21) => U468_wl(21),
wl(20) => U468_wl(20), wl(19) => U468_wl(19),
wl(18) => U468_wl(18), wl(17) => U468_wl(17),
wl(16) => U468_wl(16), wl(15) => U468_wl(15),
wl(14) => U468_wl(14), wl(13) => U468_wl(13),
wl(12) => U468_wl(12), wl(11) => U468_wl(11),
wl(10) => U468_wl(10), wl(9) => U468_wl(9), wl(8)
=> U468_wl(8), wl(7) => U468_wl(7), wl(6) =>
U468_wl(6), wl(5) => U468_wl(5), wl(4) =>
U468_wl(4), wl(3) => U468_wl(3), wl(2) =>
U468_wl(2), wl(1) => U468_wl(1), wl(0) =>
U468_wl(0), ml(340) => U496_ml(340), ml(339) =>
U496_ml(339), ml(338) => U496_ml(338), ml(337) =>
U496_ml(337), ml(336) => U496_ml(336), ml(335) =>
U496_ml(335), ml(334) => U496_ml(334), ml(333) =>
U496_ml(333), ml(332) => U496_ml(332), ml(331) =>
U496_ml(331), ml(330) => U496_ml(330), ml(329) =>
U496_ml(329), ml(328) => U496_ml(328), ml(327) =>
U496_ml(327), ml(326) => U496_ml(326), ml(325) =>
U496_ml(325), ml(324) => U496_ml(324), ml(323) =>
U496_ml(323), ml(322) => U496_ml(322), ml(321) =>
U496_ml(321), ml(320) => U496_ml(320), ml(319) =>
U496_ml(319), ml(318) => U496_ml(318), ml(317) =>
U496_ml(317), ml(316) => U496_ml(316), ml(315) =>
U496_ml(315), ml(314) => U496_ml(314), ml(313) =>
U496_ml(313), ml(312) => U496_ml(312), ml(311) =>
U496_ml(311), ml(310) => U496_ml(310), ml(309) =>
U496_ml(309), ml(308) => U496_ml(308), ml(307) =>
U496_ml(307), ml(306) => U496_ml(306), ml(305) =>
U496_ml(305), ml(304) => U496_ml(304), ml(303) =>
U496_ml(303), ml(302) => U496_ml(302), ml(301) =>
U496_ml(301), ml(300) => U496_ml(300), ml(299) =>
U496_ml(299), ml(298) => U496_ml(298), ml(297) =>
U496_ml(297), ml(296) => U496_ml(296), ml(295) =>
U496_ml(295), ml(294) => U496_ml(294), ml(293) =>
U496_ml(293), ml(292) => U496_ml(292), ml(291) =>
U496_ml(291), ml(290) => U496_ml(290), ml(289) =>
U496_ml(289), ml(288) => U496_ml(288), ml(287) =>
U496_ml(287), ml(286) => U496_ml(286), ml(285) =>
U496_ml(285), ml(284) => U496_ml(284), ml(283) =>
U496_ml(283), ml(282) => U496_ml(282), ml(281) =>
U496_ml(281), ml(280) => U496_ml(280), ml(279) =>
U496_ml(279), ml(278) => U496_ml(278), ml(277) =>
U496_ml(277), ml(276) => U496_ml(276), ml(275) =>
U496_ml(275), ml(274) => U496_ml(274), ml(273) =>
U496_ml(273), ml(272) => U496_ml(272), ml(271) =>
U496_ml(271), ml(270) => U496_ml(270), ml(269) =>
U496_ml(269), ml(268) => U496_ml(268), ml(267) =>
U496_ml(267), ml(266) => U496_ml(266), ml(265) =>
U496_ml(265), ml(264) => U496_ml(264), ml(263) =>
U496_ml(263), ml(262) => U496_ml(262), ml(261) =>

U496_ml(261), ml(260) => U496_ml(260), ml(259) =>
U496_ml(259), ml(258) => U496_ml(258), ml(257) =>
U496_ml(257), ml(256) => U496_ml(256), ml(255) =>
U496_ml(255), ml(254) => U496_ml(254), ml(253) =>
U496_ml(253), ml(252) => U496_ml(252), ml(251) =>
U496_ml(251), ml(250) => U496_ml(250), ml(249) =>
U496_ml(249), ml(248) => U496_ml(248), ml(247) =>
U496_ml(247), ml(246) => U496_ml(246), ml(245) =>
U496_ml(245), ml(244) => U496_ml(244), ml(243) =>
U496_ml(243), ml(242) => U496_ml(242), ml(241) =>
U496_ml(241), ml(240) => U496_ml(240), ml(239) =>
U496_ml(239), ml(238) => U496_ml(238), ml(237) =>
U496_ml(237), ml(236) => U496_ml(236), ml(235) =>
U496_ml(235), ml(234) => U496_ml(234), ml(233) =>
U496_ml(233), ml(232) => U496_ml(232), ml(231) =>
U496_ml(231), ml(230) => U496_ml(230), ml(229) =>
U496_ml(229), ml(228) => U496_ml(228), ml(227) =>
U496_ml(227), ml(226) => U496_ml(226), ml(225) =>
U496_ml(225), ml(224) => U496_ml(224), ml(223) =>
U496_ml(223), ml(222) => U496_ml(222), ml(221) =>
U496_ml(221), ml(220) => U496_ml(220), ml(219) =>
U496_ml(219), ml(218) => U496_ml(218), ml(217) =>
U496_ml(217), ml(216) => U496_ml(216), ml(215) =>
U496_ml(215), ml(214) => U496_ml(214), ml(213) =>
U496_ml(213), ml(212) => U496_ml(212), ml(211) =>
U496_ml(211), ml(210) => U496_ml(210), ml(209) =>
U496_ml(209), ml(208) => U496_ml(208), ml(207) =>
U496_ml(207), ml(206) => U496_ml(206), ml(205) =>
U496_ml(205), ml(204) => U496_ml(204), ml(203) =>
U496_ml(203), ml(202) => U496_ml(202), ml(201) =>
U496_ml(201), ml(200) => U496_ml(200), ml(199) =>
U496_ml(199), ml(198) => U496_ml(198), ml(197) =>
U496_ml(197), ml(196) => U496_ml(196), ml(195) =>
U496_ml(195), ml(194) => U496_ml(194), ml(193) =>
U496_ml(193), ml(192) => U496_ml(192), ml(191) =>
U496_ml(191), ml(190) => U496_ml(190), ml(189) =>
U496_ml(189), ml(188) => U496_ml(188), ml(187) =>
U496_ml(187), ml(186) => U496_ml(186), ml(185) =>
U496_ml(185), ml(184) => U496_ml(184), ml(183) =>
U496_ml(183), ml(182) => U496_ml(182), ml(181) =>
U496_ml(181), ml(180) => U496_ml(180), ml(179) =>
U496_ml(179), ml(178) => U496_ml(178), ml(177) =>
U496_ml(177), ml(176) => U496_ml(176), ml(175) =>
U496_ml(175), ml(174) => U496_ml(174), ml(173) =>
U496_ml(173), ml(172) => U496_ml(172), ml(171) =>
U496_ml(171), ml(170) => U496_ml(170), ml(169) =>
U496_ml(169), ml(168) => U496_ml(168), ml(167) =>
U496_ml(167), ml(166) => U496_ml(166), ml(165) =>
U496_ml(165), ml(164) => U496_ml(164), ml(163) =>
U496_ml(163), ml(162) => U496_ml(162), ml(161) =>
U496_ml(161), ml(160) => U496_ml(160), ml(159) =>
U496_ml(159), ml(158) => U496_ml(158), ml(157) =>
U496_ml(157), ml(156) => U496_ml(156), ml(155) =>
U496_ml(155), ml(154) => U496_ml(154), ml(153) =>
U496_ml(153), ml(152) => U496_ml(152), ml(151) =>
U496_ml(151), ml(150) => U496_ml(150), ml(149) =>
U496_ml(149), ml(148) => U496_ml(148), ml(147) =>
U496_ml(147), ml(146) => U496_ml(146), ml(145) =>

U496_ml(145), ml(144) => U496_ml(144), ml(143) =>
U496_ml(143), ml(142) => U496_ml(142), ml(141) =>
U496_ml(141), ml(140) => U496_ml(140), ml(139) =>
U496_ml(139), ml(138) => U496_ml(138), ml(137) =>
U496_ml(137), ml(136) => U496_ml(136), ml(135) =>
U496_ml(135), ml(134) => U496_ml(134), ml(133) =>
U496_ml(133), ml(132) => U496_ml(132), ml(131) =>
U496_ml(131), ml(130) => U496_ml(130), ml(129) =>
U496_ml(129), ml(128) => U496_ml(128), ml(127) =>
U496_ml(127), ml(126) => U496_ml(126), ml(125) =>
U496_ml(125), ml(124) => U496_ml(124), ml(123) =>
U496_ml(123), ml(122) => U496_ml(122), ml(121) =>
U496_ml(121), ml(120) => U496_ml(120), ml(119) =>
U496_ml(119), ml(118) => U496_ml(118), ml(117) =>
U496_ml(117), ml(116) => U496_ml(116), ml(115) =>
U496_ml(115), ml(114) => U496_ml(114), ml(113) =>
U496_ml(113), ml(112) => U496_ml(112), ml(111) =>
U496_ml(111), ml(110) => U496_ml(110), ml(109) =>
U496_ml(109), ml(108) => U496_ml(108), ml(107) =>
U496_ml(107), ml(106) => U496_ml(106), ml(105) =>
U496_ml(105), ml(104) => U496_ml(104), ml(103) =>
U496_ml(103), ml(102) => U496_ml(102), ml(101) =>
U496_ml(101), ml(100) => U496_ml(100), ml(99) =>
U496_ml(99), ml(98) => U496_ml(98), ml(97) =>
U496_ml(97), ml(96) => U496_ml(96), ml(95) =>
U496_ml(95), ml(94) => U496_ml(94), ml(93) =>
U496_ml(93), ml(92) => U496_ml(92), ml(91) =>
U496_ml(91), ml(90) => U496_ml(90), ml(89) =>
U496_ml(89), ml(88) => U496_ml(88), ml(87) =>
U496_ml(87), ml(86) => U496_ml(86), ml(85) =>
U496_ml(85), ml(84) => U496_ml(84), ml(83) =>
U496_ml(83), ml(82) => U496_ml(82), ml(81) =>
U496_ml(81), ml(80) => U496_ml(80), ml(79) =>
U496_ml(79), ml(78) => U496_ml(78), ml(77) =>
U496_ml(77), ml(76) => U496_ml(76), ml(75) =>
U496_ml(75), ml(74) => U496_ml(74), ml(73) =>
U496_ml(73), ml(72) => U496_ml(72), ml(71) =>
U496_ml(71), ml(70) => U496_ml(70), ml(69) =>
U496_ml(69), ml(68) => U496_ml(68), ml(67) =>
U496_ml(67), ml(66) => U496_ml(66), ml(65) =>
U496_ml(65), ml(64) => U496_ml(64), ml(63) =>
U496_ml(63), ml(62) => U496_ml(62), ml(61) =>
U496_ml(61), ml(60) => U496_ml(60), ml(59) =>
U496_ml(59), ml(58) => U496_ml(58), ml(57) =>
U496_ml(57), ml(56) => U496_ml(56), ml(55) =>
U496_ml(55), ml(54) => U496_ml(54), ml(53) =>
U496_ml(53), ml(52) => U496_ml(52), ml(51) =>
U496_ml(51), ml(50) => U496_ml(50), ml(49) =>
U496_ml(49), ml(48) => U496_ml(48), ml(47) =>
U496_ml(47), ml(46) => U496_ml(46), ml(45) =>
U496_ml(45), ml(44) => U496_ml(44), ml(43) =>
U496_ml(43), ml(42) => U496_ml(42), ml(41) =>
U496_ml(41), ml(40) => U496_ml(40), ml(39) =>
U496_ml(39), ml(38) => U496_ml(38), ml(37) =>
U496_ml(37), ml(36) => U496_ml(36), ml(35) =>
U496_ml(35), ml(34) => U496_ml(34), ml(33) =>
U496_ml(33), ml(32) => U496_ml(32), ml(31) =>
U496_ml(31), ml(30) => U496_ml(30), ml(29) =>

U496_ml(29), ml(28) => U496_ml(28), ml(27) =>
U496_ml(27), ml(26) => U496_ml(26), ml(25) =>
U496_ml(25), ml(24) => U496_ml(24), ml(23) =>
U496_ml(23), ml(22) => U496_ml(22), ml(21) =>
U496_ml(21), ml(20) => U496_ml(20), ml(19) =>
U496_ml(19), ml(18) => U496_ml(18), ml(17) =>
U496_ml(17), ml(16) => U496_ml(16), ml(15) =>
U496_ml(15), ml(14) => U496_ml(14), ml(13) =>
U496_ml(13), ml(12) => U496_ml(12), ml(11) =>
U496_ml(11), ml(10) => U496_ml(10), ml(9) =>
U496_ml(9), ml(8) => U496_ml(8), ml(7) =>
U496_ml(7), ml(6) => U496_ml(6), ml(5) =>
U496_ml(5), ml(4) => U496_ml(4), ml(3) =>
U496_ml(3), ml(2) => U496_ml(2), ml(1) =>
U496_ml(1), ml(0) => U496_ml(0), rspen(340) =>
U468_rspen(340), rspen(339) => U468_rspen(339),
rspen(338) => U468_rspen(338), rspen(337) =>
U468_rspen(337), rspen(336) => U468_rspen(336),
rspen(335) => U468_rspen(335), rspen(334) =>
U468_rspen(334), rspen(333) => U468_rspen(333),
rspen(332) => U468_rspen(332), rspen(331) =>
U468_rspen(331), rspen(330) => U468_rspen(330),
rspen(329) => U468_rspen(329), rspen(328) =>
U468_rspen(328), rspen(327) => U468_rspen(327),
rspen(326) => U468_rspen(326), rspen(325) =>
U468_rspen(325), rspen(324) => U468_rspen(324),
rspen(323) => U468_rspen(323), rspen(322) =>
U468_rspen(322), rspen(321) => U468_rspen(321),
rspen(320) => U468_rspen(320), rspen(319) =>
U468_rspen(319), rspen(318) => U468_rspen(318),
rspen(317) => U468_rspen(317), rspen(316) =>
U468_rspen(316), rspen(315) => U468_rspen(315),
rspen(314) => U468_rspen(314), rspen(313) =>
U468_rspen(313), rspen(312) => U468_rspen(312),
rspen(311) => U468_rspen(311), rspen(310) =>
U468_rspen(310), rspen(309) => U468_rspen(309),
rspen(308) => U468_rspen(308), rspen(307) =>
U468_rspen(307), rspen(306) => U468_rspen(306),
rspen(305) => U468_rspen(305), rspen(304) =>
U468_rspen(304), rspen(303) => U468_rspen(303),
rspen(302) => U468_rspen(302), rspen(301) =>
U468_rspen(301), rspen(300) => U468_rspen(300),
rspen(299) => U468_rspen(299), rspen(298) =>
U468_rspen(298), rspen(297) => U468_rspen(297),
rspen(296) => U468_rspen(296), rspen(295) =>
U468_rspen(295), rspen(294) => U468_rspen(294),
rspen(293) => U468_rspen(293), rspen(292) =>
U468_rspen(292), rspen(291) => U468_rspen(291),
rspen(290) => U468_rspen(290), rspen(289) =>
U468_rspen(289), rspen(288) => U468_rspen(288),
rspen(287) => U468_rspen(287), rspen(286) =>
U468_rspen(286), rspen(285) => U468_rspen(285),
rspen(284) => U468_rspen(284), rspen(283) =>
U468_rspen(283), rspen(282) => U468_rspen(282),
rspen(281) => U468_rspen(281), rspen(280) =>
U468_rspen(280), rspen(279) => U468_rspen(279),
rspen(278) => U468_rspen(278), rspen(277) =>
U468_rspen(277), rspen(276) => U468_rspen(276), rspen(275) => U468_rspen(275), rspen(274) => U468_rspen(274), rspen(273) => U468_rspen(273), rspen(272) => U468_rspen(272), rspen(271) => U468_rspen(271), rspen(270) => U468_rspen(270), rspen(269) => U468_rspen(269), rspen(268) => U468_rspen(268), rspen(267) => U468_rspen(267), rspen(266) => U468_rspen(266), rspen(265) => U468_rspen(265), rspen(264) => U468_rspen(264), rspen(263) => U468_rspen(263), rspen(262) => U468_rspen(262), rspen(261) => U468_rspen(261), rspen(260) => U468_rspen(260), rspen(259) => U468_rspen(259), rspen(258) => U468_rspen(258), rspen(257) => U468_rspen(257), rspen(256) => U468_rspen(256), rspen(255) => U468_rspen(255), rspen(254) => U468_rspen(254), rspen(253) => U468_rspen(253), rspen(252) => U468_rspen(252), rspen(251) => U468_rspen(251), rspen(250) => U468_rspen(250), rspen(249) => U468_rspen(249), rspen(248) => U468_rspen(248), rspen(247) => U468_rspen(247), rspen(246) => U468_rspen(246), rspen(245) => U468_rspen(245), rspen(244) => U468_rspen(244), rspen(243) => U468_rspen(243), rspen(242) => U468_rspen(242), rspen(241) => U468_rspen(241), rspen(240) => U468_rspen(240), rspen(239) => U468_rspen(239), rspen(238) => U468_rspen(238), rspen(237) => U468_rspen(237), rspen(236) => U468_rspen(236), rspen(235) => U468_rspen(235), rspen(234) => U468_rspen(234), rspen(233) => U468_rspen(233), rspen(232) => U468_rspen(232), rspen(231) => U468_rspen(231), rspen(230) => U468_rspen(230), rspen(229) => U468_rspen(229), rspen(228) => U468_rspen(228), rspen(227) => U468_rspen(227), rspen(226) => U468_rspen(226), rspen(225) => U468_rspen(225), rspen(224) => U468_rspen(224), rspen(223) => U468_rspen(223), rspen(222) => U468_rspen(222), rspen(221) => U468_rspen(221), rspen(220) => U468_rspen(220), rspen(219) => U468_rspen(219), rspen(218) => U468_rspen(218), rspen(217) => U468_rspen(217), rspen(216) => U468_rspen(216), rspen(215) => U468_rspen(215), rspen(214) => U468_rspen(214), rspen(213) => U468_rspen(213), rspen(212) => U468_rspen(212), rspen(211) => U468_rspen(211), rspen(210) => U468_rspen(210), rspen(209) => U468_rspen(209), rspen(208) => U468_rspen(208), rspen(207) => U468_rspen(207), rspen(206) => U468_rspen(206), rspen(205) => U468_rspen(205), rspen(204) => U468_rspen(204), rspen(203) => U468_rspen(203), rspen(202) => U468_rspen(202), rspen(201) => U468_rspen(201), rspen(200) => U468_rspen(200), rspen(199) => U468_rspen(199), rspen(198) => U468_rspen(198), rspen(197) => U468_rspen(197), rspen(196) => U468_rspen(196), rspen(195) => U468_rspen(195), rspen(194) => U468_rspen(194), rspen(193) => U468_rspen(193), rspen(192) => U468_rspen(192), rspen(191) => U468_rspen(191), rspen(190) => U468_rspen(190), rspen(189) => U468_rspen(189), rspen(188) => U468_rspen(188), rspen(187) => U468_rspen(187), rspen(186) => U468_rspen(186), rspen(185) => U468_rspen(185), rspen(184) => U468_rspen(184), rspen(183) => U468_rspen(183), rspen(182) => U468_rspen(182), rspen(181) => U468_rspen(181), rspen(180) => U468_rspen(180), rspen(179) => U468_rspen(179), rspen(178) => U468_rspen(178), rspen(177) => U468_rspen(177), rspen(176) => U468_rspen(176), rspen(175) => U468_rspen(175), rspen(174) => U468_rspen(174), rspen(173) => U468_rspen(173), rspen(172) => U468_rspen(172), rspen(171) => U468_rspen(171), rspen(170) => U468_rspen(170), rspen(169) => U468_rspen(169), rspen(168) => U468_rspen(168), rspen(167) => U468_rspen(167), rspen(166) => U468_rspen(166), rspen(165) => U468_rspen(165), rspen(164) => U468_rspen(164), rspen(163) => U468_rspen(163), rspen(162) => U468_rspen(162), rspen(161) => U468_rspen(161), rspen(160) => U468_rspen(160), rspen(159) => U468_rspen(159), rspen(158) => U468_rspen(158), rspen(157) => U468_rspen(157), rspen(156) => U468_rspen(156), rspen(155) => U468_rspen(155), rspen(154) => U468_rspen(154), rspen(153) => U468_rspen(153), rspen(152) => U468_rspen(152), rspen(151) => U468_rspen(151), rspen(150) => U468_rspen(150), rspen(149) => U468_rspen(149), rspen(148) => U468_rspen(148), rspen(147) => U468_rspen(147), rspen(146) => U468_rspen(146), rspen(145) => U468_rspen(145), rspen(144) => U468_rspen(144), rspen(143) => U468_rspen(143), rspen(142) => U468_rspen(142), rspen(141) => U468_rspen(141), rspen(140) => U468_rspen(140), rspen(139) => U468_rspen(139), rspen(138) => U468_rspen(138), rspen(137) => U468_rspen(137), rspen(136) => U468_rspen(136), rspen(135) => U468_rspen(135), rspen(134) => U468_rspen(134), rspen(133) => U468_rspen(133), rspen(132) => U468_rspen(132), rspen(131) => U468_rspen(131), rspen(130) => U468_rspen(130), rspen(129) => U468_rspen(129), rspen(128) => U468_rspen(128), rspen(127) => U468_rspen(127), rspen(126) => U468_rspen(126), rspen(125) => U468_rspen(125), rspen(124) => U468_rspen(124), rspen(123) => U468_rspen(123), rspen(122) => U468_rspen(122), rspen(121) => U468_rspen(121), rspen(120) => U468_rspen(120), rspen(119) => U468_rspen(119), rspen(118) => U468_rspen(118), rspen(117) => U468_rspen(117), rspen(116) => U468_rspen(116), rspen(115) => U468_rspen(115), rspen(114) => U468_rspen(114), rspen(113) => U468_rspen(113), rspen(112) => U468_rspen(112), rspen(111) => U468_rspen(111), rspen(110) => U468_rspen(110), rspen(109) => U468_rspen(109), rspen(108) => U468_rspen(108), rspen(107) => U468_rspen(107), rspen(106) => U468_rspen(106), rspen(105) => U468_rspen(105), rspen(104) => U468_rspen(104), rspen(103) => U468_rspen(103), rspen(102) => U468_rspen(102), rspen(101) => U468_rspen(101), rspen(100) => U468_rspen(100), rspen(99) => U468_rspen(99), rspen(98) => U468_rspen(98), rspen(97) => U468_rspen(97), rspen(96) => U468_rspen(96), rspen(95) => U468_rspen(95), rspen(94) => U468_rspen(94), rspen(93) => U468_rspen(93), rspen(92) => U468_rspen(92), rspen(91) => U468_rspen(91), rspen(90) => U468_rspen(90), rspen(89) => U468_rspen(89), rspen(88) => U468_rspen(88), rspen(87) => U468_rspen(87), rspen(86) => U468_rspen(86), rspen(85) => U468_rspen(85), rspen(84) => U468_rspen(84), rspen(83) => U468_rspen(83), rspen(82) => U468_rspen(82), rspen(81) => U468_rspen(81), rspen(80) => U468_rspen(80), rspen(79) => U468_rspen(79), rspen(78) => U468_rspen(78), rspen(77) => U468_rspen(77), rspen(76) => U468_rspen(76), rspen(75) => U468_rspen(75), rspen(74) => U468_rspen(74), rspen(73) => U468_rspen(73), rspen(72) => U468_rspen(72), rspen(71) => U468_rspen(71), rspen(70) => U468_rspen(70), rspen(69) => U468_rspen(69), rspen(68) => U468_rspen(68), rspen(67) => U468_rspen(67), rspen(66) => U468_rspen(66), rspen(65) => U468_rspen(65), rspen(64) => U468_rspen(64), rspen(63) => U468_rspen(63), rspen(62) => U468_rspen(62), rspen(61) => U468_rspen(61), rspen(60) => U468_rspen(60), rspen(59) => U468_rspen(59), rspen(58) => U468_rspen(58), rspen(57) => U468_rspen(57), rspen(56) => U468_rspen(56), rspen(55) => U468_rspen(55), rspen(54) => U468_rspen(54), rspen(53) => U468_rspen(53), rspen(52) => U468_rspen(52), rspen(51) => U468_rspen(51), rspen(50) => U468_rspen(50), rspen(49) => U468_rspen(49), rspen(48) => U468_rspen(48), rspen(47) => U468_rspen(47), rspen(46) => U468_rspen(46), rspen(45) => U468_rspen(45), rspen(44) => U468_rspen(44), rspen(43) => U468_rspen(43), rspen(42) => U468_rspen(42), rspen(41) => U468_rspen(41), rspen(40) => U468_rspen(40), rspen(39) => U468_rspen(39), rspen(38) => U468_rspen(38), rspen(37) => U468_rspen(37), rspen(36) => U468_rspen(36), rspen(35) => U468_rspen(35), rspen(34) => U468_rspen(34), rspen(33) => U468_rspen(33), rspen(32) => U468_rspen(32), rspen(31) => U468_rspen(31), rspen(30) => U468_rspen(30), rspen(29) => U468_rspen(29), rspen(28) => U468_rspen(28), rspen(27) => U468_rspen(27), rspen(26) => U468_rspen(26), rspen(25) => U468_rspen(25), rspen(24) => U468_rspen(24), rspen(23) => U468_rspen(23), rspen(22) => U468_rspen(22), rspen(21) => U468_rspen(21), rspen(20) => U468_rspen(20), rspen(19) => U468_rspen(19), rspen(18) => U468_rspen(18), rspen(17) => U468_rspen(17), rspen(16) => U468_rspen(16), rspen(15) => U468_rspen(15), rspen(14) => U468_rspen(14), rspen(13) => U468_rspen(13), rspen(12) => U468_rspen(12), rspen(11) => U468_rspen(11), rspen(10) => U468_rspen(10), rspen(9) => U468_rspen(9), rspen(8) => U468_rspen(8), rspen(7) => U468_rspen(7), rspen(6) => U468_rspen(6), rspen(5) => U468_rspen(5), rspen(4) => U468_rspen(4), rspen(3) => U468_rspen(3), rspen(2) => U468_rspen(2), rspen(1) => U468_rspen(1), rspen(0) => U468_rspen(0), fwl(340) => U469_fwl(340), fwl(339) => U469_fwl(339), fwl(338) => U469_fwl(338), fwl(337) => U469_fwl(337), fwl(336) => U469_fwl(336), fwl(335) => U469_fwl(335), fwl(334) => U469_fwl(334), fwl(333) => U469_fwl(333), fwl(332) => U469_fwl(332), fwl(331) => U469_fwl(331), fwl(330) => U469_fwl(330), fwl(329) => U469_fwl(329), fwl(328) => U469_fwl(328), fwl(327) => U469_fwl(327), fwl(326) => U469_fwl(326), fwl(325) => U469_fwl(325), fwl(324) => U469_fwl(324), fwl(323) => U469_fwl(323), fwl(322) => U469_fwl(322), fwl(321) => U469_fwl(321), fwl(320) => U469_fwl(320), fwl(319) => U469_fwl(319), fwl(318) => U469_fwl(318), fwl(317) => U469_fwl(317), fwl(316) => U469_fwl(316), fwl(315) => U469_fwl(315), fwl(314) => U469_fwl(314), fwl(313) => U469_fwl(313), fwl(312) => U469_fwl(312), fwl(311) => U469_fwl(311), fwl(310) => U469_fwl(310), fwl(309) => U469_fwl(309), fwl(308) => U469_fwl(308), fwl(307) => U469_fwl(307), fwl(306) => U469_fwl(306), fwl(305) => U469_fwl(305), fwl(304) => U469_fwl(304), fwl(303) => U469_fwl(303), fwl(302) => U469_fwl(302), fwl(301) => U469_fwl(301), fwl(300) => U469_fwl(300), fwl(299) => U469_fwl(299), fwl(298) => U469_fwl(298), fwl(297) => U469_fwl(297), fwl(296) => U469_fwl(296), fwl(295) => U469_fwl(295), fwl(294) => U469_fwl(294), fwl(293) => U469_fwl(293), fwl(292) => U469_fwl(292), fwl(291) => U469_fwl(291), fwl(290) => U469_fwl(290), fwl(289) => U469_fwl(289), fwl(288) => U469_fwl(288), fwl(287) => U469_fwl(287), fwl(286) => U469_fwl(286), fwl(285) => U469_fwl(285), fwl(284) => U469_fwl(284), fwl(283) => U469_fwl(283), fwl(282) => U469_fwl(282), fwl(281) => U469_fwl(281), fwl(280) => U469_fwl(280), fwl(279) => U469_fwl(279), fwl(278) => U469_fwl(278), fwl(277) => U469_fwl(277), fwl(276) => U469_fwl(276), fwl(275) => U469_fwl(275), fwl(274) => U469_fwl(274), fwl(273) => U469_fwl(273), fwl(272) => U469_fwl(272), fwl(271) => U469_fwl(271), fwl(270) => U469_fwl(270), fwl(269) => U469_fwl(269), fwl(268) => U469_fwl(268), fwl(267) => U469_fwl(267), fwl(266) => U469_fwl(266), fwl(265) => U469_fwl(265), fwl(264) => U469_fwl(264), fwl(263) => U469_fwl(263), fwl(262) => U469_fwl(262), fwl(261) => U469_fwl(261), fwl(260) => U469_fwl(260), fwl(259) => U469_fwl(259), fwl(258) => U469_fwl(258), fwl(257) => U469_fwl(257), fwl(256) => U469_fwl(256), fwl(255) => U469_fwl(255), fwl(254) => U469_fwl(254), fwl(253) => U469_fwl(253), fwl(252) => U469_fwl(252), fwl(251) => U469_fwl(251), fwl(250) => U469_fwl(250), fwl(249) => U469_fwl(249), fwl(248) => U469_fwl(248), fwl(247) => U469_fwl(247), fwl(246) => U469_fwl(246), fwl(245) => U469_fwl(245), fwl(244) => U469_fwl(244), fwl(243) => U469_fwl(243), fwl(242) => U469_fwl(242), fwl(241) => U469_fwl(241), fwl(240) => U469_fwl(240), fwl(239) => U469_fwl(239), fwl(238) => U469_fwl(238), fwl(237) => U469_fwl(237), fwl(236) => U469_fwl(236), fwl(235) => U469_fwl(235), fwl(234) => U469_fwl(234), fwl(233) => U469_fwl(233), fwl(232) => U469_fwl(232), fwl(231) => U469_fwl(231), fwl(230) => U469_fwl(230), fwl(229) => U469_fwl(229), fwl(228) => U469_fwl(228), fwl(227) => U469_fwl(227), fwl(226) => U469_fwl(226), fwl(225) => U469_fwl(225), fwl(224) => U469_fwl(224), fwl(223) => U469_fwl(223), fwl(222) => U469_fwl(222), fwl(221) => U469_fwl(221), fwl(220) => U469_fwl(220), fwl(219) => U469_fwl(219), fwl(218) => U469_fwl(218), fwl(217) => U469_fwl(217), fwl(216) => U469_fwl(216), fwl(215) => U469_fwl(215), fwl(214) => U469_fwl(214), fwl(213) => U469_fwl(213), fwl(212) => U469_fwl(212), fwl(211) => U469_fwl(211), fwl(210) => U469_fwl(210), fwl(209) => U469_fwl(209), fwl(208) => U469_fwl(208), fwl(207) => U469_fwl(207), fwl(206) => U469_fwl(206), fwl(205) => U469_fwl(205), fwl(204) => U469_fwl(204), fwl(203) => U469_fwl(203), fwl(202) => U469_fwl(202), fwl(201) => U469_fwl(201), fwl(200) => U469_fwl(200), fwl(199) => U469_fwl(199), fwl(198) => U469_fwl(198), fwl(197) => U469_fwl(197), fwl(196) => U469_fwl(196), fwl(195) => U469_fwl(195), fwl(194) => U469_fwl(194), fwl(193) => U469_fwl(193), fwl(192) => U469_fwl(192), fwl(191) => U469_fwl(191), fwl(190) => U469_fwl(190), fwl(189) => U469_fwl(189), fwl(188) => U469_fwl(188), fwl(187) => U469_fwl(187), fwl(186) => U469_fwl(186), fwl(185) => U469_fwl(185), fwl(184) => U469_fwl(184), fwl(183) => U469_fwl(183), fwl(182) => U469_fwl(182), fwl(181) => U469_fwl(181), fwl(180) => U469_fwl(180), fwl(179) => U469_fwl(179), fwl(178) => U469_fwl(178), fwl(177) => U469_fwl(177), fwl(176) => U469_fwl(176), fwl(175) => U469_fwl(175), fwl(174) => U469_fwl(174), fwl(173) => U469_fwl(173), fwl(172) => U469_fwl(172), fwl(171) => U469_fwl(171), fwl(170) => U469_fwl(170), fwl(169) => U469_fwl(169), fwl(168) => U469_fwl(168), fwl(167) => U469_fwl(167), fwl(166) => U469_fwl(166), fwl(165) => U469_fwl(165), fwl(164) => U469_fwl(164), fwl(163) =>

U469_fwl(163), fwl(162) => U469_fwl(162), fwl(161) => U469_fwl(161), fwl(160) => U469_fwl(160), fwl(159) => U469_fwl(159), fwl(158) => U469_fwl(158), fwl(157) => U469_fwl(157), fwl(156) => U469_fwl(156), fwl(155) => U469_fwl(155), fwl(154) => U469_fwl(154), fwl(153) => U469_fwl(153), fwl(152) => U469_fwl(152), fwl(151) => U469_fwl(151), fwl(150) => U469_fwl(150), fwl(149) => U469_fwl(149), fwl(148) => U469_fwl(148), fwl(147) => U469_fwl(147), fwl(146) => U469_fwl(146), fwl(145) => U469_fwl(145), fwl(144) => U469_fwl(144), fwl(143) => U469_fwl(143), fwl(142) => U469_fwl(142), fwl(141) => U469_fwl(141), fwl(140) => U469_fwl(140), fwl(139) => U469_fwl(139), fwl(138) => U469_fwl(138), fwl(137) => U469_fwl(137), fwl(136) => U469_fwl(136), fwl(135) => U469_fwl(135), fwl(134) => U469_fwl(134), fwl(133) => U469_fwl(133), fwl(132) => U469_fwl(132), fwl(131) => U469_fwl(131), fwl(130) => U469_fwl(130), fwl(129) => U469_fwl(129), fwl(128) => U469_fwl(128), fwl(127) => U469_fwl(127), fwl(126) => U469_fwl(126), fwl(125) => U469_fwl(125), fwl(124) => U469_fwl(124), fwl(123) => U469_fwl(123), fwl(122) => U469_fwl(122), fwl(121) => U469_fwl(121), fwl(120) => U469_fwl(120), fwl(119) => U469_fwl(119), fwl(118) => U469_fwl(118), fwl(117) => U469_fwl(117), fwl(116) => U469_fwl(116), fwl(115) => U469_fwl(115), fwl(114) => U469_fwl(114), fwl(113) => U469_fwl(113), fwl(112) => U469_fwl(112), fwl(111) => U469_fwl(111), fwl(110) => U469_fwl(110), fwl(109) => U469_fwl(109), fwl(108) => U469_fwl(108), fwl(107) => U469_fwl(107), fwl(106) => U469_fwl(106), fwl(105) => U469_fwl(105), fwl(104) => U469_fwl(104), fwl(103) => U469_fwl(103), fwl(102) => U469_fwl(102), fwl(101) => U469_fwl(101), fwl(100) => U469_fwl(100), fwl(99) => U469_fwl(99), fwl(98) => U469_fwl(98), fwl(97) => U469_fwl(97), fwl(96) => U469_fwl(96), fwl(95) => U469_fwl(95), fwl(94) => U469_fwl(94), fwl(93) => U469_fwl(93), fwl(92) => U469_fwl(92), fwl(91) => U469_fwl(91), fwl(90) => U469_fwl(90), fwl(89) => U469_fwl(89), fwl(88) => U469_fwl(88), fwl(87) => U469_fwl(87), fwl(86) => U469_fwl(86), fwl(85) => U469_fwl(85), fwl(84) => U469_fwl(84), fwl(83) => U469_fwl(83), fwl(82) => U469_fwl(82), fwl(81) => U469_fwl(81), fwl(80) => U469_fwl(80), fwl(79) => U469_fwl(79), fwl(78) => U469_fwl(78), fwl(77) => U469_fwl(77), fwl(76) => U469_fwl(76), fwl(75) => U469_fwl(75), fwl(74) => U469_fwl(74), fwl(73) => U469_fwl(73), fwl(72) => U469_fwl(72), fwl(71) => U469_fwl(71), fwl(70) => U469_fwl(70), fwl(69) => U469_fwl(69), fwl(68) => U469_fwl(68), fwl(67) => U469_fwl(67), fwl(66) => U469_fwl(66), fwl(65) => U469_fwl(65), fwl(64) => U469_fwl(64), fwl(63) => U469_fwl(63), fwl(62) => U469_fwl(62), fwl(61) => U469_fwl(61), fwl(60) => U469_fwl(60),

```
fwl(59) => U469_fwl(59), fwl(58) => U469_fwl(58),
fwl(57) => U469_fwl(57), fwl(56) => U469_fwl(56),
fwl(55) => U469_fwl(55), fwl(54) => U469_fwl(54),
fwl(53) => U469_fwl(53), fwl(52) => U469_fwl(52),
fwl(51) => U469_fwl(51), fwl(50) => U469_fwl(50),
fwl(49) => U469_fwl(49), fwl(48) => U469_fwl(48),
fwl(47) => U469_fwl(47), fwl(46) => U469_fwl(46),
fwl(45) => U469_fwl(45), fwl(44) => U469_fwl(44),
fwl(43) => U469_fwl(43), fwl(42) => U469_fwl(42),
fwl(41) => U469_fwl(41), fwl(40) => U469_fwl(40),
fwl(39) => U469_fwl(39), fwl(38) => U469_fwl(38),
fwl(37) => U469_fwl(37), fwl(36) => U469_fwl(36),
fwl(35) => U469_fwl(35), fwl(34) => U469_fwl(34),
fwl(33) => U469_fwl(33), fwl(32) => U469_fwl(32),
fwl(31) => U469_fwl(31), fwl(30) => U469_fwl(30),
fwl(29) => U469_fwl(29), fwl(28) => U469_fwl(28),
fwl(27) => U469_fwl(27), fwl(26) => U469_fwl(26),
fwl(25) => U469_fwl(25), fwl(24) => U469_fwl(24),
fwl(23) => U469_fwl(23), fwl(22) => U469_fwl(22),
fwl(21) => U469_fwl(21), fwl(20) => U469_fwl(20),
fwl(19) => U469_fwl(19), fwl(18) => U469_fwl(18),
fwl(17) => U469_fwl(17), fwl(16) => U469_fwl(16),
fwl(15) => U469_fwl(15), fwl(14) => U469_fwl(14),
fwl(13) => U469_fwl(13), fwl(12) => U469_fwl(12),
fwl(11) => U469_fwl(11), fwl(10) => U469_fwl(10),
fwl(9) => U469_fwl(9), fwl(8) => U469_fwl(8),
fwl(7) => U469_fwl(7), fwl(6) => U469_fwl(6),
fwl(5) => U469_fwl(5), fwl(4) => U469_fwl(4),
fwl(3) => U469_fwl(3), fwl(2) => U469_fwl(2),
fwl(1) => U469_fwl(1), fwl(0) => U469_fwl(0),
fsaen => U487_Z, asaen => U489_Z, prsp => U460_Z,
rsao(71) => rdsao(71), rsao(70) => rdsao(70),
rsao(69) => rdsao(69), rsao(68) => rdsao(68),
rsao(67) => rdsao(67), rsao(66) => rdsao(66),
rsao(65) => rdsao(65), rsao(64) => rdsao(64),
rsao(63) => rdsao(63), rsao(62) => rdsao(62),
rsao(61) => rdsao(61), rsao(60) => rdsao(60),
rsao(59) => rdsao(59), rsao(58) => rdsao(58),
rsao(57) => rdsao(57), rsao(56) => rdsao(56),
rsao(55) => rdsao(55), rsao(54) => rdsao(54),
rsao(53) => rdsao(53), rsao(52) => rdsao(52),
rsao(51) => rdsao(51), rsao(50) => rdsao(50),
rsao(49) => rdsao(49), rsao(48) => rdsao(48),
rsao(47) => rdsao(47), rsao(46) => rdsao(46),
rsao(45) => rdsao(45), rsao(44) => rdsao(44),
rsao(43) => rdsao(43), rsao(42) => rdsao(42),
rsao(41) => rdsao(41), rsao(40) => rdsao(40),
rsao(39) => rdsao(39), rsao(38) => rdsao(38),
rsao(37) => rdsao(37), rsao(36) => rdsao(36),
rsao(35) => rdsao(35), rsao(34) => rdsao(34),
rsao(33) => rdsao(33), rsao(32) => rdsao(32),
rsao(31) => rdsao(31), rsao(30) => rdsao(30),
rsao(29) => rdsao(29), rsao(28) => rdsao(28),
rsao(27) => rdsao(27), rsao(26) => rdsao(26),
rsao(25) => rdsao(25), rsao(24) => rdsao(24),
rsao(23) => rdsao(23), rsao(22) => rdsao(22),
rsao(21) => rdsao(21), rsao(20) => rdsao(20),
rsao(19) => rdsao(19), rsao(18) => rdsao(18),
```

rsao(17) => rdsao(17), rsao(16) => rdsao(16), rsao(15) => rdsao(15), rsao(14) => rdsao(14), rsao(13) => rdsao(13), rsao(12) => rdsao(12), rsao(11) => rdsao(11), rsao(10) => rdsao(10), rsao(9) => rdsao(9), rsao(8) => rdsao(8), rsao(7) => rdsao(7), rsao(6) => rdsao(6), rsao(5) => rdsao(5), rsao(4) => rdsao(4), rsao(3) => rdsao(3), rsao(2) => rdsao(2), rsao(1) => rdsao(1), rsao(0) => rdsao(0), rsp => rsp, prech => U461_Z, bl(71) => U451_o(71), bl(70) => U451_o(70), bl(69) => U451_o(69), bl(68) => U451_o(68), bl(67) => U451_o(67), bl(66) => U451_o(66), bl(65) => U451_o(65), bl(64) => U451_o(64), bl(63) => U451_o(63), bl(62) => U451_o(62), bl(61) => U451_o(61), bl(60) => U451_o(60), bl(59) => U451_o(59), bl(58) => U451_o(58), bl(57) => U451_o(57), bl(56) => U451_o(56), bl(55) => U451_o(55), bl(54) => U451_o(54), bl(53) => U451_o(53), bl(52) => U451_o(52), bl(51) => U451_o(51), bl(50) => U451_o(50), bl(49) => U451_o(49), bl(48) => U451_o(48), bl(47) => U451_o(47), bl(46) => U451_o(46), bl(45) => U451_o(45), bl(44) => U451_o(44), bl(43) => U451_o(43), bl(42) => U451_o(42), bl(41) => U451_o(41), bl(40) => U451_o(40), bl(39) => U451_o(39), bl(38) => U451_o(38), bl(37) => U451_o(37), bl(36) => U451_o(36), bl(35) => U451_o(35), bl(34) => U451_o(34), bl(33) => U451_o(33), bl(32) => U451_o(32), bl(31) => U451_o(31), bl(30) => U451_o(30), bl(29) => U451_o(29), bl(28) => U451_o(28), bl(27) => U451_o(27), bl(26) => U451_o(26), bl(25) => U451_o(25), bl(24) => U451_o(24), bl(23) => U451_o(23), bl(22) => U451_o(22), bl(21) => U451_o(21), bl(20) => U451_o(20), bl(19) => U451_o(19), bl(18) => U451_o(18), bl(17) => U451_o(17), bl(16) => U451_o(16), bl(15) => U451_o(15), bl(14) => U451_o(14), bl(13) => U451_o(13), bl(12) => U451_o(12), bl(11) => U451_o(11), bl(10) => U451_o(10), bl(9) => U451_o(9), bl(8) => U451_o(8), bl(7) => U451_o(7), bl(6) => U451_o(6), bl(5) => U451_o(5), bl(4) => U451_o(4), bl(3) => U451_o(3), bl(2) => U451_o(2), bl(1) => U451_o(1), bl(0) => U451_o(0), disch => U488_Z, f0 => U480_Z, f1 => U481_Z, f2 => U482_Z, ibl(71) => U452_o(71), ibl(70) => U452_o(70), ibl(69) => U452_o(69), ibl(68) => U452_o(68), ibl(67) => U452_o(67), ibl(66) => U452_o(66), ibl(65) => U452_o(65), ibl(64) => U452_o(64), ibl(63) => U452_o(63), ibl(62) => U452_o(62), ibl(61) => U452_o(61), ibl(60) => U452_o(60), ibl(59) => U452_o(59), ibl(58) => U452_o(58), ibl(57) => U452_o(57), ibl(56) => U452_o(56), ibl(55) => U452_o(55), ibl(54) => U452_o(54), ibl(53) => U452_o(53), ibl(52) => U452_o(52), ibl(51) => U452_o(51), ibl(50) => U452_o(50), ibl(49) => U452_o(49), ibl(48) => U452_o(48), ibl(47) => U452_o(47), ibl(46) => U452_o(46),

```
ibl(45) => U452_o(45), ibl(44) => U452_o(44),
ibl(43) => U452_o(43), ibl(42) => U452_o(42),
ibl(41) => U452_o(41), ibl(40) => U452_o(40),
ibl(39) => U452_o(39), ibl(38) => U452_o(38),
ibl(37) => U452_o(37), ibl(36) => U452_o(36),
ibl(35) => U452_o(35), ibl(34) => U452_o(34),
ibl(33) => U452_o(33), ibl(32) => U452_o(32),
ibl(31) => U452_o(31), ibl(30) => U452_o(30),
ibl(29) => U452_o(29), ibl(28) => U452_o(28),
ibl(27) => U452_o(27), ibl(26) => U452_o(26),
ibl(25) => U452_o(25), ibl(24) => U452_o(24),
ibl(23) => U452_o(23), ibl(22) => U452_o(22),
ibl(21) => U452_o(21), ibl(20) => U452_o(20),
ibl(19) => U452_o(19), ibl(18) => U452_o(18),
ibl(17) => U452_o(17), ibl(16) => U452_o(16),
ibl(15) => U452_o(15), ibl(14) => U452_o(14),
ibl(13) => U452_o(13), ibl(12) => U452_o(12),
ibl(11) => U452_o(11), ibl(10) => U452_o(10),
ibl(9) => U452_o(9), ibl(8) => U452_o(8), ibl(7)
=> U452_o(7), ibl(6) => U452_o(6), ibl(5) =>
U452_o(5), ibl(4) => U452_o(4), ibl(3) =>
U452_o(3), ibl(2) => U452_o(2), ibl(1) =>
U452_o(1), ibl(0) => U452_o(0), if0 => if0, if1 =>
U484_ZN, if2 => if2, mask(71) => m(71), mask(70)
=> m(70), mask(69) => m(69), mask(68) => m(68),
mask(67) => m(67), mask(66) => m(66), mask(65) =>
m(65), mask(64) => m(64), mask(63) => m(63),
mask(62) => m(62), mask(61) => m(61), mask(60) =>
m(60), mask(59) => m(59), mask(58) => m(58),
mask(57) => m(57), mask(56) => m(56), mask(55) =>
m(55), mask(54) => m(54), mask(53) => m(53),
mask(52) => m(52), mask(51) => m(51), mask(50) =>
m(50), mask(49) => m(49), mask(48) => m(48),
mask(47) => m(47), mask(46) => m(46), mask(45) =>
m(45), mask(44) => m(44), mask(43) => m(43),
mask(42) => m(42), mask(41) => m(41), mask(40) =>
m(40), mask(39) => m(39), mask(38) => m(38),
mask(37) => m(37), mask(36) => m(36), mask(35) =>
m(35), mask(34) => m(34), mask(33) => m(33),
mask(32) => m(32), mask(31) => m(31), mask(30) =>
m(30), mask(29) => m(29), mask(28) => m(28),
mask(27) => m(27), mask(26) => m(26), mask(25) =>
m(25), mask(24) => m(24), mask(23) => m(23),
mask(22) => m(22), mask(21) => m(21), mask(20) =>
m(20), mask(19) => m(19), mask(18) => m(18),
mask(17) => m(17), mask(16) => m(16), mask(15) =>
m(15), mask(14) => m(14), mask(13) => m(13),
mask(12) => m(12), mask(11) => m(11), mask(10) =>
m(10), mask(9) => m(9), mask(8) => m(8), mask(7)
=> m(7), mask(6) => m(6), mask(5) => m(5), mask(4)
=> m(4), mask(3) => m(3), mask(2) => m(2), mask(1)
=> m(1), mask(0) => m(0), msaen => U490_Z );

U482: ni01d3
  port map ( I => f2, Z => U482_Z );

U480: ni01d3
  port map ( I => f0, Z => U480_Z );
```

```
U481: ni01d3
  port map ( I => f1, Z => U481_Z );

U484: in01d3
  port map ( I => f1, ZN => U484_ZN );

U483: in01d3
  port map ( I => f0, ZN => if0 );

U485: in01d3
  port map ( I => f2, ZN => if2 );

U469: fitag341
  port map ( finit => finit, venb => U462_Z, rstfifoaddr =>
        U463_Z, wenf => U492_o, fful => fful, fwl(340) =>
        U469_fwl(340), fwl(339) => U469_fwl(339), fwl(338)
        => U469_fwl(338), fwl(337) => U469_fwl(337),
        fwl(336) => U469_fwl(336), fwl(335) =>
        U469_fwl(335), fwl(334) => U469_fwl(334), fwl(333)
        => U469_fwl(333), fwl(332) => U469_fwl(332),
        fwl(331) => U469_fwl(331), fwl(330) =>
        U469_fwl(330), fwl(329) => U469_fwl(329), fwl(328)
        => U469_fwl(328), fwl(327) => U469_fwl(327),
        fwl(326) => U469_fwl(326), fwl(325) =>
        U469_fwl(325), fwl(324) => U469_fwl(324), fwl(323)
        => U469_fwl(323), fwl(322) => U469_fwl(322),
        fwl(321) => U469_fwl(321), fwl(320) =>
        U469_fwl(320), fwl(319) => U469_fwl(319), fwl(318)
        => U469_fwl(318), fwl(317) => U469_fwl(317),
        fwl(316) => U469_fwl(316), fwl(315) =>
        U469_fwl(315), fwl(314) => U469_fwl(314), fwl(313)
        => U469_fwl(313), fwl(312) => U469_fwl(312),
        fwl(311) => U469_fwl(311), fwl(310) =>
        U469_fwl(310), fwl(309) => U469_fwl(309), fwl(308)
        => U469_fwl(308), fwl(307) => U469_fwl(307),
        fwl(306) => U469_fwl(306), fwl(305) =>
        U469_fwl(305), fwl(304) => U469_fwl(304), fwl(303)
        => U469_fwl(303), fwl(302) => U469_fwl(302),
        fwl(301) => U469_fwl(301), fwl(300) =>
        U469_fwl(300), fwl(299) => U469_fwl(299), fwl(298)
        => U469_fwl(298), fwl(297) => U469_fwl(297),
        fwl(296) => U469_fwl(296), fwl(295) =>
        U469_fwl(295), fwl(294) => U469_fwl(294), fwl(293)
        => U469_fwl(293), fwl(292) => U469_fwl(292),
        fwl(291) => U469_fwl(291), fwl(290) =>
        U469_fwl(290), fwl(289) => U469_fwl(289), fwl(288)
        => U469_fwl(288), fwl(287) => U469_fwl(287),
        fwl(286) => U469_fwl(286), fwl(285) =>
        U469_fwl(285), fwl(284) => U469_fwl(284), fwl(283)
        => U469_fwl(283), fwl(282) => U469_fwl(282),
        fwl(281) => U469_fwl(281), fwl(280) =>
        U469_fwl(280), fwl(279) => U469_fwl(279), fwl(278)
        => U469_fwl(278), fwl(277) => U469_fwl(277),
        fwl(276) => U469_fwl(276), fwl(275) =>
        U469_fwl(275), fwl(274) => U469_fwl(274), fwl(273)
        => U469_fwl(273), fwl(272) => U469_fwl(272),
        fwl(271) => U469_fwl(271), fwl(270) =>
```

U469_fwl(270), fwl(269) => U469_fwl(269), fwl(268) => U469_fwl(268), fwl(267) => U469_fwl(267), fwl(266) => U469_fwl(266), fwl(265) => U469_fwl(265), fwl(264) => U469_fwl(264), fwl(263) => U469_fwl(263), fwl(262) => U469_fwl(262), fwl(261) => U469_fwl(261), fwl(260) => U469_fwl(260), fwl(259) => U469_fwl(259), fwl(258) => U469_fwl(258), fwl(257) => U469_fwl(257), fwl(256) => U469_fwl(256), fwl(255) => U469_fwl(255), fwl(254) => U469_fwl(254), fwl(253) => U469_fwl(253), fwl(252) => U469_fwl(252), fwl(251) => U469_fwl(251), fwl(250) => U469_fwl(250), fwl(249) => U469_fwl(249), fwl(248) => U469_fwl(248), fwl(247) => U469_fwl(247), fwl(246) => U469_fwl(246), fwl(245) => U469_fwl(245), fwl(244) => U469_fwl(244), fwl(243) => U469_fwl(243), fwl(242) => U469_fwl(242), fwl(241) => U469_fwl(241), fwl(240) => U469_fwl(240), fwl(239) => U469_fwl(239), fwl(238) => U469_fwl(238), fwl(237) => U469_fwl(237), fwl(236) => U469_fwl(236), fwl(235) => U469_fwl(235), fwl(234) => U469_fwl(234), fwl(233) => U469_fwl(233), fwl(232) => U469_fwl(232), fwl(231) => U469_fwl(231), fwl(230) => U469_fwl(230), fwl(229) => U469_fwl(229), fwl(228) => U469_fwl(228), fwl(227) => U469_fwl(227), fwl(226) => U469_fwl(226), fwl(225) => U469_fwl(225), fwl(224) => U469_fwl(224), fwl(223) => U469_fwl(223), fwl(222) => U469_fwl(222), fwl(221) => U469_fwl(221), fwl(220) => U469_fwl(220), fwl(219) => U469_fwl(219), fwl(218) => U469_fwl(218), fwl(217) => U469_fwl(217), fwl(216) => U469_fwl(216), fwl(215) => U469_fwl(215), fwl(214) => U469_fwl(214), fwl(213) => U469_fwl(213), fwl(212) => U469_fwl(212), fwl(211) => U469_fwl(211), fwl(210) => U469_fwl(210), fwl(209) => U469_fwl(209), fwl(208) => U469_fwl(208), fwl(207) => U469_fwl(207), fwl(206) => U469_fwl(206), fwl(205) => U469_fwl(205), fwl(204) => U469_fwl(204), fwl(203) => U469_fwl(203), fwl(202) => U469_fwl(202), fwl(201) => U469_fwl(201), fwl(200) => U469_fwl(200), fwl(199) => U469_fwl(199), fwl(198) => U469_fwl(198), fwl(197) => U469_fwl(197), fwl(196) => U469_fwl(196), fwl(195) => U469_fwl(195), fwl(194) => U469_fwl(194), fwl(193) => U469_fwl(193), fwl(192) => U469_fwl(192), fwl(191) => U469_fwl(191), fwl(190) => U469_fwl(190), fwl(189) => U469_fwl(189), fwl(188) => U469_fwl(188), fwl(187) => U469_fwl(187), fwl(186) => U469_fwl(186), fwl(185) => U469_fwl(185), fwl(184) => U469_fwl(184), fwl(183) => U469_fwl(183), fwl(182) => U469_fwl(182), fwl(181) => U469_fwl(181), fwl(180) => U469_fwl(180), fwl(179) => U469_fwl(179), fwl(178) => U469_fwl(178), fwl(177) => U469_fwl(177), fwl(176) => U469_fwl(176), fwl(175) => U469_fwl(175), fwl(174) => U469_fwl(174), fwl(173)

=> U469_fwl(173), fwl(172) => U469_fwl(172), fwl(171) => U469_fwl(171), fwl(170) => U469_fwl(170), fwl(169) => U469_fwl(169), fwl(168) => U469_fwl(168), fwl(167) => U469_fwl(167), fwl(166) => U469_fwl(166), fwl(165) => U469_fwl(165), fwl(164) => U469_fwl(164), fwl(163) => U469_fwl(163), fwl(162) => U469_fwl(162), fwl(161) => U469_fwl(161), fwl(160) => U469_fwl(160), fwl(159) => U469_fwl(159), fwl(158) => U469_fwl(158), fwl(157) => U469_fwl(157), fwl(156) => U469_fwl(156), fwl(155) => U469_fwl(155), fwl(154) => U469_fwl(154), fwl(153) => U469_fwl(153), fwl(152) => U469_fwl(152), fwl(151) => U469_fwl(151), fwl(150) => U469_fwl(150), fwl(149) => U469_fwl(149), fwl(148) => U469_fwl(148), fwl(147) => U469_fwl(147), fwl(146) => U469_fwl(146), fwl(145) => U469_fwl(145), fwl(144) => U469_fwl(144), fwl(143) => U469_fwl(143), fwl(142) => U469_fwl(142), fwl(141) => U469_fwl(141), fwl(140) => U469_fwl(140), fwl(139) => U469_fwl(139), fwl(138) => U469_fwl(138), fwl(137) => U469_fwl(137), fwl(136) => U469_fwl(136), fwl(135) => U469_fwl(135), fwl(134) => U469_fwl(134), fwl(133) => U469_fwl(133), fwl(132) => U469_fwl(132), fwl(131) => U469_fwl(131), fwl(130) => U469_fwl(130), fwl(129) => U469_fwl(129), fwl(128) => U469_fwl(128), fwl(127) => U469_fwl(127), fwl(126) => U469_fwl(126), fwl(125) => U469_fwl(125), fwl(124) => U469_fwl(124), fwl(123) => U469_fwl(123), fwl(122) => U469_fwl(122), fwl(121) => U469_fwl(121), fwl(120) => U469_fwl(120), fwl(119) => U469_fwl(119), fwl(118) => U469_fwl(118), fwl(117) => U469_fwl(117), fwl(116) => U469_fwl(116), fwl(115) => U469_fwl(115), fwl(114) => U469_fwl(114), fwl(113) => U469_fwl(113), fwl(112) => U469_fwl(112), fwl(111) => U469_fwl(111), fwl(110) => U469_fwl(110), fwl(109) => U469_fwl(109), fwl(108) => U469_fwl(108), fwl(107) => U469_fwl(107), fwl(106) => U469_fwl(106), fwl(105) => U469_fwl(105), fwl(104) => U469_fwl(104), fwl(103) => U469_fwl(103), fwl(102) => U469_fwl(102), fwl(101) => U469_fwl(101), fwl(100) => U469_fwl(100), fwl(99) => U469_fwl(99), fwl(98) => U469_fwl(98), fwl(97) => U469_fwl(97), fwl(96) => U469_fwl(96), fwl(95) => U469_fwl(95), fwl(94) => U469_fwl(94), fwl(93) => U469_fwl(93), fwl(92) => U469_fwl(92), fwl(91) => U469_fwl(91), fwl(90) => U469_fwl(90), fwl(89) => U469_fwl(89), fwl(88) => U469_fwl(88), fwl(87) => U469_fwl(87), fwl(86) => U469_fwl(86), fwl(85) => U469_fwl(85), fwl(84) => U469_fwl(84), fwl(83) => U469_fwl(83), fwl(82) => U469_fwl(82), fwl(81) => U469_fwl(81), fwl(80) => U469_fwl(80), fwl(79) => U469_fwl(79), fwl(78) => U469_fwl(78), fwl(77) => U469_fwl(77), fwl(76) => U469_fwl(76), fwl(75) => U469_fwl(75), fwl(74) => U469_fwl(74), fwl(73) => U469_fwl(73), fwl(72) =>

```
        U469_fwl(72), fwl(71) => U469_fwl(71), fwl(70) =>
        U469_fwl(70), fwl(69) => U469_fwl(69), fwl(68) =>
        U469_fwl(68), fwl(67) => U469_fwl(67), fwl(66) =>
        U469_fwl(66), fwl(65) => U469_fwl(65), fwl(64) =>
        U469_fwl(64), fwl(63) => U469_fwl(63), fwl(62) =>
        U469_fwl(62), fwl(61) => U469_fwl(61), fwl(60) =>
        U469_fwl(60), fwl(59) => U469_fwl(59), fwl(58) =>
        U469_fwl(58), fwl(57) => U469_fwl(57), fwl(56) =>
        U469_fwl(56), fwl(55) => U469_fwl(55), fwl(54) =>
        U469_fwl(54), fwl(53) => U469_fwl(53), fwl(52) =>
        U469_fwl(52), fwl(51) => U469_fwl(51), fwl(50) =>
        U469_fwl(50), fwl(49) => U469_fwl(49), fwl(48) =>
        U469_fwl(48), fwl(47) => U469_fwl(47), fwl(46) =>
        U469_fwl(46), fwl(45) => U469_fwl(45), fwl(44) =>
        U469_fwl(44), fwl(43) => U469_fwl(43), fwl(42) =>
        U469_fwl(42), fwl(41) => U469_fwl(41), fwl(40) =>
        U469_fwl(40), fwl(39) => U469_fwl(39), fwl(38) =>
        U469_fwl(38), fwl(37) => U469_fwl(37), fwl(36) =>
        U469_fwl(36), fwl(35) => U469_fwl(35), fwl(34) =>
        U469_fwl(34), fwl(33) => U469_fwl(33), fwl(32) =>
        U469_fwl(32), fwl(31) => U469_fwl(31), fwl(30) =>
        U469_fwl(30), fwl(29) => U469_fwl(29), fwl(28) =>
        U469_fwl(28), fwl(27) => U469_fwl(27), fwl(26) =>
        U469_fwl(26), fwl(25) => U469_fwl(25), fwl(24) =>
        U469_fwl(24), fwl(23) => U469_fwl(23), fwl(22) =>
        U469_fwl(22), fwl(21) => U469_fwl(21), fwl(20) =>
        U469_fwl(20), fwl(19) => U469_fwl(19), fwl(18) =>
        U469_fwl(18), fwl(17) => U469_fwl(17), fwl(16) =>
        U469_fwl(16), fwl(15) => U469_fwl(15), fwl(14) =>
        U469_fwl(14), fwl(13) => U469_fwl(13), fwl(12) =>
        U469_fwl(12), fwl(11) => U469_fwl(11), fwl(10) =>
        U469_fwl(10), fwl(9) => U469_fwl(9), fwl(8) =>
        U469_fwl(8), fwl(7) => U469_fwl(7), fwl(6) =>
        U469_fwl(6), fwl(5) => U469_fwl(5), fwl(4) =>
        U469_fwl(4), fwl(3) => U469_fwl(3), fwl(2) =>
        U469_fwl(2), fwl(1) => U469_fwl(1), fwl(0) =>
        U469_fwl(0), exen => U465_Z );

U487: ni01d5
  port map ( I => fsaen, Z => U487_Z );

U490: ni01d5
  port map ( I => msaen, Z => U490_Z );

U451: bbuf
  port map ( r(4) => U4944_Z, r(3) => U4943_Z, r(2) => U4942_Z,
        r(1) => U4941_Z, r(0) => U4940_Z, i(71) => bl(71),
        i(70) => bl(70), i(69) => bl(69), i(68) => bl(68),
        i(67) => bl(67), i(66) => bl(66), i(65) => bl(65),
        i(64) => bl(64), i(63) => bl(63), i(62) => bl(62),
        i(61) => bl(61), i(60) => bl(60), i(59) => bl(59),
        i(58) => bl(58), i(57) => bl(57), i(56) => bl(56),
        i(55) => bl(55), i(54) => bl(54), i(53) => bl(53),
        i(52) => bl(52), i(51) => bl(51), i(50) => bl(50),
        i(49) => bl(49), i(48) => bl(48), i(47) => bl(47),
        i(46) => bl(46), i(45) => bl(45), i(44) => bl(44),
        i(43) => bl(43), i(42) => bl(42), i(41) => bl(41),
        i(40) => bl(40), i(39) => bl(39), i(38) => bl(38),
```

```
        i(37) => bl(37), i(36) => bl(36), i(35) => bl(35),
        i(34) => bl(34), i(33) => bl(33), i(32) => bl(32),
        i(31) => bl(31), i(30) => bl(30), i(29) => bl(29),
        i(28) => bl(28), i(27) => bl(27), i(26) => bl(26),
        i(25) => bl(25), i(24) => bl(24), i(23) => bl(23),
        i(22) => bl(22), i(21) => bl(21), i(20) => bl(20),
        i(19) => bl(19), i(18) => bl(18), i(17) => bl(17),
        i(16) => bl(16), i(15) => bl(15), i(14) => bl(14),
        i(13) => bl(13), i(12) => bl(12), i(11) => bl(11),
        i(10) => bl(10), i(9) => bl(9), i(8) => bl(8),
        i(7) => bl(7), i(6) => bl(6), i(5) => bl(5), i(4)
        => bl(4), i(3) => bl(3), i(2) => bl(2), i(1) =>
        bl(1), i(0) => bl(0), o(71) => U451_o(71), o(70)
        => U451_o(70), o(69) => U451_o(69), o(68) =>
        U451_o(68), o(67) => U451_o(67), o(66) =>
        U451_o(66), o(65) => U451_o(65), o(64) =>
        U451_o(64), o(63) => U451_o(63), o(62) =>
        U451_o(62), o(61) => U451_o(61), o(60) =>
        U451_o(60), o(59) => U451_o(59), o(58) =>
        U451_o(58), o(57) => U451_o(57), o(56) =>
        U451_o(56), o(55) => U451_o(55), o(54) =>
        U451_o(54), o(53) => U451_o(53), o(52) =>
        U451_o(52), o(51) => U451_o(51), o(50) =>
        U451_o(50), o(49) => U451_o(49), o(48) =>
        U451_o(48), o(47) => U451_o(47), o(46) =>
        U451_o(46), o(45) => U451_o(45), o(44) =>
        U451_o(44), o(43) => U451_o(43), o(42) =>
        U451_o(42), o(41) => U451_o(41), o(40) =>
        U451_o(40), o(39) => U451_o(39), o(38) =>
        U451_o(38), o(37) => U451_o(37), o(36) =>
        U451_o(36), o(35) => U451_o(35), o(34) =>
        U451_o(34), o(33) => U451_o(33), o(32) =>
        U451_o(32), o(31) => U451_o(31), o(30) =>
        U451_o(30), o(29) => U451_o(29), o(28) =>
        U451_o(28), o(27) => U451_o(27), o(26) =>
        U451_o(26), o(25) => U451_o(25), o(24) =>
        U451_o(24), o(23) => U451_o(23), o(22) =>
        U451_o(22), o(21) => U451_o(21), o(20) =>
        U451_o(20), o(19) => U451_o(19), o(18) =>
        U451_o(18), o(17) => U451_o(17), o(16) =>
        U451_o(16), o(15) => U451_o(15), o(14) =>
        U451_o(14), o(13) => U451_o(13), o(12) =>
        U451_o(12), o(11) => U451_o(11), o(10) =>
        U451_o(10), o(9) => U451_o(9), o(8) => U451_o(8),
        o(7) => U451_o(7), o(6) => U451_o(6), o(5) =>
        U451_o(5), o(4) => U451_o(4), o(3) => U451_o(3),
        o(2) => U451_o(2), o(1) => U451_o(1), o(0) =>
        U451_o(0) );

U462: ni01d5
  port map ( I => venb, Z => U462_Z );

U463: ni01d5
  port map ( I => rstfifoaddr, Z => U463_Z );

U492: double_buf
  port map ( i => wenf, o => U492_o );
```

```
U452: bbuf
  port map ( r(4) => U4944_Z, r(3) => U4943_Z, r(2) => U4942_Z,
        r(1) => U4941_Z, r(0) => U4940_Z, i(71) => ibl(71),
        i(70) => ibl(70), i(69) => ibl(69), i(68) =>
        ibl(68), i(67) => ibl(67), i(66) => ibl(66), i(65)
        => ibl(65), i(64) => ibl(64), i(63) => ibl(63),
        i(62) => ibl(62), i(61) => ibl(61), i(60) =>
        ibl(60), i(59) => ibl(59), i(58) => ibl(58), i(57)
        => ibl(57), i(56) => ibl(56), i(55) => ibl(55),
        i(54) => ibl(54), i(53) => ibl(53), i(52) =>
        ibl(52), i(51) => ibl(51), i(50) => ibl(50), i(49)
        => ibl(49), i(48) => ibl(48), i(47) => ibl(47),
        i(46) => ibl(46), i(45) => ibl(45), i(44) =>
        ibl(44), i(43) => ibl(43), i(42) => ibl(42), i(41)
        => ibl(41), i(40) => ibl(40), i(39) => ibl(39),
        i(38) => ibl(38), i(37) => ibl(37), i(36) =>
        ibl(36), i(35) => ibl(35), i(34) => ibl(34), i(33)
        => ibl(33), i(32) => ibl(32), i(31) => ibl(31),
        i(30) => ibl(30), i(29) => ibl(29), i(28) =>
        ibl(28), i(27) => ibl(27), i(26) => ibl(26), i(25)
        => ibl(25), i(24) => ibl(24), i(23) => ibl(23),
        i(22) => ibl(22), i(21) => ibl(21), i(20) =>
        ibl(20), i(19) => ibl(19), i(18) => ibl(18), i(17)
        => ibl(17), i(16) => ibl(16), i(15) => ibl(15),
        i(14) => ibl(14), i(13) => ibl(13), i(12) =>
        ibl(12), i(11) => ibl(11), i(10) => ibl(10), i(9)
        => ibl(9), i(8) => ibl(8), i(7) => ibl(7), i(6) =>
        ibl(6), i(5) => ibl(5), i(4) => ibl(4), i(3) =>
        ibl(3), i(2) => ibl(2), i(1) => ibl(1), i(0) =>
        ibl(0), o(71) => U452_o(71), o(70) => U452_o(70),
        o(69) => U452_o(69), o(68) => U452_o(68), o(67) =>
        U452_o(67), o(66) => U452_o(66), o(65) =>
        U452_o(65), o(64) => U452_o(64), o(63) =>
        U452_o(63), o(62) => U452_o(62), o(61) =>
        U452_o(61), o(60) => U452_o(60), o(59) =>
        U452_o(59), o(58) => U452_o(58), o(57) =>
        U452_o(57), o(56) => U452_o(56), o(55) =>
        U452_o(55), o(54) => U452_o(54), o(53) =>
        U452_o(53), o(52) => U452_o(52), o(51) =>
        U452_o(51), o(50) => U452_o(50), o(49) =>
        U452_o(49), o(48) => U452_o(48), o(47) =>
        U452_o(47), o(46) => U452_o(46), o(45) =>
        U452_o(45), o(44) => U452_o(44), o(43) =>
        U452_o(43), o(42) => U452_o(42), o(41) =>
        U452_o(41), o(40) => U452_o(40), o(39) =>
        U452_o(39), o(38) => U452_o(38), o(37) =>
        U452_o(37), o(36) => U452_o(36), o(35) =>
        U452_o(35), o(34) => U452_o(34), o(33) =>
        U452_o(33), o(32) => U452_o(32), o(31) =>
        U452_o(31), o(30) => U452_o(30), o(29) =>
        U452_o(29), o(28) => U452_o(28), o(27) =>
        U452_o(27), o(26) => U452_o(26), o(25) =>
        U452_o(25), o(24) => U452_o(24), o(23) =>
        U452_o(23), o(22) => U452_o(22), o(21) =>
        U452_o(21), o(20) => U452_o(20), o(19) =>
        U452_o(19), o(18) => U452_o(18), o(17) =>
        U452_o(17), o(16) => U452_o(16), o(15) =>
        U452_o(15), o(14) => U452_o(14), o(13) =>
```

```
        U452_o(13), o(12) => U452_o(12), o(11) =>
        U452_o(11), o(10) => U452_o(10), o(9) => U452_o(9),
        o(8) => U452_o(8), o(7) => U452_o(7), o(6) =>
        U452_o(6), o(5) => U452_o(5), o(4) => U452_o(4),
        o(3) => U452_o(3), o(2) => U452_o(2), o(1) =>
        U452_o(1), o(0) => U452_o(0) );

U461: ni01d5
  port map ( I => cmp, Z => U461_Z );

U453: ni01d5
  port map ( I => we, Z => U453_Z );

U47871: double_buf
  port map ( i => mask(71), o => m(71) );

U47870: double_buf
  port map ( i => mask(70), o => m(70) );

U47869: double_buf
  port map ( i => mask(69), o => m(69) );

U47868: double_buf
  port map ( i => mask(68), o => m(68) );

U47867: double_buf
  port map ( i => mask(67), o => m(67) );

U47866: double_buf
  port map ( i => mask(66), o => m(66) );

U47865: double_buf
  port map ( i => mask(65), o => m(65) );

U47864: double_buf
  port map ( i => mask(64), o => m(64) );

U47863: double_buf
  port map ( i => mask(63), o => m(63) );

U47862: double_buf
  port map ( i => mask(62), o => m(62) );

U47861: double_buf
  port map ( i => mask(61), o => m(61) );

U47860: double_buf
  port map ( i => mask(60), o => m(60) );

U47859: double_buf
  port map ( i => mask(59), o => m(59) );

U47858: double_buf
  port map ( i => mask(58), o => m(58) );

U47857: double_buf
  port map ( i => mask(57), o => m(57) );
```

```
U47856: double_buf
   port map ( i => mask(56), o => m(56) );

U47855: double_buf
   port map ( i => mask(55), o => m(55) );

U47854: double_buf
   port map ( i => mask(54), o => m(54) );

U47853: double_buf
   port map ( i => mask(53), o => m(53) );

U47852: double_buf
   port map ( i => mask(52), o => m(52) );

U47851: double_buf
   port map ( i => mask(51), o => m(51) );

U47850: double_buf
   port map ( i => mask(50), o => m(50) );

U47849: double_buf
   port map ( i => mask(49), o => m(49) );

U47848: double_buf
   port map ( i => mask(48), o => m(48) );

U47847: double_buf
   port map ( i => mask(47), o => m(47) );

U47846: double_buf
   port map ( i => mask(46), o => m(46) );

U47845: double_buf
   port map ( i => mask(45), o => m(45) );

U47844: double_buf
   port map ( i => mask(44), o => m(44) );

U47843: double_buf
   port map ( i => mask(43), o => m(43) );

U47842: double_buf
   port map ( i => mask(42), o => m(42) );

U47841: double_buf
   port map ( i => mask(41), o => m(41) );

U47840: double_buf
   port map ( i => mask(40), o => m(40) );

U47839: double_buf
   port map ( i => mask(39), o => m(39) );

U47838: double_buf
   port map ( i => mask(38), o => m(38) );

U47837: double_buf
```

```
   port map ( i => mask(37), o => m(37) );

U47836: double_buf
   port map ( i => mask(36), o => m(36) );

U47835: double_buf
   port map ( i => mask(35), o => m(35) );

U47834: double_buf
   port map ( i => mask(34), o => m(34) );

U47833: double_buf
   port map ( i => mask(33), o => m(33) );

U47832: double_buf
   port map ( i => mask(32), o => m(32) );

U47831: double_buf
   port map ( i => mask(31), o => m(31) );

U47830: double_buf
   port map ( i => mask(30), o => m(30) );

U47829: double_buf
   port map ( i => mask(29), o => m(29) );

U47828: double_buf
   port map ( i => mask(28), o => m(28) );

U47827: double_buf
   port map ( i => mask(27), o => m(27) );

U47826: double_buf
   port map ( i => mask(26), o => m(26) );

U47825: double_buf
   port map ( i => mask(25), o => m(25) );

U47824: double_buf
   port map ( i => mask(24), o => m(24) );

U47823: double_buf
   port map ( i => mask(23), o => m(23) );

U47822: double_buf
   port map ( i => mask(22), o => m(22) );

U47821: double_buf
   port map ( i => mask(21), o => m(21) );

U47820: double_buf
   port map ( i => mask(20), o => m(20) );

U47819: double_buf
   port map ( i => mask(19), o => m(19) );

U47818: double_buf
   port map ( i => mask(18), o => m(18) );
```

```
U47817: double_buf
  port map ( i => mask(17), o => m(17) );

U47816: double_buf
  port map ( i => mask(16), o => m(16) );

U47815: double_buf
  port map ( i => mask(15), o => m(15) );

U47814: double_buf
  port map ( i => mask(14), o => m(14) );

U47813: double_buf
  port map ( i => mask(13), o => m(13) );

U47812: double_buf
  port map ( i => mask(12), o => m(12) );

U47811: double_buf
  port map ( i => mask(11), o => m(11) );

U47810: double_buf
  port map ( i => mask(10), o => m(10) );

U4789: double_buf
  port map ( i => mask(9), o => m(9) );

U4788: double_buf
  port map ( i => mask(8), o => m(8) );

U4787: double_buf
  port map ( i => mask(7), o => m(7) );

U4786: double_buf
  port map ( i => mask(6), o => m(6) );

U4785: double_buf
  port map ( i => mask(5), o => m(5) );

U4784: double_buf
  port map ( i => mask(4), o => m(4) );

U4783: double_buf
  port map ( i => mask(3), o => m(3) );

U4782: double_buf
  port map ( i => mask(2), o => m(2) );

U4781: double_buf
  port map ( i => mask(1), o => m(1) );

U4780: double_buf
  port map ( i => mask(0), o => m(0) );

U4944: ni01d5
  port map ( I => rd(4), Z => U4944_Z );
```

```
U4943: ni01d5
   port map ( I => rd(3), Z => U4943_Z );

U4942: ni01d5
   port map ( I => rd(2), Z => U4942_Z );

U4941: ni01d5
   port map ( I => rd(1), Z => U4941_Z );

U4940: ni01d5
   port map ( I => rd(0), Z => U4940_Z );

U460: ni01d5
   port map ( I => prsp, Z => U460_Z );

U458: ni01d5
   port map ( I => mux0, Z => U458_Z );

U459: ni01d5
   port map ( I => setag, Z => U459_Z );

U457: ni01d5
   port map ( I => mux1, Z => U457_Z );

U456: ni01d5
   port map ( I => mux2, Z => U456_Z );

U455: ni01d5
   port map ( I => rstaddr, Z => U455_Z );

so(15) <= so15_local;
so(14) <= so14_local;
so(13) <= so13_local;
so(12) <= so12_local;
so(11) <= so11_local;
so(10) <= so10_local;
so(9) <= so9_local;
so(8) <= so8_local;
so(7) <= so7_local;
so(6) <= so6_local;
so(5) <= so5_local;
so(4) <= so4_local;
so(3) <= so3_local;
so(2) <= so2_local;
so(1) <= so1_local;
so(0) <= sso_local;
no(15) <= nno_local;
no(14) <= no14_local;
no(13) <= no13_local;
no(12) <= no12_local;
no(11) <= no11_local;
no(10) <= no10_local;
no(9) <= no9_local;
no(8) <= no8_local;
no(7) <= no7_local;
no(6) <= no6_local;
no(5) <= no5_local;
no(4) <= no4_local;
```

```
  no(3) <= no3_local;
  no(2) <= no2_local;
  no(1) <= no1_local;
  no(0) <= no0_local;
  sso <= sso_local;
  nno <= nno_local;

end col341_c;
```

```
file: COL341_R.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity col341_r is


   port ( si : in Std_Logic_Vector(15 downto 0) := (others => 'U');
        ni : in Std_Logic_Vector(15 downto 0) := (others => 'U');
        prsp : in Std_Logic := 'U';
        setag : in Std_Logic := 'U';
        resp_in : in Std_Logic := 'U';
        fir_in : in Std_Logic := 'U';
        mux0 : in Std_Logic := 'U';
        mux1 : in Std_Logic := 'U';
        mux2 : in Std_Logic := 'U';
        rstaddr : in Std_Logic := 'U';
        cntinit : in Std_Logic := 'U';
        we : in Std_Logic := 'U';
        ibl : in Std_Logic_Vector(71 downto 0) := (others => 'U');
        bl : in Std_Logic_Vector(71 downto 0) := (others => 'U');
        venb : in Std_Logic := 'U';
        rstfifoaddr : in Std_Logic := 'U';
        wenf : in Std_Logic := 'U';
        finit : in Std_Logic := 'U';
        cmp : in Std_Logic := 'U';
        rd : in Std_Logic_Vector(4 downto 0) := (others => 'U');
        exen : in Std_Logic := 'U';
        nni : in Std_Logic := 'U';
        ssi : in Std_Logic := 'U';
        mask : in Std_Logic_Vector(71 downto 0) := (others => 'U');
        f0 : in Std_Logic := 'U';
        f1 : in Std_Logic := 'U';
        f2 : in Std_Logic := 'U';
        asaen : in Std_Logic := 'U';
        fsaen : in Std_Logic := 'U';
        disch : in Std_Logic := 'U';
        msaen : in Std_Logic := 'U';
        fircnten : in Std_Logic := 'U';

        fful : out Std_Logic := 'U';
        so : out Std_Logic_Vector(15 downto 0) := (others => 'U');
        no : out Std_Logic_Vector(15 downto 0) := (others => 'U');
        count_out : out Std_Logic := 'U';
        sso : out Std_Logic := 'U';
        nno : out Std_Logic := 'U';
        rdsao : out Std_Logic_Vector(71 downto 0) := (others =>
'U');
        rsp : out Std_Logic := 'U' );
```

```
end col341_r;

------------------------------------------------------------------------

architecture col341_r OF col341_r is

   component tag341
      port ( prsp : in Std_Logic;
            setag : in Std_Logic;
            cntinit : in Std_Logic;
            rstaddr : in Std_Logic;
            mux2 : in Std_Logic;
            mux1 : in Std_Logic;
            mux0 : in Std_Logic;
            fir_in : in Std_Logic;
            resp_in : in Std_Logic;
            we : in Std_Logic;
            fn : in Std_Logic_Vector(340 downto 0) := (others =>
'U');
            nn : in Std_Logic_Vector(340 downto 0) := (others =>
'U');
            ns : in Std_Logic_Vector(340 downto 0) := (others =>
'U');
            fs : in Std_Logic_Vector(340 downto 0) := (others =>
'U');
            ml : in Std_Logic_Vector(340 downto 0) := (others =>
'U');
            fircnten : in Std_Logic;

            count : out Std_Logic;
            tag : out Std_Logic_Vector(340 downto 0) := (others =>
'U');
            rspen : out Std_Logic_Vector(340 downto 0) := (others
=> 'U');
            wl : out Std_Logic_Vector(340 downto 0) := (others =>
'U') );
   end component;


   component array341_m
      port ( wl : in Std_Logic_Vector(340 downto 0) := (others =>
'U');
            rspen : in Std_Logic_Vector(340 downto 0) := (others
=> 'U');
            fwl : in Std_Logic_Vector(340 downto 0) := (others =>
'U');
            fsaen : in Std_Logic;
            asaen : in Std_Logic;
            prsp : in Std_Logic;
            prech : in Std_Logic;
            bl : in Std_Logic_Vector(71 downto 0) := (others =>
'U');
            disch : in Std_Logic;
            f0 : in Std_Logic;
            f1 : in Std_Logic;
            f2 : in Std_Logic;
            ibl : in Std_Logic_Vector(71 downto 0) := (others =>
```

```
'U');
            if0 : in Std_Logic;
            if1 : in Std_Logic;
            if2 : in Std_Logic;
            mask : in Std_Logic_Vector(71 downto 0) := (others =>
'U');
            msaen : in Std_Logic;

            ml : out Std_Logic_Vector(340 downto 0) := (others =>
'U');
            rsao : out Std_Logic_Vector(71 downto 0) := (others =>
'U');
            rsp : out Std_Logic );
  end component;


  component fitag341_r
     port ( finit : in Std_Logic;
            venb : in Std_Logic;
            rstfifoaddr : in Std_Logic;
            wenf : in Std_Logic;
            exen : in Std_Logic;

            fful : out Std_Logic;
            fwl : out Std_Logic_Vector(340 downto 0) := (others =>
'U') );
  end component;


  component bbuf
     port ( r : in Std_Logic_Vector(4 downto 0) := (others => 'U');
            i : in Std_Logic_Vector(71 downto 0) := (others =>
'U');

            o : out Std_Logic_Vector(71 downto 0) := (others =>
'U') );
  end component;

  component double_buf
     port ( i : in Std_Logic;

            o : out Std_Logic );
  end component;


  signal so15_local, so14_local, so13_local, so12_local, so11_local,
       so10_local, so9_local, so8_local, so7_local, so6_local,
       so5_local, so4_local, so3_local, so2_local, so1_local,
       sso_local, nno_local, no14_local, no13_local, no12_local,
       no11_local, no10_local, no9_local, no8_local, no7_local,
       no6_local, no5_local, no4_local, no3_local, no2_local,
       no1_local, no0_local: Std_Logic;
  signal if2 : Std_Logic;
  signal U465_Z : Std_Logic;
  signal U471_fwl : Std_Logic_Vector(340 downto 0);
  signal U492_o : Std_Logic;
  signal U463_Z : Std_Logic;
  signal U462_Z : Std_Logic;
```

```
signal U487_Z : Std_Logic;
signal U485_ZN : Std_Logic;
signal U451_o : Std_Logic_Vector(71 downto 0);
signal if0 : Std_Logic;
signal U482_Z : Std_Logic;
signal U483_Z : Std_Logic;
signal U481_Z : Std_Logic;
signal U490_Z : Std_Logic;
signal U468_wl : Std_Logic_Vector(340 downto 0);
signal U468_rspen : Std_Logic_Vector(340 downto 0);
signal U496_ml : Std_Logic_Vector(340 downto 0);
signal U489_Z : Std_Logic;
signal U488_Z : Std_Logic;
signal U460_Z : Std_Logic;
signal U461_Z : Std_Logic;
signal U452_o : Std_Logic_Vector(71 downto 0);
signal m : Std_Logic_Vector(71 downto 0);
signal U453_Z : Std_Logic;
signal U4944_Z : Std_Logic;
signal U4943_Z : Std_Logic;
signal U4942_Z : Std_Logic;
signal U4941_Z : Std_Logic;
signal U4940_Z : Std_Logic;
signal S1 : Std_Logic;
signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal S9 : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal fn : Std_Logic_Vector(340 downto 32);
signal S17 : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal S25 : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
signal S33 : Std_Logic;
signal S34 : Std_Logic;
```

```
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal S49 : Std_Logic;
signal S50 : Std_Logic;
signal S51 : Std_Logic;
signal S52 : Std_Logic;
signal S53 : Std_Logic;
signal S54 : Std_Logic;
signal S55 : Std_Logic;
signal S56 : Std_Logic;
signal S57 : Std_Logic;
signal S58 : Std_Logic;
signal S59 : Std_Logic;
signal S60 : Std_Logic;
signal S61 : Std_Logic;
signal S62 : Std_Logic;
signal S63 : Std_Logic;
signal S64 : Std_Logic;
signal S65 : Std_Logic;
signal S66 : Std_Logic;
signal S67 : Std_Logic;
signal S68 : Std_Logic;
signal S69 : Std_Logic;
signal S70 : Std_Logic;
signal S71 : Std_Logic;
signal S72 : Std_Logic;
signal S73 : Std_Logic;
signal S74 : Std_Logic;
signal S75 : Std_Logic;
signal S76 : Std_Logic;
signal S77 : Std_Logic;
signal S78 : Std_Logic;
signal S79 : Std_Logic;
signal S80 : Std_Logic;
signal S81 : Std_Logic;
signal S82 : Std_Logic;
signal S83 : Std_Logic;
signal S84 : Std_Logic;
signal S85 : Std_Logic;
signal S86 : Std_Logic;
signal S87 : Std_Logic;
signal S88 : Std_Logic;
signal S89 : Std_Logic;
signal S90 : Std_Logic;
signal S91 : Std_Logic;
signal S92 : Std_Logic;
```

```
signal S93 : Std_Logic;
signal S94 : Std_Logic;
signal S95 : Std_Logic;
signal S96 : Std_Logic;
signal S97 : Std_Logic;
signal S98 : Std_Logic;
signal S99 : Std_Logic;
signal S100 : Std_Logic;
signal S101 : Std_Logic;
signal S102 : Std_Logic;
signal S103 : Std_Logic;
signal S104 : Std_Logic;
signal S105 : Std_Logic;
signal S106 : Std_Logic;
signal S107 : Std_Logic;
signal S108 : Std_Logic;
signal S109 : Std_Logic;
signal S110 : Std_Logic;
signal S111 : Std_Logic;
signal S112 : Std_Logic;
signal S113 : Std_Logic;
signal S114 : Std_Logic;
signal S115 : Std_Logic;
signal S116 : Std_Logic;
signal S117 : Std_Logic;
signal S118 : Std_Logic;
signal S119 : Std_Logic;
signal S120 : Std_Logic;
signal S121 : Std_Logic;
signal S122 : Std_Logic;
signal S123 : Std_Logic;
signal S124 : Std_Logic;
signal S125 : Std_Logic;
signal S126 : Std_Logic;
signal S127 : Std_Logic;
signal S128 : Std_Logic;
signal S129 : Std_Logic;
signal S130 : Std_Logic;
signal S131 : Std_Logic;
signal S132 : Std_Logic;
signal S133 : Std_Logic;
signal S134 : Std_Logic;
signal S135 : Std_Logic;
signal S136 : Std_Logic;
signal S137 : Std_Logic;
signal S138 : Std_Logic;
signal S139 : Std_Logic;
signal S140 : Std_Logic;
signal S141 : Std_Logic;
signal S142 : Std_Logic;
signal S143 : Std_Logic;
signal S144 : Std_Logic;
signal S145 : Std_Logic;
signal S146 : Std_Logic;
signal S147 : Std_Logic;
signal S148 : Std_Logic;
signal S149 : Std_Logic;
signal S150 : Std_Logic;
```

```
signal S151 : Std_Logic;
signal S152 : Std_Logic;
signal S153 : Std_Logic;
signal S154 : Std_Logic;
signal S155 : Std_Logic;
signal S156 : Std_Logic;
signal S157 : Std_Logic;
signal S158 : Std_Logic;
signal S159 : Std_Logic;
signal S160 : Std_Logic;
signal S161 : Std_Logic;
signal S162 : Std_Logic;
signal S163 : Std_Logic;
signal S164 : Std_Logic;
signal S165 : Std_Logic;
signal S166 : Std_Logic;
signal S167 : Std_Logic;
signal S168 : Std_Logic;
signal S169 : Std_Logic;
signal S170 : Std_Logic;
signal S171 : Std_Logic;
signal S172 : Std_Logic;
signal S173 : Std_Logic;
signal S174 : Std_Logic;
signal S175 : Std_Logic;
signal S176 : Std_Logic;
signal S177 : Std_Logic;
signal S178 : Std_Logic;
signal S179 : Std_Logic;
signal S180 : Std_Logic;
signal S181 : Std_Logic;
signal S182 : Std_Logic;
signal S183 : Std_Logic;
signal S184 : Std_Logic;
signal S185 : Std_Logic;
signal S186 : Std_Logic;
signal S187 : Std_Logic;
signal S188 : Std_Logic;
signal S189 : Std_Logic;
signal S190 : Std_Logic;
signal S191 : Std_Logic;
signal S192 : Std_Logic;
signal S193 : Std_Logic;
signal S194 : Std_Logic;
signal S195 : Std_Logic;
signal S196 : Std_Logic;
signal S197 : Std_Logic;
signal S198 : Std_Logic;
signal S199 : Std_Logic;
signal S200 : Std_Logic;
signal S201 : Std_Logic;
signal S202 : Std_Logic;
signal S203 : Std_Logic;
signal S204 : Std_Logic;
signal S205 : Std_Logic;
signal S206 : Std_Logic;
signal S207 : Std_Logic;
signal S208 : Std_Logic;
```

```
signal S209 : Std_Logic;
signal S210 : Std_Logic;
signal S211 : Std_Logic;
signal S212 : Std_Logic;
signal S213 : Std_Logic;
signal S214 : Std_Logic;
signal S215 : Std_Logic;
signal S216 : Std_Logic;
signal S217 : Std_Logic;
signal S218 : Std_Logic;
signal S219 : Std_Logic;
signal S220 : Std_Logic;
signal S221 : Std_Logic;
signal S222 : Std_Logic;
signal S223 : Std_Logic;
signal S224 : Std_Logic;
signal S225 : Std_Logic;
signal S226 : Std_Logic;
signal S227 : Std_Logic;
signal S228 : Std_Logic;
signal S229 : Std_Logic;
signal S230 : Std_Logic;
signal S231 : Std_Logic;
signal S232 : Std_Logic;
signal S233 : Std_Logic;
signal S234 : Std_Logic;
signal S235 : Std_Logic;
signal S236 : Std_Logic;
signal S237 : Std_Logic;
signal S238 : Std_Logic;
signal S239 : Std_Logic;
signal S240 : Std_Logic;
signal S241 : Std_Logic;
signal S242 : Std_Logic;
signal S243 : Std_Logic;
signal S244 : Std_Logic;
signal S245 : Std_Logic;
signal S246 : Std_Logic;
signal S247 : Std_Logic;
signal S248 : Std_Logic;
signal S249 : Std_Logic;
signal S250 : Std_Logic;
signal S251 : Std_Logic;
signal S252 : Std_Logic;
signal S253 : Std_Logic;
signal S254 : Std_Logic;
signal S255 : Std_Logic;
signal S256 : Std_Logic;
signal S257 : Std_Logic;
signal S258 : Std_Logic;
signal S259 : Std_Logic;
signal S260 : Std_Logic;
signal S261 : Std_Logic;
signal S262 : Std_Logic;
signal S263 : Std_Logic;
signal S264 : Std_Logic;
signal S265 : Std_Logic;
signal S266 : Std_Logic;
```

```
signal S267 : Std_Logic;
signal S268 : Std_Logic;
signal S269 : Std_Logic;
signal S270 : Std_Logic;
signal S271 : Std_Logic;
signal S272 : Std_Logic;
signal S273 : Std_Logic;
signal S274 : Std_Logic;
signal S275 : Std_Logic;
signal S276 : Std_Logic;
signal S277 : Std_Logic;
signal S278 : Std_Logic;
signal S279 : Std_Logic;
signal S280 : Std_Logic;
signal S281 : Std_Logic;
signal S282 : Std_Logic;
signal S283 : Std_Logic;
signal S284 : Std_Logic;
signal S285 : Std_Logic;
signal S286 : Std_Logic;
signal S287 : Std_Logic;
signal S288 : Std_Logic;
signal S289 : Std_Logic;
signal S290 : Std_Logic;
signal S291 : Std_Logic;
signal S292 : Std_Logic;
signal S293 : Std_Logic;
signal S294 : Std_Logic;
signal S295 : Std_Logic;
signal S296 : Std_Logic;
signal S297 : Std_Logic;
signal S298 : Std_Logic;
signal S299 : Std_Logic;
signal S300 : Std_Logic;
signal S301 : Std_Logic;
signal S302 : Std_Logic;
signal S303 : Std_Logic;
signal S304 : Std_Logic;
signal S305 : Std_Logic;
signal S306 : Std_Logic;
signal S307 : Std_Logic;
signal S308 : Std_Logic;
signal S309 : Std_Logic;
signal S310 : Std_Logic;
signal S311 : Std_Logic;
signal S312 : Std_Logic;
signal S313 : Std_Logic;
signal S314 : Std_Logic;
signal S315 : Std_Logic;
signal S316 : Std_Logic;
signal S317 : Std_Logic;
signal S318 : Std_Logic;
signal S319 : Std_Logic;
signal S320 : Std_Logic;
signal S321 : Std_Logic;
signal S322 : Std_Logic;
signal S323 : Std_Logic;
signal S324 : Std_Logic;
```

```
signal S325 : Std_Logic;
signal S326 : Std_Logic;
signal S327 : Std_Logic;
signal S328 : Std_Logic;
signal S329 : Std_Logic;
signal S330 : Std_Logic;
signal S331 : Std_Logic;
signal S332 : Std_Logic;
signal S333 : Std_Logic;
signal S334 : Std_Logic;
signal S335 : Std_Logic;
signal S336 : Std_Logic;
signal S337 : Std_Logic;
signal S338 : Std_Logic;
signal S339 : Std_Logic;
signal S340 : Std_Logic;
signal S341 : Std_Logic;
signal S342 : Std_Logic;
signal S343 : Std_Logic;
signal S344 : Std_Logic;
signal S345 : Std_Logic;
signal S346 : Std_Logic;
signal S347 : Std_Logic;
signal S348 : Std_Logic;
signal S349 : Std_Logic;
signal S350 : Std_Logic;
signal S351 : Std_Logic;
signal S352 : Std_Logic;
signal S353 : Std_Logic;
signal S354 : Std_Logic;
signal S355 : Std_Logic;
signal S356 : Std_Logic;
signal S357 : Std_Logic;
signal S358 : Std_Logic;
signal S359 : Std_Logic;
signal S360 : Std_Logic;
signal S361 : Std_Logic;
signal S362 : Std_Logic;
signal S363 : Std_Logic;
signal S364 : Std_Logic;
signal S365 : Std_Logic;
signal S366 : Std_Logic;
signal S367 : Std_Logic;
signal S368 : Std_Logic;
signal S369 : Std_Logic;
signal S370 : Std_Logic;
signal S371 : Std_Logic;
signal S372 : Std_Logic;
signal S373 : Std_Logic;
signal S374 : Std_Logic;
signal S375 : Std_Logic;
signal S376 : Std_Logic;
signal S377 : Std_Logic;
signal S378 : Std_Logic;
signal S379 : Std_Logic;
signal S380 : Std_Logic;
signal S381 : Std_Logic;
signal S382 : Std_Logic;
```

```
signal S383 : Std_Logic;
signal S384 : Std_Logic;
signal S385 : Std_Logic;
signal S386 : Std_Logic;
signal S387 : Std_Logic;
signal S388 : Std_Logic;
signal S389 : Std_Logic;
signal S390 : Std_Logic;
signal S391 : Std_Logic;
signal S392 : Std_Logic;
signal S393 : Std_Logic;
signal S394 : Std_Logic;
signal S395 : Std_Logic;
signal S396 : Std_Logic;
signal S397 : Std_Logic;
signal S398 : Std_Logic;
signal S399 : Std_Logic;
signal S400 : Std_Logic;
signal S401 : Std_Logic;
signal S402 : Std_Logic;
signal S403 : Std_Logic;
signal S404 : Std_Logic;
signal S405 : Std_Logic;
signal S406 : Std_Logic;
signal S407 : Std_Logic;
signal S408 : Std_Logic;
signal S409 : Std_Logic;
signal S410 : Std_Logic;
signal S411 : Std_Logic;
signal S412 : Std_Logic;
signal S413 : Std_Logic;
signal S414 : Std_Logic;
signal S415 : Std_Logic;
signal S416 : Std_Logic;
signal S417 : Std_Logic;
signal S418 : Std_Logic;
signal S419 : Std_Logic;
signal S420 : Std_Logic;
signal S421 : Std_Logic;
signal S422 : Std_Logic;
signal S423 : Std_Logic;
signal S424 : Std_Logic;
signal S425 : Std_Logic;
signal S426 : Std_Logic;
signal S427 : Std_Logic;
signal S428 : Std_Logic;
signal S429 : Std_Logic;
signal S430 : Std_Logic;
signal S431 : Std_Logic;
signal S432 : Std_Logic;
signal S433 : Std_Logic;
signal S434 : Std_Logic;
signal S435 : Std_Logic;
signal S436 : Std_Logic;
signal S437 : Std_Logic;
signal S438 : Std_Logic;
signal S439 : Std_Logic;
signal S440 : Std_Logic;
```

```
signal S441 : Std_Logic;
signal S442 : Std_Logic;
signal S443 : Std_Logic;
signal S444 : Std_Logic;
signal S445 : Std_Logic;
signal S446 : Std_Logic;
signal S447 : Std_Logic;
signal S448 : Std_Logic;
signal S449 : Std_Logic;
signal S450 : Std_Logic;
signal S451 : Std_Logic;
signal S452 : Std_Logic;
signal S453 : Std_Logic;
signal S454 : Std_Logic;
signal S455 : Std_Logic;
signal S456 : Std_Logic;
signal S457 : Std_Logic;
signal S458 : Std_Logic;
signal S459 : Std_Logic;
signal S460 : Std_Logic;
signal S461 : Std_Logic;
signal S462 : Std_Logic;
signal S463 : Std_Logic;
signal S464 : Std_Logic;
signal S465 : Std_Logic;
signal S466 : Std_Logic;
signal S467 : Std_Logic;
signal S468 : Std_Logic;
signal S469 : Std_Logic;
signal S470 : Std_Logic;
signal S471 : Std_Logic;
signal S472 : Std_Logic;
signal S473 : Std_Logic;
signal S474 : Std_Logic;
signal S475 : Std_Logic;
signal S476 : Std_Logic;
signal S477 : Std_Logic;
signal S478 : Std_Logic;
signal S479 : Std_Logic;
signal S480 : Std_Logic;
signal S481 : Std_Logic;
signal S482 : Std_Logic;
signal S483 : Std_Logic;
signal S484 : Std_Logic;
signal S485 : Std_Logic;
signal S486 : Std_Logic;
signal S487 : Std_Logic;
signal S488 : Std_Logic;
signal S489 : Std_Logic;
signal S490 : Std_Logic;
signal S491 : Std_Logic;
signal S492 : Std_Logic;
signal S493 : Std_Logic;
signal S494 : Std_Logic;
signal S495 : Std_Logic;
signal S496 : Std_Logic;
signal S497 : Std_Logic;
signal S498 : Std_Logic;
```

```
signal S499 : Std_Logic;
signal S500 : Std_Logic;
signal S501 : Std_Logic;
signal S502 : Std_Logic;
signal S503 : Std_Logic;
signal S504 : Std_Logic;
signal S505 : Std_Logic;
signal S506 : Std_Logic;
signal S507 : Std_Logic;
signal S508 : Std_Logic;
signal S509 : Std_Logic;
signal S510 : Std_Logic;
signal S511 : Std_Logic;
signal S512 : Std_Logic;
signal S513 : Std_Logic;
signal S514 : Std_Logic;
signal S515 : Std_Logic;
signal S516 : Std_Logic;
signal S517 : Std_Logic;
signal S518 : Std_Logic;
signal S519 : Std_Logic;
signal S520 : Std_Logic;
signal S521 : Std_Logic;
signal S522 : Std_Logic;
signal S523 : Std_Logic;
signal S524 : Std_Logic;
signal S525 : Std_Logic;
signal S526 : Std_Logic;
signal S527 : Std_Logic;
signal S528 : Std_Logic;
signal S529 : Std_Logic;
signal S530 : Std_Logic;
signal S531 : Std_Logic;
signal S532 : Std_Logic;
signal S533 : Std_Logic;
signal S534 : Std_Logic;
signal S535 : Std_Logic;
signal S536 : Std_Logic;
signal S537 : Std_Logic;
signal S538 : Std_Logic;
signal S539 : Std_Logic;
signal S540 : Std_Logic;
signal S541 : Std_Logic;
signal S542 : Std_Logic;
signal S543 : Std_Logic;
signal S544 : Std_Logic;
signal S545 : Std_Logic;
signal S546 : Std_Logic;
signal S547 : Std_Logic;
signal S548 : Std_Logic;
signal S549 : Std_Logic;
signal S550 : Std_Logic;
signal S551 : Std_Logic;
signal S552 : Std_Logic;
signal S553 : Std_Logic;
signal S554 : Std_Logic;
signal S555 : Std_Logic;
signal S556 : Std_Logic;
```

```
signal S557 : Std_Logic;
signal S558 : Std_Logic;
signal S559 : Std_Logic;
signal S560 : Std_Logic;
signal S561 : Std_Logic;
signal S562 : Std_Logic;
signal S563 : Std_Logic;
signal S564 : Std_Logic;
signal S565 : Std_Logic;
signal S566 : Std_Logic;
signal S567 : Std_Logic;
signal S568 : Std_Logic;
signal S569 : Std_Logic;
signal S570 : Std_Logic;
signal S571 : Std_Logic;
signal S572 : Std_Logic;
signal S573 : Std_Logic;
signal S574 : Std_Logic;
signal S575 : Std_Logic;
signal S576 : Std_Logic;
signal S577 : Std_Logic;
signal S578 : Std_Logic;
signal S579 : Std_Logic;
signal S580 : Std_Logic;
signal S581 : Std_Logic;
signal S582 : Std_Logic;
signal S583 : Std_Logic;
signal S584 : Std_Logic;
signal S585 : Std_Logic;
signal S586 : Std_Logic;
signal S587 : Std_Logic;
signal S588 : Std_Logic;
signal S589 : Std_Logic;
signal S590 : Std_Logic;
signal S591 : Std_Logic;
signal S592 : Std_Logic;
signal S593 : Std_Logic;
signal S594 : Std_Logic;
signal S595 : Std_Logic;
signal S596 : Std_Logic;
signal S597 : Std_Logic;
signal S598 : Std_Logic;
signal S599 : Std_Logic;
signal S600 : Std_Logic;
signal S601 : Std_Logic;
signal S602 : Std_Logic;
signal S603 : Std_Logic;
signal S604 : Std_Logic;
signal S605 : Std_Logic;
signal S606 : Std_Logic;
signal S607 : Std_Logic;
signal S608 : Std_Logic;
signal S609 : Std_Logic;
signal S610 : Std_Logic;
signal S611 : Std_Logic;
signal S612 : Std_Logic;
signal S613 : Std_Logic;
signal S614 : Std_Logic;
```

```
signal S615 : Std_Logic;
signal S616 : Std_Logic;
signal S617 : Std_Logic;
signal S618 : Std_Logic;
signal S619 : Std_Logic;
signal S620 : Std_Logic;
signal S621 : Std_Logic;
signal S622 : Std_Logic;
signal S623 : Std_Logic;
signal S624 : Std_Logic;
signal S625 : Std_Logic;
signal S626 : Std_Logic;
signal S627 : Std_Logic;
signal S628 : Std_Logic;
signal S629 : Std_Logic;
signal S630 : Std_Logic;
signal S631 : Std_Logic;
signal S632 : Std_Logic;
signal S633 : Std_Logic;
signal S634 : Std_Logic;
signal S635 : Std_Logic;
signal S636 : Std_Logic;
signal S637 : Std_Logic;
signal S638 : Std_Logic;
signal S639 : Std_Logic;
signal S640 : Std_Logic;
signal S641 : Std_Logic;
signal S642 : Std_Logic;
signal S643 : Std_Logic;
signal S644 : Std_Logic;
signal S645 : Std_Logic;
signal S646 : Std_Logic;
signal S647 : Std_Logic;
signal S648 : Std_Logic;
signal S649 : Std_Logic;
signal S650 : Std_Logic;
signal S651 : Std_Logic;
signal S652 : Std_Logic;
signal S653 : Std_Logic;
signal S654 : Std_Logic;
signal S655 : Std_Logic;
signal S656 : Std_Logic;
signal S657 : Std_Logic;
signal S658 : Std_Logic;
signal S659 : Std_Logic;
signal S660 : Std_Logic;
signal S661 : Std_Logic;
signal S662 : Std_Logic;
signal S663 : Std_Logic;
signal S664 : Std_Logic;
signal S665 : Std_Logic;
signal S666 : Std_Logic;
signal S667 : Std_Logic;
signal S668 : Std_Logic;
signal S669 : Std_Logic;
signal S670 : Std_Logic;
signal S671 : Std_Logic;
signal S672 : Std_Logic;
```

```
signal S673 : Std_Logic;
signal S674 : Std_Logic;
signal S675 : Std_Logic;
signal S676 : Std_Logic;
signal S677 : Std_Logic;
signal S678 : Std_Logic;
signal S679 : Std_Logic;
signal S680 : Std_Logic;
signal S681 : Std_Logic;
signal S682 : Std_Logic;
signal S683 : Std_Logic;
signal S684 : Std_Logic;
signal S685 : Std_Logic;
signal S686 : Std_Logic;
signal S687 : Std_Logic;
signal S688 : Std_Logic;
signal S689 : Std_Logic;
signal S690 : Std_Logic;
signal S691 : Std_Logic;
signal S692 : Std_Logic;
signal S693 : Std_Logic;
signal S694 : Std_Logic;
signal S695 : Std_Logic;
signal S696 : Std_Logic;
signal S697 : Std_Logic;
signal S698 : Std_Logic;
signal S699 : Std_Logic;
signal S700 : Std_Logic;
signal S701 : Std_Logic;
signal S702 : Std_Logic;
signal S703 : Std_Logic;
signal S704 : Std_Logic;
signal S705 : Std_Logic;
signal S706 : Std_Logic;
signal S707 : Std_Logic;
signal S708 : Std_Logic;
signal S709 : Std_Logic;
signal S710 : Std_Logic;
signal S711 : Std_Logic;
signal S712 : Std_Logic;
signal S713 : Std_Logic;
signal S714 : Std_Logic;
signal S715 : Std_Logic;
signal S716 : Std_Logic;
signal S717 : Std_Logic;
signal S718 : Std_Logic;
signal S719 : Std_Logic;
signal S720 : Std_Logic;
signal S721 : Std_Logic;
signal S722 : Std_Logic;
signal S723 : Std_Logic;
signal S724 : Std_Logic;
signal S725 : Std_Logic;
signal S726 : Std_Logic;
signal S727 : Std_Logic;
signal S728 : Std_Logic;
signal S729 : Std_Logic;
signal S730 : Std_Logic;
```

```
signal S731 : Std_Logic;
signal S732 : Std_Logic;
signal S733 : Std_Logic;
signal S734 : Std_Logic;
signal S735 : Std_Logic;
signal S736 : Std_Logic;
signal S737 : Std_Logic;
signal S738 : Std_Logic;
signal S739 : Std_Logic;
signal S740 : Std_Logic;
signal S741 : Std_Logic;
signal S742 : Std_Logic;
signal S743 : Std_Logic;
signal S744 : Std_Logic;
signal S745 : Std_Logic;
signal S746 : Std_Logic;
signal S747 : Std_Logic;
signal S748 : Std_Logic;
signal S749 : Std_Logic;
signal S750 : Std_Logic;
signal S751 : Std_Logic;
signal S752 : Std_Logic;
signal S753 : Std_Logic;
signal S754 : Std_Logic;
signal S755 : Std_Logic;
signal S756 : Std_Logic;
signal S757 : Std_Logic;
signal S758 : Std_Logic;
signal S759 : Std_Logic;
signal S760 : Std_Logic;
signal S761 : Std_Logic;
signal S762 : Std_Logic;
signal S763 : Std_Logic;
signal S764 : Std_Logic;
signal S765 : Std_Logic;
signal S766 : Std_Logic;
signal S767 : Std_Logic;
signal S768 : Std_Logic;
signal S769 : Std_Logic;
signal S770 : Std_Logic;
signal S771 : Std_Logic;
signal S772 : Std_Logic;
signal S773 : Std_Logic;
signal S774 : Std_Logic;
signal S775 : Std_Logic;
signal S776 : Std_Logic;
signal S777 : Std_Logic;
signal S778 : Std_Logic;
signal S779 : Std_Logic;
signal S780 : Std_Logic;
signal S781 : Std_Logic;
signal S782 : Std_Logic;
signal S783 : Std_Logic;
signal S784 : Std_Logic;
signal S785 : Std_Logic;
signal S786 : Std_Logic;
signal S787 : Std_Logic;
signal S788 : Std_Logic;
```

```
signal S789 : Std_Logic;
signal S790 : Std_Logic;
signal S791 : Std_Logic;
signal S792 : Std_Logic;
signal S793 : Std_Logic;
signal S794 : Std_Logic;
signal S795 : Std_Logic;
signal S796 : Std_Logic;
signal S797 : Std_Logic;
signal S798 : Std_Logic;
signal S799 : Std_Logic;
signal S800 : Std_Logic;
signal S801 : Std_Logic;
signal S802 : Std_Logic;
signal S803 : Std_Logic;
signal S804 : Std_Logic;
signal S805 : Std_Logic;
signal S806 : Std_Logic;
signal S807 : Std_Logic;
signal S808 : Std_Logic;
signal S809 : Std_Logic;
signal S810 : Std_Logic;
signal S811 : Std_Logic;
signal S812 : Std_Logic;
signal S813 : Std_Logic;
signal S814 : Std_Logic;
signal S815 : Std_Logic;
signal S816 : Std_Logic;
signal S817 : Std_Logic;
signal S818 : Std_Logic;
signal S819 : Std_Logic;
signal S820 : Std_Logic;
signal S821 : Std_Logic;
signal S822 : Std_Logic;
signal S823 : Std_Logic;
signal S824 : Std_Logic;
signal S825 : Std_Logic;
signal S826 : Std_Logic;
signal S827 : Std_Logic;
signal S828 : Std_Logic;
signal S829 : Std_Logic;
signal S830 : Std_Logic;
signal S831 : Std_Logic;
signal S832 : Std_Logic;
signal S833 : Std_Logic;
signal S834 : Std_Logic;
signal S835 : Std_Logic;
signal S836 : Std_Logic;
signal S837 : Std_Logic;
signal S838 : Std_Logic;
signal S839 : Std_Logic;
signal S840 : Std_Logic;
signal S841 : Std_Logic;
signal S842 : Std_Logic;
signal S843 : Std_Logic;
signal S844 : Std_Logic;
signal S845 : Std_Logic;
signal S846 : Std_Logic;
```

```
signal S847 : Std_Logic;
signal S848 : Std_Logic;
signal S849 : Std_Logic;
signal S850 : Std_Logic;
signal S851 : Std_Logic;
signal S852 : Std_Logic;
signal S853 : Std_Logic;
signal S854 : Std_Logic;
signal S855 : Std_Logic;
signal S856 : Std_Logic;
signal S857 : Std_Logic;
signal S858 : Std_Logic;
signal S859 : Std_Logic;
signal S860 : Std_Logic;
signal S861 : Std_Logic;
signal S862 : Std_Logic;
signal S863 : Std_Logic;
signal S864 : Std_Logic;
signal S865 : Std_Logic;
signal S866 : Std_Logic;
signal S867 : Std_Logic;
signal S868 : Std_Logic;
signal S869 : Std_Logic;
signal S870 : Std_Logic;
signal S871 : Std_Logic;
signal S872 : Std_Logic;
signal S873 : Std_Logic;
signal S874 : Std_Logic;
signal S875 : Std_Logic;
signal S876 : Std_Logic;
signal S877 : Std_Logic;
signal S878 : Std_Logic;
signal S879 : Std_Logic;
signal S880 : Std_Logic;
signal S881 : Std_Logic;
signal S882 : Std_Logic;
signal S883 : Std_Logic;
signal S884 : Std_Logic;
signal S885 : Std_Logic;
signal S886 : Std_Logic;
signal S887 : Std_Logic;
signal S888 : Std_Logic;
signal S889 : Std_Logic;
signal S890 : Std_Logic;
signal S891 : Std_Logic;
signal S892 : Std_Logic;
signal S893 : Std_Logic;
signal S894 : Std_Logic;
signal S895 : Std_Logic;
signal S896 : Std_Logic;
signal S897 : Std_Logic;
signal S898 : Std_Logic;
signal S899 : Std_Logic;
signal S900 : Std_Logic;
signal S901 : Std_Logic;
signal S902 : Std_Logic;
signal S903 : Std_Logic;
signal S904 : Std_Logic;
```

```
signal S905 : Std_Logic;
signal S906 : Std_Logic;
signal S907 : Std_Logic;
signal S908 : Std_Logic;
signal S909 : Std_Logic;
signal S910 : Std_Logic;
signal S911 : Std_Logic;
signal S912 : Std_Logic;
signal S913 : Std_Logic;
signal S914 : Std_Logic;
signal S915 : Std_Logic;
signal S916 : Std_Logic;
signal S917 : Std_Logic;
signal S918 : Std_Logic;
signal S919 : Std_Logic;
signal S920 : Std_Logic;
signal S921 : Std_Logic;
signal S922 : Std_Logic;
signal S923 : Std_Logic;
signal S924 : Std_Logic;
signal S925 : Std_Logic;
signal S926 : Std_Logic;
signal S927 : Std_Logic;
signal S928 : Std_Logic;
signal S929 : Std_Logic;
signal S930 : Std_Logic;
signal S931 : Std_Logic;
signal S932 : Std_Logic;
signal S933 : Std_Logic;
signal S934 : Std_Logic;
signal S935 : Std_Logic;
signal S936 : Std_Logic;
signal S937 : Std_Logic;
signal S938 : Std_Logic;
signal S939 : Std_Logic;
signal S940 : Std_Logic;
signal S941 : Std_Logic;
signal S942 : Std_Logic;
signal S943 : Std_Logic;
signal S944 : Std_Logic;
signal S945 : Std_Logic;
signal S946 : Std_Logic;
signal S947 : Std_Logic;
signal S948 : Std_Logic;
signal S949 : Std_Logic;
signal S950 : Std_Logic;
signal S951 : Std_Logic;
signal S952 : Std_Logic;
signal S953 : Std_Logic;
signal S954 : Std_Logic;
signal S955 : Std_Logic;
signal S956 : Std_Logic;
signal S957 : Std_Logic;
signal S958 : Std_Logic;
signal S959 : Std_Logic;
signal S960 : Std_Logic;
signal S961 : Std_Logic;
signal S962 : Std_Logic;
```

```
signal S963 : Std_Logic;
signal S964 : Std_Logic;
signal S965 : Std_Logic;
signal S966 : Std_Logic;
signal S967 : Std_Logic;
signal S968 : Std_Logic;
signal S969 : Std_Logic;
signal S970 : Std_Logic;
signal S971 : Std_Logic;
signal S972 : Std_Logic;
signal S973 : Std_Logic;
signal S974 : Std_Logic;
signal S975 : Std_Logic;
signal S976 : Std_Logic;
signal S977 : Std_Logic;
signal S978 : Std_Logic;
signal S979 : Std_Logic;
signal S980 : Std_Logic;
signal S981 : Std_Logic;
signal S982 : Std_Logic;
signal S983 : Std_Logic;
signal S984 : Std_Logic;
signal S985 : Std_Logic;
signal S986 : Std_Logic;
signal S987 : Std_Logic;
signal S988 : Std_Logic;
signal S989 : Std_Logic;
signal S990 : Std_Logic;
signal S991 : Std_Logic;
signal S992 : Std_Logic;
signal S993 : Std_Logic;
signal S994 : Std_Logic;
signal S995 : Std_Logic;
signal S996 : Std_Logic;
signal S997 : Std_Logic;
signal S998 : Std_Logic;
signal S999 : Std_Logic;
signal S1000 : Std_Logic;
signal S1001 : Std_Logic;
signal S1002 : Std_Logic;
signal S1003 : Std_Logic;
signal S1004 : Std_Logic;
signal S1005 : Std_Logic;
signal S1006 : Std_Logic;
signal S1007 : Std_Logic;
signal S1008 : Std_Logic;
signal S1009 : Std_Logic;
signal S1010 : Std_Logic;
signal S1011 : Std_Logic;
signal S1012 : Std_Logic;
signal S1013 : Std_Logic;
signal S1014 : Std_Logic;
signal S1015 : Std_Logic;
signal S1016 : Std_Logic;
signal S1017 : Std_Logic;
signal S1018 : Std_Logic;
signal S1019 : Std_Logic;
signal S1020 : Std_Logic;
```

fn(261), fn(260) => fn(260), fn(259) => fn(259),
fn(258) => fn(258), fn(257) => fn(257), fn(256) =>
fn(256), fn(255) => fn(255), fn(254) => fn(254),
fn(253) => fn(253), fn(252) => fn(252), fn(251) =>
fn(251), fn(250) => fn(250), fn(249) => fn(249),
fn(248) => fn(248), fn(247) => fn(247), fn(246) =>
fn(246), fn(245) => fn(245), fn(244) => fn(244),
fn(243) => fn(243), fn(242) => fn(242), fn(241) =>
fn(241), fn(240) => fn(240), fn(239) => fn(239),
fn(238) => fn(238), fn(237) => fn(237), fn(236) =>
fn(236), fn(235) => fn(235), fn(234) => fn(234),
fn(233) => fn(233), fn(232) => fn(232), fn(231) =>
fn(231), fn(230) => fn(230), fn(229) => fn(229),
fn(228) => fn(228), fn(227) => fn(227), fn(226) =>
fn(226), fn(225) => fn(225), fn(224) => fn(224),
fn(223) => fn(223), fn(222) => fn(222), fn(221) =>
fn(221), fn(220) => fn(220), fn(219) => fn(219),
fn(218) => fn(218), fn(217) => fn(217), fn(216) =>
fn(216), fn(215) => fn(215), fn(214) => fn(214),
fn(213) => fn(213), fn(212) => fn(212), fn(211) =>
fn(211), fn(210) => fn(210), fn(209) => fn(209),
fn(208) => fn(208), fn(207) => fn(207), fn(206) =>
fn(206), fn(205) => fn(205), fn(204) => fn(204),
fn(203) => fn(203), fn(202) => fn(202), fn(201) =>
fn(201), fn(200) => fn(200), fn(199) => fn(199),
fn(198) => fn(198), fn(197) => fn(197), fn(196) =>
fn(196), fn(195) => fn(195), fn(194) => fn(194),
fn(193) => fn(193), fn(192) => fn(192), fn(191) =>
fn(191), fn(190) => fn(190), fn(189) => fn(189),
fn(188) => fn(188), fn(187) => fn(187), fn(186) =>
fn(186), fn(185) => fn(185), fn(184) => fn(184),
fn(183) => fn(183), fn(182) => fn(182), fn(181) =>
fn(181), fn(180) => fn(180), fn(179) => fn(179),
fn(178) => fn(178), fn(177) => fn(177), fn(176) =>
fn(176), fn(175) => fn(175), fn(174) => fn(174),
fn(173) => fn(173), fn(172) => fn(172), fn(171) =>
fn(171), fn(170) => fn(170), fn(169) => fn(169),
fn(168) => fn(168), fn(167) => fn(167), fn(166) =>
fn(166), fn(165) => fn(165), fn(164) => fn(164),
fn(163) => fn(163), fn(162) => fn(162), fn(161) =>
fn(161), fn(160) => fn(160), fn(159) => fn(159),
fn(158) => fn(158), fn(157) => fn(157), fn(156) =>
fn(156), fn(155) => fn(155), fn(154) => fn(154),
fn(153) => fn(153), fn(152) => fn(152), fn(151) =>
fn(151), fn(150) => fn(150), fn(149) => fn(149),
fn(148) => fn(148), fn(147) => fn(147), fn(146) =>
fn(146), fn(145) => fn(145), fn(144) => fn(144),
fn(143) => fn(143), fn(142) => fn(142), fn(141) =>
fn(141), fn(140) => fn(140), fn(139) => fn(139),
fn(138) => fn(138), fn(137) => fn(137), fn(136) =>
fn(136), fn(135) => fn(135), fn(134) => fn(134),
fn(133) => fn(133), fn(132) => fn(132), fn(131) =>
fn(131), fn(130) => fn(130), fn(129) => fn(129),
fn(128) => fn(128), fn(127) => fn(127), fn(126) =>
fn(126), fn(125) => fn(125), fn(124) => fn(124),
fn(123) => fn(123), fn(122) => fn(122), fn(121) =>
fn(121), fn(120) => fn(120), fn(119) => fn(119),
fn(118) => fn(118), fn(117) => fn(117), fn(116) =>

```
signal S1021 : Std_Logic;
signal S1022 : Std_Logic;
signal S1023 : Std_Logic;
signal S1024 : Std_Logic;
signal S1025 : Std_Logic;
signal S1026 : Std_Logic;
signal S1027 : Std_Logic;
signal S1028 : Std_Logic;
signal S1029 : Std_Logic;
signal S1030 : Std_Logic;
signal S1031 : Std_Logic;
signal S1032 : Std_Logic;
signal S1033 : Std_Logic;
signal S1034 : Std_Logic;
signal S1035 : Std_Logic;
signal S1036 : Std_Logic;
signal S1037 : Std_Logic;
signal S1038 : Std_Logic;
signal S1039 : Std_Logic;
signal S1040 : Std_Logic;
signal S1041 : Std_Logic;
signal S1042 : Std_Logic;
signal S1043 : Std_Logic;
signal S1044 : Std_Logic;
signal S1045 : Std_Logic;
signal S1046 : Std_Logic;
signal S1047 : Std_Logic;
signal S1048 : Std_Logic;
signal S1049 : Std_Logic;
signal S1050 : Std_Logic;
signal S1051 : Std_Logic;
signal S1052 : Std_Logic;
signal S1053 : Std_Logic;
signal S1054 : Std_Logic;
signal S1055 : Std_Logic;
signal S1056 : Std_Logic;
signal S1057 : Std_Logic;
signal S1058 : Std_Logic;
signal S1059 : Std_Logic;
signal S1060 : Std_Logic;
signal S1061 : Std_Logic;
signal S1062 : Std_Logic;
signal S1063 : Std_Logic;
signal S1064 : Std_Logic;
signal S1065 : Std_Logic;
signal S1066 : Std_Logic;
signal S1067 : Std_Logic;
signal S1068 : Std_Logic;
signal S1069 : Std_Logic;
signal S1070 : Std_Logic;
signal S1071 : Std_Logic;
signal S1072 : Std_Logic;
signal S1073 : Std_Logic;
signal S1074 : Std_Logic;
signal S1075 : Std_Logic;
signal S1076 : Std_Logic;
signal S1077 : Std_Logic;
signal S1078 : Std_Logic;
```

```
   signal S1079 : Std_Logic;
   signal S1080 : Std_Logic;
   signal S1081 : Std_Logic;
   signal S1082 : Std_Logic;
   signal S1083 : Std_Logic;
   signal S1084 : Std_Logic;
   signal S1085 : Std_Logic;
   signal S1086 : Std_Logic;
   signal S1087 : Std_Logic;
   signal S1088 : Std_Logic;
   signal S1089 : Std_Logic;
   signal U458_Z : Std_Logic;
   signal U457_Z : Std_Logic;
   signal U456_Z : Std_Logic;
   signal U455_Z : Std_Logic;
   signal U491_Z : Std_Logic;
   signal U459_Z : Std_Logic;

begin

   U468: tag341
     port map ( prsp => U460_Z, setag => U459_Z, cntinit =>
           cntinit, rstaddr => U455_Z, mux2 => U456_Z, mux1
           => U457_Z, mux0 => U458_Z, fir_in => fir_in,
           resp_in => resp_in, we => U453_Z, count =>
           count_out, fn(340) => fn(340), fn(339) => fn(339),
           fn(338) => fn(338), fn(337) => fn(337), fn(336) =>
           fn(336), fn(335) => fn(335), fn(334) => fn(334),
           fn(333) => fn(333), fn(332) => fn(332), fn(331) =>
           fn(331), fn(330) => fn(330), fn(329) => fn(329),
           fn(328) => fn(328), fn(327) => fn(327), fn(326) =>
           fn(326), fn(325) => fn(325), fn(324) => fn(324),
           fn(323) => fn(323), fn(322) => fn(322), fn(321) =>
           fn(321), fn(320) => fn(320), fn(319) => fn(319),
           fn(318) => fn(318), fn(317) => fn(317), fn(316) =>
           fn(316), fn(315) => fn(315), fn(314) => fn(314),
           fn(313) => fn(313), fn(312) => fn(312), fn(311) =>
           fn(311), fn(310) => fn(310), fn(309) => fn(309),
           fn(308) => fn(308), fn(307) => fn(307), fn(306) =>
           fn(306), fn(305) => fn(305), fn(304) => fn(304),
           fn(303) => fn(303), fn(302) => fn(302), fn(301) =>
           fn(301), fn(300) => fn(300), fn(299) => fn(299),
           fn(298) => fn(298), fn(297) => fn(297), fn(296) =>
           fn(296), fn(295) => fn(295), fn(294) => fn(294),
           fn(293) => fn(293), fn(292) => fn(292), fn(291) =>
           fn(291), fn(290) => fn(290), fn(289) => fn(289),
           fn(288) => fn(288), fn(287) => fn(287), fn(286) =>
           fn(286), fn(285) => fn(285), fn(284) => fn(284),
           fn(283) => fn(283), fn(282) => fn(282), fn(281) =>
           fn(281), fn(280) => fn(280), fn(279) => fn(279),
           fn(278) => fn(278), fn(277) => fn(277), fn(276) =>
           fn(276), fn(275) => fn(275), fn(274) => fn(274),
           fn(273) => fn(273), fn(272) => fn(272), fn(271) =>
           fn(271), fn(270) => fn(270), fn(269) => fn(269),
           fn(268) => fn(268), fn(267) => fn(267), fn(266) =>
           fn(266), fn(265) => fn(265), fn(264) => fn(264),
           fn(263) => fn(263), fn(262) => fn(262), fn(261) =>
```

fn(116), fn(115) => fn(115), fn(114) => fn(114),
fn(113) => fn(113), fn(112) => fn(112), fn(111) =>
fn(111), fn(110) => fn(110), fn(109) => fn(109),
fn(108) => fn(108), fn(107) => fn(107), fn(106) =>
fn(106), fn(105) => fn(105), fn(104) => fn(104),
fn(103) => fn(103), fn(102) => fn(102), fn(101) =>
fn(101), fn(100) => fn(100), fn(99) => fn(99),
fn(98) => fn(98), fn(97) => fn(97), fn(96) =>
fn(96), fn(95) => fn(95), fn(94) => fn(94), fn(93)
=> fn(93), fn(92) => fn(92), fn(91) => fn(91),
fn(90) => fn(90), fn(89) => fn(89), fn(88) =>
fn(88), fn(87) => fn(87), fn(86) => fn(86), fn(85)
=> fn(85), fn(84) => fn(84), fn(83) => fn(83),
fn(82) => fn(82), fn(81) => fn(81), fn(80) =>
fn(80), fn(79) => fn(79), fn(78) => fn(78), fn(77)
=> fn(77), fn(76) => fn(76), fn(75) => fn(75),
fn(74) => fn(74), fn(73) => fn(73), fn(72) =>
fn(72), fn(71) => fn(71), fn(70) => fn(70), fn(69)
=> fn(69), fn(68) => fn(68), fn(67) => fn(67),
fn(66) => fn(66), fn(65) => fn(65), fn(64) =>
fn(64), fn(63) => fn(63), fn(62) => fn(62), fn(61)
=> fn(61), fn(60) => fn(60), fn(59) => fn(59),
fn(58) => fn(58), fn(57) => fn(57), fn(56) =>
fn(56), fn(55) => fn(55), fn(54) => fn(54), fn(53)
=> fn(53), fn(52) => fn(52), fn(51) => fn(51),
fn(50) => fn(50), fn(49) => fn(49), fn(48) =>
fn(48), fn(47) => fn(47), fn(46) => fn(46), fn(45)
=> fn(45), fn(44) => fn(44), fn(43) => fn(43),
fn(42) => fn(42), fn(41) => fn(41), fn(40) =>
fn(40), fn(39) => fn(39), fn(38) => fn(38), fn(37)
=> fn(37), fn(36) => fn(36), fn(35) => fn(35),
fn(34) => fn(34), fn(33) => fn(33), fn(32) =>
fn(32), fn(31) => so15_local, fn(30) => so14_local,
fn(29) => so13_local, fn(28) => so12_local, fn(27)
=> so11_local, fn(26) => so10_local, fn(25) =>
so9_local, fn(24) => so8_local, fn(23) =>
so7_local, fn(22) => so6_local, fn(21) =>
so5_local, fn(20) => so4_local, fn(19) =>
so3_local, fn(18) => so2_local, fn(17) =>
so1_local, fn(16) => sso_local, fn(15) => ni(15),
fn(14) => ni(14), fn(13) => ni(13), fn(12) =>
ni(12), fn(11) => ni(11), fn(10) => ni(10), fn(9)
=> ni(9), fn(8) => ni(8), fn(7) => ni(7), fn(6) =>
ni(6), fn(5) => ni(5), fn(4) => ni(4), fn(3) =>
ni(3), fn(2) => ni(2), fn(1) => ni(1), fn(0) =>
ni(0), nn(340) => no14_local, nn(339) =>
no13_local, nn(338) => no12_local, nn(337) =>
no11_local, nn(336) => no10_local, nn(335) =>
no9_local, nn(334) => no8_local, nn(333) =>
no7_local, nn(332) => no6_local, nn(331) =>
no5_local, nn(330) => no4_local, nn(329) =>
no3_local, nn(328) => no2_local, nn(327) =>
no1_local, nn(326) => no0_local, nn(325) =>
fn(340), nn(324) => fn(339), nn(323) => fn(338),
nn(322) => fn(337), nn(321) => fn(336), nn(320) =>
fn(335), nn(319) => fn(334), nn(318) => fn(333),
nn(317) => fn(332), nn(316) => fn(331), nn(315) =>
fn(330), nn(314) => fn(329), nn(313) => fn(328), nn(312) => fn(327), nn(311) => fn(326), nn(310) => fn(325), nn(309) => fn(324), nn(308) => fn(323), nn(307) => fn(322), nn(306) => fn(321), nn(305) => fn(320), nn(304) => fn(319), nn(303) => fn(318), nn(302) => fn(317), nn(301) => fn(316), nn(300) => fn(315), nn(299) => fn(314), nn(298) => fn(313), nn(297) => fn(312), nn(296) => fn(311), nn(295) => fn(310), nn(294) => fn(309), nn(293) => fn(308), nn(292) => fn(307), nn(291) => fn(306), nn(290) => fn(305), nn(289) => fn(304), nn(288) => fn(303), nn(287) => fn(302), nn(286) => fn(301), nn(285) => fn(300), nn(284) => fn(299), nn(283) => fn(298), nn(282) => fn(297), nn(281) => fn(296), nn(280) => fn(295), nn(279) => fn(294), nn(278) => fn(293), nn(277) => fn(292), nn(276) => fn(291), nn(275) => fn(290), nn(274) => fn(289), nn(273) => fn(288), nn(272) => fn(287), nn(271) => fn(286), nn(270) => fn(285), nn(269) => fn(284), nn(268) => fn(283), nn(267) => fn(282), nn(266) => fn(281), nn(265) => fn(280), nn(264) => fn(279), nn(263) => fn(278), nn(262) => fn(277), nn(261) => fn(276), nn(260) => fn(275), nn(259) => fn(274), nn(258) => fn(273), nn(257) => fn(272), nn(256) => fn(271), nn(255) => fn(270), nn(254) => fn(269), nn(253) => fn(268), nn(252) => fn(267), nn(251) => fn(266), nn(250) => fn(265), nn(249) => fn(264), nn(248) => fn(263), nn(247) => fn(262), nn(246) => fn(261), nn(245) => fn(260), nn(244) => fn(259), nn(243) => fn(258), nn(242) => fn(257), nn(241) => fn(256), nn(240) => fn(255), nn(239) => fn(254), nn(238) => fn(253), nn(237) => fn(252), nn(236) => fn(251), nn(235) => fn(250), nn(234) => fn(249), nn(233) => fn(248), nn(232) => fn(247), nn(231) => fn(246), nn(230) => fn(245), nn(229) => fn(244), nn(228) => fn(243), nn(227) => fn(242), nn(226) => fn(241), nn(225) => fn(240), nn(224) => fn(239), nn(223) => fn(238), nn(222) => fn(237), nn(221) => fn(236), nn(220) => fn(235), nn(219) => fn(234), nn(218) => fn(233), nn(217) => fn(232), nn(216) => fn(231), nn(215) => fn(230), nn(214) => fn(229), nn(213) => fn(228), nn(212) => fn(227), nn(211) => fn(226), nn(210) => fn(225), nn(209) => fn(224), nn(208) => fn(223), nn(207) => fn(222), nn(206) => fn(221), nn(205) => fn(220), nn(204) => fn(219), nn(203) => fn(218), nn(202) => fn(217), nn(201) => fn(216), nn(200) => fn(215), nn(199) => fn(214), nn(198) => fn(213), nn(197) => fn(212), nn(196) => fn(211), nn(195) => fn(210), nn(194) => fn(209), nn(193) => fn(208), nn(192) => fn(207), nn(191) => fn(206), nn(190) => fn(205), nn(189) => fn(204), nn(188) => fn(203), nn(187) => fn(202), nn(186) => fn(201), nn(185) => fn(200), nn(184) => fn(199), nn(183) => fn(198), nn(182) => fn(197), nn(181) => fn(196), nn(180) => fn(195), nn(179) => fn(194), nn(178) => fn(193), nn(177) => fn(192), nn(176) => fn(191), nn(175) => fn(190), nn(174) => fn(189), nn(173) => fn(188), nn(172) => fn(187), nn(171) => fn(186), nn(170) => fn(185), nn(169) => fn(184), nn(168) => fn(183), nn(167) => fn(182), nn(166) => fn(181), nn(165) => fn(180), nn(164) => fn(179), nn(163) => fn(178), nn(162) => fn(177), nn(161) => fn(176), nn(160) => fn(175), nn(159) => fn(174), nn(158) => fn(173), nn(157) => fn(172), nn(156) => fn(171), nn(155) => fn(170), nn(154) => fn(169), nn(153) => fn(168), nn(152) => fn(167), nn(151) => fn(166), nn(150) => fn(165), nn(149) => fn(164), nn(148) => fn(163), nn(147) => fn(162), nn(146) => fn(161), nn(145) => fn(160), nn(144) => fn(159), nn(143) => fn(158), nn(142) => fn(157), nn(141) => fn(156), nn(140) => fn(155), nn(139) => fn(154), nn(138) => fn(153), nn(137) => fn(152), nn(136) => fn(151), nn(135) => fn(150), nn(134) => fn(149), nn(133) => fn(148), nn(132) => fn(147), nn(131) => fn(146), nn(130) => fn(145), nn(129) => fn(144), nn(128) => fn(143), nn(127) => fn(142), nn(126) => fn(141), nn(125) => fn(140), nn(124) => fn(139), nn(123) => fn(138), nn(122) => fn(137), nn(121) => fn(136), nn(120) => fn(135), nn(119) => fn(134), nn(118) => fn(133), nn(117) => fn(132), nn(116) => fn(131), nn(115) => fn(130), nn(114) => fn(129), nn(113) => fn(128), nn(112) => fn(127), nn(111) => fn(126), nn(110) => fn(125), nn(109) => fn(124), nn(108) => fn(123), nn(107) => fn(122), nn(106) => fn(121), nn(105) => fn(120), nn(104) => fn(119), nn(103) => fn(118), nn(102) => fn(117), nn(101) => fn(116), nn(100) => fn(115), nn(99) => fn(114), nn(98) => fn(113), nn(97) => fn(112), nn(96) => fn(111), nn(95) => fn(110), nn(94) => fn(109), nn(93) => fn(108), nn(92) => fn(107), nn(91) => fn(106), nn(90) => fn(105), nn(89) => fn(104), nn(88) => fn(103), nn(87) => fn(102), nn(86) => fn(101), nn(85) => fn(100), nn(84) => fn(99), nn(83) => fn(98), nn(82) => fn(97), nn(81) => fn(96), nn(80) => fn(95), nn(79) => fn(94), nn(78) => fn(93), nn(77) => fn(92), nn(76) => fn(91), nn(75) => fn(90), nn(74) => fn(89), nn(73) => fn(88), nn(72) => fn(87), nn(71) => fn(86), nn(70) => fn(85), nn(69) => fn(84), nn(68) => fn(83), nn(67) => fn(82), nn(66) => fn(81), nn(65) => fn(80), nn(64) => fn(79), nn(63) => fn(78), nn(62) => fn(77), nn(61) => fn(76), nn(60) => fn(75), nn(59) => fn(74), nn(58) => fn(73), nn(57) => fn(72), nn(56) => fn(71), nn(55) => fn(70), nn(54) => fn(69), nn(53) => fn(68), nn(52) => fn(67), nn(51) => fn(66), nn(50) => fn(65), nn(49) => fn(64), nn(48) => fn(63), nn(47) => fn(62), nn(46) => fn(61), nn(45) => fn(60), nn(44) => fn(59), nn(43) => fn(58), nn(42) => fn(57), nn(41) => fn(56), nn(40) => fn(55), nn(39) => fn(54), nn(38) => fn(53), nn(37) => fn(52), nn(36) => fn(51), nn(35) => fn(50), nn(34) => fn(49), nn(33) => fn(48), nn(32) => fn(47), nn(31) => fn(46), nn(30) => fn(45), nn(29) => fn(44), nn(28) => fn(43), nn(27) => fn(42), nn(26) => fn(41), nn(25) => fn(40), nn(24) => fn(39), nn(23) => fn(38), nn(22) => fn(37), nn(21) => fn(36), nn(20) => fn(35), nn(19) => fn(34), nn(18) => fn(33), nn(17) => fn(32), nn(16) => so15_local, nn(15) => so14_local, nn(14) => so13_local, nn(13) => so12_local, nn(12) => so11_local, nn(11) => so10_local, nn(10) => so9_local, nn(9) => so8_local, nn(8) => so7_local, nn(7) => so6_local, nn(6) => so5_local, nn(5) => so4_local, nn(4) => so3_local, nn(3) => so2_local, nn(2) => so1_local, nn(1) => sso_local, nn(0) => nni, tag(340) => nno_local, tag(339) => no14_local, tag(338) => no13_local, tag(337) => no12_local, tag(336) => no11_local, tag(335) => no10_local, tag(334) => no9_local, tag(333) => no8_local, tag(332) => no7_local, tag(331) => no6_local, tag(330) => no5_local, tag(329) => no4_local, tag(328) => no3_local, tag(327) => no2_local, tag(326) => no1_local, tag(325) => no0_local, tag(324) => fn(340), tag(323) => fn(339), tag(322) => fn(338), tag(321) => fn(337), tag(320) => fn(336), tag(319) => fn(335), tag(318) => fn(334), tag(317) => fn(333), tag(316) => fn(332), tag(315) => fn(331), tag(314) => fn(330), tag(313) => fn(329), tag(312) => fn(328), tag(311) => fn(327), tag(310) => fn(326), tag(309) => fn(325), tag(308) => fn(324), tag(307) => fn(323), tag(306) => fn(322), tag(305) => fn(321), tag(304) => fn(320), tag(303) => fn(319), tag(302) => fn(318), tag(301) => fn(317), tag(300) => fn(316), tag(299) => fn(315), tag(298) => fn(314), tag(297) => fn(313), tag(296) => fn(312), tag(295) => fn(311), tag(294) => fn(310), tag(293) => fn(309), tag(292) => fn(308), tag(291) => fn(307), tag(290) => fn(306), tag(289) => fn(305), tag(288) => fn(304), tag(287) => fn(303), tag(286) => fn(302), tag(285) => fn(301), tag(284) => fn(300), tag(283) => fn(299), tag(282) => fn(298), tag(281) => fn(297), tag(280) => fn(296), tag(279) => fn(295), tag(278) => fn(294), tag(277) => fn(293), tag(276) => fn(292), tag(275) => fn(291), tag(274) => fn(290), tag(273) => fn(289), tag(272) => fn(288), tag(271) => fn(287), tag(270) => fn(286), tag(269) => fn(285), tag(268) => fn(284), tag(267) => fn(283), tag(266) => fn(282), tag(265) => fn(281), tag(264) => fn(280), tag(263) => fn(279), tag(262) => fn(278), tag(261) => fn(277), tag(260) => fn(276), tag(259) => fn(275), tag(258) => fn(274), tag(257) => fn(273), tag(256) => fn(272), tag(255) => fn(271), tag(254) => fn(270), tag(253) => fn(269), tag(252) => fn(268), tag(251) => fn(267), tag(250) => fn(266), tag(249) => fn(265), tag(248) => fn(264), tag(247) => fn(263), tag(246) => fn(262), tag(245) => fn(261), tag(244) => fn(260), tag(243) => fn(259), tag(242) => fn(258), tag(241) => fn(257), tag(240) => fn(256), tag(239) => fn(255), tag(238) => fn(254), tag(237) => fn(253), tag(236) => fn(252), tag(235) => fn(251), tag(234) => fn(250), tag(233) => fn(249), tag(232) => fn(248), tag(231) => fn(247), tag(230) => fn(246), tag(229) => fn(245), tag(228) => fn(244), tag(227) => fn(243), tag(226) => fn(242), tag(225) => fn(241), tag(224) => fn(240), tag(223) => fn(239), tag(222) => fn(238), tag(221) => fn(237), tag(220) => fn(236), tag(219) => fn(235), tag(218) => fn(234), tag(217) => fn(233), tag(216) => fn(232), tag(215) => fn(231), tag(214) => fn(230), tag(213) => fn(229), tag(212) => fn(228), tag(211) => fn(227), tag(210) => fn(226), tag(209) => fn(225), tag(208) => fn(224), tag(207) => fn(223), tag(206) => fn(222), tag(205) => fn(221), tag(204) => fn(220), tag(203) => fn(219), tag(202) => fn(218), tag(201) => fn(217), tag(200) => fn(216), tag(199) => fn(215), tag(198) => fn(214), tag(197) => fn(213), tag(196) => fn(212), tag(195) => fn(211), tag(194) => fn(210), tag(193) => fn(209), tag(192) => fn(208), tag(191) => fn(207), tag(190) => fn(206), tag(189) => fn(205), tag(188) => fn(204), tag(187) => fn(203), tag(186) => fn(202), tag(185) => fn(201), tag(184) => fn(200), tag(183) => fn(199), tag(182) => fn(198), tag(181) => fn(197), tag(180) => fn(196), tag(179) => fn(195), tag(178) => fn(194), tag(177) => fn(193), tag(176) => fn(192), tag(175) => fn(191), tag(174) => fn(190), tag(173) => fn(189), tag(172) => fn(188), tag(171) => fn(187), tag(170) => fn(186), tag(169) => fn(185), tag(168) => fn(184), tag(167) => fn(183), tag(166) => fn(182), tag(165) => fn(181), tag(164) => fn(180), tag(163) => fn(179), tag(162) => fn(178), tag(161) => fn(177), tag(160) => fn(176), tag(159) => fn(175), tag(158) => fn(174), tag(157) => fn(173), tag(156) => fn(172), tag(155) => fn(171), tag(154) => fn(170), tag(153) => fn(169), tag(152) => fn(168), tag(151) => fn(167), tag(150) => fn(166), tag(149) => fn(165), tag(148) => fn(164), tag(147) => fn(163), tag(146) => fn(162), tag(145) => fn(161), tag(144) => fn(160), tag(143) => fn(159), tag(142) => fn(158), tag(141) => fn(157), tag(140) => fn(156), tag(139) => fn(155), tag(138) => fn(154), tag(137) => fn(153), tag(136) => fn(152), tag(135) => fn(151), tag(134) => fn(150), tag(133) => fn(149), tag(132) => fn(148), tag(131) => fn(147), tag(130) => fn(146), tag(129) => fn(145), tag(128) => fn(144), tag(127) => fn(143), tag(126) => fn(142), tag(125) => fn(141), tag(124) => fn(140), tag(123) => fn(139), tag(122) => fn(138), tag(121) => fn(137), tag(120) => fn(136), tag(119) => fn(135), tag(118) => fn(134), tag(117) => fn(133), tag(116) => fn(132), tag(115) => fn(131), tag(114) => fn(130), tag(113) => fn(129), tag(112) => fn(128), tag(111) => fn(127), tag(110) => fn(126), tag(109) => fn(125), tag(108) => fn(124), tag(107) => fn(123), tag(106) => fn(122), tag(105) => fn(121), tag(104) => fn(120), tag(103) => fn(119), tag(102) => fn(118), tag(101) => fn(117), tag(100) => fn(116), tag(99) => fn(115), tag(98) => fn(114), tag(97) => fn(113), tag(96) => fn(112), tag(95) => fn(111), tag(94) => fn(110), tag(93) => fn(109), tag(92) => fn(108), tag(91) => fn(107), tag(90) => fn(106), tag(89) => fn(105), tag(88) => fn(104), tag(87) => fn(103), tag(86) => fn(102), tag(85) => fn(101), tag(84) => fn(100), tag(83) => fn(99), tag(82) => fn(98), tag(81) => fn(97), tag(80) => fn(96), tag(79) => fn(95), tag(78) => fn(94), tag(77) => fn(93), tag(76) => fn(92), tag(75) => fn(91), tag(74) => fn(90), tag(73) => fn(89), tag(72) => fn(88), tag(71) => fn(87), tag(70) => fn(86), tag(69) => fn(85), tag(68) => fn(84), tag(67) => fn(83), tag(66) => fn(82), tag(65) => fn(81), tag(64) => fn(80), tag(63) => fn(79), tag(62) => fn(78), tag(61) => fn(77), tag(60) => fn(76), tag(59) => fn(75), tag(58) => fn(74), tag(57) => fn(73), tag(56) => fn(72), tag(55) => fn(71), tag(54) => fn(70), tag(53) => fn(69), tag(52) => fn(68), tag(51) => fn(67), tag(50) => fn(66), tag(49) => fn(65), tag(48) => fn(64), tag(47) => fn(63), tag(46) => fn(62), tag(45) => fn(61), tag(44) => fn(60), tag(43) => fn(59), tag(42) => fn(58), tag(41) => fn(57), tag(40) => fn(56), tag(39) => fn(55), tag(38) => fn(54), tag(37) => fn(53), tag(36) => fn(52), tag(35) => fn(51), tag(34) => fn(50), tag(33) => fn(49), tag(32) => fn(48), tag(31) => fn(47), tag(30) => fn(46), tag(29) => fn(45), tag(28) => fn(44), tag(27) => fn(43), tag(26) => fn(42), tag(25) => fn(41), tag(24) => fn(40), tag(23) => fn(39), tag(22) => fn(38), tag(21) => fn(37), tag(20) => fn(36), tag(19) => fn(35), tag(18) => fn(34), tag(17) => fn(33), tag(16) => fn(32), tag(15) => so15_local, tag(14) => so14_local, tag(13) => so13_local, tag(12) => so12_local, tag(11) => so11_local, tag(10) => so10_local, tag(9) => so9_local, tag(8) => so8_local, tag(7) => so7_local, tag(6) => so6_local, tag(5) => so5_local, tag(4) => so4_local, tag(3) => so3_local, tag(2) => so2_local, tag(1) => so1_local, tag(0) => sso_local, ns(340) => ssi, ns(339) => nno_local, ns(338) => no14_local, ns(337) => no13_local, ns(336) => no12_local, ns(335) => no11_local, ns(334) => no10_local, ns(333) => no9_local, ns(332) => no8_local, ns(331) => no7_local, ns(330) => no6_local, ns(329) => no5_local, ns(328) => no4_local, ns(327) => no3_local, ns(326) => no2_local, ns(325) => no1_local, ns(324) => no0_local, ns(323) => fn(340), ns(322) => fn(339), ns(321) => fn(338), ns(320) => fn(337), ns(319) => fn(336), ns(318) => fn(335), ns(317) => fn(334), ns(316) => fn(333), ns(315) => fn(332), ns(314) => fn(331), ns(313) => fn(330), ns(312) => fn(329), ns(311) => fn(328), ns(310) => fn(327), ns(309) => fn(326), ns(308) => fn(325), ns(307) => fn(324), ns(306) => fn(323), ns(305) => fn(322), ns(304) => fn(321), ns(303) => fn(320), ns(302) => fn(319), ns(301) => fn(318), ns(300) => fn(317), ns(299) => fn(316), ns(298) => fn(315), ns(297) => fn(314), ns(296) => fn(313), ns(295) => fn(312), ns(294) => fn(311), ns(293) => fn(310), ns(292) => fn(309), ns(291) => fn(308), ns(290) => fn(307), ns(289) => fn(306), ns(288) => fn(305), ns(287) => fn(304), ns(286) => fn(303), ns(285) => fn(302), ns(284) => fn(301), ns(283) => fn(300), ns(282) => fn(299), ns(281) => fn(298), ns(280) => fn(297), ns(279) => fn(296), ns(278) => fn(295), ns(277) => fn(294), ns(276) => fn(293), ns(275) => fn(292), ns(274) => fn(291), ns(273) => fn(290), ns(272) => fn(289), ns(271) => fn(288), ns(270) => fn(287), ns(269) => fn(286), ns(268) => fn(285), ns(267) => fn(284), ns(266) => fn(283), ns(265) => fn(282), ns(264) => fn(281), ns(263) => fn(280), ns(262) => fn(279), ns(261) => fn(278), ns(260) => fn(277), ns(259) => fn(276), ns(258) => fn(275), ns(257) => fn(274), ns(256) => fn(273), ns(255) => fn(272), ns(254) => fn(271), ns(253) => fn(270), ns(252) => fn(269), ns(251) => fn(268), ns(250) => fn(267), ns(249) => fn(266), ns(248) => fn(265), ns(247) => fn(264), ns(246) => fn(263), ns(245) => fn(262), ns(244) => fn(261), ns(243) => fn(260), ns(242) => fn(259), ns(241) => fn(258), ns(240) => fn(257), ns(239) => fn(256), ns(238) => fn(255), ns(237) => fn(254), ns(236) => fn(253), ns(235) => fn(252), ns(234) => fn(251), ns(233) => fn(250), ns(232) => fn(249), ns(231) => fn(248), ns(230) => fn(247), ns(229) => fn(246), ns(228) => fn(245), ns(227) => fn(244), ns(226) => fn(243), ns(225) => fn(242), ns(224) => fn(241), ns(223) => fn(240), ns(222) => fn(239), ns(221) => fn(238), ns(220) => fn(237), ns(219) => fn(236), ns(218) => fn(235), ns(217) => fn(234), ns(216) => fn(233), ns(215) => fn(232), ns(214) => fn(231), ns(213) => fn(230), ns(212) => fn(229), ns(211) => fn(228), ns(210) => fn(227), ns(209) => fn(226), ns(208) => fn(225), ns(207) => fn(224), ns(206) => fn(223), ns(205) => fn(222), ns(204) => fn(221), ns(203) => fn(220), ns(202) => fn(219), ns(201) => fn(218), ns(200) => fn(217), ns(199) => fn(216), ns(198) => fn(215), ns(197) => fn(214), ns(196) => fn(213), ns(195) => fn(212), ns(194) => fn(211), ns(193) => fn(210), ns(192) => fn(209), ns(191) => fn(208), ns(190) => fn(207), ns(189) => fn(206), ns(188) => fn(205), ns(187) => fn(204), ns(186) => fn(203), ns(185) => fn(202), ns(184) => fn(201), ns(183) => fn(200), ns(182) => fn(199), ns(181) => fn(198), ns(180) => fn(197), ns(179) => fn(196), ns(178) => fn(195), ns(177) => fn(194), ns(176) => fn(193), ns(175) => fn(192), ns(174) => fn(191), ns(173) => fn(190), ns(172) => fn(189), ns(171) => fn(188), ns(170) => fn(187), ns(169) => fn(186), ns(168) => fn(185), ns(167) => fn(184), ns(166) => fn(183), ns(165) => fn(182), ns(164) => fn(181), ns(163) => fn(180), ns(162) => fn(179), ns(161) => fn(178), ns(160) => fn(177), ns(159) => fn(176), ns(158) => fn(175), ns(157) => fn(174), ns(156) => fn(173), ns(155) => fn(172), ns(154) => fn(171), ns(153) => fn(170), ns(152) => fn(169), ns(151) => fn(168), ns(150) => fn(167), ns(149) => fn(166), ns(148) => fn(165), ns(147) => fn(164), ns(146) => fn(163), ns(145) => fn(162), ns(144) => fn(161), ns(143) => fn(160), ns(142) => fn(159), ns(141) => fn(158), ns(140) => fn(157), ns(139) => fn(156), ns(138) => fn(155), ns(137) => fn(154), ns(136) => fn(153), ns(135) => fn(152), ns(134) => fn(151), ns(133) => fn(150), ns(132) => fn(149), ns(131) => fn(148), ns(130) => fn(147), ns(129) => fn(146), ns(128) => fn(145), ns(127) => fn(144), ns(126) => fn(143), ns(125) => fn(142), ns(124) => fn(141), ns(123) => fn(140), ns(122) => fn(139), ns(121) => fn(138), ns(120) => fn(137), ns(119) => fn(136), ns(118) => fn(135), ns(117) => fn(134), ns(116) => fn(133), ns(115) => fn(132), ns(114) => fn(131), ns(113) => fn(130), ns(112) => fn(129), ns(111) => fn(128), ns(110) => fn(127), ns(109) => fn(126), ns(108) => fn(125), ns(107) => fn(124), ns(106) => fn(123), ns(105) => fn(122), ns(104) => fn(121), ns(103) => fn(120), ns(102) => fn(119), ns(101) => fn(118), ns(100) => fn(117), ns(99) => fn(116), ns(98) => fn(115), ns(97) => fn(114), ns(96) => fn(113), ns(95) => fn(112), ns(94) => fn(111), ns(93) => fn(110), ns(92) => fn(109), ns(91) => fn(108), ns(90) => fn(107), ns(89) => fn(106), ns(88) => fn(105), ns(87) => fn(104), ns(86) => fn(103), ns(85) => fn(102), ns(84) => fn(101), ns(83) => fn(100), ns(82) => fn(99), ns(81) => fn(98), ns(80) => fn(97), ns(79) => fn(96), ns(78) => fn(95), ns(77) => fn(94), ns(76) => fn(93), ns(75) => fn(92), ns(74) => fn(91), ns(73) => fn(90), ns(72) => fn(89), ns(71) => fn(88), ns(70) => fn(87), ns(69) => fn(86), ns(68) => fn(85), ns(67) => fn(84), ns(66) => fn(83), ns(65) => fn(82), ns(64) => fn(81), ns(63) => fn(80), ns(62) => fn(79), ns(61) => fn(78), ns(60) => fn(77), ns(59) => fn(76), ns(58) => fn(75), ns(57) => fn(74), ns(56) => fn(73), ns(55) => fn(72), ns(54) => fn(71), ns(53) => fn(70), ns(52) => fn(69), ns(51) => fn(68), ns(50) => fn(67), ns(49) => fn(66), ns(48) => fn(65), ns(47) => fn(64), ns(46) => fn(63), ns(45) => fn(62), ns(44) => fn(61), ns(43) => fn(60), ns(42) => fn(59), ns(41) => fn(58), ns(40) => fn(57), ns(39) => fn(56), ns(38) => fn(55), ns(37) => fn(54), ns(36) => fn(53), ns(35) => fn(52), ns(34) => fn(51), ns(33) => fn(50), ns(32) => fn(49), ns(31) => fn(48), ns(30) => fn(47), ns(29) => fn(46), ns(28) => fn(45), ns(27) => fn(44), ns(26) => fn(43), ns(25) => fn(42), ns(24) => fn(41), ns(23) => fn(40), ns(22) => fn(39), ns(21) => fn(38), ns(20) => fn(37), ns(19) => fn(36), ns(18) => fn(35), ns(17) => fn(34), ns(16) => fn(33), ns(15) => fn(32), ns(14) => so15_local, ns(13) => so14_local, ns(12) => so13_local, ns(11) => so12_local, ns(10) => so11_local, ns(9) => so10_local, ns(8) => so9_local, ns(7) => so8_local, ns(6) => so7_local, ns(5) => so6_local, ns(4) => so5_local, ns(3) => so4_local, ns(2) => so3_local, ns(1) => so2_local, ns(0) => so1_local, fs(340) => si(15), fs(339) => si(14), fs(338) => si(13), fs(337) => si(12), fs(336) => si(11), fs(335) => si(10), fs(334) => si(9), fs(333) => si(8), fs(332) => si(7), fs(331) => si(6), fs(330) => si(5), fs(329) => si(4), fs(328) => si(3), fs(327) => si(2), fs(326) => si(1), fs(325) => si(0), fs(324) => nno_local, fs(323) => no14_local, fs(322) => no13_local, fs(321) => no12_local, fs(320) => no11_local, fs(319) => no10_local, fs(318) => no9_local, fs(317) => no8_local, fs(316) => no7_local, fs(315) => no6_local, fs(314) => no5_local, fs(313) => no4_local, fs(312) => no3_local, fs(311) => no2_local, fs(310) => no1_local, fs(309) => no0_local, fs(308) => fn(340), fs(307) => fn(339), fs(306) => fn(338), fs(305) => fn(337), fs(304) => fn(336), fs(303) => fn(335), fs(302) => fn(334), fs(301) => fn(333), fs(300) => fn(332), fs(299) => fn(331), fs(298) => fn(330), fs(297) => fn(329), fs(296) => fn(328), fs(295) => fn(327), fs(294) => fn(326), fs(293) => fn(325), fs(292) => fn(324), fs(291) => fn(323), fs(290) => fn(322), fs(289) => fn(321), fs(288) => fn(320), fs(287) => fn(319), fs(286) => fn(318), fs(285) => fn(317), fs(284) => fn(316), fs(283) => fn(315), fs(282) => fn(314), fs(281) => fn(313), fs(280) => fn(312), fs(279) => fn(311), fs(278) => fn(310), fs(277) => fn(309), fs(276) => fn(308), fs(275) => fn(307), fs(274) => fn(306), fs(273) => fn(305), fs(272) => fn(304), fs(271) => fn(303), fs(270) => fn(302), fs(269) => fn(301), fs(268) => fn(300), fs(267) => fn(299), fs(266) => fn(298), fs(265) => fn(297), fs(264) => fn(296), fs(263) => fn(295), fs(262) => fn(294), fs(261) => fn(293), fs(260) => fn(292), fs(259) => fn(291), fs(258) => fn(290), fs(257) => fn(289), fs(256) => fn(288), fs(255) => fn(287), fs(254) => fn(286), fs(253) => fn(285), fs(252) => fn(284), fs(251) => fn(283), fs(250) => fn(282), fs(249) => fn(281), fs(248) => fn(280), fs(247) => fn(279), fs(246) => fn(278), fs(245) => fn(277), fs(244) => fn(276), fs(243) => fn(275), fs(242) => fn(274), fs(241) => fn(273), fs(240) => fn(272), fs(239) => fn(271), fs(238) => fn(270), fs(237) => fn(269), fs(236) => fn(268), fs(235) => fn(267), fs(234) => fn(266), fs(233) => fn(265), fs(232) => fn(264), fs(231) => fn(263), fs(230) => fn(262), fs(229) => fn(261), fs(228) => fn(260), fs(227) => fn(259), fs(226) => fn(258), fs(225) => fn(257), fs(224) => fn(256), fs(223) => fn(255), fs(222) => fn(254), fs(221) => fn(253), fs(220) => fn(252), fs(219) => fn(251), fs(218) => fn(250), fs(217) => fn(249), fs(216) => fn(248), fs(215) => fn(247), fs(214) => fn(246), fs(213) => fn(245), fs(212) => fn(244), fs(211) => fn(243), fs(210) => fn(242), fs(209) => fn(241), fs(208) => fn(240), fs(207) => fn(239), fs(206) => fn(238), fs(205) => fn(237), fs(204) => fn(236), fs(203) => fn(235), fs(202) => fn(234), fs(201) => fn(233), fs(200) => fn(232), fs(199) => fn(231), fs(198) => fn(230), fs(197) => fn(229), fs(196) => fn(228), fs(195) => fn(227), fs(194) => fn(226), fs(193) => fn(225), fs(192) => fn(224), fs(191) => fn(223), fs(190) => fn(222), fs(189) => fn(221), fs(188) => fn(220), fs(187) => fn(219), fs(186) => fn(218), fs(185) => fn(217), fs(184) => fn(216), fs(183) => fn(215), fs(182) => fn(214), fs(181) => fn(213), fs(180) => fn(212), fs(179) => fn(211), fs(178) => fn(210), fs(177) => fn(209), fs(176) => fn(208), fs(175) => fn(207), fs(174) => fn(206), fs(173) => fn(205), fs(172) => fn(204), fs(171) => fn(203), fs(170) => fn(202), fs(169) => fn(201), fs(168) => fn(200), fs(167) => fn(199), fs(166) => fn(198), fs(165) => fn(197), fs(164) => fn(196), fs(163) => fn(195), fs(162) => fn(194), fs(161) => fn(193), fs(160) => fn(192), fs(159) => fn(191), fs(158) => fn(190), fs(157) => fn(189), fs(156) => fn(188), fs(155) => fn(187), fs(154) => fn(186), fs(153) => fn(185), fs(152) => fn(184), fs(151) => fn(183), fs(150) => fn(182), fs(149) => fn(181), fs(148) => fn(180), fs(147) => fn(179), fs(146) => fn(178), fs(145) => fn(177), fs(144) => fn(176), fs(143) => fn(175), fs(142) => fn(174), fs(141) => fn(173), fs(140) => fn(172), fs(139) => fn(171), fs(138) => fn(170), fs(137) => fn(169), fs(136) => fn(168), fs(135) => fn(167), fs(134) => fn(166), fs(133) => fn(165), fs(132) => fn(164), fs(131) => fn(163), fs(130) => fn(162), fs(129) => fn(161), fs(128) => fn(160), fs(127) => fn(159), fs(126) => fn(158), fs(125) => fn(157), fs(124) => fn(156), fs(123) => fn(155), fs(122) => fn(154), fs(121) => fn(153), fs(120) => fn(152), fs(119) => fn(151), fs(118) => fn(150), fs(117) => fn(149), fs(116) => fn(148), fs(115) => fn(147), fs(114) => fn(146), fs(113) => fn(145), fs(112) => fn(144), fs(111) => fn(143), fs(110) => fn(142), fs(109) => fn(141), fs(108) => fn(140), fs(107) => fn(139), fs(106) => fn(138), fs(105) => fn(137), fs(104) => fn(136), fs(103) => fn(135), fs(102) => fn(134), fs(101) => fn(133), fs(100) => fn(132), fs(99) => fn(131), fs(98) => fn(130), fs(97) => fn(129), fs(96) => fn(128), fs(95) => fn(127), fs(94) => fn(126), fs(93) => fn(125), fs(92) => fn(124), fs(91) => fn(123), fs(90) => fn(122), fs(89) => fn(121), fs(88) => fn(120), fs(87) => fn(119), fs(86) => fn(118), fs(85) => fn(117), fs(84) => fn(116), fs(83) => fn(115), fs(82) => fn(114), fs(81) => fn(113), fs(80) => fn(112), fs(79) => fn(111), fs(78) => fn(110), fs(77) => fn(109), fs(76) => fn(108), fs(75) => fn(107), fs(74) => fn(106), fs(73) => fn(105), fs(72) => fn(104), fs(71) => fn(103), fs(70) => fn(102), fs(69) => fn(101), fs(68) => fn(100), fs(67) => fn(99), fs(66) => fn(98), fs(65) => fn(97), fs(64) => fn(96), fs(63) => fn(95), fs(62) => fn(94), fs(61) => fn(93), fs(60) => fn(92), fs(59) => fn(91), fs(58) => fn(90), fs(57) => fn(89), fs(56) => fn(88), fs(55) => fn(87), fs(54) => fn(86), fs(53) => fn(85), fs(52) => fn(84), fs(51) => fn(83), fs(50) => fn(82), fs(49) => fn(81), fs(48) => fn(80), fs(47) => fn(79), fs(46) => fn(78), fs(45) => fn(77), fs(44) => fn(76), fs(43) => fn(75), fs(42) => fn(74), fs(41) => fn(73), fs(40) => fn(72), fs(39) => fn(71), fs(38) => fn(70), fs(37) => fn(69), fs(36) => fn(68), fs(35) => fn(67), fs(34) => fn(66), fs(33) => fn(65), fs(32) => fn(64), fs(31) => fn(63), fs(30) => fn(62), fs(29) => fn(61), fs(28) => fn(60), fs(27) => fn(59), fs(26) => fn(58), fs(25) => fn(57), fs(24) => fn(56), fs(23) => fn(55), fs(22) => fn(54), fs(21) => fn(53), fs(20) => fn(52), fs(19) => fn(51), fs(18) => fn(50), fs(17) => fn(49), fs(16) => fn(48), fs(15) => fn(47), fs(14) => fn(46), fs(13) => fn(45), fs(12) => fn(44), fs(11) => fn(43), fs(10) => fn(42), fs(9) => fn(41), fs(8) => fn(40), fs(7) => fn(39), fs(6) => fn(38), fs(5) => fn(37), fs(4) => fn(36), fs(3) => fn(35), fs(2) => fn(34), fs(1) => fn(33), fs(0) => fn(32), rspen(340) => U468_rspen(340), rspen(339) => U468_rspen(339), rspen(338) => U468_rspen(338), rspen(337) => U468_rspen(337), rspen(336) => U468_rspen(336), rspen(335) => U468_rspen(335), rspen(334) => U468_rspen(334), rspen(333) => U468_rspen(333), rspen(332) => U468_rspen(332), rspen(331) => U468_rspen(331), rspen(330) => U468_rspen(330), rspen(329) => U468_rspen(329), rspen(328) => U468_rspen(328), rspen(327) => U468_rspen(327), rspen(326) => U468_rspen(326), rspen(325) => U468_rspen(325), rspen(324) => U468_rspen(324), rspen(323) => U468_rspen(323), rspen(322) => U468_rspen(322), rspen(321) => U468_rspen(321), rspen(320) => U468_rspen(320), rspen(319) => U468_rspen(319), rspen(318) => U468_rspen(318), rspen(317) => U468_rspen(317), rspen(316) => U468_rspen(316), rspen(315) => U468_rspen(315), rspen(314) => U468_rspen(314), rspen(313) => U468_rspen(313), rspen(312) => U468_rspen(312), rspen(311) => U468_rspen(311), rspen(310) => U468_rspen(310), rspen(309) => U468_rspen(309), rspen(308) => U468_rspen(308), rspen(307) => U468_rspen(307), rspen(306) => U468_rspen(306), rspen(305) => U468_rspen(305), rspen(304) => U468_rspen(304), rspen(303) => U468_rspen(303), rspen(302) => U468_rspen(302), rspen(301) => U468_rspen(301), rspen(300) => U468_rspen(300), rspen(299) => U468_rspen(299), rspen(298) => U468_rspen(298), rspen(297) => U468_rspen(297), rspen(296) => U468_rspen(296), rspen(295) => U468_rspen(295), rspen(294) => U468_rspen(294), rspen(293) => U468_rspen(293), rspen(292) => U468_rspen(292), rspen(291) => U468_rspen(291), rspen(290) => U468_rspen(290), rspen(289) => U468_rspen(289), rspen(288) => U468_rspen(288), rspen(287) => U468_rspen(287), rspen(286) => U468_rspen(286), rspen(285) => U468_rspen(285), rspen(284) => U468_rspen(284), rspen(283) => U468_rspen(283), rspen(282) => U468_rspen(282), rspen(281) => U468_rspen(281), rspen(280) => U468_rspen(280), rspen(279) => U468_rspen(279), rspen(278) => U468_rspen(278), rspen(277) => U468_rspen(277), rspen(276) => U468_rspen(276), rspen(275) => U468_rspen(275), rspen(274) => U468_rspen(274), rspen(273) => U468_rspen(273), rspen(272) => U468_rspen(272), rspen(271) => U468_rspen(271), rspen(270) => U468_rspen(270), rspen(269) => U468_rspen(269), rspen(268) => U468_rspen(268), rspen(267) => U468_rspen(267), rspen(266) => U468_rspen(266), rspen(265) => U468_rspen(265), rspen(264) => U468_rspen(264), rspen(263) => U468_rspen(263), rspen(262) => U468_rspen(262), rspen(261) => U468_rspen(261), rspen(260) => U468_rspen(260), rspen(259) => U468_rspen(259), rspen(258) => U468_rspen(258), rspen(257) => U468_rspen(257), rspen(256) => U468_rspen(256), rspen(255) => U468_rspen(255), rspen(254) => U468_rspen(254), rspen(253) => U468_rspen(253), rspen(252) => U468_rspen(252), rspen(251) => U468_rspen(251), rspen(250) => U468_rspen(250), rspen(249) => U468_rspen(249), rspen(248) => U468_rspen(248), rspen(247) => U468_rspen(247), rspen(246) => U468_rspen(246), rspen(245) => U468_rspen(245), rspen(244) => U468_rspen(244), rspen(243) => U468_rspen(243), rspen(242) => U468_rspen(242), rspen(241) => U468_rspen(241), rspen(240) => U468_rspen(240), rspen(239) => U468_rspen(239), rspen(238) => U468_rspen(238), rspen(237) => U468_rspen(237), rspen(236) => U468_rspen(236), rspen(235) => U468_rspen(235), rspen(234) => U468_rspen(234), rspen(233) => U468_rspen(233), rspen(232) => U468_rspen(232), rspen(231) => U468_rspen(231), rspen(230) => U468_rspen(230), rspen(229) => U468_rspen(229), rspen(228) => U468_rspen(228), rspen(227) => U468_rspen(227), rspen(226) => U468_rspen(226), rspen(225) => U468_rspen(225), rspen(224) => U468_rspen(224), rspen(223) => U468_rspen(223), rspen(222) => U468_rspen(222), rspen(221) => U468_rspen(221), rspen(220) => U468_rspen(220), rspen(219) => U468_rspen(219), rspen(218) => U468_rspen(218), rspen(217) => U468_rspen(217), rspen(216) => U468_rspen(216), rspen(215) => U468_rspen(215), rspen(214) => U468_rspen(214), rspen(213) => U468_rspen(213), rspen(212) => U468_rspen(212), rspen(211) => U468_rspen(211), rspen(210) => U468_rspen(210), rspen(209) => U468_rspen(209), rspen(208) => U468_rspen(208), rspen(207) => U468_rspen(207), rspen(206) => U468_rspen(206), rspen(205) => U468_rspen(205), rspen(204) => U468_rspen(204), rspen(203) => U468_rspen(203), rspen(202) => U468_rspen(202), rspen(201) => U468_rspen(201), rspen(200) => U468_rspen(200), rspen(199) => U468_rspen(199), rspen(198) => U468_rspen(198), rspen(197) => U468_rspen(197), rspen(196) => U468_rspen(196), rspen(195) => U468_rspen(195), rspen(194) => U468_rspen(194), rspen(193) => U468_rspen(193), rspen(192) => U468_rspen(192), rspen(191) => U468_rspen(191), rspen(190) => U468_rspen(190), rspen(189) => U468_rspen(189), rspen(188) => U468_rspen(188), rspen(187) => U468_rspen(187), rspen(186) => U468_rspen(186), rspen(185) => U468_rspen(185), rspen(184) => U468_rspen(184), rspen(183) => U468_rspen(183), rspen(182) => U468_rspen(182), rspen(181) => U468_rspen(181), rspen(180) => U468_rspen(180), rspen(179) => U468_rspen(179), rspen(178) => U468_rspen(178), rspen(177) => U468_rspen(177), rspen(176) => U468_rspen(176), rspen(175) => U468_rspen(175), rspen(174) => U468_rspen(174), rspen(173) => U468_rspen(173), rspen(172) => U468_rspen(172), rspen(171) => U468_rspen(171), rspen(170) => U468_rspen(170), rspen(169) => U468_rspen(169), rspen(168) => U468_rspen(168), rspen(167) => U468_rspen(167), rspen(166) => U468_rspen(166), rspen(165) => U468_rspen(165), rspen(164) => U468_rspen(164), rspen(163) => U468_rspen(163), rspen(162) => U468_rspen(162), rspen(161) => U468_rspen(161), rspen(160) => U468_rspen(160), rspen(159) => U468_rspen(159), rspen(158) => U468_rspen(158), rspen(157) => U468_rspen(157), rspen(156) => U468_rspen(156), rspen(155) => U468_rspen(155), rspen(154) => U468_rspen(154), rspen(153) => U468_rspen(153), rspen(152) => U468_rspen(152), rspen(151) => U468_rspen(151), rspen(150) => U468_rspen(150), rspen(149) => U468_rspen(149), rspen(148) => U468_rspen(148), rspen(147) => U468_rspen(147), rspen(146) => U468_rspen(146), rspen(145) => U468_rspen(145), rspen(144) => U468_rspen(144), rspen(143) => U468_rspen(143), rspen(142) => U468_rspen(142), rspen(141) => U468_rspen(141), rspen(140) => U468_rspen(140), rspen(139) => U468_rspen(139), rspen(138) => U468_rspen(138), rspen(137) => U468_rspen(137), rspen(136) => U468_rspen(136), rspen(135) => U468_rspen(135), rspen(134) => U468_rspen(134), rspen(133) => U468_rspen(133), rspen(132) => U468_rspen(132), rspen(131) => U468_rspen(131), rspen(130) => U468_rspen(130), rspen(129) => U468_rspen(129), rspen(128) => U468_rspen(128), rspen(127) => U468_rspen(127), rspen(126) => U468_rspen(126), rspen(125) => U468_rspen(125), rspen(124) => U468_rspen(124), rspen(123) => U468_rspen(123), rspen(122) => U468_rspen(122), rspen(121) => U468_rspen(121), rspen(120) => U468_rspen(120), rspen(119) => U468_rspen(119), rspen(118) => U468_rspen(118), rspen(117) => U468_rspen(117), rspen(116) => U468_rspen(116), rspen(115) => U468_rspen(115), rspen(114) => U468_rspen(114), rspen(113) => U468_rspen(113), rspen(112) => U468_rspen(112), rspen(111) => U468_rspen(111), rspen(110) => U468_rspen(110), rspen(109) => U468_rspen(109), rspen(108) =>
U468_rspen(108), rspen(107) => U468_rspen(107),
rspen(106) => U468_rspen(106), rspen(105) =>
U468_rspen(105), rspen(104) => U468_rspen(104),
rspen(103) => U468_rspen(103), rspen(102) =>
U468_rspen(102), rspen(101) => U468_rspen(101),
rspen(100) => U468_rspen(100), rspen(99) =>
U468_rspen(99), rspen(98) => U468_rspen(98),
rspen(97) => U468_rspen(97), rspen(96) =>
U468_rspen(96), rspen(95) => U468_rspen(95),
rspen(94) => U468_rspen(94), rspen(93) =>
U468_rspen(93), rspen(92) => U468_rspen(92),
rspen(91) => U468_rspen(91), rspen(90) =>
U468_rspen(90), rspen(89) => U468_rspen(89),
rspen(88) => U468_rspen(88), rspen(87) =>
U468_rspen(87), rspen(86) => U468_rspen(86),
rspen(85) => U468_rspen(85), rspen(84) =>
U468_rspen(84), rspen(83) => U468_rspen(83),
rspen(82) => U468_rspen(82), rspen(81) =>
U468_rspen(81), rspen(80) => U468_rspen(80),
rspen(79) => U468_rspen(79), rspen(78) =>
U468_rspen(78), rspen(77) => U468_rspen(77),
rspen(76) => U468_rspen(76), rspen(75) =>
U468_rspen(75), rspen(74) => U468_rspen(74),
rspen(73) => U468_rspen(73), rspen(72) =>
U468_rspen(72), rspen(71) => U468_rspen(71),
rspen(70) => U468_rspen(70), rspen(69) =>
U468_rspen(69), rspen(68) => U468_rspen(68),
rspen(67) => U468_rspen(67), rspen(66) =>
U468_rspen(66), rspen(65) => U468_rspen(65),
rspen(64) => U468_rspen(64), rspen(63) =>
U468_rspen(63), rspen(62) => U468_rspen(62),
rspen(61) => U468_rspen(61), rspen(60) =>
U468_rspen(60), rspen(59) => U468_rspen(59),
rspen(58) => U468_rspen(58), rspen(57) =>
U468_rspen(57), rspen(56) => U468_rspen(56),
rspen(55) => U468_rspen(55), rspen(54) =>
U468_rspen(54), rspen(53) => U468_rspen(53),
rspen(52) => U468_rspen(52), rspen(51) =>
U468_rspen(51), rspen(50) => U468_rspen(50),
rspen(49) => U468_rspen(49), rspen(48) =>
U468_rspen(48), rspen(47) => U468_rspen(47),
rspen(46) => U468_rspen(46), rspen(45) =>
U468_rspen(45), rspen(44) => U468_rspen(44),
rspen(43) => U468_rspen(43), rspen(42) =>
U468_rspen(42), rspen(41) => U468_rspen(41),
rspen(40) => U468_rspen(40), rspen(39) =>
U468_rspen(39), rspen(38) => U468_rspen(38),
rspen(37) => U468_rspen(37), rspen(36) =>
U468_rspen(36), rspen(35) => U468_rspen(35),
rspen(34) => U468_rspen(34), rspen(33) =>
U468_rspen(33), rspen(32) => U468_rspen(32),
rspen(31) => U468_rspen(31), rspen(30) =>
U468_rspen(30), rspen(29) => U468_rspen(29),
rspen(28) => U468_rspen(28), rspen(27) =>
U468_rspen(27), rspen(26) => U468_rspen(26),
rspen(25) => U468_rspen(25), rspen(24) =>
U468_rspen(24), rspen(23) => U468_rspen(23), rspen(22) => U468_rspen(22), rspen(21) =>
U468_rspen(21), rspen(20) => U468_rspen(20),
rspen(19) => U468_rspen(19), rspen(18) =>
U468_rspen(18), rspen(17) => U468_rspen(17),
rspen(16) => U468_rspen(16), rspen(15) =>
U468_rspen(15), rspen(14) => U468_rspen(14),
rspen(13) => U468_rspen(13), rspen(12) =>
U468_rspen(12), rspen(11) => U468_rspen(11),
rspen(10) => U468_rspen(10), rspen(9) =>
U468_rspen(9), rspen(8) => U468_rspen(8), rspen(7)
=> U468_rspen(7), rspen(6) => U468_rspen(6),
rspen(5) => U468_rspen(5), rspen(4) =>
U468_rspen(4), rspen(3) => U468_rspen(3), rspen(2)
=> U468_rspen(2), rspen(1) => U468_rspen(1),
rspen(0) => U468_rspen(0), wl(340) => U468_wl(340),
wl(339) => U468_wl(339), wl(338) => U468_wl(338),
wl(337) => U468_wl(337), wl(336) => U468_wl(336),
wl(335) => U468_wl(335), wl(334) => U468_wl(334),
wl(333) => U468_wl(333), wl(332) => U468_wl(332),
wl(331) => U468_wl(331), wl(330) => U468_wl(330),
wl(329) => U468_wl(329), wl(328) => U468_wl(328),
wl(327) => U468_wl(327), wl(326) => U468_wl(326),
wl(325) => U468_wl(325), wl(324) => U468_wl(324),
wl(323) => U468_wl(323), wl(322) => U468_wl(322),
wl(321) => U468_wl(321), wl(320) => U468_wl(320),
wl(319) => U468_wl(319), wl(318) => U468_wl(318),
wl(317) => U468_wl(317), wl(316) => U468_wl(316),
wl(315) => U468_wl(315), wl(314) => U468_wl(314),
wl(313) => U468_wl(313), wl(312) => U468_wl(312),
wl(311) => U468_wl(311), wl(310) => U468_wl(310),
wl(309) => U468_wl(309), wl(308) => U468_wl(308),
wl(307) => U468_wl(307), wl(306) => U468_wl(306),
wl(305) => U468_wl(305), wl(304) => U468_wl(304),
wl(303) => U468_wl(303), wl(302) => U468_wl(302),
wl(301) => U468_wl(301), wl(300) => U468_wl(300),
wl(299) => U468_wl(299), wl(298) => U468_wl(298),
wl(297) => U468_wl(297), wl(296) => U468_wl(296),
wl(295) => U468_wl(295), wl(294) => U468_wl(294),
wl(293) => U468_wl(293), wl(292) => U468_wl(292),
wl(291) => U468_wl(291), wl(290) => U468_wl(290),
wl(289) => U468_wl(289), wl(288) => U468_wl(288),
wl(287) => U468_wl(287), wl(286) => U468_wl(286),
wl(285) => U468_wl(285), wl(284) => U468_wl(284),
wl(283) => U468_wl(283), wl(282) => U468_wl(282),
wl(281) => U468_wl(281), wl(280) => U468_wl(280),
wl(279) => U468_wl(279), wl(278) => U468_wl(278),
wl(277) => U468_wl(277), wl(276) => U468_wl(276),
wl(275) => U468_wl(275), wl(274) => U468_wl(274),
wl(273) => U468_wl(273), wl(272) => U468_wl(272),
wl(271) => U468_wl(271), wl(270) => U468_wl(270),
wl(269) => U468_wl(269), wl(268) => U468_wl(268),
wl(267) => U468_wl(267), wl(266) => U468_wl(266),
wl(265) => U468_wl(265), wl(264) => U468_wl(264),
wl(263) => U468_wl(263), wl(262) => U468_wl(262),
wl(261) => U468_wl(261), wl(260) => U468_wl(260),
wl(259) => U468_wl(259), wl(258) => U468_wl(258),
wl(257) => U468_wl(257), wl(256) => U468_wl(256),
wl(255) => U468_wl(255), wl(254) => U468_wl(254), wl(253) => U468_wl(253), wl(252) => U468_wl(252),
wl(251) => U468_wl(251), wl(250) => U468_wl(250),
wl(249) => U468_wl(249), wl(248) => U468_wl(248),
wl(247) => U468_wl(247), wl(246) => U468_wl(246),
wl(245) => U468_wl(245), wl(244) => U468_wl(244),
wl(243) => U468_wl(243), wl(242) => U468_wl(242),
wl(241) => U468_wl(241), wl(240) => U468_wl(240),
wl(239) => U468_wl(239), wl(238) => U468_wl(238),
wl(237) => U468_wl(237), wl(236) => U468_wl(236),
wl(235) => U468_wl(235), wl(234) => U468_wl(234),
wl(233) => U468_wl(233), wl(232) => U468_wl(232),
wl(231) => U468_wl(231), wl(230) => U468_wl(230),
wl(229) => U468_wl(229), wl(228) => U468_wl(228),
wl(227) => U468_wl(227), wl(226) => U468_wl(226),
wl(225) => U468_wl(225), wl(224) => U468_wl(224),
wl(223) => U468_wl(223), wl(222) => U468_wl(222),
wl(221) => U468_wl(221), wl(220) => U468_wl(220),
wl(219) => U468_wl(219), wl(218) => U468_wl(218),
wl(217) => U468_wl(217), wl(216) => U468_wl(216),
wl(215) => U468_wl(215), wl(214) => U468_wl(214),
wl(213) => U468_wl(213), wl(212) => U468_wl(212),
wl(211) => U468_wl(211), wl(210) => U468_wl(210),
wl(209) => U468_wl(209), wl(208) => U468_wl(208),
wl(207) => U468_wl(207), wl(206) => U468_wl(206),
wl(205) => U468_wl(205), wl(204) => U468_wl(204),
wl(203) => U468_wl(203), wl(202) => U468_wl(202),
wl(201) => U468_wl(201), wl(200) => U468_wl(200),
wl(199) => U468_wl(199), wl(198) => U468_wl(198),
wl(197) => U468_wl(197), wl(196) => U468_wl(196),
wl(195) => U468_wl(195), wl(194) => U468_wl(194),
wl(193) => U468_wl(193), wl(192) => U468_wl(192),
wl(191) => U468_wl(191), wl(190) => U468_wl(190),
wl(189) => U468_wl(189), wl(188) => U468_wl(188),
wl(187) => U468_wl(187), wl(186) => U468_wl(186),
wl(185) => U468_wl(185), wl(184) => U468_wl(184),
wl(183) => U468_wl(183), wl(182) => U468_wl(182),
wl(181) => U468_wl(181), wl(180) => U468_wl(180),
wl(179) => U468_wl(179), wl(178) => U468_wl(178),
wl(177) => U468_wl(177), wl(176) => U468_wl(176),
wl(175) => U468_wl(175), wl(174) => U468_wl(174),
wl(173) => U468_wl(173), wl(172) => U468_wl(172),
wl(171) => U468_wl(171), wl(170) => U468_wl(170),
wl(169) => U468_wl(169), wl(168) => U468_wl(168),
wl(167) => U468_wl(167), wl(166) => U468_wl(166),
wl(165) => U468_wl(165), wl(164) => U468_wl(164),
wl(163) => U468_wl(163), wl(162) => U468_wl(162),
wl(161) => U468_wl(161), wl(160) => U468_wl(160),
wl(159) => U468_wl(159), wl(158) => U468_wl(158),
wl(157) => U468_wl(157), wl(156) => U468_wl(156),
wl(155) => U468_wl(155), wl(154) => U468_wl(154),
wl(153) => U468_wl(153), wl(152) => U468_wl(152),
wl(151) => U468_wl(151), wl(150) => U468_wl(150),
wl(149) => U468_wl(149), wl(148) => U468_wl(148),
wl(147) => U468_wl(147), wl(146) => U468_wl(146),
wl(145) => U468_wl(145), wl(144) => U468_wl(144),
wl(143) => U468_wl(143), wl(142) => U468_wl(142),
wl(141) => U468_wl(141), wl(140) => U468_wl(140),
wl(139) => U468_wl(139), wl(138) => U468_wl(138),

```
wl(137) => U468_wl(137), wl(136) => U468_wl(136),
wl(135) => U468_wl(135), wl(134) => U468_wl(134),
wl(133) => U468_wl(133), wl(132) => U468_wl(132),
wl(131) => U468_wl(131), wl(130) => U468_wl(130),
wl(129) => U468_wl(129), wl(128) => U468_wl(128),
wl(127) => U468_wl(127), wl(126) => U468_wl(126),
wl(125) => U468_wl(125), wl(124) => U468_wl(124),
wl(123) => U468_wl(123), wl(122) => U468_wl(122),
wl(121) => U468_wl(121), wl(120) => U468_wl(120),
wl(119) => U468_wl(119), wl(118) => U468_wl(118),
wl(117) => U468_wl(117), wl(116) => U468_wl(116),
wl(115) => U468_wl(115), wl(114) => U468_wl(114),
wl(113) => U468_wl(113), wl(112) => U468_wl(112),
wl(111) => U468_wl(111), wl(110) => U468_wl(110),
wl(109) => U468_wl(109), wl(108) => U468_wl(108),
wl(107) => U468_wl(107), wl(106) => U468_wl(106),
wl(105) => U468_wl(105), wl(104) => U468_wl(104),
wl(103) => U468_wl(103), wl(102) => U468_wl(102),
wl(101) => U468_wl(101), wl(100) => U468_wl(100),
wl(99) => U468_wl(99), wl(98) => U468_wl(98),
wl(97) => U468_wl(97), wl(96) => U468_wl(96),
wl(95) => U468_wl(95), wl(94) => U468_wl(94),
wl(93) => U468_wl(93), wl(92) => U468_wl(92),
wl(91) => U468_wl(91), wl(90) => U468_wl(90),
wl(89) => U468_wl(89), wl(88) => U468_wl(88),
wl(87) => U468_wl(87), wl(86) => U468_wl(86),
wl(85) => U468_wl(85), wl(84) => U468_wl(84),
wl(83) => U468_wl(83), wl(82) => U468_wl(82),
wl(81) => U468_wl(81), wl(80) => U468_wl(80),
wl(79) => U468_wl(79), wl(78) => U468_wl(78),
wl(77) => U468_wl(77), wl(76) => U468_wl(76),
wl(75) => U468_wl(75), wl(74) => U468_wl(74),
wl(73) => U468_wl(73), wl(72) => U468_wl(72),
wl(71) => U468_wl(71), wl(70) => U468_wl(70),
wl(69) => U468_wl(69), wl(68) => U468_wl(68),
wl(67) => U468_wl(67), wl(66) => U468_wl(66),
wl(65) => U468_wl(65), wl(64) => U468_wl(64),
wl(63) => U468_wl(63), wl(62) => U468_wl(62),
wl(61) => U468_wl(61), wl(60) => U468_wl(60),
wl(59) => U468_wl(59), wl(58) => U468_wl(58),
wl(57) => U468_wl(57), wl(56) => U468_wl(56),
wl(55) => U468_wl(55), wl(54) => U468_wl(54),
wl(53) => U468_wl(53), wl(52) => U468_wl(52),
wl(51) => U468_wl(51), wl(50) => U468_wl(50),
wl(49) => U468_wl(49), wl(48) => U468_wl(48),
wl(47) => U468_wl(47), wl(46) => U468_wl(46),
wl(45) => U468_wl(45), wl(44) => U468_wl(44),
wl(43) => U468_wl(43), wl(42) => U468_wl(42),
wl(41) => U468_wl(41), wl(40) => U468_wl(40),
wl(39) => U468_wl(39), wl(38) => U468_wl(38),
wl(37) => U468_wl(37), wl(36) => U468_wl(36),
wl(35) => U468_wl(35), wl(34) => U468_wl(34),
wl(33) => U468_wl(33), wl(32) => U468_wl(32),
wl(31) => U468_wl(31), wl(30) => U468_wl(30),
wl(29) => U468_wl(29), wl(28) => U468_wl(28),
wl(27) => U468_wl(27), wl(26) => U468_wl(26),
wl(25) => U468_wl(25), wl(24) => U468_wl(24),
wl(23) => U468_wl(23), wl(22) => U468_wl(22),
```

wl(21) => U468_wl(21), wl(20) => U468_wl(20),
wl(19) => U468_wl(19), wl(18) => U468_wl(18),
wl(17) => U468_wl(17), wl(16) => U468_wl(16),
wl(15) => U468_wl(15), wl(14) => U468_wl(14),
wl(13) => U468_wl(13), wl(12) => U468_wl(12),
wl(11) => U468_wl(11), wl(10) => U468_wl(10),
wl(9) => U468_wl(9), wl(8) => U468_wl(8), wl(7) =>
U468_wl(7), wl(6) => U468_wl(6), wl(5) =>
U468_wl(5), wl(4) => U468_wl(4), wl(3) =>
U468_wl(3), wl(2) => U468_wl(2), wl(1) =>
U468_wl(1), wl(0) => U468_wl(0), ml(340) =>
U496_ml(340), ml(339) => U496_ml(339), ml(338) =>
U496_ml(338), ml(337) => U496_ml(337), ml(336) =>
U496_ml(336), ml(335) => U496_ml(335), ml(334) =>
U496_ml(334), ml(333) => U496_ml(333), ml(332) =>
U496_ml(332), ml(331) => U496_ml(331), ml(330) =>
U496_ml(330), ml(329) => U496_ml(329), ml(328) =>
U496_ml(328), ml(327) => U496_ml(327), ml(326) =>
U496_ml(326), ml(325) => U496_ml(325), ml(324) =>
U496_ml(324), ml(323) => U496_ml(323), ml(322) =>
U496_ml(322), ml(321) => U496_ml(321), ml(320) =>
U496_ml(320), ml(319) => U496_ml(319), ml(318) =>
U496_ml(318), ml(317) => U496_ml(317), ml(316) =>
U496_ml(316), ml(315) => U496_ml(315), ml(314) =>
U496_ml(314), ml(313) => U496_ml(313), ml(312) =>
U496_ml(312), ml(311) => U496_ml(311), ml(310) =>
U496_ml(310), ml(309) => U496_ml(309), ml(308) =>
U496_ml(308), ml(307) => U496_ml(307), ml(306) =>
U496_ml(306), ml(305) => U496_ml(305), ml(304) =>
U496_ml(304), ml(303) => U496_ml(303), ml(302) =>
U496_ml(302), ml(301) => U496_ml(301), ml(300) =>
U496_ml(300), ml(299) => U496_ml(299), ml(298) =>
U496_ml(298), ml(297) => U496_ml(297), ml(296) =>
U496_ml(296), ml(295) => U496_ml(295), ml(294) =>
U496_ml(294), ml(293) => U496_ml(293), ml(292) =>
U496_ml(292), ml(291) => U496_ml(291), ml(290) =>
U496_ml(290), ml(289) => U496_ml(289), ml(288) =>
U496_ml(288), ml(287) => U496_ml(287), ml(286) =>
U496_ml(286), ml(285) => U496_ml(285), ml(284) =>
U496_ml(284), ml(283) => U496_ml(283), ml(282) =>
U496_ml(282), ml(281) => U496_ml(281), ml(280) =>
U496_ml(280), ml(279) => U496_ml(279), ml(278) =>
U496_ml(278), ml(277) => U496_ml(277), ml(276) =>
U496_ml(276), ml(275) => U496_ml(275), ml(274) =>
U496_ml(274), ml(273) => U496_ml(273), ml(272) =>
U496_ml(272), ml(271) => U496_ml(271), ml(270) =>
U496_ml(270), ml(269) => U496_ml(269), ml(268) =>
U496_ml(268), ml(267) => U496_ml(267), ml(266) =>
U496_ml(266), ml(265) => U496_ml(265), ml(264) =>
U496_ml(264), ml(263) => U496_ml(263), ml(262) =>
U496_ml(262), ml(261) => U496_ml(261), ml(260) =>
U496_ml(260), ml(259) => U496_ml(259), ml(258) =>
U496_ml(258), ml(257) => U496_ml(257), ml(256) =>
U496_ml(256), ml(255) => U496_ml(255), ml(254) =>
U496_ml(254), ml(253) => U496_ml(253), ml(252) =>
U496_ml(252), ml(251) => U496_ml(251), ml(250) =>
U496_ml(250), ml(249) => U496_ml(249), ml(248) =>
U496_ml(248), ml(247) => U496_ml(247), ml(246) =>

U496_ml(246), ml(245) => U496_ml(245), ml(244) =>
U496_ml(244), ml(243) => U496_ml(243), ml(242) =>
U496_ml(242), ml(241) => U496_ml(241), ml(240) =>
U496_ml(240), ml(239) => U496_ml(239), ml(238) =>
U496_ml(238), ml(237) => U496_ml(237), ml(236) =>
U496_ml(236), ml(235) => U496_ml(235), ml(234) =>
U496_ml(234), ml(233) => U496_ml(233), ml(232) =>
U496_ml(232), ml(231) => U496_ml(231), ml(230) =>
U496_ml(230), ml(229) => U496_ml(229), ml(228) =>
U496_ml(228), ml(227) => U496_ml(227), ml(226) =>
U496_ml(226), ml(225) => U496_ml(225), ml(224) =>
U496_ml(224), ml(223) => U496_ml(223), ml(222) =>
U496_ml(222), ml(221) => U496_ml(221), ml(220) =>
U496_ml(220), ml(219) => U496_ml(219), ml(218) =>
U496_ml(218), ml(217) => U496_ml(217), ml(216) =>
U496_ml(216), ml(215) => U496_ml(215), ml(214) =>
U496_ml(214), ml(213) => U496_ml(213), ml(212) =>
U496_ml(212), ml(211) => U496_ml(211), ml(210) =>
U496_ml(210), ml(209) => U496_ml(209), ml(208) =>
U496_ml(208), ml(207) => U496_ml(207), ml(206) =>
U496_ml(206), ml(205) => U496_ml(205), ml(204) =>
U496_ml(204), ml(203) => U496_ml(203), ml(202) =>
U496_ml(202), ml(201) => U496_ml(201), ml(200) =>
U496_ml(200), ml(199) => U496_ml(199), ml(198) =>
U496_ml(198), ml(197) => U496_ml(197), ml(196) =>
U496_ml(196), ml(195) => U496_ml(195), ml(194) =>
U496_ml(194), ml(193) => U496_ml(193), ml(192) =>
U496_ml(192), ml(191) => U496_ml(191), ml(190) =>
U496_ml(190), ml(189) => U496_ml(189), ml(188) =>
U496_ml(188), ml(187) => U496_ml(187), ml(186) =>
U496_ml(186), ml(185) => U496_ml(185), ml(184) =>
U496_ml(184), ml(183) => U496_ml(183), ml(182) =>
U496_ml(182), ml(181) => U496_ml(181), ml(180) =>
U496_ml(180), ml(179) => U496_ml(179), ml(178) =>
U496_ml(178), ml(177) => U496_ml(177), ml(176) =>
U496_ml(176), ml(175) => U496_ml(175), ml(174) =>
U496_ml(174), ml(173) => U496_ml(173), ml(172) =>
U496_ml(172), ml(171) => U496_ml(171), ml(170) =>
U496_ml(170), ml(169) => U496_ml(169), ml(168) =>
U496_ml(168), ml(167) => U496_ml(167), ml(166) =>
U496_ml(166), ml(165) => U496_ml(165), ml(164) =>
U496_ml(164), ml(163) => U496_ml(163), ml(162) =>
U496_ml(162), ml(161) => U496_ml(161), ml(160) =>
U496_ml(160), ml(159) => U496_ml(159), ml(158) =>
U496_ml(158), ml(157) => U496_ml(157), ml(156) =>
U496_ml(156), ml(155) => U496_ml(155), ml(154) =>
U496_ml(154), ml(153) => U496_ml(153), ml(152) =>
U496_ml(152), ml(151) => U496_ml(151), ml(150) =>
U496_ml(150), ml(149) => U496_ml(149), ml(148) =>
U496_ml(148), ml(147) => U496_ml(147), ml(146) =>
U496_ml(146), ml(145) => U496_ml(145), ml(144) =>
U496_ml(144), ml(143) => U496_ml(143), ml(142) =>
U496_ml(142), ml(141) => U496_ml(141), ml(140) =>
U496_ml(140), ml(139) => U496_ml(139), ml(138) =>
U496_ml(138), ml(137) => U496_ml(137), ml(136) =>
U496_ml(136), ml(135) => U496_ml(135), ml(134) =>
U496_ml(134), ml(133) => U496_ml(133), ml(132) =>
U496_ml(132), ml(131) => U496_ml(131), ml(130) =>

```
U496_ml(130), ml(129) => U496_ml(129), ml(128) =>
U496_ml(128), ml(127) => U496_ml(127), ml(126) =>
U496_ml(126), ml(125) => U496_ml(125), ml(124) =>
U496_ml(124), ml(123) => U496_ml(123), ml(122) =>
U496_ml(122), ml(121) => U496_ml(121), ml(120) =>
U496_ml(120), ml(119) => U496_ml(119), ml(118) =>
U496_ml(118), ml(117) => U496_ml(117), ml(116) =>
U496_ml(116), ml(115) => U496_ml(115), ml(114) =>
U496_ml(114), ml(113) => U496_ml(113), ml(112) =>
U496_ml(112), ml(111) => U496_ml(111), ml(110) =>
U496_ml(110), ml(109) => U496_ml(109), ml(108) =>
U496_ml(108), ml(107) => U496_ml(107), ml(106) =>
U496_ml(106), ml(105) => U496_ml(105), ml(104) =>
U496_ml(104), ml(103) => U496_ml(103), ml(102) =>
U496_ml(102), ml(101) => U496_ml(101), ml(100) =>
U496_ml(100), ml(99) => U496_ml(99), ml(98) =>
U496_ml(98), ml(97) => U496_ml(97), ml(96) =>
U496_ml(96), ml(95) => U496_ml(95), ml(94) =>
U496_ml(94), ml(93) => U496_ml(93), ml(92) =>
U496_ml(92), ml(91) => U496_ml(91), ml(90) =>
U496_ml(90), ml(89) => U496_ml(89), ml(88) =>
U496_ml(88), ml(87) => U496_ml(87), ml(86) =>
U496_ml(86), ml(85) => U496_ml(85), ml(84) =>
U496_ml(84), ml(83) => U496_ml(83), ml(82) =>
U496_ml(82), ml(81) => U496_ml(81), ml(80) =>
U496_ml(80), ml(79) => U496_ml(79), ml(78) =>
U496_ml(78), ml(77) => U496_ml(77), ml(76) =>
U496_ml(76), ml(75) => U496_ml(75), ml(74) =>
U496_ml(74), ml(73) => U496_ml(73), ml(72) =>
U496_ml(72), ml(71) => U496_ml(71), ml(70) =>
U496_ml(70), ml(69) => U496_ml(69), ml(68) =>
U496_ml(68), ml(67) => U496_ml(67), ml(66) =>
U496_ml(66), ml(65) => U496_ml(65), ml(64) =>
U496_ml(64), ml(63) => U496_ml(63), ml(62) =>
U496_ml(62), ml(61) => U496_ml(61), ml(60) =>
U496_ml(60), ml(59) => U496_ml(59), ml(58) =>
U496_ml(58), ml(57) => U496_ml(57), ml(56) =>
U496_ml(56), ml(55) => U496_ml(55), ml(54) =>
U496_ml(54), ml(53) => U496_ml(53), ml(52) =>
U496_ml(52), ml(51) => U496_ml(51), ml(50) =>
U496_ml(50), ml(49) => U496_ml(49), ml(48) =>
U496_ml(48), ml(47) => U496_ml(47), ml(46) =>
U496_ml(46), ml(45) => U496_ml(45), ml(44) =>
U496_ml(44), ml(43) => U496_ml(43), ml(42) =>
U496_ml(42), ml(41) => U496_ml(41), ml(40) =>
U496_ml(40), ml(39) => U496_ml(39), ml(38) =>
U496_ml(38), ml(37) => U496_ml(37), ml(36) =>
U496_ml(36), ml(35) => U496_ml(35), ml(34) =>
U496_ml(34), ml(33) => U496_ml(33), ml(32) =>
U496_ml(32), ml(31) => U496_ml(31), ml(30) =>
U496_ml(30), ml(29) => U496_ml(29), ml(28) =>
U496_ml(28), ml(27) => U496_ml(27), ml(26) =>
U496_ml(26), ml(25) => U496_ml(25), ml(24) =>
U496_ml(24), ml(23) => U496_ml(23), ml(22) =>
U496_ml(22), ml(21) => U496_ml(21), ml(20) =>
U496_ml(20), ml(19) => U496_ml(19), ml(18) =>
U496_ml(18), ml(17) => U496_ml(17), ml(16) =>
U496_ml(16), ml(15) => U496_ml(15), ml(14) =>
```

```
        U496_ml(14), ml(13) => U496_ml(13), ml(12) =>
        U496_ml(12), ml(11) => U496_ml(11), ml(10) =>
        U496_ml(10), ml(9) => U496_ml(9), ml(8) =>
        U496_ml(8), ml(7) => U496_ml(7), ml(6) =>
        U496_ml(6), ml(5) => U496_ml(5), ml(4) =>
        U496_ml(4), ml(3) => U496_ml(3), ml(2) =>
        U496_ml(2), ml(1) => U496_ml(1), ml(0) =>
        U496_ml(0), fircnten => U491_Z );

U465: ni01d5
   port map ( I => exen, Z => U465_Z );

U488: ni01d5
   port map ( I => disch, Z => U488_Z );

U489: ni01d5
   port map ( I => asaen, Z => U489_Z );

U491: ni01d5
   port map ( I => fircnten, Z => U491_Z );

U496: array341_m
   port map ( wl(340) => U468_wl(340), wl(339) => U468_wl(339),
        wl(338) => U468_wl(338), wl(337) => U468_wl(337),
        wl(336) => U468_wl(336), wl(335) => U468_wl(335),
        wl(334) => U468_wl(334), wl(333) => U468_wl(333),
        wl(332) => U468_wl(332), wl(331) => U468_wl(331),
        wl(330) => U468_wl(330), wl(329) => U468_wl(329),
        wl(328) => U468_wl(328), wl(327) => U468_wl(327),
        wl(326) => U468_wl(326), wl(325) => U468_wl(325),
        wl(324) => U468_wl(324), wl(323) => U468_wl(323),
        wl(322) => U468_wl(322), wl(321) => U468_wl(321),
        wl(320) => U468_wl(320), wl(319) => U468_wl(319),
        wl(318) => U468_wl(318), wl(317) => U468_wl(317),
        wl(316) => U468_wl(316), wl(315) => U468_wl(315),
        wl(314) => U468_wl(314), wl(313) => U468_wl(313),
        wl(312) => U468_wl(312), wl(311) => U468_wl(311),
        wl(310) => U468_wl(310), wl(309) => U468_wl(309),
        wl(308) => U468_wl(308), wl(307) => U468_wl(307),
        wl(306) => U468_wl(306), wl(305) => U468_wl(305),
        wl(304) => U468_wl(304), wl(303) => U468_wl(303),
        wl(302) => U468_wl(302), wl(301) => U468_wl(301),
        wl(300) => U468_wl(300), wl(299) => U468_wl(299),
        wl(298) => U468_wl(298), wl(297) => U468_wl(297),
        wl(296) => U468_wl(296), wl(295) => U468_wl(295),
        wl(294) => U468_wl(294), wl(293) => U468_wl(293),
        wl(292) => U468_wl(292), wl(291) => U468_wl(291),
        wl(290) => U468_wl(290), wl(289) => U468_wl(289),
        wl(288) => U468_wl(288), wl(287) => U468_wl(287),
        wl(286) => U468_wl(286), wl(285) => U468_wl(285),
        wl(284) => U468_wl(284), wl(283) => U468_wl(283),
        wl(282) => U468_wl(282), wl(281) => U468_wl(281),
        wl(280) => U468_wl(280), wl(279) => U468_wl(279),
        wl(278) => U468_wl(278), wl(277) => U468_wl(277),
        wl(276) => U468_wl(276), wl(275) => U468_wl(275),
        wl(274) => U468_wl(274), wl(273) => U468_wl(273),
        wl(272) => U468_wl(272), wl(271) => U468_wl(271),
        wl(270) => U468_wl(270), wl(269) => U468_wl(269),
```

wl(268) => U468_wl(268), wl(267) => U468_wl(267),
wl(266) => U468_wl(266), wl(265) => U468_wl(265),
wl(264) => U468_wl(264), wl(263) => U468_wl(263),
wl(262) => U468_wl(262), wl(261) => U468_wl(261),
wl(260) => U468_wl(260), wl(259) => U468_wl(259),
wl(258) => U468_wl(258), wl(257) => U468_wl(257),
wl(256) => U468_wl(256), wl(255) => U468_wl(255),
wl(254) => U468_wl(254), wl(253) => U468_wl(253),
wl(252) => U468_wl(252), wl(251) => U468_wl(251),
wl(250) => U468_wl(250), wl(249) => U468_wl(249),
wl(248) => U468_wl(248), wl(247) => U468_wl(247),
wl(246) => U468_wl(246), wl(245) => U468_wl(245),
wl(244) => U468_wl(244), wl(243) => U468_wl(243),
wl(242) => U468_wl(242), wl(241) => U468_wl(241),
wl(240) => U468_wl(240), wl(239) => U468_wl(239),
wl(238) => U468_wl(238), wl(237) => U468_wl(237),
wl(236) => U468_wl(236), wl(235) => U468_wl(235),
wl(234) => U468_wl(234), wl(233) => U468_wl(233),
wl(232) => U468_wl(232), wl(231) => U468_wl(231),
wl(230) => U468_wl(230), wl(229) => U468_wl(229),
wl(228) => U468_wl(228), wl(227) => U468_wl(227),
wl(226) => U468_wl(226), wl(225) => U468_wl(225),
wl(224) => U468_wl(224), wl(223) => U468_wl(223),
wl(222) => U468_wl(222), wl(221) => U468_wl(221),
wl(220) => U468_wl(220), wl(219) => U468_wl(219),
wl(218) => U468_wl(218), wl(217) => U468_wl(217),
wl(216) => U468_wl(216), wl(215) => U468_wl(215),
wl(214) => U468_wl(214), wl(213) => U468_wl(213),
wl(212) => U468_wl(212), wl(211) => U468_wl(211),
wl(210) => U468_wl(210), wl(209) => U468_wl(209),
wl(208) => U468_wl(208), wl(207) => U468_wl(207),
wl(206) => U468_wl(206), wl(205) => U468_wl(205),
wl(204) => U468_wl(204), wl(203) => U468_wl(203),
wl(202) => U468_wl(202), wl(201) => U468_wl(201),
wl(200) => U468_wl(200), wl(199) => U468_wl(199),
wl(198) => U468_wl(198), wl(197) => U468_wl(197),
wl(196) => U468_wl(196), wl(195) => U468_wl(195),
wl(194) => U468_wl(194), wl(193) => U468_wl(193),
wl(192) => U468_wl(192), wl(191) => U468_wl(191),
wl(190) => U468_wl(190), wl(189) => U468_wl(189),
wl(188) => U468_wl(188), wl(187) => U468_wl(187),
wl(186) => U468_wl(186), wl(185) => U468_wl(185),
wl(184) => U468_wl(184), wl(183) => U468_wl(183),
wl(182) => U468_wl(182), wl(181) => U468_wl(181),
wl(180) => U468_wl(180), wl(179) => U468_wl(179),
wl(178) => U468_wl(178), wl(177) => U468_wl(177),
wl(176) => U468_wl(176), wl(175) => U468_wl(175),
wl(174) => U468_wl(174), wl(173) => U468_wl(173),
wl(172) => U468_wl(172), wl(171) => U468_wl(171),
wl(170) => U468_wl(170), wl(169) => U468_wl(169),
wl(168) => U468_wl(168), wl(167) => U468_wl(167),
wl(166) => U468_wl(166), wl(165) => U468_wl(165),
wl(164) => U468_wl(164), wl(163) => U468_wl(163),
wl(162) => U468_wl(162), wl(161) => U468_wl(161),
wl(160) => U468_wl(160), wl(159) => U468_wl(159),
wl(158) => U468_wl(158), wl(157) => U468_wl(157),
wl(156) => U468_wl(156), wl(155) => U468_wl(155),
wl(154) => U468_wl(154), wl(153) => U468_wl(153), wl(152) => U468_wl(152), wl(151) => U468_wl(151),
wl(150) => U468_wl(150), wl(149) => U468_wl(149),
wl(148) => U468_wl(148), wl(147) => U468_wl(147),
wl(146) => U468_wl(146), wl(145) => U468_wl(145),
wl(144) => U468_wl(144), wl(143) => U468_wl(143),
wl(142) => U468_wl(142), wl(141) => U468_wl(141),
wl(140) => U468_wl(140), wl(139) => U468_wl(139),
wl(138) => U468_wl(138), wl(137) => U468_wl(137),
wl(136) => U468_wl(136), wl(135) => U468_wl(135),
wl(134) => U468_wl(134), wl(133) => U468_wl(133),
wl(132) => U468_wl(132), wl(131) => U468_wl(131),
wl(130) => U468_wl(130), wl(129) => U468_wl(129),
wl(128) => U468_wl(128), wl(127) => U468_wl(127),
wl(126) => U468_wl(126), wl(125) => U468_wl(125),
wl(124) => U468_wl(124), wl(123) => U468_wl(123),
wl(122) => U468_wl(122), wl(121) => U468_wl(121),
wl(120) => U468_wl(120), wl(119) => U468_wl(119),
wl(118) => U468_wl(118), wl(117) => U468_wl(117),
wl(116) => U468_wl(116), wl(115) => U468_wl(115),
wl(114) => U468_wl(114), wl(113) => U468_wl(113),
wl(112) => U468_wl(112), wl(111) => U468_wl(111),
wl(110) => U468_wl(110), wl(109) => U468_wl(109),
wl(108) => U468_wl(108), wl(107) => U468_wl(107),
wl(106) => U468_wl(106), wl(105) => U468_wl(105),
wl(104) => U468_wl(104), wl(103) => U468_wl(103),
wl(102) => U468_wl(102), wl(101) => U468_wl(101),
wl(100) => U468_wl(100), wl(99) => U468_wl(99),
wl(98) => U468_wl(98), wl(97) => U468_wl(97),
wl(96) => U468_wl(96), wl(95) => U468_wl(95),
wl(94) => U468_wl(94), wl(93) => U468_wl(93),
wl(92) => U468_wl(92), wl(91) => U468_wl(91),
wl(90) => U468_wl(90), wl(89) => U468_wl(89),
wl(88) => U468_wl(88), wl(87) => U468_wl(87),
wl(86) => U468_wl(86), wl(85) => U468_wl(85),
wl(84) => U468_wl(84), wl(83) => U468_wl(83),
wl(82) => U468_wl(82), wl(81) => U468_wl(81),
wl(80) => U468_wl(80), wl(79) => U468_wl(79),
wl(78) => U468_wl(78), wl(77) => U468_wl(77),
wl(76) => U468_wl(76), wl(75) => U468_wl(75),
wl(74) => U468_wl(74), wl(73) => U468_wl(73),
wl(72) => U468_wl(72), wl(71) => U468_wl(71),
wl(70) => U468_wl(70), wl(69) => U468_wl(69),
wl(68) => U468_wl(68), wl(67) => U468_wl(67),
wl(66) => U468_wl(66), wl(65) => U468_wl(65),
wl(64) => U468_wl(64), wl(63) => U468_wl(63),
wl(62) => U468_wl(62), wl(61) => U468_wl(61),
wl(60) => U468_wl(60), wl(59) => U468_wl(59),
wl(58) => U468_wl(58), wl(57) => U468_wl(57),
wl(56) => U468_wl(56), wl(55) => U468_wl(55),
wl(54) => U468_wl(54), wl(53) => U468_wl(53),
wl(52) => U468_wl(52), wl(51) => U468_wl(51),
wl(50) => U468_wl(50), wl(49) => U468_wl(49),
wl(48) => U468_wl(48), wl(47) => U468_wl(47),
wl(46) => U468_wl(46), wl(45) => U468_wl(45),
wl(44) => U468_wl(44), wl(43) => U468_wl(43),
wl(42) => U468_wl(42), wl(41) => U468_wl(41),
wl(40) => U468_wl(40), wl(39) => U468_wl(39),
wl(38) => U468_wl(38), wl(37) => U468_wl(37), wl(36) => U468_wl(36), wl(35) => U468_wl(35), wl(34) => U468_wl(34), wl(33) => U468_wl(33), wl(32) => U468_wl(32), wl(31) => U468_wl(31), wl(30) => U468_wl(30), wl(29) => U468_wl(29), wl(28) => U468_wl(28), wl(27) => U468_wl(27), wl(26) => U468_wl(26), wl(25) => U468_wl(25), wl(24) => U468_wl(24), wl(23) => U468_wl(23), wl(22) => U468_wl(22), wl(21) => U468_wl(21), wl(20) => U468_wl(20), wl(19) => U468_wl(19), wl(18) => U468_wl(18), wl(17) => U468_wl(17), wl(16) => U468_wl(16), wl(15) => U468_wl(15), wl(14) => U468_wl(14), wl(13) => U468_wl(13), wl(12) => U468_wl(12), wl(11) => U468_wl(11), wl(10) => U468_wl(10), wl(9) => U468_wl(9), wl(8) => U468_wl(8), wl(7) => U468_wl(7), wl(6) => U468_wl(6), wl(5) => U468_wl(5), wl(4) => U468_wl(4), wl(3) => U468_wl(3), wl(2) => U468_wl(2), wl(1) => U468_wl(1), wl(0) => U468_wl(0), ml(340) => U496_ml(340), ml(339) => U496_ml(339), ml(338) => U496_ml(338), ml(337) => U496_ml(337), ml(336) => U496_ml(336), ml(335) => U496_ml(335), ml(334) => U496_ml(334), ml(333) => U496_ml(333), ml(332) => U496_ml(332), ml(331) => U496_ml(331), ml(330) => U496_ml(330), ml(329) => U496_ml(329), ml(328) => U496_ml(328), ml(327) => U496_ml(327), ml(326) => U496_ml(326), ml(325) => U496_ml(325), ml(324) => U496_ml(324), ml(323) => U496_ml(323), ml(322) => U496_ml(322), ml(321) => U496_ml(321), ml(320) => U496_ml(320), ml(319) => U496_ml(319), ml(318) => U496_ml(318), ml(317) => U496_ml(317), ml(316) => U496_ml(316), ml(315) => U496_ml(315), ml(314) => U496_ml(314), ml(313) => U496_ml(313), ml(312) => U496_ml(312), ml(311) => U496_ml(311), ml(310) => U496_ml(310), ml(309) => U496_ml(309), ml(308) => U496_ml(308), ml(307) => U496_ml(307), ml(306) => U496_ml(306), ml(305) => U496_ml(305), ml(304) => U496_ml(304), ml(303) => U496_ml(303), ml(302) => U496_ml(302), ml(301) => U496_ml(301), ml(300) => U496_ml(300), ml(299) => U496_ml(299), ml(298) => U496_ml(298), ml(297) => U496_ml(297), ml(296) => U496_ml(296), ml(295) => U496_ml(295), ml(294) => U496_ml(294), ml(293) => U496_ml(293), ml(292) => U496_ml(292), ml(291) => U496_ml(291), ml(290) => U496_ml(290), ml(289) => U496_ml(289), ml(288) => U496_ml(288), ml(287) => U496_ml(287), ml(286) => U496_ml(286), ml(285) => U496_ml(285), ml(284) => U496_ml(284), ml(283) => U496_ml(283), ml(282) => U496_ml(282), ml(281) => U496_ml(281), ml(280) => U496_ml(280), ml(279) => U496_ml(279), ml(278) => U496_ml(278), ml(277) => U496_ml(277), ml(276) => U496_ml(276), ml(275) => U496_ml(275), ml(274) => U496_ml(274), ml(273) => U496_ml(273), ml(272) => U496_ml(272), ml(271) => U496_ml(271), ml(270) => U496_ml(270), ml(269) => U496_ml(269), ml(268) => U496_ml(268), ml(267) => U496_ml(267), ml(266) => U496_ml(266), ml(265) => U496_ml(265), ml(264) => U496_ml(264), ml(263) => U496_ml(263), ml(262) => U496_ml(262), ml(261) =>

U496_ml(261), ml(260) => U496_ml(260), ml(259) =>
U496_ml(259), ml(258) => U496_ml(258), ml(257) =>
U496_ml(257), ml(256) => U496_ml(256), ml(255) =>
U496_ml(255), ml(254) => U496_ml(254), ml(253) =>
U496_ml(253), ml(252) => U496_ml(252), ml(251) =>
U496_ml(251), ml(250) => U496_ml(250), ml(249) =>
U496_ml(249), ml(248) => U496_ml(248), ml(247) =>
U496_ml(247), ml(246) => U496_ml(246), ml(245) =>
U496_ml(245), ml(244) => U496_ml(244), ml(243) =>
U496_ml(243), ml(242) => U496_ml(242), ml(241) =>
U496_ml(241), ml(240) => U496_ml(240), ml(239) =>
U496_ml(239), ml(238) => U496_ml(238), ml(237) =>
U496_ml(237), ml(236) => U496_ml(236), ml(235) =>
U496_ml(235), ml(234) => U496_ml(234), ml(233) =>
U496_ml(233), ml(232) => U496_ml(232), ml(231) =>
U496_ml(231), ml(230) => U496_ml(230), ml(229) =>
U496_ml(229), ml(228) => U496_ml(228), ml(227) =>
U496_ml(227), ml(226) => U496_ml(226), ml(225) =>
U496_ml(225), ml(224) => U496_ml(224), ml(223) =>
U496_ml(223), ml(222) => U496_ml(222), ml(221) =>
U496_ml(221), ml(220) => U496_ml(220), ml(219) =>
U496_ml(219), ml(218) => U496_ml(218), ml(217) =>
U496_ml(217), ml(216) => U496_ml(216), ml(215) =>
U496_ml(215), ml(214) => U496_ml(214), ml(213) =>
U496_ml(213), ml(212) => U496_ml(212), ml(211) =>
U496_ml(211), ml(210) => U496_ml(210), ml(209) =>
U496_ml(209), ml(208) => U496_ml(208), ml(207) =>
U496_ml(207), ml(206) => U496_ml(206), ml(205) =>
U496_ml(205), ml(204) => U496_ml(204), ml(203) =>
U496_ml(203), ml(202) => U496_ml(202), ml(201) =>
U496_ml(201), ml(200) => U496_ml(200), ml(199) =>
U496_ml(199), ml(198) => U496_ml(198), ml(197) =>
U496_ml(197), ml(196) => U496_ml(196), ml(195) =>
U496_ml(195), ml(194) => U496_ml(194), ml(193) =>
U496_ml(193), ml(192) => U496_ml(192), ml(191) =>
U496_ml(191), ml(190) => U496_ml(190), ml(189) =>
U496_ml(189), ml(188) => U496_ml(188), ml(187) =>
U496_ml(187), ml(186) => U496_ml(186), ml(185) =>
U496_ml(185), ml(184) => U496_ml(184), ml(183) =>
U496_ml(183), ml(182) => U496_ml(182), ml(181) =>
U496_ml(181), ml(180) => U496_ml(180), ml(179) =>
U496_ml(179), ml(178) => U496_ml(178), ml(177) =>
U496_ml(177), ml(176) => U496_ml(176), ml(175) =>
U496_ml(175), ml(174) => U496_ml(174), ml(173) =>
U496_ml(173), ml(172) => U496_ml(172), ml(171) =>
U496_ml(171), ml(170) => U496_ml(170), ml(169) =>
U496_ml(169), ml(168) => U496_ml(168), ml(167) =>
U496_ml(167), ml(166) => U496_ml(166), ml(165) =>
U496_ml(165), ml(164) => U496_ml(164), ml(163) =>
U496_ml(163), ml(162) => U496_ml(162), ml(161) =>
U496_ml(161), ml(160) => U496_ml(160), ml(159) =>
U496_ml(159), ml(158) => U496_ml(158), ml(157) =>
U496_ml(157), ml(156) => U496_ml(156), ml(155) =>
U496_ml(155), ml(154) => U496_ml(154), ml(153) =>
U496_ml(153), ml(152) => U496_ml(152), ml(151) =>
U496_ml(151), ml(150) => U496_ml(150), ml(149) =>
U496_ml(149), ml(148) => U496_ml(148), ml(147) =>
U496_ml(147), ml(146) => U496_ml(146), ml(145) =>

```
U496_ml(145), ml(144) => U496_ml(144), ml(143) =>
U496_ml(143), ml(142) => U496_ml(142), ml(141) =>
U496_ml(141), ml(140) => U496_ml(140), ml(139) =>
U496_ml(139), ml(138) => U496_ml(138), ml(137) =>
U496_ml(137), ml(136) => U496_ml(136), ml(135) =>
U496_ml(135), ml(134) => U496_ml(134), ml(133) =>
U496_ml(133), ml(132) => U496_ml(132), ml(131) =>
U496_ml(131), ml(130) => U496_ml(130), ml(129) =>
U496_ml(129), ml(128) => U496_ml(128), ml(127) =>
U496_ml(127), ml(126) => U496_ml(126), ml(125) =>
U496_ml(125), ml(124) => U496_ml(124), ml(123) =>
U496_ml(123), ml(122) => U496_ml(122), ml(121) =>
U496_ml(121), ml(120) => U496_ml(120), ml(119) =>
U496_ml(119), ml(118) => U496_ml(118), ml(117) =>
U496_ml(117), ml(116) => U496_ml(116), ml(115) =>
U496_ml(115), ml(114) => U496_ml(114), ml(113) =>
U496_ml(113), ml(112) => U496_ml(112), ml(111) =>
U496_ml(111), ml(110) => U496_ml(110), ml(109) =>
U496_ml(109), ml(108) => U496_ml(108), ml(107) =>
U496_ml(107), ml(106) => U496_ml(106), ml(105) =>
U496_ml(105), ml(104) => U496_ml(104), ml(103) =>
U496_ml(103), ml(102) => U496_ml(102), ml(101) =>
U496_ml(101), ml(100) => U496_ml(100), ml(99) =>
U496_ml(99), ml(98) => U496_ml(98), ml(97) =>
U496_ml(97), ml(96) => U496_ml(96), ml(95) =>
U496_ml(95), ml(94) => U496_ml(94), ml(93) =>
U496_ml(93), ml(92) => U496_ml(92), ml(91) =>
U496_ml(91), ml(90) => U496_ml(90), ml(89) =>
U496_ml(89), ml(88) => U496_ml(88), ml(87) =>
U496_ml(87), ml(86) => U496_ml(86), ml(85) =>
U496_ml(85), ml(84) => U496_ml(84), ml(83) =>
U496_ml(83), ml(82) => U496_ml(82), ml(81) =>
U496_ml(81), ml(80) => U496_ml(80), ml(79) =>
U496_ml(79), ml(78) => U496_ml(78), ml(77) =>
U496_ml(77), ml(76) => U496_ml(76), ml(75) =>
U496_ml(75), ml(74) => U496_ml(74), ml(73) =>
U496_ml(73), ml(72) => U496_ml(72), ml(71) =>
U496_ml(71), ml(70) => U496_ml(70), ml(69) =>
U496_ml(69), ml(68) => U496_ml(68), ml(67) =>
U496_ml(67), ml(66) => U496_ml(66), ml(65) =>
U496_ml(65), ml(64) => U496_ml(64), ml(63) =>
U496_ml(63), ml(62) => U496_ml(62), ml(61) =>
U496_ml(61), ml(60) => U496_ml(60), ml(59) =>
U496_ml(59), ml(58) => U496_ml(58), ml(57) =>
U496_ml(57), ml(56) => U496_ml(56), ml(55) =>
U496_ml(55), ml(54) => U496_ml(54), ml(53) =>
U496_ml(53), ml(52) => U496_ml(52), ml(51) =>
U496_ml(51), ml(50) => U496_ml(50), ml(49) =>
U496_ml(49), ml(48) => U496_ml(48), ml(47) =>
U496_ml(47), ml(46) => U496_ml(46), ml(45) =>
U496_ml(45), ml(44) => U496_ml(44), ml(43) =>
U496_ml(43), ml(42) => U496_ml(42), ml(41) =>
U496_ml(41), ml(40) => U496_ml(40), ml(39) =>
U496_ml(39), ml(38) => U496_ml(38), ml(37) =>
U496_ml(37), ml(36) => U496_ml(36), ml(35) =>
U496_ml(35), ml(34) => U496_ml(34), ml(33) =>
U496_ml(33), ml(32) => U496_ml(32), ml(31) =>
U496_ml(31), ml(30) => U496_ml(30), ml(29) =>
```

U496_ml(29), ml(28) => U496_ml(28), ml(27) =>
U496_ml(27), ml(26) => U496_ml(26), ml(25) =>
U496_ml(25), ml(24) => U496_ml(24), ml(23) =>
U496_ml(23), ml(22) => U496_ml(22), ml(21) =>
U496_ml(21), ml(20) => U496_ml(20), ml(19) =>
U496_ml(19), ml(18) => U496_ml(18), ml(17) =>
U496_ml(17), ml(16) => U496_ml(16), ml(15) =>
U496_ml(15), ml(14) => U496_ml(14), ml(13) =>
U496_ml(13), ml(12) => U496_ml(12), ml(11) =>
U496_ml(11), ml(10) => U496_ml(10), ml(9) =>
U496_ml(9), ml(8) => U496_ml(8), ml(7) =>
U496_ml(7), ml(6) => U496_ml(6), ml(5) =>
U496_ml(5), ml(4) => U496_ml(4), ml(3) =>
U496_ml(3), ml(2) => U496_ml(2), ml(1) =>
U496_ml(1), ml(0) => U496_ml(0), rspen(340) =>
U468_rspen(340), rspen(339) => U468_rspen(339),
rspen(338) => U468_rspen(338), rspen(337) =>
U468_rspen(337), rspen(336) => U468_rspen(336),
rspen(335) => U468_rspen(335), rspen(334) =>
U468_rspen(334), rspen(333) => U468_rspen(333),
rspen(332) => U468_rspen(332), rspen(331) =>
U468_rspen(331), rspen(330) => U468_rspen(330),
rspen(329) => U468_rspen(329), rspen(328) =>
U468_rspen(328), rspen(327) => U468_rspen(327),
rspen(326) => U468_rspen(326), rspen(325) =>
U468_rspen(325), rspen(324) => U468_rspen(324),
rspen(323) => U468_rspen(323), rspen(322) =>
U468_rspen(322), rspen(321) => U468_rspen(321),
rspen(320) => U468_rspen(320), rspen(319) =>
U468_rspen(319), rspen(318) => U468_rspen(318),
rspen(317) => U468_rspen(317), rspen(316) =>
U468_rspen(316), rspen(315) => U468_rspen(315),
rspen(314) => U468_rspen(314), rspen(313) =>
U468_rspen(313), rspen(312) => U468_rspen(312),
rspen(311) => U468_rspen(311), rspen(310) =>
U468_rspen(310), rspen(309) => U468_rspen(309),
rspen(308) => U468_rspen(308), rspen(307) =>
U468_rspen(307), rspen(306) => U468_rspen(306),
rspen(305) => U468_rspen(305), rspen(304) =>
U468_rspen(304), rspen(303) => U468_rspen(303),
rspen(302) => U468_rspen(302), rspen(301) =>
U468_rspen(301), rspen(300) => U468_rspen(300),
rspen(299) => U468_rspen(299), rspen(298) =>
U468_rspen(298), rspen(297) => U468_rspen(297),
rspen(296) => U468_rspen(296), rspen(295) =>
U468_rspen(295), rspen(294) => U468_rspen(294),
rspen(293) => U468_rspen(293), rspen(292) =>
U468_rspen(292), rspen(291) => U468_rspen(291),
rspen(290) => U468_rspen(290), rspen(289) =>
U468_rspen(289), rspen(288) => U468_rspen(288),
rspen(287) => U468_rspen(287), rspen(286) =>
U468_rspen(286), rspen(285) => U468_rspen(285),
rspen(284) => U468_rspen(284), rspen(283) =>
U468_rspen(283), rspen(282) => U468_rspen(282),
rspen(281) => U468_rspen(281), rspen(280) =>
U468_rspen(280), rspen(279) => U468_rspen(279),
rspen(278) => U468_rspen(278), rspen(277) =>
U468_rspen(277), rspen(276) => U468_rspen(276), rspen(275) => U468_rspen(275), rspen(274) => U468_rspen(274), rspen(273) => U468_rspen(273), rspen(272) => U468_rspen(272), rspen(271) => U468_rspen(271), rspen(270) => U468_rspen(270), rspen(269) => U468_rspen(269), rspen(268) => U468_rspen(268), rspen(267) => U468_rspen(267), rspen(266) => U468_rspen(266), rspen(265) => U468_rspen(265), rspen(264) => U468_rspen(264), rspen(263) => U468_rspen(263), rspen(262) => U468_rspen(262), rspen(261) => U468_rspen(261), rspen(260) => U468_rspen(260), rspen(259) => U468_rspen(259), rspen(258) => U468_rspen(258), rspen(257) => U468_rspen(257), rspen(256) => U468_rspen(256), rspen(255) => U468_rspen(255), rspen(254) => U468_rspen(254), rspen(253) => U468_rspen(253), rspen(252) => U468_rspen(252), rspen(251) => U468_rspen(251), rspen(250) => U468_rspen(250), rspen(249) => U468_rspen(249), rspen(248) => U468_rspen(248), rspen(247) => U468_rspen(247), rspen(246) => U468_rspen(246), rspen(245) => U468_rspen(245), rspen(244) => U468_rspen(244), rspen(243) => U468_rspen(243), rspen(242) => U468_rspen(242), rspen(241) => U468_rspen(241), rspen(240) => U468_rspen(240), rspen(239) => U468_rspen(239), rspen(238) => U468_rspen(238), rspen(237) => U468_rspen(237), rspen(236) => U468_rspen(236), rspen(235) => U468_rspen(235), rspen(234) => U468_rspen(234), rspen(233) => U468_rspen(233), rspen(232) => U468_rspen(232), rspen(231) => U468_rspen(231), rspen(230) => U468_rspen(230), rspen(229) => U468_rspen(229), rspen(228) => U468_rspen(228), rspen(227) => U468_rspen(227), rspen(226) => U468_rspen(226), rspen(225) => U468_rspen(225), rspen(224) => U468_rspen(224), rspen(223) => U468_rspen(223), rspen(222) => U468_rspen(222), rspen(221) => U468_rspen(221), rspen(220) => U468_rspen(220), rspen(219) => U468_rspen(219), rspen(218) => U468_rspen(218), rspen(217) => U468_rspen(217), rspen(216) => U468_rspen(216), rspen(215) => U468_rspen(215), rspen(214) => U468_rspen(214), rspen(213) => U468_rspen(213), rspen(212) => U468_rspen(212), rspen(211) => U468_rspen(211), rspen(210) => U468_rspen(210), rspen(209) => U468_rspen(209), rspen(208) => U468_rspen(208), rspen(207) => U468_rspen(207), rspen(206) => U468_rspen(206), rspen(205) => U468_rspen(205), rspen(204) => U468_rspen(204), rspen(203) => U468_rspen(203), rspen(202) => U468_rspen(202), rspen(201) => U468_rspen(201), rspen(200) => U468_rspen(200), rspen(199) => U468_rspen(199), rspen(198) => U468_rspen(198), rspen(197) => U468_rspen(197), rspen(196) => U468_rspen(196), rspen(195) => U468_rspen(195), rspen(194) => U468_rspen(194), rspen(193) => U468_rspen(193), rspen(192) => U468_rspen(192), rspen(191) => U468_rspen(191), rspen(190) => U468_rspen(190), rspen(189) => U468_rspen(189), rspen(188) => U468_rspen(188), rspen(187) => U468_rspen(187), rspen(186) => U468_rspen(186), rspen(185) => U468_rspen(185), rspen(184) => U468_rspen(184), rspen(183) => U468_rspen(183), rspen(182) => U468_rspen(182), rspen(181) => U468_rspen(181), rspen(180) => U468_rspen(180), rspen(179) => U468_rspen(179), rspen(178) => U468_rspen(178), rspen(177) => U468_rspen(177), rspen(176) => U468_rspen(176), rspen(175) => U468_rspen(175), rspen(174) => U468_rspen(174), rspen(173) => U468_rspen(173), rspen(172) => U468_rspen(172), rspen(171) => U468_rspen(171), rspen(170) => U468_rspen(170), rspen(169) => U468_rspen(169), rspen(168) => U468_rspen(168), rspen(167) => U468_rspen(167), rspen(166) => U468_rspen(166), rspen(165) => U468_rspen(165), rspen(164) => U468_rspen(164), rspen(163) => U468_rspen(163), rspen(162) => U468_rspen(162), rspen(161) => U468_rspen(161), rspen(160) => U468_rspen(160), rspen(159) => U468_rspen(159), rspen(158) => U468_rspen(158), rspen(157) => U468_rspen(157), rspen(156) => U468_rspen(156), rspen(155) => U468_rspen(155), rspen(154) => U468_rspen(154), rspen(153) => U468_rspen(153), rspen(152) => U468_rspen(152), rspen(151) => U468_rspen(151), rspen(150) => U468_rspen(150), rspen(149) => U468_rspen(149), rspen(148) => U468_rspen(148), rspen(147) => U468_rspen(147), rspen(146) => U468_rspen(146), rspen(145) => U468_rspen(145), rspen(144) => U468_rspen(144), rspen(143) => U468_rspen(143), rspen(142) => U468_rspen(142), rspen(141) => U468_rspen(141), rspen(140) => U468_rspen(140), rspen(139) => U468_rspen(139), rspen(138) => U468_rspen(138), rspen(137) => U468_rspen(137), rspen(136) => U468_rspen(136), rspen(135) => U468_rspen(135), rspen(134) => U468_rspen(134), rspen(133) => U468_rspen(133), rspen(132) => U468_rspen(132), rspen(131) => U468_rspen(131), rspen(130) => U468_rspen(130), rspen(129) => U468_rspen(129), rspen(128) => U468_rspen(128), rspen(127) => U468_rspen(127), rspen(126) => U468_rspen(126), rspen(125) => U468_rspen(125), rspen(124) => U468_rspen(124), rspen(123) => U468_rspen(123), rspen(122) => U468_rspen(122), rspen(121) => U468_rspen(121), rspen(120) => U468_rspen(120), rspen(119) => U468_rspen(119), rspen(118) => U468_rspen(118), rspen(117) => U468_rspen(117), rspen(116) => U468_rspen(116), rspen(115) => U468_rspen(115), rspen(114) => U468_rspen(114), rspen(113) => U468_rspen(113), rspen(112) => U468_rspen(112), rspen(111) => U468_rspen(111), rspen(110) => U468_rspen(110), rspen(109) => U468_rspen(109), rspen(108) => U468_rspen(108), rspen(107) => U468_rspen(107), rspen(106) => U468_rspen(106), rspen(105) => U468_rspen(105), rspen(104) => U468_rspen(104), rspen(103) => U468_rspen(103), rspen(102) => U468_rspen(102), rspen(101) => U468_rspen(101), rspen(100) => U468_rspen(100), rspen(99) => U468_rspen(99), rspen(98) => U468_rspen(98), rspen(97) => U468_rspen(97), rspen(96) => U468_rspen(96), rspen(95) => U468_rspen(95), rspen(94) => U468_rspen(94), rspen(93) => U468_rspen(93), rspen(92) => U468_rspen(92), rspen(91) => U468_rspen(91), rspen(90) => U468_rspen(90), rspen(89) => U468_rspen(89), rspen(88) => U468_rspen(88), rspen(87) => U468_rspen(87), rspen(86) => U468_rspen(86), rspen(85) => U468_rspen(85), rspen(84) => U468_rspen(84), rspen(83) => U468_rspen(83), rspen(82) => U468_rspen(82), rspen(81) => U468_rspen(81), rspen(80) => U468_rspen(80), rspen(79) => U468_rspen(79), rspen(78) => U468_rspen(78), rspen(77) => U468_rspen(77), rspen(76) => U468_rspen(76), rspen(75) => U468_rspen(75), rspen(74) => U468_rspen(74), rspen(73) => U468_rspen(73), rspen(72) => U468_rspen(72), rspen(71) => U468_rspen(71), rspen(70) => U468_rspen(70), rspen(69) => U468_rspen(69), rspen(68) => U468_rspen(68), rspen(67) => U468_rspen(67), rspen(66) => U468_rspen(66), rspen(65) => U468_rspen(65), rspen(64) => U468_rspen(64), rspen(63) => U468_rspen(63), rspen(62) => U468_rspen(62), rspen(61) => U468_rspen(61), rspen(60) => U468_rspen(60), rspen(59) => U468_rspen(59), rspen(58) => U468_rspen(58), rspen(57) => U468_rspen(57), rspen(56) => U468_rspen(56), rspen(55) => U468_rspen(55), rspen(54) => U468_rspen(54), rspen(53) => U468_rspen(53), rspen(52) => U468_rspen(52), rspen(51) => U468_rspen(51), rspen(50) => U468_rspen(50), rspen(49) => U468_rspen(49), rspen(48) => U468_rspen(48), rspen(47) => U468_rspen(47), rspen(46) => U468_rspen(46), rspen(45) => U468_rspen(45), rspen(44) => U468_rspen(44), rspen(43) => U468_rspen(43), rspen(42) => U468_rspen(42), rspen(41) => U468_rspen(41), rspen(40) => U468_rspen(40), rspen(39) => U468_rspen(39), rspen(38) => U468_rspen(38), rspen(37) => U468_rspen(37), rspen(36) => U468_rspen(36), rspen(35) => U468_rspen(35), rspen(34) => U468_rspen(34), rspen(33) => U468_rspen(33), rspen(32) => U468_rspen(32), rspen(31) => U468_rspen(31), rspen(30) => U468_rspen(30), rspen(29) => U468_rspen(29), rspen(28) => U468_rspen(28), rspen(27) => U468_rspen(27), rspen(26) => U468_rspen(26), rspen(25) => U468_rspen(25), rspen(24) => U468_rspen(24), rspen(23) => U468_rspen(23), rspen(22) => U468_rspen(22), rspen(21) => U468_rspen(21), rspen(20) => U468_rspen(20), rspen(19) => U468_rspen(19), rspen(18) => U468_rspen(18), rspen(17) => U468_rspen(17), rspen(16) => U468_rspen(16), rspen(15) => U468_rspen(15), rspen(14) => U468_rspen(14), rspen(13) => U468_rspen(13), rspen(12) => U468_rspen(12), rspen(11) => U468_rspen(11), rspen(10) => U468_rspen(10), rspen(9) => U468_rspen(9), rspen(8) => U468_rspen(8), rspen(7) => U468_rspen(7), rspen(6) => U468_rspen(6), rspen(5) => U468_rspen(5), rspen(4) => U468_rspen(4), rspen(3) => U468_rspen(3), rspen(2) => U468_rspen(2), rspen(1) => U468_rspen(1), rspen(0) => U468_rspen(0), fwl(340) => U471_fwl(340), fwl(339) => U471_fwl(339), fwl(338) => U471_fwl(338), fwl(337) => U471_fwl(337), fwl(336) => U471_fwl(336), fwl(335) => U471_fwl(335), fwl(334) => U471_fwl(334), fwl(333) => U471_fwl(333), fwl(332) => U471_fwl(332), fwl(331) => U471_fwl(331), fwl(330) => U471_fwl(330), fwl(329) => U471_fwl(329), fwl(328) => U471_fwl(328), fwl(327) => U471_fwl(327), fwl(326) => U471_fwl(326), fwl(325) => U471_fwl(325), fwl(324) => U471_fwl(324), fwl(323) => U471_fwl(323), fwl(322) => U471_fwl(322), fwl(321) => U471_fwl(321), fwl(320) => U471_fwl(320), fwl(319) => U471_fwl(319), fwl(318) => U471_fwl(318), fwl(317) => U471_fwl(317), fwl(316) => U471_fwl(316), fwl(315) => U471_fwl(315), fwl(314) => U471_fwl(314), fwl(313) => U471_fwl(313), fwl(312) => U471_fwl(312), fwl(311) => U471_fwl(311), fwl(310) => U471_fwl(310), fwl(309) => U471_fwl(309), fwl(308) => U471_fwl(308), fwl(307) => U471_fwl(307), fwl(306) => U471_fwl(306), fwl(305) => U471_fwl(305), fwl(304) => U471_fwl(304), fwl(303) => U471_fwl(303), fwl(302) => U471_fwl(302), fwl(301) => U471_fwl(301), fwl(300) => U471_fwl(300), fwl(299) => U471_fwl(299), fwl(298) => U471_fwl(298), fwl(297) => U471_fwl(297), fwl(296) => U471_fwl(296), fwl(295) => U471_fwl(295), fwl(294) => U471_fwl(294), fwl(293) => U471_fwl(293), fwl(292) => U471_fwl(292), fwl(291) => U471_fwl(291), fwl(290) => U471_fwl(290), fwl(289) => U471_fwl(289), fwl(288) => U471_fwl(288), fwl(287) => U471_fwl(287), fwl(286) => U471_fwl(286), fwl(285) => U471_fwl(285), fwl(284) => U471_fwl(284), fwl(283) => U471_fwl(283), fwl(282) => U471_fwl(282), fwl(281) => U471_fwl(281), fwl(280) => U471_fwl(280), fwl(279) => U471_fwl(279), fwl(278) => U471_fwl(278), fwl(277) => U471_fwl(277), fwl(276) => U471_fwl(276), fwl(275) => U471_fwl(275), fwl(274) => U471_fwl(274), fwl(273) => U471_fwl(273), fwl(272) => U471_fwl(272), fwl(271) => U471_fwl(271), fwl(270) => U471_fwl(270), fwl(269) => U471_fwl(269), fwl(268) => U471_fwl(268), fwl(267) => U471_fwl(267), fwl(266) => U471_fwl(266), fwl(265) => U471_fwl(265), fwl(264) => U471_fwl(264), fwl(263) => U471_fwl(263), fwl(262) => U471_fwl(262), fwl(261) => U471_fwl(261), fwl(260) => U471_fwl(260), fwl(259) => U471_fwl(259), fwl(258) => U471_fwl(258), fwl(257) => U471_fwl(257), fwl(256) => U471_fwl(256), fwl(255) => U471_fwl(255), fwl(254) => U471_fwl(254), fwl(253) => U471_fwl(253), fwl(252) => U471_fwl(252), fwl(251) => U471_fwl(251), fwl(250) => U471_fwl(250), fwl(249) => U471_fwl(249), fwl(248) => U471_fwl(248), fwl(247) => U471_fwl(247), fwl(246) => U471_fwl(246), fwl(245) => U471_fwl(245), fwl(244) => U471_fwl(244), fwl(243) => U471_fwl(243), fwl(242) => U471_fwl(242), fwl(241) => U471_fwl(241), fwl(240) => U471_fwl(240), fwl(239) => U471_fwl(239), fwl(238) => U471_fwl(238), fwl(237) => U471_fwl(237), fwl(236) => U471_fwl(236), fwl(235) => U471_fwl(235), fwl(234) => U471_fwl(234), fwl(233) => U471_fwl(233), fwl(232) => U471_fwl(232), fwl(231) => U471_fwl(231), fwl(230) => U471_fwl(230), fwl(229) => U471_fwl(229), fwl(228) => U471_fwl(228), fwl(227) => U471_fwl(227), fwl(226) => U471_fwl(226), fwl(225) => U471_fwl(225), fwl(224) => U471_fwl(224), fwl(223) => U471_fwl(223), fwl(222) => U471_fwl(222), fwl(221) => U471_fwl(221), fwl(220) => U471_fwl(220), fwl(219) => U471_fwl(219), fwl(218) => U471_fwl(218), fwl(217) => U471_fwl(217), fwl(216) => U471_fwl(216), fwl(215) => U471_fwl(215), fwl(214) => U471_fwl(214), fwl(213) => U471_fwl(213), fwl(212) => U471_fwl(212), fwl(211) => U471_fwl(211), fwl(210) => U471_fwl(210), fwl(209) => U471_fwl(209), fwl(208) => U471_fwl(208), fwl(207) => U471_fwl(207), fwl(206) => U471_fwl(206), fwl(205) => U471_fwl(205), fwl(204) => U471_fwl(204), fwl(203) => U471_fwl(203), fwl(202) => U471_fwl(202), fwl(201) => U471_fwl(201), fwl(200) => U471_fwl(200), fwl(199) => U471_fwl(199), fwl(198) => U471_fwl(198), fwl(197) => U471_fwl(197), fwl(196) => U471_fwl(196), fwl(195) => U471_fwl(195), fwl(194) => U471_fwl(194), fwl(193) => U471_fwl(193), fwl(192) => U471_fwl(192), fwl(191) => U471_fwl(191), fwl(190) => U471_fwl(190), fwl(189) => U471_fwl(189), fwl(188) => U471_fwl(188), fwl(187) => U471_fwl(187), fwl(186) => U471_fwl(186), fwl(185) => U471_fwl(185), fwl(184) => U471_fwl(184), fwl(183) => U471_fwl(183), fwl(182) => U471_fwl(182), fwl(181) => U471_fwl(181), fwl(180) => U471_fwl(180), fwl(179) => U471_fwl(179), fwl(178) => U471_fwl(178), fwl(177) => U471_fwl(177), fwl(176) => U471_fwl(176), fwl(175) => U471_fwl(175), fwl(174) => U471_fwl(174), fwl(173) => U471_fwl(173), fwl(172) => U471_fwl(172), fwl(171) => U471_fwl(171), fwl(170) => U471_fwl(170), fwl(169) => U471_fwl(169), fwl(168) => U471_fwl(168), fwl(167) => U471_fwl(167), fwl(166) => U471_fwl(166), fwl(165) => U471_fwl(165), fwl(164) => U471_fwl(164), fwl(163) =>

U471_fwl(163), fwl(162) => U471_fwl(162), fwl(161) => U471_fwl(161), fwl(160) => U471_fwl(160), fwl(159) => U471_fwl(159), fwl(158) => U471_fwl(158), fwl(157) => U471_fwl(157), fwl(156) => U471_fwl(156), fwl(155) => U471_fwl(155), fwl(154) => U471_fwl(154), fwl(153) => U471_fwl(153), fwl(152) => U471_fwl(152), fwl(151) => U471_fwl(151), fwl(150) => U471_fwl(150), fwl(149) => U471_fwl(149), fwl(148) => U471_fwl(148), fwl(147) => U471_fwl(147), fwl(146) => U471_fwl(146), fwl(145) => U471_fwl(145), fwl(144) => U471_fwl(144), fwl(143) => U471_fwl(143), fwl(142) => U471_fwl(142), fwl(141) => U471_fwl(141), fwl(140) => U471_fwl(140), fwl(139) => U471_fwl(139), fwl(138) => U471_fwl(138), fwl(137) => U471_fwl(137), fwl(136) => U471_fwl(136), fwl(135) => U471_fwl(135), fwl(134) => U471_fwl(134), fwl(133) => U471_fwl(133), fwl(132) => U471_fwl(132), fwl(131) => U471_fwl(131), fwl(130) => U471_fwl(130), fwl(129) => U471_fwl(129), fwl(128) => U471_fwl(128), fwl(127) => U471_fwl(127), fwl(126) => U471_fwl(126), fwl(125) => U471_fwl(125), fwl(124) => U471_fwl(124), fwl(123) => U471_fwl(123), fwl(122) => U471_fwl(122), fwl(121) => U471_fwl(121), fwl(120) => U471_fwl(120), fwl(119) => U471_fwl(119), fwl(118) => U471_fwl(118), fwl(117) => U471_fwl(117), fwl(116) => U471_fwl(116), fwl(115) => U471_fwl(115), fwl(114) => U471_fwl(114), fwl(113) => U471_fwl(113), fwl(112) => U471_fwl(112), fwl(111) => U471_fwl(111), fwl(110) => U471_fwl(110), fwl(109) => U471_fwl(109), fwl(108) => U471_fwl(108), fwl(107) => U471_fwl(107), fwl(106) => U471_fwl(106), fwl(105) => U471_fwl(105), fwl(104) => U471_fwl(104), fwl(103) => U471_fwl(103), fwl(102) => U471_fwl(102), fwl(101) => U471_fwl(101), fwl(100) => U471_fwl(100), fwl(99) => U471_fwl(99), fwl(98) => U471_fwl(98), fwl(97) => U471_fwl(97), fwl(96) => U471_fwl(96), fwl(95) => U471_fwl(95), fwl(94) => U471_fwl(94), fwl(93) => U471_fwl(93), fwl(92) => U471_fwl(92), fwl(91) => U471_fwl(91), fwl(90) => U471_fwl(90), fwl(89) => U471_fwl(89), fwl(88) => U471_fwl(88), fwl(87) => U471_fwl(87), fwl(86) => U471_fwl(86), fwl(85) => U471_fwl(85), fwl(84) => U471_fwl(84), fwl(83) => U471_fwl(83), fwl(82) => U471_fwl(82), fwl(81) => U471_fwl(81), fwl(80) => U471_fwl(80), fwl(79) => U471_fwl(79), fwl(78) => U471_fwl(78), fwl(77) => U471_fwl(77), fwl(76) => U471_fwl(76), fwl(75) => U471_fwl(75), fwl(74) => U471_fwl(74), fwl(73) => U471_fwl(73), fwl(72) => U471_fwl(72), fwl(71) => U471_fwl(71), fwl(70) => U471_fwl(70), fwl(69) => U471_fwl(69), fwl(68) => U471_fwl(68), fwl(67) => U471_fwl(67), fwl(66) => U471_fwl(66), fwl(65) => U471_fwl(65), fwl(64) => U471_fwl(64), fwl(63) => U471_fwl(63), fwl(62) => U471_fwl(62), fwl(61) => U471_fwl(61), fwl(60) => U471_fwl(60),

```
fwl(59) => U471_fwl(59), fwl(58) => U471_fwl(58),
fwl(57) => U471_fwl(57), fwl(56) => U471_fwl(56),
fwl(55) => U471_fwl(55), fwl(54) => U471_fwl(54),
fwl(53) => U471_fwl(53), fwl(52) => U471_fwl(52),
fwl(51) => U471_fwl(51), fwl(50) => U471_fwl(50),
fwl(49) => U471_fwl(49), fwl(48) => U471_fwl(48),
fwl(47) => U471_fwl(47), fwl(46) => U471_fwl(46),
fwl(45) => U471_fwl(45), fwl(44) => U471_fwl(44),
fwl(43) => U471_fwl(43), fwl(42) => U471_fwl(42),
fwl(41) => U471_fwl(41), fwl(40) => U471_fwl(40),
fwl(39) => U471_fwl(39), fwl(38) => U471_fwl(38),
fwl(37) => U471_fwl(37), fwl(36) => U471_fwl(36),
fwl(35) => U471_fwl(35), fwl(34) => U471_fwl(34),
fwl(33) => U471_fwl(33), fwl(32) => U471_fwl(32),
fwl(31) => U471_fwl(31), fwl(30) => U471_fwl(30),
fwl(29) => U471_fwl(29), fwl(28) => U471_fwl(28),
fwl(27) => U471_fwl(27), fwl(26) => U471_fwl(26),
fwl(25) => U471_fwl(25), fwl(24) => U471_fwl(24),
fwl(23) => U471_fwl(23), fwl(22) => U471_fwl(22),
fwl(21) => U471_fwl(21), fwl(20) => U471_fwl(20),
fwl(19) => U471_fwl(19), fwl(18) => U471_fwl(18),
fwl(17) => U471_fwl(17), fwl(16) => U471_fwl(16),
fwl(15) => U471_fwl(15), fwl(14) => U471_fwl(14),
fwl(13) => U471_fwl(13), fwl(12) => U471_fwl(12),
fwl(11) => U471_fwl(11), fwl(10) => U471_fwl(10),
fwl(9) => U471_fwl(9), fwl(8) => U471_fwl(8),
fwl(7) => U471_fwl(7), fwl(6) => U471_fwl(6),
fwl(5) => U471_fwl(5), fwl(4) => U471_fwl(4),
fwl(3) => U471_fwl(3), fwl(2) => U471_fwl(2),
fwl(1) => U471_fwl(1), fwl(0) => U471_fwl(0),
fsaen => U487_Z, asaen => U489_Z, prsp => U460_Z,
rsao(71) => rdsao(71), rsao(70) => rdsao(70),
rsao(69) => rdsao(69), rsao(68) => rdsao(68),
rsao(67) => rdsao(67), rsao(66) => rdsao(66),
rsao(65) => rdsao(65), rsao(64) => rdsao(64),
rsao(63) => rdsao(63), rsao(62) => rdsao(62),
rsao(61) => rdsao(61), rsao(60) => rdsao(60),
rsao(59) => rdsao(59), rsao(58) => rdsao(58),
rsao(57) => rdsao(57), rsao(56) => rdsao(56),
rsao(55) => rdsao(55), rsao(54) => rdsao(54),
rsao(53) => rdsao(53), rsao(52) => rdsao(52),
rsao(51) => rdsao(51), rsao(50) => rdsao(50),
rsao(49) => rdsao(49), rsao(48) => rdsao(48),
rsao(47) => rdsao(47), rsao(46) => rdsao(46),
rsao(45) => rdsao(45), rsao(44) => rdsao(44),
rsao(43) => rdsao(43), rsao(42) => rdsao(42),
rsao(41) => rdsao(41), rsao(40) => rdsao(40),
rsao(39) => rdsao(39), rsao(38) => rdsao(38),
rsao(37) => rdsao(37), rsao(36) => rdsao(36),
rsao(35) => rdsao(35), rsao(34) => rdsao(34),
rsao(33) => rdsao(33), rsao(32) => rdsao(32),
rsao(31) => rdsao(31), rsao(30) => rdsao(30),
rsao(29) => rdsao(29), rsao(28) => rdsao(28),
rsao(27) => rdsao(27), rsao(26) => rdsao(26),
rsao(25) => rdsao(25), rsao(24) => rdsao(24),
rsao(23) => rdsao(23), rsao(22) => rdsao(22),
rsao(21) => rdsao(21), rsao(20) => rdsao(20),
rsao(19) => rdsao(19), rsao(18) => rdsao(18),
```

rsao(17) => rdsao(17), rsao(16) => rdsao(16), rsao(15) => rdsao(15), rsao(14) => rdsao(14), rsao(13) => rdsao(13), rsao(12) => rdsao(12), rsao(11) => rdsao(11), rsao(10) => rdsao(10), rsao(9) => rdsao(9), rsao(8) => rdsao(8), rsao(7) => rdsao(7), rsao(6) => rdsao(6), rsao(5) => rdsao(5), rsao(4) => rdsao(4), rsao(3) => rdsao(3), rsao(2) => rdsao(2), rsao(1) => rdsao(1), rsao(0) => rdsao(0), rsp => rsp, prech => U461_Z, bl(71) => U451_o(71), bl(70) => U451_o(70), bl(69) => U451_o(69), bl(68) => U451_o(68), bl(67) => U451_o(67), bl(66) => U451_o(66), bl(65) => U451_o(65), bl(64) => U451_o(64), bl(63) => U451_o(63), bl(62) => U451_o(62), bl(61) => U451_o(61), bl(60) => U451_o(60), bl(59) => U451_o(59), bl(58) => U451_o(58), bl(57) => U451_o(57), bl(56) => U451_o(56), bl(55) => U451_o(55), bl(54) => U451_o(54), bl(53) => U451_o(53), bl(52) => U451_o(52), bl(51) => U451_o(51), bl(50) => U451_o(50), bl(49) => U451_o(49), bl(48) => U451_o(48), bl(47) => U451_o(47), bl(46) => U451_o(46), bl(45) => U451_o(45), bl(44) => U451_o(44), bl(43) => U451_o(43), bl(42) => U451_o(42), bl(41) => U451_o(41), bl(40) => U451_o(40), bl(39) => U451_o(39), bl(38) => U451_o(38), bl(37) => U451_o(37), bl(36) => U451_o(36), bl(35) => U451_o(35), bl(34) => U451_o(34), bl(33) => U451_o(33), bl(32) => U451_o(32), bl(31) => U451_o(31), bl(30) => U451_o(30), bl(29) => U451_o(29), bl(28) => U451_o(28), bl(27) => U451_o(27), bl(26) => U451_o(26), bl(25) => U451_o(25), bl(24) => U451_o(24), bl(23) => U451_o(23), bl(22) => U451_o(22), bl(21) => U451_o(21), bl(20) => U451_o(20), bl(19) => U451_o(19), bl(18) => U451_o(18), bl(17) => U451_o(17), bl(16) => U451_o(16), bl(15) => U451_o(15), bl(14) => U451_o(14), bl(13) => U451_o(13), bl(12) => U451_o(12), bl(11) => U451_o(11), bl(10) => U451_o(10), bl(9) => U451_o(9), bl(8) => U451_o(8), bl(7) => U451_o(7), bl(6) => U451_o(6), bl(5) => U451_o(5), bl(4) => U451_o(4), bl(3) => U451_o(3), bl(2) => U451_o(2), bl(1) => U451_o(1), bl(0) => U451_o(0), disch => U488_Z, f0 => U481_Z, f1 => U482_Z, f2 => U483_Z, ibl(71) => U452_o(71), ibl(70) => U452_o(70), ibl(69) => U452_o(69), ibl(68) => U452_o(68), ibl(67) => U452_o(67), ibl(66) => U452_o(66), ibl(65) => U452_o(65), ibl(64) => U452_o(64), ibl(63) => U452_o(63), ibl(62) => U452_o(62), ibl(61) => U452_o(61), ibl(60) => U452_o(60), ibl(59) => U452_o(59), ibl(58) => U452_o(58), ibl(57) => U452_o(57), ibl(56) => U452_o(56), ibl(55) => U452_o(55), ibl(54) => U452_o(54), ibl(53) => U452_o(53), ibl(52) => U452_o(52), ibl(51) => U452_o(51), ibl(50) => U452_o(50), ibl(49) => U452_o(49), ibl(48) => U452_o(48), ibl(47) => U452_o(47), ibl(46) => U452_o(46),

```
    ibl(45) => U452_o(45), ibl(44) => U452_o(44),
    ibl(43) => U452_o(43), ibl(42) => U452_o(42),
    ibl(41) => U452_o(41), ibl(40) => U452_o(40),
    ibl(39) => U452_o(39), ibl(38) => U452_o(38),
    ibl(37) => U452_o(37), ibl(36) => U452_o(36),
    ibl(35) => U452_o(35), ibl(34) => U452_o(34),
    ibl(33) => U452_o(33), ibl(32) => U452_o(32),
    ibl(31) => U452_o(31), ibl(30) => U452_o(30),
    ibl(29) => U452_o(29), ibl(28) => U452_o(28),
    ibl(27) => U452_o(27), ibl(26) => U452_o(26),
    ibl(25) => U452_o(25), ibl(24) => U452_o(24),
    ibl(23) => U452_o(23), ibl(22) => U452_o(22),
    ibl(21) => U452_o(21), ibl(20) => U452_o(20),
    ibl(19) => U452_o(19), ibl(18) => U452_o(18),
    ibl(17) => U452_o(17), ibl(16) => U452_o(16),
    ibl(15) => U452_o(15), ibl(14) => U452_o(14),
    ibl(13) => U452_o(13), ibl(12) => U452_o(12),
    ibl(11) => U452_o(11), ibl(10) => U452_o(10),
    ibl(9) => U452_o(9), ibl(8) => U452_o(8), ibl(7)
    => U452_o(7), ibl(6) => U452_o(6), ibl(5) =>
    U452_o(5), ibl(4) => U452_o(4), ibl(3) =>
    U452_o(3), ibl(2) => U452_o(2), ibl(1) =>
    U452_o(1), ibl(0) => U452_o(0), if0 => if0, if1 =>
    U485_ZN, if2 => if2, mask(71) => m(71), mask(70)
    => m(70), mask(69) => m(69), mask(68) => m(68),
    mask(67) => m(67), mask(66) => m(66), mask(65) =>
    m(65), mask(64) => m(64), mask(63) => m(63),
    mask(62) => m(62), mask(61) => m(61), mask(60) =>
    m(60), mask(59) => m(59), mask(58) => m(58),
    mask(57) => m(57), mask(56) => m(56), mask(55) =>
    m(55), mask(54) => m(54), mask(53) => m(53),
    mask(52) => m(52), mask(51) => m(51), mask(50) =>
    m(50), mask(49) => m(49), mask(48) => m(48),
    mask(47) => m(47), mask(46) => m(46), mask(45) =>
    m(45), mask(44) => m(44), mask(43) => m(43),
    mask(42) => m(42), mask(41) => m(41), mask(40) =>
    m(40), mask(39) => m(39), mask(38) => m(38),
    mask(37) => m(37), mask(36) => m(36), mask(35) =>
    m(35), mask(34) => m(34), mask(33) => m(33),
    mask(32) => m(32), mask(31) => m(31), mask(30) =>
    m(30), mask(29) => m(29), mask(28) => m(28),
    mask(27) => m(27), mask(26) => m(26), mask(25) =>
    m(25), mask(24) => m(24), mask(23) => m(23),
    mask(22) => m(22), mask(21) => m(21), mask(20) =>
    m(20), mask(19) => m(19), mask(18) => m(18),
    mask(17) => m(17), mask(16) => m(16), mask(15) =>
    m(15), mask(14) => m(14), mask(13) => m(13),
    mask(12) => m(12), mask(11) => m(11), mask(10) =>
    m(10), mask(9) => m(9), mask(8) => m(8), mask(7)
    => m(7), mask(6) => m(6), mask(5) => m(5), mask(4)
    => m(4), mask(3) => m(3), mask(2) => m(2), mask(1)
    => m(1), mask(0) => m(0), msaen => U490_Z );

U486: in01d3
  port map ( I => f2, ZN => if2 );

U471: fitag341_r
  port map ( finit => finit, venb => U462_Z, rstfifoaddr =>
```

U463_Z, wenf => U492_o, fful => fful, fwl(340) => U471_fwl(340), fwl(339) => U471_fwl(339), fwl(338) => U471_fwl(338), fwl(337) => U471_fwl(337), fwl(336) => U471_fwl(336), fwl(335) => U471_fwl(335), fwl(334) => U471_fwl(334), fwl(333) => U471_fwl(333), fwl(332) => U471_fwl(332), fwl(331) => U471_fwl(331), fwl(330) => U471_fwl(330), fwl(329) => U471_fwl(329), fwl(328) => U471_fwl(328), fwl(327) => U471_fwl(327), fwl(326) => U471_fwl(326), fwl(325) => U471_fwl(325), fwl(324) => U471_fwl(324), fwl(323) => U471_fwl(323), fwl(322) => U471_fwl(322), fwl(321) => U471_fwl(321), fwl(320) => U471_fwl(320), fwl(319) => U471_fwl(319), fwl(318) => U471_fwl(318), fwl(317) => U471_fwl(317), fwl(316) => U471_fwl(316), fwl(315) => U471_fwl(315), fwl(314) => U471_fwl(314), fwl(313) => U471_fwl(313), fwl(312) => U471_fwl(312), fwl(311) => U471_fwl(311), fwl(310) => U471_fwl(310), fwl(309) => U471_fwl(309), fwl(308) => U471_fwl(308), fwl(307) => U471_fwl(307), fwl(306) => U471_fwl(306), fwl(305) => U471_fwl(305), fwl(304) => U471_fwl(304), fwl(303) => U471_fwl(303), fwl(302) => U471_fwl(302), fwl(301) => U471_fwl(301), fwl(300) => U471_fwl(300), fwl(299) => U471_fwl(299), fwl(298) => U471_fwl(298), fwl(297) => U471_fwl(297), fwl(296) => U471_fwl(296), fwl(295) => U471_fwl(295), fwl(294) => U471_fwl(294), fwl(293) => U471_fwl(293), fwl(292) => U471_fwl(292), fwl(291) => U471_fwl(291), fwl(290) => U471_fwl(290), fwl(289) => U471_fwl(289), fwl(288) => U471_fwl(288), fwl(287) => U471_fwl(287), fwl(286) => U471_fwl(286), fwl(285) => U471_fwl(285), fwl(284) => U471_fwl(284), fwl(283) => U471_fwl(283), fwl(282) => U471_fwl(282), fwl(281) => U471_fwl(281), fwl(280) => U471_fwl(280), fwl(279) => U471_fwl(279), fwl(278) => U471_fwl(278), fwl(277) => U471_fwl(277), fwl(276) => U471_fwl(276), fwl(275) => U471_fwl(275), fwl(274) => U471_fwl(274), fwl(273) => U471_fwl(273), fwl(272) => U471_fwl(272), fwl(271) => U471_fwl(271), fwl(270) => U471_fwl(270), fwl(269) => U471_fwl(269), fwl(268) => U471_fwl(268), fwl(267) => U471_fwl(267), fwl(266) => U471_fwl(266), fwl(265) => U471_fwl(265), fwl(264) => U471_fwl(264), fwl(263) => U471_fwl(263), fwl(262) => U471_fwl(262), fwl(261) => U471_fwl(261), fwl(260) => U471_fwl(260), fwl(259) => U471_fwl(259), fwl(258) => U471_fwl(258), fwl(257) => U471_fwl(257), fwl(256) => U471_fwl(256), fwl(255) => U471_fwl(255), fwl(254) => U471_fwl(254), fwl(253) => U471_fwl(253), fwl(252) => U471_fwl(252), fwl(251) => U471_fwl(251), fwl(250) => U471_fwl(250), fwl(249) => U471_fwl(249), fwl(248) => U471_fwl(248), fwl(247) => U471_fwl(247), fwl(246) => U471_fwl(246), fwl(245) =>

U471_fwl(245), fwl(244) => U471_fwl(244), fwl(243) => U471_fwl(243), fwl(242) => U471_fwl(242), fwl(241) => U471_fwl(241), fwl(240) => U471_fwl(240), fwl(239) => U471_fwl(239), fwl(238) => U471_fwl(238), fwl(237) => U471_fwl(237), fwl(236) => U471_fwl(236), fwl(235) => U471_fwl(235), fwl(234) => U471_fwl(234), fwl(233) => U471_fwl(233), fwl(232) => U471_fwl(232), fwl(231) => U471_fwl(231), fwl(230) => U471_fwl(230), fwl(229) => U471_fwl(229), fwl(228) => U471_fwl(228), fwl(227) => U471_fwl(227), fwl(226) => U471_fwl(226), fwl(225) => U471_fwl(225), fwl(224) => U471_fwl(224), fwl(223) => U471_fwl(223), fwl(222) => U471_fwl(222), fwl(221) => U471_fwl(221), fwl(220) => U471_fwl(220), fwl(219) => U471_fwl(219), fwl(218) => U471_fwl(218), fwl(217) => U471_fwl(217), fwl(216) => U471_fwl(216), fwl(215) => U471_fwl(215), fwl(214) => U471_fwl(214), fwl(213) => U471_fwl(213), fwl(212) => U471_fwl(212), fwl(211) => U471_fwl(211), fwl(210) => U471_fwl(210), fwl(209) => U471_fwl(209), fwl(208) => U471_fwl(208), fwl(207) => U471_fwl(207), fwl(206) => U471_fwl(206), fwl(205) => U471_fwl(205), fwl(204) => U471_fwl(204), fwl(203) => U471_fwl(203), fwl(202) => U471_fwl(202), fwl(201) => U471_fwl(201), fwl(200) => U471_fwl(200), fwl(199) => U471_fwl(199), fwl(198) => U471_fwl(198), fwl(197) => U471_fwl(197), fwl(196) => U471_fwl(196), fwl(195) => U471_fwl(195), fwl(194) => U471_fwl(194), fwl(193) => U471_fwl(193), fwl(192) => U471_fwl(192), fwl(191) => U471_fwl(191), fwl(190) => U471_fwl(190), fwl(189) => U471_fwl(189), fwl(188) => U471_fwl(188), fwl(187) => U471_fwl(187), fwl(186) => U471_fwl(186), fwl(185) => U471_fwl(185), fwl(184) => U471_fwl(184), fwl(183) => U471_fwl(183), fwl(182) => U471_fwl(182), fwl(181) => U471_fwl(181), fwl(180) => U471_fwl(180), fwl(179) => U471_fwl(179), fwl(178) => U471_fwl(178), fwl(177) => U471_fwl(177), fwl(176) => U471_fwl(176), fwl(175) => U471_fwl(175), fwl(174) => U471_fwl(174), fwl(173) => U471_fwl(173), fwl(172) => U471_fwl(172), fwl(171) => U471_fwl(171), fwl(170) => U471_fwl(170), fwl(169) => U471_fwl(169), fwl(168) => U471_fwl(168), fwl(167) => U471_fwl(167), fwl(166) => U471_fwl(166), fwl(165) => U471_fwl(165), fwl(164) => U471_fwl(164), fwl(163) => U471_fwl(163), fwl(162) => U471_fwl(162), fwl(161) => U471_fwl(161), fwl(160) => U471_fwl(160), fwl(159) => U471_fwl(159), fwl(158) => U471_fwl(158), fwl(157) => U471_fwl(157), fwl(156) => U471_fwl(156), fwl(155) => U471_fwl(155), fwl(154) => U471_fwl(154), fwl(153) => U471_fwl(153), fwl(152) => U471_fwl(152), fwl(151) => U471_fwl(151), fwl(150) => U471_fwl(150), fwl(149) => U471_fwl(149), fwl(148)

=> U471_fwl(148), fwl(147) => U471_fwl(147), fwl(146) => U471_fwl(146), fwl(145) => U471_fwl(145), fwl(144) => U471_fwl(144), fwl(143) => U471_fwl(143), fwl(142) => U471_fwl(142), fwl(141) => U471_fwl(141), fwl(140) => U471_fwl(140), fwl(139) => U471_fwl(139), fwl(138) => U471_fwl(138), fwl(137) => U471_fwl(137), fwl(136) => U471_fwl(136), fwl(135) => U471_fwl(135), fwl(134) => U471_fwl(134), fwl(133) => U471_fwl(133), fwl(132) => U471_fwl(132), fwl(131) => U471_fwl(131), fwl(130) => U471_fwl(130), fwl(129) => U471_fwl(129), fwl(128) => U471_fwl(128), fwl(127) => U471_fwl(127), fwl(126) => U471_fwl(126), fwl(125) => U471_fwl(125), fwl(124) => U471_fwl(124), fwl(123) => U471_fwl(123), fwl(122) => U471_fwl(122), fwl(121) => U471_fwl(121), fwl(120) => U471_fwl(120), fwl(119) => U471_fwl(119), fwl(118) => U471_fwl(118), fwl(117) => U471_fwl(117), fwl(116) => U471_fwl(116), fwl(115) => U471_fwl(115), fwl(114) => U471_fwl(114), fwl(113) => U471_fwl(113), fwl(112) => U471_fwl(112), fwl(111) => U471_fwl(111), fwl(110) => U471_fwl(110), fwl(109) => U471_fwl(109), fwl(108) => U471_fwl(108), fwl(107) => U471_fwl(107), fwl(106) => U471_fwl(106), fwl(105) => U471_fwl(105), fwl(104) => U471_fwl(104), fwl(103) => U471_fwl(103), fwl(102) => U471_fwl(102), fwl(101) => U471_fwl(101), fwl(100) => U471_fwl(100), fwl(99) => U471_fwl(99), fwl(98) => U471_fwl(98), fwl(97) => U471_fwl(97), fwl(96) => U471_fwl(96), fwl(95) => U471_fwl(95), fwl(94) => U471_fwl(94), fwl(93) => U471_fwl(93), fwl(92) => U471_fwl(92), fwl(91) => U471_fwl(91), fwl(90) => U471_fwl(90), fwl(89) => U471_fwl(89), fwl(88) => U471_fwl(88), fwl(87) => U471_fwl(87), fwl(86) => U471_fwl(86), fwl(85) => U471_fwl(85), fwl(84) => U471_fwl(84), fwl(83) => U471_fwl(83), fwl(82) => U471_fwl(82), fwl(81) => U471_fwl(81), fwl(80) => U471_fwl(80), fwl(79) => U471_fwl(79), fwl(78) => U471_fwl(78), fwl(77) => U471_fwl(77), fwl(76) => U471_fwl(76), fwl(75) => U471_fwl(75), fwl(74) => U471_fwl(74), fwl(73) => U471_fwl(73), fwl(72) => U471_fwl(72), fwl(71) => U471_fwl(71), fwl(70) => U471_fwl(70), fwl(69) => U471_fwl(69), fwl(68) => U471_fwl(68), fwl(67) => U471_fwl(67), fwl(66) => U471_fwl(66), fwl(65) => U471_fwl(65), fwl(64) => U471_fwl(64), fwl(63) => U471_fwl(63), fwl(62) => U471_fwl(62), fwl(61) => U471_fwl(61), fwl(60) => U471_fwl(60), fwl(59) => U471_fwl(59), fwl(58) => U471_fwl(58), fwl(57) => U471_fwl(57), fwl(56) => U471_fwl(56), fwl(55) => U471_fwl(55), fwl(54) => U471_fwl(54), fwl(53) => U471_fwl(53), fwl(52) => U471_fwl(52), fwl(51) => U471_fwl(51), fwl(50) => U471_fwl(50), fwl(49) => U471_fwl(49), fwl(48) => U471_fwl(48), fwl(47) => U471_fwl(47), fwl(46) => U471_fwl(46), fwl(45) => U471_fwl(45), fwl(44) => U471_fwl(44), fwl(43) => U471_fwl(43), fwl(42) =>

```
U471_fwl(42), fwl(41) => U471_fwl(41), fwl(40) =>
U471_fwl(40), fwl(39) => U471_fwl(39), fwl(38) =>
U471_fwl(38), fwl(37) => U471_fwl(37), fwl(36) =>
U471_fwl(36), fwl(35) => U471_fwl(35), fwl(34) =>
U471_fwl(34), fwl(33) => U471_fwl(33), fwl(32) =>
U471_fwl(32), fwl(31) => U471_fwl(31), fwl(30) =>
U471_fwl(30), fwl(29) => U471_fwl(29), fwl(28) =>
U471_fwl(28), fwl(27) => U471_fwl(27), fwl(26) =>
U471_fwl(26), fwl(25) => U471_fwl(25), fwl(24) =>
U471_fwl(24), fwl(23) => U471_fwl(23), fwl(22) =>
U471_fwl(22), fwl(21) => U471_fwl(21), fwl(20) =>
U471_fwl(20), fwl(19) => U471_fwl(19), fwl(18) =>
U471_fwl(18), fwl(17) => U471_fwl(17), fwl(16) =>
U471_fwl(16), fwl(15) => U471_fwl(15), fwl(14) =>
U471_fwl(14), fwl(13) => U471_fwl(13), fwl(12) =>
U471_fwl(12), fwl(11) => U471_fwl(11), fwl(10) =>
U471_fwl(10), fwl(9) => U471_fwl(9), fwl(8) =>
U471_fwl(8), fwl(7) => U471_fwl(7), fwl(6) =>
U471_fwl(6), fwl(5) => U471_fwl(5), fwl(4) =>
U471_fwl(4), fwl(3) => U471_fwl(3), fwl(2) =>
U471_fwl(2), fwl(1) => U471_fwl(1), fwl(0) =>
U471_fwl(0), exen => U465_Z );

U487: ni01d5
  port map ( I => fsaen, Z => U487_Z );

U485: in01d3
  port map ( I => f1, ZN => U485_ZN );

U484: in01d3
  port map ( I => f0, ZN => if0 );

U482: ni01d3
  port map ( I => f1, Z => U482_Z );

U483: ni01d3
  port map ( I => f2, Z => U483_Z );

U481: ni01d3
  port map ( I => f0, Z => U481_Z );

U490: ni01d5
  port map ( I => msaen, Z => U490_Z );

U451: bbuf
  port map ( r(4) => U4944_Z, r(3) => U4943_Z, r(2) => U4942_Z,
        r(1) => U4941_Z, r(0) => U4940_Z, i(71) => bl(71),
        i(70) => bl(70), i(69) => bl(69), i(68) => bl(68),
        i(67) => bl(67), i(66) => bl(66), i(65) => bl(65),
        i(64) => bl(64), i(63) => bl(63), i(62) => bl(62),
        i(61) => bl(61), i(60) => bl(60), i(59) => bl(59),
        i(58) => bl(58), i(57) => bl(57), i(56) => bl(56),
        i(55) => bl(55), i(54) => bl(54), i(53) => bl(53),
        i(52) => bl(52), i(51) => bl(51), i(50) => bl(50),
        i(49) => bl(49), i(48) => bl(48), i(47) => bl(47),
        i(46) => bl(46), i(45) => bl(45), i(44) => bl(44),
        i(43) => bl(43), i(42) => bl(42), i(41) => bl(41),
        i(40) => bl(40), i(39) => bl(39), i(38) => bl(38),
```

```
i(37) => bl(37), i(36) => bl(36), i(35) => bl(35),
i(34) => bl(34), i(33) => bl(33), i(32) => bl(32),
i(31) => bl(31), i(30) => bl(30), i(29) => bl(29),
i(28) => bl(28), i(27) => bl(27), i(26) => bl(26),
i(25) => bl(25), i(24) => bl(24), i(23) => bl(23),
i(22) => bl(22), i(21) => bl(21), i(20) => bl(20),
i(19) => bl(19), i(18) => bl(18), i(17) => bl(17),
i(16) => bl(16), i(15) => bl(15), i(14) => bl(14),
i(13) => bl(13), i(12) => bl(12), i(11) => bl(11),
i(10) => bl(10), i(9) => bl(9), i(8) => bl(8),
i(7) => bl(7), i(6) => bl(6), i(5) => bl(5), i(4)
=> bl(4), i(3) => bl(3), i(2) => bl(2), i(1) =>
bl(1), i(0) => bl(0), o(71) => U451_o(71), o(70)
=> U451_o(70), o(69) => U451_o(69), o(68) =>
U451_o(68), o(67) => U451_o(67), o(66) =>
U451_o(66), o(65) => U451_o(65), o(64) =>
U451_o(64), o(63) => U451_o(63), o(62) =>
U451_o(62), o(61) => U451_o(61), o(60) =>
U451_o(60), o(59) => U451_o(59), o(58) =>
U451_o(58), o(57) => U451_o(57), o(56) =>
U451_o(56), o(55) => U451_o(55), o(54) =>
U451_o(54), o(53) => U451_o(53), o(52) =>
U451_o(52), o(51) => U451_o(51), o(50) =>
U451_o(50), o(49) => U451_o(49), o(48) =>
U451_o(48), o(47) => U451_o(47), o(46) =>
U451_o(46), o(45) => U451_o(45), o(44) =>
U451_o(44), o(43) => U451_o(43), o(42) =>
U451_o(42), o(41) => U451_o(41), o(40) =>
U451_o(40), o(39) => U451_o(39), o(38) =>
U451_o(38), o(37) => U451_o(37), o(36) =>
U451_o(36), o(35) => U451_o(35), o(34) =>
U451_o(34), o(33) => U451_o(33), o(32) =>
U451_o(32), o(31) => U451_o(31), o(30) =>
U451_o(30), o(29) => U451_o(29), o(28) =>
U451_o(28), o(27) => U451_o(27), o(26) =>
U451_o(26), o(25) => U451_o(25), o(24) =>
U451_o(24), o(23) => U451_o(23), o(22) =>
U451_o(22), o(21) => U451_o(21), o(20) =>
U451_o(20), o(19) => U451_o(19), o(18) =>
U451_o(18), o(17) => U451_o(17), o(16) =>
U451_o(16), o(15) => U451_o(15), o(14) =>
U451_o(14), o(13) => U451_o(13), o(12) =>
U451_o(12), o(11) => U451_o(11), o(10) =>
U451_o(10), o(9) => U451_o(9), o(8) => U451_o(8),
o(7) => U451_o(7), o(6) => U451_o(6), o(5) =>
U451_o(5), o(4) => U451_o(4), o(3) => U451_o(3),
o(2) => U451_o(2), o(1) => U451_o(1), o(0) =>
U451_o(0) );

U463: ni01d5
  port map ( I => rstfifoaddr, Z => U463_Z );

U462: ni01d5
  port map ( I => venb, Z => U462_Z );

U492: double_buf
  port map ( i => wenf, o => U492_o );
```

```
U461: ni01d5
  port map ( I => cmp, Z => U461_Z );

U453: ni01d5
  port map ( I => we, Z => U453_Z );

U452: bbuf
  port map ( r(4) => U4944_Z, r(3) => U4943_Z, r(2) => U4942_Z,
        r(1) => U4941_Z, r(0) => U4940_Z, i(71) => ibl(71),
        i(70) => ibl(70), i(69) => ibl(69), i(68) =>
        ibl(68), i(67) => ibl(67), i(66) => ibl(66), i(65)
        => ibl(65), i(64) => ibl(64), i(63) => ibl(63),
        i(62) => ibl(62), i(61) => ibl(61), i(60) =>
        ibl(60), i(59) => ibl(59), i(58) => ibl(58), i(57)
        => ibl(57), i(56) => ibl(56), i(55) => ibl(55),
        i(54) => ibl(54), i(53) => ibl(53), i(52) =>
        ibl(52), i(51) => ibl(51), i(50) => ibl(50), i(49)
        => ibl(49), i(48) => ibl(48), i(47) => ibl(47),
        i(46) => ibl(46), i(45) => ibl(45), i(44) =>
        ibl(44), i(43) => ibl(43), i(42) => ibl(42), i(41)
        => ibl(41), i(40) => ibl(40), i(39) => ibl(39),
        i(38) => ibl(38), i(37) => ibl(37), i(36) =>
        ibl(36), i(35) => ibl(35), i(34) => ibl(34), i(33)
        => ibl(33), i(32) => ibl(32), i(31) => ibl(31),
        i(30) => ibl(30), i(29) => ibl(29), i(28) =>
        ibl(28), i(27) => ibl(27), i(26) => ibl(26), i(25)
        => ibl(25), i(24) => ibl(24), i(23) => ibl(23),
        i(22) => ibl(22), i(21) => ibl(21), i(20) =>
        ibl(20), i(19) => ibl(19), i(18) => ibl(18), i(17)
        => ibl(17), i(16) => ibl(16), i(15) => ibl(15),
        i(14) => ibl(14), i(13) => ibl(13), i(12) =>
        ibl(12), i(11) => ibl(11), i(10) => ibl(10), i(9)
        => ibl(9), i(8) => ibl(8), i(7) => ibl(7), i(6) =>
        ibl(6), i(5) => ibl(5), i(4) => ibl(4), i(3) =>
        ibl(3), i(2) => ibl(2), i(1) => ibl(1), i(0) =>
        ibl(0), o(71) => U452_o(71), o(70) => U452_o(70),
        o(69) => U452_o(69), o(68) => U452_o(68), o(67) =>
        U452_o(67), o(66) => U452_o(66), o(65) =>
        U452_o(65), o(64) => U452_o(64), o(63) =>
        U452_o(63), o(62) => U452_o(62), o(61) =>
        U452_o(61), o(60) => U452_o(60), o(59) =>
        U452_o(59), o(58) => U452_o(58), o(57) =>
        U452_o(57), o(56) => U452_o(56), o(55) =>
        U452_o(55), o(54) => U452_o(54), o(53) =>
        U452_o(53), o(52) => U452_o(52), o(51) =>
        U452_o(51), o(50) => U452_o(50), o(49) =>
        U452_o(49), o(48) => U452_o(48), o(47) =>
        U452_o(47), o(46) => U452_o(46), o(45) =>
        U452_o(45), o(44) => U452_o(44), o(43) =>
        U452_o(43), o(42) => U452_o(42), o(41) =>
        U452_o(41), o(40) => U452_o(40), o(39) =>
        U452_o(39), o(38) => U452_o(38), o(37) =>
        U452_o(37), o(36) => U452_o(36), o(35) =>
        U452_o(35), o(34) => U452_o(34), o(33) =>
        U452_o(33), o(32) => U452_o(32), o(31) =>
        U452_o(31), o(30) => U452_o(30), o(29) =>
        U452_o(29), o(28) => U452_o(28), o(27) =>
        U452_o(27), o(26) => U452_o(26), o(25) =>
```

```
            U452_o(25), o(24) => U452_o(24), o(23) =>
            U452_o(23), o(22) => U452_o(22), o(21) =>
            U452_o(21), o(20) => U452_o(20), o(19) =>
            U452_o(19), o(18) => U452_o(18), o(17) =>
            U452_o(17), o(16) => U452_o(16), o(15) =>
            U452_o(15), o(14) => U452_o(14), o(13) =>
            U452_o(13), o(12) => U452_o(12), o(11) =>
            U452_o(11), o(10) => U452_o(10), o(9) => U452_o(9),
            o(8) => U452_o(8), o(7) => U452_o(7), o(6) =>
            U452_o(6), o(5) => U452_o(5), o(4) => U452_o(4),
            o(3) => U452_o(3), o(2) => U452_o(2), o(1) =>
            U452_o(1), o(0) => U452_o(0) );

U47971: double_buf
   port map ( i => mask(71), o => m(71) );

U47970: double_buf
   port map ( i => mask(70), o => m(70) );

U47969: double_buf
   port map ( i => mask(69), o => m(69) );

U47968: double_buf
   port map ( i => mask(68), o => m(68) );

U47967: double_buf
   port map ( i => mask(67), o => m(67) );

U47966: double_buf
   port map ( i => mask(66), o => m(66) );

U47965: double_buf
   port map ( i => mask(65), o => m(65) );

U47964: double_buf
   port map ( i => mask(64), o => m(64) );

U47963: double_buf
   port map ( i => mask(63), o => m(63) );

U47962: double_buf
   port map ( i => mask(62), o => m(62) );

U47961: double_buf
   port map ( i => mask(61), o => m(61) );

U47960: double_buf
   port map ( i => mask(60), o => m(60) );

U47959: double_buf
   port map ( i => mask(59), o => m(59) );

U47958: double_buf
   port map ( i => mask(58), o => m(58) );

U47957: double_buf
   port map ( i => mask(57), o => m(57) );
```

```
U47956: double_buf
   port map ( i => mask(56), o => m(56) );

U47955: double_buf
   port map ( i => mask(55), o => m(55) );

U47954: double_buf
   port map ( i => mask(54), o => m(54) );

U47953: double_buf
   port map ( i => mask(53), o => m(53) );

U47952: double_buf
   port map ( i => mask(52), o => m(52) );

U47951: double_buf
   port map ( i => mask(51), o => m(51) );

U47950: double_buf
   port map ( i => mask(50), o => m(50) );

U47949: double_buf
   port map ( i => mask(49), o => m(49) );

U47948: double_buf
   port map ( i => mask(48), o => m(48) );

U47947: double_buf
   port map ( i => mask(47), o => m(47) );

U47946: double_buf
   port map ( i => mask(46), o => m(46) );

U47945: double_buf
   port map ( i => mask(45), o => m(45) );

U47944: double_buf
   port map ( i => mask(44), o => m(44) );

U47943: double_buf
   port map ( i => mask(43), o => m(43) );

U47942: double_buf
   port map ( i => mask(42), o => m(42) );

U47941: double_buf
   port map ( i => mask(41), o => m(41) );

U47940: double_buf
   port map ( i => mask(40), o => m(40) );

U47939: double_buf
   port map ( i => mask(39), o => m(39) );

U47938: double_buf
   port map ( i => mask(38), o => m(38) );

U47937: double_buf
```

```
   port map ( i => mask(37), o => m(37) );

U47936: double_buf
   port map ( i => mask(36), o => m(36) );

U47935: double_buf
   port map ( i => mask(35), o => m(35) );

U47934: double_buf
   port map ( i => mask(34), o => m(34) );

U47933: double_buf
   port map ( i => mask(33), o => m(33) );

U47932: double_buf
   port map ( i => mask(32), o => m(32) );

U47931: double_buf
   port map ( i => mask(31), o => m(31) );

U47930: double_buf
   port map ( i => mask(30), o => m(30) );

U47929: double_buf
   port map ( i => mask(29), o => m(29) );

U47928: double_buf
   port map ( i => mask(28), o => m(28) );

U47927: double_buf
   port map ( i => mask(27), o => m(27) );

U47926: double_buf
   port map ( i => mask(26), o => m(26) );

U47925: double_buf
   port map ( i => mask(25), o => m(25) );

U47924: double_buf
   port map ( i => mask(24), o => m(24) );

U47923: double_buf
   port map ( i => mask(23), o => m(23) );

U47922: double_buf
   port map ( i => mask(22), o => m(22) );

U47921: double_buf
   port map ( i => mask(21), o => m(21) );

U47920: double_buf
   port map ( i => mask(20), o => m(20) );

U47919: double_buf
   port map ( i => mask(19), o => m(19) );

U47918: double_buf
   port map ( i => mask(18), o => m(18) );
```

```
U47917: double_buf
   port map ( i => mask(17), o => m(17) );

U47916: double_buf
   port map ( i => mask(16), o => m(16) );

U47915: double_buf
   port map ( i => mask(15), o => m(15) );

U47914: double_buf
   port map ( i => mask(14), o => m(14) );

U47913: double_buf
   port map ( i => mask(13), o => m(13) );

U47912: double_buf
   port map ( i => mask(12), o => m(12) );

U47911: double_buf
   port map ( i => mask(11), o => m(11) );

U47910: double_buf
   port map ( i => mask(10), o => m(10) );

U4799: double_buf
   port map ( i => mask(9), o => m(9) );

U4798: double_buf
   port map ( i => mask(8), o => m(8) );

U4797: double_buf
   port map ( i => mask(7), o => m(7) );

U4796: double_buf
   port map ( i => mask(6), o => m(6) );

U4795: double_buf
   port map ( i => mask(5), o => m(5) );

U4794: double_buf
   port map ( i => mask(4), o => m(4) );

U4793: double_buf
   port map ( i => mask(3), o => m(3) );

U4792: double_buf
   port map ( i => mask(2), o => m(2) );

U4791: double_buf
   port map ( i => mask(1), o => m(1) );

U4790: double_buf
   port map ( i => mask(0), o => m(0) );

U4944: ni01d5
   port map ( I => rd(4), Z => U4944_Z );
```

```
U4943: ni01d5
   port map ( I => rd(3), Z => U4943_Z );

U4942: ni01d5
   port map ( I => rd(2), Z => U4942_Z );

U4941: ni01d5
   port map ( I => rd(1), Z => U4941_Z );

U4940: ni01d5
   port map ( I => rd(0), Z => U4940_Z );

U460: ni01d5
   port map ( I => prsp, Z => U460_Z );

U457: ni01d5
   port map ( I => mux1, Z => U457_Z );

U456: ni01d5
   port map ( I => mux2, Z => U456_Z );

U458: ni01d5
   port map ( I => mux0, Z => U458_Z );

U459: ni01d5
   port map ( I => setag, Z => U459_Z );

U455: ni01d5
   port map ( I => rstaddr, Z => U455_Z );

so(15) <= so15_local;
so(14) <= so14_local;
so(13) <= so13_local;
so(12) <= so12_local;
so(11) <= so11_local;
so(10) <= so10_local;
so(9) <= so9_local;
so(8) <= so8_local;
so(7) <= so7_local;
so(6) <= so6_local;
so(5) <= so5_local;
so(4) <= so4_local;
so(3) <= so3_local;
so(2) <= so2_local;
so(1) <= so1_local;
so(0) <= sso_local;
no(15) <= nno_local;
no(14) <= no14_local;
no(13) <= no13_local;
no(12) <= no12_local;
no(11) <= no11_local;
no(10) <= no10_local;
no(9) <= no9_local;
no(8) <= no8_local;
no(7) <= no7_local;
no(6) <= no6_local;
no(5) <= no5_local;
no(4) <= no4_local;
```

```
file: COL342_L.VHD
-- Date of netlist generation:  Nov-18-93

----------------------------------------------------------------------

library IEEE;
use IEEE.STD_LOGIC_1164.ALL;

library COMPASS_LIB;
use COMPASS_LIB.COMPASS.ALL;

entity col342_l is

   port ( si : in Std_Logic_Vector(15 downto 0) := (others => 'U');
        ni : in Std_Logic_Vector(15 downto 0) := (others => 'U');
        prsp : in Std_Logic := 'U';
        setag : in Std_Logic := 'U';
        resp_in : in Std_Logic := 'U';
        fir_in : in Std_Logic := 'U';
        mux0 : in Std_Logic := 'U';
        mux1 : in Std_Logic := 'U';
        mux2 : in Std_Logic := 'U';
        rstaddr : in Std_Logic := 'U';
        cntinit : in Std_Logic := 'U';
        we : in Std_Logic := 'U';
        ibl : in Std_Logic_Vector(71 downto 0) := (others => 'U');
        bl : in Std_Logic_Vector(71 downto 0) := (others => 'U');
        venb : in Std_Logic := 'U';
        rstfifoaddr : in Std_Logic := 'U';
        wenf : in Std_Logic := 'U';
        finit : in Std_Logic := 'U';
        cmp : in Std_Logic := 'U';
        rd : in Std_Logic_Vector(4 downto 0) := (others => 'U');
        exen : in Std_Logic := 'U';
        nni : in Std_Logic := 'U';
        ssi : in Std_Logic := 'U';
        mask : in Std_Logic_Vector(71 downto 0) := (others => 'U');
        f0 : in Std_Logic := 'U';
        f1 : in Std_Logic := 'U';
        f2 : in Std_Logic := 'U';
        asaen : in Std_Logic := 'U';
        fsaen : in Std_Logic := 'U';
        disch : in Std_Logic := 'U';
        msaen : in Std_Logic := 'U';
        fircnten : in Std_Logic := 'U';

        fful : out Std_Logic := 'U';
        so : out Std_Logic_Vector(15 downto 0) := (others => 'U');
        no : out Std_Logic_Vector(15 downto 0) := (others => 'U');
        count_out : out Std_Logic := 'U';
        sso : out Std_Logic := 'U';
        nno : out Std_Logic := 'U';
        rdsao : out Std_Logic_Vector(71 downto 0) := (others =>
'U');
        rsp : out Std_Logic := 'U' );
```

```
end col342_l;

----------------------------------------------------------------------

architecture col342_l OF col342_l is

   component tag342
      port ( prsp : in Std_Logic;
             setag : in Std_Logic;
             cntinit : in Std_Logic;
             rstaddr : in Std_Logic;
             mux2 : in Std_Logic;
             mux1 : in Std_Logic;
             mux0 : in Std_Logic;
             fir_in : in Std_Logic;
             resp_in : in Std_Logic;
             we : in Std_Logic;
             fn : in Std_Logic_Vector(341 downto 0) := (others =>
'U');
             nn : in Std_Logic_Vector(341 downto 0) := (others =>
'U');
             ns : in Std_Logic_Vector(341 downto 0) := (others =>
'U');
             fs : in Std_Logic_Vector(341 downto 0) := (others =>
'U');
             ml : in Std_Logic_Vector(341 downto 0) := (others =>
'U');
             fircnten : in Std_Logic;

             count_out : out Std_Logic;
             tag : out Std_Logic_Vector(341 downto 0) := (others =>
'U');
             rspen : out Std_Logic_Vector(341 downto 0) := (others
=> 'U');
             wl : out Std_Logic_Vector(341 downto 0) := (others =>
'U') );
   end component;


   component array342_m
      port ( wl : in Std_Logic_Vector(341 downto 0) := (others =>
'U');
             rspen : in Std_Logic_Vector(341 downto 0) := (others
=> 'U');
             fwl : in Std_Logic_Vector(341 downto 0) := (others =>
'U');
             fsaen : in Std_Logic;
             asaen : in Std_Logic;
             prsp : in Std_Logic;
             prech : in Std_Logic;
             bl : in Std_Logic_Vector(71 downto 0) := (others =>
'U');
             disch : in Std_Logic;
             f0 : in Std_Logic;
             f1 : in Std_Logic;
             f2 : in Std_Logic;
             ibl : in Std_Logic_Vector(71 downto 0) := (others =>
```

```
'U');
          if0 : in Std_Logic;
          if1 : in Std_Logic;
          if2 : in Std_Logic;
          mask : in Std_Logic_Vector(71 downto 0) := (others =>
'U');
          msaen : in Std_Logic;

          ml : out Std_Logic_Vector(341 downto 0) := (others =>
'U');
          rsao : out Std_Logic_Vector(71 downto 0) := (others =>
'U');
          rsp : out Std_Logic );
  end component;

  component fitag342
     port ( finit : in Std_Logic;
          venb : in Std_Logic;
          rstfifoaddr : in Std_Logic;
          wenf : in Std_Logic;
          exen : in Std_Logic;

          fful : out Std_Logic;
          fwl : out Std_Logic_Vector(341 downto 0) := (others =>
'U') );
  end component;



  component bbuf
     port ( r : in Std_Logic_Vector(4 downto 0) := (others => 'U');
          i : in Std_Logic_Vector(71 downto 0) := (others =>
'U');

          o : out Std_Logic_Vector(71 downto 0) := (others =>
'U') );
  end component;

  component double_buf
     port ( i : in Std_Logic;

          o : out Std_Logic );
  end component;


  signal so15_local, so14_local, so13_local, so12_local, so11_local,
       so10_local, so9_local, so8_local, so7_local, so6_local,
       so5_local, so4_local, so3_local, so2_local, so1_local,
       sso_local, nno_local, no14_local, no13_local, no12_local,
       no11_local, no10_local, no9_local, no8_local, no7_local,
       no6_local, no5_local, no4_local, no3_local, no2_local,
       no1_local, no0_local: Std_Logic;
  signal U465_Z : Std_Logic;
  signal U450_fwl : Std_Logic_Vector(341 downto 0);
  signal U488_o : Std_Logic;
  signal U463_Z : Std_Logic;
  signal U462_Z : Std_Logic;
  signal U483_Z : Std_Logic;
```

```
signal U481_Z : Std_Logic;
signal U451_o : Std_Logic_Vector(71 downto 0);
signal if0 : Std_Logic;
signal U477_ZN : Std_Logic;
signal if2 : Std_Logic;
signal U479_Z : Std_Logic;
signal U480_Z : Std_Logic;
signal U484_Z : Std_Logic;
signal U492_ml : Std_Logic_Vector(341 downto 0);
signal U446_wl : Std_Logic_Vector(341 downto 0);
signal U446_rspen : Std_Logic_Vector(341 downto 0);
signal U486_Z : Std_Logic;
signal U485_Z : Std_Logic;
signal U460_Z : Std_Logic;
signal U461_Z : Std_Logic;
signal U452_o : Std_Logic_Vector(71 downto 0);
signal m : Std_Logic_Vector(71 downto 0);
signal U4904_Z : Std_Logic;
signal U4903_Z : Std_Logic;
signal U4902_Z : Std_Logic;
signal U4901_Z : Std_Logic;
signal U4900_Z : Std_Logic;
signal U453_Z : Std_Logic;
signal S1 : Std_Logic;
signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal S9 : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal fn : Std_Logic_Vector(341 downto 32);
signal S17 : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal S25 : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
signal S33 : Std_Logic;
signal S34 : Std_Logic;
```

```
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal S49 : Std_Logic;
signal S50 : Std_Logic;
signal S51 : Std_Logic;
signal S52 : Std_Logic;
signal S53 : Std_Logic;
signal S54 : Std_Logic;
signal S55 : Std_Logic;
signal S56 : Std_Logic;
signal S57 : Std_Logic;
signal S58 : Std_Logic;
signal S59 : Std_Logic;
signal S60 : Std_Logic;
signal S61 : Std_Logic;
signal S62 : Std_Logic;
signal S63 : Std_Logic;
signal S64 : Std_Logic;
signal S65 : Std_Logic;
signal S66 : Std_Logic;
signal S67 : Std_Logic;
signal S68 : Std_Logic;
signal S69 : Std_Logic;
signal S70 : Std_Logic;
signal S71 : Std_Logic;
signal S72 : Std_Logic;
signal S73 : Std_Logic;
signal S74 : Std_Logic;
signal S75 : Std_Logic;
signal S76 : Std_Logic;
signal S77 : Std_Logic;
signal S78 : Std_Logic;
signal S79 : Std_Logic;
signal S80 : Std_Logic;
signal S81 : Std_Logic;
signal S82 : Std_Logic;
signal S83 : Std_Logic;
signal S84 : Std_Logic;
signal S85 : Std_Logic;
signal S86 : Std_Logic;
signal S87 : Std_Logic;
signal S88 : Std_Logic;
signal S89 : Std_Logic;
signal S90 : Std_Logic;
signal S91 : Std_Logic;
signal S92 : Std_Logic;
```

```
signal S93 : Std_Logic;
signal S94 : Std_Logic;
signal S95 : Std_Logic;
signal S96 : Std_Logic;
signal S97 : Std_Logic;
signal S98 : Std_Logic;
signal S99 : Std_Logic;
signal S100 : Std_Logic;
signal S101 : Std_Logic;
signal S102 : Std_Logic;
signal S103 : Std_Logic;
signal S104 : Std_Logic;
signal S105 : Std_Logic;
signal S106 : Std_Logic;
signal S107 : Std_Logic;
signal S108 : Std_Logic;
signal S109 : Std_Logic;
signal S110 : Std_Logic;
signal S111 : Std_Logic;
signal S112 : Std_Logic;
signal S113 : Std_Logic;
signal S114 : Std_Logic;
signal S115 : Std_Logic;
signal S116 : Std_Logic;
signal S117 : Std_Logic;
signal S118 : Std_Logic;
signal S119 : Std_Logic;
signal S120 : Std_Logic;
signal S121 : Std_Logic;
signal S122 : Std_Logic;
signal S123 : Std_Logic;
signal S124 : Std_Logic;
signal S125 : Std_Logic;
signal S126 : Std_Logic;
signal S127 : Std_Logic;
signal S128 : Std_Logic;
signal S129 : Std_Logic;
signal S130 : Std_Logic;
signal S131 : Std_Logic;
signal S132 : Std_Logic;
signal S133 : Std_Logic;
signal S134 : Std_Logic;
signal S135 : Std_Logic;
signal S136 : Std_Logic;
signal S137 : Std_Logic;
signal S138 : Std_Logic;
signal S139 : Std_Logic;
signal S140 : Std_Logic;
signal S141 : Std_Logic;
signal S142 : Std_Logic;
signal S143 : Std_Logic;
signal S144 : Std_Logic;
signal S145 : Std_Logic;
signal S146 : Std_Logic;
signal S147 : Std_Logic;
signal S148 : Std_Logic;
signal S149 : Std_Logic;
signal S150 : Std_Logic;
```

```
signal S151 : Std_Logic;
signal S152 : Std_Logic;
signal S153 : Std_Logic;
signal S154 : Std_Logic;
signal S155 : Std_Logic;
signal S156 : Std_Logic;
signal S157 : Std_Logic;
signal S158 : Std_Logic;
signal S159 : Std_Logic;
signal S160 : Std_Logic;
signal S161 : Std_Logic;
signal S162 : Std_Logic;
signal S163 : Std_Logic;
signal S164 : Std_Logic;
signal S165 : Std_Logic;
signal S166 : Std_Logic;
signal S167 : Std_Logic;
signal S168 : Std_Logic;
signal S169 : Std_Logic;
signal S170 : Std_Logic;
signal S171 : Std_Logic;
signal S172 : Std_Logic;
signal S173 : Std_Logic;
signal S174 : Std_Logic;
signal S175 : Std_Logic;
signal S176 : Std_Logic;
signal S177 : Std_Logic;
signal S178 : Std_Logic;
signal S179 : Std_Logic;
signal S180 : Std_Logic;
signal S181 : Std_Logic;
signal S182 : Std_Logic;
signal S183 : Std_Logic;
signal S184 : Std_Logic;
signal S185 : Std_Logic;
signal S186 : Std_Logic;
signal S187 : Std_Logic;
signal S188 : Std_Logic;
signal S189 : Std_Logic;
signal S190 : Std_Logic;
signal S191 : Std_Logic;
signal S192 : Std_Logic;
signal S193 : Std_Logic;
signal S194 : Std_Logic;
signal S195 : Std_Logic;
signal S196 : Std_Logic;
signal S197 : Std_Logic;
signal S198 : Std_Logic;
signal S199 : Std_Logic;
signal S200 : Std_Logic;
signal S201 : Std_Logic;
signal S202 : Std_Logic;
signal S203 : Std_Logic;
signal S204 : Std_Logic;
signal S205 : Std_Logic;
signal S206 : Std_Logic;
signal S207 : Std_Logic;
signal S208 : Std_Logic;
```

```
signal S209 : Std_Logic;
signal S210 : Std_Logic;
signal S211 : Std_Logic;
signal S212 : Std_Logic;
signal S213 : Std_Logic;
signal S214 : Std_Logic;
signal S215 : Std_Logic;
signal S216 : Std_Logic;
signal S217 : Std_Logic;
signal S218 : Std_Logic;
signal S219 : Std_Logic;
signal S220 : Std_Logic;
signal S221 : Std_Logic;
signal S222 : Std_Logic;
signal S223 : Std_Logic;
signal S224 : Std_Logic;
signal S225 : Std_Logic;
signal S226 : Std_Logic;
signal S227 : Std_Logic;
signal S228 : Std_Logic;
signal S229 : Std_Logic;
signal S230 : Std_Logic;
signal S231 : Std_Logic;
signal S232 : Std_Logic;
signal S233 : Std_Logic;
signal S234 : Std_Logic;
signal S235 : Std_Logic;
signal S236 : Std_Logic;
signal S237 : Std_Logic;
signal S238 : Std_Logic;
signal S239 : Std_Logic;
signal S240 : Std_Logic;
signal S241 : Std_Logic;
signal S242 : Std_Logic;
signal S243 : Std_Logic;
signal S244 : Std_Logic;
signal S245 : Std_Logic;
signal S246 : Std_Logic;
signal S247 : Std_Logic;
signal S248 : Std_Logic;
signal S249 : Std_Logic;
signal S250 : Std_Logic;
signal S251 : Std_Logic;
signal S252 : Std_Logic;
signal S253 : Std_Logic;
signal S254 : Std_Logic;
signal S255 : Std_Logic;
signal S256 : Std_Logic;
signal S257 : Std_Logic;
signal S258 : Std_Logic;
signal S259 : Std_Logic;
signal S260 : Std_Logic;
signal S261 : Std_Logic;
signal S262 : Std_Logic;
signal S263 : Std_Logic;
signal S264 : Std_Logic;
signal S265 : Std_Logic;
signal S266 : Std_Logic;
```

```
signal S267 : Std_Logic;
signal S268 : Std_Logic;
signal S269 : Std_Logic;
signal S270 : Std_Logic;
signal S271 : Std_Logic;
signal S272 : Std_Logic;
signal S273 : Std_Logic;
signal S274 : Std_Logic;
signal S275 : Std_Logic;
signal S276 : Std_Logic;
signal S277 : Std_Logic;
signal S278 : Std_Logic;
signal S279 : Std_Logic;
signal S280 : Std_Logic;
signal S281 : Std_Logic;
signal S282 : Std_Logic;
signal S283 : Std_Logic;
signal S284 : Std_Logic;
signal S285 : Std_Logic;
signal S286 : Std_Logic;
signal S287 : Std_Logic;
signal S288 : Std_Logic;
signal S289 : Std_Logic;
signal S290 : Std_Logic;
signal S291 : Std_Logic;
signal S292 : Std_Logic;
signal S293 : Std_Logic;
signal S294 : Std_Logic;
signal S295 : Std_Logic;
signal S296 : Std_Logic;
signal S297 : Std_Logic;
signal S298 : Std_Logic;
signal S299 : Std_Logic;
signal S300 : Std_Logic;
signal S301 : Std_Logic;
signal S302 : Std_Logic;
signal S303 : Std_Logic;
signal S304 : Std_Logic;
signal S305 : Std_Logic;
signal S306 : Std_Logic;
signal S307 : Std_Logic;
signal S308 : Std_Logic;
signal S309 : Std_Logic;
signal S310 : Std_Logic;
signal S311 : Std_Logic;
signal S312 : Std_Logic;
signal S313 : Std_Logic;
signal S314 : Std_Logic;
signal S315 : Std_Logic;
signal S316 : Std_Logic;
signal S317 : Std_Logic;
signal S318 : Std_Logic;
signal S319 : Std_Logic;
signal S320 : Std_Logic;
signal S321 : Std_Logic;
signal S322 : Std_Logic;
signal S323 : Std_Logic;
signal S324 : Std_Logic;
```

```
signal S325 : Std_Logic;
signal S326 : Std_Logic;
signal S327 : Std_Logic;
signal S328 : Std_Logic;
signal S329 : Std_Logic;
signal S330 : Std_Logic;
signal S331 : Std_Logic;
signal S332 : Std_Logic;
signal S333 : Std_Logic;
signal S334 : Std_Logic;
signal S335 : Std_Logic;
signal S336 : Std_Logic;
signal S337 : Std_Logic;
signal S338 : Std_Logic;
signal S339 : Std_Logic;
signal S340 : Std_Logic;
signal S341 : Std_Logic;
signal S342 : Std_Logic;
signal S343 : Std_Logic;
signal S344 : Std_Logic;
signal S345 : Std_Logic;
signal S346 : Std_Logic;
signal S347 : Std_Logic;
signal S348 : Std_Logic;
signal S349 : Std_Logic;
signal S350 : Std_Logic;
signal S351 : Std_Logic;
signal S352 : Std_Logic;
signal S353 : Std_Logic;
signal S354 : Std_Logic;
signal S355 : Std_Logic;
signal S356 : Std_Logic;
signal S357 : Std_Logic;
signal S358 : Std_Logic;
signal S359 : Std_Logic;
signal S360 : Std_Logic;
signal S361 : Std_Logic;
signal S362 : Std_Logic;
signal S363 : Std_Logic;
signal S364 : Std_Logic;
signal S365 : Std_Logic;
signal S366 : Std_Logic;
signal S367 : Std_Logic;
signal S368 : Std_Logic;
signal S369 : Std_Logic;
signal S370 : Std_Logic;
signal S371 : Std_Logic;
signal S372 : Std_Logic;
signal S373 : Std_Logic;
signal S374 : Std_Logic;
signal S375 : Std_Logic;
signal S376 : Std_Logic;
signal S377 : Std_Logic;
signal S378 : Std_Logic;
signal S379 : Std_Logic;
signal S380 : Std_Logic;
signal S381 : Std_Logic;
signal S382 : Std_Logic;
```

```
signal S383 : Std_Logic;
signal S384 : Std_Logic;
signal S385 : Std_Logic;
signal S386 : Std_Logic;
signal S387 : Std_Logic;
signal S388 : Std_Logic;
signal S389 : Std_Logic;
signal S390 : Std_Logic;
signal S391 : Std_Logic;
signal S392 : Std_Logic;
signal S393 : Std_Logic;
signal S394 : Std_Logic;
signal S395 : Std_Logic;
signal S396 : Std_Logic;
signal S397 : Std_Logic;
signal S398 : Std_Logic;
signal S399 : Std_Logic;
signal S400 : Std_Logic;
signal S401 : Std_Logic;
signal S402 : Std_Logic;
signal S403 : Std_Logic;
signal S404 : Std_Logic;
signal S405 : Std_Logic;
signal S406 : Std_Logic;
signal S407 : Std_Logic;
signal S408 : Std_Logic;
signal S409 : Std_Logic;
signal S410 : Std_Logic;
signal S411 : Std_Logic;
signal S412 : Std_Logic;
signal S413 : Std_Logic;
signal S414 : Std_Logic;
signal S415 : Std_Logic;
signal S416 : Std_Logic;
signal S417 : Std_Logic;
signal S418 : Std_Logic;
signal S419 : Std_Logic;
signal S420 : Std_Logic;
signal S421 : Std_Logic;
signal S422 : Std_Logic;
signal S423 : Std_Logic;
signal S424 : Std_Logic;
signal S425 : Std_Logic;
signal S426 : Std_Logic;
signal S427 : Std_Logic;
signal S428 : Std_Logic;
signal S429 : Std_Logic;
signal S430 : Std_Logic;
signal S431 : Std_Logic;
signal S432 : Std_Logic;
signal S433 : Std_Logic;
signal S434 : Std_Logic;
signal S435 : Std_Logic;
signal S436 : Std_Logic;
signal S437 : Std_Logic;
signal S438 : Std_Logic;
signal S439 : Std_Logic;
signal S440 : Std_Logic;
```

```
signal S441 : Std_Logic;
signal S442 : Std_Logic;
signal S443 : Std_Logic;
signal S444 : Std_Logic;
signal S445 : Std_Logic;
signal S446 : Std_Logic;
signal S447 : Std_Logic;
signal S448 : Std_Logic;
signal S449 : Std_Logic;
signal S450 : Std_Logic;
signal S451 : Std_Logic;
signal S452 : Std_Logic;
signal S453 : Std_Logic;
signal S454 : Std_Logic;
signal S455 : Std_Logic;
signal S456 : Std_Logic;
signal S457 : Std_Logic;
signal S458 : Std_Logic;
signal S459 : Std_Logic;
signal S460 : Std_Logic;
signal S461 : Std_Logic;
signal S462 : Std_Logic;
signal S463 : Std_Logic;
signal S464 : Std_Logic;
signal S465 : Std_Logic;
signal S466 : Std_Logic;
signal S467 : Std_Logic;
signal S468 : Std_Logic;
signal S469 : Std_Logic;
signal S470 : Std_Logic;
signal S471 : Std_Logic;
signal S472 : Std_Logic;
signal S473 : Std_Logic;
signal S474 : Std_Logic;
signal S475 : Std_Logic;
signal S476 : Std_Logic;
signal S477 : Std_Logic;
signal S478 : Std_Logic;
signal S479 : Std_Logic;
signal S480 : Std_Logic;
signal S481 : Std_Logic;
signal S482 : Std_Logic;
signal S483 : Std_Logic;
signal S484 : Std_Logic;
signal S485 : Std_Logic;
signal S486 : Std_Logic;
signal S487 : Std_Logic;
signal S488 : Std_Logic;
signal S489 : Std_Logic;
signal S490 : Std_Logic;
signal S491 : Std_Logic;
signal S492 : Std_Logic;
signal S493 : Std_Logic;
signal S494 : Std_Logic;
signal S495 : Std_Logic;
signal S496 : Std_Logic;
signal S497 : Std_Logic;
signal S498 : Std_Logic;
```

```
signal S499 : Std_Logic;
signal S500 : Std_Logic;
signal S501 : Std_Logic;
signal S502 : Std_Logic;
signal S503 : Std_Logic;
signal S504 : Std_Logic;
signal S505 : Std_Logic;
signal S506 : Std_Logic;
signal S507 : Std_Logic;
signal S508 : Std_Logic;
signal S509 : Std_Logic;
signal S510 : Std_Logic;
signal S511 : Std_Logic;
signal S512 : Std_Logic;
signal S513 : Std_Logic;
signal S514 : Std_Logic;
signal S515 : Std_Logic;
signal S516 : Std_Logic;
signal S517 : Std_Logic;
signal S518 : Std_Logic;
signal S519 : Std_Logic;
signal S520 : Std_Logic;
signal S521 : Std_Logic;
signal S522 : Std_Logic;
signal S523 : Std_Logic;
signal S524 : Std_Logic;
signal S525 : Std_Logic;
signal S526 : Std_Logic;
signal S527 : Std_Logic;
signal S528 : Std_Logic;
signal S529 : Std_Logic;
signal S530 : Std_Logic;
signal S531 : Std_Logic;
signal S532 : Std_Logic;
signal S533 : Std_Logic;
signal S534 : Std_Logic;
signal S535 : Std_Logic;
signal S536 : Std_Logic;
signal S537 : Std_Logic;
signal S538 : Std_Logic;
signal S539 : Std_Logic;
signal S540 : Std_Logic;
signal S541 : Std_Logic;
signal S542 : Std_Logic;
signal S543 : Std_Logic;
signal S544 : Std_Logic;
signal S545 : Std_Logic;
signal S546 : Std_Logic;
signal S547 : Std_Logic;
signal S548 : Std_Logic;
signal S549 : Std_Logic;
signal S550 : Std_Logic;
signal S551 : Std_Logic;
signal S552 : Std_Logic;
signal S553 : Std_Logic;
signal S554 : Std_Logic;
signal S555 : Std_Logic;
signal S556 : Std_Logic;
```

```
signal S557 : Std_Logic;
signal S558 : Std_Logic;
signal S559 : Std_Logic;
signal S560 : Std_Logic;
signal S561 : Std_Logic;
signal S562 : Std_Logic;
signal S563 : Std_Logic;
signal S564 : Std_Logic;
signal S565 : Std_Logic;
signal S566 : Std_Logic;
signal S567 : Std_Logic;
signal S568 : Std_Logic;
signal S569 : Std_Logic;
signal S570 : Std_Logic;
signal S571 : Std_Logic;
signal S572 : Std_Logic;
signal S573 : Std_Logic;
signal S574 : Std_Logic;
signal S575 : Std_Logic;
signal S576 : Std_Logic;
signal S577 : Std_Logic;
signal S578 : Std_Logic;
signal S579 : Std_Logic;
signal S580 : Std_Logic;
signal S581 : Std_Logic;
signal S582 : Std_Logic;
signal S583 : Std_Logic;
signal S584 : Std_Logic;
signal S585 : Std_Logic;
signal S586 : Std_Logic;
signal S587 : Std_Logic;
signal S588 : Std_Logic;
signal S589 : Std_Logic;
signal S590 : Std_Logic;
signal S591 : Std_Logic;
signal S592 : Std_Logic;
signal S593 : Std_Logic;
signal S594 : Std_Logic;
signal S595 : Std_Logic;
signal S596 : Std_Logic;
signal S597 : Std_Logic;
signal S598 : Std_Logic;
signal S599 : Std_Logic;
signal S600 : Std_Logic;
signal S601 : Std_Logic;
signal S602 : Std_Logic;
signal S603 : Std_Logic;
signal S604 : Std_Logic;
signal S605 : Std_Logic;
signal S606 : Std_Logic;
signal S607 : Std_Logic;
signal S608 : Std_Logic;
signal S609 : Std_Logic;
signal S610 : Std_Logic;
signal S611 : Std_Logic;
signal S612 : Std_Logic;
signal S613 : Std_Logic;
signal S614 : Std_Logic;
```

```
signal S615 : Std_Logic;
signal S616 : Std_Logic;
signal S617 : Std_Logic;
signal S618 : Std_Logic;
signal S619 : Std_Logic;
signal S620 : Std_Logic;
signal S621 : Std_Logic;
signal S622 : Std_Logic;
signal S623 : Std_Logic;
signal S624 : Std_Logic;
signal S625 : Std_Logic;
signal S626 : Std_Logic;
signal S627 : Std_Logic;
signal S628 : Std_Logic;
signal S629 : Std_Logic;
signal S630 : Std_Logic;
signal S631 : Std_Logic;
signal S632 : Std_Logic;
signal S633 : Std_Logic;
signal S634 : Std_Logic;
signal S635 : Std_Logic;
signal S636 : Std_Logic;
signal S637 : Std_Logic;
signal S638 : Std_Logic;
signal S639 : Std_Logic;
signal S640 : Std_Logic;
signal S641 : Std_Logic;
signal S642 : Std_Logic;
signal S643 : Std_Logic;
signal S644 : Std_Logic;
signal S645 : Std_Logic;
signal S646 : Std_Logic;
signal S647 : Std_Logic;
signal S648 : Std_Logic;
signal S649 : Std_Logic;
signal S650 : Std_Logic;
signal S651 : Std_Logic;
signal S652 : Std_Logic;
signal S653 : Std_Logic;
signal S654 : Std_Logic;
signal S655 : Std_Logic;
signal S656 : Std_Logic;
signal S657 : Std_Logic;
signal S658 : Std_Logic;
signal S659 : Std_Logic;
signal S660 : Std_Logic;
signal S661 : Std_Logic;
signal S662 : Std_Logic;
signal S663 : Std_Logic;
signal S664 : Std_Logic;
signal S665 : Std_Logic;
signal S666 : Std_Logic;
signal S667 : Std_Logic;
signal S668 : Std_Logic;
signal S669 : Std_Logic;
signal S670 : Std_Logic;
signal S671 : Std_Logic;
signal S672 : Std_Logic;
```

```
signal S673 : Std_Logic;
signal S674 : Std_Logic;
signal S675 : Std_Logic;
signal S676 : Std_Logic;
signal S677 : Std_Logic;
signal S678 : Std_Logic;
signal S679 : Std_Logic;
signal S680 : Std_Logic;
signal S681 : Std_Logic;
signal S682 : Std_Logic;
signal S683 : Std_Logic;
signal S684 : Std_Logic;
signal S685 : Std_Logic;
signal S686 : Std_Logic;
signal S687 : Std_Logic;
signal S688 : Std_Logic;
signal S689 : Std_Logic;
signal S690 : Std_Logic;
signal S691 : Std_Logic;
signal S692 : Std_Logic;
signal S693 : Std_Logic;
signal S694 : Std_Logic;
signal S695 : Std_Logic;
signal S696 : Std_Logic;
signal S697 : Std_Logic;
signal S698 : Std_Logic;
signal S699 : Std_Logic;
signal S700 : Std_Logic;
signal S701 : Std_Logic;
signal S702 : Std_Logic;
signal S703 : Std_Logic;
signal S704 : Std_Logic;
signal S705 : Std_Logic;
signal S706 : Std_Logic;
signal S707 : Std_Logic;
signal S708 : Std_Logic;
signal S709 : Std_Logic;
signal S710 : Std_Logic;
signal S711 : Std_Logic;
signal S712 : Std_Logic;
signal S713 : Std_Logic;
signal S714 : Std_Logic;
signal S715 : Std_Logic;
signal S716 : Std_Logic;
signal S717 : Std_Logic;
signal S718 : Std_Logic;
signal S719 : Std_Logic;
signal S720 : Std_Logic;
signal S721 : Std_Logic;
signal S722 : Std_Logic;
signal S723 : Std_Logic;
signal S724 : Std_Logic;
signal S725 : Std_Logic;
signal S726 : Std_Logic;
signal S727 : Std_Logic;
signal S728 : Std_Logic;
signal S729 : Std_Logic;
signal S730 : Std_Logic;
```

```
signal S789 : Std_Logic;
signal S790 : Std_Logic;
signal S791 : Std_Logic;
signal S792 : Std_Logic;
signal S793 : Std_Logic;
signal S794 : Std_Logic;
signal S795 : Std_Logic;
signal S796 : Std_Logic;
signal S797 : Std_Logic;
signal S798 : Std_Logic;
signal S799 : Std_Logic;
signal S800 : Std_Logic;
signal S801 : Std_Logic;
signal S802 : Std_Logic;
signal S803 : Std_Logic;
signal S804 : Std_Logic;
signal S805 : Std_Logic;
signal S806 : Std_Logic;
signal S807 : Std_Logic;
signal S808 : Std_Logic;
signal S809 : Std_Logic;
signal S810 : Std_Logic;
signal S811 : Std_Logic;
signal S812 : Std_Logic;
signal S813 : Std_Logic;
signal S814 : Std_Logic;
signal S815 : Std_Logic;
signal S816 : Std_Logic;
signal S817 : Std_Logic;
signal S818 : Std_Logic;
signal S819 : Std_Logic;
signal S820 : Std_Logic;
signal S821 : Std_Logic;
signal S822 : Std_Logic;
signal S823 : Std_Logic;
signal S824 : Std_Logic;
signal S825 : Std_Logic;
signal S826 : Std_Logic;
signal S827 : Std_Logic;
signal S828 : Std_Logic;
signal S829 : Std_Logic;
signal S830 : Std_Logic;
signal S831 : Std_Logic;
signal S832 : Std_Logic;
signal S833 : Std_Logic;
signal S834 : Std_Logic;
signal S835 : Std_Logic;
signal S836 : Std_Logic;
signal S837 : Std_Logic;
signal S838 : Std_Logic;
signal S839 : Std_Logic;
signal S840 : Std_Logic;
signal S841 : Std_Logic;
signal S842 : Std_Logic;
signal S843 : Std_Logic;
signal S844 : Std_Logic;
signal S845 : Std_Logic;
signal S846 : Std_Logic;
```

```
signal S847 : Std_Logic;
signal S848 : Std_Logic;
signal S849 : Std_Logic;
signal S850 : Std_Logic;
signal S851 : Std_Logic;
signal S852 : Std_Logic;
signal S853 : Std_Logic;
signal S854 : Std_Logic;
signal S855 : Std_Logic;
signal S856 : Std_Logic;
signal S857 : Std_Logic;
signal S858 : Std_Logic;
signal S859 : Std_Logic;
signal S860 : Std_Logic;
signal S861 : Std_Logic;
signal S862 : Std_Logic;
signal S863 : Std_Logic;
signal S864 : Std_Logic;
signal S865 : Std_Logic;
signal S866 : Std_Logic;
signal S867 : Std_Logic;
signal S868 : Std_Logic;
signal S869 : Std_Logic;
signal S870 : Std_Logic;
signal S871 : Std_Logic;
signal S872 : Std_Logic;
signal S873 : Std_Logic;
signal S874 : Std_Logic;
signal S875 : Std_Logic;
signal S876 : Std_Logic;
signal S877 : Std_Logic;
signal S878 : Std_Logic;
signal S879 : Std_Logic;
signal S880 : Std_Logic;
signal S881 : Std_Logic;
signal S882 : Std_Logic;
signal S883 : Std_Logic;
signal S884 : Std_Logic;
signal S885 : Std_Logic;
signal S886 : Std_Logic;
signal S887 : Std_Logic;
signal S888 : Std_Logic;
signal S889 : Std_Logic;
signal S890 : Std_Logic;
signal S891 : Std_Logic;
signal S892 : Std_Logic;
signal S893 : Std_Logic;
signal S894 : Std_Logic;
signal S895 : Std_Logic;
signal S896 : Std_Logic;
signal S897 : Std_Logic;
signal S898 : Std_Logic;
signal S899 : Std_Logic;
signal S900 : Std_Logic;
signal S901 : Std_Logic;
signal S902 : Std_Logic;
signal S903 : Std_Logic;
signal S904 : Std_Logic;
```

```
signal S905 : Std_Logic;
signal S906 : Std_Logic;
signal S907 : Std_Logic;
signal S908 : Std_Logic;
signal S909 : Std_Logic;
signal S910 : Std_Logic;
signal S911 : Std_Logic;
signal S912 : Std_Logic;
signal S913 : Std_Logic;
signal S914 : Std_Logic;
signal S915 : Std_Logic;
signal S916 : Std_Logic;
signal S917 : Std_Logic;
signal S918 : Std_Logic;
signal S919 : Std_Logic;
signal S920 : Std_Logic;
signal S921 : Std_Logic;
signal S922 : Std_Logic;
signal S923 : Std_Logic;
signal S924 : Std_Logic;
signal S925 : Std_Logic;
signal S926 : Std_Logic;
signal S927 : Std_Logic;
signal S928 : Std_Logic;
signal S929 : Std_Logic;
signal S930 : Std_Logic;
signal S931 : Std_Logic;
signal S932 : Std_Logic;
signal S933 : Std_Logic;
signal S934 : Std_Logic;
signal S935 : Std_Logic;
signal S936 : Std_Logic;
signal S937 : Std_Logic;
signal S938 : Std_Logic;
signal S939 : Std_Logic;
signal S940 : Std_Logic;
signal S941 : Std_Logic;
signal S942 : Std_Logic;
signal S943 : Std_Logic;
signal S944 : Std_Logic;
signal S945 : Std_Logic;
signal S946 : Std_Logic;
signal S947 : Std_Logic;
signal S948 : Std_Logic;
signal S949 : Std_Logic;
signal S950 : Std_Logic;
signal S951 : Std_Logic;
signal S952 : Std_Logic;
signal S953 : Std_Logic;
signal S954 : Std_Logic;
signal S955 : Std_Logic;
signal S956 : Std_Logic;
signal S957 : Std_Logic;
signal S958 : Std_Logic;
signal S959 : Std_Logic;
signal S960 : Std_Logic;
signal S961 : Std_Logic;
signal S962 : Std_Logic;
```

```
signal S963 : Std_Logic;
signal S964 : Std_Logic;
signal S965 : Std_Logic;
signal S966 : Std_Logic;
signal S967 : Std_Logic;
signal S968 : Std_Logic;
signal S969 : Std_Logic;
signal S970 : Std_Logic;
signal S971 : Std_Logic;
signal S972 : Std_Logic;
signal S973 : Std_Logic;
signal S974 : Std_Logic;
signal S975 : Std_Logic;
signal S976 : Std_Logic;
signal S977 : Std_Logic;
signal S978 : Std_Logic;
signal S979 : Std_Logic;
signal S980 : Std_Logic;
signal S981 : Std_Logic;
signal S982 : Std_Logic;
signal S983 : Std_Logic;
signal S984 : Std_Logic;
signal S985 : Std_Logic;
signal S986 : Std_Logic;
signal S987 : Std_Logic;
signal S988 : Std_Logic;
signal S989 : Std_Logic;
signal S990 : Std_Logic;
signal S991 : Std_Logic;
signal S992 : Std_Logic;
signal S993 : Std_Logic;
signal S994 : Std_Logic;
signal S995 : Std_Logic;
signal S996 : Std_Logic;
signal S997 : Std_Logic;
signal S998 : Std_Logic;
signal S999 : Std_Logic;
signal S1000 : Std_Logic;
signal S1001 : Std_Logic;
signal S1002 : Std_Logic;
signal S1003 : Std_Logic;
signal S1004 : Std_Logic;
signal S1005 : Std_Logic;
signal S1006 : Std_Logic;
signal S1007 : Std_Logic;
signal S1008 : Std_Logic;
signal S1009 : Std_Logic;
signal S1010 : Std_Logic;
signal S1011 : Std_Logic;
signal S1012 : Std_Logic;
signal S1013 : Std_Logic;
signal S1014 : Std_Logic;
signal S1015 : Std_Logic;
signal S1016 : Std_Logic;
signal S1017 : Std_Logic;
signal S1018 : Std_Logic;
signal S1019 : Std_Logic;
signal S1020 : Std_Logic;
```

```
signal S1021 : Std_Logic;
signal S1022 : Std_Logic;
signal S1023 : Std_Logic;
signal S1024 : Std_Logic;
signal S1025 : Std_Logic;
signal S1026 : Std_Logic;
signal S1027 : Std_Logic;
signal S1028 : Std_Logic;
signal S1029 : Std_Logic;
signal S1030 : Std_Logic;
signal S1031 : Std_Logic;
signal S1032 : Std_Logic;
signal S1033 : Std_Logic;
signal S1034 : Std_Logic;
signal S1035 : Std_Logic;
signal S1036 : Std_Logic;
signal S1037 : Std_Logic;
signal S1038 : Std_Logic;
signal S1039 : Std_Logic;
signal S1040 : Std_Logic;
signal S1041 : Std_Logic;
signal S1042 : Std_Logic;
signal S1043 : Std_Logic;
signal S1044 : Std_Logic;
signal S1045 : Std_Logic;
signal S1046 : Std_Logic;
signal S1047 : Std_Logic;
signal S1048 : Std_Logic;
signal S1049 : Std_Logic;
signal S1050 : Std_Logic;
signal S1051 : Std_Logic;
signal S1052 : Std_Logic;
signal S1053 : Std_Logic;
signal S1054 : Std_Logic;
signal S1055 : Std_Logic;
signal S1056 : Std_Logic;
signal S1057 : Std_Logic;
signal S1058 : Std_Logic;
signal S1059 : Std_Logic;
signal S1060 : Std_Logic;
signal S1061 : Std_Logic;
signal S1062 : Std_Logic;
signal S1063 : Std_Logic;
signal S1064 : Std_Logic;
signal S1065 : Std_Logic;
signal S1066 : Std_Logic;
signal S1067 : Std_Logic;
signal S1068 : Std_Logic;
signal S1069 : Std_Logic;
signal S1070 : Std_Logic;
signal S1071 : Std_Logic;
signal S1072 : Std_Logic;
signal S1073 : Std_Logic;
signal S1074 : Std_Logic;
signal S1075 : Std_Logic;
signal S1076 : Std_Logic;
signal S1077 : Std_Logic;
signal S1078 : Std_Logic;
```

```
  signal S1079 : Std_Logic;
  signal S1080 : Std_Logic;
  signal S1081 : Std_Logic;
  signal S1082 : Std_Logic;
  signal S1083 : Std_Logic;
  signal S1084 : Std_Logic;
  signal S1085 : Std_Logic;
  signal S1086 : Std_Logic;
  signal S1087 : Std_Logic;
  signal S1088 : Std_Logic;
  signal S1089 : Std_Logic;
  signal S1090 : Std_Logic;
  signal S1091 : Std_Logic;
  signal S1092 : Std_Logic;
  signal U457_Z : Std_Logic;
  signal U458_Z : Std_Logic;
  signal U456_Z : Std_Logic;
  signal U455_Z : Std_Logic;
  signal U459_Z : Std_Logic;
  signal U487_Z : Std_Logic;

begin

  U446: tag342
    port map ( prsp => U460_Z, setag => U459_Z, cntinit =>
          cntinit, rstaddr => U455_Z, mux2 => U456_Z, mux1
          => U457_Z, mux0 => U458_Z, fir_in => fir_in,
          resp_in => resp_in, count_out => count_out, we =>
          U453_Z, fn(341) => fn(341), fn(340) => fn(340),
          fn(339) => fn(339), fn(338) => fn(338), fn(337) =>
          fn(337), fn(336) => fn(336), fn(335) => fn(335),
          fn(334) => fn(334), fn(333) => fn(333), fn(332) =>
          fn(332), fn(331) => fn(331), fn(330) => fn(330),
          fn(329) => fn(329), fn(328) => fn(328), fn(327) =>
          fn(327), fn(326) => fn(326), fn(325) => fn(325),
          fn(324) => fn(324), fn(323) => fn(323), fn(322) =>
          fn(322), fn(321) => fn(321), fn(320) => fn(320),
          fn(319) => fn(319), fn(318) => fn(318), fn(317) =>
          fn(317), fn(316) => fn(316), fn(315) => fn(315),
          fn(314) => fn(314), fn(313) => fn(313), fn(312) =>
          fn(312), fn(311) => fn(311), fn(310) => fn(310),
          fn(309) => fn(309), fn(308) => fn(308), fn(307) =>
          fn(307), fn(306) => fn(306), fn(305) => fn(305),
          fn(304) => fn(304), fn(303) => fn(303), fn(302) =>
          fn(302), fn(301) => fn(301), fn(300) => fn(300),
          fn(299) => fn(299), fn(298) => fn(298), fn(297) =>
          fn(297), fn(296) => fn(296), fn(295) => fn(295),
          fn(294) => fn(294), fn(293) => fn(293), fn(292) =>
          fn(292), fn(291) => fn(291), fn(290) => fn(290),
          fn(289) => fn(289), fn(288) => fn(288), fn(287) =>
          fn(287), fn(286) => fn(286), fn(285) => fn(285),
          fn(284) => fn(284), fn(283) => fn(283), fn(282) =>
          fn(282), fn(281) => fn(281), fn(280) => fn(280),
          fn(279) => fn(279), fn(278) => fn(278), fn(277) =>
          fn(277), fn(276) => fn(276), fn(275) => fn(275),
          fn(274) => fn(274), fn(273) => fn(273), fn(272) =>
          fn(272), fn(271) => fn(271), fn(270) => fn(270),
```

fn(269) => fn(269), fn(268) => fn(268), fn(267) => fn(267), fn(266) => fn(266), fn(265) => fn(265), fn(264) => fn(264), fn(263) => fn(263), fn(262) => fn(262), fn(261) => fn(261), fn(260) => fn(260), fn(259) => fn(259), fn(258) => fn(258), fn(257) => fn(257), fn(256) => fn(256), fn(255) => fn(255), fn(254) => fn(254), fn(253) => fn(253), fn(252) => fn(252), fn(251) => fn(251), fn(250) => fn(250), fn(249) => fn(249), fn(248) => fn(248), fn(247) => fn(247), fn(246) => fn(246), fn(245) => fn(245), fn(244) => fn(244), fn(243) => fn(243), fn(242) => fn(242), fn(241) => fn(241), fn(240) => fn(240), fn(239) => fn(239), fn(238) => fn(238), fn(237) => fn(237), fn(236) => fn(236), fn(235) => fn(235), fn(234) => fn(234), fn(233) => fn(233), fn(232) => fn(232), fn(231) => fn(231), fn(230) => fn(230), fn(229) => fn(229), fn(228) => fn(228), fn(227) => fn(227), fn(226) => fn(226), fn(225) => fn(225), fn(224) => fn(224), fn(223) => fn(223), fn(222) => fn(222), fn(221) => fn(221), fn(220) => fn(220), fn(219) => fn(219), fn(218) => fn(218), fn(217) => fn(217), fn(216) => fn(216), fn(215) => fn(215), fn(214) => fn(214), fn(213) => fn(213), fn(212) => fn(212), fn(211) => fn(211), fn(210) => fn(210), fn(209) => fn(209), fn(208) => fn(208), fn(207) => fn(207), fn(206) => fn(206), fn(205) => fn(205), fn(204) => fn(204), fn(203) => fn(203), fn(202) => fn(202), fn(201) => fn(201), fn(200) => fn(200), fn(199) => fn(199), fn(198) => fn(198), fn(197) => fn(197), fn(196) => fn(196), fn(195) => fn(195), fn(194) => fn(194), fn(193) => fn(193), fn(192) => fn(192), fn(191) => fn(191), fn(190) => fn(190), fn(189) => fn(189), fn(188) => fn(188), fn(187) => fn(187), fn(186) => fn(186), fn(185) => fn(185), fn(184) => fn(184), fn(183) => fn(183), fn(182) => fn(182), fn(181) => fn(181), fn(180) => fn(180), fn(179) => fn(179), fn(178) => fn(178), fn(177) => fn(177), fn(176) => fn(176), fn(175) => fn(175), fn(174) => fn(174), fn(173) => fn(173), fn(172) => fn(172), fn(171) => fn(171), fn(170) => fn(170), fn(169) => fn(169), fn(168) => fn(168), fn(167) => fn(167), fn(166) => fn(166), fn(165) => fn(165), fn(164) => fn(164), fn(163) => fn(163), fn(162) => fn(162), fn(161) => fn(161), fn(160) => fn(160), fn(159) => fn(159), fn(158) => fn(158), fn(157) => fn(157), fn(156) => fn(156), fn(155) => fn(155), fn(154) => fn(154), fn(153) => fn(153), fn(152) => fn(152), fn(151) => fn(151), fn(150) => fn(150), fn(149) => fn(149), fn(148) => fn(148), fn(147) => fn(147), fn(146) => fn(146), fn(145) => fn(145), fn(144) => fn(144), fn(143) => fn(143), fn(142) => fn(142), fn(141) => fn(141), fn(140) => fn(140), fn(139) => fn(139), fn(138) => fn(138), fn(137) => fn(137), fn(136) => fn(136), fn(135) => fn(135), fn(134) => fn(134), fn(133) => fn(133), fn(132) => fn(132), fn(131) => fn(131), fn(130) => fn(130), fn(129) => fn(129), fn(128) => fn(128), fn(127) => fn(127), fn(126) => fn(126), fn(125) => fn(125), fn(124) => fn(124), fn(123) => fn(123), fn(122) => fn(122), fn(121) => fn(121), fn(120) => fn(120), fn(119) => fn(119), fn(118) => fn(118), fn(117) => fn(117), fn(116) => fn(116), fn(115) => fn(115), fn(114) => fn(114), fn(113) => fn(113), fn(112) => fn(112), fn(111) => fn(111), fn(110) => fn(110), fn(109) => fn(109), fn(108) => fn(108), fn(107) => fn(107), fn(106) => fn(106), fn(105) => fn(105), fn(104) => fn(104), fn(103) => fn(103), fn(102) => fn(102), fn(101) => fn(101), fn(100) => fn(100), fn(99) => fn(99), fn(98) => fn(98), fn(97) => fn(97), fn(96) => fn(96), fn(95) => fn(95), fn(94) => fn(94), fn(93) => fn(93), fn(92) => fn(92), fn(91) => fn(91), fn(90) => fn(90), fn(89) => fn(89), fn(88) => fn(88), fn(87) => fn(87), fn(86) => fn(86), fn(85) => fn(85), fn(84) => fn(84), fn(83) => fn(83), fn(82) => fn(82), fn(81) => fn(81), fn(80) => fn(80), fn(79) => fn(79), fn(78) => fn(78), fn(77) => fn(77), fn(76) => fn(76), fn(75) => fn(75), fn(74) => fn(74), fn(73) => fn(73), fn(72) => fn(72), fn(71) => fn(71), fn(70) => fn(70), fn(69) => fn(69), fn(68) => fn(68), fn(67) => fn(67), fn(66) => fn(66), fn(65) => fn(65), fn(64) => fn(64), fn(63) => fn(63), fn(62) => fn(62), fn(61) => fn(61), fn(60) => fn(60), fn(59) => fn(59), fn(58) => fn(58), fn(57) => fn(57), fn(56) => fn(56), fn(55) => fn(55), fn(54) => fn(54), fn(53) => fn(53), fn(52) => fn(52), fn(51) => fn(51), fn(50) => fn(50), fn(49) => fn(49), fn(48) => fn(48), fn(47) => fn(47), fn(46) => fn(46), fn(45) => fn(45), fn(44) => fn(44), fn(43) => fn(43), fn(42) => fn(42), fn(41) => fn(41), fn(40) => fn(40), fn(39) => fn(39), fn(38) => fn(38), fn(37) => fn(37), fn(36) => fn(36), fn(35) => fn(35), fn(34) => fn(34), fn(33) => fn(33), fn(32) => fn(32), fn(31) => so15_local, fn(30) => so14_local, fn(29) => so13_local, fn(28) => so12_local, fn(27) => so11_local, fn(26) => so10_local, fn(25) => so9_local, fn(24) => so8_local, fn(23) => so7_local, fn(22) => so6_local, fn(21) => so5_local, fn(20) => so4_local, fn(19) => so3_local, fn(18) => so2_local, fn(17) => so1_local, fn(16) => sso_local, fn(15) => ni(15), fn(14) => ni(14), fn(13) => ni(13), fn(12) => ni(12), fn(11) => ni(11), fn(10) => ni(10), fn(9) => ni(9), fn(8) => ni(8), fn(7) => ni(7), fn(6) => ni(6), fn(5) => ni(5), fn(4) => ni(4), fn(3) => ni(3), fn(2) => ni(2), fn(1) => ni(1), fn(0) => ni(0), nn(341) => no14_local, nn(340) => no13_local, nn(339) => no12_local, nn(338) => no11_local, nn(337) => no10_local, nn(336) => no9_local, nn(335) => no8_local, nn(334) => no7_local, nn(333) => no6_local, nn(332) => no5_local, nn(331) => no4_local, nn(330) => no3_local, nn(329) => no2_local, nn(328) => no1_local, nn(327) => no0_local, nn(326) => fn(341), nn(325) => fn(340), nn(324) => fn(339), nn(323) => fn(338), nn(322) => fn(337), nn(321) => fn(336), nn(320) => fn(335), nn(319) => fn(334), nn(318) => fn(333), nn(317) => fn(332), nn(316) => fn(331), nn(315) => fn(330), nn(314) => fn(329), nn(313) => fn(328), nn(312) => fn(327), nn(311) => fn(326), nn(310) => fn(325), nn(309) => fn(324), nn(308) => fn(323), nn(307) => fn(322), nn(306) => fn(321), nn(305) => fn(320), nn(304) => fn(319), nn(303) => fn(318), nn(302) => fn(317), nn(301) => fn(316), nn(300) => fn(315), nn(299) => fn(314), nn(298) => fn(313), nn(297) => fn(312), nn(296) => fn(311), nn(295) => fn(310), nn(294) => fn(309), nn(293) => fn(308), nn(292) => fn(307), nn(291) => fn(306), nn(290) => fn(305), nn(289) => fn(304), nn(288) => fn(303), nn(287) => fn(302), nn(286) => fn(301), nn(285) => fn(300), nn(284) => fn(299), nn(283) => fn(298), nn(282) => fn(297), nn(281) => fn(296), nn(280) => fn(295), nn(279) => fn(294), nn(278) => fn(293), nn(277) => fn(292), nn(276) => fn(291), nn(275) => fn(290), nn(274) => fn(289), nn(273) => fn(288), nn(272) => fn(287), nn(271) => fn(286), nn(270) => fn(285), nn(269) => fn(284), nn(268) => fn(283), nn(267) => fn(282), nn(266) => fn(281), nn(265) => fn(280), nn(264) => fn(279), nn(263) => fn(278), nn(262) => fn(277), nn(261) => fn(276), nn(260) => fn(275), nn(259) => fn(274), nn(258) => fn(273), nn(257) => fn(272), nn(256) => fn(271), nn(255) => fn(270), nn(254) => fn(269), nn(253) => fn(268), nn(252) => fn(267), nn(251) => fn(266), nn(250) => fn(265), nn(249) => fn(264), nn(248) => fn(263), nn(247) => fn(262), nn(246) => fn(261), nn(245) => fn(260), nn(244) => fn(259), nn(243) => fn(258), nn(242) => fn(257), nn(241) => fn(256), nn(240) => fn(255), nn(239) => fn(254), nn(238) => fn(253), nn(237) => fn(252), nn(236) => fn(251), nn(235) => fn(250), nn(234) => fn(249), nn(233) => fn(248), nn(232) => fn(247), nn(231) => fn(246), nn(230) => fn(245), nn(229) => fn(244), nn(228) => fn(243), nn(227) => fn(242), nn(226) => fn(241), nn(225) => fn(240), nn(224) => fn(239), nn(223) => fn(238), nn(222) => fn(237), nn(221) => fn(236), nn(220) => fn(235), nn(219) => fn(234), nn(218) => fn(233), nn(217) => fn(232), nn(216) => fn(231), nn(215) => fn(230), nn(214) => fn(229), nn(213) => fn(228), nn(212) => fn(227), nn(211) => fn(226), nn(210) => fn(225), nn(209) => fn(224), nn(208) => fn(223), nn(207) => fn(222), nn(206) => fn(221), nn(205) => fn(220), nn(204) => fn(219), nn(203) => fn(218), nn(202) => fn(217), nn(201) => fn(216), nn(200) => fn(215), nn(199) => fn(214), nn(198) => fn(213), nn(197) => fn(212), nn(196) => fn(211), nn(195) => fn(210), nn(194) => fn(209), nn(193) => fn(208), nn(192) => fn(207), nn(191) => fn(206), nn(190) => fn(205), nn(189) => fn(204), nn(188) => fn(203), nn(187) => fn(202), nn(186) => fn(201), nn(185) => fn(200), nn(184) => fn(199), nn(183) => fn(198), nn(182) => fn(197), nn(181) => fn(196), nn(180) => fn(195), nn(179) => fn(194), nn(178) => fn(193), nn(177) => fn(192), nn(176) => fn(191), nn(175) => fn(190), nn(174) => fn(189), nn(173) => fn(188), nn(172) => fn(187), nn(171) => fn(186), nn(170) => fn(185), nn(169) => fn(184), nn(168) => fn(183), nn(167) => fn(182), nn(166) => fn(181), nn(165) => fn(180), nn(164) => fn(179), nn(163) => fn(178), nn(162) => fn(177), nn(161) => fn(176), nn(160) => fn(175), nn(159) => fn(174), nn(158) => fn(173), nn(157) => fn(172), nn(156) => fn(171), nn(155) => fn(170), nn(154) => fn(169), nn(153) => fn(168), nn(152) => fn(167), nn(151) => fn(166), nn(150) => fn(165), nn(149) => fn(164), nn(148) => fn(163), nn(147) => fn(162), nn(146) => fn(161), nn(145) => fn(160), nn(144) => fn(159), nn(143) => fn(158), nn(142) => fn(157), nn(141) => fn(156), nn(140) => fn(155), nn(139) => fn(154), nn(138) => fn(153), nn(137) => fn(152), nn(136) => fn(151), nn(135) => fn(150), nn(134) => fn(149), nn(133) => fn(148), nn(132) => fn(147), nn(131) => fn(146), nn(130) => fn(145), nn(129) => fn(144), nn(128) => fn(143), nn(127) => fn(142), nn(126) => fn(141), nn(125) => fn(140), nn(124) => fn(139), nn(123) => fn(138), nn(122) => fn(137), nn(121) => fn(136), nn(120) => fn(135), nn(119) => fn(134), nn(118) => fn(133), nn(117) => fn(132), nn(116) => fn(131), nn(115) => fn(130), nn(114) => fn(129), nn(113) => fn(128), nn(112) => fn(127), nn(111) => fn(126), nn(110) => fn(125), nn(109) => fn(124), nn(108) => fn(123), nn(107) => fn(122), nn(106) => fn(121), nn(105) => fn(120), nn(104) => fn(119), nn(103) => fn(118), nn(102) => fn(117), nn(101) => fn(116), nn(100) => fn(115), nn(99) => fn(114), nn(98) => fn(113), nn(97) => fn(112), nn(96) => fn(111), nn(95) => fn(110), nn(94) => fn(109), nn(93) => fn(108), nn(92) => fn(107), nn(91) => fn(106), nn(90) => fn(105), nn(89) => fn(104), nn(88) => fn(103), nn(87) => fn(102), nn(86) => fn(101), nn(85) => fn(100), nn(84) => fn(99), nn(83) => fn(98), nn(82) => fn(97), nn(81) => fn(96), nn(80) => fn(95), nn(79) => fn(94), nn(78) => fn(93), nn(77) => fn(92), nn(76) => fn(91), nn(75) => fn(90), nn(74) => fn(89), nn(73) => fn(88), nn(72) => fn(87), nn(71) => fn(86), nn(70) => fn(85), nn(69) => fn(84), nn(68) => fn(83), nn(67) => fn(82), nn(66) => fn(81), nn(65) => fn(80), nn(64) => fn(79), nn(63) => fn(78), nn(62) => fn(77), nn(61) => fn(76), nn(60) => fn(75), nn(59) => fn(74), nn(58) => fn(73), nn(57) => fn(72), nn(56) => fn(71), nn(55) => fn(70), nn(54) => fn(69), nn(53) => fn(68), nn(52) => fn(67), nn(51) => fn(66), nn(50) => fn(65), nn(49) => fn(64), nn(48) => fn(63), nn(47) => fn(62), nn(46) => fn(61), nn(45) => fn(60), nn(44) => fn(59), nn(43) => fn(58), nn(42) => fn(57), nn(41) => fn(56), nn(40) => fn(55), nn(39) => fn(54), nn(38) => fn(53), nn(37) => fn(52), nn(36) => fn(51), nn(35) => fn(50), nn(34) => fn(49), nn(33) => fn(48), nn(32) => fn(47), nn(31) => fn(46), nn(30) => fn(45), nn(29) => fn(44), nn(28) => fn(43), nn(27) => fn(42), nn(26) => fn(41), nn(25) => fn(40), nn(24) => fn(39), nn(23) => fn(38), nn(22) => fn(37), nn(21) => fn(36), nn(20) => fn(35), nn(19) => fn(34), nn(18) => fn(33), nn(17) => fn(32), nn(16) => so15_local, nn(15) => so14_local, nn(14) => so13_local, nn(13) => so12_local, nn(12) => so11_local, nn(11) => so10_local, nn(10) => so9_local, nn(9) => so8_local, nn(8) => so7_local, nn(7) => so6_local, nn(6) => so5_local, nn(5) => so4_local, nn(4) => so3_local, nn(3) => so2_local, nn(2) => so1_local, nn(1) => sso_local, nn(0) => nni, tag(341) => nno_local, tag(340) => no14_local, tag(339) => no13_local, tag(338) => no12_local, tag(337) => no11_local, tag(336) => no10_local, tag(335) => no9_local, tag(334) => no8_local, tag(333) => no7_local, tag(332) => no6_local, tag(331) => no5_local, tag(330) => no4_local, tag(329) => no3_local, tag(328) => no2_local, tag(327) => no1_local, tag(326) => no0_local, tag(325) => fn(341), tag(324) => fn(340), tag(323) => fn(339), tag(322) => fn(338), tag(321) => fn(337), tag(320) => fn(336), tag(319) => fn(335), tag(318) => fn(334), tag(317) => fn(333), tag(316) => fn(332), tag(315) => fn(331), tag(314) => fn(330), tag(313) => fn(329), tag(312) => fn(328), tag(311) => fn(327), tag(310) => fn(326), tag(309) => fn(325), tag(308) => fn(324), tag(307) => fn(323), tag(306) => fn(322), tag(305) => fn(321), tag(304) => fn(320), tag(303) => fn(319), tag(302) => fn(318), tag(301) => fn(317), tag(300) => fn(316), tag(299) => fn(315), tag(298) => fn(314), tag(297) => fn(313), tag(296) => fn(312), tag(295) => fn(311), tag(294) => fn(310), tag(293) => fn(309), tag(292) => fn(308), tag(291) => fn(307), tag(290) => fn(306), tag(289) => fn(305), tag(288) => fn(304), tag(287) => fn(303), tag(286) => fn(302), tag(285) => fn(301), tag(284) => fn(300), tag(283) => fn(299), tag(282) => fn(298), tag(281) => fn(297), tag(280) => fn(296), tag(279) => fn(295), tag(278) => fn(294), tag(277) => fn(293), tag(276) => fn(292), tag(275) => fn(291), tag(274) => fn(290), tag(273) => fn(289), tag(272) => fn(288), tag(271) => fn(287), tag(270) => fn(286), tag(269) => fn(285), tag(268) => fn(284), tag(267) => fn(283), tag(266) => fn(282), tag(265) => fn(281), tag(264) => fn(280), tag(263) => fn(279), tag(262) => fn(278), tag(261) => fn(277), tag(260) => fn(276), tag(259) => fn(275), tag(258) => fn(274), tag(257) => fn(273), tag(256) => fn(272), tag(255) => fn(271), tag(254) => fn(270), tag(253) => fn(269), tag(252) => fn(268), tag(251) => fn(267), tag(250) => fn(266), tag(249) => fn(265), tag(248) => fn(264), tag(247) => fn(263), tag(246) => fn(262), tag(245) => fn(261), tag(244) => fn(260), tag(243) => fn(259), tag(242) => fn(258), tag(241) => fn(257), tag(240) => fn(256), tag(239) => fn(255), tag(238) => fn(254), tag(237) => fn(253), tag(236)

=> fn(252), tag(235) => fn(251), tag(234) => fn(250), tag(233) => fn(249), tag(232) => fn(248), tag(231) => fn(247), tag(230) => fn(246), tag(229) => fn(245), tag(228) => fn(244), tag(227) => fn(243), tag(226) => fn(242), tag(225) => fn(241), tag(224) => fn(240), tag(223) => fn(239), tag(222) => fn(238), tag(221) => fn(237), tag(220) => fn(236), tag(219) => fn(235), tag(218) => fn(234), tag(217) => fn(233), tag(216) => fn(232), tag(215) => fn(231), tag(214) => fn(230), tag(213) => fn(229), tag(212) => fn(228), tag(211) => fn(227), tag(210) => fn(226), tag(209) => fn(225), tag(208) => fn(224), tag(207) => fn(223), tag(206) => fn(222), tag(205) => fn(221), tag(204) => fn(220), tag(203) => fn(219), tag(202) => fn(218), tag(201) => fn(217), tag(200) => fn(216), tag(199) => fn(215), tag(198) => fn(214), tag(197) => fn(213), tag(196) => fn(212), tag(195) => fn(211), tag(194) => fn(210), tag(193) => fn(209), tag(192) => fn(208), tag(191) => fn(207), tag(190) => fn(206), tag(189) => fn(205), tag(188) => fn(204), tag(187) => fn(203), tag(186) => fn(202), tag(185) => fn(201), tag(184) => fn(200), tag(183) => fn(199), tag(182) => fn(198), tag(181) => fn(197), tag(180) => fn(196), tag(179) => fn(195), tag(178) => fn(194), tag(177) => fn(193), tag(176) => fn(192), tag(175) => fn(191), tag(174) => fn(190), tag(173) => fn(189), tag(172) => fn(188), tag(171) => fn(187), tag(170) => fn(186), tag(169) => fn(185), tag(168) => fn(184), tag(167) => fn(183), tag(166) => fn(182), tag(165) => fn(181), tag(164) => fn(180), tag(163) => fn(179), tag(162) => fn(178), tag(161) => fn(177), tag(160) => fn(176), tag(159) => fn(175), tag(158) => fn(174), tag(157) => fn(173), tag(156) => fn(172), tag(155) => fn(171), tag(154) => fn(170), tag(153) => fn(169), tag(152) => fn(168), tag(151) => fn(167), tag(150) => fn(166), tag(149) => fn(165), tag(148) => fn(164), tag(147) => fn(163), tag(146) => fn(162), tag(145) => fn(161), tag(144) => fn(160), tag(143) => fn(159), tag(142) => fn(158), tag(141) => fn(157), tag(140) => fn(156), tag(139) => fn(155), tag(138) => fn(154), tag(137) => fn(153), tag(136) => fn(152), tag(135) => fn(151), tag(134) => fn(150), tag(133) => fn(149), tag(132) => fn(148), tag(131) => fn(147), tag(130) => fn(146), tag(129) => fn(145), tag(128) => fn(144), tag(127) => fn(143), tag(126) => fn(142), tag(125) => fn(141), tag(124) => fn(140), tag(123) => fn(139), tag(122) => fn(138), tag(121) => fn(137), tag(120) => fn(136), tag(119) => fn(135), tag(118) => fn(134), tag(117) => fn(133), tag(116) => fn(132), tag(115) => fn(131), tag(114) => fn(130), tag(113) => fn(129), tag(112) => fn(128), tag(111) => fn(127), tag(110) => fn(126), tag(109) => fn(125), tag(108) => fn(124), tag(107) => fn(123), tag(106) => fn(122), tag(105) => fn(121), tag(104) => fn(120), tag(103) => fn(119), tag(102) => fn(118), tag(101) => fn(117), tag(100) => fn(116), tag(99) => fn(115), tag(98) => fn(114), tag(97) => fn(113), tag(96) => fn(112), tag(95) => fn(111), tag(94) => fn(110), tag(93) => fn(109), tag(92) => fn(108), tag(91) => fn(107), tag(90) => fn(106), tag(89) => fn(105), tag(88) => fn(104), tag(87) => fn(103), tag(86) => fn(102), tag(85) => fn(101), tag(84) => fn(100), tag(83) => fn(99), tag(82) => fn(98), tag(81) => fn(97), tag(80) => fn(96), tag(79) => fn(95), tag(78) => fn(94), tag(77) => fn(93), tag(76) => fn(92), tag(75) => fn(91), tag(74) => fn(90), tag(73) => fn(89), tag(72) => fn(88), tag(71) => fn(87), tag(70) => fn(86), tag(69) => fn(85), tag(68) => fn(84), tag(67) => fn(83), tag(66) => fn(82), tag(65) => fn(81), tag(64) => fn(80), tag(63) => fn(79), tag(62) => fn(78), tag(61) => fn(77), tag(60) => fn(76), tag(59) => fn(75), tag(58) => fn(74), tag(57) => fn(73), tag(56) => fn(72), tag(55) => fn(71), tag(54) => fn(70), tag(53) => fn(69), tag(52) => fn(68), tag(51) => fn(67), tag(50) => fn(66), tag(49) => fn(65), tag(48) => fn(64), tag(47) => fn(63), tag(46) => fn(62), tag(45) => fn(61), tag(44) => fn(60), tag(43) => fn(59), tag(42) => fn(58), tag(41) => fn(57), tag(40) => fn(56), tag(39) => fn(55), tag(38) => fn(54), tag(37) => fn(53), tag(36) => fn(52), tag(35) => fn(51), tag(34) => fn(50), tag(33) => fn(49), tag(32) => fn(48), tag(31) => fn(47), tag(30) => fn(46), tag(29) => fn(45), tag(28) => fn(44), tag(27) => fn(43), tag(26) => fn(42), tag(25) => fn(41), tag(24) => fn(40), tag(23) => fn(39), tag(22) => fn(38), tag(21) => fn(37), tag(20) => fn(36), tag(19) => fn(35), tag(18) => fn(34), tag(17) => fn(33), tag(16) => fn(32), tag(15) => so15_local, tag(14) => so14_local, tag(13) => so13_local, tag(12) => so12_local, tag(11) => so11_local, tag(10) => so10_local, tag(9) => so9_local, tag(8) => so8_local, tag(7) => so7_local, tag(6) => so6_local, tag(5) => so5_local, tag(4) => so4_local, tag(3) => so3_local, tag(2) => so2_local, tag(1) => so1_local, tag(0) => sso_local, ns(341) => ssi, ns(340) => nno_local, ns(339) => no14_local, ns(338) => no13_local, ns(337) => no12_local, ns(336) => no11_local, ns(335) => no10_local, ns(334) => no9_local, ns(333) => no8_local, ns(332) => no7_local, ns(331) => no6_local, ns(330) => no5_local, ns(329) => no4_local, ns(328) => no3_local, ns(327) => no2_local, ns(326) => no1_local, ns(325) => no0_local, ns(324) => fn(341), ns(323) => fn(340), ns(322) => fn(339), ns(321) => fn(338), ns(320) => fn(337), ns(319) => fn(336), ns(318) => fn(335), ns(317) => fn(334), ns(316) => fn(333), ns(315) => fn(332), ns(314) => fn(331), ns(313) => fn(330), ns(312) => fn(329), ns(311) => fn(328), ns(310) => fn(327), ns(309) => fn(326), ns(308) => fn(325), ns(307) => fn(324), ns(306) => fn(323), ns(305) => fn(322), ns(304) => fn(321), ns(303) => fn(320), ns(302) => fn(319), ns(301) => fn(318), ns(300) => fn(317), ns(299) => fn(316), ns(298) => fn(315), ns(297) => fn(314), ns(296) => fn(313), ns(295) => fn(312), ns(294) => fn(311), ns(293) => fn(310), ns(292) => fn(309), ns(291) => fn(308), ns(290) => fn(307), ns(289) => fn(306), ns(288) => fn(305), ns(287) => fn(304), ns(286) => fn(303), ns(285) => fn(302), ns(284) => fn(301), ns(283) => fn(300), ns(282) => fn(299), ns(281) => fn(298), ns(280) => fn(297), ns(279) => fn(296), ns(278) => fn(295), ns(277) => fn(294), ns(276) => fn(293), ns(275) => fn(292), ns(274) => fn(291), ns(273) => fn(290), ns(272) => fn(289), ns(271) => fn(288), ns(270) => fn(287), ns(269) => fn(286), ns(268) => fn(285), ns(267) => fn(284), ns(266) => fn(283), ns(265) => fn(282), ns(264) => fn(281), ns(263) => fn(280), ns(262) => fn(279), ns(261) => fn(278), ns(260) => fn(277), ns(259) => fn(276), ns(258) => fn(275), ns(257) => fn(274), ns(256) => fn(273), ns(255) => fn(272), ns(254) => fn(271), ns(253) => fn(270), ns(252) => fn(269), ns(251) => fn(268), ns(250) => fn(267), ns(249) => fn(266), ns(248) => fn(265), ns(247) => fn(264), ns(246) => fn(263), ns(245) => fn(262), ns(244) => fn(261), ns(243) => fn(260), ns(242) => fn(259), ns(241) => fn(258), ns(240) => fn(257), ns(239) => fn(256), ns(238) => fn(255), ns(237) => fn(254), ns(236) => fn(253), ns(235) => fn(252), ns(234) => fn(251), ns(233) => fn(250), ns(232) => fn(249), ns(231) => fn(248), ns(230) => fn(247), ns(229) => fn(246), ns(228) => fn(245), ns(227) => fn(244), ns(226) => fn(243), ns(225) => fn(242), ns(224) => fn(241), ns(223) => fn(240), ns(222) => fn(239), ns(221) => fn(238), ns(220) => fn(237), ns(219) => fn(236), ns(218) => fn(235), ns(217) => fn(234), ns(216) => fn(233), ns(215) => fn(232), ns(214) => fn(231), ns(213) => fn(230), ns(212) => fn(229), ns(211) => fn(228), ns(210) => fn(227), ns(209) => fn(226), ns(208) => fn(225), ns(207) => fn(224), ns(206) => fn(223), ns(205) => fn(222), ns(204) => fn(221), ns(203) => fn(220), ns(202) => fn(219), ns(201) => fn(218), ns(200) => fn(217), ns(199) => fn(216), ns(198) => fn(215), ns(197) => fn(214), ns(196) => fn(213), ns(195) => fn(212), ns(194) => fn(211), ns(193) => fn(210), ns(192) => fn(209), ns(191) => fn(208), ns(190) => fn(207), ns(189) => fn(206), ns(188) => fn(205), ns(187) => fn(204), ns(186) => fn(203), ns(185) => fn(202), ns(184) => fn(201), ns(183) => fn(200), ns(182) => fn(199), ns(181) => fn(198), ns(180) => fn(197), ns(179) => fn(196), ns(178) => fn(195), ns(177) => fn(194), ns(176) => fn(193), ns(175) => fn(192), ns(174) => fn(191), ns(173) => fn(190), ns(172) => fn(189), ns(171) => fn(188), ns(170) => fn(187), ns(169) => fn(186), ns(168) => fn(185), ns(167) => fn(184), ns(166) => fn(183), ns(165) => fn(182), ns(164) => fn(181), ns(163) => fn(180), ns(162) => fn(179), ns(161) => fn(178), ns(160) => fn(177), ns(159) => fn(176), ns(158) => fn(175), ns(157) => fn(174), ns(156) => fn(173), ns(155) => fn(172), ns(154) => fn(171), ns(153) => fn(170), ns(152) => fn(169), ns(151) => fn(168), ns(150) => fn(167), ns(149) => fn(166), ns(148) => fn(165), ns(147) => fn(164), ns(146) => fn(163), ns(145) => fn(162), ns(144) => fn(161), ns(143) => fn(160), ns(142) => fn(159), ns(141) => fn(158), ns(140) => fn(157), ns(139) => fn(156), ns(138) => fn(155), ns(137) => fn(154), ns(136) => fn(153), ns(135) => fn(152), ns(134) => fn(151), ns(133) => fn(150), ns(132) => fn(149), ns(131) => fn(148), ns(130) => fn(147), ns(129) => fn(146), ns(128) => fn(145), ns(127) => fn(144), ns(126) => fn(143), ns(125) => fn(142), ns(124) => fn(141), ns(123) => fn(140), ns(122) => fn(139), ns(121) => fn(138), ns(120) => fn(137), ns(119) => fn(136), ns(118) => fn(135), ns(117) => fn(134), ns(116) => fn(133), ns(115) => fn(132), ns(114) => fn(131), ns(113) => fn(130), ns(112) => fn(129), ns(111) => fn(128), ns(110) => fn(127), ns(109) => fn(126), ns(108) => fn(125), ns(107) => fn(124), ns(106) => fn(123), ns(105) => fn(122), ns(104) => fn(121), ns(103) => fn(120), ns(102) => fn(119), ns(101) => fn(118), ns(100) => fn(117), ns(99) => fn(116), ns(98) => fn(115), ns(97) => fn(114), ns(96) => fn(113), ns(95) => fn(112), ns(94) => fn(111), ns(93) => fn(110), ns(92) => fn(109), ns(91) => fn(108), ns(90) => fn(107), ns(89) => fn(106), ns(88) => fn(105), ns(87) => fn(104), ns(86) => fn(103), ns(85) => fn(102), ns(84) => fn(101), ns(83) => fn(100), ns(82) => fn(99), ns(81) => fn(98), ns(80) => fn(97), ns(79) => fn(96), ns(78) => fn(95), ns(77) => fn(94), ns(76) => fn(93), ns(75) => fn(92), ns(74) => fn(91), ns(73) => fn(90), ns(72) => fn(89), ns(71) => fn(88), ns(70) => fn(87), ns(69) => fn(86), ns(68) => fn(85), ns(67) => fn(84), ns(66) => fn(83), ns(65) => fn(82), ns(64) => fn(81), ns(63) => fn(80), ns(62) => fn(79), ns(61) => fn(78), ns(60) => fn(77), ns(59) => fn(76), ns(58) => fn(75), ns(57) => fn(74), ns(56) => fn(73), ns(55) => fn(72), ns(54) => fn(71), ns(53) => fn(70), ns(52) => fn(69), ns(51) => fn(68), ns(50) => fn(67), ns(49) => fn(66), ns(48) => fn(65), ns(47) => fn(64), ns(46) => fn(63), ns(45) => fn(62), ns(44) => fn(61), ns(43) => fn(60), ns(42) => fn(59), ns(41) => fn(58), ns(40) => fn(57), ns(39) => fn(56), ns(38) => fn(55), ns(37) => fn(54), ns(36) => fn(53), ns(35) => fn(52), ns(34) => fn(51), ns(33) => fn(50), ns(32) => fn(49), ns(31) => fn(48), ns(30) => fn(47), ns(29) => fn(46), ns(28) => fn(45), ns(27) => fn(44), ns(26) => fn(43), ns(25) => fn(42), ns(24) => fn(41), ns(23) => fn(40), ns(22) => fn(39), ns(21) => fn(38), ns(20) => fn(37), ns(19) => fn(36), ns(18) => fn(35), ns(17) => fn(34), ns(16) => fn(33), ns(15) => fn(32), ns(14) => so15_local, ns(13) => so14_local, ns(12) => so13_local, ns(11) => so12_local, ns(10) => so11_local, ns(9) => so10_local, ns(8) => so9_local, ns(7) => so8_local, ns(6) => so7_local, ns(5) => so6_local, ns(4) => so5_local, ns(3) => so4_local, ns(2) => so3_local, ns(1) => so2_local, ns(0) => so1_local, fs(341) => si(15), fs(340) => si(14), fs(339) => si(13), fs(338) => si(12), fs(337) => si(11), fs(336) => si(10), fs(335) => si(9), fs(334) => si(8), fs(333) => si(7), fs(332) => si(6), fs(331) => si(5), fs(330) => si(4), fs(329) => si(3), fs(328) => si(2), fs(327) => si(1), fs(326) => si(0), fs(325) => nno_local, fs(324) => no14_local, fs(323) => no13_local, fs(322) => no12_local, fs(321) => no11_local, fs(320) => no10_local, fs(319) => no9_local, fs(318) => no8_local, fs(317) => no7_local, fs(316) => no6_local, fs(315) => no5_local, fs(314) => no4_local, fs(313) => no3_local, fs(312) => no2_local, fs(311) => no1_local, fs(310) => no0_local, fs(309) => fn(341), fs(308) => fn(340), fs(307) => fn(339), fs(306) => fn(338), fs(305) => fn(337), fs(304) => fn(336), fs(303) => fn(335), fs(302) => fn(334), fs(301) => fn(333), fs(300) => fn(332), fs(299) => fn(331), fs(298) => fn(330), fs(297) => fn(329), fs(296) => fn(328), fs(295) => fn(327), fs(294) => fn(326), fs(293) => fn(325), fs(292) => fn(324), fs(291) => fn(323), fs(290) => fn(322), fs(289) => fn(321), fs(288) => fn(320), fs(287) => fn(319), fs(286) => fn(318), fs(285) => fn(317), fs(284) => fn(316), fs(283) => fn(315), fs(282) => fn(314), fs(281) => fn(313), fs(280) => fn(312), fs(279) => fn(311), fs(278) => fn(310), fs(277) => fn(309), fs(276) => fn(308), fs(275) => fn(307), fs(274) => fn(306), fs(273) => fn(305), fs(272) => fn(304), fs(271) => fn(303), fs(270) => fn(302), fs(269) => fn(301), fs(268) => fn(300), fs(267) => fn(299), fs(266) => fn(298), fs(265) => fn(297), fs(264) => fn(296), fs(263) => fn(295), fs(262) => fn(294), fs(261) => fn(293), fs(260) => fn(292), fs(259) => fn(291), fs(258) => fn(290), fs(257) => fn(289), fs(256) => fn(288), fs(255) => fn(287), fs(254) => fn(286), fs(253) => fn(285), fs(252) => fn(284), fs(251) => fn(283), fs(250) => fn(282), fs(249) => fn(281), fs(248) => fn(280), fs(247) => fn(279), fs(246) => fn(278), fs(245) => fn(277), fs(244) => fn(276), fs(243) => fn(275), fs(242) => fn(274), fs(241) => fn(273), fs(240) => fn(272), fs(239) => fn(271), fs(238) => fn(270), fs(237) => fn(269), fs(236) => fn(268), fs(235) => fn(267), fs(234) => fn(266), fs(233) => fn(265), fs(232) => fn(264), fs(231) => fn(263), fs(230) => fn(262), fs(229) => fn(261), fs(228) => fn(260), fs(227) => fn(259), fs(226) => fn(258), fs(225) => fn(257), fs(224) => fn(256), fs(223) => fn(255), fs(222) => fn(254), fs(221) => fn(253), fs(220) => fn(252), fs(219) => fn(251), fs(218) => fn(250), fs(217) => fn(249), fs(216) => fn(248), fs(215) => fn(247), fs(214) => fn(246), fs(213) => fn(245), fs(212) => fn(244), fs(211) => fn(243), fs(210) => fn(242), fs(209) => fn(241), fs(208) => fn(240), fs(207) => fn(239), fs(206) => fn(238), fs(205) => fn(237), fs(204) => fn(236), fs(203) => fn(235), fs(202) => fn(234), fs(201) => fn(233), fs(200) => fn(232), fs(199) => fn(231), fs(198) => fn(230), fs(197) => fn(229), fs(196) => fn(228), fs(195) => fn(227), fs(194) => fn(226), fs(193) => fn(225), fs(192) => fn(224), fs(191) => fn(223), fs(190) => fn(222), fs(189) => fn(221), fs(188) => fn(220), fs(187) => fn(219), fs(186) => fn(218), fs(185) => fn(217), fs(184) => fn(216), fs(183) => fn(215), fs(182) => fn(214), fs(181) => fn(213), fs(180) => fn(212), fs(179) => fn(211), fs(178) => fn(210), fs(177) => fn(209), fs(176) => fn(208), fs(175) => fn(207), fs(174) => fn(206), fs(173) => fn(205), fs(172) => fn(204), fs(171) => fn(203), fs(170) => fn(202), fs(169) => fn(201), fs(168) => fn(200), fs(167) => fn(199), fs(166) => fn(198), fs(165) => fn(197), fs(164) => fn(196), fs(163) => fn(195), fs(162) => fn(194), fs(161) => fn(193), fs(160) => fn(192), fs(159) => fn(191), fs(158) => fn(190), fs(157) => fn(189), fs(156) => fn(188), fs(155) => fn(187), fs(154) => fn(186), fs(153) => fn(185), fs(152) => fn(184), fs(151) => fn(183), fs(150) => fn(182), fs(149) => fn(181), fs(148) => fn(180), fs(147) => fn(179), fs(146) => fn(178), fs(145) => fn(177), fs(144) => fn(176), fs(143) => fn(175), fs(142) => fn(174), fs(141) => fn(173), fs(140) => fn(172), fs(139) => fn(171), fs(138) => fn(170), fs(137) => fn(169), fs(136) => fn(168), fs(135) => fn(167), fs(134) => fn(166), fs(133) => fn(165), fs(132) => fn(164), fs(131) => fn(163), fs(130) => fn(162), fs(129) => fn(161), fs(128) => fn(160), fs(127) => fn(159), fs(126) => fn(158), fs(125) => fn(157), fs(124) => fn(156), fs(123) => fn(155), fs(122) => fn(154), fs(121) => fn(153), fs(120) => fn(152), fs(119) => fn(151), fs(118) => fn(150), fs(117) => fn(149), fs(116) => fn(148), fs(115) => fn(147), fs(114) => fn(146), fs(113) => fn(145), fs(112) => fn(144), fs(111) => fn(143), fs(110) => fn(142), fs(109) => fn(141), fs(108) => fn(140), fs(107) => fn(139), fs(106) => fn(138), fs(105) => fn(137), fs(104) => fn(136), fs(103) => fn(135), fs(102) => fn(134), fs(101) => fn(133), fs(100) => fn(132), fs(99) => fn(131), fs(98) => fn(130), fs(97) => fn(129), fs(96) => fn(128), fs(95) => fn(127), fs(94) => fn(126), fs(93) => fn(125), fs(92) => fn(124), fs(91) => fn(123), fs(90) => fn(122), fs(89) => fn(121), fs(88) => fn(120), fs(87) => fn(119), fs(86) => fn(118), fs(85) => fn(117), fs(84) => fn(116), fs(83) => fn(115), fs(82) => fn(114), fs(81) => fn(113), fs(80) => fn(112), fs(79) => fn(111), fs(78) => fn(110), fs(77) => fn(109), fs(76) => fn(108), fs(75) => fn(107), fs(74) => fn(106), fs(73) => fn(105), fs(72) => fn(104), fs(71) => fn(103), fs(70) => fn(102), fs(69) => fn(101), fs(68) => fn(100), fs(67) => fn(99), fs(66) => fn(98), fs(65) => fn(97), fs(64) => fn(96), fs(63) => fn(95), fs(62) => fn(94), fs(61) => fn(93), fs(60) => fn(92), fs(59) => fn(91), fs(58) => fn(90), fs(57) => fn(89), fs(56) => fn(88), fs(55) => fn(87), fs(54) => fn(86), fs(53) => fn(85), fs(52) => fn(84), fs(51) => fn(83), fs(50) => fn(82), fs(49) => fn(81), fs(48) => fn(80), fs(47) => fn(79), fs(46) => fn(78), fs(45) => fn(77), fs(44) => fn(76), fs(43) => fn(75), fs(42) => fn(74), fs(41) => fn(73), fs(40) => fn(72), fs(39) => fn(71), fs(38) => fn(70), fs(37) => fn(69), fs(36) => fn(68), fs(35) => fn(67), fs(34) => fn(66), fs(33) => fn(65), fs(32) => fn(64), fs(31) => fn(63), fs(30) => fn(62), fs(29) => fn(61), fs(28) => fn(60), fs(27) => fn(59), fs(26) => fn(58), fs(25) => fn(57), fs(24) => fn(56), fs(23) => fn(55), fs(22) => fn(54), fs(21) => fn(53), fs(20) => fn(52), fs(19) => fn(51), fs(18) => fn(50), fs(17) => fn(49), fs(16) => fn(48), fs(15) => fn(47), fs(14) => fn(46), fs(13) => fn(45), fs(12) => fn(44), fs(11) => fn(43), fs(10) => fn(42), fs(9) => fn(41), fs(8) => fn(40), fs(7) => fn(39), fs(6) => fn(38), fs(5) => fn(37), fs(4) => fn(36), fs(3) => fn(35), fs(2) => fn(34), fs(1) => fn(33), fs(0) => fn(32), rspen(341) => U446_rspen(341), rspen(340) => U446_rspen(340), rspen(339) => U446_rspen(339), rspen(338) => U446_rspen(338), rspen(337) => U446_rspen(337), rspen(336) => U446_rspen(336), rspen(335) => U446_rspen(335), rspen(334) => U446_rspen(334), rspen(333) => U446_rspen(333), rspen(332) => U446_rspen(332), rspen(331) => U446_rspen(331), rspen(330) => U446_rspen(330), rspen(329) => U446_rspen(329), rspen(328) => U446_rspen(328), rspen(327) => U446_rspen(327), rspen(326) => U446_rspen(326), rspen(325) => U446_rspen(325), rspen(324) => U446_rspen(324), rspen(323) => U446_rspen(323), rspen(322) => U446_rspen(322), rspen(321) => U446_rspen(321), rspen(320) => U446_rspen(320), rspen(319) => U446_rspen(319), rspen(318) => U446_rspen(318), rspen(317) => U446_rspen(317), rspen(316) => U446_rspen(316), rspen(315) => U446_rspen(315), rspen(314) => U446_rspen(314), rspen(313) => U446_rspen(313), rspen(312) => U446_rspen(312), rspen(311) => U446_rspen(311), rspen(310) => U446_rspen(310), rspen(309) => U446_rspen(309), rspen(308) => U446_rspen(308), rspen(307) => U446_rspen(307), rspen(306) => U446_rspen(306), rspen(305) => U446_rspen(305), rspen(304) => U446_rspen(304), rspen(303) => U446_rspen(303), rspen(302) => U446_rspen(302), rspen(301) => U446_rspen(301), rspen(300) => U446_rspen(300), rspen(299) => U446_rspen(299), rspen(298) => U446_rspen(298), rspen(297) => U446_rspen(297), rspen(296) => U446_rspen(296), rspen(295) => U446_rspen(295), rspen(294) => U446_rspen(294), rspen(293) => U446_rspen(293), rspen(292) => U446_rspen(292), rspen(291) => U446_rspen(291), rspen(290) => U446_rspen(290), rspen(289) => U446_rspen(289), rspen(288) => U446_rspen(288), rspen(287) => U446_rspen(287), rspen(286) => U446_rspen(286), rspen(285) => U446_rspen(285), rspen(284) => U446_rspen(284), rspen(283) => U446_rspen(283), rspen(282) => U446_rspen(282), rspen(281) => U446_rspen(281), rspen(280) => U446_rspen(280), rspen(279) => U446_rspen(279), rspen(278) => U446_rspen(278), rspen(277) => U446_rspen(277), rspen(276) => U446_rspen(276), rspen(275) => U446_rspen(275), rspen(274) => U446_rspen(274), rspen(273) => U446_rspen(273), rspen(272) => U446_rspen(272), rspen(271) => U446_rspen(271), rspen(270) => U446_rspen(270), rspen(269) => U446_rspen(269), rspen(268) => U446_rspen(268), rspen(267) => U446_rspen(267), rspen(266) => U446_rspen(266), rspen(265) => U446_rspen(265), rspen(264) => U446_rspen(264), rspen(263) => U446_rspen(263), rspen(262) => U446_rspen(262), rspen(261) => U446_rspen(261), rspen(260) => U446_rspen(260), rspen(259) => U446_rspen(259), rspen(258) => U446_rspen(258), rspen(257) => U446_rspen(257), rspen(256) => U446_rspen(256), rspen(255) => U446_rspen(255), rspen(254) => U446_rspen(254), rspen(253) => U446_rspen(253), rspen(252) => U446_rspen(252), rspen(251) => U446_rspen(251), rspen(250) => U446_rspen(250), rspen(249) => U446_rspen(249), rspen(248) => U446_rspen(248), rspen(247) => U446_rspen(247), rspen(246) => U446_rspen(246), rspen(245) => U446_rspen(245), rspen(244) => U446_rspen(244), rspen(243) => U446_rspen(243), rspen(242) => U446_rspen(242), rspen(241) => U446_rspen(241), rspen(240) => U446_rspen(240), rspen(239) => U446_rspen(239), rspen(238) => U446_rspen(238), rspen(237) => U446_rspen(237), rspen(236) => U446_rspen(236), rspen(235) => U446_rspen(235), rspen(234) => U446_rspen(234), rspen(233) => U446_rspen(233), rspen(232) => U446_rspen(232), rspen(231) => U446_rspen(231), rspen(230) => U446_rspen(230), rspen(229) => U446_rspen(229), rspen(228) => U446_rspen(228), rspen(227) => U446_rspen(227), rspen(226) => U446_rspen(226), rspen(225) => U446_rspen(225), rspen(224) => U446_rspen(224), rspen(223) => U446_rspen(223), rspen(222) => U446_rspen(222), rspen(221) => U446_rspen(221), rspen(220) => U446_rspen(220), rspen(219) => U446_rspen(219), rspen(218) => U446_rspen(218), rspen(217) => U446_rspen(217), rspen(216) => U446_rspen(216), rspen(215) => U446_rspen(215), rspen(214) => U446_rspen(214), rspen(213) => U446_rspen(213), rspen(212) => U446_rspen(212), rspen(211) => U446_rspen(211), rspen(210) => U446_rspen(210), rspen(209) => U446_rspen(209), rspen(208) => U446_rspen(208), rspen(207) => U446_rspen(207), rspen(206) => U446_rspen(206), rspen(205) => U446_rspen(205), rspen(204) => U446_rspen(204), rspen(203) => U446_rspen(203), rspen(202) => U446_rspen(202), rspen(201) => U446_rspen(201), rspen(200) => U446_rspen(200), rspen(199) => U446_rspen(199), rspen(198) => U446_rspen(198), rspen(197) => U446_rspen(197), rspen(196) => U446_rspen(196), rspen(195) => U446_rspen(195), rspen(194) => U446_rspen(194), rspen(193) => U446_rspen(193), rspen(192) => U446_rspen(192), rspen(191) => U446_rspen(191), rspen(190) => U446_rspen(190), rspen(189) => U446_rspen(189), rspen(188) => U446_rspen(188), rspen(187) => U446_rspen(187), rspen(186) => U446_rspen(186), rspen(185) => U446_rspen(185), rspen(184) => U446_rspen(184), rspen(183) => U446_rspen(183), rspen(182) => U446_rspen(182), rspen(181) => U446_rspen(181), rspen(180) => U446_rspen(180), rspen(179) => U446_rspen(179), rspen(178) => U446_rspen(178), rspen(177) => U446_rspen(177), rspen(176) => U446_rspen(176), rspen(175) => U446_rspen(175), rspen(174) => U446_rspen(174), rspen(173) => U446_rspen(173), rspen(172) => U446_rspen(172), rspen(171) => U446_rspen(171), rspen(170) => U446_rspen(170), rspen(169) => U446_rspen(169), rspen(168) => U446_rspen(168), rspen(167) => U446_rspen(167), rspen(166) => U446_rspen(166), rspen(165) => U446_rspen(165), rspen(164) => U446_rspen(164), rspen(163) => U446_rspen(163), rspen(162) => U446_rspen(162), rspen(161) => U446_rspen(161), rspen(160) => U446_rspen(160), rspen(159) => U446_rspen(159), rspen(158) => U446_rspen(158), rspen(157) => U446_rspen(157), rspen(156) => U446_rspen(156), rspen(155) => U446_rspen(155), rspen(154) => U446_rspen(154), rspen(153) => U446_rspen(153), rspen(152) => U446_rspen(152), rspen(151) => U446_rspen(151), rspen(150) => U446_rspen(150), rspen(149) => U446_rspen(149), rspen(148) => U446_rspen(148), rspen(147) => U446_rspen(147), rspen(146) => U446_rspen(146), rspen(145) => U446_rspen(145), rspen(144) => U446_rspen(144), rspen(143) => U446_rspen(143), rspen(142) => U446_rspen(142), rspen(141) => U446_rspen(141), rspen(140) => U446_rspen(140), rspen(139) => U446_rspen(139), rspen(138) => U446_rspen(138), rspen(137) => U446_rspen(137), rspen(136) => U446_rspen(136), rspen(135) => U446_rspen(135), rspen(134) => U446_rspen(134), rspen(133) => U446_rspen(133), rspen(132) => U446_rspen(132), rspen(131) => U446_rspen(131), rspen(130) => U446_rspen(130), rspen(129) => U446_rspen(129), rspen(128) => U446_rspen(128), rspen(127) => U446_rspen(127), rspen(126) => U446_rspen(126), rspen(125) => U446_rspen(125), rspen(124) => U446_rspen(124), rspen(123) => U446_rspen(123), rspen(122) => U446_rspen(122), rspen(121) => U446_rspen(121), rspen(120) => U446_rspen(120), rspen(119) => U446_rspen(119), rspen(118) => U446_rspen(118), rspen(117) =>
U446_rspen(117), rspen(116) => U446_rspen(116),
rspen(115) => U446_rspen(115), rspen(114) =>
U446_rspen(114), rspen(113) => U446_rspen(113),
rspen(112) => U446_rspen(112), rspen(111) =>
U446_rspen(111), rspen(110) => U446_rspen(110),
rspen(109) => U446_rspen(109), rspen(108) =>
U446_rspen(108), rspen(107) => U446_rspen(107),
rspen(106) => U446_rspen(106), rspen(105) =>
U446_rspen(105), rspen(104) => U446_rspen(104),
rspen(103) => U446_rspen(103), rspen(102) =>
U446_rspen(102), rspen(101) => U446_rspen(101),
rspen(100) => U446_rspen(100), rspen(99) =>
U446_rspen(99), rspen(98) => U446_rspen(98),
rspen(97) => U446_rspen(97), rspen(96) =>
U446_rspen(96), rspen(95) => U446_rspen(95),
rspen(94) => U446_rspen(94), rspen(93) =>
U446_rspen(93), rspen(92) => U446_rspen(92),
rspen(91) => U446_rspen(91), rspen(90) =>
U446_rspen(90), rspen(89) => U446_rspen(89),
rspen(88) => U446_rspen(88), rspen(87) =>
U446_rspen(87), rspen(86) => U446_rspen(86),
rspen(85) => U446_rspen(85), rspen(84) =>
U446_rspen(84), rspen(83) => U446_rspen(83),
rspen(82) => U446_rspen(82), rspen(81) =>
U446_rspen(81), rspen(80) => U446_rspen(80),
rspen(79) => U446_rspen(79), rspen(78) =>
U446_rspen(78), rspen(77) => U446_rspen(77),
rspen(76) => U446_rspen(76), rspen(75) =>
U446_rspen(75), rspen(74) => U446_rspen(74),
rspen(73) => U446_rspen(73), rspen(72) =>
U446_rspen(72), rspen(71) => U446_rspen(71),
rspen(70) => U446_rspen(70), rspen(69) =>
U446_rspen(69), rspen(68) => U446_rspen(68),
rspen(67) => U446_rspen(67), rspen(66) =>
U446_rspen(66), rspen(65) => U446_rspen(65),
rspen(64) => U446_rspen(64), rspen(63) =>
U446_rspen(63), rspen(62) => U446_rspen(62),
rspen(61) => U446_rspen(61), rspen(60) =>
U446_rspen(60), rspen(59) => U446_rspen(59),
rspen(58) => U446_rspen(58), rspen(57) =>
U446_rspen(57), rspen(56) => U446_rspen(56),
rspen(55) => U446_rspen(55), rspen(54) =>
U446_rspen(54), rspen(53) => U446_rspen(53),
rspen(52) => U446_rspen(52), rspen(51) =>
U446_rspen(51), rspen(50) => U446_rspen(50),
rspen(49) => U446_rspen(49), rspen(48) =>
U446_rspen(48), rspen(47) => U446_rspen(47),
rspen(46) => U446_rspen(46), rspen(45) =>
U446_rspen(45), rspen(44) => U446_rspen(44),
rspen(43) => U446_rspen(43), rspen(42) =>
U446_rspen(42), rspen(41) => U446_rspen(41),
rspen(40) => U446_rspen(40), rspen(39) =>
U446_rspen(39), rspen(38) => U446_rspen(38),
rspen(37) => U446_rspen(37), rspen(36) =>
U446_rspen(36), rspen(35) => U446_rspen(35),
rspen(34) => U446_rspen(34), rspen(33) =>
U446_rspen(33), rspen(32) => U446_rspen(32), rspen(31) => U446_rspen(31), rspen(30) => U446_rspen(30), rspen(29) => U446_rspen(29), rspen(28) => U446_rspen(28), rspen(27) => U446_rspen(27), rspen(26) => U446_rspen(26), rspen(25) => U446_rspen(25), rspen(24) => U446_rspen(24), rspen(23) => U446_rspen(23), rspen(22) => U446_rspen(22), rspen(21) => U446_rspen(21), rspen(20) => U446_rspen(20), rspen(19) => U446_rspen(19), rspen(18) => U446_rspen(18), rspen(17) => U446_rspen(17), rspen(16) => U446_rspen(16), rspen(15) => U446_rspen(15), rspen(14) => U446_rspen(14), rspen(13) => U446_rspen(13), rspen(12) => U446_rspen(12), rspen(11) => U446_rspen(11), rspen(10) => U446_rspen(10), rspen(9) => U446_rspen(9), rspen(8) => U446_rspen(8), rspen(7) => U446_rspen(7), rspen(6) => U446_rspen(6), rspen(5) => U446_rspen(5), rspen(4) => U446_rspen(4), rspen(3) => U446_rspen(3), rspen(2) => U446_rspen(2), rspen(1) => U446_rspen(1), rspen(0) => U446_rspen(0), wl(341) => U446_wl(341), wl(340) => U446_wl(340), wl(339) => U446_wl(339), wl(338) => U446_wl(338), wl(337) => U446_wl(337), wl(336) => U446_wl(336), wl(335) => U446_wl(335), wl(334) => U446_wl(334), wl(333) => U446_wl(333), wl(332) => U446_wl(332), wl(331) => U446_wl(331), wl(330) => U446_wl(330), wl(329) => U446_wl(329), wl(328) => U446_wl(328), wl(327) => U446_wl(327), wl(326) => U446_wl(326), wl(325) => U446_wl(325), wl(324) => U446_wl(324), wl(323) => U446_wl(323), wl(322) => U446_wl(322), wl(321) => U446_wl(321), wl(320) => U446_wl(320), wl(319) => U446_wl(319), wl(318) => U446_wl(318), wl(317) => U446_wl(317), wl(316) => U446_wl(316), wl(315) => U446_wl(315), wl(314) => U446_wl(314), wl(313) => U446_wl(313), wl(312) => U446_wl(312), wl(311) => U446_wl(311), wl(310) => U446_wl(310), wl(309) => U446_wl(309), wl(308) => U446_wl(308), wl(307) => U446_wl(307), wl(306) => U446_wl(306), wl(305) => U446_wl(305), wl(304) => U446_wl(304), wl(303) => U446_wl(303), wl(302) => U446_wl(302), wl(301) => U446_wl(301), wl(300) => U446_wl(300), wl(299) => U446_wl(299), wl(298) => U446_wl(298), wl(297) => U446_wl(297), wl(296) => U446_wl(296), wl(295) => U446_wl(295), wl(294) => U446_wl(294), wl(293) => U446_wl(293), wl(292) => U446_wl(292), wl(291) => U446_wl(291), wl(290) => U446_wl(290), wl(289) => U446_wl(289), wl(288) => U446_wl(288), wl(287) => U446_wl(287), wl(286) => U446_wl(286), wl(285) => U446_wl(285), wl(284) => U446_wl(284), wl(283) => U446_wl(283), wl(282) => U446_wl(282), wl(281) => U446_wl(281), wl(280) => U446_wl(280), wl(279) => U446_wl(279), wl(278) => U446_wl(278), wl(277) => U446_wl(277), wl(276) => U446_wl(276), wl(275) => U446_wl(275), wl(274) => U446_wl(274), wl(273) => U446_wl(273), wl(272) => U446_wl(272), wl(271) => U446_wl(271), wl(270) => U446_wl(270), wl(269) => U446_wl(269), wl(268) => U446_wl(268), wl(267) => U446_wl(267), wl(266) => U446_wl(266), wl(265) => U446_wl(265),
wl(264) => U446_wl(264), wl(263) => U446_wl(263),
wl(262) => U446_wl(262), wl(261) => U446_wl(261),
wl(260) => U446_wl(260), wl(259) => U446_wl(259),
wl(258) => U446_wl(258), wl(257) => U446_wl(257),
wl(256) => U446_wl(256), wl(255) => U446_wl(255),
wl(254) => U446_wl(254), wl(253) => U446_wl(253),
wl(252) => U446_wl(252), wl(251) => U446_wl(251),
wl(250) => U446_wl(250), wl(249) => U446_wl(249),
wl(248) => U446_wl(248), wl(247) => U446_wl(247),
wl(246) => U446_wl(246), wl(245) => U446_wl(245),
wl(244) => U446_wl(244), wl(243) => U446_wl(243),
wl(242) => U446_wl(242), wl(241) => U446_wl(241),
wl(240) => U446_wl(240), wl(239) => U446_wl(239),
wl(238) => U446_wl(238), wl(237) => U446_wl(237),
wl(236) => U446_wl(236), wl(235) => U446_wl(235),
wl(234) => U446_wl(234), wl(233) => U446_wl(233),
wl(232) => U446_wl(232), wl(231) => U446_wl(231),
wl(230) => U446_wl(230), wl(229) => U446_wl(229),
wl(228) => U446_wl(228), wl(227) => U446_wl(227),
wl(226) => U446_wl(226), wl(225) => U446_wl(225),
wl(224) => U446_wl(224), wl(223) => U446_wl(223),
wl(222) => U446_wl(222), wl(221) => U446_wl(221),
wl(220) => U446_wl(220), wl(219) => U446_wl(219),
wl(218) => U446_wl(218), wl(217) => U446_wl(217),
wl(216) => U446_wl(216), wl(215) => U446_wl(215),
wl(214) => U446_wl(214), wl(213) => U446_wl(213),
wl(212) => U446_wl(212), wl(211) => U446_wl(211),
wl(210) => U446_wl(210), wl(209) => U446_wl(209),
wl(208) => U446_wl(208), wl(207) => U446_wl(207),
wl(206) => U446_wl(206), wl(205) => U446_wl(205),
wl(204) => U446_wl(204), wl(203) => U446_wl(203),
wl(202) => U446_wl(202), wl(201) => U446_wl(201),
wl(200) => U446_wl(200), wl(199) => U446_wl(199),
wl(198) => U446_wl(198), wl(197) => U446_wl(197),
wl(196) => U446_wl(196), wl(195) => U446_wl(195),
wl(194) => U446_wl(194), wl(193) => U446_wl(193),
wl(192) => U446_wl(192), wl(191) => U446_wl(191),
wl(190) => U446_wl(190), wl(189) => U446_wl(189),
wl(188) => U446_wl(188), wl(187) => U446_wl(187),
wl(186) => U446_wl(186), wl(185) => U446_wl(185),
wl(184) => U446_wl(184), wl(183) => U446_wl(183),
wl(182) => U446_wl(182), wl(181) => U446_wl(181),
wl(180) => U446_wl(180), wl(179) => U446_wl(179),
wl(178) => U446_wl(178), wl(177) => U446_wl(177),
wl(176) => U446_wl(176), wl(175) => U446_wl(175),
wl(174) => U446_wl(174), wl(173) => U446_wl(173),
wl(172) => U446_wl(172), wl(171) => U446_wl(171),
wl(170) => U446_wl(170), wl(169) => U446_wl(169),
wl(168) => U446_wl(168), wl(167) => U446_wl(167),
wl(166) => U446_wl(166), wl(165) => U446_wl(165),
wl(164) => U446_wl(164), wl(163) => U446_wl(163),
wl(162) => U446_wl(162), wl(161) => U446_wl(161),
wl(160) => U446_wl(160), wl(159) => U446_wl(159),
wl(158) => U446_wl(158), wl(157) => U446_wl(157),
wl(156) => U446_wl(156), wl(155) => U446_wl(155),
wl(154) => U446_wl(154), wl(153) => U446_wl(153),
wl(152) => U446_wl(152), wl(151) => U446_wl(151), wl(150) => U446_wl(150), wl(149) => U446_wl(149),
wl(148) => U446_wl(148), wl(147) => U446_wl(147),
wl(146) => U446_wl(146), wl(145) => U446_wl(145),
wl(144) => U446_wl(144), wl(143) => U446_wl(143),
wl(142) => U446_wl(142), wl(141) => U446_wl(141),
wl(140) => U446_wl(140), wl(139) => U446_wl(139),
wl(138) => U446_wl(138), wl(137) => U446_wl(137),
wl(136) => U446_wl(136), wl(135) => U446_wl(135),
wl(134) => U446_wl(134), wl(133) => U446_wl(133),
wl(132) => U446_wl(132), wl(131) => U446_wl(131),
wl(130) => U446_wl(130), wl(129) => U446_wl(129),
wl(128) => U446_wl(128), wl(127) => U446_wl(127),
wl(126) => U446_wl(126), wl(125) => U446_wl(125),
wl(124) => U446_wl(124), wl(123) => U446_wl(123),
wl(122) => U446_wl(122), wl(121) => U446_wl(121),
wl(120) => U446_wl(120), wl(119) => U446_wl(119),
wl(118) => U446_wl(118), wl(117) => U446_wl(117),
wl(116) => U446_wl(116), wl(115) => U446_wl(115),
wl(114) => U446_wl(114), wl(113) => U446_wl(113),
wl(112) => U446_wl(112), wl(111) => U446_wl(111),
wl(110) => U446_wl(110), wl(109) => U446_wl(109),
wl(108) => U446_wl(108), wl(107) => U446_wl(107),
wl(106) => U446_wl(106), wl(105) => U446_wl(105),
wl(104) => U446_wl(104), wl(103) => U446_wl(103),
wl(102) => U446_wl(102), wl(101) => U446_wl(101),
wl(100) => U446_wl(100), wl(99) => U446_wl(99),
wl(98) => U446_wl(98), wl(97) => U446_wl(97),
wl(96) => U446_wl(96), wl(95) => U446_wl(95),
wl(94) => U446_wl(94), wl(93) => U446_wl(93),
wl(92) => U446_wl(92), wl(91) => U446_wl(91),
wl(90) => U446_wl(90), wl(89) => U446_wl(89),
wl(88) => U446_wl(88), wl(87) => U446_wl(87),
wl(86) => U446_wl(86), wl(85) => U446_wl(85),
wl(84) => U446_wl(84), wl(83) => U446_wl(83),
wl(82) => U446_wl(82), wl(81) => U446_wl(81),
wl(80) => U446_wl(80), wl(79) => U446_wl(79),
wl(78) => U446_wl(78), wl(77) => U446_wl(77),
wl(76) => U446_wl(76), wl(75) => U446_wl(75),
wl(74) => U446_wl(74), wl(73) => U446_wl(73),
wl(72) => U446_wl(72), wl(71) => U446_wl(71),
wl(70) => U446_wl(70), wl(69) => U446_wl(69),
wl(68) => U446_wl(68), wl(67) => U446_wl(67),
wl(66) => U446_wl(66), wl(65) => U446_wl(65),
wl(64) => U446_wl(64), wl(63) => U446_wl(63),
wl(62) => U446_wl(62), wl(61) => U446_wl(61),
wl(60) => U446_wl(60), wl(59) => U446_wl(59),
wl(58) => U446_wl(58), wl(57) => U446_wl(57),
wl(56) => U446_wl(56), wl(55) => U446_wl(55),
wl(54) => U446_wl(54), wl(53) => U446_wl(53),
wl(52) => U446_wl(52), wl(51) => U446_wl(51),
wl(50) => U446_wl(50), wl(49) => U446_wl(49),
wl(48) => U446_wl(48), wl(47) => U446_wl(47),
wl(46) => U446_wl(46), wl(45) => U446_wl(45),
wl(44) => U446_wl(44), wl(43) => U446_wl(43),
wl(42) => U446_wl(42), wl(41) => U446_wl(41),
wl(40) => U446_wl(40), wl(39) => U446_wl(39),
wl(38) => U446_wl(38), wl(37) => U446_wl(37),
wl(36) => U446_wl(36), wl(35) => U446_wl(35),

```
wl(34) => U446_wl(34), wl(33) => U446_wl(33),
wl(32) => U446_wl(32), wl(31) => U446_wl(31),
wl(30) => U446_wl(30), wl(29) => U446_wl(29),
wl(28) => U446_wl(28), wl(27) => U446_wl(27),
wl(26) => U446_wl(26), wl(25) => U446_wl(25),
wl(24) => U446_wl(24), wl(23) => U446_wl(23),
wl(22) => U446_wl(22), wl(21) => U446_wl(21),
wl(20) => U446_wl(20), wl(19) => U446_wl(19),
wl(18) => U446_wl(18), wl(17) => U446_wl(17),
wl(16) => U446_wl(16), wl(15) => U446_wl(15),
wl(14) => U446_wl(14), wl(13) => U446_wl(13),
wl(12) => U446_wl(12), wl(11) => U446_wl(11),
wl(10) => U446_wl(10), wl(9) => U446_wl(9), wl(8)
=> U446_wl(8), wl(7) => U446_wl(7), wl(6) =>
U446_wl(6), wl(5) => U446_wl(5), wl(4) =>
U446_wl(4), wl(3) => U446_wl(3), wl(2) =>
U446_wl(2), wl(1) => U446_wl(1), wl(0) =>
U446_wl(0), ml(341) => U492_ml(341), ml(340) =>
U492_ml(340), ml(339) => U492_ml(339), ml(338) =>
U492_ml(338), ml(337) => U492_ml(337), ml(336) =>
U492_ml(336), ml(335) => U492_ml(335), ml(334) =>
U492_ml(334), ml(333) => U492_ml(333), ml(332) =>
U492_ml(332), ml(331) => U492_ml(331), ml(330) =>
U492_ml(330), ml(329) => U492_ml(329), ml(328) =>
U492_ml(328), ml(327) => U492_ml(327), ml(326) =>
U492_ml(326), ml(325) => U492_ml(325), ml(324) =>
U492_ml(324), ml(323) => U492_ml(323), ml(322) =>
U492_ml(322), ml(321) => U492_ml(321), ml(320) =>
U492_ml(320), ml(319) => U492_ml(319), ml(318) =>
U492_ml(318), ml(317) => U492_ml(317), ml(316) =>
U492_ml(316), ml(315) => U492_ml(315), ml(314) =>
U492_ml(314), ml(313) => U492_ml(313), ml(312) =>
U492_ml(312), ml(311) => U492_ml(311), ml(310) =>
U492_ml(310), ml(309) => U492_ml(309), ml(308) =>
U492_ml(308), ml(307) => U492_ml(307), ml(306) =>
U492_ml(306), ml(305) => U492_ml(305), ml(304) =>
U492_ml(304), ml(303) => U492_ml(303), ml(302) =>
U492_ml(302), ml(301) => U492_ml(301), ml(300) =>
U492_ml(300), ml(299) => U492_ml(299), ml(298) =>
U492_ml(298), ml(297) => U492_ml(297), ml(296) =>
U492_ml(296), ml(295) => U492_ml(295), ml(294) =>
U492_ml(294), ml(293) => U492_ml(293), ml(292) =>
U492_ml(292), ml(291) => U492_ml(291), ml(290) =>
U492_ml(290), ml(289) => U492_ml(289), ml(288) =>
U492_ml(288), ml(287) => U492_ml(287), ml(286) =>
U492_ml(286), ml(285) => U492_ml(285), ml(284) =>
U492_ml(284), ml(283) => U492_ml(283), ml(282) =>
U492_ml(282), ml(281) => U492_ml(281), ml(280) =>
U492_ml(280), ml(279) => U492_ml(279), ml(278) =>
U492_ml(278), ml(277) => U492_ml(277), ml(276) =>
U492_ml(276), ml(275) => U492_ml(275), ml(274) =>
U492_ml(274), ml(273) => U492_ml(273), ml(272) =>
U492_ml(272), ml(271) => U492_ml(271), ml(270) =>
U492_ml(270), ml(269) => U492_ml(269), ml(268) =>
U492_ml(268), ml(267) => U492_ml(267), ml(266) =>
U492_ml(266), ml(265) => U492_ml(265), ml(264) =>
U492_ml(264), ml(263) => U492_ml(263), ml(262) =>
U492_ml(262), ml(261) => U492_ml(261), ml(260) =>
```

U492_ml(260), ml(259) => U492_ml(259), ml(258) =>
U492_ml(258), ml(257) => U492_ml(257), ml(256) =>
U492_ml(256), ml(255) => U492_ml(255), ml(254) =>
U492_ml(254), ml(253) => U492_ml(253), ml(252) =>
U492_ml(252), ml(251) => U492_ml(251), ml(250) =>
U492_ml(250), ml(249) => U492_ml(249), ml(248) =>
U492_ml(248), ml(247) => U492_ml(247), ml(246) =>
U492_ml(246), ml(245) => U492_ml(245), ml(244) =>
U492_ml(244), ml(243) => U492_ml(243), ml(242) =>
U492_ml(242), ml(241) => U492_ml(241), ml(240) =>
U492_ml(240), ml(239) => U492_ml(239), ml(238) =>
U492_ml(238), ml(237) => U492_ml(237), ml(236) =>
U492_ml(236), ml(235) => U492_ml(235), ml(234) =>
U492_ml(234), ml(233) => U492_ml(233), ml(232) =>
U492_ml(232), ml(231) => U492_ml(231), ml(230) =>
U492_ml(230), ml(229) => U492_ml(229), ml(228) =>
U492_ml(228), ml(227) => U492_ml(227), ml(226) =>
U492_ml(226), ml(225) => U492_ml(225), ml(224) =>
U492_ml(224), ml(223) => U492_ml(223), ml(222) =>
U492_ml(222), ml(221) => U492_ml(221), ml(220) =>
U492_ml(220), ml(219) => U492_ml(219), ml(218) =>
U492_ml(218), ml(217) => U492_ml(217), ml(216) =>
U492_ml(216), ml(215) => U492_ml(215), ml(214) =>
U492_ml(214), ml(213) => U492_ml(213), ml(212) =>
U492_ml(212), ml(211) => U492_ml(211), ml(210) =>
U492_ml(210), ml(209) => U492_ml(209), ml(208) =>
U492_ml(208), ml(207) => U492_ml(207), ml(206) =>
U492_ml(206), ml(205) => U492_ml(205), ml(204) =>
U492_ml(204), ml(203) => U492_ml(203), ml(202) =>
U492_ml(202), ml(201) => U492_ml(201), ml(200) =>
U492_ml(200), ml(199) => U492_ml(199), ml(198) =>
U492_ml(198), ml(197) => U492_ml(197), ml(196) =>
U492_ml(196), ml(195) => U492_ml(195), ml(194) =>
U492_ml(194), ml(193) => U492_ml(193), ml(192) =>
U492_ml(192), ml(191) => U492_ml(191), ml(190) =>
U492_ml(190), ml(189) => U492_ml(189), ml(188) =>
U492_ml(188), ml(187) => U492_ml(187), ml(186) =>
U492_ml(186), ml(185) => U492_ml(185), ml(184) =>
U492_ml(184), ml(183) => U492_ml(183), ml(182) =>
U492_ml(182), ml(181) => U492_ml(181), ml(180) =>
U492_ml(180), ml(179) => U492_ml(179), ml(178) =>
U492_ml(178), ml(177) => U492_ml(177), ml(176) =>
U492_ml(176), ml(175) => U492_ml(175), ml(174) =>
U492_ml(174), ml(173) => U492_ml(173), ml(172) =>
U492_ml(172), ml(171) => U492_ml(171), ml(170) =>
U492_ml(170), ml(169) => U492_ml(169), ml(168) =>
U492_ml(168), ml(167) => U492_ml(167), ml(166) =>
U492_ml(166), ml(165) => U492_ml(165), ml(164) =>
U492_ml(164), ml(163) => U492_ml(163), ml(162) =>
U492_ml(162), ml(161) => U492_ml(161), ml(160) =>
U492_ml(160), ml(159) => U492_ml(159), ml(158) =>
U492_ml(158), ml(157) => U492_ml(157), ml(156) =>
U492_ml(156), ml(155) => U492_ml(155), ml(154) =>
U492_ml(154), ml(153) => U492_ml(153), ml(152) =>
U492_ml(152), ml(151) => U492_ml(151), ml(150) =>
U492_ml(150), ml(149) => U492_ml(149), ml(148) =>
U492_ml(148), ml(147) => U492_ml(147), ml(146) =>
U492_ml(146), ml(145) => U492_ml(145), ml(144) =>

U492_ml(144), ml(143) => U492_ml(143), ml(142) =>
U492_ml(142), ml(141) => U492_ml(141), ml(140) =>
U492_ml(140), ml(139) => U492_ml(139), ml(138) =>
U492_ml(138), ml(137) => U492_ml(137), ml(136) =>
U492_ml(136), ml(135) => U492_ml(135), ml(134) =>
U492_ml(134), ml(133) => U492_ml(133), ml(132) =>
U492_ml(132), ml(131) => U492_ml(131), ml(130) =>
U492_ml(130), ml(129) => U492_ml(129), ml(128) =>
U492_ml(128), ml(127) => U492_ml(127), ml(126) =>
U492_ml(126), ml(125) => U492_ml(125), ml(124) =>
U492_ml(124), ml(123) => U492_ml(123), ml(122) =>
U492_ml(122), ml(121) => U492_ml(121), ml(120) =>
U492_ml(120), ml(119) => U492_ml(119), ml(118) =>
U492_ml(118), ml(117) => U492_ml(117), ml(116) =>
U492_ml(116), ml(115) => U492_ml(115), ml(114) =>
U492_ml(114), ml(113) => U492_ml(113), ml(112) =>
U492_ml(112), ml(111) => U492_ml(111), ml(110) =>
U492_ml(110), ml(109) => U492_ml(109), ml(108) =>
U492_ml(108), ml(107) => U492_ml(107), ml(106) =>
U492_ml(106), ml(105) => U492_ml(105), ml(104) =>
U492_ml(104), ml(103) => U492_ml(103), ml(102) =>
U492_ml(102), ml(101) => U492_ml(101), ml(100) =>
U492_ml(100), ml(99) => U492_ml(99), ml(98) =>
U492_ml(98), ml(97) => U492_ml(97), ml(96) =>
U492_ml(96), ml(95) => U492_ml(95), ml(94) =>
U492_ml(94), ml(93) => U492_ml(93), ml(92) =>
U492_ml(92), ml(91) => U492_ml(91), ml(90) =>
U492_ml(90), ml(89) => U492_ml(89), ml(88) =>
U492_ml(88), ml(87) => U492_ml(87), ml(86) =>
U492_ml(86), ml(85) => U492_ml(85), ml(84) =>
U492_ml(84), ml(83) => U492_ml(83), ml(82) =>
U492_ml(82), ml(81) => U492_ml(81), ml(80) =>
U492_ml(80), ml(79) => U492_ml(79), ml(78) =>
U492_ml(78), ml(77) => U492_ml(77), ml(76) =>
U492_ml(76), ml(75) => U492_ml(75), ml(74) =>
U492_ml(74), ml(73) => U492_ml(73), ml(72) =>
U492_ml(72), ml(71) => U492_ml(71), ml(70) =>
U492_ml(70), ml(69) => U492_ml(69), ml(68) =>
U492_ml(68), ml(67) => U492_ml(67), ml(66) =>
U492_ml(66), ml(65) => U492_ml(65), ml(64) =>
U492_ml(64), ml(63) => U492_ml(63), ml(62) =>
U492_ml(62), ml(61) => U492_ml(61), ml(60) =>
U492_ml(60), ml(59) => U492_ml(59), ml(58) =>
U492_ml(58), ml(57) => U492_ml(57), ml(56) =>
U492_ml(56), ml(55) => U492_ml(55), ml(54) =>
U492_ml(54), ml(53) => U492_ml(53), ml(52) =>
U492_ml(52), ml(51) => U492_ml(51), ml(50) =>
U492_ml(50), ml(49) => U492_ml(49), ml(48) =>
U492_ml(48), ml(47) => U492_ml(47), ml(46) =>
U492_ml(46), ml(45) => U492_ml(45), ml(44) =>
U492_ml(44), ml(43) => U492_ml(43), ml(42) =>
U492_ml(42), ml(41) => U492_ml(41), ml(40) =>
U492_ml(40), ml(39) => U492_ml(39), ml(38) =>
U492_ml(38), ml(37) => U492_ml(37), ml(36) =>
U492_ml(36), ml(35) => U492_ml(35), ml(34) =>
U492_ml(34), ml(33) => U492_ml(33), ml(32) =>
U492_ml(32), ml(31) => U492_ml(31), ml(30) =>
U492_ml(30), ml(29) => U492_ml(29), ml(28) =>

```
            U492_ml(28), ml(27) => U492_ml(27), ml(26) =>
            U492_ml(26), ml(25) => U492_ml(25), ml(24) =>
            U492_ml(24), ml(23) => U492_ml(23), ml(22) =>
            U492_ml(22), ml(21) => U492_ml(21), ml(20) =>
            U492_ml(20), ml(19) => U492_ml(19), ml(18) =>
            U492_ml(18), ml(17) => U492_ml(17), ml(16) =>
            U492_ml(16), ml(15) => U492_ml(15), ml(14) =>
            U492_ml(14), ml(13) => U492_ml(13), ml(12) =>
            U492_ml(12), ml(11) => U492_ml(11), ml(10) =>
            U492_ml(10), ml(9) => U492_ml(9), ml(8) =>
            U492_ml(8), ml(7) => U492_ml(7), ml(6) =>
            U492_ml(6), ml(5) => U492_ml(5), ml(4) =>
            U492_ml(4), ml(3) => U492_ml(3), ml(2) =>
            U492_ml(2), ml(1) => U492_ml(1), ml(0) =>
            U492_ml(0), fircnten => U487_Z );

U487: ni01d5
   port map ( I => fircnten, Z => U487_Z );

U486: ni01d5
   port map ( I => msaen, Z => U486_Z );

U485: ni01d5
   port map ( I => asaen, Z => U485_Z );

U465: ni01d5
   port map ( I => exen, Z => U465_Z );

U492: array342_m
   port map ( wl(341) => U446_wl(341), wl(340) => U446_wl(340),
            wl(339) => U446_wl(339), wl(338) => U446_wl(338),
            wl(337) => U446_wl(337), wl(336) => U446_wl(336),
            wl(335) => U446_wl(335), wl(334) => U446_wl(334),
            wl(333) => U446_wl(333), wl(332) => U446_wl(332),
            wl(331) => U446_wl(331), wl(330) => U446_wl(330),
            wl(329) => U446_wl(329), wl(328) => U446_wl(328),
            wl(327) => U446_wl(327), wl(326) => U446_wl(326),
            wl(325) => U446_wl(325), wl(324) => U446_wl(324),
            wl(323) => U446_wl(323), wl(322) => U446_wl(322),
            wl(321) => U446_wl(321), wl(320) => U446_wl(320),
            wl(319) => U446_wl(319), wl(318) => U446_wl(318),
            wl(317) => U446_wl(317), wl(316) => U446_wl(316),
            wl(315) => U446_wl(315), wl(314) => U446_wl(314),
            wl(313) => U446_wl(313), wl(312) => U446_wl(312),
            wl(311) => U446_wl(311), wl(310) => U446_wl(310),
            wl(309) => U446_wl(309), wl(308) => U446_wl(308),
            wl(307) => U446_wl(307), wl(306) => U446_wl(306),
            wl(305) => U446_wl(305), wl(304) => U446_wl(304),
            wl(303) => U446_wl(303), wl(302) => U446_wl(302),
            wl(301) => U446_wl(301), wl(300) => U446_wl(300),
            wl(299) => U446_wl(299), wl(298) => U446_wl(298),
            wl(297) => U446_wl(297), wl(296) => U446_wl(296),
            wl(295) => U446_wl(295), wl(294) => U446_wl(294),
            wl(293) => U446_wl(293), wl(292) => U446_wl(292),
            wl(291) => U446_wl(291), wl(290) => U446_wl(290),
            wl(289) => U446_wl(289), wl(288) => U446_wl(288),
            wl(287) => U446_wl(287), wl(286) => U446_wl(286),
            wl(285) => U446_wl(285), wl(284) => U446_wl(284),
```

wl(283) => U446_wl(283), wl(282) => U446_wl(282),
wl(281) => U446_wl(281), wl(280) => U446_wl(280),
wl(279) => U446_wl(279), wl(278) => U446_wl(278),
wl(277) => U446_wl(277), wl(276) => U446_wl(276),
wl(275) => U446_wl(275), wl(274) => U446_wl(274),
wl(273) => U446_wl(273), wl(272) => U446_wl(272),
wl(271) => U446_wl(271), wl(270) => U446_wl(270),
wl(269) => U446_wl(269), wl(268) => U446_wl(268),
wl(267) => U446_wl(267), wl(266) => U446_wl(266),
wl(265) => U446_wl(265), wl(264) => U446_wl(264),
wl(263) => U446_wl(263), wl(262) => U446_wl(262),
wl(261) => U446_wl(261), wl(260) => U446_wl(260),
wl(259) => U446_wl(259), wl(258) => U446_wl(258),
wl(257) => U446_wl(257), wl(256) => U446_wl(256),
wl(255) => U446_wl(255), wl(254) => U446_wl(254),
wl(253) => U446_wl(253), wl(252) => U446_wl(252),
wl(251) => U446_wl(251), wl(250) => U446_wl(250),
wl(249) => U446_wl(249), wl(248) => U446_wl(248),
wl(247) => U446_wl(247), wl(246) => U446_wl(246),
wl(245) => U446_wl(245), wl(244) => U446_wl(244),
wl(243) => U446_wl(243), wl(242) => U446_wl(242),
wl(241) => U446_wl(241), wl(240) => U446_wl(240),
wl(239) => U446_wl(239), wl(238) => U446_wl(238),
wl(237) => U446_wl(237), wl(236) => U446_wl(236),
wl(235) => U446_wl(235), wl(234) => U446_wl(234),
wl(233) => U446_wl(233), wl(232) => U446_wl(232),
wl(231) => U446_wl(231), wl(230) => U446_wl(230),
wl(229) => U446_wl(229), wl(228) => U446_wl(228),
wl(227) => U446_wl(227), wl(226) => U446_wl(226),
wl(225) => U446_wl(225), wl(224) => U446_wl(224),
wl(223) => U446_wl(223), wl(222) => U446_wl(222),
wl(221) => U446_wl(221), wl(220) => U446_wl(220),
wl(219) => U446_wl(219), wl(218) => U446_wl(218),
wl(217) => U446_wl(217), wl(216) => U446_wl(216),
wl(215) => U446_wl(215), wl(214) => U446_wl(214),
wl(213) => U446_wl(213), wl(212) => U446_wl(212),
wl(211) => U446_wl(211), wl(210) => U446_wl(210),
wl(209) => U446_wl(209), wl(208) => U446_wl(208),
wl(207) => U446_wl(207), wl(206) => U446_wl(206),
wl(205) => U446_wl(205), wl(204) => U446_wl(204),
wl(203) => U446_wl(203), wl(202) => U446_wl(202),
wl(201) => U446_wl(201), wl(200) => U446_wl(200),
wl(199) => U446_wl(199), wl(198) => U446_wl(198),
wl(197) => U446_wl(197), wl(196) => U446_wl(196),
wl(195) => U446_wl(195), wl(194) => U446_wl(194),
wl(193) => U446_wl(193), wl(192) => U446_wl(192),
wl(191) => U446_wl(191), wl(190) => U446_wl(190),
wl(189) => U446_wl(189), wl(188) => U446_wl(188),
wl(187) => U446_wl(187), wl(186) => U446_wl(186),
wl(185) => U446_wl(185), wl(184) => U446_wl(184),
wl(183) => U446_wl(183), wl(182) => U446_wl(182),
wl(181) => U446_wl(181), wl(180) => U446_wl(180),
wl(179) => U446_wl(179), wl(178) => U446_wl(178),
wl(177) => U446_wl(177), wl(176) => U446_wl(176),
wl(175) => U446_wl(175), wl(174) => U446_wl(174),
wl(173) => U446_wl(173), wl(172) => U446_wl(172),
wl(171) => U446_wl(171), wl(170) => U446_wl(170),
wl(169) => U446_wl(169), wl(168) => U446_wl(168),

```
wl(167) => U446_wl(167), wl(166) => U446_wl(166),
wl(165) => U446_wl(165), wl(164) => U446_wl(164),
wl(163) => U446_wl(163), wl(162) => U446_wl(162),
wl(161) => U446_wl(161), wl(160) => U446_wl(160),
wl(159) => U446_wl(159), wl(158) => U446_wl(158),
wl(157) => U446_wl(157), wl(156) => U446_wl(156),
wl(155) => U446_wl(155), wl(154) => U446_wl(154),
wl(153) => U446_wl(153), wl(152) => U446_wl(152),
wl(151) => U446_wl(151), wl(150) => U446_wl(150),
wl(149) => U446_wl(149), wl(148) => U446_wl(148),
wl(147) => U446_wl(147), wl(146) => U446_wl(146),
wl(145) => U446_wl(145), wl(144) => U446_wl(144),
wl(143) => U446_wl(143), wl(142) => U446_wl(142),
wl(141) => U446_wl(141), wl(140) => U446_wl(140),
wl(139) => U446_wl(139), wl(138) => U446_wl(138),
wl(137) => U446_wl(137), wl(136) => U446_wl(136),
wl(135) => U446_wl(135), wl(134) => U446_wl(134),
wl(133) => U446_wl(133), wl(132) => U446_wl(132),
wl(131) => U446_wl(131), wl(130) => U446_wl(130),
wl(129) => U446_wl(129), wl(128) => U446_wl(128),
wl(127) => U446_wl(127), wl(126) => U446_wl(126),
wl(125) => U446_wl(125), wl(124) => U446_wl(124),
wl(123) => U446_wl(123), wl(122) => U446_wl(122),
wl(121) => U446_wl(121), wl(120) => U446_wl(120),
wl(119) => U446_wl(119), wl(118) => U446_wl(118),
wl(117) => U446_wl(117), wl(116) => U446_wl(116),
wl(115) => U446_wl(115), wl(114) => U446_wl(114),
wl(113) => U446_wl(113), wl(112) => U446_wl(112),
wl(111) => U446_wl(111), wl(110) => U446_wl(110),
wl(109) => U446_wl(109), wl(108) => U446_wl(108),
wl(107) => U446_wl(107), wl(106) => U446_wl(106),
wl(105) => U446_wl(105), wl(104) => U446_wl(104),
wl(103) => U446_wl(103), wl(102) => U446_wl(102),
wl(101) => U446_wl(101), wl(100) => U446_wl(100),
wl(99) => U446_wl(99), wl(98) => U446_wl(98),
wl(97) => U446_wl(97), wl(96) => U446_wl(96),
wl(95) => U446_wl(95), wl(94) => U446_wl(94),
wl(93) => U446_wl(93), wl(92) => U446_wl(92),
wl(91) => U446_wl(91), wl(90) => U446_wl(90),
wl(89) => U446_wl(89), wl(88) => U446_wl(88),
wl(87) => U446_wl(87), wl(86) => U446_wl(86),
wl(85) => U446_wl(85), wl(84) => U446_wl(84),
wl(83) => U446_wl(83), wl(82) => U446_wl(82),
wl(81) => U446_wl(81), wl(80) => U446_wl(80),
wl(79) => U446_wl(79), wl(78) => U446_wl(78),
wl(77) => U446_wl(77), wl(76) => U446_wl(76),
wl(75) => U446_wl(75), wl(74) => U446_wl(74),
wl(73) => U446_wl(73), wl(72) => U446_wl(72),
wl(71) => U446_wl(71), wl(70) => U446_wl(70),
wl(69) => U446_wl(69), wl(68) => U446_wl(68),
wl(67) => U446_wl(67), wl(66) => U446_wl(66),
wl(65) => U446_wl(65), wl(64) => U446_wl(64),
wl(63) => U446_wl(63), wl(62) => U446_wl(62),
wl(61) => U446_wl(61), wl(60) => U446_wl(60),
wl(59) => U446_wl(59), wl(58) => U446_wl(58),
wl(57) => U446_wl(57), wl(56) => U446_wl(56),
wl(55) => U446_wl(55), wl(54) => U446_wl(54),
wl(53) => U446_wl(53), wl(52) => U446_wl(52),
```

```
wl(51) => U446_wl(51), wl(50) => U446_wl(50),
wl(49) => U446_wl(49), wl(48) => U446_wl(48),
wl(47) => U446_wl(47), wl(46) => U446_wl(46),
wl(45) => U446_wl(45), wl(44) => U446_wl(44),
wl(43) => U446_wl(43), wl(42) => U446_wl(42),
wl(41) => U446_wl(41), wl(40) => U446_wl(40),
wl(39) => U446_wl(39), wl(38) => U446_wl(38),
wl(37) => U446_wl(37), wl(36) => U446_wl(36),
wl(35) => U446_wl(35), wl(34) => U446_wl(34),
wl(33) => U446_wl(33), wl(32) => U446_wl(32),
wl(31) => U446_wl(31), wl(30) => U446_wl(30),
wl(29) => U446_wl(29), wl(28) => U446_wl(28),
wl(27) => U446_wl(27), wl(26) => U446_wl(26),
wl(25) => U446_wl(25), wl(24) => U446_wl(24),
wl(23) => U446_wl(23), wl(22) => U446_wl(22),
wl(21) => U446_wl(21), wl(20) => U446_wl(20),
wl(19) => U446_wl(19), wl(18) => U446_wl(18),
wl(17) => U446_wl(17), wl(16) => U446_wl(16),
wl(15) => U446_wl(15), wl(14) => U446_wl(14),
wl(13) => U446_wl(13), wl(12) => U446_wl(12),
wl(11) => U446_wl(11), wl(10) => U446_wl(10),
wl(9) => U446_wl(9), wl(8) => U446_wl(8), wl(7) =>
U446_wl(7), wl(6) => U446_wl(6), wl(5) =>
U446_wl(5), wl(4) => U446_wl(4), wl(3) =>
U446_wl(3), wl(2) => U446_wl(2), wl(1) =>
U446_wl(1), wl(0) => U446_wl(0), ml(341) =>
U492_ml(341), ml(340) => U492_ml(340), ml(339) =>
U492_ml(339), ml(338) => U492_ml(338), ml(337) =>
U492_ml(337), ml(336) => U492_ml(336), ml(335) =>
U492_ml(335), ml(334) => U492_ml(334), ml(333) =>
U492_ml(333), ml(332) => U492_ml(332), ml(331) =>
U492_ml(331), ml(330) => U492_ml(330), ml(329) =>
U492_ml(329), ml(328) => U492_ml(328), ml(327) =>
U492_ml(327), ml(326) => U492_ml(326), ml(325) =>
U492_ml(325), ml(324) => U492_ml(324), ml(323) =>
U492_ml(323), ml(322) => U492_ml(322), ml(321) =>
U492_ml(321), ml(320) => U492_ml(320), ml(319) =>
U492_ml(319), ml(318) => U492_ml(318), ml(317) =>
U492_ml(317), ml(316) => U492_ml(316), ml(315) =>
U492_ml(315), ml(314) => U492_ml(314), ml(313) =>
U492_ml(313), ml(312) => U492_ml(312), ml(311) =>
U492_ml(311), ml(310) => U492_ml(310), ml(309) =>
U492_ml(309), ml(308) => U492_ml(308), ml(307) =>
U492_ml(307), ml(306) => U492_ml(306), ml(305) =>
U492_ml(305), ml(304) => U492_ml(304), ml(303) =>
U492_ml(303), ml(302) => U492_ml(302), ml(301) =>
U492_ml(301), ml(300) => U492_ml(300), ml(299) =>
U492_ml(299), ml(298) => U492_ml(298), ml(297) =>
U492_ml(297), ml(296) => U492_ml(296), ml(295) =>
U492_ml(295), ml(294) => U492_ml(294), ml(293) =>
U492_ml(293), ml(292) => U492_ml(292), ml(291) =>
U492_ml(291), ml(290) => U492_ml(290), ml(289) =>
U492_ml(289), ml(288) => U492_ml(288), ml(287) =>
U492_ml(287), ml(286) => U492_ml(286), ml(285) =>
U492_ml(285), ml(284) => U492_ml(284), ml(283) =>
U492_ml(283), ml(282) => U492_ml(282), ml(281) =>
U492_ml(281), ml(280) => U492_ml(280), ml(279) =>
U492_ml(279), ml(278) => U492_ml(278), ml(277) =>
```

U492_ml(277), ml(276) => U492_ml(276), ml(275) =>
U492_ml(275), ml(274) => U492_ml(274), ml(273) =>
U492_ml(273), ml(272) => U492_ml(272), ml(271) =>
U492_ml(271), ml(270) => U492_ml(270), ml(269) =>
U492_ml(269), ml(268) => U492_ml(268), ml(267) =>
U492_ml(267), ml(266) => U492_ml(266), ml(265) =>
U492_ml(265), ml(264) => U492_ml(264), ml(263) =>
U492_ml(263), ml(262) => U492_ml(262), ml(261) =>
U492_ml(261), ml(260) => U492_ml(260), ml(259) =>
U492_ml(259), ml(258) => U492_ml(258), ml(257) =>
U492_ml(257), ml(256) => U492_ml(256), ml(255) =>
U492_ml(255), ml(254) => U492_ml(254), ml(253) =>
U492_ml(253), ml(252) => U492_ml(252), ml(251) =>
U492_ml(251), ml(250) => U492_ml(250), ml(249) =>
U492_ml(249), ml(248) => U492_ml(248), ml(247) =>
U492_ml(247), ml(246) => U492_ml(246), ml(245) =>
U492_ml(245), ml(244) => U492_ml(244), ml(243) =>
U492_ml(243), ml(242) => U492_ml(242), ml(241) =>
U492_ml(241), ml(240) => U492_ml(240), ml(239) =>
U492_ml(239), ml(238) => U492_ml(238), ml(237) =>
U492_ml(237), ml(236) => U492_ml(236), ml(235) =>
U492_ml(235), ml(234) => U492_ml(234), ml(233) =>
U492_ml(233), ml(232) => U492_ml(232), ml(231) =>
U492_ml(231), ml(230) => U492_ml(230), ml(229) =>
U492_ml(229), ml(228) => U492_ml(228), ml(227) =>
U492_ml(227), ml(226) => U492_ml(226), ml(225) =>
U492_ml(225), ml(224) => U492_ml(224), ml(223) =>
U492_ml(223), ml(222) => U492_ml(222), ml(221) =>
U492_ml(221), ml(220) => U492_ml(220), ml(219) =>
U492_ml(219), ml(218) => U492_ml(218), ml(217) =>
U492_ml(217), ml(216) => U492_ml(216), ml(215) =>
U492_ml(215), ml(214) => U492_ml(214), ml(213) =>
U492_ml(213), ml(212) => U492_ml(212), ml(211) =>
U492_ml(211), ml(210) => U492_ml(210), ml(209) =>
U492_ml(209), ml(208) => U492_ml(208), ml(207) =>
U492_ml(207), ml(206) => U492_ml(206), ml(205) =>
U492_ml(205), ml(204) => U492_ml(204), ml(203) =>
U492_ml(203), ml(202) => U492_ml(202), ml(201) =>
U492_ml(201), ml(200) => U492_ml(200), ml(199) =>
U492_ml(199), ml(198) => U492_ml(198), ml(197) =>
U492_ml(197), ml(196) => U492_ml(196), ml(195) =>
U492_ml(195), ml(194) => U492_ml(194), ml(193) =>
U492_ml(193), ml(192) => U492_ml(192), ml(191) =>
U492_ml(191), ml(190) => U492_ml(190), ml(189) =>
U492_ml(189), ml(188) => U492_ml(188), ml(187) =>
U492_ml(187), ml(186) => U492_ml(186), ml(185) =>
U492_ml(185), ml(184) => U492_ml(184), ml(183) =>
U492_ml(183), ml(182) => U492_ml(182), ml(181) =>
U492_ml(181), ml(180) => U492_ml(180), ml(179) =>
U492_ml(179), ml(178) => U492_ml(178), ml(177) =>
U492_ml(177), ml(176) => U492_ml(176), ml(175) =>
U492_ml(175), ml(174) => U492_ml(174), ml(173) =>
U492_ml(173), ml(172) => U492_ml(172), ml(171) =>
U492_ml(171), ml(170) => U492_ml(170), ml(169) =>
U492_ml(169), ml(168) => U492_ml(168), ml(167) =>
U492_ml(167), ml(166) => U492_ml(166), ml(165) =>
U492_ml(165), ml(164) => U492_ml(164), ml(163) =>
U492_ml(163), ml(162) => U492_ml(162), ml(161) =>

```
U492_ml(161), ml(160) => U492_ml(160), ml(159) =>
U492_ml(159), ml(158) => U492_ml(158), ml(157) =>
U492_ml(157), ml(156) => U492_ml(156), ml(155) =>
U492_ml(155), ml(154) => U492_ml(154), ml(153) =>
U492_ml(153), ml(152) => U492_ml(152), ml(151) =>
U492_ml(151), ml(150) => U492_ml(150), ml(149) =>
U492_ml(149), ml(148) => U492_ml(148), ml(147) =>
U492_ml(147), ml(146) => U492_ml(146), ml(145) =>
U492_ml(145), ml(144) => U492_ml(144), ml(143) =>
U492_ml(143), ml(142) => U492_ml(142), ml(141) =>
U492_ml(141), ml(140) => U492_ml(140), ml(139) =>
U492_ml(139), ml(138) => U492_ml(138), ml(137) =>
U492_ml(137), ml(136) => U492_ml(136), ml(135) =>
U492_ml(135), ml(134) => U492_ml(134), ml(133) =>
U492_ml(133), ml(132) => U492_ml(132), ml(131) =>
U492_ml(131), ml(130) => U492_ml(130), ml(129) =>
U492_ml(129), ml(128) => U492_ml(128), ml(127) =>
U492_ml(127), ml(126) => U492_ml(126), ml(125) =>
U492_ml(125), ml(124) => U492_ml(124), ml(123) =>
U492_ml(123), ml(122) => U492_ml(122), ml(121) =>
U492_ml(121), ml(120) => U492_ml(120), ml(119) =>
U492_ml(119), ml(118) => U492_ml(118), ml(117) =>
U492_ml(117), ml(116) => U492_ml(116), ml(115) =>
U492_ml(115), ml(114) => U492_ml(114), ml(113) =>
U492_ml(113), ml(112) => U492_ml(112), ml(111) =>
U492_ml(111), ml(110) => U492_ml(110), ml(109) =>
U492_ml(109), ml(108) => U492_ml(108), ml(107) =>
U492_ml(107), ml(106) => U492_ml(106), ml(105) =>
U492_ml(105), ml(104) => U492_ml(104), ml(103) =>
U492_ml(103), ml(102) => U492_ml(102), ml(101) =>
U492_ml(101), ml(100) => U492_ml(100), ml(99) =>
U492_ml(99), ml(98) => U492_ml(98), ml(97) =>
U492_ml(97), ml(96) => U492_ml(96), ml(95) =>
U492_ml(95), ml(94) => U492_ml(94), ml(93) =>
U492_ml(93), ml(92) => U492_ml(92), ml(91) =>
U492_ml(91), ml(90) => U492_ml(90), ml(89) =>
U492_ml(89), ml(88) => U492_ml(88), ml(87) =>
U492_ml(87), ml(86) => U492_ml(86), ml(85) =>
U492_ml(85), ml(84) => U492_ml(84), ml(83) =>
U492_ml(83), ml(82) => U492_ml(82), ml(81) =>
U492_ml(81), ml(80) => U492_ml(80), ml(79) =>
U492_ml(79), ml(78) => U492_ml(78), ml(77) =>
U492_ml(77), ml(76) => U492_ml(76), ml(75) =>
U492_ml(75), ml(74) => U492_ml(74), ml(73) =>
U492_ml(73), ml(72) => U492_ml(72), ml(71) =>
U492_ml(71), ml(70) => U492_ml(70), ml(69) =>
U492_ml(69), ml(68) => U492_ml(68), ml(67) =>
U492_ml(67), ml(66) => U492_ml(66), ml(65) =>
U492_ml(65), ml(64) => U492_ml(64), ml(63) =>
U492_ml(63), ml(62) => U492_ml(62), ml(61) =>
U492_ml(61), ml(60) => U492_ml(60), ml(59) =>
U492_ml(59), ml(58) => U492_ml(58), ml(57) =>
U492_ml(57), ml(56) => U492_ml(56), ml(55) =>
U492_ml(55), ml(54) => U492_ml(54), ml(53) =>
U492_ml(53), ml(52) => U492_ml(52), ml(51) =>
U492_ml(51), ml(50) => U492_ml(50), ml(49) =>
U492_ml(49), ml(48) => U492_ml(48), ml(47) =>
U492_ml(47), ml(46) => U492_ml(46), ml(45) =>
```

U492_ml(45), ml(44) => U492_ml(44), ml(43) =>
U492_ml(43), ml(42) => U492_ml(42), ml(41) =>
U492_ml(41), ml(40) => U492_ml(40), ml(39) =>
U492_ml(39), ml(38) => U492_ml(38), ml(37) =>
U492_ml(37), ml(36) => U492_ml(36), ml(35) =>
U492_ml(35), ml(34) => U492_ml(34), ml(33) =>
U492_ml(33), ml(32) => U492_ml(32), ml(31) =>
U492_ml(31), ml(30) => U492_ml(30), ml(29) =>
U492_ml(29), ml(28) => U492_ml(28), ml(27) =>
U492_ml(27), ml(26) => U492_ml(26), ml(25) =>
U492_ml(25), ml(24) => U492_ml(24), ml(23) =>
U492_ml(23), ml(22) => U492_ml(22), ml(21) =>
U492_ml(21), ml(20) => U492_ml(20), ml(19) =>
U492_ml(19), ml(18) => U492_ml(18), ml(17) =>
U492_ml(17), ml(16) => U492_ml(16), ml(15) =>
U492_ml(15), ml(14) => U492_ml(14), ml(13) =>
U492_ml(13), ml(12) => U492_ml(12), ml(11) =>
U492_ml(11), ml(10) => U492_ml(10), ml(9) =>
U492_ml(9), ml(8) => U492_ml(8), ml(7) =>
U492_ml(7), ml(6) => U492_ml(6), ml(5) =>
U492_ml(5), ml(4) => U492_ml(4), ml(3) =>
U492_ml(3), ml(2) => U492_ml(2), ml(1) =>
U492_ml(1), ml(0) => U492_ml(0), rspen(341) =>
U446_rspen(341), rspen(340) => U446_rspen(340),
rspen(339) => U446_rspen(339), rspen(338) =>
U446_rspen(338), rspen(337) => U446_rspen(337),
rspen(336) => U446_rspen(336), rspen(335) =>
U446_rspen(335), rspen(334) => U446_rspen(334),
rspen(333) => U446_rspen(333), rspen(332) =>
U446_rspen(332), rspen(331) => U446_rspen(331),
rspen(330) => U446_rspen(330), rspen(329) =>
U446_rspen(329), rspen(328) => U446_rspen(328),
rspen(327) => U446_rspen(327), rspen(326) =>
U446_rspen(326), rspen(325) => U446_rspen(325),
rspen(324) => U446_rspen(324), rspen(323) =>
U446_rspen(323), rspen(322) => U446_rspen(322),
rspen(321) => U446_rspen(321), rspen(320) =>
U446_rspen(320), rspen(319) => U446_rspen(319),
rspen(318) => U446_rspen(318), rspen(317) =>
U446_rspen(317), rspen(316) => U446_rspen(316),
rspen(315) => U446_rspen(315), rspen(314) =>
U446_rspen(314), rspen(313) => U446_rspen(313),
rspen(312) => U446_rspen(312), rspen(311) =>
U446_rspen(311), rspen(310) => U446_rspen(310),
rspen(309) => U446_rspen(309), rspen(308) =>
U446_rspen(308), rspen(307) => U446_rspen(307),
rspen(306) => U446_rspen(306), rspen(305) =>
U446_rspen(305), rspen(304) => U446_rspen(304),
rspen(303) => U446_rspen(303), rspen(302) =>
U446_rspen(302), rspen(301) => U446_rspen(301),
rspen(300) => U446_rspen(300), rspen(299) =>
U446_rspen(299), rspen(298) => U446_rspen(298),
rspen(297) => U446_rspen(297), rspen(296) =>
U446_rspen(296), rspen(295) => U446_rspen(295),
rspen(294) => U446_rspen(294), rspen(293) =>
U446_rspen(293), rspen(292) => U446_rspen(292),
rspen(291) => U446_rspen(291), rspen(290) =>
U446_rspen(290), rspen(289) => U446_rspen(289), rspen(288) => U446_rspen(288), rspen(287) => U446_rspen(287), rspen(286) => U446_rspen(286), rspen(285) => U446_rspen(285), rspen(284) => U446_rspen(284), rspen(283) => U446_rspen(283), rspen(282) => U446_rspen(282), rspen(281) => U446_rspen(281), rspen(280) => U446_rspen(280), rspen(279) => U446_rspen(279), rspen(278) => U446_rspen(278), rspen(277) => U446_rspen(277), rspen(276) => U446_rspen(276), rspen(275) => U446_rspen(275), rspen(274) => U446_rspen(274), rspen(273) => U446_rspen(273), rspen(272) => U446_rspen(272), rspen(271) => U446_rspen(271), rspen(270) => U446_rspen(270), rspen(269) => U446_rspen(269), rspen(268) => U446_rspen(268), rspen(267) => U446_rspen(267), rspen(266) => U446_rspen(266), rspen(265) => U446_rspen(265), rspen(264) => U446_rspen(264), rspen(263) => U446_rspen(263), rspen(262) => U446_rspen(262), rspen(261) => U446_rspen(261), rspen(260) => U446_rspen(260), rspen(259) => U446_rspen(259), rspen(258) => U446_rspen(258), rspen(257) => U446_rspen(257), rspen(256) => U446_rspen(256), rspen(255) => U446_rspen(255), rspen(254) => U446_rspen(254), rspen(253) => U446_rspen(253), rspen(252) => U446_rspen(252), rspen(251) => U446_rspen(251), rspen(250) => U446_rspen(250), rspen(249) => U446_rspen(249), rspen(248) => U446_rspen(248), rspen(247) => U446_rspen(247), rspen(246) => U446_rspen(246), rspen(245) => U446_rspen(245), rspen(244) => U446_rspen(244), rspen(243) => U446_rspen(243), rspen(242) => U446_rspen(242), rspen(241) => U446_rspen(241), rspen(240) => U446_rspen(240), rspen(239) => U446_rspen(239), rspen(238) => U446_rspen(238), rspen(237) => U446_rspen(237), rspen(236) => U446_rspen(236), rspen(235) => U446_rspen(235), rspen(234) => U446_rspen(234), rspen(233) => U446_rspen(233), rspen(232) => U446_rspen(232), rspen(231) => U446_rspen(231), rspen(230) => U446_rspen(230), rspen(229) => U446_rspen(229), rspen(228) => U446_rspen(228), rspen(227) => U446_rspen(227), rspen(226) => U446_rspen(226), rspen(225) => U446_rspen(225), rspen(224) => U446_rspen(224), rspen(223) => U446_rspen(223), rspen(222) => U446_rspen(222), rspen(221) => U446_rspen(221), rspen(220) => U446_rspen(220), rspen(219) => U446_rspen(219), rspen(218) => U446_rspen(218), rspen(217) => U446_rspen(217), rspen(216) => U446_rspen(216), rspen(215) => U446_rspen(215), rspen(214) => U446_rspen(214), rspen(213) => U446_rspen(213), rspen(212) => U446_rspen(212), rspen(211) => U446_rspen(211), rspen(210) => U446_rspen(210), rspen(209) => U446_rspen(209), rspen(208) => U446_rspen(208), rspen(207) => U446_rspen(207), rspen(206) => U446_rspen(206), rspen(205) => U446_rspen(205), rspen(204) => U446_rspen(204), rspen(203) => U446_rspen(203), rspen(202) => U446_rspen(202), rspen(201) => U446_rspen(201), rspen(200) => U446_rspen(200), rspen(199) => U446_rspen(199), rspen(198) => U446_rspen(198), rspen(197) => U446_rspen(197), rspen(196) => U446_rspen(196), rspen(195) => U446_rspen(195), rspen(194) => U446_rspen(194), rspen(193) => U446_rspen(193), rspen(192) => U446_rspen(192), rspen(191) => U446_rspen(191), rspen(190) => U446_rspen(190), rspen(189) => U446_rspen(189), rspen(188) => U446_rspen(188), rspen(187) => U446_rspen(187), rspen(186) => U446_rspen(186), rspen(185) => U446_rspen(185), rspen(184) => U446_rspen(184), rspen(183) => U446_rspen(183), rspen(182) => U446_rspen(182), rspen(181) => U446_rspen(181), rspen(180) => U446_rspen(180), rspen(179) => U446_rspen(179), rspen(178) => U446_rspen(178), rspen(177) => U446_rspen(177), rspen(176) => U446_rspen(176), rspen(175) => U446_rspen(175), rspen(174) => U446_rspen(174), rspen(173) => U446_rspen(173), rspen(172) => U446_rspen(172), rspen(171) => U446_rspen(171), rspen(170) => U446_rspen(170), rspen(169) => U446_rspen(169), rspen(168) => U446_rspen(168), rspen(167) => U446_rspen(167), rspen(166) => U446_rspen(166), rspen(165) => U446_rspen(165), rspen(164) => U446_rspen(164), rspen(163) => U446_rspen(163), rspen(162) => U446_rspen(162), rspen(161) => U446_rspen(161), rspen(160) => U446_rspen(160), rspen(159) => U446_rspen(159), rspen(158) => U446_rspen(158), rspen(157) => U446_rspen(157), rspen(156) => U446_rspen(156), rspen(155) => U446_rspen(155), rspen(154) => U446_rspen(154), rspen(153) => U446_rspen(153), rspen(152) => U446_rspen(152), rspen(151) => U446_rspen(151), rspen(150) => U446_rspen(150), rspen(149) => U446_rspen(149), rspen(148) => U446_rspen(148), rspen(147) => U446_rspen(147), rspen(146) => U446_rspen(146), rspen(145) => U446_rspen(145), rspen(144) => U446_rspen(144), rspen(143) => U446_rspen(143), rspen(142) => U446_rspen(142), rspen(141) => U446_rspen(141), rspen(140) => U446_rspen(140), rspen(139) => U446_rspen(139), rspen(138) => U446_rspen(138), rspen(137) => U446_rspen(137), rspen(136) => U446_rspen(136), rspen(135) => U446_rspen(135), rspen(134) => U446_rspen(134), rspen(133) => U446_rspen(133), rspen(132) => U446_rspen(132), rspen(131) => U446_rspen(131), rspen(130) => U446_rspen(130), rspen(129) => U446_rspen(129), rspen(128) => U446_rspen(128), rspen(127) => U446_rspen(127), rspen(126) => U446_rspen(126), rspen(125) => U446_rspen(125), rspen(124) => U446_rspen(124), rspen(123) => U446_rspen(123), rspen(122) => U446_rspen(122), rspen(121) => U446_rspen(121), rspen(120) => U446_rspen(120), rspen(119) => U446_rspen(119), rspen(118) => U446_rspen(118), rspen(117) => U446_rspen(117), rspen(116) => U446_rspen(116), rspen(115) => U446_rspen(115), rspen(114) => U446_rspen(114), rspen(113) =>
U446_rspen(113), rspen(112) => U446_rspen(112),
rspen(111) => U446_rspen(111), rspen(110) =>
U446_rspen(110), rspen(109) => U446_rspen(109),
rspen(108) => U446_rspen(108), rspen(107) =>
U446_rspen(107), rspen(106) => U446_rspen(106),
rspen(105) => U446_rspen(105), rspen(104) =>
U446_rspen(104), rspen(103) => U446_rspen(103),
rspen(102) => U446_rspen(102), rspen(101) =>
U446_rspen(101), rspen(100) => U446_rspen(100),
rspen(99) => U446_rspen(99), rspen(98) =>
U446_rspen(98), rspen(97) => U446_rspen(97),
rspen(96) => U446_rspen(96), rspen(95) =>
U446_rspen(95), rspen(94) => U446_rspen(94),
rspen(93) => U446_rspen(93), rspen(92) =>
U446_rspen(92), rspen(91) => U446_rspen(91),
rspen(90) => U446_rspen(90), rspen(89) =>
U446_rspen(89), rspen(88) => U446_rspen(88),
rspen(87) => U446_rspen(87), rspen(86) =>
U446_rspen(86), rspen(85) => U446_rspen(85),
rspen(84) => U446_rspen(84), rspen(83) =>
U446_rspen(83), rspen(82) => U446_rspen(82),
rspen(81) => U446_rspen(81), rspen(80) =>
U446_rspen(80), rspen(79) => U446_rspen(79),
rspen(78) => U446_rspen(78), rspen(77) =>
U446_rspen(77), rspen(76) => U446_rspen(76),
rspen(75) => U446_rspen(75), rspen(74) =>
U446_rspen(74), rspen(73) => U446_rspen(73),
rspen(72) => U446_rspen(72), rspen(71) =>
U446_rspen(71), rspen(70) => U446_rspen(70),
rspen(69) => U446_rspen(69), rspen(68) =>
U446_rspen(68), rspen(67) => U446_rspen(67),
rspen(66) => U446_rspen(66), rspen(65) =>
U446_rspen(65), rspen(64) => U446_rspen(64),
rspen(63) => U446_rspen(63), rspen(62) =>
U446_rspen(62), rspen(61) => U446_rspen(61),
rspen(60) => U446_rspen(60), rspen(59) =>
U446_rspen(59), rspen(58) => U446_rspen(58),
rspen(57) => U446_rspen(57), rspen(56) =>
U446_rspen(56), rspen(55) => U446_rspen(55),
rspen(54) => U446_rspen(54), rspen(53) =>
U446_rspen(53), rspen(52) => U446_rspen(52),
rspen(51) => U446_rspen(51), rspen(50) =>
U446_rspen(50), rspen(49) => U446_rspen(49),
rspen(48) => U446_rspen(48), rspen(47) =>
U446_rspen(47), rspen(46) => U446_rspen(46),
rspen(45) => U446_rspen(45), rspen(44) =>
U446_rspen(44), rspen(43) => U446_rspen(43),
rspen(42) => U446_rspen(42), rspen(41) =>
U446_rspen(41), rspen(40) => U446_rspen(40),
rspen(39) => U446_rspen(39), rspen(38) =>
U446_rspen(38), rspen(37) => U446_rspen(37),
rspen(36) => U446_rspen(36), rspen(35) =>
U446_rspen(35), rspen(34) => U446_rspen(34),
rspen(33) => U446_rspen(33), rspen(32) =>
U446_rspen(32), rspen(31) => U446_rspen(31),
rspen(30) => U446_rspen(30), rspen(29) =>
U446_rspen(29), rspen(28) => U446_rspen(28), rspen(27) => U446_rspen(27), rspen(26) => U446_rspen(26), rspen(25) => U446_rspen(25), rspen(24) => U446_rspen(24), rspen(23) => U446_rspen(23), rspen(22) => U446_rspen(22), rspen(21) => U446_rspen(21), rspen(20) => U446_rspen(20), rspen(19) => U446_rspen(19), rspen(18) => U446_rspen(18), rspen(17) => U446_rspen(17), rspen(16) => U446_rspen(16), rspen(15) => U446_rspen(15), rspen(14) => U446_rspen(14), rspen(13) => U446_rspen(13), rspen(12) => U446_rspen(12), rspen(11) => U446_rspen(11), rspen(10) => U446_rspen(10), rspen(9) => U446_rspen(9), rspen(8) => U446_rspen(8), rspen(7) => U446_rspen(7), rspen(6) => U446_rspen(6), rspen(5) => U446_rspen(5), rspen(4) => U446_rspen(4), rspen(3) => U446_rspen(3), rspen(2) => U446_rspen(2), rspen(1) => U446_rspen(1), rspen(0) => U446_rspen(0), fwl(341) => U450_fwl(341), fwl(340) => U450_fwl(340), fwl(339) => U450_fwl(339), fwl(338) => U450_fwl(338), fwl(337) => U450_fwl(337), fwl(336) => U450_fwl(336), fwl(335) => U450_fwl(335), fwl(334) => U450_fwl(334), fwl(333) => U450_fwl(333), fwl(332) => U450_fwl(332), fwl(331) => U450_fwl(331), fwl(330) => U450_fwl(330), fwl(329) => U450_fwl(329), fwl(328) => U450_fwl(328), fwl(327) => U450_fwl(327), fwl(326) => U450_fwl(326), fwl(325) => U450_fwl(325), fwl(324) => U450_fwl(324), fwl(323) => U450_fwl(323), fwl(322) => U450_fwl(322), fwl(321) => U450_fwl(321), fwl(320) => U450_fwl(320), fwl(319) => U450_fwl(319), fwl(318) => U450_fwl(318), fwl(317) => U450_fwl(317), fwl(316) => U450_fwl(316), fwl(315) => U450_fwl(315), fwl(314) => U450_fwl(314), fwl(313) => U450_fwl(313), fwl(312) => U450_fwl(312), fwl(311) => U450_fwl(311), fwl(310) => U450_fwl(310), fwl(309) => U450_fwl(309), fwl(308) => U450_fwl(308), fwl(307) => U450_fwl(307), fwl(306) => U450_fwl(306), fwl(305) => U450_fwl(305), fwl(304) => U450_fwl(304), fwl(303) => U450_fwl(303), fwl(302) => U450_fwl(302), fwl(301) => U450_fwl(301), fwl(300) => U450_fwl(300), fwl(299) => U450_fwl(299), fwl(298) => U450_fwl(298), fwl(297) => U450_fwl(297), fwl(296) => U450_fwl(296), fwl(295) => U450_fwl(295), fwl(294) => U450_fwl(294), fwl(293) => U450_fwl(293), fwl(292) => U450_fwl(292), fwl(291) => U450_fwl(291), fwl(290) => U450_fwl(290), fwl(289) => U450_fwl(289), fwl(288) => U450_fwl(288), fwl(287) => U450_fwl(287), fwl(286) => U450_fwl(286), fwl(285) => U450_fwl(285), fwl(284) => U450_fwl(284), fwl(283) => U450_fwl(283), fwl(282) => U450_fwl(282), fwl(281) => U450_fwl(281), fwl(280) => U450_fwl(280), fwl(279) => U450_fwl(279), fwl(278) => U450_fwl(278), fwl(277) => U450_fwl(277), fwl(276) => U450_fwl(276), fwl(275) =>

U450_fwl(275), fwl(274) => U450_fwl(274), fwl(273) => U450_fwl(273), fwl(272) => U450_fwl(272), fwl(271) => U450_fwl(271), fwl(270) => U450_fwl(270), fwl(269) => U450_fwl(269), fwl(268) => U450_fwl(268), fwl(267) => U450_fwl(267), fwl(266) => U450_fwl(266), fwl(265) => U450_fwl(265), fwl(264) => U450_fwl(264), fwl(263) => U450_fwl(263), fwl(262) => U450_fwl(262), fwl(261) => U450_fwl(261), fwl(260) => U450_fwl(260), fwl(259) => U450_fwl(259), fwl(258) => U450_fwl(258), fwl(257) => U450_fwl(257), fwl(256) => U450_fwl(256), fwl(255) => U450_fwl(255), fwl(254) => U450_fwl(254), fwl(253) => U450_fwl(253), fwl(252) => U450_fwl(252), fwl(251) => U450_fwl(251), fwl(250) => U450_fwl(250), fwl(249) => U450_fwl(249), fwl(248) => U450_fwl(248), fwl(247) => U450_fwl(247), fwl(246) => U450_fwl(246), fwl(245) => U450_fwl(245), fwl(244) => U450_fwl(244), fwl(243) => U450_fwl(243), fwl(242) => U450_fwl(242), fwl(241) => U450_fwl(241), fwl(240) => U450_fwl(240), fwl(239) => U450_fwl(239), fwl(238) => U450_fwl(238), fwl(237) => U450_fwl(237), fwl(236) => U450_fwl(236), fwl(235) => U450_fwl(235), fwl(234) => U450_fwl(234), fwl(233) => U450_fwl(233), fwl(232) => U450_fwl(232), fwl(231) => U450_fwl(231), fwl(230) => U450_fwl(230), fwl(229) => U450_fwl(229), fwl(228) => U450_fwl(228), fwl(227) => U450_fwl(227), fwl(226) => U450_fwl(226), fwl(225) => U450_fwl(225), fwl(224) => U450_fwl(224), fwl(223) => U450_fwl(223), fwl(222) => U450_fwl(222), fwl(221) => U450_fwl(221), fwl(220) => U450_fwl(220), fwl(219) => U450_fwl(219), fwl(218) => U450_fwl(218), fwl(217) => U450_fwl(217), fwl(216) => U450_fwl(216), fwl(215) => U450_fwl(215), fwl(214) => U450_fwl(214), fwl(213) => U450_fwl(213), fwl(212) => U450_fwl(212), fwl(211) => U450_fwl(211), fwl(210) => U450_fwl(210), fwl(209) => U450_fwl(209), fwl(208) => U450_fwl(208), fwl(207) => U450_fwl(207), fwl(206) => U450_fwl(206), fwl(205) => U450_fwl(205), fwl(204) => U450_fwl(204), fwl(203) => U450_fwl(203), fwl(202) => U450_fwl(202), fwl(201) => U450_fwl(201), fwl(200) => U450_fwl(200), fwl(199) => U450_fwl(199), fwl(198) => U450_fwl(198), fwl(197) => U450_fwl(197), fwl(196) => U450_fwl(196), fwl(195) => U450_fwl(195), fwl(194) => U450_fwl(194), fwl(193) => U450_fwl(193), fwl(192) => U450_fwl(192), fwl(191) => U450_fwl(191), fwl(190) => U450_fwl(190), fwl(189) => U450_fwl(189), fwl(188) => U450_fwl(188), fwl(187) => U450_fwl(187), fwl(186) => U450_fwl(186), fwl(185) => U450_fwl(185), fwl(184) => U450_fwl(184), fwl(183) => U450_fwl(183), fwl(182) => U450_fwl(182), fwl(181) => U450_fwl(181), fwl(180) => U450_fwl(180), fwl(179) => U450_fwl(179), fwl(178)

=> U450_fwl(178), fwl(177) => U450_fwl(177), fwl(176) => U450_fwl(176), fwl(175) => U450_fwl(175), fwl(174) => U450_fwl(174), fwl(173) => U450_fwl(173), fwl(172) => U450_fwl(172), fwl(171) => U450_fwl(171), fwl(170) => U450_fwl(170), fwl(169) => U450_fwl(169), fwl(168) => U450_fwl(168), fwl(167) => U450_fwl(167), fwl(166) => U450_fwl(166), fwl(165) => U450_fwl(165), fwl(164) => U450_fwl(164), fwl(163) => U450_fwl(163), fwl(162) => U450_fwl(162), fwl(161) => U450_fwl(161), fwl(160) => U450_fwl(160), fwl(159) => U450_fwl(159), fwl(158) => U450_fwl(158), fwl(157) => U450_fwl(157), fwl(156) => U450_fwl(156), fwl(155) => U450_fwl(155), fwl(154) => U450_fwl(154), fwl(153) => U450_fwl(153), fwl(152) => U450_fwl(152), fwl(151) => U450_fwl(151), fwl(150) => U450_fwl(150), fwl(149) => U450_fwl(149), fwl(148) => U450_fwl(148), fwl(147) => U450_fwl(147), fwl(146) => U450_fwl(146), fwl(145) => U450_fwl(145), fwl(144) => U450_fwl(144), fwl(143) => U450_fwl(143), fwl(142) => U450_fwl(142), fwl(141) => U450_fwl(141), fwl(140) => U450_fwl(140), fwl(139) => U450_fwl(139), fwl(138) => U450_fwl(138), fwl(137) => U450_fwl(137), fwl(136) => U450_fwl(136), fwl(135) => U450_fwl(135), fwl(134) => U450_fwl(134), fwl(133) => U450_fwl(133), fwl(132) => U450_fwl(132), fwl(131) => U450_fwl(131), fwl(130) => U450_fwl(130), fwl(129) => U450_fwl(129), fwl(128) => U450_fwl(128), fwl(127) => U450_fwl(127), fwl(126) => U450_fwl(126), fwl(125) => U450_fwl(125), fwl(124) => U450_fwl(124), fwl(123) => U450_fwl(123), fwl(122) => U450_fwl(122), fwl(121) => U450_fwl(121), fwl(120) => U450_fwl(120), fwl(119) => U450_fwl(119), fwl(118) => U450_fwl(118), fwl(117) => U450_fwl(117), fwl(116) => U450_fwl(116), fwl(115) => U450_fwl(115), fwl(114) => U450_fwl(114), fwl(113) => U450_fwl(113), fwl(112) => U450_fwl(112), fwl(111) => U450_fwl(111), fwl(110) => U450_fwl(110), fwl(109) => U450_fwl(109), fwl(108) => U450_fwl(108), fwl(107) => U450_fwl(107), fwl(106) => U450_fwl(106), fwl(105) => U450_fwl(105), fwl(104) => U450_fwl(104), fwl(103) => U450_fwl(103), fwl(102) => U450_fwl(102), fwl(101) => U450_fwl(101), fwl(100) => U450_fwl(100), fwl(99) => U450_fwl(99), fwl(98) => U450_fwl(98), fwl(97) => U450_fwl(97), fwl(96) => U450_fwl(96), fwl(95) => U450_fwl(95), fwl(94) => U450_fwl(94), fwl(93) => U450_fwl(93), fwl(92) => U450_fwl(92), fwl(91) => U450_fwl(91), fwl(90) => U450_fwl(90), fwl(89) => U450_fwl(89), fwl(88) => U450_fwl(88), fwl(87) => U450_fwl(87), fwl(86) => U450_fwl(86), fwl(85) => U450_fwl(85), fwl(84) => U450_fwl(84), fwl(83) => U450_fwl(83), fwl(82) => U450_fwl(82), fwl(81) => U450_fwl(81), fwl(80) => U450_fwl(80), fwl(79) => U450_fwl(79), fwl(78) =>

```
U450_fwl(78), fwl(77) => U450_fwl(77), fwl(76) =>
U450_fwl(76), fwl(75) => U450_fwl(75), fwl(74) =>
U450_fwl(74), fwl(73) => U450_fwl(73), fwl(72) =>
U450_fwl(72), fwl(71) => U450_fwl(71), fwl(70) =>
U450_fwl(70), fwl(69) => U450_fwl(69), fwl(68) =>
U450_fwl(68), fwl(67) => U450_fwl(67), fwl(66) =>
U450_fwl(66), fwl(65) => U450_fwl(65), fwl(64) =>
U450_fwl(64), fwl(63) => U450_fwl(63), fwl(62) =>
U450_fwl(62), fwl(61) => U450_fwl(61), fwl(60) =>
U450_fwl(60), fwl(59) => U450_fwl(59), fwl(58) =>
U450_fwl(58), fwl(57) => U450_fwl(57), fwl(56) =>
U450_fwl(56), fwl(55) => U450_fwl(55), fwl(54) =>
U450_fwl(54), fwl(53) => U450_fwl(53), fwl(52) =>
U450_fwl(52), fwl(51) => U450_fwl(51), fwl(50) =>
U450_fwl(50), fwl(49) => U450_fwl(49), fwl(48) =>
U450_fwl(48), fwl(47) => U450_fwl(47), fwl(46) =>
U450_fwl(46), fwl(45) => U450_fwl(45), fwl(44) =>
U450_fwl(44), fwl(43) => U450_fwl(43), fwl(42) =>
U450_fwl(42), fwl(41) => U450_fwl(41), fwl(40) =>
U450_fwl(40), fwl(39) => U450_fwl(39), fwl(38) =>
U450_fwl(38), fwl(37) => U450_fwl(37), fwl(36) =>
U450_fwl(36), fwl(35) => U450_fwl(35), fwl(34) =>
U450_fwl(34), fwl(33) => U450_fwl(33), fwl(32) =>
U450_fwl(32), fwl(31) => U450_fwl(31), fwl(30) =>
U450_fwl(30), fwl(29) => U450_fwl(29), fwl(28) =>
U450_fwl(28), fwl(27) => U450_fwl(27), fwl(26) =>
U450_fwl(26), fwl(25) => U450_fwl(25), fwl(24) =>
U450_fwl(24), fwl(23) => U450_fwl(23), fwl(22) =>
U450_fwl(22), fwl(21) => U450_fwl(21), fwl(20) =>
U450_fwl(20), fwl(19) => U450_fwl(19), fwl(18) =>
U450_fwl(18), fwl(17) => U450_fwl(17), fwl(16) =>
U450_fwl(16), fwl(15) => U450_fwl(15), fwl(14) =>
U450_fwl(14), fwl(13) => U450_fwl(13), fwl(12) =>
U450_fwl(12), fwl(11) => U450_fwl(11), fwl(10) =>
U450_fwl(10), fwl(9) => U450_fwl(9), fwl(8) =>
U450_fwl(8), fwl(7) => U450_fwl(7), fwl(6) =>
U450_fwl(6), fwl(5) => U450_fwl(5), fwl(4) =>
U450_fwl(4), fwl(3) => U450_fwl(3), fwl(2) =>
U450_fwl(2), fwl(1) => U450_fwl(1), fwl(0) =>
U450_fwl(0), fsaen => U483_Z, asaen => U485_Z,
prsp => U460_Z, rsao(71) => rdsao(71), rsao(70) =>
rdsao(70), rsao(69) => rdsao(69), rsao(68) =>
rdsao(68), rsao(67) => rdsao(67), rsao(66) =>
rdsao(66), rsao(65) => rdsao(65), rsao(64) =>
rdsao(64), rsao(63) => rdsao(63), rsao(62) =>
rdsao(62), rsao(61) => rdsao(61), rsao(60) =>
rdsao(60), rsao(59) => rdsao(59), rsao(58) =>
rdsao(58), rsao(57) => rdsao(57), rsao(56) =>
rdsao(56), rsao(55) => rdsao(55), rsao(54) =>
rdsao(54), rsao(53) => rdsao(53), rsao(52) =>
rdsao(52), rsao(51) => rdsao(51), rsao(50) =>
rdsao(50), rsao(49) => rdsao(49), rsao(48) =>
rdsao(48), rsao(47) => rdsao(47), rsao(46) =>
rdsao(46), rsao(45) => rdsao(45), rsao(44) =>
rdsao(44), rsao(43) => rdsao(43), rsao(42) =>
rdsao(42), rsao(41) => rdsao(41), rsao(40) =>
rdsao(40), rsao(39) => rdsao(39), rsao(38) =>
rdsao(38), rsao(37) => rdsao(37), rsao(36) =>
```

rdsao(36), rsao(35) => rdsao(35), rsao(34) =>
rdsao(34), rsao(33) => rdsao(33), rsao(32) =>
rdsao(32), rsao(31) => rdsao(31), rsao(30) =>
rdsao(30), rsao(29) => rdsao(29), rsao(28) =>
rdsao(28), rsao(27) => rdsao(27), rsao(26) =>
rdsao(26), rsao(25) => rdsao(25), rsao(24) =>
rdsao(24), rsao(23) => rdsao(23), rsao(22) =>
rdsao(22), rsao(21) => rdsao(21), rsao(20) =>
rdsao(20), rsao(19) => rdsao(19), rsao(18) =>
rdsao(18), rsao(17) => rdsao(17), rsao(16) =>
rdsao(16), rsao(15) => rdsao(15), rsao(14) =>
rdsao(14), rsao(13) => rdsao(13), rsao(12) =>
rdsao(12), rsao(11) => rdsao(11), rsao(10) =>
rdsao(10), rsao(9) => rdsao(9), rsao(8) =>
rdsao(8), rsao(7) => rdsao(7), rsao(6) => rdsao(6),
rsao(5) => rdsao(5), rsao(4) => rdsao(4), rsao(3)
=> rdsao(3), rsao(2) => rdsao(2), rsao(1) =>
rdsao(1), rsao(0) => rdsao(0), rsp => rsp, prech
=> U461_Z, bl(71) => U451_o(71), bl(70) =>
U451_o(70), bl(69) => U451_o(69), bl(68) =>
U451_o(68), bl(67) => U451_o(67), bl(66) =>
U451_o(66), bl(65) => U451_o(65), bl(64) =>
U451_o(64), bl(63) => U451_o(63), bl(62) =>
U451_o(62), bl(61) => U451_o(61), bl(60) =>
U451_o(60), bl(59) => U451_o(59), bl(58) =>
U451_o(58), bl(57) => U451_o(57), bl(56) =>
U451_o(56), bl(55) => U451_o(55), bl(54) =>
U451_o(54), bl(53) => U451_o(53), bl(52) =>
U451_o(52), bl(51) => U451_o(51), bl(50) =>
U451_o(50), bl(49) => U451_o(49), bl(48) =>
U451_o(48), bl(47) => U451_o(47), bl(46) =>
U451_o(46), bl(45) => U451_o(45), bl(44) =>
U451_o(44), bl(43) => U451_o(43), bl(42) =>
U451_o(42), bl(41) => U451_o(41), bl(40) =>
U451_o(40), bl(39) => U451_o(39), bl(38) =>
U451_o(38), bl(37) => U451_o(37), bl(36) =>
U451_o(36), bl(35) => U451_o(35), bl(34) =>
U451_o(34), bl(33) => U451_o(33), bl(32) =>
U451_o(32), bl(31) => U451_o(31), bl(30) =>
U451_o(30), bl(29) => U451_o(29), bl(28) =>
U451_o(28), bl(27) => U451_o(27), bl(26) =>
U451_o(26), bl(25) => U451_o(25), bl(24) =>
U451_o(24), bl(23) => U451_o(23), bl(22) =>
U451_o(22), bl(21) => U451_o(21), bl(20) =>
U451_o(20), bl(19) => U451_o(19), bl(18) =>
U451_o(18), bl(17) => U451_o(17), bl(16) =>
U451_o(16), bl(15) => U451_o(15), bl(14) =>
U451_o(14), bl(13) => U451_o(13), bl(12) =>
U451_o(12), bl(11) => U451_o(11), bl(10) =>
U451_o(10), bl(9) => U451_o(9), bl(8) => U451_o(8),
bl(7) => U451_o(7), bl(6) => U451_o(6), bl(5) =>
U451_o(5), bl(4) => U451_o(4), bl(3) => U451_o(3),
bl(2) => U451_o(2), bl(1) => U451_o(1), bl(0) =>
U451_o(0), disch => U484_Z, f0 => U479_Z, f1 =>
U480_Z, f2 => U481_Z, ibl(71) => U452_o(71),
ibl(70) => U452_o(70), ibl(69) => U452_o(69),
ibl(68) => U452_o(68), ibl(67) => U452_o(67),
ibl(66) => U452_o(66), ibl(65) => U452_o(65), ibl(64) => U452_o(64), ibl(63) => U452_o(63), ibl(62) => U452_o(62), ibl(61) => U452_o(61), ibl(60) => U452_o(60), ibl(59) => U452_o(59), ibl(58) => U452_o(58), ibl(57) => U452_o(57), ibl(56) => U452_o(56), ibl(55) => U452_o(55), ibl(54) => U452_o(54), ibl(53) => U452_o(53), ibl(52) => U452_o(52), ibl(51) => U452_o(51), ibl(50) => U452_o(50), ibl(49) => U452_o(49), ibl(48) => U452_o(48), ibl(47) => U452_o(47), ibl(46) => U452_o(46), ibl(45) => U452_o(45), ibl(44) => U452_o(44), ibl(43) => U452_o(43), ibl(42) => U452_o(42), ibl(41) => U452_o(41), ibl(40) => U452_o(40), ibl(39) => U452_o(39), ibl(38) => U452_o(38), ibl(37) => U452_o(37), ibl(36) => U452_o(36), ibl(35) => U452_o(35), ibl(34) => U452_o(34), ibl(33) => U452_o(33), ibl(32) => U452_o(32), ibl(31) => U452_o(31), ibl(30) => U452_o(30), ibl(29) => U452_o(29), ibl(28) => U452_o(28), ibl(27) => U452_o(27), ibl(26) => U452_o(26), ibl(25) => U452_o(25), ibl(24) => U452_o(24), ibl(23) => U452_o(23), ibl(22) => U452_o(22), ibl(21) => U452_o(21), ibl(20) => U452_o(20), ibl(19) => U452_o(19), ibl(18) => U452_o(18), ibl(17) => U452_o(17), ibl(16) => U452_o(16), ibl(15) => U452_o(15), ibl(14) => U452_o(14), ibl(13) => U452_o(13), ibl(12) => U452_o(12), ibl(11) => U452_o(11), ibl(10) => U452_o(10), ibl(9) => U452_o(9), ibl(8) => U452_o(8), ibl(7) => U452_o(7), ibl(6) => U452_o(6), ibl(5) => U452_o(5), ibl(4) => U452_o(4), ibl(3) => U452_o(3), ibl(2) => U452_o(2), ibl(1) => U452_o(1), ibl(0) => U452_o(0), if0 => if0, if1 => U477_ZN, if2 => if2, mask(71) => m(71), mask(70) => m(70), mask(69) => m(69), mask(68) => m(68), mask(67) => m(67), mask(66) => m(66), mask(65) => m(65), mask(64) => m(64), mask(63) => m(63), mask(62) => m(62), mask(61) => m(61), mask(60) => m(60), mask(59) => m(59), mask(58) => m(58), mask(57) => m(57), mask(56) => m(56), mask(55) => m(55), mask(54) => m(54), mask(53) => m(53), mask(52) => m(52), mask(51) => m(51), mask(50) => m(50), mask(49) => m(49), mask(48) => m(48), mask(47) => m(47), mask(46) => m(46), mask(45) => m(45), mask(44) => m(44), mask(43) => m(43), mask(42) => m(42), mask(41) => m(41), mask(40) => m(40), mask(39) => m(39), mask(38) => m(38), mask(37) => m(37), mask(36) => m(36), mask(35) => m(35), mask(34) => m(34), mask(33) => m(33), mask(32) => m(32), mask(31) => m(31), mask(30) => m(30), mask(29) => m(29), mask(28) => m(28), mask(27) => m(27), mask(26) => m(26), mask(25) => m(25), mask(24) => m(24), mask(23) => m(23), mask(22) => m(22), mask(21) => m(21), mask(20) => m(20), mask(19) => m(19), mask(18) => m(18), mask(17) => m(17), mask(16) => m(16), mask(15) => m(15), mask(14) => m(14), mask(13) => m(13), mask(12) => m(12), mask(11) => m(11), mask(10) => m(10), mask(9) =>

```
            m(9), mask(8) => m(8), mask(7) => m(7), mask(6) =>
            m(6), mask(5) => m(5), mask(4) => m(4), mask(3) =>
            m(3), mask(2) => m(2), mask(1) => m(1), mask(0) =>
            m(0), msaen => U486_Z );

U450: fitag342
   port map ( finit => finit, venb => U462_Z, rstfifoaddr =>
            U463_Z, wenf => U488_o, fful => fful, fwl(341) =>
            U450_fwl(341), fwl(340) => U450_fwl(340), fwl(339)
            => U450_fwl(339), fwl(338) => U450_fwl(338),
            fwl(337) => U450_fwl(337), fwl(336) =>
            U450_fwl(336), fwl(335) => U450_fwl(335), fwl(334)
            => U450_fwl(334), fwl(333) => U450_fwl(333),
            fwl(332) => U450_fwl(332), fwl(331) =>
            U450_fwl(331), fwl(330) => U450_fwl(330), fwl(329)
            => U450_fwl(329), fwl(328) => U450_fwl(328),
            fwl(327) => U450_fwl(327), fwl(326) =>
            U450_fwl(326), fwl(325) => U450_fwl(325), fwl(324)
            => U450_fwl(324), fwl(323) => U450_fwl(323),
            fwl(322) => U450_fwl(322), fwl(321) =>
            U450_fwl(321), fwl(320) => U450_fwl(320), fwl(319)
            => U450_fwl(319), fwl(318) => U450_fwl(318),
            fwl(317) => U450_fwl(317), fwl(316) =>
            U450_fwl(316), fwl(315) => U450_fwl(315), fwl(314)
            => U450_fwl(314), fwl(313) => U450_fwl(313),
            fwl(312) => U450_fwl(312), fwl(311) =>
            U450_fwl(311), fwl(310) => U450_fwl(310), fwl(309)
            => U450_fwl(309), fwl(308) => U450_fwl(308),
            fwl(307) => U450_fwl(307), fwl(306) =>
            U450_fwl(306), fwl(305) => U450_fwl(305), fwl(304)
            => U450_fwl(304), fwl(303) => U450_fwl(303),
            fwl(302) => U450_fwl(302), fwl(301) =>
            U450_fwl(301), fwl(300) => U450_fwl(300), fwl(299)
            => U450_fwl(299), fwl(298) => U450_fwl(298),
            fwl(297) => U450_fwl(297), fwl(296) =>
            U450_fwl(296), fwl(295) => U450_fwl(295), fwl(294)
            => U450_fwl(294), fwl(293) => U450_fwl(293),
            fwl(292) => U450_fwl(292), fwl(291) =>
            U450_fwl(291), fwl(290) => U450_fwl(290), fwl(289)
            => U450_fwl(289), fwl(288) => U450_fwl(288),
            fwl(287) => U450_fwl(287), fwl(286) =>
            U450_fwl(286), fwl(285) => U450_fwl(285), fwl(284)
            => U450_fwl(284), fwl(283) => U450_fwl(283),
            fwl(282) => U450_fwl(282), fwl(281) =>
            U450_fwl(281), fwl(280) => U450_fwl(280), fwl(279)
            => U450_fwl(279), fwl(278) => U450_fwl(278),
            fwl(277) => U450_fwl(277), fwl(276) =>
            U450_fwl(276), fwl(275) => U450_fwl(275), fwl(274)
            => U450_fwl(274), fwl(273) => U450_fwl(273),
            fwl(272) => U450_fwl(272), fwl(271) =>
            U450_fwl(271), fwl(270) => U450_fwl(270), fwl(269)
            => U450_fwl(269), fwl(268) => U450_fwl(268),
            fwl(267) => U450_fwl(267), fwl(266) =>
            U450_fwl(266), fwl(265) => U450_fwl(265), fwl(264)
            => U450_fwl(264), fwl(263) => U450_fwl(263),
            fwl(262) => U450_fwl(262), fwl(261) =>
            U450_fwl(261), fwl(260) => U450_fwl(260), fwl(259)
            => U450_fwl(259), fwl(258) => U450_fwl(258),
```

fwl(257) => U450_fwl(257), fwl(256) =>
U450_fwl(256), fwl(255) => U450_fwl(255), fwl(254)
=> U450_fwl(254), fwl(253) => U450_fwl(253),
fwl(252) => U450_fwl(252), fwl(251) =>
U450_fwl(251), fwl(250) => U450_fwl(250), fwl(249)
=> U450_fwl(249), fwl(248) => U450_fwl(248),
fwl(247) => U450_fwl(247), fwl(246) =>
U450_fwl(246), fwl(245) => U450_fwl(245), fwl(244)
=> U450_fwl(244), fwl(243) => U450_fwl(243),
fwl(242) => U450_fwl(242), fwl(241) =>
U450_fwl(241), fwl(240) => U450_fwl(240), fwl(239)
=> U450_fwl(239), fwl(238) => U450_fwl(238),
fwl(237) => U450_fwl(237), fwl(236) =>
U450_fwl(236), fwl(235) => U450_fwl(235), fwl(234)
=> U450_fwl(234), fwl(233) => U450_fwl(233),
fwl(232) => U450_fwl(232), fwl(231) =>
U450_fwl(231), fwl(230) => U450_fwl(230), fwl(229)
=> U450_fwl(229), fwl(228) => U450_fwl(228),
fwl(227) => U450_fwl(227), fwl(226) =>
U450_fwl(226), fwl(225) => U450_fwl(225), fwl(224)
=> U450_fwl(224), fwl(223) => U450_fwl(223),
fwl(222) => U450_fwl(222), fwl(221) =>
U450_fwl(221), fwl(220) => U450_fwl(220), fwl(219)
=> U450_fwl(219), fwl(218) => U450_fwl(218),
fwl(217) => U450_fwl(217), fwl(216) =>
U450_fwl(216), fwl(215) => U450_fwl(215), fwl(214)
=> U450_fwl(214), fwl(213) => U450_fwl(213),
fwl(212) => U450_fwl(212), fwl(211) =>
U450_fwl(211), fwl(210) => U450_fwl(210), fwl(209)
=> U450_fwl(209), fwl(208) => U450_fwl(208),
fwl(207) => U450_fwl(207), fwl(206) =>
U450_fwl(206), fwl(205) => U450_fwl(205), fwl(204)
=> U450_fwl(204), fwl(203) => U450_fwl(203),
fwl(202) => U450_fwl(202), fwl(201) =>
U450_fwl(201), fwl(200) => U450_fwl(200), fwl(199)
=> U450_fwl(199), fwl(198) => U450_fwl(198),
fwl(197) => U450_fwl(197), fwl(196) =>
U450_fwl(196), fwl(195) => U450_fwl(195), fwl(194)
=> U450_fwl(194), fwl(193) => U450_fwl(193),
fwl(192) => U450_fwl(192), fwl(191) =>
U450_fwl(191), fwl(190) => U450_fwl(190), fwl(189)
=> U450_fwl(189), fwl(188) => U450_fwl(188),
fwl(187) => U450_fwl(187), fwl(186) =>
U450_fwl(186), fwl(185) => U450_fwl(185), fwl(184)
=> U450_fwl(184), fwl(183) => U450_fwl(183),
fwl(182) => U450_fwl(182), fwl(181) =>
U450_fwl(181), fwl(180) => U450_fwl(180), fwl(179)
=> U450_fwl(179), fwl(178) => U450_fwl(178),
fwl(177) => U450_fwl(177), fwl(176) =>
U450_fwl(176), fwl(175) => U450_fwl(175), fwl(174)
=> U450_fwl(174), fwl(173) => U450_fwl(173),
fwl(172) => U450_fwl(172), fwl(171) =>
U450_fwl(171), fwl(170) => U450_fwl(170), fwl(169)
=> U450_fwl(169), fwl(168) => U450_fwl(168),
fwl(167) => U450_fwl(167), fwl(166) =>
U450_fwl(166), fwl(165) => U450_fwl(165), fwl(164)
=> U450_fwl(164), fwl(163) => U450_fwl(163),
fwl(162) => U450_fwl(162), fwl(161) =>

U450_fwl(161), fwl(160) => U450_fwl(160), fwl(159) => U450_fwl(159), fwl(158) => U450_fwl(158), fwl(157) => U450_fwl(157), fwl(156) => U450_fwl(156), fwl(155) => U450_fwl(155), fwl(154) => U450_fwl(154), fwl(153) => U450_fwl(153), fwl(152) => U450_fwl(152), fwl(151) => U450_fwl(151), fwl(150) => U450_fwl(150), fwl(149) => U450_fwl(149), fwl(148) => U450_fwl(148), fwl(147) => U450_fwl(147), fwl(146) => U450_fwl(146), fwl(145) => U450_fwl(145), fwl(144) => U450_fwl(144), fwl(143) => U450_fwl(143), fwl(142) => U450_fwl(142), fwl(141) => U450_fwl(141), fwl(140) => U450_fwl(140), fwl(139) => U450_fwl(139), fwl(138) => U450_fwl(138), fwl(137) => U450_fwl(137), fwl(136) => U450_fwl(136), fwl(135) => U450_fwl(135), fwl(134) => U450_fwl(134), fwl(133) => U450_fwl(133), fwl(132) => U450_fwl(132), fwl(131) => U450_fwl(131), fwl(130) => U450_fwl(130), fwl(129) => U450_fwl(129), fwl(128) => U450_fwl(128), fwl(127) => U450_fwl(127), fwl(126) => U450_fwl(126), fwl(125) => U450_fwl(125), fwl(124) => U450_fwl(124), fwl(123) => U450_fwl(123), fwl(122) => U450_fwl(122), fwl(121) => U450_fwl(121), fwl(120) => U450_fwl(120), fwl(119) => U450_fwl(119), fwl(118) => U450_fwl(118), fwl(117) => U450_fwl(117), fwl(116) => U450_fwl(116), fwl(115) => U450_fwl(115), fwl(114) => U450_fwl(114), fwl(113) => U450_fwl(113), fwl(112) => U450_fwl(112), fwl(111) => U450_fwl(111), fwl(110) => U450_fwl(110), fwl(109) => U450_fwl(109), fwl(108) => U450_fwl(108), fwl(107) => U450_fwl(107), fwl(106) => U450_fwl(106), fwl(105) => U450_fwl(105), fwl(104) => U450_fwl(104), fwl(103) => U450_fwl(103), fwl(102) => U450_fwl(102), fwl(101) => U450_fwl(101), fwl(100) => U450_fwl(100), fwl(99) => U450_fwl(99), fwl(98) => U450_fwl(98), fwl(97) => U450_fwl(97), fwl(96) => U450_fwl(96), fwl(95) => U450_fwl(95), fwl(94) => U450_fwl(94), fwl(93) => U450_fwl(93), fwl(92) => U450_fwl(92), fwl(91) => U450_fwl(91), fwl(90) => U450_fwl(90), fwl(89) => U450_fwl(89), fwl(88) => U450_fwl(88), fwl(87) => U450_fwl(87), fwl(86) => U450_fwl(86), fwl(85) => U450_fwl(85), fwl(84) => U450_fwl(84), fwl(83) => U450_fwl(83), fwl(82) => U450_fwl(82), fwl(81) => U450_fwl(81), fwl(80) => U450_fwl(80), fwl(79) => U450_fwl(79), fwl(78) => U450_fwl(78), fwl(77) => U450_fwl(77), fwl(76) => U450_fwl(76), fwl(75) => U450_fwl(75), fwl(74) => U450_fwl(74), fwl(73) => U450_fwl(73), fwl(72) => U450_fwl(72), fwl(71) => U450_fwl(71), fwl(70) => U450_fwl(70), fwl(69) => U450_fwl(69), fwl(68) => U450_fwl(68), fwl(67) => U450_fwl(67), fwl(66) => U450_fwl(66), fwl(65) => U450_fwl(65), fwl(64) => U450_fwl(64), fwl(63) => U450_fwl(63), fwl(62) => U450_fwl(62), fwl(61) => U450_fwl(61), fwl(60) => U450_fwl(60), fwl(59) => U450_fwl(59), fwl(58) => U450_fwl(58), fwl(57)

```
=> U450_fwl(57), fwl(56) => U450_fwl(56), fwl(55)
=> U450_fwl(55), fwl(54) => U450_fwl(54), fwl(53)
=> U450_fwl(53), fwl(52) => U450_fwl(52), fwl(51)
=> U450_fwl(51), fwl(50) => U450_fwl(50), fwl(49)
=> U450_fwl(49), fwl(48) => U450_fwl(48), fwl(47)
=> U450_fwl(47), fwl(46) => U450_fwl(46), fwl(45)
=> U450_fwl(45), fwl(44) => U450_fwl(44), fwl(43)
=> U450_fwl(43), fwl(42) => U450_fwl(42), fwl(41)
=> U450_fwl(41), fwl(40) => U450_fwl(40), fwl(39)
=> U450_fwl(39), fwl(38) => U450_fwl(38), fwl(37)
=> U450_fwl(37), fwl(36) => U450_fwl(36), fwl(35)
=> U450_fwl(35), fwl(34) => U450_fwl(34), fwl(33)
=> U450_fwl(33), fwl(32) => U450_fwl(32), fwl(31)
=> U450_fwl(31), fwl(30) => U450_fwl(30), fwl(29)
=> U450_fwl(29), fwl(28) => U450_fwl(28), fwl(27)
=> U450_fwl(27), fwl(26) => U450_fwl(26), fwl(25)
=> U450_fwl(25), fwl(24) => U450_fwl(24), fwl(23)
=> U450_fwl(23), fwl(22) => U450_fwl(22), fwl(21)
=> U450_fwl(21), fwl(20) => U450_fwl(20), fwl(19)
=> U450_fwl(19), fwl(18) => U450_fwl(18), fwl(17)
=> U450_fwl(17), fwl(16) => U450_fwl(16), fwl(15)
=> U450_fwl(15), fwl(14) => U450_fwl(14), fwl(13)
=> U450_fwl(13), fwl(12) => U450_fwl(12), fwl(11)
=> U450_fwl(11), fwl(10) => U450_fwl(10), fwl(9)
=> U450_fwl(9), fwl(8) => U450_fwl(8), fwl(7) =>
U450_fwl(7), fwl(6) => U450_fwl(6), fwl(5) =>
U450_fwl(5), fwl(4) => U450_fwl(4), fwl(3) =>
U450_fwl(3), fwl(2) => U450_fwl(2), fwl(1) =>
U450_fwl(1), fwl(0) => U450_fwl(0), exen => U465_Z
);

U483: ni01d5
  port map ( I => fsaen, Z => U483_Z );

U481: ni01d3
  port map ( I => f2, Z => U481_Z );

U476: in01d3
  port map ( I => f0, ZN => if0 );

U477: in01d3
  port map ( I => f1, ZN => U477_ZN );

U478: in01d3
  port map ( I => f2, ZN => if2 );

U479: ni01d3
  port map ( I => f0, Z => U479_Z );

U480: ni01d3
  port map ( I => f1, Z => U480_Z );

U484: ni01d5
  port map ( I => disch, Z => U484_Z );

U451: bbuf
  port map ( r(4) => U4904_Z, r(3) => U4903_Z, r(2) => U4902_Z,
        r(1) => U4901_Z, r(0) => U4900_Z, i(71) => bl(71),
```

i(70) => bl(70), i(69) => bl(69), i(68) => bl(68),
i(67) => bl(67), i(66) => bl(66), i(65) => bl(65),
i(64) => bl(64), i(63) => bl(63), i(62) => bl(62),
i(61) => bl(61), i(60) => bl(60), i(59) => bl(59),
i(58) => bl(58), i(57) => bl(57), i(56) => bl(56),
i(55) => bl(55), i(54) => bl(54), i(53) => bl(53),
i(52) => bl(52), i(51) => bl(51), i(50) => bl(50),
i(49) => bl(49), i(48) => bl(48), i(47) => bl(47),
i(46) => bl(46), i(45) => bl(45), i(44) => bl(44),
i(43) => bl(43), i(42) => bl(42), i(41) => bl(41),
i(40) => bl(40), i(39) => bl(39), i(38) => bl(38),
i(37) => bl(37), i(36) => bl(36), i(35) => bl(35),
i(34) => bl(34), i(33) => bl(33), i(32) => bl(32),
i(31) => bl(31), i(30) => bl(30), i(29) => bl(29),
i(28) => bl(28), i(27) => bl(27), i(26) => bl(26),
i(25) => bl(25), i(24) => bl(24), i(23) => bl(23),
i(22) => bl(22), i(21) => bl(21), i(20) => bl(20),
i(19) => bl(19), i(18) => bl(18), i(17) => bl(17),
i(16) => bl(16), i(15) => bl(15), i(14) => bl(14),
i(13) => bl(13), i(12) => bl(12), i(11) => bl(11),
i(10) => bl(10), i(9) => bl(9), i(8) => bl(8),
i(7) => bl(7), i(6) => bl(6), i(5) => bl(5), i(4)
=> bl(4), i(3) => bl(3), i(2) => bl(2), i(1) =>
bl(1), i(0) => bl(0), o(71) => U451_o(71), o(70)
=> U451_o(70), o(69) => U451_o(69), o(68) =>
U451_o(68), o(67) => U451_o(67), o(66) =>
U451_o(66), o(65) => U451_o(65), o(64) =>
U451_o(64), o(63) => U451_o(63), o(62) =>
U451_o(62), o(61) => U451_o(61), o(60) =>
U451_o(60), o(59) => U451_o(59), o(58) =>
U451_o(58), o(57) => U451_o(57), o(56) =>
U451_o(56), o(55) => U451_o(55), o(54) =>
U451_o(54), o(53) => U451_o(53), o(52) =>
U451_o(52), o(51) => U451_o(51), o(50) =>
U451_o(50), o(49) => U451_o(49), o(48) =>
U451_o(48), o(47) => U451_o(47), o(46) =>
U451_o(46), o(45) => U451_o(45), o(44) =>
U451_o(44), o(43) => U451_o(43), o(42) =>
U451_o(42), o(41) => U451_o(41), o(40) =>
U451_o(40), o(39) => U451_o(39), o(38) =>
U451_o(38), o(37) => U451_o(37), o(36) =>
U451_o(36), o(35) => U451_o(35), o(34) =>
U451_o(34), o(33) => U451_o(33), o(32) =>
U451_o(32), o(31) => U451_o(31), o(30) =>
U451_o(30), o(29) => U451_o(29), o(28) =>
U451_o(28), o(27) => U451_o(27), o(26) =>
U451_o(26), o(25) => U451_o(25), o(24) =>
U451_o(24), o(23) => U451_o(23), o(22) =>
U451_o(22), o(21) => U451_o(21), o(20) =>
U451_o(20), o(19) => U451_o(19), o(18) =>
U451_o(18), o(17) => U451_o(17), o(16) =>
U451_o(16), o(15) => U451_o(15), o(14) =>
U451_o(14), o(13) => U451_o(13), o(12) =>
U451_o(12), o(11) => U451_o(11), o(10) =>
U451_o(10), o(9) => U451_o(9), o(8) => U451_o(8),
o(7) => U451_o(7), o(6) => U451_o(6), o(5) =>
U451_o(5), o(4) => U451_o(4), o(3) => U451_o(3),
o(2) => U451_o(2), o(1) => U451_o(1), o(0) =>

```
        => ibl(9), i(8) => ibl(8), i(7) => ibl(7), i(6) =>
        ibl(6), i(5) => ibl(5), i(4) => ibl(4), i(3) =>
        ibl(3), i(2) => ibl(2), i(1) => ibl(1), i(0) =>
        ibl(0), o(71) => U452_o(71), o(70) => U452_o(70),
        o(69) => U452_o(69), o(68) => U452_o(68), o(67) =>
        U452_o(67), o(66) => U452_o(66), o(65) =>
        U452_o(65), o(64) => U452_o(64), o(63) =>
        U452_o(63), o(62) => U452_o(62), o(61) =>
        U452_o(61), o(60) => U452_o(60), o(59) =>
        U452_o(59), o(58) => U452_o(58), o(57) =>
        U452_o(57), o(56) => U452_o(56), o(55) =>
        U452_o(55), o(54) => U452_o(54), o(53) =>
        U452_o(53), o(52) => U452_o(52), o(51) =>
        U452_o(51), o(50) => U452_o(50), o(49) =>
        U452_o(49), o(48) => U452_o(48), o(47) =>
        U452_o(47), o(46) => U452_o(46), o(45) =>
        U452_o(45), o(44) => U452_o(44), o(43) =>
        U452_o(43), o(42) => U452_o(42), o(41) =>
        U452_o(41), o(40) => U452_o(40), o(39) =>
        U452_o(39), o(38) => U452_o(38), o(37) =>
        U452_o(37), o(36) => U452_o(36), o(35) =>
        U452_o(35), o(34) => U452_o(34), o(33) =>
        U452_o(33), o(32) => U452_o(32), o(31) =>
        U452_o(31), o(30) => U452_o(30), o(29) =>
        U452_o(29), o(28) => U452_o(28), o(27) =>
        U452_o(27), o(26) => U452_o(26), o(25) =>
        U452_o(25), o(24) => U452_o(24), o(23) =>
        U452_o(23), o(22) => U452_o(22), o(21) =>
        U452_o(21), o(20) => U452_o(20), o(19) =>
        U452_o(19), o(18) => U452_o(18), o(17) =>
        U452_o(17), o(16) => U452_o(16), o(15) =>
        U452_o(15), o(14) => U452_o(14), o(13) =>
        U452_o(13), o(12) => U452_o(12), o(11) =>
        U452_o(11), o(10) => U452_o(10), o(9) => U452_o(9),
        o(8) => U452_o(8), o(7) => U452_o(7), o(6) =>
        U452_o(6), o(5) => U452_o(5), o(4) => U452_o(4),
        o(3) => U452_o(3), o(2) => U452_o(2), o(1) =>
        U452_o(1), o(0) => U452_o(0) );

U47471: double_buf
  port map ( i => mask(71), o => m(71) );

U47470: double_buf
  port map ( i => mask(70), o => m(70) );

U47469: double_buf
  port map ( i => mask(69), o => m(69) );

U47468: double_buf
  port map ( i => mask(68), o => m(68) );

U47467: double_buf
  port map ( i => mask(67), o => m(67) );

U47466: double_buf
  port map ( i => mask(66), o => m(66) );

U47465: double_buf
```

```
        U451_o(0) );

U488: double_buf
   port map ( i => wenf, o => U488_o );

U463: ni01d5
   port map ( I => rstfifoaddr, Z => U463_Z );

U462: ni01d5
   port map ( I => venb, Z => U462_Z );

U4904: ni01d5
   port map ( I => rd(4), Z => U4904_Z );

U4903: ni01d5
   port map ( I => rd(3), Z => U4903_Z );

U4902: ni01d5
   port map ( I => rd(2), Z => U4902_Z );

U4901: ni01d5
   port map ( I => rd(1), Z => U4901_Z );

U4900: ni01d5
   port map ( I => rd(0), Z => U4900_Z );

U461: ni01d5
   port map ( I => cmp, Z => U461_Z );

U453: ni01d5
   port map ( I => we, Z => U453_Z );

U452: bbuf
   port map ( r(4) => U4904_Z, r(3) => U4903_Z, r(2) => U4902_Z,
        r(1) => U4901_Z, r(0) => U4900_Z, i(71) => ibl(71),
        i(70) => ibl(70), i(69) => ibl(69), i(68) =>
        ibl(68), i(67) => ibl(67), i(66) => ibl(66), i(65)
        => ibl(65), i(64) => ibl(64), i(63) => ibl(63),
        i(62) => ibl(62), i(61) => ibl(61), i(60) =>
        ibl(60), i(59) => ibl(59), i(58) => ibl(58), i(57)
        => ibl(57), i(56) => ibl(56), i(55) => ibl(55),
        i(54) => ibl(54), i(53) => ibl(53), i(52) =>
        ibl(52), i(51) => ibl(51), i(50) => ibl(50), i(49)
        => ibl(49), i(48) => ibl(48), i(47) => ibl(47),
        i(46) => ibl(46), i(45) => ibl(45), i(44) =>
        ibl(44), i(43) => ibl(43), i(42) => ibl(42), i(41)
        => ibl(41), i(40) => ibl(40), i(39) => ibl(39),
        i(38) => ibl(38), i(37) => ibl(37), i(36) =>
        ibl(36), i(35) => ibl(35), i(34) => ibl(34), i(33)
        => ibl(33), i(32) => ibl(32), i(31) => ibl(31),
        i(30) => ibl(30), i(29) => ibl(29), i(28) =>
        ibl(28), i(27) => ibl(27), i(26) => ibl(26), i(25)
        => ibl(25), i(24) => ibl(24), i(23) => ibl(23),
        i(22) => ibl(22), i(21) => ibl(21), i(20) =>
        ibl(20), i(19) => ibl(19), i(18) => ibl(18), i(17)
        => ibl(17), i(16) => ibl(16), i(15) => ibl(15),
        i(14) => ibl(14), i(13) => ibl(13), i(12) =>
        ibl(12), i(11) => ibl(11), i(10) => ibl(10), i(9)
```

```
  port map ( i => mask(65), o => m(65) );

U47464: double_buf
  port map ( i => mask(64), o => m(64) );

U47463: double_buf
  port map ( i => mask(63), o => m(63) );

U47462: double_buf
  port map ( i => mask(62), o => m(62) );

U47461: double_buf
  port map ( i => mask(61), o => m(61) );

U47460: double_buf
  port map ( i => mask(60), o => m(60) );

U47459: double_buf
  port map ( i => mask(59), o => m(59) );

U47458: double_buf
  port map ( i => mask(58), o => m(58) );

U47457: double_buf
  port map ( i => mask(57), o => m(57) );

U47456: double_buf
  port map ( i => mask(56), o => m(56) );

U47455: double_buf
  port map ( i => mask(55), o => m(55) );

U47454: double_buf
  port map ( i => mask(54), o => m(54) );

U47453: double_buf
  port map ( i => mask(53), o => m(53) );

U47452: double_buf
  port map ( i => mask(52), o => m(52) );

U47451: double_buf
  port map ( i => mask(51), o => m(51) );

U47450: double_buf
  port map ( i => mask(50), o => m(50) );

U47449: double_buf
  port map ( i => mask(49), o => m(49) );

U47448: double_buf
  port map ( i => mask(48), o => m(48) );

U47447: double_buf
  port map ( i => mask(47), o => m(47) );

U47446: double_buf
  port map ( i => mask(46), o => m(46) );
```

```
U47445: double_buf
   port map ( i => mask(45), o => m(45) );

U47444: double_buf
   port map ( i => mask(44), o => m(44) );

U47443: double_buf
   port map ( i => mask(43), o => m(43) );

U47442: double_buf
   port map ( i => mask(42), o => m(42) );

U47441: double_buf
   port map ( i => mask(41), o => m(41) );

U47440: double_buf
   port map ( i => mask(40), o => m(40) );

U47439: double_buf
   port map ( i => mask(39), o => m(39) );

U47438: double_buf
   port map ( i => mask(38), o => m(38) );

U47437: double_buf
   port map ( i => mask(37), o => m(37) );

U47436: double_buf
   port map ( i => mask(36), o => m(36) );

U47435: double_buf
   port map ( i => mask(35), o => m(35) );

U47434: double_buf
   port map ( i => mask(34), o => m(34) );

U47433: double_buf
   port map ( i => mask(33), o => m(33) );

U47432: double_buf
   port map ( i => mask(32), o => m(32) );

U47431: double_buf
   port map ( i => mask(31), o => m(31) );

U47430: double_buf
   port map ( i => mask(30), o => m(30) );

U47429: double_buf
   port map ( i => mask(29), o => m(29) );

U47428: double_buf
   port map ( i => mask(28), o => m(28) );

U47427: double_buf
   port map ( i => mask(27), o => m(27) );
```

```
   port map ( i => mask(7), o => m(7) );

U4746: double_buf
   port map ( i => mask(6), o => m(6) );

U4745: double_buf
   port map ( i => mask(5), o => m(5) );

U4744: double_buf
   port map ( i => mask(4), o => m(4) );

U4743: double_buf
   port map ( i => mask(3), o => m(3) );

U4742: double_buf
   port map ( i => mask(2), o => m(2) );

U4741: double_buf
   port map ( i => mask(1), o => m(1) );

U4740: double_buf
   port map ( i => mask(0), o => m(0) );

U460: ni01d5
   port map ( I => prsp, Z => U460_Z );

U459: ni01d5
   port map ( I => setag, Z => U459_Z );

U458: ni01d5
   port map ( I => mux0, Z => U458_Z );

U457: ni01d5
   port map ( I => mux1, Z => U457_Z );

U456: ni01d5
   port map ( I => mux2, Z => U456_Z );

U455: ni01d5
   port map ( I => rstaddr, Z => U455_Z );

so(15) <= so15_local;
so(14) <= so14_local;
so(13) <= so13_local;
so(12) <= so12_local;
so(11) <= so11_local;
so(10) <= so10_local;
so(9) <= so9_local;
so(8) <= so8_local;
so(7) <= so7_local;
so(6) <= so6_local;
so(5) <= so5_local;
so(4) <= so4_local;
so(3) <= so3_local;
so(2) <= so2_local;
so(1) <= so1_local;
so(0) <= sso_local;
no(15) <= nno_local;
```

```
  no(14) <= no14_local;
  no(13) <= no13_local;
  no(12) <= no12_local;
  no(11) <= no11_local;
  no(10) <= no10_local;
  no(9) <= no9_local;
  no(8) <= no8_local;
  no(7) <= no7_local;
  no(6) <= no6_local;
  no(5) <= no5_local;
  no(4) <= no4_local;
  no(3) <= no3_local;
  no(2) <= no2_local;
  no(1) <= no1_local;
  no(0) <= no0_local;
  sso <= sso_local;
  nno <= nno_local;

end col342_l;
```

```
file: COMP_REG.VHD
-- Date of netlist generation: Nov-21-93
------------------------------------------------------------------

library IEEE;
use IEEE.STD_LOGIC_1164.ALL;

library COMPASS_LIB;
use COMPASS_LIB.COMPASS.ALL;

entity comp_reg1 is

   port ( load : in Std_Logic := 'U';
         clk : in Std_Logic := 'U';
         set : in Std_Logic := 'U';
         rst : in Std_Logic := 'U';
         s0 : in Std_Logic := 'U';
         s1 : in Std_Logic := 'U';
         fstrobe : in Std_Logic := 'U';
         f : in Std_Logic_Vector(0 to 2) := (others => 'U');
         d : in Std_Logic_Vector(23 downto 0) := (others => 'U');
         ex : in Std_Logic := 'U';
         vin : in Std_Logic_Vector(23 downto 0) := (others => 'U');

         c : out Std_Logic_Vector(71 downto 0) := (others => 'U');
         nc : out Std_Logic_Vector(71 downto 0) := (others => 'U')
);

end comp_reg1;

------------------------------------------------------------------

architecture comp_reg1 OF comp_reg1 is

   component loadmux
      port ( l3 : in Std_Logic;
            fen : in Std_Logic;
            f : in Std_Logic_Vector(0 to 2) := (others => 'U');

            l5 : out Std_Logic;
            l4 : out Std_Logic;
            l33 : out Std_Logic;
            m3 : out Std_Logic;
            m2 : out Std_Logic;
            m1 : out Std_Logic );
   end component;

   component ff_enb2
      port ( a : in Std_Logic;
            clk : in Std_Logic;
            rst : in Std_Logic;
            ld : in Std_Logic;

            outt : out Std_Logic;
            nout : out Std_Logic );
   end component;
```

```
component demux4x1
   port ( s0 : in Std_Logic;
        s1 : in Std_Logic;
        ld : in Std_Logic;

        l0 : out Std_Logic;
        l1 : out Std_Logic;
        l2 : out Std_Logic );
end component;

component dgen
   port ( d : in Std_Logic;
        r : in Std_Logic;
        s : in Std_Logic;

        do : out Std_Logic );
end component;

component amos
   port ( l2 : in Std_Logic;
        ex : in Std_Logic;
        l1 : in Std_Logic;
        l0 : in Std_Logic;

        p0 : out Std_Logic;
        p1 : out Std_Logic;
        p2 : out Std_Logic );
end component;

signal U78_m1 : Std_Logic;
signal U78_m2 : Std_Logic;
signal U78_m3 : Std_Logic;
signal U78_l33 : Std_Logic;
signal U78_l4 : Std_Logic;
signal U78_l5 : Std_Logic;
signal U417_Z : Std_Logic;
signal U416_Z : Std_Logic;
signal U415_Z : Std_Logic;
signal U414_Z : Std_Logic;
signal U413_Z : Std_Logic;
signal U412_Z : Std_Logic;
signal U411_Z : Std_Logic;
signal U410_Z : Std_Logic;
signal U100_p2 : Std_Logic;
signal U58_l5 : Std_Logic;
signal U427_Z : Std_Logic;
signal U426_Z : Std_Logic;
signal U425_Z : Std_Logic;
signal U424_Z : Std_Logic;
signal U423_Z : Std_Logic;
signal U422_Z : Std_Logic;
signal U421_Z : Std_Logic;
signal U420_Z : Std_Logic;
signal U40_m2 : Std_Logic;
signal U437_Z : Std_Logic;
signal U436_Z : Std_Logic;
signal U435_Z : Std_Logic;
signal U434_Z : Std_Logic;
```

```
signal U433_Z : Std_Logic;
signal U432_Z : Std_Logic;
signal U431_Z : Std_Logic;
signal U430_Z : Std_Logic;
signal U40_m1 : Std_Logic;
signal U58_I4 : Std_Logic;
signal U40_m3 : Std_Logic;
signal U59_m3 : Std_Logic;
signal U58_m1 : Std_Logic;
signal U58_m2 : Std_Logic;
signal U58_m3 : Std_Logic;
signal U58_I33 : Std_Logic;
signal U59_I5 : Std_Logic;
signal U59_m1 : Std_Logic;
signal U59_m2 : Std_Logic;
signal U18_I2 : Std_Logic;
signal I55 : Std_Logic;
signal U40_I4 : Std_Logic;
signal U40_I33 : Std_Logic;
signal U56_I2 : Std_Logic;
signal U56_I1 : Std_Logic;
signal U56_I0 : Std_Logic;
signal U57_I2 : Std_Logic;
signal U57_I1 : Std_Logic;
signal U57_I0 : Std_Logic;
signal U59_I33 : Std_Logic;
signal U59_I4 : Std_Logic;
signal U18_I1 : Std_Logic;
signal U18_I0 : Std_Logic;
signal U123_Z : Std_Logic;
signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal S9 : Std_Logic;
signal U1167_do : Std_Logic;
signal U1166_do : Std_Logic;
signal U1165_do : Std_Logic;
signal U1164_do : Std_Logic;
signal U1163_do : Std_Logic;
signal U1162_do : Std_Logic;
signal U1161_do : Std_Logic;
signal U1160_do : Std_Logic;
signal U84_ZN : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal S17 : Std_Logic;
signal U82_ZN : Std_Logic;
signal U1157_do : Std_Logic;
signal U1156_do : Std_Logic;
```

```
signal U1155_do : Std_Logic;
signal U1154_do : Std_Logic;
signal U1153_do : Std_Logic;
signal U1152_do : Std_Logic;
signal U1151_do : Std_Logic;
signal U1150_do : Std_Logic;
signal U121_Z : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal S25 : Std_Logic;
signal U81_ZN : Std_Logic;
signal U100_p1 : Std_Logic;
signal U100_p0 : Std_Logic;
signal U88_ZN : Std_Logic;
signal U1147_do : Std_Logic;
signal U1146_do : Std_Logic;
signal U1145_do : Std_Logic;
signal U1144_do : Std_Logic;
signal U1143_do : Std_Logic;
signal U1142_do : Std_Logic;
signal U1141_do : Std_Logic;
signal U1140_do : Std_Logic;
signal U120_Z : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
signal S33 : Std_Logic;
signal S34 : Std_Logic;
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal S49 : Std_Logic;
signal U85_ZN : Std_Logic;
signal U119_Z : Std_Logic;
signal U11123_do : Std_Logic;
signal U11122_do : Std_Logic;
signal U11121_do : Std_Logic;
signal U11120_do : Std_Logic;
```

```
signal U11119_do : Std_Logic;
signal U11118_do : Std_Logic;
signal U11117_do : Std_Logic;
signal U11116_do : Std_Logic;
signal U11115_do : Std_Logic;
signal U11114_do : Std_Logic;
signal U11113_do : Std_Logic;
signal U11112_do : Std_Logic;
signal U11111_do : Std_Logic;
signal U11110_do : Std_Logic;
signal U1119_do : Std_Logic;
signal U1118_do : Std_Logic;
signal U1117_do : Std_Logic;
signal U1116_do : Std_Logic;
signal U1115_do : Std_Logic;
signal U1114_do : Std_Logic;
signal U1113_do : Std_Logic;
signal U1112_do : Std_Logic;
signal U1111_do : Std_Logic;
signal U1110_do : Std_Logic;
signal U11223_do : Std_Logic;
signal U11222_do : Std_Logic;
signal U11221_do : Std_Logic;
signal U11220_do : Std_Logic;
signal U11219_do : Std_Logic;
signal U11218_do : Std_Logic;
signal U11217_do : Std_Logic;
signal U11216_do : Std_Logic;
signal U11215_do : Std_Logic;
signal U11214_do : Std_Logic;
signal U11213_do : Std_Logic;
signal U11212_do : Std_Logic;
signal U11211_do : Std_Logic;
signal U11210_do : Std_Logic;
signal U1129_do : Std_Logic;
signal U1128_do : Std_Logic;
signal U1127_do : Std_Logic;
signal U1126_do : Std_Logic;
signal U1125_do : Std_Logic;
signal U1124_do : Std_Logic;
signal U1123_do : Std_Logic;
signal U1122_do : Std_Logic;
signal U1121_do : Std_Logic;
signal U1120_do : Std_Logic;
signal S50 : Std_Logic;
signal S51 : Std_Logic;
signal S52 : Std_Logic;
signal S53 : Std_Logic;
signal S54 : Std_Logic;
signal S55 : Std_Logic;
signal S56 : Std_Logic;
signal S57 : Std_Logic;
signal S58 : Std_Logic;
signal S59 : Std_Logic;
signal S60 : Std_Logic;
signal S61 : Std_Logic;
signal S62 : Std_Logic;
signal S63 : Std_Logic;
```

```
    signal S64 : Std_Logic;
    signal S65 : Std_Logic;
    signal S66 : Std_Logic;
    signal S67 : Std_Logic;
    signal S68 : Std_Logic;
    signal S69 : Std_Logic;
    signal S70 : Std_Logic;
    signal S71 : Std_Logic;
    signal S72 : Std_Logic;
    signal S73 : Std_Logic;
    signal U118_Z : Std_Logic;

begin

  U59: loadmux
    port map ( I3 => U57_I2, fen => VSS, I5 => U59_I5, I4 =>
          U59_I4, I33 => U59_I33, f(0) => f(0), f(1) => f(1),
          f(2) => f(2), m3 => U59_m3, m2 => U59_m2, m1 =>
          U59_m1 );

  U58: loadmux
    port map ( I3 => U56_I2, fen => VSS, I5 => U58_I5, I4 =>
          U58_I4, I33 => U58_I33, f(0) => f(0), f(1) => f(1),
          f(2) => f(2), m3 => U58_m3, m2 => U58_m2, m1 =>
          U58_m1 );

  U1057: ff_enb2
    port map ( a => U120_Z, clk => clk, outt => c(55), rst =>
          ARESET, ld => U1147_do, nout => nc(55) );

  U1056: ff_enb2
    port map ( a => U120_Z, clk => clk, outt => c(54), rst =>
          ARESET, ld => U1146_do, nout => nc(54) );

  U1055: ff_enb2
    port map ( a => U120_Z, clk => clk, outt => c(53), rst =>
          ARESET, ld => U1145_do, nout => nc(53) );

  U1054: ff_enb2
    port map ( a => U120_Z, clk => clk, outt => c(52), rst =>
          ARESET, ld => U1144_do, nout => nc(52) );

  U1053: ff_enb2
    port map ( a => U120_Z, clk => clk, outt => c(51), rst =>
          ARESET, ld => U1143_do, nout => nc(51) );

  U1052: ff_enb2
    port map ( a => U120_Z, clk => clk, outt => c(50), rst =>
          ARESET, ld => U1142_do, nout => nc(50) );

  U1051: ff_enb2
    port map ( a => U120_Z, clk => clk, outt => c(49), rst =>
          ARESET, ld => U1141_do, nout => nc(49) );

  U1050: ff_enb2
    port map ( a => U120_Z, clk => clk, outt => c(48), rst =>
          ARESET, ld => U1140_do, nout => nc(48) );
```

```
U417: mx21d1
   port map ( I0 => d(23), I1 => vin(0), S => U40_m1, Z =>
         U417_Z );

U416: mx21d1
   port map ( I0 => d(22), I1 => vin(1), S => U40_m1, Z =>
         U416_Z );

U415: mx21d1
   port map ( I0 => d(21), I1 => vin(2), S => U40_m1, Z =>
         U415_Z );

U414: mx21d1
   port map ( I0 => d(20), I1 => vin(3), S => U40_m1, Z =>
         U414_Z );

U413: mx21d1
   port map ( I0 => d(19), I1 => vin(4), S => U40_m1, Z =>
         U413_Z );

U412: mx21d1
   port map ( I0 => d(18), I1 => vin(5), S => U40_m1, Z =>
         U412_Z );

U411: mx21d1
   port map ( I0 => d(17), I1 => vin(6), S => U40_m1, Z =>
         U411_Z );

U410: mx21d1
   port map ( I0 => d(16), I1 => vin(7), S => U40_m1, Z =>
         U410_Z );

U437: mx21d1
   port map ( I0 => d(7), I1 => vin(16), S => U40_m3, Z =>
         U437_Z );

U436: mx21d1
   port map ( I0 => d(6), I1 => vin(17), S => U40_m3, Z =>
         U436_Z );

U435: mx21d1
   port map ( I0 => d(5), I1 => vin(18), S => U40_m3, Z =>
         U435_Z );

U434: mx21d1
   port map ( I0 => d(4), I1 => vin(19), S => U40_m3, Z =>
         U434_Z );

U433: mx21d1
   port map ( I0 => d(3), I1 => vin(20), S => U40_m3, Z =>
         U433_Z );

U432: mx21d1
   port map ( I0 => d(2), I1 => vin(21), S => U40_m3, Z =>
         U432_Z );

U431: mx21d1
```

```
   port map ( I0 => d(1), I1 => vin(22), S => U40_m3, Z =>
        U431_Z );

U430: mx21d1
   port map ( I0 => d(0), I1 => vin(23), S => U40_m3, Z =>
        U430_Z );

U427: mx21d1
   port map ( I0 => d(15), I1 => vin(8), S => U40_m2, Z =>
        U427_Z );

U426: mx21d1
   port map ( I0 => d(14), I1 => vin(9), S => U40_m2, Z =>
        U426_Z );

U425: mx21d1
   port map ( I0 => d(13), I1 => vin(10), S => U40_m2, Z =>
        U425_Z );

U424: mx21d1
   port map ( I0 => d(12), I1 => vin(11), S => U40_m2, Z =>
        U424_Z );

U423: mx21d1
   port map ( I0 => d(11), I1 => vin(12), S => U40_m2, Z =>
        U423_Z );

U422: mx21d1
   port map ( I0 => d(10), I1 => vin(13), S => U40_m2, Z =>
        U422_Z );

U421: mx21d1
   port map ( I0 => d(9), I1 => vin(14), S => U40_m2, Z =>
        U421_Z );

U420: mx21d1
   port map ( I0 => d(8), I1 => vin(15), S => U40_m2, Z =>
        U420_Z );

U78: loadmux
   port map ( l3 => U100_p2, fen => VSS, l5 => U78_l5, l4 =>
        U78_l4, l33 => U78_l33, f(0) => f(0), f(1) => f(1),
        f(2) => f(2), m3 => U78_m3, m2 => U78_m2, m1 =>
        U78_m1 );

U40: loadmux
   port map ( l3 => U18_l2, fen => fstrobe, l5 => l55, l4 =>
        U40_l4, l33 => U40_l33, f(0) => f(0), f(1) => f(1),
        f(2) => f(2), m3 => U40_m3, m2 => U40_m2, m1 =>
        U40_m1 );

U57: demux4x1
   port map ( s0 => s0, s1 => s1, l0 => U57_l0, l1 => U57_l1, l2
        => U57_l2, ld => set );

U56: demux4x1
   port map ( s0 => s0, s1 => s1, l0 => U56_l0, l1 => U56_l1, l2
        => U56_l2, ld => rst );
```

```
U18: demux4x1
  port map ( s0 => s0, s1 => s1, I0 => U18_I0, I1 => U18_I1, I2
        => U18_I2, ld => load );

U1027: ff_enb2
  port map ( a => U121_Z, clk => clk, outt => c(63), rst =>
        ARESET, ld => U1157_do, nout => nc(63) );

U1026: ff_enb2
  port map ( a => U121_Z, clk => clk, outt => c(62), rst =>
        ARESET, ld => U1156_do, nout => nc(62) );

U1025: ff_enb2
  port map ( a => U121_Z, clk => clk, outt => c(61), rst =>
        ARESET, ld => U1155_do, nout => nc(61) );

U1024: ff_enb2
  port map ( a => U121_Z, clk => clk, outt => c(60), rst =>
        ARESET, ld => U1154_do, nout => nc(60) );

U1023: ff_enb2
  port map ( a => U121_Z, clk => clk, outt => c(59), rst =>
        ARESET, ld => U1153_do, nout => nc(59) );

U1022: ff_enb2
  port map ( a => U121_Z, clk => clk, outt => c(58), rst =>
        ARESET, ld => U1152_do, nout => nc(58) );

U1021: ff_enb2
  port map ( a => U121_Z, clk => clk, outt => c(57), rst =>
        ARESET, ld => U1151_do, nout => nc(57) );

U1020: ff_enb2
  port map ( a => U121_Z, clk => clk, outt => c(56), rst =>
        ARESET, ld => U1150_do, nout => nc(56) );

U1017: ff_enb2
  port map ( a => U123_Z, clk => clk, outt => c(71), rst =>
        ARESET, ld => U1167_do, nout => nc(71) );

U1016: ff_enb2
  port map ( a => U123_Z, clk => clk, outt => c(70), rst =>
        ARESET, ld => U1166_do, nout => nc(70) );

U1015: ff_enb2
  port map ( a => U123_Z, clk => clk, outt => c(69), rst =>
        ARESET, ld => U1165_do, nout => nc(69) );

U1014: ff_enb2
  port map ( a => U123_Z, clk => clk, outt => c(68), rst =>
        ARESET, ld => U1164_do, nout => nc(68) );

U1013: ff_enb2
  port map ( a => U123_Z, clk => clk, outt => c(67), rst =>
        ARESET, ld => U1163_do, nout => nc(67) );

U1012: ff_enb2
```

```
  port map ( a => U123_Z, clk => clk, outt => c(66), rst =>
        ARESET, ld => U1162_do, nout => nc(66) );

U1011: ff_enb2
  port map ( a => U123_Z, clk => clk, outt => c(65), rst =>
        ARESET, ld => U1161_do, nout => nc(65) );

U1010: ff_enb2
  port map ( a => U123_Z, clk => clk, outt => c(64), rst =>
        ARESET, ld => U1160_do, nout => nc(64) );

U123: or02d1
  port map ( A1 => I55, A2 => U78_I5, Z => U123_Z );

U1167: dgen
  port map ( d => U417_Z, r => U84_ZN, s => U59_I5, do =>
        U1167_do );

U1166: dgen
  port map ( d => U416_Z, r => U84_ZN, s => U59_I5, do =>
        U1166_do );

U1165: dgen
  port map ( d => U415_Z, r => U84_ZN, s => U59_I5, do =>
        U1165_do );

U1164: dgen
  port map ( d => U414_Z, r => U84_ZN, s => U59_I5, do =>
        U1164_do );

U1163: dgen
  port map ( d => U413_Z, r => U84_ZN, s => U59_I5, do =>
        U1163_do );

U1162: dgen
  port map ( d => U412_Z, r => U84_ZN, s => U59_I5, do =>
        U1162_do );

U1161: dgen
  port map ( d => U411_Z, r => U84_ZN, s => U59_I5, do =>
        U1161_do );

U1160: dgen
  port map ( d => U410_Z, r => U84_ZN, s => U59_I5, do =>
        U1160_do );

U84: nr02d1
  port map ( A1 => U58_I5, A2 => U78_I5, ZN => U84_ZN );

U82: nr02d1
  port map ( A1 => U78_I4, A2 => U58_I4, ZN => U82_ZN );

U121: or02d1
  port map ( A1 => U40_I4, A2 => U78_I4, Z => U121_Z );

U1157: dgen
  port map ( d => U427_Z, r => U82_ZN, s => U59_I4, do =>
        U1157_do );
```

```
U1156: dgen
   port map ( d => U426_Z, r => U82_ZN, s => U59_14, do =>
         U1156_do );

U1155: dgen
   port map ( d => U425_Z, r => U82_ZN, s => U59_14, do =>
         U1155_do );

U1154: dgen
   port map ( d => U424_Z, r => U82_ZN, s => U59_14, do =>
         U1154_do );

U1153: dgen
   port map ( d => U423_Z, r => U82_ZN, s => U59_14, do =>
         U1153_do );

U1152: dgen
   port map ( d => U422_Z, r => U82_ZN, s => U59_14, do =>
         U1152_do );

U1151: dgen
   port map ( d => U421_Z, r => U82_ZN, s => U59_14, do =>
         U1151_do );

U1150: dgen
   port map ( d => U420_Z, r => U82_ZN, s => U59_14, do =>
         U1150_do );

U81: nr02d1
   port map ( A1 => U78_133, A2 => U58_133, ZN => U81_ZN );

U10723: ff_enb2
   port map ( a => U118_Z, clk => clk, outt => c(23), rst =>
         ARESET, ld => U11123_do, nout => nc(23) );

U10722: ff_enb2
   port map ( a => U118_Z, clk => clk, outt => c(22), rst =>
         ARESET, ld => U11122_do, nout => nc(22) );

U10721: ff_enb2
   port map ( a => U118_Z, clk => clk, outt => c(21), rst =>
         ARESET, ld => U11121_do, nout => nc(21) );

U10720: ff_enb2
   port map ( a => U118_Z, clk => clk, outt => c(20), rst =>
         ARESET, ld => U11120_do, nout => nc(20) );

U10719: ff_enb2
   port map ( a => U118_Z, clk => clk, outt => c(19), rst =>
         ARESET, ld => U11119_do, nout => nc(19) );

U10718: ff_enb2
   port map ( a => U118_Z, clk => clk, outt => c(18), rst =>
         ARESET, ld => U11118_do, nout => nc(18) );

U10717: ff_enb2
   port map ( a => U118_Z, clk => clk, outt => c(17), rst =>
```

```
        ARESET, ld => U11117_do, nout => nc(17) );

U10716: ff_enb2
   port map ( a => U118_Z, clk => clk, outt => c(16), rst =>
        ARESET, ld => U11116_do, nout => nc(16) );

U10715: ff_enb2
   port map ( a => U118_Z, clk => clk, outt => c(15), rst =>
        ARESET, ld => U11115_do, nout => nc(15) );

U10714: ff_enb2
   port map ( a => U118_Z, clk => clk, outt => c(14), rst =>
        ARESET, ld => U11114_do, nout => nc(14) );

U10713: ff_enb2
   port map ( a => U118_Z, clk => clk, outt => c(13), rst =>
        ARESET, ld => U11113_do, nout => nc(13) );

U10712: ff_enb2
   port map ( a => U118_Z, clk => clk, outt => c(12), rst =>
        ARESET, ld => U11112_do, nout => nc(12) );

U10711: ff_enb2
   port map ( a => U118_Z, clk => clk, outt => c(11), rst =>
        ARESET, ld => U11111_do, nout => nc(11) );

U10710: ff_enb2
   port map ( a => U118_Z, clk => clk, outt => c(10), rst =>
        ARESET, ld => U11110_do, nout => nc(10) );

U1079: ff_enb2
   port map ( a => U118_Z, clk => clk, outt => c(9), rst =>
        ARESET, ld => U1119_do, nout => nc(9) );

U1078: ff_enb2
   port map ( a => U118_Z, clk => clk, outt => c(8), rst =>
        ARESET, ld => U1118_do, nout => nc(8) );

U1077: ff_enb2
   port map ( a => U118_Z, clk => clk, outt => c(7), rst =>
        ARESET, ld => U1117_do, nout => nc(7) );

U1076: ff_enb2
   port map ( a => U118_Z, clk => clk, outt => c(6), rst =>
        ARESET, ld => U1116_do, nout => nc(6) );

U1075: ff_enb2
   port map ( a => U118_Z, clk => clk, outt => c(5), rst =>
        ARESET, ld => U1115_do, nout => nc(5) );

U1074: ff_enb2
   port map ( a => U118_Z, clk => clk, outt => c(4), rst =>
        ARESET, ld => U1114_do, nout => nc(4) );

U1073: ff_enb2
   port map ( a => U118_Z, clk => clk, outt => c(3), rst =>
        ARESET, ld => U1113_do, nout => nc(3) );
```

```
U1072: ff_enb2
   port map ( a => U118_Z, clk => clk, outt => c(2), rst =>
         ARESET, ld => U1112_do, nout => nc(2) );

U1071: ff_enb2
   port map ( a => U118_Z, clk => clk, outt => c(1), rst =>
         ARESET, ld => U1111_do, nout => nc(1) );

U1070: ff_enb2
   port map ( a => U118_Z, clk => clk, outt => c(0), rst =>
         ARESET, ld => U1110_do, nout => nc(0) );

U10823: ff_enb2
   port map ( a => U119_Z, clk => clk, outt => c(47), rst =>
         ARESET, ld => U11223_do, nout => nc(47) );

U10822: ff_enb2
   port map ( a => U119_Z, clk => clk, outt => c(46), rst =>
         ARESET, ld => U11222_do, nout => nc(46) );

U10821: ff_enb2
   port map ( a => U119_Z, clk => clk, outt => c(45), rst =>
         ARESET, ld => U11221_do, nout => nc(45) );

U10820: ff_enb2
   port map ( a => U119_Z, clk => clk, outt => c(44), rst =>
         ARESET, ld => U11220_do, nout => nc(44) );

U10819: ff_enb2
   port map ( a => U119_Z, clk => clk, outt => c(43), rst =>
         ARESET, ld => U11219_do, nout => nc(43) );

U10818: ff_enb2
   port map ( a => U119_Z, clk => clk, outt => c(42), rst =>
         ARESET, ld => U11218_do, nout => nc(42) );

U10817: ff_enb2
   port map ( a => U119_Z, clk => clk, outt => c(41), rst =>
         ARESET, ld => U11217_do, nout => nc(41) );

U10816: ff_enb2
   port map ( a => U119_Z, clk => clk, outt => c(40), rst =>
         ARESET, ld => U11216_do, nout => nc(40) );

U10815: ff_enb2
   port map ( a => U119_Z, clk => clk, outt => c(39), rst =>
         ARESET, ld => U11215_do, nout => nc(39) );

U10814: ff_enb2
   port map ( a => U119_Z, clk => clk, outt => c(38), rst =>
         ARESET, ld => U11214_do, nout => nc(38) );

U10813: ff_enb2
   port map ( a => U119_Z, clk => clk, outt => c(37), rst =>
         ARESET, ld => U11213_do, nout => nc(37) );

U10812: ff_enb2
   port map ( a => U119_Z, clk => clk, outt => c(36), rst =>
```

```
        ARESET, ld => U11212_do, nout => nc(36) );
U10811: ff_enb2
  port map ( a => U119_Z, clk => clk, outt => c(35), rst =>
        ARESET, ld => U11211_do, nout => nc(35) );
U10810: ff_enb2
  port map ( a => U119_Z, clk => clk, outt => c(34), rst =>
        ARESET, ld => U11210_do, nout => nc(34) );
U1089: ff_enb2
  port map ( a => U119_Z, clk => clk, outt => c(33), rst =>
        ARESET, ld => U1129_do, nout => nc(33) );
U1088: ff_enb2
  port map ( a => U119_Z, clk => clk, outt => c(32), rst =>
        ARESET, ld => U1128_do, nout => nc(32) );
U1087: ff_enb2
  port map ( a => U119_Z, clk => clk, outt => c(31), rst =>
        ARESET, ld => U1127_do, nout => nc(31) );
U1086: ff_enb2
  port map ( a => U119_Z, clk => clk, outt => c(30), rst =>
        ARESET, ld => U1126_do, nout => nc(30) );
U1085: ff_enb2
  port map ( a => U119_Z, clk => clk, outt => c(29), rst =>
        ARESET, ld => U1125_do, nout => nc(29) );
U1084: ff_enb2
  port map ( a => U119_Z, clk => clk, outt => c(28), rst =>
        ARESET, ld => U1124_do, nout => nc(28) );
U1083: ff_enb2
  port map ( a => U119_Z, clk => clk, outt => c(27), rst =>
        ARESET, ld => U1123_do, nout => nc(27) );
U1082: ff_enb2
  port map ( a => U119_Z, clk => clk, outt => c(26), rst =>
        ARESET, ld => U1122_do, nout => nc(26) );
U1081: ff_enb2
  port map ( a => U119_Z, clk => clk, outt => c(25), rst =>
        ARESET, ld => U1121_do, nout => nc(25) );
U1080: ff_enb2
  port map ( a => U119_Z, clk => clk, outt => c(24), rst =>
        ARESET, ld => U1120_do, nout => nc(24) );
U118: or02d1
  port map ( A1 => U18_l0, A2 => U100_p0, Z => U118_Z );
U11123: dgen
  port map ( d => d(23), r => U85_ZN, s => U57_l0, do =>
        U11123_do );
U11122: dgen
```

```
    port map ( d => d(22), r => U85_ZN, s => U57_I0, do =>
            U11122_do );

U11121: dgen
    port map ( d => d(21), r => U85_ZN, s => U57_I0, do =>
            U11121_do );

U11120: dgen
    port map ( d => d(20), r => U85_ZN, s => U57_I0, do =>
            U11120_do );

U11119: dgen
    port map ( d => d(19), r => U85_ZN, s => U57_I0, do =>
            U11119_do );

U11118: dgen
    port map ( d => d(18), r => U85_ZN, s => U57_I0, do =>
            U11118_do );

U11117: dgen
    port map ( d => d(17), r => U85_ZN, s => U57_I0, do =>
            U11117_do );

U11116: dgen
    port map ( d => d(16), r => U85_ZN, s => U57_I0, do =>
            U11116_do );

U11115: dgen
    port map ( d => d(15), r => U85_ZN, s => U57_I0, do =>
            U11115_do );

U11114: dgen
    port map ( d => d(14), r => U85_ZN, s => U57_I0, do =>
            U11114_do );

U11113: dgen
    port map ( d => d(13), r => U85_ZN, s => U57_I0, do =>
            U11113_do );

U11112: dgen
    port map ( d => d(12), r => U85_ZN, s => U57_I0, do =>
            U11112_do );

U11111: dgen
    port map ( d => d(11), r => U85_ZN, s => U57_I0, do =>
            U11111_do );

U11110: dgen
    port map ( d => d(10), r => U85_ZN, s => U57_I0, do =>
            U11110_do );

U1119: dgen
    port map ( d => d(9), r => U85_ZN, s => U57_I0, do =>
            U1119_do );

U1118: dgen
    port map ( d => d(8), r => U85_ZN, s => U57_I0, do =>
            U1118_do );
```

```
U1117: dgen
   port map ( d => d(7), r => U85_ZN, s => U57_l0, do =>
        U1117_do );

U1116: dgen
   port map ( d => d(6), r => U85_ZN, s => U57_l0, do =>
        U1116_do );

U1115: dgen
   port map ( d => d(5), r => U85_ZN, s => U57_l0, do =>
        U1115_do );

U1114: dgen
   port map ( d => d(4), r => U85_ZN, s => U57_l0, do =>
        U1114_do );

U1113: dgen
   port map ( d => d(3), r => U85_ZN, s => U57_l0, do =>
        U1113_do );

U1112: dgen
   port map ( d => d(2), r => U85_ZN, s => U57_l0, do =>
        U1112_do );

U1111: dgen
   port map ( d => d(1), r => U85_ZN, s => U57_l0, do =>
        U1111_do );

U1110: dgen
   port map ( d => d(0), r => U85_ZN, s => U57_l0, do =>
        U1110_do );

U120: or02d1
   port map ( A1 => U40_l33, A2 => U78_l33, Z => U120_Z );

U119: or02d1
   port map ( A1 => U18_l1, A2 => U100_p1, Z => U119_Z );

U85: nr02d1
   port map ( A1 => U100_p0, A2 => U56_l0, ZN => U85_ZN );

U88: nr02d1
   port map ( A1 => U100_p1, A2 => U56_l1, ZN => U88_ZN );

U11223: dgen
   port map ( d => d(23), r => U88_ZN, s => U57_l1, do =>
        U11223_do );

U11222: dgen
   port map ( d => d(22), r => U88_ZN, s => U57_l1, do =>
        U11222_do );

U11221: dgen
   port map ( d => d(21), r => U88_ZN, s => U57_l1, do =>
        U11221_do );

U11220: dgen
```

```
   port map ( d => d(20), r => U88_ZN, s => U57_I1, do =>
         U11220_do );

U11219: dgen
   port map ( d => d(19), r => U88_ZN, s => U57_I1, do =>
         U11219_do );

U11218: dgen
   port map ( d => d(18), r => U88_ZN, s => U57_I1, do =>
         U11218_do );

U11217: dgen
   port map ( d => d(17), r => U88_ZN, s => U57_I1, do =>
         U11217_do );

U11216: dgen
   port map ( d => d(16), r => U88_ZN, s => U57_I1, do =>
         U11216_do );

U11215: dgen
   port map ( d => d(15), r => U88_ZN, s => U57_I1, do =>
         U11215_do );

U11214: dgen
   port map ( d => d(14), r => U88_ZN, s => U57_I1, do =>
         U11214_do );

U11213: dgen
   port map ( d => d(13), r => U88_ZN, s => U57_I1, do =>
         U11213_do );

U11212: dgen
   port map ( d => d(12), r => U88_ZN, s => U57_I1, do =>
         U11212_do );

U11211: dgen
   port map ( d => d(11), r => U88_ZN, s => U57_I1, do =>
         U11211_do );

U11210: dgen
   port map ( d => d(10), r => U88_ZN, s => U57_I1, do =>
         U11210_do );

U1129: dgen
   port map ( d => d(9), r => U88_ZN, s => U57_I1, do =>
         U1129_do );

U1128: dgen
   port map ( d => d(8), r => U88_ZN, s => U57_I1, do =>
         U1128_do );

U1127: dgen
   port map ( d => d(7), r => U88_ZN, s => U57_I1, do =>
         U1127_do );

U1126: dgen
   port map ( d => d(6), r => U88_ZN, s => U57_I1, do =>
         U1126_do );
```

```
U1125: dgen
   port map ( d => d(5), r => U88_ZN, s => U57_I1, do =>
         U1125_do );

U1124: dgen
   port map ( d => d(4), r => U88_ZN, s => U57_I1, do =>
         U1124_do );

U1123: dgen
   port map ( d => d(3), r => U88_ZN, s => U57_I1, do =>
         U1123_do );

U1122: dgen
   port map ( d => d(2), r => U88_ZN, s => U57_I1, do =>
         U1122_do );

U1121: dgen
   port map ( d => d(1), r => U88_ZN, s => U57_I1, do =>
         U1121_do );

U1120: dgen
   port map ( d => d(0), r => U88_ZN, s => U57_I1, do =>
         U1120_do );

U1147: dgen
   port map ( d => U437_Z, r => U81_ZN, s => U59_I33, do =>
         U1147_do );

U1146: dgen
   port map ( d => U436_Z, r => U81_ZN, s => U59_I33, do =>
         U1146_do );

U1145: dgen
   port map ( d => U435_Z, r => U81_ZN, s => U59_I33, do =>
         U1145_do );

U1144: dgen
   port map ( d => U434_Z, r => U81_ZN, s => U59_I33, do =>
         U1144_do );

U1143: dgen
   port map ( d => U433_Z, r => U81_ZN, s => U59_I33, do =>
         U1143_do );

U1142: dgen
   port map ( d => U432_Z, r => U81_ZN, s => U59_I33, do =>
         U1142_do );

U1141: dgen
   port map ( d => U431_Z, r => U81_ZN, s => U59_I33, do =>
         U1141_do );

U1140: dgen
   port map ( d => U430_Z, r => U81_ZN, s => U59_I33, do =>
         U1140_do );

U100: amos
```

```
port map ( p0 => U100_p0, p1 => U100_p1, p2 => U100_p2, I2 =>
        U18_I2, ex => ex, I1 => U18_I1, I0 => U18_I0 );

end comp_reg1;
```

```
file: COMPMUX5.VHD
-- Date of netlist generation:  Nov-19-93

----------------------------------------------------------------------

library IEEE;
use IEEE.STD_LOGIC_1164.ALL;

library COMPASS_LIB;
use COMPASS_LIB.COMPASS.ALL;

entity compmux5 is


   port ( rdf : in Std_Logic := 'U';
        cvf : in Std_Logic := 'U';
        mask : in Std_Logic_Vector(71 downto 0) := (others => 'U');
        ncomp : in Std_Logic_Vector(71 downto 0) := (others =>
'U');
        ncbf : in Std_Logic := 'U';
        cmp : in Std_Logic := 'U';
        cva : in Std_Logic := 'U';
        rda : in Std_Logic := 'U';
        ncba : in Std_Logic := 'U';
        f : in Std_Logic_Vector(0 to 2) := (others => 'U');
        comp : in Std_Logic_Vector(71 downto 0) := (others => 'U');
        cmpf : in Std_Logic := 'U';

        bl : out Std_Logic_Vector(71 downto 0) := (others => 'U');
        rdd : out Std_Logic_Vector(4 downto 0) := (others => 'U')
);

end compmux5;

----------------------------------------------------------------------

architecture compmux5 OF compmux5 is


   component fiarmux
      port ( fsig : in Std_Logic_Vector(5 downto 0) := (others =>
'U');
           arsig : in Std_Logic_Vector(5 downto 0) := (others =>
'U');
           f : in Std_Logic_Vector(0 to 2) := (others => 'U');

           sig3 : out Std_Logic_Vector(5 downto 0) := (others =>
'U');
```

```
        sig2 : out Std_Logic_Vector(5 downto 0) := (others =>
'U');
        sig1 : out Std_Logic_Vector(5 downto 0) := (others =>
'U');
        m1 : out Std_Logic;
        m2 : out Std_Logic;
        m3 : out Std_Logic );
  end component;

  signal rd : Std_Logic_Vector(4 downto 1);
  signal S1 : Std_Logic;
  signal S2 : Std_Logic;
  signal U125_m3 : Std_Logic;
  signal U3727_Q : Std_Logic;
  signal U3726_Q : Std_Logic;
  signal U3725_Q : Std_Logic;
  signal U3724_Q : Std_Logic;
  signal U3723_Q : Std_Logic;
  signal U3722_Q : Std_Logic;
  signal U3721_Q : Std_Logic;
  signal U3720_Q : Std_Logic;
  signal S3 : Std_Logic;
  signal S4 : Std_Logic;
  signal S5 : Std_Logic;
  signal S6 : Std_Logic;
  signal S7 : Std_Logic;
  signal S8 : Std_Logic;
  signal S9 : Std_Logic;
  signal S10 : Std_Logic;
  signal U3727_QN : Std_Logic;
  signal U3726_QN : Std_Logic;
  signal U3725_QN : Std_Logic;
  signal U3724_QN : Std_Logic;
  signal U3723_QN : Std_Logic;
  signal U3722_QN : Std_Logic;
  signal U3721_QN : Std_Logic;
  signal U3720_QN : Std_Logic;
  signal S11 : Std_Logic;
  signal S12 : Std_Logic;
  signal S13 : Std_Logic;
  signal S14 : Std_Logic;
  signal S15 : Std_Logic;
  signal S16 : Std_Logic;
  signal S17 : Std_Logic;
  signal S18 : Std_Logic;
  signal U125_m2 : Std_Logic;
  signal U125_m1 : Std_Logic;
  signal S19 : Std_Logic;
  signal S20 : Std_Logic;
  signal U3687_ZN : Std_Logic;
  signal U3686_ZN : Std_Logic;
```

```
signal U3685_ZN : Std_Logic;
signal U3684_ZN : Std_Logic;
signal U3683_ZN : Std_Logic;
signal U3682_ZN : Std_Logic;
signal U3681_ZN : Std_Logic;
signal U3680_ZN : Std_Logic;
signal U3717_Q : Std_Logic;
signal U3716_Q : Std_Logic;
signal U3715_Q : Std_Logic;
signal U3714_Q : Std_Logic;
signal U3713_Q : Std_Logic;
signal U3712_Q : Std_Logic;
signal U3711_Q : Std_Logic;
signal U3710_Q : Std_Logic;
signal yo : Std_Logic_Vector(71 downto 64);
signal U3717_QN : Std_Logic;
signal U3716_QN : Std_Logic;
signal U3715_QN : Std_Logic;
signal U3714_QN : Std_Logic;
signal U3713_QN : Std_Logic;
signal U3712_QN : Std_Logic;
signal U3711_QN : Std_Logic;
signal U3710_QN : Std_Logic;
signal U3647_Z : Std_Logic;
signal U3646_Z : Std_Logic;
signal U3645_Z : Std_Logic;
signal U3644_Z : Std_Logic;
signal U3643_Z : Std_Logic;
signal U3642_Z : Std_Logic;
signal U3641_Z : Std_Logic;
signal U3640_Z : Std_Logic;
signal U3847_Z : Std_Logic;
signal U3846_Z : Std_Logic;
signal U3845_Z : Std_Logic;
signal U3844_Z : Std_Logic;
signal U3843_Z : Std_Logic;
signal U3842_Z : Std_Logic;
signal U3841_Z : Std_Logic;
signal U3840_Z : Std_Logic;
signal S21 : Std_Logic;
signal S22 : Std_Logic;
signal S23 : Std_Logic;
signal S24 : Std_Logic;
signal S25 : Std_Logic;
signal S26 : Std_Logic;
signal S27 : Std_Logic;
signal S28 : Std_Logic;
signal U3777_Z : Std_Logic;
signal U3776_Z : Std_Logic;
signal U3775_Z : Std_Logic;
signal U3774_Z : Std_Logic;
signal U3773_Z : Std_Logic;
signal U3772_Z : Std_Logic;
signal U3771_Z : Std_Logic;
signal U3770_Z : Std_Logic;
signal U3827_Z : Std_Logic;
signal U3826_Z : Std_Logic;
signal U3825_Z : Std_Logic;
```

```
signal U3824_Z : Std_Logic;
signal U3823_Z : Std_Logic;
signal U3822_Z : Std_Logic;
signal U3821_Z : Std_Logic;
signal U3820_Z : Std_Logic;
signal U3677_ZN : Std_Logic;
signal U3676_ZN : Std_Logic;
signal U3675_ZN : Std_Logic;
signal U3674_ZN : Std_Logic;
signal U3673_ZN : Std_Logic;
signal U3672_ZN : Std_Logic;
signal U3671_ZN : Std_Logic;
signal U3670_ZN : Std_Logic;
signal U3817_Z : Std_Logic;
signal U3816_Z : Std_Logic;
signal U3815_Z : Std_Logic;
signal U3814_Z : Std_Logic;
signal U3813_Z : Std_Logic;
signal U3812_Z : Std_Logic;
signal U3811_Z : Std_Logic;
signal U3810_Z : Std_Logic;
signal U3837_Z : Std_Logic;
signal U3836_Z : Std_Logic;
signal U3835_Z : Std_Logic;
signal U3834_Z : Std_Logic;
signal U3833_Z : Std_Logic;
signal U3832_Z : Std_Logic;
signal U3831_Z : Std_Logic;
signal U3830_Z : Std_Logic;
signal U3767_Z : Std_Logic;
signal U3766_Z : Std_Logic;
signal U3765_Z : Std_Logic;
signal U3764_Z : Std_Logic;
signal U3763_Z : Std_Logic;
signal U3762_Z : Std_Logic;
signal U3761_Z : Std_Logic;
signal U3760_Z : Std_Logic;
signal S29 : Std_Logic;
signal S30 : Std_Logic;
signal S31 : Std_Logic;
signal S32 : Std_Logic;
signal S33 : Std_Logic;
signal S34 : Std_Logic;
signal S35 : Std_Logic;
signal S36 : Std_Logic;
signal U3697_ZN : Std_Logic;
signal U3696_ZN : Std_Logic;
signal U3695_ZN : Std_Logic;
signal U3694_ZN : Std_Logic;
signal U3693_ZN : Std_Logic;
signal U3692_ZN : Std_Logic;
signal U3691_ZN : Std_Logic;
signal U3690_ZN : Std_Logic;
signal U3667_Z : Std_Logic;
signal U3666_Z : Std_Logic;
signal U3665_Z : Std_Logic;
signal U3664_Z : Std_Logic;
signal U3663_Z : Std_Logic;
```

```
signal U3662_Z : Std_Logic;
signal U3661_Z : Std_Logic;
signal U3660_Z : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal S49 : Std_Logic;
signal S50 : Std_Logic;
signal S51 : Std_Logic;
signal S52 : Std_Logic;
signal U3807_Z : Std_Logic;
signal U3806_Z : Std_Logic;
signal U3805_Z : Std_Logic;
signal U3804_Z : Std_Logic;
signal U3803_Z : Std_Logic;
signal U3802_Z : Std_Logic;
signal U3801_Z : Std_Logic;
signal U3800_Z : Std_Logic;
signal U3707_QN : Std_Logic;
signal U3706_QN : Std_Logic;
signal U3705_QN : Std_Logic;
signal U3704_QN : Std_Logic;
signal U3703_QN : Std_Logic;
signal U3702_QN : Std_Logic;
signal U3701_QN : Std_Logic;
signal U3700_QN : Std_Logic;
signal U3707_Q : Std_Logic;
signal U3706_Q : Std_Logic;
signal U3705_Q : Std_Logic;
signal U3704_Q : Std_Logic;
signal U3703_Q : Std_Logic;
signal U3702_Q : Std_Logic;
signal U3701_Q : Std_Logic;
signal U3700_Q : Std_Logic;
signal U3797_Z : Std_Logic;
signal U3796_Z : Std_Logic;
signal U3795_Z : Std_Logic;
signal U3794_Z : Std_Logic;
signal U3793_Z : Std_Logic;
signal U3792_Z : Std_Logic;
signal U3791_Z : Std_Logic;
signal U3790_Z : Std_Logic;
signal U3787_Z : Std_Logic;
signal U3786_Z : Std_Logic;
signal U3785_Z : Std_Logic;
signal U3784_Z : Std_Logic;
signal U3783_Z : Std_Logic;
signal U3782_Z : Std_Logic;
signal U3781_Z : Std_Logic;
```

```
signal U3780_Z : Std_Logic;
signal S53 : Std_Logic;
signal U2817_ZN : Std_Logic;
signal U2816_ZN : Std_Logic;
signal U2815_ZN : Std_Logic;
signal U2814_ZN : Std_Logic;
signal U2813_ZN : Std_Logic;
signal U2812_ZN : Std_Logic;
signal U2811_ZN : Std_Logic;
signal U2810_ZN : Std_Logic;
signal b : Std_Logic_Vector(71 downto 64);
signal a : Std_Logic_Vector(71 downto 64);
signal U349_Z : Std_Logic;
signal s : Std_Logic_Vector(5 downto 0);
signal U350_Z : Std_Logic;
signal fs : Std_Logic_Vector(5 downto 1);
signal S54 : Std_Logic;
signal S55 : Std_Logic;
signal S56 : Std_Logic;
signal q : Std_Logic_Vector(5 downto 0);
signal p : Std_Logic_Vector(5 downto 0);
signal as : Std_Logic_Vector(5 downto 0);
signal S57 : Std_Logic;
signal c : Std_Logic_Vector(71 downto 64);
signal U2807_ZN : Std_Logic;
signal U2806_ZN : Std_Logic;
signal U2805_ZN : Std_Logic;
signal U2804_ZN : Std_Logic;
signal U2803_ZN : Std_Logic;
signal U2802_ZN : Std_Logic;
signal U2801_ZN : Std_Logic;
signal U2800_ZN : Std_Logic;
signal U2597_ZN : Std_Logic;
signal U2596_ZN : Std_Logic;
signal U2595_ZN : Std_Logic;
signal U2594_ZN : Std_Logic;
signal U2593_ZN : Std_Logic;
signal U2592_ZN : Std_Logic;
signal U2591_ZN : Std_Logic;
signal U2590_ZN : Std_Logic;
signal U2797_ZN : Std_Logic;
signal U2796_ZN : Std_Logic;
signal U2795_ZN : Std_Logic;
signal U2794_ZN : Std_Logic;
signal U2793_ZN : Std_Logic;
signal U2792_ZN : Std_Logic;
signal U2791_ZN : Std_Logic;
signal U2790_ZN : Std_Logic;
signal U2647_ZN : Std_Logic;
signal U2646_ZN : Std_Logic;
signal U2645_ZN : Std_Logic;
signal U2644_ZN : Std_Logic;
signal U2643_ZN : Std_Logic;
signal U2642_ZN : Std_Logic;
signal U2641_ZN : Std_Logic;
signal U2640_ZN : Std_Logic;
signal U2637_ZN : Std_Logic;
signal U2636_ZN : Std_Logic;
```

```
signal U2635_ZN : Std_Logic;
signal U2634_ZN : Std_Logic;
signal U2633_ZN : Std_Logic;
signal U2632_ZN : Std_Logic;
signal U2631_ZN : Std_Logic;
signal U2630_ZN : Std_Logic;
signal U2787_ZN : Std_Logic;
signal U2786_ZN : Std_Logic;
signal U2785_ZN : Std_Logic;
signal U2784_ZN : Std_Logic;
signal U2783_ZN : Std_Logic;
signal U2782_ZN : Std_Logic;
signal U2781_ZN : Std_Logic;
signal U2780_ZN : Std_Logic;
signal U348_Z : Std_Logic;
signal U347_Z : Std_Logic;
signal U2657_ZN : Std_Logic;
signal U2656_ZN : Std_Logic;
signal U2655_ZN : Std_Logic;
signal U2654_ZN : Std_Logic;
signal U2653_ZN : Std_Logic;
signal U2652_ZN : Std_Logic;
signal U2651_ZN : Std_Logic;
signal U2650_ZN : Std_Logic;
signal U2667_ZN : Std_Logic;
signal U2666_ZN : Std_Logic;
signal U2665_ZN : Std_Logic;
signal U2664_ZN : Std_Logic;
signal U2663_ZN : Std_Logic;
signal U2662_ZN : Std_Logic;
signal U2661_ZN : Std_Logic;
signal U2660_ZN : Std_Logic;
signal U2587_ZN : Std_Logic;
signal U2586_ZN : Std_Logic;
signal U2585_ZN : Std_Logic;
signal U2584_ZN : Std_Logic;
signal U2583_ZN : Std_Logic;
signal U2582_ZN : Std_Logic;
signal U2581_ZN : Std_Logic;
signal U2580_ZN : Std_Logic;
signal U346_Z : Std_Logic;
signal U345_Z : Std_Logic;
signal U2767_ZN : Std_Logic;
signal U2766_ZN : Std_Logic;
signal U2765_ZN : Std_Logic;
signal U2764_ZN : Std_Logic;
signal U2763_ZN : Std_Logic;
signal U2762_ZN : Std_Logic;
signal U2761_ZN : Std_Logic;
signal U2760_ZN : Std_Logic;
signal U2757_ZN : Std_Logic;
signal U2756_ZN : Std_Logic;
signal U2755_ZN : Std_Logic;
signal U2754_ZN : Std_Logic;
signal U2753_ZN : Std_Logic;
signal U2752_ZN : Std_Logic;
signal U2751_ZN : Std_Logic;
signal U2750_ZN : Std_Logic;
```

```
signal U28623_ZN : Std_Logic;
signal U28622_ZN : Std_Logic;
signal U28621_ZN : Std_Logic;
signal U28620_ZN : Std_Logic;
signal U28619_ZN : Std_Logic;
signal U28618_ZN : Std_Logic;
signal U28617_ZN : Std_Logic;
signal U28616_ZN : Std_Logic;
signal U28615_ZN : Std_Logic;
signal U28614_ZN : Std_Logic;
signal U28613_ZN : Std_Logic;
signal U28612_ZN : Std_Logic;
signal U28611_ZN : Std_Logic;
signal U28610_ZN : Std_Logic;
signal U2869_ZN : Std_Logic;
signal U2868_ZN : Std_Logic;
signal U2867_ZN : Std_Logic;
signal U2866_ZN : Std_Logic;
signal U2865_ZN : Std_Logic;
signal U2864_ZN : Std_Logic;
signal U2863_ZN : Std_Logic;
signal U2862_ZN : Std_Logic;
signal U2861_ZN : Std_Logic;
signal U2860_ZN : Std_Logic;
signal U28523_ZN : Std_Logic;
signal U28522_ZN : Std_Logic;
signal U28521_ZN : Std_Logic;
signal U28520_ZN : Std_Logic;
signal U28519_ZN : Std_Logic;
signal U28518_ZN : Std_Logic;
signal U28517_ZN : Std_Logic;
signal U28516_ZN : Std_Logic;
signal U28515_ZN : Std_Logic;
signal U28514_ZN : Std_Logic;
signal U28513_ZN : Std_Logic;
signal U28512_ZN : Std_Logic;
signal U28511_ZN : Std_Logic;
signal U28510_ZN : Std_Logic;
signal U2859_ZN : Std_Logic;
signal U2858_ZN : Std_Logic;
signal U2857_ZN : Std_Logic;
signal U2856_ZN : Std_Logic;
signal U2855_ZN : Std_Logic;
signal U2854_ZN : Std_Logic;
signal U2853_ZN : Std_Logic;
signal U2852_ZN : Std_Logic;
signal U2851_ZN : Std_Logic;
signal U2850_ZN : Std_Logic;
signal U27423_ZN : Std_Logic;
signal U27422_ZN : Std_Logic;
signal U27421_ZN : Std_Logic;
signal U27420_ZN : Std_Logic;
signal U27419_ZN : Std_Logic;
signal U27418_ZN : Std_Logic;
signal U27417_ZN : Std_Logic;
signal U27416_ZN : Std_Logic;
signal U27415_ZN : Std_Logic;
signal U27414_ZN : Std_Logic;
```

```
signal U27413_ZN : Std_Logic;
signal U27412_ZN : Std_Logic;
signal U27411_ZN : Std_Logic;
signal U27410_ZN : Std_Logic;
signal U2749_ZN : Std_Logic;
signal U2748_ZN : Std_Logic;
signal U2747_ZN : Std_Logic;
signal U2746_ZN : Std_Logic;
signal U2745_ZN : Std_Logic;
signal U2744_ZN : Std_Logic;
signal U2743_ZN : Std_Logic;
signal U2742_ZN : Std_Logic;
signal U2741_ZN : Std_Logic;
signal U2740_ZN : Std_Logic;
signal U27323_ZN : Std_Logic;
signal U27322_ZN : Std_Logic;
signal U27321_ZN : Std_Logic;
signal U27320_ZN : Std_Logic;
signal U27319_ZN : Std_Logic;
signal U27318_ZN : Std_Logic;
signal U27317_ZN : Std_Logic;
signal U27316_ZN : Std_Logic;
signal U27315_ZN : Std_Logic;
signal U27314_ZN : Std_Logic;
signal U27313_ZN : Std_Logic;
signal U27312_ZN : Std_Logic;
signal U27311_ZN : Std_Logic;
signal U27310_ZN : Std_Logic;
signal U2739_ZN : Std_Logic;
signal U2738_ZN : Std_Logic;
signal U2737_ZN : Std_Logic;
signal U2736_ZN : Std_Logic;
signal U2735_ZN : Std_Logic;
signal U2734_ZN : Std_Logic;
signal U2733_ZN : Std_Logic;
signal U2732_ZN : Std_Logic;
signal U2731_ZN : Std_Logic;
signal U2730_ZN : Std_Logic;
signal U26723_ZN : Std_Logic;
signal U26722_ZN : Std_Logic;
signal U26721_ZN : Std_Logic;
signal U26720_ZN : Std_Logic;
signal U26719_ZN : Std_Logic;
signal U26718_ZN : Std_Logic;
signal U26717_ZN : Std_Logic;
signal U26716_ZN : Std_Logic;
signal U26715_ZN : Std_Logic;
signal U26714_ZN : Std_Logic;
signal U26713_ZN : Std_Logic;
signal U26712_ZN : Std_Logic;
signal U26711_ZN : Std_Logic;
signal U26710_ZN : Std_Logic;
signal U2679_ZN : Std_Logic;
signal U2678_ZN : Std_Logic;
signal U2677_ZN : Std_Logic;
signal U2676_ZN : Std_Logic;
signal U2675_ZN : Std_Logic;
signal U2674_ZN : Std_Logic;
```

```
signal U2673_ZN : Std_Logic;
signal U2672_ZN : Std_Logic;
signal U2671_ZN : Std_Logic;
signal U2670_ZN : Std_Logic;
signal U344_Z : Std_Logic;
signal U26823_ZN : Std_Logic;
signal U26822_ZN : Std_Logic;
signal U26821_ZN : Std_Logic;
signal U26820_ZN : Std_Logic;
signal U26819_ZN : Std_Logic;
signal U26818_ZN : Std_Logic;
signal U26817_ZN : Std_Logic;
signal U26816_ZN : Std_Logic;
signal U26815_ZN : Std_Logic;
signal U26814_ZN : Std_Logic;
signal U26813_ZN : Std_Logic;
signal U26812_ZN : Std_Logic;
signal U26811_ZN : Std_Logic;
signal U26810_ZN : Std_Logic;
signal U2689_ZN : Std_Logic;
signal U2688_ZN : Std_Logic;
signal U2687_ZN : Std_Logic;
signal U2686_ZN : Std_Logic;
signal U2685_ZN : Std_Logic;
signal U2684_ZN : Std_Logic;
signal U2683_ZN : Std_Logic;
signal U2682_ZN : Std_Logic;
signal U2681_ZN : Std_Logic;
signal U2680_ZN : Std_Logic;
signal U343_Z : Std_Logic;
signal U25723_ZN : Std_Logic;
signal U25722_ZN : Std_Logic;
signal U25721_ZN : Std_Logic;
signal U25720_ZN : Std_Logic;
signal U25719_ZN : Std_Logic;
signal U25718_ZN : Std_Logic;
signal U25717_ZN : Std_Logic;
signal U25716_ZN : Std_Logic;
signal U25715_ZN : Std_Logic;
signal U25714_ZN : Std_Logic;
signal U25713_ZN : Std_Logic;
signal U25712_ZN : Std_Logic;
signal U25711_ZN : Std_Logic;
signal U25710_ZN : Std_Logic;
signal U2579_ZN : Std_Logic;
signal U2578_ZN : Std_Logic;
signal U2577_ZN : Std_Logic;
signal U2576_ZN : Std_Logic;
signal U2575_ZN : Std_Logic;
signal U2574_ZN : Std_Logic;
signal U2573_ZN : Std_Logic;
signal U2572_ZN : Std_Logic;
signal U2571_ZN : Std_Logic;
signal U2570_ZN : Std_Logic;
signal U342_Z : Std_Logic;
signal x : Std_Logic_Vector(23 downto 0);
signal U27223_ZN : Std_Logic;
signal U27222_ZN : Std_Logic;
```

```
signal U27221_ZN : Std_Logic;
signal U27220_ZN : Std_Logic;
signal U27219_ZN : Std_Logic;
signal U27218_ZN : Std_Logic;
signal U27217_ZN : Std_Logic;
signal U27216_ZN : Std_Logic;
signal U27215_ZN : Std_Logic;
signal U27214_ZN : Std_Logic;
signal U27213_ZN : Std_Logic;
signal U27212_ZN : Std_Logic;
signal U27211_ZN : Std_Logic;
signal U27210_ZN : Std_Logic;
signal U2729_ZN : Std_Logic;
signal U2728_ZN : Std_Logic;
signal U2727_ZN : Std_Logic;
signal U2726_ZN : Std_Logic;
signal U2725_ZN : Std_Logic;
signal U2724_ZN : Std_Logic;
signal U2723_ZN : Std_Logic;
signal U2722_ZN : Std_Logic;
signal U2721_ZN : Std_Logic;
signal U2720_ZN : Std_Logic;
signal U27123_ZN : Std_Logic;
signal U27122_ZN : Std_Logic;
signal U27121_ZN : Std_Logic;
signal U27120_ZN : Std_Logic;
signal U27119_ZN : Std_Logic;
signal U27118_ZN : Std_Logic;
signal U27117_ZN : Std_Logic;
signal U27116_ZN : Std_Logic;
signal U27115_ZN : Std_Logic;
signal U27114_ZN : Std_Logic;
signal U27113_ZN : Std_Logic;
signal U27112_ZN : Std_Logic;
signal U27111_ZN : Std_Logic;
signal U27110_ZN : Std_Logic;
signal U2719_ZN : Std_Logic;
signal U2718_ZN : Std_Logic;
signal U2717_ZN : Std_Logic;
signal U2716_ZN : Std_Logic;
signal U2715_ZN : Std_Logic;
signal U2714_ZN : Std_Logic;
signal U2713_ZN : Std_Logic;
signal U2712_ZN : Std_Logic;
signal U2711_ZN : Std_Logic;
signal U2710_ZN : Std_Logic;
signal U341_Z : Std_Logic;
signal z : Std_Logic_Vector(23 downto 0);
signal y : Std_Logic_Vector(23 downto 0);
signal U252_ZN : Std_Logic;
signal U337_C : Std_Logic;
signal U339_ZN : Std_Logic;
signal U336_QN : Std_Logic;
signal U337_CN : Std_Logic;
signal U336_Q : Std_Logic;
signal U251_ZN : Std_Logic;
signal U253_ZN : Std_Logic;
signal U246_ZN : Std_Logic;
```

```
  signal U245_ZN : Std_Logic;

begin

  U3677: nr02d1
    port map ( A1 => U2807_ZN, A2 => U2817_ZN, ZN => U3677_ZN );

  U3676: nr02d1
    port map ( A1 => U2806_ZN, A2 => U2816_ZN, ZN => U3676_ZN );

  U3675: nr02d1
    port map ( A1 => U2805_ZN, A2 => U2815_ZN, ZN => U3675_ZN );

  U3674: nr02d1
    port map ( A1 => U2804_ZN, A2 => U2814_ZN, ZN => U3674_ZN );

  U3673: nr02d1
    port map ( A1 => U2803_ZN, A2 => U2813_ZN, ZN => U3673_ZN );

  U3672: nr02d1
    port map ( A1 => U2802_ZN, A2 => U2812_ZN, ZN => U3672_ZN );

  U3671: nr02d1
    port map ( A1 => U2801_ZN, A2 => U2811_ZN, ZN => U3671_ZN );

  U3670: nr02d1
    port map ( A1 => U2800_ZN, A2 => U2810_ZN, ZN => U3670_ZN );

  U2807: nd02d1
    port map ( A1 => mask(71), A2 => c(71), ZN => U2807_ZN );

  U2806: nd02d1
    port map ( A1 => mask(70), A2 => c(70), ZN => U2806_ZN );

  U2805: nd02d1
    port map ( A1 => mask(69), A2 => c(69), ZN => U2805_ZN );

  U2804: nd02d1
    port map ( A1 => mask(68), A2 => c(68), ZN => U2804_ZN );

  U2803: nd02d1
    port map ( A1 => mask(67), A2 => c(67), ZN => U2803_ZN );

  U2802: nd02d1
    port map ( A1 => mask(66), A2 => c(66), ZN => U2802_ZN );

  U2801: nd02d1
    port map ( A1 => mask(65), A2 => c(65), ZN => U2801_ZN );

  U2800: nd02d1
    port map ( A1 => mask(64), A2 => c(64), ZN => U2800_ZN );

  U3767: ni01d1
    port map ( I => U3677_ZN, Z => U3767_Z );

  U3766: ni01d1
    port map ( I => U3676_ZN, Z => U3766_Z );
```

```
U3765: ni01d1
   port map ( I => U3675_ZN, Z => U3765_Z );

U3764: ni01d1
   port map ( I => U3674_ZN, Z => U3764_Z );

U3763: ni01d1
   port map ( I => U3673_ZN, Z => U3763_Z );

U3762: ni01d1
   port map ( I => U3672_ZN, Z => U3762_Z );

U3761: ni01d1
   port map ( I => U3671_ZN, Z => U3761_Z );

U3760: ni01d1
   port map ( I => U3670_ZN, Z => U3760_Z );

U2817: nd02d1
   port map ( A1 => b(71), A2 => a(71), ZN => U2817_ZN );

U2816: nd02d1
   port map ( A1 => b(70), A2 => a(70), ZN => U2816_ZN );

U2815: nd02d1
   port map ( A1 => b(69), A2 => a(69), ZN => U2815_ZN );

U2814: nd02d1
   port map ( A1 => b(68), A2 => a(68), ZN => U2814_ZN );

U2813: nd02d1
   port map ( A1 => b(67), A2 => a(67), ZN => U2813_ZN );

U2812: nd02d1
   port map ( A1 => b(66), A2 => a(66), ZN => U2812_ZN );

U2811: nd02d1
   port map ( A1 => b(65), A2 => a(65), ZN => U2811_ZN );

U2810: nd02d1
   port map ( A1 => b(64), A2 => a(64), ZN => U2810_ZN );

U3687: nr02d1
   port map ( A1 => U2787_ZN, A2 => U2797_ZN, ZN => U3687_ZN );

U3686: nr02d1
   port map ( A1 => U2786_ZN, A2 => U2796_ZN, ZN => U3686_ZN );

U3685: nr02d1
   port map ( A1 => U2785_ZN, A2 => U2795_ZN, ZN => U3685_ZN );

U3684: nr02d1
   port map ( A1 => U2784_ZN, A2 => U2794_ZN, ZN => U3684_ZN );

U3683: nr02d1
   port map ( A1 => U2783_ZN, A2 => U2793_ZN, ZN => U3683_ZN );
```

```
U3682: nr02d1
   port map ( A1 => U2782_ZN, A2 => U2792_ZN, ZN => U3682_ZN );

U3681: nr02d1
   port map ( A1 => U2781_ZN, A2 => U2791_ZN, ZN => U3681_ZN );

U3680: nr02d1
   port map ( A1 => U2780_ZN, A2 => U2790_ZN, ZN => U3680_ZN );

U2787: nd02d1
   port map ( A1 => mask(63), A2 => U2597_ZN, ZN => U2787_ZN );

U2786: nd02d1
   port map ( A1 => mask(62), A2 => U2596_ZN, ZN => U2786_ZN );

U2785: nd02d1
   port map ( A1 => mask(61), A2 => U2595_ZN, ZN => U2785_ZN );

U2784: nd02d1
   port map ( A1 => mask(60), A2 => U2594_ZN, ZN => U2784_ZN );

U2783: nd02d1
   port map ( A1 => mask(59), A2 => U2593_ZN, ZN => U2783_ZN );

U2782: nd02d1
   port map ( A1 => mask(58), A2 => U2592_ZN, ZN => U2782_ZN );

U2781: nd02d1
   port map ( A1 => mask(57), A2 => U2591_ZN, ZN => U2781_ZN );

U2780: nd02d1
   port map ( A1 => mask(56), A2 => U2590_ZN, ZN => U2780_ZN );

U3697: nr02d1
   port map ( A1 => U2757_ZN, A2 => U2767_ZN, ZN => U3697_ZN );

U3696: nr02d1
   port map ( A1 => U2756_ZN, A2 => U2766_ZN, ZN => U3696_ZN );

U3695: nr02d1
   port map ( A1 => U2755_ZN, A2 => U2765_ZN, ZN => U3695_ZN );

U3694: nr02d1
   port map ( A1 => U2754_ZN, A2 => U2764_ZN, ZN => U3694_ZN );

U3693: nr02d1
   port map ( A1 => U2753_ZN, A2 => U2763_ZN, ZN => U3693_ZN );

U3692: nr02d1
   port map ( A1 => U2752_ZN, A2 => U2762_ZN, ZN => U3692_ZN );

U3691: nr02d1
   port map ( A1 => U2751_ZN, A2 => U2761_ZN, ZN => U3691_ZN );

U3690: nr02d1
   port map ( A1 => U2750_ZN, A2 => U2760_ZN, ZN => U3690_ZN );

U2757: nd02d1
```

```
    port map ( A1 => mask(55), A2 => U2587_ZN, ZN => U2757_ZN );
  U2756: nd02d1
    port map ( A1 => mask(54), A2 => U2586_ZN, ZN => U2756_ZN );
  U2755: nd02d1
    port map ( A1 => mask(53), A2 => U2585_ZN, ZN => U2755_ZN );
  U2754: nd02d1
    port map ( A1 => mask(52), A2 => U2584_ZN, ZN => U2754_ZN );
  U2753: nd02d1
    port map ( A1 => mask(51), A2 => U2583_ZN, ZN => U2753_ZN );
  U2752: nd02d1
    port map ( A1 => mask(50), A2 => U2582_ZN, ZN => U2752_ZN );
  U2751: nd02d1
    port map ( A1 => mask(49), A2 => U2581_ZN, ZN => U2751_ZN );
  U2750: nd02d1
    port map ( A1 => mask(48), A2 => U2580_ZN, ZN => U2750_ZN );
  U2797: nd02d1
    port map ( A1 => U2647_ZN, A2 => U2637_ZN, ZN => U2797_ZN );
  U2796: nd02d1
    port map ( A1 => U2646_ZN, A2 => U2636_ZN, ZN => U2796_ZN );
  U2795: nd02d1
    port map ( A1 => U2645_ZN, A2 => U2635_ZN, ZN => U2795_ZN );
  U2794: nd02d1
    port map ( A1 => U2644_ZN, A2 => U2634_ZN, ZN => U2794_ZN );
  U2793: nd02d1
    port map ( A1 => U2643_ZN, A2 => U2633_ZN, ZN => U2793_ZN );
  U2792: nd02d1
    port map ( A1 => U2642_ZN, A2 => U2632_ZN, ZN => U2792_ZN );
  U2791: nd02d1
    port map ( A1 => U2641_ZN, A2 => U2631_ZN, ZN => U2791_ZN );
  U2790: nd02d1
    port map ( A1 => U2640_ZN, A2 => U2630_ZN, ZN => U2790_ZN );
  U2767: nd02d1
    port map ( A1 => U2667_ZN, A2 => U2657_ZN, ZN => U2767_ZN );
  U2766: nd02d1
    port map ( A1 => U2666_ZN, A2 => U2656_ZN, ZN => U2766_ZN );
  U2765: nd02d1
    port map ( A1 => U2665_ZN, A2 => U2655_ZN, ZN => U2765_ZN );
  U2764: nd02d1
    port map ( A1 => U2664_ZN, A2 => U2654_ZN, ZN => U2764_ZN );
```

```
U2763: nd02d1
  port map ( A1 => U2663_ZN, A2 => U2653_ZN, ZN => U2763_ZN );
U2762: nd02d1
  port map ( A1 => U2662_ZN, A2 => U2652_ZN, ZN => U2762_ZN );
U2761: nd02d1
  port map ( A1 => U2661_ZN, A2 => U2651_ZN, ZN => U2761_ZN );
U2760: nd02d1
  port map ( A1 => U2660_ZN, A2 => U2650_ZN, ZN => U2760_ZN );
U3557: ni01d5
  port map ( I => yo(71), Z => bl(71) );
U3556: ni01d5
  port map ( I => yo(70), Z => bl(70) );
U3555: ni01d5
  port map ( I => yo(69), Z => bl(69) );
U3554: ni01d5
  port map ( I => yo(68), Z => bl(68) );
U3553: ni01d5
  port map ( I => yo(67), Z => bl(67) );
U3552: ni01d5
  port map ( I => yo(66), Z => bl(66) );
U3551: ni01d5
  port map ( I => yo(65), Z => bl(65) );
U3550: ni01d5
  port map ( I => yo(64), Z => bl(64) );
U3637: mx21d2
  port map ( I0 => U3677_ZN, I1 => U3727_Q, S => U125_m3, Z =>
       yo(71) );
U3636: mx21d2
  port map ( I0 => U3676_ZN, I1 => U3726_Q, S => U125_m3, Z =>
       yo(70) );
U3635: mx21d2
  port map ( I0 => U3675_ZN, I1 => U3725_Q, S => U125_m3, Z =>
       yo(69) );
U3634: mx21d2
  port map ( I0 => U3674_ZN, I1 => U3724_Q, S => U125_m3, Z =>
       yo(68) );
U3633: mx21d2
  port map ( I0 => U3673_ZN, I1 => U3723_Q, S => U125_m3, Z =>
       yo(67) );
U3632: mx21d2
```

```
   port map ( I0 => U3672_ZN, I1 => U3722_Q, S => U125_m3, Z =>
         yo(66) );

U3631: mx21d2
   port map ( I0 => U3671_ZN, I1 => U3721_Q, S => U125_m3, Z =>
         yo(65) );

U3630: mx21d2
   port map ( I0 => U3670_ZN, I1 => U3720_Q, S => U125_m3, Z =>
         yo(64) );

U3727: dfctnb
   port map ( D => U3837_Z, CP => CLK, CDN => ARESET, Q =>
         U3727_Q, QN => U3727_QN );

U3726: dfctnb
   port map ( D => U3836_Z, CP => CLK, CDN => ARESET, Q =>
         U3726_Q, QN => U3726_QN );

U3725: dfctnb
   port map ( D => U3835_Z, CP => CLK, CDN => ARESET, Q =>
         U3725_Q, QN => U3725_QN );

U3724: dfctnb
   port map ( D => U3834_Z, CP => CLK, CDN => ARESET, Q =>
         U3724_Q, QN => U3724_QN );

U3723: dfctnb
   port map ( D => U3833_Z, CP => CLK, CDN => ARESET, Q =>
         U3723_Q, QN => U3723_QN );

U3722: dfctnb
   port map ( D => U3832_Z, CP => CLK, CDN => ARESET, Q =>
         U3722_Q, QN => U3722_QN );

U3721: dfctnb
   port map ( D => U3831_Z, CP => CLK, CDN => ARESET, Q =>
         U3721_Q, QN => U3721_QN );

U3720: dfctnb
   port map ( D => U3830_Z, CP => CLK, CDN => ARESET, Q =>
         U3720_Q, QN => U3720_QN );

U3837: ni01d1
   port map ( I => U3817_Z, Z => U3837_Z );

U3836: ni01d1
   port map ( I => U3816_Z, Z => U3836_Z );

U3835: ni01d1
   port map ( I => U3815_Z, Z => U3835_Z );

U3834: ni01d1
   port map ( I => U3814_Z, Z => U3834_Z );

U3833: ni01d1
   port map ( I => U3813_Z, Z => U3833_Z );
```

```
U3832: ni01d1
   port map ( I => U3812_Z, Z => U3832_Z );

U3831: ni01d1
   port map ( I => U3811_Z, Z => U3831_Z );

U3830: ni01d1
   port map ( I => U3810_Z, Z => U3830_Z );

U3817: ni01d1
   port map ( I => U3767_Z, Z => U3817_Z );

U3816: ni01d1
   port map ( I => U3766_Z, Z => U3816_Z );

U3815: ni01d1
   port map ( I => U3765_Z, Z => U3815_Z );

U3814: ni01d1
   port map ( I => U3764_Z, Z => U3814_Z );

U3813: ni01d1
   port map ( I => U3763_Z, Z => U3813_Z );

U3812: ni01d1
   port map ( I => U3762_Z, Z => U3812_Z );

U3811: ni01d1
   port map ( I => U3761_Z, Z => U3811_Z );

U3810: ni01d1
   port map ( I => U3760_Z, Z => U3810_Z );

U3537: ni01d5
   port map ( I => U3667_Z, Z => bl(55) );

U3536: ni01d5
   port map ( I => U3666_Z, Z => bl(54) );

U3535: ni01d5
   port map ( I => U3665_Z, Z => bl(53) );

U3534: ni01d5
   port map ( I => U3664_Z, Z => bl(52) );

U3533: ni01d5
   port map ( I => U3663_Z, Z => bl(51) );

U3532: ni01d5
   port map ( I => U3662_Z, Z => bl(50) );

U3531: ni01d5
   port map ( I => U3661_Z, Z => bl(49) );

U3530: ni01d5
   port map ( I => U3660_Z, Z => bl(48) );

U3647: mx21d2
```

```
  port map ( I0 => U3687_ZN, I1 => U3717_Q, S => U125_m2, Z =>
        U3647_Z );

U3646: mx21d2
  port map ( I0 => U3686_ZN, I1 => U3716_Q, S => U125_m2, Z =>
        U3646_Z );

U3645: mx21d2
  port map ( I0 => U3685_ZN, I1 => U3715_Q, S => U125_m2, Z =>
        U3645_Z );

U3644: mx21d2
  port map ( I0 => U3684_ZN, I1 => U3714_Q, S => U125_m2, Z =>
        U3644_Z );

U3643: mx21d2
  port map ( I0 => U3683_ZN, I1 => U3713_Q, S => U125_m2, Z =>
        U3643_Z );

U3642: mx21d2
  port map ( I0 => U3682_ZN, I1 => U3712_Q, S => U125_m2, Z =>
        U3642_Z );

U3641: mx21d2
  port map ( I0 => U3681_ZN, I1 => U3711_Q, S => U125_m2, Z =>
        U3641_Z );

U3640: mx21d2
  port map ( I0 => U3680_ZN, I1 => U3710_Q, S => U125_m2, Z =>
        U3640_Z );

U3717: dfctnb
  port map ( D => U3847_Z, CP => CLK, CDN => ARESET, Q =>
        U3717_Q, QN => U3717_QN );

U3716: dfctnb
  port map ( D => U3846_Z, CP => CLK, CDN => ARESET, Q =>
        U3716_Q, QN => U3716_QN );

U3715: dfctnb
  port map ( D => U3845_Z, CP => CLK, CDN => ARESET, Q =>
        U3715_Q, QN => U3715_QN );

U3714: dfctnb
  port map ( D => U3844_Z, CP => CLK, CDN => ARESET, Q =>
        U3714_Q, QN => U3714_QN );

U3713: dfctnb
  port map ( D => U3843_Z, CP => CLK, CDN => ARESET, Q =>
        U3713_Q, QN => U3713_QN );

U3712: dfctnb
  port map ( D => U3842_Z, CP => CLK, CDN => ARESET, Q =>
        U3712_Q, QN => U3712_QN );

U3711: dfctnb
  port map ( D => U3841_Z, CP => CLK, CDN => ARESET, Q =>
        U3711_Q, QN => U3711_QN );
```

```
U3710: dfctnb
   port map ( D => U3840_Z, CP => CLK, CDN => ARESET, Q =>
          U3710_Q, QN => U3710_QN );

U3547: ni01d5
   port map ( I => U3647_Z, Z => bl(63) );

U3546: ni01d5
   port map ( I => U3646_Z, Z => bl(62) );

U3545: ni01d5
   port map ( I => U3645_Z, Z => bl(61) );

U3544: ni01d5
   port map ( I => U3644_Z, Z => bl(60) );

U3543: ni01d5
   port map ( I => U3643_Z, Z => bl(59) );

U3542: ni01d5
   port map ( I => U3642_Z, Z => bl(58) );

U3541: ni01d5
   port map ( I => U3641_Z, Z => bl(57) );

U3540: ni01d5
   port map ( I => U3640_Z, Z => bl(56) );

U3847: ni01d1
   port map ( I => U3827_Z, Z => U3847_Z );

U3846: ni01d1
   port map ( I => U3826_Z, Z => U3846_Z );

U3845: ni01d1
   port map ( I => U3825_Z, Z => U3845_Z );

U3844: ni01d1
   port map ( I => U3824_Z, Z => U3844_Z );

U3843: ni01d1
   port map ( I => U3823_Z, Z => U3843_Z );

U3842: ni01d1
   port map ( I => U3822_Z, Z => U3842_Z );

U3841: ni01d1
   port map ( I => U3821_Z, Z => U3841_Z );

U3840: ni01d1
   port map ( I => U3820_Z, Z => U3840_Z );

U3777: ni01d1
   port map ( I => U3687_ZN, Z => U3777_Z );

U3776: ni01d1
   port map ( I => U3686_ZN, Z => U3776_Z );
```

```
U3775: ni01d1
   port map ( I => U3685_ZN, Z => U3775_Z );

U3774: ni01d1
   port map ( I => U3684_ZN, Z => U3774_Z );

U3773: ni01d1
   port map ( I => U3683_ZN, Z => U3773_Z );

U3772: ni01d1
   port map ( I => U3682_ZN, Z => U3772_Z );

U3771: ni01d1
   port map ( I => U3681_ZN, Z => U3771_Z );

U3770: ni01d1
   port map ( I => U3680_ZN, Z => U3770_Z );

U3827: ni01d1
   port map ( I => U3777_Z, Z => U3827_Z );

U3826: ni01d1
   port map ( I => U3776_Z, Z => U3826_Z );

U3825: ni01d1
   port map ( I => U3775_Z, Z => U3825_Z );

U3824: ni01d1
   port map ( I => U3774_Z, Z => U3824_Z );

U3823: ni01d1
   port map ( I => U3773_Z, Z => U3823_Z );

U3822: ni01d1
   port map ( I => U3772_Z, Z => U3822_Z );

U3821: ni01d1
   port map ( I => U3771_Z, Z => U3821_Z );

U3820: ni01d1
   port map ( I => U3770_Z, Z => U3820_Z );

U3667: mx21d2
   port map ( I0 => U3697_ZN, I1 => U3707_Q, S => U125_m1, Z =>
        U3667_Z );

U3666: mx21d2
   port map ( I0 => U3696_ZN, I1 => U3706_Q, S => U125_m1, Z =>
        U3666_Z );

U3665: mx21d2
   port map ( I0 => U3695_ZN, I1 => U3705_Q, S => U125_m1, Z =>
        U3665_Z );

U3664: mx21d2
   port map ( I0 => U3694_ZN, I1 => U3704_Q, S => U125_m1, Z =>
        U3664_Z );
```

```
U3663: mx21d2
   port map ( I0 => U3693_ZN, I1 => U3703_Q, S => U125_m1, Z =>
        U3663_Z );

U3662: mx21d2
   port map ( I0 => U3692_ZN, I1 => U3702_Q, S => U125_m1, Z =>
        U3662_Z );

U3661: mx21d2
   port map ( I0 => U3691_ZN, I1 => U3701_Q, S => U125_m1, Z =>
        U3661_Z );

U3660: mx21d2
   port map ( I0 => U3690_ZN, I1 => U3700_Q, S => U125_m1, Z =>
        U3660_Z );

U3707: dfctnb
   port map ( D => U3807_Z, CP => CLK, CDN => ARESET, Q =>
        U3707_Q, QN => U3707_QN );

U3706: dfctnb
   port map ( D => U3806_Z, CP => CLK, CDN => ARESET, Q =>
        U3706_Q, QN => U3706_QN );

U3705: dfctnb
   port map ( D => U3805_Z, CP => CLK, CDN => ARESET, Q =>
        U3705_Q, QN => U3705_QN );

U3704: dfctnb
   port map ( D => U3804_Z, CP => CLK, CDN => ARESET, Q =>
        U3704_Q, QN => U3704_QN );

U3703: dfctnb
   port map ( D => U3803_Z, CP => CLK, CDN => ARESET, Q =>
        U3703_Q, QN => U3703_QN );

U3702: dfctnb
   port map ( D => U3802_Z, CP => CLK, CDN => ARESET, Q =>
        U3702_Q, QN => U3702_QN );

U3701: dfctnb
   port map ( D => U3801_Z, CP => CLK, CDN => ARESET, Q =>
        U3701_Q, QN => U3701_QN );

U3700: dfctnb
   port map ( D => U3800_Z, CP => CLK, CDN => ARESET, Q =>
        U3700_Q, QN => U3700_QN );

U3807: ni01d1
   port map ( I => U3797_Z, Z => U3807_Z );

U3806: ni01d1
   port map ( I => U3796_Z, Z => U3806_Z );

U3805: ni01d1
   port map ( I => U3795_Z, Z => U3805_Z );
```

```
U3804: ni01d1
   port map ( I => U3794_Z, Z => U3804_Z );

U3803: ni01d1
   port map ( I => U3793_Z, Z => U3803_Z );

U3802: ni01d1
   port map ( I => U3792_Z, Z => U3802_Z );

U3801: ni01d1
   port map ( I => U3791_Z, Z => U3801_Z );

U3800: ni01d1
   port map ( I => U3790_Z, Z => U3800_Z );

U3797: ni01d1
   port map ( I => U3787_Z, Z => U3797_Z );

U3796: ni01d1
   port map ( I => U3786_Z, Z => U3796_Z );

U3795: ni01d1
   port map ( I => U3785_Z, Z => U3795_Z );

U3794: ni01d1
   port map ( I => U3784_Z, Z => U3794_Z );

U3793: ni01d1
   port map ( I => U3783_Z, Z => U3793_Z );

U3792: ni01d1
   port map ( I => U3782_Z, Z => U3792_Z );

U3791: ni01d1
   port map ( I => U3781_Z, Z => U3791_Z );

U3790: ni01d1
   port map ( I => U3780_Z, Z => U3790_Z );

U3787: ni01d1
   port map ( I => U3697_ZN, Z => U3787_Z );

U3786: ni01d1
   port map ( I => U3696_ZN, Z => U3786_Z );

U3785: ni01d1
   port map ( I => U3695_ZN, Z => U3785_Z );

U3784: ni01d1
   port map ( I => U3694_ZN, Z => U3784_Z );

U3783: ni01d1
   port map ( I => U3693_ZN, Z => U3783_Z );

U3782: ni01d1
   port map ( I => U3692_ZN, Z => U3782_Z );

U3781: ni01d1
```

```
   port map ( I => U3691_ZN, Z => U3781_Z );

U3780: ni01d1
   port map ( I => U3690_ZN, Z => U3780_Z );

U2607: nd02d1
   port map ( A1 => s(3), A2 => s(1), ZN => c(71) );

U2606: nd02d1
   port map ( A1 => s(3), A2 => s(1), ZN => c(70) );

U2605: nd02d1
   port map ( A1 => s(3), A2 => s(1), ZN => c(69) );

U2604: nd02d1
   port map ( A1 => s(3), A2 => s(1), ZN => c(68) );

U2603: nd02d1
   port map ( A1 => s(3), A2 => s(1), ZN => c(67) );

U2602: nd02d1
   port map ( A1 => s(3), A2 => s(1), ZN => c(66) );

U2601: nd02d1
   port map ( A1 => s(3), A2 => s(1), ZN => c(65) );

U2600: nd02d1
   port map ( A1 => s(3), A2 => s(1), ZN => c(64) );

U2617: nd03d1
   port map ( A1 => ncomp(71), A2 => s(5), A3 => U349_Z, ZN =>
         b(71) );

U2616: nd03d1
   port map ( A1 => ncomp(70), A2 => s(5), A3 => U349_Z, ZN =>
         b(70) );

U2615: nd03d1
   port map ( A1 => ncomp(69), A2 => s(5), A3 => U349_Z, ZN =>
         b(69) );

U2614: nd03d1
   port map ( A1 => ncomp(68), A2 => s(5), A3 => U349_Z, ZN =>
         b(68) );

U2613: nd03d1
   port map ( A1 => ncomp(67), A2 => s(5), A3 => U349_Z, ZN =>
         b(67) );

U2612: nd03d1
   port map ( A1 => ncomp(66), A2 => s(5), A3 => U349_Z, ZN =>
         b(66) );

U2611: nd03d1
   port map ( A1 => ncomp(65), A2 => s(5), A3 => U349_Z, ZN =>
         b(65) );

U2610: nd03d1
```

```
   port map ( A1 => ncomp(64), A2 => s(5), A3 => U349_Z, ZN =>
        b(64) );

U218: in01d1
   port map ( I => cmpf, ZN => fs(5) );

U349: ni01d3
   port map ( I => s(0), Z => U349_Z );

U350: ni01d3
   port map ( I => s(0), Z => U350_Z );

U2627: nd03d1
   port map ( A1 => comp(71), A2 => U350_Z, A3 => s(4), ZN =>
        a(71) );

U2626: nd03d1
   port map ( A1 => comp(70), A2 => U350_Z, A3 => s(4), ZN =>
        a(70) );

U2625: nd03d1
   port map ( A1 => comp(69), A2 => U350_Z, A3 => s(4), ZN =>
        a(69) );

U2624: nd03d1
   port map ( A1 => comp(68), A2 => U350_Z, A3 => s(4), ZN =>
        a(68) );

U2623: nd03d1
   port map ( A1 => comp(67), A2 => U350_Z, A3 => s(4), ZN =>
        a(67) );

U2622: nd03d1
   port map ( A1 => comp(66), A2 => U350_Z, A3 => s(4), ZN =>
        a(66) );

U2621: nd03d1
   port map ( A1 => comp(65), A2 => U350_Z, A3 => s(4), ZN =>
        a(65) );

U2620: nd03d1
   port map ( A1 => comp(64), A2 => U350_Z, A3 => s(4), ZN =>
        a(64) );

U125: fiarmux
   port map ( fsig(5) => fs(5), fsig(4) => cmpf, fsig(3) => ncbf,
        fsig(2) => rdf, fsig(1) => fs(1), fsig(0) => cvf,
        arsig(5) => as(5), arsig(4) => as(4), arsig(3) =>
        as(3), arsig(2) => rd(1), arsig(1) => as(1),
        arsig(0) => as(0), f(0) => f(0), f(1) => f(1),
        f(2) => f(2), sig3(5) => s(5), sig3(4) => s(4),
        sig3(3) => s(3), sig3(2) => rd(4), sig3(1) => s(1),
        sig3(0) => s(0), sig2(5) => p(5), sig2(4) => p(4),
        sig2(3) => p(3), sig2(2) => rd(3), sig2(1) => p(1),
        sig2(0) => p(0), sig1(5) => q(5), sig1(4) => q(4),
        sig1(3) => q(3), sig1(2) => rd(2), sig1(1) => q(1),
        sig1(0) => q(0), m1 => U125_m1, m2 => U125_m2, m3
        => U125_m3 );
```

```
U142: in01d2
   port map ( I => cvf, ZN => fs(1) );

U2637: nd03d1
   port map ( A1 => comp(63), A2 => U348_Z, A3 => p(4), ZN =>
         U2637_ZN );

U2636: nd03d1
   port map ( A1 => comp(62), A2 => U348_Z, A3 => p(4), ZN =>
         U2636_ZN );

U2635: nd03d1
   port map ( A1 => comp(61), A2 => U348_Z, A3 => p(4), ZN =>
         U2635_ZN );

U2634: nd03d1
   port map ( A1 => comp(60), A2 => U348_Z, A3 => p(4), ZN =>
         U2634_ZN );

U2633: nd03d1
   port map ( A1 => comp(59), A2 => U348_Z, A3 => p(4), ZN =>
         U2633_ZN );

U2632: nd03d1
   port map ( A1 => comp(58), A2 => U348_Z, A3 => p(4), ZN =>
         U2632_ZN );

U2631: nd03d1
   port map ( A1 => comp(57), A2 => U348_Z, A3 => p(4), ZN =>
         U2631_ZN );

U2630: nd03d1
   port map ( A1 => comp(56), A2 => U348_Z, A3 => p(4), ZN =>
         U2630_ZN );

U348: ni01d3
   port map ( I => p(0), Z => U348_Z );

U347: ni01d3
   port map ( I => p(0), Z => U347_Z );

U2597: nd02d1
   port map ( A1 => p(3), A2 => p(1), ZN => U2597_ZN );

U2596: nd02d1
   port map ( A1 => p(3), A2 => p(1), ZN => U2596_ZN );

U2595: nd02d1
   port map ( A1 => p(3), A2 => p(1), ZN => U2595_ZN );

U2594: nd02d1
   port map ( A1 => p(3), A2 => p(1), ZN => U2594_ZN );

U2593: nd02d1
   port map ( A1 => p(3), A2 => p(1), ZN => U2593_ZN );

U2592: nd02d1
```

```
port map ( A1 => p(3), A2 => p(1), ZN => U2592_ZN );

U2591: nd02d1
   port map ( A1 => p(3), A2 => p(1), ZN => U2591_ZN );

U2590: nd02d1
   port map ( A1 => p(3), A2 => p(1), ZN => U2590_ZN );

U2647: nd03d1
   port map ( A1 => ncomp(63), A2 => p(5), A3 => U347_Z, ZN =>
         U2647_ZN );

U2646: nd03d1
   port map ( A1 => ncomp(62), A2 => p(5), A3 => U347_Z, ZN =>
         U2646_ZN );

U2645: nd03d1
   port map ( A1 => ncomp(61), A2 => p(5), A3 => U347_Z, ZN =>
         U2645_ZN );

U2644: nd03d1
   port map ( A1 => ncomp(60), A2 => p(5), A3 => U347_Z, ZN =>
         U2644_ZN );

U2643: nd03d1
   port map ( A1 => ncomp(59), A2 => p(5), A3 => U347_Z, ZN =>
         U2643_ZN );

U2642: nd03d1
   port map ( A1 => ncomp(58), A2 => p(5), A3 => U347_Z, ZN =>
         U2642_ZN );

U2641: nd03d1
   port map ( A1 => ncomp(57), A2 => p(5), A3 => U347_Z, ZN =>
         U2641_ZN );

U2640: nd03d1
   port map ( A1 => ncomp(56), A2 => p(5), A3 => U347_Z, ZN =>
         U2640_ZN );

U346: ni01d3
   port map ( I => q(0), Z => U346_Z );

U345: ni01d3
   port map ( I => q(0), Z => U345_Z );

U2657: nd03d1
   port map ( A1 => comp(55), A2 => U346_Z, A3 => q(4), ZN =>
         U2657_ZN );

U2656: nd03d1
   port map ( A1 => comp(54), A2 => U346_Z, A3 => q(4), ZN =>
         U2656_ZN );

U2655: nd03d1
   port map ( A1 => comp(53), A2 => U346_Z, A3 => q(4), ZN =>
         U2655_ZN );
```

```
U2654: nd03d1
   port map ( A1 => comp(52), A2 => U346_Z, A3 => q(4), ZN =>
        U2654_ZN );

U2653: nd03d1
   port map ( A1 => comp(51), A2 => U346_Z, A3 => q(4), ZN =>
        U2653_ZN );

U2652: nd03d1
   port map ( A1 => comp(50), A2 => U346_Z, A3 => q(4), ZN =>
        U2652_ZN );

U2651: nd03d1
   port map ( A1 => comp(49), A2 => U346_Z, A3 => q(4), ZN =>
        U2651_ZN );

U2650: nd03d1
   port map ( A1 => comp(48), A2 => U346_Z, A3 => q(4), ZN =>
        U2650_ZN );

U2667: nd03d1
   port map ( A1 => ncomp(55), A2 => q(5), A3 => U345_Z, ZN =>
        U2667_ZN );

U2666: nd03d1
   port map ( A1 => ncomp(54), A2 => q(5), A3 => U345_Z, ZN =>
        U2666_ZN );

U2665: nd03d1
   port map ( A1 => ncomp(53), A2 => q(5), A3 => U345_Z, ZN =>
        U2665_ZN );

U2664: nd03d1
   port map ( A1 => ncomp(52), A2 => q(5), A3 => U345_Z, ZN =>
        U2664_ZN );

U2663: nd03d1
   port map ( A1 => ncomp(51), A2 => q(5), A3 => U345_Z, ZN =>
        U2663_ZN );

U2662: nd03d1
   port map ( A1 => ncomp(50), A2 => q(5), A3 => U345_Z, ZN =>
        U2662_ZN );

U2661: nd03d1
   port map ( A1 => ncomp(49), A2 => q(5), A3 => U345_Z, ZN =>
        U2661_ZN );

U2660: nd03d1
   port map ( A1 => ncomp(48), A2 => q(5), A3 => U345_Z, ZN =>
        U2660_ZN );

U2587: nd02d1
   port map ( A1 => q(3), A2 => q(1), ZN => U2587_ZN );

U2586: nd02d1
   port map ( A1 => q(3), A2 => q(1), ZN => U2586_ZN );
```

```
U2585: nd02d1
   port map ( A1 => q(3), A2 => q(1), ZN => U2585_ZN );

U2584: nd02d1
   port map ( A1 => q(3), A2 => q(1), ZN => U2584_ZN );

U2583: nd02d1
   port map ( A1 => q(3), A2 => q(1), ZN => U2583_ZN );

U2582: nd02d1
   port map ( A1 => q(3), A2 => q(1), ZN => U2582_ZN );

U2581: nd02d1
   port map ( A1 => q(3), A2 => q(1), ZN => U2581_ZN );

U2580: nd02d1
   port map ( A1 => q(3), A2 => q(1), ZN => U2580_ZN );

U35123: ni01d5
   port map ( I => U28623_ZN, Z => bl(23) );

U35122: ni01d5
   port map ( I => U28622_ZN, Z => bl(22) );

U35121: ni01d5
   port map ( I => U28621_ZN, Z => bl(21) );

U35120: ni01d5
   port map ( I => U28620_ZN, Z => bl(20) );

U35119: ni01d5
   port map ( I => U28619_ZN, Z => bl(19) );

U35118: ni01d5
   port map ( I => U28618_ZN, Z => bl(18) );

U35117: ni01d5
   port map ( I => U28617_ZN, Z => bl(17) );

U35116: ni01d5
   port map ( I => U28616_ZN, Z => bl(16) );

U35115: ni01d5
   port map ( I => U28615_ZN, Z => bl(15) );

U35114: ni01d5
   port map ( I => U28614_ZN, Z => bl(14) );

U35113: ni01d5
   port map ( I => U28613_ZN, Z => bl(13) );

U35112: ni01d5
   port map ( I => U28612_ZN, Z => bl(12) );

U35111: ni01d5
   port map ( I => U28611_ZN, Z => bl(11) );

U35110: ni01d5
```

```
   port map ( I => U28610_ZN, Z => bl(10) );

U3519: ni01d5
   port map ( I => U2869_ZN, Z => bl(9) );

U3518: ni01d5
   port map ( I => U2868_ZN, Z => bl(8) );

U3517: ni01d5
   port map ( I => U2867_ZN, Z => bl(7) );

U3516: ni01d5
   port map ( I => U2866_ZN, Z => bl(6) );

U3515: ni01d5
   port map ( I => U2865_ZN, Z => bl(5) );

U3514: ni01d5
   port map ( I => U2864_ZN, Z => bl(4) );

U3513: ni01d5
   port map ( I => U2863_ZN, Z => bl(3) );

U3512: ni01d5
   port map ( I => U2862_ZN, Z => bl(2) );

U3511: ni01d5
   port map ( I => U2861_ZN, Z => bl(1) );

U3510: ni01d5
   port map ( I => U2860_ZN, Z => bl(0) );

U35223: ni01d5
   port map ( I => U28523_ZN, Z => bl(47) );

U35222: ni01d5
   port map ( I => U28522_ZN, Z => bl(46) );

U35221: ni01d5
   port map ( I => U28521_ZN, Z => bl(45) );

U35220: ni01d5
   port map ( I => U28520_ZN, Z => bl(44) );

U35219: ni01d5
   port map ( I => U28519_ZN, Z => bl(43) );

U35218: ni01d5
   port map ( I => U28518_ZN, Z => bl(42) );

U35217: ni01d5
   port map ( I => U28517_ZN, Z => bl(41) );

U35216: ni01d5
   port map ( I => U28516_ZN, Z => bl(40) );

U35215: ni01d5
   port map ( I => U28515_ZN, Z => bl(39) );
```

```
U35214: ni01d5
   port map ( I => U28514_ZN, Z => bl(38) );

U35213: ni01d5
   port map ( I => U28513_ZN, Z => bl(37) );

U35212: ni01d5
   port map ( I => U28512_ZN, Z => bl(36) );

U35211: ni01d5
   port map ( I => U28511_ZN, Z => bl(35) );

U35210: ni01d5
   port map ( I => U28510_ZN, Z => bl(34) );

U3529: ni01d5
   port map ( I => U2859_ZN, Z => bl(33) );

U3528: ni01d5
   port map ( I => U2858_ZN, Z => bl(32) );

U3527: ni01d5
   port map ( I => U2857_ZN, Z => bl(31) );

U3526: ni01d5
   port map ( I => U2856_ZN, Z => bl(30) );

U3525: ni01d5
   port map ( I => U2855_ZN, Z => bl(29) );

U3524: ni01d5
   port map ( I => U2854_ZN, Z => bl(28) );

U3523: ni01d5
   port map ( I => U2853_ZN, Z => bl(27) );

U3522: ni01d5
   port map ( I => U2852_ZN, Z => bl(26) );

U3521: ni01d5
   port map ( I => U2851_ZN, Z => bl(25) );

U3520: ni01d5
   port map ( I => U2850_ZN, Z => bl(24) );

U3854: ni01d5
   port map ( I => rd(4), Z => rdd(4) );

U3853: ni01d5
   port map ( I => rd(3), Z => rdd(3) );

U3852: ni01d5
   port map ( I => rd(2), Z => rdd(2) );

U3851: ni01d5
   port map ( I => rd(1), Z => rdd(1) );
```

```
U3850: ni01d5
   port map ( I => rd(1), Z => rdd(0) );

U252: nd02d2
   port map ( A1 => U251_ZN, A2 => U339_ZN, ZN => U252_ZN );

U339: nd03d1
   port map ( A1 => U245_ZN, A2 => cva, A3 => U336_QN, ZN =>
         U339_ZN );

U336: dfctnb
   port map ( D => cva, CP => U337_CN, CDN => ARESET, Q =>
         U336_Q, QN => U336_QN );

U245: in01d1
   port map ( I => cmp, ZN => U245_ZN );

U300: ni01d5
   port map ( I => ncba, Z => as(3) );

U299: ni01d5
   port map ( I => rda, Z => rd(1) );

U26923: nd03d1
   port map ( A1 => comp(23), A2 => U342_Z, A3 => as(4), ZN =>
         x(23) );

U26922: nd03d1
   port map ( A1 => comp(22), A2 => U342_Z, A3 => as(4), ZN =>
         x(22) );

U26921: nd03d1
   port map ( A1 => comp(21), A2 => U342_Z, A3 => as(4), ZN =>
         x(21) );

U26920: nd03d1
   port map ( A1 => comp(20), A2 => U342_Z, A3 => as(4), ZN =>
         x(20) );

U26919: nd03d1
   port map ( A1 => comp(19), A2 => U342_Z, A3 => as(4), ZN =>
         x(19) );

U26918: nd03d1
   port map ( A1 => comp(18), A2 => U342_Z, A3 => as(4), ZN =>
         x(18) );

U26917: nd03d1
   port map ( A1 => comp(17), A2 => U342_Z, A3 => as(4), ZN =>
         x(17) );

U26916: nd03d1
   port map ( A1 => comp(16), A2 => U342_Z, A3 => as(4), ZN =>
         x(16) );

U26915: nd03d1
   port map ( A1 => comp(15), A2 => U342_Z, A3 => as(4), ZN =>
         x(15) );
```

```
U26914: nd03d1
   port map ( A1 => comp(14), A2 => U342_Z, A3 => as(4), ZN =>
         x(14) );

U26913: nd03d1
   port map ( A1 => comp(13), A2 => U342_Z, A3 => as(4), ZN =>
         x(13) );

U26912: nd03d1
   port map ( A1 => comp(12), A2 => U342_Z, A3 => as(4), ZN =>
         x(12) );

U26911: nd03d1
   port map ( A1 => comp(11), A2 => U342_Z, A3 => as(4), ZN =>
         x(11) );

U26910: nd03d1
   port map ( A1 => comp(10), A2 => U342_Z, A3 => as(4), ZN =>
         x(10) );

U2699: nd03d1
   port map ( A1 => comp(9), A2 => U342_Z, A3 => as(4), ZN =>
         x(9) );

U2698: nd03d1
   port map ( A1 => comp(8), A2 => U342_Z, A3 => as(4), ZN =>
         x(8) );

U2697: nd03d1
   port map ( A1 => comp(7), A2 => U342_Z, A3 => as(4), ZN =>
         x(7) );

U2696: nd03d1
   port map ( A1 => comp(6), A2 => U342_Z, A3 => as(4), ZN =>
         x(6) );

U2695: nd03d1
   port map ( A1 => comp(5), A2 => U342_Z, A3 => as(4), ZN =>
         x(5) );

U2694: nd03d1
   port map ( A1 => comp(4), A2 => U342_Z, A3 => as(4), ZN =>
         x(4) );

U2693: nd03d1
   port map ( A1 => comp(3), A2 => U342_Z, A3 => as(4), ZN =>
         x(3) );

U2692: nd03d1
   port map ( A1 => comp(2), A2 => U342_Z, A3 => as(4), ZN =>
         x(2) );

U2691: nd03d1
   port map ( A1 => comp(1), A2 => U342_Z, A3 => as(4), ZN =>
         x(1) );

U2690: nd03d1
```

```
    port map ( A1 => comp(0), A2 => U342_Z, A3 => as(4), ZN =>
        x(0) );

U342: ni01d5
    port map ( I => as(0), Z => U342_Z );

U27223: nd02d1
    port map ( A1 => y(23), A2 => x(23), ZN => U27223_ZN );

U27222: nd02d1
    port map ( A1 => y(22), A2 => x(22), ZN => U27222_ZN );

U27221: nd02d1
    port map ( A1 => y(21), A2 => x(21), ZN => U27221_ZN );

U27220: nd02d1
    port map ( A1 => y(20), A2 => x(20), ZN => U27220_ZN );

U27219: nd02d1
    port map ( A1 => y(19), A2 => x(19), ZN => U27219_ZN );

U27218: nd02d1
    port map ( A1 => y(18), A2 => x(18), ZN => U27218_ZN );

U27217: nd02d1
    port map ( A1 => y(17), A2 => x(17), ZN => U27217_ZN );

U27216: nd02d1
    port map ( A1 => y(16), A2 => x(16), ZN => U27216_ZN );

U27215: nd02d1
    port map ( A1 => y(15), A2 => x(15), ZN => U27215_ZN );

U27214: nd02d1
    port map ( A1 => y(14), A2 => x(14), ZN => U27214_ZN );

U27213: nd02d1
    port map ( A1 => y(13), A2 => x(13), ZN => U27213_ZN );

U27212: nd02d1
    port map ( A1 => y(12), A2 => x(12), ZN => U27212_ZN );

U27211: nd02d1
    port map ( A1 => y(11), A2 => x(11), ZN => U27211_ZN );

U27210: nd02d1
    port map ( A1 => y(10), A2 => x(10), ZN => U27210_ZN );

U2729: nd02d1
    port map ( A1 => y(9), A2 => x(9), ZN => U2729_ZN );

U2728: nd02d1
    port map ( A1 => y(8), A2 => x(8), ZN => U2728_ZN );

U2727: nd02d1
    port map ( A1 => y(7), A2 => x(7), ZN => U2727_ZN );

U2726: nd02d1
```

```
   port map ( A1 => y(6), A2 => x(6), ZN => U2726_ZN );

U2725: nd02d1
   port map ( A1 => y(5), A2 => x(5), ZN => U2725_ZN );

U2724: nd02d1
   port map ( A1 => y(4), A2 => x(4), ZN => U2724_ZN );

U2723: nd02d1
   port map ( A1 => y(3), A2 => x(3), ZN => U2723_ZN );

U2722: nd02d1
   port map ( A1 => y(2), A2 => x(2), ZN => U2722_ZN );

U2721: nd02d1
   port map ( A1 => y(1), A2 => x(1), ZN => U2721_ZN );

U2720: nd02d1
   port map ( A1 => y(0), A2 => x(0), ZN => U2720_ZN );

U25623: nd02d1
   port map ( A1 => as(3), A2 => as(1), ZN => z(23) );

U25622: nd02d1
   port map ( A1 => as(3), A2 => as(1), ZN => z(22) );

U25621: nd02d1
   port map ( A1 => as(3), A2 => as(1), ZN => z(21) );

U25620: nd02d1
   port map ( A1 => as(3), A2 => as(1), ZN => z(20) );

U25619: nd02d1
   port map ( A1 => as(3), A2 => as(1), ZN => z(19) );

U25618: nd02d1
   port map ( A1 => as(3), A2 => as(1), ZN => z(18) );

U25617: nd02d1
   port map ( A1 => as(3), A2 => as(1), ZN => z(17) );

U25616: nd02d1
   port map ( A1 => as(3), A2 => as(1), ZN => z(16) );

U25615: nd02d1
   port map ( A1 => as(3), A2 => as(1), ZN => z(15) );

U25614: nd02d1
   port map ( A1 => as(3), A2 => as(1), ZN => z(14) );

U25613: nd02d1
   port map ( A1 => as(3), A2 => as(1), ZN => z(13) );

U25612: nd02d1
   port map ( A1 => as(3), A2 => as(1), ZN => z(12) );

U25611: nd02d1
   port map ( A1 => as(3), A2 => as(1), ZN => z(11) );
```

```
U25610: nd02d1
   port map ( A1 => as(3), A2 => as(1), ZN => z(10) );

U2569: nd02d1
   port map ( A1 => as(3), A2 => as(1), ZN => z(9) );

U2568: nd02d1
   port map ( A1 => as(3), A2 => as(1), ZN => z(8) );

U2567: nd02d1
   port map ( A1 => as(3), A2 => as(1), ZN => z(7) );

U2566: nd02d1
   port map ( A1 => as(3), A2 => as(1), ZN => z(6) );

U2565: nd02d1
   port map ( A1 => as(3), A2 => as(1), ZN => z(5) );

U2564: nd02d1
   port map ( A1 => as(3), A2 => as(1), ZN => z(4) );

U2563: nd02d1
   port map ( A1 => as(3), A2 => as(1), ZN => z(3) );

U2562: nd02d1
   port map ( A1 => as(3), A2 => as(1), ZN => z(2) );

U2561: nd02d1
   port map ( A1 => as(3), A2 => as(1), ZN => z(1) );

U2560: nd02d1
   port map ( A1 => as(3), A2 => as(1), ZN => z(0) );

U27023: nd03d1
   port map ( A1 => ncomp(23), A2 => as(5), A3 => U341_Z, ZN =>
         y(23) );

U27022: nd03d1
   port map ( A1 => ncomp(22), A2 => as(5), A3 => U341_Z, ZN =>
         y(22) );

U27021: nd03d1
   port map ( A1 => ncomp(21), A2 => as(5), A3 => U341_Z, ZN =>
         y(21) );

U27020: nd03d1
   port map ( A1 => ncomp(20), A2 => as(5), A3 => U341_Z, ZN =>
         y(20) );

U27019: nd03d1
   port map ( A1 => ncomp(19), A2 => as(5), A3 => U341_Z, ZN =>
         y(19) );

U27018: nd03d1
   port map ( A1 => ncomp(18), A2 => as(5), A3 => U341_Z, ZN =>
         y(18) );
```

```
U27017: nd03d1
   port map ( A1 => ncomp(17), A2 => as(5), A3 => U341_Z, ZN =>
        y(17) );

U27016: nd03d1
   port map ( A1 => ncomp(16), A2 => as(5), A3 => U341_Z, ZN =>
        y(16) );

U27015: nd03d1
   port map ( A1 => ncomp(15), A2 => as(5), A3 => U341_Z, ZN =>
        y(15) );

U27014: nd03d1
   port map ( A1 => ncomp(14), A2 => as(5), A3 => U341_Z, ZN =>
        y(14) );

U27013: nd03d1
   port map ( A1 => ncomp(13), A2 => as(5), A3 => U341_Z, ZN =>
        y(13) );

U27012: nd03d1
   port map ( A1 => ncomp(12), A2 => as(5), A3 => U341_Z, ZN =>
        y(12) );

U27011: nd03d1
   port map ( A1 => ncomp(11), A2 => as(5), A3 => U341_Z, ZN =>
        y(11) );

U27010: nd03d1
   port map ( A1 => ncomp(10), A2 => as(5), A3 => U341_Z, ZN =>
        y(10) );

U2709: nd03d1
   port map ( A1 => ncomp(9), A2 => as(5), A3 => U341_Z, ZN =>
        y(9) );

U2708: nd03d1
   port map ( A1 => ncomp(8), A2 => as(5), A3 => U341_Z, ZN =>
        y(8) );

U2707: nd03d1
   port map ( A1 => ncomp(7), A2 => as(5), A3 => U341_Z, ZN =>
        y(7) );

U2706: nd03d1
   port map ( A1 => ncomp(6), A2 => as(5), A3 => U341_Z, ZN =>
        y(6) );

U2705: nd03d1
   port map ( A1 => ncomp(5), A2 => as(5), A3 => U341_Z, ZN =>
        y(5) );

U2704: nd03d1
   port map ( A1 => ncomp(4), A2 => as(5), A3 => U341_Z, ZN =>
        y(4) );

U2703: nd03d1
   port map ( A1 => ncomp(3), A2 => as(5), A3 => U341_Z, ZN =>
```

```
        y(3) );

U2702: nd03d1
  port map ( A1 => ncomp(2), A2 => as(5), A3 => U341_Z, ZN =>
        y(2) );

U2701: nd03d1
  port map ( A1 => ncomp(1), A2 => as(5), A3 => U341_Z, ZN =>
        y(1) );

U2700: nd03d1
  port map ( A1 => ncomp(0), A2 => as(5), A3 => U341_Z, ZN =>
        y(0) );

U27423: nd02d1
  port map ( A1 => U26723_ZN, A2 => U26823_ZN, ZN => U27423_ZN
        );

U27422: nd02d1
  port map ( A1 => U26722_ZN, A2 => U26822_ZN, ZN => U27422_ZN
        );

U27421: nd02d1
  port map ( A1 => U26721_ZN, A2 => U26821_ZN, ZN => U27421_ZN
        );

U27420: nd02d1
  port map ( A1 => U26720_ZN, A2 => U26820_ZN, ZN => U27420_ZN
        );

U27419: nd02d1
  port map ( A1 => U26719_ZN, A2 => U26819_ZN, ZN => U27419_ZN
        );

U27418: nd02d1
  port map ( A1 => U26718_ZN, A2 => U26818_ZN, ZN => U27418_ZN
        );

U27417: nd02d1
  port map ( A1 => U26717_ZN, A2 => U26817_ZN, ZN => U27417_ZN
        );

U27416: nd02d1
  port map ( A1 => U26716_ZN, A2 => U26816_ZN, ZN => U27416_ZN
        );

U27415: nd02d1
  port map ( A1 => U26715_ZN, A2 => U26815_ZN, ZN => U27415_ZN
        );

U27414: nd02d1
  port map ( A1 => U26714_ZN, A2 => U26814_ZN, ZN => U27414_ZN
        );

U27413: nd02d1
  port map ( A1 => U26713_ZN, A2 => U26813_ZN, ZN => U27413_ZN
        );
```

```
U27412: nd02d1
   port map ( A1 => U26712_ZN, A2 => U26812_ZN, ZN => U27412_ZN
        );

U27411: nd02d1
   port map ( A1 => U26711_ZN, A2 => U26811_ZN, ZN => U27411_ZN
        );

U27410: nd02d1
   port map ( A1 => U26710_ZN, A2 => U26810_ZN, ZN => U27410_ZN
        );

U2749: nd02d1
   port map ( A1 => U2679_ZN, A2 => U2689_ZN, ZN => U2749_ZN );

U2748: nd02d1
   port map ( A1 => U2678_ZN, A2 => U2688_ZN, ZN => U2748_ZN );

U2747: nd02d1
   port map ( A1 => U2677_ZN, A2 => U2687_ZN, ZN => U2747_ZN );

U2746: nd02d1
   port map ( A1 => U2676_ZN, A2 => U2686_ZN, ZN => U2746_ZN );

U2745: nd02d1
   port map ( A1 => U2675_ZN, A2 => U2685_ZN, ZN => U2745_ZN );

U2744: nd02d1
   port map ( A1 => U2674_ZN, A2 => U2684_ZN, ZN => U2744_ZN );

U2743: nd02d1
   port map ( A1 => U2673_ZN, A2 => U2683_ZN, ZN => U2743_ZN );

U2742: nd02d1
   port map ( A1 => U2672_ZN, A2 => U2682_ZN, ZN => U2742_ZN );

U2741: nd02d1
   port map ( A1 => U2671_ZN, A2 => U2681_ZN, ZN => U2741_ZN );

U2740: nd02d1
   port map ( A1 => U2670_ZN, A2 => U2680_ZN, ZN => U2740_ZN );

U27323: nd02d1
   port map ( A1 => mask(47), A2 => U25723_ZN, ZN => U27323_ZN );

U27322: nd02d1
   port map ( A1 => mask(46), A2 => U25722_ZN, ZN => U27322_ZN );

U27321: nd02d1
   port map ( A1 => mask(45), A2 => U25721_ZN, ZN => U27321_ZN );

U27320: nd02d1
   port map ( A1 => mask(44), A2 => U25720_ZN, ZN => U27320_ZN );

U27319: nd02d1
   port map ( A1 => mask(43), A2 => U25719_ZN, ZN => U27319_ZN );

U27318: nd02d1
```

```
    port map ( A1 => mask(42), A2 => U25718_ZN, ZN => U27318_ZN );

U27317: nd02d1
    port map ( A1 => mask(41), A2 => U25717_ZN, ZN => U27317_ZN );

U27316: nd02d1
    port map ( A1 => mask(40), A2 => U25716_ZN, ZN => U27316_ZN );

U27315: nd02d1
    port map ( A1 => mask(39), A2 => U25715_ZN, ZN => U27315_ZN );

U27314: nd02d1
    port map ( A1 => mask(38), A2 => U25714_ZN, ZN => U27314_ZN );

U27313: nd02d1
    port map ( A1 => mask(37), A2 => U25713_ZN, ZN => U27313_ZN );

U27312: nd02d1
    port map ( A1 => mask(36), A2 => U25712_ZN, ZN => U27312_ZN );

U27311: nd02d1
    port map ( A1 => mask(35), A2 => U25711_ZN, ZN => U27311_ZN );

U27310: nd02d1
    port map ( A1 => mask(34), A2 => U25710_ZN, ZN => U27310_ZN );

U2739: nd02d1
    port map ( A1 => mask(33), A2 => U2579_ZN, ZN => U2739_ZN );

U2738: nd02d1
    port map ( A1 => mask(32), A2 => U2578_ZN, ZN => U2738_ZN );

U2737: nd02d1
    port map ( A1 => mask(31), A2 => U2577_ZN, ZN => U2737_ZN );

U2736: nd02d1
    port map ( A1 => mask(30), A2 => U2576_ZN, ZN => U2736_ZN );

U2735: nd02d1
    port map ( A1 => mask(29), A2 => U2575_ZN, ZN => U2735_ZN );

U2734: nd02d1
    port map ( A1 => mask(28), A2 => U2574_ZN, ZN => U2734_ZN );

U2733: nd02d1
    port map ( A1 => mask(27), A2 => U2573_ZN, ZN => U2733_ZN );

U2732: nd02d1
    port map ( A1 => mask(26), A2 => U2572_ZN, ZN => U2732_ZN );

U2731: nd02d1
    port map ( A1 => mask(25), A2 => U2571_ZN, ZN => U2731_ZN );

U2730: nd02d1
    port map ( A1 => mask(24), A2 => U2570_ZN, ZN => U2730_ZN );

U27123: nd02d1
    port map ( A1 => mask(23), A2 => z(23), ZN => U27123_ZN );
```

```
U27122: nd02d1
   port map ( A1 => mask(22), A2 => z(22), ZN => U27122_ZN );

U27121: nd02d1
   port map ( A1 => mask(21), A2 => z(21), ZN => U27121_ZN );

U27120: nd02d1
   port map ( A1 => mask(20), A2 => z(20), ZN => U27120_ZN );

U27119: nd02d1
   port map ( A1 => mask(19), A2 => z(19), ZN => U27119_ZN );

U27118: nd02d1
   port map ( A1 => mask(18), A2 => z(18), ZN => U27118_ZN );

U27117: nd02d1
   port map ( A1 => mask(17), A2 => z(17), ZN => U27117_ZN );

U27116: nd02d1
   port map ( A1 => mask(16), A2 => z(16), ZN => U27116_ZN );

U27115: nd02d1
   port map ( A1 => mask(15), A2 => z(15), ZN => U27115_ZN );

U27114: nd02d1
   port map ( A1 => mask(14), A2 => z(14), ZN => U27114_ZN );

U27113: nd02d1
   port map ( A1 => mask(13), A2 => z(13), ZN => U27113_ZN );

U27112: nd02d1
   port map ( A1 => mask(12), A2 => z(12), ZN => U27112_ZN );

U27111: nd02d1
   port map ( A1 => mask(11), A2 => z(11), ZN => U27111_ZN );

U27110: nd02d1
   port map ( A1 => mask(10), A2 => z(10), ZN => U27110_ZN );

U2719: nd02d1
   port map ( A1 => mask(9), A2 => z(9), ZN => U2719_ZN );

U2718: nd02d1
   port map ( A1 => mask(8), A2 => z(8), ZN => U2718_ZN );

U2717: nd02d1
   port map ( A1 => mask(7), A2 => z(7), ZN => U2717_ZN );

U2716: nd02d1
   port map ( A1 => mask(6), A2 => z(6), ZN => U2716_ZN );

U2715: nd02d1
   port map ( A1 => mask(5), A2 => z(5), ZN => U2715_ZN );

U2714: nd02d1
   port map ( A1 => mask(4), A2 => z(4), ZN => U2714_ZN );
```

```
U2713: nd02d1
   port map ( A1 => mask(3), A2 => z(3), ZN => U2713_ZN );

U2712: nd02d1
   port map ( A1 => mask(2), A2 => z(2), ZN => U2712_ZN );

U2711: nd02d1
   port map ( A1 => mask(1), A2 => z(1), ZN => U2711_ZN );

U2710: nd02d1
   port map ( A1 => mask(0), A2 => z(0), ZN => U2710_ZN );

U25723: nd02d1
   port map ( A1 => as(3), A2 => as(1), ZN => U25723_ZN );

U25722: nd02d1
   port map ( A1 => as(3), A2 => as(1), ZN => U25722_ZN );

U25721: nd02d1
   port map ( A1 => as(3), A2 => as(1), ZN => U25721_ZN );

U25720: nd02d1
   port map ( A1 => as(3), A2 => as(1), ZN => U25720_ZN );

U25719: nd02d1
   port map ( A1 => as(3), A2 => as(1), ZN => U25719_ZN );

U25718: nd02d1
   port map ( A1 => as(3), A2 => as(1), ZN => U25718_ZN );

U25717: nd02d1
   port map ( A1 => as(3), A2 => as(1), ZN => U25717_ZN );

U25716: nd02d1
   port map ( A1 => as(3), A2 => as(1), ZN => U25716_ZN );

U25715: nd02d1
   port map ( A1 => as(3), A2 => as(1), ZN => U25715_ZN );

U25714: nd02d1
   port map ( A1 => as(3), A2 => as(1), ZN => U25714_ZN );

U25713: nd02d1
   port map ( A1 => as(3), A2 => as(1), ZN => U25713_ZN );

U25712: nd02d1
   port map ( A1 => as(3), A2 => as(1), ZN => U25712_ZN );

U25711: nd02d1
   port map ( A1 => as(3), A2 => as(1), ZN => U25711_ZN );

U25710: nd02d1
   port map ( A1 => as(3), A2 => as(1), ZN => U25710_ZN );

U2579: nd02d1
   port map ( A1 => as(3), A2 => as(1), ZN => U2579_ZN );

U2578: nd02d1
```

```
   port map ( A1 => as(3), A2 => as(1), ZN => U2578_ZN );

U2577: nd02d1
   port map ( A1 => as(3), A2 => as(1), ZN => U2577_ZN );

U2576: nd02d1
   port map ( A1 => as(3), A2 => as(1), ZN => U2576_ZN );

U2575: nd02d1
   port map ( A1 => as(3), A2 => as(1), ZN => U2575_ZN );

U2574: nd02d1
   port map ( A1 => as(3), A2 => as(1), ZN => U2574_ZN );

U2573: nd02d1
   port map ( A1 => as(3), A2 => as(1), ZN => U2573_ZN );

U2572: nd02d1
   port map ( A1 => as(3), A2 => as(1), ZN => U2572_ZN );

U2571: nd02d1
   port map ( A1 => as(3), A2 => as(1), ZN => U2571_ZN );

U2570: nd02d1
   port map ( A1 => as(3), A2 => as(1), ZN => U2570_ZN );

U26823: nd03d1
   port map ( A1 => comp(47), A2 => U343_Z, A3 => as(4), ZN =>
         U26823_ZN );

U26822: nd03d1
   port map ( A1 => comp(46), A2 => U343_Z, A3 => as(4), ZN =>
         U26822_ZN );

U26821: nd03d1
   port map ( A1 => comp(45), A2 => U343_Z, A3 => as(4), ZN =>
         U26821_ZN );

U26820: nd03d1
   port map ( A1 => comp(44), A2 => U343_Z, A3 => as(4), ZN =>
         U26820_ZN );

U26819: nd03d1
   port map ( A1 => comp(43), A2 => U343_Z, A3 => as(4), ZN =>
         U26819_ZN );

U26818: nd03d1
   port map ( A1 => comp(42), A2 => U343_Z, A3 => as(4), ZN =>
         U26818_ZN );

U26817: nd03d1
   port map ( A1 => comp(41), A2 => U343_Z, A3 => as(4), ZN =>
         U26817_ZN );

U26816: nd03d1
   port map ( A1 => comp(40), A2 => U343_Z, A3 => as(4), ZN =>
         U26816_ZN );
```

```
U26815: nd03d1
   port map ( A1 => comp(39), A2 => U343_Z, A3 => as(4), ZN =>
        U26815_ZN );

U26814: nd03d1
   port map ( A1 => comp(38), A2 => U343_Z, A3 => as(4), ZN =>
        U26814_ZN );

U26813: nd03d1
   port map ( A1 => comp(37), A2 => U343_Z, A3 => as(4), ZN =>
        U26813_ZN );

U26812: nd03d1
   port map ( A1 => comp(36), A2 => U343_Z, A3 => as(4), ZN =>
        U26812_ZN );

U26811: nd03d1
   port map ( A1 => comp(35), A2 => U343_Z, A3 => as(4), ZN =>
        U26811_ZN );

U26810: nd03d1
   port map ( A1 => comp(34), A2 => U343_Z, A3 => as(4), ZN =>
        U26810_ZN );

U2689: nd03d1
   port map ( A1 => comp(33), A2 => U343_Z, A3 => as(4), ZN =>
        U2689_ZN );

U2688: nd03d1
   port map ( A1 => comp(32), A2 => U343_Z, A3 => as(4), ZN =>
        U2688_ZN );

U2687: nd03d1
   port map ( A1 => comp(31), A2 => U343_Z, A3 => as(4), ZN =>
        U2687_ZN );

U2686: nd03d1
   port map ( A1 => comp(30), A2 => U343_Z, A3 => as(4), ZN =>
        U2686_ZN );

U2685: nd03d1
   port map ( A1 => comp(29), A2 => U343_Z, A3 => as(4), ZN =>
        U2685_ZN );

U2684: nd03d1
   port map ( A1 => comp(28), A2 => U343_Z, A3 => as(4), ZN =>
        U2684_ZN );

U2683: nd03d1
   port map ( A1 => comp(27), A2 => U343_Z, A3 => as(4), ZN =>
        U2683_ZN );

U2682: nd03d1
   port map ( A1 => comp(26), A2 => U343_Z, A3 => as(4), ZN =>
        U2682_ZN );

U2681: nd03d1
   port map ( A1 => comp(25), A2 => U343_Z, A3 => as(4), ZN =>
```

```
        U2681_ZN );

U2680: nd03d1
   port map ( A1 => comp(24), A2 => U343_Z, A3 => as(4), ZN =>
        U2680_ZN );

U26723: nd03d1
   port map ( A1 => ncomp(47), A2 => as(5), A3 => U344_Z, ZN =>
        U26723_ZN );

U26722: nd03d1
   port map ( A1 => ncomp(46), A2 => as(5), A3 => U344_Z, ZN =>
        U26722_ZN );

U26721: nd03d1
   port map ( A1 => ncomp(45), A2 => as(5), A3 => U344_Z, ZN =>
        U26721_ZN );

U26720: nd03d1
   port map ( A1 => ncomp(44), A2 => as(5), A3 => U344_Z, ZN =>
        U26720_ZN );

U26719: nd03d1
   port map ( A1 => ncomp(43), A2 => as(5), A3 => U344_Z, ZN =>
        U26719_ZN );

U26718: nd03d1
   port map ( A1 => ncomp(42), A2 => as(5), A3 => U344_Z, ZN =>
        U26718_ZN );

U26717: nd03d1
   port map ( A1 => ncomp(41), A2 => as(5), A3 => U344_Z, ZN =>
        U26717_ZN );

U26716: nd03d1
   port map ( A1 => ncomp(40), A2 => as(5), A3 => U344_Z, ZN =>
        U26716_ZN );

U26715: nd03d1
   port map ( A1 => ncomp(39), A2 => as(5), A3 => U344_Z, ZN =>
        U26715_ZN );

U26714: nd03d1
   port map ( A1 => ncomp(38), A2 => as(5), A3 => U344_Z, ZN =>
        U26714_ZN );

U26713: nd03d1
   port map ( A1 => ncomp(37), A2 => as(5), A3 => U344_Z, ZN =>
        U26713_ZN );

U26712: nd03d1
   port map ( A1 => ncomp(36), A2 => as(5), A3 => U344_Z, ZN =>
        U26712_ZN );

U26711: nd03d1
   port map ( A1 => ncomp(35), A2 => as(5), A3 => U344_Z, ZN =>
        U26711_ZN );
```

```
U26710: nd03d1
   port map ( A1 => ncomp(34), A2 => as(5), A3 => U344_Z, ZN =>
         U26710_ZN );

U2679: nd03d1
   port map ( A1 => ncomp(33), A2 => as(5), A3 => U344_Z, ZN =>
         U2679_ZN );

U2678: nd03d1
   port map ( A1 => ncomp(32), A2 => as(5), A3 => U344_Z, ZN =>
         U2678_ZN );

U2677: nd03d1
   port map ( A1 => ncomp(31), A2 => as(5), A3 => U344_Z, ZN =>
         U2677_ZN );

U2676: nd03d1
   port map ( A1 => ncomp(30), A2 => as(5), A3 => U344_Z, ZN =>
         U2676_ZN );

U2675: nd03d1
   port map ( A1 => ncomp(29), A2 => as(5), A3 => U344_Z, ZN =>
         U2675_ZN );

U2674: nd03d1
   port map ( A1 => ncomp(28), A2 => as(5), A3 => U344_Z, ZN =>
         U2674_ZN );

U2673: nd03d1
   port map ( A1 => ncomp(27), A2 => as(5), A3 => U344_Z, ZN =>
         U2673_ZN );

U2672: nd03d1
   port map ( A1 => ncomp(26), A2 => as(5), A3 => U344_Z, ZN =>
         U2672_ZN );

U2671: nd03d1
   port map ( A1 => ncomp(25), A2 => as(5), A3 => U344_Z, ZN =>
         U2671_ZN );

U2670: nd03d1
   port map ( A1 => ncomp(24), A2 => as(5), A3 => U344_Z, ZN =>
         U2670_ZN );

U28523: NR02D2
   port map ( A1 => U27323_ZN, A2 => U27423_ZN, ZN => U28523_ZN
         );

U28522: NR02D2
   port map ( A1 => U27322_ZN, A2 => U27422_ZN, ZN => U28522_ZN
         );

U28521: NR02D2
   port map ( A1 => U27321_ZN, A2 => U27421_ZN, ZN => U28521_ZN
         );

U28520: NR02D2
   port map ( A1 => U27320_ZN, A2 => U27420_ZN, ZN => U28520_ZN
```

```
        );

U28519: NR02D2
   port map ( A1 => U27319_ZN, A2 => U27419_ZN, ZN => U28519_ZN
        );

U28518: NR02D2
   port map ( A1 => U27318_ZN, A2 => U27418_ZN, ZN => U28518_ZN
        );

U28517: NR02D2
   port map ( A1 => U27317_ZN, A2 => U27417_ZN, ZN => U28517_ZN
        );

U28516: NR02D2
   port map ( A1 => U27316_ZN, A2 => U27416_ZN, ZN => U28516_ZN
        );

U28515: NR02D2
   port map ( A1 => U27315_ZN, A2 => U27415_ZN, ZN => U28515_ZN
        );

U28514: NR02D2
   port map ( A1 => U27314_ZN, A2 => U27414_ZN, ZN => U28514_ZN
        );

U28513: NR02D2
   port map ( A1 => U27313_ZN, A2 => U27413_ZN, ZN => U28513_ZN
        );

U28512: NR02D2
   port map ( A1 => U27312_ZN, A2 => U27412_ZN, ZN => U28512_ZN
        );

U28511: NR02D2
   port map ( A1 => U27311_ZN, A2 => U27411_ZN, ZN => U28511_ZN
        );

U28510: NR02D2
   port map ( A1 => U27310_ZN, A2 => U27410_ZN, ZN => U28510_ZN
        );

U2859: NR02D2
   port map ( A1 => U2739_ZN, A2 => U2749_ZN, ZN => U2859_ZN );

U2858: NR02D2
   port map ( A1 => U2738_ZN, A2 => U2748_ZN, ZN => U2858_ZN );

U2857: NR02D2
   port map ( A1 => U2737_ZN, A2 => U2747_ZN, ZN => U2857_ZN );

U2856: NR02D2
   port map ( A1 => U2736_ZN, A2 => U2746_ZN, ZN => U2856_ZN );

U2855: NR02D2
   port map ( A1 => U2735_ZN, A2 => U2745_ZN, ZN => U2855_ZN );

U2854: NR02D2
```

```
   port map ( A1 => U2734_ZN, A2 => U2744_ZN, ZN => U2854_ZN );

U2853: NR02D2
   port map ( A1 => U2733_ZN, A2 => U2743_ZN, ZN => U2853_ZN );

U2852: NR02D2
   port map ( A1 => U2732_ZN, A2 => U2742_ZN, ZN => U2852_ZN );

U2851: NR02D2
   port map ( A1 => U2731_ZN, A2 => U2741_ZN, ZN => U2851_ZN );

U2850: NR02D2
   port map ( A1 => U2730_ZN, A2 => U2740_ZN, ZN => U2850_ZN );

U343: ni01d5
   port map ( I => as(0), Z => U343_Z );

U344: ni01d5
   port map ( I => as(0), Z => U344_Z );

U28623: NR02D2
   port map ( A1 => U27123_ZN, A2 => U27223_ZN, ZN => U28623_ZN
        );

U28622: NR02D2
   port map ( A1 => U27122_ZN, A2 => U27222_ZN, ZN => U28622_ZN
        );

U28621: NR02D2
   port map ( A1 => U27121_ZN, A2 => U27221_ZN, ZN => U28621_ZN
        );

U28620: NR02D2
   port map ( A1 => U27120_ZN, A2 => U27220_ZN, ZN => U28620_ZN
        );

U28619: NR02D2
   port map ( A1 => U27119_ZN, A2 => U27219_ZN, ZN => U28619_ZN
        );

U28618: NR02D2
   port map ( A1 => U27118_ZN, A2 => U27218_ZN, ZN => U28618_ZN
        );

U28617: NR02D2
   port map ( A1 => U27117_ZN, A2 => U27217_ZN, ZN => U28617_ZN
        );

U28616: NR02D2
   port map ( A1 => U27116_ZN, A2 => U27216_ZN, ZN => U28616_ZN
        );

U28615: NR02D2
   port map ( A1 => U27115_ZN, A2 => U27215_ZN, ZN => U28615_ZN
        );

U28614: NR02D2
   port map ( A1 => U27114_ZN, A2 => U27214_ZN, ZN => U28614_ZN
```

```
        );

U28613: NR02D2
   port map ( A1 => U27113_ZN, A2 => U27213_ZN, ZN => U28613_ZN
        );

U28612: NR02D2
   port map ( A1 => U27112_ZN, A2 => U27212_ZN, ZN => U28612_ZN
        );

U28611: NR02D2
   port map ( A1 => U27111_ZN, A2 => U27211_ZN, ZN => U28611_ZN
        );

U28610: NR02D2
   port map ( A1 => U27110_ZN, A2 => U27210_ZN, ZN => U28610_ZN
        );

U2869: NR02D2
   port map ( A1 => U2719_ZN, A2 => U2729_ZN, ZN => U2869_ZN );

U2868: NR02D2
   port map ( A1 => U2718_ZN, A2 => U2728_ZN, ZN => U2868_ZN );

U2867: NR02D2
   port map ( A1 => U2717_ZN, A2 => U2727_ZN, ZN => U2867_ZN );

U2866: NR02D2
   port map ( A1 => U2716_ZN, A2 => U2726_ZN, ZN => U2866_ZN );

U2865: NR02D2
   port map ( A1 => U2715_ZN, A2 => U2725_ZN, ZN => U2865_ZN );

U2864: NR02D2
   port map ( A1 => U2714_ZN, A2 => U2724_ZN, ZN => U2864_ZN );

U2863: NR02D2
   port map ( A1 => U2713_ZN, A2 => U2723_ZN, ZN => U2863_ZN );

U2862: NR02D2
   port map ( A1 => U2712_ZN, A2 => U2722_ZN, ZN => U2862_ZN );

U2861: NR02D2
   port map ( A1 => U2711_ZN, A2 => U2721_ZN, ZN => U2861_ZN );

U2860: NR02D2
   port map ( A1 => U2710_ZN, A2 => U2720_ZN, ZN => U2860_ZN );

U341: ni01d5
   port map ( I => as(0), Z => U341_Z );

U210: ni01d5
   port map ( I => U252_ZN, Z => as(0) );

U191: ni01d4
   port map ( I => cmp, Z => as(4) );

U192: in01d4
```

```
    port map ( I => cmp, ZN => as(5) );

  U205: in01d5
    port map ( I => U252_ZN, ZN => as(1) );

  U337: ck01d1
    port map ( CLK => DCLK, C => U337_C, CN => U337_CN );

  U251: nd02d1
    port map ( A1 => cmp, A2 => U253_ZN, ZN => U251_ZN );

  U246: in01d1
    port map ( I => DCLK, ZN => U246_ZN );

  U253: nd02d1
    port map ( A1 => CLK, A2 => U246_ZN, ZN => U253_ZN );

end compmux5;
```

file: CORE.VHD
-- Date of netlist generation: Nov-18-93

```
------------------------------------------------------------------------

library IEEE;
use IEEE.STD_LOGIC_1164.ALL;

library COMPASS_LIB;
use COMPASS_LIB.COMPASS.ALL;

entity core is

  port ( wenf : in Std_Logic := 'U';
      rstfifoaddr : in Std_Logic := 'U';
      venf : in Std_Logic := 'U';
      ldorf : in Std_Logic := 'U';
      f1 : in Std_Logic := 'U';
      f0 : in Std_Logic := 'U';
      s0 : in Std_Logic := 'U';
      s1 : in Std_Logic := 'U';
      bl : in Std_Logic_Vector(71 downto 0) := (others => 'U');
      mask : in Std_Logic_Vector(71 downto 0) := (others => 'U');
      ibl : in Std_Logic_Vector(71 downto 0) := (others => 'U');
      ldor : in Std_Logic := 'U';
      we : in Std_Logic := 'U';
      cmp : in Std_Logic := 'U';
      setag : in Std_Logic := 'U';
      prsp : in Std_Logic := 'U';
      resp_in : in Std_Logic := 'U';
      cntinit : in Std_Logic := 'U';
      mux1 : in Std_Logic := 'U';
      mux2 : in Std_Logic := 'U';
      rstaddr : in Std_Logic := 'U';
      finit : in Std_Logic := 'U';
      si : in Std_Logic_Vector(15 downto 0) := (others => 'U');
      mux0 : in Std_Logic := 'U';
      f2 : in Std_Logic := 'U';
      ssi : in Std_Logic := 'U';
      nni : in Std_Logic := 'U';
      rd : in Std_Logic_Vector(4 downto 0) := (others => 'U');
      ni : in Std_Logic_Vector(15 downto 0) := (others => 'U');
      exen : in Std_Logic := 'U';
      msaen : in Std_Logic := 'U';
      disch : in Std_Logic := 'U';
      fircnten : in Std_Logic := 'U';
      fir_in : in Std_Logic := 'U';

      fful : out Std_Logic := 'U';
      so : out Std_Logic_Vector(15 downto 0) := (others => 'U');
      no : out Std_Logic_Vector(15 downto 0) := (others => 'U');
      vout : out Std_Logic_Vector(23 downto 0) := (others =>
'U');
      outt : out Std_Logic_Vector(23 downto 0) := (others =>
'U');
      rsp : out Std_Logic := 'U';
```

```
        ctag : out Std_Logic := 'U';
        nno : out Std_Logic := 'U';
        sso : out Std_Logic := 'U' );

end core;

------------------------------------------------------------------------

architecture core OF core is

   component col341_c
      port ( si : in Std_Logic_Vector(15 downto 0) := (others =>
'U');
          ni : in Std_Logic_Vector(15 downto 0) := (others =>
'U');
          prsp : in Std_Logic;
          setag : in Std_Logic;
          resp_in : in Std_Logic;
          fir_in : in Std_Logic;
          mux0 : in Std_Logic;
          mux1 : in Std_Logic;
          mux2 : in Std_Logic;
          rstaddr : in Std_Logic;
          cntinit : in Std_Logic;
          we : in Std_Logic;
          ibl : in Std_Logic_Vector(71 downto 0) := (others =>
'U');
          bl : in Std_Logic_Vector(71 downto 0) := (others =>
'U');
          venb : in Std_Logic;
          rstfifoaddr : in Std_Logic;
          wenf : in Std_Logic;
          finit : in Std_Logic;
          cmp : in Std_Logic;
          rd : in Std_Logic_Vector(4 downto 0) := (others =>
'U');
          exen : in Std_Logic;
          nni : in Std_Logic;
          ssi : in Std_Logic;
          mask : in Std_Logic_Vector(71 downto 0) := (others =>
'U');
          f0 : in Std_Logic;
          f1 : in Std_Logic;
          f2 : in Std_Logic;
          asaen : in Std_Logic;
          fsaen : in Std_Logic;
          disch : in Std_Logic;
          msaen : in Std_Logic;
          fircnten : in Std_Logic;

          fful : out Std_Logic;
          so : out Std_Logic_Vector(15 downto 0) := (others =>
'U');
          no : out Std_Logic_Vector(15 downto 0) := (others =>
'U');
          count_out : out Std_Logic;
          sso : out Std_Logic;
```

```
        nno : out Std_Logic;
        rdsao : out Std_Logic_Vector(71 downto 0) := (others
=> 'U');
        rsp : out Std_Logic );
  end component;

  component oreg
     port ( ldor : in Std_Logic;
        s0 : in Std_Logic;
        s1 : in Std_Logic;
        ldorf : in Std_Logic;
        f : in Std_Logic_Vector(0 to 2) := (others => 'U');
        o : in Std_Logic_Vector(71 downto 0) := (others =>
'U');

        vout : out Std_Logic_Vector(23 downto 0) := (others =>
'U');
        orr : out Std_Logic_Vector(23 downto 0) := (others =>
'U') );
  end component;

  component col341_r
     port ( si : in Std_Logic_Vector(15 downto 0) := (others =>
'U');
        ni : in Std_Logic_Vector(15 downto 0) := (others =>
'U');
        prsp : in Std_Logic;
        setag : in Std_Logic;
        resp_in : in Std_Logic;
        fir_in : in Std_Logic;
        mux0 : in Std_Logic;
        mux1 : in Std_Logic;
        mux2 : in Std_Logic;
        rstaddr : in Std_Logic;
        cntinit : in Std_Logic;
        we : in Std_Logic;
        ibl : in Std_Logic_Vector(71 downto 0) := (others =>
'U');
        bl : in Std_Logic_Vector(71 downto 0) := (others =>
'U');
        venb : in Std_Logic;
        rstfifoaddr : in Std_Logic;
        wenf : in Std_Logic;
        finit : in Std_Logic;
        cmp : in Std_Logic;
        rd : in Std_Logic_Vector(4 downto 0) := (others =>
'U');
        exen : in Std_Logic;
        nni : in Std_Logic;
        ssi : in Std_Logic;
        mask : in Std_Logic_Vector(71 downto 0) := (others =>
'U');
        f0 : in Std_Logic;
        f1 : in Std_Logic;
        f2 : in Std_Logic;
        asaen : in Std_Logic;
        fsaen : in Std_Logic;
        disch : in Std_Logic;
```

```
            msaen : in Std_Logic;
            fircnten : in Std_Logic;

            fful : out Std_Logic;
            so : out Std_Logic_Vector(15 downto 0) := (others =>
'U');
            no : out Std_Logic_Vector(15 downto 0) := (others =>
'U');
            count_out : out Std_Logic;
            sso : out Std_Logic;
            nno : out Std_Logic;
            rdsao : out Std_Logic_Vector(71 downto 0) := (others
=> 'U');
            rsp : out Std_Logic );
  end component;

  component col342_1
     port ( si : in Std_Logic_Vector(15 downto 0) := (others =>
'U');
            ni : in Std_Logic_Vector(15 downto 0) := (others =>
'U');
            prsp : in Std_Logic;
            setag : in Std_Logic;
            resp_in : in Std_Logic;
            fir_in : in Std_Logic;
            mux0 : in Std_Logic;
            mux1 : in Std_Logic;
            mux2 : in Std_Logic;
            rstaddr : in Std_Logic;
            cntinit : in Std_Logic;
            we : in Std_Logic;
            ibl : in Std_Logic_Vector(71 downto 0) := (others =>
'U');
            bl : in Std_Logic_Vector(71 downto 0) := (others =>
'U');
            venb : in Std_Logic;
            rstfifoaddr : in Std_Logic;
            wenf : in Std_Logic;
            finit : in Std_Logic;
            cmp : in Std_Logic;
            rd : in Std_Logic_Vector(4 downto 0) := (others =>
'U');
            exen : in Std_Logic;
            nni : in Std_Logic;
            ssi : in Std_Logic;
            mask : in Std_Logic_Vector(71 downto 0) := (others =>
'U');
            f0 : in Std_Logic;
            f1 : in Std_Logic;
            f2 : in Std_Logic;
            asaen : in Std_Logic;
            fsaen : in Std_Logic;
            disch : in Std_Logic;
            msaen : in Std_Logic;
            fircnten : in Std_Logic;

            fful : out Std_Logic;
            so : out Std_Logic_Vector(15 downto 0) := (others =>
```

```
'U');
        no : out Std_Logic_Vector(15 downto 0) := (others =>
'U');
        count_out : out Std_Logic;
        sso : out Std_Logic;
        nno : out Std_Logic;
        rdsao : out Std_Logic_Vector(71 downto 0) := (others
=> 'U');
        rsp : out Std_Logic );
  end component;

  component rsp_prio
    port ( r0 : in Std_Logic;
        r1 : in Std_Logic;
        r2 : in Std_Logic;
        prsp : in Std_Logic;

        rsp : out Std_Logic;
        f1 : out Std_Logic;
        f2 : out Std_Logic;
        rs0 : out Std_Logic;
        rs1 : out Std_Logic;
        rs2 : out Std_Logic );
  end component;

  component resense
    port ( rstfifo : in Std_Logic;
        fu2 : in Std_Logic;
        fu1 : in Std_Logic;
        fu0 : in Std_Logic;
        rs0 : in Std_Logic;
        rs1 : in Std_Logic;
        rs2 : in Std_Logic;
        o2 : in Std_Logic_Vector(71 downto 0) := (others =>
'U');
        o1 : in Std_Logic_Vector(71 downto 0) := (others =>
'U');
        o0 : in Std_Logic_Vector(71 downto 0) := (others =>
'U');

        oo : out Std_Logic_Vector(71 downto 0) := (others =>
'U') );
  end component;

  component fulcon
    port ( rstfifo : in Std_Logic;
        ful : in Std_Logic;

        fful : out Std_Logic );
  end component;

  component fin_add
    port ( inn : in Std_Logic_Vector(2 downto 0) := (others =>
'U');
        rst : in Std_Logic;

        outt : out Std_Logic );
  end component;
```

```
signal fful_local: Std_Logic;
signal rs0 : Std_Logic;
signal rs1 : Std_Logic;
signal rs2 : Std_Logic;
signal U56_rdsao : Std_Logic_Vector(71 downto 0);
signal ff0 : Std_Logic;
signal c : Std_Logic_Vector(2 downto 0);
signal r0 : Std_Logic;
signal fir1 : Std_Logic;
signal fir2 : Std_Logic;
signal r2 : Std_Logic;
signal r1 : Std_Logic;
signal U56_nno : Std_Logic;
signal U56_no : Std_Logic_Vector(15 downto 0);
signal U57_so : Std_Logic_Vector(15 downto 0);
signal U57_sso : Std_Logic;
signal U44_oo : Std_Logic_Vector(71 downto 0);
signal ff1 : Std_Logic;
signal U59_rdsao : Std_Logic_Vector(71 downto 0);
signal U57_rdsao : Std_Logic_Vector(71 downto 0);
signal U59_so : Std_Logic_Vector(15 downto 0);
signal U57_no : Std_Logic_Vector(15 downto 0);
signal U59_sso : Std_Logic;
signal U57_nno : Std_Logic;
signal U59_fful : Std_Logic;

begin

U57: col341_c
  port map ( fful => ff1, so(15) => U57_so(15), so(14) =>
        U57_so(14), so(13) => U57_so(13), so(12) =>
        U57_so(12), so(11) => U57_so(11), so(10) =>
        U57_so(10), so(9) => U57_so(9), so(8) => U57_so(8),
        so(7) => U57_so(7), so(6) => U57_so(6), so(5) =>
        U57_so(5), so(4) => U57_so(4), so(3) => U57_so(3),
        so(2) => U57_so(2), so(1) => U57_so(1), so(0) =>
        U57_so(0), si(15) => U59_so(15), si(14) =>
        U59_so(14), si(13) => U59_so(13), si(12) =>
        U59_so(12), si(11) => U59_so(11), si(10) =>
        U59_so(10), si(9) => U59_so(9), si(8) => U59_so(8),
        si(7) => U59_so(7), si(6) => U59_so(6), si(5) =>
        U59_so(5), si(4) => U59_so(4), si(3) => U59_so(3),
        si(2) => U59_so(2), si(1) => U59_so(1), si(0) =>
        U59_so(0), no(15) => U57_no(15), no(14) =>
        U57_no(14), no(13) => U57_no(13), no(12) =>
        U57_no(12), no(11) => U57_no(11), no(10) =>
        U57_no(10), no(9) => U57_no(9), no(8) => U57_no(8),
        no(7) => U57_no(7), no(6) => U57_no(6), no(5) =>
        U57_no(5), no(4) => U57_no(4), no(3) => U57_no(3),
        no(2) => U57_no(2), no(1) => U57_no(1), no(0) =>
        U57_no(0), ni(15) => U56_no(15), ni(14) =>
        U56_no(14), ni(13) => U56_no(13), ni(12) =>
        U56_no(12), ni(11) => U56_no(11), ni(10) =>
        U56_no(10), ni(9) => U56_no(9), ni(8) => U56_no(8),
        ni(7) => U56_no(7), ni(6) => U56_no(6), ni(5) =>
```

U56_no(5), ni(4) => U56_no(4), ni(3) => U56_no(3), ni(2) => U56_no(2), ni(1) => U56_no(1), ni(0) => U56_no(0), prsp => prsp, setag => setag, resp_in => resp_in, fir_in => fir1, mux0 => mux0, mux1 => mux1, mux2 => mux2, rstaddr => rstaddr, cntinit => cntinit, we => we, ibl(71) => ibl(71), ibl(70) => ibl(70), ibl(69) => ibl(69), ibl(68) => ibl(68), ibl(67) => ibl(67), ibl(66) => ibl(66), ibl(65) => ibl(65), ibl(64) => ibl(64), ibl(63) => ibl(63), ibl(62) => ibl(62), ibl(61) => ibl(61), ibl(60) => ibl(60), ibl(59) => ibl(59), ibl(58) => ibl(58), ibl(57) => ibl(57), ibl(56) => ibl(56), ibl(55) => ibl(55), ibl(54) => ibl(54), ibl(53) => ibl(53), ibl(52) => ibl(52), ibl(51) => ibl(51), ibl(50) => ibl(50), ibl(49) => ibl(49), ibl(48) => ibl(48), ibl(47) => ibl(47), ibl(46) => ibl(46), ibl(45) => ibl(45), ibl(44) => ibl(44), ibl(43) => ibl(43), ibl(42) => ibl(42), ibl(41) => ibl(41), ibl(40) => ibl(40), ibl(39) => ibl(39), ibl(38) => ibl(38), ibl(37) => ibl(37), ibl(36) => ibl(36), ibl(35) => ibl(35), ibl(34) => ibl(34), ibl(33) => ibl(33), ibl(32) => ibl(32), ibl(31) => ibl(31), ibl(30) => ibl(30), ibl(29) => ibl(29), ibl(28) => ibl(28), ibl(27) => ibl(27), ibl(26) => ibl(26), ibl(25) => ibl(25), ibl(24) => ibl(24), ibl(23) => ibl(23), ibl(22) => ibl(22), ibl(21) => ibl(21), ibl(20) => ibl(20), ibl(19) => ibl(19), ibl(18) => ibl(18), ibl(17) => ibl(17), ibl(16) => ibl(16), ibl(15) => ibl(15), ibl(14) => ibl(14), ibl(13) => ibl(13), ibl(12) => ibl(12), ibl(11) => ibl(11), ibl(10) => ibl(10), ibl(9) => ibl(9), ibl(8) => ibl(8), ibl(7) => ibl(7), ibl(6) => ibl(6), ibl(5) => ibl(5), ibl(4) => ibl(4), ibl(3) => ibl(3), ibl(2) => ibl(2), ibl(1) => ibl(1), ibl(0) => ibl(0), bl(71) => bl(71), bl(70) => bl(70), bl(69) => bl(69), bl(68) => bl(68), bl(67) => bl(67), bl(66) => bl(66), bl(65) => bl(65), bl(64) => bl(64), bl(63) => bl(63), bl(62) => bl(62), bl(61) => bl(61), bl(60) => bl(60), bl(59) => bl(59), bl(58) => bl(58), bl(57) => bl(57), bl(56) => bl(56), bl(55) => bl(55), bl(54) => bl(54), bl(53) => bl(53), bl(52) => bl(52), bl(51) => bl(51), bl(50) => bl(50), bl(49) => bl(49), bl(48) => bl(48), bl(47) => bl(47), bl(46) => bl(46), bl(45) => bl(45), bl(44) => bl(44), bl(43) => bl(43), bl(42) => bl(42), bl(41) => bl(41), bl(40) => bl(40), bl(39) => bl(39), bl(38) => bl(38), bl(37) => bl(37), bl(36) => bl(36), bl(35) => bl(35), bl(34) => bl(34), bl(33) => bl(33), bl(32) => bl(32), bl(31) => bl(31), bl(30) => bl(30), bl(29) => bl(29), bl(28) => bl(28), bl(27) => bl(27), bl(26) => bl(26), bl(25) => bl(25), bl(24) => bl(24), bl(23) => bl(23), bl(22) => bl(22), bl(21) => bl(21), bl(20) => bl(20), bl(19) => bl(19), bl(18) => bl(18), bl(17) => bl(17), bl(16) => bl(16), bl(15) => bl(15), bl(14) => bl(14), bl(13) => bl(13), bl(12) => bl(12), bl(11) => bl(11), bl(10) => bl(10), bl(9) => bl(9), bl(8) => bl(8), bl(7)

=> bl(7), bl(6) => bl(6), bl(5) => bl(5), bl(4) =>
bl(4), bl(3) => bl(3), bl(2) => bl(2), bl(1) =>
bl(1), bl(0) => bl(0), venb => venf, rstfifoaddr
=> rstfifoaddr, wenf => wenf, finit => ff0, cmp =>
cmp, count_out => c(1), rd(4) => rd(4), rd(3) =>
rd(3), rd(2) => rd(2), rd(1) => rd(1), rd(0) =>
rd(0), exen => exen, sso => U57_sso, nni =>
U56_nno, nno => U57_nno, ssi => U59_sso, mask(71)
=> mask(71), mask(70) => mask(70), mask(69) =>
mask(69), mask(68) => mask(68), mask(67) =>
mask(67), mask(66) => mask(66), mask(65) =>
mask(65), mask(64) => mask(64), mask(63) =>
mask(63), mask(62) => mask(62), mask(61) =>
mask(61), mask(60) => mask(60), mask(59) =>
mask(59), mask(58) => mask(58), mask(57) =>
mask(57), mask(56) => mask(56), mask(55) =>
mask(55), mask(54) => mask(54), mask(53) =>
mask(53), mask(52) => mask(52), mask(51) =>
mask(51), mask(50) => mask(50), mask(49) =>
mask(49), mask(48) => mask(48), mask(47) =>
mask(47), mask(46) => mask(46), mask(45) =>
mask(45), mask(44) => mask(44), mask(43) =>
mask(43), mask(42) => mask(42), mask(41) =>
mask(41), mask(40) => mask(40), mask(39) =>
mask(39), mask(38) => mask(38), mask(37) =>
mask(37), mask(36) => mask(36), mask(35) =>
mask(35), mask(34) => mask(34), mask(33) =>
mask(33), mask(32) => mask(32), mask(31) =>
mask(31), mask(30) => mask(30), mask(29) =>
mask(29), mask(28) => mask(28), mask(27) =>
mask(27), mask(26) => mask(26), mask(25) =>
mask(25), mask(24) => mask(24), mask(23) =>
mask(23), mask(22) => mask(22), mask(21) =>
mask(21), mask(20) => mask(20), mask(19) =>
mask(19), mask(18) => mask(18), mask(17) =>
mask(17), mask(16) => mask(16), mask(15) =>
mask(15), mask(14) => mask(14), mask(13) =>
mask(13), mask(12) => mask(12), mask(11) =>
mask(11), mask(10) => mask(10), mask(9) => mask(9),
mask(8) => mask(8), mask(7) => mask(7), mask(6) =>
mask(6), mask(5) => mask(5), mask(4) => mask(4),
mask(3) => mask(3), mask(2) => mask(2), mask(1) =>
mask(1), mask(0) => mask(0), rdsao(71) =>
U57_rdsao(71), rdsao(70) => U57_rdsao(70),
rdsao(69) => U57_rdsao(69), rdsao(68) =>
U57_rdsao(68), rdsao(67) => U57_rdsao(67),
rdsao(66) => U57_rdsao(66), rdsao(65) =>
U57_rdsao(65), rdsao(64) => U57_rdsao(64),
rdsao(63) => U57_rdsao(63), rdsao(62) =>
U57_rdsao(62), rdsao(61) => U57_rdsao(61),
rdsao(60) => U57_rdsao(60), rdsao(59) =>
U57_rdsao(59), rdsao(58) => U57_rdsao(58),
rdsao(57) => U57_rdsao(57), rdsao(56) =>
U57_rdsao(56), rdsao(55) => U57_rdsao(55),
rdsao(54) => U57_rdsao(54), rdsao(53) =>
U57_rdsao(53), rdsao(52) => U57_rdsao(52),
rdsao(51) => U57_rdsao(51), rdsao(50) =>
U57_rdsao(50), rdsao(49) => U57_rdsao(49),

```
rdsao(48) => U57_rdsao(48), rdsao(47) =>
U57_rdsao(47), rdsao(46) => U57_rdsao(46),
rdsao(45) => U57_rdsao(45), rdsao(44) =>
U57_rdsao(44), rdsao(43) => U57_rdsao(43),
rdsao(42) => U57_rdsao(42), rdsao(41) =>
U57_rdsao(41), rdsao(40) => U57_rdsao(40),
rdsao(39) => U57_rdsao(39), rdsao(38) =>
U57_rdsao(38), rdsao(37) => U57_rdsao(37),
rdsao(36) => U57_rdsao(36), rdsao(35) =>
U57_rdsao(35), rdsao(34) => U57_rdsao(34),
rdsao(33) => U57_rdsao(33), rdsao(32) =>
U57_rdsao(32), rdsao(31) => U57_rdsao(31),
rdsao(30) => U57_rdsao(30), rdsao(29) =>
U57_rdsao(29), rdsao(28) => U57_rdsao(28),
rdsao(27) => U57_rdsao(27), rdsao(26) =>
U57_rdsao(26), rdsao(25) => U57_rdsao(25),
rdsao(24) => U57_rdsao(24), rdsao(23) =>
U57_rdsao(23), rdsao(22) => U57_rdsao(22),
rdsao(21) => U57_rdsao(21), rdsao(20) =>
U57_rdsao(20), rdsao(19) => U57_rdsao(19),
rdsao(18) => U57_rdsao(18), rdsao(17) =>
U57_rdsao(17), rdsao(16) => U57_rdsao(16),
rdsao(15) => U57_rdsao(15), rdsao(14) =>
U57_rdsao(14), rdsao(13) => U57_rdsao(13),
rdsao(12) => U57_rdsao(12), rdsao(11) =>
U57_rdsao(11), rdsao(10) => U57_rdsao(10),
rdsao(9) => U57_rdsao(9), rdsao(8) => U57_rdsao(8),
rdsao(7) => U57_rdsao(7), rdsao(6) => U57_rdsao(6),
rdsao(5) => U57_rdsao(5), rdsao(4) => U57_rdsao(4),
rdsao(3) => U57_rdsao(3), rdsao(2) => U57_rdsao(2),
rdsao(1) => U57_rdsao(1), rdsao(0) => U57_rdsao(0),
f0 => f0, f1 => f1, f2 => f2, rsp => r1, asaen =>
ldor, fsaen => ldorf, disch => disch, msaen =>
msaen, fircnten => fircnten );

U15: oreg
  port map ( ldor => ldor, s0 => s0, s1 => s1, ldorf => ldorf,
    f(0) => f0, f(1) => f1, f(2) => f2, vout(23) =>
    vout(23), vout(22) => vout(22), vout(21) =>
    vout(21), vout(20) => vout(20), vout(19) =>
    vout(19), vout(18) => vout(18), vout(17) =>
    vout(17), vout(16) => vout(16), vout(15) =>
    vout(15), vout(14) => vout(14), vout(13) =>
    vout(13), vout(12) => vout(12), vout(11) =>
    vout(11), vout(10) => vout(10), vout(9) => vout(9),
    vout(8) => vout(8), vout(7) => vout(7), vout(6) =>
    vout(6), vout(5) => vout(5), vout(4) => vout(4),
    vout(3) => vout(3), vout(2) => vout(2), vout(1) =>
    vout(1), vout(0) => vout(0), o(71) => U44_oo(71),
    o(70) => U44_oo(70), o(69) => U44_oo(69), o(68) =>
    U44_oo(68), o(67) => U44_oo(67), o(66) =>
    U44_oo(66), o(65) => U44_oo(65), o(64) =>
    U44_oo(64), o(63) => U44_oo(63), o(62) =>
    U44_oo(62), o(61) => U44_oo(61), o(60) =>
    U44_oo(60), o(59) => U44_oo(59), o(58) =>
    U44_oo(58), o(57) => U44_oo(57), o(56) =>
    U44_oo(56), o(55) => U44_oo(55), o(54) =>
    U44_oo(54), o(53) => U44_oo(53), o(52) =>
```

```
          U44_oo(52), o(51) => U44_oo(51), o(50) =>
          U44_oo(50), o(49) => U44_oo(49), o(48) =>
          U44_oo(48), o(47) => U44_oo(47), o(46) =>
          U44_oo(46), o(45) => U44_oo(45), o(44) =>
          U44_oo(44), o(43) => U44_oo(43), o(42) =>
          U44_oo(42), o(41) => U44_oo(41), o(40) =>
          U44_oo(40), o(39) => U44_oo(39), o(38) =>
          U44_oo(38), o(37) => U44_oo(37), o(36) =>
          U44_oo(36), o(35) => U44_oo(35), o(34) =>
          U44_oo(34), o(33) => U44_oo(33), o(32) =>
          U44_oo(32), o(31) => U44_oo(31), o(30) =>
          U44_oo(30), o(29) => U44_oo(29), o(28) =>
          U44_oo(28), o(27) => U44_oo(27), o(26) =>
          U44_oo(26), o(25) => U44_oo(25), o(24) =>
          U44_oo(24), o(23) => U44_oo(23), o(22) =>
          U44_oo(22), o(21) => U44_oo(21), o(20) =>
          U44_oo(20), o(19) => U44_oo(19), o(18) =>
          U44_oo(18), o(17) => U44_oo(17), o(16) =>
          U44_oo(16), o(15) => U44_oo(15), o(14) =>
          U44_oo(14), o(13) => U44_oo(13), o(12) =>
          U44_oo(12), o(11) => U44_oo(11), o(10) =>
          U44_oo(10), o(9) => U44_oo(9), o(8) => U44_oo(8),
          o(7) => U44_oo(7), o(6) => U44_oo(6), o(5) =>
          U44_oo(5), o(4) => U44_oo(4), o(3) => U44_oo(3),
          o(2) => U44_oo(2), o(1) => U44_oo(1), o(0) =>
          U44_oo(0), orr(23) => outt(23), orr(22) =>
          outt(22), orr(21) => outt(21), orr(20) => outt(20),
          orr(19) => outt(19), orr(18) => outt(18), orr(17)
          => outt(17), orr(16) => outt(16), orr(15) =>
          outt(15), orr(14) => outt(14), orr(13) => outt(13),
          orr(12) => outt(12), orr(11) => outt(11), orr(10)
          => outt(10), orr(9) => outt(9), orr(8) => outt(8),
          orr(7) => outt(7), orr(6) => outt(6), orr(5) =>
          outt(5), orr(4) => outt(4), orr(3) => outt(3),
          orr(2) => outt(2), orr(1) => outt(1), orr(0) =>
          outt(0) );

U59: col341_r
   port map ( fful => U59_fful, so(15) => U59_so(15), so(14) =>
          U59_so(14), so(13) => U59_so(13), so(12) =>
          U59_so(12), so(11) => U59_so(11), so(10) =>
          U59_so(10), so(9) => U59_so(9), so(8) => U59_so(8),
          so(7) => U59_so(7), so(6) => U59_so(6), so(5) =>
          U59_so(5), so(4) => U59_so(4), so(3) => U59_so(3),
          so(2) => U59_so(2), so(1) => U59_so(1), so(0) =>
          U59_so(0), si(15) => si(15), si(14) => si(14),
          si(13) => si(13), si(12) => si(12), si(11) =>
          si(11), si(10) => si(10), si(9) => si(9), si(8) =>
          si(8), si(7) => si(7), si(6) => si(6), si(5) =>
          si(5), si(4) => si(4), si(3) => si(3), si(2) =>
          si(2), si(1) => si(1), si(0) => si(0), no(15) =>
          no(15), no(14) => no(14), no(13) => no(13), no(12)
          => no(12), no(11) => no(11), no(10) => no(10),
          no(9) => no(9), no(8) => no(8), no(7) => no(7),
          no(6) => no(6), no(5) => no(5), no(4) => no(4),
          no(3) => no(3), no(2) => no(2), no(1) => no(1),
          no(0) => no(0), ni(15) => U57_no(15), ni(14) =>
          U57_no(14), ni(13) => U57_no(13), ni(12) =>
```

U57_no(12), ni(11) => U57_no(11), ni(10) => U57_no(10), ni(9) => U57_no(9), ni(8) => U57_no(8), ni(7) => U57_no(7), ni(6) => U57_no(6), ni(5) => U57_no(5), ni(4) => U57_no(4), ni(3) => U57_no(3), ni(2) => U57_no(2), ni(1) => U57_no(1), ni(0) => U57_no(0), prsp => prsp, setag => setag, resp_in => resp_in, fir_in => fir2, mux0 => mux0, mux1 => mux1, mux2 => mux2, rstaddr => rstaddr, cntinit => cntinit, we => we, ibl(71) => ibl(71), ibl(70) => ibl(70), ibl(69) => ibl(69), ibl(68) => ibl(68), ibl(67) => ibl(67), ibl(66) => ibl(66), ibl(65) => ibl(65), ibl(64) => ibl(64), ibl(63) => ibl(63), ibl(62) => ibl(62), ibl(61) => ibl(61), ibl(60) => ibl(60), ibl(59) => ibl(59), ibl(58) => ibl(58), ibl(57) => ibl(57), ibl(56) => ibl(56), ibl(55) => ibl(55), ibl(54) => ibl(54), ibl(53) => ibl(53), ibl(52) => ibl(52), ibl(51) => ibl(51), ibl(50) => ibl(50), ibl(49) => ibl(49), ibl(48) => ibl(48), ibl(47) => ibl(47), ibl(46) => ibl(46), ibl(45) => ibl(45), ibl(44) => ibl(44), ibl(43) => ibl(43), ibl(42) => ibl(42), ibl(41) => ibl(41), ibl(40) => ibl(40), ibl(39) => ibl(39), ibl(38) => ibl(38), ibl(37) => ibl(37), ibl(36) => ibl(36), ibl(35) => ibl(35), ibl(34) => ibl(34), ibl(33) => ibl(33), ibl(32) => ibl(32), ibl(31) => ibl(31), ibl(30) => ibl(30), ibl(29) => ibl(29), ibl(28) => ibl(28), ibl(27) => ibl(27), ibl(26) => ibl(26), ibl(25) => ibl(25), ibl(24) => ibl(24), ibl(23) => ibl(23), ibl(22) => ibl(22), ibl(21) => ibl(21), ibl(20) => ibl(20), ibl(19) => ibl(19), ibl(18) => ibl(18), ibl(17) => ibl(17), ibl(16) => ibl(16), ibl(15) => ibl(15), ibl(14) => ibl(14), ibl(13) => ibl(13), ibl(12) => ibl(12), ibl(11) => ibl(11), ibl(10) => ibl(10), ibl(9) => ibl(9), ibl(8) => ibl(8), ibl(7) => ibl(7), ibl(6) => ibl(6), ibl(5) => ibl(5), ibl(4) => ibl(4), ibl(3) => ibl(3), ibl(2) => ibl(2), ibl(1) => ibl(1), ibl(0) => ibl(0), bl(71) => bl(71), bl(70) => bl(70), bl(69) => bl(69), bl(68) => bl(68), bl(67) => bl(67), bl(66) => bl(66), bl(65) => bl(65), bl(64) => bl(64), bl(63) => bl(63), bl(62) => bl(62), bl(61) => bl(61), bl(60) => bl(60), bl(59) => bl(59), bl(58) => bl(58), bl(57) => bl(57), bl(56) => bl(56), bl(55) => bl(55), bl(54) => bl(54), bl(53) => bl(53), bl(52) => bl(52), bl(51) => bl(51), bl(50) => bl(50), bl(49) => bl(49), bl(48) => bl(48), bl(47) => bl(47), bl(46) => bl(46), bl(45) => bl(45), bl(44) => bl(44), bl(43) => bl(43), bl(42) => bl(42), bl(41) => bl(41), bl(40) => bl(40), bl(39) => bl(39), bl(38) => bl(38), bl(37) => bl(37), bl(36) => bl(36), bl(35) => bl(35), bl(34) => bl(34), bl(33) => bl(33), bl(32) => bl(32), bl(31) => bl(31), bl(30) => bl(30), bl(29) => bl(29), bl(28) => bl(28), bl(27) => bl(27), bl(26) => bl(26), bl(25) => bl(25), bl(24) => bl(24), bl(23) => bl(23), bl(22) => bl(22), bl(21) => bl(21), bl(20) => bl(20), bl(19) => bl(19), bl(18) => bl(18), bl(17) => bl(17), bl(16) => bl(16), bl(15) => bl(15), bl(14) => bl(14), bl(13) => bl(13), bl(12) => bl(12), bl(11) => bl(11), bl(10) => bl(10), bl(9) => bl(9), bl(8) => bl(8), bl(7) => bl(7), bl(6) => bl(6), bl(5) => bl(5), bl(4) => bl(4), bl(3) => bl(3), bl(2) => bl(2), bl(1) => bl(1), bl(0) => bl(0), venb => venf, rstfifoaddr => rstfifoaddr, wenf => wenf, finit => ff1, cmp => cmp, count_out => c(0), rd(4) => rd(4), rd(3) => rd(3), rd(2) => rd(2), rd(1) => rd(1), rd(0) => rd(0), exen => exen, sso => U59_sso, nni => U57_nno, nno => nno, ssi => ssi, mask(71) => mask(71), mask(70) => mask(70), mask(69) => mask(69), mask(68) => mask(68), mask(67) => mask(67), mask(66) => mask(66), mask(65) => mask(65), mask(64) => mask(64), mask(63) => mask(63), mask(62) => mask(62), mask(61) => mask(61), mask(60) => mask(60), mask(59) => mask(59), mask(58) => mask(58), mask(57) => mask(57), mask(56) => mask(56), mask(55) => mask(55), mask(54) => mask(54), mask(53) => mask(53), mask(52) => mask(52), mask(51) => mask(51), mask(50) => mask(50), mask(49) => mask(49), mask(48) => mask(48), mask(47) => mask(47), mask(46) => mask(46), mask(45) => mask(45), mask(44) => mask(44), mask(43) => mask(43), mask(42) => mask(42), mask(41) => mask(41), mask(40) => mask(40), mask(39) => mask(39), mask(38) => mask(38), mask(37) => mask(37), mask(36) => mask(36), mask(35) => mask(35), mask(34) => mask(34), mask(33) => mask(33), mask(32) => mask(32), mask(31) => mask(31), mask(30) => mask(30), mask(29) => mask(29), mask(28) => mask(28), mask(27) => mask(27), mask(26) => mask(26), mask(25) => mask(25), mask(24) => mask(24), mask(23) => mask(23), mask(22) => mask(22), mask(21) => mask(21), mask(20) => mask(20), mask(19) => mask(19), mask(18) => mask(18), mask(17) => mask(17), mask(16) => mask(16), mask(15) => mask(15), mask(14) => mask(14), mask(13) => mask(13), mask(12) => mask(12), mask(11) => mask(11), mask(10) => mask(10), mask(9) => mask(9), mask(8) => mask(8), mask(7) => mask(7), mask(6) => mask(6), mask(5) => mask(5), mask(4) => mask(4), mask(3) => mask(3), mask(2) => mask(2), mask(1) => mask(1), mask(0) => mask(0), rdsao(71) => U59_rdsao(71), rdsao(70) => U59_rdsao(70), rdsao(69) => U59_rdsao(69), rdsao(68) => U59_rdsao(68), rdsao(67) => U59_rdsao(67), rdsao(66) => U59_rdsao(66), rdsao(65) => U59_rdsao(65), rdsao(64) => U59_rdsao(64), rdsao(63) => U59_rdsao(63), rdsao(62) => U59_rdsao(62), rdsao(61) => U59_rdsao(61), rdsao(60) => U59_rdsao(60), rdsao(59) => U59_rdsao(59), rdsao(58) => U59_rdsao(58), rdsao(57) => U59_rdsao(57), rdsao(56) => U59_rdsao(56), rdsao(55) => U59_rdsao(55), rdsao(54) => U59_rdsao(54), rdsao(53) =>

```
            U59_rdsao(53), rdsao(52) => U59_rdsao(52),
            rdsao(51) => U59_rdsao(51), rdsao(50) =>
            U59_rdsao(50), rdsao(49) => U59_rdsao(49),
            rdsao(48) => U59_rdsao(48), rdsao(47) =>
            U59_rdsao(47), rdsao(46) => U59_rdsao(46),
            rdsao(45) => U59_rdsao(45), rdsao(44) =>
            U59_rdsao(44), rdsao(43) => U59_rdsao(43),
            rdsao(42) => U59_rdsao(42), rdsao(41) =>
            U59_rdsao(41), rdsao(40) => U59_rdsao(40),
            rdsao(39) => U59_rdsao(39), rdsao(38) =>
            U59_rdsao(38), rdsao(37) => U59_rdsao(37),
            rdsao(36) => U59_rdsao(36), rdsao(35) =>
            U59_rdsao(35), rdsao(34) => U59_rdsao(34),
            rdsao(33) => U59_rdsao(33), rdsao(32) =>
            U59_rdsao(32), rdsao(31) => U59_rdsao(31),
            rdsao(30) => U59_rdsao(30), rdsao(29) =>
            U59_rdsao(29), rdsao(28) => U59_rdsao(28),
            rdsao(27) => U59_rdsao(27), rdsao(26) =>
            U59_rdsao(26), rdsao(25) => U59_rdsao(25),
            rdsao(24) => U59_rdsao(24), rdsao(23) =>
            U59_rdsao(23), rdsao(22) => U59_rdsao(22),
            rdsao(21) => U59_rdsao(21), rdsao(20) =>
            U59_rdsao(20), rdsao(19) => U59_rdsao(19),
            rdsao(18) => U59_rdsao(18), rdsao(17) =>
            U59_rdsao(17), rdsao(16) => U59_rdsao(16),
            rdsao(15) => U59_rdsao(15), rdsao(14) =>
            U59_rdsao(14), rdsao(13) => U59_rdsao(13),
            rdsao(12) => U59_rdsao(12), rdsao(11) =>
            U59_rdsao(11), rdsao(10) => U59_rdsao(10),
            rdsao(9) => U59_rdsao(9), rdsao(8) => U59_rdsao(8),
            rdsao(7) => U59_rdsao(7), rdsao(6) => U59_rdsao(6),
            rdsao(5) => U59_rdsao(5), rdsao(4) => U59_rdsao(4),
            rdsao(3) => U59_rdsao(3), rdsao(2) => U59_rdsao(2),
            rdsao(1) => U59_rdsao(1), rdsao(0) => U59_rdsao(0),
            f0 => f0, f1 => f1, f2 => f2, rsp => r2, asaen =>
            ldor, fsaen => ldorf, disch => disch, msaen =>
            msaen, fircnten => fircnten );

    U56: col342_1
      port map ( fful => ff0, so(15) => so(15), so(14) => so(14),
            so(13) => so(13), so(12) => so(12), so(11) =>
            so(11), so(10) => so(10), so(9) => so(9), so(8) =>
            so(8), so(7) => so(7), so(6) => so(6), so(5) =>
            so(5), so(4) => so(4), so(3) => so(3), so(2) =>
            so(2), so(1) => so(1), so(0) => so(0), si(15) =>
            U57_so(15), si(14) => U57_so(14), si(13) =>
            U57_so(13), si(12) => U57_so(12), si(11) =>
            U57_so(11), si(10) => U57_so(10), si(9) =>
            U57_so(9), si(8) => U57_so(8), si(7) => U57_so(7),
            si(6) => U57_so(6), si(5) => U57_so(5), si(4) =>
            U57_so(4), si(3) => U57_so(3), si(2) => U57_so(2),
            si(1) => U57_so(1), si(0) => U57_so(0), no(15) =>
            U56_no(15), no(14) => U56_no(14), no(13) =>
            U56_no(13), no(12) => U56_no(12), no(11) =>
            U56_no(11), no(10) => U56_no(10), no(9) =>
            U56_no(9), no(8) => U56_no(8), no(7) => U56_no(7),
            no(6) => U56_no(6), no(5) => U56_no(5), no(4) =>
            U56_no(4), no(3) => U56_no(3), no(2) => U56_no(2),
```

no(1) => U56_no(1), no(0) => U56_no(0), ni(15) => ni(15), ni(14) => ni(14), ni(13) => ni(13), ni(12) => ni(12), ni(11) => ni(11), ni(10) => ni(10), ni(9) => ni(9), ni(8) => ni(8), ni(7) => ni(7), ni(6) => ni(6), ni(5) => ni(5), ni(4) => ni(4), ni(3) => ni(3), ni(2) => ni(2), ni(1) => ni(1), ni(0) => ni(0), prsp => prsp, setag => setag, resp_in => resp_in, fir_in => fir_in, mux0 => mux0, mux1 => mux1, mux2 => mux2, rstaddr => rstaddr, cntinit => cntinit, we => we, ibl(71) => ibl(71), ibl(70) => ibl(70), ibl(69) => ibl(69), ibl(68) => ibl(68), ibl(67) => ibl(67), ibl(66) => ibl(66), ibl(65) => ibl(65), ibl(64) => ibl(64), ibl(63) => ibl(63), ibl(62) => ibl(62), ibl(61) => ibl(61), ibl(60) => ibl(60), ibl(59) => ibl(59), ibl(58) => ibl(58), ibl(57) => ibl(57), ibl(56) => ibl(56), ibl(55) => ibl(55), ibl(54) => ibl(54), ibl(53) => ibl(53), ibl(52) => ibl(52), ibl(51) => ibl(51), ibl(50) => ibl(50), ibl(49) => ibl(49), ibl(48) => ibl(48), ibl(47) => ibl(47), ibl(46) => ibl(46), ibl(45) => ibl(45), ibl(44) => ibl(44), ibl(43) => ibl(43), ibl(42) => ibl(42), ibl(41) => ibl(41), ibl(40) => ibl(40), ibl(39) => ibl(39), ibl(38) => ibl(38), ibl(37) => ibl(37), ibl(36) => ibl(36), ibl(35) => ibl(35), ibl(34) => ibl(34), ibl(33) => ibl(33), ibl(32) => ibl(32), ibl(31) => ibl(31), ibl(30) => ibl(30), ibl(29) => ibl(29), ibl(28) => ibl(28), ibl(27) => ibl(27), ibl(26) => ibl(26), ibl(25) => ibl(25), ibl(24) => ibl(24), ibl(23) => ibl(23), ibl(22) => ibl(22), ibl(21) => ibl(21), ibl(20) => ibl(20), ibl(19) => ibl(19), ibl(18) => ibl(18), ibl(17) => ibl(17), ibl(16) => ibl(16), ibl(15) => ibl(15), ibl(14) => ibl(14), ibl(13) => ibl(13), ibl(12) => ibl(12), ibl(11) => ibl(11), ibl(10) => ibl(10), ibl(9) => ibl(9), ibl(8) => ibl(8), ibl(7) => ibl(7), ibl(6) => ibl(6), ibl(5) => ibl(5), ibl(4) => ibl(4), ibl(3) => ibl(3), ibl(2) => ibl(2), ibl(1) => ibl(1), ibl(0) => ibl(0), bl(71) => bl(71), bl(70) => bl(70), bl(69) => bl(69), bl(68) => bl(68), bl(67) => bl(67), bl(66) => bl(66), bl(65) => bl(65), bl(64) => bl(64), bl(63) => bl(63), bl(62) => bl(62), bl(61) => bl(61), bl(60) => bl(60), bl(59) => bl(59), bl(58) => bl(58), bl(57) => bl(57), bl(56) => bl(56), bl(55) => bl(55), bl(54) => bl(54), bl(53) => bl(53), bl(52) => bl(52), bl(51) => bl(51), bl(50) => bl(50), bl(49) => bl(49), bl(48) => bl(48), bl(47) => bl(47), bl(46) => bl(46), bl(45) => bl(45), bl(44) => bl(44), bl(43) => bl(43), bl(42) => bl(42), bl(41) => bl(41), bl(40) => bl(40), bl(39) => bl(39), bl(38) => bl(38), bl(37) => bl(37), bl(36) => bl(36), bl(35) => bl(35), bl(34) => bl(34), bl(33) => bl(33), bl(32) => bl(32), bl(31) => bl(31), bl(30) => bl(30), bl(29) => bl(29), bl(28) => bl(28), bl(27) => bl(27), bl(26) => bl(26), bl(25) => bl(25), bl(24) => bl(24), bl(23) => bl(23), bl(22) => bl(22), bl(21) => bl(21), bl(20) => bl(20), bl(19) => bl(19), bl(18) => bl(18), bl(17) => bl(17), bl(16) => bl(16), bl(15) => bl(15), bl(14) => bl(14), bl(13) => bl(13), bl(12) => bl(12), bl(11) => bl(11), bl(10) => bl(10), bl(9) => bl(9), bl(8) => bl(8), bl(7) => bl(7), bl(6) => bl(6), bl(5) => bl(5), bl(4) => bl(4), bl(3) => bl(3), bl(2) => bl(2), bl(1) => bl(1), bl(0) => bl(0), venb => venf, rstfifoaddr => rstfifoaddr, wenf => wenf, finit => finit, cmp => cmp, count_out => c(2), rd(4) => rd(4), rd(3) => rd(3), rd(2) => rd(2), rd(1) => rd(1), rd(0) => rd(0), exen => exen, sso => sso, nni => nni, nno => U56_nno, ssi => U57_sso, mask(71) => mask(71), mask(70) => mask(70), mask(69) => mask(69), mask(68) => mask(68), mask(67) => mask(67), mask(66) => mask(66), mask(65) => mask(65), mask(64) => mask(64), mask(63) => mask(63), mask(62) => mask(62), mask(61) => mask(61), mask(60) => mask(60), mask(59) => mask(59), mask(58) => mask(58), mask(57) => mask(57), mask(56) => mask(56), mask(55) => mask(55), mask(54) => mask(54), mask(53) => mask(53), mask(52) => mask(52), mask(51) => mask(51), mask(50) => mask(50), mask(49) => mask(49), mask(48) => mask(48), mask(47) => mask(47), mask(46) => mask(46), mask(45) => mask(45), mask(44) => mask(44), mask(43) => mask(43), mask(42) => mask(42), mask(41) => mask(41), mask(40) => mask(40), mask(39) => mask(39), mask(38) => mask(38), mask(37) => mask(37), mask(36) => mask(36), mask(35) => mask(35), mask(34) => mask(34), mask(33) => mask(33), mask(32) => mask(32), mask(31) => mask(31), mask(30) => mask(30), mask(29) => mask(29), mask(28) => mask(28), mask(27) => mask(27), mask(26) => mask(26), mask(25) => mask(25), mask(24) => mask(24), mask(23) => mask(23), mask(22) => mask(22), mask(21) => mask(21), mask(20) => mask(20), mask(19) => mask(19), mask(18) => mask(18), mask(17) => mask(17), mask(16) => mask(16), mask(15) => mask(15), mask(14) => mask(14), mask(13) => mask(13), mask(12) => mask(12), mask(11) => mask(11), mask(10) => mask(10), mask(9) => mask(9), mask(8) => mask(8), mask(7) => mask(7), mask(6) => mask(6), mask(5) => mask(5), mask(4) => mask(4), mask(3) => mask(3), mask(2) => mask(2), mask(1) => mask(1), mask(0) => mask(0), rdsao(71) => U56_rdsao(71), rdsao(70) => U56_rdsao(70), rdsao(69) => U56_rdsao(69), rdsao(68) => U56_rdsao(68), rdsao(67) => U56_rdsao(67), rdsao(66) => U56_rdsao(66), rdsao(65) => U56_rdsao(65), rdsao(64) => U56_rdsao(64), rdsao(63) => U56_rdsao(63), rdsao(62) => U56_rdsao(62), rdsao(61) => U56_rdsao(61), rdsao(60) => U56_rdsao(60), rdsao(59) => U56_rdsao(59), rdsao(58) => U56_rdsao(58), rdsao(57) => U56_rdsao(57), rdsao(56) => U56_rdsao(56), rdsao(55) =>

```
U56_rdsao(55), rdsao(54) => U56_rdsao(54),
rdsao(53) => U56_rdsao(53), rdsao(52) =>
U56_rdsao(52), rdsao(51) => U56_rdsao(51),
rdsao(50) => U56_rdsao(50), rdsao(49) =>
U56_rdsao(49), rdsao(48) => U56_rdsao(48),
rdsao(47) => U56_rdsao(47), rdsao(46) =>
U56_rdsao(46), rdsao(45) => U56_rdsao(45),
rdsao(44) => U56_rdsao(44), rdsao(43) =>
U56_rdsao(43), rdsao(42) => U56_rdsao(42),
rdsao(41) => U56_rdsao(41), rdsao(40) =>
U56_rdsao(40), rdsao(39) => U56_rdsao(39),
rdsao(38) => U56_rdsao(38), rdsao(37) =>
U56_rdsao(37), rdsao(36) => U56_rdsao(36),
rdsao(35) => U56_rdsao(35), rdsao(34) =>
U56_rdsao(34), rdsao(33) => U56_rdsao(33),
rdsao(32) => U56_rdsao(32), rdsao(31) =>
U56_rdsao(31), rdsao(30) => U56_rdsao(30),
rdsao(29) => U56_rdsao(29), rdsao(28) =>
U56_rdsao(28), rdsao(27) => U56_rdsao(27),
rdsao(26) => U56_rdsao(26), rdsao(25) =>
U56_rdsao(25), rdsao(24) => U56_rdsao(24),
rdsao(23) => U56_rdsao(23), rdsao(22) =>
U56_rdsao(22), rdsao(21) => U56_rdsao(21),
rdsao(20) => U56_rdsao(20), rdsao(19) =>
U56_rdsao(19), rdsao(18) => U56_rdsao(18),
rdsao(17) => U56_rdsao(17), rdsao(16) =>
U56_rdsao(16), rdsao(15) => U56_rdsao(15),
rdsao(14) => U56_rdsao(14), rdsao(13) =>
U56_rdsao(13), rdsao(12) => U56_rdsao(12),
rdsao(11) => U56_rdsao(11), rdsao(10) =>
U56_rdsao(10), rdsao(9) => U56_rdsao(9), rdsao(8)
=> U56_rdsao(8), rdsao(7) => U56_rdsao(7),
rdsao(6) => U56_rdsao(6), rdsao(5) => U56_rdsao(5),
rdsao(4) => U56_rdsao(4), rdsao(3) => U56_rdsao(3),
rdsao(2) => U56_rdsao(2), rdsao(1) => U56_rdsao(1),
rdsao(0) => U56_rdsao(0), f0 => f0, f1 => f1, f2
=> f2, rsp => r0, asaen => ldor, fsaen => ldorf,
disch => disch, msaen => msaen, fircnten =>
fircnten );

U24: rsp_prio
  port map ( rsp => rsp, r0 => r0, r1 => r1, r2 => r2, f1 =>
        fir1, f2 => fir2, prsp => prsp, rs0 => rs0, rs1 =>
        rs1, rs2 => rs2 );

U44: resense
  port map ( rstfifo => rstfifoaddr, fu2 => fful_local, fu1 =>
        ff1, fu0 => ff0, rs0 => rs2, rs1 => rs1, rs2 =>
        rs0, o2(71) => U59_rdsao(71), o2(70) =>
        U59_rdsao(70), o2(69) => U59_rdsao(69), o2(68) =>
        U59_rdsao(68), o2(67) => U59_rdsao(67), o2(66) =>
        U59_rdsao(66), o2(65) => U59_rdsao(65), o2(64) =>
        U59_rdsao(64), o2(63) => U59_rdsao(63), o2(62) =>
        U59_rdsao(62), o2(61) => U59_rdsao(61), o2(60) =>
        U59_rdsao(60), o2(59) => U59_rdsao(59), o2(58) =>
        U59_rdsao(58), o2(57) => U59_rdsao(57), o2(56) =>
        U59_rdsao(56), o2(55) => U59_rdsao(55), o2(54) =>
        U59_rdsao(54), o2(53) => U59_rdsao(53), o2(52) =>
```

```
U59_rdsao(52), o2(51) => U59_rdsao(51), o2(50) =>
U59_rdsao(50), o2(49) => U59_rdsao(49), o2(48) =>
U59_rdsao(48), o2(47) => U59_rdsao(47), o2(46) =>
U59_rdsao(46), o2(45) => U59_rdsao(45), o2(44) =>
U59_rdsao(44), o2(43) => U59_rdsao(43), o2(42) =>
U59_rdsao(42), o2(41) => U59_rdsao(41), o2(40) =>
U59_rdsao(40), o2(39) => U59_rdsao(39), o2(38) =>
U59_rdsao(38), o2(37) => U59_rdsao(37), o2(36) =>
U59_rdsao(36), o2(35) => U59_rdsao(35), o2(34) =>
U59_rdsao(34), o2(33) => U59_rdsao(33), o2(32) =>
U59_rdsao(32), o2(31) => U59_rdsao(31), o2(30) =>
U59_rdsao(30), o2(29) => U59_rdsao(29), o2(28) =>
U59_rdsao(28), o2(27) => U59_rdsao(27), o2(26) =>
U59_rdsao(26), o2(25) => U59_rdsao(25), o2(24) =>
U59_rdsao(24), o2(23) => U59_rdsao(23), o2(22) =>
U59_rdsao(22), o2(21) => U59_rdsao(21), o2(20) =>
U59_rdsao(20), o2(19) => U59_rdsao(19), o2(18) =>
U59_rdsao(18), o2(17) => U59_rdsao(17), o2(16) =>
U59_rdsao(16), o2(15) => U59_rdsao(15), o2(14) =>
U59_rdsao(14), o2(13) => U59_rdsao(13), o2(12) =>
U59_rdsao(12), o2(11) => U59_rdsao(11), o2(10) =>
U59_rdsao(10), o2(9) => U59_rdsao(9), o2(8) =>
U59_rdsao(8), o2(7) => U59_rdsao(7), o2(6) =>
U59_rdsao(6), o2(5) => U59_rdsao(5), o2(4) =>
U59_rdsao(4), o2(3) => U59_rdsao(3), o2(2) =>
U59_rdsao(2), o2(1) => U59_rdsao(1), o2(0) =>
U59_rdsao(0), o1(71) => U57_rdsao(71), o1(70) =>
U57_rdsao(70), o1(69) => U57_rdsao(69), o1(68) =>
U57_rdsao(68), o1(67) => U57_rdsao(67), o1(66) =>
U57_rdsao(66), o1(65) => U57_rdsao(65), o1(64) =>
U57_rdsao(64), o1(63) => U57_rdsao(63), o1(62) =>
U57_rdsao(62), o1(61) => U57_rdsao(61), o1(60) =>
U57_rdsao(60), o1(59) => U57_rdsao(59), o1(58) =>
U57_rdsao(58), o1(57) => U57_rdsao(57), o1(56) =>
U57_rdsao(56), o1(55) => U57_rdsao(55), o1(54) =>
U57_rdsao(54), o1(53) => U57_rdsao(53), o1(52) =>
U57_rdsao(52), o1(51) => U57_rdsao(51), o1(50) =>
U57_rdsao(50), o1(49) => U57_rdsao(49), o1(48) =>
U57_rdsao(48), o1(47) => U57_rdsao(47), o1(46) =>
U57_rdsao(46), o1(45) => U57_rdsao(45), o1(44) =>
U57_rdsao(44), o1(43) => U57_rdsao(43), o1(42) =>
U57_rdsao(42), o1(41) => U57_rdsao(41), o1(40) =>
U57_rdsao(40), o1(39) => U57_rdsao(39), o1(38) =>
U57_rdsao(38), o1(37) => U57_rdsao(37), o1(36) =>
U57_rdsao(36), o1(35) => U57_rdsao(35), o1(34) =>
U57_rdsao(34), o1(33) => U57_rdsao(33), o1(32) =>
U57_rdsao(32), o1(31) => U57_rdsao(31), o1(30) =>
U57_rdsao(30), o1(29) => U57_rdsao(29), o1(28) =>
U57_rdsao(28), o1(27) => U57_rdsao(27), o1(26) =>
U57_rdsao(26), o1(25) => U57_rdsao(25), o1(24) =>
U57_rdsao(24), o1(23) => U57_rdsao(23), o1(22) =>
U57_rdsao(22), o1(21) => U57_rdsao(21), o1(20) =>
U57_rdsao(20), o1(19) => U57_rdsao(19), o1(18) =>
U57_rdsao(18), o1(17) => U57_rdsao(17), o1(16) =>
U57_rdsao(16), o1(15) => U57_rdsao(15), o1(14) =>
U57_rdsao(14), o1(13) => U57_rdsao(13), o1(12) =>
U57_rdsao(12), o1(11) => U57_rdsao(11), o1(10) =>
U57_rdsao(10), o1(9) => U57_rdsao(9), o1(8) =>
```

U57_rdsao(8), o1(7) => U57_rdsao(7), o1(6) =>
U57_rdsao(6), o1(5) => U57_rdsao(5), o1(4) =>
U57_rdsao(4), o1(3) => U57_rdsao(3), o1(2) =>
U57_rdsao(2), o1(1) => U57_rdsao(1), o1(0) =>
U57_rdsao(0), o0(71) => U56_rdsao(71), o0(70) =>
U56_rdsao(70), o0(69) => U56_rdsao(69), o0(68) =>
U56_rdsao(68), o0(67) => U56_rdsao(67), o0(66) =>
U56_rdsao(66), o0(65) => U56_rdsao(65), o0(64) =>
U56_rdsao(64), o0(63) => U56_rdsao(63), o0(62) =>
U56_rdsao(62), o0(61) => U56_rdsao(61), o0(60) =>
U56_rdsao(60), o0(59) => U56_rdsao(59), o0(58) =>
U56_rdsao(58), o0(57) => U56_rdsao(57), o0(56) =>
U56_rdsao(56), o0(55) => U56_rdsao(55), o0(54) =>
U56_rdsao(54), o0(53) => U56_rdsao(53), o0(52) =>
U56_rdsao(52), o0(51) => U56_rdsao(51), o0(50) =>
U56_rdsao(50), o0(49) => U56_rdsao(49), o0(48) =>
U56_rdsao(48), o0(47) => U56_rdsao(47), o0(46) =>
U56_rdsao(46), o0(45) => U56_rdsao(45), o0(44) =>
U56_rdsao(44), o0(43) => U56_rdsao(43), o0(42) =>
U56_rdsao(42), o0(41) => U56_rdsao(41), o0(40) =>
U56_rdsao(40), o0(39) => U56_rdsao(39), o0(38) =>
U56_rdsao(38), o0(37) => U56_rdsao(37), o0(36) =>
U56_rdsao(36), o0(35) => U56_rdsao(35), o0(34) =>
U56_rdsao(34), o0(33) => U56_rdsao(33), o0(32) =>
U56_rdsao(32), o0(31) => U56_rdsao(31), o0(30) =>
U56_rdsao(30), o0(29) => U56_rdsao(29), o0(28) =>
U56_rdsao(28), o0(27) => U56_rdsao(27), o0(26) =>
U56_rdsao(26), o0(25) => U56_rdsao(25), o0(24) =>
U56_rdsao(24), o0(23) => U56_rdsao(23), o0(22) =>
U56_rdsao(22), o0(21) => U56_rdsao(21), o0(20) =>
U56_rdsao(20), o0(19) => U56_rdsao(19), o0(18) =>
U56_rdsao(18), o0(17) => U56_rdsao(17), o0(16) =>
U56_rdsao(16), o0(15) => U56_rdsao(15), o0(14) =>
U56_rdsao(14), o0(13) => U56_rdsao(13), o0(12) =>
U56_rdsao(12), o0(11) => U56_rdsao(11), o0(10) =>
U56_rdsao(10), o0(9) => U56_rdsao(9), o0(8) =>
U56_rdsao(8), o0(7) => U56_rdsao(7), o0(6) =>
U56_rdsao(6), o0(5) => U56_rdsao(5), o0(4) =>
U56_rdsao(4), o0(3) => U56_rdsao(3), o0(2) =>
U56_rdsao(2), o0(1) => U56_rdsao(1), o0(0) =>
U56_rdsao(0), oo(71) => U44_oo(71), oo(70) =>
U44_oo(70), oo(69) => U44_oo(69), oo(68) =>
U44_oo(68), oo(67) => U44_oo(67), oo(66) =>
U44_oo(66), oo(65) => U44_oo(65), oo(64) =>
U44_oo(64), oo(63) => U44_oo(63), oo(62) =>
U44_oo(62), oo(61) => U44_oo(61), oo(60) =>
U44_oo(60), oo(59) => U44_oo(59), oo(58) =>
U44_oo(58), oo(57) => U44_oo(57), oo(56) =>
U44_oo(56), oo(55) => U44_oo(55), oo(54) =>
U44_oo(54), oo(53) => U44_oo(53), oo(52) =>
U44_oo(52), oo(51) => U44_oo(51), oo(50) =>
U44_oo(50), oo(49) => U44_oo(49), oo(48) =>
U44_oo(48), oo(47) => U44_oo(47), oo(46) =>
U44_oo(46), oo(45) => U44_oo(45), oo(44) =>
U44_oo(44), oo(43) => U44_oo(43), oo(42) =>
U44_oo(42), oo(41) => U44_oo(41), oo(40) =>
U44_oo(40), oo(39) => U44_oo(39), oo(38) =>
U44_oo(38), oo(37) => U44_oo(37), oo(36) =>

```
            U44_oo(36), oo(35) => U44_oo(35), oo(34) =>
            U44_oo(34), oo(33) => U44_oo(33), oo(32) =>
            U44_oo(32), oo(31) => U44_oo(31), oo(30) =>
            U44_oo(30), oo(29) => U44_oo(29), oo(28) =>
            U44_oo(28), oo(27) => U44_oo(27), oo(26) =>
            U44_oo(26), oo(25) => U44_oo(25), oo(24) =>
            U44_oo(24), oo(23) => U44_oo(23), oo(22) =>
            U44_oo(22), oo(21) => U44_oo(21), oo(20) =>
            U44_oo(20), oo(19) => U44_oo(19), oo(18) =>
            U44_oo(18), oo(17) => U44_oo(17), oo(16) =>
            U44_oo(16), oo(15) => U44_oo(15), oo(14) =>
            U44_oo(14), oo(13) => U44_oo(13), oo(12) =>
            U44_oo(12), oo(11) => U44_oo(11), oo(10) =>
            U44_oo(10), oo(9) => U44_oo(9), oo(8) => U44_oo(8),
            oo(7) => U44_oo(7), oo(6) => U44_oo(6), oo(5) =>
            U44_oo(5), oo(4) => U44_oo(4), oo(3) => U44_oo(3),
            oo(2) => U44_oo(2), oo(1) => U44_oo(1), oo(0) =>
            U44_oo(0) );

  U45: fulcon
    port map ( rstfifo => rstfifoaddr, ful => U59_fful, fful =>
            fful_local );

  U26: fin_add
    port map ( inn(2) => c(2), inn(1) => c(1), inn(0) => c(0),
            outt => ctag, rst => rstaddr );

  fful <= fful_local;

end core;
```

```
file: DEMUX2X1.VHD
-- Date of netlist generation: Nov-19-93

------------------------------------------------------------------------

library IEEE;
use IEEE.STD_LOGIC_1164.ALL;

library COMPASS_LIB;
use COMPASS_LIB.COMPASS.ALL;

entity demux2x1 is


   port ( m : in Std_Logic := 'U';
        i : in Std_Logic := 'U';

        o1 : out Std_Logic := 'U';
        o0 : out Std_Logic := 'U' );

end demux2x1;

------------------------------------------------------------------------

architecture demux2x1 OF demux2x1 is


   signal U3_ZN : Std_Logic;

begin

   U1: an02d1
      port map ( A1 => i, A2 => m, Z => o1 );

   U2: an02d1
      port map ( A1 => U3_ZN, A2 => i, Z => o0 );

   U3: in01d1
      port map ( I => m, ZN => U3_ZN );

end demux2x1;
```

```
file: DEMUX4X1.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity demux4x1 is


   port ( s0 : in Std_Logic := 'U';
        s1 : in Std_Logic := 'U';
        ld : in Std_Logic := 'U';

        l0 : out Std_Logic := 'U';
        l1 : out Std_Logic := 'U';
        l2 : out Std_Logic := 'U' );

end demux4x1;

------------------------------------------------------------------------

architecture demux4x1 OF demux4x1 is


   signal U7_ZN : Std_Logic;
   signal U8_ZN : Std_Logic;

begin


   U7: in01d1
      port map ( I => s0, ZN => U7_ZN );

   U8: in01d1
      port map ( I => s1, ZN => U8_ZN );

   U4: an03d1
      port map ( A1 => ld, A2 => s0, A3 => U8_ZN, Z => l1 );

   U5: an03d1
      port map ( A1 => ld, A2 => U7_ZN, A3 => s1, Z => l2 );

   U3: an03d1
      port map ( A1 => ld, A2 => U7_ZN, A3 => U8_ZN, Z => l0 );

end demux4x1;
```

```
file: DGEN.VHD
-- Date of netlist generation:  Nov-22-93
----------------------------------------------------------------------

library IEEE;
use IEEE.STD_LOGIC_1164.ALL;

library COMPASS_LIB;
use COMPASS_LIB.COMPASS.ALL;

entity dgen is

   port ( d : in Std_Logic := 'U';
        r : in Std_Logic := 'U';
        s : in Std_Logic := 'U';

        do : out Std_Logic := 'U' );

end dgen;


----------------------------------------------------------------------

architecture dgen OF dgen is

   signal U1_Z : Std_Logic;

begin


   U1: an02d1
      port map ( A1 => r, A2 => d, Z => U1_Z );

   U2: or02d1
      port map ( A1 => s, A2 => U1_Z, Z => do );

end dgen;
```

```
file: DOUBLE_B.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity double_buf is


   port ( i : in Std_Logic := 'U';

        o : out Std_Logic := 'U' );

end double_buf;

------------------------------------------------------------------------

architecture double_buf OF double_buf is


begin

   U2: ni01d5
      port map ( I => i, Z => o );

   U1: ni01d5
      port map ( I => i, Z => o );

end double_buf;
```

```
file: DOUBLE_T.VHD
-- Date of netlist generation:  Nov-19-93

-----------------------------------------------------------------------

library IEEE;
use IEEE.STD_LOGIC_1164.ALL;

library COMPASS_LIB;
use COMPASS_LIB.COMPASS.ALL;

entity double_tri is


   port ( rd : in Std_Logic := 'U';
        i : in Std_Logic := 'U';

        o : out Std_Logic := 'U' );

end double_tri;

-----------------------------------------------------------------------

architecture double_tri OF double_tri is


begin

   U1: nt01d5
      port map ( I => i, Z => o, OE => rd );

   U2: nt01d5
      port map ( I => i, Z => o, OE => rd );

end double_tri;
```

```
file: EXENC.VHD
-- Date of netlist generation:  Nov-18-93

-----------------------------------------------------------------------

library IEEE;
use IEEE.STD_LOGIC_1164.ALL;

library COMPASS_LIB;
use COMPASS_LIB.COMPASS.ALL;

entity exenc is

   port ( f : in Std_Logic_Vector(0 to 2) := (others => 'U');

        exen : out Std_Logic := 'U' );

end exenc;

-----------------------------------------------------------------------

architecture exenc OF exenc is

   signal U5_ZN : Std_Logic;
   signal U6_ZN : Std_Logic;
   signal U4_ZN : Std_Logic;
   signal U15_ZN : Std_Logic;
   signal U16_ZN : Std_Logic;
   signal U17_ZN : Std_Logic;

begin

   U17: nd03d1
     port map ( A1 => U4_ZN, A2 => f(1), A3 => f(2), ZN => U17_ZN
          );

   U15: nd03d1
     port map ( A1 => f(0), A2 => f(1), A3 => U6_ZN, ZN => U15_ZN
          );

   U16: nd03d1
     port map ( A1 => f(0), A2 => U5_ZN, A3 => f(2), ZN => U16_ZN
          );

   U5: in01d1
     port map ( I => f(1), ZN => U5_ZN );

   U6: in01d1
     port map ( I => f(2), ZN => U6_ZN );

   U4: in01d1
     port map ( I => f(0), ZN => U4_ZN );

   U18: nd03d1
     port map ( A1 => U17_ZN, A2 => U16_ZN, A3 => U15_ZN, ZN =>
          exen );

end exenc;
```

```
file: FENB2_SM.VHD
-- Date of netlist generation: Nov-19-93

-----------------------------------------------------------------------

library IEEE;
use IEEE.STD_LOGIC_1164.ALL;

library COMPASS_LIB;
use COMPASS_LIB.COMPASS.ALL;

entity fenb2_smachn_1 is


   port ( clk : in Std_Logic := 'U';
        rstfifo : in Std_Logic := 'U';
        fenb : in Std_Logic := 'U';
        fz : in Std_Logic := 'U';

        bb : out Std_Logic := 'U' );

end fenb2_smachn_1;

-----------------------------------------------------------------------

architecture fenb2_smachn_1 OF fenb2_smachn_1 is



   signal sm_sr1_QN : Std_Logic;
   signal i_9_ZN : Std_Logic;
   signal sm_sr1_Q : Std_Logic;
   signal i_5_ZN : Std_Logic;
   signal sm_sr2_Q : Std_Logic;
   signal sm_sr2_QN : Std_Logic;
   signal i_6_ZN : Std_Logic;
   signal i_7_ZN : Std_Logic;
   signal sm_bb_QN : Std_Logic;
   signal i_10_ZN : Std_Logic;
   signal i_8_ZN : Std_Logic;

begin

   i_8: nr02d0
      port map ( A1 => sm_sr1_QN, A2 => fz, ZN => i_8_ZN );

   sm_sr2: dfctnb
      port map ( D => i_9_ZN, CP => clk, CDN => rstfifo, Q =>
             sm_sr2_Q, QN => sm_sr2_QN );

   sm_bb: lanfnb
```

```
    port map ( D => i_9_ZN, EN => clk, Q => bb, QN => sm_bb_QN );

  sm_sr1: dfctnb
    port map ( D => i_5_ZN, CP => clk, CDN => rstfifo, Q =>
            sm_sr1_Q, QN => sm_sr1_QN );

  i_6: nd02d0
    port map ( A1 => sm_sr1_QN, A2 => fenb, ZN => i_6_ZN );

  i_5: nd03d0
    port map ( A1 => i_7_ZN, A2 => sm_sr2_QN, A3 => i_6_ZN, ZN =>
            i_5_ZN );

  i_10: nd02d0
    port map ( A1 => sm_sr2_QN, A2 => i_8_ZN, ZN => i_10_ZN );

  i_9: nd02d0
    port map ( A1 => i_10_ZN, A2 => i_6_ZN, ZN => i_9_ZN );

  i_7: in01d0
    port map ( I => i_8_ZN, ZN => i_7_ZN );

end fenb2_smachn_1;
```

```
file: FENB3_SM.VHD
-- Date of netlist generation: Nov-21-93
----------------------------------------------------------------------

library IEEE;
use IEEE.STD_LOGIC_1164.ALL;

library COMPASS_LIB;
use COMPASS_LIB.COMPASS.ALL;

entity fenb3_smachn_2 is

   port ( clk : in Std_Logic := 'U';
        rstfifo : in Std_Logic := 'U';
        finit : in Std_Logic := 'U';
        fenb : in Std_Logic := 'U';
        fz : in Std_Logic := 'U';

        bb : out Std_Logic := 'U' );

end fenb3_smachn_2;


----------------------------------------------------------------------

architecture fenb3_smachn_2 OF fenb3_smachn_2 is

   signal i_12_ZN : Std_Logic;
   signal i_10_Z : Std_Logic;
   signal i_11_ZN : Std_Logic;
   signal sm_sr2_Q : Std_Logic;
   signal sm_sr2_QN : Std_Logic;
   signal i_6_ZN : Std_Logic;
   signal i_7_ZN : Std_Logic;
   signal sm_sr1_Q : Std_Logic;
   signal sm_sr1_QN : Std_Logic;
   signal i_5_ZN : Std_Logic;
   signal i_8_Z : Std_Logic;
   signal i_9_ZN : Std_Logic;
   signal sm_bb_QN : Std_Logic;

begin


   i_5: nd03d0
      port map ( A1 => i_8_Z, A2 => i_6_ZN, A3 => sm_sr2_QN, ZN =>
            i_5_ZN );

   i_8: mx21d1
      port map ( I0 => sm_sr1_QN, I1 => i_9_ZN, S => fenb, Z =>
            i_8_Z );

   sm_sr1: dfctnb
      port map ( D => i_5_ZN, CP => clk, CDN => rstfifo, Q =>
            sm_sr1_Q, QN => sm_sr1_QN );

   i_10: an02d1
      port map ( A1 => i_11_ZN, A2 => fenb, Z => i_10_Z );
```

```
sm_sr2: dfctnb
   port map ( D => i_10_Z, CP => clk, CDN => rstfifo, Q =>
           sm_sr2_Q, QN => sm_sr2_QN );

sm_bb: lanfnb
   port map ( D => i_10_Z, EN => clk, Q => bb, QN => sm_bb_QN );

i_6: in01d0
   port map ( I => i_7_ZN, ZN => i_6_ZN );

i_9: nd02d0
   port map ( A1 => sm_sr1_QN, A2 => finit, ZN => i_9_ZN );

i_11: nd02d0
   port map ( A1 => i_12_ZN, A2 => i_9_ZN, ZN => i_11_ZN );

i_12: nd02d0
   port map ( A1 => sm_sr2_QN, A2 => i_7_ZN, ZN => i_12_ZN );

i_7: nr02d0
   port map ( A1 => sm_sr1_QN, A2 => fz, ZN => i_7_ZN );

end fenb3_smachn_2;
```

```
file: FENBCONT.VHD
-- Date of netlist generation:  Nov-21-93
----------------------------------------------------------------------
library IEEE;
use IEEE.STD_LOGIC_1164.ALL;

library COMPASS_LIB;
use COMPASS_LIB.COMPASS.ALL;

entity fenbcont1 is

   port ( rstfifo : in Std_Logic := 'U';
        fz : in Std_Logic := 'U';
        finit : in Std_Logic := 'U';
        fenb : in Std_Logic := 'U';

        fstrobe : out Std_Logic := 'U' );

end fenbcont1;

----------------------------------------------------------------------
architecture fenbcont1 OF fenbcont1 is

   component feng_smachn_1
      port ( clk : in Std_Logic;
           finit : in Std_Logic;
           rstfifo : in Std_Logic;

           x : out Std_Logic );
   end component;

   component fenb3_smachn_2
      port ( clk : in Std_Logic;
           fenb : in Std_Logic;
           finit : in Std_Logic;
           fz : in Std_Logic;
           rstfifo : in Std_Logic;

           bb : out Std_Logic );
   end component;

   signal x : Std_Logic;
   signal U7_Z : Std_Logic;

begin

   U7: an02d1
      port map ( A1 => x, A2 => fenb, Z => U7_Z );

   U6: feng_smachn_1
      port map ( clk => CLK, finit => finit, rstfifo => rstfifo, x
            => x );

   U5: fenb3_smachn_2
      port map ( clk => CLK, fenb => U7_Z, finit => finit, fz => fz,
            rstfifo => rstfifo, bb => fstrobe );

end fenbcont1;
```

```
file: FENG_SMA.VHD
-- Date of netlist generation: Nov-21-93
------------------------------------------------------------------------

library IEEE;
use IEEE.STD_LOGIC_1164.ALL;

library COMPASS_LIB;
use COMPASS_LIB.COMPASS.ALL;

entity feng_smachn_1 is
   port ( clk : in Std_Logic := 'U';
        rstfifo : in Std_Logic := 'U';
        finit : in Std_Logic := 'U';

        x : out Std_Logic := 'U' );

end feng_smachn_1;


------------------------------------------------------------------------

architecture feng_smachn_1 OF feng_smachn_1 is

   signal x_local: Std_Logic;
   signal sm_sr1_Q : Std_Logic;
   signal i_4_Z : Std_Logic;
   signal sm_sr2_QN : Std_Logic;
   signal sm_sr2_Q : Std_Logic;
   signal sm_sr1_QN : Std_Logic;

begin


   i_5: mx21d1
     port map ( I0 => finit, I1 => sm_sr2_QN, S => sm_sr1_Q, Z =>
          x_local );

   i_4: or02d1
     port map ( A1 => finit, A2 => sm_sr1_Q, Z => i_4_Z );

   sm_sr2: dfctnb
     port map ( D => x_local, CP => clk, CDN => rstfifo, Q =>
          sm_sr2_Q, QN => sm_sr2_QN );

   sm_sr1: dfctnb
     port map ( D => i_4_Z, CP => clk, CDN => rstfifo, Q =>
          sm_sr1_Q, QN => sm_sr1_QN );

   x <= x_local;

end feng_smachn_1;
```

```
file: FF_ENB.VHD
-- Date of netlist generation:  Nov-18-93

-----------------------------------------------------------------------

library IEEE;
use IEEE.STD_LOGIC_1164.ALL;

library COMPASS_LIB;
use COMPASS_LIB.COMPASS.ALL;

entity ff_enb is


   port ( a : in Std_Logic := 'U';
        clk : in Std_Logic := 'U';
        set : in Std_Logic := 'U';
        rst : in Std_Logic := 'U';
        ld : in Std_Logic := 'U';

        outt : out Std_Logic := 'U';
        nout : out Std_Logic := 'U' );

end ff_enb;

-----------------------------------------------------------------------

architecture ff_enb OF ff_enb is


   signal outt_local: Std_Logic;

begin


   U1: mfbtnb
      port map ( DA => ld, DB => outt_local, SA => a, CP => clk,
              SDN => set, CDN => rst, Q => outt_local, QN =>
              nout );

   outt <= outt_local;

end ff_enb;
```

```
file: FF_ENB1.VHD
-- Date of netlist generation:  Nov-18-93

---------------------------------------------------------------------

library IEEE;
use IEEE.STD_LOGIC_1164.ALL;

library COMPASS_LIB;
use COMPASS_LIB.COMPASS.ALL;

entity ff_enb1 is



   port ( a : in Std_Logic := 'U';
        clk : in Std_Logic := 'U';
        set : in Std_Logic := 'U';
        ld : in Std_Logic := 'U';

        outt : out Std_Logic := 'U';
        nout : out Std_Logic := 'U' );

end ff_enb1;

---------------------------------------------------------------------

architecture ff_enb1 OF ff_enb1 is



   signal outt_local: Std_Logic;

begin


   U1: mfbtnb
      port map ( DA => ld, DB => outt_local, SA => a, CP => clk,
              SDN => set, CDN => ARESET, Q => outt_local, QN =>
              nout );

   outt <= outt_local;

end ff_enb1;
```

```
file: FF_ENB2.VHD
-- Date of netlist generation: Nov-18-93

-----------------------------------------------------------------------

library IEEE;
use IEEE.STD_LOGIC_1164.ALL;

library COMPASS_LIB;
use COMPASS_LIB.COMPASS.ALL;

entity ff_enb2 is


   port ( a : in Std_Logic := 'U';
        clk : in Std_Logic := 'U';
        rst : in Std_Logic := 'U';
        ld : in Std_Logic := 'U';

        outt : out Std_Logic := 'U';
        nout : out Std_Logic := 'U' );

end ff_enb2;

-----------------------------------------------------------------------

architecture ff_enb2 OF ff_enb2 is


   signal outt_local: Std_Logic;

begin

   U3: mfctnb
      port map ( DA => ld, DB => outt_local, SA => a, CP => clk,
             CDN => rst, Q => outt_local, QN => nout );

   outt <= outt_local;

end ff_enb2;
```

```
file: FIAR.VHD
-- Date of netlist generation:  Nov-19-93

-----------------------------------------------------------------------

library IEEE;
use IEEE.STD_LOGIC_1164.ALL;

library COMPASS_LIB;
use COMPASS_LIB.COMPASS.ALL;

entity fiar is

   port ( f : in Std_Logic_Vector(2 downto 0) := (others => 'U');

        m1 : out Std_Logic := 'U';
        m2 : out Std_Logic := 'U';
        m3 : out Std_Logic := 'U' );

end fiar;

-----------------------------------------------------------------------

architecture fiar OF fiar is

   signal m3_local: Std_Logic;
   signal U6_ZN : Std_Logic;
   signal U5_ZN : Std_Logic;
   signal U4_ZN : Std_Logic;
   signal U2_Z : Std_Logic;
   signal U1_Z : Std_Logic;

begin

   U1: an03d1
      port map ( A1 => U4_ZN, A2 => f(1), A3 => f(2), Z => U1_Z );

   U2: an03d1
      port map ( A1 => f(0), A2 => U5_ZN, A3 => f(2), Z => U2_Z );

   U4: in01d1
      port map ( I => f(0), ZN => U4_ZN );

   U6: in01d1
      port map ( I => f(2), ZN => U6_ZN );

   U5: in01d1
      port map ( I => f(1), ZN => U5_ZN );
```

```
  U3: an03d1
    port map ( A1 => f(0), A2 => f(1), A3 => U6_ZN, Z => m3_local
          );

  U10: or02d1
    port map ( A1 => U2_Z, A2 => m3_local, Z => m2 );

  U8: or03d1
    port map ( A1 => U1_Z, A2 => m3_local, A3 => U2_Z, Z => m1 );

  m3 <= m3_local;

end fiar;
```

```
file: FIARMUX.VHD
-- Date of netlist generation:  Nov-19-93

----------------------------------------------------------------------

library IEEE;
use IEEE.STD_LOGIC_1164.ALL;

library COMPASS_LIB;
use COMPASS_LIB.COMPASS.ALL;

entity fiarmux is


  port ( fsig : in Std_Logic_Vector(5 downto 0) := (others => 'U');
        arsig : in Std_Logic_Vector(5 downto 0) := (others => 'U');
        f : in Std_Logic_Vector(0 to 2) := (others => 'U');

        sig3 : out Std_Logic_Vector(5 downto 0) := (others => 'U');
        sig2 : out Std_Logic_Vector(5 downto 0) := (others => 'U');
        sig1 : out Std_Logic_Vector(5 downto 0) := (others => 'U');
        m1 : out Std_Logic := 'U';
        m2 : out Std_Logic := 'U';
        m3 : out Std_Logic := 'U' );

end fiarmux;

----------------------------------------------------------------------

architecture fiarmux OF fiarmux is


  component fiar
    port ( f : in Std_Logic_Vector(2 downto 0) := (others => 'U');

          m1 : out Std_Logic;
          m2 : out Std_Logic;
          m3 : out Std_Logic );
  end component;


  signal m1_local, m2_local, m3_local: Std_Logic;
  signal U45_Z : Std_Logic;
  signal U44_Z : Std_Logic;
  signal U43_Z : Std_Logic;
  signal U42_Z : Std_Logic;
  signal U41_Z : Std_Logic;
  signal U40_Z : Std_Logic;
  signal U65_Z : Std_Logic;
  signal U64_Z : Std_Logic;
  signal U63_Z : Std_Logic;
  signal U62_Z : Std_Logic;
  signal U61_Z : Std_Logic;
  signal U60_Z : Std_Logic;
  signal U55_Z : Std_Logic;
```

```
  signal U54_Z : Std_Logic;
  signal U53_Z : Std_Logic;
  signal U52_Z : Std_Logic;
  signal U51_Z : Std_Logic;
  signal U50_Z : Std_Logic;

begin

  U45: mx21d2
    port map ( I0 => arsig(5), I1 => fsig(5), S => m3_local, Z =>
         U45_Z );

  U44: mx21d2
    port map ( I0 => arsig(4), I1 => fsig(4), S => m3_local, Z =>
         U44_Z );

  U43: mx21d2
    port map ( I0 => arsig(3), I1 => fsig(3), S => m3_local, Z =>
         U43_Z );

  U42: mx21d2
    port map ( I0 => arsig(2), I1 => fsig(2), S => m3_local, Z =>
         U42_Z );

  U41: mx21d2
    port map ( I0 => arsig(1), I1 => fsig(1), S => m3_local, Z =>
         U41_Z );

  U40: mx21d2
    port map ( I0 => arsig(0), I1 => fsig(0), S => m3_local, Z =>
         U40_Z );

  U65: mx21d2
    port map ( I0 => arsig(5), I1 => fsig(5), S => m1_local, Z =>
         U65_Z );

  U64: mx21d2
    port map ( I0 => arsig(4), I1 => fsig(4), S => m1_local, Z =>
         U64_Z );

  U63: mx21d2
    port map ( I0 => arsig(3), I1 => fsig(3), S => m1_local, Z =>
         U63_Z );

  U62: mx21d2
    port map ( I0 => arsig(2), I1 => fsig(2), S => m1_local, Z =>
         U62_Z );

  U61: mx21d2
    port map ( I0 => arsig(1), I1 => fsig(1), S => m1_local, Z =>
         U61_Z );

  U60: mx21d2
    port map ( I0 => arsig(0), I1 => fsig(0), S => m1_local, Z =>
         U60_Z );

  U55: mx21d2
```

```
  port map ( I0 => arsig(5), I1 => fsig(5), S => m2_local, Z =>
        U55_Z );

U54: mx21d2
  port map ( I0 => arsig(4), I1 => fsig(4), S => m2_local, Z =>
        U54_Z );

U53: mx21d2
  port map ( I0 => arsig(3), I1 => fsig(3), S => m2_local, Z =>
        U53_Z );

U52: mx21d2
  port map ( I0 => arsig(2), I1 => fsig(2), S => m2_local, Z =>
        U52_Z );

U51: mx21d2
  port map ( I0 => arsig(1), I1 => fsig(1), S => m2_local, Z =>
        U51_Z );

U50: mx21d2
  port map ( I0 => arsig(0), I1 => fsig(0), S => m2_local, Z =>
        U50_Z );

U85: ni01d5
  port map ( I => U45_Z, Z => sig3(5) );

U84: ni01d5
  port map ( I => U44_Z, Z => sig3(4) );

U83: ni01d5
  port map ( I => U43_Z, Z => sig3(3) );

U82: ni01d5
  port map ( I => U42_Z, Z => sig3(2) );

U81: ni01d5
  port map ( I => U41_Z, Z => sig3(1) );

U80: ni01d5
  port map ( I => U40_Z, Z => sig3(0) );

U3: fiar
  port map ( f(2) => f(2), f(1) => f(1), f(0) => f(0), m1 =>
        m3_local, m2 => m2_local, m3 => m1_local );

U105: ni01d5
  port map ( I => U65_Z, Z => sig1(5) );

U104: ni01d5
  port map ( I => U64_Z, Z => sig1(4) );

U103: ni01d5
  port map ( I => U63_Z, Z => sig1(3) );

U102: ni01d5
  port map ( I => U62_Z, Z => sig1(2) );

U101: ni01d5
```

```
    port map ( I => U61_Z, Z => sig1(1) );

  U100: ni01d5
    port map ( I => U60_Z, Z => sig1(0) );

  U95: ni01d5
    port map ( I => U55_Z, Z => sig2(5) );

  U94: ni01d5
    port map ( I => U54_Z, Z => sig2(4) );

  U93: ni01d5
    port map ( I => U53_Z, Z => sig2(3) );

  U92: ni01d5
    port map ( I => U52_Z, Z => sig2(2) );

  U91: ni01d5
    port map ( I => U51_Z, Z => sig2(1) );

  U90: ni01d5
    port map ( I => U50_Z, Z => sig2(0) );

  m1 <= m1_local;
  m2 <= m2_local;
  m3 <= m3_local;

end fiarmux;
```

```
file: FIFO_CON.VHD
-- Date of netlist generation:  Nov-18-93

-----------------------------------------------------------------------

library IEEE;
use IEEE.STD_LOGIC_1164.ALL;

library COMPASS_LIB;
use COMPASS_LIB.COMPASS.ALL;

entity fifo_control is


   port ( fstrobe : in Std_Logic := 'U';
        rstfifof : in Std_Logic := 'U';

        cvf : out Std_Logic := 'U';
        ldorf : out Std_Logic := 'U';
        venb : out Std_Logic := 'U';
        ncbf : out Std_Logic := 'U';
        wenf : out Std_Logic := 'U';
        nclk : out Std_Logic := 'U';
        finitf : out Std_Logic := 'U' );

end fifo_control;

-----------------------------------------------------------------------

architecture fifo_control OF fifo_control is


   component fifocont
      port ( rstfifof : in Std_Logic;

           finitf : out Std_Logic );
   end component;



   signal ldorf_local, nclk_local: Std_Logic;
   signal U37_QN : Std_Logic;
   signal U24_QN : Std_Logic;
   signal U20_QN : Std_Logic;

begin


   U40: in01d3
      port map ( I => CLK, ZN => nclk_local );

   U38: fifocont
      port map ( rstfifof => rstfifof, finitf => finitf );
```

```
U32: in01d2
   port map ( I => ldorf_local, ZN => ncbf );

U37: dfctnh
   port map ( D => fstrobe, CP => CLK, CDN => rstfifof, Q =>
          ldorf_local, QN => U37_QN );

U24: dfctnb
   port map ( D => ldorf_local, CP => CLK, CDN => rstfifof, Q =>
          cvf, QN => U24_QN );

U20: dfctnb
   port map ( D => ldorf_local, CP => nclk_local, CDN =>
          rstfifof, Q => wenf, QN => U20_QN );

ldorf <= ldorf_local;
venb <= fstrobe;
nclk <= nclk_local;

end fifo_control;
```

```
file: FIFOCONT.VHD
-- Date of netlist generation:  Nov-19-93
-----------------------------------------------------------------
library IEEE;
use IEEE.STD_LOGIC_1164.ALL;

library COMPASS_LIB;
use COMPASS_LIB.COMPASS.ALL;

entity fifocont_smachn_1 is


   port ( clk : in Std_Logic := 'U';
        arst : in Std_Logic := 'U';
        rst : in Std_Logic := 'U';

        finitf : out Std_Logic := 'U' );

end fifocont_smachn_1;


-----------------------------------------------------------------

architecture fifocont_smachn_1 OF fifocont_smachn_1 is


   signal finitf_local: Std_Logic;
   signal sm_sr2_Q : Std_Logic;
   signal i_4_Z : Std_Logic;
   signal sm_sr1_QN : Std_Logic;
   signal i_6_ZN : Std_Logic;
   signal sm_sr1_Q : Std_Logic;
   signal sm_sr2_QN : Std_Logic;

begin


  i_6: ni01d1
     port map ( I => arst, Z => i_6_ZN );

  i_5: an02d1
     port map ( A1 => sm_sr1_QN, A2 => rst, Z => finitf_local );

  i_4: or02d1
     port map ( A1 => sm_sr2_Q, A2 => rst, Z => i_4_Z );

  sm_sr1: dfctnb
     port map ( D => i_4_Z, CP => clk, CDN => i_6_ZN, Q =>
           sm_sr1_Q, QN => sm_sr1_QN );

  sm_sr2: dfctnb
     port map ( D => finitf_local, CP => clk, CDN => i_6_ZN, Q =>
           sm_sr2_Q, QN => sm_sr2_QN );

  finitf <= finitf_local;

end fifocont_smachn_1;
```

```
file: FIN_ADD.VHD
-- Date of netlist generation:  Nov-18-93

------------------------------------------------------------------------

library IEEE;
use IEEE.STD_LOGIC_1164.ALL;

library COMPASS_LIB;
use COMPASS_LIB.COMPASS.ALL;

entity fin_add is

   port ( inn : in Std_Logic_Vector(2 downto 0) := (others => 'U');
        rst : in Std_Logic := 'U';

        outt : out Std_Logic := 'U' );

end fin_add;

------------------------------------------------------------------------

architecture fin_add OF fin_add is

   signal dc2 : Std_Logic;
   signal c2 : Std_Logic;
   signal U6_QN : Std_Logic;
   signal s2 : Std_Logic;
   signal S3 : Std_Logic;
   signal S4 : Std_Logic;
   signal S5 : Std_Logic;
   signal cout : Std_Logic;
   signal car : Std_Logic;
   signal U2_S : Std_Logic;
   signal U16_QN : Std_Logic;
   signal ds2 : Std_Logic;
   signal s1 : Std_Logic;
   signal U7_QN : Std_Logic;

begin

   U1: ad01d1
     port map ( A => inn(0), B => inn(1), CI => inn(2), S => s1,
          CO => car );

   U2: ad01d1
     port map ( A => ds2, B => VSS, CI => s1, S => U2_S, CO =>
          cout );

   U4: ad01d1
     port map ( A => car, B => cout, CI => dc2, S => s2, CO => c2
          );
```

```
U6: dfctnb
   port map ( D => c2, CP => CLK, CDN => rst, Q => dc2, QN =>
         U6_QN );

U16: dfctnb
   port map ( D => U2_S, CP => CLK, CDN => rst, Q => outt, QN =>
         U16_QN );

U7: dfctnb
   port map ( D => s2, CP => CLK, CDN => rst, Q => ds2, QN =>
         U7_QN );

end fin_add;
```

file: FIRSEL.VHD

```
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity FirSel is

   port ( Tag_In : in Std_Logic := 'U';
        R_In : in Std_Logic := 'U';

        S1 : out Std_Logic := 'U';
        R_Out : out Std_Logic := 'U' );

end FirSel;

------------------------------------------------------------------------

architecture FirSel OF FirSel is

   signal U2_ZN : Std_Logic;

begin

   U2: in01d1
      port map ( I => Tag_In, ZN => U2_ZN );

   U4: nr02d1
      port map ( A1 => R_In, A2 => U2_ZN, ZN => S1 );

   U1: or02d1
      port map ( A1 => R_In, A2 => Tag_In, Z => R_Out );

end FirSel;
```

```
file: FITAG1.VHD
-- Date of netlist generation:  Nov-19-93

-----------------------------------------------------------------------

library IEEE;
use IEEE.STD_LOGIC_1164.ALL;

library COMPASS_LIB;
use COMPASS_LIB.COMPASS.ALL;

entity fitag1 is

   port ( wenf : in Std_Logic := 'U';
        addrin : in Std_Logic := 'U';
        rstfifoaddr : in Std_Logic := 'U';
        venb : in Std_Logic := 'U';
        exen : in Std_Logic := 'U';

        addrot : out Std_Logic := 'U';
        wl : out Std_Logic := 'U' );

end fitag1;

-----------------------------------------------------------------------

architecture fitag1 OF fitag1 is

   component ff_enb2
      port ( a : in Std_Logic;
           clk : in Std_Logic;
           rst : in Std_Logic;
           ld : in Std_Logic;

           outt : out Std_Logic;
           nout : out Std_Logic );
   end component;


   signal addrot_local: Std_Logic;
   signal U15_nout : Std_Logic;
   signal U17_Z : Std_Logic;

begin

   U19: nt01d4
      port map ( I => U17_Z, Z => wl, OE => exen );

   U15: ff_enb2
      port map ( a => venb, clk => CLK, outt => addrot_local, rst
              => rstfifoaddr, ld => addrin, nout => U15_nout );

   U17: an02d1
      port map ( A1 => wenf, A2 => addrot_local, Z => U17_Z );

   addrot <= addrot_local;

end fitag1;
```

```
file: FITAG341.VHD
-- Date of netlist generation:  Nov-4-93

------------------------------------------------------------------------

library IEEE;
use IEEE.STD_LOGIC_1164.ALL;

library COMPASS_LIB;
use COMPASS_LIB.COMPASS.ALL;

entity fitag341_r is


   port ( finit : in Std_Logic := 'U';
        venb : in Std_Logic := 'U';
        rstfifoaddr : in Std_Logic := 'U';
        wenf : in Std_Logic := 'U';
        exen : in Std_Logic := 'U';

        fful : out Std_Logic := 'U';
        fwl : out Std_Logic_Vector(340 downto 0) := (others =>
'U') );

end fitag341_r;


------------------------------------------------------------------------

architecture fitag341_r OF fitag341_r is


   component fitag1
      port ( wenf : in Std_Logic;
           addrin : in Std_Logic;
           rstfifoaddr : in Std_Logic;
           venb : in Std_Logic;
           exen : in Std_Logic;

           addrot : out Std_Logic;
           wl : out Std_Logic );
   end component;

   signal ad : Std_Logic_Vector(1 to 341);
   signal U435_QN : Std_Logic;
   signal S1 : Std_Logic;

begin


   U435: dfctnb
      port map ( D => ad(340), CP => CLK, CDN => rstfifoaddr, Q =>
            fful, QN => U435_QN );

   U7340: fitag1
      port map ( wenf => wenf, addrin => ad(340), addrot => ad(341),
            rstfifoaddr => rstfifoaddr, wl => fwl(340), venb
```

```
        => venb, exen => exen );

U7339: fitag1
   port map ( wenf => wenf, addrin => ad(339), addrot => ad(340),
        rstfifoaddr => rstfifoaddr, wl => fwl(339), venb
        => venb, exen => exen );

U7338: fitag1
   port map ( wenf => wenf, addrin => ad(338), addrot => ad(339),
        rstfifoaddr => rstfifoaddr, wl => fwl(338), venb
        => venb, exen => exen );

U7337: fitag1
   port map ( wenf => wenf, addrin => ad(337), addrot => ad(338),
        rstfifoaddr => rstfifoaddr, wl => fwl(337), venb
        => venb, exen => exen );

U7336: fitag1
   port map ( wenf => wenf, addrin => ad(336), addrot => ad(337),
        rstfifoaddr => rstfifoaddr, wl => fwl(336), venb
        => venb, exen => exen );

U7335: fitag1
   port map ( wenf => wenf, addrin => ad(335), addrot => ad(336),
        rstfifoaddr => rstfifoaddr, wl => fwl(335), venb
        => venb, exen => exen );

U7334: fitag1
   port map ( wenf => wenf, addrin => ad(334), addrot => ad(335),
        rstfifoaddr => rstfifoaddr, wl => fwl(334), venb
        => venb, exen => exen );

U7333: fitag1
   port map ( wenf => wenf, addrin => ad(333), addrot => ad(334),
        rstfifoaddr => rstfifoaddr, wl => fwl(333), venb
        => venb, exen => exen );

U7332: fitag1
   port map ( wenf => wenf, addrin => ad(332), addrot => ad(333),
        rstfifoaddr => rstfifoaddr, wl => fwl(332), venb
        => venb, exen => exen );

U7331: fitag1
   port map ( wenf => wenf, addrin => ad(331), addrot => ad(332),
        rstfifoaddr => rstfifoaddr, wl => fwl(331), venb
        => venb, exen => exen );

U7330: fitag1
   port map ( wenf => wenf, addrin => ad(330), addrot => ad(331),
        rstfifoaddr => rstfifoaddr, wl => fwl(330), venb
        => venb, exen => exen );

U7329: fitag1
   port map ( wenf => wenf, addrin => ad(329), addrot => ad(330),
        rstfifoaddr => rstfifoaddr, wl => fwl(329), venb
        => venb, exen => exen );

U7328: fitag1
```

```
port map ( wenf => wenf, addrin => ad(328), addrot => ad(329),
        rstfifoaddr => rstfifoaddr, wl => fwl(328), venb
        => venb, exen => exen );

U7327: fitagl
   port map ( wenf => wenf, addrin => ad(327), addrot => ad(328),
        rstfifoaddr => rstfifoaddr, wl => fwl(327), venb
        => venb, exen => exen );

U7326: fitagl
   port map ( wenf => wenf, addrin => ad(326), addrot => ad(327),
        rstfifoaddr => rstfifoaddr, wl => fwl(326), venb
        => venb, exen => exen );

U7325: fitagl
   port map ( wenf => wenf, addrin => ad(325), addrot => ad(326),
        rstfifoaddr => rstfifoaddr, wl => fwl(325), venb
        => venb, exen => exen );

U7324: fitagl
   port map ( wenf => wenf, addrin => ad(324), addrot => ad(325),
        rstfifoaddr => rstfifoaddr, wl => fwl(324), venb
        => venb, exen => exen );

U7323: fitagl
   port map ( wenf => wenf, addrin => ad(323), addrot => ad(324),
        rstfifoaddr => rstfifoaddr, wl => fwl(323), venb
        => venb, exen => exen );

U7322: fitagl
   port map ( wenf => wenf, addrin => ad(322), addrot => ad(323),
        rstfifoaddr => rstfifoaddr, wl => fwl(322), venb
        => venb, exen => exen );

U7321: fitagl
   port map ( wenf => wenf, addrin => ad(321), addrot => ad(322),
        rstfifoaddr => rstfifoaddr, wl => fwl(321), venb
        => venb, exen => exen );

U7320: fitagl
   port map ( wenf => wenf, addrin => ad(320), addrot => ad(321),
        rstfifoaddr => rstfifoaddr, wl => fwl(320), venb
        => venb, exen => exen );

U7319: fitagl
   port map ( wenf => wenf, addrin => ad(319), addrot => ad(320),
        rstfifoaddr => rstfifoaddr, wl => fwl(319), venb
        => venb, exen => exen );

U7318: fitagl
   port map ( wenf => wenf, addrin => ad(318), addrot => ad(319),
        rstfifoaddr => rstfifoaddr, wl => fwl(318), venb
        => venb, exen => exen );

U7317: fitagl
   port map ( wenf => wenf, addrin => ad(317), addrot => ad(318),
        rstfifoaddr => rstfifoaddr, wl => fwl(317), venb
        => venb, exen => exen );
```

```
U7316: fitagl
   port map ( wenf => wenf, addrin => ad(316), addrot => ad(317),
          rstfifoaddr => rstfifoaddr, wl => fwl(316), venb
          => venb, exen => exen );

U7315: fitagl
   port map ( wenf => wenf, addrin => ad(315), addrot => ad(316),
          rstfifoaddr => rstfifoaddr, wl => fwl(315), venb
          => venb, exen => exen );

U7314: fitagl
   port map ( wenf => wenf, addrin => ad(314), addrot => ad(315),
          rstfifoaddr => rstfifoaddr, wl => fwl(314), venb
          => venb, exen => exen );

U7313: fitagl
   port map ( wenf => wenf, addrin => ad(313), addrot => ad(314),
          rstfifoaddr => rstfifoaddr, wl => fwl(313), venb
          => venb, exen => exen );

U7312: fitagl
   port map ( wenf => wenf, addrin => ad(312), addrot => ad(313),
          rstfifoaddr => rstfifoaddr, wl => fwl(312), venb
          => venb, exen => exen );

U7311: fitagl
   port map ( wenf => wenf, addrin => ad(311), addrot => ad(312),
          rstfifoaddr => rstfifoaddr, wl => fwl(311), venb
          => venb, exen => exen );

U7310: fitagl
   port map ( wenf => wenf, addrin => ad(310), addrot => ad(311),
          rstfifoaddr => rstfifoaddr, wl => fwl(310), venb
          => venb, exen => exen );

U7309: fitagl
   port map ( wenf => wenf, addrin => ad(309), addrot => ad(310),
          rstfifoaddr => rstfifoaddr, wl => fwl(309), venb
          => venb, exen => exen );

U7308: fitagl
   port map ( wenf => wenf, addrin => ad(308), addrot => ad(309),
          rstfifoaddr => rstfifoaddr, wl => fwl(308), venb
          => venb, exen => exen );

U7307: fitagl
   port map ( wenf => wenf, addrin => ad(307), addrot => ad(308),
          rstfifoaddr => rstfifoaddr, wl => fwl(307), venb
          => venb, exen => exen );

U7306: fitagl
   port map ( wenf => wenf, addrin => ad(306), addrot => ad(307),
          rstfifoaddr => rstfifoaddr, wl => fwl(306), venb
          => venb, exen => exen );

U7305: fitagl
   port map ( wenf => wenf, addrin => ad(305), addrot => ad(306),
```

```
        rstfifoaddr => rstfifoaddr, wl => fwl(305), venb
        => venb, exen => exen );

U7304: fitagl
   port map ( wenf => wenf, addrin => ad(304), addrot => ad(305),
        rstfifoaddr => rstfifoaddr, wl => fwl(304), venb
        => venb, exen => exen );

U7303: fitagl
   port map ( wenf => wenf, addrin => ad(303), addrot => ad(304),
        rstfifoaddr => rstfifoaddr, wl => fwl(303), venb
        => venb, exen => exen );

U7302: fitagl
   port map ( wenf => wenf, addrin => ad(302), addrot => ad(303),
        rstfifoaddr => rstfifoaddr, wl => fwl(302), venb
        => venb, exen => exen );

U7301: fitagl
   port map ( wenf => wenf, addrin => ad(301), addrot => ad(302),
        rstfifoaddr => rstfifoaddr, wl => fwl(301), venb
        => venb, exen => exen );

U7300: fitagl
   port map ( wenf => wenf, addrin => ad(300), addrot => ad(301),
        rstfifoaddr => rstfifoaddr, wl => fwl(300), venb
        => venb, exen => exen );

U7299: fitagl
   port map ( wenf => wenf, addrin => ad(299), addrot => ad(300),
        rstfifoaddr => rstfifoaddr, wl => fwl(299), venb
        => venb, exen => exen );

U7298: fitagl
   port map ( wenf => wenf, addrin => ad(298), addrot => ad(299),
        rstfifoaddr => rstfifoaddr, wl => fwl(298), venb
        => venb, exen => exen );

U7297: fitagl
   port map ( wenf => wenf, addrin => ad(297), addrot => ad(298),
        rstfifoaddr => rstfifoaddr, wl => fwl(297), venb
        => venb, exen => exen );

U7296: fitagl
   port map ( wenf => wenf, addrin => ad(296), addrot => ad(297),
        rstfifoaddr => rstfifoaddr, wl => fwl(296), venb
        => venb, exen => exen );

U7295: fitagl
   port map ( wenf => wenf, addrin => ad(295), addrot => ad(296),
        rstfifoaddr => rstfifoaddr, wl => fwl(295), venb
        => venb, exen => exen );

U7294: fitagl
   port map ( wenf => wenf, addrin => ad(294), addrot => ad(295),
        rstfifoaddr => rstfifoaddr, wl => fwl(294), venb
        => venb, exen => exen );
```

```
U7293: fitag1
  port map ( wenf => wenf, addrin => ad(293), addrot => ad(294),
        rstfifoaddr => rstfifoaddr, wl => fwl(293), venb
        => venb, exen => exen );

U7292: fitag1
  port map ( wenf => wenf, addrin => ad(292), addrot => ad(293),
        rstfifoaddr => rstfifoaddr, wl => fwl(292), venb
        => venb, exen => exen );

U7291: fitag1
  port map ( wenf => wenf, addrin => ad(291), addrot => ad(292),
        rstfifoaddr => rstfifoaddr, wl => fwl(291), venb
        => venb, exen => exen );

U7290: fitag1
  port map ( wenf => wenf, addrin => ad(290), addrot => ad(291),
        rstfifoaddr => rstfifoaddr, wl => fwl(290), venb
        => venb, exen => exen );

U7289: fitag1
  port map ( wenf => wenf, addrin => ad(289), addrot => ad(290),
        rstfifoaddr => rstfifoaddr, wl => fwl(289), venb
        => venb, exen => exen );

U7288: fitag1
  port map ( wenf => wenf, addrin => ad(288), addrot => ad(289),
        rstfifoaddr => rstfifoaddr, wl => fwl(288), venb
        => venb, exen => exen );

U7287: fitag1
  port map ( wenf => wenf, addrin => ad(287), addrot => ad(288),
        rstfifoaddr => rstfifoaddr, wl => fwl(287), venb
        => venb, exen => exen );

U7286: fitag1
  port map ( wenf => wenf, addrin => ad(286), addrot => ad(287),
        rstfifoaddr => rstfifoaddr, wl => fwl(286), venb
        => venb, exen => exen );

U7285: fitag1
  port map ( wenf => wenf, addrin => ad(285), addrot => ad(286),
        rstfifoaddr => rstfifoaddr, wl => fwl(285), venb
        => venb, exen => exen );

U7284: fitag1
  port map ( wenf => wenf, addrin => ad(284), addrot => ad(285),
        rstfifoaddr => rstfifoaddr, wl => fwl(284), venb
        => venb, exen => exen );

U7283: fitag1
  port map ( wenf => wenf, addrin => ad(283), addrot => ad(284),
        rstfifoaddr => rstfifoaddr, wl => fwl(283), venb
        => venb, exen => exen );

U7282: fitag1
  port map ( wenf => wenf, addrin => ad(282), addrot => ad(283),
        rstfifoaddr => rstfifoaddr, wl => fwl(282), venb
```

```
        => venb, exen => exen );

U7281: fitag1
   port map ( wenf => wenf, addrin => ad(281), addrot => ad(282),
        rstfifoaddr => rstfifoaddr, wl => fwl(281), venb
        => venb, exen => exen );

U7280: fitag1
   port map ( wenf => wenf, addrin => ad(280), addrot => ad(281),
        rstfifoaddr => rstfifoaddr, wl => fwl(280), venb
        => venb, exen => exen );

U7279: fitag1
   port map ( wenf => wenf, addrin => ad(279), addrot => ad(280),
        rstfifoaddr => rstfifoaddr, wl => fwl(279), venb
        => venb, exen => exen );

U7278: fitag1
   port map ( wenf => wenf, addrin => ad(278), addrot => ad(279),
        rstfifoaddr => rstfifoaddr, wl => fwl(278), venb
        => venb, exen => exen );

U7277: fitag1
   port map ( wenf => wenf, addrin => ad(277), addrot => ad(278),
        rstfifoaddr => rstfifoaddr, wl => fwl(277), venb
        => venb, exen => exen );

U7276: fitag1
   port map ( wenf => wenf, addrin => ad(276), addrot => ad(277),
        rstfifoaddr => rstfifoaddr, wl => fwl(276), venb
        => venb, exen => exen );

U7275: fitag1
   port map ( wenf => wenf, addrin => ad(275), addrot => ad(276),
        rstfifoaddr => rstfifoaddr, wl => fwl(275), venb
        => venb, exen => exen );

U7274: fitag1
   port map ( wenf => wenf, addrin => ad(274), addrot => ad(275),
        rstfifoaddr => rstfifoaddr, wl => fwl(274), venb
        => venb, exen => exen );

U7273: fitag1
   port map ( wenf => wenf, addrin => ad(273), addrot => ad(274),
        rstfifoaddr => rstfifoaddr, wl => fwl(273), venb
        => venb, exen => exen );

U7272: fitag1
   port map ( wenf => wenf, addrin => ad(272), addrot => ad(273),
        rstfifoaddr => rstfifoaddr, wl => fwl(272), venb
        => venb, exen => exen );

U7271: fitag1
   port map ( wenf => wenf, addrin => ad(271), addrot => ad(272),
        rstfifoaddr => rstfifoaddr, wl => fwl(271), venb
        => venb, exen => exen );

U7270: fitag1
```

```
  port map ( wenf => wenf, addrin => ad(270), addrot => ad(271),
          rstfifoaddr => rstfifoaddr, wl => fwl(270), venb
          => venb, exen => exen );

U7269: fitagl
  port map ( wenf => wenf, addrin => ad(269), addrot => ad(270),
          rstfifoaddr => rstfifoaddr, wl => fwl(269), venb
          => venb, exen => exen );

U7268: fitagl
  port map ( wenf => wenf, addrin => ad(268), addrot => ad(269),
          rstfifoaddr => rstfifoaddr, wl => fwl(268), venb
          => venb, exen => exen );

U7267: fitagl
  port map ( wenf => wenf, addrin => ad(267), addrot => ad(268),
          rstfifoaddr => rstfifoaddr, wl => fwl(267), venb
          => venb, exen => exen );

U7266: fitagl
  port map ( wenf => wenf, addrin => ad(266), addrot => ad(267),
          rstfifoaddr => rstfifoaddr, wl => fwl(266), venb
          => venb, exen => exen );

U7265: fitagl
  port map ( wenf => wenf, addrin => ad(265), addrot => ad(266),
          rstfifoaddr => rstfifoaddr, wl => fwl(265), venb
          => venb, exen => exen );

U7264: fitagl
  port map ( wenf => wenf, addrin => ad(264), addrot => ad(265),
          rstfifoaddr => rstfifoaddr, wl => fwl(264), venb
          => venb, exen => exen );

U7263: fitagl
  port map ( wenf => wenf, addrin => ad(263), addrot => ad(264),
          rstfifoaddr => rstfifoaddr, wl => fwl(263), venb
          => venb, exen => exen );

U7262: fitagl
  port map ( wenf => wenf, addrin => ad(262), addrot => ad(263),
          rstfifoaddr => rstfifoaddr, wl => fwl(262), venb
          => venb, exen => exen );

U7261: fitagl
  port map ( wenf => wenf, addrin => ad(261), addrot => ad(262),
          rstfifoaddr => rstfifoaddr, wl => fwl(261), venb
          => venb, exen => exen );

U7260: fitagl
  port map ( wenf => wenf, addrin => ad(260), addrot => ad(261),
          rstfifoaddr => rstfifoaddr, wl => fwl(260), venb
          => venb, exen => exen );

U7259: fitagl
  port map ( wenf => wenf, addrin => ad(259), addrot => ad(260),
          rstfifoaddr => rstfifoaddr, wl => fwl(259), venb
          => venb, exen => exen );
```

```
U7258: fitag1
  port map ( wenf => wenf, addrin => ad(258), addrot => ad(259),
        rstfifoaddr => rstfifoaddr, wl => fwl(258), venb
        => venb, exen => exen );

U7257: fitag1
  port map ( wenf => wenf, addrin => ad(257), addrot => ad(258),
        rstfifoaddr => rstfifoaddr, wl => fwl(257), venb
        => venb, exen => exen );

U7256: fitag1
  port map ( wenf => wenf, addrin => ad(256), addrot => ad(257),
        rstfifoaddr => rstfifoaddr, wl => fwl(256), venb
        => venb, exen => exen );

U7255: fitag1
  port map ( wenf => wenf, addrin => ad(255), addrot => ad(256),
        rstfifoaddr => rstfifoaddr, wl => fwl(255), venb
        => venb, exen => exen );

U7254: fitag1
  port map ( wenf => wenf, addrin => ad(254), addrot => ad(255),
        rstfifoaddr => rstfifoaddr, wl => fwl(254), venb
        => venb, exen => exen );

U7253: fitag1
  port map ( wenf => wenf, addrin => ad(253), addrot => ad(254),
        rstfifoaddr => rstfifoaddr, wl => fwl(253), venb
        => venb, exen => exen );

U7252: fitag1
  port map ( wenf => wenf, addrin => ad(252), addrot => ad(253),
        rstfifoaddr => rstfifoaddr, wl => fwl(252), venb
        => venb, exen => exen );

U7251: fitag1
  port map ( wenf => wenf, addrin => ad(251), addrot => ad(252),
        rstfifoaddr => rstfifoaddr, wl => fwl(251), venb
        => venb, exen => exen );

U7250: fitag1
  port map ( wenf => wenf, addrin => ad(250), addrot => ad(251),
        rstfifoaddr => rstfifoaddr, wl => fwl(250), venb
        => venb, exen => exen );

U7249: fitag1
  port map ( wenf => wenf, addrin => ad(249), addrot => ad(250),
        rstfifoaddr => rstfifoaddr, wl => fwl(249), venb
        => venb, exen => exen );

U7248: fitag1
  port map ( wenf => wenf, addrin => ad(248), addrot => ad(249),
        rstfifoaddr => rstfifoaddr, wl => fwl(248), venb
        => venb, exen => exen );

U7247: fitag1
  port map ( wenf => wenf, addrin => ad(247), addrot => ad(248),
```

```
rstfifoaddr => rstfifoaddr, wl => fwl(247), venb
        => venb, exen => exen );

U7246: fitag1
   port map ( wenf => wenf, addrin => ad(246), addrot => ad(247),
        rstfifoaddr => rstfifoaddr, wl => fwl(246), venb
        => venb, exen => exen );

U7245: fitag1
   port map ( wenf => wenf, addrin => ad(245), addrot => ad(246),
        rstfifoaddr => rstfifoaddr, wl => fwl(245), venb
        => venb, exen => exen );

U7244: fitag1
   port map ( wenf => wenf, addrin => ad(244), addrot => ad(245),
        rstfifoaddr => rstfifoaddr, wl => fwl(244), venb
        => venb, exen => exen );

U7243: fitag1
   port map ( wenf => wenf, addrin => ad(243), addrot => ad(244),
        rstfifoaddr => rstfifoaddr, wl => fwl(243), venb
        => venb, exen => exen );

U7242: fitag1
   port map ( wenf => wenf, addrin => ad(242), addrot => ad(243),
        rstfifoaddr => rstfifoaddr, wl => fwl(242), venb
        => venb, exen => exen );

U7241: fitag1
   port map ( wenf => wenf, addrin => ad(241), addrot => ad(242),
        rstfifoaddr => rstfifoaddr, wl => fwl(241), venb
        => venb, exen => exen );

U7240: fitag1
   port map ( wenf => wenf, addrin => ad(240), addrot => ad(241),
        rstfifoaddr => rstfifoaddr, wl => fwl(240), venb
        => venb, exen => exen );

U7239: fitag1
   port map ( wenf => wenf, addrin => ad(239), addrot => ad(240),
        rstfifoaddr => rstfifoaddr, wl => fwl(239), venb
        => venb, exen => exen );

U7238: fitag1
   port map ( wenf => wenf, addrin => ad(238), addrot => ad(239),
        rstfifoaddr => rstfifoaddr, wl => fwl(238), venb
        => venb, exen => exen );

U7237: fitag1
   port map ( wenf => wenf, addrin => ad(237), addrot => ad(238),
        rstfifoaddr => rstfifoaddr, wl => fwl(237), venb
        => venb, exen => exen );

U7236: fitag1
   port map ( wenf => wenf, addrin => ad(236), addrot => ad(237),
        rstfifoaddr => rstfifoaddr, wl => fwl(236), venb
        => venb, exen => exen );
```

```
U7235: fitag1
   port map ( wenf => wenf, addrin => ad(235), addrot => ad(236),
         rstfifoaddr => rstfifoaddr, wl => fwl(235), venb
         => venb, exen => exen );

U7234: fitag1
   port map ( wenf => wenf, addrin => ad(234), addrot => ad(235),
         rstfifoaddr => rstfifoaddr, wl => fwl(234), venb
         => venb, exen => exen );

U7233: fitag1
   port map ( wenf => wenf, addrin => ad(233), addrot => ad(234),
         rstfifoaddr => rstfifoaddr, wl => fwl(233), venb
         => venb, exen => exen );

U7232: fitag1
   port map ( wenf => wenf, addrin => ad(232), addrot => ad(233),
         rstfifoaddr => rstfifoaddr, wl => fwl(232), venb
         => venb, exen => exen );

U7231: fitag1
   port map ( wenf => wenf, addrin => ad(231), addrot => ad(232),
         rstfifoaddr => rstfifoaddr, wl => fwl(231), venb
         => venb, exen => exen );

U7230: fitag1
   port map ( wenf => wenf, addrin => ad(230), addrot => ad(231),
         rstfifoaddr => rstfifoaddr, wl => fwl(230), venb
         => venb, exen => exen );

U7229: fitag1
   port map ( wenf => wenf, addrin => ad(229), addrot => ad(230),
         rstfifoaddr => rstfifoaddr, wl => fwl(229), venb
         => venb, exen => exen );

U7228: fitag1
   port map ( wenf => wenf, addrin => ad(228), addrot => ad(229),
         rstfifoaddr => rstfifoaddr, wl => fwl(228), venb
         => venb, exen => exen );

U7227: fitag1
   port map ( wenf => wenf, addrin => ad(227), addrot => ad(228),
         rstfifoaddr => rstfifoaddr, wl => fwl(227), venb
         => venb, exen => exen );

U7226: fitag1
   port map ( wenf => wenf, addrin => ad(226), addrot => ad(227),
         rstfifoaddr => rstfifoaddr, wl => fwl(226), venb
         => venb, exen => exen );

U7225: fitag1
   port map ( wenf => wenf, addrin => ad(225), addrot => ad(226),
         rstfifoaddr => rstfifoaddr, wl => fwl(225), venb
         => venb, exen => exen );

U7224: fitag1
   port map ( wenf => wenf, addrin => ad(224), addrot => ad(225),
         rstfifoaddr => rstfifoaddr, wl => fwl(224), venb
```

```
          => venb, exen => exen );

U7223: fitagl
   port map ( wenf => wenf, addrin => ad(223), addrot => ad(224),
          rstfifoaddr => rstfifoaddr, wl => fwl(223), venb
          => venb, exen => exen );

U7222: fitagl
   port map ( wenf => wenf, addrin => ad(222), addrot => ad(223),
          rstfifoaddr => rstfifoaddr, wl => fwl(222), venb
          => venb, exen => exen );

U7221: fitagl
   port map ( wenf => wenf, addrin => ad(221), addrot => ad(222),
          rstfifoaddr => rstfifoaddr, wl => fwl(221), venb
          => venb, exen => exen );

U7220: fitagl
   port map ( wenf => wenf, addrin => ad(220), addrot => ad(221),
          rstfifoaddr => rstfifoaddr, wl => fwl(220), venb
          => venb, exen => exen );

U7219: fitagl
   port map ( wenf => wenf, addrin => ad(219), addrot => ad(220),
          rstfifoaddr => rstfifoaddr, wl => fwl(219), venb
          => venb, exen => exen );

U7218: fitagl
   port map ( wenf => wenf, addrin => ad(218), addrot => ad(219),
          rstfifoaddr => rstfifoaddr, wl => fwl(218), venb
          => venb, exen => exen );

U7217: fitagl
   port map ( wenf => wenf, addrin => ad(217), addrot => ad(218),
          rstfifoaddr => rstfifoaddr, wl => fwl(217), venb
          => venb, exen => exen );

U7216: fitagl
   port map ( wenf => wenf, addrin => ad(216), addrot => ad(217),
          rstfifoaddr => rstfifoaddr, wl => fwl(216), venb
          => venb, exen => exen );

U7215: fitagl
   port map ( wenf => wenf, addrin => ad(215), addrot => ad(216),
          rstfifoaddr => rstfifoaddr, wl => fwl(215), venb
          => venb, exen => exen );

U7214: fitagl
   port map ( wenf => wenf, addrin => ad(214), addrot => ad(215),
          rstfifoaddr => rstfifoaddr, wl => fwl(214), venb
          => venb, exen => exen );

U7213: fitagl
   port map ( wenf => wenf, addrin => ad(213), addrot => ad(214),
          rstfifoaddr => rstfifoaddr, wl => fwl(213), venb
          => venb, exen => exen );

U7212: fitagl
```

```
  port map ( wenf => wenf, addrin => ad(212), addrot => ad(213),
        rstfifoaddr => rstfifoaddr, wl => fwl(212), venb
        => venb, exen => exen );

U7211: fitag1
  port map ( wenf => wenf, addrin => ad(211), addrot => ad(212),
        rstfifoaddr => rstfifoaddr, wl => fwl(211), venb
        => venb, exen => exen );

U7210: fitag1
  port map ( wenf => wenf, addrin => ad(210), addrot => ad(211),
        rstfifoaddr => rstfifoaddr, wl => fwl(210), venb
        => venb, exen => exen );

U7209: fitag1
  port map ( wenf => wenf, addrin => ad(209), addrot => ad(210),
        rstfifoaddr => rstfifoaddr, wl => fwl(209), venb
        => venb, exen => exen );

U7208: fitag1
  port map ( wenf => wenf, addrin => ad(208), addrot => ad(209),
        rstfifoaddr => rstfifoaddr, wl => fwl(208), venb
        => venb, exen => exen );

U7207: fitag1
  port map ( wenf => wenf, addrin => ad(207), addrot => ad(208),
        rstfifoaddr => rstfifoaddr, wl => fwl(207), venb
        => venb, exen => exen );

U7206: fitag1
  port map ( wenf => wenf, addrin => ad(206), addrot => ad(207),
        rstfifoaddr => rstfifoaddr, wl => fwl(206), venb
        => venb, exen => exen );

U7205: fitag1
  port map ( wenf => wenf, addrin => ad(205), addrot => ad(206),
        rstfifoaddr => rstfifoaddr, wl => fwl(205), venb
        => venb, exen => exen );

U7204: fitag1
  port map ( wenf => wenf, addrin => ad(204), addrot => ad(205),
        rstfifoaddr => rstfifoaddr, wl => fwl(204), venb
        => venb, exen => exen );

U7203: fitag1
  port map ( wenf => wenf, addrin => ad(203), addrot => ad(204),
        rstfifoaddr => rstfifoaddr, wl => fwl(203), venb
        => venb, exen => exen );

U7202: fitag1
  port map ( wenf => wenf, addrin => ad(202), addrot => ad(203),
        rstfifoaddr => rstfifoaddr, wl => fwl(202), venb
        => venb, exen => exen );

U7201: fitag1
  port map ( wenf => wenf, addrin => ad(201), addrot => ad(202),
        rstfifoaddr => rstfifoaddr, wl => fwl(201), venb
        => venb, exen => exen );
```

```
U7200: fitag1
  port map ( wenf => wenf, addrin => ad(200), addrot => ad(201),
        rstfifoaddr => rstfifoaddr, wl => fwl(200), venb
        => venb, exen => exen );

U7199: fitag1
  port map ( wenf => wenf, addrin => ad(199), addrot => ad(200),
        rstfifoaddr => rstfifoaddr, wl => fwl(199), venb
        => venb, exen => exen );

U7198: fitag1
  port map ( wenf => wenf, addrin => ad(198), addrot => ad(199),
        rstfifoaddr => rstfifoaddr, wl => fwl(198), venb
        => venb, exen => exen );

U7197: fitag1
  port map ( wenf => wenf, addrin => ad(197), addrot => ad(198),
        rstfifoaddr => rstfifoaddr, wl => fwl(197), venb
        => venb, exen => exen );

U7196: fitag1
  port map ( wenf => wenf, addrin => ad(196), addrot => ad(197),
        rstfifoaddr => rstfifoaddr, wl => fwl(196), venb
        => venb, exen => exen );

U7195: fitag1
  port map ( wenf => wenf, addrin => ad(195), addrot => ad(196),
        rstfifoaddr => rstfifoaddr, wl => fwl(195), venb
        => venb, exen => exen );

U7194: fitag1
  port map ( wenf => wenf, addrin => ad(194), addrot => ad(195),
        rstfifoaddr => rstfifoaddr, wl => fwl(194), venb
        => venb, exen => exen );

U7193: fitag1
  port map ( wenf => wenf, addrin => ad(193), addrot => ad(194),
        rstfifoaddr => rstfifoaddr, wl => fwl(193), venb
        => venb, exen => exen );

U7192: fitag1
  port map ( wenf => wenf, addrin => ad(192), addrot => ad(193),
        rstfifoaddr => rstfifoaddr, wl => fwl(192), venb
        => venb, exen => exen );

U7191: fitag1
  port map ( wenf => wenf, addrin => ad(191), addrot => ad(192),
        rstfifoaddr => rstfifoaddr, wl => fwl(191), venb
        => venb, exen => exen );

U7190: fitag1
  port map ( wenf => wenf, addrin => ad(190), addrot => ad(191),
        rstfifoaddr => rstfifoaddr, wl => fwl(190), venb
        => venb, exen => exen );

U7189: fitag1
  port map ( wenf => wenf, addrin => ad(189), addrot => ad(190),
```

```
U7200: fitag1
   port map ( wenf => wenf, addrin => ad(200), addrot => ad(201),
         rstfifoaddr => rstfifoaddr, wl => fwl(200), venb
         => venb, exen => exen );

U7199: fitag1
   port map ( wenf => wenf, addrin => ad(199), addrot => ad(200),
         rstfifoaddr => rstfifoaddr, wl => fwl(199), venb
         => venb, exen => exen );

U7198: fitag1
   port map ( wenf => wenf, addrin => ad(198), addrot => ad(199),
         rstfifoaddr => rstfifoaddr, wl => fwl(198), venb
         => venb, exen => exen );

U7197: fitag1
   port map ( wenf => wenf, addrin => ad(197), addrot => ad(198),
         rstfifoaddr => rstfifoaddr, wl => fwl(197), venb
         => venb, exen => exen );

U7196: fitag1
   port map ( wenf => wenf, addrin => ad(196), addrot => ad(197),
         rstfifoaddr => rstfifoaddr, wl => fwl(196), venb
         => venb, exen => exen );

U7195: fitag1
   port map ( wenf => wenf, addrin => ad(195), addrot => ad(196),
         rstfifoaddr => rstfifoaddr, wl => fwl(195), venb
         => venb, exen => exen );

U7194: fitag1
   port map ( wenf => wenf, addrin => ad(194), addrot => ad(195),
         rstfifoaddr => rstfifoaddr, wl => fwl(194), venb
         => venb, exen => exen );

U7193: fitag1
   port map ( wenf => wenf, addrin => ad(193), addrot => ad(194),
         rstfifoaddr => rstfifoaddr, wl => fwl(193), venb
         => venb, exen => exen );

U7192: fitag1
   port map ( wenf => wenf, addrin => ad(192), addrot => ad(193),
         rstfifoaddr => rstfifoaddr, wl => fwl(192), venb
         => venb, exen => exen );

U7191: fitag1
   port map ( wenf => wenf, addrin => ad(191), addrot => ad(192),
         rstfifoaddr => rstfifoaddr, wl => fwl(191), venb
         => venb, exen => exen );

U7190: fitag1
   port map ( wenf => wenf, addrin => ad(190), addrot => ad(191),
         rstfifoaddr => rstfifoaddr, wl => fwl(190), venb
         => venb, exen => exen );

U7189: fitag1
   port map ( wenf => wenf, addrin => ad(189), addrot => ad(190),
```

```
        rstfifoaddr => rstfifoaddr, wl => fwl(189), venb
        => venb, exen => exen );

U7188: fitag1
    port map ( wenf => wenf, addrin => ad(188), addrot => ad(189),
        rstfifoaddr => rstfifoaddr, wl => fwl(188), venb
        => venb, exen => exen );

U7187: fitag1
    port map ( wenf => wenf, addrin => ad(187), addrot => ad(188),
        rstfifoaddr => rstfifoaddr, wl => fwl(187), venb
        => venb, exen => exen );

U7186: fitag1
    port map ( wenf => wenf, addrin => ad(186), addrot => ad(187),
        rstfifoaddr => rstfifoaddr, wl => fwl(186), venb
        => venb, exen => exen );

U7185: fitag1
    port map ( wenf => wenf, addrin => ad(185), addrot => ad(186),
        rstfifoaddr => rstfifoaddr, wl => fwl(185), venb
        => venb, exen => exen );

U7184: fitag1
    port map ( wenf => wenf, addrin => ad(184), addrot => ad(185),
        rstfifoaddr => rstfifoaddr, wl => fwl(184), venb
        => venb, exen => exen );

U7183: fitag1
    port map ( wenf => wenf, addrin => ad(183), addrot => ad(184),
        rstfifoaddr => rstfifoaddr, wl => fwl(183), venb
        => venb, exen => exen );

U7182: fitag1
    port map ( wenf => wenf, addrin => ad(182), addrot => ad(183),
        rstfifoaddr => rstfifoaddr, wl => fwl(182), venb
        => venb, exen => exen );

U7181: fitag1
    port map ( wenf => wenf, addrin => ad(181), addrot => ad(182),
        rstfifoaddr => rstfifoaddr, wl => fwl(181), venb
        => venb, exen => exen );

U7180: fitag1
    port map ( wenf => wenf, addrin => ad(180), addrot => ad(181),
        rstfifoaddr => rstfifoaddr, wl => fwl(180), venb
        => venb, exen => exen );

U7179: fitag1
    port map ( wenf => wenf, addrin => ad(179), addrot => ad(180),
        rstfifoaddr => rstfifoaddr, wl => fwl(179), venb
        => venb, exen => exen );

U7178: fitag1
    port map ( wenf => wenf, addrin => ad(178), addrot => ad(179),
        rstfifoaddr => rstfifoaddr, wl => fwl(178), venb
        => venb, exen => exen );
```

```
U7177: fitag1
  port map ( wenf => wenf, addrin => ad(177), addrot => ad(178),
        rstfifoaddr => rstfifoaddr, wl => fwl(177), venb
        => venb, exen => exen );

U7176: fitag1
  port map ( wenf => wenf, addrin => ad(176), addrot => ad(177),
        rstfifoaddr => rstfifoaddr, wl => fwl(176), venb
        => venb, exen => exen );

U7175: fitag1
  port map ( wenf => wenf, addrin => ad(175), addrot => ad(176),
        rstfifoaddr => rstfifoaddr, wl => fwl(175), venb
        => venb, exen => exen );

U7174: fitag1
  port map ( wenf => wenf, addrin => ad(174), addrot => ad(175),
        rstfifoaddr => rstfifoaddr, wl => fwl(174), venb
        => venb, exen => exen );

U7173: fitag1
  port map ( wenf => wenf, addrin => ad(173), addrot => ad(174),
        rstfifoaddr => rstfifoaddr, wl => fwl(173), venb
        => venb, exen => exen );

U7172: fitag1
  port map ( wenf => wenf, addrin => ad(172), addrot => ad(173),
        rstfifoaddr => rstfifoaddr, wl => fwl(172), venb
        => venb, exen => exen );

U7171: fitag1
  port map ( wenf => wenf, addrin => ad(171), addrot => ad(172),
        rstfifoaddr => rstfifoaddr, wl => fwl(171), venb
        => venb, exen => exen );

U7170: fitag1
  port map ( wenf => wenf, addrin => ad(170), addrot => ad(171),
        rstfifoaddr => rstfifoaddr, wl => fwl(170), venb
        => venb, exen => exen );

U7169: fitag1
  port map ( wenf => wenf, addrin => ad(169), addrot => ad(170),
        rstfifoaddr => rstfifoaddr, wl => fwl(169), venb
        => venb, exen => exen );

U7168: fitag1
  port map ( wenf => wenf, addrin => ad(168), addrot => ad(169),
        rstfifoaddr => rstfifoaddr, wl => fwl(168), venb
        => venb, exen => exen );

U7167: fitag1
  port map ( wenf => wenf, addrin => ad(167), addrot => ad(168),
        rstfifoaddr => rstfifoaddr, wl => fwl(167), venb
        => venb, exen => exen );

U7166: fitag1
  port map ( wenf => wenf, addrin => ad(166), addrot => ad(167),
        rstfifoaddr => rstfifoaddr, wl => fwl(166), venb
```

```
=> venb, exen => exen );

U7165: fitag1
  port map ( wenf => wenf, addrin => ad(165), addrot => ad(166),
        rstfifoaddr => rstfifoaddr, wl => fwl(165), venb
        => venb, exen => exen );

U7164: fitag1
  port map ( wenf => wenf, addrin => ad(164), addrot => ad(165),
        rstfifoaddr => rstfifoaddr, wl => fwl(164), venb
        => venb, exen => exen );

U7163: fitag1
  port map ( wenf => wenf, addrin => ad(163), addrot => ad(164),
        rstfifoaddr => rstfifoaddr, wl => fwl(163), venb
        => venb, exen => exen );

U7162: fitag1
  port map ( wenf => wenf, addrin => ad(162), addrot => ad(163),
        rstfifoaddr => rstfifoaddr, wl => fwl(162), venb
        => venb, exen => exen );

U7161: fitag1
  port map ( wenf => wenf, addrin => ad(161), addrot => ad(162),
        rstfifoaddr => rstfifoaddr, wl => fwl(161), venb
        => venb, exen => exen );

U7160: fitag1
  port map ( wenf => wenf, addrin => ad(160), addrot => ad(161),
        rstfifoaddr => rstfifoaddr, wl => fwl(160), venb
        => venb, exen => exen );

U7159: fitag1
  port map ( wenf => wenf, addrin => ad(159), addrot => ad(160),
        rstfifoaddr => rstfifoaddr, wl => fwl(159), venb
        => venb, exen => exen );

U7158: fitag1
  port map ( wenf => wenf, addrin => ad(158), addrot => ad(159),
        rstfifoaddr => rstfifoaddr, wl => fwl(158), venb
        => venb, exen => exen );

U7157: fitag1
  port map ( wenf => wenf, addrin => ad(157), addrot => ad(158),
        rstfifoaddr => rstfifoaddr, wl => fwl(157), venb
        => venb, exen => exen );

U7156: fitag1
  port map ( wenf => wenf, addrin => ad(156), addrot => ad(157),
        rstfifoaddr => rstfifoaddr, wl => fwl(156), venb
        => venb, exen => exen );

U7155: fitag1
  port map ( wenf => wenf, addrin => ad(155), addrot => ad(156),
        rstfifoaddr => rstfifoaddr, wl => fwl(155), venb
        => venb, exen => exen );

U7154: fitag1
```

```
    port map ( wenf => wenf, addrin => ad(154), addrot => ad(155),
            rstfifoaddr => rstfifoaddr, wl => fwl(154), venb
            => venb, exen => exen );

U7153: fitagl
    port map ( wenf => wenf, addrin => ad(153), addrot => ad(154),
            rstfifoaddr => rstfifoaddr, wl => fwl(153), venb
            => venb, exen => exen );

U7152: fitagl
    port map ( wenf => wenf, addrin => ad(152), addrot => ad(153),
            rstfifoaddr => rstfifoaddr, wl => fwl(152), venb
            => venb, exen => exen );

U7151: fitagl
    port map ( wenf => wenf, addrin => ad(151), addrot => ad(152),
            rstfifoaddr => rstfifoaddr, wl => fwl(151), venb
            => venb, exen => exen );

U7150: fitagl
    port map ( wenf => wenf, addrin => ad(150), addrot => ad(151),
            rstfifoaddr => rstfifoaddr, wl => fwl(150), venb
            => venb, exen => exen );

U7149: fitagl
    port map ( wenf => wenf, addrin => ad(149), addrot => ad(150),
            rstfifoaddr => rstfifoaddr, wl => fwl(149), venb
            => venb, exen => exen );

U7148: fitagl
    port map ( wenf => wenf, addrin => ad(148), addrot => ad(149),
            rstfifoaddr => rstfifoaddr, wl => fwl(148), venb
            => venb, exen => exen );

U7147: fitagl
    port map ( wenf => wenf, addrin => ad(147), addrot => ad(148),
            rstfifoaddr => rstfifoaddr, wl => fwl(147), venb
            => venb, exen => exen );

U7146: fitagl
    port map ( wenf => wenf, addrin => ad(146), addrot => ad(147),
            rstfifoaddr => rstfifoaddr, wl => fwl(146), venb
            => venb, exen => exen );

U7145: fitagl
    port map ( wenf => wenf, addrin => ad(145), addrot => ad(146),
            rstfifoaddr => rstfifoaddr, wl => fwl(145), venb
            => venb, exen => exen );

U7144: fitagl
    port map ( wenf => wenf, addrin => ad(144), addrot => ad(145),
            rstfifoaddr => rstfifoaddr, wl => fwl(144), venb
            => venb, exen => exen );

U7143: fitagl
    port map ( wenf => wenf, addrin => ad(143), addrot => ad(144),
            rstfifoaddr => rstfifoaddr, wl => fwl(143), venb
            => venb, exen => exen );
```

```
U7142: fitagl
   port map ( wenf => wenf, addrin => ad(142), addrot => ad(143),
         rstfifoaddr => rstfifoaddr, wl => fwl(142), venb
         => venb, exen => exen );

U7141: fitagl
   port map ( wenf => wenf, addrin => ad(141), addrot => ad(142),
         rstfifoaddr => rstfifoaddr, wl => fwl(141), venb
         => venb, exen => exen );

U7140: fitagl
   port map ( wenf => wenf, addrin => ad(140), addrot => ad(141),
         rstfifoaddr => rstfifoaddr, wl => fwl(140), venb
         => venb, exen => exen );

U7139: fitagl
   port map ( wenf => wenf, addrin => ad(139), addrot => ad(140),
         rstfifoaddr => rstfifoaddr, wl => fwl(139), venb
         => venb, exen => exen );

U7138: fitagl
   port map ( wenf => wenf, addrin => ad(138), addrot => ad(139),
         rstfifoaddr => rstfifoaddr, wl => fwl(138), venb
         => venb, exen => exen );

U7137: fitagl
   port map ( wenf => wenf, addrin => ad(137), addrot => ad(138),
         rstfifoaddr => rstfifoaddr, wl => fwl(137), venb
         => venb, exen => exen );

U7136: fitagl
   port map ( wenf => wenf, addrin => ad(136), addrot => ad(137),
         rstfifoaddr => rstfifoaddr, wl => fwl(136), venb
         => venb, exen => exen );

U7135: fitagl
   port map ( wenf => wenf, addrin => ad(135), addrot => ad(136),
         rstfifoaddr => rstfifoaddr, wl => fwl(135), venb
         => venb, exen => exen );

U7134: fitagl
   port map ( wenf => wenf, addrin => ad(134), addrot => ad(135),
         rstfifoaddr => rstfifoaddr, wl => fwl(134), venb
         => venb, exen => exen );

U7133: fitagl
   port map ( wenf => wenf, addrin => ad(133), addrot => ad(134),
         rstfifoaddr => rstfifoaddr, wl => fwl(133), venb
         => venb, exen => exen );

U7132: fitagl
   port map ( wenf => wenf, addrin => ad(132), addrot => ad(133),
         rstfifoaddr => rstfifoaddr, wl => fwl(132), venb
         => venb, exen => exen );

U7131: fitagl
   port map ( wenf => wenf, addrin => ad(131), addrot => ad(132),
```

```
          rstfifoaddr => rstfifoaddr, wl => fwl(131), venb
          => venb, exen => exen );

U7130: fitag1
   port map ( wenf => wenf, addrin => ad(130), addrot => ad(131),
          rstfifoaddr => rstfifoaddr, wl => fwl(130), venb
          => venb, exen => exen );

U7129: fitag1
   port map ( wenf => wenf, addrin => ad(129), addrot => ad(130),
          rstfifoaddr => rstfifoaddr, wl => fwl(129), venb
          => venb, exen => exen );

U7128: fitag1
   port map ( wenf => wenf, addrin => ad(128), addrot => ad(129),
          rstfifoaddr => rstfifoaddr, wl => fwl(128), venb
          => venb, exen => exen );

U7127: fitag1
   port map ( wenf => wenf, addrin => ad(127), addrot => ad(128),
          rstfifoaddr => rstfifoaddr, wl => fwl(127), venb
          => venb, exen => exen );

U7126: fitag1
   port map ( wenf => wenf, addrin => ad(126), addrot => ad(127),
          rstfifoaddr => rstfifoaddr, wl => fwl(126), venb
          => venb, exen => exen );

U7125: fitag1
   port map ( wenf => wenf, addrin => ad(125), addrot => ad(126),
          rstfifoaddr => rstfifoaddr, wl => fwl(125), venb
          => venb, exen => exen );

U7124: fitag1
   port map ( wenf => wenf, addrin => ad(124), addrot => ad(125),
          rstfifoaddr => rstfifoaddr, wl => fwl(124), venb
          => venb, exen => exen );

U7123: fitag1
   port map ( wenf => wenf, addrin => ad(123), addrot => ad(124),
          rstfifoaddr => rstfifoaddr, wl => fwl(123), venb
          => venb, exen => exen );

U7122: fitag1
   port map ( wenf => wenf, addrin => ad(122), addrot => ad(123),
          rstfifoaddr => rstfifoaddr, wl => fwl(122), venb
          => venb, exen => exen );

U7121: fitag1
   port map ( wenf => wenf, addrin => ad(121), addrot => ad(122),
          rstfifoaddr => rstfifoaddr, wl => fwl(121), venb
          => venb, exen => exen );

U7120: fitag1
   port map ( wenf => wenf, addrin => ad(120), addrot => ad(121),
          rstfifoaddr => rstfifoaddr, wl => fwl(120), venb
          => venb, exen => exen );
```

```
U7119: fitag1
   port map ( wenf => wenf, addrin => ad(119), addrot => ad(120),
        rstfifoaddr => rstfifoaddr, wl => fwl(119), venb
        => venb, exen => exen );

U7118: fitag1
   port map ( wenf => wenf, addrin => ad(118), addrot => ad(119),
        rstfifoaddr => rstfifoaddr, wl => fwl(118), venb
        => venb, exen => exen );

U7117: fitag1
   port map ( wenf => wenf, addrin => ad(117), addrot => ad(118),
        rstfifoaddr => rstfifoaddr, wl => fwl(117), venb
        => venb, exen => exen );

U7116: fitag1
   port map ( wenf => wenf, addrin => ad(116), addrot => ad(117),
        rstfifoaddr => rstfifoaddr, wl => fwl(116), venb
        => venb, exen => exen );

U7115: fitag1
   port map ( wenf => wenf, addrin => ad(115), addrot => ad(116),
        rstfifoaddr => rstfifoaddr, wl => fwl(115), venb
        => venb, exen => exen );

U7114: fitag1
   port map ( wenf => wenf, addrin => ad(114), addrot => ad(115),
        rstfifoaddr => rstfifoaddr, wl => fwl(114), venb
        => venb, exen => exen );

U7113: fitag1
   port map ( wenf => wenf, addrin => ad(113), addrot => ad(114),
        rstfifoaddr => rstfifoaddr, wl => fwl(113), venb
        => venb, exen => exen );

U7112: fitag1
   port map ( wenf => wenf, addrin => ad(112), addrot => ad(113),
        rstfifoaddr => rstfifoaddr, wl => fwl(112), venb
        => venb, exen => exen );

U7111: fitag1
   port map ( wenf => wenf, addrin => ad(111), addrot => ad(112),
        rstfifoaddr => rstfifoaddr, wl => fwl(111), venb
        => venb, exen => exen );

U7110: fitag1
   port map ( wenf => wenf, addrin => ad(110), addrot => ad(111),
        rstfifoaddr => rstfifoaddr, wl => fwl(110), venb
        => venb, exen => exen );

U7109: fitag1
   port map ( wenf => wenf, addrin => ad(109), addrot => ad(110),
        rstfifoaddr => rstfifoaddr, wl => fwl(109), venb
        => venb, exen => exen );

U7108: fitag1
   port map ( wenf => wenf, addrin => ad(108), addrot => ad(109),
        rstfifoaddr => rstfifoaddr, wl => fwl(108), venb
```

```
=> venb, exen => exen );

U7107: fitagl
  port map ( wenf => wenf, addrin => ad(107), addrot => ad(108),
        rstfifoaddr => rstfifoaddr, wl => fwl(107), venb
        => venb, exen => exen );

U7106: fitagl
  port map ( wenf => wenf, addrin => ad(106), addrot => ad(107),
        rstfifoaddr => rstfifoaddr, wl => fwl(106), venb
        => venb, exen => exen );

U7105: fitagl
  port map ( wenf => wenf, addrin => ad(105), addrot => ad(106),
        rstfifoaddr => rstfifoaddr, wl => fwl(105), venb
        => venb, exen => exen );

U7104: fitagl
  port map ( wenf => wenf, addrin => ad(104), addrot => ad(105),
        rstfifoaddr => rstfifoaddr, wl => fwl(104), venb
        => venb, exen => exen );

U7103: fitagl
  port map ( wenf => wenf, addrin => ad(103), addrot => ad(104),
        rstfifoaddr => rstfifoaddr, wl => fwl(103), venb
        => venb, exen => exen );

U7102: fitagl
  port map ( wenf => wenf, addrin => ad(102), addrot => ad(103),
        rstfifoaddr => rstfifoaddr, wl => fwl(102), venb
        => venb, exen => exen );

U7101: fitagl
  port map ( wenf => wenf, addrin => ad(101), addrot => ad(102),
        rstfifoaddr => rstfifoaddr, wl => fwl(101), venb
        => venb, exen => exen );

U7100: fitagl
  port map ( wenf => wenf, addrin => ad(100), addrot => ad(101),
        rstfifoaddr => rstfifoaddr, wl => fwl(100), venb
        => venb, exen => exen );

U799: fitagl
  port map ( wenf => wenf, addrin => ad(99), addrot => ad(100),
        rstfifoaddr => rstfifoaddr, wl => fwl(99), venb =>
        venb, exen => exen );

U798: fitagl
  port map ( wenf => wenf, addrin => ad(98), addrot => ad(99),
        rstfifoaddr => rstfifoaddr, wl => fwl(98), venb =>
        venb, exen => exen );

U797: fitagl
  port map ( wenf => wenf, addrin => ad(97), addrot => ad(98),
        rstfifoaddr => rstfifoaddr, wl => fwl(97), venb =>
        venb, exen => exen );

U796: fitagl
```

```
port map ( wenf => wenf, addrin => ad(96), addrot => ad(97),
        rstfifoaddr => rstfifoaddr, wl => fwl(96), venb =>
        venb, exen => exen );

U795: fitagl
  port map ( wenf => wenf, addrin => ad(95), addrot => ad(96),
        rstfifoaddr => rstfifoaddr, wl => fwl(95), venb =>
        venb, exen => exen );

U794: fitagl
  port map ( wenf => wenf, addrin => ad(94), addrot => ad(95),
        rstfifoaddr => rstfifoaddr, wl => fwl(94), venb =>
        venb, exen => exen );

U793: fitagl
  port map ( wenf => wenf, addrin => ad(93), addrot => ad(94),
        rstfifoaddr => rstfifoaddr, wl => fwl(93), venb =>
        venb, exen => exen );

U792: fitagl
  port map ( wenf => wenf, addrin => ad(92), addrot => ad(93),
        rstfifoaddr => rstfifoaddr, wl => fwl(92), venb =>
        venb, exen => exen );

U791: fitagl
  port map ( wenf => wenf, addrin => ad(91), addrot => ad(92),
        rstfifoaddr => rstfifoaddr, wl => fwl(91), venb =>
        venb, exen => exen );

U790: fitagl
  port map ( wenf => wenf, addrin => ad(90), addrot => ad(91),
        rstfifoaddr => rstfifoaddr, wl => fwl(90), venb =>
        venb, exen => exen );

U789: fitagl
  port map ( wenf => wenf, addrin => ad(89), addrot => ad(90),
        rstfifoaddr => rstfifoaddr, wl => fwl(89), venb =>
        venb, exen => exen );

U788: fitagl
  port map ( wenf => wenf, addrin => ad(88), addrot => ad(89),
        rstfifoaddr => rstfifoaddr, wl => fwl(88), venb =>
        venb, exen => exen );

U787: fitagl
  port map ( wenf => wenf, addrin => ad(87), addrot => ad(88),
        rstfifoaddr => rstfifoaddr, wl => fwl(87), venb =>
        venb, exen => exen );

U786: fitagl
  port map ( wenf => wenf, addrin => ad(86), addrot => ad(87),
        rstfifoaddr => rstfifoaddr, wl => fwl(86), venb =>
        venb, exen => exen );

U785: fitagl
  port map ( wenf => wenf, addrin => ad(85), addrot => ad(86),
        rstfifoaddr => rstfifoaddr, wl => fwl(85), venb =>
        venb, exen => exen );
```

```
U784: fitag1
   port map ( wenf => wenf, addrin => ad(84), addrot => ad(85),
          rstfifoaddr => rstfifoaddr, wl => fwl(84), venb =>
          venb, exen => exen );

U783: fitag1
   port map ( wenf => wenf, addrin => ad(83), addrot => ad(84),
          rstfifoaddr => rstfifoaddr, wl => fwl(83), venb =>
          venb, exen => exen );

U782: fitag1
   port map ( wenf => wenf, addrin => ad(82), addrot => ad(83),
          rstfifoaddr => rstfifoaddr, wl => fwl(82), venb =>
          venb, exen => exen );

U781: fitag1
   port map ( wenf => wenf, addrin => ad(81), addrot => ad(82),
          rstfifoaddr => rstfifoaddr, wl => fwl(81), venb =>
          venb, exen => exen );

U780: fitag1
   port map ( wenf => wenf, addrin => ad(80), addrot => ad(81),
          rstfifoaddr => rstfifoaddr, wl => fwl(80), venb =>
          venb, exen => exen );

U779: fitag1
   port map ( wenf => wenf, addrin => ad(79), addrot => ad(80),
          rstfifoaddr => rstfifoaddr, wl => fwl(79), venb =>
          venb, exen => exen );

U778: fitag1
   port map ( wenf => wenf, addrin => ad(78), addrot => ad(79),
          rstfifoaddr => rstfifoaddr, wl => fwl(78), venb =>
          venb, exen => exen );

U777: fitag1
   port map ( wenf => wenf, addrin => ad(77), addrot => ad(78),
          rstfifoaddr => rstfifoaddr, wl => fwl(77), venb =>
          venb, exen => exen );

U776: fitag1
   port map ( wenf => wenf, addrin => ad(76), addrot => ad(77),
          rstfifoaddr => rstfifoaddr, wl => fwl(76), venb =>
          venb, exen => exen );

U775: fitag1
   port map ( wenf => wenf, addrin => ad(75), addrot => ad(76),
          rstfifoaddr => rstfifoaddr, wl => fwl(75), venb =>
          venb, exen => exen );

U774: fitag1
   port map ( wenf => wenf, addrin => ad(74), addrot => ad(75),
          rstfifoaddr => rstfifoaddr, wl => fwl(74), venb =>
          venb, exen => exen );

U773: fitag1
   port map ( wenf => wenf, addrin => ad(73), addrot => ad(74),
```

```
            rstfifoaddr => rstfifoaddr, wl => fwl(73), venb =>
            venb, exen => exen );

      U772: fitag1
        port map ( wenf => wenf, addrin => ad(72), addrot => ad(73),
            rstfifoaddr => rstfifoaddr, wl => fwl(72), venb =>
            venb, exen => exen );

      U771: fitag1
        port map ( wenf => wenf, addrin => ad(71), addrot => ad(72),
            rstfifoaddr => rstfifoaddr, wl => fwl(71), venb =>
            venb, exen => exen );

      U770: fitag1
        port map ( wenf => wenf, addrin => ad(70), addrot => ad(71),
            rstfifoaddr => rstfifoaddr, wl => fwl(70), venb =>
            venb, exen => exen );

      U769: fitag1
        port map ( wenf => wenf, addrin => ad(69), addrot => ad(70),
            rstfifoaddr => rstfifoaddr, wl => fwl(69), venb =>
            venb, exen => exen );

      U768: fitag1
        port map ( wenf => wenf, addrin => ad(68), addrot => ad(69),
            rstfifoaddr => rstfifoaddr, wl => fwl(68), venb =>
            venb, exen => exen );

      U767: fitag1
        port map ( wenf => wenf, addrin => ad(67), addrot => ad(68),
            rstfifoaddr => rstfifoaddr, wl => fwl(67), venb =>
            venb, exen => exen );

      U766: fitag1
        port map ( wenf => wenf, addrin => ad(66), addrot => ad(67),
            rstfifoaddr => rstfifoaddr, wl => fwl(66), venb =>
            venb, exen => exen );

      U765: fitag1
        port map ( wenf => wenf, addrin => ad(65), addrot => ad(66),
            rstfifoaddr => rstfifoaddr, wl => fwl(65), venb =>
            venb, exen => exen );

      U764: fitag1
        port map ( wenf => wenf, addrin => ad(64), addrot => ad(65),
            rstfifoaddr => rstfifoaddr, wl => fwl(64), venb =>
            venb, exen => exen );

      U763: fitag1
        port map ( wenf => wenf, addrin => ad(63), addrot => ad(64),
            rstfifoaddr => rstfifoaddr, wl => fwl(63), venb =>
            venb, exen => exen );

      U762: fitag1
        port map ( wenf => wenf, addrin => ad(62), addrot => ad(63),
            rstfifoaddr => rstfifoaddr, wl => fwl(62), venb =>
            venb, exen => exen );
```

```
U761: fitag1
  port map ( wenf => wenf, addrin => ad(61), addrot => ad(62),
        rstfifoaddr => rstfifoaddr, wl => fwl(61), venb =>
        venb, exen => exen );

U760: fitag1
  port map ( wenf => wenf, addrin => ad(60), addrot => ad(61),
        rstfifoaddr => rstfifoaddr, wl => fwl(60), venb =>
        venb, exen => exen );

U759: fitag1
  port map ( wenf => wenf, addrin => ad(59), addrot => ad(60),
        rstfifoaddr => rstfifoaddr, wl => fwl(59), venb =>
        venb, exen => exen );

U758: fitag1
  port map ( wenf => wenf, addrin => ad(58), addrot => ad(59),
        rstfifoaddr => rstfifoaddr, wl => fwl(58), venb =>
        venb, exen => exen );

U757: fitag1
  port map ( wenf => wenf, addrin => ad(57), addrot => ad(58),
        rstfifoaddr => rstfifoaddr, wl => fwl(57), venb =>
        venb, exen => exen );

U756: fitag1
  port map ( wenf => wenf, addrin => ad(56), addrot => ad(57),
        rstfifoaddr => rstfifoaddr, wl => fwl(56), venb =>
        venb, exen => exen );

U755: fitag1
  port map ( wenf => wenf, addrin => ad(55), addrot => ad(56),
        rstfifoaddr => rstfifoaddr, wl => fwl(55), venb =>
        venb, exen => exen );

U754: fitag1
  port map ( wenf => wenf, addrin => ad(54), addrot => ad(55),
        rstfifoaddr => rstfifoaddr, wl => fwl(54), venb =>
        venb, exen => exen );

U753: fitag1
  port map ( wenf => wenf, addrin => ad(53), addrot => ad(54),
        rstfifoaddr => rstfifoaddr, wl => fwl(53), venb =>
        venb, exen => exen );

U752: fitag1
  port map ( wenf => wenf, addrin => ad(52), addrot => ad(53),
        rstfifoaddr => rstfifoaddr, wl => fwl(52), venb =>
        venb, exen => exen );

U751: fitag1
  port map ( wenf => wenf, addrin => ad(51), addrot => ad(52),
        rstfifoaddr => rstfifoaddr, wl => fwl(51), venb =>
        venb, exen => exen );

U750: fitag1
  port map ( wenf => wenf, addrin => ad(50), addrot => ad(51),
        rstfifoaddr => rstfifoaddr, wl => fwl(50), venb =>
```

```
        venb, exen => exen );

U749: fitag1
   port map ( wenf => wenf, addrin => ad(49), addrot => ad(50),
        rstfifoaddr => rstfifoaddr, wl => fwl(49), venb =>
        venb, exen => exen );

U748: fitag1
   port map ( wenf => wenf, addrin => ad(48), addrot => ad(49),
        rstfifoaddr => rstfifoaddr, wl => fwl(48), venb =>
        venb, exen => exen );

U747: fitag1
   port map ( wenf => wenf, addrin => ad(47), addrot => ad(48),
        rstfifoaddr => rstfifoaddr, wl => fwl(47), venb =>
        venb, exen => exen );

U746: fitag1
   port map ( wenf => wenf, addrin => ad(46), addrot => ad(47),
        rstfifoaddr => rstfifoaddr, wl => fwl(46), venb =>
        venb, exen => exen );

U745: fitag1
   port map ( wenf => wenf, addrin => ad(45), addrot => ad(46),
        rstfifoaddr => rstfifoaddr, wl => fwl(45), venb =>
        venb, exen => exen );

U744: fitag1
   port map ( wenf => wenf, addrin => ad(44), addrot => ad(45),
        rstfifoaddr => rstfifoaddr, wl => fwl(44), venb =>
        venb, exen => exen );

U743: fitag1
   port map ( wenf => wenf, addrin => ad(43), addrot => ad(44),
        rstfifoaddr => rstfifoaddr, wl => fwl(43), venb =>
        venb, exen => exen );

U742: fitag1
   port map ( wenf => wenf, addrin => ad(42), addrot => ad(43),
        rstfifoaddr => rstfifoaddr, wl => fwl(42), venb =>
        venb, exen => exen );

U741: fitag1
   port map ( wenf => wenf, addrin => ad(41), addrot => ad(42),
        rstfifoaddr => rstfifoaddr, wl => fwl(41), venb =>
        venb, exen => exen );

U740: fitag1
   port map ( wenf => wenf, addrin => ad(40), addrot => ad(41),
        rstfifoaddr => rstfifoaddr, wl => fwl(40), venb =>
        venb, exen => exen );

U739: fitag1
   port map ( wenf => wenf, addrin => ad(39), addrot => ad(40),
        rstfifoaddr => rstfifoaddr, wl => fwl(39), venb =>
        venb, exen => exen );

U738: fitag1
```

```
    port map ( wenf => wenf, addrin => ad(38), addrot => ad(39),
          rstfifoaddr => rstfifoaddr, wl => fwl(38), venb =>
          venb, exen => exen );

U737: fitag1
    port map ( wenf => wenf, addrin => ad(37), addrot => ad(38),
          rstfifoaddr => rstfifoaddr, wl => fwl(37), venb =>
          venb, exen => exen );

U736: fitag1
    port map ( wenf => wenf, addrin => ad(36), addrot => ad(37),
          rstfifoaddr => rstfifoaddr, wl => fwl(36), venb =>
          venb, exen => exen );

U735: fitag1
    port map ( wenf => wenf, addrin => ad(35), addrot => ad(36),
          rstfifoaddr => rstfifoaddr, wl => fwl(35), venb =>
          venb, exen => exen );

U734: fitag1
    port map ( wenf => wenf, addrin => ad(34), addrot => ad(35),
          rstfifoaddr => rstfifoaddr, wl => fwl(34), venb =>
          venb, exen => exen );

U733: fitag1
    port map ( wenf => wenf, addrin => ad(33), addrot => ad(34),
          rstfifoaddr => rstfifoaddr, wl => fwl(33), venb =>
          venb, exen => exen );

U732: fitag1
    port map ( wenf => wenf, addrin => ad(32), addrot => ad(33),
          rstfifoaddr => rstfifoaddr, wl => fwl(32), venb =>
          venb, exen => exen );

U731: fitag1
    port map ( wenf => wenf, addrin => ad(31), addrot => ad(32),
          rstfifoaddr => rstfifoaddr, wl => fwl(31), venb =>
          venb, exen => exen );

U730: fitag1
    port map ( wenf => wenf, addrin => ad(30), addrot => ad(31),
          rstfifoaddr => rstfifoaddr, wl => fwl(30), venb =>
          venb, exen => exen );

U729: fitag1
    port map ( wenf => wenf, addrin => ad(29), addrot => ad(30),
          rstfifoaddr => rstfifoaddr, wl => fwl(29), venb =>
          venb, exen => exen );

U728: fitag1
    port map ( wenf => wenf, addrin => ad(28), addrot => ad(29),
          rstfifoaddr => rstfifoaddr, wl => fwl(28), venb =>
          venb, exen => exen );

U727: fitag1
    port map ( wenf => wenf, addrin => ad(27), addrot => ad(28),
          rstfifoaddr => rstfifoaddr, wl => fwl(27), venb =>
          venb, exen => exen );
```

```
U726: fitagl
  port map ( wenf => wenf, addrin => ad(26), addrot => ad(27),
         rstfifoaddr => rstfifoaddr, wl => fwl(26), venb =>
         venb, exen => exen );

U725: fitagl
  port map ( wenf => wenf, addrin => ad(25), addrot => ad(26),
         rstfifoaddr => rstfifoaddr, wl => fwl(25), venb =>
         venb, exen => exen );

U724: fitagl
  port map ( wenf => wenf, addrin => ad(24), addrot => ad(25),
         rstfifoaddr => rstfifoaddr, wl => fwl(24), venb =>
         venb, exen => exen );

U723: fitagl
  port map ( wenf => wenf, addrin => ad(23), addrot => ad(24),
         rstfifoaddr => rstfifoaddr, wl => fwl(23), venb =>
         venb, exen => exen );

U722: fitagl
  port map ( wenf => wenf, addrin => ad(22), addrot => ad(23),
         rstfifoaddr => rstfifoaddr, wl => fwl(22), venb =>
         venb, exen => exen );

U721: fitagl
  port map ( wenf => wenf, addrin => ad(21), addrot => ad(22),
         rstfifoaddr => rstfifoaddr, wl => fwl(21), venb =>
         venb, exen => exen );

U720: fitagl
  port map ( wenf => wenf, addrin => ad(20), addrot => ad(21),
         rstfifoaddr => rstfifoaddr, wl => fwl(20), venb =>
         venb, exen => exen );

U719: fitagl
  port map ( wenf => wenf, addrin => ad(19), addrot => ad(20),
         rstfifoaddr => rstfifoaddr, wl => fwl(19), venb =>
         venb, exen => exen );

U718: fitagl
  port map ( wenf => wenf, addrin => ad(18), addrot => ad(19),
         rstfifoaddr => rstfifoaddr, wl => fwl(18), venb =>
         venb, exen => exen );

U717: fitagl
  port map ( wenf => wenf, addrin => ad(17), addrot => ad(18),
         rstfifoaddr => rstfifoaddr, wl => fwl(17), venb =>
         venb, exen => exen );

U716: fitagl
  port map ( wenf => wenf, addrin => ad(16), addrot => ad(17),
         rstfifoaddr => rstfifoaddr, wl => fwl(16), venb =>
         venb, exen => exen );

U715: fitagl
  port map ( wenf => wenf, addrin => ad(15), addrot => ad(16),
```

```
        rstfifoaddr => rstfifoaddr, wl => fwl(15), venb =>
        venb, exen => exen );

U714: fitag1
   port map ( wenf => wenf, addrin => ad(14), addrot => ad(15),
        rstfifoaddr => rstfifoaddr, wl => fwl(14), venb =>
        venb, exen => exen );

U713: fitag1
   port map ( wenf => wenf, addrin => ad(13), addrot => ad(14),
        rstfifoaddr => rstfifoaddr, wl => fwl(13), venb =>
        venb, exen => exen );

U712: fitag1
   port map ( wenf => wenf, addrin => ad(12), addrot => ad(13),
        rstfifoaddr => rstfifoaddr, wl => fwl(12), venb =>
        venb, exen => exen );

U711: fitag1
   port map ( wenf => wenf, addrin => ad(11), addrot => ad(12),
        rstfifoaddr => rstfifoaddr, wl => fwl(11), venb =>
        venb, exen => exen );

U710: fitag1
   port map ( wenf => wenf, addrin => ad(10), addrot => ad(11),
        rstfifoaddr => rstfifoaddr, wl => fwl(10), venb =>
        venb, exen => exen );

U79: fitag1
   port map ( wenf => wenf, addrin => ad(9), addrot => ad(10),
        rstfifoaddr => rstfifoaddr, wl => fwl(9), venb =>
        venb, exen => exen );

U78: fitag1
   port map ( wenf => wenf, addrin => ad(8), addrot => ad(9),
        rstfifoaddr => rstfifoaddr, wl => fwl(8), venb =>
        venb, exen => exen );

U77: fitag1
   port map ( wenf => wenf, addrin => ad(7), addrot => ad(8),
        rstfifoaddr => rstfifoaddr, wl => fwl(7), venb =>
        venb, exen => exen );

U76: fitag1
   port map ( wenf => wenf, addrin => ad(6), addrot => ad(7),
        rstfifoaddr => rstfifoaddr, wl => fwl(6), venb =>
        venb, exen => exen );

U75: fitag1
   port map ( wenf => wenf, addrin => ad(5), addrot => ad(6),
        rstfifoaddr => rstfifoaddr, wl => fwl(5), venb =>
        venb, exen => exen );

U74: fitag1
   port map ( wenf => wenf, addrin => ad(4), addrot => ad(5),
        rstfifoaddr => rstfifoaddr, wl => fwl(4), venb =>
        venb, exen => exen );
```

```
U73: fitag1
  port map ( wenf => wenf, addrin => ad(3), addrot => ad(4),
        rstfifoaddr => rstfifoaddr, wl => fwl(3), venb =>
        venb, exen => exen );

U72: fitag1
  port map ( wenf => wenf, addrin => ad(2), addrot => ad(3),
        rstfifoaddr => rstfifoaddr, wl => fwl(2), venb =>
        venb, exen => exen );

U71: fitag1
  port map ( wenf => wenf, addrin => ad(1), addrot => ad(2),
        rstfifoaddr => rstfifoaddr, wl => fwl(1), venb =>
        venb, exen => exen );

U70: fitag1
  port map ( wenf => wenf, addrin => finit, addrot => ad(1),
        rstfifoaddr => rstfifoaddr, wl => fwl(0), venb =>
        venb, exen => exen );

end fitag341_r;
```

```
file: FITAG342.VHD
-- Date of netlist generation: Nov-4-93

--------------------------------------------------------------------

library IEEE;
use IEEE.STD_LOGIC_1164.ALL;

library COMPASS_LIB;
use COMPASS_LIB.COMPASS.ALL;

entity fitag342 is



   port ( finit : in Std_Logic := 'U';
        venb : in Std_Logic := 'U';
        rstfifoaddr : in Std_Logic := 'U';
        wenf : in Std_Logic := 'U';
        exen : in Std_Logic := 'U';

        fful : out Std_Logic := 'U';
        fwl : out Std_Logic_Vector(341 downto 0) := (others =>
'U') );

end fitag342;


--------------------------------------------------------------------

architecture fitag342 OF fitag342 is

   component fitag1
      port ( wenf : in Std_Logic;
           addrin : in Std_Logic;
           rstfifoaddr : in Std_Logic;
           venb : in Std_Logic;
           exen : in Std_Logic;

           addrot : out Std_Logic;
           wl : out Std_Logic );
   end component;

   signal S1 : Std_Logic;
   signal ad : Std_Logic_Vector(341 downto 1);
   signal S2 : Std_Logic;

begin


   U7341: fitag1
      port map ( wenf => wenf, addrin => ad(341), addrot => fful,
              rstfifoaddr => rstfifoaddr, wl => fwl(341), venb
              => venb, exen => exen );

   U7340: fitag1
      port map ( wenf => wenf, addrin => ad(340), addrot => ad(341),
              rstfifoaddr => rstfifoaddr, wl => fwl(340), venb
```

```
        => venb, exen => exen );

U7339: fitag1
   port map ( wenf => wenf, addrin => ad(339), addrot => ad(340),
        rstfifoaddr => rstfifoaddr, wl => fwl(339), venb
        => venb, exen => exen );

U7338: fitag1
   port map ( wenf => wenf, addrin => ad(338), addrot => ad(339),
        rstfifoaddr => rstfifoaddr, wl => fwl(338), venb
        => venb, exen => exen );

U7337: fitag1
   port map ( wenf => wenf, addrin => ad(337), addrot => ad(338),
        rstfifoaddr => rstfifoaddr, wl => fwl(337), venb
        => venb, exen => exen );

U7336: fitag1
   port map ( wenf => wenf, addrin => ad(336), addrot => ad(337),
        rstfifoaddr => rstfifoaddr, wl => fwl(336), venb
        => venb, exen => exen );

U7335: fitag1
   port map ( wenf => wenf, addrin => ad(335), addrot => ad(336),
        rstfifoaddr => rstfifoaddr, wl => fwl(335), venb
        => venb, exen => exen );

U7334: fitag1
   port map ( wenf => wenf, addrin => ad(334), addrot => ad(335),
        rstfifoaddr => rstfifoaddr, wl => fwl(334), venb
        => venb, exen => exen );

U7333: fitag1
   port map ( wenf => wenf, addrin => ad(333), addrot => ad(334),
        rstfifoaddr => rstfifoaddr, wl => fwl(333), venb
        => venb, exen => exen );

U7332: fitag1
   port map ( wenf => wenf, addrin => ad(332), addrot => ad(333),
        rstfifoaddr => rstfifoaddr, wl => fwl(332), venb
        => venb, exen => exen );

U7331: fitag1
   port map ( wenf => wenf, addrin => ad(331), addrot => ad(332),
        rstfifoaddr => rstfifoaddr, wl => fwl(331), venb
        => venb, exen => exen );

U7330: fitag1
   port map ( wenf => wenf, addrin => ad(330), addrot => ad(331),
        rstfifoaddr => rstfifoaddr, wl => fwl(330), venb
        => venb, exen => exen );

U7329: fitag1
   port map ( wenf => wenf, addrin => ad(329), addrot => ad(330),
        rstfifoaddr => rstfifoaddr, wl => fwl(329), venb
        => venb, exen => exen );

U7328: fitag1
```

```
port map ( wenf => wenf, addrin => ad(328), addrot => ad(329),
        rstfifoaddr => rstfifoaddr, wl => fwl(328), venb
        => venb, exen => exen );

U7327: fitagl
  port map ( wenf => wenf, addrin => ad(327), addrot => ad(328),
        rstfifoaddr => rstfifoaddr, wl => fwl(327), venb
        => venb, exen => exen );

U7326: fitagl
  port map ( wenf => wenf, addrin => ad(326), addrot => ad(327),
        rstfifoaddr => rstfifoaddr, wl => fwl(326), venb
        => venb, exen => exen );

U7325: fitagl
  port map ( wenf => wenf, addrin => ad(325), addrot => ad(326),
        rstfifoaddr => rstfifoaddr, wl => fwl(325), venb
        => venb, exen => exen );

U7324: fitagl
  port map ( wenf => wenf, addrin => ad(324), addrot => ad(325),
        rstfifoaddr => rstfifoaddr, wl => fwl(324), venb
        => venb, exen => exen );

U7323: fitagl
  port map ( wenf => wenf, addrin => ad(323), addrot => ad(324),
        rstfifoaddr => rstfifoaddr, wl => fwl(323), venb
        => venb, exen => exen );

U7322: fitagl
  port map ( wenf => wenf, addrin => ad(322), addrot => ad(323),
        rstfifoaddr => rstfifoaddr, wl => fwl(322), venb
        => venb, exen => exen );

U7321: fitagl
  port map ( wenf => wenf, addrin => ad(321), addrot => ad(322),
        rstfifoaddr => rstfifoaddr, wl => fwl(321), venb
        => venb, exen => exen );

U7320: fitagl
  port map ( wenf => wenf, addrin => ad(320), addrot => ad(321),
        rstfifoaddr => rstfifoaddr, wl => fwl(320), venb
        => venb, exen => exen );

U7319: fitagl
  port map ( wenf => wenf, addrin => ad(319), addrot => ad(320),
        rstfifoaddr => rstfifoaddr, wl => fwl(319), venb
        => venb, exen => exen );

U7318: fitagl
  port map ( wenf => wenf, addrin => ad(318), addrot => ad(319),
        rstfifoaddr => rstfifoaddr, wl => fwl(318), venb
        => venb, exen => exen );

U7317: fitagl
  port map ( wenf => wenf, addrin => ad(317), addrot => ad(318),
        rstfifoaddr => rstfifoaddr, wl => fwl(317), venb
        => venb, exen => exen );
```

```
U7316: fitag1
  port map ( wenf => wenf, addrin => ad(316), addrot => ad(317),
        rstfifoaddr => rstfifoaddr, wl => fwl(316), venb
        => venb, exen => exen );

U7315: fitag1
  port map ( wenf => wenf, addrin => ad(315), addrot => ad(316),
        rstfifoaddr => rstfifoaddr, wl => fwl(315), venb
        => venb, exen => exen );

U7314: fitag1
  port map ( wenf => wenf, addrin => ad(314), addrot => ad(315),
        rstfifoaddr => rstfifoaddr, wl => fwl(314), venb
        => venb, exen => exen );

U7313: fitag1
  port map ( wenf => wenf, addrin => ad(313), addrot => ad(314),
        rstfifoaddr => rstfifoaddr, wl => fwl(313), venb
        => venb, exen => exen );

U7312: fitag1
  port map ( wenf => wenf, addrin => ad(312), addrot => ad(313),
        rstfifoaddr => rstfifoaddr, wl => fwl(312), venb
        => venb, exen => exen );

U7311: fitag1
  port map ( wenf => wenf, addrin => ad(311), addrot => ad(312),
        rstfifoaddr => rstfifoaddr, wl => fwl(311), venb
        => venb, exen => exen );

U7310: fitag1
  port map ( wenf => wenf, addrin => ad(310), addrot => ad(311),
        rstfifoaddr => rstfifoaddr, wl => fwl(310), venb
        => venb, exen => exen );

U7309: fitag1
  port map ( wenf => wenf, addrin => ad(309), addrot => ad(310),
        rstfifoaddr => rstfifoaddr, wl => fwl(309), venb
        => venb, exen => exen );

U7308: fitag1
  port map ( wenf => wenf, addrin => ad(308), addrot => ad(309),
        rstfifoaddr => rstfifoaddr, wl => fwl(308), venb
        => venb, exen => exen );

U7307: fitag1
  port map ( wenf => wenf, addrin => ad(307), addrot => ad(308),
        rstfifoaddr => rstfifoaddr, wl => fwl(307), venb
        => venb, exen => exen );

U7306: fitag1
  port map ( wenf => wenf, addrin => ad(306), addrot => ad(307),
        rstfifoaddr => rstfifoaddr, wl => fwl(306), venb
        => venb, exen => exen );

U7305: fitag1
  port map ( wenf => wenf, addrin => ad(305), addrot => ad(306),
```

```
          rstfifoaddr => rstfifoaddr, wl => fwl(305), venb
          => venb, exen => exen );

U7304: fitag1
   port map ( wenf => wenf, addrin => ad(304), addrot => ad(305),
          rstfifoaddr => rstfifoaddr, wl => fwl(304), venb
          => venb, exen => exen );

U7303: fitag1
   port map ( wenf => wenf, addrin => ad(303), addrot => ad(304),
          rstfifoaddr => rstfifoaddr, wl => fwl(303), venb
          => venb, exen => exen );

U7302: fitag1
   port map ( wenf => wenf, addrin => ad(302), addrot => ad(303),
          rstfifoaddr => rstfifoaddr, wl => fwl(302), venb
          => venb, exen => exen );

U7301: fitag1
   port map ( wenf => wenf, addrin => ad(301), addrot => ad(302),
          rstfifoaddr => rstfifoaddr, wl => fwl(301), venb
          => venb, exen => exen );

U7300: fitag1
   port map ( wenf => wenf, addrin => ad(300), addrot => ad(301),
          rstfifoaddr => rstfifoaddr, wl => fwl(300), venb
          => venb, exen => exen );

U7299: fitag1
   port map ( wenf => wenf, addrin => ad(299), addrot => ad(300),
          rstfifoaddr => rstfifoaddr, wl => fwl(299), venb
          => venb, exen => exen );

U7298: fitag1
   port map ( wenf => wenf, addrin => ad(298), addrot => ad(299),
          rstfifoaddr => rstfifoaddr, wl => fwl(298), venb
          => venb, exen => exen );

U7297: fitag1
   port map ( wenf => wenf, addrin => ad(297), addrot => ad(298),
          rstfifoaddr => rstfifoaddr, wl => fwl(297), venb
          => venb, exen => exen );

U7296: fitag1
   port map ( wenf => wenf, addrin => ad(296), addrot => ad(297),
          rstfifoaddr => rstfifoaddr, wl => fwl(296), venb
          => venb, exen => exen );

U7295: fitag1
   port map ( wenf => wenf, addrin => ad(295), addrot => ad(296),
          rstfifoaddr => rstfifoaddr, wl => fwl(295), venb
          => venb, exen => exen );

U7294: fitag1
   port map ( wenf => wenf, addrin => ad(294), addrot => ad(295),
          rstfifoaddr => rstfifoaddr, wl => fwl(294), venb
          => venb, exen => exen );
```

```
U7293: fitag1
  port map ( wenf => wenf, addrin => ad(293), addrot => ad(294),
        rstfifoaddr => rstfifoaddr, wl => fwl(293), venb
        => venb, exen => exen );

U7292: fitag1
  port map ( wenf => wenf, addrin => ad(292), addrot => ad(293),
        rstfifoaddr => rstfifoaddr, wl => fwl(292), venb
        => venb, exen => exen );

U7291: fitag1
  port map ( wenf => wenf, addrin => ad(291), addrot => ad(292),
        rstfifoaddr => rstfifoaddr, wl => fwl(291), venb
        => venb, exen => exen );

U7290: fitag1
  port map ( wenf => wenf, addrin => ad(290), addrot => ad(291),
        rstfifoaddr => rstfifoaddr, wl => fwl(290), venb
        => venb, exen => exen );

U7289: fitag1
  port map ( wenf => wenf, addrin => ad(289), addrot => ad(290),
        rstfifoaddr => rstfifoaddr, wl => fwl(289), venb
        => venb, exen => exen );

U7288: fitag1
  port map ( wenf => wenf, addrin => ad(288), addrot => ad(289),
        rstfifoaddr => rstfifoaddr, wl => fwl(288), venb
        => venb, exen => exen );

U7287: fitag1
  port map ( wenf => wenf, addrin => ad(287), addrot => ad(288),
        rstfifoaddr => rstfifoaddr, wl => fwl(287), venb
        => venb, exen => exen );

U7286: fitag1
  port map ( wenf => wenf, addrin => ad(286), addrot => ad(287),
        rstfifoaddr => rstfifoaddr, wl => fwl(286), venb
        => venb, exen => exen );

U7285: fitag1
  port map ( wenf => wenf, addrin => ad(285), addrot => ad(286),
        rstfifoaddr => rstfifoaddr, wl => fwl(285), venb
        => venb, exen => exen );

U7284: fitag1
  port map ( wenf => wenf, addrin => ad(284), addrot => ad(285),
        rstfifoaddr => rstfifoaddr, wl => fwl(284), venb
        => venb, exen => exen );

U7283: fitag1
  port map ( wenf => wenf, addrin => ad(283), addrot => ad(284),
        rstfifoaddr => rstfifoaddr, wl => fwl(283), venb
        => venb, exen => exen );

U7282: fitag1
  port map ( wenf => wenf, addrin => ad(282), addrot => ad(283),
        rstfifoaddr => rstfifoaddr, wl => fwl(282), venb
```

```
        => venb, exen => exen );

U7281: fitag1
   port map ( wenf => wenf, addrin => ad(281), addrot => ad(282),
        rstfifoaddr => rstfifoaddr, wl => fwl(281), venb
        => venb, exen => exen );

U7280: fitag1
   port map ( wenf => wenf, addrin => ad(280), addrot => ad(281),
        rstfifoaddr => rstfifoaddr, wl => fwl(280), venb
        => venb, exen => exen );

U7279: fitag1
   port map ( wenf => wenf, addrin => ad(279), addrot => ad(280),
        rstfifoaddr => rstfifoaddr, wl => fwl(279), venb
        => venb, exen => exen );

U7278: fitag1
   port map ( wenf => wenf, addrin => ad(278), addrot => ad(279),
        rstfifoaddr => rstfifoaddr, wl => fwl(278), venb
        => venb, exen => exen );

U7277: fitag1
   port map ( wenf => wenf, addrin => ad(277), addrot => ad(278),
        rstfifoaddr => rstfifoaddr, wl => fwl(277), venb
        => venb, exen => exen );

U7276: fitag1
   port map ( wenf => wenf, addrin => ad(276), addrot => ad(277),
        rstfifoaddr => rstfifoaddr, wl => fwl(276), venb
        => venb, exen => exen );

U7275: fitag1
   port map ( wenf => wenf, addrin => ad(275), addrot => ad(276),
        rstfifoaddr => rstfifoaddr, wl => fwl(275), venb
        => venb, exen => exen );

U7274: fitag1
   port map ( wenf => wenf, addrin => ad(274), addrot => ad(275),
        rstfifoaddr => rstfifoaddr, wl => fwl(274), venb
        => venb, exen => exen );

U7273: fitag1
   port map ( wenf => wenf, addrin => ad(273), addrot => ad(274),
        rstfifoaddr => rstfifoaddr, wl => fwl(273), venb
        => venb, exen => exen );

U7272: fitag1
   port map ( wenf => wenf, addrin => ad(272), addrot => ad(273),
        rstfifoaddr => rstfifoaddr, wl => fwl(272), venb
        => venb, exen => exen );

U7271: fitag1
   port map ( wenf => wenf, addrin => ad(271), addrot => ad(272),
        rstfifoaddr => rstfifoaddr, wl => fwl(271), venb
        => venb, exen => exen );

U7270: fitag1
```

```
    port map ( wenf => wenf, addrin => ad(270), addrot => ad(271),
            rstfifoaddr => rstfifoaddr, wl => fwl(270), venb
            => venb, exen => exen );

U7269: fitag1
    port map ( wenf => wenf, addrin => ad(269), addrot => ad(270),
            rstfifoaddr => rstfifoaddr, wl => fwl(269), venb
            => venb, exen => exen );

U7268: fitag1
    port map ( wenf => wenf, addrin => ad(268), addrot => ad(269),
            rstfifoaddr => rstfifoaddr, wl => fwl(268), venb
            => venb, exen => exen );

U7267: fitag1
    port map ( wenf => wenf, addrin => ad(267), addrot => ad(268),
            rstfifoaddr => rstfifoaddr, wl => fwl(267), venb
            => venb, exen => exen );

U7266: fitag1
    port map ( wenf => wenf, addrin => ad(266), addrot => ad(267),
            rstfifoaddr => rstfifoaddr, wl => fwl(266), venb
            => venb, exen => exen );

U7265: fitag1
    port map ( wenf => wenf, addrin => ad(265), addrot => ad(266),
            rstfifoaddr => rstfifoaddr, wl => fwl(265), venb
            => venb, exen => exen );

U7264: fitag1
    port map ( wenf => wenf, addrin => ad(264), addrot => ad(265),
            rstfifoaddr => rstfifoaddr, wl => fwl(264), venb
            => venb, exen => exen );

U7263: fitag1
    port map ( wenf => wenf, addrin => ad(263), addrot => ad(264),
            rstfifoaddr => rstfifoaddr, wl => fwl(263), venb
            => venb, exen => exen );

U7262: fitag1
    port map ( wenf => wenf, addrin => ad(262), addrot => ad(263),
            rstfifoaddr => rstfifoaddr, wl => fwl(262), venb
            => venb, exen => exen );

U7261: fitag1
    port map ( wenf => wenf, addrin => ad(261), addrot => ad(262),
            rstfifoaddr => rstfifoaddr, wl => fwl(261), venb
            => venb, exen => exen );

U7260: fitag1
    port map ( wenf => wenf, addrin => ad(260), addrot => ad(261),
            rstfifoaddr => rstfifoaddr, wl => fwl(260), venb
            => venb, exen => exen );

U7259: fitag1
    port map ( wenf => wenf, addrin => ad(259), addrot => ad(260),
            rstfifoaddr => rstfifoaddr, wl => fwl(259), venb
            => venb, exen => exen );
```

```
U7258: fitagl
   port map ( wenf => wenf, addrin => ad(258), addrot => ad(259),
         rstfifoaddr => rstfifoaddr, wl => fwl(258), venb
         => venb, exen => exen );

U7257: fitagl
   port map ( wenf => wenf, addrin => ad(257), addrot => ad(258),
         rstfifoaddr => rstfifoaddr, wl => fwl(257), venb
         => venb, exen => exen );

U7256: fitagl
   port map ( wenf => wenf, addrin => ad(256), addrot => ad(257),
         rstfifoaddr => rstfifoaddr, wl => fwl(256), venb
         => venb, exen => exen );

U7255: fitagl
   port map ( wenf => wenf, addrin => ad(255), addrot => ad(256),
         rstfifoaddr => rstfifoaddr, wl => fwl(255), venb
         => venb, exen => exen );

U7254: fitagl
   port map ( wenf => wenf, addrin => ad(254), addrot => ad(255),
         rstfifoaddr => rstfifoaddr, wl => fwl(254), venb
         => venb, exen => exen );

U7253: fitagl
   port map ( wenf => wenf, addrin => ad(253), addrot => ad(254),
         rstfifoaddr => rstfifoaddr, wl => fwl(253), venb
         => venb, exen => exen );

U7252: fitagl
   port map ( wenf => wenf, addrin => ad(252), addrot => ad(253),
         rstfifoaddr => rstfifoaddr, wl => fwl(252), venb
         => venb, exen => exen );

U7251: fitagl
   port map ( wenf => wenf, addrin => ad(251), addrot => ad(252),
         rstfifoaddr => rstfifoaddr, wl => fwl(251), venb
         => venb, exen => exen );

U7250: fitagl
   port map ( wenf => wenf, addrin => ad(250), addrot => ad(251),
         rstfifoaddr => rstfifoaddr, wl => fwl(250), venb
         => venb, exen => exen );

U7249: fitagl
   port map ( wenf => wenf, addrin => ad(249), addrot => ad(250),
         rstfifoaddr => rstfifoaddr, wl => fwl(249), venb
         => venb, exen => exen );

U7248: fitagl
   port map ( wenf => wenf, addrin => ad(248), addrot => ad(249),
         rstfifoaddr => rstfifoaddr, wl => fwl(248), venb
         => venb, exen => exen );

U7247: fitagl
   port map ( wenf => wenf, addrin => ad(247), addrot => ad(248),
```

```
        rstfifoaddr => rstfifoaddr, wl => fwl(247), venb
        => venb, exen => exen );

U7246: fitag1
   port map ( wenf => wenf, addrin => ad(246), addrot => ad(247),
        rstfifoaddr => rstfifoaddr, wl => fwl(246), venb
        => venb, exen => exen );

U7245: fitag1
   port map ( wenf => wenf, addrin => ad(245), addrot => ad(246),
        rstfifoaddr => rstfifoaddr, wl => fwl(245), venb
        => venb, exen => exen );

U7244: fitag1
   port map ( wenf => wenf, addrin => ad(244), addrot => ad(245),
        rstfifoaddr => rstfifoaddr, wl => fwl(244), venb
        => venb, exen => exen );

U7243: fitag1
   port map ( wenf => wenf, addrin => ad(243), addrot => ad(244),
        rstfifoaddr => rstfifoaddr, wl => fwl(243), venb
        => venb, exen => exen );

U7242: fitag1
   port map ( wenf => wenf, addrin => ad(242), addrot => ad(243),
        rstfifoaddr => rstfifoaddr, wl => fwl(242), venb
        => venb, exen => exen );

U7241: fitag1
   port map ( wenf => wenf, addrin => ad(241), addrot => ad(242),
        rstfifoaddr => rstfifoaddr, wl => fwl(241), venb
        => venb, exen => exen );

U7240: fitag1
   port map ( wenf => wenf, addrin => ad(240), addrot => ad(241),
        rstfifoaddr => rstfifoaddr, wl => fwl(240), venb
        => venb, exen => exen );

U7239: fitag1
   port map ( wenf => wenf, addrin => ad(239), addrot => ad(240),
        rstfifoaddr => rstfifoaddr, wl => fwl(239), venb
        => venb, exen => exen );

U7238: fitag1
   port map ( wenf => wenf, addrin => ad(238), addrot => ad(239),
        rstfifoaddr => rstfifoaddr, wl => fwl(238), venb
        => venb, exen => exen );

U7237: fitag1
   port map ( wenf => wenf, addrin => ad(237), addrot => ad(238),
        rstfifoaddr => rstfifoaddr, wl => fwl(237), venb
        => venb, exen => exen );

U7236: fitag1
   port map ( wenf => wenf, addrin => ad(236), addrot => ad(237),
        rstfifoaddr => rstfifoaddr, wl => fwl(236), venb
        => venb, exen => exen );
```

```
U7235: fitag1
   port map ( wenf => wenf, addrin => ad(235), addrot => ad(236),
         rstfifoaddr => rstfifoaddr, wl => fwl(235), venb
         => venb, exen => exen );

U7234: fitag1
   port map ( wenf => wenf, addrin => ad(234), addrot => ad(235),
         rstfifoaddr => rstfifoaddr, wl => fwl(234), venb
         => venb, exen => exen );

U7233: fitag1
   port map ( wenf => wenf, addrin => ad(233), addrot => ad(234),
         rstfifoaddr => rstfifoaddr, wl => fwl(233), venb
         => venb, exen => exen );

U7232: fitag1
   port map ( wenf => wenf, addrin => ad(232), addrot => ad(233),
         rstfifoaddr => rstfifoaddr, wl => fwl(232), venb
         => venb, exen => exen );

U7231: fitag1
   port map ( wenf => wenf, addrin => ad(231), addrot => ad(232),
         rstfifoaddr => rstfifoaddr, wl => fwl(231), venb
         => venb, exen => exen );

U7230: fitag1
   port map ( wenf => wenf, addrin => ad(230), addrot => ad(231),
         rstfifoaddr => rstfifoaddr, wl => fwl(230), venb
         => venb, exen => exen );

U7229: fitag1
   port map ( wenf => wenf, addrin => ad(229), addrot => ad(230),
         rstfifoaddr => rstfifoaddr, wl => fwl(229), venb
         => venb, exen => exen );

U7228: fitag1
   port map ( wenf => wenf, addrin => ad(228), addrot => ad(229),
         rstfifoaddr => rstfifoaddr, wl => fwl(228), venb
         => venb, exen => exen );

U7227: fitag1
   port map ( wenf => wenf, addrin => ad(227), addrot => ad(228),
         rstfifoaddr => rstfifoaddr, wl => fwl(227), venb
         => venb, exen => exen );

U7226: fitag1
   port map ( wenf => wenf, addrin => ad(226), addrot => ad(227),
         rstfifoaddr => rstfifoaddr, wl => fwl(226), venb
         => venb, exen => exen );

U7225: fitag1
   port map ( wenf => wenf, addrin => ad(225), addrot => ad(226),
         rstfifoaddr => rstfifoaddr, wl => fwl(225), venb
         => venb, exen => exen );

U7224: fitag1
   port map ( wenf => wenf, addrin => ad(224), addrot => ad(225),
         rstfifoaddr => rstfifoaddr, wl => fwl(224), venb
```

```
        => venb, exen => exen );

U7223: fitagl
   port map ( wenf => wenf, addrin => ad(223), addrot => ad(224),
        rstfifoaddr => rstfifoaddr, wl => fwl(223), venb
        => venb, exen => exen );

U7222: fitagl
   port map ( wenf => wenf, addrin => ad(222), addrot => ad(223),
        rstfifoaddr => rstfifoaddr, wl => fwl(222), venb
        => venb, exen => exen );

U7221: fitagl
   port map ( wenf => wenf, addrin => ad(221), addrot => ad(222),
        rstfifoaddr => rstfifoaddr, wl => fwl(221), venb
        => venb, exen => exen );

U7220: fitagl
   port map ( wenf => wenf, addrin => ad(220), addrot => ad(221),
        rstfifoaddr => rstfifoaddr, wl => fwl(220), venb
        => venb, exen => exen );

U7219: fitagl
   port map ( wenf => wenf, addrin => ad(219), addrot => ad(220),
        rstfifoaddr => rstfifoaddr, wl => fwl(219), venb
        => venb, exen => exen );

U7218: fitagl
   port map ( wenf => wenf, addrin => ad(218), addrot => ad(219),
        rstfifoaddr => rstfifoaddr, wl => fwl(218), venb
        => venb, exen => exen );

U7217: fitagl
   port map ( wenf => wenf, addrin => ad(217), addrot => ad(218),
        rstfifoaddr => rstfifoaddr, wl => fwl(217), venb
        => venb, exen => exen );

U7216: fitagl
   port map ( wenf => wenf, addrin => ad(216), addrot => ad(217),
        rstfifoaddr => rstfifoaddr, wl => fwl(216), venb
        => venb, exen => exen );

U7215: fitagl
   port map ( wenf => wenf, addrin => ad(215), addrot => ad(216),
        rstfifoaddr => rstfifoaddr, wl => fwl(215), venb
        => venb, exen => exen );

U7214: fitagl
   port map ( wenf => wenf, addrin => ad(214), addrot => ad(215),
        rstfifoaddr => rstfifoaddr, wl => fwl(214), venb
        => venb, exen => exen );

U7213: fitagl
   port map ( wenf => wenf, addrin => ad(213), addrot => ad(214),
        rstfifoaddr => rstfifoaddr, wl => fwl(213), venb
        => venb, exen => exen );

U7212: fitagl
```

```
   port map ( wenf => wenf, addrin => ad(212), addrot => ad(213),
          rstfifoaddr => rstfifoaddr, wl => fwl(212), venb
          => venb, exen => exen );

U7211: fitag1
   port map ( wenf => wenf, addrin => ad(211), addrot => ad(212),
          rstfifoaddr => rstfifoaddr, wl => fwl(211), venb
          => venb, exen => exen );

U7210: fitag1
   port map ( wenf => wenf, addrin => ad(210), addrot => ad(211),
          rstfifoaddr => rstfifoaddr, wl => fwl(210), venb
          => venb, exen => exen );

U7209: fitag1
   port map ( wenf => wenf, addrin => ad(209), addrot => ad(210),
          rstfifoaddr => rstfifoaddr, wl => fwl(209), venb
          => venb, exen => exen );

U7208: fitag1
   port map ( wenf => wenf, addrin => ad(208), addrot => ad(209),
          rstfifoaddr => rstfifoaddr, wl => fwl(208), venb
          => venb, exen => exen );

U7207: fitag1
   port map ( wenf => wenf, addrin => ad(207), addrot => ad(208),
          rstfifoaddr => rstfifoaddr, wl => fwl(207), venb
          => venb, exen => exen );

U7206: fitag1
   port map ( wenf => wenf, addrin => ad(206), addrot => ad(207),
          rstfifoaddr => rstfifoaddr, wl => fwl(206), venb
          => venb, exen => exen );

U7205: fitag1
   port map ( wenf => wenf, addrin => ad(205), addrot => ad(206),
          rstfifoaddr => rstfifoaddr, wl => fwl(205), venb
          => venb, exen => exen );

U7204: fitag1
   port map ( wenf => wenf, addrin => ad(204), addrot => ad(205),
          rstfifoaddr => rstfifoaddr, wl => fwl(204), venb
          => venb, exen => exen );

U7203: fitag1
   port map ( wenf => wenf, addrin => ad(203), addrot => ad(204),
          rstfifoaddr => rstfifoaddr, wl => fwl(203), venb
          => venb, exen => exen );

U7202: fitag1
   port map ( wenf => wenf, addrin => ad(202), addrot => ad(203),
          rstfifoaddr => rstfifoaddr, wl => fwl(202), venb
          => venb, exen => exen );

U7201: fitag1
   port map ( wenf => wenf, addrin => ad(201), addrot => ad(202),
          rstfifoaddr => rstfifoaddr, wl => fwl(201), venb
          => venb, exen => exen );
```

```
U7200: fitag1
   port map ( wenf => wenf, addrin => ad(200), addrot => ad(201),
         rstfifoaddr => rstfifoaddr, wl => fwl(200), venb
         => venb, exen => exen );

U7199: fitag1
   port map ( wenf => wenf, addrin => ad(199), addrot => ad(200),
         rstfifoaddr => rstfifoaddr, wl => fwl(199), venb
         => venb, exen => exen );

U7198: fitag1
   port map ( wenf => wenf, addrin => ad(198), addrot => ad(199),
         rstfifoaddr => rstfifoaddr, wl => fwl(198), venb
         => venb, exen => exen );

U7197: fitag1
   port map ( wenf => wenf, addrin => ad(197), addrot => ad(198),
         rstfifoaddr => rstfifoaddr, wl => fwl(197), venb
         => venb, exen => exen );

U7196: fitag1
   port map ( wenf => wenf, addrin => ad(196), addrot => ad(197),
         rstfifoaddr => rstfifoaddr, wl => fwl(196), venb
         => venb, exen => exen );

U7195: fitag1
   port map ( wenf => wenf, addrin => ad(195), addrot => ad(196),
         rstfifoaddr => rstfifoaddr, wl => fwl(195), venb
         => venb, exen => exen );

U7194: fitag1
   port map ( wenf => wenf, addrin => ad(194), addrot => ad(195),
         rstfifoaddr => rstfifoaddr, wl => fwl(194), venb
         => venb, exen => exen );

U7193: fitag1
   port map ( wenf => wenf, addrin => ad(193), addrot => ad(194),
         rstfifoaddr => rstfifoaddr, wl => fwl(193), venb
         => venb, exen => exen );

U7192: fitag1
   port map ( wenf => wenf, addrin => ad(192), addrot => ad(193),
         rstfifoaddr => rstfifoaddr, wl => fwl(192), venb
         => venb, exen => exen );

U7191: fitag1
   port map ( wenf => wenf, addrin => ad(191), addrot => ad(192),
         rstfifoaddr => rstfifoaddr, wl => fwl(191), venb
         => venb, exen => exen );

U7190: fitag1
   port map ( wenf => wenf, addrin => ad(190), addrot => ad(191),
         rstfifoaddr => rstfifoaddr, wl => fwl(190), venb
         => venb, exen => exen );

U7189: fitag1
   port map ( wenf => wenf, addrin => ad(189), addrot => ad(190),
```

```
        rstfifoaddr => rstfifoaddr, wl => fwl(189), venb
        => venb, exen => exen );

U7188: fitag1
   port map ( wenf => wenf, addrin => ad(188), addrot => ad(189),
        rstfifoaddr => rstfifoaddr, wl => fwl(188), venb
        => venb, exen => exen );

U7187: fitag1
   port map ( wenf => wenf, addrin => ad(187), addrot => ad(188),
        rstfifoaddr => rstfifoaddr, wl => fwl(187), venb
        => venb, exen => exen );

U7186: fitag1
   port map ( wenf => wenf, addrin => ad(186), addrot => ad(187),
        rstfifoaddr => rstfifoaddr, wl => fwl(186), venb
        => venb, exen => exen );

U7185: fitag1
   port map ( wenf => wenf, addrin => ad(185), addrot => ad(186),
        rstfifoaddr => rstfifoaddr, wl => fwl(185), venb
        => venb, exen => exen );

U7184: fitag1
   port map ( wenf => wenf, addrin => ad(184), addrot => ad(185),
        rstfifoaddr => rstfifoaddr, wl => fwl(184), venb
        => venb, exen => exen );

U7183: fitag1
   port map ( wenf => wenf, addrin => ad(183), addrot => ad(184),
        rstfifoaddr => rstfifoaddr, wl => fwl(183), venb
        => venb, exen => exen );

U7182: fitag1
   port map ( wenf => wenf, addrin => ad(182), addrot => ad(183),
        rstfifoaddr => rstfifoaddr, wl => fwl(182), venb
        => venb, exen => exen );

U7181: fitag1
   port map ( wenf => wenf, addrin => ad(181), addrot => ad(182),
        rstfifoaddr => rstfifoaddr, wl => fwl(181), venb
        => venb, exen => exen );

U7180: fitag1
   port map ( wenf => wenf, addrin => ad(180), addrot => ad(181),
        rstfifoaddr => rstfifoaddr, wl => fwl(180), venb
        => venb, exen => exen );

U7179: fitag1
   port map ( wenf => wenf, addrin => ad(179), addrot => ad(180),
        rstfifoaddr => rstfifoaddr, wl => fwl(179), venb
        => venb, exen => exen );

U7178: fitag1
   port map ( wenf => wenf, addrin => ad(178), addrot => ad(179),
        rstfifoaddr => rstfifoaddr, wl => fwl(178), venb
        => venb, exen => exen );
```

```
U7177: fitagl
   port map ( wenf => wenf, addrin => ad(177), addrot => ad(178),
         rstfifoaddr => rstfifoaddr, wl => fwl(177), venb
         => venb, exen => exen );

U7176: fitagl
   port map ( wenf => wenf, addrin => ad(176), addrot => ad(177),
         rstfifoaddr => rstfifoaddr, wl => fwl(176), venb
         => venb, exen => exen );

U7175: fitagl
   port map ( wenf => wenf, addrin => ad(175), addrot => ad(176),
         rstfifoaddr => rstfifoaddr, wl => fwl(175), venb
         => venb, exen => exen );

U7174: fitagl
   port map ( wenf => wenf, addrin => ad(174), addrot => ad(175),
         rstfifoaddr => rstfifoaddr, wl => fwl(174), venb
         => venb, exen => exen );

U7173: fitagl
   port map ( wenf => wenf, addrin => ad(173), addrot => ad(174),
         rstfifoaddr => rstfifoaddr, wl => fwl(173), venb
         => venb, exen => exen );

U7172: fitagl
   port map ( wenf => wenf, addrin => ad(172), addrot => ad(173),
         rstfifoaddr => rstfifoaddr, wl => fwl(172), venb
         => venb, exen => exen );

U7171: fitagl
   port map ( wenf => wenf, addrin => ad(171), addrot => ad(172),
         rstfifoaddr => rstfifoaddr, wl => fwl(171), venb
         => venb, exen => exen );

U7170: fitagl
   port map ( wenf => wenf, addrin => ad(170), addrot => ad(171),
         rstfifoaddr => rstfifoaddr, wl => fwl(170), venb
         => venb, exen => exen );

U7169: fitagl
   port map ( wenf => wenf, addrin => ad(169), addrot => ad(170),
         rstfifoaddr => rstfifoaddr, wl => fwl(169), venb
         => venb, exen => exen );

U7168: fitagl
   port map ( wenf => wenf, addrin => ad(168), addrot => ad(169),
         rstfifoaddr => rstfifoaddr, wl => fwl(168), venb
         => venb, exen => exen );

U7167: fitagl
   port map ( wenf => wenf, addrin => ad(167), addrot => ad(168),
         rstfifoaddr => rstfifoaddr, wl => fwl(167), venb
         => venb, exen => exen );

U7166: fitagl
   port map ( wenf => wenf, addrin => ad(166), addrot => ad(167),
         rstfifoaddr => rstfifoaddr, wl => fwl(166), venb
```

```
        => venb, exen => exen );

U7165: fitag1
   port map ( wenf => wenf, addrin => ad(165), addrot => ad(166),
        rstfifoaddr => rstfifoaddr, wl => fwl(165), venb
        => venb, exen => exen );

U7164: fitag1
   port map ( wenf => wenf, addrin => ad(164), addrot => ad(165),
        rstfifoaddr => rstfifoaddr, wl => fwl(164), venb
        => venb, exen => exen );

U7163: fitag1
   port map ( wenf => wenf, addrin => ad(163), addrot => ad(164),
        rstfifoaddr => rstfifoaddr, wl => fwl(163), venb
        => venb, exen => exen );

U7162: fitag1
   port map ( wenf => wenf, addrin => ad(162), addrot => ad(163),
        rstfifoaddr => rstfifoaddr, wl => fwl(162), venb
        => venb, exen => exen );

U7161: fitag1
   port map ( wenf => wenf, addrin => ad(161), addrot => ad(162),
        rstfifoaddr => rstfifoaddr, wl => fwl(161), venb
        => venb, exen => exen );

U7160: fitag1
   port map ( wenf => wenf, addrin => ad(160), addrot => ad(161),
        rstfifoaddr => rstfifoaddr, wl => fwl(160), venb
        => venb, exen => exen );

U7159: fitag1
   port map ( wenf => wenf, addrin => ad(159), addrot => ad(160),
        rstfifoaddr => rstfifoaddr, wl => fwl(159), venb
        => venb, exen => exen );

U7158: fitag1
   port map ( wenf => wenf, addrin => ad(158), addrot => ad(159),
        rstfifoaddr => rstfifoaddr, wl => fwl(158), venb
        => venb, exen => exen );

U7157: fitag1
   port map ( wenf => wenf, addrin => ad(157), addrot => ad(158),
        rstfifoaddr => rstfifoaddr, wl => fwl(157), venb
        => venb, exen => exen );

U7156: fitag1
   port map ( wenf => wenf, addrin => ad(156), addrot => ad(157),
        rstfifoaddr => rstfifoaddr, wl => fwl(156), venb
        => venb, exen => exen );

U7155: fitag1
   port map ( wenf => wenf, addrin => ad(155), addrot => ad(156),
        rstfifoaddr => rstfifoaddr, wl => fwl(155), venb
        => venb, exen => exen );

U7154: fitag1
```

```
   port map ( wenf => wenf, addrin => ad(154), addrot => ad(155),
          rstfifoaddr => rstfifoaddr, wl => fwl(154), venb
          => venb, exen => exen );

U7153: fitagl
   port map ( wenf => wenf, addrin => ad(153), addrot => ad(154),
          rstfifoaddr => rstfifoaddr, wl => fwl(153), venb
          => venb, exen => exen );

U7152: fitagl
   port map ( wenf => wenf, addrin => ad(152), addrot => ad(153),
          rstfifoaddr => rstfifoaddr, wl => fwl(152), venb
          => venb, exen => exen );

U7151: fitagl
   port map ( wenf => wenf, addrin => ad(151), addrot => ad(152),
          rstfifoaddr => rstfifoaddr, wl => fwl(151), venb
          => venb, exen => exen );

U7150: fitagl
   port map ( wenf => wenf, addrin => ad(150), addrot => ad(151),
          rstfifoaddr => rstfifoaddr, wl => fwl(150), venb
          => venb, exen => exen );

U7149: fitagl
   port map ( wenf => wenf, addrin => ad(149), addrot => ad(150),
          rstfifoaddr => rstfifoaddr, wl => fwl(149), venb
          => venb, exen => exen );

U7148: fitagl
   port map ( wenf => wenf, addrin => ad(148), addrot => ad(149),
          rstfifoaddr => rstfifoaddr, wl => fwl(148), venb
          => venb, exen => exen );

U7147: fitagl
   port map ( wenf => wenf, addrin => ad(147), addrot => ad(148),
          rstfifoaddr => rstfifoaddr, wl => fwl(147), venb
          => venb, exen => exen );

U7146: fitagl
   port map ( wenf => wenf, addrin => ad(146), addrot => ad(147),
          rstfifoaddr => rstfifoaddr, wl => fwl(146), venb
          => venb, exen => exen );

U7145: fitagl
   port map ( wenf => wenf, addrin => ad(145), addrot => ad(146),
          rstfifoaddr => rstfifoaddr, wl => fwl(145), venb
          => venb, exen => exen );

U7144: fitagl
   port map ( wenf => wenf, addrin => ad(144), addrot => ad(145),
          rstfifoaddr => rstfifoaddr, wl => fwl(144), venb
          => venb, exen => exen );

U7143: fitagl
   port map ( wenf => wenf, addrin => ad(143), addrot => ad(144),
          rstfifoaddr => rstfifoaddr, wl => fwl(143), venb
          => venb, exen => exen );
```

```
U7142: fitag1
  port map ( wenf => wenf, addrin => ad(142), addrot => ad(143),
         rstfifoaddr => rstfifoaddr, wl => fwl(142), venb
         => venb, exen => exen );

U7141: fitag1
  port map ( wenf => wenf, addrin => ad(141), addrot => ad(142),
         rstfifoaddr => rstfifoaddr, wl => fwl(141), venb
         => venb, exen => exen );

U7140: fitag1
  port map ( wenf => wenf, addrin => ad(140), addrot => ad(141),
         rstfifoaddr => rstfifoaddr, wl => fwl(140), venb
         => venb, exen => exen );

U7139: fitag1
  port map ( wenf => wenf, addrin => ad(139), addrot => ad(140),
         rstfifoaddr => rstfifoaddr, wl => fwl(139), venb
         => venb, exen => exen );

U7138: fitag1
  port map ( wenf => wenf, addrin => ad(138), addrot => ad(139),
         rstfifoaddr => rstfifoaddr, wl => fwl(138), venb
         => venb, exen => exen );

U7137: fitag1
  port map ( wenf => wenf, addrin => ad(137), addrot => ad(138),
         rstfifoaddr => rstfifoaddr, wl => fwl(137), venb
         => venb, exen => exen );

U7136: fitag1
  port map ( wenf => wenf, addrin => ad(136), addrot => ad(137),
         rstfifoaddr => rstfifoaddr, wl => fwl(136), venb
         => venb, exen => exen );

U7135: fitag1
  port map ( wenf => wenf, addrin => ad(135), addrot => ad(136),
         rstfifoaddr => rstfifoaddr, wl => fwl(135), venb
         => venb, exen => exen );

U7134: fitag1
  port map ( wenf => wenf, addrin => ad(134), addrot => ad(135),
         rstfifoaddr => rstfifoaddr, wl => fwl(134), venb
         => venb, exen => exen );

U7133: fitag1
  port map ( wenf => wenf, addrin => ad(133), addrot => ad(134),
         rstfifoaddr => rstfifoaddr, wl => fwl(133), venb
         => venb, exen => exen );

U7132: fitag1
  port map ( wenf => wenf, addrin => ad(132), addrot => ad(133),
         rstfifoaddr => rstfifoaddr, wl => fwl(132), venb
         => venb, exen => exen );

U7131: fitag1
  port map ( wenf => wenf, addrin => ad(131), addrot => ad(132),
```

```
            rstfifoaddr => rstfifoaddr, wl => fwl(131), venb
            => venb, exen => exen );

U7130: fitag1
   port map ( wenf => wenf, addrin => ad(130), addrot => ad(131),
            rstfifoaddr => rstfifoaddr, wl => fwl(130), venb
            => venb, exen => exen );

U7129: fitag1
   port map ( wenf => wenf, addrin => ad(129), addrot => ad(130),
            rstfifoaddr => rstfifoaddr, wl => fwl(129), venb
            => venb, exen => exen );

U7128: fitag1
   port map ( wenf => wenf, addrin => ad(128), addrot => ad(129),
            rstfifoaddr => rstfifoaddr, wl => fwl(128), venb
            => venb, exen => exen );

U7127: fitag1
   port map ( wenf => wenf, addrin => ad(127), addrot => ad(128),
            rstfifoaddr => rstfifoaddr, wl => fwl(127), venb
            => venb, exen => exen );

U7126: fitag1
   port map ( wenf => wenf, addrin => ad(126), addrot => ad(127),
            rstfifoaddr => rstfifoaddr, wl => fwl(126), venb
            => venb, exen => exen );

U7125: fitag1
   port map ( wenf => wenf, addrin => ad(125), addrot => ad(126),
            rstfifoaddr => rstfifoaddr, wl => fwl(125), venb
            => venb, exen => exen );

U7124: fitag1
   port map ( wenf => wenf, addrin => ad(124), addrot => ad(125),
            rstfifoaddr => rstfifoaddr, wl => fwl(124), venb
            => venb, exen => exen );

U7123: fitag1
   port map ( wenf => wenf, addrin => ad(123), addrot => ad(124),
            rstfifoaddr => rstfifoaddr, wl => fwl(123), venb
            => venb, exen => exen );

U7122: fitag1
   port map ( wenf => wenf, addrin => ad(122), addrot => ad(123),
            rstfifoaddr => rstfifoaddr, wl => fwl(122), venb
            => venb, exen => exen );

U7121: fitag1
   port map ( wenf => wenf, addrin => ad(121), addrot => ad(122),
            rstfifoaddr => rstfifoaddr, wl => fwl(121), venb
            => venb, exen => exen );

U7120: fitag1
   port map ( wenf => wenf, addrin => ad(120), addrot => ad(121),
            rstfifoaddr => rstfifoaddr, wl => fwl(120), venb
            => venb, exen => exen );
```

```
U7119: fitagl
   port map ( wenf => wenf, addrin => ad(119), addrot => ad(120),
          rstfifoaddr => rstfifoaddr, wl => fwl(119), venb
          => venb, exen => exen );

U7118: fitagl
   port map ( wenf => wenf, addrin => ad(118), addrot => ad(119),
          rstfifoaddr => rstfifoaddr, wl => fwl(118), venb
          => venb, exen => exen );

U7117: fitagl
   port map ( wenf => wenf, addrin => ad(117), addrot => ad(118),
          rstfifoaddr => rstfifoaddr, wl => fwl(117), venb
          => venb, exen => exen );

U7116: fitagl
   port map ( wenf => wenf, addrin => ad(116), addrot => ad(117),
          rstfifoaddr => rstfifoaddr, wl => fwl(116), venb
          => venb, exen => exen );

U7115: fitagl
   port map ( wenf => wenf, addrin => ad(115), addrot => ad(116),
          rstfifoaddr => rstfifoaddr, wl => fwl(115), venb
          => venb, exen => exen );

U7114: fitagl
   port map ( wenf => wenf, addrin => ad(114), addrot => ad(115),
          rstfifoaddr => rstfifoaddr, wl => fwl(114), venb
          => venb, exen => exen );

U7113: fitagl
   port map ( wenf => wenf, addrin => ad(113), addrot => ad(114),
          rstfifoaddr => rstfifoaddr, wl => fwl(113), venb
          => venb, exen => exen );

U7112: fitagl
   port map ( wenf => wenf, addrin => ad(112), addrot => ad(113),
          rstfifoaddr => rstfifoaddr, wl => fwl(112), venb
          => venb, exen => exen );

U7111: fitagl
   port map ( wenf => wenf, addrin => ad(111), addrot => ad(112),
          rstfifoaddr => rstfifoaddr, wl => fwl(111), venb
          => venb, exen => exen );

U7110: fitagl
   port map ( wenf => wenf, addrin => ad(110), addrot => ad(111),
          rstfifoaddr => rstfifoaddr, wl => fwl(110), venb
          => venb, exen => exen );

U7109: fitagl
   port map ( wenf => wenf, addrin => ad(109), addrot => ad(110),
          rstfifoaddr => rstfifoaddr, wl => fwl(109), venb
          => venb, exen => exen );

U7108: fitagl
   port map ( wenf => wenf, addrin => ad(108), addrot => ad(109),
          rstfifoaddr => rstfifoaddr, wl => fwl(108), venb
```

```
          => venb, exen => exen );

U7107: fitagl
   port map ( wenf => wenf, addrin => ad(107), addrot => ad(108),
          rstfifoaddr => rstfifoaddr, wl => fwl(107), venb
          => venb, exen => exen );

U7106: fitagl
   port map ( wenf => wenf, addrin => ad(106), addrot => ad(107),
          rstfifoaddr => rstfifoaddr, wl => fwl(106), venb
          => venb, exen => exen );

U7105: fitagl
   port map ( wenf => wenf, addrin => ad(105), addrot => ad(106),
          rstfifoaddr => rstfifoaddr, wl => fwl(105), venb
          => venb, exen => exen );

U7104: fitagl
   port map ( wenf => wenf, addrin => ad(104), addrot => ad(105),
          rstfifoaddr => rstfifoaddr, wl => fwl(104), venb
          => venb, exen => exen );

U7103: fitagl
   port map ( wenf => wenf, addrin => ad(103), addrot => ad(104),
          rstfifoaddr => rstfifoaddr, wl => fwl(103), venb
          => venb, exen => exen );

U7102: fitagl
   port map ( wenf => wenf, addrin => ad(102), addrot => ad(103),
          rstfifoaddr => rstfifoaddr, wl => fwl(102), venb
          => venb, exen => exen );

U7101: fitagl
   port map ( wenf => wenf, addrin => ad(101), addrot => ad(102),
          rstfifoaddr => rstfifoaddr, wl => fwl(101), venb
          => venb, exen => exen );

U7100: fitagl
   port map ( wenf => wenf, addrin => ad(100), addrot => ad(101),
          rstfifoaddr => rstfifoaddr, wl => fwl(100), venb
          => venb, exen => exen );

U799: fitagl
   port map ( wenf => wenf, addrin => ad(99), addrot => ad(100),
          rstfifoaddr => rstfifoaddr, wl => fwl(99), venb =>
          venb, exen => exen );

U798: fitagl
   port map ( wenf => wenf, addrin => ad(98), addrot => ad(99),
          rstfifoaddr => rstfifoaddr, wl => fwl(98), venb =>
          venb, exen => exen );

U797: fitagl
   port map ( wenf => wenf, addrin => ad(97), addrot => ad(98),
          rstfifoaddr => rstfifoaddr, wl => fwl(97), venb =>
          venb, exen => exen );

U796: fitagl
```

```
    port map ( wenf => wenf, addrin => ad(96), addrot => ad(97),
            rstfifoaddr => rstfifoaddr, wl => fwl(96), venb =>
            venb, exen => exen );

U795: fitag1
    port map ( wenf => wenf, addrin => ad(95), addrot => ad(96),
            rstfifoaddr => rstfifoaddr, wl => fwl(95), venb =>
            venb, exen => exen );

U794: fitag1
    port map ( wenf => wenf, addrin => ad(94), addrot => ad(95),
            rstfifoaddr => rstfifoaddr, wl => fwl(94), venb =>
            venb, exen => exen );

U793: fitag1
    port map ( wenf => wenf, addrin => ad(93), addrot => ad(94),
            rstfifoaddr => rstfifoaddr, wl => fwl(93), venb =>
            venb, exen => exen );

U792: fitag1
    port map ( wenf => wenf, addrin => ad(92), addrot => ad(93),
            rstfifoaddr => rstfifoaddr, wl => fwl(92), venb =>
            venb, exen => exen );

U791: fitag1
    port map ( wenf => wenf, addrin => ad(91), addrot => ad(92),
            rstfifoaddr => rstfifoaddr, wl => fwl(91), venb =>
            venb, exen => exen );

U790: fitag1
    port map ( wenf => wenf, addrin => ad(90), addrot => ad(91),
            rstfifoaddr => rstfifoaddr, wl => fwl(90), venb =>
            venb, exen => exen );

U789: fitag1
    port map ( wenf => wenf, addrin => ad(89), addrot => ad(90),
            rstfifoaddr => rstfifoaddr, wl => fwl(89), venb =>
            venb, exen => exen );

U788: fitag1
    port map ( wenf => wenf, addrin => ad(88), addrot => ad(89),
            rstfifoaddr => rstfifoaddr, wl => fwl(88), venb =>
            venb, exen => exen );

U787: fitag1
    port map ( wenf => wenf, addrin => ad(87), addrot => ad(88),
            rstfifoaddr => rstfifoaddr, wl => fwl(87), venb =>
            venb, exen => exen );

U786: fitag1
    port map ( wenf => wenf, addrin => ad(86), addrot => ad(87),
            rstfifoaddr => rstfifoaddr, wl => fwl(86), venb =>
            venb, exen => exen );

U785: fitag1
    port map ( wenf => wenf, addrin => ad(85), addrot => ad(86),
            rstfifoaddr => rstfifoaddr, wl => fwl(85), venb =>
            venb, exen => exen );
```

```
U784: fitag1
  port map ( wenf => wenf, addrin => ad(84), addrot => ad(85),
        rstfifoaddr => rstfifoaddr, wl => fwl(84), venb =>
        venb, exen => exen );

U783: fitag1
  port map ( wenf => wenf, addrin => ad(83), addrot => ad(84),
        rstfifoaddr => rstfifoaddr, wl => fwl(83), venb =>
        venb, exen => exen );

U782: fitag1
  port map ( wenf => wenf, addrin => ad(82), addrot => ad(83),
        rstfifoaddr => rstfifoaddr, wl => fwl(82), venb =>
        venb, exen => exen );

U781: fitag1
  port map ( wenf => wenf, addrin => ad(81), addrot => ad(82),
        rstfifoaddr => rstfifoaddr, wl => fwl(81), venb =>
        venb, exen => exen );

U780: fitag1
  port map ( wenf => wenf, addrin => ad(80), addrot => ad(81),
        rstfifoaddr => rstfifoaddr, wl => fwl(80), venb =>
        venb, exen => exen );

U779: fitag1
  port map ( wenf => wenf, addrin => ad(79), addrot => ad(80),
        rstfifoaddr => rstfifoaddr, wl => fwl(79), venb =>
        venb, exen => exen );

U778: fitag1
  port map ( wenf => wenf, addrin => ad(78), addrot => ad(79),
        rstfifoaddr => rstfifoaddr, wl => fwl(78), venb =>
        venb, exen => exen );

U777: fitag1
  port map ( wenf => wenf, addrin => ad(77), addrot => ad(78),
        rstfifoaddr => rstfifoaddr, wl => fwl(77), venb =>
        venb, exen => exen );

U776: fitag1
  port map ( wenf => wenf, addrin => ad(76), addrot => ad(77),
        rstfifoaddr => rstfifoaddr, wl => fwl(76), venb =>
        venb, exen => exen );

U775: fitag1
  port map ( wenf => wenf, addrin => ad(75), addrot => ad(76),
        rstfifoaddr => rstfifoaddr, wl => fwl(75), venb =>
        venb, exen => exen );

U774: fitag1
  port map ( wenf => wenf, addrin => ad(74), addrot => ad(75),
        rstfifoaddr => rstfifoaddr, wl => fwl(74), venb =>
        venb, exen => exen );

U773: fitag1
  port map ( wenf => wenf, addrin => ad(73), addrot => ad(74),
```

```
        rstfifoaddr => rstfifoaddr, wl => fwl(73), venb =>
        venb, exen => exen );

U772: fitag1
   port map ( wenf => wenf, addrin => ad(72), addrot => ad(73),
        rstfifoaddr => rstfifoaddr, wl => fwl(72), venb =>
        venb, exen => exen );

U771: fitag1
   port map ( wenf => wenf, addrin => ad(71), addrot => ad(72),
        rstfifoaddr => rstfifoaddr, wl => fwl(71), venb =>
        venb, exen => exen );

U770: fitag1
   port map ( wenf => wenf, addrin => ad(70), addrot => ad(71),
        rstfifoaddr => rstfifoaddr, wl => fwl(70), venb =>
        venb, exen => exen );

U769: fitag1
   port map ( wenf => wenf, addrin => ad(69), addrot => ad(70),
        rstfifoaddr => rstfifoaddr, wl => fwl(69), venb =>
        venb, exen => exen );

U768: fitag1
   port map ( wenf => wenf, addrin => ad(68), addrot => ad(69),
        rstfifoaddr => rstfifoaddr, wl => fwl(68), venb =>
        venb, exen => exen );

U767: fitag1
   port map ( wenf => wenf, addrin => ad(67), addrot => ad(68),
        rstfifoaddr => rstfifoaddr, wl => fwl(67), venb =>
        venb, exen => exen );

U766: fitag1
   port map ( wenf => wenf, addrin => ad(66), addrot => ad(67),
        rstfifoaddr => rstfifoaddr, wl => fwl(66), venb =>
        venb, exen => exen );

U765: fitag1
   port map ( wenf => wenf, addrin => ad(65), addrot => ad(66),
        rstfifoaddr => rstfifoaddr, wl => fwl(65), venb =>
        venb, exen => exen );

U764: fitag1
   port map ( wenf => wenf, addrin => ad(64), addrot => ad(65),
        rstfifoaddr => rstfifoaddr, wl => fwl(64), venb =>
        venb, exen => exen );

U763: fitag1
   port map ( wenf => wenf, addrin => ad(63), addrot => ad(64),
        rstfifoaddr => rstfifoaddr, wl => fwl(63), venb =>
        venb, exen => exen );

U762: fitag1
   port map ( wenf => wenf, addrin => ad(62), addrot => ad(63),
        rstfifoaddr => rstfifoaddr, wl => fwl(62), venb =>
        venb, exen => exen );
```

```
U761: fitagl
  port map ( wenf => wenf, addrin => ad(61), addrot => ad(62),
        rstfifoaddr => rstfifoaddr, wl => fwl(61), venb =>
        venb, exen => exen );

U760: fitagl
  port map ( wenf => wenf, addrin => ad(60), addrot => ad(61),
        rstfifoaddr => rstfifoaddr, wl => fwl(60), venb =>
        venb, exen => exen );

U759: fitagl
  port map ( wenf => wenf, addrin => ad(59), addrot => ad(60),
        rstfifoaddr => rstfifoaddr, wl => fwl(59), venb =>
        venb, exen => exen );

U758: fitagl
  port map ( wenf => wenf, addrin => ad(58), addrot => ad(59),
        rstfifoaddr => rstfifoaddr, wl => fwl(58), venb =>
        venb, exen => exen );

U757: fitagl
  port map ( wenf => wenf, addrin => ad(57), addrot => ad(58),
        rstfifoaddr => rstfifoaddr, wl => fwl(57), venb =>
        venb, exen => exen );

U756: fitagl
  port map ( wenf => wenf, addrin => ad(56), addrot => ad(57),
        rstfifoaddr => rstfifoaddr, wl => fwl(56), venb =>
        venb, exen => exen );

U755: fitagl
  port map ( wenf => wenf, addrin => ad(55), addrot => ad(56),
        rstfifoaddr => rstfifoaddr, wl => fwl(55), venb =>
        venb, exen => exen );

U754: fitagl
  port map ( wenf => wenf, addrin => ad(54), addrot => ad(55),
        rstfifoaddr => rstfifoaddr, wl => fwl(54), venb =>
        venb, exen => exen );

U753: fitagl
  port map ( wenf => wenf, addrin => ad(53), addrot => ad(54),
        rstfifoaddr => rstfifoaddr, wl => fwl(53), venb =>
        venb, exen => exen );

U752: fitagl
  port map ( wenf => wenf, addrin => ad(52), addrot => ad(53),
        rstfifoaddr => rstfifoaddr, wl => fwl(52), venb =>
        venb, exen => exen );

U751: fitagl
  port map ( wenf => wenf, addrin => ad(51), addrot => ad(52),
        rstfifoaddr => rstfifoaddr, wl => fwl(51), venb =>
        venb, exen => exen );

U750: fitagl
  port map ( wenf => wenf, addrin => ad(50), addrot => ad(51),
        rstfifoaddr => rstfifoaddr, wl => fwl(50), venb =>
```

```
            venb, exen => exen );

U749: fitag1
   port map ( wenf => wenf, addrin => ad(49), addrot => ad(50),
            rstfifoaddr => rstfifoaddr, wl => fwl(49), venb =>
            venb, exen => exen );

U748: fitag1
   port map ( wenf => wenf, addrin => ad(48), addrot => ad(49),
            rstfifoaddr => rstfifoaddr, wl => fwl(48), venb =>
            venb, exen => exen );

U747: fitag1
   port map ( wenf => wenf, addrin => ad(47), addrot => ad(48),
            rstfifoaddr => rstfifoaddr, wl => fwl(47), venb =>
            venb, exen => exen );

U746: fitag1
   port map ( wenf => wenf, addrin => ad(46), addrot => ad(47),
            rstfifoaddr => rstfifoaddr, wl => fwl(46), venb =>
            venb, exen => exen );

U745: fitag1
   port map ( wenf => wenf, addrin => ad(45), addrot => ad(46),
            rstfifoaddr => rstfifoaddr, wl => fwl(45), venb =>
            venb, exen => exen );

U744: fitag1
   port map ( wenf => wenf, addrin => ad(44), addrot => ad(45),
            rstfifoaddr => rstfifoaddr, wl => fwl(44), venb =>
            venb, exen => exen );

U743: fitag1
   port map ( wenf => wenf, addrin => ad(43), addrot => ad(44),
            rstfifoaddr => rstfifoaddr, wl => fwl(43), venb =>
            venb, exen => exen );

U742: fitag1
   port map ( wenf => wenf, addrin => ad(42), addrot => ad(43),
            rstfifoaddr => rstfifoaddr, wl => fwl(42), venb =>
            venb, exen => exen );

U741: fitag1
   port map ( wenf => wenf, addrin => ad(41), addrot => ad(42),
            rstfifoaddr => rstfifoaddr, wl => fwl(41), venb =>
            venb, exen => exen );

U740: fitag1
   port map ( wenf => wenf, addrin => ad(40), addrot => ad(41),
            rstfifoaddr => rstfifoaddr, wl => fwl(40), venb =>
            venb, exen => exen );

U739: fitag1
   port map ( wenf => wenf, addrin => ad(39), addrot => ad(40),
            rstfifoaddr => rstfifoaddr, wl => fwl(39), venb =>
            venb, exen => exen );

U738: fitag1
```

```
   port map ( wenf => wenf, addrin => ad(38), addrot => ad(39),
           rstfifoaddr => rstfifoaddr, wl => fwl(38), venb =>
           venb, exen => exen );

U737: fitag1
   port map ( wenf => wenf, addrin => ad(37), addrot => ad(38),
           rstfifoaddr => rstfifoaddr, wl => fwl(37), venb =>
           venb, exen => exen );

U736: fitag1
   port map ( wenf => wenf, addrin => ad(36), addrot => ad(37),
           rstfifoaddr => rstfifoaddr, wl => fwl(36), venb =>
           venb, exen => exen );

U735: fitag1
   port map ( wenf => wenf, addrin => ad(35), addrot => ad(36),
           rstfifoaddr => rstfifoaddr, wl => fwl(35), venb =>
           venb, exen => exen );

U734: fitag1
   port map ( wenf => wenf, addrin => ad(34), addrot => ad(35),
           rstfifoaddr => rstfifoaddr, wl => fwl(34), venb =>
           venb, exen => exen );

U733: fitag1
   port map ( wenf => wenf, addrin => ad(33), addrot => ad(34),
           rstfifoaddr => rstfifoaddr, wl => fwl(33), venb =>
           venb, exen => exen );

U732: fitag1
   port map ( wenf => wenf, addrin => ad(32), addrot => ad(33),
           rstfifoaddr => rstfifoaddr, wl => fwl(32), venb =>
           venb, exen => exen );

U731: fitag1
   port map ( wenf => wenf, addrin => ad(31), addrot => ad(32),
           rstfifoaddr => rstfifoaddr, wl => fwl(31), venb =>
           venb, exen => exen );

U730: fitag1
   port map ( wenf => wenf, addrin => ad(30), addrot => ad(31),
           rstfifoaddr => rstfifoaddr, wl => fwl(30), venb =>
           venb, exen => exen );

U729: fitag1
   port map ( wenf => wenf, addrin => ad(29), addrot => ad(30),
           rstfifoaddr => rstfifoaddr, wl => fwl(29), venb =>
           venb, exen => exen );

U728: fitag1
   port map ( wenf => wenf, addrin => ad(28), addrot => ad(29),
           rstfifoaddr => rstfifoaddr, wl => fwl(28), venb =>
           venb, exen => exen );

U727: fitag1
   port map ( wenf => wenf, addrin => ad(27), addrot => ad(28),
           rstfifoaddr => rstfifoaddr, wl => fwl(27), venb =>
           venb, exen => exen );
```

```
U726: fitag1
   port map ( wenf => wenf, addrin => ad(26), addrot => ad(27),
         rstfifoaddr => rstfifoaddr, wl => fwl(26), venb =>
         venb, exen => exen );

U725: fitag1
   port map ( wenf => wenf, addrin => ad(25), addrot => ad(26),
         rstfifoaddr => rstfifoaddr, wl => fwl(25), venb =>
         venb, exen => exen );

U724: fitag1
   port map ( wenf => wenf, addrin => ad(24), addrot => ad(25),
         rstfifoaddr => rstfifoaddr, wl => fwl(24), venb =>
         venb, exen => exen );

U723: fitag1
   port map ( wenf => wenf, addrin => ad(23), addrot => ad(24),
         rstfifoaddr => rstfifoaddr, wl => fwl(23), venb =>
         venb, exen => exen );

U722: fitag1
   port map ( wenf => wenf, addrin => ad(22), addrot => ad(23),
         rstfifoaddr => rstfifoaddr, wl => fwl(22), venb =>
         venb, exen => exen );

U721: fitag1
   port map ( wenf => wenf, addrin => ad(21), addrot => ad(22),
         rstfifoaddr => rstfifoaddr, wl => fwl(21), venb =>
         venb, exen => exen );

U720: fitag1
   port map ( wenf => wenf, addrin => ad(20), addrot => ad(21),
         rstfifoaddr => rstfifoaddr, wl => fwl(20), venb =>
         venb, exen => exen );

U719: fitag1
   port map ( wenf => wenf, addrin => ad(19), addrot => ad(20),
         rstfifoaddr => rstfifoaddr, wl => fwl(19), venb =>
         venb, exen => exen );

U718: fitag1
   port map ( wenf => wenf, addrin => ad(18), addrot => ad(19),
         rstfifoaddr => rstfifoaddr, wl => fwl(18), venb =>
         venb, exen => exen );

U717: fitag1
   port map ( wenf => wenf, addrin => ad(17), addrot => ad(18),
         rstfifoaddr => rstfifoaddr, wl => fwl(17), venb =>
         venb, exen => exen );

U716: fitag1
   port map ( wenf => wenf, addrin => ad(16), addrot => ad(17),
         rstfifoaddr => rstfifoaddr, wl => fwl(16), venb =>
         venb, exen => exen );

U715: fitag1
   port map ( wenf => wenf, addrin => ad(15), addrot => ad(16),
```

```
        rstfifoaddr => rstfifoaddr, wl => fwl(15), venb =>
        venb, exen => exen );

U714: fitag1
   port map ( wenf => wenf, addrin => ad(14), addrot => ad(15),
        rstfifoaddr => rstfifoaddr, wl => fwl(14), venb =>
        venb, exen => exen );

U713: fitag1
   port map ( wenf => wenf, addrin => ad(13), addrot => ad(14),
        rstfifoaddr => rstfifoaddr, wl => fwl(13), venb =>
        venb, exen => exen );

U712: fitag1
   port map ( wenf => wenf, addrin => ad(12), addrot => ad(13),
        rstfifoaddr => rstfifoaddr, wl => fwl(12), venb =>
        venb, exen => exen );

U711: fitag1
   port map ( wenf => wenf, addrin => ad(11), addrot => ad(12),
        rstfifoaddr => rstfifoaddr, wl => fwl(11), venb =>
        venb, exen => exen );

U710: fitag1
   port map ( wenf => wenf, addrin => ad(10), addrot => ad(11),
        rstfifoaddr => rstfifoaddr, wl => fwl(10), venb =>
        venb, exen => exen );

U79: fitag1
   port map ( wenf => wenf, addrin => ad(9), addrot => ad(10),
        rstfifoaddr => rstfifoaddr, wl => fwl(9), venb =>
        venb, exen => exen );

U78: fitag1
   port map ( wenf => wenf, addrin => ad(8), addrot => ad(9),
        rstfifoaddr => rstfifoaddr, wl => fwl(8), venb =>
        venb, exen => exen );

U77: fitag1
   port map ( wenf => wenf, addrin => ad(7), addrot => ad(8),
        rstfifoaddr => rstfifoaddr, wl => fwl(7), venb =>
        venb, exen => exen );

U76: fitag1
   port map ( wenf => wenf, addrin => ad(6), addrot => ad(7),
        rstfifoaddr => rstfifoaddr, wl => fwl(6), venb =>
        venb, exen => exen );

U75: fitag1
   port map ( wenf => wenf, addrin => ad(5), addrot => ad(6),
        rstfifoaddr => rstfifoaddr, wl => fwl(5), venb =>
        venb, exen => exen );

U74: fitag1
   port map ( wenf => wenf, addrin => ad(4), addrot => ad(5),
        rstfifoaddr => rstfifoaddr, wl => fwl(4), venb =>
        venb, exen => exen );
```

```
  U73: fitagl
    port map ( wenf => wenf, addrin => ad(3), addrot => ad(4),
            rstfifoaddr => rstfifoaddr, wl => fwl(3), venb =>
            venb, exen => exen );

  U72: fitagl
    port map ( wenf => wenf, addrin => ad(2), addrot => ad(3),
            rstfifoaddr => rstfifoaddr, wl => fwl(2), venb =>
            venb, exen => exen );

  U71: fitagl
    port map ( wenf => wenf, addrin => ad(1), addrot => ad(2),
            rstfifoaddr => rstfifoaddr, wl => fwl(1), venb =>
            venb, exen => exen );

  U70: fitagl
    port map ( wenf => wenf, addrin => finit, addrot => ad(1),
            rstfifoaddr => rstfifoaddr, wl => fwl(0), venb =>
            venb, exen => exen );

end fitag342;
```

```
file: FOEN_CON.VHD
-- Date of netlist generation: Nov-18-93

-------------------------------------------------------------------

library IEEE;
use IEEE.STD_LOGIC_1164.ALL;

library COMPASS_LIB;
use COMPASS_LIB.COMPASS.ALL;

entity foen_con is


  port ( finit : in Std_Logic := 'U';
       fful : in Std_Logic := 'U';

       foen : out Std_Logic := 'U' );

end foen_con;

-------------------------------------------------------------------

architecture foen_con OF foen_con is


  component foenc_smachn_2
    port ( arst : in Std_Logic;
         clk : in Std_Logic;
         fn : in Std_Logic;
         st : in Std_Logic;

         foen : out Std_Logic );
  end component;

  signal U2_Q : Std_Logic;
  signal U11_C : Std_Logic;
  signal U1_QN : Std_Logic;
  signal U1_Q : Std_Logic;
  signal U2_QN : Std_Logic;
  signal U4_Q : Std_Logic;
  signal st : Std_Logic;
  signal U5_QN : Std_Logic;
  signal U4_QN : Std_Logic;
  signal U21_Q : Std_Logic;
  signal U21_QN : Std_Logic;
  signal fn : Std_Logic;
  signal U11_CN : Std_Logic;
  signal U3_QN : Std_Logic;

begin


  U5: dfctnb
    port map ( D => U4_Q, CP => CLK, CDN => ARESET, Q => st, QN
```

```
          => U5_QN );

  U11: ck01d1
    port map ( CLK => CLK, C => U11_C, CN => U11_CN );

  U3: dfctnb
    port map ( D => U2_Q, CP => U11_CN, CDN => ARESET, Q => fn,
          QN => U3_QN );

  U18: foenc_smachn_2
    port map ( arst => ARESET, clk => CLK, fn => fn, st => st,
          foen => foen );

  U2: dfctnb
    port map ( D => U1_Q, CP => CLK, CDN => ARESET, Q => U2_Q, QN
          => U2_QN );

  U1: dfctnb
    port map ( D => fful, CP => CLK, CDN => ARESET, Q => U1_Q, QN
          => U1_QN );

  U4: dfctnb
    port map ( D => U21_Q, CP => CLK, CDN => ARESET, Q => U4_Q,
          QN => U4_QN );

  U21: dfctnb
    port map ( D => finit, CP => CLK, CDN => ARESET, Q => U21_Q,
          QN => U21_QN );

end foen_con;
```

```
file: FOENC_SM.VHD
-- Date of netlist generation: Nov-19-93

----------------------------------------------------------------------

library IEEE;
use IEEE.STD_LOGIC_1164.ALL;

library COMPASS_LIB;
use COMPASS_LIB.COMPASS.ALL;

entity foenc_smachn_2 is

   port ( clk : in Std_Logic := 'U';
        arst : in Std_Logic := 'U';
        st : in Std_Logic := 'U';
        fn : in Std_Logic := 'U';

        foen : out Std_Logic := 'U' );

end foenc_smachn_2;

----------------------------------------------------------------------

architecture foenc_smachn_2 OF foenc_smachn_2 is

   signal foen_local: Std_Logic;
   signal i_3_ZN : Std_Logic;
   signal sm_sr1_Q : Std_Logic;
   signal sm_sr1_QN : Std_Logic;

begin

   sm_sr1: dfctnb
      port map ( D => i_3_ZN, CP => clk, CDN => arst, Q => sm_sr1_Q,
            QN => sm_sr1_QN );

   i_4: fn03d1
      port map ( A1 => st, A2 => sm_sr1_QN, B1 => fn, B2 =>
            sm_sr1_QN, ZN => foen_local );

   i_3: in01d0
      port map ( I => foen_local, ZN => i_3_ZN );

   foen <= foen_local;

end foenc_smachn_2;
```

```
file: FULC.VHD
-- Date of netlist generation:  Nov-18-93

----------------------------------------------------------------------

library IEEE;
use IEEE.STD_LOGIC_1164.ALL;

library COMPASS_LIB;
use COMPASS_LIB.COMPASS.ALL;

entity fulc is


  port ( clk : in Std_Logic := 'U';
       rstfifo : in Std_Logic := 'U';
       ful : in Std_Logic := 'U';

       ff : out Std_Logic := 'U' );

end fulc;

----------------------------------------------------------------------

architecture fulc OF fulc is




  signal i_5_Z : Std_Logic;
  signal i_6_ZN : Std_Logic;
  signal sm_sr1_QN : Std_Logic;
  signal sm_sr1_Q : Std_Logic;
  signal sm_sr2_QN : Std_Logic;
  signal sm_sr2_Q : Std_Logic;
  signal i_7_ZN : Std_Logic;
  signal i_8_ZN : Std_Logic;
  signal U2_QN : Std_Logic;

begin


  sm_sr1: dfctnb
    port map ( D => i_5_Z, CP => clk, CDN => rstfifo, Q =>
         sm_sr1_Q, QN => sm_sr1_QN );

  sm_sr2: dfptnb
    port map ( D => i_6_ZN, CP => clk, SDN => rstfifo, Q =>
         sm_sr2_Q, QN => sm_sr2_QN );

  i_5: an02d1
    port map ( A1 => ful, A2 => i_6_ZN, Z => i_5_Z );
```

```
i_6: nr02d0
   port map ( A1 => sm_sr1_Q, A2 => sm_sr2_QN, ZN => i_6_ZN );

i_7: nd02d0
   port map ( A1 => i_8_ZN, A2 => sm_sr1_QN, ZN => i_7_ZN );

i_8: nd02d0
   port map ( A1 => sm_sr2_Q, A2 => ful, ZN => i_8_ZN );

U2: lacfnb
   port map ( EN => clk, D => i_7_ZN, CDN => rstfifo, Q => ff,
         QN => U2_QN );

end fulc;
```

```
        );

 U2: an03d1
   port map ( A1 => f(0), A2 => U5_ZN, A3 => f(2), Z => U2_Z );

 U10: or02d1
   port map ( A1 => U2_Z, A2 => m3_local, Z => m2_local );

 U12: mx21d1
   port map ( I0 => l3, I1 => fen, S => m2_local, Z => l4 );

 U5: in01d1
   port map ( I => f(1), ZN => U5_ZN );

 U6: in01d1
   port map ( I => f(2), ZN => U6_ZN );

 U4: in01d1
   port map ( I => f(0), ZN => U4_ZN );

 U13: mx21d1
   port map ( I0 => l3, I1 => fen, S => m3_local, Z => l33 );

 U11: mx21d1
   port map ( I0 => l3, I1 => fen, S => m1_local, Z => l5 );

 m3 <= m3_local;
 m2 <= m2_local;
 m1 <= m1_local;

end loadmux;
```

```
file: MASK_REG.VHD
-- Date of netlist generation:  Nov-21-93
----------------------------------------------------------------------

library IEEE;
use IEEE.STD_LOGIC_1164.ALL;

library COMPASS_LIB;
use COMPASS_LIB.COMPASS.ALL;

entity mask_reg is

   port ( load : in Std_Logic := 'U';
        clk : in Std_Logic := 'U';
        set : in Std_Logic := 'U';
        rst : in Std_Logic := 'U';
        s0 : in Std_Logic := 'U';
        s1 : in Std_Logic := 'U';
        fstrobe : in Std_Logic := 'U';
        f : in Std_Logic_Vector(0 to 2) := (others => 'U');
        d : in Std_Logic_Vector(23 downto 0) := (others => 'U');
        ex : in Std_Logic := 'U';

        c : out Std_Logic_Vector(71 downto 0) := (others => 'U');
        nc : out Std_Logic_Vector(71 downto 0) := (others => 'U')
);

end mask_reg;

----------------------------------------------------------------------
architecture mask_reg OF mask_reg is

   component ff_enb2
      port ( a : in Std_Logic;
           clk : in Std_Logic;
           rst : in Std_Logic;
           ld : in Std_Logic;

           outt : out Std_Logic;
           nout : out Std_Logic );
   end component;

   component loadmux
      port ( l3 : in Std_Logic;
           fen : in Std_Logic;
           f : in Std_Logic_Vector(0 to 2) := (others => 'U');

           l5 : out Std_Logic;
           l4 : out Std_Logic;
           l33 : out Std_Logic;
           m3 : out Std_Logic;
           m2 : out Std_Logic;
           m1 : out Std_Logic );
   end component;

   component demux4x1
      port ( s0 : in Std_Logic;
           s1 : in Std_Logic;
```

```
signal U412_Z : Std_Logic;
signal U411_Z : Std_Logic;
signal U410_Z : Std_Logic;
signal U78_I5 : Std_Logic;
signal U78_I4 : Std_Logic;
signal U78_I33 : Std_Logic;
signal U78_m3 : Std_Logic;
signal U78_m2 : Std_Logic;
signal U78_m1 : Std_Logic;
signal U427_Z : Std_Logic;
signal U426_Z : Std_Logic;
signal U425_Z : Std_Logic;
signal U424_Z : Std_Logic;
signal U423_Z : Std_Logic;
signal U422_Z : Std_Logic;
signal U421_Z : Std_Logic;
signal U420_Z : Std_Logic;
signal U40_m2 : Std_Logic;
signal U437_Z : Std_Logic;
signal U436_Z : Std_Logic;
signal U435_Z : Std_Logic;
signal U434_Z : Std_Logic;
signal U433_Z : Std_Logic;
signal U432_Z : Std_Logic;
signal U431_Z : Std_Logic;
signal U430_Z : Std_Logic;
signal U40_m1 : Std_Logic;
signal U58_I4 : Std_Logic;
signal U58_m1 : Std_Logic;
signal U58_m2 : Std_Logic;
signal U59_m3 : Std_Logic;
signal U59_m2 : Std_Logic;
signal U58_m3 : Std_Logic;
signal U58_I33 : Std_Logic;
signal U59_I5 : Std_Logic;
signal U59_m1 : Std_Logic;
signal U18_I2 : Std_Logic;
signal I55 : Std_Logic;
signal U40_I4 : Std_Logic;
signal U40_I33 : Std_Logic;
signal U56_I1 : Std_Logic;
signal U56_I2 : Std_Logic;
signal U56_I0 : Std_Logic;
signal U57_I2 : Std_Logic;
signal U57_I1 : Std_Logic;
signal U57_I0 : Std_Logic;
signal U59_I4 : Std_Logic;
signal U59_I33 : Std_Logic;
signal U18_I1 : Std_Logic;
signal U18_I0 : Std_Logic;
signal U123_Z : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
```

```
      ld : in Std_Logic;

      l0 : out Std_Logic;
      l1 : out Std_Logic;
      l2 : out Std_Logic );
end component;

component dgen
   port ( d : in Std_Logic;
      r : in Std_Logic;
      s : in Std_Logic;

      do : out Std_Logic );
end component;

component amos
   port ( l2 : in Std_Logic;
      ex : in Std_Logic;
      l1 : in Std_Logic;
      l0 : in Std_Logic;

      p0 : out Std_Logic;
      p1 : out Std_Logic;
      p2 : out Std_Logic );
end component;

signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal S9 : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal S17 : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal S25 : Std_Logic;
signal U40_m3 : Std_Logic;
signal U58_l5 : Std_Logic;
signal U100_p2 : Std_Logic;
signal U417_Z : Std_Logic;
signal U416_Z : Std_Logic;
signal U415_Z : Std_Logic;
signal U414_Z : Std_Logic;
signal U413_Z : Std_Logic;
```

```
signal U412_Z : Std_Logic;
signal U411_Z : Std_Logic;
signal U410_Z : Std_Logic;
signal U78_I5 : Std_Logic;
signal U78_I4 : Std_Logic;
signal U78_I33 : Std_Logic;
signal U78_m3 : Std_Logic;
signal U78_m2 : Std_Logic;
signal U78_m1 : Std_Logic;
signal U427_Z : Std_Logic;
signal U426_Z : Std_Logic;
signal U425_Z : Std_Logic;
signal U424_Z : Std_Logic;
signal U423_Z : Std_Logic;
signal U422_Z : Std_Logic;
signal U421_Z : Std_Logic;
signal U420_Z : Std_Logic;
signal U40_m2 : Std_Logic;
signal U437_Z : Std_Logic;
signal U436_Z : Std_Logic;
signal U435_Z : Std_Logic;
signal U434_Z : Std_Logic;
signal U433_Z : Std_Logic;
signal U432_Z : Std_Logic;
signal U431_Z : Std_Logic;
signal U430_Z : Std_Logic;
signal U40_m1 : Std_Logic;
signal U58_I4 : Std_Logic;
signal U58_m1 : Std_Logic;
signal U58_m2 : Std_Logic;
signal U59_m3 : Std_Logic;
signal U59_m2 : Std_Logic;
signal U58_m3 : Std_Logic;
signal U58_I33 : Std_Logic;
signal U59_I5 : Std_Logic;
signal U59_m1 : Std_Logic;
signal U18_I2 : Std_Logic;
signal I55 : Std_Logic;
signal U40_I4 : Std_Logic;
signal U40_I33 : Std_Logic;
signal U56_I1 : Std_Logic;
signal U56_I2 : Std_Logic;
signal U56_I0 : Std_Logic;
signal U57_I2 : Std_Logic;
signal U57_I1 : Std_Logic;
signal U57_I0 : Std_Logic;
signal U59_I4 : Std_Logic;
signal U59_I33 : Std_Logic;
signal U18_I1 : Std_Logic;
signal U18_I0 : Std_Logic;
signal U123_Z : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
```

```
signal S33 : Std_Logic;
signal U1167_do : Std_Logic;
signal U1166_do : Std_Logic;
signal U1165_do : Std_Logic;
signal U1164_do : Std_Logic;
signal U1163_do : Std_Logic;
signal U1162_do : Std_Logic;
signal U1161_do : Std_Logic;
signal U1160_do : Std_Logic;
signal U84_ZN : Std_Logic;
signal S34 : Std_Logic;
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal U82_ZN : Std_Logic;
signal U1157_do : Std_Logic;
signal U1156_do : Std_Logic;
signal U1155_do : Std_Logic;
signal U1154_do : Std_Logic;
signal U1153_do : Std_Logic;
signal U1152_do : Std_Logic;
signal U1151_do : Std_Logic;
signal U1150_do : Std_Logic;
signal U121_Z : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal S49 : Std_Logic;
signal U81_ZN : Std_Logic;
signal U100_p0 : Std_Logic;
signal U100_p1 : Std_Logic;
signal U1147_do : Std_Logic;
signal U1146_do : Std_Logic;
signal U1145_do : Std_Logic;
signal U1144_do : Std_Logic;
signal U1143_do : Std_Logic;
signal U1142_do : Std_Logic;
signal U1141_do : Std_Logic;
signal U1140_do : Std_Logic;
signal U120_Z : Std_Logic;
signal S50 : Std_Logic;
signal S51 : Std_Logic;
signal S52 : Std_Logic;
signal S53 : Std_Logic;
signal S54 : Std_Logic;
signal S55 : Std_Logic;
signal S56 : Std_Logic;
signal S57 : Std_Logic;
signal S58 : Std_Logic;
signal S59 : Std_Logic;
```

```
signal S60 : Std_Logic;
signal S61 : Std_Logic;
signal S62 : Std_Logic;
signal S63 : Std_Logic;
signal S64 : Std_Logic;
signal S65 : Std_Logic;
signal S66 : Std_Logic;
signal S67 : Std_Logic;
signal S68 : Std_Logic;
signal S69 : Std_Logic;
signal S70 : Std_Logic;
signal S71 : Std_Logic;
signal S72 : Std_Logic;
signal S73 : Std_Logic;
signal U88_ZN : Std_Logic;
signal U85_ZN : Std_Logic;
signal U119_Z : Std_Logic;
signal U11123_do : Std_Logic;
signal U11122_do : Std_Logic;
signal U11121_do : Std_Logic;
signal U11120_do : Std_Logic;
signal U11119_do : Std_Logic;
signal U11118_do : Std_Logic;
signal U11117_do : Std_Logic;
signal U11116_do : Std_Logic;
signal U11115_do : Std_Logic;
signal U11114_do : Std_Logic;
signal U11113_do : Std_Logic;
signal U11112_do : Std_Logic;
signal U11111_do : Std_Logic;
signal U11110_do : Std_Logic;
signal U1119_do : Std_Logic;
signal U1118_do : Std_Logic;
signal U1117_do : Std_Logic;
signal U1116_do : Std_Logic;
signal U1115_do : Std_Logic;
signal U1114_do : Std_Logic;
signal U1113_do : Std_Logic;
signal U1112_do : Std_Logic;
signal U1111_do : Std_Logic;
signal U1110_do : Std_Logic;
signal U11223_do : Std_Logic;
signal U11222_do : Std_Logic;
signal U11221_do : Std_Logic;
signal U11220_do : Std_Logic;
signal U11219_do : Std_Logic;
signal U11218_do : Std_Logic;
signal U11217_do : Std_Logic;
signal U11216_do : Std_Logic;
signal U11215_do : Std_Logic;
signal U11214_do : Std_Logic;
signal U11213_do : Std_Logic;
signal U11212_do : Std_Logic;
signal U11211_do : Std_Logic;
signal U11210_do : Std_Logic;
signal U1129_do : Std_Logic;
signal U1128_do : Std_Logic;
signal U1127_do : Std_Logic;
```

```
        ARESET, ld => U1142_do, nout => nc(50) );

U1051: ff_enb2
   port map ( a => U120_Z, clk => clk, outt => c(49), rst =>
        ARESET, ld => U1141_do, nout => nc(49) );

U1050: ff_enb2
   port map ( a => U120_Z, clk => clk, outt => c(48), rst =>
        ARESET, ld => U1140_do, nout => nc(48) );

U58: loadmux
   port map ( l3 => U56_l2, fen => VSS, l5 => U58_l5, l4 =>
        U58_l4, l33 => U58_l33, f(0) => f(0), f(1) => f(1),
        f(2) => f(2), m3 => U58_m3, m2 => U58_m2, m1 =>
        U58_m1 );

U59: loadmux
   port map ( l3 => U57_l2, fen => VSS, l5 => U59_l5, l4 =>
        U59_l4, l33 => U59_l33, f(0) => f(0), f(1) => f(1),
        f(2) => f(2), m3 => U59_m3, m2 => U59_m2, m1 =>
        U59_m1 );

U417: mx21d1
   port map ( I0 => d(23), I1 => VDD, S => U40_m1, Z => U417_Z );

U416: mx21d1
   port map ( I0 => d(22), I1 => VDD, S => U40_m1, Z => U416_Z );

U415: mx21d1
   port map ( I0 => d(21), I1 => VDD, S => U40_m1, Z => U415_Z );

U414: mx21d1
   port map ( I0 => d(20), I1 => VDD, S => U40_m1, Z => U414_Z );

U413: mx21d1
   port map ( I0 => d(19), I1 => VDD, S => U40_m1, Z => U413_Z );

U412: mx21d1
   port map ( I0 => d(18), I1 => VDD, S => U40_m1, Z => U412_Z );

U411: mx21d1
   port map ( I0 => d(17), I1 => VDD, S => U40_m1, Z => U411_Z );

U410: mx21d1
   port map ( I0 => d(16), I1 => VDD, S => U40_m1, Z => U410_Z );

U437: mx21d1
   port map ( I0 => d(7), I1 => VDD, S => U40_m3, Z => U437_Z );

U436: mx21d1
   port map ( I0 => d(6), I1 => VDD, S => U40_m3, Z => U436_Z );

U435: mx21d1
   port map ( I0 => d(5), I1 => VDD, S => U40_m3, Z => U435_Z );

U434: mx21d1
   port map ( I0 => d(4), I1 => VDD, S => U40_m3, Z => U434_Z );
```

```
signal U1126_do : Std_Logic;
signal U1125_do : Std_Logic;
signal U1124_do : Std_Logic;
signal U1123_do : Std_Logic;
signal U1122_do : Std_Logic;
signal U1121_do : Std_Logic;
signal U1120_do : Std_Logic;
signal S74 : Std_Logic;
signal S75 : Std_Logic;
signal S76 : Std_Logic;
signal S77 : Std_Logic;
signal S78 : Std_Logic;
signal S79 : Std_Logic;
signal S80 : Std_Logic;
signal S81 : Std_Logic;
signal S82 : Std_Logic;
signal S83 : Std_Logic;
signal S84 : Std_Logic;
signal S85 : Std_Logic;
signal S86 : Std_Logic;
signal S87 : Std_Logic;
signal S88 : Std_Logic;
signal S89 : Std_Logic;
signal S90 : Std_Logic;
signal S91 : Std_Logic;
signal S92 : Std_Logic;
signal S93 : Std_Logic;
signal S94 : Std_Logic;
signal S95 : Std_Logic;
signal S96 : Std_Logic;
signal S97 : Std_Logic;
signal U118_Z : Std_Logic;

begin

U1057: ff_enb2
   port map ( a => U120_Z, clk => clk, outt => c(55), rst =>
         ARESET, ld => U1147_do, nout => nc(55) );

U1056: ff_enb2
   port map ( a => U120_Z, clk => clk, outt => c(54), rst =>
         ARESET, ld => U1146_do, nout => nc(54) );

U1055: ff_enb2
   port map ( a => U120_Z, clk => clk, outt => c(53), rst =>
         ARESET, ld => U1145_do, nout => nc(53) );

U1054: ff_enb2
   port map ( a => U120_Z, clk => clk, outt => c(52), rst =>
         ARESET, ld => U1144_do, nout => nc(52) );

U1053: ff_enb2
   port map ( a => U120_Z, clk => clk, outt => c(51), rst =>
         ARESET, ld => U1143_do, nout => nc(51) );

U1052: ff_enb2
   port map ( a => U120_Z, clk => clk, outt => c(50), rst =>
```

```
U433: mx21d1
  port map ( I0 => d(3), I1 => VDD, S => U40_m3, Z => U433_Z );

U432: mx21d1
  port map ( I0 => d(2), I1 => VDD, S => U40_m3, Z => U432_Z );

U431: mx21d1
  port map ( I0 => d(1), I1 => VDD, S => U40_m3, Z => U431_Z );

U430: mx21d1
  port map ( I0 => d(0), I1 => VDD, S => U40_m3, Z => U430_Z );

U427: mx21d1
  port map ( I0 => d(15), I1 => VDD, S => U40_m2, Z => U427_Z );

U426: mx21d1
  port map ( I0 => d(14), I1 => VDD, S => U40_m2, Z => U426_Z );

U425: mx21d1
  port map ( I0 => d(13), I1 => VDD, S => U40_m2, Z => U425_Z );

U424: mx21d1
  port map ( I0 => d(12), I1 => VDD, S => U40_m2, Z => U424_Z );

U423: mx21d1
  port map ( I0 => d(11), I1 => VDD, S => U40_m2, Z => U423_Z );

U422: mx21d1
  port map ( I0 => d(10), I1 => VDD, S => U40_m2, Z => U422_Z );

U421: mx21d1
  port map ( I0 => d(9), I1 => VDD, S => U40_m2, Z => U421_Z );

U420: mx21d1
  port map ( I0 => d(8), I1 => VDD, S => U40_m2, Z => U420_Z );

U78: loadmux
  port map ( l3 => U100_p2, fen => VSS, l5 => U78_l5, l4 =>
        U78_l4, l33 => U78_l33, f(0) => f(0), f(1) => f(1),
        f(2) => f(2), m3 => U78_m3, m2 => U78_m2, m1 =>
        U78_m1 );

U40: loadmux
  port map ( l3 => U18_l2, fen => fstrobe, l5 => l55, l4 =>
        U40_l4, l33 => U40_l33, f(0) => f(0), f(1) => f(1),
        f(2) => f(2), m3 => U40_m3, m2 => U40_m2, m1 =>
        U40_m1 );

U57: demux4x1
  port map ( s0 => s0, s1 => s1, l0 => U57_l0, l1 => U57_l1, l2
        => U57_l2, ld => set );

U56: demux4x1
  port map ( s0 => s0, s1 => s1, l0 => U56_l0, l1 => U56_l1, l2
        => U56_l2, ld => rst );

U18: demux4x1
  port map ( s0 => s0, s1 => s1, l0 => U18_l0, l1 => U18_l1, l2
```

```
        => U18_I2, ld => load );

U1027: ff_enb2
   port map ( a => U121_Z, clk => clk, outt => c(63), rst =>
         ARESET, ld => U1157_do, nout => nc(63) );

U1026: ff_enb2
   port map ( a => U121_Z, clk => clk, outt => c(62), rst =>
         ARESET, ld => U1156_do, nout => nc(62) );

U1025: ff_enb2
   port map ( a => U121_Z, clk => clk, outt => c(61), rst =>
         ARESET, ld => U1155_do, nout => nc(61) );

U1024: ff_enb2
   port map ( a => U121_Z, clk => clk, outt => c(60), rst =>
         ARESET, ld => U1154_do, nout => nc(60) );

U1023: ff_enb2
   port map ( a => U121_Z, clk => clk, outt => c(59), rst =>
         ARESET, ld => U1153_do, nout => nc(59) );

U1022: ff_enb2
   port map ( a => U121_Z, clk => clk, outt => c(58), rst =>
         ARESET, ld => U1152_do, nout => nc(58) );

U1021: ff_enb2
   port map ( a => U121_Z, clk => clk, outt => c(57), rst =>
         ARESET, ld => U1151_do, nout => nc(57) );

U1020: ff_enb2
   port map ( a => U121_Z, clk => clk, outt => c(56), rst =>
         ARESET, ld => U1150_do, nout => nc(56) );

U1017: ff_enb2
   port map ( a => U123_Z, clk => clk, outt => c(71), rst =>
         ARESET, ld => U1167_do, nout => nc(71) );

U1016: ff_enb2
   port map ( a => U123_Z, clk => clk, outt => c(70), rst =>
         ARESET, ld => U1166_do, nout => nc(70) );

U1015: ff_enb2
   port map ( a => U123_Z, clk => clk, outt => c(69), rst =>
         ARESET, ld => U1165_do, nout => nc(69) );

U1014: ff_enb2
   port map ( a => U123_Z, clk => clk, outt => c(68), rst =>
         ARESET, ld => U1164_do, nout => nc(68) );

U1013: ff_enb2
   port map ( a => U123_Z, clk => clk, outt => c(67), rst =>
         ARESET, ld => U1163_do, nout => nc(67) );

U1012: ff_enb2
   port map ( a => U123_Z, clk => clk, outt => c(66), rst =>
         ARESET, ld => U1162_do, nout => nc(66) );
```

```
U1011: ff_enb2
   port map ( a => U123_Z, clk => clk, outt => c(65), rst =>
         ARESET, ld => U1161_do, nout => nc(65) );

U1010: ff_enb2
   port map ( a => U123_Z, clk => clk, outt => c(64), rst =>
         ARESET, ld => U1160_do, nout => nc(64) );

U123: or02d1
   port map ( A1 => I55, A2 => U78_I5, Z => U123_Z );

U1167: dgen
   port map ( d => U417_Z, r => U84_ZN, s => U59_I5, do =>
         U1167_do );

U1166: dgen
   port map ( d => U416_Z, r => U84_ZN, s => U59_I5, do =>
         U1166_do );

U1165: dgen
   port map ( d => U415_Z, r => U84_ZN, s => U59_I5, do =>
         U1165_do );

U1164: dgen
   port map ( d => U414_Z, r => U84_ZN, s => U59_I5, do =>
         U1164_do );

U1163: dgen
   port map ( d => U413_Z, r => U84_ZN, s => U59_I5, do =>
         U1163_do );

U1162: dgen
   port map ( d => U412_Z, r => U84_ZN, s => U59_I5, do =>
         U1162_do );

U1161: dgen
   port map ( d => U411_Z, r => U84_ZN, s => U59_I5, do =>
         U1161_do );

U1160: dgen
   port map ( d => U410_Z, r => U84_ZN, s => U59_I5, do =>
         U1160_do );

U84: nr02d1
   port map ( A1 => U58_I5, A2 => U78_I5, ZN => U84_ZN );

U82: nr02d1
   port map ( A1 => U78_I4, A2 => U58_I4, ZN => U82_ZN );

U121: or02d1
   port map ( A1 => U40_I4, A2 => U78_I4, Z => U121_Z );

U1157: dgen
   port map ( d => U427_Z, r => U82_ZN, s => U59_I4, do =>
         U1157_do );

U1156: dgen
   port map ( d => U426_Z, r => U82_ZN, s => U59_I4, do =>
```

```
        U1156_do );

U1155: dgen
   port map ( d => U425_Z, r => U82_ZN, s => U59_l4, do =>
        U1155_do );

U1154: dgen
   port map ( d => U424_Z, r => U82_ZN, s => U59_l4, do =>
        U1154_do );

U1153: dgen
   port map ( d => U423_Z, r => U82_ZN, s => U59_l4, do =>
        U1153_do );

U1152: dgen
   port map ( d => U422_Z, r => U82_ZN, s => U59_l4, do =>
        U1152_do );

U1151: dgen
   port map ( d => U421_Z, r => U82_ZN, s => U59_l4, do =>
        U1151_do );

U1150: dgen
   port map ( d => U420_Z, r => U82_ZN, s => U59_l4, do =>
        U1150_do );

U81: nr02d1
   port map ( A1 => U78_l33, A2 => U58_l33, ZN => U81_ZN );

U10723: ff_enb2
   port map ( a => U118_Z, clk => clk, outt => c(23), rst =>
        ARESET, ld => U11123_do, nout => nc(23) );

U10722: ff_enb2
   port map ( a => U118_Z, clk => clk, outt => c(22), rst =>
        ARESET, ld => U11122_do, nout => nc(22) );

U10721: ff_enb2
   port map ( a => U118_Z, clk => clk, outt => c(21), rst =>
        ARESET, ld => U11121_do, nout => nc(21) );

U10720: ff_enb2
   port map ( a => U118_Z, clk => clk, outt => c(20), rst =>
        ARESET, ld => U11120_do, nout => nc(20) );

U10719: ff_enb2
   port map ( a => U118_Z, clk => clk, outt => c(19), rst =>
        ARESET, ld => U11119_do, nout => nc(19) );

U10718: ff_enb2
   port map ( a => U118_Z, clk => clk, outt => c(18), rst =>
        ARESET, ld => U11118_do, nout => nc(18) );

U10717: ff_enb2
   port map ( a => U118_Z, clk => clk, outt => c(17), rst =>
        ARESET, ld => U11117_do, nout => nc(17) );

U10716: ff_enb2
```

```
   port map ( a => U118_Z, clk => clk, outt => c(16), rst =>
         ARESET, ld => U11116_do, nout => nc(16) );

U10715: ff_enb2
   port map ( a => U118_Z, clk => clk, outt => c(15), rst =>
         ARESET, ld => U11115_do, nout => nc(15) );

U10714: ff_enb2
   port map ( a => U118_Z, clk => clk, outt => c(14), rst =>
         ARESET, ld => U11114_do, nout => nc(14) );

U10713: ff_enb2
   port map ( a => U118_Z, clk => clk, outt => c(13), rst =>
         ARESET, ld => U11113_do, nout => nc(13) );

U10712: ff_enb2
   port map ( a => U118_Z, clk => clk, outt => c(12), rst =>
         ARESET, ld => U11112_do, nout => nc(12) );

U10711: ff_enb2
   port map ( a => U118_Z, clk => clk, outt => c(11), rst =>
         ARESET, ld => U11111_do, nout => nc(11) );

U10710: ff_enb2
   port map ( a => U118_Z, clk => clk, outt => c(10), rst =>
         ARESET, ld => U11110_do, nout => nc(10) );

U1079: ff_enb2
   port map ( a => U118_Z, clk => clk, outt => c(9), rst =>
         ARESET, ld => U1119_do, nout => nc(9) );

U1078: ff_enb2
   port map ( a => U118_Z, clk => clk, outt => c(8), rst =>
         ARESET, ld => U1118_do, nout => nc(8) );

U1077: ff_enb2
   port map ( a => U118_Z, clk => clk, outt => c(7), rst =>
         ARESET, ld => U1117_do, nout => nc(7) );

U1076: ff_enb2
   port map ( a => U118_Z, clk => clk, outt => c(6), rst =>
         ARESET, ld => U1116_do, nout => nc(6) );

U1075: ff_enb2
   port map ( a => U118_Z, clk => clk, outt => c(5), rst =>
         ARESET, ld => U1115_do, nout => nc(5) );

U1074: ff_enb2
   port map ( a => U118_Z, clk => clk, outt => c(4), rst =>
         ARESET, ld => U1114_do, nout => nc(4) );

U1073: ff_enb2
   port map ( a => U118_Z, clk => clk, outt => c(3), rst =>
         ARESET, ld => U1113_do, nout => nc(3) );

U1072: ff_enb2
   port map ( a => U118_Z, clk => clk, outt => c(2), rst =>
         ARESET, ld => U1112_do, nout => nc(2) );
```

```
U1071: ff_enb2
  port map ( a => U118_Z, clk => clk, outt => c(1), rst =>
        ARESET, ld => U1111_do, nout => nc(1) );

U1070: ff_enb2
  port map ( a => U118_Z, clk => clk, outt => c(0), rst =>
        ARESET, ld => U1110_do, nout => nc(0) );

U10823: ff_enb2
  port map ( a => U119_Z, clk => clk, outt => c(47), rst =>
        ARESET, ld => U11223_do, nout => nc(47) );

U10822: ff_enb2
  port map ( a => U119_Z, clk => clk, outt => c(46), rst =>
        ARESET, ld => U11222_do, nout => nc(46) );

U10821: ff_enb2
  port map ( a => U119_Z, clk => clk, outt => c(45), rst =>
        ARESET, ld => U11221_do, nout => nc(45) );

U10820: ff_enb2
  port map ( a => U119_Z, clk => clk, outt => c(44), rst =>
        ARESET, ld => U11220_do, nout => nc(44) );

U10819: ff_enb2
  port map ( a => U119_Z, clk => clk, outt => c(43), rst =>
        ARESET, ld => U11219_do, nout => nc(43) );

U10818: ff_enb2
  port map ( a => U119_Z, clk => clk, outt => c(42), rst =>
        ARESET, ld => U11218_do, nout => nc(42) );

U10817: ff_enb2
  port map ( a => U119_Z, clk => clk, outt => c(41), rst =>
        ARESET, ld => U11217_do, nout => nc(41) );

U10816: ff_enb2
  port map ( a => U119_Z, clk => clk, outt => c(40), rst =>
        ARESET, ld => U11216_do, nout => nc(40) );

U10815: ff_enb2
  port map ( a => U119_Z, clk => clk, outt => c(39), rst =>
        ARESET, ld => U11215_do, nout => nc(39) );

U10814: ff_enb2
  port map ( a => U119_Z, clk => clk, outt => c(38), rst =>
        ARESET, ld => U11214_do, nout => nc(38) );

U10813: ff_enb2
  port map ( a => U119_Z, clk => clk, outt => c(37), rst =>
        ARESET, ld => U11213_do, nout => nc(37) );

U10812: ff_enb2
  port map ( a => U119_Z, clk => clk, outt => c(36), rst =>
        ARESET, ld => U11212_do, nout => nc(36) );

U10811: ff_enb2
```

```
   port map ( a => U119_Z, clk => clk, outt => c(35), rst =>
         ARESET, ld => U11211_do, nout => nc(35) );

U10810: ff_enb2
   port map ( a => U119_Z, clk => clk, outt => c(34), rst =>
         ARESET, ld => U11210_do, nout => nc(34) );

U1089: ff_enb2
   port map ( a => U119_Z, clk => clk, outt => c(33), rst =>
         ARESET, ld => U1129_do, nout => nc(33) );

U1088: ff_enb2
   port map ( a => U119_Z, clk => clk, outt => c(32), rst =>
         ARESET, ld => U1128_do, nout => nc(32) );

U1087: ff_enb2
   port map ( a => U119_Z, clk => clk, outt => c(31), rst =>
         ARESET, ld => U1127_do, nout => nc(31) );

U1086: ff_enb2
   port map ( a => U119_Z, clk => clk, outt => c(30), rst =>
         ARESET, ld => U1126_do, nout => nc(30) );

U1085: ff_enb2
   port map ( a => U119_Z, clk => clk, outt => c(29), rst =>
         ARESET, ld => U1125_do, nout => nc(29) );

U1084: ff_enb2
   port map ( a => U119_Z, clk => clk, outt => c(28), rst =>
         ARESET, ld => U1124_do, nout => nc(28) );

U1083: ff_enb2
   port map ( a => U119_Z, clk => clk, outt => c(27), rst =>
         ARESET, ld => U1123_do, nout => nc(27) );

U1082: ff_enb2
   port map ( a => U119_Z, clk => clk, outt => c(26), rst =>
         ARESET, ld => U1122_do, nout => nc(26) );

U1081: ff_enb2
   port map ( a => U119_Z, clk => clk, outt => c(25), rst =>
         ARESET, ld => U1121_do, nout => nc(25) );

U1080: ff_enb2
   port map ( a => U119_Z, clk => clk, outt => c(24), rst =>
         ARESET, ld => U1120_do, nout => nc(24) );

U118: or02d1
   port map ( A1 => U18_l0, A2 => U100_p0, Z => U118_Z );

U11123: dgen
   port map ( d => d(23), r => U85_ZN, s => U57_l0, do =>
         U11123_do );

U11122: dgen
   port map ( d => d(22), r => U85_ZN, s => U57_l0, do =>
         U11122_do );
```

```
U11121: dgen
   port map ( d => d(21), r => U85_ZN, s => U57_l0, do =>
         U11121_do );

U11120: dgen
   port map ( d => d(20), r => U85_ZN, s => U57_l0, do =>
         U11120_do );

U11119: dgen
   port map ( d => d(19), r => U85_ZN, s => U57_l0, do =>
         U11119_do );

U11118: dgen
   port map ( d => d(18), r => U85_ZN, s => U57_l0, do =>
         U11118_do );

U11117: dgen
   port map ( d => d(17), r => U85_ZN, s => U57_l0, do =>
         U11117_do );

U11116: dgen
   port map ( d => d(16), r => U85_ZN, s => U57_l0, do =>
         U11116_do );

U11115: dgen
   port map ( d => d(15), r => U85_ZN, s => U57_l0, do =>
         U11115_do );

U11114: dgen
   port map ( d => d(14), r => U85_ZN, s => U57_l0, do =>
         U11114_do );

U11113: dgen
   port map ( d => d(13), r => U85_ZN, s => U57_l0, do =>
         U11113_do );

U11112: dgen
   port map ( d => d(12), r => U85_ZN, s => U57_l0, do =>
         U11112_do );

U11111: dgen
   port map ( d => d(11), r => U85_ZN, s => U57_l0, do =>
         U11111_do );

U11110: dgen
   port map ( d => d(10), r => U85_ZN, s => U57_l0, do =>
         U11110_do );

U1119: dgen
   port map ( d => d(9), r => U85_ZN, s => U57_l0, do =>
         U1119_do );

U1118: dgen
   port map ( d => d(8), r => U85_ZN, s => U57_l0, do =>
         U1118_do );

U1117: dgen
   port map ( d => d(7), r => U85_ZN, s => U57_l0, do =>
```

```
        U1117_do );

U1116: dgen
   port map ( d => d(6), r => U85_ZN, s => U57_I0, do =>
        U1116_do );

U1115: dgen
   port map ( d => d(5), r => U85_ZN, s => U57_I0, do =>
        U1115_do );

U1114: dgen
   port map ( d => d(4), r => U85_ZN, s => U57_I0, do =>
        U1114_do );

U1113: dgen
   port map ( d => d(3), r => U85_ZN, s => U57_I0, do =>
        U1113_do );

U1112: dgen
   port map ( d => d(2), r => U85_ZN, s => U57_I0, do =>
        U1112_do );

U1111: dgen
   port map ( d => d(1), r => U85_ZN, s => U57_I0, do =>
        U1111_do );

U1110: dgen
   port map ( d => d(0), r => U85_ZN, s => U57_I0, do =>
        U1110_do );

U119: or02d1
   port map ( A1 => U18_I1, A2 => U100_p1, Z => U119_Z );

U120: or02d1
   port map ( A1 => U40_I33, A2 => U78_I33, Z => U120_Z );

U85: nr02d1
   port map ( A1 => U100_p0, A2 => U56_I0, ZN => U85_ZN );

U88: nr02d1
   port map ( A1 => U100_p1, A2 => U56_I1, ZN => U88_ZN );

U11223: dgen
   port map ( d => d(23), r => U88_ZN, s => U57_I1, do =>
        U11223_do );

U11222: dgen
   port map ( d => d(22), r => U88_ZN, s => U57_I1, do =>
        U11222_do );

U11221: dgen
   port map ( d => d(21), r => U88_ZN, s => U57_I1, do =>
        U11221_do );

U11220: dgen
   port map ( d => d(20), r => U88_ZN, s => U57_I1, do =>
        U11220_do );
```

```
U11219: dgen
   port map ( d => d(19), r => U88_ZN, s => U57_11, do =>
        U11219_do );

U11218: dgen
   port map ( d => d(18), r => U88_ZN, s => U57_11, do =>
        U11218_do );

U11217: dgen
   port map ( d => d(17), r => U88_ZN, s => U57_11, do =>
        U11217_do );

U11216: dgen
   port map ( d => d(16), r => U88_ZN, s => U57_11, do =>
        U11216_do );

U11215: dgen
   port map ( d => d(15), r => U88_ZN, s => U57_11, do =>
        U11215_do );

U11214: dgen
   port map ( d => d(14), r => U88_ZN, s => U57_11, do =>
        U11214_do );

U11213: dgen
   port map ( d => d(13), r => U88_ZN, s => U57_11, do =>
        U11213_do );

U11212: dgen
   port map ( d => d(12), r => U88_ZN, s => U57_11, do =>
        U11212_do );

U11211: dgen
   port map ( d => d(11), r => U88_ZN, s => U57_11, do =>
        U11211_do );

U11210: dgen
   port map ( d => d(10), r => U88_ZN, s => U57_11, do =>
        U11210_do );

U1129: dgen
   port map ( d => d(9), r => U88_ZN, s => U57_11, do =>
        U1129_do );

U1128: dgen
   port map ( d => d(8), r => U88_ZN, s => U57_11, do =>
        U1128_do );

U1127: dgen
   port map ( d => d(7), r => U88_ZN, s => U57_11, do =>
        U1127_do );

U1126: dgen
   port map ( d => d(6), r => U88_ZN, s => U57_11, do =>
        U1126_do );

U1125: dgen
   port map ( d => d(5), r => U88_ZN, s => U57_11, do =>
```

```
        U1125_do );

  U1124: dgen
     port map ( d => d(4), r => U88_ZN, s => U57_I1, do =>
        U1124_do );

  U1123: dgen
     port map ( d => d(3), r => U88_ZN, s => U57_I1, do =>
        U1123_do );

  U1122: dgen
     port map ( d => d(2), r => U88_ZN, s => U57_I1, do =>
        U1122_do );

  U1121: dgen
     port map ( d => d(1), r => U88_ZN, s => U57_I1, do =>
        U1121_do );

  U1120: dgen
     port map ( d => d(0), r => U88_ZN, s => U57_I1, do =>
        U1120_do );

  U1147: dgen
     port map ( d => U437_Z, r => U81_ZN, s => U59_I33, do =>
        U1147_do );

  U1146: dgen
     port map ( d => U436_Z, r => U81_ZN, s => U59_I33, do =>
        U1146_do );

  U1145: dgen
     port map ( d => U435_Z, r => U81_ZN, s => U59_I33, do =>
        U1145_do );

  U1144: dgen
     port map ( d => U434_Z, r => U81_ZN, s => U59_I33, do =>
        U1144_do );

  U1143: dgen
     port map ( d => U433_Z, r => U81_ZN, s => U59_I33, do =>
        U1143_do );

  U1142: dgen
     port map ( d => U432_Z, r => U81_ZN, s => U59_I33, do =>
        U1142_do );

  U1141: dgen
     port map ( d => U431_Z, r => U81_ZN, s => U59_I33, do =>
        U1141_do );

  U1140: dgen
     port map ( d => U430_Z, r => U81_ZN, s => U59_I33, do =>
        U1140_do );

  U100: amos
     port map ( p0 => U100_p0, p1 => U100_p1, p2 => U100_p2, I2 =>
        U18_I2, ex => ex, I1 => U18_I1, I0 => U18_I0 );
end mask_reg;
```

```
file: MODEL1.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity model1 is


   port ( Resp : in Std_Logic := 'U';
        P_In : in Std_Logic := 'U';

        NR : out Std_Logic := 'U';
        P_Out : out Std_Logic := 'U' );

end model1;

------------------------------------------------------------------------

architecture model1 OF model1 is



   signal P_Out_local: Std_Logic;
   signal U42_ZN : Std_Logic;

begin

   U43: nr02d0
      port map ( A1 => P_Out_local, A2 => U42_ZN, ZN => NR );

   U42: in01d0
      port map ( I => Resp, ZN => U42_ZN );

   U36: xo02d1
      port map ( A1 => P_In, A2 => Resp, Z => P_Out_local );

   P_Out <= P_Out_local;

end model1;
```

```
file: MUX3X1.VHD
-- Date of netlist generation: Nov-4-93

-----------------------------------------------------------------------

library IEEE;
use IEEE.STD_LOGIC_1164.ALL;

library COMPASS_LIB;
use COMPASS_LIB.COMPASS.ALL;

entity mux3x1 is


   port ( o0 : in Std_Logic_Vector(23 downto 0) := (others => 'U');
        o1 : in Std_Logic_Vector(23 downto 0) := (others => 'U');
        o2 : in Std_Logic_Vector(23 downto 0) := (others => 'U');
        sector : in Std_Logic_Vector(1 downto 0) := (others =>
'U');

        orr : out Std_Logic_Vector(23 downto 0) := (others => 'U')
);

end mux3x1;

-----------------------------------------------------------------------

architecture mux3x1 OF mux3x1 is


   signal U4_ZN : Std_Logic;
   signal U6_ZN : Std_Logic;
   signal U1223_Z : Std_Logic;
   signal U1222_Z : Std_Logic;
   signal U1221_Z : Std_Logic;
   signal U1220_Z : Std_Logic;
   signal U1219_Z : Std_Logic;
   signal U1218_Z : Std_Logic;
   signal U1217_Z : Std_Logic;
   signal U1216_Z : Std_Logic;
   signal U1215_Z : Std_Logic;
   signal U1214_Z : Std_Logic;
   signal U1213_Z : Std_Logic;
   signal U1212_Z : Std_Logic;
   signal U1211_Z : Std_Logic;
   signal U1210_Z : Std_Logic;
   signal U129_Z : Std_Logic;
   signal U128_Z : Std_Logic;
   signal U127_Z : Std_Logic;
   signal U126_Z : Std_Logic;
   signal U125_Z : Std_Logic;
   signal U124_Z : Std_Logic;
   signal U123_Z : Std_Logic;
   signal U122_Z : Std_Logic;
```

```
signal U121_Z : Std_Logic;
signal U120_Z : Std_Logic;
signal U1123_Z : Std_Logic;
signal U1122_Z : Std_Logic;
signal U1121_Z : Std_Logic;
signal U1120_Z : Std_Logic;
signal U1119_Z : Std_Logic;
signal U1118_Z : Std_Logic;
signal U1117_Z : Std_Logic;
signal U1116_Z : Std_Logic;
signal U1115_Z : Std_Logic;
signal U1114_Z : Std_Logic;
signal U1113_Z : Std_Logic;
signal U1112_Z : Std_Logic;
signal U1111_Z : Std_Logic;
signal U1110_Z : Std_Logic;
signal U119_Z : Std_Logic;
signal U118_Z : Std_Logic;
signal U117_Z : Std_Logic;
signal U116_Z : Std_Logic;
signal U115_Z : Std_Logic;
signal U114_Z : Std_Logic;
signal U113_Z : Std_Logic;
signal U112_Z : Std_Logic;
signal U111_Z : Std_Logic;
signal U110_Z : Std_Logic;
signal U923_Z : Std_Logic;
signal U922_Z : Std_Logic;
signal U921_Z : Std_Logic;
signal U920_Z : Std_Logic;
signal U919_Z : Std_Logic;
signal U918_Z : Std_Logic;
signal U917_Z : Std_Logic;
signal U916_Z : Std_Logic;
signal U915_Z : Std_Logic;
signal U914_Z : Std_Logic;
signal U913_Z : Std_Logic;
signal U912_Z : Std_Logic;
signal U911_Z : Std_Logic;
signal U910_Z : Std_Logic;
signal U99_Z : Std_Logic;
signal U98_Z : Std_Logic;
signal U97_Z : Std_Logic;
signal U96_Z : Std_Logic;
signal U95_Z : Std_Logic;
signal U94_Z : Std_Logic;
signal U93_Z : Std_Logic;
signal U92_Z : Std_Logic;
signal U91_Z : Std_Logic;
signal U90_Z : Std_Logic;

begin

U923: an03d1
  port map ( A1 => U4_ZN, A2 => U6_ZN, A3 => o0(23), Z =>
        U923_Z );
```

```
U922: an03d1
   port map ( A1 => U4_ZN, A2 => U6_ZN, A3 => o0(22), Z =>
        U922_Z );

U921: an03d1
   port map ( A1 => U4_ZN, A2 => U6_ZN, A3 => o0(21), Z =>
        U921_Z );

U920: an03d1
   port map ( A1 => U4_ZN, A2 => U6_ZN, A3 => o0(20), Z =>
        U920_Z );

U919: an03d1
   port map ( A1 => U4_ZN, A2 => U6_ZN, A3 => o0(19), Z =>
        U919_Z );

U918: an03d1
   port map ( A1 => U4_ZN, A2 => U6_ZN, A3 => o0(18), Z =>
        U918_Z );

U917: an03d1
   port map ( A1 => U4_ZN, A2 => U6_ZN, A3 => o0(17), Z =>
        U917_Z );

U916: an03d1
   port map ( A1 => U4_ZN, A2 => U6_ZN, A3 => o0(16), Z =>
        U916_Z );

U915: an03d1
   port map ( A1 => U4_ZN, A2 => U6_ZN, A3 => o0(15), Z =>
        U915_Z );

U914: an03d1
   port map ( A1 => U4_ZN, A2 => U6_ZN, A3 => o0(14), Z =>
        U914_Z );

U913: an03d1
   port map ( A1 => U4_ZN, A2 => U6_ZN, A3 => o0(13), Z =>
        U913_Z );

U912: an03d1
   port map ( A1 => U4_ZN, A2 => U6_ZN, A3 => o0(12), Z =>
        U912_Z );

U911: an03d1
   port map ( A1 => U4_ZN, A2 => U6_ZN, A3 => o0(11), Z =>
        U911_Z );

U910: an03d1
   port map ( A1 => U4_ZN, A2 => U6_ZN, A3 => o0(10), Z =>
        U910_Z );

U99: an03d1
   port map ( A1 => U4_ZN, A2 => U6_ZN, A3 => o0(9), Z => U99_Z
        );

U98: an03d1
   port map ( A1 => U4_ZN, A2 => U6_ZN, A3 => o0(8), Z => U98_Z
```

```
        );

U97: an03d1
   port map ( A1 => U4_ZN, A2 => U6_ZN, A3 => o0(7), Z => U97_Z
        );

U96: an03d1
   port map ( A1 => U4_ZN, A2 => U6_ZN, A3 => o0(6), Z => U96_Z
        );

U95: an03d1
   port map ( A1 => U4_ZN, A2 => U6_ZN, A3 => o0(5), Z => U95_Z
        );

U94: an03d1
   port map ( A1 => U4_ZN, A2 => U6_ZN, A3 => o0(4), Z => U94_Z
        );

U93: an03d1
   port map ( A1 => U4_ZN, A2 => U6_ZN, A3 => o0(3), Z => U93_Z
        );

U92: an03d1
   port map ( A1 => U4_ZN, A2 => U6_ZN, A3 => o0(2), Z => U92_Z
        );

U91: an03d1
   port map ( A1 => U4_ZN, A2 => U6_ZN, A3 => o0(1), Z => U91_Z
        );

U90: an03d1
   port map ( A1 => U4_ZN, A2 => U6_ZN, A3 => o0(0), Z => U90_Z
        );

U6: in01d1
   port map ( I => sector(1), ZN => U6_ZN );

U4: in01d1
   port map ( I => sector(0), ZN => U4_ZN );

U1323: OR03D2
   port map ( A1 => U923_Z, A2 => U1123_Z, A3 => U1223_Z, Z =>
        orr(23) );

U1322: OR03D2
   port map ( A1 => U922_Z, A2 => U1122_Z, A3 => U1222_Z, Z =>
        orr(22) );

U1321: OR03D2
   port map ( A1 => U921_Z, A2 => U1121_Z, A3 => U1221_Z, Z =>
        orr(21) );

U1320: OR03D2
   port map ( A1 => U920_Z, A2 => U1120_Z, A3 => U1220_Z, Z =>
        orr(20) );

U1319: OR03D2
   port map ( A1 => U919_Z, A2 => U1119_Z, A3 => U1219_Z, Z =>
```

```
        orr(19) );

U1318: OR03D2
   port map ( A1 => U918_Z, A2 => U1118_Z, A3 => U1218_Z, Z =>
        orr(18) );

U1317: OR03D2
   port map ( A1 => U917_Z, A2 => U1117_Z, A3 => U1217_Z, Z =>
        orr(17) );

U1316: OR03D2
   port map ( A1 => U916_Z, A2 => U1116_Z, A3 => U1216_Z, Z =>
        orr(16) );

U1315: OR03D2
   port map ( A1 => U915_Z, A2 => U1115_Z, A3 => U1215_Z, Z =>
        orr(15) );

U1314: OR03D2
   port map ( A1 => U914_Z, A2 => U1114_Z, A3 => U1214_Z, Z =>
        orr(14) );

U1313: OR03D2
   port map ( A1 => U913_Z, A2 => U1113_Z, A3 => U1213_Z, Z =>
        orr(13) );

U1312: OR03D2
   port map ( A1 => U912_Z, A2 => U1112_Z, A3 => U1212_Z, Z =>
        orr(12) );

U1311: OR03D2
   port map ( A1 => U911_Z, A2 => U1111_Z, A3 => U1211_Z, Z =>
        orr(11) );

U1310: OR03D2
   port map ( A1 => U910_Z, A2 => U1110_Z, A3 => U1210_Z, Z =>
        orr(10) );

U139: OR03D2
   port map ( A1 => U99_Z, A2 => U119_Z, A3 => U129_Z, Z =>
        orr(9) );

U138: OR03D2
   port map ( A1 => U98_Z, A2 => U118_Z, A3 => U128_Z, Z =>
        orr(8) );

U137: OR03D2
   port map ( A1 => U97_Z, A2 => U117_Z, A3 => U127_Z, Z =>
        orr(7) );

U136: OR03D2
   port map ( A1 => U96_Z, A2 => U116_Z, A3 => U126_Z, Z =>
        orr(6) );

U135: OR03D2
   port map ( A1 => U95_Z, A2 => U115_Z, A3 => U125_Z, Z =>
        orr(5) );
```

```
U134: OR03D2
   port map ( A1 => U94_Z, A2 => U114_Z, A3 => U124_Z, Z =>
        orr(4) );

U133: OR03D2
   port map ( A1 => U93_Z, A2 => U113_Z, A3 => U123_Z, Z =>
        orr(3) );

U132: OR03D2
   port map ( A1 => U92_Z, A2 => U112_Z, A3 => U122_Z, Z =>
        orr(2) );

U131: OR03D2
   port map ( A1 => U91_Z, A2 => U111_Z, A3 => U121_Z, Z =>
        orr(1) );

U130: OR03D2
   port map ( A1 => U90_Z, A2 => U110_Z, A3 => U120_Z, Z =>
        orr(0) );

U1123: an03d1
   port map ( A1 => sector(0), A2 => U6_ZN, A3 => o1(23), Z =>
        U1123_Z );

U1122: an03d1
   port map ( A1 => sector(0), A2 => U6_ZN, A3 => o1(22), Z =>
        U1122_Z );

U1121: an03d1
   port map ( A1 => sector(0), A2 => U6_ZN, A3 => o1(21), Z =>
        U1121_Z );

U1120: an03d1
   port map ( A1 => sector(0), A2 => U6_ZN, A3 => o1(20), Z =>
        U1120_Z );

U1119: an03d1
   port map ( A1 => sector(0), A2 => U6_ZN, A3 => o1(19), Z =>
        U1119_Z );

U1118: an03d1
   port map ( A1 => sector(0), A2 => U6_ZN, A3 => o1(18), Z =>
        U1118_Z );

U1117: an03d1
   port map ( A1 => sector(0), A2 => U6_ZN, A3 => o1(17), Z =>
        U1117_Z );

U1116: an03d1
   port map ( A1 => sector(0), A2 => U6_ZN, A3 => o1(16), Z =>
        U1116_Z );

U1115: an03d1
   port map ( A1 => sector(0), A2 => U6_ZN, A3 => o1(15), Z =>
        U1115_Z );

U1114: an03d1
   port map ( A1 => sector(0), A2 => U6_ZN, A3 => o1(14), Z =>
```

```
        U1114_Z );

U1113: an03d1
   port map ( A1 => sector(0), A2 => U6_ZN, A3 => o1(13), Z =>
        U1113_Z );

U1112: an03d1
   port map ( A1 => sector(0), A2 => U6_ZN, A3 => o1(12), Z =>
        U1112_Z );

U1111: an03d1
   port map ( A1 => sector(0), A2 => U6_ZN, A3 => o1(11), Z =>
        U1111_Z );

U1110: an03d1
   port map ( A1 => sector(0), A2 => U6_ZN, A3 => o1(10), Z =>
        U1110_Z );

U119: an03d1
   port map ( A1 => sector(0), A2 => U6_ZN, A3 => o1(9), Z =>
        U119_Z );

U118: an03d1
   port map ( A1 => sector(0), A2 => U6_ZN, A3 => o1(8), Z =>
        U118_Z );

U117: an03d1
   port map ( A1 => sector(0), A2 => U6_ZN, A3 => o1(7), Z =>
        U117_Z );

U116: an03d1
   port map ( A1 => sector(0), A2 => U6_ZN, A3 => o1(6), Z =>
        U116_Z );

U115: an03d1
   port map ( A1 => sector(0), A2 => U6_ZN, A3 => o1(5), Z =>
        U115_Z );

U114: an03d1
   port map ( A1 => sector(0), A2 => U6_ZN, A3 => o1(4), Z =>
        U114_Z );

U113: an03d1
   port map ( A1 => sector(0), A2 => U6_ZN, A3 => o1(3), Z =>
        U113_Z );

U112: an03d1
   port map ( A1 => sector(0), A2 => U6_ZN, A3 => o1(2), Z =>
        U112_Z );

U111: an03d1
   port map ( A1 => sector(0), A2 => U6_ZN, A3 => o1(1), Z =>
        U111_Z );

U110: an03d1
   port map ( A1 => sector(0), A2 => U6_ZN, A3 => o1(0), Z =>
        U110_Z );
```

```
U1223: an03d1
   port map ( A1 => U4_ZN, A2 => sector(1), A3 => o2(23), Z =>
        U1223_Z );

U1222: an03d1
   port map ( A1 => U4_ZN, A2 => sector(1), A3 => o2(22), Z =>
        U1222_Z );

U1221: an03d1
   port map ( A1 => U4_ZN, A2 => sector(1), A3 => o2(21), Z =>
        U1221_Z );

U1220: an03d1
   port map ( A1 => U4_ZN, A2 => sector(1), A3 => o2(20), Z =>
        U1220_Z );

U1219: an03d1
   port map ( A1 => U4_ZN, A2 => sector(1), A3 => o2(19), Z =>
        U1219_Z );

U1218: an03d1
   port map ( A1 => U4_ZN, A2 => sector(1), A3 => o2(18), Z =>
        U1218_Z );

U1217: an03d1
   port map ( A1 => U4_ZN, A2 => sector(1), A3 => o2(17), Z =>
        U1217_Z );

U1216: an03d1
   port map ( A1 => U4_ZN, A2 => sector(1), A3 => o2(16), Z =>
        U1216_Z );

U1215: an03d1
   port map ( A1 => U4_ZN, A2 => sector(1), A3 => o2(15), Z =>
        U1215_Z );

U1214: an03d1
   port map ( A1 => U4_ZN, A2 => sector(1), A3 => o2(14), Z =>
        U1214_Z );

U1213: an03d1
   port map ( A1 => U4_ZN, A2 => sector(1), A3 => o2(13), Z =>
        U1213_Z );

U1212: an03d1
   port map ( A1 => U4_ZN, A2 => sector(1), A3 => o2(12), Z =>
        U1212_Z );

U1211: an03d1
   port map ( A1 => U4_ZN, A2 => sector(1), A3 => o2(11), Z =>
        U1211_Z );

U1210: an03d1
   port map ( A1 => U4_ZN, A2 => sector(1), A3 => o2(10), Z =>
        U1210_Z );

U129: an03d1
   port map ( A1 => U4_ZN, A2 => sector(1), A3 => o2(9), Z =>
```

```
         U129_Z );

   U128: an03d1
      port map ( A1 => U4_ZN, A2 => sector(1), A3 => o2(8), Z =>
         U128_Z );

   U127: an03d1
      port map ( A1 => U4_ZN, A2 => sector(1), A3 => o2(7), Z =>
         U127_Z );

   U126: an03d1
      port map ( A1 => U4_ZN, A2 => sector(1), A3 => o2(6), Z =>
         U126_Z );

   U125: an03d1
      port map ( A1 => U4_ZN, A2 => sector(1), A3 => o2(5), Z =>
         U125_Z );

   U124: an03d1
      port map ( A1 => U4_ZN, A2 => sector(1), A3 => o2(4), Z =>
         U124_Z );

   U123: an03d1
      port map ( A1 => U4_ZN, A2 => sector(1), A3 => o2(3), Z =>
         U123_Z );

   U122: an03d1
      port map ( A1 => U4_ZN, A2 => sector(1), A3 => o2(2), Z =>
         U122_Z );

   U121: an03d1
      port map ( A1 => U4_ZN, A2 => sector(1), A3 => o2(1), Z =>
         U121_Z );

   U120: an03d1
      port map ( A1 => U4_ZN, A2 => sector(1), A3 => o2(0), Z =>
         U120_Z );

end mux3x1;
```

```
file: OREG.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity oreg is


   port ( ldor : in Std_Logic := 'U';
        s0 : in Std_Logic := 'U';
        s1 : in Std_Logic := 'U';
        ldorf : in Std_Logic := 'U';
        f : in Std_Logic_Vector(0 to 2) := (others => 'U');
        o : in Std_Logic_Vector(71 downto 0) := (others => 'U');

        vout : out Std_Logic_Vector(23 downto 0) := (others =>
'U');
        orr : out Std_Logic_Vector(23 downto 0) := (others => 'U')
);

end oreg;


------------------------------------------------------------------------

architecture oreg OF oreg is

   component demux2x1
      port ( m : in Std_Logic;
           i : in Std_Logic;

           o1 : out Std_Logic;
           o0 : out Std_Logic );
   end component;

   component ff_enb2
      port ( a : in Std_Logic;
           clk : in Std_Logic;
           rst : in Std_Logic;
           ld : in Std_Logic;

           outt : out Std_Logic;
           nout : out Std_Logic );
   end component;

   component loadmux
      port ( l3 : in Std_Logic;
           fen : in Std_Logic;
           f : in Std_Logic_Vector(0 to 2) := (others => 'U');

           l5 : out Std_Logic;
```

```
        l4 : out Std_Logic;
        l33 : out Std_Logic;
        m3 : out Std_Logic;
        m2 : out Std_Logic;
        m1 : out Std_Logic );
  end component;

  component demux4x1
     port ( s0 : in Std_Logic;
        s1 : in Std_Logic;
        ld : in Std_Logic;

        l0 : out Std_Logic;
        l1 : out Std_Logic;
        l2 : out Std_Logic );
  end component;

  component mux3x1
     port ( o0 : in Std_Logic_Vector(23 downto 0) := (others =>
'U');
        o1 : in Std_Logic_Vector(23 downto 0) := (others =>
'U');
        o2 : in Std_Logic_Vector(23 downto 0) := (others =>
'U');
        sector : in Std_Logic_Vector(1 downto 0) := (others =>
'U');

        orr : out Std_Logic_Vector(23 downto 0) := (others =>
'U') );
  end component;

  signal U40_l5 : Std_Logic;
  signal U40_m1 : Std_Logic;
  signal U40_l4 : Std_Logic;
  signal U18_l2 : Std_Logic;
  signal U40_m3 : Std_Logic;
  signal U40_l33 : Std_Logic;
  signal U40_m2 : Std_Logic;
  signal U18_l0 : Std_Logic;
  signal U18_l1 : Std_Logic;
  signal S2 : Std_Logic;
  signal S3 : Std_Logic;
  signal S4 : Std_Logic;
  signal S5 : Std_Logic;
  signal S6 : Std_Logic;
  signal S7 : Std_Logic;
  signal S8 : Std_Logic;
  signal S9 : Std_Logic;
  signal S10 : Std_Logic;
  signal S11 : Std_Logic;
  signal S12 : Std_Logic;
  signal S13 : Std_Logic;
  signal S14 : Std_Logic;
  signal S15 : Std_Logic;
  signal S16 : Std_Logic;
  signal S17 : Std_Logic;
  signal S18 : Std_Logic;
  signal S19 : Std_Logic;
```

```
signal S20 : Std_Logic;
signal S21 : Std_Logic;
signal S22 : Std_Logic;
signal S23 : Std_Logic;
signal S24 : Std_Logic;
signal S25 : Std_Logic;
signal c : Std_Logic_Vector(71 downto 0);
signal U577_nout : Std_Logic;
signal U576_nout : Std_Logic;
signal U575_nout : Std_Logic;
signal U574_nout : Std_Logic;
signal U573_nout : Std_Logic;
signal U572_nout : Std_Logic;
signal U571_nout : Std_Logic;
signal U570_nout : Std_Logic;
signal o2 : Std_Logic_Vector(23 downto 0);
signal U597_nout : Std_Logic;
signal U596_nout : Std_Logic;
signal U595_nout : Std_Logic;
signal U594_nout : Std_Logic;
signal U593_nout : Std_Logic;
signal U592_nout : Std_Logic;
signal U591_nout : Std_Logic;
signal U590_nout : Std_Logic;
signal U587_nout : Std_Logic;
signal U586_nout : Std_Logic;
signal U585_nout : Std_Logic;
signal U584_nout : Std_Logic;
signal U583_nout : Std_Logic;
signal U582_nout : Std_Logic;
signal U581_nout : Std_Logic;
signal U580_nout : Std_Logic;
signal U5623_nout : Std_Logic;
signal U5622_nout : Std_Logic;
signal U5621_nout : Std_Logic;
signal U5620_nout : Std_Logic;
signal U5619_nout : Std_Logic;
signal U5618_nout : Std_Logic;
signal U5617_nout : Std_Logic;
signal U5616_nout : Std_Logic;
signal U5615_nout : Std_Logic;
signal U5614_nout : Std_Logic;
signal U5613_nout : Std_Logic;
signal U5612_nout : Std_Logic;
signal U5611_nout : Std_Logic;
signal U5610_nout : Std_Logic;
signal U569_nout : Std_Logic;
signal U568_nout : Std_Logic;
signal U567_nout : Std_Logic;
signal U566_nout : Std_Logic;
signal U565_nout : Std_Logic;
signal U564_nout : Std_Logic;
signal U563_nout : Std_Logic;
signal U562_nout : Std_Logic;
signal U561_nout : Std_Logic;
signal U560_nout : Std_Logic;
signal U6023_nout : Std_Logic;
signal U6022_nout : Std_Logic;
```

```
    signal U6021_nout : Std_Logic;
    signal U6020_nout : Std_Logic;
    signal U6019_nout : Std_Logic;
    signal U6018_nout : Std_Logic;
    signal U6017_nout : Std_Logic;
    signal U6016_nout : Std_Logic;
    signal U6015_nout : Std_Logic;
    signal U6014_nout : Std_Logic;
    signal U6013_nout : Std_Logic;
    signal U6012_nout : Std_Logic;
    signal U6011_nout : Std_Logic;
    signal U6010_nout : Std_Logic;
    signal U609_nout : Std_Logic;
    signal U608_nout : Std_Logic;
    signal U607_nout : Std_Logic;
    signal U606_nout : Std_Logic;
    signal U605_nout : Std_Logic;
    signal U604_nout : Std_Logic;
    signal U603_nout : Std_Logic;
    signal U602_nout : Std_Logic;
    signal U601_nout : Std_Logic;
    signal U600_nout : Std_Logic;

begin

    U667: demux2x1
      port map ( m => U40_m3, o1 => vout(16), o0 => o2(7), i =>
           c(55) );

    U666: demux2x1
      port map ( m => U40_m3, o1 => vout(17), o0 => o2(6), i =>
           c(54) );

    U665: demux2x1
      port map ( m => U40_m3, o1 => vout(18), o0 => o2(5), i =>
           c(53) );

    U664: demux2x1
      port map ( m => U40_m3, o1 => vout(19), o0 => o2(4), i =>
           c(52) );

    U663: demux2x1
      port map ( m => U40_m3, o1 => vout(20), o0 => o2(3), i =>
           c(51) );

    U662: demux2x1
      port map ( m => U40_m3, o1 => vout(21), o0 => o2(2), i =>
           c(50) );

    U661: demux2x1
      port map ( m => U40_m3, o1 => vout(22), o0 => o2(1), i =>
           c(49) );

    U660: demux2x1
      port map ( m => U40_m3, o1 => vout(23), o0 => o2(0), i =>
           c(48) );
```

```
U597: ff_enb2
   port map ( a => U40_133, clk => CLK, outt => c(55), rst =>
         ARESET, ld => o(55), nout => U597_nout );

U596: ff_enb2
   port map ( a => U40_133, clk => CLK, outt => c(54), rst =>
         ARESET, ld => o(54), nout => U596_nout );

U595: ff_enb2
   port map ( a => U40_133, clk => CLK, outt => c(53), rst =>
         ARESET, ld => o(53), nout => U595_nout );

U594: ff_enb2
   port map ( a => U40_133, clk => CLK, outt => c(52), rst =>
         ARESET, ld => o(52), nout => U594_nout );

U593: ff_enb2
   port map ( a => U40_133, clk => CLK, outt => c(51), rst =>
         ARESET, ld => o(51), nout => U593_nout );

U592: ff_enb2
   port map ( a => U40_133, clk => CLK, outt => c(50), rst =>
         ARESET, ld => o(50), nout => U592_nout );

U591: ff_enb2
   port map ( a => U40_133, clk => CLK, outt => c(49), rst =>
         ARESET, ld => o(49), nout => U591_nout );

U590: ff_enb2
   port map ( a => U40_133, clk => CLK, outt => c(48), rst =>
         ARESET, ld => o(48), nout => U590_nout );

U40: loadmux
   port map ( l3 => U18_l2, fen => ldorf, l5 => U40_l5, l4 =>
         U40_l4, l33 => U40_l33, f(0) => f(0), f(1) => f(1),
         f(2) => f(2), m3 => U40_m3, m2 => U40_m2, m1 =>
         U40_m1 );

U18: demux4x1
   port map ( s0 => s0, s1 => s1, l0 => U18_l0, l1 => U18_l1, l2
         => U18_l2, ld => ldor );

U577: ff_enb2
   port map ( a => U40_l5, clk => CLK, outt => c(71), rst =>
         ARESET, ld => o(71), nout => U577_nout );

U576: ff_enb2
   port map ( a => U40_l5, clk => CLK, outt => c(70), rst =>
         ARESET, ld => o(70), nout => U576_nout );

U575: ff_enb2
   port map ( a => U40_l5, clk => CLK, outt => c(69), rst =>
         ARESET, ld => o(69), nout => U575_nout );

U574: ff_enb2
   port map ( a => U40_l5, clk => CLK, outt => c(68), rst =>
         ARESET, ld => o(68), nout => U574_nout );
```

```
        o0(14) => c(14), o0(13) => c(13), o0(12) => c(12),
        o0(11) => c(11), o0(10) => c(10), o0(9) => c(9),
        o0(8) => c(8), o0(7) => c(7), o0(6) => c(6), o0(5)
        => c(5), o0(4) => c(4), o0(3) => c(3), o0(2) =>
        c(2), o0(1) => c(1), o0(0) => c(0), o1(23) =>
        c(47), o1(22) => c(46), o1(21) => c(45), o1(20) =>
        c(44), o1(19) => c(43), o1(18) => c(42), o1(17) =>
        c(41), o1(16) => c(40), o1(15) => c(39), o1(14) =>
        c(38), o1(13) => c(37), o1(12) => c(36), o1(11) =>
        c(35), o1(10) => c(34), o1(9) => c(33), o1(8) =>
        c(32), o1(7) => c(31), o1(6) => c(30), o1(5) =>
        c(29), o1(4) => c(28), o1(3) => c(27), o1(2) =>
        c(26), o1(1) => c(25), o1(0) => c(24), o2(23) =>
        o2(23), o2(22) => o2(22), o2(21) => o2(21), o2(20)
        => o2(20), o2(19) => o2(19), o2(18) => o2(18),
        o2(17) => o2(17), o2(16) => o2(16), o2(15) =>
        o2(15), o2(14) => o2(14), o2(13) => o2(13), o2(12)
        => o2(12), o2(11) => o2(11), o2(10) => o2(10),
        o2(9) => o2(9), o2(8) => o2(8), o2(7) => o2(7),
        o2(6) => o2(6), o2(5) => o2(5), o2(4) => o2(4),
        o2(3) => o2(3), o2(2) => o2(2), o2(1) => o2(1),
        o2(0) => o2(0), orr(23) => orr(23), orr(22) =>
        orr(22), orr(21) => orr(21), orr(20) => orr(20),
        orr(19) => orr(19), orr(18) => orr(18), orr(17) =>
        orr(17), orr(16) => orr(16), orr(15) => orr(15),
        orr(14) => orr(14), orr(13) => orr(13), orr(12) =>
        orr(12), orr(11) => orr(11), orr(10) => orr(10),
        orr(9) => orr(9), orr(8) => orr(8), orr(7) =>
        orr(7), orr(6) => orr(6), orr(5) => orr(5), orr(4)
        => orr(4), orr(3) => orr(3), orr(2) => orr(2),
        orr(1) => orr(1), orr(0) => orr(0), sector(1) =>
        s1, sector(0) => s0 );

U5623: ff_enb2
   port map ( a => U18_l0, clk => CLK, outt => c(23), rst =>
        ARESET, ld => o(23), nout => U5623_nout );

U5622: ff_enb2
   port map ( a => U18_l0, clk => CLK, outt => c(22), rst =>
        ARESET, ld => o(22), nout => U5622_nout );

U5621: ff_enb2
   port map ( a => U18_l0, clk => CLK, outt => c(21), rst =>
        ARESET, ld => o(21), nout => U5621_nout );

U5620: ff_enb2
   port map ( a => U18_l0, clk => CLK, outt => c(20), rst =>
        ARESET, ld => o(20), nout => U5620_nout );

U5619: ff_enb2
   port map ( a => U18_l0, clk => CLK, outt => c(19), rst =>
        ARESET, ld => o(19), nout => U5619_nout );

U5618: ff_enb2
   port map ( a => U18_l0, clk => CLK, outt => c(18), rst =>
        ARESET, ld => o(18), nout => U5618_nout );

U5617: ff_enb2
```

```
U573: ff_enb2
   port map ( a => U40_l5, clk => CLK, outt => c(67), rst =>
         ARESET, ld => o(67), nout => U573_nout );

U572: ff_enb2
   port map ( a => U40_l5, clk => CLK, outt => c(66), rst =>
         ARESET, ld => o(66), nout => U572_nout );

U571: ff_enb2
   port map ( a => U40_l5, clk => CLK, outt => c(65), rst =>
         ARESET, ld => o(65), nout => U571_nout );

U570: ff_enb2
   port map ( a => U40_l5, clk => CLK, outt => c(64), rst =>
         ARESET, ld => o(64), nout => U570_nout );

U687: demux2x1
   port map ( m => U40_m1, o1 => vout(0), o0 => o2(23), i =>
         c(71) );

U686: demux2x1
   port map ( m => U40_m1, o1 => vout(1), o0 => o2(22), i =>
         c(70) );

U685: demux2x1
   port map ( m => U40_m1, o1 => vout(2), o0 => o2(21), i =>
         c(69) );

U684: demux2x1
   port map ( m => U40_m1, o1 => vout(3), o0 => o2(20), i =>
         c(68) );

U683: demux2x1
   port map ( m => U40_m1, o1 => vout(4), o0 => o2(19), i =>
         c(67) );

U682: demux2x1
   port map ( m => U40_m1, o1 => vout(5), o0 => o2(18), i =>
         c(66) );

U681: demux2x1
   port map ( m => U40_m1, o1 => vout(6), o0 => o2(17), i =>
         c(65) );

U680: demux2x1
   port map ( m => U40_m1, o1 => vout(7), o0 => o2(16), i =>
         c(64) );

U677: demux2x1
   port map ( m => U40_m2, o1 => vout(8), o0 => o2(15), i =>
         c(63) );

U676: demux2x1
   port map ( m => U40_m2, o1 => vout(9), o0 => o2(14), i =>
         c(62) );

U675: demux2x1
   port map ( m => U40_m2, o1 => vout(10), o0 => o2(13), i =>
```

```
U562: ff_enb2
   port map ( a => U18_l0, clk => CLK, outt => c(2), rst =>
         ARESET, ld => o(2), nout => U562_nout );

U561: ff_enb2
   port map ( a => U18_l0, clk => CLK, outt => c(1), rst =>
         ARESET, ld => o(1), nout => U561_nout );

U560: ff_enb2
   port map ( a => U18_l0, clk => CLK, outt => c(0), rst =>
         ARESET, ld => o(0), nout => U560_nout );

U6023: ff_enb2
   port map ( a => U18_l1, clk => CLK, outt => c(47), rst =>
         ARESET, ld => o(47), nout => U6023_nout );

U6022: ff_enb2
   port map ( a => U18_l1, clk => CLK, outt => c(46), rst =>
         ARESET, ld => o(46), nout => U6022_nout );

U6021: ff_enb2
   port map ( a => U18_l1, clk => CLK, outt => c(45), rst =>
         ARESET, ld => o(45), nout => U6021_nout );

U6020: ff_enb2
   port map ( a => U18_l1, clk => CLK, outt => c(44), rst =>
         ARESET, ld => o(44), nout => U6020_nout );

U6019: ff_enb2
   port map ( a => U18_l1, clk => CLK, outt => c(43), rst =>
         ARESET, ld => o(43), nout => U6019_nout );

U6018: ff_enb2
   port map ( a => U18_l1, clk => CLK, outt => c(42), rst =>
         ARESET, ld => o(42), nout => U6018_nout );

U6017: ff_enb2
   port map ( a => U18_l1, clk => CLK, outt => c(41), rst =>
         ARESET, ld => o(41), nout => U6017_nout );

U6016: ff_enb2
   port map ( a => U18_l1, clk => CLK, outt => c(40), rst =>
         ARESET, ld => o(40), nout => U6016_nout );

U6015: ff_enb2
   port map ( a => U18_l1, clk => CLK, outt => c(39), rst =>
         ARESET, ld => o(39), nout => U6015_nout );

U6014: ff_enb2
   port map ( a => U18_l1, clk => CLK, outt => c(38), rst =>
         ARESET, ld => o(38), nout => U6014_nout );

U6013: ff_enb2
   port map ( a => U18_l1, clk => CLK, outt => c(37), rst =>
         ARESET, ld => o(37), nout => U6013_nout );

U6012: ff_enb2
```

```
        c(61) );

U674: demux2x1
   port map ( m => U40_m2, o1 => vout(11), o0 => o2(12), i =>
        c(60) );

U673: demux2x1
   port map ( m => U40_m2, o1 => vout(12), o0 => o2(11), i =>
        c(59) );

U672: demux2x1
   port map ( m => U40_m2, o1 => vout(13), o0 => o2(10), i =>
        c(58) );

U671: demux2x1
   port map ( m => U40_m2, o1 => vout(14), o0 => o2(9), i =>
        c(57) );

U670: demux2x1
   port map ( m => U40_m2, o1 => vout(15), o0 => o2(8), i =>
        c(56) );

U587: ff_enb2
   port map ( a => U40_l4, clk => CLK, outt => c(63), rst =>
        ARESET, ld => o(63), nout => U587_nout );

U586: ff_enb2
   port map ( a => U40_l4, clk => CLK, outt => c(62), rst =>
        ARESET, ld => o(62), nout => U586_nout );

U585: ff_enb2
   port map ( a => U40_l4, clk => CLK, outt => c(61), rst =>
        ARESET, ld => o(61), nout => U585_nout );

U584: ff_enb2
   port map ( a => U40_l4, clk => CLK, outt => c(60), rst =>
        ARESET, ld => o(60), nout => U584_nout );

U583: ff_enb2
   port map ( a => U40_l4, clk => CLK, outt => c(59), rst =>
        ARESET, ld => o(59), nout => U583_nout );

U582: ff_enb2
   port map ( a => U40_l4, clk => CLK, outt => c(58), rst =>
        ARESET, ld => o(58), nout => U582_nout );

U581: ff_enb2
   port map ( a => U40_l4, clk => CLK, outt => c(57), rst =>
        ARESET, ld => o(57), nout => U581_nout );

U580: ff_enb2
   port map ( a => U40_l4, clk => CLK, outt => c(56), rst =>
        ARESET, ld => o(56), nout => U580_nout );

U77: mux3x1
   port map ( o0(23) => c(23), o0(22) => c(22), o0(21) => c(21),
        o0(20) => c(20), o0(19) => c(19), o0(18) => c(18),
        o0(17) => c(17), o0(16) => c(16), o0(15) => c(15),
```

```
port map ( a => U18_l0, clk => CLK, outt => c(17), rst =>
        ARESET, ld => o(17), nout => U5617_nout );

U5616: ff_enb2
   port map ( a => U18_l0, clk => CLK, outt => c(16), rst =>
        ARESET, ld => o(16), nout => U5616_nout );

U5615: ff_enb2
   port map ( a => U18_l0, clk => CLK, outt => c(15), rst =>
        ARESET, ld => o(15), nout => U5615_nout );

U5614: ff_enb2
   port map ( a => U18_l0, clk => CLK, outt => c(14), rst =>
        ARESET, ld => o(14), nout => U5614_nout );

U5613: ff_enb2
   port map ( a => U18_l0, clk => CLK, outt => c(13), rst =>
        ARESET, ld => o(13), nout => U5613_nout );

U5612: ff_enb2
   port map ( a => U18_l0, clk => CLK, outt => c(12), rst =>
        ARESET, ld => o(12), nout => U5612_nout );

U5611: ff_enb2
   port map ( a => U18_l0, clk => CLK, outt => c(11), rst =>
        ARESET, ld => o(11), nout => U5611_nout );

U5610: ff_enb2
   port map ( a => U18_l0, clk => CLK, outt => c(10), rst =>
        ARESET, ld => o(10), nout => U5610_nout );

U569: ff_enb2
   port map ( a => U18_l0, clk => CLK, outt => c(9), rst =>
        ARESET, ld => o(9), nout => U569_nout );

U568: ff_enb2
   port map ( a => U18_l0, clk => CLK, outt => c(8), rst =>
        ARESET, ld => o(8), nout => U568_nout );

U567: ff_enb2
   port map ( a => U18_l0, clk => CLK, outt => c(7), rst =>
        ARESET, ld => o(7), nout => U567_nout );

U566: ff_enb2
   port map ( a => U18_l0, clk => CLK, outt => c(6), rst =>
        ARESET, ld => o(6), nout => U566_nout );

U565: ff_enb2
   port map ( a => U18_l0, clk => CLK, outt => c(5), rst =>
        ARESET, ld => o(5), nout => U565_nout );

U564: ff_enb2
   port map ( a => U18_l0, clk => CLK, outt => c(4), rst =>
        ARESET, ld => o(4), nout => U564_nout );

U563: ff_enb2
   port map ( a => U18_l0, clk => CLK, outt => c(3), rst =>
        ARESET, ld => o(3), nout => U563_nout );
```

```
    port map ( a => U18_l1, clk => CLK, outt => c(36), rst =>
           ARESET, ld => o(36), nout => U6012_nout );

  U6011: ff_enb2
    port map ( a => U18_l1, clk => CLK, outt => c(35), rst =>
           ARESET, ld => o(35), nout => U6011_nout );

  U6010: ff_enb2
    port map ( a => U18_l1, clk => CLK, outt => c(34), rst =>
           ARESET, ld => o(34), nout => U6010_nout );

  U609: ff_enb2
    port map ( a => U18_l1, clk => CLK, outt => c(33), rst =>
           ARESET, ld => o(33), nout => U609_nout );

  U608: ff_enb2
    port map ( a => U18_l1, clk => CLK, outt => c(32), rst =>
           ARESET, ld => o(32), nout => U608_nout );

  U607: ff_enb2
    port map ( a => U18_l1, clk => CLK, outt => c(31), rst =>
           ARESET, ld => o(31), nout => U607_nout );

  U606: ff_enb2
    port map ( a => U18_l1, clk => CLK, outt => c(30), rst =>
           ARESET, ld => o(30), nout => U606_nout );

  U605: ff_enb2
    port map ( a => U18_l1, clk => CLK, outt => c(29), rst =>
           ARESET, ld => o(29), nout => U605_nout );

  U604: ff_enb2
    port map ( a => U18_l1, clk => CLK, outt => c(28), rst =>
           ARESET, ld => o(28), nout => U604_nout );

  U603: ff_enb2
    port map ( a => U18_l1, clk => CLK, outt => c(27), rst =>
           ARESET, ld => o(27), nout => U603_nout );

  U602: ff_enb2
    port map ( a => U18_l1, clk => CLK, outt => c(26), rst =>
           ARESET, ld => o(26), nout => U602_nout );

  U601: ff_enb2
    port map ( a => U18_l1, clk => CLK, outt => c(25), rst =>
           ARESET, ld => o(25), nout => U601_nout );

  U600: ff_enb2
    port map ( a => U18_l1, clk => CLK, outt => c(24), rst =>
           ARESET, ld => o(24), nout => U600_nout );

end oreg;
```

```
file: RESENSE.VHD
-- Date of netlist generation:  Nov-18-93

-----------------------------------------------------------------------

library IEEE;
use IEEE.STD_LOGIC_1164.ALL;

library COMPASS_LIB;
use COMPASS_LIB.COMPASS.ALL;

entity resense is


  port ( rstfifo : in Std_Logic := 'U';
       fu2 : in Std_Logic := 'U';
       fu1 : in Std_Logic := 'U';
       fu0 : in Std_Logic := 'U';
       rs0 : in Std_Logic := 'U';
       rs1 : in Std_Logic := 'U';
       rs2 : in Std_Logic := 'U';
       o2 : in Std_Logic_Vector(71 downto 0) := (others => 'U');
       o1 : in Std_Logic_Vector(71 downto 0) := (others => 'U');
       o0 : in Std_Logic_Vector(71 downto 0) := (others => 'U');

       oo : out Std_Logic_Vector(71 downto 0) := (others => 'U')
);

end resense;


-----------------------------------------------------------------------

architecture resense OF resense is

  component resolv_smachn_1
    port ( clk : in Std_Logic;
         fu0 : in Std_Logic;
         fu1 : in Std_Logic;
         fu2 : in Std_Logic;
         rstfifo : in Std_Logic;

         su0 : out Std_Logic;
         su1 : out Std_Logic;
         su2 : out Std_Logic );
  end component;



  signal U25_Z : Std_Logic;
  signal U547_ZN : Std_Logic;
  signal U546_ZN : Std_Logic;
  signal U545_ZN : Std_Logic;
  signal U544_ZN : Std_Logic;
  signal U543_ZN : Std_Logic;
  signal U542_ZN : Std_Logic;
```

```
signal U541_ZN : Std_Logic;
signal U540_ZN : Std_Logic;
signal U539_ZN : Std_Logic;
signal U538_ZN : Std_Logic;
signal U537_ZN : Std_Logic;
signal U536_ZN : Std_Logic;
signal U535_ZN : Std_Logic;
signal U534_ZN : Std_Logic;
signal U533_ZN : Std_Logic;
signal U532_ZN : Std_Logic;
signal U531_ZN : Std_Logic;
signal U530_ZN : Std_Logic;
signal U529_ZN : Std_Logic;
signal U528_ZN : Std_Logic;
signal U527_ZN : Std_Logic;
signal U526_ZN : Std_Logic;
signal U525_ZN : Std_Logic;
signal U524_ZN : Std_Logic;
signal U523_ZN : Std_Logic;
signal U522_ZN : Std_Logic;
signal U521_ZN : Std_Logic;
signal U520_ZN : Std_Logic;
signal U519_ZN : Std_Logic;
signal U518_ZN : Std_Logic;
signal U517_ZN : Std_Logic;
signal U516_ZN : Std_Logic;
signal U515_ZN : Std_Logic;
signal U514_ZN : Std_Logic;
signal U513_ZN : Std_Logic;
signal U512_ZN : Std_Logic;
signal U511_ZN : Std_Logic;
signal U510_ZN : Std_Logic;
signal U59_ZN : Std_Logic;
signal U58_ZN : Std_Logic;
signal U57_ZN : Std_Logic;
signal U56_ZN : Std_Logic;
signal U55_ZN : Std_Logic;
signal U54_ZN : Std_Logic;
signal U53_ZN : Std_Logic;
signal U52_ZN : Std_Logic;
signal U51_ZN : Std_Logic;
signal U50_ZN : Std_Logic;
signal U447_ZN : Std_Logic;
signal U446_ZN : Std_Logic;
signal U445_ZN : Std_Logic;
signal U444_ZN : Std_Logic;
signal U443_ZN : Std_Logic;
signal U442_ZN : Std_Logic;
signal U441_ZN : Std_Logic;
signal U440_ZN : Std_Logic;
signal U439_ZN : Std_Logic;
signal U438_ZN : Std_Logic;
signal U437_ZN : Std_Logic;
signal U436_ZN : Std_Logic;
signal U435_ZN : Std_Logic;
signal U434_ZN : Std_Logic;
signal U433_ZN : Std_Logic;
signal U432_ZN : Std_Logic;
```

```
signal U431_ZN : Std_Logic;
signal U430_ZN : Std_Logic;
signal U429_ZN : Std_Logic;
signal U428_ZN : Std_Logic;
signal U427_ZN : Std_Logic;
signal U426_ZN : Std_Logic;
signal U425_ZN : Std_Logic;
signal U424_ZN : Std_Logic;
signal U423_ZN : Std_Logic;
signal U422_ZN : Std_Logic;
signal U421_ZN : Std_Logic;
signal U420_ZN : Std_Logic;
signal U419_ZN : Std_Logic;
signal U418_ZN : Std_Logic;
signal U417_ZN : Std_Logic;
signal U416_ZN : Std_Logic;
signal U415_ZN : Std_Logic;
signal U414_ZN : Std_Logic;
signal U413_ZN : Std_Logic;
signal U412_ZN : Std_Logic;
signal U411_ZN : Std_Logic;
signal U410_ZN : Std_Logic;
signal U49_ZN : Std_Logic;
signal U48_ZN : Std_Logic;
signal U47_ZN : Std_Logic;
signal U46_ZN : Std_Logic;
signal U45_ZN : Std_Logic;
signal U44_ZN : Std_Logic;
signal U43_ZN : Std_Logic;
signal U42_ZN : Std_Logic;
signal U41_ZN : Std_Logic;
signal U40_ZN : Std_Logic;
signal U23_Z : Std_Logic;
signal U24_Z : Std_Logic;
signal U347_ZN : Std_Logic;
signal U346_ZN : Std_Logic;
signal U345_ZN : Std_Logic;
signal U344_ZN : Std_Logic;
signal U343_ZN : Std_Logic;
signal U342_ZN : Std_Logic;
signal U341_ZN : Std_Logic;
signal U340_ZN : Std_Logic;
signal U339_ZN : Std_Logic;
signal U338_ZN : Std_Logic;
signal U337_ZN : Std_Logic;
signal U336_ZN : Std_Logic;
signal U335_ZN : Std_Logic;
signal U334_ZN : Std_Logic;
signal U333_ZN : Std_Logic;
signal U332_ZN : Std_Logic;
signal U331_ZN : Std_Logic;
signal U330_ZN : Std_Logic;
signal U329_ZN : Std_Logic;
signal U328_ZN : Std_Logic;
signal U327_ZN : Std_Logic;
signal U326_ZN : Std_Logic;
signal U325_ZN : Std_Logic;
signal U324_ZN : Std_Logic;
```

```
signal U323_ZN : Std_Logic;
signal U322_ZN : Std_Logic;
signal U321_ZN : Std_Logic;
signal U320_ZN : Std_Logic;
signal U319_ZN : Std_Logic;
signal U318_ZN : Std_Logic;
signal U317_ZN : Std_Logic;
signal U316_ZN : Std_Logic;
signal U315_ZN : Std_Logic;
signal U314_ZN : Std_Logic;
signal U313_ZN : Std_Logic;
signal U312_ZN : Std_Logic;
signal U311_ZN : Std_Logic;
signal U310_ZN : Std_Logic;
signal U39_ZN : Std_Logic;
signal U38_ZN : Std_Logic;
signal U37_ZN : Std_Logic;
signal U36_ZN : Std_Logic;
signal U35_ZN : Std_Logic;
signal U34_ZN : Std_Logic;
signal U33_ZN : Std_Logic;
signal U32_ZN : Std_Logic;
signal U31_ZN : Std_Logic;
signal U30_ZN : Std_Logic;
signal U22_su0 : Std_Logic;
signal U1623_ZN : Std_Logic;
signal U1622_ZN : Std_Logic;
signal U1621_ZN : Std_Logic;
signal U1620_ZN : Std_Logic;
signal U1619_ZN : Std_Logic;
signal U1618_ZN : Std_Logic;
signal U1617_ZN : Std_Logic;
signal U1616_ZN : Std_Logic;
signal U1615_ZN : Std_Logic;
signal U1614_ZN : Std_Logic;
signal U1613_ZN : Std_Logic;
signal U1612_ZN : Std_Logic;
signal U1611_ZN : Std_Logic;
signal U1610_ZN : Std_Logic;
signal U169_ZN : Std_Logic;
signal U168_ZN : Std_Logic;
signal U167_ZN : Std_Logic;
signal U166_ZN : Std_Logic;
signal U165_ZN : Std_Logic;
signal U164_ZN : Std_Logic;
signal U163_ZN : Std_Logic;
signal U162_ZN : Std_Logic;
signal U161_ZN : Std_Logic;
signal U160_ZN : Std_Logic;
signal U22_su2 : Std_Logic;
signal U1823_ZN : Std_Logic;
signal U1822_ZN : Std_Logic;
signal U1821_ZN : Std_Logic;
signal U1820_ZN : Std_Logic;
signal U1819_ZN : Std_Logic;
signal U1818_ZN : Std_Logic;
signal U1817_ZN : Std_Logic;
signal U1816_ZN : Std_Logic;
```

```
signal U1815_ZN : Std_Logic;
signal U1814_ZN : Std_Logic;
signal U1813_ZN : Std_Logic;
signal U1812_ZN : Std_Logic;
signal U1811_ZN : Std_Logic;
signal U1810_ZN : Std_Logic;
signal U189_ZN : Std_Logic;
signal U188_ZN : Std_Logic;
signal U187_ZN : Std_Logic;
signal U186_ZN : Std_Logic;
signal U185_ZN : Std_Logic;
signal U184_ZN : Std_Logic;
signal U183_ZN : Std_Logic;
signal U182_ZN : Std_Logic;
signal U181_ZN : Std_Logic;
signal U180_ZN : Std_Logic;
signal U22_su1 : Std_Logic;
signal U1723_ZN : Std_Logic;
signal U1722_ZN : Std_Logic;
signal U1721_ZN : Std_Logic;
signal U1720_ZN : Std_Logic;
signal U1719_ZN : Std_Logic;
signal U1718_ZN : Std_Logic;
signal U1717_ZN : Std_Logic;
signal U1716_ZN : Std_Logic;
signal U1715_ZN : Std_Logic;
signal U1714_ZN : Std_Logic;
signal U1713_ZN : Std_Logic;
signal U1712_ZN : Std_Logic;
signal U1711_ZN : Std_Logic;
signal U1710_ZN : Std_Logic;
signal U179_ZN : Std_Logic;
signal U178_ZN : Std_Logic;
signal U177_ZN : Std_Logic;
signal U176_ZN : Std_Logic;
signal U175_ZN : Std_Logic;
signal U174_ZN : Std_Logic;
signal U173_ZN : Std_Logic;
signal U172_ZN : Std_Logic;
signal U171_ZN : Std_Logic;
signal U170_ZN : Std_Logic;

begin

U22: resolv_smachn_1
  port map ( clk => CLK, fu0 => U25_Z, fu1 => U24_Z, fu2 =>
        U23_Z, rstfifo => rstfifo, su0 => U22_su0, su1 =>
        U22_su1, su2 => U22_su2 );

U647: nd03d1
  port map ( A1 => U347_ZN, A2 => U447_ZN, A3 => U547_ZN, ZN =>
        oo(47) );

U646: nd03d1
  port map ( A1 => U346_ZN, A2 => U446_ZN, A3 => U546_ZN, ZN =>
        oo(46) );
```

```
U645: nd03d1
   port map ( A1 => U345_ZN, A2 => U445_ZN, A3 => U545_ZN, ZN =>
        oo(45) );

U644: nd03d1
   port map ( A1 => U344_ZN, A2 => U444_ZN, A3 => U544_ZN, ZN =>
        oo(44) );

U643: nd03d1
   port map ( A1 => U343_ZN, A2 => U443_ZN, A3 => U543_ZN, ZN =>
        oo(43) );

U642: nd03d1
   port map ( A1 => U342_ZN, A2 => U442_ZN, A3 => U542_ZN, ZN =>
        oo(42) );

U641: nd03d1
   port map ( A1 => U341_ZN, A2 => U441_ZN, A3 => U541_ZN, ZN =>
        oo(41) );

U640: nd03d1
   port map ( A1 => U340_ZN, A2 => U440_ZN, A3 => U540_ZN, ZN =>
        oo(40) );

U639: nd03d1
   port map ( A1 => U339_ZN, A2 => U439_ZN, A3 => U539_ZN, ZN =>
        oo(39) );

U638: nd03d1
   port map ( A1 => U338_ZN, A2 => U438_ZN, A3 => U538_ZN, ZN =>
        oo(38) );

U637: nd03d1
   port map ( A1 => U337_ZN, A2 => U437_ZN, A3 => U537_ZN, ZN =>
        oo(37) );

U636: nd03d1
   port map ( A1 => U336_ZN, A2 => U436_ZN, A3 => U536_ZN, ZN =>
        oo(36) );

U635: nd03d1
   port map ( A1 => U335_ZN, A2 => U435_ZN, A3 => U535_ZN, ZN =>
        oo(35) );

U634: nd03d1
   port map ( A1 => U334_ZN, A2 => U434_ZN, A3 => U534_ZN, ZN =>
        oo(34) );

U633: nd03d1
   port map ( A1 => U333_ZN, A2 => U433_ZN, A3 => U533_ZN, ZN =>
        oo(33) );

U632: nd03d1
   port map ( A1 => U332_ZN, A2 => U432_ZN, A3 => U532_ZN, ZN =>
        oo(32) );

U631: nd03d1
   port map ( A1 => U331_ZN, A2 => U431_ZN, A3 => U531_ZN, ZN =>
```

```
        oo(31) );

U630: nd03d1
   port map ( A1 => U330_ZN, A2 => U430_ZN, A3 => U530_ZN, ZN =>
        oo(30) );

U629: nd03d1
   port map ( A1 => U329_ZN, A2 => U429_ZN, A3 => U529_ZN, ZN =>
        oo(29) );

U628: nd03d1
   port map ( A1 => U328_ZN, A2 => U428_ZN, A3 => U528_ZN, ZN =>
        oo(28) );

U627: nd03d1
   port map ( A1 => U327_ZN, A2 => U427_ZN, A3 => U527_ZN, ZN =>
        oo(27) );

U626: nd03d1
   port map ( A1 => U326_ZN, A2 => U426_ZN, A3 => U526_ZN, ZN =>
        oo(26) );

U625: nd03d1
   port map ( A1 => U325_ZN, A2 => U425_ZN, A3 => U525_ZN, ZN =>
        oo(25) );

U624: nd03d1
   port map ( A1 => U324_ZN, A2 => U424_ZN, A3 => U524_ZN, ZN =>
        oo(24) );

U623: nd03d1
   port map ( A1 => U323_ZN, A2 => U423_ZN, A3 => U523_ZN, ZN =>
        oo(23) );

U622: nd03d1
   port map ( A1 => U322_ZN, A2 => U422_ZN, A3 => U522_ZN, ZN =>
        oo(22) );

U621: nd03d1
   port map ( A1 => U321_ZN, A2 => U421_ZN, A3 => U521_ZN, ZN =>
        oo(21) );

U620: nd03d1
   port map ( A1 => U320_ZN, A2 => U420_ZN, A3 => U520_ZN, ZN =>
        oo(20) );

U619: nd03d1
   port map ( A1 => U319_ZN, A2 => U419_ZN, A3 => U519_ZN, ZN =>
        oo(19) );

U618: nd03d1
   port map ( A1 => U318_ZN, A2 => U418_ZN, A3 => U518_ZN, ZN =>
        oo(18) );

U617: nd03d1
   port map ( A1 => U317_ZN, A2 => U417_ZN, A3 => U517_ZN, ZN =>
        oo(17) );
```

```
U616: nd03d1
  port map ( A1 => U316_ZN, A2 => U416_ZN, A3 => U516_ZN, ZN =>
        oo(16) );

U615: nd03d1
  port map ( A1 => U315_ZN, A2 => U415_ZN, A3 => U515_ZN, ZN =>
        oo(15) );

U614: nd03d1
  port map ( A1 => U314_ZN, A2 => U414_ZN, A3 => U514_ZN, ZN =>
        oo(14) );

U613: nd03d1
  port map ( A1 => U313_ZN, A2 => U413_ZN, A3 => U513_ZN, ZN =>
        oo(13) );

U612: nd03d1
  port map ( A1 => U312_ZN, A2 => U412_ZN, A3 => U512_ZN, ZN =>
        oo(12) );

U611: nd03d1
  port map ( A1 => U311_ZN, A2 => U411_ZN, A3 => U511_ZN, ZN =>
        oo(11) );

U610: nd03d1
  port map ( A1 => U310_ZN, A2 => U410_ZN, A3 => U510_ZN, ZN =>
        oo(10) );

U69: nd03d1
  port map ( A1 => U39_ZN, A2 => U49_ZN, A3 => U59_ZN, ZN =>
        oo(9) );

U68: nd03d1
  port map ( A1 => U38_ZN, A2 => U48_ZN, A3 => U58_ZN, ZN =>
        oo(8) );

U67: nd03d1
  port map ( A1 => U37_ZN, A2 => U47_ZN, A3 => U57_ZN, ZN =>
        oo(7) );

U66: nd03d1
  port map ( A1 => U36_ZN, A2 => U46_ZN, A3 => U56_ZN, ZN =>
        oo(6) );

U65: nd03d1
  port map ( A1 => U35_ZN, A2 => U45_ZN, A3 => U55_ZN, ZN =>
        oo(5) );

U64: nd03d1
  port map ( A1 => U34_ZN, A2 => U44_ZN, A3 => U54_ZN, ZN =>
        oo(4) );

U63: nd03d1
  port map ( A1 => U33_ZN, A2 => U43_ZN, A3 => U53_ZN, ZN =>
        oo(3) );

U62: nd03d1
  port map ( A1 => U32_ZN, A2 => U42_ZN, A3 => U52_ZN, ZN =>
```

```
        oo(2) );

U61: nd03d1
   port map ( A1 => U31_ZN, A2 => U41_ZN, A3 => U51_ZN, ZN =>
        oo(1) );

U60: nd03d1
   port map ( A1 => U30_ZN, A2 => U40_ZN, A3 => U50_ZN, ZN =>
        oo(0) );

U347: nd02d1
   port map ( A1 => o2(47), A2 => rs0, ZN => U347_ZN );

U346: nd02d1
   port map ( A1 => o2(46), A2 => rs0, ZN => U346_ZN );

U345: nd02d1
   port map ( A1 => o2(45), A2 => rs0, ZN => U345_ZN );

U344: nd02d1
   port map ( A1 => o2(44), A2 => rs0, ZN => U344_ZN );

U343: nd02d1
   port map ( A1 => o2(43), A2 => rs0, ZN => U343_ZN );

U342: nd02d1
   port map ( A1 => o2(42), A2 => rs0, ZN => U342_ZN );

U341: nd02d1
   port map ( A1 => o2(41), A2 => rs0, ZN => U341_ZN );

U340: nd02d1
   port map ( A1 => o2(40), A2 => rs0, ZN => U340_ZN );

U339: nd02d1
   port map ( A1 => o2(39), A2 => rs0, ZN => U339_ZN );

U338: nd02d1
   port map ( A1 => o2(38), A2 => rs0, ZN => U338_ZN );

U337: nd02d1
   port map ( A1 => o2(37), A2 => rs0, ZN => U337_ZN );

U336: nd02d1
   port map ( A1 => o2(36), A2 => rs0, ZN => U336_ZN );

U335: nd02d1
   port map ( A1 => o2(35), A2 => rs0, ZN => U335_ZN );

U334: nd02d1
   port map ( A1 => o2(34), A2 => rs0, ZN => U334_ZN );

U333: nd02d1
   port map ( A1 => o2(33), A2 => rs0, ZN => U333_ZN );

U332: nd02d1
   port map ( A1 => o2(32), A2 => rs0, ZN => U332_ZN );
```

```
U331: nd02d1
   port map ( A1 => o2(31), A2 => rs0, ZN => U331_ZN );

U330: nd02d1
   port map ( A1 => o2(30), A2 => rs0, ZN => U330_ZN );

U329: nd02d1
   port map ( A1 => o2(29), A2 => rs0, ZN => U329_ZN );

U328: nd02d1
   port map ( A1 => o2(28), A2 => rs0, ZN => U328_ZN );

U327: nd02d1
   port map ( A1 => o2(27), A2 => rs0, ZN => U327_ZN );

U326: nd02d1
   port map ( A1 => o2(26), A2 => rs0, ZN => U326_ZN );

U325: nd02d1
   port map ( A1 => o2(25), A2 => rs0, ZN => U325_ZN );

U324: nd02d1
   port map ( A1 => o2(24), A2 => rs0, ZN => U324_ZN );

U323: nd02d1
   port map ( A1 => o2(23), A2 => rs0, ZN => U323_ZN );

U322: nd02d1
   port map ( A1 => o2(22), A2 => rs0, ZN => U322_ZN );

U321: nd02d1
   port map ( A1 => o2(21), A2 => rs0, ZN => U321_ZN );

U320: nd02d1
   port map ( A1 => o2(20), A2 => rs0, ZN => U320_ZN );

U319: nd02d1
   port map ( A1 => o2(19), A2 => rs0, ZN => U319_ZN );

U318: nd02d1
   port map ( A1 => o2(18), A2 => rs0, ZN => U318_ZN );

U317: nd02d1
   port map ( A1 => o2(17), A2 => rs0, ZN => U317_ZN );

U316: nd02d1
   port map ( A1 => o2(16), A2 => rs0, ZN => U316_ZN );

U315: nd02d1
   port map ( A1 => o2(15), A2 => rs0, ZN => U315_ZN );

U314: nd02d1
   port map ( A1 => o2(14), A2 => rs0, ZN => U314_ZN );

U313: nd02d1
   port map ( A1 => o2(13), A2 => rs0, ZN => U313_ZN );

U312: nd02d1
```

```
   port map ( A1 => o2(12), A2 => rs0, ZN => U312_ZN );

U311: nd02d1
   port map ( A1 => o2(11), A2 => rs0, ZN => U311_ZN );

U310: nd02d1
   port map ( A1 => o2(10), A2 => rs0, ZN => U310_ZN );

U39: nd02d1
   port map ( A1 => o2(9), A2 => rs0, ZN => U39_ZN );

U38: nd02d1
   port map ( A1 => o2(8), A2 => rs0, ZN => U38_ZN );

U37: nd02d1
   port map ( A1 => o2(7), A2 => rs0, ZN => U37_ZN );

U36: nd02d1
   port map ( A1 => o2(6), A2 => rs0, ZN => U36_ZN );

U35: nd02d1
   port map ( A1 => o2(5), A2 => rs0, ZN => U35_ZN );

U34: nd02d1
   port map ( A1 => o2(4), A2 => rs0, ZN => U34_ZN );

U33: nd02d1
   port map ( A1 => o2(3), A2 => rs0, ZN => U33_ZN );

U32: nd02d1
   port map ( A1 => o2(2), A2 => rs0, ZN => U32_ZN );

U31: nd02d1
   port map ( A1 => o2(1), A2 => rs0, ZN => U31_ZN );

U30: nd02d1
   port map ( A1 => o2(0), A2 => rs0, ZN => U30_ZN );

U447: nd02d1
   port map ( A1 => o1(47), A2 => rs1, ZN => U447_ZN );

U446: nd02d1
   port map ( A1 => o1(46), A2 => rs1, ZN => U446_ZN );

U445: nd02d1
   port map ( A1 => o1(45), A2 => rs1, ZN => U445_ZN );

U444: nd02d1
   port map ( A1 => o1(44), A2 => rs1, ZN => U444_ZN );

U443: nd02d1
   port map ( A1 => o1(43), A2 => rs1, ZN => U443_ZN );

U442: nd02d1
   port map ( A1 => o1(42), A2 => rs1, ZN => U442_ZN );

U441: nd02d1
   port map ( A1 => o1(41), A2 => rs1, ZN => U441_ZN );
```

```
U440: nd02d1
   port map ( A1 => o1(40), A2 => rs1, ZN => U440_ZN );

U439: nd02d1
   port map ( A1 => o1(39), A2 => rs1, ZN => U439_ZN );

U438: nd02d1
   port map ( A1 => o1(38), A2 => rs1, ZN => U438_ZN );

U437: nd02d1
   port map ( A1 => o1(37), A2 => rs1, ZN => U437_ZN );

U436: nd02d1
   port map ( A1 => o1(36), A2 => rs1, ZN => U436_ZN );

U435: nd02d1
   port map ( A1 => o1(35), A2 => rs1, ZN => U435_ZN );

U434: nd02d1
   port map ( A1 => o1(34), A2 => rs1, ZN => U434_ZN );

U433: nd02d1
   port map ( A1 => o1(33), A2 => rs1, ZN => U433_ZN );

U432: nd02d1
   port map ( A1 => o1(32), A2 => rs1, ZN => U432_ZN );

U431: nd02d1
   port map ( A1 => o1(31), A2 => rs1, ZN => U431_ZN );

U430: nd02d1
   port map ( A1 => o1(30), A2 => rs1, ZN => U430_ZN );

U429: nd02d1
   port map ( A1 => o1(29), A2 => rs1, ZN => U429_ZN );

U428: nd02d1
   port map ( A1 => o1(28), A2 => rs1, ZN => U428_ZN );

U427: nd02d1
   port map ( A1 => o1(27), A2 => rs1, ZN => U427_ZN );

U426: nd02d1
   port map ( A1 => o1(26), A2 => rs1, ZN => U426_ZN );

U425: nd02d1
   port map ( A1 => o1(25), A2 => rs1, ZN => U425_ZN );

U424: nd02d1
   port map ( A1 => o1(24), A2 => rs1, ZN => U424_ZN );

U423: nd02d1
   port map ( A1 => o1(23), A2 => rs1, ZN => U423_ZN );

U422: nd02d1
   port map ( A1 => o1(22), A2 => rs1, ZN => U422_ZN );
```

```
U421: nd02d1
   port map ( A1 => o1(21), A2 => rs1, ZN => U421_ZN );

U420: nd02d1
   port map ( A1 => o1(20), A2 => rs1, ZN => U420_ZN );

U419: nd02d1
   port map ( A1 => o1(19), A2 => rs1, ZN => U419_ZN );

U418: nd02d1
   port map ( A1 => o1(18), A2 => rs1, ZN => U418_ZN );

U417: nd02d1
   port map ( A1 => o1(17), A2 => rs1, ZN => U417_ZN );

U416: nd02d1
   port map ( A1 => o1(16), A2 => rs1, ZN => U416_ZN );

U415: nd02d1
   port map ( A1 => o1(15), A2 => rs1, ZN => U415_ZN );

U414: nd02d1
   port map ( A1 => o1(14), A2 => rs1, ZN => U414_ZN );

U413: nd02d1
   port map ( A1 => o1(13), A2 => rs1, ZN => U413_ZN );

U412: nd02d1
   port map ( A1 => o1(12), A2 => rs1, ZN => U412_ZN );

U411: nd02d1
   port map ( A1 => o1(11), A2 => rs1, ZN => U411_ZN );

U410: nd02d1
   port map ( A1 => o1(10), A2 => rs1, ZN => U410_ZN );

U49: nd02d1
   port map ( A1 => o1(9), A2 => rs1, ZN => U49_ZN );

U48: nd02d1
   port map ( A1 => o1(8), A2 => rs1, ZN => U48_ZN );

U47: nd02d1
   port map ( A1 => o1(7), A2 => rs1, ZN => U47_ZN );

U46: nd02d1
   port map ( A1 => o1(6), A2 => rs1, ZN => U46_ZN );

U45: nd02d1
   port map ( A1 => o1(5), A2 => rs1, ZN => U45_ZN );

U44: nd02d1
   port map ( A1 => o1(4), A2 => rs1, ZN => U44_ZN );

U43: nd02d1
   port map ( A1 => o1(3), A2 => rs1, ZN => U43_ZN );

U42: nd02d1
```

```
   port map ( A1 => o1(2), A2 => rs1, ZN => U42_ZN );

U41: nd02d1
   port map ( A1 => o1(1), A2 => rs1, ZN => U41_ZN );

U40: nd02d1
   port map ( A1 => o1(0), A2 => rs1, ZN => U40_ZN );

U547: nd02d1
   port map ( A1 => o0(47), A2 => rs2, ZN => U547_ZN );

U546: nd02d1
   port map ( A1 => o0(46), A2 => rs2, ZN => U546_ZN );

U545: nd02d1
   port map ( A1 => o0(45), A2 => rs2, ZN => U545_ZN );

U544: nd02d1
   port map ( A1 => o0(44), A2 => rs2, ZN => U544_ZN );

U543: nd02d1
   port map ( A1 => o0(43), A2 => rs2, ZN => U543_ZN );

U542: nd02d1
   port map ( A1 => o0(42), A2 => rs2, ZN => U542_ZN );

U541: nd02d1
   port map ( A1 => o0(41), A2 => rs2, ZN => U541_ZN );

U540: nd02d1
   port map ( A1 => o0(40), A2 => rs2, ZN => U540_ZN );

U539: nd02d1
   port map ( A1 => o0(39), A2 => rs2, ZN => U539_ZN );

U538: nd02d1
   port map ( A1 => o0(38), A2 => rs2, ZN => U538_ZN );

U537: nd02d1
   port map ( A1 => o0(37), A2 => rs2, ZN => U537_ZN );

U536: nd02d1
   port map ( A1 => o0(36), A2 => rs2, ZN => U536_ZN );

U535: nd02d1
   port map ( A1 => o0(35), A2 => rs2, ZN => U535_ZN );

U534: nd02d1
   port map ( A1 => o0(34), A2 => rs2, ZN => U534_ZN );

U533: nd02d1
   port map ( A1 => o0(33), A2 => rs2, ZN => U533_ZN );

U532: nd02d1
   port map ( A1 => o0(32), A2 => rs2, ZN => U532_ZN );

U531: nd02d1
   port map ( A1 => o0(31), A2 => rs2, ZN => U531_ZN );
```

```
U530: nd02d1
   port map ( A1 => o0(30), A2 => rs2, ZN => U530_ZN );

U529: nd02d1
   port map ( A1 => o0(29), A2 => rs2, ZN => U529_ZN );

U528: nd02d1
   port map ( A1 => o0(28), A2 => rs2, ZN => U528_ZN );

U527: nd02d1
   port map ( A1 => o0(27), A2 => rs2, ZN => U527_ZN );

U526: nd02d1
   port map ( A1 => o0(26), A2 => rs2, ZN => U526_ZN );

U525: nd02d1
   port map ( A1 => o0(25), A2 => rs2, ZN => U525_ZN );

U524: nd02d1
   port map ( A1 => o0(24), A2 => rs2, ZN => U524_ZN );

U523: nd02d1
   port map ( A1 => o0(23), A2 => rs2, ZN => U523_ZN );

U522: nd02d1
   port map ( A1 => o0(22), A2 => rs2, ZN => U522_ZN );

U521: nd02d1
   port map ( A1 => o0(21), A2 => rs2, ZN => U521_ZN );

U520: nd02d1
   port map ( A1 => o0(20), A2 => rs2, ZN => U520_ZN );

U519: nd02d1
   port map ( A1 => o0(19), A2 => rs2, ZN => U519_ZN );

U518: nd02d1
   port map ( A1 => o0(18), A2 => rs2, ZN => U518_ZN );

U517: nd02d1
   port map ( A1 => o0(17), A2 => rs2, ZN => U517_ZN );

U516: nd02d1
   port map ( A1 => o0(16), A2 => rs2, ZN => U516_ZN );

U515: nd02d1
   port map ( A1 => o0(15), A2 => rs2, ZN => U515_ZN );

U514: nd02d1
   port map ( A1 => o0(14), A2 => rs2, ZN => U514_ZN );

U513: nd02d1
   port map ( A1 => o0(13), A2 => rs2, ZN => U513_ZN );

U512: nd02d1
   port map ( A1 => o0(12), A2 => rs2, ZN => U512_ZN );
```

```
U511: nd02d1
  port map ( A1 => o0(11), A2 => rs2, ZN => U511_ZN );

U510: nd02d1
  port map ( A1 => o0(10), A2 => rs2, ZN => U510_ZN );

U59: nd02d1
  port map ( A1 => o0(9), A2 => rs2, ZN => U59_ZN );

U58: nd02d1
  port map ( A1 => o0(8), A2 => rs2, ZN => U58_ZN );

U57: nd02d1
  port map ( A1 => o0(7), A2 => rs2, ZN => U57_ZN );

U56: nd02d1
  port map ( A1 => o0(6), A2 => rs2, ZN => U56_ZN );

U55: nd02d1
  port map ( A1 => o0(5), A2 => rs2, ZN => U55_ZN );

U54: nd02d1
  port map ( A1 => o0(4), A2 => rs2, ZN => U54_ZN );

U53: nd02d1
  port map ( A1 => o0(3), A2 => rs2, ZN => U53_ZN );

U52: nd02d1
  port map ( A1 => o0(2), A2 => rs2, ZN => U52_ZN );

U51: nd02d1
  port map ( A1 => o0(1), A2 => rs2, ZN => U51_ZN );

U50: nd02d1
  port map ( A1 => o0(0), A2 => rs2, ZN => U50_ZN );

U25: ni01d2
  port map ( I => fu0, Z => U25_Z );

U24: ni01d2
  port map ( I => fu1, Z => U24_Z );

U23: ni01d2
  port map ( I => fu2, Z => U23_Z );

U1623: nd02d1
  port map ( A1 => o2(71), A2 => U22_su2, ZN => U1623_ZN );

U1622: nd02d1
  port map ( A1 => o2(70), A2 => U22_su2, ZN => U1622_ZN );

U1621: nd02d1
  port map ( A1 => o2(69), A2 => U22_su2, ZN => U1621_ZN );

U1620: nd02d1
  port map ( A1 => o2(68), A2 => U22_su2, ZN => U1620_ZN );

U1619: nd02d1
```

```
   port map ( A1 => o2(67), A2 => U22_su2, ZN => U1619_ZN );

U1618: nd02d1
   port map ( A1 => o2(66), A2 => U22_su2, ZN => U1618_ZN );

U1617: nd02d1
   port map ( A1 => o2(65), A2 => U22_su2, ZN => U1617_ZN );

U1616: nd02d1
   port map ( A1 => o2(64), A2 => U22_su2, ZN => U1616_ZN );

U1615: nd02d1
   port map ( A1 => o2(63), A2 => U22_su2, ZN => U1615_ZN );

U1614: nd02d1
   port map ( A1 => o2(62), A2 => U22_su2, ZN => U1614_ZN );

U1613: nd02d1
   port map ( A1 => o2(61), A2 => U22_su2, ZN => U1613_ZN );

U1612: nd02d1
   port map ( A1 => o2(60), A2 => U22_su2, ZN => U1612_ZN );

U1611: nd02d1
   port map ( A1 => o2(59), A2 => U22_su2, ZN => U1611_ZN );

U1610: nd02d1
   port map ( A1 => o2(58), A2 => U22_su2, ZN => U1610_ZN );

U169: nd02d1
   port map ( A1 => o2(57), A2 => U22_su2, ZN => U169_ZN );

U168: nd02d1
   port map ( A1 => o2(56), A2 => U22_su2, ZN => U168_ZN );

U167: nd02d1
   port map ( A1 => o2(55), A2 => U22_su2, ZN => U167_ZN );

U166: nd02d1
   port map ( A1 => o2(54), A2 => U22_su2, ZN => U166_ZN );

U165: nd02d1
   port map ( A1 => o2(53), A2 => U22_su2, ZN => U165_ZN );

U164: nd02d1
   port map ( A1 => o2(52), A2 => U22_su2, ZN => U164_ZN );

U163: nd02d1
   port map ( A1 => o2(51), A2 => U22_su2, ZN => U163_ZN );

U162: nd02d1
   port map ( A1 => o2(50), A2 => U22_su2, ZN => U162_ZN );

U161: nd02d1
   port map ( A1 => o2(49), A2 => U22_su2, ZN => U161_ZN );

U160: nd02d1
   port map ( A1 => o2(48), A2 => U22_su2, ZN => U160_ZN );
```

```
U1723: nd02d1
   port map ( A1 => o1(71), A2 => U22_su1, ZN => U1723_ZN );

U1722: nd02d1
   port map ( A1 => o1(70), A2 => U22_su1, ZN => U1722_ZN );

U1721: nd02d1
   port map ( A1 => o1(69), A2 => U22_su1, ZN => U1721_ZN );

U1720: nd02d1
   port map ( A1 => o1(68), A2 => U22_su1, ZN => U1720_ZN );

U1719: nd02d1
   port map ( A1 => o1(67), A2 => U22_su1, ZN => U1719_ZN );

U1718: nd02d1
   port map ( A1 => o1(66), A2 => U22_su1, ZN => U1718_ZN );

U1717: nd02d1
   port map ( A1 => o1(65), A2 => U22_su1, ZN => U1717_ZN );

U1716: nd02d1
   port map ( A1 => o1(64), A2 => U22_su1, ZN => U1716_ZN );

U1715: nd02d1
   port map ( A1 => o1(63), A2 => U22_su1, ZN => U1715_ZN );

U1714: nd02d1
   port map ( A1 => o1(62), A2 => U22_su1, ZN => U1714_ZN );

U1713: nd02d1
   port map ( A1 => o1(61), A2 => U22_su1, ZN => U1713_ZN );

U1712: nd02d1
   port map ( A1 => o1(60), A2 => U22_su1, ZN => U1712_ZN );

U1711: nd02d1
   port map ( A1 => o1(59), A2 => U22_su1, ZN => U1711_ZN );

U1710: nd02d1
   port map ( A1 => o1(58), A2 => U22_su1, ZN => U1710_ZN );

U179: nd02d1
   port map ( A1 => o1(57), A2 => U22_su1, ZN => U179_ZN );

U178: nd02d1
   port map ( A1 => o1(56), A2 => U22_su1, ZN => U178_ZN );

U177: nd02d1
   port map ( A1 => o1(55), A2 => U22_su1, ZN => U177_ZN );

U176: nd02d1
   port map ( A1 => o1(54), A2 => U22_su1, ZN => U176_ZN );

U175: nd02d1
   port map ( A1 => o1(53), A2 => U22_su1, ZN => U175_ZN );
```

```
U174: nd02d1
   port map ( A1 => o1(52), A2 => U22_su1, ZN => U174_ZN );

U173: nd02d1
   port map ( A1 => o1(51), A2 => U22_su1, ZN => U173_ZN );

U172: nd02d1
   port map ( A1 => o1(50), A2 => U22_su1, ZN => U172_ZN );

U171: nd02d1
   port map ( A1 => o1(49), A2 => U22_su1, ZN => U171_ZN );

U170: nd02d1
   port map ( A1 => o1(48), A2 => U22_su1, ZN => U170_ZN );

U1823: nd02d1
   port map ( A1 => o0(71), A2 => U22_su0, ZN => U1823_ZN );

U1822: nd02d1
   port map ( A1 => o0(70), A2 => U22_su0, ZN => U1822_ZN );

U1821: nd02d1
   port map ( A1 => o0(69), A2 => U22_su0, ZN => U1821_ZN );

U1820: nd02d1
   port map ( A1 => o0(68), A2 => U22_su0, ZN => U1820_ZN );

U1819: nd02d1
   port map ( A1 => o0(67), A2 => U22_su0, ZN => U1819_ZN );

U1818: nd02d1
   port map ( A1 => o0(66), A2 => U22_su0, ZN => U1818_ZN );

U1817: nd02d1
   port map ( A1 => o0(65), A2 => U22_su0, ZN => U1817_ZN );

U1816: nd02d1
   port map ( A1 => o0(64), A2 => U22_su0, ZN => U1816_ZN );

U1815: nd02d1
   port map ( A1 => o0(63), A2 => U22_su0, ZN => U1815_ZN );

U1814: nd02d1
   port map ( A1 => o0(62), A2 => U22_su0, ZN => U1814_ZN );

U1813: nd02d1
   port map ( A1 => o0(61), A2 => U22_su0, ZN => U1813_ZN );

U1812: nd02d1
   port map ( A1 => o0(60), A2 => U22_su0, ZN => U1812_ZN );

U1811: nd02d1
   port map ( A1 => o0(59), A2 => U22_su0, ZN => U1811_ZN );

U1810: nd02d1
   port map ( A1 => o0(58), A2 => U22_su0, ZN => U1810_ZN );

U189: nd02d1
```

```
    port map ( A1 => o0(57), A2 => U22_su0, ZN => U189_ZN );

U188: nd02d1
    port map ( A1 => o0(56), A2 => U22_su0, ZN => U188_ZN );

U187: nd02d1
    port map ( A1 => o0(55), A2 => U22_su0, ZN => U187_ZN );

U186: nd02d1
    port map ( A1 => o0(54), A2 => U22_su0, ZN => U186_ZN );

U185: nd02d1
    port map ( A1 => o0(53), A2 => U22_su0, ZN => U185_ZN );

U184: nd02d1
    port map ( A1 => o0(52), A2 => U22_su0, ZN => U184_ZN );

U183: nd02d1
    port map ( A1 => o0(51), A2 => U22_su0, ZN => U183_ZN );

U182: nd02d1
    port map ( A1 => o0(50), A2 => U22_su0, ZN => U182_ZN );

U181: nd02d1
    port map ( A1 => o0(49), A2 => U22_su0, ZN => U181_ZN );

U180: nd02d1
    port map ( A1 => o0(48), A2 => U22_su0, ZN => U180_ZN );

U1923: nd03d1
    port map ( A1 => U1623_ZN, A2 => U1723_ZN, A3 => U1823_ZN, ZN
            => oo(71) );

U1922: nd03d1
    port map ( A1 => U1622_ZN, A2 => U1722_ZN, A3 => U1822_ZN, ZN
            => oo(70) );

U1921: nd03d1
    port map ( A1 => U1621_ZN, A2 => U1721_ZN, A3 => U1821_ZN, ZN
            => oo(69) );

U1920: nd03d1
    port map ( A1 => U1620_ZN, A2 => U1720_ZN, A3 => U1820_ZN, ZN
            => oo(68) );

U1919: nd03d1
    port map ( A1 => U1619_ZN, A2 => U1719_ZN, A3 => U1819_ZN, ZN
            => oo(67) );

U1918: nd03d1
    port map ( A1 => U1618_ZN, A2 => U1718_ZN, A3 => U1818_ZN, ZN
            => oo(66) );

U1917: nd03d1
    port map ( A1 => U1617_ZN, A2 => U1717_ZN, A3 => U1817_ZN, ZN
            => oo(65) );

U1916: nd03d1
```

```
   port map ( A1 => U1616_ZN, A2 => U1716_ZN, A3 => U1816_ZN, ZN
        => oo(64) );

U1915: nd03d1
   port map ( A1 => U1615_ZN, A2 => U1715_ZN, A3 => U1815_ZN, ZN
        => oo(63) );

U1914: nd03d1
   port map ( A1 => U1614_ZN, A2 => U1714_ZN, A3 => U1814_ZN, ZN
        => oo(62) );

U1913: nd03d1
   port map ( A1 => U1613_ZN, A2 => U1713_ZN, A3 => U1813_ZN, ZN
        => oo(61) );

U1912: nd03d1
   port map ( A1 => U1612_ZN, A2 => U1712_ZN, A3 => U1812_ZN, ZN
        => oo(60) );

U1911: nd03d1
   port map ( A1 => U1611_ZN, A2 => U1711_ZN, A3 => U1811_ZN, ZN
        => oo(59) );

U1910: nd03d1
   port map ( A1 => U1610_ZN, A2 => U1710_ZN, A3 => U1810_ZN, ZN
        => oo(58) );

U199: nd03d1
   port map ( A1 => U169_ZN, A2 => U179_ZN, A3 => U189_ZN, ZN =>
        oo(57) );

U198: nd03d1
   port map ( A1 => U168_ZN, A2 => U178_ZN, A3 => U188_ZN, ZN =>
        oo(56) );

U197: nd03d1
   port map ( A1 => U167_ZN, A2 => U177_ZN, A3 => U187_ZN, ZN =>
        oo(55) );

U196: nd03d1
   port map ( A1 => U166_ZN, A2 => U176_ZN, A3 => U186_ZN, ZN =>
        oo(54) );

U195: nd03d1
   port map ( A1 => U165_ZN, A2 => U175_ZN, A3 => U185_ZN, ZN =>
        oo(53) );

U194: nd03d1
   port map ( A1 => U164_ZN, A2 => U174_ZN, A3 => U184_ZN, ZN =>
        oo(52) );

U193: nd03d1
   port map ( A1 => U163_ZN, A2 => U173_ZN, A3 => U183_ZN, ZN =>
        oo(51) );

U192: nd03d1
   port map ( A1 => U162_ZN, A2 => U172_ZN, A3 => U182_ZN, ZN =>
        oo(50) );
```

```
U191: nd03d1
   port map ( A1 => U161_ZN, A2 => U171_ZN, A3 => U181_ZN, ZN =>
         oo(49) );

U190: nd03d1
   port map ( A1 => U160_ZN, A2 => U170_ZN, A3 => U180_ZN, ZN =>
         oo(48) );

end resense;
```

```
file: RESOLV_S.VHD
-- Date of netlist generation: Nov-19-93

----------------------------------------------------------------------

library IEEE;
use IEEE.STD_LOGIC_1164.ALL;

library COMPASS_LIB;
use COMPASS_LIB.COMPASS.ALL;

entity resolv_smachn_1 is

   port ( clk : in Std_Logic := 'U';
        rstfifo : in Std_Logic := 'U';
        fu0 : in Std_Logic := 'U';
        fu1 : in Std_Logic := 'U';
        fu2 : in Std_Logic := 'U';

        su0 : out Std_Logic := 'U';
        su1 : out Std_Logic := 'U';
        su2 : out Std_Logic := 'U' );

end resolv_smachn_1;

----------------------------------------------------------------------

architecture resolv_smachn_1 OF resolv_smachn_1 is

   signal i_16_ZN : Std_Logic;
   signal sm_sr1_QN : Std_Logic;
   signal i_13_ZN : Std_Logic;
   signal sm_sr1_Q : Std_Logic;
   signal i_10_ZN : Std_Logic;
   signal i_12_ZN : Std_Logic;
   signal i_14_ZN : Std_Logic;
   signal sm_sr2_Q : Std_Logic;
   signal i_9_ZN : Std_Logic;
   signal i_31_ZN : Std_Logic;
   signal i_30_ZN : Std_Logic;
   signal i_29_Z : Std_Logic;
   signal sm_su2_QN : Std_Logic;
   signal sm_su1_QN : Std_Logic;
```

```
  signal sm_su0_QN : Std_Logic;
  signal sm_sr3_QN : Std_Logic;
  signal i_17_ZN : Std_Logic;
  signal i_19_ZN : Std_Logic;
  signal sm_sr4_QN : Std_Logic;
  signal i_20_ZN : Std_Logic;
  signal i_22_ZN : Std_Logic;
  signal sm_sr3_Q : Std_Logic;
  signal i_18_ZN : Std_Logic;
  signal sm_sr4_Q : Std_Logic;
  signal i_21_ZN : Std_Logic;
  signal i_15_ZN : Std_Logic;
  signal i_28_ZN : Std_Logic;
  signal i_27_ZN : Std_Logic;
  signal sm_sr2_QN : Std_Logic;
  signal i_24_ZN : Std_Logic;
  signal i_11_ZN : Std_Logic;
  signal i_26_ZN : Std_Logic;
  signal i_23_ZN : Std_Logic;
  signal i_25_ZN : Std_Logic;

begin

  i_9: oa03d1
    port map ( A1 => sm_sr2_Q, A2 => i_14_ZN, B1 => fu1, B2 =>
         i_12_ZN, C => i_10_ZN, ZN => i_9_ZN );

  sm_sr1: dfctnb
    port map ( D => i_9_ZN, CP => clk, CDN => rstfifo, Q =>
         sm_sr1_Q, QN => sm_sr1_QN );

  sm_su2: lanfnb
    port map ( D => i_31_ZN, EN => clk, Q => su2, QN => sm_su2_QN
         );

  sm_su1: lanfnb
    port map ( D => i_30_ZN, EN => clk, Q => su1, QN => sm_su1_QN
         );

  sm_su0: lanfnb
    port map ( D => i_29_Z, EN => clk, Q => su0, QN => sm_su0_QN
         );

  i_12: in01d0
    port map ( I => i_13_ZN, ZN => i_12_ZN );

  i_13: nr02d0
    port map ( A1 => sm_sr1_QN, A2 => sm_sr2_Q, ZN => i_13_ZN );

  i_16: in01d0
    port map ( I => i_17_ZN, ZN => i_16_ZN );

  i_17: nd02d0
    port map ( A1 => sm_sr1_Q, A2 => sm_sr4_QN, ZN => i_17_ZN );

  i_31: oa01d1
    port map ( A1 => sm_sr3_QN, A2 => i_13_ZN, B1 => sm_sr1_QN,
```

```
        B2 => i_19_ZN, ZN => i_31_ZN );

i_28: nd02d0
   port map ( A1 => fu1, A2 => sm_sr1_Q, ZN => i_28_ZN );

sm_sr3: dfctnb
   port map ( D => i_22_ZN, CP => clk, CDN => rstfifo, Q =>
        sm_sr3_Q, QN => sm_sr3_QN );

i_14: ao04d1
   port map ( A1 => fu0, A2 => sm_sr4_Q, B => sm_sr3_Q, ZN =>
        i_14_ZN );

i_18: ao01d1
   port map ( A1 => fu2, A2 => sm_sr1_Q, B1 => fu0, B2 =>
        sm_sr1_QN, ZN => i_18_ZN );

i_27: oa03d1
   port map ( A1 => sm_sr1_Q, A2 => sm_sr3_QN, B1 => sm_sr3_Q,
        B2 => i_28_ZN, C => i_21_ZN, ZN => i_27_ZN );

sm_sr4: dfptnb
   port map ( D => i_27_ZN, CP => clk, SDN => rstfifo, Q =>
        sm_sr4_Q, QN => sm_sr4_QN );

i_15: fn04d1
   port map ( A1 => i_19_ZN, A2 => i_18_ZN, B1 => fu1, B2 =>
        i_16_ZN, ZN => i_15_ZN );

sm_sr2: dfctnb
   port map ( D => i_15_ZN, CP => clk, CDN => rstfifo, Q =>
        sm_sr2_Q, QN => sm_sr2_QN );

i_22: nd02d0
   port map ( A1 => i_25_ZN, A2 => i_23_ZN, ZN => i_22_ZN );

i_30: oa03d1
   port map ( A1 => sm_sr1_Q, A2 => sm_sr2_QN, B1 => sm_sr3_QN,
        B2 => i_12_ZN, C => i_17_ZN, ZN => i_30_ZN );

i_29: mx21d1
   port map ( I0 => i_20_ZN, I1 => i_24_ZN, S => sm_sr1_Q, Z =>
        i_29_Z );

i_10: nd02d0
   port map ( A1 => sm_sr1_Q, A2 => i_11_ZN, ZN => i_10_ZN );

i_11: nr02d0
   port map ( A1 => sm_sr3_Q, A2 => sm_sr4_QN, ZN => i_11_ZN );

i_26: in01d0
   port map ( I => i_10_ZN, ZN => i_26_ZN );

i_25: nd02d0
   port map ( A1 => i_26_ZN, A2 => fu2, ZN => i_25_ZN );

i_20: nr02d0
   port map ( A1 => i_21_ZN, A2 => sm_sr2_Q, ZN => i_20_ZN );
```

```
  i_19: in01d0
    port map ( I => i_20_ZN, ZN => i_19_ZN );

  i_21: in01d0
    port map ( I => i_11_ZN, ZN => i_21_ZN );

  i_23: in01d0
    port map ( I => i_24_ZN, ZN => i_23_ZN );

  i_24: nr02d0
    port map ( A1 => sm_sr2_QN, A2 => sm_sr3_Q, ZN => i_24_ZN );

end resolv_smachn_1;
```

file: RESP_NEW.VHD

```
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity resp_new is

   port ( Mux : in Std_Logic := 'U';
        P_In : in Std_Logic := 'U';
        Resp : in Std_Logic := 'U';
        Clk : in Std_Logic := 'U';
        rst : in Std_Logic := 'U';

        P_Out : out Std_Logic := 'U' );

end resp_new;

------------------------------------------------------------------------

architecture resp_new OF resp_new is


   component model1
      port ( Resp : in Std_Logic;
           P_In : in Std_Logic;

           NR : out Std_Logic;
           P_Out : out Std_Logic );
   end component;

   signal U12_Q : Std_Logic;
   signal U4_Z : Std_Logic;
   signal U12_QN : Std_Logic;
   signal U13_NR : Std_Logic;

begin


   U4: mx21d1
      port map ( I0 => U12_Q, I1 => Resp, S => Mux, Z => U4_Z );

   U12: dfctnb
      port map ( D => U13_NR, CP => Clk, CDN => rst, Q => U12_Q, QN
            => U12_QN );

   U13: model1
      port map ( NR => U13_NR, Resp => U4_Z, P_In => P_In, P_Out =>
            P_Out );


end resp_new;
```

```
file: RSP_PRIO.VHD
-- Date of netlist generation:  Nov-19-93

----------------------------------------------------------------------

library IEEE;
use IEEE.STD_LOGIC_1164.ALL;

library COMPASS_LIB;
use COMPASS_LIB.COMPASS.ALL;

entity rsp_prio is


   port ( r0 : in Std_Logic := 'U';
        r1 : in Std_Logic := 'U';
        r2 : in Std_Logic := 'U';
        prsp : in Std_Logic := 'U';

        rsp : out Std_Logic := 'U';
        f1 : out Std_Logic := 'U';
        f2 : out Std_Logic := 'U';
        rs0 : out Std_Logic := 'U';
        rs1 : out Std_Logic := 'U';
        rs2 : out Std_Logic := 'U' );

end rsp_prio;

----------------------------------------------------------------------

architecture rsp_prio OF rsp_prio is

   component ff_enb2
      port ( a : in Std_Logic;
           clk : in Std_Logic;
           rst : in Std_Logic;
           ld : in Std_Logic;

           outt : out Std_Logic;
           nout : out Std_Logic );
   end component;



   signal rs0_local, rs1_local, rs2_local: Std_Logic;
   signal ldrsp : Std_Logic;
   signal U34_out : Std_Logic;
   signal U5_Z : Std_Logic;
   signal U33_out : Std_Logic;
   signal U32_out : Std_Logic;
   signal U40_Q : Std_Logic;

begin
```

```
U34: ff_enb2
   port map ( a => ldrsp, clk => CLK, outt => U34_out, rst =>
         ARESET, ld => r2, nout => rs2_local );

U33: ff_enb2
   port map ( a => ldrsp, clk => CLK, outt => U33_out, rst =>
         ARESET, ld => r1, nout => rs1_local );

U32: ff_enb2
   port map ( a => ldrsp, clk => CLK, outt => U32_out, rst =>
         ARESET, ld => r0, nout => rs0_local );

U5: or02d1
   port map ( A1 => rs1_local, A2 => rs0_local, Z => U5_Z );

U10: or03d1
   port map ( A1 => rs0_local, A2 => rs1_local, A3 => rs2_local,
         Z => rsp );

U9: or02d1
   port map ( A1 => U5_Z, A2 => rs0_local, Z => f2 );

U40: dfctnb
   port map ( D => prsp, CP => CLK, CDN => ARESET, Q => U40_Q,
         QN => ldrsp );

f1 <= rs0_local;
rs0 <= rs0_local;
rs1 <= rs1_local;
rs2 <= rs2_local;

end rsp_prio;
```

```
file: TAG18.VHD
-- Date of netlist generation: Nov-19-93

-----------------------------------------------------------------------

library IEEE;
use IEEE.STD_LOGIC_1164.ALL;

library COMPASS_LIB;
use COMPASS_LIB.COMPASS.ALL;

entity tag18 is

  port ( we : in Std_Logic := 'U';
       s_addr : in Std_Logic := 'U';
       rstaddr : in Std_Logic := 'U';
       mux2 : in Std_Logic := 'U';
       mux1 : in Std_Logic := 'U';
       mux0 : in Std_Logic := 'U';
       fir_in : in Std_Logic := 'U';
       carry_in : in Std_Logic := 'U';
       SetTag : in Std_Logic := 'U';
       prsp : in Std_Logic := 'U';
       ml : in Std_Logic_Vector(17 downto 0) := (others => 'U');
       fs : in Std_Logic_Vector(17 downto 0) := (others => 'U');
       ns : in Std_Logic_Vector(17 downto 0) := (others => 'U');
       nn : in Std_Logic_Vector(17 downto 0) := (others => 'U');
       fn : in Std_Logic_Vector(17 downto 0) := (others => 'U');
       fircnten : in Std_Logic := 'U';

       carry : out Std_Logic := 'U';
       wl : out Std_Logic_Vector(17 downto 0) := (others => 'U');
       tag : out Std_Logic_Vector(17 downto 0) := (others => 'U');
       rspen : out Std_Logic_Vector(17 downto 0) := (others =>
'U') );

end tag18;

-----------------------------------------------------------------------

architecture tag18 OF tag18 is

  component tag2
    port ( WE : in Std_Logic;
         ML : in Std_Logic;
         nn : in Std_Logic;
         fn : in Std_Logic;
         ns : in Std_Logic;
         fs : in Std_Logic;
         SetTag : in Std_Logic;
         Clk : in Std_Logic;
         Fir_In : in Std_Logic;
         Carry_In : in Std_Logic;
         S_Addr : in Std_Logic;
         RstAddr : in Std_Logic;
```

```
        Mux : in Std_Logic_Vector(0 to 2) := (others => 'U');
        prsp : in Std_Logic;
        fircnten : in Std_Logic;

        WL : out Std_Logic;
        Tag : out Std_Logic;
        Fir_Out : out Std_Logic;
        Carry_Out : out Std_Logic;
        rsp_tran : out Std_Logic );
  end component;


  signal f : Std_Logic_Vector(18 downto 1);
  signal S1 : Std_Logic;
  signal U332_QN : Std_Logic;
  signal r : Std_Logic_Vector(18 downto 1);
  signal S2 : Std_Logic;
  signal S3 : Std_Logic;
  signal S4 : Std_Logic;
  signal S5 : Std_Logic;
  signal S6 : Std_Logic;
  signal S7 : Std_Logic;
  signal S8 : Std_Logic;
  signal S9 : Std_Logic;
  signal S10 : Std_Logic;
  signal S11 : Std_Logic;
  signal S12 : Std_Logic;
  signal S13 : Std_Logic;
  signal S14 : Std_Logic;
  signal S15 : Std_Logic;
  signal S16 : Std_Logic;
  signal S17 : Std_Logic;
  signal S18 : Std_Logic;
  signal S19 : Std_Logic;
  signal S20 : Std_Logic;

begin


  U33717: tag2
    port map ( WE => we, WL => wl(17), ML => ml(17), nn => nn(17),
          fn => fn(17), ns => ns(17), fs => fs(17), SetTag
          => SetTag, Clk => CLK, Tag => tag(17), Fir_In =>
          f(17), Fir_Out => f(18), Carry_In => r(17),
          Carry_Out => r(18), S_Addr => s_addr, RstAddr =>
          rstaddr, Mux(0) => mux0, Mux(1) => mux1, Mux(2) =>
          mux2, prsp => prsp, rsp_tran => rspen(17),
          fircnten => fircnten );

  U33716: tag2
    port map ( WE => we, WL => wl(16), ML => ml(16), nn => nn(16),
          fn => fn(16), ns => ns(16), fs => fs(16), SetTag
          => SetTag, Clk => CLK, Tag => tag(16), Fir_In =>
          f(16), Fir_Out => f(17), Carry_In => r(16),
          Carry_Out => r(17), S_Addr => s_addr, RstAddr =>
          rstaddr, Mux(0) => mux0, Mux(1) => mux1, Mux(2) =>
          mux2, prsp => prsp, rsp_tran => rspen(16),
          fircnten => fircnten );
```

```
U33715: tag2
  port map ( WE => we, WL => wl(15), ML => ml(15), nn => nn(15),
        fn => fn(15), ns => ns(15), fs => fs(15), SetTag
        => SetTag, Clk => CLK, Tag => tag(15), Fir_In =>
        f(15), Fir_Out => f(16), Carry_In => r(15),
        Carry_Out => r(16), S_Addr => s_addr, RstAddr =>
        rstaddr, Mux(0) => mux0, Mux(1) => mux1, Mux(2) =>
        mux2, prsp => prsp, rsp_tran => rspen(15),
        fircnten => fircnten );

U33714: tag2
  port map ( WE => we, WL => wl(14), ML => ml(14), nn => nn(14),
        fn => fn(14), ns => ns(14), fs => fs(14), SetTag
        => SetTag, Clk => CLK, Tag => tag(14), Fir_In =>
        f(14), Fir_Out => f(15), Carry_In => r(14),
        Carry_Out => r(15), S_Addr => s_addr, RstAddr =>
        rstaddr, Mux(0) => mux0, Mux(1) => mux1, Mux(2) =>
        mux2, prsp => prsp, rsp_tran => rspen(14),
        fircnten => fircnten );

U33713: tag2
  port map ( WE => we, WL => wl(13), ML => ml(13), nn => nn(13),
        fn => fn(13), ns => ns(13), fs => fs(13), SetTag
        => SetTag, Clk => CLK, Tag => tag(13), Fir_In =>
        f(13), Fir_Out => f(14), Carry_In => r(13),
        Carry_Out => r(14), S_Addr => s_addr, RstAddr =>
        rstaddr, Mux(0) => mux0, Mux(1) => mux1, Mux(2) =>
        mux2, prsp => prsp, rsp_tran => rspen(13),
        fircnten => fircnten );

U33712: tag2
  port map ( WE => we, WL => wl(12), ML => ml(12), nn => nn(12),
        fn => fn(12), ns => ns(12), fs => fs(12), SetTag
        => SetTag, Clk => CLK, Tag => tag(12), Fir_In =>
        f(12), Fir_Out => f(13), Carry_In => r(12),
        Carry_Out => r(13), S_Addr => s_addr, RstAddr =>
        rstaddr, Mux(0) => mux0, Mux(1) => mux1, Mux(2) =>
        mux2, prsp => prsp, rsp_tran => rspen(12),
        fircnten => fircnten );

U33711: tag2
  port map ( WE => we, WL => wl(11), ML => ml(11), nn => nn(11),
        fn => fn(11), ns => ns(11), fs => fs(11), SetTag
        => SetTag, Clk => CLK, Tag => tag(11), Fir_In =>
        f(11), Fir_Out => f(12), Carry_In => r(11),
        Carry_Out => r(12), S_Addr => s_addr, RstAddr =>
        rstaddr, Mux(0) => mux0, Mux(1) => mux1, Mux(2) =>
        mux2, prsp => prsp, rsp_tran => rspen(11),
        fircnten => fircnten );

U33710: tag2
  port map ( WE => we, WL => wl(10), ML => ml(10), nn => nn(10),
        fn => fn(10), ns => ns(10), fs => fs(10), SetTag
        => SetTag, Clk => CLK, Tag => tag(10), Fir_In =>
        f(10), Fir_Out => f(11), Carry_In => r(10),
        Carry_Out => r(11), S_Addr => s_addr, RstAddr =>
        rstaddr, Mux(0) => mux0, Mux(1) => mux1, Mux(2) =>
```

```
        mux2, prsp => prsp, rsp_tran => rspen(10),
        fircnten => fircnten );

U3379: tag2
   port map ( WE => we, WL => wl(9), ML => ml(9), nn => nn(9),
        fn => fn(9), ns => ns(9), fs => fs(9), SetTag =>
        SetTag, Clk => CLK, Tag => tag(9), Fir_In => f(9),
        Fir_Out => f(10), Carry_In => r(9), Carry_Out =>
        r(10), S_Addr => s_addr, RstAddr => rstaddr,
        Mux(0) => mux0, Mux(1) => mux1, Mux(2) => mux2,
        prsp => prsp, rsp_tran => rspen(9), fircnten =>
        fircnten );

U3378: tag2
   port map ( WE => we, WL => wl(8), ML => ml(8), nn => nn(8),
        fn => fn(8), ns => ns(8), fs => fs(8), SetTag =>
        SetTag, Clk => CLK, Tag => tag(8), Fir_In => f(8),
        Fir_Out => f(9), Carry_In => r(8), Carry_Out =>
        r(9), S_Addr => s_addr, RstAddr => rstaddr, Mux(0)
        => mux0, Mux(1) => mux1, Mux(2) => mux2, prsp =>
        prsp, rsp_tran => rspen(8), fircnten => fircnten );

U3377: tag2
   port map ( WE => we, WL => wl(7), ML => ml(7), nn => nn(7),
        fn => fn(7), ns => ns(7), fs => fs(7), SetTag =>
        SetTag, Clk => CLK, Tag => tag(7), Fir_In => f(7),
        Fir_Out => f(8), Carry_In => r(7), Carry_Out =>
        r(8), S_Addr => s_addr, RstAddr => rstaddr, Mux(0)
        => mux0, Mux(1) => mux1, Mux(2) => mux2, prsp =>
        prsp, rsp_tran => rspen(7), fircnten => fircnten );

U3376: tag2
   port map ( WE => we, WL => wl(6), ML => ml(6), nn => nn(6),
        fn => fn(6), ns => ns(6), fs => fs(6), SetTag =>
        SetTag, Clk => CLK, Tag => tag(6), Fir_In => f(6),
        Fir_Out => f(7), Carry_In => r(6), Carry_Out =>
        r(7), S_Addr => s_addr, RstAddr => rstaddr, Mux(0)
        => mux0, Mux(1) => mux1, Mux(2) => mux2, prsp =>
        prsp, rsp_tran => rspen(6), fircnten => fircnten );

U3375: tag2
   port map ( WE => we, WL => wl(5), ML => ml(5), nn => nn(5),
        fn => fn(5), ns => ns(5), fs => fs(5), SetTag =>
        SetTag, Clk => CLK, Tag => tag(5), Fir_In => f(5),
        Fir_Out => f(6), Carry_In => r(5), Carry_Out =>
        r(6), S_Addr => s_addr, RstAddr => rstaddr, Mux(0)
        => mux0, Mux(1) => mux1, Mux(2) => mux2, prsp =>
        prsp, rsp_tran => rspen(5), fircnten => fircnten );

U3374: tag2
   port map ( WE => we, WL => wl(4), ML => ml(4), nn => nn(4),
        fn => fn(4), ns => ns(4), fs => fs(4), SetTag =>
        SetTag, Clk => CLK, Tag => tag(4), Fir_In => f(4),
        Fir_Out => f(5), Carry_In => r(4), Carry_Out =>
        r(5), S_Addr => s_addr, RstAddr => rstaddr, Mux(0)
        => mux0, Mux(1) => mux1, Mux(2) => mux2, prsp =>
        prsp, rsp_tran => rspen(4), fircnten => fircnten );
```

```
U3373: tag2
   port map ( WE => we, WL => wl(3), ML => ml(3), nn => nn(3),
         fn => fn(3), ns => ns(3), fs => fs(3), SetTag =>
         SetTag, Clk => CLK, Tag => tag(3), Fir_In => f(3),
         Fir_Out => f(4), Carry_In => r(3), Carry_Out =>
         r(4), S_Addr => s_addr, RstAddr => rstaddr, Mux(0)
         => mux0, Mux(1) => mux1, Mux(2) => mux2, prsp =>
         prsp, rsp_tran => rspen(3), fircnten => fircnten );

U3372: tag2
   port map ( WE => we, WL => wl(2), ML => ml(2), nn => nn(2),
         fn => fn(2), ns => ns(2), fs => fs(2), SetTag =>
         SetTag, Clk => CLK, Tag => tag(2), Fir_In => f(2),
         Fir_Out => f(3), Carry_In => r(2), Carry_Out =>
         r(3), S_Addr => s_addr, RstAddr => rstaddr, Mux(0)
         => mux0, Mux(1) => mux1, Mux(2) => mux2, prsp =>
         prsp, rsp_tran => rspen(2), fircnten => fircnten );

U3371: tag2
   port map ( WE => we, WL => wl(1), ML => ml(1), nn => nn(1),
         fn => fn(1), ns => ns(1), fs => fs(1), SetTag =>
         SetTag, Clk => CLK, Tag => tag(1), Fir_In => f(1),
         Fir_Out => f(2), Carry_In => r(1), Carry_Out =>
         r(2), S_Addr => s_addr, RstAddr => rstaddr, Mux(0)
         => mux0, Mux(1) => mux1, Mux(2) => mux2, prsp =>
         prsp, rsp_tran => rspen(1), fircnten => fircnten );

U3370: tag2
   port map ( WE => we, WL => wl(0), ML => ml(0), nn => nn(0),
         fn => fn(0), ns => ns(0), fs => fs(0), SetTag =>
         SetTag, Clk => CLK, Tag => tag(0), Fir_In =>
         fir_in, Fir_Out => f(1), Carry_In => carry_in,
         Carry_Out => r(1), S_Addr => s_addr, RstAddr =>
         rstaddr, Mux(0) => mux0, Mux(1) => mux1, Mux(2) =>
         mux2, prsp => prsp, rsp_tran => rspen(0), fircnten
         => fircnten );

U332: dfctnb
   port map ( D => r(18), CP => CLK, CDN => rstaddr, Q => carry,
         QN => U332_QN );

end tag18;
```

```
file: TAG19.VHD
-- Date of netlist generation:  Nov-19-93

----------------------------------------------------------------------
library IEEE;
use IEEE.STD_LOGIC_1164.ALL;

library COMPASS_LIB;
use COMPASS_LIB.COMPASS.ALL;

entity tag19 is

   port ( we : in Std_Logic := 'U';
        s_addr : in Std_Logic := 'U';
        rstaddr : in Std_Logic := 'U';
        mux2 : in Std_Logic := 'U';
        mux1 : in Std_Logic := 'U';
        mux0 : in Std_Logic := 'U';
        fir_in : in Std_Logic := 'U';
        carry_in : in Std_Logic := 'U';
        SetTag : in Std_Logic := 'U';
        prsp : in Std_Logic := 'U';
        ml : in Std_Logic_Vector(18 downto 0) := (others => 'U');
        fs : in Std_Logic_Vector(18 downto 0) := (others => 'U');
        ns : in Std_Logic_Vector(18 downto 0) := (others => 'U');
        nn : in Std_Logic_Vector(18 downto 0) := (others => 'U');
        fn : in Std_Logic_Vector(18 downto 0) := (others => 'U');
        fircnten : in Std_Logic := 'U';

        carry : out Std_Logic := 'U';
        fir : out Std_Logic := 'U';
        wl : out Std_Logic_Vector(18 downto 0) := (others => 'U');
        sado : out Std_Logic := 'U';
        tag : out Std_Logic_Vector(18 downto 0) := (others => 'U');
        rspen : out Std_Logic_Vector(18 downto 0) := (others =>
'U') );

end tag19;
----------------------------------------------------------------------
architecture tag19 OF tag19 is

   component tag2
      port ( WE : in Std_Logic;
           ML : in Std_Logic;
           nn : in Std_Logic;
           fn : in Std_Logic;
           ns : in Std_Logic;
           fs : in Std_Logic;
           SetTag : in Std_Logic;
           Clk : in Std_Logic;
           Fir_In : in Std_Logic;
           Carry_In : in Std_Logic;
           S_Addr : in Std_Logic;
           RstAddr : in Std_Logic;
           Mux : in Std_Logic_Vector(0 to 2) := (others => 'U');
           prsp : in Std_Logic;
           fircnten : in Std_Logic;
```

```
        WL : out Std_Logic;
        Tag : out Std_Logic;
        Fir_Out : out Std_Logic;
        Carry_Out : out Std_Logic;
        rsp_tran : out Std_Logic );
  end component;

  signal U335_QN : Std_Logic;
  signal U330_QN : Std_Logic;
  signal f : Std_Logic_Vector(19 downto 1);
  signal S1 : Std_Logic;
  signal U332_QN : Std_Logic;
  signal r : Std_Logic_Vector(19 downto 1);
  signal S2 : Std_Logic;
  signal S3 : Std_Logic;
  signal S4 : Std_Logic;
  signal S5 : Std_Logic;
  signal S6 : Std_Logic;
  signal S7 : Std_Logic;
  signal S8 : Std_Logic;
  signal S9 : Std_Logic;
  signal S10 : Std_Logic;
  signal S11 : Std_Logic;
  signal S12 : Std_Logic;
  signal S13 : Std_Logic;
  signal S14 : Std_Logic;
  signal S15 : Std_Logic;
  signal S16 : Std_Logic;
  signal S17 : Std_Logic;
  signal S18 : Std_Logic;
  signal S19 : Std_Logic;
  signal S20 : Std_Logic;
  signal S21 : Std_Logic;

begin


  U330: dfctnb
    port map ( D => f(19), CP => CLK, CDN => rstaddr, Q => fir,
          QN => U330_QN );

  U33718: tag2
    port map ( WE => we, WL => wl(18), ML => ml(18), nn => nn(18),
          fn => fn(18), ns => ns(18), fs => fs(18), SetTag
          => SetTag, Clk => CLK, Tag => tag(18), Fir_In =>
          f(18), Fir_Out => f(19), Carry_In => r(18),
          Carry_Out => r(19), S_Addr => s_addr, RstAddr =>
          rstaddr, Mux(0) => mux0, Mux(1) => mux1, Mux(2) =>
          mux2, prsp => prsp, rsp_tran => rspen(18),
          fircnten => fircnten );

  U33717: tag2
    port map ( WE => we, WL => wl(17), ML => ml(17), nn => nn(17),
          fn => fn(17), ns => ns(17), fs => fs(17), SetTag
          => SetTag, Clk => CLK, Tag => tag(17), Fir_In =>
          f(17), Fir_Out => f(18), Carry_In => r(17),
          Carry_Out => r(18), S_Addr => s_addr, RstAddr =>
          rstaddr, Mux(0) => mux0, Mux(1) => mux1, Mux(2) =>
```

```
        mux2, prsp => prsp, rsp_tran => rspen(17),
        fircnten => fircnten );

U33716: tag2
   port map ( WE => we, WL => wl(16), ML => ml(16), nn => nn(16),
        fn => fn(16), ns => ns(16), fs => fs(16), SetTag
        => SetTag, Clk => CLK, Tag => tag(16), Fir_In =>
        f(16), Fir_Out => f(17), Carry_In => r(16),
        Carry_Out => r(17), S_Addr => s_addr, RstAddr =>
        rstaddr, Mux(0) => mux0, Mux(1) => mux1, Mux(2) =>
        mux2, prsp => prsp, rsp_tran => rspen(16),
        fircnten => fircnten );

U33715: tag2
   port map ( WE => we, WL => wl(15), ML => ml(15), nn => nn(15),
        fn => fn(15), ns => ns(15), fs => fs(15), SetTag
        => SetTag, Clk => CLK, Tag => tag(15), Fir_In =>
        f(15), Fir_Out => f(16), Carry_In => r(15),
        Carry_Out => r(16), S_Addr => s_addr, RstAddr =>
        rstaddr, Mux(0) => mux0, Mux(1) => mux1, Mux(2) =>
        mux2, prsp => prsp, rsp_tran => rspen(15),
        fircnten => fircnten );

U33714: tag2
   port map ( WE => we, WL => wl(14), ML => ml(14), nn => nn(14),
        fn => fn(14), ns => ns(14), fs => fs(14), SetTag
        => SetTag, Clk => CLK, Tag => tag(14), Fir_In =>
        f(14), Fir_Out => f(15), Carry_In => r(14),
        Carry_Out => r(15), S_Addr => s_addr, RstAddr =>
        rstaddr, Mux(0) => mux0, Mux(1) => mux1, Mux(2) =>
        mux2, prsp => prsp, rsp_tran => rspen(14),
        fircnten => fircnten );

U33713: tag2
   port map ( WE => we, WL => wl(13), ML => ml(13), nn => nn(13),
        fn => fn(13), ns => ns(13), fs => fs(13), SetTag
        => SetTag, Clk => CLK, Tag => tag(13), Fir_In =>
        f(13), Fir_Out => f(14), Carry_In => r(13),
        Carry_Out => r(14), S_Addr => s_addr, RstAddr =>
        rstaddr, Mux(0) => mux0, Mux(1) => mux1, Mux(2) =>
        mux2, prsp => prsp, rsp_tran => rspen(13),
        fircnten => fircnten );

U33712: tag2
   port map ( WE => we, WL => wl(12), ML => ml(12), nn => nn(12),
        fn => fn(12), ns => ns(12), fs => fs(12), SetTag
        => SetTag, Clk => CLK, Tag => tag(12), Fir_In =>
        f(12), Fir_Out => f(13), Carry_In => r(12),
        Carry_Out => r(13), S_Addr => s_addr, RstAddr =>
        rstaddr, Mux(0) => mux0, Mux(1) => mux1, Mux(2) =>
        mux2, prsp => prsp, rsp_tran => rspen(12),
        fircnten => fircnten );

U33711: tag2
   port map ( WE => we, WL => wl(11), ML => ml(11), nn => nn(11),
        fn => fn(11), ns => ns(11), fs => fs(11), SetTag
        => SetTag, Clk => CLK, Tag => tag(11), Fir_In =>
        f(11), Fir_Out => f(12), Carry_In => r(11),
```

```
        Carry_Out => r(12), S_Addr => s_addr, RstAddr =>
        rstaddr, Mux(0) => mux0, Mux(1) => mux1, Mux(2) =>
        mux2, prsp => prsp, rsp_tran => rspen(11),
        fircnten => fircnten );

U33710: tag2
   port map ( WE => we, WL => wl(10), ML => ml(10), nn => nn(10),
        fn => fn(10), ns => ns(10), fs => fs(10), SetTag
        => SetTag, Clk => CLK, Tag => tag(10), Fir_In =>
        f(10), Fir_Out => f(11), Carry_In => r(10),
        Carry_Out => r(11), S_Addr => s_addr, RstAddr =>
        rstaddr, Mux(0) => mux0, Mux(1) => mux1, Mux(2) =>
        mux2, prsp => prsp, rsp_tran => rspen(10),
        fircnten => fircnten );

U3379: tag2
   port map ( WE => we, WL => wl(9), ML => ml(9), nn => nn(9),
        fn => fn(9), ns => ns(9), fs => fs(9), SetTag =>
        SetTag, Clk => CLK, Tag => tag(9), Fir_In => f(9),
        Fir_Out => f(10), Carry_In => r(9), Carry_Out =>
        r(10), S_Addr => s_addr, RstAddr => rstaddr,
        Mux(0) => mux0, Mux(1) => mux1, Mux(2) => mux2,
        prsp => prsp, rsp_tran => rspen(9), fircnten =>
        fircnten );

U3378: tag2
   port map ( WE => we, WL => wl(8), ML => ml(8), nn => nn(8),
        fn => fn(8), ns => ns(8), fs => fs(8), SetTag =>
        SetTag, Clk => CLK, Tag => tag(8), Fir_In => f(8),
        Fir_Out => f(9), Carry_In => r(8), Carry_Out =>
        r(9), S_Addr => s_addr, RstAddr => rstaddr, Mux(0)
        => mux0, Mux(1) => mux1, Mux(2) => mux2, prsp =>
        prsp, rsp_tran => rspen(8), fircnten => fircnten );

U3377: tag2
   port map ( WE => we, WL => wl(7), ML => ml(7), nn => nn(7),
        fn => fn(7), ns => ns(7), fs => fs(7), SetTag =>
        SetTag, Clk => CLK, Tag => tag(7), Fir_In => f(7),
        Fir_Out => f(8), Carry_In => r(7), Carry_Out =>
        r(8), S_Addr => s_addr, RstAddr => rstaddr, Mux(0)
        => mux0, Mux(1) => mux1, Mux(2) => mux2, prsp =>
        prsp, rsp_tran => rspen(7), fircnten => fircnten );

U3376: tag2
   port map ( WE => we, WL => wl(6), ML => ml(6), nn => nn(6),
        fn => fn(6), ns => ns(6), fs => fs(6), SetTag =>
        SetTag, Clk => CLK, Tag => tag(6), Fir_In => f(6),
        Fir_Out => f(7), Carry_In => r(6), Carry_Out =>
        r(7), S_Addr => s_addr, RstAddr => rstaddr, Mux(0)
        => mux0, Mux(1) => mux1, Mux(2) => mux2, prsp =>
        prsp, rsp_tran => rspen(6), fircnten => fircnten );

U3375: tag2
   port map ( WE => we, WL => wl(5), ML => ml(5), nn => nn(5),
        fn => fn(5), ns => ns(5), fs => fs(5), SetTag =>
        SetTag, Clk => CLK, Tag => tag(5), Fir_In => f(5),
        Fir_Out => f(6), Carry_In => r(5), Carry_Out =>
        r(6), S_Addr => s_addr, RstAddr => rstaddr, Mux(0)
```

```
          => mux0, Mux(1) => mux1, Mux(2) => mux2, prsp =>
          prsp, rsp_tran => rspen(5), fircnten => fircnten );

   U3374: tag2
      port map ( WE => we, WL => wl(4), ML => ml(4), nn => nn(4),
          fn => fn(4), ns => ns(4), fs => fs(4), SetTag =>
          SetTag, Clk => CLK, Tag => tag(4), Fir_In => f(4),
          Fir_Out => f(5), Carry_In => r(4), Carry_Out =>
          r(5), S_Addr => s_addr, RstAddr => rstaddr, Mux(0)
          => mux0, Mux(1) => mux1, Mux(2) => mux2, prsp =>
          prsp, rsp_tran => rspen(4), fircnten => fircnten );

   U3373: tag2
      port map ( WE => we, WL => wl(3), ML => ml(3), nn => nn(3),
          fn => fn(3), ns => ns(3), fs => fs(3), SetTag =>
          SetTag, Clk => CLK, Tag => tag(3), Fir_In => f(3),
          Fir_Out => f(4), Carry_In => r(3), Carry_Out =>
          r(4), S_Addr => s_addr, RstAddr => rstaddr, Mux(0)
          => mux0, Mux(1) => mux1, Mux(2) => mux2, prsp =>
          prsp, rsp_tran => rspen(3), fircnten => fircnten );

   U3372: tag2
      port map ( WE => we, WL => wl(2), ML => ml(2), nn => nn(2),
          fn => fn(2), ns => ns(2), fs => fs(2), SetTag =>
          SetTag, Clk => CLK, Tag => tag(2), Fir_In => f(2),
          Fir_Out => f(3), Carry_In => r(2), Carry_Out =>
          r(3), S_Addr => s_addr, RstAddr => rstaddr, Mux(0)
          => mux0, Mux(1) => mux1, Mux(2) => mux2, prsp =>
          prsp, rsp_tran => rspen(2), fircnten => fircnten );

   U3371: tag2
      port map ( WE => we, WL => wl(1), ML => ml(1), nn => nn(1),
          fn => fn(1), ns => ns(1), fs => fs(1), SetTag =>
          SetTag, Clk => CLK, Tag => tag(1), Fir_In => f(1),
          Fir_Out => f(2), Carry_In => r(1), Carry_Out =>
          r(2), S_Addr => s_addr, RstAddr => rstaddr, Mux(0)
          => mux0, Mux(1) => mux1, Mux(2) => mux2, prsp =>
          prsp, rsp_tran => rspen(1), fircnten => fircnten );

   U3370: tag2
      port map ( WE => we, WL => wl(0), ML => ml(0), nn => nn(0),
          fn => fn(0), ns => ns(0), fs => fs(0), SetTag =>
          SetTag, Clk => CLK, Tag => tag(0), Fir_In =>
          fir_in, Fir_Out => f(1), Carry_In => carry_in,
          Carry_Out => r(1), S_Addr => s_addr, RstAddr =>
          rstaddr, Mux(0) => mux0, Mux(1) => mux1, Mux(2) =>
          mux2, prsp => prsp, rsp_tran => rspen(0), fircnten
          => fircnten );

   U335: dfctnb
      port map ( D => s_addr, CP => CLK, CDN => rstaddr, Q => sado,
          QN => U335_QN );

   U332: dfctnb
      port map ( D => r(19), CP => CLK, CDN => rstaddr, Q => carry,
          QN => U332_QN );

end tag19;
```

```
file: TAG2.VHD
-- Date of netlist generation:  Nov-19-93

-----------------------------------------------------------------------

library IEEE;
use IEEE.STD_LOGIC_1164.ALL;

library COMPASS_LIB;
use COMPASS_LIB.COMPASS.ALL;

entity tag2 is


   port ( WE : in Std_Logic := 'U';
        ML : in Std_Logic := 'U';
        nn : in Std_Logic := 'U';
        fn : in Std_Logic := 'U';
        ns : in Std_Logic := 'U';
        fs : in Std_Logic := 'U';
        SetTag : in Std_Logic := 'U';
        Clk : in Std_Logic := 'U';
        Fir_In : in Std_Logic := 'U';
        Carry_In : in Std_Logic := 'U';
        S_Addr : in Std_Logic := 'U';
        RstAddr : in Std_Logic := 'U';
        Mux : in Std_Logic_Vector(0 to 2) := (others => 'U');
        prsp : in Std_Logic := 'U';
        fircnten : in Std_Logic := 'U';

        WL : out Std_Logic := 'U';
        Tag : out Std_Logic := 'U';
        Fir_Out : out Std_Logic := 'U';
        Carry_Out : out Std_Logic := 'U';
        rsp_tran : out Std_Logic := 'U' );

end tag2;

-----------------------------------------------------------------------

architecture tag2 OF tag2 is


   component FirSel
      port ( Tag_In : in Std_Logic;
           R_In : in Std_Logic;

           S1 : out Std_Logic;
           R_Out : out Std_Logic );
   end component;


   component resp_new
      port ( Mux : in Std_Logic;
```

```
        P_In : in Std_Logic;
        Resp : in Std_Logic;
        Clk : in Std_Logic;
        rst : in Std_Logic;

        P_Out : out Std_Logic );
  end component;


  signal Tag_local: Std_Logic;
  signal U67_Z : Std_Logic;
  signal fir : Std_Logic;
  signal yo : Std_Logic;
  signal U23_Z : Std_Logic;
  signal U65_QN : Std_Logic;

begin


  U65: dfptnb
    port map ( D => yo, CP => Clk, SDN => SetTag, Q => Tag_local,
          QN => U65_QN );

  U1: mx81d1
    port map ( I0 => Tag_local, I1 => nn, I2 => fn, I3 => VSS, I4
          => U23_Z, I5 => fs, I6 => ns, I7 => fir, S0 =>
          Mux(0), S1 => Mux(1), S2 => Mux(2), Z => yo );

  U29: FirSel
    port map ( Tag_In => U67_Z, S1 => fir, R_In => Fir_In, R_Out
          => Fir_Out );

  U23: an02d1
    port map ( A1 => Tag_local, A2 => ML, Z => U23_Z );

  U60: an02d1
    port map ( A1 => prsp, A2 => Tag_local, Z => rsp_tran );

  U58: an02d2
    port map ( A1 => Tag_local, A2 => WE, Z => WL );

  U62: resp_new
    port map ( Mux => S_Addr, P_In => Carry_In, P_Out =>
          Carry_Out, Resp => U67_Z, Clk => Clk, rst =>
          RstAddr );

  U67: an02d1
    port map ( A1 => fircnten, A2 => Tag_local, Z => U67_Z );

  Tag <= Tag_local;

end tag2;
```

```
file: TAG341.VHD
-- Date of netlist generation:  Nov-19-93

------------------------------------------------------------------------

library IEEE;
use IEEE.STD_LOGIC_1164.ALL;

library COMPASS_LIB;
use COMPASS_LIB.COMPASS.ALL;

entity tag341 is

   port ( prsp : in Std_Logic := 'U';
        setag : in Std_Logic := 'U';
        cntinit : in Std_Logic := 'U';
        rstaddr : in Std_Logic := 'U';
        mux2 : in Std_Logic := 'U';
        mux1 : in Std_Logic := 'U';
        mux0 : in Std_Logic := 'U';
        fir_in : in Std_Logic := 'U';
        resp_in : in Std_Logic := 'U';
        we : in Std_Logic := 'U';
        fn : in Std_Logic_Vector(340 downto 0) := (others => 'U');
        nn : in Std_Logic_Vector(340 downto 0) := (others => 'U');
        ns : in Std_Logic_Vector(340 downto 0) := (others => 'U');
        fs : in Std_Logic_Vector(340 downto 0) := (others => 'U');
        ml : in Std_Logic_Vector(340 downto 0) := (others => 'U');
        fircnten : in Std_Logic := 'U';

        count : out Std_Logic := 'U';
        tag : out Std_Logic_Vector(340 downto 0) := (others =>
'U');
        rspen : out Std_Logic_Vector(340 downto 0) := (others =>
'U');
        wl : out Std_Logic_Vector(340 downto 0) := (others => 'U')
);

end tag341;

------------------------------------------------------------------------

architecture tag341 OF tag341 is

   component tag19
      port ( we : in Std_Logic;
           s_addr : in Std_Logic;
           rstaddr : in Std_Logic;
           mux2 : in Std_Logic;
           mux1 : in Std_Logic;
           mux0 : in Std_Logic;
           fir_in : in Std_Logic;
           carry_in : in Std_Logic;
           SetTag : in Std_Logic;
           prsp : in Std_Logic;
           ml : in Std_Logic_Vector(18 downto 0) := (others =>
'U');
           fs : in Std_Logic_Vector(18 downto 0) := (others =>
```

```
'U');
        ns : in Std_Logic_Vector(18 downto 0) := (others =>
'U');
        nn : in Std_Logic_Vector(18 downto 0) := (others =>
'U');
        fn : in Std_Logic_Vector(18 downto 0) := (others =>
'U');
        fircnten : in Std_Logic;

        carry : out Std_Logic;
        fir : out Std_Logic;
        wl : out Std_Logic_Vector(18 downto 0) := (others =>
'U');
        sado : out Std_Logic;
        tag : out Std_Logic_Vector(18 downto 0) := (others =>
'U');
        rspen : out Std_Logic_Vector(18 downto 0) := (others
=> 'U') );
  end component;

  component tag18
     port ( we : in Std_Logic;
        s_addr : in Std_Logic;
        rstaddr : in Std_Logic;
        mux2 : in Std_Logic;
        mux1 : in Std_Logic;
        mux0 : in Std_Logic;
        fir_in : in Std_Logic;
        carry_in : in Std_Logic;
        SetTag : in Std_Logic;
        prsp : in Std_Logic;
        ml : in Std_Logic_Vector(17 downto 0) := (others =>
'U');
        fs : in Std_Logic_Vector(17 downto 0) := (others =>
'U');
        ns : in Std_Logic_Vector(17 downto 0) := (others =>
'U');
        nn : in Std_Logic_Vector(17 downto 0) := (others =>
'U');
        fn : in Std_Logic_Vector(17 downto 0) := (others =>
'U');
        fircnten : in Std_Logic;

        carry : out Std_Logic;
        wl : out Std_Logic_Vector(17 downto 0) := (others =>
'U');
        tag : out Std_Logic_Vector(17 downto 0) := (others =>
'U');
        rspen : out Std_Logic_Vector(17 downto 0) := (others
=> 'U') );
  end component;

  signal a : Std_Logic_Vector(17 downto 1);
  signal S1 : Std_Logic;
  signal f : Std_Logic_Vector(17 downto 1);
  signal c : Std_Logic_Vector(17 downto 1);
  signal S2 : Std_Logic;
  signal S3 : Std_Logic;
```

```
begin

  U42416: tag19
    port map ( we => we, s_addr => a(16), rstaddr => rstaddr,
          mux2 => mux2, mux1 => mux1, mux0 => mux0, fir_in
          => f(16), carry_in => c(16), SetTag => setag, prsp
          => prsp, carry => c(17), fir => f(17), wl(18) =>
          wl(322), wl(17) => wl(321), wl(16) => wl(320),
          wl(15) => wl(319), wl(14) => wl(318), wl(13) =>
          wl(317), wl(12) => wl(316), wl(11) => wl(315),
          wl(10) => wl(314), wl(9) => wl(313), wl(8) =>
          wl(312), wl(7) => wl(311), wl(6) => wl(310), wl(5)
          => wl(309), wl(4) => wl(308), wl(3) => wl(307),
          wl(2) => wl(306), wl(1) => wl(305), wl(0) =>
          wl(304), ml(18) => ml(322), ml(17) => ml(321),
          ml(16) => ml(320), ml(15) => ml(319), ml(14) =>
          ml(318), ml(13) => ml(317), ml(12) => ml(316),
          ml(11) => ml(315), ml(10) => ml(314), ml(9) =>
          ml(313), ml(8) => ml(312), ml(7) => ml(311), ml(6)
          => ml(310), ml(5) => ml(309), ml(4) => ml(308),
          ml(3) => ml(307), ml(2) => ml(306), ml(1) =>
          ml(305), ml(0) => ml(304), sado => a(17), fs(18)
          => fs(322), fs(17) => fs(321), fs(16) => fs(320),
          fs(15) => fs(319), fs(14) => fs(318), fs(13) =>
          fs(317), fs(12) => fs(316), fs(11) => fs(315),
          fs(10) => fs(314), fs(9) => fs(313), fs(8) =>
          fs(312), fs(7) => fs(311), fs(6) => fs(310), fs(5)
          => fs(309), fs(4) => fs(308), fs(3) => fs(307),
          fs(2) => fs(306), fs(1) => fs(305), fs(0) =>
          fs(304), ns(18) => ns(322), ns(17) => ns(321),
          ns(16) => ns(320), ns(15) => ns(319), ns(14) =>
          ns(318), ns(13) => ns(317), ns(12) => ns(316),
          ns(11) => ns(315), ns(10) => ns(314), ns(9) =>
          ns(313), ns(8) => ns(312), ns(7) => ns(311), ns(6)
          => ns(310), ns(5) => ns(309), ns(4) => ns(308),
          ns(3) => ns(307), ns(2) => ns(306), ns(1) =>
          ns(305), ns(0) => ns(304), tag(18) => tag(322),
          tag(17) => tag(321), tag(16) => tag(320), tag(15)
          => tag(319), tag(14) => tag(318), tag(13) =>
          tag(317), tag(12) => tag(316), tag(11) => tag(315),
          tag(10) => tag(314), tag(9) => tag(313), tag(8) =>
          tag(312), tag(7) => tag(311), tag(6) => tag(310),
          tag(5) => tag(309), tag(4) => tag(308), tag(3) =>
          tag(307), tag(2) => tag(306), tag(1) => tag(305),
          tag(0) => tag(304), nn(18) => nn(322), nn(17) =>
          nn(321), nn(16) => nn(320), nn(15) => nn(319),
          nn(14) => nn(318), nn(13) => nn(317), nn(12) =>
          nn(316), nn(11) => nn(315), nn(10) => nn(314),
          nn(9) => nn(313), nn(8) => nn(312), nn(7) =>
          nn(311), nn(6) => nn(310), nn(5) => nn(309), nn(4)
          => nn(308), nn(3) => nn(307), nn(2) => nn(306),
          nn(1) => nn(305), nn(0) => nn(304), fn(18) =>
          fn(322), fn(17) => fn(321), fn(16) => fn(320),
          fn(15) => fn(319), fn(14) => fn(318), fn(13) =>
          fn(317), fn(12) => fn(316), fn(11) => fn(315),
          fn(10) => fn(314), fn(9) => fn(313), fn(8) =>
```

```
fn(312), fn(7) => fn(311), fn(6) => fn(310), fn(5)
=> fn(309), fn(4) => fn(308), fn(3) => fn(307),
fn(2) => fn(306), fn(1) => fn(305), fn(0) =>
fn(304), rspen(18) => rspen(322), rspen(17) =>
rspen(321), rspen(16) => rspen(320), rspen(15) =>
rspen(319), rspen(14) => rspen(318), rspen(13) =>
rspen(317), rspen(12) => rspen(316), rspen(11) =>
rspen(315), rspen(10) => rspen(314), rspen(9) =>
rspen(313), rspen(8) => rspen(312), rspen(7) =>
rspen(311), rspen(6) => rspen(310), rspen(5) =>
rspen(309), rspen(4) => rspen(308), rspen(3) =>
rspen(307), rspen(2) => rspen(306), rspen(1) =>
rspen(305), rspen(0) => rspen(304), fircnten =>
fircnten );

U42415: tag19
  port map ( we => we, s_addr => a(15), rstaddr => rstaddr,
    mux2 => mux2, mux1 => mux1, mux0 => mux0, fir_in
    => f(15), carry_in => c(15), SetTag => setag, prsp
    => prsp, carry => c(16), fir => f(16), wl(18) =>
    wl(303), wl(17) => wl(302), wl(16) => wl(301),
    wl(15) => wl(300), wl(14) => wl(299), wl(13) =>
    wl(298), wl(12) => wl(297), wl(11) => wl(296),
    wl(10) => wl(295), wl(9) => wl(294), wl(8) =>
    wl(293), wl(7) => wl(292), wl(6) => wl(291), wl(5)
    => wl(290), wl(4) => wl(289), wl(3) => wl(288),
    wl(2) => wl(287), wl(1) => wl(286), wl(0) =>
    wl(285), ml(18) => ml(303), ml(17) => ml(302),
    ml(16) => ml(301), ml(15) => ml(300), ml(14) =>
    ml(299), ml(13) => ml(298), ml(12) => ml(297),
    ml(11) => ml(296), ml(10) => ml(295), ml(9) =>
    ml(294), ml(8) => ml(293), ml(7) => ml(292), ml(6)
    => ml(291), ml(5) => ml(290), ml(4) => ml(289),
    ml(3) => ml(288), ml(2) => ml(287), ml(1) =>
    ml(286), ml(0) => ml(285), sado => a(16), fs(18)
    => fs(303), fs(17) => fs(302), fs(16) => fs(301),
    fs(15) => fs(300), fs(14) => fs(299), fs(13) =>
    fs(298), fs(12) => fs(297), fs(11) => fs(296),
    fs(10) => fs(295), fs(9) => fs(294), fs(8) =>
    fs(293), fs(7) => fs(292), fs(6) => fs(291), fs(5)
    => fs(290), fs(4) => fs(289), fs(3) => fs(288),
    fs(2) => fs(287), fs(1) => fs(286), fs(0) =>
    fs(285), ns(18) => ns(303), ns(17) => ns(302),
    ns(16) => ns(301), ns(15) => ns(300), ns(14) =>
    ns(299), ns(13) => ns(298), ns(12) => ns(297),
    ns(11) => ns(296), ns(10) => ns(295), ns(9) =>
    ns(294), ns(8) => ns(293), ns(7) => ns(292), ns(6)
    => ns(291), ns(5) => ns(290), ns(4) => ns(289),
    ns(3) => ns(288), ns(2) => ns(287), ns(1) =>
    ns(286), ns(0) => ns(285), tag(18) => tag(303),
    tag(17) => tag(302), tag(16) => tag(301), tag(15)
    => tag(300), tag(14) => tag(299), tag(13) =>
    tag(298), tag(12) => tag(297), tag(11) => tag(296),
    tag(10) => tag(295), tag(9) => tag(294), tag(8) =>
    tag(293), tag(7) => tag(292), tag(6) => tag(291),
    tag(5) => tag(290), tag(4) => tag(289), tag(3) =>
    tag(288), tag(2) => tag(287), tag(1) => tag(286),
    tag(0) => tag(285), nn(18) => nn(303), nn(17) =>
```

```
            nn(302), nn(16) => nn(301), nn(15) => nn(300),
            nn(14) => nn(299), nn(13) => nn(298), nn(12) =>
            nn(297), nn(11) => nn(296), nn(10) => nn(295),
            nn(9) => nn(294), nn(8) => nn(293), nn(7) =>
            nn(292), nn(6) => nn(291), nn(5) => nn(290), nn(4)
            => nn(289), nn(3) => nn(288), nn(2) => nn(287),
            nn(1) => nn(286), nn(0) => nn(285), fn(18) =>
            fn(303), fn(17) => fn(302), fn(16) => fn(301),
            fn(15) => fn(300), fn(14) => fn(299), fn(13) =>
            fn(298), fn(12) => fn(297), fn(11) => fn(296),
            fn(10) => fn(295), fn(9) => fn(294), fn(8) =>
            fn(293), fn(7) => fn(292), fn(6) => fn(291), fn(5)
            => fn(290), fn(4) => fn(289), fn(3) => fn(288),
            fn(2) => fn(287), fn(1) => fn(286), fn(0) =>
            fn(285), rspen(18) => rspen(303), rspen(17) =>
            rspen(302), rspen(16) => rspen(301), rspen(15) =>
            rspen(300), rspen(14) => rspen(299), rspen(13) =>
            rspen(298), rspen(12) => rspen(297), rspen(11) =>
            rspen(296), rspen(10) => rspen(295), rspen(9) =>
            rspen(294), rspen(8) => rspen(293), rspen(7) =>
            rspen(292), rspen(6) => rspen(291), rspen(5) =>
            rspen(290), rspen(4) => rspen(289), rspen(3) =>
            rspen(288), rspen(2) => rspen(287), rspen(1) =>
            rspen(286), rspen(0) => rspen(285), fircnten =>
            fircnten );

U42414: tag19
    port map ( we => we, s_addr => a(14), rstaddr => rstaddr,
            mux2 => mux2, mux1 => mux1, mux0 => mux0, fir_in
            => f(14), carry_in => c(14), SetTag => setag, prsp
            => prsp, carry => c(15), fir => f(15), wl(18) =>
            wl(284), wl(17) => wl(283), wl(16) => wl(282),
            wl(15) => wl(281), wl(14) => wl(280), wl(13) =>
            wl(279), wl(12) => wl(278), wl(11) => wl(277),
            wl(10) => wl(276), wl(9) => wl(275), wl(8) =>
            wl(274), wl(7) => wl(273), wl(6) => wl(272), wl(5)
            => wl(271), wl(4) => wl(270), wl(3) => wl(269),
            wl(2) => wl(268), wl(1) => wl(267), wl(0) =>
            wl(266), ml(18) => ml(284), ml(17) => ml(283),
            ml(16) => ml(282), ml(15) => ml(281), ml(14) =>
            ml(280), ml(13) => ml(279), ml(12) => ml(278),
            ml(11) => ml(277), ml(10) => ml(276), ml(9) =>
            ml(275), ml(8) => ml(274), ml(7) => ml(273), ml(6)
            => ml(272), ml(5) => ml(271), ml(4) => ml(270),
            ml(3) => ml(269), ml(2) => ml(268), ml(1) =>
            ml(267), ml(0) => ml(266), sado => a(15), fs(18)
            => fs(284), fs(17) => fs(283), fs(16) => fs(282),
            fs(15) => fs(281), fs(14) => fs(280), fs(13) =>
            fs(279), fs(12) => fs(278), fs(11) => fs(277),
            fs(10) => fs(276), fs(9) => fs(275), fs(8) =>
            fs(274), fs(7) => fs(273), fs(6) => fs(272), fs(5)
            => fs(271), fs(4) => fs(270), fs(3) => fs(269),
            fs(2) => fs(268), fs(1) => fs(267), fs(0) =>
            fs(266), ns(18) => ns(284), ns(17) => ns(283),
            ns(16) => ns(282), ns(15) => ns(281), ns(14) =>
            ns(280), ns(13) => ns(279), ns(12) => ns(278),
            ns(11) => ns(277), ns(10) => ns(276), ns(9) =>
            ns(275), ns(8) => ns(274), ns(7) => ns(273), ns(6)
```

```
=> ns(272), ns(5) => ns(271), ns(4) => ns(270),
ns(3) => ns(269), ns(2) => ns(268), ns(1) =>
ns(267), ns(0) => ns(266), tag(18) => tag(284),
tag(17) => tag(283), tag(16) => tag(282), tag(15)
=> tag(281), tag(14) => tag(280), tag(13) =>
tag(279), tag(12) => tag(278), tag(11) => tag(277),
tag(10) => tag(276), tag(9) => tag(275), tag(8) =>
tag(274), tag(7) => tag(273), tag(6) => tag(272),
tag(5) => tag(271), tag(4) => tag(270), tag(3) =>
tag(269), tag(2) => tag(268), tag(1) => tag(267),
tag(0) => tag(266), nn(18) => nn(284), nn(17) =>
nn(283), nn(16) => nn(282), nn(15) => nn(281),
nn(14) => nn(280), nn(13) => nn(279), nn(12) =>
nn(278), nn(11) => nn(277), nn(10) => nn(276),
nn(9) => nn(275), nn(8) => nn(274), nn(7) =>
nn(273), nn(6) => nn(272), nn(5) => nn(271), nn(4)
=> nn(270), nn(3) => nn(269), nn(2) => nn(268),
nn(1) => nn(267), nn(0) => nn(266), fn(18) =>
fn(284), fn(17) => fn(283), fn(16) => fn(282),
fn(15) => fn(281), fn(14) => fn(280), fn(13) =>
fn(279), fn(12) => fn(278), fn(11) => fn(277),
fn(10) => fn(276), fn(9) => fn(275), fn(8) =>
fn(274), fn(7) => fn(273), fn(6) => fn(272), fn(5)
=> fn(271), fn(4) => fn(270), fn(3) => fn(269),
fn(2) => fn(268), fn(1) => fn(267), fn(0) =>
fn(266), rspen(18) => rspen(284), rspen(17) =>
rspen(283), rspen(16) => rspen(282), rspen(15) =>
rspen(281), rspen(14) => rspen(280), rspen(13) =>
rspen(279), rspen(12) => rspen(278), rspen(11) =>
rspen(277), rspen(10) => rspen(276), rspen(9) =>
rspen(275), rspen(8) => rspen(274), rspen(7) =>
rspen(273), rspen(6) => rspen(272), rspen(5) =>
rspen(271), rspen(4) => rspen(270), rspen(3) =>
rspen(269), rspen(2) => rspen(268), rspen(1) =>
rspen(267), rspen(0) => rspen(266), fircnten =>
fircnten );

U42413: tag19
  port map ( we => we, s_addr => a(13), rstaddr => rstaddr,
    mux2 => mux2, mux1 => mux1, mux0 => mux0, fir_in
    => f(13), carry_in => c(13), SetTag => setag, prsp
    => prsp, carry => c(14), fir => f(14), wl(18) =>
    wl(265), wl(17) => wl(264), wl(16) => wl(263),
    wl(15) => wl(262), wl(14) => wl(261), wl(13) =>
    wl(260), wl(12) => wl(259), wl(11) => wl(258),
    wl(10) => wl(257), wl(9) => wl(256), wl(8) =>
    wl(255), wl(7) => wl(254), wl(6) => wl(253), wl(5)
    => wl(252), wl(4) => wl(251), wl(3) => wl(250),
    wl(2) => wl(249), wl(1) => wl(248), wl(0) =>
    wl(247), ml(18) => ml(265), ml(17) => ml(264),
    ml(16) => ml(263), ml(15) => ml(262), ml(14) =>
    ml(261), ml(13) => ml(260), ml(12) => ml(259),
    ml(11) => ml(258), ml(10) => ml(257), ml(9) =>
    ml(256), ml(8) => ml(255), ml(7) => ml(254), ml(6)
    => ml(253), ml(5) => ml(252), ml(4) => ml(251),
    ml(3) => ml(250), ml(2) => ml(249), ml(1) =>
    ml(248), ml(0) => ml(247), sado => a(14), fs(18)
    => fs(265), fs(17) => fs(264), fs(16) => fs(263),
```

```
fs(15) => fs(262), fs(14) => fs(261), fs(13) =>
fs(260), fs(12) => fs(259), fs(11) => fs(258),
fs(10) => fs(257), fs(9) => fs(256), fs(8) =>
fs(255), fs(7) => fs(254), fs(6) => fs(253), fs(5)
=> fs(252), fs(4) => fs(251), fs(3) => fs(250),
fs(2) => fs(249), fs(1) => fs(248), fs(0) =>
fs(247), ns(18) => ns(265), ns(17) => ns(264),
ns(16) => ns(263), ns(15) => ns(262), ns(14) =>
ns(261), ns(13) => ns(260), ns(12) => ns(259),
ns(11) => ns(258), ns(10) => ns(257), ns(9) =>
ns(256), ns(8) => ns(255), ns(7) => ns(254), ns(6)
=> ns(253), ns(5) => ns(252), ns(4) => ns(251),
ns(3) => ns(250), ns(2) => ns(249), ns(1) =>
ns(248), ns(0) => ns(247), tag(18) => tag(265),
tag(17) => tag(264), tag(16) => tag(263), tag(15)
=> tag(262), tag(14) => tag(261), tag(13) =>
tag(260), tag(12) => tag(259), tag(11) => tag(258),
tag(10) => tag(257), tag(9) => tag(256), tag(8) =>
tag(255), tag(7) => tag(254), tag(6) => tag(253),
tag(5) => tag(252), tag(4) => tag(251), tag(3) =>
tag(250), tag(2) => tag(249), tag(1) => tag(248),
tag(0) => tag(247), nn(18) => nn(265), nn(17) =>
nn(264), nn(16) => nn(263), nn(15) => nn(262),
nn(14) => nn(261), nn(13) => nn(260), nn(12) =>
nn(259), nn(11) => nn(258), nn(10) => nn(257),
nn(9) => nn(256), nn(8) => nn(255), nn(7) =>
nn(254), nn(6) => nn(253), nn(5) => nn(252), nn(4)
=> nn(251), nn(3) => nn(250), nn(2) => nn(249),
nn(1) => nn(248), nn(0) => nn(247), fn(18) =>
fn(265), fn(17) => fn(264), fn(16) => fn(263),
fn(15) => fn(262), fn(14) => fn(261), fn(13) =>
fn(260), fn(12) => fn(259), fn(11) => fn(258),
fn(10) => fn(257), fn(9) => fn(256), fn(8) =>
fn(255), fn(7) => fn(254), fn(6) => fn(253), fn(5)
=> fn(252), fn(4) => fn(251), fn(3) => fn(250),
fn(2) => fn(249), fn(1) => fn(248), fn(0) =>
fn(247), rspen(18) => rspen(265), rspen(17) =>
rspen(264), rspen(16) => rspen(263), rspen(15) =>
rspen(262), rspen(14) => rspen(261), rspen(13) =>
rspen(260), rspen(12) => rspen(259), rspen(11) =>
rspen(258), rspen(10) => rspen(257), rspen(9) =>
rspen(256), rspen(8) => rspen(255), rspen(7) =>
rspen(254), rspen(6) => rspen(253), rspen(5) =>
rspen(252), rspen(4) => rspen(251), rspen(3) =>
rspen(250), rspen(2) => rspen(249), rspen(1) =>
rspen(248), rspen(0) => rspen(247), fircnten =>
fircnten );

U42412: tag19
  port map ( we => we, s_addr => a(12), rstaddr => rstaddr,
        mux2 => mux2, mux1 => mux1, mux0 => mux0, fir_in
        => f(12), carry_in => c(12), SetTag => setag, prsp
        => prsp, carry => c(13), fir => f(13), wl(18) =>
        wl(246), wl(17) => wl(245), wl(16) => wl(244),
        wl(15) => wl(243), wl(14) => wl(242), wl(13) =>
        wl(241), wl(12) => wl(240), wl(11) => wl(239),
        wl(10) => wl(238), wl(9) => wl(237), wl(8) =>
        wl(236), wl(7) => wl(235), wl(6) => wl(234), wl(5)
```

=> wl(233), wl(4) => wl(232), wl(3) => wl(231), wl(2) => wl(230), wl(1) => wl(229), wl(0) => wl(228), ml(18) => ml(246), ml(17) => ml(245), ml(16) => ml(244), ml(15) => ml(243), ml(14) => ml(242), ml(13) => ml(241), ml(12) => ml(240), ml(11) => ml(239), ml(10) => ml(238), ml(9) => ml(237), ml(8) => ml(236), ml(7) => ml(235), ml(6) => ml(234), ml(5) => ml(233), ml(4) => ml(232), ml(3) => ml(231), ml(2) => ml(230), ml(1) => ml(229), ml(0) => ml(228), sado => a(13), fs(18) => fs(246), fs(17) => fs(245), fs(16) => fs(244), fs(15) => fs(243), fs(14) => fs(242), fs(13) => fs(241), fs(12) => fs(240), fs(11) => fs(239), fs(10) => fs(238), fs(9) => fs(237), fs(8) => fs(236), fs(7) => fs(235), fs(6) => fs(234), fs(5) => fs(233), fs(4) => fs(232), fs(3) => fs(231), fs(2) => fs(230), fs(1) => fs(229), fs(0) => fs(228), ns(18) => ns(246), ns(17) => ns(245), ns(16) => ns(244), ns(15) => ns(243), ns(14) => ns(242), ns(13) => ns(241), ns(12) => ns(240), ns(11) => ns(239), ns(10) => ns(238), ns(9) => ns(237), ns(8) => ns(236), ns(7) => ns(235), ns(6) => ns(234), ns(5) => ns(233), ns(4) => ns(232), ns(3) => ns(231), ns(2) => ns(230), ns(1) => ns(229), ns(0) => ns(228), tag(18) => tag(246), tag(17) => tag(245), tag(16) => tag(244), tag(15) => tag(243), tag(14) => tag(242), tag(13) => tag(241), tag(12) => tag(240), tag(11) => tag(239), tag(10) => tag(238), tag(9) => tag(237), tag(8) => tag(236), tag(7) => tag(235), tag(6) => tag(234), tag(5) => tag(233), tag(4) => tag(232), tag(3) => tag(231), tag(2) => tag(230), tag(1) => tag(229), tag(0) => tag(228), nn(18) => nn(246), nn(17) => nn(245), nn(16) => nn(244), nn(15) => nn(243), nn(14) => nn(242), nn(13) => nn(241), nn(12) => nn(240), nn(11) => nn(239), nn(10) => nn(238), nn(9) => nn(237), nn(8) => nn(236), nn(7) => nn(235), nn(6) => nn(234), nn(5) => nn(233), nn(4) => nn(232), nn(3) => nn(231), nn(2) => nn(230), nn(1) => nn(229), nn(0) => nn(228), fn(18) => fn(246), fn(17) => fn(245), fn(16) => fn(244), fn(15) => fn(243), fn(14) => fn(242), fn(13) => fn(241), fn(12) => fn(240), fn(11) => fn(239), fn(10) => fn(238), fn(9) => fn(237), fn(8) => fn(236), fn(7) => fn(235), fn(6) => fn(234), fn(5) => fn(233), fn(4) => fn(232), fn(3) => fn(231), fn(2) => fn(230), fn(1) => fn(229), fn(0) => fn(228), rspen(18) => rspen(246), rspen(17) => rspen(245), rspen(16) => rspen(244), rspen(15) => rspen(243), rspen(14) => rspen(242), rspen(13) => rspen(241), rspen(12) => rspen(240), rspen(11) => rspen(239), rspen(10) => rspen(238), rspen(9) => rspen(237), rspen(8) => rspen(236), rspen(7) => rspen(235), rspen(6) => rspen(234), rspen(5) => rspen(233), rspen(4) => rspen(232), rspen(3) => rspen(231), rspen(2) => rspen(230), rspen(1) => rspen(229), rspen(0) => rspen(228), fircnten => fircnten );

```
U42411: tag19
  port map ( we => we, s_addr => a(11), rstaddr => rstaddr,
        mux2 => mux2, mux1 => mux1, mux0 => mux0, fir_in
        => f(11), carry_in => c(11), SetTag => setag, prsp
        => prsp, carry => c(12), fir => f(12), wl(18) =>
        wl(227), wl(17) => wl(226), wl(16) => wl(225),
        wl(15) => wl(224), wl(14) => wl(223), wl(13) =>
        wl(222), wl(12) => wl(221), wl(11) => wl(220),
        wl(10) => wl(219), wl(9) => wl(218), wl(8) =>
        wl(217), wl(7) => wl(216), wl(6) => wl(215), wl(5)
        => wl(214), wl(4) => wl(213), wl(3) => wl(212),
        wl(2) => wl(211), wl(1) => wl(210), wl(0) =>
        wl(209), ml(18) => ml(227), ml(17) => ml(226),
        ml(16) => ml(225), ml(15) => ml(224), ml(14) =>
        ml(223), ml(13) => ml(222), ml(12) => ml(221),
        ml(11) => ml(220), ml(10) => ml(219), ml(9) =>
        ml(218), ml(8) => ml(217), ml(7) => ml(216), ml(6)
        => ml(215), ml(5) => ml(214), ml(4) => ml(213),
        ml(3) => ml(212), ml(2) => ml(211), ml(1) =>
        ml(210), ml(0) => ml(209), sado => a(12), fs(18)
        => fs(227), fs(17) => fs(226), fs(16) => fs(225),
        fs(15) => fs(224), fs(14) => fs(223), fs(13) =>
        fs(222), fs(12) => fs(221), fs(11) => fs(220),
        fs(10) => fs(219), fs(9) => fs(218), fs(8) =>
        fs(217), fs(7) => fs(216), fs(6) => fs(215), fs(5)
        => fs(214), fs(4) => fs(213), fs(3) => fs(212),
        fs(2) => fs(211), fs(1) => fs(210), fs(0) =>
        fs(209), ns(18) => ns(227), ns(17) => ns(226),
        ns(16) => ns(225), ns(15) => ns(224), ns(14) =>
        ns(223), ns(13) => ns(222), ns(12) => ns(221),
        ns(11) => ns(220), ns(10) => ns(219), ns(9) =>
        ns(218), ns(8) => ns(217), ns(7) => ns(216), ns(6)
        => ns(215), ns(5) => ns(214), ns(4) => ns(213),
        ns(3) => ns(212), ns(2) => ns(211), ns(1) =>
        ns(210), ns(0) => ns(209), tag(18) => tag(227),
        tag(17) => tag(226), tag(16) => tag(225), tag(15)
        => tag(224), tag(14) => tag(223), tag(13) =>
        tag(222), tag(12) => tag(221), tag(11) => tag(220),
        tag(10) => tag(219), tag(9) => tag(218), tag(8) =>
        tag(217), tag(7) => tag(216), tag(6) => tag(215),
        tag(5) => tag(214), tag(4) => tag(213), tag(3) =>
        tag(212), tag(2) => tag(211), tag(1) => tag(210),
        tag(0) => tag(209), nn(18) => nn(227), nn(17) =>
        nn(226), nn(16) => nn(225), nn(15) => nn(224),
        nn(14) => nn(223), nn(13) => nn(222), nn(12) =>
        nn(221), nn(11) => nn(220), nn(10) => nn(219),
        nn(9) => nn(218), nn(8) => nn(217), nn(7) =>
        nn(216), nn(6) => nn(215), nn(5) => nn(214), nn(4)
        => nn(213), nn(3) => nn(212), nn(2) => nn(211),
        nn(1) => nn(210), nn(0) => nn(209), fn(18) =>
        fn(227), fn(17) => fn(226), fn(16) => fn(225),
        fn(15) => fn(224), fn(14) => fn(223), fn(13) =>
        fn(222), fn(12) => fn(221), fn(11) => fn(220),
        fn(10) => fn(219), fn(9) => fn(218), fn(8) =>
        fn(217), fn(7) => fn(216), fn(6) => fn(215), fn(5)
        => fn(214), fn(4) => fn(213), fn(3) => fn(212),
        fn(2) => fn(211), fn(1) => fn(210), fn(0) =>
```

```
        fn(209), rspen(18) => rspen(227), rspen(17) =>
        rspen(226), rspen(16) => rspen(225), rspen(15) =>
        rspen(224), rspen(14) => rspen(223), rspen(13) =>
        rspen(222), rspen(12) => rspen(221), rspen(11) =>
        rspen(220), rspen(10) => rspen(219), rspen(9) =>
        rspen(218), rspen(8) => rspen(217), rspen(7) =>
        rspen(216), rspen(6) => rspen(215), rspen(5) =>
        rspen(214), rspen(4) => rspen(213), rspen(3) =>
        rspen(212), rspen(2) => rspen(211), rspen(1) =>
        rspen(210), rspen(0) => rspen(209), fircnten =>
        fircnten );

U42410: tag19
   port map ( we => we, s_addr => a(10), rstaddr => rstaddr,
        mux2 => mux2, mux1 => mux1, mux0 => mux0, fir_in
        => f(10), carry_in => c(10), SetTag => setag, prsp
        => prsp, carry => c(11), fir => f(11), wl(18) =>
        wl(208), wl(17) => wl(207), wl(16) => wl(206),
        wl(15) => wl(205), wl(14) => wl(204), wl(13) =>
        wl(203), wl(12) => wl(202), wl(11) => wl(201),
        wl(10) => wl(200), wl(9) => wl(199), wl(8) =>
        wl(198), wl(7) => wl(197), wl(6) => wl(196), wl(5)
        => wl(195), wl(4) => wl(194), wl(3) => wl(193),
        wl(2) => wl(192), wl(1) => wl(191), wl(0) =>
        wl(190), ml(18) => ml(208), ml(17) => ml(207),
        ml(16) => ml(206), ml(15) => ml(205), ml(14) =>
        ml(204), ml(13) => ml(203), ml(12) => ml(202),
        ml(11) => ml(201), ml(10) => ml(200), ml(9) =>
        ml(199), ml(8) => ml(198), ml(7) => ml(197), ml(6)
        => ml(196), ml(5) => ml(195), ml(4) => ml(194),
        ml(3) => ml(193), ml(2) => ml(192), ml(1) =>
        ml(191), ml(0) => ml(190), sado => a(11), fs(18)
        => fs(208), fs(17) => fs(207), fs(16) => fs(206),
        fs(15) => fs(205), fs(14) => fs(204), fs(13) =>
        fs(203), fs(12) => fs(202), fs(11) => fs(201),
        fs(10) => fs(200), fs(9) => fs(199), fs(8) =>
        fs(198), fs(7) => fs(197), fs(6) => fs(196), fs(5)
        => fs(195), fs(4) => fs(194), fs(3) => fs(193),
        fs(2) => fs(192), fs(1) => fs(191), fs(0) =>
        fs(190), ns(18) => ns(208), ns(17) => ns(207),
        ns(16) => ns(206), ns(15) => ns(205), ns(14) =>
        ns(204), ns(13) => ns(203), ns(12) => ns(202),
        ns(11) => ns(201), ns(10) => ns(200), ns(9) =>
        ns(199), ns(8) => ns(198), ns(7) => ns(197), ns(6)
        => ns(196), ns(5) => ns(195), ns(4) => ns(194),
        ns(3) => ns(193), ns(2) => ns(192), ns(1) =>
        ns(191), ns(0) => ns(190), tag(18) => tag(208),
        tag(17) => tag(207), tag(16) => tag(206), tag(15)
        => tag(205), tag(14) => tag(204), tag(13) =>
        tag(203), tag(12) => tag(202), tag(11) => tag(201),
        tag(10) => tag(200), tag(9) => tag(199), tag(8) =>
        tag(198), tag(7) => tag(197), tag(6) => tag(196),
        tag(5) => tag(195), tag(4) => tag(194), tag(3) =>
        tag(193), tag(2) => tag(192), tag(1) => tag(191),
        tag(0) => tag(190), nn(18) => nn(208), nn(17) =>
        nn(207), nn(16) => nn(206), nn(15) => nn(205),
        nn(14) => nn(204), nn(13) => nn(203), nn(12) =>
        nn(202), nn(11) => nn(201), nn(10) => nn(200),
```

```
nn(9) => nn(199), nn(8) => nn(198), nn(7) =>
nn(197), nn(6) => nn(196), nn(5) => nn(195), nn(4)
=> nn(194), nn(3) => nn(193), nn(2) => nn(192),
nn(1) => nn(191), nn(0) => nn(190), fn(18) =>
fn(208), fn(17) => fn(207), fn(16) => fn(206),
fn(15) => fn(205), fn(14) => fn(204), fn(13) =>
fn(203), fn(12) => fn(202), fn(11) => fn(201),
fn(10) => fn(200), fn(9) => fn(199), fn(8) =>
fn(198), fn(7) => fn(197), fn(6) => fn(196), fn(5)
=> fn(195), fn(4) => fn(194), fn(3) => fn(193),
fn(2) => fn(192), fn(1) => fn(191), fn(0) =>
fn(190), rspen(18) => rspen(208), rspen(17) =>
rspen(207), rspen(16) => rspen(206), rspen(15) =>
rspen(205), rspen(14) => rspen(204), rspen(13) =>
rspen(203), rspen(12) => rspen(202), rspen(11) =>
rspen(201), rspen(10) => rspen(200), rspen(9) =>
rspen(199), rspen(8) => rspen(198), rspen(7) =>
rspen(197), rspen(6) => rspen(196), rspen(5) =>
rspen(195), rspen(4) => rspen(194), rspen(3) =>
rspen(193), rspen(2) => rspen(192), rspen(1) =>
rspen(191), rspen(0) => rspen(190), fircnten =>
fircnten );

U4249: tag19
  port map ( we => we, s_addr => a(9), rstaddr => rstaddr, mux2
      => mux2, mux1 => mux1, mux0 => mux0, fir_in =>
      f(9), carry_in => c(9), SetTag => setag, prsp =>
      prsp, carry => c(10), fir => f(10), wl(18) =>
      wl(189), wl(17) => wl(188), wl(16) => wl(187),
      wl(15) => wl(186), wl(14) => wl(185), wl(13) =>
      wl(184), wl(12) => wl(183), wl(11) => wl(182),
      wl(10) => wl(181), wl(9) => wl(180), wl(8) =>
      wl(179), wl(7) => wl(178), wl(6) => wl(177), wl(5)
      => wl(176), wl(4) => wl(175), wl(3) => wl(174),
      wl(2) => wl(173), wl(1) => wl(172), wl(0) =>
      wl(171), ml(18) => ml(189), ml(17) => ml(188),
      ml(16) => ml(187), ml(15) => ml(186), ml(14) =>
      ml(185), ml(13) => ml(184), ml(12) => ml(183),
      ml(11) => ml(182), ml(10) => ml(181), ml(9) =>
      ml(180), ml(8) => ml(179), ml(7) => ml(178), ml(6)
      => ml(177), ml(5) => ml(176), ml(4) => ml(175),
      ml(3) => ml(174), ml(2) => ml(173), ml(1) =>
      ml(172), ml(0) => ml(171), sado => a(10), fs(18)
      => fs(189), fs(17) => fs(188), fs(16) => fs(187),
      fs(15) => fs(186), fs(14) => fs(185), fs(13) =>
      fs(184), fs(12) => fs(183), fs(11) => fs(182),
      fs(10) => fs(181), fs(9) => fs(180), fs(8) =>
      fs(179), fs(7) => fs(178), fs(6) => fs(177), fs(5)
      => fs(176), fs(4) => fs(175), fs(3) => fs(174),
      fs(2) => fs(173), fs(1) => fs(172), fs(0) =>
      fs(171), ns(18) => ns(189), ns(17) => ns(188),
      ns(16) => ns(187), ns(15) => ns(186), ns(14) =>
      ns(185), ns(13) => ns(184), ns(12) => ns(183),
      ns(11) => ns(182), ns(10) => ns(181), ns(9) =>
      ns(180), ns(8) => ns(179), ns(7) => ns(178), ns(6)
      => ns(177), ns(5) => ns(176), ns(4) => ns(175),
      ns(3) => ns(174), ns(2) => ns(173), ns(1) =>
      ns(172), ns(0) => ns(171), tag(18) => tag(189),
```

```
tag(17) => tag(188), tag(16) => tag(187), tag(15)
=> tag(186), tag(14) => tag(185), tag(13) =>
tag(184), tag(12) => tag(183), tag(11) => tag(182),
tag(10) => tag(181), tag(9) => tag(180), tag(8) =>
tag(179), tag(7) => tag(178), tag(6) => tag(177),
tag(5) => tag(176), tag(4) => tag(175), tag(3) =>
tag(174), tag(2) => tag(173), tag(1) => tag(172),
tag(0) => tag(171), nn(18) => nn(189), nn(17) =>
nn(188), nn(16) => nn(187), nn(15) => nn(186),
nn(14) => nn(185), nn(13) => nn(184), nn(12) =>
nn(183), nn(11) => nn(182), nn(10) => nn(181),
nn(9) => nn(180), nn(8) => nn(179), nn(7) =>
nn(178), nn(6) => nn(177), nn(5) => nn(176), nn(4)
=> nn(175), nn(3) => nn(174), nn(2) => nn(173),
nn(1) => nn(172), nn(0) => nn(171), fn(18) =>
fn(189), fn(17) => fn(188), fn(16) => fn(187),
fn(15) => fn(186), fn(14) => fn(185), fn(13) =>
fn(184), fn(12) => fn(183), fn(11) => fn(182),
fn(10) => fn(181), fn(9) => fn(180), fn(8) =>
fn(179), fn(7) => fn(178), fn(6) => fn(177), fn(5)
=> fn(176), fn(4) => fn(175), fn(3) => fn(174),
fn(2) => fn(173), fn(1) => fn(172), fn(0) =>
fn(171), rspen(18) => rspen(189), rspen(17) =>
rspen(188), rspen(16) => rspen(187), rspen(15) =>
rspen(186), rspen(14) => rspen(185), rspen(13) =>
rspen(184), rspen(12) => rspen(183), rspen(11) =>
rspen(182), rspen(10) => rspen(181), rspen(9) =>
rspen(180), rspen(8) => rspen(179), rspen(7) =>
rspen(178), rspen(6) => rspen(177), rspen(5) =>
rspen(176), rspen(4) => rspen(175), rspen(3) =>
rspen(174), rspen(2) => rspen(173), rspen(1) =>
rspen(172), rspen(0) => rspen(171), fircnten =>
fircnten );

U4248: tag19
  port map ( we => we, s_addr => a(8), rstaddr => rstaddr, mux2
    => mux2, mux1 => mux1, mux0 => mux0, fir_in =>
    f(8), carry_in => c(8), SetTag => setag, prsp =>
    prsp, carry => c(9), fir => f(9), wl(18) =>
    wl(170), wl(17) => wl(169), wl(16) => wl(168),
    wl(15) => wl(167), wl(14) => wl(166), wl(13) =>
    wl(165), wl(12) => wl(164), wl(11) => wl(163),
    wl(10) => wl(162), wl(9) => wl(161), wl(8) =>
    wl(160), wl(7) => wl(159), wl(6) => wl(158), wl(5)
    => wl(157), wl(4) => wl(156), wl(3) => wl(155),
    wl(2) => wl(154), wl(1) => wl(153), wl(0) =>
    wl(152), ml(18) => ml(170), ml(17) => ml(169),
    ml(16) => ml(168), ml(15) => ml(167), ml(14) =>
    ml(166), ml(13) => ml(165), ml(12) => ml(164),
    ml(11) => ml(163), ml(10) => ml(162), ml(9) =>
    ml(161), ml(8) => ml(160), ml(7) => ml(159), ml(6)
    => ml(158), ml(5) => ml(157), ml(4) => ml(156),
    ml(3) => ml(155), ml(2) => ml(154), ml(1) =>
    ml(153), ml(0) => ml(152), sado => a(9), fs(18) =>
    fs(170), fs(17) => fs(169), fs(16) => fs(168),
    fs(15) => fs(167), fs(14) => fs(166), fs(13) =>
    fs(165), fs(12) => fs(164), fs(11) => fs(163),
    fs(10) => fs(162), fs(9) => fs(161), fs(8) =>
```

```
        fs(160), fs(7) => fs(159), fs(6) => fs(158), fs(5)
        => fs(157), fs(4) => fs(156), fs(3) => fs(155),
        fs(2) => fs(154), fs(1) => fs(153), fs(0) =>
        fs(152), ns(18) => ns(170), ns(17) => ns(169),
        ns(16) => ns(168), ns(15) => ns(167), ns(14) =>
        ns(166), ns(13) => ns(165), ns(12) => ns(164),
        ns(11) => ns(163), ns(10) => ns(162), ns(9) =>
        ns(161), ns(8) => ns(160), ns(7) => ns(159), ns(6)
        => ns(158), ns(5) => ns(157), ns(4) => ns(156),
        ns(3) => ns(155), ns(2) => ns(154), ns(1) =>
        ns(153), ns(0) => ns(152), tag(18) => tag(170),
        tag(17) => tag(169), tag(16) => tag(168), tag(15)
        => tag(167), tag(14) => tag(166), tag(13) =>
        tag(165), tag(12) => tag(164), tag(11) => tag(163),
        tag(10) => tag(162), tag(9) => tag(161), tag(8) =>
        tag(160), tag(7) => tag(159), tag(6) => tag(158),
        tag(5) => tag(157), tag(4) => tag(156), tag(3) =>
        tag(155), tag(2) => tag(154), tag(1) => tag(153),
        tag(0) => tag(152), nn(18) => nn(170), nn(17) =>
        nn(169), nn(16) => nn(168), nn(15) => nn(167),
        nn(14) => nn(166), nn(13) => nn(165), nn(12) =>
        nn(164), nn(11) => nn(163), nn(10) => nn(162),
        nn(9) => nn(161), nn(8) => nn(160), nn(7) =>
        nn(159), nn(6) => nn(158), nn(5) => nn(157), nn(4)
        => nn(156), nn(3) => nn(155), nn(2) => nn(154),
        nn(1) => nn(153), nn(0) => nn(152), fn(18) =>
        fn(170), fn(17) => fn(169), fn(16) => fn(168),
        fn(15) => fn(167), fn(14) => fn(166), fn(13) =>
        fn(165), fn(12) => fn(164), fn(11) => fn(163),
        fn(10) => fn(162), fn(9) => fn(161), fn(8) =>
        fn(160), fn(7) => fn(159), fn(6) => fn(158), fn(5)
        => fn(157), fn(4) => fn(156), fn(3) => fn(155),
        fn(2) => fn(154), fn(1) => fn(153), fn(0) =>
        fn(152), rspen(18) => rspen(170), rspen(17) =>
        rspen(169), rspen(16) => rspen(168), rspen(15) =>
        rspen(167), rspen(14) => rspen(166), rspen(13) =>
        rspen(165), rspen(12) => rspen(164), rspen(11) =>
        rspen(163), rspen(10) => rspen(162), rspen(9) =>
        rspen(161), rspen(8) => rspen(160), rspen(7) =>
        rspen(159), rspen(6) => rspen(158), rspen(5) =>
        rspen(157), rspen(4) => rspen(156), rspen(3) =>
        rspen(155), rspen(2) => rspen(154), rspen(1) =>
        rspen(153), rspen(0) => rspen(152), fircnten =>
        fircnten );

U4247: tag19
  port map ( we => we, s_addr => a(7), rstaddr => rstaddr, mux2
        => mux2, mux1 => mux1, mux0 => mux0, fir_in =>
        f(7), carry_in => c(7), SetTag => setag, prsp =>
        prsp, carry => c(8), fir => f(8), wl(18) =>
        wl(151), wl(17) => wl(150), wl(16) => wl(149),
        wl(15) => wl(148), wl(14) => wl(147), wl(13) =>
        wl(146), wl(12) => wl(145), wl(11) => wl(144),
        wl(10) => wl(143), wl(9) => wl(142), wl(8) =>
        wl(141), wl(7) => wl(140), wl(6) => wl(139), wl(5)
        => wl(138), wl(4) => wl(137), wl(3) => wl(136),
        wl(2) => wl(135), wl(1) => wl(134), wl(0) =>
        wl(133), ml(18) => ml(151), ml(17) => ml(150),
```

```
ml(16) => ml(149), ml(15) => ml(148), ml(14) =>
ml(147), ml(13) => ml(146), ml(12) => ml(145),
ml(11) => ml(144), ml(10) => ml(143), ml(9) =>
ml(142), ml(8) => ml(141), ml(7) => ml(140), ml(6)
=> ml(139), ml(5) => ml(138), ml(4) => ml(137),
ml(3) => ml(136), ml(2) => ml(135), ml(1) =>
ml(134), ml(0) => ml(133), sado => a(8), fs(18) =>
fs(151), fs(17) => fs(150), fs(16) => fs(149),
fs(15) => fs(148), fs(14) => fs(147), fs(13) =>
fs(146), fs(12) => fs(145), fs(11) => fs(144),
fs(10) => fs(143), fs(9) => fs(142), fs(8) =>
fs(141), fs(7) => fs(140), fs(6) => fs(139), fs(5)
=> fs(138), fs(4) => fs(137), fs(3) => fs(136),
fs(2) => fs(135), fs(1) => fs(134), fs(0) =>
fs(133), ns(18) => ns(151), ns(17) => ns(150),
ns(16) => ns(149), ns(15) => ns(148), ns(14) =>
ns(147), ns(13) => ns(146), ns(12) => ns(145),
ns(11) => ns(144), ns(10) => ns(143), ns(9) =>
ns(142), ns(8) => ns(141), ns(7) => ns(140), ns(6)
=> ns(139), ns(5) => ns(138), ns(4) => ns(137),
ns(3) => ns(136), ns(2) => ns(135), ns(1) =>
ns(134), ns(0) => ns(133), tag(18) => tag(151),
tag(17) => tag(150), tag(16) => tag(149), tag(15)
=> tag(148), tag(14) => tag(147), tag(13) =>
tag(146), tag(12) => tag(145), tag(11) => tag(144),
tag(10) => tag(143), tag(9) => tag(142), tag(8) =>
tag(141), tag(7) => tag(140), tag(6) => tag(139),
tag(5) => tag(138), tag(4) => tag(137), tag(3) =>
tag(136), tag(2) => tag(135), tag(1) => tag(134),
tag(0) => tag(133), nn(18) => nn(151), nn(17) =>
nn(150), nn(16) => nn(149), nn(15) => nn(148),
nn(14) => nn(147), nn(13) => nn(146), nn(12) =>
nn(145), nn(11) => nn(144), nn(10) => nn(143),
nn(9) => nn(142), nn(8) => nn(141), nn(7) =>
nn(140), nn(6) => nn(139), nn(5) => nn(138), nn(4)
=> nn(137), nn(3) => nn(136), nn(2) => nn(135),
nn(1) => nn(134), nn(0) => nn(133), fn(18) =>
fn(151), fn(17) => fn(150), fn(16) => fn(149),
fn(15) => fn(148), fn(14) => fn(147), fn(13) =>
fn(146), fn(12) => fn(145), fn(11) => fn(144),
fn(10) => fn(143), fn(9) => fn(142), fn(8) =>
fn(141), fn(7) => fn(140), fn(6) => fn(139), fn(5)
=> fn(138), fn(4) => fn(137), fn(3) => fn(136),
fn(2) => fn(135), fn(1) => fn(134), fn(0) =>
fn(133), rspen(18) => rspen(151), rspen(17) =>
rspen(150), rspen(16) => rspen(149), rspen(15) =>
rspen(148), rspen(14) => rspen(147), rspen(13) =>
rspen(146), rspen(12) => rspen(145), rspen(11) =>
rspen(144), rspen(10) => rspen(143), rspen(9) =>
rspen(142), rspen(8) => rspen(141), rspen(7) =>
rspen(140), rspen(6) => rspen(139), rspen(5) =>
rspen(138), rspen(4) => rspen(137), rspen(3) =>
rspen(136), rspen(2) => rspen(135), rspen(1) =>
rspen(134), rspen(0) => rspen(133), fircnten =>
fircnten );

U4246: tag19
  port map ( we => we, s_addr => a(6), rstaddr => rstaddr, mux2
```

=> mux2, mux1 => mux1, mux0 => mux0, fir_in => f(6), carry_in => c(6), SetTag => setag, prsp => prsp, carry => c(7), fir => f(7), wl(18) => wl(132), wl(17) => wl(131), wl(16) => wl(130), wl(15) => wl(129), wl(14) => wl(128), wl(13) => wl(127), wl(12) => wl(126), wl(11) => wl(125), wl(10) => wl(124), wl(9) => wl(123), wl(8) => wl(122), wl(7) => wl(121), wl(6) => wl(120), wl(5) => wl(119), wl(4) => wl(118), wl(3) => wl(117), wl(2) => wl(116), wl(1) => wl(115), wl(0) => wl(114), ml(18) => ml(132), ml(17) => ml(131), ml(16) => ml(130), ml(15) => ml(129), ml(14) => ml(128), ml(13) => ml(127), ml(12) => ml(126), ml(11) => ml(125), ml(10) => ml(124), ml(9) => ml(123), ml(8) => ml(122), ml(7) => ml(121), ml(6) => ml(120), ml(5) => ml(119), ml(4) => ml(118), ml(3) => ml(117), ml(2) => ml(116), ml(1) => ml(115), ml(0) => ml(114), sado => a(7), fs(18) => fs(132), fs(17) => fs(131), fs(16) => fs(130), fs(15) => fs(129), fs(14) => fs(128), fs(13) => fs(127), fs(12) => fs(126), fs(11) => fs(125), fs(10) => fs(124), fs(9) => fs(123), fs(8) => fs(122), fs(7) => fs(121), fs(6) => fs(120), fs(5) => fs(119), fs(4) => fs(118), fs(3) => fs(117), fs(2) => fs(116), fs(1) => fs(115), fs(0) => fs(114), ns(18) => ns(132), ns(17) => ns(131), ns(16) => ns(130), ns(15) => ns(129), ns(14) => ns(128), ns(13) => ns(127), ns(12) => ns(126), ns(11) => ns(125), ns(10) => ns(124), ns(9) => ns(123), ns(8) => ns(122), ns(7) => ns(121), ns(6) => ns(120), ns(5) => ns(119), ns(4) => ns(118), ns(3) => ns(117), ns(2) => ns(116), ns(1) => ns(115), ns(0) => ns(114), tag(18) => tag(132), tag(17) => tag(131), tag(16) => tag(130), tag(15) => tag(129), tag(14) => tag(128), tag(13) => tag(127), tag(12) => tag(126), tag(11) => tag(125), tag(10) => tag(124), tag(9) => tag(123), tag(8) => tag(122), tag(7) => tag(121), tag(6) => tag(120), tag(5) => tag(119), tag(4) => tag(118), tag(3) => tag(117), tag(2) => tag(116), tag(1) => tag(115), tag(0) => tag(114), nn(18) => nn(132), nn(17) => nn(131), nn(16) => nn(130), nn(15) => nn(129), nn(14) => nn(128), nn(13) => nn(127), nn(12) => nn(126), nn(11) => nn(125), nn(10) => nn(124), nn(9) => nn(123), nn(8) => nn(122), nn(7) => nn(121), nn(6) => nn(120), nn(5) => nn(119), nn(4) => nn(118), nn(3) => nn(117), nn(2) => nn(116), nn(1) => nn(115), nn(0) => nn(114), fn(18) => fn(132), fn(17) => fn(131), fn(16) => fn(130), fn(15) => fn(129), fn(14) => fn(128), fn(13) => fn(127), fn(12) => fn(126), fn(11) => fn(125), fn(10) => fn(124), fn(9) => fn(123), fn(8) => fn(122), fn(7) => fn(121), fn(6) => fn(120), fn(5) => fn(119), fn(4) => fn(118), fn(3) => fn(117), fn(2) => fn(116), fn(1) => fn(115), fn(0) => fn(114), rspen(18) => rspen(132), rspen(17) => rspen(131), rspen(16) => rspen(130), rspen(15) => rspen(129), rspen(14) => rspen(128), rspen(13) =>

```
            rspen(127), rspen(12) => rspen(126), rspen(11) =>
            rspen(125), rspen(10) => rspen(124), rspen(9) =>
            rspen(123), rspen(8) => rspen(122), rspen(7) =>
            rspen(121), rspen(6) => rspen(120), rspen(5) =>
            rspen(119), rspen(4) => rspen(118), rspen(3) =>
            rspen(117), rspen(2) => rspen(116), rspen(1) =>
            rspen(115), rspen(0) => rspen(114), fircnten =>
            fircnten );

U4245: tag19
   port map ( we => we, s_addr => a(5), rstaddr => rstaddr, mux2
            => mux2, mux1 => mux1, mux0 => mux0, fir_in =>
            f(5), carry_in => c(5), SetTag => setag, prsp =>
            prsp, carry => c(6), fir => f(6), wl(18) =>
            wl(113), wl(17) => wl(112), wl(16) => wl(111),
            wl(15) => wl(110), wl(14) => wl(109), wl(13) =>
            wl(108), wl(12) => wl(107), wl(11) => wl(106),
            wl(10) => wl(105), wl(9) => wl(104), wl(8) =>
            wl(103), wl(7) => wl(102), wl(6) => wl(101), wl(5)
            => wl(100), wl(4) => wl(99), wl(3) => wl(98),
            wl(2) => wl(97), wl(1) => wl(96), wl(0) => wl(95),
            ml(18) => ml(113), ml(17) => ml(112), ml(16) =>
            ml(111), ml(15) => ml(110), ml(14) => ml(109),
            ml(13) => ml(108), ml(12) => ml(107), ml(11) =>
            ml(106), ml(10) => ml(105), ml(9) => ml(104),
            ml(8) => ml(103), ml(7) => ml(102), ml(6) =>
            ml(101), ml(5) => ml(100), ml(4) => ml(99), ml(3)
            => ml(98), ml(2) => ml(97), ml(1) => ml(96), ml(0)
            => ml(95), sado => a(6), fs(18) => fs(113), fs(17)
            => fs(112), fs(16) => fs(111), fs(15) => fs(110),
            fs(14) => fs(109), fs(13) => fs(108), fs(12) =>
            fs(107), fs(11) => fs(106), fs(10) => fs(105),
            fs(9) => fs(104), fs(8) => fs(103), fs(7) =>
            fs(102), fs(6) => fs(101), fs(5) => fs(100), fs(4)
            => fs(99), fs(3) => fs(98), fs(2) => fs(97), fs(1)
            => fs(96), fs(0) => fs(95), ns(18) => ns(113),
            ns(17) => ns(112), ns(16) => ns(111), ns(15) =>
            ns(110), ns(14) => ns(109), ns(13) => ns(108),
            ns(12) => ns(107), ns(11) => ns(106), ns(10) =>
            ns(105), ns(9) => ns(104), ns(8) => ns(103), ns(7)
            => ns(102), ns(6) => ns(101), ns(5) => ns(100),
            ns(4) => ns(99), ns(3) => ns(98), ns(2) => ns(97),
            ns(1) => ns(96), ns(0) => ns(95), tag(18) =>
            tag(113), tag(17) => tag(112), tag(16) => tag(111),
            tag(15) => tag(110), tag(14) => tag(109), tag(13)
            => tag(108), tag(12) => tag(107), tag(11) =>
            tag(106), tag(10) => tag(105), tag(9) => tag(104),
            tag(8) => tag(103), tag(7) => tag(102), tag(6) =>
            tag(101), tag(5) => tag(100), tag(4) => tag(99),
            tag(3) => tag(98), tag(2) => tag(97), tag(1) =>
            tag(96), tag(0) => tag(95), nn(18) => nn(113),
            nn(17) => nn(112), nn(16) => nn(111), nn(15) =>
            nn(110), nn(14) => nn(109), nn(13) => nn(108),
            nn(12) => nn(107), nn(11) => nn(106), nn(10) =>
            nn(105), nn(9) => nn(104), nn(8) => nn(103), nn(7)
            => nn(102), nn(6) => nn(101), nn(5) => nn(100),
            nn(4) => nn(99), nn(3) => nn(98), nn(2) => nn(97),
            nn(1) => nn(96), nn(0) => nn(95), fn(18) =>
```

```
fn(113), fn(17) => fn(112), fn(16) => fn(111),
fn(15) => fn(110), fn(14) => fn(109), fn(13) =>
fn(108), fn(12) => fn(107), fn(11) => fn(106),
fn(10) => fn(105), fn(9) => fn(104), fn(8) =>
fn(103), fn(7) => fn(102), fn(6) => fn(101), fn(5)
=> fn(100), fn(4) => fn(99), fn(3) => fn(98),
fn(2) => fn(97), fn(1) => fn(96), fn(0) => fn(95),
rspen(18) => rspen(113), rspen(17) => rspen(112),
rspen(16) => rspen(111), rspen(15) => rspen(110),
rspen(14) => rspen(109), rspen(13) => rspen(108),
rspen(12) => rspen(107), rspen(11) => rspen(106),
rspen(10) => rspen(105), rspen(9) => rspen(104),
rspen(8) => rspen(103), rspen(7) => rspen(102),
rspen(6) => rspen(101), rspen(5) => rspen(100),
rspen(4) => rspen(99), rspen(3) => rspen(98),
rspen(2) => rspen(97), rspen(1) => rspen(96),
rspen(0) => rspen(95), fircnten => fircnten );

U4244: tag19
  port map ( we => we, s_addr => a(4), rstaddr => rstaddr, mux2
        => mux2, mux1 => mux1, mux0 => mux0, fir_in =>
        f(4), carry_in => c(4), SetTag => setag, prsp =>
        prsp, carry => c(5), fir => f(5), wl(18) => wl(94),
        wl(17) => wl(93), wl(16) => wl(92), wl(15) =>
        wl(91), wl(14) => wl(90), wl(13) => wl(89), wl(12)
        => wl(88), wl(11) => wl(87), wl(10) => wl(86),
        wl(9) => wl(85), wl(8) => wl(84), wl(7) => wl(83),
        wl(6) => wl(82), wl(5) => wl(81), wl(4) => wl(80),
        wl(3) => wl(79), wl(2) => wl(78), wl(1) => wl(77),
        wl(0) => wl(76), ml(18) => ml(94), ml(17) =>
        ml(93), ml(16) => ml(92), ml(15) => ml(91), ml(14)
        => ml(90), ml(13) => ml(89), ml(12) => ml(88),
        ml(11) => ml(87), ml(10) => ml(86), ml(9) =>
        ml(85), ml(8) => ml(84), ml(7) => ml(83), ml(6) =>
        ml(82), ml(5) => ml(81), ml(4) => ml(80), ml(3) =>
        ml(79), ml(2) => ml(78), ml(1) => ml(77), ml(0) =>
        ml(76), sado => a(5), fs(18) => fs(94), fs(17) =>
        fs(93), fs(16) => fs(92), fs(15) => fs(91), fs(14)
        => fs(90), fs(13) => fs(89), fs(12) => fs(88),
        fs(11) => fs(87), fs(10) => fs(86), fs(9) =>
        fs(85), fs(8) => fs(84), fs(7) => fs(83), fs(6) =>
        fs(82), fs(5) => fs(81), fs(4) => fs(80), fs(3) =>
        fs(79), fs(2) => fs(78), fs(1) => fs(77), fs(0) =>
        fs(76), ns(18) => ns(94), ns(17) => ns(93), ns(16)
        => ns(92), ns(15) => ns(91), ns(14) => ns(90),
        ns(13) => ns(89), ns(12) => ns(88), ns(11) =>
        ns(87), ns(10) => ns(86), ns(9) => ns(85), ns(8)
        => ns(84), ns(7) => ns(83), ns(6) => ns(82), ns(5)
        => ns(81), ns(4) => ns(80), ns(3) => ns(79), ns(2)
        => ns(78), ns(1) => ns(77), ns(0) => ns(76),
        tag(18) => tag(94), tag(17) => tag(93), tag(16) =>
        tag(92), tag(15) => tag(91), tag(14) => tag(90),
        tag(13) => tag(89), tag(12) => tag(88), tag(11) =>
        tag(87), tag(10) => tag(86), tag(9) => tag(85),
        tag(8) => tag(84), tag(7) => tag(83), tag(6) =>
        tag(82), tag(5) => tag(81), tag(4) => tag(80),
        tag(3) => tag(79), tag(2) => tag(78), tag(1) =>
        tag(77), tag(0) => tag(76), nn(18) => nn(94),
```

```
            nn(17) => nn(93), nn(16) => nn(92), nn(15) =>
            nn(91), nn(14) => nn(90), nn(13) => nn(89), nn(12)
            => nn(88), nn(11) => nn(87), nn(10) => nn(86),
            nn(9) => nn(85), nn(8) => nn(84), nn(7) => nn(83),
            nn(6) => nn(82), nn(5) => nn(81), nn(4) => nn(80),
            nn(3) => nn(79), nn(2) => nn(78), nn(1) => nn(77),
            nn(0) => nn(76), fn(18) => fn(94), fn(17) =>
            fn(93), fn(16) => fn(92), fn(15) => fn(91), fn(14)
            => fn(90), fn(13) => fn(89), fn(12) => fn(88),
            fn(11) => fn(87), fn(10) => fn(86), fn(9) =>
            fn(85), fn(8) => fn(84), fn(7) => fn(83), fn(6) =>
            fn(82), fn(5) => fn(81), fn(4) => fn(80), fn(3) =>
            fn(79), fn(2) => fn(78), fn(1) => fn(77), fn(0) =>
            fn(76), rspen(18) => rspen(94), rspen(17) =>
            rspen(93), rspen(16) => rspen(92), rspen(15) =>
            rspen(91), rspen(14) => rspen(90), rspen(13) =>
            rspen(89), rspen(12) => rspen(88), rspen(11) =>
            rspen(87), rspen(10) => rspen(86), rspen(9) =>
            rspen(85), rspen(8) => rspen(84), rspen(7) =>
            rspen(83), rspen(6) => rspen(82), rspen(5) =>
            rspen(81), rspen(4) => rspen(80), rspen(3) =>
            rspen(79), rspen(2) => rspen(78), rspen(1) =>
            rspen(77), rspen(0) => rspen(76), fircnten =>
            fircnten );

U4243: tag19
   port map ( we => we, s_addr => a(3), rstaddr => rstaddr, mux2
            => mux2, mux1 => mux1, mux0 => mux0, fir_in =>
            f(3), carry_in => c(3), SetTag => setag, prsp =>
            prsp, carry => c(4), fir => f(4), wl(18) => wl(75),
            wl(17) => wl(74), wl(16) => wl(73), wl(15) =>
            wl(72), wl(14) => wl(71), wl(13) => wl(70), wl(12)
            => wl(69), wl(11) => wl(68), wl(10) => wl(67),
            wl(9) => wl(66), wl(8) => wl(65), wl(7) => wl(64),
            wl(6) => wl(63), wl(5) => wl(62), wl(4) => wl(61),
            wl(3) => wl(60), wl(2) => wl(59), wl(1) => wl(58),
            wl(0) => wl(57), ml(18) => ml(75), ml(17) =>
            ml(74), ml(16) => ml(73), ml(15) => ml(72), ml(14)
            => ml(71), ml(13) => ml(70), ml(12) => ml(69),
            ml(11) => ml(68), ml(10) => ml(67), ml(9) =>
            ml(66), ml(8) => ml(65), ml(7) => ml(64), ml(6) =>
            ml(63), ml(5) => ml(62), ml(4) => ml(61), ml(3) =>
            ml(60), ml(2) => ml(59), ml(1) => ml(58), ml(0) =>
            ml(57), sado => a(4), fs(18) => fs(75), fs(17) =>
            fs(74), fs(16) => fs(73), fs(15) => fs(72), fs(14)
            => fs(71), fs(13) => fs(70), fs(12) => fs(69),
            fs(11) => fs(68), fs(10) => fs(67), fs(9) =>
            fs(66), fs(8) => fs(65), fs(7) => fs(64), fs(6) =>
            fs(63), fs(5) => fs(62), fs(4) => fs(61), fs(3) =>
            fs(60), fs(2) => fs(59), fs(1) => fs(58), fs(0) =>
            fs(57), ns(18) => ns(75), ns(17) => ns(74), ns(16)
            => ns(73), ns(15) => ns(72), ns(14) => ns(71),
            ns(13) => ns(70), ns(12) => ns(69), ns(11) =>
            ns(68), ns(10) => ns(67), ns(9) => ns(66), ns(8)
            => ns(65), ns(7) => ns(64), ns(6) => ns(63), ns(5)
            => ns(62), ns(4) => ns(61), ns(3) => ns(60), ns(2)
            => ns(59), ns(1) => ns(58), ns(0) => ns(57),
            tag(18) => tag(75), tag(17) => tag(74), tag(16) =>
```

tag(73), tag(15) => tag(72), tag(14) => tag(71), tag(13) => tag(70), tag(12) => tag(69), tag(11) => tag(68), tag(10) => tag(67), tag(9) => tag(66), tag(8) => tag(65), tag(7) => tag(64), tag(6) => tag(63), tag(5) => tag(62), tag(4) => tag(61), tag(3) => tag(60), tag(2) => tag(59), tag(1) => tag(58), tag(0) => tag(57), nn(18) => nn(75), nn(17) => nn(74), nn(16) => nn(73), nn(15) => nn(72), nn(14) => nn(71), nn(13) => nn(70), nn(12) => nn(69), nn(11) => nn(68), nn(10) => nn(67), nn(9) => nn(66), nn(8) => nn(65), nn(7) => nn(64), nn(6) => nn(63), nn(5) => nn(62), nn(4) => nn(61), nn(3) => nn(60), nn(2) => nn(59), nn(1) => nn(58), nn(0) => nn(57), fn(18) => fn(75), fn(17) => fn(74), fn(16) => fn(73), fn(15) => fn(72), fn(14) => fn(71), fn(13) => fn(70), fn(12) => fn(69), fn(11) => fn(68), fn(10) => fn(67), fn(9) => fn(66), fn(8) => fn(65), fn(7) => fn(64), fn(6) => fn(63), fn(5) => fn(62), fn(4) => fn(61), fn(3) => fn(60), fn(2) => fn(59), fn(1) => fn(58), fn(0) => fn(57), rspen(18) => rspen(75), rspen(17) => rspen(74), rspen(16) => rspen(73), rspen(15) => rspen(72), rspen(14) => rspen(71), rspen(13) => rspen(70), rspen(12) => rspen(69), rspen(11) => rspen(68), rspen(10) => rspen(67), rspen(9) => rspen(66), rspen(8) => rspen(65), rspen(7) => rspen(64), rspen(6) => rspen(63), rspen(5) => rspen(62), rspen(4) => rspen(61), rspen(3) => rspen(60), rspen(2) => rspen(59), rspen(1) => rspen(58), rspen(0) => rspen(57), fircnten => fircnten );

U4242: tag19
port map ( we => we, s_addr => a(2), rstaddr => rstaddr, mux2 => mux2, mux1 => mux1, mux0 => mux0, fir_in => f(2), carry_in => c(2), SetTag => setag, prsp => prsp, carry => c(3), fir => f(3), wl(18) => wl(56), wl(17) => wl(55), wl(16) => wl(54), wl(15) => wl(53), wl(14) => wl(52), wl(13) => wl(51), wl(12) => wl(50), wl(11) => wl(49), wl(10) => wl(48), wl(9) => wl(47), wl(8) => wl(46), wl(7) => wl(45), wl(6) => wl(44), wl(5) => wl(43), wl(4) => wl(42), wl(3) => wl(41), wl(2) => wl(40), wl(1) => wl(39), wl(0) => wl(38), ml(18) => ml(56), ml(17) => ml(55), ml(16) => ml(54), ml(15) => ml(53), ml(14) => ml(52), ml(13) => ml(51), ml(12) => ml(50), ml(11) => ml(49), ml(10) => ml(48), ml(9) => ml(47), ml(8) => ml(46), ml(7) => ml(45), ml(6) => ml(44), ml(5) => ml(43), ml(4) => ml(42), ml(3) => ml(41), ml(2) => ml(40), ml(1) => ml(39), ml(0) => ml(38), sado => a(3), fs(18) => fs(56), fs(17) => fs(55), fs(16) => fs(54), fs(15) => fs(53), fs(14) => fs(52), fs(13) => fs(51), fs(12) => fs(50), fs(11) => fs(49), fs(10) => fs(48), fs(9) => fs(47), fs(8) => fs(46), fs(7) => fs(45), fs(6) => fs(44), fs(5) => fs(43), fs(4) => fs(42), fs(3) => fs(41), fs(2) => fs(40), fs(1) => fs(39), fs(0) => fs(38), ns(18) => ns(56), ns(17) => ns(55), ns(16)

```
=> ns(54), ns(15) => ns(53), ns(14) => ns(52),
ns(13) => ns(51), ns(12) => ns(50), ns(11) =>
ns(49), ns(10) => ns(48), ns(9) => ns(47), ns(8)
=> ns(46), ns(7) => ns(45), ns(6) => ns(44), ns(5)
=> ns(43), ns(4) => ns(42), ns(3) => ns(41), ns(2)
=> ns(40), ns(1) => ns(39), ns(0) => ns(38),
tag(18) => tag(56), tag(17) => tag(55), tag(16) =>
tag(54), tag(15) => tag(53), tag(14) => tag(52),
tag(13) => tag(51), tag(12) => tag(50), tag(11) =>
tag(49), tag(10) => tag(48), tag(9) => tag(47),
tag(8) => tag(46), tag(7) => tag(45), tag(6) =>
tag(44), tag(5) => tag(43), tag(4) => tag(42),
tag(3) => tag(41), tag(2) => tag(40), tag(1) =>
tag(39), tag(0) => tag(38), nn(18) => nn(56),
nn(17) => nn(55), nn(16) => nn(54), nn(15) =>
nn(53), nn(14) => nn(52), nn(13) => nn(51), nn(12)
=> nn(50), nn(11) => nn(49), nn(10) => nn(48),
nn(9) => nn(47), nn(8) => nn(46), nn(7) => nn(45),
nn(6) => nn(44), nn(5) => nn(43), nn(4) => nn(42),
nn(3) => nn(41), nn(2) => nn(40), nn(1) => nn(39),
nn(0) => nn(38), fn(18) => fn(56), fn(17) =>
fn(55), fn(16) => fn(54), fn(15) => fn(53), fn(14)
=> fn(52), fn(13) => fn(51), fn(12) => fn(50),
fn(11) => fn(49), fn(10) => fn(48), fn(9) =>
fn(47), fn(8) => fn(46), fn(7) => fn(45), fn(6) =>
fn(44), fn(5) => fn(43), fn(4) => fn(42), fn(3) =>
fn(41), fn(2) => fn(40), fn(1) => fn(39), fn(0) =>
fn(38), rspen(18) => rspen(56), rspen(17) =>
rspen(55), rspen(16) => rspen(54), rspen(15) =>
rspen(53), rspen(14) => rspen(52), rspen(13) =>
rspen(51), rspen(12) => rspen(50), rspen(11) =>
rspen(49), rspen(10) => rspen(48), rspen(9) =>
rspen(47), rspen(8) => rspen(46), rspen(7) =>
rspen(45), rspen(6) => rspen(44), rspen(5) =>
rspen(43), rspen(4) => rspen(42), rspen(3) =>
rspen(41), rspen(2) => rspen(40), rspen(1) =>
rspen(39), rspen(0) => rspen(38), fircnten =>
fircnten );

U4241: tag19
  port map ( we => we, s_addr => a(1), rstaddr => rstaddr, mux2
      => mux2, mux1 => mux1, mux0 => mux0, fir_in =>
      f(1), carry_in => c(1), SetTag => setag, prsp =>
      prsp, carry => c(2), fir => f(2), wl(18) => wl(37),
      wl(17) => wl(36), wl(16) => wl(35), wl(15) =>
      wl(34), wl(14) => wl(33), wl(13) => wl(32), wl(12)
      => wl(31), wl(11) => wl(30), wl(10) => wl(29),
      wl(9) => wl(28), wl(8) => wl(27), wl(7) => wl(26),
      wl(6) => wl(25), wl(5) => wl(24), wl(4) => wl(23),
      wl(3) => wl(22), wl(2) => wl(21), wl(1) => wl(20),
      wl(0) => wl(19), ml(18) => ml(37), ml(17) =>
      ml(36), ml(16) => ml(35), ml(15) => ml(34), ml(14)
      => ml(33), ml(13) => ml(32), ml(12) => ml(31),
      ml(11) => ml(30), ml(10) => ml(29), ml(9) =>
      ml(28), ml(8) => ml(27), ml(7) => ml(26), ml(6) =>
      ml(25), ml(5) => ml(24), ml(4) => ml(23), ml(3) =>
      ml(22), ml(2) => ml(21), ml(1) => ml(20), ml(0) =>
      ml(19), sado => a(2), fs(18) => fs(37), fs(17) =>
```

```
        fs(36), fs(16) => fs(35), fs(15) => fs(34), fs(14)
        => fs(33), fs(13) => fs(32), fs(12) => fs(31),
        fs(11) => fs(30), fs(10) => fs(29), fs(9) =>
        fs(28), fs(8) => fs(27), fs(7) => fs(26), fs(6) =>
        fs(25), fs(5) => fs(24), fs(4) => fs(23), fs(3) =>
        fs(22), fs(2) => fs(21), fs(1) => fs(20), fs(0) =>
        fs(19), ns(18) => ns(37), ns(17) => ns(36), ns(16)
        => ns(35), ns(15) => ns(34), ns(14) => ns(33),
        ns(13) => ns(32), ns(12) => ns(31), ns(11) =>
        ns(30), ns(10) => ns(29), ns(9) => ns(28), ns(8)
        => ns(27), ns(7) => ns(26), ns(6) => ns(25), ns(5)
        => ns(24), ns(4) => ns(23), ns(3) => ns(22), ns(2)
        => ns(21), ns(1) => ns(20), ns(0) => ns(19),
        tag(18) => tag(37), tag(17) => tag(36), tag(16) =>
        tag(35), tag(15) => tag(34), tag(14) => tag(33),
        tag(13) => tag(32), tag(12) => tag(31), tag(11) =>
        tag(30), tag(10) => tag(29), tag(9) => tag(28),
        tag(8) => tag(27), tag(7) => tag(26), tag(6) =>
        tag(25), tag(5) => tag(24), tag(4) => tag(23),
        tag(3) => tag(22), tag(2) => tag(21), tag(1) =>
        tag(20), tag(0) => tag(19), nn(18) => nn(37),
        nn(17) => nn(36), nn(16) => nn(35), nn(15) =>
        nn(34), nn(14) => nn(33), nn(13) => nn(32), nn(12)
        => nn(31), nn(11) => nn(30), nn(10) => nn(29),
        nn(9) => nn(28), nn(8) => nn(27), nn(7) => nn(26),
        nn(6) => nn(25), nn(5) => nn(24), nn(4) => nn(23),
        nn(3) => nn(22), nn(2) => nn(21), nn(1) => nn(20),
        nn(0) => nn(19), fn(18) => fn(37), fn(17) =>
        fn(36), fn(16) => fn(35), fn(15) => fn(34), fn(14)
        => fn(33), fn(13) => fn(32), fn(12) => fn(31),
        fn(11) => fn(30), fn(10) => fn(29), fn(9) =>
        fn(28), fn(8) => fn(27), fn(7) => fn(26), fn(6) =>
        fn(25), fn(5) => fn(24), fn(4) => fn(23), fn(3) =>
        fn(22), fn(2) => fn(21), fn(1) => fn(20), fn(0) =>
        fn(19), rspen(18) => rspen(37), rspen(17) =>
        rspen(36), rspen(16) => rspen(35), rspen(15) =>
        rspen(34), rspen(14) => rspen(33), rspen(13) =>
        rspen(32), rspen(12) => rspen(31), rspen(11) =>
        rspen(30), rspen(10) => rspen(29), rspen(9) =>
        rspen(28), rspen(8) => rspen(27), rspen(7) =>
        rspen(26), rspen(6) => rspen(25), rspen(5) =>
        rspen(24), rspen(4) => rspen(23), rspen(3) =>
        rspen(22), rspen(2) => rspen(21), rspen(1) =>
        rspen(20), rspen(0) => rspen(19), fircnten =>
        fircnten );

U4240: tag19
  port map ( we => we, s_addr => cntinit, rstaddr => rstaddr,
        mux2 => mux2, mux1 => mux1, mux0 => mux0, fir_in
        => fir_in, carry_in => resp_in, SetTag => setag,
        prsp => prsp, carry => c(1), fir => f(1), wl(18)
        => wl(18), wl(17) => wl(17), wl(16) => wl(16),
        wl(15) => wl(15), wl(14) => wl(14), wl(13) =>
        wl(13), wl(12) => wl(12), wl(11) => wl(11), wl(10)
        => wl(10), wl(9) => wl(9), wl(8) => wl(8), wl(7)
        => wl(7), wl(6) => wl(6), wl(5) => wl(5), wl(4) =>
        wl(4), wl(3) => wl(3), wl(2) => wl(2), wl(1) =>
        wl(1), wl(0) => wl(0), ml(18) => ml(18), ml(17) =>
```

```
        ml(17), ml(16) => ml(16), ml(15) => ml(15), ml(14)
        => ml(14), ml(13) => ml(13), ml(12) => ml(12),
        ml(11) => ml(11), ml(10) => ml(10), ml(9) => ml(9),
        ml(8) => ml(8), ml(7) => ml(7), ml(6) => ml(6),
        ml(5) => ml(5), ml(4) => ml(4), ml(3) => ml(3),
        ml(2) => ml(2), ml(1) => ml(1), ml(0) => ml(0),
        sado => a(1), fs(18) => fs(18), fs(17) => fs(17),
        fs(16) => fs(16), fs(15) => fs(15), fs(14) =>
        fs(14), fs(13) => fs(13), fs(12) => fs(12), fs(11)
        => fs(11), fs(10) => fs(10), fs(9) => fs(9), fs(8)
        => fs(8), fs(7) => fs(7), fs(6) => fs(6), fs(5) =>
        fs(5), fs(4) => fs(4), fs(3) => fs(3), fs(2) =>
        fs(2), fs(1) => fs(1), fs(0) => fs(0), ns(18) =>
        ns(18), ns(17) => ns(17), ns(16) => ns(16), ns(15)
        => ns(15), ns(14) => ns(14), ns(13) => ns(13),
        ns(12) => ns(12), ns(11) => ns(11), ns(10) =>
        ns(10), ns(9) => ns(9), ns(8) => ns(8), ns(7) =>
        ns(7), ns(6) => ns(6), ns(5) => ns(5), ns(4) =>
        ns(4), ns(3) => ns(3), ns(2) => ns(2), ns(1) =>
        ns(1), ns(0) => ns(0), tag(18) => tag(18), tag(17)
        => tag(17), tag(16) => tag(16), tag(15) => tag(15),
        tag(14) => tag(14), tag(13) => tag(13), tag(12) =>
        tag(12), tag(11) => tag(11), tag(10) => tag(10),
        tag(9) => tag(9), tag(8) => tag(8), tag(7) =>
        tag(7), tag(6) => tag(6), tag(5) => tag(5), tag(4)
        => tag(4), tag(3) => tag(3), tag(2) => tag(2),
        tag(1) => tag(1), tag(0) => tag(0), nn(18) =>
        nn(18), nn(17) => nn(17), nn(16) => nn(16), nn(15)
        => nn(15), nn(14) => nn(14), nn(13) => nn(13),
        nn(12) => nn(12), nn(11) => nn(11), nn(10) =>
        nn(10), nn(9) => nn(9), nn(8) => nn(8), nn(7) =>
        nn(7), nn(6) => nn(6), nn(5) => nn(5), nn(4) =>
        nn(4), nn(3) => nn(3), nn(2) => nn(2), nn(1) =>
        nn(1), nn(0) => nn(0), fn(18) => fn(18), fn(17) =>
        fn(17), fn(16) => fn(16), fn(15) => fn(15), fn(14)
        => fn(14), fn(13) => fn(13), fn(12) => fn(12),
        fn(11) => fn(11), fn(10) => fn(10), fn(9) => fn(9),
        fn(8) => fn(8), fn(7) => fn(7), fn(6) => fn(6),
        fn(5) => fn(5), fn(4) => fn(4), fn(3) => fn(3),
        fn(2) => fn(2), fn(1) => fn(1), fn(0) => fn(0),
        rspen(18) => rspen(18), rspen(17) => rspen(17),
        rspen(16) => rspen(16), rspen(15) => rspen(15),
        rspen(14) => rspen(14), rspen(13) => rspen(13),
        rspen(12) => rspen(12), rspen(11) => rspen(11),
        rspen(10) => rspen(10), rspen(9) => rspen(9),
        rspen(8) => rspen(8), rspen(7) => rspen(7),
        rspen(6) => rspen(6), rspen(5) => rspen(5),
        rspen(4) => rspen(4), rspen(3) => rspen(3),
        rspen(2) => rspen(2), rspen(1) => rspen(1),
        rspen(0) => rspen(0), fircnten => fircnten );

U434: tag18
   port map ( we => we, s_addr => a(17), rstaddr => rstaddr,
        mux2 => mux2, mux1 => mux1, mux0 => mux0, fir_in
        => f(17), carry_in => c(17), SetTag => setag, prsp
        => prsp, carry => count, wl(17) => wl(340), wl(16)
        => wl(339), wl(15) => wl(338), wl(14) => wl(337),
        wl(13) => wl(336), wl(12) => wl(335), wl(11) =>
```

```
        wl(334), wl(10) => wl(333), wl(9) => wl(332),
        wl(8) => wl(331), wl(7) => wl(330), wl(6) =>
        wl(329), wl(5) => wl(328), wl(4) => wl(327), wl(3)
        => wl(326), wl(2) => wl(325), wl(1) => wl(324),
        wl(0) => wl(323), ml(17) => ml(340), ml(16) =>
        ml(339), ml(15) => ml(338), ml(14) => ml(337),
        ml(13) => ml(336), ml(12) => ml(335), ml(11) =>
        ml(334), ml(10) => ml(333), ml(9) => ml(332),
        ml(8) => ml(331), ml(7) => ml(330), ml(6) =>
        ml(329), ml(5) => ml(328), ml(4) => ml(327), ml(3)
        => ml(326), ml(2) => ml(325), ml(1) => ml(324),
        ml(0) => ml(323), fs(17) => fs(340), fs(16) =>
        fs(339), fs(15) => fs(338), fs(14) => fs(337),
        fs(13) => fs(336), fs(12) => fs(335), fs(11) =>
        fs(334), fs(10) => fs(333), fs(9) => fs(332),
        fs(8) => fs(331), fs(7) => fs(330), fs(6) =>
        fs(329), fs(5) => fs(328), fs(4) => fs(327), fs(3)
        => fs(326), fs(2) => fs(325), fs(1) => fs(324),
        fs(0) => fs(323), ns(17) => ns(340), ns(16) =>
        ns(339), ns(15) => ns(338), ns(14) => ns(337),
        ns(13) => ns(336), ns(12) => ns(335), ns(11) =>
        ns(334), ns(10) => ns(333), ns(9) => ns(332),
        ns(8) => ns(331), ns(7) => ns(330), ns(6) =>
        ns(329), ns(5) => ns(328), ns(4) => ns(327), ns(3)
        => ns(326), ns(2) => ns(325), ns(1) => ns(324),
        ns(0) => ns(323), tag(17) => tag(340), tag(16) =>
        tag(339), tag(15) => tag(338), tag(14) => tag(337),
        tag(13) => tag(336), tag(12) => tag(335), tag(11)
        => tag(334), tag(10) => tag(333), tag(9) =>
        tag(332), tag(8) => tag(331), tag(7) => tag(330),
        tag(6) => tag(329), tag(5) => tag(328), tag(4) =>
        tag(327), tag(3) => tag(326), tag(2) => tag(325),
        tag(1) => tag(324), tag(0) => tag(323), nn(17) =>
        nn(340), nn(16) => nn(339), nn(15) => nn(338),
        nn(14) => nn(337), nn(13) => nn(336), nn(12) =>
        nn(335), nn(11) => nn(334), nn(10) => nn(333),
        nn(9) => nn(332), nn(8) => nn(331), nn(7) =>
        nn(330), nn(6) => nn(329), nn(5) => nn(328), nn(4)
        => nn(327), nn(3) => nn(326), nn(2) => nn(325),
        nn(1) => nn(324), nn(0) => nn(323), fn(17) =>
        fn(340), fn(16) => fn(339), fn(15) => fn(338),
        fn(14) => fn(337), fn(13) => fn(336), fn(12) =>
        fn(335), fn(11) => fn(334), fn(10) => fn(333),
        fn(9) => fn(332), fn(8) => fn(331), fn(7) =>
        fn(330), fn(6) => fn(329), fn(5) => fn(328), fn(4)
        => fn(327), fn(3) => fn(326), fn(2) => fn(325),
        fn(1) => fn(324), fn(0) => fn(323), rspen(17) =>
        rspen(340), rspen(16) => rspen(339), rspen(15) =>
        rspen(338), rspen(14) => rspen(337), rspen(13) =>
        rspen(336), rspen(12) => rspen(335), rspen(11) =>
        rspen(334), rspen(10) => rspen(333), rspen(9) =>
        rspen(332), rspen(8) => rspen(331), rspen(7) =>
        rspen(330), rspen(6) => rspen(329), rspen(5) =>
        rspen(328), rspen(4) => rspen(327), rspen(3) =>
        rspen(326), rspen(2) => rspen(325), rspen(1) =>
        rspen(324), rspen(0) => rspen(323), fircnten =>
        fircnten );
end tag341;
```

file: TAG342.VHD
-- Date of netlist generation: Nov-19-93

```
-----------------------------------------------------------------------

library IEEE;
use IEEE.STD_LOGIC_1164.ALL;

library COMPASS_LIB;
use COMPASS_LIB.COMPASS.ALL;

entity tag342 is



   port ( prsp : in Std_Logic := 'U';
        setag : in Std_Logic := 'U';
        cntinit : in Std_Logic := 'U';
        rstaddr : in Std_Logic := 'U';
        mux2 : in Std_Logic := 'U';
        mux1 : in Std_Logic := 'U';
        mux0 : in Std_Logic := 'U';
        fir_in : in Std_Logic := 'U';
        resp_in : in Std_Logic := 'U';
        we : in Std_Logic := 'U';
        fn : in Std_Logic_Vector(341 downto 0) := (others => 'U');
        nn : in Std_Logic_Vector(341 downto 0) := (others => 'U');
        ns : in Std_Logic_Vector(341 downto 0) := (others => 'U');
        fs : in Std_Logic_Vector(341 downto 0) := (others => 'U');
        ml : in Std_Logic_Vector(341 downto 0) := (others => 'U');
        fircnten : in Std_Logic := 'U';

        count_out : out Std_Logic := 'U';
        tag : out Std_Logic_Vector(341 downto 0) := (others =>
'U');
        rspen : out Std_Logic_Vector(341 downto 0) := (others =>
'U');
        wl : out Std_Logic_Vector(341 downto 0) := (others => 'U')
);

end tag342;


-----------------------------------------------------------------------

architecture tag342 OF tag342 is

   component tag19
      port ( we : in Std_Logic;
           s_addr : in Std_Logic;
           rstaddr : in Std_Logic;
           mux2 : in Std_Logic;
           mux1 : in Std_Logic;
           mux0 : in Std_Logic;
           fir_in : in Std_Logic;
           carry_in : in Std_Logic;
           SetTag : in Std_Logic;
           prsp : in Std_Logic;
```

```
        ml : in Std_Logic_Vector(18 downto 0) := (others =>
'U');
        fs : in Std_Logic_Vector(18 downto 0) := (others =>
'U');
        ns : in Std_Logic_Vector(18 downto 0) := (others =>
'U');
        nn : in Std_Logic_Vector(18 downto 0) := (others =>
'U');
        fn : in Std_Logic_Vector(18 downto 0) := (others =>
'U');
        fircnten : in Std_Logic;

        carry : out Std_Logic;
        fir : out Std_Logic;
        wl : out Std_Logic_Vector(18 downto 0) := (others =>
'U');
        sado : out Std_Logic;
        tag : out Std_Logic_Vector(18 downto 0) := (others =>
'U');
        rspen : out Std_Logic_Vector(18 downto 0) := (others
=> 'U') );
  end component;

  signal a : Std_Logic_Vector(18 downto 1);
  signal S1 : Std_Logic;
  signal S2 : Std_Logic;
  signal c : Std_Logic_Vector(17 downto 1);
  signal S3 : Std_Logic;
  signal f : Std_Logic_Vector(18 downto 1);
  signal S4 : Std_Logic;

begin


  U42417: tag19
    port map ( we => we, s_addr => a(17), rstaddr => rstaddr,
          mux2 => mux2, mux1 => mux1, mux0 => mux0, fir_in
          => f(17), carry_in => c(17), SetTag => setag, prsp
          => prsp, carry => count_out, fir => f(18), wl(18)
          => wl(341), wl(17) => wl(340), wl(16) => wl(339),
          wl(15) => wl(338), wl(14) => wl(337), wl(13) =>
          wl(336), wl(12) => wl(335), wl(11) => wl(334),
          wl(10) => wl(333), wl(9) => wl(332), wl(8) =>
          wl(331), wl(7) => wl(330), wl(6) => wl(329), wl(5)
          => wl(328), wl(4) => wl(327), wl(3) => wl(326),
          wl(2) => wl(325), wl(1) => wl(324), wl(0) =>
          wl(323), ml(18) => ml(341), ml(17) => ml(340),
          ml(16) => ml(339), ml(15) => ml(338), ml(14) =>
          ml(337), ml(13) => ml(336), ml(12) => ml(335),
          ml(11) => ml(334), ml(10) => ml(333), ml(9) =>
          ml(332), ml(8) => ml(331), ml(7) => ml(330), ml(6)
          => ml(329), ml(5) => ml(328), ml(4) => ml(327),
          ml(3) => ml(326), ml(2) => ml(325), ml(1) =>
          ml(324), ml(0) => ml(323), sado => a(18), fs(18)
          => fs(341), fs(17) => fs(340), fs(16) => fs(339),
          fs(15) => fs(338), fs(14) => fs(337), fs(13) =>
          fs(336), fs(12) => fs(335), fs(11) => fs(334),
          fs(10) => fs(333), fs(9) => fs(332), fs(8) =>
```

```
fs(331), fs(7) => fs(330), fs(6) => fs(329), fs(5)
=> fs(328), fs(4) => fs(327), fs(3) => fs(326),
fs(2) => fs(325), fs(1) => fs(324), fs(0) =>
fs(323), ns(18) => ns(341), ns(17) => ns(340),
ns(16) => ns(339), ns(15) => ns(338), ns(14) =>
ns(337), ns(13) => ns(336), ns(12) => ns(335),
ns(11) => ns(334), ns(10) => ns(333), ns(9) =>
ns(332), ns(8) => ns(331), ns(7) => ns(330), ns(6)
=> ns(329), ns(5) => ns(328), ns(4) => ns(327),
ns(3) => ns(326), ns(2) => ns(325), ns(1) =>
ns(324), ns(0) => ns(323), tag(18) => tag(341),
tag(17) => tag(340), tag(16) => tag(339), tag(15)
=> tag(338), tag(14) => tag(337), tag(13) =>
tag(336), tag(12) => tag(335), tag(11) => tag(334),
tag(10) => tag(333), tag(9) => tag(332), tag(8) =>
tag(331), tag(7) => tag(330), tag(6) => tag(329),
tag(5) => tag(328), tag(4) => tag(327), tag(3) =>
tag(326), tag(2) => tag(325), tag(1) => tag(324),
tag(0) => tag(323), nn(18) => nn(341), nn(17) =>
nn(340), nn(16) => nn(339), nn(15) => nn(338),
nn(14) => nn(337), nn(13) => nn(336), nn(12) =>
nn(335), nn(11) => nn(334), nn(10) => nn(333),
nn(9) => nn(332), nn(8) => nn(331), nn(7) =>
nn(330), nn(6) => nn(329), nn(5) => nn(328), nn(4)
=> nn(327), nn(3) => nn(326), nn(2) => nn(325),
nn(1) => nn(324), nn(0) => nn(323), fn(18) =>
fn(341), fn(17) => fn(340), fn(16) => fn(339),
fn(15) => fn(338), fn(14) => fn(337), fn(13) =>
fn(336), fn(12) => fn(335), fn(11) => fn(334),
fn(10) => fn(333), fn(9) => fn(332), fn(8) =>
fn(331), fn(7) => fn(330), fn(6) => fn(329), fn(5)
=> fn(328), fn(4) => fn(327), fn(3) => fn(326),
fn(2) => fn(325), fn(1) => fn(324), fn(0) =>
fn(323), rspen(18) => rspen(341), rspen(17) =>
rspen(340), rspen(16) => rspen(339), rspen(15) =>
rspen(338), rspen(14) => rspen(337), rspen(13) =>
rspen(336), rspen(12) => rspen(335), rspen(11) =>
rspen(334), rspen(10) => rspen(333), rspen(9) =>
rspen(332), rspen(8) => rspen(331), rspen(7) =>
rspen(330), rspen(6) => rspen(329), rspen(5) =>
rspen(328), rspen(4) => rspen(327), rspen(3) =>
rspen(326), rspen(2) => rspen(325), rspen(1) =>
rspen(324), rspen(0) => rspen(323), fircnten =>
fircnten );

U42416: tag19
  port map ( we => we, s_addr => a(16), rstaddr => rstaddr,
        mux2 => mux2, mux1 => mux1, mux0 => mux0, fir_in
        => f(16), carry_in => c(16), SetTag => setag, prsp
        => prsp, carry => c(17), fir => f(17), wl(18) =>
        wl(322), wl(17) => wl(321), wl(16) => wl(320),
        wl(15) => wl(319), wl(14) => wl(318), wl(13) =>
        wl(317), wl(12) => wl(316), wl(11) => wl(315),
        wl(10) => wl(314), wl(9) => wl(313), wl(8) =>
        wl(312), wl(7) => wl(311), wl(6) => wl(310), wl(5)
        => wl(309), wl(4) => wl(308), wl(3) => wl(307),
        wl(2) => wl(306), wl(1) => wl(305), wl(0) =>
        wl(304), ml(18) => ml(322), ml(17) => ml(321),
```

```
ml(16) => ml(320), ml(15) => ml(319), ml(14) =>
ml(318), ml(13) => ml(317), ml(12) => ml(316),
ml(11) => ml(315), ml(10) => ml(314), ml(9) =>
ml(313), ml(8) => ml(312), ml(7) => ml(311), ml(6)
=> ml(310), ml(5) => ml(309), ml(4) => ml(308),
ml(3) => ml(307), ml(2) => ml(306), ml(1) =>
ml(305), ml(0) => ml(304), sado => a(17), fs(18)
=> fs(322), fs(17) => fs(321), fs(16) => fs(320),
fs(15) => fs(319), fs(14) => fs(318), fs(13) =>
fs(317), fs(12) => fs(316), fs(11) => fs(315),
fs(10) => fs(314), fs(9) => fs(313), fs(8) =>
fs(312), fs(7) => fs(311), fs(6) => fs(310), fs(5)
=> fs(309), fs(4) => fs(308), fs(3) => fs(307),
fs(2) => fs(306), fs(1) => fs(305), fs(0) =>
fs(304), ns(18) => ns(322), ns(17) => ns(321),
ns(16) => ns(320), ns(15) => ns(319), ns(14) =>
ns(318), ns(13) => ns(317), ns(12) => ns(316),
ns(11) => ns(315), ns(10) => ns(314), ns(9) =>
ns(313), ns(8) => ns(312), ns(7) => ns(311), ns(6)
=> ns(310), ns(5) => ns(309), ns(4) => ns(308),
ns(3) => ns(307), ns(2) => ns(306), ns(1) =>
ns(305), ns(0) => ns(304), tag(18) => tag(322),
tag(17) => tag(321), tag(16) => tag(320), tag(15)
=> tag(319), tag(14) => tag(318), tag(13) =>
tag(317), tag(12) => tag(316), tag(11) => tag(315),
tag(10) => tag(314), tag(9) => tag(313), tag(8) =>
tag(312), tag(7) => tag(311), tag(6) => tag(310),
tag(5) => tag(309), tag(4) => tag(308), tag(3) =>
tag(307), tag(2) => tag(306), tag(1) => tag(305),
tag(0) => tag(304), nn(18) => nn(322), nn(17) =>
nn(321), nn(16) => nn(320), nn(15) => nn(319),
nn(14) => nn(318), nn(13) => nn(317), nn(12) =>
nn(316), nn(11) => nn(315), nn(10) => nn(314),
nn(9) => nn(313), nn(8) => nn(312), nn(7) =>
nn(311), nn(6) => nn(310), nn(5) => nn(309), nn(4)
=> nn(308), nn(3) => nn(307), nn(2) => nn(306),
nn(1) => nn(305), nn(0) => nn(304), fn(18) =>
fn(322), fn(17) => fn(321), fn(16) => fn(320),
fn(15) => fn(319), fn(14) => fn(318), fn(13) =>
fn(317), fn(12) => fn(316), fn(11) => fn(315),
fn(10) => fn(314), fn(9) => fn(313), fn(8) =>
fn(312), fn(7) => fn(311), fn(6) => fn(310), fn(5)
=> fn(309), fn(4) => fn(308), fn(3) => fn(307),
fn(2) => fn(306), fn(1) => fn(305), fn(0) =>
fn(304), rspen(18) => rspen(322), rspen(17) =>
rspen(321), rspen(16) => rspen(320), rspen(15) =>
rspen(319), rspen(14) => rspen(318), rspen(13) =>
rspen(317), rspen(12) => rspen(316), rspen(11) =>
rspen(315), rspen(10) => rspen(314), rspen(9) =>
rspen(313), rspen(8) => rspen(312), rspen(7) =>
rspen(311), rspen(6) => rspen(310), rspen(5) =>
rspen(309), rspen(4) => rspen(308), rspen(3) =>
rspen(307), rspen(2) => rspen(306), rspen(1) =>
rspen(305), rspen(0) => rspen(304), fircnten =>
fircnten );

U42415: tag19
  port map ( we => we, s_addr => a(15), rstaddr => rstaddr,
```

mux2 => mux2, mux1 => mux1, mux0 => mux0, fir_in => f(15), carry_in => c(15), SetTag => setag, prsp => prsp, carry => c(16), fir => f(16), wl(18) => wl(303), wl(17) => wl(302), wl(16) => wl(301), wl(15) => wl(300), wl(14) => wl(299), wl(13) => wl(298), wl(12) => wl(297), wl(11) => wl(296), wl(10) => wl(295), wl(9) => wl(294), wl(8) => wl(293), wl(7) => wl(292), wl(6) => wl(291), wl(5) => wl(290), wl(4) => wl(289), wl(3) => wl(288), wl(2) => wl(287), wl(1) => wl(286), wl(0) => wl(285), ml(18) => ml(303), ml(17) => ml(302), ml(16) => ml(301), ml(15) => ml(300), ml(14) => ml(299), ml(13) => ml(298), ml(12) => ml(297), ml(11) => ml(296), ml(10) => ml(295), ml(9) => ml(294), ml(8) => ml(293), ml(7) => ml(292), ml(6) => ml(291), ml(5) => ml(290), ml(4) => ml(289), ml(3) => ml(288), ml(2) => ml(287), ml(1) => ml(286), ml(0) => ml(285), sado => a(16), fs(18) => fs(303), fs(17) => fs(302), fs(16) => fs(301), fs(15) => fs(300), fs(14) => fs(299), fs(13) => fs(298), fs(12) => fs(297), fs(11) => fs(296), fs(10) => fs(295), fs(9) => fs(294), fs(8) => fs(293), fs(7) => fs(292), fs(6) => fs(291), fs(5) => fs(290), fs(4) => fs(289), fs(3) => fs(288), fs(2) => fs(287), fs(1) => fs(286), fs(0) => fs(285), ns(18) => ns(303), ns(17) => ns(302), ns(16) => ns(301), ns(15) => ns(300), ns(14) => ns(299), ns(13) => ns(298), ns(12) => ns(297), ns(11) => ns(296), ns(10) => ns(295), ns(9) => ns(294), ns(8) => ns(293), ns(7) => ns(292), ns(6) => ns(291), ns(5) => ns(290), ns(4) => ns(289), ns(3) => ns(288), ns(2) => ns(287), ns(1) => ns(286), ns(0) => ns(285), tag(18) => tag(303), tag(17) => tag(302), tag(16) => tag(301), tag(15) => tag(300), tag(14) => tag(299), tag(13) => tag(298), tag(12) => tag(297), tag(11) => tag(296), tag(10) => tag(295), tag(9) => tag(294), tag(8) => tag(293), tag(7) => tag(292), tag(6) => tag(291), tag(5) => tag(290), tag(4) => tag(289), tag(3) => tag(288), tag(2) => tag(287), tag(1) => tag(286), tag(0) => tag(285), nn(18) => nn(303), nn(17) => nn(302), nn(16) => nn(301), nn(15) => nn(300), nn(14) => nn(299), nn(13) => nn(298), nn(12) => nn(297), nn(11) => nn(296), nn(10) => nn(295), nn(9) => nn(294), nn(8) => nn(293), nn(7) => nn(292), nn(6) => nn(291), nn(5) => nn(290), nn(4) => nn(289), nn(3) => nn(288), nn(2) => nn(287), nn(1) => nn(286), nn(0) => nn(285), fn(18) => fn(303), fn(17) => fn(302), fn(16) => fn(301), fn(15) => fn(300), fn(14) => fn(299), fn(13) => fn(298), fn(12) => fn(297), fn(11) => fn(296), fn(10) => fn(295), fn(9) => fn(294), fn(8) => fn(293), fn(7) => fn(292), fn(6) => fn(291), fn(5) => fn(290), fn(4) => fn(289), fn(3) => fn(288), fn(2) => fn(287), fn(1) => fn(286), fn(0) => fn(285), rspen(18) => rspen(303), rspen(17) => rspen(302), rspen(16) => rspen(301), rspen(15) => rspen(300), rspen(14) => rspen(299), rspen(13) =>

```
          rspen(298), rspen(12) => rspen(297), rspen(11) =>
          rspen(296), rspen(10) => rspen(295), rspen(9) =>
          rspen(294), rspen(8) => rspen(293), rspen(7) =>
          rspen(292), rspen(6) => rspen(291), rspen(5) =>
          rspen(290), rspen(4) => rspen(289), rspen(3) =>
          rspen(288), rspen(2) => rspen(287), rspen(1) =>
          rspen(286), rspen(0) => rspen(285), fircnten =>
          fircnten );

U42414: tag19
   port map ( we => we, s_addr => a(14), rstaddr => rstaddr,
          mux2 => mux2, mux1 => mux1, mux0 => mux0, fir_in
          => f(14), carry_in => c(14), SetTag => setag, prsp
          => prsp, carry => c(15), fir => f(15), wl(18) =>
          wl(284), wl(17) => wl(283), wl(16) => wl(282),
          wl(15) => wl(281), wl(14) => wl(280), wl(13) =>
          wl(279), wl(12) => wl(278), wl(11) => wl(277),
          wl(10) => wl(276), wl(9) => wl(275), wl(8) =>
          wl(274), wl(7) => wl(273), wl(6) => wl(272), wl(5)
          => wl(271), wl(4) => wl(270), wl(3) => wl(269),
          wl(2) => wl(268), wl(1) => wl(267), wl(0) =>
          wl(266), ml(18) => ml(284), ml(17) => ml(283),
          ml(16) => ml(282), ml(15) => ml(281), ml(14) =>
          ml(280), ml(13) => ml(279), ml(12) => ml(278),
          ml(11) => ml(277), ml(10) => ml(276), ml(9) =>
          ml(275), ml(8) => ml(274), ml(7) => ml(273), ml(6)
          => ml(272), ml(5) => ml(271), ml(4) => ml(270),
          ml(3) => ml(269), ml(2) => ml(268), ml(1) =>
          ml(267), ml(0) => ml(266), sado => a(15), fs(18)
          => fs(284), fs(17) => fs(283), fs(16) => fs(282),
          fs(15) => fs(281), fs(14) => fs(280), fs(13) =>
          fs(279), fs(12) => fs(278), fs(11) => fs(277),
          fs(10) => fs(276), fs(9) => fs(275), fs(8) =>
          fs(274), fs(7) => fs(273), fs(6) => fs(272), fs(5)
          => fs(271), fs(4) => fs(270), fs(3) => fs(269),
          fs(2) => fs(268), fs(1) => fs(267), fs(0) =>
          fs(266), ns(18) => ns(284), ns(17) => ns(283),
          ns(16) => ns(282), ns(15) => ns(281), ns(14) =>
          ns(280), ns(13) => ns(279), ns(12) => ns(278),
          ns(11) => ns(277), ns(10) => ns(276), ns(9) =>
          ns(275), ns(8) => ns(274), ns(7) => ns(273), ns(6)
          => ns(272), ns(5) => ns(271), ns(4) => ns(270),
          ns(3) => ns(269), ns(2) => ns(268), ns(1) =>
          ns(267), ns(0) => ns(266), tag(18) => tag(284),
          tag(17) => tag(283), tag(16) => tag(282), tag(15)
          => tag(281), tag(14) => tag(280), tag(13) =>
          tag(279), tag(12) => tag(278), tag(11) => tag(277),
          tag(10) => tag(276), tag(9) => tag(275), tag(8) =>
          tag(274), tag(7) => tag(273), tag(6) => tag(272),
          tag(5) => tag(271), tag(4) => tag(270), tag(3) =>
          tag(269), tag(2) => tag(268), tag(1) => tag(267),
          tag(0) => tag(266), nn(18) => nn(284), nn(17) =>
          nn(283), nn(16) => nn(282), nn(15) => nn(281),
          nn(14) => nn(280), nn(13) => nn(279), nn(12) =>
          nn(278), nn(11) => nn(277), nn(10) => nn(276),
          nn(9) => nn(275), nn(8) => nn(274), nn(7) =>
          nn(273), nn(6) => nn(272), nn(5) => nn(271), nn(4)
          => nn(270), nn(3) => nn(269), nn(2) => nn(268),
```

```
nn(1) => nn(267), nn(0) => nn(266), fn(18) =>
        fn(284), fn(17) => fn(283), fn(16) => fn(282),
        fn(15) => fn(281), fn(14) => fn(280), fn(13) =>
        fn(279), fn(12) => fn(278), fn(11) => fn(277),
        fn(10) => fn(276), fn(9) => fn(275), fn(8) =>
        fn(274), fn(7) => fn(273), fn(6) => fn(272), fn(5)
        => fn(271), fn(4) => fn(270), fn(3) => fn(269),
        fn(2) => fn(268), fn(1) => fn(267), fn(0) =>
        fn(266), rspen(18) => rspen(284), rspen(17) =>
        rspen(283), rspen(16) => rspen(282), rspen(15) =>
        rspen(281), rspen(14) => rspen(280), rspen(13) =>
        rspen(279), rspen(12) => rspen(278), rspen(11) =>
        rspen(277), rspen(10) => rspen(276), rspen(9) =>
        rspen(275), rspen(8) => rspen(274), rspen(7) =>
        rspen(273), rspen(6) => rspen(272), rspen(5) =>
        rspen(271), rspen(4) => rspen(270), rspen(3) =>
        rspen(269), rspen(2) => rspen(268), rspen(1) =>
        rspen(267), rspen(0) => rspen(266), fircnten =>
        fircnten );

U42413: tag19
   port map ( we => we, s_addr => a(13), rstaddr => rstaddr,
        mux2 => mux2, mux1 => mux1, mux0 => mux0, fir_in
        => f(13), carry_in => c(13), SetTag => setag, prsp
        => prsp, carry => c(14), fir => f(14), wl(18) =>
        wl(265), wl(17) => wl(264), wl(16) => wl(263),
        wl(15) => wl(262), wl(14) => wl(261), wl(13) =>
        wl(260), wl(12) => wl(259), wl(11) => wl(258),
        wl(10) => wl(257), wl(9) => wl(256), wl(8) =>
        wl(255), wl(7) => wl(254), wl(6) => wl(253), wl(5)
        => wl(252), wl(4) => wl(251), wl(3) => wl(250),
        wl(2) => wl(249), wl(1) => wl(248), wl(0) =>
        wl(247), ml(18) => ml(265), ml(17) => ml(264),
        ml(16) => ml(263), ml(15) => ml(262), ml(14) =>
        ml(261), ml(13) => ml(260), ml(12) => ml(259),
        ml(11) => ml(258), ml(10) => ml(257), ml(9) =>
        ml(256), ml(8) => ml(255), ml(7) => ml(254), ml(6)
        => ml(253), ml(5) => ml(252), ml(4) => ml(251),
        ml(3) => ml(250), ml(2) => ml(249), ml(1) =>
        ml(248), ml(0) => ml(247), sado => a(14), fs(18)
        => fs(265), fs(17) => fs(264), fs(16) => fs(263),
        fs(15) => fs(262), fs(14) => fs(261), fs(13) =>
        fs(260), fs(12) => fs(259), fs(11) => fs(258),
        fs(10) => fs(257), fs(9) => fs(256), fs(8) =>
        fs(255), fs(7) => fs(254), fs(6) => fs(253), fs(5)
        => fs(252), fs(4) => fs(251), fs(3) => fs(250),
        fs(2) => fs(249), fs(1) => fs(248), fs(0) =>
        fs(247), ns(18) => ns(265), ns(17) => ns(264),
        ns(16) => ns(263), ns(15) => ns(262), ns(14) =>
        ns(261), ns(13) => ns(260), ns(12) => ns(259),
        ns(11) => ns(258), ns(10) => ns(257), ns(9) =>
        ns(256), ns(8) => ns(255), ns(7) => ns(254), ns(6)
        => ns(253), ns(5) => ns(252), ns(4) => ns(251),
        ns(3) => ns(250), ns(2) => ns(249), ns(1) =>
        ns(248), ns(0) => ns(247), tag(18) => tag(265),
        tag(17) => tag(264), tag(16) => tag(263), tag(15)
        => tag(262), tag(14) => tag(261), tag(13) =>
        tag(260), tag(12) => tag(259), tag(11) => tag(258),
```

```
tag(10) => tag(257), tag(9) => tag(256), tag(8) =>
tag(255), tag(7) => tag(254), tag(6) => tag(253),
tag(5) => tag(252), tag(4) => tag(251), tag(3) =>
tag(250), tag(2) => tag(249), tag(1) => tag(248),
tag(0) => tag(247), nn(18) => nn(265), nn(17) =>
nn(264), nn(16) => nn(263), nn(15) => nn(262),
nn(14) => nn(261), nn(13) => nn(260), nn(12) =>
nn(259), nn(11) => nn(258), nn(10) => nn(257),
nn(9) => nn(256), nn(8) => nn(255), nn(7) =>
nn(254), nn(6) => nn(253), nn(5) => nn(252), nn(4)
=> nn(251), nn(3) => nn(250), nn(2) => nn(249),
nn(1) => nn(248), nn(0) => nn(247), fn(18) =>
fn(265), fn(17) => fn(264), fn(16) => fn(263),
fn(15) => fn(262), fn(14) => fn(261), fn(13) =>
fn(260), fn(12) => fn(259), fn(11) => fn(258),
fn(10) => fn(257), fn(9) => fn(256), fn(8) =>
fn(255), fn(7) => fn(254), fn(6) => fn(253), fn(5)
=> fn(252), fn(4) => fn(251), fn(3) => fn(250),
fn(2) => fn(249), fn(1) => fn(248), fn(0) =>
fn(247), rspen(18) => rspen(265), rspen(17) =>
rspen(264), rspen(16) => rspen(263), rspen(15) =>
rspen(262), rspen(14) => rspen(261), rspen(13) =>
rspen(260), rspen(12) => rspen(259), rspen(11) =>
rspen(258), rspen(10) => rspen(257), rspen(9) =>
rspen(256), rspen(8) => rspen(255), rspen(7) =>
rspen(254), rspen(6) => rspen(253), rspen(5) =>
rspen(252), rspen(4) => rspen(251), rspen(3) =>
rspen(250), rspen(2) => rspen(249), rspen(1) =>
rspen(248), rspen(0) => rspen(247), fircnten =>
fircnten );

U42412: tag19
  port map ( we => we, s_addr => a(12), rstaddr => rstaddr,
    mux2 => mux2, mux1 => mux1, mux0 => mux0, fir_in
    => f(12), carry_in => c(12), SetTag => setag, prsp
    => prsp, carry => c(13), fir => f(13), wl(18) =>
    wl(246), wl(17) => wl(245), wl(16) => wl(244),
    wl(15) => wl(243), wl(14) => wl(242), wl(13) =>
    wl(241), wl(12) => wl(240), wl(11) => wl(239),
    wl(10) => wl(238), wl(9) => wl(237), wl(8) =>
    wl(236), wl(7) => wl(235), wl(6) => wl(234), wl(5)
    => wl(233), wl(4) => wl(232), wl(3) => wl(231),
    wl(2) => wl(230), wl(1) => wl(229), wl(0) =>
    wl(228), ml(18) => ml(246), ml(17) => ml(245),
    ml(16) => ml(244), ml(15) => ml(243), ml(14) =>
    ml(242), ml(13) => ml(241), ml(12) => ml(240),
    ml(11) => ml(239), ml(10) => ml(238), ml(9) =>
    ml(237), ml(8) => ml(236), ml(7) => ml(235), ml(6)
    => ml(234), ml(5) => ml(233), ml(4) => ml(232),
    ml(3) => ml(231), ml(2) => ml(230), ml(1) =>
    ml(229), ml(0) => ml(228), sado => a(13), fs(18)
    => fs(246), fs(17) => fs(245), fs(16) => fs(244),
    fs(15) => fs(243), fs(14) => fs(242), fs(13) =>
    fs(241), fs(12) => fs(240), fs(11) => fs(239),
    fs(10) => fs(238), fs(9) => fs(237), fs(8) =>
    fs(236), fs(7) => fs(235), fs(6) => fs(234), fs(5)
    => fs(233), fs(4) => fs(232), fs(3) => fs(231),
    fs(2) => fs(230), fs(1) => fs(229), fs(0) =>
```

```
fs(228), ns(18) => ns(246), ns(17) => ns(245),
ns(16) => ns(244), ns(15) => ns(243), ns(14) =>
ns(242), ns(13) => ns(241), ns(12) => ns(240),
ns(11) => ns(239), ns(10) => ns(238), ns(9) =>
ns(237), ns(8) => ns(236), ns(7) => ns(235), ns(6)
=> ns(234), ns(5) => ns(233), ns(4) => ns(232),
ns(3) => ns(231), ns(2) => ns(230), ns(1) =>
ns(229), ns(0) => ns(228), tag(18) => tag(246),
tag(17) => tag(245), tag(16) => tag(244), tag(15)
=> tag(243), tag(14) => tag(242), tag(13) =>
tag(241), tag(12) => tag(240), tag(11) => tag(239),
tag(10) => tag(238), tag(9) => tag(237), tag(8) =>
tag(236), tag(7) => tag(235), tag(6) => tag(234),
tag(5) => tag(233), tag(4) => tag(232), tag(3) =>
tag(231), tag(2) => tag(230), tag(1) => tag(229),
tag(0) => tag(228), nn(18) => nn(246), nn(17) =>
nn(245), nn(16) => nn(244), nn(15) => nn(243),
nn(14) => nn(242), nn(13) => nn(241), nn(12) =>
nn(240), nn(11) => nn(239), nn(10) => nn(238),
nn(9) => nn(237), nn(8) => nn(236), nn(7) =>
nn(235), nn(6) => nn(234), nn(5) => nn(233), nn(4)
=> nn(232), nn(3) => nn(231), nn(2) => nn(230),
nn(1) => nn(229), nn(0) => nn(228), fn(18) =>
fn(246), fn(17) => fn(245), fn(16) => fn(244),
fn(15) => fn(243), fn(14) => fn(242), fn(13) =>
fn(241), fn(12) => fn(240), fn(11) => fn(239),
fn(10) => fn(238), fn(9) => fn(237), fn(8) =>
fn(236), fn(7) => fn(235), fn(6) => fn(234), fn(5)
=> fn(233), fn(4) => fn(232), fn(3) => fn(231),
fn(2) => fn(230), fn(1) => fn(229), fn(0) =>
fn(228), rspen(18) => rspen(246), rspen(17) =>
rspen(245), rspen(16) => rspen(244), rspen(15) =>
rspen(243), rspen(14) => rspen(242), rspen(13) =>
rspen(241), rspen(12) => rspen(240), rspen(11) =>
rspen(239), rspen(10) => rspen(238), rspen(9) =>
rspen(237), rspen(8) => rspen(236), rspen(7) =>
rspen(235), rspen(6) => rspen(234), rspen(5) =>
rspen(233), rspen(4) => rspen(232), rspen(3) =>
rspen(231), rspen(2) => rspen(230), rspen(1) =>
rspen(229), rspen(0) => rspen(228), fircnten =>
fircnten );

U42411: tag19
  port map ( we => we, s_addr => a(11), rstaddr => rstaddr,
      mux2 => mux2, mux1 => mux1, mux0 => mux0, fir_in
      => f(11), carry_in => c(11), SetTag => setag, prsp
      => prsp, carry => c(12), fir => f(12), wl(18) =>
      wl(227), wl(17) => wl(226), wl(16) => wl(225),
      wl(15) => wl(224), wl(14) => wl(223), wl(13) =>
      wl(222), wl(12) => wl(221), wl(11) => wl(220),
      wl(10) => wl(219), wl(9) => wl(218), wl(8) =>
      wl(217), wl(7) => wl(216), wl(6) => wl(215), wl(5)
      => wl(214), wl(4) => wl(213), wl(3) => wl(212),
      wl(2) => wl(211), wl(1) => wl(210), wl(0) =>
      wl(209), ml(18) => ml(227), ml(17) => ml(226),
      ml(16) => ml(225), ml(15) => ml(224), ml(14) =>
      ml(223), ml(13) => ml(222), ml(12) => ml(221),
      ml(11) => ml(220), ml(10) => ml(219), ml(9) =>
```

```
ml(218), ml(8) => ml(217), ml(7) => ml(216), ml(6)
=> ml(215), ml(5) => ml(214), ml(4) => ml(213),
ml(3) => ml(212), ml(2) => ml(211), ml(1) =>
ml(210), ml(0) => ml(209), sado => a(12), fs(18)
=> fs(227), fs(17) => fs(226), fs(16) => fs(225),
fs(15) => fs(224), fs(14) => fs(223), fs(13) =>
fs(222), fs(12) => fs(221), fs(11) => fs(220),
fs(10) => fs(219), fs(9) => fs(218), fs(8) =>
fs(217), fs(7) => fs(216), fs(6) => fs(215), fs(5)
=> fs(214), fs(4) => fs(213), fs(3) => fs(212),
fs(2) => fs(211), fs(1) => fs(210), fs(0) =>
fs(209), ns(18) => ns(227), ns(17) => ns(226),
ns(16) => ns(225), ns(15) => ns(224), ns(14) =>
ns(223), ns(13) => ns(222), ns(12) => ns(221),
ns(11) => ns(220), ns(10) => ns(219), ns(9) =>
ns(218), ns(8) => ns(217), ns(7) => ns(216), ns(6)
=> ns(215), ns(5) => ns(214), ns(4) => ns(213),
ns(3) => ns(212), ns(2) => ns(211), ns(1) =>
ns(210), ns(0) => ns(209), tag(18) => tag(227),
tag(17) => tag(226), tag(16) => tag(225), tag(15)
=> tag(224), tag(14) => tag(223), tag(13) =>
tag(222), tag(12) => tag(221), tag(11) => tag(220),
tag(10) => tag(219), tag(9) => tag(218), tag(8) =>
tag(217), tag(7) => tag(216), tag(6) => tag(215),
tag(5) => tag(214), tag(4) => tag(213), tag(3) =>
tag(212), tag(2) => tag(211), tag(1) => tag(210),
tag(0) => tag(209), nn(18) => nn(227), nn(17) =>
nn(226), nn(16) => nn(225), nn(15) => nn(224),
nn(14) => nn(223), nn(13) => nn(222), nn(12) =>
nn(221), nn(11) => nn(220), nn(10) => nn(219),
nn(9) => nn(218), nn(8) => nn(217), nn(7) =>
nn(216), nn(6) => nn(215), nn(5) => nn(214), nn(4)
=> nn(213), nn(3) => nn(212), nn(2) => nn(211),
nn(1) => nn(210), nn(0) => nn(209), fn(18) =>
fn(227), fn(17) => fn(226), fn(16) => fn(225),
fn(15) => fn(224), fn(14) => fn(223), fn(13) =>
fn(222), fn(12) => fn(221), fn(11) => fn(220),
fn(10) => fn(219), fn(9) => fn(218), fn(8) =>
fn(217), fn(7) => fn(216), fn(6) => fn(215), fn(5)
=> fn(214), fn(4) => fn(213), fn(3) => fn(212),
fn(2) => fn(211), fn(1) => fn(210), fn(0) =>
fn(209), rspen(18) => rspen(227), rspen(17) =>
rspen(226), rspen(16) => rspen(225), rspen(15) =>
rspen(224), rspen(14) => rspen(223), rspen(13) =>
rspen(222), rspen(12) => rspen(221), rspen(11) =>
rspen(220), rspen(10) => rspen(219), rspen(9) =>
rspen(218), rspen(8) => rspen(217), rspen(7) =>
rspen(216), rspen(6) => rspen(215), rspen(5) =>
rspen(214), rspen(4) => rspen(213), rspen(3) =>
rspen(212), rspen(2) => rspen(211), rspen(1) =>
rspen(210), rspen(0) => rspen(209), fircnten =>
fircnten );

U42410: tag19
  port map ( we => we, s_addr => a(10), rstaddr => rstaddr,
      mux2 => mux2, mux1 => mux1, mux0 => mux0, fir_in
      => f(10), carry_in => c(10), SetTag => setag, prsp
      => prsp, carry => c(11), fir => f(11), wl(18) =>
```

wl(208), wl(17) => wl(207), wl(16) => wl(206), wl(15) => wl(205), wl(14) => wl(204), wl(13) => wl(203), wl(12) => wl(202), wl(11) => wl(201), wl(10) => wl(200), wl(9) => wl(199), wl(8) => wl(198), wl(7) => wl(197), wl(6) => wl(196), wl(5) => wl(195), wl(4) => wl(194), wl(3) => wl(193), wl(2) => wl(192), wl(1) => wl(191), wl(0) => wl(190), ml(18) => ml(208), ml(17) => ml(207), ml(16) => ml(206), ml(15) => ml(205), ml(14) => ml(204), ml(13) => ml(203), ml(12) => ml(202), ml(11) => ml(201), ml(10) => ml(200), ml(9) => ml(199), ml(8) => ml(198), ml(7) => ml(197), ml(6) => ml(196), ml(5) => ml(195), ml(4) => ml(194), ml(3) => ml(193), ml(2) => ml(192), ml(1) => ml(191), ml(0) => ml(190), sado => a(11), fs(18) => fs(208), fs(17) => fs(207), fs(16) => fs(206), fs(15) => fs(205), fs(14) => fs(204), fs(13) => fs(203), fs(12) => fs(202), fs(11) => fs(201), fs(10) => fs(200), fs(9) => fs(199), fs(8) => fs(198), fs(7) => fs(197), fs(6) => fs(196), fs(5) => fs(195), fs(4) => fs(194), fs(3) => fs(193), fs(2) => fs(192), fs(1) => fs(191), fs(0) => fs(190), ns(18) => ns(208), ns(17) => ns(207), ns(16) => ns(206), ns(15) => ns(205), ns(14) => ns(204), ns(13) => ns(203), ns(12) => ns(202), ns(11) => ns(201), ns(10) => ns(200), ns(9) => ns(199), ns(8) => ns(198), ns(7) => ns(197), ns(6) => ns(196), ns(5) => ns(195), ns(4) => ns(194), ns(3) => ns(193), ns(2) => ns(192), ns(1) => ns(191), ns(0) => ns(190), tag(18) => tag(208), tag(17) => tag(207), tag(16) => tag(206), tag(15) => tag(205), tag(14) => tag(204), tag(13) => tag(203), tag(12) => tag(202), tag(11) => tag(201), tag(10) => tag(200), tag(9) => tag(199), tag(8) => tag(198), tag(7) => tag(197), tag(6) => tag(196), tag(5) => tag(195), tag(4) => tag(194), tag(3) => tag(193), tag(2) => tag(192), tag(1) => tag(191), tag(0) => tag(190), nn(18) => nn(208), nn(17) => nn(207), nn(16) => nn(206), nn(15) => nn(205), nn(14) => nn(204), nn(13) => nn(203), nn(12) => nn(202), nn(11) => nn(201), nn(10) => nn(200), nn(9) => nn(199), nn(8) => nn(198), nn(7) => nn(197), nn(6) => nn(196), nn(5) => nn(195), nn(4) => nn(194), nn(3) => nn(193), nn(2) => nn(192), nn(1) => nn(191), nn(0) => nn(190), fn(18) => fn(208), fn(17) => fn(207), fn(16) => fn(206), fn(15) => fn(205), fn(14) => fn(204), fn(13) => fn(203), fn(12) => fn(202), fn(11) => fn(201), fn(10) => fn(200), fn(9) => fn(199), fn(8) => fn(198), fn(7) => fn(197), fn(6) => fn(196), fn(5) => fn(195), fn(4) => fn(194), fn(3) => fn(193), fn(2) => fn(192), fn(1) => fn(191), fn(0) => fn(190), rspen(18) => rspen(208), rspen(17) => rspen(207), rspen(16) => rspen(206), rspen(15) => rspen(205), rspen(14) => rspen(204), rspen(13) => rspen(203), rspen(12) => rspen(202), rspen(11) => rspen(201), rspen(10) => rspen(200), rspen(9) => rspen(199), rspen(8) => rspen(198), rspen(7) =>

```
        rspen(197), rspen(6) => rspen(196), rspen(5) =>
        rspen(195), rspen(4) => rspen(194), rspen(3) =>
        rspen(193), rspen(2) => rspen(192), rspen(1) =>
        rspen(191), rspen(0) => rspen(190), fircnten =>
        fircnten );

U4249: tag19
  port map ( we => we, s_addr => a(9), rstaddr => rstaddr, mux2
        => mux2, mux1 => mux1, mux0 => mux0, fir_in =>
        f(9), carry_in => c(9), SetTag => setag, prsp =>
        prsp, carry => c(10), fir => f(10), wl(18) =>
        wl(189), wl(17) => wl(188), wl(16) => wl(187),
        wl(15) => wl(186), wl(14) => wl(185), wl(13) =>
        wl(184), wl(12) => wl(183), wl(11) => wl(182),
        wl(10) => wl(181), wl(9) => wl(180), wl(8) =>
        wl(179), wl(7) => wl(178), wl(6) => wl(177), wl(5)
        => wl(176), wl(4) => wl(175), wl(3) => wl(174),
        wl(2) => wl(173), wl(1) => wl(172), wl(0) =>
        wl(171), ml(18) => ml(189), ml(17) => ml(188),
        ml(16) => ml(187), ml(15) => ml(186), ml(14) =>
        ml(185), ml(13) => ml(184), ml(12) => ml(183),
        ml(11) => ml(182), ml(10) => ml(181), ml(9) =>
        ml(180), ml(8) => ml(179), ml(7) => ml(178), ml(6)
        => ml(177), ml(5) => ml(176), ml(4) => ml(175),
        ml(3) => ml(174), ml(2) => ml(173), ml(1) =>
        ml(172), ml(0) => ml(171), sado => a(10), fs(18)
        => fs(189), fs(17) => fs(188), fs(16) => fs(187),
        fs(15) => fs(186), fs(14) => fs(185), fs(13) =>
        fs(184), fs(12) => fs(183), fs(11) => fs(182),
        fs(10) => fs(181), fs(9) => fs(180), fs(8) =>
        fs(179), fs(7) => fs(178), fs(6) => fs(177), fs(5)
        => fs(176), fs(4) => fs(175), fs(3) => fs(174),
        fs(2) => fs(173), fs(1) => fs(172), fs(0) =>
        fs(171), ns(18) => ns(189), ns(17) => ns(188),
        ns(16) => ns(187), ns(15) => ns(186), ns(14) =>
        ns(185), ns(13) => ns(184), ns(12) => ns(183),
        ns(11) => ns(182), ns(10) => ns(181), ns(9) =>
        ns(180), ns(8) => ns(179), ns(7) => ns(178), ns(6)
        => ns(177), ns(5) => ns(176), ns(4) => ns(175),
        ns(3) => ns(174), ns(2) => ns(173), ns(1) =>
        ns(172), ns(0) => ns(171), tag(18) => tag(189),
        tag(17) => tag(188), tag(16) => tag(187), tag(15)
        => tag(186), tag(14) => tag(185), tag(13) =>
        tag(184), tag(12) => tag(183), tag(11) => tag(182),
        tag(10) => tag(181), tag(9) => tag(180), tag(8) =>
        tag(179), tag(7) => tag(178), tag(6) => tag(177),
        tag(5) => tag(176), tag(4) => tag(175), tag(3) =>
        tag(174), tag(2) => tag(173), tag(1) => tag(172),
        tag(0) => tag(171), nn(18) => nn(189), nn(17) =>
        nn(188), nn(16) => nn(187), nn(15) => nn(186),
        nn(14) => nn(185), nn(13) => nn(184), nn(12) =>
        nn(183), nn(11) => nn(182), nn(10) => nn(181),
        nn(9) => nn(180), nn(8) => nn(179), nn(7) =>
        nn(178), nn(6) => nn(177), nn(5) => nn(176), nn(4)
        => nn(175), nn(3) => nn(174), nn(2) => nn(173),
        nn(1) => nn(172), nn(0) => nn(171), fn(18) =>
        fn(189), fn(17) => fn(188), fn(16) => fn(187),
        fn(15) => fn(186), fn(14) => fn(185), fn(13) =>
```

```
        fn(184), fn(12) => fn(183), fn(11) => fn(182),
        fn(10) => fn(181), fn(9) => fn(180), fn(8) =>
        fn(179), fn(7) => fn(178), fn(6) => fn(177), fn(5)
        => fn(176), fn(4) => fn(175), fn(3) => fn(174),
        fn(2) => fn(173), fn(1) => fn(172), fn(0) =>
        fn(171), rspen(18) => rspen(189), rspen(17) =>
        rspen(188), rspen(16) => rspen(187), rspen(15) =>
        rspen(186), rspen(14) => rspen(185), rspen(13) =>
        rspen(184), rspen(12) => rspen(183), rspen(11) =>
        rspen(182), rspen(10) => rspen(181), rspen(9) =>
        rspen(180), rspen(8) => rspen(179), rspen(7) =>
        rspen(178), rspen(6) => rspen(177), rspen(5) =>
        rspen(176), rspen(4) => rspen(175), rspen(3) =>
        rspen(174), rspen(2) => rspen(173), rspen(1) =>
        rspen(172), rspen(0) => rspen(171), fircnten =>
        fircnten );

U4248: tag19
  port map ( we => we, s_addr => a(8), rstaddr => rstaddr, mux2
        => mux2, mux1 => mux1, mux0 => mux0, fir_in =>
        f(8), carry_in => c(8), SetTag => setag, prsp =>
        prsp, carry => c(9), fir => f(9), wl(18) =>
        wl(170), wl(17) => wl(169), wl(16) => wl(168),
        wl(15) => wl(167), wl(14) => wl(166), wl(13) =>
        wl(165), wl(12) => wl(164), wl(11) => wl(163),
        wl(10) => wl(162), wl(9) => wl(161), wl(8) =>
        wl(160), wl(7) => wl(159), wl(6) => wl(158), wl(5)
        => wl(157), wl(4) => wl(156), wl(3) => wl(155),
        wl(2) => wl(154), wl(1) => wl(153), wl(0) =>
        wl(152), ml(18) => ml(170), ml(17) => ml(169),
        ml(16) => ml(168), ml(15) => ml(167), ml(14) =>
        ml(166), ml(13) => ml(165), ml(12) => ml(164),
        ml(11) => ml(163), ml(10) => ml(162), ml(9) =>
        ml(161), ml(8) => ml(160), ml(7) => ml(159), ml(6)
        => ml(158), ml(5) => ml(157), ml(4) => ml(156),
        ml(3) => ml(155), ml(2) => ml(154), ml(1) =>
        ml(153), ml(0) => ml(152), sado => a(9), fs(18) =>
        fs(170), fs(17) => fs(169), fs(16) => fs(168),
        fs(15) => fs(167), fs(14) => fs(166), fs(13) =>
        fs(165), fs(12) => fs(164), fs(11) => fs(163),
        fs(10) => fs(162), fs(9) => fs(161), fs(8) =>
        fs(160), fs(7) => fs(159), fs(6) => fs(158), fs(5)
        => fs(157), fs(4) => fs(156), fs(3) => fs(155),
        fs(2) => fs(154), fs(1) => fs(153), fs(0) =>
        fs(152), ns(18) => ns(170), ns(17) => ns(169),
        ns(16) => ns(168), ns(15) => ns(167), ns(14) =>
        ns(166), ns(13) => ns(165), ns(12) => ns(164),
        ns(11) => ns(163), ns(10) => ns(162), ns(9) =>
        ns(161), ns(8) => ns(160), ns(7) => ns(159), ns(6)
        => ns(158), ns(5) => ns(157), ns(4) => ns(156),
        ns(3) => ns(155), ns(2) => ns(154), ns(1) =>
        ns(153), ns(0) => ns(152), tag(18) => tag(170),
        tag(17) => tag(169), tag(16) => tag(168), tag(15)
        => tag(167), tag(14) => tag(166), tag(13) =>
        tag(165), tag(12) => tag(164), tag(11) => tag(163),
        tag(10) => tag(162), tag(9) => tag(161), tag(8) =>
        tag(160), tag(7) => tag(159), tag(6) => tag(158),
        tag(5) => tag(157), tag(4) => tag(156), tag(3) =>
```

```
tag(155), tag(2) => tag(154), tag(1) => tag(153),
tag(0) => tag(152), nn(18) => nn(170), nn(17) =>
nn(169), nn(16) => nn(168), nn(15) => nn(167),
nn(14) => nn(166), nn(13) => nn(165), nn(12) =>
nn(164), nn(11) => nn(163), nn(10) => nn(162),
nn(9) => nn(161), nn(8) => nn(160), nn(7) =>
nn(159), nn(6) => nn(158), nn(5) => nn(157), nn(4)
=> nn(156), nn(3) => nn(155), nn(2) => nn(154),
nn(1) => nn(153), nn(0) => nn(152), fn(18) =>
fn(170), fn(17) => fn(169), fn(16) => fn(168),
fn(15) => fn(167), fn(14) => fn(166), fn(13) =>
fn(165), fn(12) => fn(164), fn(11) => fn(163),
fn(10) => fn(162), fn(9) => fn(161), fn(8) =>
fn(160), fn(7) => fn(159), fn(6) => fn(158), fn(5)
=> fn(157), fn(4) => fn(156), fn(3) => fn(155),
fn(2) => fn(154), fn(1) => fn(153), fn(0) =>
fn(152), rspen(18) => rspen(170), rspen(17) =>
rspen(169), rspen(16) => rspen(168), rspen(15) =>
rspen(167), rspen(14) => rspen(166), rspen(13) =>
rspen(165), rspen(12) => rspen(164), rspen(11) =>
rspen(163), rspen(10) => rspen(162), rspen(9) =>
rspen(161), rspen(8) => rspen(160), rspen(7) =>
rspen(159), rspen(6) => rspen(158), rspen(5) =>
rspen(157), rspen(4) => rspen(156), rspen(3) =>
rspen(155), rspen(2) => rspen(154), rspen(1) =>
rspen(153), rspen(0) => rspen(152), fircnten =>
fircnten );

U4247: tag19
port map ( we => we, s_addr => a(7), rstaddr => rstaddr, mux2
=> mux2, mux1 => mux1, mux0 => mux0, fir_in =>
f(7), carry_in => c(7), SetTag => setag, prsp =>
prsp, carry => c(8), fir => f(8), wl(18) =>
wl(151), wl(17) => wl(150), wl(16) => wl(149),
wl(15) => wl(148), wl(14) => wl(147), wl(13) =>
wl(146), wl(12) => wl(145), wl(11) => wl(144),
wl(10) => wl(143), wl(9) => wl(142), wl(8) =>
wl(141), wl(7) => wl(140), wl(6) => wl(139), wl(5)
=> wl(138), wl(4) => wl(137), wl(3) => wl(136),
wl(2) => wl(135), wl(1) => wl(134), wl(0) =>
wl(133), ml(18) => ml(151), ml(17) => ml(150),
ml(16) => ml(149), ml(15) => ml(148), ml(14) =>
ml(147), ml(13) => ml(146), ml(12) => ml(145),
ml(11) => ml(144), ml(10) => ml(143), ml(9) =>
ml(142), ml(8) => ml(141), ml(7) => ml(140), ml(6)
=> ml(139), ml(5) => ml(138), ml(4) => ml(137),
ml(3) => ml(136), ml(2) => ml(135), ml(1) =>
ml(134), ml(0) => ml(133), sado => a(8), fs(18) =>
fs(151), fs(17) => fs(150), fs(16) => fs(149),
fs(15) => fs(148), fs(14) => fs(147), fs(13) =>
fs(146), fs(12) => fs(145), fs(11) => fs(144),
fs(10) => fs(143), fs(9) => fs(142), fs(8) =>
fs(141), fs(7) => fs(140), fs(6) => fs(139), fs(5)
=> fs(138), fs(4) => fs(137), fs(3) => fs(136),
fs(2) => fs(135), fs(1) => fs(134), fs(0) =>
fs(133), ns(18) => ns(151), ns(17) => ns(150),
ns(16) => ns(149), ns(15) => ns(148), ns(14) =>
ns(147), ns(13) => ns(146), ns(12) => ns(145),
```

```
        ns(11) => ns(144), ns(10) => ns(143), ns(9) =>
        ns(142), ns(8) => ns(141), ns(7) => ns(140), ns(6)
        => ns(139), ns(5) => ns(138), ns(4) => ns(137),
        ns(3) => ns(136), ns(2) => ns(135), ns(1) =>
        ns(134), ns(0) => ns(133), tag(18) => tag(151),
        tag(17) => tag(150), tag(16) => tag(149), tag(15)
        => tag(148), tag(14) => tag(147), tag(13) =>
        tag(146), tag(12) => tag(145), tag(11) => tag(144),
        tag(10) => tag(143), tag(9) => tag(142), tag(8) =>
        tag(141), tag(7) => tag(140), tag(6) => tag(139),
        tag(5) => tag(138), tag(4) => tag(137), tag(3) =>
        tag(136), tag(2) => tag(135), tag(1) => tag(134),
        tag(0) => tag(133), nn(18) => nn(151), nn(17) =>
        nn(150), nn(16) => nn(149), nn(15) => nn(148),
        nn(14) => nn(147), nn(13) => nn(146), nn(12) =>
        nn(145), nn(11) => nn(144), nn(10) => nn(143),
        nn(9) => nn(142), nn(8) => nn(141), nn(7) =>
        nn(140), nn(6) => nn(139), nn(5) => nn(138), nn(4)
        => nn(137), nn(3) => nn(136), nn(2) => nn(135),
        nn(1) => nn(134), nn(0) => nn(133), fn(18) =>
        fn(151), fn(17) => fn(150), fn(16) => fn(149),
        fn(15) => fn(148), fn(14) => fn(147), fn(13) =>
        fn(146), fn(12) => fn(145), fn(11) => fn(144),
        fn(10) => fn(143), fn(9) => fn(142), fn(8) =>
        fn(141), fn(7) => fn(140), fn(6) => fn(139), fn(5)
        => fn(138), fn(4) => fn(137), fn(3) => fn(136),
        fn(2) => fn(135), fn(1) => fn(134), fn(0) =>
        fn(133), rspen(18) => rspen(151), rspen(17) =>
        rspen(150), rspen(16) => rspen(149), rspen(15) =>
        rspen(148), rspen(14) => rspen(147), rspen(13) =>
        rspen(146), rspen(12) => rspen(145), rspen(11) =>
        rspen(144), rspen(10) => rspen(143), rspen(9) =>
        rspen(142), rspen(8) => rspen(141), rspen(7) =>
        rspen(140), rspen(6) => rspen(139), rspen(5) =>
        rspen(138), rspen(4) => rspen(137), rspen(3) =>
        rspen(136), rspen(2) => rspen(135), rspen(1) =>
        rspen(134), rspen(0) => rspen(133), fircnten =>
        fircnten );

U4246: tag19
   port map ( we => we, s_addr => a(6), rstaddr => rstaddr, mux2
        => mux2, mux1 => mux1, mux0 => mux0, fir_in =>
        f(6), carry_in => c(6), SetTag => setag, prsp =>
        prsp, carry => c(7), fir => f(7), wl(18) =>
        wl(132), wl(17) => wl(131), wl(16) => wl(130),
        wl(15) => wl(129), wl(14) => wl(128), wl(13) =>
        wl(127), wl(12) => wl(126), wl(11) => wl(125),
        wl(10) => wl(124), wl(9) => wl(123), wl(8) =>
        wl(122), wl(7) => wl(121), wl(6) => wl(120), wl(5)
        => wl(119), wl(4) => wl(118), wl(3) => wl(117),
        wl(2) => wl(116), wl(1) => wl(115), wl(0) =>
        wl(114), ml(18) => ml(132), ml(17) => ml(131),
        ml(16) => ml(130), ml(15) => ml(129), ml(14) =>
        ml(128), ml(13) => ml(127), ml(12) => ml(126),
        ml(11) => ml(125), ml(10) => ml(124), ml(9) =>
        ml(123), ml(8) => ml(122), ml(7) => ml(121), ml(6)
        => ml(120), ml(5) => ml(119), ml(4) => ml(118),
        ml(3) => ml(117), ml(2) => ml(116), ml(1) =>
```

```
        ml(115), ml(0) => ml(114), sado => a(7), fs(18) =>
        fs(132), fs(17) => fs(131), fs(16) => fs(130),
        fs(15) => fs(129), fs(14) => fs(128), fs(13) =>
        fs(127), fs(12) => fs(126), fs(11) => fs(125),
        fs(10) => fs(124), fs(9) => fs(123), fs(8) =>
        fs(122), fs(7) => fs(121), fs(6) => fs(120), fs(5)
        => fs(119), fs(4) => fs(118), fs(3) => fs(117),
        fs(2) => fs(116), fs(1) => fs(115), fs(0) =>
        fs(114), ns(18) => ns(132), ns(17) => ns(131),
        ns(16) => ns(130), ns(15) => ns(129), ns(14) =>
        ns(128), ns(13) => ns(127), ns(12) => ns(126),
        ns(11) => ns(125), ns(10) => ns(124), ns(9) =>
        ns(123), ns(8) => ns(122), ns(7) => ns(121), ns(6)
        => ns(120), ns(5) => ns(119), ns(4) => ns(118),
        ns(3) => ns(117), ns(2) => ns(116), ns(1) =>
        ns(115), ns(0) => ns(114), tag(18) => tag(132),
        tag(17) => tag(131), tag(16) => tag(130), tag(15)
        => tag(129), tag(14) => tag(128), tag(13) =>
        tag(127), tag(12) => tag(126), tag(11) => tag(125),
        tag(10) => tag(124), tag(9) => tag(123), tag(8) =>
        tag(122), tag(7) => tag(121), tag(6) => tag(120),
        tag(5) => tag(119), tag(4) => tag(118), tag(3) =>
        tag(117), tag(2) => tag(116), tag(1) => tag(115),
        tag(0) => tag(114), nn(18) => nn(132), nn(17) =>
        nn(131), nn(16) => nn(130), nn(15) => nn(129),
        nn(14) => nn(128), nn(13) => nn(127), nn(12) =>
        nn(126), nn(11) => nn(125), nn(10) => nn(124),
        nn(9) => nn(123), nn(8) => nn(122), nn(7) =>
        nn(121), nn(6) => nn(120), nn(5) => nn(119), nn(4)
        => nn(118), nn(3) => nn(117), nn(2) => nn(116),
        nn(1) => nn(115), nn(0) => nn(114), fn(18) =>
        fn(132), fn(17) => fn(131), fn(16) => fn(130),
        fn(15) => fn(129), fn(14) => fn(128), fn(13) =>
        fn(127), fn(12) => fn(126), fn(11) => fn(125),
        fn(10) => fn(124), fn(9) => fn(123), fn(8) =>
        fn(122), fn(7) => fn(121), fn(6) => fn(120), fn(5)
        => fn(119), fn(4) => fn(118), fn(3) => fn(117),
        fn(2) => fn(116), fn(1) => fn(115), fn(0) =>
        fn(114), rspen(18) => rspen(132), rspen(17) =>
        rspen(131), rspen(16) => rspen(130), rspen(15) =>
        rspen(129), rspen(14) => rspen(128), rspen(13) =>
        rspen(127), rspen(12) => rspen(126), rspen(11) =>
        rspen(125), rspen(10) => rspen(124), rspen(9) =>
        rspen(123), rspen(8) => rspen(122), rspen(7) =>
        rspen(121), rspen(6) => rspen(120), rspen(5) =>
        rspen(119), rspen(4) => rspen(118), rspen(3) =>
        rspen(117), rspen(2) => rspen(116), rspen(1) =>
        rspen(115), rspen(0) => rspen(114), fircnten =>
        fircnten );

U4245: tag19
   port map ( we => we, s_addr => a(5), rstaddr => rstaddr, mux2
        => mux2, mux1 => mux1, mux0 => mux0, fir_in =>
        f(5), carry_in => c(5), SetTag => setag, prsp =>
        prsp, carry => c(6), fir => f(6), wl(18) =>
        wl(113), wl(17) => wl(112), wl(16) => wl(111),
        wl(15) => wl(110), wl(14) => wl(109), wl(13) =>
        wl(108), wl(12) => wl(107), wl(11) => wl(106),
```

wl(10) => wl(105), wl(9) => wl(104), wl(8) => wl(103), wl(7) => wl(102), wl(6) => wl(101), wl(5) => wl(100), wl(4) => wl(99), wl(3) => wl(98), wl(2) => wl(97), wl(1) => wl(96), wl(0) => wl(95), ml(18) => ml(113), ml(17) => ml(112), ml(16) => ml(111), ml(15) => ml(110), ml(14) => ml(109), ml(13) => ml(108), ml(12) => ml(107), ml(11) => ml(106), ml(10) => ml(105), ml(9) => ml(104), ml(8) => ml(103), ml(7) => ml(102), ml(6) => ml(101), ml(5) => ml(100), ml(4) => ml(99), ml(3) => ml(98), ml(2) => ml(97), ml(1) => ml(96), ml(0) => ml(95), sado => a(6), fs(18) => fs(113), fs(17) => fs(112), fs(16) => fs(111), fs(15) => fs(110), fs(14) => fs(109), fs(13) => fs(108), fs(12) => fs(107), fs(11) => fs(106), fs(10) => fs(105), fs(9) => fs(104), fs(8) => fs(103), fs(7) => fs(102), fs(6) => fs(101), fs(5) => fs(100), fs(4) => fs(99), fs(3) => fs(98), fs(2) => fs(97), fs(1) => fs(96), fs(0) => fs(95), ns(18) => ns(113), ns(17) => ns(112), ns(16) => ns(111), ns(15) => ns(110), ns(14) => ns(109), ns(13) => ns(108), ns(12) => ns(107), ns(11) => ns(106), ns(10) => ns(105), ns(9) => ns(104), ns(8) => ns(103), ns(7) => ns(102), ns(6) => ns(101), ns(5) => ns(100), ns(4) => ns(99), ns(3) => ns(98), ns(2) => ns(97), ns(1) => ns(96), ns(0) => ns(95), tag(18) => tag(113), tag(17) => tag(112), tag(16) => tag(111), tag(15) => tag(110), tag(14) => tag(109), tag(13) => tag(108), tag(12) => tag(107), tag(11) => tag(106), tag(10) => tag(105), tag(9) => tag(104), tag(8) => tag(103), tag(7) => tag(102), tag(6) => tag(101), tag(5) => tag(100), tag(4) => tag(99), tag(3) => tag(98), tag(2) => tag(97), tag(1) => tag(96), tag(0) => tag(95), nn(18) => nn(113), nn(17) => nn(112), nn(16) => nn(111), nn(15) => nn(110), nn(14) => nn(109), nn(13) => nn(108), nn(12) => nn(107), nn(11) => nn(106), nn(10) => nn(105), nn(9) => nn(104), nn(8) => nn(103), nn(7) => nn(102), nn(6) => nn(101), nn(5) => nn(100), nn(4) => nn(99), nn(3) => nn(98), nn(2) => nn(97), nn(1) => nn(96), nn(0) => nn(95), fn(18) => fn(113), fn(17) => fn(112), fn(16) => fn(111), fn(15) => fn(110), fn(14) => fn(109), fn(13) => fn(108), fn(12) => fn(107), fn(11) => fn(106), fn(10) => fn(105), fn(9) => fn(104), fn(8) => fn(103), fn(7) => fn(102), fn(6) => fn(101), fn(5) => fn(100), fn(4) => fn(99), fn(3) => fn(98), fn(2) => fn(97), fn(1) => fn(96), fn(0) => fn(95), rspen(18) => rspen(113), rspen(17) => rspen(112), rspen(16) => rspen(111), rspen(15) => rspen(110), rspen(14) => rspen(109), rspen(13) => rspen(108), rspen(12) => rspen(107), rspen(11) => rspen(106), rspen(10) => rspen(105), rspen(9) => rspen(104), rspen(8) => rspen(103), rspen(7) => rspen(102), rspen(6) => rspen(101), rspen(5) => rspen(100), rspen(4) => rspen(99), rspen(3) => rspen(98), rspen(2) => rspen(97), rspen(1) => rspen(96), rspen(0) => rspen(95), fircnten => fircnten );

```
U4244: tag19
  port map ( we => we, s_addr => a(4), rstaddr => rstaddr, mux2
        => mux2, mux1 => mux1, mux0 => mux0, fir_in =>
        f(4), carry_in => c(4), SetTag => setag, prsp =>
        prsp, carry => c(5), fir => f(5), wl(18) => wl(94),
        wl(17) => wl(93), wl(16) => wl(92), wl(15) =>
        wl(91), wl(14) => wl(90), wl(13) => wl(89), wl(12)
        => wl(88), wl(11) => wl(87), wl(10) => wl(86),
        wl(9) => wl(85), wl(8) => wl(84), wl(7) => wl(83),
        wl(6) => wl(82), wl(5) => wl(81), wl(4) => wl(80),
        wl(3) => wl(79), wl(2) => wl(78), wl(1) => wl(77),
        wl(0) => wl(76), ml(18) => ml(94), ml(17) =>
        ml(93), ml(16) => ml(92), ml(15) => ml(91), ml(14)
        => ml(90), ml(13) => ml(89), ml(12) => ml(88),
        ml(11) => ml(87), ml(10) => ml(86), ml(9) =>
        ml(85), ml(8) => ml(84), ml(7) => ml(83), ml(6) =>
        ml(82), ml(5) => ml(81), ml(4) => ml(80), ml(3) =>
        ml(79), ml(2) => ml(78), ml(1) => ml(77), ml(0) =>
        ml(76), sado => a(5), fs(18) => fs(94), fs(17) =>
        fs(93), fs(16) => fs(92), fs(15) => fs(91), fs(14)
        => fs(90), fs(13) => fs(89), fs(12) => fs(88),
        fs(11) => fs(87), fs(10) => fs(86), fs(9) =>
        fs(85), fs(8) => fs(84), fs(7) => fs(83), fs(6) =>
        fs(82), fs(5) => fs(81), fs(4) => fs(80), fs(3) =>
        fs(79), fs(2) => fs(78), fs(1) => fs(77), fs(0) =>
        fs(76), ns(18) => ns(94), ns(17) => ns(93), ns(16)
        => ns(92), ns(15) => ns(91), ns(14) => ns(90),
        ns(13) => ns(89), ns(12) => ns(88), ns(11) =>
        ns(87), ns(10) => ns(86), ns(9) => ns(85), ns(8)
        => ns(84), ns(7) => ns(83), ns(6) => ns(82), ns(5)
        => ns(81), ns(4) => ns(80), ns(3) => ns(79), ns(2)
        => ns(78), ns(1) => ns(77), ns(0) => ns(76),
        tag(18) => tag(94), tag(17) => tag(93), tag(16) =>
        tag(92), tag(15) => tag(91), tag(14) => tag(90),
        tag(13) => tag(89), tag(12) => tag(88), tag(11) =>
        tag(87), tag(10) => tag(86), tag(9) => tag(85),
        tag(8) => tag(84), tag(7) => tag(83), tag(6) =>
        tag(82), tag(5) => tag(81), tag(4) => tag(80),
        tag(3) => tag(79), tag(2) => tag(78), tag(1) =>
        tag(77), tag(0) => tag(76), nn(18) => nn(94),
        nn(17) => nn(93), nn(16) => nn(92), nn(15) =>
        nn(91), nn(14) => nn(90), nn(13) => nn(89), nn(12)
        => nn(88), nn(11) => nn(87), nn(10) => nn(86),
        nn(9) => nn(85), nn(8) => nn(84), nn(7) => nn(83),
        nn(6) => nn(82), nn(5) => nn(81), nn(4) => nn(80),
        nn(3) => nn(79), nn(2) => nn(78), nn(1) => nn(77),
        nn(0) => nn(76), fn(18) => fn(94), fn(17) =>
        fn(93), fn(16) => fn(92), fn(15) => fn(91), fn(14)
        => fn(90), fn(13) => fn(89), fn(12) => fn(88),
        fn(11) => fn(87), fn(10) => fn(86), fn(9) =>
        fn(85), fn(8) => fn(84), fn(7) => fn(83), fn(6) =>
        fn(82), fn(5) => fn(81), fn(4) => fn(80), fn(3) =>
        fn(79), fn(2) => fn(78), fn(1) => fn(77), fn(0) =>
        fn(76), rspen(18) => rspen(94), rspen(17) =>
        rspen(93), rspen(16) => rspen(92), rspen(15) =>
        rspen(91), rspen(14) => rspen(90), rspen(13) =>
        rspen(89), rspen(12) => rspen(88), rspen(11) =>
```

```
        rspen(87), rspen(10) => rspen(86), rspen(9) =>
        rspen(85), rspen(8) => rspen(84), rspen(7) =>
        rspen(83), rspen(6) => rspen(82), rspen(5) =>
        rspen(81), rspen(4) => rspen(80), rspen(3) =>
        rspen(79), rspen(2) => rspen(78), rspen(1) =>
        rspen(77), rspen(0) => rspen(76), fircnten =>
        fircnten );

U4243: tag19
  port map ( we => we, s_addr => a(3), rstaddr => rstaddr, mux2
        => mux2, mux1 => mux1, mux0 => mux0, fir_in =>
        f(3), carry_in => c(3), SetTag => setag, prsp =>
        prsp, carry => c(4), fir => f(4), wl(18) => wl(75),
        wl(17) => wl(74), wl(16) => wl(73), wl(15) =>
        wl(72), wl(14) => wl(71), wl(13) => wl(70), wl(12)
        => wl(69), wl(11) => wl(68), wl(10) => wl(67),
        wl(9) => wl(66), wl(8) => wl(65), wl(7) => wl(64),
        wl(6) => wl(63), wl(5) => wl(62), wl(4) => wl(61),
        wl(3) => wl(60), wl(2) => wl(59), wl(1) => wl(58),
        wl(0) => wl(57), ml(18) => ml(75), ml(17) =>
        ml(74), ml(16) => ml(73), ml(15) => ml(72), ml(14)
        => ml(71), ml(13) => ml(70), ml(12) => ml(69),
        ml(11) => ml(68), ml(10) => ml(67), ml(9) =>
        ml(66), ml(8) => ml(65), ml(7) => ml(64), ml(6) =>
        ml(63), ml(5) => ml(62), ml(4) => ml(61), ml(3) =>
        ml(60), ml(2) => ml(59), ml(1) => ml(58), ml(0) =>
        ml(57), sado => a(4), fs(18) => fs(75), fs(17) =>
        fs(74), fs(16) => fs(73), fs(15) => fs(72), fs(14)
        => fs(71), fs(13) => fs(70), fs(12) => fs(69),
        fs(11) => fs(68), fs(10) => fs(67), fs(9) =>
        fs(66), fs(8) => fs(65), fs(7) => fs(64), fs(6) =>
        fs(63), fs(5) => fs(62), fs(4) => fs(61), fs(3) =>
        fs(60), fs(2) => fs(59), fs(1) => fs(58), fs(0) =>
        fs(57), ns(18) => ns(75), ns(17) => ns(74), ns(16)
        => ns(73), ns(15) => ns(72), ns(14) => ns(71),
        ns(13) => ns(70), ns(12) => ns(69), ns(11) =>
        ns(68), ns(10) => ns(67), ns(9) => ns(66), ns(8)
        => ns(65), ns(7) => ns(64), ns(6) => ns(63), ns(5)
        => ns(62), ns(4) => ns(61), ns(3) => ns(60), ns(2)
        => ns(59), ns(1) => ns(58), ns(0) => ns(57),
        tag(18) => tag(75), tag(17) => tag(74), tag(16) =>
        tag(73), tag(15) => tag(72), tag(14) => tag(71),
        tag(13) => tag(70), tag(12) => tag(69), tag(11) =>
        tag(68), tag(10) => tag(67), tag(9) => tag(66),
        tag(8) => tag(65), tag(7) => tag(64), tag(6) =>
        tag(63), tag(5) => tag(62), tag(4) => tag(61),
        tag(3) => tag(60), tag(2) => tag(59), tag(1) =>
        tag(58), tag(0) => tag(57), nn(18) => nn(75),
        nn(17) => nn(74), nn(16) => nn(73), nn(15) =>
        nn(72), nn(14) => nn(71), nn(13) => nn(70), nn(12)
        => nn(69), nn(11) => nn(68), nn(10) => nn(67),
        nn(9) => nn(66), nn(8) => nn(65), nn(7) => nn(64),
        nn(6) => nn(63), nn(5) => nn(62), nn(4) => nn(61),
        nn(3) => nn(60), nn(2) => nn(59), nn(1) => nn(58),
        nn(0) => nn(57), fn(18) => fn(75), fn(17) =>
        fn(74), fn(16) => fn(73), fn(15) => fn(72), fn(14)
        => fn(71), fn(13) => fn(70), fn(12) => fn(69),
        fn(11) => fn(68), fn(10) => fn(67), fn(9) =>
```

```
        fn(66), fn(8) => fn(65), fn(7) => fn(64), fn(6) =>
        fn(63), fn(5) => fn(62), fn(4) => fn(61), fn(3) =>
        fn(60), fn(2) => fn(59), fn(1) => fn(58), fn(0) =>
        fn(57), rspen(18) => rspen(75), rspen(17) =>
        rspen(74), rspen(16) => rspen(73), rspen(15) =>
        rspen(72), rspen(14) => rspen(71), rspen(13) =>
        rspen(70), rspen(12) => rspen(69), rspen(11) =>
        rspen(68), rspen(10) => rspen(67), rspen(9) =>
        rspen(66), rspen(8) => rspen(65), rspen(7) =>
        rspen(64), rspen(6) => rspen(63), rspen(5) =>
        rspen(62), rspen(4) => rspen(61), rspen(3) =>
        rspen(60), rspen(2) => rspen(59), rspen(1) =>
        rspen(58), rspen(0) => rspen(57), fircnten =>
        fircnten );

U4242: tag19
   port map ( we => we, s_addr => a(2), rstaddr => rstaddr, mux2
        => mux2, mux1 => mux1, mux0 => mux0, fir_in =>
        f(2), carry_in => c(2), SetTag => setag, prsp =>
        prsp, carry => c(3), fir => f(3), wl(18) => wl(56),
        wl(17) => wl(55), wl(16) => wl(54), wl(15) =>
        wl(53), wl(14) => wl(52), wl(13) => wl(51), wl(12)
        => wl(50), wl(11) => wl(49), wl(10) => wl(48),
        wl(9) => wl(47), wl(8) => wl(46), wl(7) => wl(45),
        wl(6) => wl(44), wl(5) => wl(43), wl(4) => wl(42),
        wl(3) => wl(41), wl(2) => wl(40), wl(1) => wl(39),
        wl(0) => wl(38), ml(18) => ml(56), ml(17) =>
        ml(55), ml(16) => ml(54), ml(15) => ml(53), ml(14)
        => ml(52), ml(13) => ml(51), ml(12) => ml(50),
        ml(11) => ml(49), ml(10) => ml(48), ml(9) =>
        ml(47), ml(8) => ml(46), ml(7) => ml(45), ml(6) =>
        ml(44), ml(5) => ml(43), ml(4) => ml(42), ml(3) =>
        ml(41), ml(2) => ml(40), ml(1) => ml(39), ml(0) =>
        ml(38), sado => a(3), fs(18) => fs(56), fs(17) =>
        fs(55), fs(16) => fs(54), fs(15) => fs(53), fs(14)
        => fs(52), fs(13) => fs(51), fs(12) => fs(50),
        fs(11) => fs(49), fs(10) => fs(48), fs(9) =>
        fs(47), fs(8) => fs(46), fs(7) => fs(45), fs(6) =>
        fs(44), fs(5) => fs(43), fs(4) => fs(42), fs(3) =>
        fs(41), fs(2) => fs(40), fs(1) => fs(39), fs(0) =>
        fs(38), ns(18) => ns(56), ns(17) => ns(55), ns(16)
        => ns(54), ns(15) => ns(53), ns(14) => ns(52),
        ns(13) => ns(51), ns(12) => ns(50), ns(11) =>
        ns(49), ns(10) => ns(48), ns(9) => ns(47), ns(8)
        => ns(46), ns(7) => ns(45), ns(6) => ns(44), ns(5)
        => ns(43), ns(4) => ns(42), ns(3) => ns(41), ns(2)
        => ns(40), ns(1) => ns(39), ns(0) => ns(38),
        tag(18) => tag(56), tag(17) => tag(55), tag(16) =>
        tag(54), tag(15) => tag(53), tag(14) => tag(52),
        tag(13) => tag(51), tag(12) => tag(50), tag(11) =>
        tag(49), tag(10) => tag(48), tag(9) => tag(47),
        tag(8) => tag(46), tag(7) => tag(45), tag(6) =>
        tag(44), tag(5) => tag(43), tag(4) => tag(42),
        tag(3) => tag(41), tag(2) => tag(40), tag(1) =>
        tag(39), tag(0) => tag(38), nn(18) => nn(56),
        nn(17) => nn(55), nn(16) => nn(54), nn(15) =>
        nn(53), nn(14) => nn(52), nn(13) => nn(51), nn(12)
        => nn(50), nn(11) => nn(49), nn(10) => nn(48),
```

```
nn(9) => nn(47), nn(8) => nn(46), nn(7) => nn(45),
nn(6) => nn(44), nn(5) => nn(43), nn(4) => nn(42),
nn(3) => nn(41), nn(2) => nn(40), nn(1) => nn(39),
nn(0) => nn(38), fn(18) => fn(56), fn(17) =>
fn(55), fn(16) => fn(54), fn(15) => fn(53), fn(14)
=> fn(52), fn(13) => fn(51), fn(12) => fn(50),
fn(11) => fn(49), fn(10) => fn(48), fn(9) =>
fn(47), fn(8) => fn(46), fn(7) => fn(45), fn(6) =>
fn(44), fn(5) => fn(43), fn(4) => fn(42), fn(3) =>
fn(41), fn(2) => fn(40), fn(1) => fn(39), fn(0) =>
fn(38), rspen(18) => rspen(56), rspen(17) =>
rspen(55), rspen(16) => rspen(54), rspen(15) =>
rspen(53), rspen(14) => rspen(52), rspen(13) =>
rspen(51), rspen(12) => rspen(50), rspen(11) =>
rspen(49), rspen(10) => rspen(48), rspen(9) =>
rspen(47), rspen(8) => rspen(46), rspen(7) =>
rspen(45), rspen(6) => rspen(44), rspen(5) =>
rspen(43), rspen(4) => rspen(42), rspen(3) =>
rspen(41), rspen(2) => rspen(40), rspen(1) =>
rspen(39), rspen(0) => rspen(38), fircnten =>
fircnten );

U4241: tag19
  port map ( we => we, s_addr => a(1), rstaddr => rstaddr, mux2
      => mux2, mux1 => mux1, mux0 => mux0, fir_in =>
      f(1), carry_in => c(1), SetTag => setag, prsp =>
      prsp, carry => c(2), fir => f(2), wl(18) => wl(37),
      wl(17) => wl(36), wl(16) => wl(35), wl(15) =>
      wl(34), wl(14) => wl(33), wl(13) => wl(32), wl(12)
      => wl(31), wl(11) => wl(30), wl(10) => wl(29),
      wl(9) => wl(28), wl(8) => wl(27), wl(7) => wl(26),
      wl(6) => wl(25), wl(5) => wl(24), wl(4) => wl(23),
      wl(3) => wl(22), wl(2) => wl(21), wl(1) => wl(20),
      wl(0) => wl(19), ml(18) => ml(37), ml(17) =>
      ml(36), ml(16) => ml(35), ml(15) => ml(34), ml(14)
      => ml(33), ml(13) => ml(32), ml(12) => ml(31),
      ml(11) => ml(30), ml(10) => ml(29), ml(9) =>
      ml(28), ml(8) => ml(27), ml(7) => ml(26), ml(6) =>
      ml(25), ml(5) => ml(24), ml(4) => ml(23), ml(3) =>
      ml(22), ml(2) => ml(21), ml(1) => ml(20), ml(0) =>
      ml(19), sado => a(2), fs(18) => fs(37), fs(17) =>
      fs(36), fs(16) => fs(35), fs(15) => fs(34), fs(14)
      => fs(33), fs(13) => fs(32), fs(12) => fs(31),
      fs(11) => fs(30), fs(10) => fs(29), fs(9) =>
      fs(28), fs(8) => fs(27), fs(7) => fs(26), fs(6) =>
      fs(25), fs(5) => fs(24), fs(4) => fs(23), fs(3) =>
      fs(22), fs(2) => fs(21), fs(1) => fs(20), fs(0) =>
      fs(19), ns(18) => ns(37), ns(17) => ns(36), ns(16)
      => ns(35), ns(15) => ns(34), ns(14) => ns(33),
      ns(13) => ns(32), ns(12) => ns(31), ns(11) =>
      ns(30), ns(10) => ns(29), ns(9) => ns(28), ns(8)
      => ns(27), ns(7) => ns(26), ns(6) => ns(25), ns(5)
      => ns(24), ns(4) => ns(23), ns(3) => ns(22), ns(2)
      => ns(21), ns(1) => ns(20), ns(0) => ns(19),
      tag(18) => tag(37), tag(17) => tag(36), tag(16) =>
      tag(35), tag(15) => tag(34), tag(14) => tag(33),
      tag(13) => tag(32), tag(12) => tag(31), tag(11) =>
      tag(30), tag(10) => tag(29), tag(9) => tag(28),
```

```
tag(8) => tag(27), tag(7) => tag(26), tag(6) =>
tag(25), tag(5) => tag(24), tag(4) => tag(23),
tag(3) => tag(22), tag(2) => tag(21), tag(1) =>
tag(20), tag(0) => tag(19), nn(18) => nn(37),
nn(17) => nn(36), nn(16) => nn(35), nn(15) =>
nn(34), nn(14) => nn(33), nn(13) => nn(32), nn(12)
=> nn(31), nn(11) => nn(30), nn(10) => nn(29),
nn(9) => nn(28), nn(8) => nn(27), nn(7) => nn(26),
nn(6) => nn(25), nn(5) => nn(24), nn(4) => nn(23),
nn(3) => nn(22), nn(2) => nn(21), nn(1) => nn(20),
nn(0) => nn(19), fn(18) => fn(37), fn(17) =>
fn(36), fn(16) => fn(35), fn(15) => fn(34), fn(14)
=> fn(33), fn(13) => fn(32), fn(12) => fn(31),
fn(11) => fn(30), fn(10) => fn(29), fn(9) =>
fn(28), fn(8) => fn(27), fn(7) => fn(26), fn(6) =>
fn(25), fn(5) => fn(24), fn(4) => fn(23), fn(3) =>
fn(22), fn(2) => fn(21), fn(1) => fn(20), fn(0) =>
fn(19), rspen(18) => rspen(37), rspen(17) =>
rspen(36), rspen(16) => rspen(35), rspen(15) =>
rspen(34), rspen(14) => rspen(33), rspen(13) =>
rspen(32), rspen(12) => rspen(31), rspen(11) =>
rspen(30), rspen(10) => rspen(29), rspen(9) =>
rspen(28), rspen(8) => rspen(27), rspen(7) =>
rspen(26), rspen(6) => rspen(25), rspen(5) =>
rspen(24), rspen(4) => rspen(23), rspen(3) =>
rspen(22), rspen(2) => rspen(21), rspen(1) =>
rspen(20), rspen(0) => rspen(19), fircnten =>
fircnten );

U4240: tag19
port map ( we => we, s_addr => cntinit, rstaddr => rstaddr,
mux2 => mux2, mux1 => mux1, mux0 => mux0, fir_in
=> fir_in, carry_in => resp_in, SetTag => setag,
prsp => prsp, carry => c(1), fir => f(1), wl(18)
=> wl(18), wl(17) => wl(17), wl(16) => wl(16),
wl(15) => wl(15), wl(14) => wl(14), wl(13) =>
wl(13), wl(12) => wl(12), wl(11) => wl(11), wl(10)
=> wl(10), wl(9) => wl(9), wl(8) => wl(8), wl(7)
=> wl(7), wl(6) => wl(6), wl(5) => wl(5), wl(4) =>
wl(4), wl(3) => wl(3), wl(2) => wl(2), wl(1) =>
wl(1), wl(0) => wl(0), ml(18) => ml(18), ml(17) =>
ml(17), ml(16) => ml(16), ml(15) => ml(15), ml(14)
=> ml(14), ml(13) => ml(13), ml(12) => ml(12),
ml(11) => ml(11), ml(10) => ml(10), ml(9) => ml(9),
ml(8) => ml(8), ml(7) => ml(7), ml(6) => ml(6),
ml(5) => ml(5), ml(4) => ml(4), ml(3) => ml(3),
ml(2) => ml(2), ml(1) => ml(1), ml(0) => ml(0),
sado => a(1), fs(18) => fs(18), fs(17) => fs(17),
fs(16) => fs(16), fs(15) => fs(15), fs(14) =>
fs(14), fs(13) => fs(13), fs(12) => fs(12), fs(11)
=> fs(11), fs(10) => fs(10), fs(9) => fs(9), fs(8)
=> fs(8), fs(7) => fs(7), fs(6) => fs(6), fs(5) =>
fs(5), fs(4) => fs(4), fs(3) => fs(3), fs(2) =>
fs(2), fs(1) => fs(1), fs(0) => fs(0), ns(18) =>
ns(18), ns(17) => ns(17), ns(16) => ns(16), ns(15)
=> ns(15), ns(14) => ns(14), ns(13) => ns(13),
ns(12) => ns(12), ns(11) => ns(11), ns(10) =>
ns(10), ns(9) => ns(9), ns(8) => ns(8), ns(7) =>
```

```
        ns(7), ns(6) => ns(6), ns(5) => ns(5), ns(4) =>
        ns(4), ns(3) => ns(3), ns(2) => ns(2), ns(1) =>
        ns(1), ns(0) => ns(0), tag(18) => tag(18), tag(17)
        => tag(17), tag(16) => tag(16), tag(15) => tag(15),
        tag(14) => tag(14), tag(13) => tag(13), tag(12) =>
        tag(12), tag(11) => tag(11), tag(10) => tag(10),
        tag(9) => tag(9), tag(8) => tag(8), tag(7) =>
        tag(7), tag(6) => tag(6), tag(5) => tag(5), tag(4)
        => tag(4), tag(3) => tag(3), tag(2) => tag(2),
        tag(1) => tag(1), tag(0) => tag(0), nn(18) =>
        nn(18), nn(17) => nn(17), nn(16) => nn(16), nn(15)
        => nn(15), nn(14) => nn(14), nn(13) => nn(13),
        nn(12) => nn(12), nn(11) => nn(11), nn(10) =>
        nn(10), nn(9) => nn(9), nn(8) => nn(8), nn(7) =>
        nn(7), nn(6) => nn(6), nn(5) => nn(5), nn(4) =>
        nn(4), nn(3) => nn(3), nn(2) => nn(2), nn(1) =>
        nn(1), nn(0) => nn(0), fn(18) => fn(18), fn(17) =>
        fn(17), fn(16) => fn(16), fn(15) => fn(15), fn(14)
        => fn(14), fn(13) => fn(13), fn(12) => fn(12),
        fn(11) => fn(11), fn(10) => fn(10), fn(9) => fn(9),
        fn(8) => fn(8), fn(7) => fn(7), fn(6) => fn(6),
        fn(5) => fn(5), fn(4) => fn(4), fn(3) => fn(3),
        fn(2) => fn(2), fn(1) => fn(1), fn(0) => fn(0),
        rspen(18) => rspen(18), rspen(17) => rspen(17),
        rspen(16) => rspen(16), rspen(15) => rspen(15),
        rspen(14) => rspen(14), rspen(13) => rspen(13),
        rspen(12) => rspen(12), rspen(11) => rspen(11),
        rspen(10) => rspen(10), rspen(9) => rspen(9),
        rspen(8) => rspen(8), rspen(7) => rspen(7),
        rspen(6) => rspen(6), rspen(5) => rspen(5),
        rspen(4) => rspen(4), rspen(3) => rspen(3),
        rspen(2) => rspen(2), rspen(1) => rspen(1),
        rspen(0) => rspen(0), fircnten => fircnten );

end tag342;
```

```
file: TOP2.VHD
-- Date of netlist generation:  Nov-21-93
---------------------------------------------------------------------------

library IEEE;
use IEEE.STD_LOGIC_1164.ALL;

library COMPASS_LIB;
use COMPASS_LIB.COMPASS.ALL;

entity top2 is

  port ( setc : in Std_Logic := 'U';
      rstc : in Std_Logic := 'U';
      ldc : in Std_Logic := 'U';
      cba : in Std_Logic := 'U';
      cv : in Std_Logic := 'U';
      cmp : in Std_Logic := 'U';
      setM : in Std_Logic := 'U';
      rstM : in Std_Logic := 'U';
      LdM : in Std_Logic := 'U';
      vvin : in Std_Logic_Vector(23 downto 0) := (others => 'U');
      dd : in Std_Logic_Vector(23 downto 0) := (others => 'U');
      LdFifoConf : in Std_Logic := 'U';
      we : in Std_Logic := 'U';
      rda : in Std_Logic := 'U';
      setag : in Std_Logic := 'U';
      rstaddr : in Std_Logic := 'U';
      mux : in Std_Logic_Vector(2 downto 0) := (others => 'U');
      sinit : in Std_Logic := 'U';
      rstfifo : in Std_Logic := 'U';
      ldor : in Std_Logic := 'U';
      prsp : in Std_Logic := 'U';
      selr_s : in Std_Logic := 'U';
      hin : in Std_Logic := 'U';
      lin : in Std_Logic := 'U';
      ex : in Std_Logic := 'U';
      sct : in Std_Logic_Vector(1 downto 0) := (others => 'U');
      finit : in Std_Logic := 'U';
      exc : in Std_Logic := 'U';
      fz : in Std_Logic := 'U';
      fircnten : in Std_Logic := 'U';
      fir_in : in Std_Logic := 'U';
      fenb : in Std_Logic := 'U';

      bl : out Std_Logic_Vector(71 downto 0) := (others => 'U');
      ibl : out Std_Logic_Vector(71 downto 0) := (others => 'U');
      mask : out Std_Logic_Vector(71 downto 0) := (others =>
'U');
      f : out Std_Logic_Vector(2 downto 0) := (others => 'U');
      wenb : out Std_Logic := 'U';
      cmpt : out Std_Logic := 'U';
      wenbf : out Std_Logic := 'U';
      sinitt : out Std_Logic := 'U';
      rstaddrt : out Std_Logic := 'U';
      setagt : out Std_Logic := 'U';
      finitf : out Std_Logic := 'U';
      rstfifof : out Std_Logic := 'U';
```

```
        muxt : out Std_Logic_Vector(2 downto 0) := (others => 'U');
        s : out Std_Logic_Vector(1 downto 0) := (others => 'U');
        ldort : out Std_Logic := 'U';
        ldorf : out Std_Logic := 'U';
        venbf : out Std_Logic := 'U';
        prspt : out Std_Logic := 'U';
        carryt : out Std_Logic := 'U';
        firt : out Std_Logic := 'U';
        selr_st : out Std_Logic := 'U';
        hint : out Std_Logic := 'U';
        lint : out Std_Logic := 'U';
        n_in : out Std_Logic := 'U';
        s_in : out Std_Logic := 'U';
        rb : out Std_Logic_Vector(4 downto 0) := (others => 'U');
        exen : out Std_Logic := 'U';
        msaen : out Std_Logic := 'U';
        disch : out Std_Logic := 'U';
        fircntent : out Std_Logic := 'U';
        foen : out Std_Logic := 'U' );

end top2;

---------------------------------------------------------------------------

architecture top2 OF top2 is

   component comp_reg1
      port ( load : in Std_Logic;
           clk : in Std_Logic;
           set : in Std_Logic;
           rst : in Std_Logic;
           s0 : in Std_Logic;
           s1 : in Std_Logic;
           fstrobe : in Std_Logic;
           f : in Std_Logic_Vector(0 to 2) := (others => 'U');
           d : in Std_Logic_Vector(23 downto 0) := (others =>
'U');
           ex : in Std_Logic;
           vin : in Std_Logic_Vector(23 downto 0) := (others =>
'U');

           c : out Std_Logic_Vector(71 downto 0) := (others =>
'U');
           nc : out Std_Logic_Vector(71 downto 0) := (others =>
'U') );
   end component;

   component compmux5
      port ( rdf : in Std_Logic;
           cvf : in Std_Logic;
           mask : in Std_Logic_Vector(71 downto 0) := (others =>
'U');
           ncomp : in Std_Logic_Vector(71 downto 0) := (others =>
'U');
           ncbf : in Std_Logic;
           cmp : in Std_Logic;
           cva : in Std_Logic;
```

```
        rda : in Std_Logic;
        ncba : in Std_Logic;
        f : in Std_Logic_Vector(0 to 2) := (others => 'U');
        comp : in Std_Logic_Vector(71 downto 0) := (others =>
'U');
        cmpf : in Std_Logic;

        bl : out Std_Logic_Vector(71 downto 0) := (others =>
'U');
        rdd : out Std_Logic_Vector(4 downto 0) := (others =>
'U') );
  end component;

  component fifo_control
    port ( fstrobe : in Std_Logic;
        rstfifof : in Std_Logic;

        cvf : out Std_Logic;
        ldorf : out Std_Logic;
        venb : out Std_Logic;
        ncbf : out Std_Logic;
        wenf : out Std_Logic;
        nclk : out Std_Logic;
        finitf : out Std_Logic );
  end component;

  component foen_con
    port ( finit : in Std_Logic;
        fful : in Std_Logic;

        foen : out Std_Logic );
  end component;

  component exenc
    port ( f : in Std_Logic_Vector(0 to 2) := (others => 'U');

        exen : out Std_Logic );
  end component;

  component ff_enb2
    port ( a : in Std_Logic;
        clk : in Std_Logic;
        rst : in Std_Logic;
        ld : in Std_Logic;

        outt : out Std_Logic;
        nout : out Std_Logic );
  end component;

  component fenbcont1
    port ( rstfifo : in Std_Logic;
        fz : in Std_Logic;
        finit : in Std_Logic;
        fenb : in Std_Logic;

        fstrobe : out Std_Logic );
  end component;
```

```
component we_new
   port ( we : in Std_Logic;

        wenb : out Std_Logic );
end component;

component bufer
   port ( a : in Std_Logic;

        b : out Std_Logic );
end component;

component mask_reg
   port ( load : in Std_Logic;
        clk : in Std_Logic;
        set : in Std_Logic;
        rst : in Std_Logic;
        s0 : in Std_Logic;
        s1 : in Std_Logic;
        fstrobe : in Std_Logic;
        f : in Std_Logic_Vector(0 to 2) := (others => 'U');
        d : in Std_Logic_Vector(23 downto 0) := (others =>
'U');
        ex : in Std_Logic;

        c : out Std_Logic_Vector(71 downto 0) := (others =>
'U');
        nc : out Std_Logic_Vector(71 downto 0) := (others =>
'U') );
end component;


signal f2_local, f1_local, f0_local, rstfifof_local, muxt2_local,
     muxt1_local, muxt0_local, s1_local, s0_local,
     carryt_local: Std_Logic;
signal U410_ldorf : Std_Logic;
signal U569_QN : Std_Logic;
signal d_c : Std_Logic;
signal U410_wenf : Std_Logic;
signal U568_QN : Std_Logic;
signal U496_QN : Std_Logic;
signal U410_venb : Std_Logic;
signal U567_QN : Std_Logic;
signal U410_finitf : Std_Logic;
signal U566_QN : Std_Logic;
signal U562_QN : Std_Logic;
signal U436_Q : Std_Logic;
signal U562_Q : Std_Logic;
signal U476_Q : Std_Logic;
signal U475_QN : Std_Logic;
signal U475_Q : Std_Logic;
signal U476_QN : Std_Logic;
signal U564_Q : Std_Logic;
signal ncbf : Std_Logic;
signal cvf : Std_Logic;
signal rdf : Std_Logic;
signal U564_QN : Std_Logic;
signal U435_Q : Std_Logic;
```

```
signal U435_QN : Std_Logic;
signal U442_Q : Std_Logic;
signal U586_QN : Std_Logic;
signal U586_Q : Std_Logic;
signal U585_QN : Std_Logic;
signal U585_Q : Std_Logic;
signal U593_c : Std_Logic_Vector(71 downto 0);
signal U467_c : Std_Logic_Vector(71 downto 0);
signal U467_nc : Std_Logic_Vector(71 downto 0);
signal U468_Q : Std_Logic;
signal U589_Q : Std_Logic;
signal U395_Q : Std_Logic;
signal U395_QN : Std_Logic;
signal U394_Q : Std_Logic;
signal U394_QN : Std_Logic;
signal U491_fstrobe : Std_Logic;
signal U589_QN : Std_Logic;
signal S1 : Std_Logic;
signal S2 : Std_Logic;
signal S3 : Std_Logic;
signal S4 : Std_Logic;
signal S5 : Std_Logic;
signal S6 : Std_Logic;
signal S7 : Std_Logic;
signal S8 : Std_Logic;
signal S9 : Std_Logic;
signal S10 : Std_Logic;
signal S11 : Std_Logic;
signal S12 : Std_Logic;
signal S13 : Std_Logic;
signal S14 : Std_Logic;
signal S15 : Std_Logic;
signal S16 : Std_Logic;
signal S17 : Std_Logic;
signal S18 : Std_Logic;
signal S19 : Std_Logic;
signal S20 : Std_Logic;
signal S21 : Std_Logic;
signal S22 : Std_Logic;
signal S23 : Std_Logic;
signal S24 : Std_Logic;
signal U583_Q : Std_Logic;
signal vin : Std_Logic_Vector(23 downto 0);
signal U58123_QN : Std_Logic;
signal U58122_QN : Std_Logic;
signal U58121_QN : Std_Logic;
signal U58120_QN : Std_Logic;
signal U58119_QN : Std_Logic;
signal U58118_QN : Std_Logic;
signal U58117_QN : Std_Logic;
signal U58116_QN : Std_Logic;
signal U58115_QN : Std_Logic;
signal U58114_QN : Std_Logic;
signal U58113_QN : Std_Logic;
signal U58112_QN : Std_Logic;
signal U58111_QN : Std_Logic;
signal U58110_QN : Std_Logic;
signal U5819_QN : Std_Logic;
```

```
signal U5818_QN : Std_Logic;
signal U5817_QN : Std_Logic;
signal U5816_QN : Std_Logic;
signal U5815_QN : Std_Logic;
signal U5814_QN : Std_Logic;
signal U5813_QN : Std_Logic;
signal U5812_QN : Std_Logic;
signal U5811_QN : Std_Logic;
signal U5810_QN : Std_Logic;
signal S25 : Std_Logic;
signal S26 : Std_Logic;
signal S27 : Std_Logic;
signal S28 : Std_Logic;
signal S29 : Std_Logic;
signal S30 : Std_Logic;
signal S31 : Std_Logic;
signal S32 : Std_Logic;
signal S33 : Std_Logic;
signal S34 : Std_Logic;
signal S35 : Std_Logic;
signal S36 : Std_Logic;
signal S37 : Std_Logic;
signal S38 : Std_Logic;
signal S39 : Std_Logic;
signal S40 : Std_Logic;
signal S41 : Std_Logic;
signal S42 : Std_Logic;
signal S43 : Std_Logic;
signal S44 : Std_Logic;
signal S45 : Std_Logic;
signal S46 : Std_Logic;
signal S47 : Std_Logic;
signal S48 : Std_Logic;
signal U583_QN : Std_Logic;
signal d : Std_Logic_Vector(23 downto 0);
signal S49 : Std_Logic;
signal S50 : Std_Logic;
signal S51 : Std_Logic;
signal S52 : Std_Logic;
signal S53 : Std_Logic;
signal S54 : Std_Logic;
signal U5942_nout : Std_Logic;
signal U5941_nout : Std_Logic;
signal U5940_nout : Std_Logic;
signal U468_QN : Std_Logic;
signal U517_Q : Std_Logic;
signal U517_QN : Std_Logic;
signal U378_Q : Std_Logic;
signal U336_rdd : Std_Logic_Vector(4 downto 0);
signal U378_QN : Std_Logic;
signal U424_Q : Std_Logic;
signal U442_QN : Std_Logic;
signal U504_wenb : Std_Logic;
signal U441_QN : Std_Logic;
signal U441_Q : Std_Logic;
signal U426_Q : Std_Logic;
signal U426_QN : Std_Logic;
signal U424_QN : Std_Logic;
```

```
signal U332_ZN : Std_Logic;
signal U450_Q : Std_Logic;
signal U450_QN : Std_Logic;
signal U451_Q : Std_Logic;
signal U451_QN : Std_Logic;
signal U374_QN : Std_Logic;
signal U376_Q : Std_Logic;
signal U560_Q : Std_Logic;
signal U560_QN : Std_Logic;
signal U376_QN : Std_Logic;
signal U593_nc : Std_Logic_Vector(71 downto 0);
signal U374_Q : Std_Logic;
signal S55 : Std_Logic;
signal S56 : Std_Logic;
signal S57 : Std_Logic;
signal S58 : Std_Logic;
signal U5911_QN : Std_Logic;
signal U5910_QN : Std_Logic;
signal S59 : Std_Logic;
signal S60 : Std_Logic;
signal S61 : Std_Logic;
signal S62 : Std_Logic;
signal S63 : Std_Logic;
signal S64 : Std_Logic;
signal S65 : Std_Logic;
signal S66 : Std_Logic;
signal S67 : Std_Logic;
signal S68 : Std_Logic;
signal S69 : Std_Logic;
signal S70 : Std_Logic;
signal S71 : Std_Logic;
signal S72 : Std_Logic;
signal S73 : Std_Logic;
signal S74 : Std_Logic;
signal S75 : Std_Logic;
signal S76 : Std_Logic;
signal S77 : Std_Logic;
signal S78 : Std_Logic;
signal S79 : Std_Logic;
signal S80 : Std_Logic;
signal S81 : Std_Logic;
signal S82 : Std_Logic;
signal S83 : Std_Logic;
signal S84 : Std_Logic;
signal U551_QN : Std_Logic;
signal U550_Q : Std_Logic;
signal U550_QN : Std_Logic;
signal U553_QN : Std_Logic;
signal U549_QN : Std_Logic;
signal U548_QN : Std_Logic;
signal U548_Q : Std_Logic;
signal U544_QN : Std_Logic;
signal U542_QN : Std_Logic;
signal U542_Q : Std_Logic;
signal U543_Q : Std_Logic;
signal U537_Q : Std_Logic;
signal U537_QN : Std_Logic;
signal U543_QN : Std_Logic;
```

```
signal U536_Q : Std_Logic;
signal U536_QN : Std_Logic;
signal S85 : Std_Logic;
signal S86 : Std_Logic;
signal S87 : Std_Logic;
signal S88 : Std_Logic;
signal S89 : Std_Logic;
signal S90 : Std_Logic;
signal S91 : Std_Logic;
signal S92 : Std_Logic;
signal S93 : Std_Logic;
signal S94 : Std_Logic;
signal S95 : Std_Logic;
signal S96 : Std_Logic;
signal S97 : Std_Logic;
signal S98 : Std_Logic;
signal S99 : Std_Logic;
signal S100 : Std_Logic;
signal S101 : Std_Logic;
signal S102 : Std_Logic;
signal S103 : Std_Logic;
signal S104 : Std_Logic;
signal S105 : Std_Logic;
signal S106 : Std_Logic;
signal S107 : Std_Logic;
signal S108 : Std_Logic;
signal S109 : Std_Logic;
signal S110 : Std_Logic;
signal S111 : Std_Logic;
signal S112 : Std_Logic;
signal S113 : Std_Logic;
signal S114 : Std_Logic;
signal S115 : Std_Logic;
signal S116 : Std_Logic;
signal S117 : Std_Logic;
signal S118 : Std_Logic;
signal S119 : Std_Logic;
signal S120 : Std_Logic;
signal S121 : Std_Logic;
signal S122 : Std_Logic;
signal S123 : Std_Logic;
signal S124 : Std_Logic;
signal S125 : Std_Logic;
signal S126 : Std_Logic;
signal S127 : Std_Logic;
signal S128 : Std_Logic;
signal S129 : Std_Logic;
signal S130 : Std_Logic;
signal S131 : Std_Logic;
signal S132 : Std_Logic;
signal ddec : Std_Logic_Vector(23 downto 0);
signal U57523_QN : Std_Logic;
signal U57522_QN : Std_Logic;
signal U57521_QN : Std_Logic;
signal U57520_QN : Std_Logic;
signal U57519_QN : Std_Logic;
signal U57518_QN : Std_Logic;
signal U57517_QN : Std_Logic;
```

```
signal U57516_QN : Std_Logic;
signal U57515_QN : Std_Logic;
signal U57514_QN : Std_Logic;
signal U57513_QN : Std_Logic;
signal U57512_QN : Std_Logic;
signal U57511_QN : Std_Logic;
signal U57510_QN : Std_Logic;
signal U5759_QN : Std_Logic;
signal U5758_QN : Std_Logic;
signal U5757_QN : Std_Logic;
signal U5756_QN : Std_Logic;
signal U5755_QN : Std_Logic;
signal U5754_QN : Std_Logic;
signal U5753_QN : Std_Logic;
signal U5752_QN : Std_Logic;
signal U5751_QN : Std_Logic;
signal U5750_QN : Std_Logic;
signal S133 : Std_Logic;
signal S134 : Std_Logic;
signal S135 : Std_Logic;
signal S136 : Std_Logic;
signal S137 : Std_Logic;
signal S138 : Std_Logic;
signal S139 : Std_Logic;
signal S140 : Std_Logic;
signal S141 : Std_Logic;
signal S142 : Std_Logic;
signal S143 : Std_Logic;
signal S144 : Std_Logic;
signal S145 : Std_Logic;
signal S146 : Std_Logic;
signal S147 : Std_Logic;
signal S148 : Std_Logic;
signal S149 : Std_Logic;
signal S150 : Std_Logic;
signal S151 : Std_Logic;
signal S152 : Std_Logic;
signal S153 : Std_Logic;
signal S154 : Std_Logic;
signal S155 : Std_Logic;
signal S156 : Std_Logic;
signal U57623_Q : Std_Logic;
signal U57622_Q : Std_Logic;
signal U57621_Q : Std_Logic;
signal U57620_Q : Std_Logic;
signal U57619_Q : Std_Logic;
signal U57618_Q : Std_Logic;
signal U57617_Q : Std_Logic;
signal U57616_Q : Std_Logic;
signal U57615_Q : Std_Logic;
signal U57614_Q : Std_Logic;
signal U57613_Q : Std_Logic;
signal U57612_Q : Std_Logic;
signal U57611_Q : Std_Logic;
signal U57610_Q : Std_Logic;
signal U5769_Q : Std_Logic;
signal U5768_Q : Std_Logic;
signal U5767_Q : Std_Logic;
```

```
signal U5766_Q : Std_Logic;
signal U5765_Q : Std_Logic;
signal U5764_Q : Std_Logic;
signal U5763_Q : Std_Logic;
signal U5762_Q : Std_Logic;
signal U5761_Q : Std_Logic;
signal U5760_Q : Std_Logic;
signal U57623_QN : Std_Logic;
signal U57622_QN : Std_Logic;
signal U57621_QN : Std_Logic;
signal U57620_QN : Std_Logic;
signal U57619_QN : Std_Logic;
signal U57618_QN : Std_Logic;
signal U57617_QN : Std_Logic;
signal U57616_QN : Std_Logic;
signal U57615_QN : Std_Logic;
signal U57614_QN : Std_Logic;
signal U57613_QN : Std_Logic;
signal U57612_QN : Std_Logic;
signal U57611_QN : Std_Logic;
signal U57610_QN : Std_Logic;
signal U5769_QN : Std_Logic;
signal U5768_QN : Std_Logic;
signal U5767_QN : Std_Logic;
signal U5766_QN : Std_Logic;
signal U5765_QN : Std_Logic;
signal U5764_QN : Std_Logic;
signal U5763_QN : Std_Logic;
signal U5762_QN : Std_Logic;
signal U5761_QN : Std_Logic;
signal U5760_QN : Std_Logic;
signal S157 : Std_Logic;
signal S158 : Std_Logic;
signal S159 : Std_Logic;
signal S160 : Std_Logic;
signal S161 : Std_Logic;
signal S162 : Std_Logic;
signal S163 : Std_Logic;
signal S164 : Std_Logic;
signal S165 : Std_Logic;
signal S166 : Std_Logic;
signal S167 : Std_Logic;
signal S168 : Std_Logic;
signal S169 : Std_Logic;
signal S170 : Std_Logic;
signal S171 : Std_Logic;
signal S172 : Std_Logic;
signal S173 : Std_Logic;
signal S174 : Std_Logic;
signal S175 : Std_Logic;
signal S176 : Std_Logic;
signal S177 : Std_Logic;
signal S178 : Std_Logic;
signal S179 : Std_Logic;
signal S180 : Std_Logic;
signal S181 : Std_Logic;
signal S182 : Std_Logic;
signal S183 : Std_Logic;
```

```
signal S184 : Std_Logic;
signal S185 : Std_Logic;
signal S186 : Std_Logic;
signal S187 : Std_Logic;
signal S188 : Std_Logic;
signal S189 : Std_Logic;
signal S190 : Std_Logic;
signal S191 : Std_Logic;
signal S192 : Std_Logic;
signal S193 : Std_Logic;
signal S194 : Std_Logic;
signal S195 : Std_Logic;
signal S196 : Std_Logic;
signal S197 : Std_Logic;
signal S198 : Std_Logic;
signal S199 : Std_Logic;
signal S200 : Std_Logic;
signal S201 : Std_Logic;
signal S202 : Std_Logic;
signal S203 : Std_Logic;
signal S204 : Std_Logic;
signal U57723_QN : Std_Logic;
signal U57722_QN : Std_Logic;
signal U57721_QN : Std_Logic;
signal U57720_QN : Std_Logic;
signal U57719_QN : Std_Logic;
signal U57718_QN : Std_Logic;
signal U57717_QN : Std_Logic;
signal U57716_QN : Std_Logic;
signal U57715_QN : Std_Logic;
signal U57714_QN : Std_Logic;
signal U57713_QN : Std_Logic;
signal U57712_QN : Std_Logic;
signal U57711_QN : Std_Logic;
signal U57710_QN : Std_Logic;
signal U5779_QN : Std_Logic;
signal U5778_QN : Std_Logic;
signal U5777_QN : Std_Logic;
signal U5776_QN : Std_Logic;
signal U5775_QN : Std_Logic;
signal U5774_QN : Std_Logic;
signal U5773_QN : Std_Logic;
signal U5772_QN : Std_Logic;
signal U5771_QN : Std_Logic;
signal U5770_QN : Std_Logic;
signal U552_Q : Std_Logic;
signal U552_QN : Std_Logic;
signal U454_Q : Std_Logic;
signal U457_QN : Std_Logic;
signal U454_QN : Std_Logic;
signal U456_QN : Std_Logic;
signal U527_QN : Std_Logic;
signal U525_QN : Std_Logic;
signal U525_Q : Std_Logic;
signal U455_QN : Std_Logic;
signal U455_Q : Std_Logic;
signal U484_ZN : Std_Logic;
signal U488_ZN : Std_Logic;
```

```
signal U487_ZN : Std_Logic;
signal U5352_QN : Std_Logic;
signal U5351_QN : Std_Logic;
signal U5350_QN : Std_Logic;
signal S205 : Std_Logic;
signal S206 : Std_Logic;
signal S207 : Std_Logic;
signal U5342_Q : Std_Logic;
signal U5341_Q : Std_Logic;
signal U5340_Q : Std_Logic;
signal U5342_QN : Std_Logic;
signal U5341_QN : Std_Logic;
signal U5340_QN : Std_Logic;
signal S208 : Std_Logic;
signal S209 : Std_Logic;
signal S210 : Std_Logic;
signal S211 : Std_Logic;
signal S212 : Std_Logic;
signal S213 : Std_Logic;
signal S214 : Std_Logic;
signal S215 : Std_Logic;
signal S216 : Std_Logic;

begin

U517: dfctnb
  port map ( D => U436_Q, CP => DCLK, CDN => ARESET, Q =>
        U517_Q, QN => U517_QN );

U467: comp_regl
  port map ( load => U564_Q, clk => CLK, c(71) => U467_c(71),
        c(70) => U467_c(70), c(69) => U467_c(69), c(68) =>
        U467_c(68), c(67) => U467_c(67), c(66) =>
        U467_c(66), c(65) => U467_c(65), c(64) =>
        U467_c(64), c(63) => U467_c(63), c(62) =>
        U467_c(62), c(61) => U467_c(61), c(60) =>
        U467_c(60), c(59) => U467_c(59), c(58) =>
        U467_c(58), c(57) => U467_c(57), c(56) =>
        U467_c(56), c(55) => U467_c(55), c(54) =>
        U467_c(54), c(53) => U467_c(53), c(52) =>
        U467_c(52), c(51) => U467_c(51), c(50) =>
        U467_c(50), c(49) => U467_c(49), c(48) =>
        U467_c(48), c(47) => U467_c(47), c(46) =>
        U467_c(46), c(45) => U467_c(45), c(44) =>
        U467_c(44), c(43) => U467_c(43), c(42) =>
        U467_c(42), c(41) => U467_c(41), c(40) =>
        U467_c(40), c(39) => U467_c(39), c(38) =>
        U467_c(38), c(37) => U467_c(37), c(36) =>
        U467_c(36), c(35) => U467_c(35), c(34) =>
        U467_c(34), c(33) => U467_c(33), c(32) =>
        U467_c(32), c(31) => U467_c(31), c(30) =>
        U467_c(30), c(29) => U467_c(29), c(28) =>
        U467_c(28), c(27) => U467_c(27), c(26) =>
        U467_c(26), c(25) => U467_c(25), c(24) =>
        U467_c(24), c(23) => U467_c(23), c(22) =>
        U467_c(22), c(21) => U467_c(21), c(20) =>
        U467_c(20), c(19) => U467_c(19), c(18) =>
```

U467_c(18), c(17) => U467_c(17), c(16) => U467_c(16), c(15) => U467_c(15), c(14) => U467_c(14), c(13) => U467_c(13), c(12) => U467_c(12), c(11) => U467_c(11), c(10) => U467_c(10), c(9) => U467_c(9), c(8) => U467_c(8), c(7) => U467_c(7), c(6) => U467_c(6), c(5) => U467_c(5), c(4) => U467_c(4), c(3) => U467_c(3), c(2) => U467_c(2), c(1) => U467_c(1), c(0) => U467_c(0), set => U394_Q, rst => U395_Q, nc(71) => U467_nc(71), nc(70) => U467_nc(70), nc(69) => U467_nc(69), nc(68) => U467_nc(68), nc(67) => U467_nc(67), nc(66) => U467_nc(66), nc(65) => U467_nc(65), nc(64) => U467_nc(64), nc(63) => U467_nc(63), nc(62) => U467_nc(62), nc(61) => U467_nc(61), nc(60) => U467_nc(60), nc(59) => U467_nc(59), nc(58) => U467_nc(58), nc(57) => U467_nc(57), nc(56) => U467_nc(56), nc(55) => U467_nc(55), nc(54) => U467_nc(54), nc(53) => U467_nc(53), nc(52) => U467_nc(52), nc(51) => U467_nc(51), nc(50) => U467_nc(50), nc(49) => U467_nc(49), nc(48) => U467_nc(48), nc(47) => U467_nc(47), nc(46) => U467_nc(46), nc(45) => U467_nc(45), nc(44) => U467_nc(44), nc(43) => U467_nc(43), nc(42) => U467_nc(42), nc(41) => U467_nc(41), nc(40) => U467_nc(40), nc(39) => U467_nc(39), nc(38) => U467_nc(38), nc(37) => U467_nc(37), nc(36) => U467_nc(36), nc(35) => U467_nc(35), nc(34) => U467_nc(34), nc(33) => U467_nc(33), nc(32) => U467_nc(32), nc(31) => U467_nc(31), nc(30) => U467_nc(30), nc(29) => U467_nc(29), nc(28) => U467_nc(28), nc(27) => U467_nc(27), nc(26) => U467_nc(26), nc(25) => U467_nc(25), nc(24) => U467_nc(24), nc(23) => U467_nc(23), nc(22) => U467_nc(22), nc(21) => U467_nc(21), nc(20) => U467_nc(20), nc(19) => U467_nc(19), nc(18) => U467_nc(18), nc(17) => U467_nc(17), nc(16) => U467_nc(16), nc(15) => U467_nc(15), nc(14) => U467_nc(14), nc(13) => U467_nc(13), nc(12) => U467_nc(12), nc(11) => U467_nc(11), nc(10) => U467_nc(10), nc(9) => U467_nc(9), nc(8) => U467_nc(8), nc(7) => U467_nc(7), nc(6) => U467_nc(6), nc(5) => U467_nc(5), nc(4) => U467_nc(4), nc(3) => U467_nc(3), nc(2) => U467_nc(2), nc(1) => U467_nc(1), nc(0) => U467_nc(0), s0 => s0_local, s1 => s1_local, fstrobe => U589_Q, f(0) => f0_local, f(1) => f1_local, f(2) => f2_local, d(23) => d(23), d(22) => d(22), d(21) => d(21), d(20) => d(20), d(19) => d(19), d(18) => d(18), d(17) => d(17), d(16) => d(16), d(15) => d(15), d(14) => d(14), d(13) => d(13), d(12) => d(12), d(11) => d(11), d(10) => d(10), d(9) => d(9), d(8) => d(8), d(7) => d(7), d(6) => d(6), d(5) => d(5), d(4) => d(4), d(3) => d(3), d(2) => d(2), d(1) => d(1), d(0) => d(0), ex => U468_Q, vin(23) => vin(23), vin(22) => vin(22), vin(21) => vin(21), vin(20) => vin(20), vin(19) => vin(19), vin(18) => vin(18), vin(17) => vin(17), vin(16) => vin(16),

```
        vin(15) => vin(15), vin(14) => vin(14), vin(13) =>
        vin(13), vin(12) => vin(12), vin(11) => vin(11),
        vin(10) => vin(10), vin(9) => vin(9), vin(8) =>
        vin(8), vin(7) => vin(7), vin(6) => vin(6), vin(5)
        => vin(5), vin(4) => vin(4), vin(3) => vin(3),
        vin(2) => vin(2), vin(1) => vin(1), vin(0) =>
        vin(0) );

U378: dfctnb
   port map ( D => rstM, CP => CLK, CDN => ARESET, Q => U378_Q,
        QN => U378_QN );

U496: dfctnb
   port map ( D => rstfifo, CP => d_c, CDN => ARESET, Q =>
        rstfifof_local, QN => U496_QN );

U585: dfctnb
   port map ( D => cba, CP => CLK, CDN => ARESET, Q => U585_Q,
        QN => U585_QN );

U586: dfctnb
   port map ( D => U585_Q, CP => CLK, CDN => ARESET, Q => U586_Q,
        QN => U586_QN );

U411: nd02d2
   port map ( A1 => U436_Q, A2 => U562_QN, ZN => cmpt );

U562: dfctnb
   port map ( D => U436_Q, CP => DCLK, CDN => ARESET, Q =>
        U562_Q, QN => U562_QN );

U569: dfctnb
   port map ( D => U410_ldorf, CP => CLK, CDN => ARESET, Q =>
        ldorf, QN => U569_QN );

U567: dfctnb
   port map ( D => U410_venb, CP => CLK, CDN => ARESET, Q =>
        venbf, QN => U567_QN );

U568: dfctnb
   port map ( D => U410_wenf, CP => d_c, CDN => ARESET, Q =>
        wenbf, QN => U568_QN );

U566: dfctnb
   port map ( D => U410_finitf, CP => CLK, CDN => ARESET, Q =>
        finitf, QN => U566_QN );

U475: dfctnb
   port map ( D => U476_Q, CP => CLK, CDN => ARESET, Q => U475_Q,
        QN => U475_QN );

U476: dfctnb
   port map ( D => cv, CP => CLK, CDN => ARESET, Q => U476_Q, QN
        => U476_QN );

U299: nd02d2
   port map ( A1 => cvf, A2 => d_c, ZN => rdf );
```

```
U564: dfctnb
   port map ( D => ldc, CP => CLK, CDN => ARESET, Q => U564_Q,
          QN => U564_QN );

U436: dfctnb
   port map ( D => U435_Q, CP => CLK, CDN => ARESET, Q => U436_Q,
          QN => disch );

U435: dfctnb
   port map ( D => cmp, CP => CLK, CDN => ARESET, Q => U435_Q,
          QN => U435_QN );

U335: compmux5
   port map ( rdf => rdf, cvf => cvf, mask(71) => U593_c(71),
          mask(70) => U593_c(70), mask(69) => U593_c(69),
          mask(68) => U593_c(68), mask(67) => U593_c(67),
          mask(66) => U593_c(66), mask(65) => U593_c(65),
          mask(64) => U593_c(64), mask(63) => U593_c(63),
          mask(62) => U593_c(62), mask(61) => U593_c(61),
          mask(60) => U593_c(60), mask(59) => U593_c(59),
          mask(58) => U593_c(58), mask(57) => U593_c(57),
          mask(56) => U593_c(56), mask(55) => U593_c(55),
          mask(54) => U593_c(54), mask(53) => U593_c(53),
          mask(52) => U593_c(52), mask(51) => U593_c(51),
          mask(50) => U593_c(50), mask(49) => U593_c(49),
          mask(48) => U593_c(48), mask(47) => U593_c(47),
          mask(46) => U593_c(46), mask(45) => U593_c(45),
          mask(44) => U593_c(44), mask(43) => U593_c(43),
          mask(42) => U593_c(42), mask(41) => U593_c(41),
          mask(40) => U593_c(40), mask(39) => U593_c(39),
          mask(38) => U593_c(38), mask(37) => U593_c(37),
          mask(36) => U593_c(36), mask(35) => U593_c(35),
          mask(34) => U593_c(34), mask(33) => U593_c(33),
          mask(32) => U593_c(32), mask(31) => U593_c(31),
          mask(30) => U593_c(30), mask(29) => U593_c(29),
          mask(28) => U593_c(28), mask(27) => U593_c(27),
          mask(26) => U593_c(26), mask(25) => U593_c(25),
          mask(24) => U593_c(24), mask(23) => U593_c(23),
          mask(22) => U593_c(22), mask(21) => U593_c(21),
          mask(20) => U593_c(20), mask(19) => U593_c(19),
          mask(18) => U593_c(18), mask(17) => U593_c(17),
          mask(16) => U593_c(16), mask(15) => U593_c(15),
          mask(14) => U593_c(14), mask(13) => U593_c(13),
          mask(12) => U593_c(12), mask(11) => U593_c(11),
          mask(10) => U593_c(10), mask(9) => U593_c(9),
          mask(8) => U593_c(8), mask(7) => U593_c(7),
          mask(6) => U593_c(6), mask(5) => U593_c(5),
          mask(4) => U593_c(4), mask(3) => U593_c(3),
          mask(2) => U593_c(2), mask(1) => U593_c(1),
          mask(0) => U593_c(0), ncomp(71) => U467_nc(71),
          ncomp(70) => U467_nc(70), ncomp(69) => U467_nc(69),
          ncomp(68) => U467_nc(68), ncomp(67) => U467_nc(67),
          ncomp(66) => U467_nc(66), ncomp(65) => U467_nc(65),
          ncomp(64) => U467_nc(64), ncomp(63) => U467_nc(63),
          ncomp(62) => U467_nc(62), ncomp(61) => U467_nc(61),
          ncomp(60) => U467_nc(60), ncomp(59) => U467_nc(59),
          ncomp(58) => U467_nc(58), ncomp(57) => U467_nc(57),
          ncomp(56) => U467_nc(56), ncomp(55) => U467_nc(55),
```

ncomp(54) => U467_nc(54), ncomp(53) => U467_nc(53), ncomp(52) => U467_nc(52), ncomp(51) => U467_nc(51), ncomp(50) => U467_nc(50), ncomp(49) => U467_nc(49), ncomp(48) => U467_nc(48), ncomp(47) => U467_nc(47), ncomp(46) => U467_nc(46), ncomp(45) => U467_nc(45), ncomp(44) => U467_nc(44), ncomp(43) => U467_nc(43), ncomp(42) => U467_nc(42), ncomp(41) => U467_nc(41), ncomp(40) => U467_nc(40), ncomp(39) => U467_nc(39), ncomp(38) => U467_nc(38), ncomp(37) => U467_nc(37), ncomp(36) => U467_nc(36), ncomp(35) => U467_nc(35), ncomp(34) => U467_nc(34), ncomp(33) => U467_nc(33), ncomp(32) => U467_nc(32), ncomp(31) => U467_nc(31), ncomp(30) => U467_nc(30), ncomp(29) => U467_nc(29), ncomp(28) => U467_nc(28), ncomp(27) => U467_nc(27), ncomp(26) => U467_nc(26), ncomp(25) => U467_nc(25), ncomp(24) => U467_nc(24), ncomp(23) => U467_nc(23), ncomp(22) => U467_nc(22), ncomp(21) => U467_nc(21), ncomp(20) => U467_nc(20), ncomp(19) => U467_nc(19), ncomp(18) => U467_nc(18), ncomp(17) => U467_nc(17), ncomp(16) => U467_nc(16), ncomp(15) => U467_nc(15), ncomp(14) => U467_nc(14), ncomp(13) => U467_nc(13), ncomp(12) => U467_nc(12), ncomp(11) => U467_nc(11), ncomp(10) => U467_nc(10), ncomp(9) => U467_nc(9), ncomp(8) => U467_nc(8), ncomp(7) => U467_nc(7), ncomp(6) => U467_nc(6), ncomp(5) => U467_nc(5), ncomp(4) => U467_nc(4), ncomp(3) => U467_nc(3), ncomp(2) => U467_nc(2), ncomp(1) => U467_nc(1), ncomp(0) => U467_nc(0), ncbf => ncbf, cmp => U436_Q, cva => U475_Q, rda => U442_Q, ncba => U586_QN, f(0) => f0_local, f(1) => f1_local, f(2) => f2_local, bl(71) => bl(71), bl(70) => bl(70), bl(69) => bl(69), bl(68) => bl(68), bl(67) => bl(67), bl(66) => bl(66), bl(65) => bl(65), bl(64) => bl(64), bl(63) => bl(63), bl(62) => bl(62), bl(61) => bl(61), bl(60) => bl(60), bl(59) => bl(59), bl(58) => bl(58), bl(57) => bl(57), bl(56) => bl(56), bl(55) => bl(55), bl(54) => bl(54), bl(53) => bl(53), bl(52) => bl(52), bl(51) => bl(51), bl(50) => bl(50), bl(49) => bl(49), bl(48) => bl(48), bl(47) => bl(47), bl(46) => bl(46), bl(45) => bl(45), bl(44) => bl(44), bl(43) => bl(43), bl(42) => bl(42), bl(41) => bl(41), bl(40) => bl(40), bl(39) => bl(39), bl(38) => bl(38), bl(37) => bl(37), bl(36) => bl(36), bl(35) => bl(35), bl(34) => bl(34), bl(33) => bl(33), bl(32) => bl(32), bl(31) => bl(31), bl(30) => bl(30), bl(29) => bl(29), bl(28) => bl(28), bl(27) => bl(27), bl(26) => bl(26), bl(25) => bl(25), bl(24) => bl(24), bl(23) => bl(23), bl(22) => bl(22), bl(21) => bl(21), bl(20) => bl(20), bl(19) => bl(19), bl(18) => bl(18), bl(17) => bl(17), bl(16) => bl(16), bl(15) => bl(15), bl(14) => bl(14), bl(13) => bl(13), bl(12) => bl(12), bl(11) => bl(11), bl(10) => bl(10), bl(9) => bl(9), bl(8) => bl(8), bl(7) => bl(7), bl(6) => bl(6), bl(5) => bl(5), bl(4) => bl(4), bl(3) => bl(3), bl(2) => bl(2), bl(1) => bl(1), bl(0) => bl(0), comp(71) => U467_c(71), comp(70) => U467_c(70), comp(69) =>

```
        U467_c(69), comp(68) => U467_c(68), comp(67) =>
        U467_c(67), comp(66) => U467_c(66), comp(65) =>
        U467_c(65), comp(64) => U467_c(64), comp(63) =>
        U467_c(63), comp(62) => U467_c(62), comp(61) =>
        U467_c(61), comp(60) => U467_c(60), comp(59) =>
        U467_c(59), comp(58) => U467_c(58), comp(57) =>
        U467_c(57), comp(56) => U467_c(56), comp(55) =>
        U467_c(55), comp(54) => U467_c(54), comp(53) =>
        U467_c(53), comp(52) => U467_c(52), comp(51) =>
        U467_c(51), comp(50) => U467_c(50), comp(49) =>
        U467_c(49), comp(48) => U467_c(48), comp(47) =>
        U467_c(47), comp(46) => U467_c(46), comp(45) =>
        U467_c(45), comp(44) => U467_c(44), comp(43) =>
        U467_c(43), comp(42) => U467_c(42), comp(41) =>
        U467_c(41), comp(40) => U467_c(40), comp(39) =>
        U467_c(39), comp(38) => U467_c(38), comp(37) =>
        U467_c(37), comp(36) => U467_c(36), comp(35) =>
        U467_c(35), comp(34) => U467_c(34), comp(33) =>
        U467_c(33), comp(32) => U467_c(32), comp(31) =>
        U467_c(31), comp(30) => U467_c(30), comp(29) =>
        U467_c(29), comp(28) => U467_c(28), comp(27) =>
        U467_c(27), comp(26) => U467_c(26), comp(25) =>
        U467_c(25), comp(24) => U467_c(24), comp(23) =>
        U467_c(23), comp(22) => U467_c(22), comp(21) =>
        U467_c(21), comp(20) => U467_c(20), comp(19) =>
        U467_c(19), comp(18) => U467_c(18), comp(17) =>
        U467_c(17), comp(16) => U467_c(16), comp(15) =>
        U467_c(15), comp(14) => U467_c(14), comp(13) =>
        U467_c(13), comp(12) => U467_c(12), comp(11) =>
        U467_c(11), comp(10) => U467_c(10), comp(9) =>
        U467_c(9), comp(8) => U467_c(8), comp(7) =>
        U467_c(7), comp(6) => U467_c(6), comp(5) =>
        U467_c(5), comp(4) => U467_c(4), comp(3) =>
        U467_c(3), comp(2) => U467_c(2), comp(1) =>
        U467_c(1), comp(0) => U467_c(0), cmpf => VSS,
        rdd(4) => rb(4), rdd(3) => rb(3), rdd(2) => rb(2),
        rdd(1) => rb(1), rdd(0) => rb(0) );

U410: fifo_control
   port map ( fstrobe => U589_Q, rstfifof => rstfifof_local, cvf
        => cvf, ldorf => U410_ldorf, venb => U410_venb,
        ncbf => ncbf, wenf => U410_wenf, nclk => d_c,
        finitf => U410_finitf );

U468: dfctnh
   port map ( D => exc, CP => CLK, CDN => ARESET, Q => U468_Q,
        QN => U468_QN );

U532: foen_con
   port map ( finit => finit, fful => fz, foen => foen );

U394: dfctnb
   port map ( D => setc, CP => CLK, CDN => ARESET, Q => U394_Q,
        QN => U394_QN );

U499: exenc
   port map ( f(0) => f0_local, f(1) => f1_local, f(2) =>
        f2_local, exen => exen );
```

```
U5942: ff_enb2
   port map ( a => U583_Q, clk => CLK, outt => f2_local, rst =>
         ARESET, ld => d(2), nout => U5942_nout );

U5941: ff_enb2
   port map ( a => U583_Q, clk => CLK, outt => f1_local, rst =>
         ARESET, ld => d(1), nout => U5941_nout );

U5940: ff_enb2
   port map ( a => U583_Q, clk => CLK, outt => f0_local, rst =>
         ARESET, ld => d(0), nout => U5940_nout );

U491: fenbcont1
   port map ( fstrobe => U491_fstrobe, rstfifo => rstfifof_local,
         fz => fz, finit => finit, fenb => fenb );

U589: dfctnb
   port map ( D => U491_fstrobe, CP => CLK, CDN => ARESET, Q =>
         U589_Q, QN => U589_QN );

U395: dfctnb
   port map ( D => rstc, CP => CLK, CDN => ARESET, Q => U395_Q,
         QN => U395_QN );

U58123: dfctnb
   port map ( D => vvin(23), CP => CLK, CDN => ARESET, Q =>
         vin(23), QN => U58123_QN );

U58122: dfctnb
   port map ( D => vvin(22), CP => CLK, CDN => ARESET, Q =>
         vin(22), QN => U58122_QN );

U58121: dfctnb
   port map ( D => vvin(21), CP => CLK, CDN => ARESET, Q =>
         vin(21), QN => U58121_QN );

U58120: dfctnb
   port map ( D => vvin(20), CP => CLK, CDN => ARESET, Q =>
         vin(20), QN => U58120_QN );

U58119: dfctnb
   port map ( D => vvin(19), CP => CLK, CDN => ARESET, Q =>
         vin(19), QN => U58119_QN );

U58118: dfctnb
   port map ( D => vvin(18), CP => CLK, CDN => ARESET, Q =>
         vin(18), QN => U58118_QN );

U58117: dfctnb
   port map ( D => vvin(17), CP => CLK, CDN => ARESET, Q =>
         vin(17), QN => U58117_QN );

U58116: dfctnb
   port map ( D => vvin(16), CP => CLK, CDN => ARESET, Q =>
         vin(16), QN => U58116_QN );

U58115: dfctnb
```

```
  port map ( D => vvin(15), CP => CLK, CDN => ARESET, Q =>
       vin(15), QN => U58115_QN );

U58114: dfctnb
  port map ( D => vvin(14), CP => CLK, CDN => ARESET, Q =>
       vin(14), QN => U58114_QN );

U58113: dfctnb
  port map ( D => vvin(13), CP => CLK, CDN => ARESET, Q =>
       vin(13), QN => U58113_QN );

U58112: dfctnb
  port map ( D => vvin(12), CP => CLK, CDN => ARESET, Q =>
       vin(12), QN => U58112_QN );

U58111: dfctnb
  port map ( D => vvin(11), CP => CLK, CDN => ARESET, Q =>
       vin(11), QN => U58111_QN );

U58110: dfctnb
  port map ( D => vvin(10), CP => CLK, CDN => ARESET, Q =>
       vin(10), QN => U58110_QN );

U5819: dfctnb
  port map ( D => vvin(9), CP => CLK, CDN => ARESET, Q =>
       vin(9), QN => U5819_QN );

U5818: dfctnb
  port map ( D => vvin(8), CP => CLK, CDN => ARESET, Q =>
       vin(8), QN => U5818_QN );

U5817: dfctnb
  port map ( D => vvin(7), CP => CLK, CDN => ARESET, Q =>
       vin(7), QN => U5817_QN );

U5816: dfctnb
  port map ( D => vvin(6), CP => CLK, CDN => ARESET, Q =>
       vin(6), QN => U5816_QN );

U5815: dfctnb
  port map ( D => vvin(5), CP => CLK, CDN => ARESET, Q =>
       vin(5), QN => U5815_QN );

U5814: dfctnb
  port map ( D => vvin(4), CP => CLK, CDN => ARESET, Q =>
       vin(4), QN => U5814_QN );

U5813: dfctnb
  port map ( D => vvin(3), CP => CLK, CDN => ARESET, Q =>
       vin(3), QN => U5813_QN );

U5812: dfctnb
  port map ( D => vvin(2), CP => CLK, CDN => ARESET, Q =>
       vin(2), QN => U5812_QN );

U5811: dfctnb
  port map ( D => vvin(1), CP => CLK, CDN => ARESET, Q =>
       vin(1), QN => U5811_QN );
```

```
U5810: dfctnb
  port map ( D => vvin(0), CP => CLK, CDN => ARESET, Q =>
        vin(0), QN => U5810_QN );

U583: dfctnb
  port map ( D => LdFifoConf, CP => CLK, CDN => ARESET, Q =>
        U583_Q, QN => U583_QN );

U334: nd02d2
  port map ( A1 => U332_ZN, A2 => U504_wenb, ZN => wenb );

U442: dfctnb
  port map ( D => U441_Q, CP => CLK, CDN => ARESET, Q => U442_Q,
        QN => U442_QN );

U504: we_new
  port map ( wenb => U504_wenb, we => U424_Q );

U441: dfctnb
  port map ( D => rda, CP => CLK, CDN => ARESET, Q => U441_Q,
        QN => U441_QN );

U48971: bufer
  port map ( a => U593_c(71), b => mask(71) );

U48970: bufer
  port map ( a => U593_c(70), b => mask(70) );

U48969: bufer
  port map ( a => U593_c(69), b => mask(69) );

U48968: bufer
  port map ( a => U593_c(68), b => mask(68) );

U48967: bufer
  port map ( a => U593_c(67), b => mask(67) );

U48966: bufer
  port map ( a => U593_c(66), b => mask(66) );

U48965: bufer
  port map ( a => U593_c(65), b => mask(65) );

U48964: bufer
  port map ( a => U593_c(64), b => mask(64) );

U48963: bufer
  port map ( a => U593_c(63), b => mask(63) );

U48962: bufer
  port map ( a => U593_c(62), b => mask(62) );

U48961: bufer
  port map ( a => U593_c(61), b => mask(61) );

U48960: bufer
  port map ( a => U593_c(60), b => mask(60) );
```

```
U48959: bufer
  port map ( a => U593_c(59), b => mask(59) );

U48958: bufer
  port map ( a => U593_c(58), b => mask(58) );

U48957: bufer
  port map ( a => U593_c(57), b => mask(57) );

U48956: bufer
  port map ( a => U593_c(56), b => mask(56) );

U48955: bufer
  port map ( a => U593_c(55), b => mask(55) );

U48954: bufer
  port map ( a => U593_c(54), b => mask(54) );

U48953: bufer
  port map ( a => U593_c(53), b => mask(53) );

U48952: bufer
  port map ( a => U593_c(52), b => mask(52) );

U48951: bufer
  port map ( a => U593_c(51), b => mask(51) );

U48950: bufer
  port map ( a => U593_c(50), b => mask(50) );

U48949: bufer
  port map ( a => U593_c(49), b => mask(49) );

U48948: bufer
  port map ( a => U593_c(48), b => mask(48) );

U48947: bufer
  port map ( a => U593_c(47), b => mask(47) );

U48946: bufer
  port map ( a => U593_c(46), b => mask(46) );

U48945: bufer
  port map ( a => U593_c(45), b => mask(45) );

U48944: bufer
  port map ( a => U593_c(44), b => mask(44) );

U48943: bufer
  port map ( a => U593_c(43), b => mask(43) );

U48942: bufer
  port map ( a => U593_c(42), b => mask(42) );

U48941: bufer
  port map ( a => U593_c(41), b => mask(41) );
```

```
U48940: bufer
   port map ( a => U593_c(40), b => mask(40) );

U48939: bufer
   port map ( a => U593_c(39), b => mask(39) );

U48938: bufer
   port map ( a => U593_c(38), b => mask(38) );

U48937: bufer
   port map ( a => U593_c(37), b => mask(37) );

U48936: bufer
   port map ( a => U593_c(36), b => mask(36) );

U48935: bufer
   port map ( a => U593_c(35), b => mask(35) );

U48934: bufer
   port map ( a => U593_c(34), b => mask(34) );

U48933: bufer
   port map ( a => U593_c(33), b => mask(33) );

U48932: bufer
   port map ( a => U593_c(32), b => mask(32) );

U48931: bufer
   port map ( a => U593_c(31), b => mask(31) );

U48930: bufer
   port map ( a => U593_c(30), b => mask(30) );

U48929: bufer
   port map ( a => U593_c(29), b => mask(29) );

U48928: bufer
   port map ( a => U593_c(28), b => mask(28) );

U48927: bufer
   port map ( a => U593_c(27), b => mask(27) );

U48926: bufer
   port map ( a => U593_c(26), b => mask(26) );

U48925: bufer
   port map ( a => U593_c(25), b => mask(25) );

U48924: bufer
   port map ( a => U593_c(24), b => mask(24) );

U48923: bufer
   port map ( a => U593_c(23), b => mask(23) );

U48922: bufer
   port map ( a => U593_c(22), b => mask(22) );

U48921: bufer
```

```
   port map ( a => U593_c(21), b => mask(21) );

U48920: bufer
   port map ( a => U593_c(20), b => mask(20) );

U48919: bufer
   port map ( a => U593_c(19), b => mask(19) );

U48918: bufer
   port map ( a => U593_c(18), b => mask(18) );

U48917: bufer
   port map ( a => U593_c(17), b => mask(17) );

U48916: bufer
   port map ( a => U593_c(16), b => mask(16) );

U48915: bufer
   port map ( a => U593_c(15), b => mask(15) );

U48914: bufer
   port map ( a => U593_c(14), b => mask(14) );

U48913: bufer
   port map ( a => U593_c(13), b => mask(13) );

U48912: bufer
   port map ( a => U593_c(12), b => mask(12) );

U48911: bufer
   port map ( a => U593_c(11), b => mask(11) );

U48910: bufer
   port map ( a => U593_c(10), b => mask(10) );

U4899: bufer
   port map ( a => U593_c(9), b => mask(9) );

U4898: bufer
   port map ( a => U593_c(8), b => mask(8) );

U4897: bufer
   port map ( a => U593_c(7), b => mask(7) );

U4896: bufer
   port map ( a => U593_c(6), b => mask(6) );

U4895: bufer
   port map ( a => U593_c(5), b => mask(5) );

U4894: bufer
   port map ( a => U593_c(4), b => mask(4) );

U4893: bufer
   port map ( a => U593_c(3), b => mask(3) );

U4892: bufer
   port map ( a => U593_c(2), b => mask(2) );
```

```
U4891: bufer
   port map ( a => U593_c(1), b => mask(1) );

U4890: bufer
   port map ( a => U593_c(0), b => mask(0) );

U523: an02d2
   port map ( A1 => U436_Q, A2 => U517_Q, Z => msaen );

U336: compmux5
   port map ( rdf => rdf, cvf => cvf, mask(71) => U593_c(71),
         mask(70) => U593_c(70), mask(69) => U593_c(69),
         mask(68) => U593_c(68), mask(67) => U593_c(67),
         mask(66) => U593_c(66), mask(65) => U593_c(65),
         mask(64) => U593_c(64), mask(63) => U593_c(63),
         mask(62) => U593_c(62), mask(61) => U593_c(61),
         mask(60) => U593_c(60), mask(59) => U593_c(59),
         mask(58) => U593_c(58), mask(57) => U593_c(57),
         mask(56) => U593_c(56), mask(55) => U593_c(55),
         mask(54) => U593_c(54), mask(53) => U593_c(53),
         mask(52) => U593_c(52), mask(51) => U593_c(51),
         mask(50) => U593_c(50), mask(49) => U593_c(49),
         mask(48) => U593_c(48), mask(47) => U593_c(47),
         mask(46) => U593_c(46), mask(45) => U593_c(45),
         mask(44) => U593_c(44), mask(43) => U593_c(43),
         mask(42) => U593_c(42), mask(41) => U593_c(41),
         mask(40) => U593_c(40), mask(39) => U593_c(39),
         mask(38) => U593_c(38), mask(37) => U593_c(37),
         mask(36) => U593_c(36), mask(35) => U593_c(35),
         mask(34) => U593_c(34), mask(33) => U593_c(33),
         mask(32) => U593_c(32), mask(31) => U593_c(31),
         mask(30) => U593_c(30), mask(29) => U593_c(29),
         mask(28) => U593_c(28), mask(27) => U593_c(27),
         mask(26) => U593_c(26), mask(25) => U593_c(25),
         mask(24) => U593_c(24), mask(23) => U593_c(23),
         mask(22) => U593_c(22), mask(21) => U593_c(21),
         mask(20) => U593_c(20), mask(19) => U593_c(19),
         mask(18) => U593_c(18), mask(17) => U593_c(17),
         mask(16) => U593_c(16), mask(15) => U593_c(15),
         mask(14) => U593_c(14), mask(13) => U593_c(13),
         mask(12) => U593_c(12), mask(11) => U593_c(11),
         mask(10) => U593_c(10), mask(9) => U593_c(9),
         mask(8) => U593_c(8), mask(7) => U593_c(7),
         mask(6) => U593_c(6), mask(5) => U593_c(5),
         mask(4) => U593_c(4), mask(3) => U593_c(3),
         mask(2) => U593_c(2), mask(1) => U593_c(1),
         mask(0) => U593_c(0), ncomp(71) => U467_c(71),
         ncomp(70) => U467_c(70), ncomp(69) => U467_c(69),
         ncomp(68) => U467_c(68), ncomp(67) => U467_c(67),
         ncomp(66) => U467_c(66), ncomp(65) => U467_c(65),
         ncomp(64) => U467_c(64), ncomp(63) => U467_c(63),
         ncomp(62) => U467_c(62), ncomp(61) => U467_c(61),
         ncomp(60) => U467_c(60), ncomp(59) => U467_c(59),
         ncomp(58) => U467_c(58), ncomp(57) => U467_c(57),
         ncomp(56) => U467_c(56), ncomp(55) => U467_c(55),
         ncomp(54) => U467_c(54), ncomp(53) => U467_c(53),
         ncomp(52) => U467_c(52), ncomp(51) => U467_c(51),
```

ncomp(50) => U467_c(50), ncomp(49) => U467_c(49), ncomp(48) => U467_c(48), ncomp(47) => U467_c(47), ncomp(46) => U467_c(46), ncomp(45) => U467_c(45), ncomp(44) => U467_c(44), ncomp(43) => U467_c(43), ncomp(42) => U467_c(42), ncomp(41) => U467_c(41), ncomp(40) => U467_c(40), ncomp(39) => U467_c(39), ncomp(38) => U467_c(38), ncomp(37) => U467_c(37), ncomp(36) => U467_c(36), ncomp(35) => U467_c(35), ncomp(34) => U467_c(34), ncomp(33) => U467_c(33), ncomp(32) => U467_c(32), ncomp(31) => U467_c(31), ncomp(30) => U467_c(30), ncomp(29) => U467_c(29), ncomp(28) => U467_c(28), ncomp(27) => U467_c(27), ncomp(26) => U467_c(26), ncomp(25) => U467_c(25), ncomp(24) => U467_c(24), ncomp(23) => U467_c(23), ncomp(22) => U467_c(22), ncomp(21) => U467_c(21), ncomp(20) => U467_c(20), ncomp(19) => U467_c(19), ncomp(18) => U467_c(18), ncomp(17) => U467_c(17), ncomp(16) => U467_c(16), ncomp(15) => U467_c(15), ncomp(14) => U467_c(14), ncomp(13) => U467_c(13), ncomp(12) => U467_c(12), ncomp(11) => U467_c(11), ncomp(10) => U467_c(10), ncomp(9) => U467_c(9), ncomp(8) => U467_c(8), ncomp(7) => U467_c(7), ncomp(6) => U467_c(6), ncomp(5) => U467_c(5), ncomp(4) => U467_c(4), ncomp(3) => U467_c(3), ncomp(2) => U467_c(2), ncomp(1) => U467_c(1), ncomp(0) => U467_c(0), ncbf => ncbf, cmp => U436_Q, cva => U475_Q, rda => U442_Q, ncba => U586_QN, f(0) => f0_local, f(1) => f1_local, f(2) => f2_local, bl(71) => ibl(71), bl(70) => ibl(70), bl(69) => ibl(69), bl(68) => ibl(68), bl(67) => ibl(67), bl(66) => ibl(66), bl(65) => ibl(65), bl(64) => ibl(64), bl(63) => ibl(63), bl(62) => ibl(62), bl(61) => ibl(61), bl(60) => ibl(60), bl(59) => ibl(59), bl(58) => ibl(58), bl(57) => ibl(57), bl(56) => ibl(56), bl(55) => ibl(55), bl(54) => ibl(54), bl(53) => ibl(53), bl(52) => ibl(52), bl(51) => ibl(51), bl(50) => ibl(50), bl(49) => ibl(49), bl(48) => ibl(48), bl(47) => ibl(47), bl(46) => ibl(46), bl(45) => ibl(45), bl(44) => ibl(44), bl(43) => ibl(43), bl(42) => ibl(42), bl(41) => ibl(41), bl(40) => ibl(40), bl(39) => ibl(39), bl(38) => ibl(38), bl(37) => ibl(37), bl(36) => ibl(36), bl(35) => ibl(35), bl(34) => ibl(34), bl(33) => ibl(33), bl(32) => ibl(32), bl(31) => ibl(31), bl(30) => ibl(30), bl(29) => ibl(29), bl(28) => ibl(28), bl(27) => ibl(27), bl(26) => ibl(26), bl(25) => ibl(25), bl(24) => ibl(24), bl(23) => ibl(23), bl(22) => ibl(22), bl(21) => ibl(21), bl(20) => ibl(20), bl(19) => ibl(19), bl(18) => ibl(18), bl(17) => ibl(17), bl(16) => ibl(16), bl(15) => ibl(15), bl(14) => ibl(14), bl(13) => ibl(13), bl(12) => ibl(12), bl(11) => ibl(11), bl(10) => ibl(10), bl(9) => ibl(9), bl(8) => ibl(8), bl(7) => ibl(7), bl(6) => ibl(6), bl(5) => ibl(5), bl(4) => ibl(4), bl(3) => ibl(3), bl(2) => ibl(2), bl(1) => ibl(1), bl(0) => ibl(0), comp(71) => U467_nc(71), comp(70) => U467_nc(70), comp(69) => U467_nc(69), comp(68)

```
        => U467_nc(68), comp(67) => U467_nc(67), comp(66)
        => U467_nc(66), comp(65) => U467_nc(65), comp(64)
        => U467_nc(64), comp(63) => U467_nc(63), comp(62)
        => U467_nc(62), comp(61) => U467_nc(61), comp(60)
        => U467_nc(60), comp(59) => U467_nc(59), comp(58)
        => U467_nc(58), comp(57) => U467_nc(57), comp(56)
        => U467_nc(56), comp(55) => U467_nc(55), comp(54)
        => U467_nc(54), comp(53) => U467_nc(53), comp(52)
        => U467_nc(52), comp(51) => U467_nc(51), comp(50)
        => U467_nc(50), comp(49) => U467_nc(49), comp(48)
        => U467_nc(48), comp(47) => U467_nc(47), comp(46)
        => U467_nc(46), comp(45) => U467_nc(45), comp(44)
        => U467_nc(44), comp(43) => U467_nc(43), comp(42)
        => U467_nc(42), comp(41) => U467_nc(41), comp(40)
        => U467_nc(40), comp(39) => U467_nc(39), comp(38)
        => U467_nc(38), comp(37) => U467_nc(37), comp(36)
        => U467_nc(36), comp(35) => U467_nc(35), comp(34)
        => U467_nc(34), comp(33) => U467_nc(33), comp(32)
        => U467_nc(32), comp(31) => U467_nc(31), comp(30)
        => U467_nc(30), comp(29) => U467_nc(29), comp(28)
        => U467_nc(28), comp(27) => U467_nc(27), comp(26)
        => U467_nc(26), comp(25) => U467_nc(25), comp(24)
        => U467_nc(24), comp(23) => U467_nc(23), comp(22)
        => U467_nc(22), comp(21) => U467_nc(21), comp(20)
        => U467_nc(20), comp(19) => U467_nc(19), comp(18)
        => U467_nc(18), comp(17) => U467_nc(17), comp(16)
        => U467_nc(16), comp(15) => U467_nc(15), comp(14)
        => U467_nc(14), comp(13) => U467_nc(13), comp(12)
        => U467_nc(12), comp(11) => U467_nc(11), comp(10)
        => U467_nc(10), comp(9) => U467_nc(9), comp(8) =>
        U467_nc(8), comp(7) => U467_nc(7), comp(6) =>
        U467_nc(6), comp(5) => U467_nc(5), comp(4) =>
        U467_nc(4), comp(3) => U467_nc(3), comp(2) =>
        U467_nc(2), comp(1) => U467_nc(1), comp(0) =>
        U467_nc(0), cmpf => VSS, rdd(4) => U336_rdd(4),
        rdd(3) => U336_rdd(3), rdd(2) => U336_rdd(2),
        rdd(1) => U336_rdd(1), rdd(0) => U336_rdd(0) );

U424: dfctnb
   port map ( D => U426_Q, CP => CLK, CDN => ARESET, Q => U424_Q,
        QN => U424_QN );

U426: dfctnb
   port map ( D => we, CP => CLK, CDN => ARESET, Q => U426_Q, QN
        => U426_QN );

U332: nd02d1
   port map ( A1 => U424_Q, A2 => U442_QN, ZN => U332_ZN );

U450: dfctnb
   port map ( D => setag, CP => CLK, CDN => ARESET, Q => U450_Q,
        QN => U450_QN );

U337: nd02d2
   port map ( A1 => DCLK, A2 => U451_Q, ZN => setagt );

U451: dfctnb
   port map ( D => U450_Q, CP => CLK, CDN => ARESET, Q => U451_Q,
```

```
        QN => U451_QN );

U552: dfctnb
   port map ( D => selr_s, CP => CLK, CDN => ARESET, Q => U552_Q,
        QN => U552_QN );

U553: dfctnb
   port map ( D => U552_Q, CP => CLK, CDN => ARESET, Q =>
        selr_st, QN => U553_QN );

U5352: dfctnb
   port map ( D => U5342_Q, CP => CLK, CDN => ARESET, Q =>
        muxt2_local, QN => U5352_QN );

U5351: dfctnb
   port map ( D => U5341_Q, CP => CLK, CDN => ARESET, Q =>
        muxt1_local, QN => U5351_QN );

U5350: dfctnb
   port map ( D => U5340_Q, CP => CLK, CDN => ARESET, Q =>
        muxt0_local, QN => U5350_QN );

U536: dfctnb
   port map ( D => rstaddr, CP => CLK, CDN => ARESET, Q =>
        U536_Q, QN => U536_QN );

U5342: dfctnb
   port map ( D => mux(2), CP => CLK, CDN => ARESET, Q =>
        U5342_Q, QN => U5342_QN );

U5341: dfctnb
   port map ( D => mux(1), CP => CLK, CDN => ARESET, Q =>
        U5341_Q, QN => U5341_QN );

U5340: dfctnb
   port map ( D => mux(0), CP => CLK, CDN => ARESET, Q =>
        U5340_Q, QN => U5340_QN );

U57723: dfctnb
   port map ( D => U57623_Q, CP => CLK, CDN => ARESET, Q =>
        d(23), QN => U57723_QN );

U57722: dfctnb
   port map ( D => U57622_Q, CP => CLK, CDN => ARESET, Q =>
        d(22), QN => U57722_QN );

U57721: dfctnb
   port map ( D => U57621_Q, CP => CLK, CDN => ARESET, Q =>
        d(21), QN => U57721_QN );

U57720: dfctnb
   port map ( D => U57620_Q, CP => CLK, CDN => ARESET, Q =>
        d(20), QN => U57720_QN );

U57719: dfctnb
   port map ( D => U57619_Q, CP => CLK, CDN => ARESET, Q =>
        d(19), QN => U57719_QN );
```

```
U57718: dfctnb
   port map ( D => U57618_Q, CP => CLK, CDN => ARESET, Q =>
         d(18), QN => U57718_QN );

U57717: dfctnb
   port map ( D => U57617_Q, CP => CLK, CDN => ARESET, Q =>
         d(17), QN => U57717_QN );

U57716: dfctnb
   port map ( D => U57616_Q, CP => CLK, CDN => ARESET, Q =>
         d(16), QN => U57716_QN );

U57715: dfctnb
   port map ( D => U57615_Q, CP => CLK, CDN => ARESET, Q =>
         d(15), QN => U57715_QN );

U57714: dfctnb
   port map ( D => U57614_Q, CP => CLK, CDN => ARESET, Q =>
         d(14), QN => U57714_QN );

U57713: dfctnb
   port map ( D => U57613_Q, CP => CLK, CDN => ARESET, Q =>
         d(13), QN => U57713_QN );

U57712: dfctnb
   port map ( D => U57612_Q, CP => CLK, CDN => ARESET, Q =>
         d(12), QN => U57712_QN );

U57711: dfctnb
   port map ( D => U57611_Q, CP => CLK, CDN => ARESET, Q =>
         d(11), QN => U57711_QN );

U57710: dfctnb
   port map ( D => U57610_Q, CP => CLK, CDN => ARESET, Q =>
         d(10), QN => U57710_QN );

U5779: dfctnb
   port map ( D => U5769_Q, CP => CLK, CDN => ARESET, Q => d(9),
         QN => U5779_QN );

U5778: dfctnb
   port map ( D => U5768_Q, CP => CLK, CDN => ARESET, Q => d(8),
         QN => U5778_QN );

U5777: dfctnb
   port map ( D => U5767_Q, CP => CLK, CDN => ARESET, Q => d(7),
         QN => U5777_QN );

U5776: dfctnb
   port map ( D => U5766_Q, CP => CLK, CDN => ARESET, Q => d(6),
         QN => U5776_QN );

U5775: dfctnb
   port map ( D => U5765_Q, CP => CLK, CDN => ARESET, Q => d(5),
         QN => U5775_QN );

U5774: dfctnb
   port map ( D => U5764_Q, CP => CLK, CDN => ARESET, Q => d(4),
```

```
        QN => U5774_QN );

U5773: dfctnb
   port map ( D => U5763_Q, CP => CLK, CDN => ARESET, Q => d(3),
        QN => U5773_QN );

U5772: dfctnb
   port map ( D => U5762_Q, CP => CLK, CDN => ARESET, Q => d(2),
        QN => U5772_QN );

U5771: dfctnb
   port map ( D => U5761_Q, CP => CLK, CDN => ARESET, Q => d(1),
        QN => U5771_QN );

U5770: dfctnb
   port map ( D => U5760_Q, CP => CLK, CDN => ARESET, Q => d(0),
        QN => U5770_QN );

U374: dfctnb
   port map ( D => ex, CP => CLK, CDN => ARESET, Q => U374_Q, QN
        => U374_QN );

U376: dfctnb
   port map ( D => setM, CP => CLK, CDN => ARESET, Q => U376_Q,
        QN => U376_QN );

U560: dfctnb
   port map ( D => LdM, CP => CLK, CDN => ARESET, Q => U560_Q,
        QN => U560_QN );

U421: nd02d2
   port map ( A1 => U537_Q, A2 => U543_Q, ZN => rstaddrt );

U593: mask_reg
   port map ( load => U560_Q, clk => CLK, c(71) => U593_c(71),
        c(70) => U593_c(70), c(69) => U593_c(69), c(68) =>
        U593_c(68), c(67) => U593_c(67), c(66) =>
        U593_c(66), c(65) => U593_c(65), c(64) =>
        U593_c(64), c(63) => U593_c(63), c(62) =>
        U593_c(62), c(61) => U593_c(61), c(60) =>
        U593_c(60), c(59) => U593_c(59), c(58) =>
        U593_c(58), c(57) => U593_c(57), c(56) =>
        U593_c(56), c(55) => U593_c(55), c(54) =>
        U593_c(54), c(53) => U593_c(53), c(52) =>
        U593_c(52), c(51) => U593_c(51), c(50) =>
        U593_c(50), c(49) => U593_c(49), c(48) =>
        U593_c(48), c(47) => U593_c(47), c(46) =>
        U593_c(46), c(45) => U593_c(45), c(44) =>
        U593_c(44), c(43) => U593_c(43), c(42) =>
        U593_c(42), c(41) => U593_c(41), c(40) =>
        U593_c(40), c(39) => U593_c(39), c(38) =>
        U593_c(38), c(37) => U593_c(37), c(36) =>
        U593_c(36), c(35) => U593_c(35), c(34) =>
        U593_c(34), c(33) => U593_c(33), c(32) =>
        U593_c(32), c(31) => U593_c(31), c(30) =>
        U593_c(30), c(29) => U593_c(29), c(28) =>
        U593_c(28), c(27) => U593_c(27), c(26) =>
        U593_c(26), c(25) => U593_c(25), c(24) =>
```

U593_c(24), c(23) => U593_c(23), c(22) =>
U593_c(22), c(21) => U593_c(21), c(20) =>
U593_c(20), c(19) => U593_c(19), c(18) =>
U593_c(18), c(17) => U593_c(17), c(16) =>
U593_c(16), c(15) => U593_c(15), c(14) =>
U593_c(14), c(13) => U593_c(13), c(12) =>
U593_c(12), c(11) => U593_c(11), c(10) =>
U593_c(10), c(9) => U593_c(9), c(8) => U593_c(8),
c(7) => U593_c(7), c(6) => U593_c(6), c(5) =>
U593_c(5), c(4) => U593_c(4), c(3) => U593_c(3),
c(2) => U593_c(2), c(1) => U593_c(1), c(0) =>
U593_c(0), set => U376_Q, rst => U378_Q, nc(71) =>
U593_nc(71), nc(70) => U593_nc(70), nc(69) =>
U593_nc(69), nc(68) => U593_nc(68), nc(67) =>
U593_nc(67), nc(66) => U593_nc(66), nc(65) =>
U593_nc(65), nc(64) => U593_nc(64), nc(63) =>
U593_nc(63), nc(62) => U593_nc(62), nc(61) =>
U593_nc(61), nc(60) => U593_nc(60), nc(59) =>
U593_nc(59), nc(58) => U593_nc(58), nc(57) =>
U593_nc(57), nc(56) => U593_nc(56), nc(55) =>
U593_nc(55), nc(54) => U593_nc(54), nc(53) =>
U593_nc(53), nc(52) => U593_nc(52), nc(51) =>
U593_nc(51), nc(50) => U593_nc(50), nc(49) =>
U593_nc(49), nc(48) => U593_nc(48), nc(47) =>
U593_nc(47), nc(46) => U593_nc(46), nc(45) =>
U593_nc(45), nc(44) => U593_nc(44), nc(43) =>
U593_nc(43), nc(42) => U593_nc(42), nc(41) =>
U593_nc(41), nc(40) => U593_nc(40), nc(39) =>
U593_nc(39), nc(38) => U593_nc(38), nc(37) =>
U593_nc(37), nc(36) => U593_nc(36), nc(35) =>
U593_nc(35), nc(34) => U593_nc(34), nc(33) =>
U593_nc(33), nc(32) => U593_nc(32), nc(31) =>
U593_nc(31), nc(30) => U593_nc(30), nc(29) =>
U593_nc(29), nc(28) => U593_nc(28), nc(27) =>
U593_nc(27), nc(26) => U593_nc(26), nc(25) =>
U593_nc(25), nc(24) => U593_nc(24), nc(23) =>
U593_nc(23), nc(22) => U593_nc(22), nc(21) =>
U593_nc(21), nc(20) => U593_nc(20), nc(19) =>
U593_nc(19), nc(18) => U593_nc(18), nc(17) =>
U593_nc(17), nc(16) => U593_nc(16), nc(15) =>
U593_nc(15), nc(14) => U593_nc(14), nc(13) =>
U593_nc(13), nc(12) => U593_nc(12), nc(11) =>
U593_nc(11), nc(10) => U593_nc(10), nc(9) =>
U593_nc(9), nc(8) => U593_nc(8), nc(7) =>
U593_nc(7), nc(6) => U593_nc(6), nc(5) =>
U593_nc(5), nc(4) => U593_nc(4), nc(3) =>
U593_nc(3), nc(2) => U593_nc(2), nc(1) =>
U593_nc(1), nc(0) => U593_nc(0), s0 => s0_local,
s1 => s1_local, fstrobe => U589_Q, f(0) =>
f0_local, f(1) => f1_local, f(2) => f2_local,
d(23) => d(23), d(22) => d(22), d(21) => d(21),
d(20) => d(20), d(19) => d(19), d(18) => d(18),
d(17) => d(17), d(16) => d(16), d(15) => d(15),
d(14) => d(14), d(13) => d(13), d(12) => d(12),
d(11) => d(11), d(10) => d(10), d(9) => d(9), d(8)
=> d(8), d(7) => d(7), d(6) => d(6), d(5) => d(5),
d(4) => d(4), d(3) => d(3), d(2) => d(2), d(1) =>
d(1), d(0) => d(0), ex => U374_Q );

```
U5911: dfctnb
  port map ( D => sct(1), CP => CLK, CDN => ARESET, Q =>
        s1_local, QN => U5911_QN );

U5910: dfctnb
  port map ( D => sct(0), CP => CLK, CDN => ARESET, Q =>
        s0_local, QN => U5910_QN );

U549: dfctnb
  port map ( D => U548_Q, CP => CLK, CDN => ARESET, Q => ldort,
        QN => U549_QN );

U550: dfctnb
  port map ( D => prsp, CP => CLK, CDN => ARESET, Q => U550_Q,
        QN => U550_QN );

U548: dfctnb
  port map ( D => ldor, CP => CLK, CDN => ARESET, Q => U548_Q,
        QN => U548_QN );

U551: dfctnb
  port map ( D => U550_Q, CP => CLK, CDN => ARESET, Q => prspt,
        QN => U551_QN );

U542: dfctnb
  port map ( D => sinit, CP => CLK, CDN => ARESET, Q => U542_Q,
        QN => U542_QN );

U537: dfctnb
  port map ( D => U536_Q, CP => CLK, CDN => ARESET, Q => U537_Q,
        QN => U537_QN );

U544: dfctnb
  port map ( D => U542_Q, CP => CLK, CDN => ARESET, Q => sinitt,
        QN => U544_QN );

U543: dfctnb
  port map ( D => U537_Q, CP => DCLK, CDN => ARESET, Q =>
        U543_Q, QN => U543_QN );

U57523: dfctnb
  port map ( D => dd(23), CP => CLK, CDN => ARESET, Q =>
        ddec(23), QN => U57523_QN );

U57522: dfctnb
  port map ( D => dd(22), CP => CLK, CDN => ARESET, Q =>
        ddec(22), QN => U57522_QN );

U57521: dfctnb
  port map ( D => dd(21), CP => CLK, CDN => ARESET, Q =>
        ddec(21), QN => U57521_QN );

U57520: dfctnb
  port map ( D => dd(20), CP => CLK, CDN => ARESET, Q =>
        ddec(20), QN => U57520_QN );

U57519: dfctnb
```

```
  port map ( D => dd(19), CP => CLK, CDN => ARESET, Q =>
        ddec(19), QN => U57519_QN );

U57518: dfctnb
  port map ( D => dd(18), CP => CLK, CDN => ARESET, Q =>
        ddec(18), QN => U57518_QN );

U57517: dfctnb
  port map ( D => dd(17), CP => CLK, CDN => ARESET, Q =>
        ddec(17), QN => U57517_QN );

U57516: dfctnb
  port map ( D => dd(16), CP => CLK, CDN => ARESET, Q =>
        ddec(16), QN => U57516_QN );

U57515: dfctnb
  port map ( D => dd(15), CP => CLK, CDN => ARESET, Q =>
        ddec(15), QN => U57515_QN );

U57514: dfctnb
  port map ( D => dd(14), CP => CLK, CDN => ARESET, Q =>
        ddec(14), QN => U57514_QN );

U57513: dfctnb
  port map ( D => dd(13), CP => CLK, CDN => ARESET, Q =>
        ddec(13), QN => U57513_QN );

U57512: dfctnb
  port map ( D => dd(12), CP => CLK, CDN => ARESET, Q =>
        ddec(12), QN => U57512_QN );

U57511: dfctnb
  port map ( D => dd(11), CP => CLK, CDN => ARESET, Q =>
        ddec(11), QN => U57511_QN );

U57510: dfctnb
  port map ( D => dd(10), CP => CLK, CDN => ARESET, Q =>
        ddec(10), QN => U57510_QN );

U5759: dfctnb
  port map ( D => dd(9), CP => CLK, CDN => ARESET, Q => ddec(9),
        QN => U5759_QN );

U5758: dfctnb
  port map ( D => dd(8), CP => CLK, CDN => ARESET, Q => ddec(8),
        QN => U5758_QN );

U5757: dfctnb
  port map ( D => dd(7), CP => CLK, CDN => ARESET, Q => ddec(7),
        QN => U5757_QN );

U5756: dfctnb
  port map ( D => dd(6), CP => CLK, CDN => ARESET, Q => ddec(6),
        QN => U5756_QN );

U5755: dfctnb
  port map ( D => dd(5), CP => CLK, CDN => ARESET, Q => ddec(5),
        QN => U5755_QN );
```

```
U5754: dfctnb
   port map ( D => dd(4), CP => CLK, CDN => ARESET, Q => ddec(4),
         QN => U5754_QN );

U5753: dfctnb
   port map ( D => dd(3), CP => CLK, CDN => ARESET, Q => ddec(3),
         QN => U5753_QN );

U5752: dfctnb
   port map ( D => dd(2), CP => CLK, CDN => ARESET, Q => ddec(2),
         QN => U5752_QN );

U5751: dfctnb
   port map ( D => dd(1), CP => CLK, CDN => ARESET, Q => ddec(1),
         QN => U5751_QN );

U5750: dfctnb
   port map ( D => dd(0), CP => CLK, CDN => ARESET, Q => ddec(0),
         QN => U5750_QN );

U57623: dfctnb
   port map ( D => ddec(23), CP => CLK, CDN => ARESET, Q =>
         U57623_Q, QN => U57623_QN );

U57622: dfctnb
   port map ( D => ddec(22), CP => CLK, CDN => ARESET, Q =>
         U57622_Q, QN => U57622_QN );

U57621: dfctnb
   port map ( D => ddec(21), CP => CLK, CDN => ARESET, Q =>
         U57621_Q, QN => U57621_QN );

U57620: dfctnb
   port map ( D => ddec(20), CP => CLK, CDN => ARESET, Q =>
         U57620_Q, QN => U57620_QN );

U57619: dfctnb
   port map ( D => ddec(19), CP => CLK, CDN => ARESET, Q =>
         U57619_Q, QN => U57619_QN );

U57618: dfctnb
   port map ( D => ddec(18), CP => CLK, CDN => ARESET, Q =>
         U57618_Q, QN => U57618_QN );

U57617: dfctnb
   port map ( D => ddec(17), CP => CLK, CDN => ARESET, Q =>
         U57617_Q, QN => U57617_QN );

U57616: dfctnb
   port map ( D => ddec(16), CP => CLK, CDN => ARESET, Q =>
         U57616_Q, QN => U57616_QN );

U57615: dfctnb
   port map ( D => ddec(15), CP => CLK, CDN => ARESET, Q =>
         U57615_Q, QN => U57615_QN );

U57614: dfctnb
```

```
   port map ( D => ddec(14), CP => CLK, CDN => ARESET, Q =>
        U57614_Q, QN => U57614_QN );

U57613: dfctnb
   port map ( D => ddec(13), CP => CLK, CDN => ARESET, Q =>
        U57613_Q, QN => U57613_QN );

U57612: dfctnb
   port map ( D => ddec(12), CP => CLK, CDN => ARESET, Q =>
        U57612_Q, QN => U57612_QN );

U57611: dfctnb
   port map ( D => ddec(11), CP => CLK, CDN => ARESET, Q =>
        U57611_Q, QN => U57611_QN );

U57610: dfctnb
   port map ( D => ddec(10), CP => CLK, CDN => ARESET, Q =>
        U57610_Q, QN => U57610_QN );

U5769: dfctnb
   port map ( D => ddec(9), CP => CLK, CDN => ARESET, Q =>
        U5769_Q, QN => U5769_QN );

U5768: dfctnb
   port map ( D => ddec(8), CP => CLK, CDN => ARESET, Q =>
        U5768_Q, QN => U5768_QN );

U5767: dfctnb
   port map ( D => ddec(7), CP => CLK, CDN => ARESET, Q =>
        U5767_Q, QN => U5767_QN );

U5766: dfctnb
   port map ( D => ddec(6), CP => CLK, CDN => ARESET, Q =>
        U5766_Q, QN => U5766_QN );

U5765: dfctnb
   port map ( D => ddec(5), CP => CLK, CDN => ARESET, Q =>
        U5765_Q, QN => U5765_QN );

U5764: dfctnb
   port map ( D => ddec(4), CP => CLK, CDN => ARESET, Q =>
        U5764_Q, QN => U5764_QN );

U5763: dfctnb
   port map ( D => ddec(3), CP => CLK, CDN => ARESET, Q =>
        U5763_Q, QN => U5763_QN );

U5762: dfctnb
   port map ( D => ddec(2), CP => CLK, CDN => ARESET, Q =>
        U5762_Q, QN => U5762_QN );

U5761: dfctnb
   port map ( D => ddec(1), CP => CLK, CDN => ARESET, Q =>
        U5761_Q, QN => U5761_QN );

U5760: dfctnb
   port map ( D => ddec(0), CP => CLK, CDN => ARESET, Q =>
        U5760_Q, QN => U5760_QN );
```

```
U525: dfptnb
  port map ( D => fircnten, CP => CLK, SDN => ARESET, Q =>
        U525_Q, QN => U525_QN );

U527: dfptnb
  port map ( D => U525_Q, CP => CLK, SDN => ARESET, Q =>
        fircntent, QN => U527_QN );

U457: dfptnb
  port map ( D => U454_Q, CP => CLK, SDN => ARESET, Q => hint,
        QN => U457_QN );

U454: dfptnb
  port map ( D => hin, CP => CLK, SDN => ARESET, Q => U454_Q,
        QN => U454_QN );

U455: dfptnb
  port map ( D => lin, CP => CLK, SDN => ARESET, Q => U455_Q,
        QN => U455_QN );

U456: dfptnb
  port map ( D => U455_Q, CP => CLK, SDN => ARESET, Q => lint,
        QN => U456_QN );

U485: nr03d1
  port map ( A1 => muxt2_local, A2 => muxt1_local, A3 =>
        U484_ZN, ZN => s_in );

U484: in01d1
  port map ( I => muxt0_local, ZN => U484_ZN );

U486: nr03d1
  port map ( A1 => U487_ZN, A2 => U488_ZN, A3 => muxt0_local,
        ZN => n_in );

U488: in01d1
  port map ( I => muxt1_local, ZN => U488_ZN );

U487: in01d1
  port map ( I => muxt2_local, ZN => U487_ZN );

f(2) <= f2_local;
f(1) <= f1_local;
f(0) <= f0_local;
rstfifof <= rstfifof_local;
muxt(2) <= muxt2_local;
muxt(1) <= muxt1_local;
muxt(0) <= muxt0_local;
s(1) <= s1_local;
s(0) <= s0_local;
carryt <= VSS;
firt <= fir_in;

end top2;
```

```
file: WE_NEW.VHD
-- Date of netlist generation: Nov-5-93

--------------------------------------------------------------------

library IEEE;
use IEEE.STD_LOGIC_1164.ALL;

library COMPASS_LIB;
use COMPASS_LIB.COMPASS.ALL;

entity we_new is


   port ( we : in Std_Logic := 'U';

        wenb : out Std_Logic := 'U' );

end we_new;

--------------------------------------------------------------------

architecture we_new OF we_new is



   signal U9_C : Std_Logic;
   signal U1_Q : Std_Logic;
   signal w_d : Std_Logic;
   signal U9_CN : Std_Logic;

begin


   U9: ck01d1
      port map ( CLK => CLK, C => U9_C, CN => U9_CN );

   U1: dfctnb
      port map ( D => we, CP => U9_CN, CDN => ARESET, Q => U1_Q, QN
            => w_d );

   U12: nd02d1
      port map ( A1 => w_d, A2 => we, ZN => wenb );

end we_new;
```

APPENDIX B

Histogram Generation

```
MEMORY WORD FORMAT FOR 8 BITS HISTORAM GENERATION
+--------------------------------+--------------+
|                                | IMAGE   (8)  |
+--------------------------------+--------------+

#define MEM_SIZE 1024
#define WORD_LENGTH 64
#include "sub.rtn"

  main()
  {
   int pixel;
   int out_array[256];

   letm dseq(0,7);
   for(pixel=0; pixel<256; pixel++)
    {
      letc dvar(0,7, pixel);
      setag; compare;
      out_array[pixel] = countag;
    }
  }
```

APPENDIX C

```
          /** ASSOCIATIVE CONVOLUTION  PROGRAM  **/
          /*************************************/

/* THIS PROCEDURE CONVOLVES DATA VECTOR [d] by filter vector [f],   */
/* EACH IS 8 BITS IN LENGTH. THE FILTER SIZE IS 7 WORDS.            */
/* THE OUTPUT IS ACCUMULATED IN FIELD [fd].                         */
/* THE [fd] FIELD IS 8+8+log2(7) = 19  BITS IN LENGTH.              */
/* THE "TEMP" CELL IS USED FOR A TEMPORARY CARRY (WHICH PROPAGATES  */
/* THROUGH BIT POSITION 8+8+log2(7) of [fd] FIELD.)                 */
/* THE "MARK" CELL IS USED TO MARK THE WORD POSITION IN WHICH SUMMED*/
/* MULTIPLICATION IS TO BE CARRIED OUT.                             */
/* THE ASSOCIATIVE MEMORY SIZE IS 32 WORDS, EACH OF 29 BITS.        */

/*                      THE MEMORY FORMAT                           */
/*                      *****************                           */
/*   |---- d ----|--|--|------------- fd -------------------|       */
/*   |-----------|--|--|------------------------------------|       */
/*               mark temp                                          */


#define MEMORY_SIZE 32
#define WORD_LENGTH 29
#include "sub.rtn"

int f[7] = { 255,255,255,255,255,255,255 }; /* define the filter*/

main()

{

  int f_size = 7; /* filter size is 7 words */
  int n = 8; /* data word length */
  int temp = 19; /* temp is in bit  position 19 */
  int mark = 20; /* mark is in bit  position 20 */
  int d_offset = 21; /* [d] field first bit posion */
  int add_offset, bit_count, f_index;
  int fd_bitcnt;

  load;

 /****** summed multiplication *******/
 /*                                  */
 /* add [d] to [fd] if the bit at    */
 /* position bit_count of f[f_index] */
 /* is 1                             */
 /************************************/

  for(f_index=0; f_index<f_size; f_index++)
    {
      for(add_offset=0; add_offset<n; add_offset++)
 if( BIT(add_offset) OF_WORD f[f_index]) /*test if bit is 1 */
   {
```

```
/************  add  ***************/

   for(bit_count=0; bit_count<n; bit_count++)
     {
       fd_bitcnt = add_offset + bit_count;
letm d(fd_bitcnt) d(temp)
  d(d_offset+bit_count) d(mark);
letc d(temp) d(mark); setag; compare;
letc d(fd_bitcnt) d(mark); write;

letc d(fd_bitcnt) d(temp) d(mark)
  setag; compare;
letc d(temp) d(mark); write;

       letc d(fd_bitcnt) d(d_offset+bit_count)
  d(mark); setag; compare;
letc d(temp) d(d_offset+bit_count) d(mark); write;

letc d(d_offset+bit_count) d(mark); setag; compare;
letc d(fd_bitcnt) d(d_offset+bit_count)
  d(mark); write;

     }

        /****** propagate carry *******/

  letc d(mark) d(temp);
  while(fd_bitcnt < 2*n +3 )
    {
      letm d(fd_bitcnt) d(mark) d(temp);
      setag; compare;
      letc d(fd_bitcnt) d(mark); write;
      letc d(fd_bitcnt) d(mark) d(temp);
      setag; compare;
      letc d(mark) d(temp); write;

      bit_count++;

    }

  }

     /********* shift [d] field down *********/

     for(bit_count=mark+1; bit_count<=mark+n; bit_count++)
{
  letmc d(bit_count); setag; compare;
  letc; write;
  letc d(bit_count); shiftag(1); write;
}
   }

 save;

}
```

APPENDIX D

Implementation of Low Pass Filter In ASP

```
#include "sub.rtn"

#define Pixel          0
#define PIXELSIZE    8
#define PixelSign    Pixel + PIXELSIZE
#define Array_Res    17
#define TempNig      39

shift_2( int pos ,int len , int res ,int shift_factor);
sign (int pos , int len , int res , int temp );
void neighbour(int  SrcPos,int  DstPos,int len ,int  NbrName);
add(int  src ,int src_len,int dst ,int dst_len,int c_bit);

enum color {RED,GREEN,BLUE };
int lpf_filter[] = {4,2,2,2,2,1,1,1,1};


main(int ,char *argv[])
{
 int j ;
 color cl;

 printf("Runnig Asp Simulator : %s \n\n", argv[0]);
   load (24L,48L);

  for (cl = RED ; cl <= BLUE ; cl++ )
   {
                neighbour(48+8*cl,Pixel,PIXELSIZE,0);
  shift_2 ( Pixel , PIXELSIZE , Array_Res , 2 );   /* multply the array * 4 and put resul
t in */
  shift_2 ( Pixel , PIXELSIZE , PixelSign , 1 );     /* multply the array * 4 and put res
ult in */

           for ( j = 1 ; j <= 8; j++)
             {
      /* copy the neigbour */
      if ( j <=4)
      {
    neighbour(PixelSign,TempNig ,9,j);
    add(TempNig,PIXELSIZE+1,Array_Res,PIXELSIZE+1+j,Array_Res+PIXELSIZE+1+j);

      }
     else
      {
     neighbour(Pixel,TempNig,8,j);
    add(TempNig,PIXELSIZE,Array_Res,PIXELSIZE+1+j,Array_Res+PIXELSIZE+1+j);
      }
    }
   neighbour(Array_Res+4  ,48+8*cl,PIXELSIZE,0);
     }
     save(24L,48L);
```

```
  print_cycles;
       return 0;
}

add(int  src ,int src_len,int dst ,int dst_len,int c_bit)
{
int cnt ;
 /* clear carray bit */

 letm  d(c_bit) ; setag ;
 letc;
 write;

 for(cnt=0; cnt<src_len; cnt++)
  {
   letm d(dst+cnt) d( c_bit) d( cnt+src);
   letc d(c_bit); setag;
   compare;
   letc d(dst+cnt);
   write;

   letc d(dst+cnt) d( c_bit); setag;
   compare;
   letc d(c_bit);
   write;

   letc d(dst+cnt) d( cnt+src); setag;
   compare;
   letc d(c_bit) d( cnt+src) ;
   write;

   letc d(cnt+src); setag;
   compare;
   letc d(dst+cnt) d( cnt+src);
   write;

  }

  /*   carry propogation */

              for (; cnt < dst_len ; cnt++)
   {
    letm d(dst+cnt) d( c_bit) ;
    letc d(c_bit); setag;
    compare;
    letc d(dst+cnt);
    write;

    letmc d(dst+cnt) d( c_bit); setag;
    compare;
    letc d(c_bit);
    write;
  }

              return 0;
 }
```

```
void neighbour(int  SrcPos,int  DstPos,int len ,int  NbrName)
{
 int i;
 /*  clear destintaion */

     letm dseq(DstPos ,DstPos+ len - 1) ; setag :
   letc ;
   write ;


   for (i = 0; i < len ; i++)
     {

      letmc d(SrcPos + i) ; setag;
      compare;
      letmc  d(DstPos + i) ;
      switch(NbrName)
        {
  case  0:
   break;
  case   1 :
   shiftag(1) ;
   break;
  case   2:
   shiftag(-1);
   break;
  case   3:
   shiftag(128);
   break;
  case   4:
   shiftag(-128);
   break;
  case   5:
   shiftag(127) ;
   break;
  case   6:
   shiftag(-127);
   break;
  case   7:
   shiftag(129);
   break;
  case   8:
   shiftag(-129);
   break;
        }

       write ;
    }

  return;
 }

 shift_2( int pos ,int len , int res ,int shift_factor)
 {
 int i ;
```

```
/*   clean the result operand     */

 letm  dseq(res, res+ len + shift_factor-1) ; setag;
 letc   ;
  write ;

/* copy  the operand from pos to res +shift_factor  using the tag register */

 for ( i = 0; i < len ; i++ )
   {
 letmc  d( pos + i)   ; setag ;
 compare ;

 letmc  d( res + shift_factor + i);
 write ;
 }
return 0 ;
}

sign (int pos , int len , int res , int temp )
{
int i ;
 /*   clean the result operand     */

  letm  dseq(res, res+ len-1) d(temp); setag;
  letc ;
   write ;

 /* copy  the operand from pos to res +shift_factor  using the tag register */

  for ( i = 0; i < len ; i++ )
    {
  letm d(pos + i)  d(temp); setag ;
                 letc d(pos + i) ;
  compare ;
  letmc d( res + i) d(temp) ;
  write ;

  letm  d( pos +i) d(temp); setag;
  letc  d(temp);
  compare ;
                 letmc d(res+i);
  write ;
  }
 return 0 ;
}
```

APPENDIX E

Laplacian Implementation

```
#include "sub.rtn"

#define Pixel         0
#define PIXELSIZE     8
#define PixelSign     Pixel + PIXELSIZE
#define Array_Res     24
#define TempNig       40

shift_2( int pos ,int len , int res ,int shift_factor);
sign (int pos , int len , int res , int temp );
void neighbour(int  SrcPos,int  DstPos,int  NbrName);
add(int  src ,int src_len,int dst ,int dst_len,int c_bit);

enum color {RED,GREEN,BLUE };

main(int ,char *argv[])
{
 int j ;
 color cl;

 printf("Runnig Asp Simulator : %s \n\n", argv[0]);
   load (24L,48L);

  for (cl = RED ; cl <= BLUE ; cl++ )
   {
                neighbour(48+8*cl,0,0);
  shift_2 ( Pixel , PIXELSIZE , Array_Res , 2 );   /* multply the array * 4 and put resul
t in */
          sign    ( Pixel , PIXELSIZE , PixelSign , PixelSign + PIXELSIZE );

          for ( j = 1 ; j <= 4 ; j++)
            {
   /* copy the neigbour */

   neighbour(PixelSign,TempNig ,j);

   add(TempNig,PIXELSIZE,Array_Res,PIXELSIZE+1+j,Array_Res+PIXELSIZE+1+j);
    }
   neighbour(Array_Res+2 ,48+8*cl,0);
     }
    save(24L,48L);
   print_cycles;
        return 0;
 }

 add(int  src ,int src_len,int dst ,int dst_len,int c_bit)
 {
 int cnt ;
  /* clear carray bit */

  letm  d(c_bit) ; setag ;
  letc;
  write;
```

```
for(cnt=0; cnt<src_len; cnt++)
 {
  letm d(dst+cnt) d( c_bit) d( cnt+src);
  letc d(c_bit); setag;
  compare;
  letc d(dst+cnt);
  write;

  letc d(dst+cnt) d( c_bit); setag;
  compare;
  letc d(c_bit);
  write;

  letc d(dst+cnt) d( cnt+src); setag;
  compare;
  letc d(c_bit) d( cnt+src) ;
  write;

  letc d(cnt+src); setag;
  compare;
  letc d(dst+cnt) d( cnt+src);
  write;

 }

 /*   carry propogation */

            for (; cnt < dst_len ; cnt++)
  {
   letm d(dst+cnt) d( c_bit) ;
   letc d(c_bit); setag;
   compare;
   letc d(dst+cnt);
   write;

   letmc d(dst+cnt) d( c_bit); setag;
   compare;
   letc d(c_bit);
   write;
  }

            return 0;
}

void neighbour(int  SrcPos,int  DstPos,int  NbrName)
{
 int i;
 /*  clear destintaion */

     letm dseq(DstPos ,DstPos+ PIXELSIZE-1) ; setag ;
   letc ;
   write ;


   for (i = 0; i < PIXELSIZE ; i++)
```

```
  {

    letmc d(SrcPos + i) ; setag;
    compare;
    letmc  d(DstPos + i) ;
    switch(NbrName)
      {
case  0:
 break;
case   1 :
 shiftag(1) ;
 break;
case   2:
 shiftag(-1);
 break;
case   3:
 shiftag(128);
 break;
case   4:
 shiftag(-128);
 break;
      }

    write ;
  }

 return;
}

shift_2( int pos ,int len , int res ,int shift_factor)
{
int i ;
 /*   clean the result operand     */

  letm  dseq(res, res+ len + shift_factor-1) ; setag;
  letc   ;
   write ;

 /* copy  the operand from pos to res +shift_factor  using the tag register */

  for ( i = 0; i < len ; i++ )
    {
  letmc  d( pos + i)  ; setag ;
  compare ;

  letmc  d( res + shift_factor + i);
  write ;
  }
 return 0 ;
}

sign (int pos , int len , int res , int temp )
{
int i ;
 /*   clean the result operand     */
```

```
 letm  dseq(res, res+ len-1) d(temp); setag;
 letc ;
  write ;

/* copy  the operand from pos to res +shift_factor  using the tag register */

 for ( i = 0; i < len ; i++ )
   {
 letm d(pos + i)  d(temp); setag ;
              letc d(pos + i) ;
 compare ;
 letmc d( res + i) d(temp) ;
 write ;

 letm  d( pos +i) d(temp); setag;
 letc  d(temp);
 compare ;
              letmc d(res+i);
 write ;
 }
return 0 ;
}
```

APPENDIX F

Implementaion of SOBEL filter in ASP

```
#include "sub.rtn"

#define Pixel          0
#define PIXELSIZE   8
#define PixelSign   Pixel + PIXELSIZE
#define Array_Res   24
#define TempNig     33
#define Sx           46
#define Sy           Sx+13

shift_2( int pos ,int len , int res ,int shift_factor);
sign (int pos , int len , int res , int temp );
add(int  src ,int src_len,int dst ,int dst_len,int c_bit);
void neighbour(int  SrcPos,int  DstPos,int len ,int  NbrName);
int sqr(int src,int len,int dst,int cont);

enum color {RED,GREEN,BLUE };

main(int ,char *argv[])
{
 int j=0 ;
 int cl=0;

 printf("Runnig Asp Simulator : %s \n\n", argv[0]);
   load (24L,72L);


  for (cl = RED ; cl <= BLUE ; cl++ )
   {
              letm dseq (Sx,71);
  letc ; setag;
  write;
     neighbour(72+8*cl,Pixel,PIXELSIZE,0);
  shift_2 ( Pixel , PIXELSIZE , Array_Res , 1 );   /* multply the array * 4 and put
result in */
          sign    ( Pixel , PIXELSIZE , PixelSign , PixelSign + PIXELSIZE );

  neighbour(PixelSign,Sx,PIXELSIZE,5);
          for ( j = 6 ; j <= 8 ; j++)
            {
  /* copy the neigbour */

  neighbour(PixelSign,TempNig,PIXELSIZE ,j);

  add(TempNig,PIXELSIZE,Sx,PIXELSIZE+j-6,Sx+PIXELSIZE+j-6);
   }

  neighbour(Sx,Sy,PIXELSIZE+3,0);

  neighbour (Array_Res,TempNig,9,1);
```

```
  add(TempNig,PIXELSIZE+1,Sy,11,Sy+11);

  neighbour (Array_Res,TempNig,9,2);
  add(TempNig,PIXELSIZE+1,Sy,12,Sy+12);

  neighbour (Array_Res,TempNig,9,3);
  add(TempNig,PIXELSIZE+1,Sx,11,Sx+PIXELSIZE+11);

  neighbour (Array_Res,TempNig,9,4);
  add(TempNig,PIXELSIZE+1,Sx,12,Sx+12);

//  add(Sy,8,Sx,8,Sx+9);
  sqr(Sx,8,0,18);
//  neighbour(8 ,72+8*cl,8,0);
  neighbour(Sx ,72+8*cl,8,0);
    }
    save(24L,72L);
  print_cycles;
       return 0;
}

add(int  src ,int src_len,int dst ,int dst_len,int c_bit)
{
int cnt ;
 /* clear carray bit */

 letm  d(c_bit) ; setag ;
 letc;
 write;

 for(cnt=0; cnt<src_len; cnt++)
  {
   letm d(dst+cnt) d( c_bit) d( cnt+src);
   letc d(c_bit); setag;
   compare;
   letc d(dst+cnt);
   write;

   letc d(dst+cnt) d( c_bit); setag;
   compare;
   letc d(c_bit);
   write;

   letc d(dst+cnt) d( cnt+src); setag;
   compare;
   letc d(c_bit) d( cnt+src) ;
   write;

   letc d(cnt+src); setag;
   compare;
   letc d(dst+cnt) d( cnt+src);
   write;

  }

  /*   carry propogation */
```

```
            for (; cnt < dst_len ; cnt++)
  {
   letm d(dst+cnt) d( c_bit) ;
   letc d(c_bit); setag;
   compare;
   letc d(dst+cnt);
   write;

   letmc d(dst+cnt) d( c_bit); setag;
   compare;
   letc d(c_bit);
   write;
  }

            return 0;
}

void neighbour(int  SrcPos,int  DstPos,int len ,int  NbrName)
{
 int i;
 /*  clear destintaion */

     letm dseq(DstPos ,DstPos+ len - 1) ; setag ;
   letc ;
   write ;


   for (i = 0; i < len ; i++)
     {

      letmc d(SrcPos + i) ; setag;
      compare;
      letmc  d(DstPos + i) ;
      switch(NbrName)
        {
   case  0:
    break;
   case   1 :
    shiftag(1) ;
    break;
   case   2:
    shiftag(-1);
    break;
   case   3:
    shiftag(128);
    break;
   case   4:
    shiftag(-128);
    break;
   case   5:
    shiftag(127) ;
    break;
   case   6:
    shiftag(-127);
```

```
  }

   break;
  case   7:
   shiftag(129);
   break;
  case   8:
   shiftag(-129);
   break;
        }

      write ;
   }

 return;
}

shift_2( int pos ,int len , int res ,int shift_factor)
{
int i ;
 /*   clean the result operand     */

  letm  dseq(res, res+ len + shift_factor-1) ; setag;
  letc    ;
   write ;

 /* copy  the operand from pos to res +shift_factor  using the tag register */

  for ( i = 0; i < len ; i++ )
    {
  letmc  d( pos + i)  ; setag ;
  compare ;

  letmc  d( res + shift_factor + i);
  write ;
  }
 return 0 ;
}

sign (int pos , int len , int res , int temp )
{
int i ;
 /*   clean the result operand     */

  letm  dseq(res, res+ len-1) d(temp); setag;
  letc ;
   write ;

 /* copy  the operand from pos to res +shift_factor  using the tag register */

  for ( i = 0; i < len ; i++ )
    {
  letm d(pos + i)  d(temp); setag ;
                letc d(pos + i) ;
  compare ;
  letmc d( res + i) d(temp) ;
  write ;
```

```
  letm  d( pos +i) d(temp); setag;
  letc  d(temp);
  compare ;
                  letmc d(res+i);
  write ;
  }
 return 0 ;
}

int sqr(int src,int len,int dst,int cont)
{
int i , cnt ;

 /* clear the result area */

 letm  dseq(dst,dst+2*len); letc ;setag;
 write;

 for ( i = 0 ; i < len ; i++)
  {
                  /* clear the control bit*/
    letm   d(cont) ; letc ; setag; write;

    /*  set the cont bit if the currunt bit is on */
    letmc  d(src+i); setag; compare;
    letmc   d (cont) ; write;

    /* clear carray bit */

    letm  d(dst+len+i) ; setag ;
    letc;
    write;

    for ( cnt = 0 ; cnt < len ;  cnt++   )
     {

       letm d(dst+cnt+i) d( dst+len+i) d( cnt+src)  d(cont);
       letc d(dst+len+i) d(cont); setag;
       compare;
       letc d(dst+cnt+i)  d(cont);
       write;

                     letc d(dst+cnt+i) d( dst+len+i) d(cont); setag;
       compare;
       letc d(dst+len+i) d(cont);
       write;

                     letc d(dst+cnt+i) d( cnt+src)  d(cont) ; setag;
       compare;
       letc d(dst+len+i) d( cnt+src)  d(cont);
       write;

       letc d(cnt+src+i) d(cont); setag;
       compare;
       letc d(dst+cnt+i) d( cnt+src) d(cont);
       write;
```

```
    }
  }
 return 0;
}
```

APPENDIX G.

```
/*******  CURVES PROPAGATION BY ASSOCIATIVE PROCESSOR *******/
/**************************************************************/

/*  This program  implements the curve propagation step of Canny */
/* Edge Detection.                                               */
/*  The  propagation step is connected  all pixels with gradient */
/* magnitude between low and high values, if they can be connected */
/* to a pixel above high through a chain of pixels above low.    */

/****************  MEMORY ORGANIZATION  *************************/
/*           |--|--------------|--|                             */
/*           |--|--------------|--|                             */
/*           MARK   not use     E0                              */
/*           bit-7              bit-0                           */
/* INPUTS : 1)  MARK  indicates all pixels above low threshold  */
/*          2)  E0    indicates all pixels above high threshold */
/*                                                              */
/* OUTPUT :     E0   indicates all edges found after the last   */
/*                   iteration                                  */
/*                                                              */
/* PROCESS :                                                    */
/*     old_condition = 0                                        */
/*     SETAG                                                    */
/*     UNTIL ( COUNTAG - old_condition ) < some_growth  DO      */
/*         E0 <-- 3x3 neighbors of  mark E0                     */
/*         TAG <-- E0                                           */
/*     END                                                      */


/******************* MAIN PROGRAM ******************************/

#define MEM_SIZE 100 /* 10 x 10 image size example */
#define WORD_LENGTH 8
#include "sub.rtn"

main()

{

  int growth;
  int growth_threshold = 0;
  int old_condition = 0;
  int new_condition = 1;
  int MARK = 7;
  int E0 = 0;
  int b = 10; /* long shift constant */

  load;

  letmc d(E0); setag; compare;  /* TAG <-- E0 */

  while ( (growth = (new_condition - old_condition)) > growth_threshold)
    {
```

```
shiftag(-b); shiftag(-1); write; shiftag(1); write; shiftag(1); write;
setag; compare;
letc; write;    /* clear E0 */
letmc d(MARK); compare;
letmc d(E0); write;   /* new edges in E0 */

shiftag(1); write; shiftag(-1); shiftag(-1); write;
setag; compare;
letc; write;    /* clear E0 */
letmc d(MARK); compare;
letmc d(E0); write;   /* new edges in E0 */

shiftag(b); shiftag(1); write; shiftag(-1); write; shiftag(-1); write;
setag; compare;
letc; write;    /* clear E0 */
letmc d(MARK); compare;
letmc d(E0); write;   /* new edges in E0 */


old_condition = new_condition;
new_condition = countag;


printf("%d %d\n", growth, new_condition );

}

save;

print_cycles;

}
```

APPENDIX H

```
/****************************************************************************/
/*        ASSOCIATIVE "HORN & SCHUNCK" OPTICAL FLOW (O.F.)  ALGORITHM       */
/****************************************************************************/

/**************    INPUT    ************                                    */
/* Gray level images of n & n+1 frames.                                     */

/**************    OUTPUT   ************                                    */
/* Optical flow patterns.                                                   */

/**************    PROCESS  ************                                    */
/* The memory organization:                                                 */

/*    1 1   14    14    10   10     20        18     10   10   10   8   8   */
/*   |-|-|-----|-----|----|----|---------|-------|----|----|----|---|---|   */
/*   |-|-|-----|-----|----|----|---------|-------|----|----|----|---|---|   */
/*    m t   V     U    Vav  Uav    Ac        Sc     Et   Ey   Ex  En1 En    */
/*    a e                                                                   */
/*    r m                                                                   */
/*    k p                                                                   */

/*  En :   Gray level of frame n.                                           */
/*  En1 :  Gray level of frame n+1.                                         */
/*  Ex  :  Derivative estimation in X direction.                            */
/*  Ey  :  Derivative estimation in Y direction.                            */
/*  Et  :  Time rate of change in intensity.                                */
/*  Sc  :  Accumulator to compute the scale factor D  where                 */
/*         D = alfa*alfa + Ex*Ex + Ey*Ey.                                   */
/*         It is also used to store Ex/D  and Ey/D.                         */
/*  Ac  :  Accumulator to compute Ex*Uav + Ey*Vav +Et.                      */
/*  Uav :  Local average of U. (It also computes Ex/D at first iteration)   */
/*  Vav :  Local average of V. (It also computes Ey/D at first iteration)   */
/*  U   :  X component of O.F. (Also used as intermediate results storage) */
/*  V   :  Y component of O.F. (Also used as intermediate results storage) */
/*  temp, mark : Flags.                                                     */
/*                                                                          */
/*                                                                          */
/****************************** MAIN PROGRAM ******************************/

#define MEM_SIZE 64 /* 8 X 8 image size */
#define WORD_LENGTH 134
#include "sub.rtn.h"

/**** FIRST BIT POSITIONS DEFINITION ***/

#define En  0
#define En1  8
#define Ex  16
#define Ey  26
#define Et  36
#define Sc  46
#define Ac  64
```

```
#define Uav 84
#define Vav 94
#define U   104
#define V   118
#define temp 132
#define mark 133

#define b  8 /* Long shift length */

main()

{

int bit_count, index, cy, Ex_2, iterations;
int alfa = 1;
int no_of_iterations=1;


load;

/*** COMPUTE Ex Ey & Et ***/
/* We compute the derivatives by shift and add according to the */
/* following table:                                              */

/* |    DATA     |  Ex  |  Ey  |  Et  | Order Of Execution |      */
/* |-------------|------|------|------|--------------------|      */
/* |Ei,j,n       |  -   |  -   |  -   |         7          |      */
/* |Ei,j,n+1     |  -   |  -   |  +   |         8          |      */
/* |Ei,j+1,n     |  +   |  -   |  -   |         5          |      */
/* |Ei,j+1,n+1   |  +   |  -   |  +   |         6          |      */
/* |Ei+1,j,n     |  -   |  +   |  -   |         3          |      */
/* |Ei+1,j,n+1   |  -   |  +   |  +   |         4          |      */
/* |Ei+1,j+1,n   |  +   |  +   |  -   |         2          |      */
/* |Ei+1,j+1,n+1 |  +   |  +   |  +   |         1          |      */
/* |---------------------------------|--------------------|      */

/*** shift up fields En & En1 b+1 places ***/
shift_fields(En,16,b+1,-1);


/*** perform op. 1  ***/
printf("op1\n");
/** write field En1 into Ex Ey & Et **/
for(bit_count=0; bit_count<8; bit_count++)
  {
    letm d(En1+bit_count) d(Ex+bit_count) d(Ey+bit_count) d(Et+bit_count);
    letc d(En1+bit_count); setag; compare;
    letc d(En1+bit_count) d(Ex+bit_count) d(Ey+bit_count) d(Et+bit_count);
         write;
  }

/*** perform op. 2 ***/
printf("op2\n");
add(En,Ex,8,2,mark);
add(En,Ey,8,2,mark);
sub(En,Et,8,2,mark);
```

```
/*** perform op. 3  & op. 4 ***/
printf("op3,4\n");
shift_fields(En,16,1,1); /* shift En & En1 one place down */
sub(En,Ex,8,2,mark);
add(En,Ey,8,2,mark);
sub(En,Et,8,2,mark);
sub(En1,Ex,8,2,mark);
add(En1,Ey,8,2,mark);
add(En,Et,8,2,mark);

/*** perform op. 5  & op. 6 ***/
printf("op5,6\n");
shift_fields(En,16,b,1); /* shift En & En1 b places down */
sub(En,Ex,8,2,mark);
sub(En,Ey,8,2,mark);
sub(En,Et,8,2,mark);
sub(En1,Ex,8,2,mark);
sub(En1,Ey,8,2,mark);
add(En,Et,8,2,mark);

/*** perform op. 7  & op. 8 ***/
printf("op7,8\n");
shift_fields(En,16,1,-1); /* shift En & En1 1 place up */
add(En,Ex,8,2,mark);
sub(En,Ey,8,2,mark);
sub(En,Et,8,2,mark);
add(En1,Ex,8,2,mark);
sub(En1,Ey,8,2,mark);
add(En,Et,8,2,mark);
shift_fields(En,16,1,1); /* shift back */

/************* convert Ex Ey & Et to absolute value and sign *******/
convert_to_abs_and_sign(Ex,10);
convert_to_abs_and_sign(Ey,10);
convert_to_abs_and_sign(Et,10);

printf("Computing D\n");

/************** Compute D = alfa*alfa+Ex*Ex+Ey*Ey *****************/
/*** 1. Compute alfa*alfa+Ex*Ex bu look-up-table, into field "Sc" ***/
/*** 2. Compute Ey*Ey by look-up-table and sum accumulate in "Sc" ***/
printf("ok\n");
/** Step 1 **/
for(index=0; index<256; index++)
  {
    letm dseq(Ex+1,Ex+8); letc dvar(Ex+1,Ex+8,index);
    setag; compare;
    letm dseq(Sc,Sc+17); letc dvar(Sc,Sc+17,alfa*alfa+index*index);
    write;
  }
/** Step 2**/
printf("ok\n");
cy = Uav; /* unused cell (Uav) is served as  carry for this process.*/
for(index=0; index<256; index++)
```

```
 {
   /** Compute Ey*Ey **/
   letm d(temp); letc; setag; write; /*clear temp*/
   Ex_2 = index*index;
   letm dseq(Ey+1,Ey+8); letc dvar(Ey+1,Ey+8,index);
   setag; compare;
   letmc d(temp); write; /* store pointed pixels to be work on, in "temp" */
   /** Sum accumulate in "Sc" **/
   for(bit_count=Sc; bit_count<Sc+18; bit_count++)
     {
letm d(temp) d(bit_count) d(cy);
if( !(BIT(bit_count-Sc) OF_WORD Ex_2) )
  {
    letc d(temp) d(cy); setag; compare;
    letc d(temp) d(bit_count); write;
    letc d(temp) d(bit_count) d(cy); setag; compare;
    letc d(temp) d(cy); write;
  }
else
  {
    letc d(temp) d(bit_count); setag; compare;
    letc d(temp) d(cy); write;
    letc d(temp); setag; compare;
    letc d(temp) d(bit_count); write;
  }
     }
 }

/********************** COMPUTE Ex/Sc and Ey/Sc **********************/
/* To compute  Ex/Sc (or Ey/Sc), Ex (Ey) is moved to unused buffer   */
/* Vav+Uav). This buffer calles "D", is used to subtract Ex from Sc, */
/* in division process. The results are  saved in "U" ("V").        */
/* It shout be noted that Ex (Ey) value is started in bit position   */
/* Ex+1 (Ey+1). The sign bit in bit position Ex+9 (Ey+9).            */
/*  the division process will be carried out only on  magnitude and  */
/* will be copied to the suitable positions at the end.              */

/***** Compute Ex/Sc *****/
div(Ex,U); /* Compute Ex/Sc into U */
div(Ey,V); /* Compute Ex/Sc into U */
/** Mov Ex/Sc (Ey/Sc) magnitude and sign into first (last) 9-bit of Sc */
letm dseq(Sc,Sc+17); letc; setag; write; /* clear Sc field */
for(bit_count=0; bit_count<8; bit_count++)
  {
    letmc d(U+bit_count); setag; compare;   /** move magnitude of Ex/Sc **/
    letmc d(Sc+bit_count); write;
    letmc d(V+bit_count); setag; compare;   /** move magnitude of Ey/Sc **/
    letmc d(Sc+bit_count+9); write;
  }
letmc d(Ex+9); setag; compare; /* move sign of Ex */
letmc d(Sc+8); write;
letmc d(Ex+9); setag; compare; /* move sign of Ey */
letmc d(Sc+17); write;
```

```
/*************** ITERATIVE STEP **********/
for(iterations=0; iterations<no_of_iterations; iterations++)
  {

    /** Computing Uav and Vav **/

    laplace(U,Uav); /* convolve U and output to Uav */
    laplace(V,Vav); /* convolve V and output to Vav */

    /** Computing Ex*Uav+Ey*Vav+Et in field Ac**/
    /*******************************************/
    letm dseq(U,U+17) dseq(Ac,Ac+19); letc; setag; write;
    /* clear working fields*/

    /* 1. Computing Ex*Uav  in  the working field U */
    convert_to_abs_and_sign(U,9); /*express Uav as a mag. &  sign. */
    mul(Ex,9,Uav,9,U,mark);
    /*perform U<--Ex*Uav (product is given as mag. & sign).*/
    convert_to_abs_and_sign(U,17); /*express the product as 2's complement*/
    /* 2. Computing Ey*Vav  in the working field Ac */
    convert_to_abs_and_sign(Vav,9); /*express Vav as a mag. & sign. */
    mul(Ey,9,Vav,9,Ac,mark);
    /*perform Ac<--Ey*Vav (product is given as mag.& sign).*/
    convert_to_abs_and_sign(Ac,17); /*express the product as 2's complement*/
    /* 3. Sum the products in Ac */
    add(U,Ac,17,2,mark);
    /* 4. Add Et to the results */
    add(Et,Ac,8,11,mark);
    letm d(Et+8) d(Ac+19); /* sign bit adjusted */
    letc d(Et+8); setag; compare;
    letc d(Ac+19); write;
    letc d(Et+8) d(Ac+19); setag; compare;
    letc; write;
    /* 5. Express results as mag. & sign */
    convert_to_abs_and_sign(Ac,19);
    /* 6. Convert back Uav and Vav to 2's complement */
    convert_to_abs_and_sign(Uav,9);
    convert_to_abs_and_sign(Vav,9);

    /** COMPUTING -U COMPONENT OF MOTION **/
    letm dseq(U,U+27); letc; setag; write; /* clear working field*/
    mul(Sc,9,Ac,20,U,mark); /* U <-- Sc(x)*Ac  */
    sub(U+20,Uav,9,0,mark); /* U <-- -(Sc(x)*Ac) save results in Uav
                               (round results starts in U+20)*/
    /** COMPUTING -V COMPONENT OF MOTION **/
    letm dseq(U,U+27); letc; setag; write; /* clear working field*/
    mul(Sc+9,9,Ac,20,V,mark); /* U <-- Sc(y)*Ac */
    sub(U+20,Vav,9,0,mark); /* V <-- -(Sc(y)*Ac) save results in Uav */

    /* Move -(-U) and -(-V) to "U" and "V" */
    letm dseq(U,U+27); letc; setag; write; /* clear "U" and "V"*/
    sub(Uav,U,9,0,mark);
    sub(Vav,V,9,0,mark);
```

```
  }

save;

print_cycles;

}

/******* CONVERT TO ABSOLUTE AND SIGN ********/
/* This procedure converts "nc" bits starting at bit position "field"  */
/* to absolute and sign, just wordes marked by the sign bit */

convert_to_abs_and_sign(field,nc)
int field,nc;
{
  int sign, bit_count;

  bit_count = field;
  sign = field + nc - 1 ;

  letm d(temp); letc; setag; write; /* clear temp */
  letmc d(mark);  setag; compare;
  letm d(temp); write;
  letm d(mark) d(temp) d(sign) d(bit_count);

  while(bit_count < sign)
    {
      letc d(mark) d(sign) d(bit_count); setag; compare;
      letc d(mark) d(temp) d(sign) d(bit_count); write;

      bit_count++ ;

      letm d(mark) d(temp) d(sign) d(bit_count);
      letc d(mark) d(temp) d(sign); setag; compare;
      letc d(mark) d(sign) d(bit_count); write;
      letc d(mark) d(temp) d(sign) d(bit_count); setag; compare;
      letc d(mark) d(temp) d(sign); write;

    }

}

   /************ ADD ***************/

/*    This procedure adds "nc" bits of field starting in          */
/*    bit position "so" into field starting at bit position "de"  */
/*    and propagate carry "pc" bits.                              */
/*    The addition process is carried out only on candidates wordes */
/*    signed by "mr.                                              */

add(so,de,nc,pc,mr)
int so,de,nc,pc,mr;
{
```

```
int bit_count;
for(bit_count=0; bit_count<nc; bit_count++)

  {
    letm d(mr) d(de+bit_count) d(temp) d(so+bit_count);
    letc d(mr) d(temp); setag; compare;
    letc d(mr) d(de+bit_count); write;

    letc d(mr) d(de+bit_count) d(temp); setag; compare;
    letc d(mr) d(temp)  ; write;

    letc d(mr) d(de+bit_count) d(so+bit_count); setag; compare;
    letc d(mr) d(temp) d(so+bit_count); write;

    letc d(mr) d(so+bit_count); setag; compare;
    letc d(mr) d(de+bit_count) d(so+bit_count); write;

  }

/****** propagate carry *******/
for(; bit_count< nc+pc; bit_count++)
  {
    letm d(mr) d(de+bit_count) d(temp) d(mr);
    letc d(mr) d(temp) d(mr); setag; compare;
    letc d(mr) d(de+bit_count) d(mr); write;
    letc d(mr) d(de+bit_count) d(temp) d(mr);  setag; compare;
    letc d(mr) d(temp) d(mr); write;
  }

/*** clear "temp "***/
letm d(temp); letc; setag; write;

}

/************************************  SUB  ********************************/

/* This procedure subtract "so" field from "de", each of length "nc",     */
/* and output in "de". The last bit is propagates "pb" bits.             */
/* The subtraction is carried out only on candidate wordes signed by "mr" */

sub(so,de,nc,pb,mr)
int so,de,nc,pb,mr;
{
  int bit_count;

  letm d(temp); letc; setag; write; /*clear temp*/
  for(bit_count=0; bit_count<nc; bit_count++)
    {
      letm d(mr) d(so+bit_count) d(de+bit_count) d(temp);
      letc d(mr) d(so+bit_count); setag; compare;
      letc d(mr) d(so+bit_count) d(de+bit_count) d(temp); write;

      letc  d(mr) d(de+bit_count) d(temp); setag; compare;
      letc d(mr);  write;

      letc d(mr) d(de+bit_count) d(so+bit_count); setag; compare;
```

```
      }
      letc d(mr) d(so+bit_count); write;

      letc d(mr) d(temp); setag; compare;
      letc d(mr) d(de+bit_count) d(temp); write;
    }

  /** propagate borrow **/
  for(; bit_count<nc+pb; bit_count++)
    {
      letmc d(mr) d(de+bit_count) d(temp); setag; compare;
      letc d(mr); write;
      letc d(mr) d(temp); setag; compare;
      letc d(mr) d(de+bit_count) d(temp); write;
    }

/*** clear "temp "***/
letm d(temp); letc; setag; write;

}

/************************** DIVISION ******************************/
/* This function computes en/Sc and output results to rs*/

div(en,rs)
int en, rs;
{
  int nc=8; /* result field length */
  int D = 84;
  int bit_count, le;

  /* clear working fields */
  letm dseq(D,D+17); dseq(rs,rs+nc-1); letc; setag; write;

  /* mov magnitude of en to D+9+1 */
  /*  ( Moving to D+9 is to expand the numerator word length (8-bit)
      to the denominator (18-bit). Because the the numerator is value
      is less than the denominator, it is shifted one bit more to the
      left).
      */
  for(bit_count=0; bit_count<nc; bit_count++)
    {
      letmc d(en+1+bit_count); setag; compare;
      letmc d(D+10+bit_count); write;
    }

  /* Perform rs <-- D/Sc */
  shift_left(D,nc+1);
  for(bit_count=0; bit_count<nc; bit_count++)
    {
      le = rs+nc-1-bit_count;
      compare_field(Sc,D,nc+1,le,temp,mark);
      letm d(temp) d(le); letc; setag; compare;
      letmc d(le); write;
      sub(Sc,D,nc,1,le);
      shift_left(D,nc+1);
    }
```

```
    }
```

```
/**************************** COMPARE FIELD *************************/
/* This function testing field f1 against f2, each of length nc.    */
/* lt is condition flag to indicate if f1 < f2, while gt indicates  */
/* if f1 > f2.  Comparison is carried out only on words marked by "mr" */

compare_field(f1,f2,nc,lt,gt,mr)
int f1, f2, nc, lt, gt, mr;
{
  int bit_count;

  letm d(gt) d(lt); letc; setag; write;
  /* clear greater &less than flags */

  for(bit_count=nc-1; bit_count>=0; bit_count--)
    {
      letm  d(mr) d(gt) d(lt) d(f1+bit_count) d(f2+bit_count);
      letc  d(mr) d(f1+bit_count); setag; compare;
      letc  d(mr) d(gt) d(f1+bit_count); write;
      letc  d(mr) d(f2+bit_count); setag; compare;
      letc  d(mr) d(lt) d(f2+bit_count); write;
    }
}


/************************ SHIFT LEFT *************************/
/* This function is shifted left one position the operand "op" */
/* of size "nc"                                                */

shift_left(op,nc)
int op, nc;
{
  int bit_count;
  for(bit_count=op+nc-2; bit_count>=op; bit_count--)
    {
      letm d(bit_count+1); letc; setag; write;
      letmc d(bit_count); setag; compare;
      letmc d(bit_count+1); write;
    }
  letm d(op); letc; setag; write;
}


/*** shift fields ***/
/*** This procedure shifts "nc" bits starting at bit-position "s0" ***/
/*** "pl" places down if dir=1 or up if dir=-1  ***/
shift_fields(s0,nc,pl,dir)
int s0,nc,pl,dir;
{
int bit_count, shift_count, long_shift_count, short_shift_count;
```

```
long_shift_count = pl/b;
short_shift_count = pl - long_shift_count*b;

  for(bit_count=s0; bit_count<s0+nc; bit_count++)
    {
      letm d(bit_count);
      letc d(bit_count); setag; compare;
      letc; write;
      letc d(bit_count);
      for(shift_count=0; shift_count<long_shift_count; shift_count++)
 shiftag(dir*b);
      for(shift_count=0; shift_count<short_shift_count; shift_count++)
 shiftag(dir);
      write;
    }
}


/*********** Estimating the Laplacian *************/

/* This is done by convolving U and V with the kernel
                   1/4  1/2   1/4
                   1/2  (1-4) 1/2
                   1/4  1/2   1/4
*/

laplace(in,out)
int in,out;
{

int bit_count, shift_index;

letm dseq(out,out+9); letc; setag; write; /* clear output field */
/* compute out <-- in - 4*in   */
for(bit_count=0; bit_count<9; bit_count++) /* move in to out */
  {
    letmc d(in+bit_count); setag; compare;
    letmc d(out+bit_count); write;
  }
sub(in,out+2,8,0,mark);   /* add the center pixel */
shift_fields(in,9,1,1);   /* shift "in" field one place down */
add(in+1,out,8,2,mark); /* Compute The West term */
shift_fields(in,9,2,-1); /* shift "in" field tow places up  */
add(in+1,out,8,2,mark); /* Compute The East term */
shift_fields(in,9,b,1) ; /* shift "in" field b places down */
add(in+2,out,7,3,mark) /* Compute The S-E term */
shift_fields(in,9,1,-1); /* shift "in" field one place up  */
add(in+1,out,8,2,mark); /* Compute The S  term */
shift_fields(in,9,1,-1);  /* shift "in" field one place up */
add(in+1,out,8,2,mark); /* Compute The S-W term */
shift_fields(in,9,1,-b);  /* shift "in" field b places up */
add(in+2,out,7,3,mark); /* Compute The N-W term */
shift_fields(in,9,1,1);   /* shift "in" field one place down */
add(in+1,out,8,2,mark); /* Compute N term */
shift_fields(in,9,1,1);   /* shift "in" field one place down */
```

```
add(in+2,out,7,3,mark); /* Compute NE term */

}

/****************************** MUL *************************************/
/* This function performs integer multiplication, between Multiplicand
   "mcd" of length "s_mcd" bits, by Multiplier "mlr" of length "s_mlr" bits,
   and output product results into "prd", to all wordes signed by "mr".
*/

mul(mcd,s_mcd,mlr,s_mlr,prd,mr)
int mcd,s_mcd,mlr,s_mlr,prd,mr;

{
  int add_offset, bit_count, f_index;

  for(add_offset=0; add_offset<s_mlr; add_offset++)
    /** add and propagate s_mcd+s_mlr-add_offset-1 positions,
        only where mlr+add_offset is sets.
    **/
    add(mlr,prd,s_mcd,s_mcd+s_mlr-add_offset-1,mlr+add_offset);

}
```

APPENDIX I

CONVERTING TO COLOR SPACE RGB-->YUV

```
#include "sub.rtn"

#define Pixel           0
#define PIXELSIZE    8
#define PixelSign    Pixel + PIXELSIZE
#define Array_Res    17
#define TempNig      39


#define Yr               0
#define Yg              Yr+8
#define Yb   Yg+8

#define Ur               24
#define Ug              Ur+8
#define Ub   Ug+8

#define Vr               48
#define Vg              Vr+8
#define Vb  Vg+8

#define RedPixel       72
#define GreenPixel    RedPixel+8
#define BluePixel      GreenPixel+8

addb(int  src ,int src_len,int dst ,int dst_len,int c_bit);
add(int  src ,int src_len,int dst ,int dst_len,int c_bit);
laplacian(int src ,int len ,int dst );
lpf(int src,int dst,int len);
void neighbour(int  SrcPos,int  DstPos,int len,int  NbrName);

enum color {RED,GREEN,BLUE };

main(int ,char *argv[])
{
 int j ;
 int color ;

 printf("Runnig Asp Simulator : %s \n\n", argv[0]);
   load (24L,72L);
  for (color = 0 ; color < 256 ; color++ )
   {
  letm dseq( RedPixel,RedPixel+PIXELSIZE-1);
  letc  dvar (RedPixel,RedPixel+PIXELSIZE,color); setag;
  compare;

  letm dseq ( Yr,Yr+PIXELSIZE-1);
  letc  dvar  ( Yr,Yr+PIXELSIZE,(int) (0.299 * color));
  write;

 /*  letm dseq ( Ur,Ur+PIXELSIZE-1);
```

```
    }
 letc   dvar ( Ur,Ur+PIXELSIZE, (int)( -0.168 * color));
 write;

 letm dseq ( Vr,Vr+PIXELSIZE-1);
 letc   dvar ( Vr,Vr+PIXELSIZE,(int)( 0.5 * color));
 write;

*/     }
  for (color = 0 ; color < 256 ; color++ )
   {
   letm dseq( GreenPixel,GreenPixel+PIXELSIZE-1);
  letc  dvar (GreenPixel,GreenPixel+PIXELSIZE,color); setag;
  compare;

  letm dseq ( Yg,Yg+PIXELSIZE-1);
  letc  dvar (Yg,Yg+PIXELSIZE,0.587*color);
  write;

/*  letm dseq ( Ug,Ug+PIXELSIZE-1);
  letc   dvar( Ug,Ug+PIXELSIZE,(int)( -0.3313 * color));
  write;

  letm dseq ( Vg,Vg+PIXELSIZE-1);
  letc  dvar (Vg,Vg+PIXELSIZE,(int)( -0.4187 * color));
  write;

*/     }
  for (color = 0 ; color < 256 ; color++ )
   {
   letm dseq( BluePixel,BluePixel+PIXELSIZE-1);
  letc  dvar (BluePixel,BluePixel+PIXELSIZE,color); setag;
  compare;

  letm dseq ( Yb,Yb+PIXELSIZE-1);
  letc   dvar ( Yb,Yb+PIXELSIZE,(int) (0.114 * color));
  write;

/*  letm dseq ( Ub,Ub+PIXELSIZE-1);
  letc ( (int)( 0.5 * color));
  write;

  letm dseq ( Vb,Vb+PIXELSIZE-1);
  letc ( (int)( 0.013 * color));
  write;
*/     }
 addb(Yg,PIXELSIZE,Yr,PIXELSIZE,8);
 add(Yb,PIXELSIZE,Yr,9,9);
  neighbour(0 ,72,PIXELSIZE,0);
  neighbour(0 ,72+8,PIXELSIZE,0);
  neighbour(0,72+16,PIXELSIZE,0);

//  lpf(0,10,Array_Res);
//  laplacian(0,10,24);
  save(24L,72L);
  print_cycles;
      return 0;
```

```
}
addb(int  src ,int src_len,int dst ,int dst_len,int c_bit)
{
int cnt ;
 /* clear carray bit */

// letm  d(c_bit) ; setag ;
// letc;
// write;
   letm d(dst)  d( src);
   letc d(src); setag;
   compare;
   letc d(dst);
   write;

   letc d(dst) d( src); setag;
   compare;
   letc d(c_bit);
   write;

 for(cnt=1; cnt<src_len; cnt++)
  {
   letm d(dst+cnt) d( c_bit) d( cnt+src);
   letc d(c_bit); setag;
   compare;
   letc d(dst+cnt);
   write;

   letc d(dst+cnt) d( c_bit); setag;
   compare;
   letc d(c_bit);
   write;

   letc d(dst+cnt) d( cnt+src); setag;
   compare;
   letc d(c_bit) d( cnt+src) ;
   write;

   letc d(cnt+src); setag;
   compare;
   letc d(dst+cnt) d( cnt+src);
   write;

 }

 /*   carry propogation */

            for (; cnt < dst_len ; cnt++)
  {
   letm d(dst+cnt) d( c_bit) ;
   letc d(c_bit); setag;
   compare;
   letc d(dst+cnt);
   write;
```

```
  letmc d(dst+cnt) d( c_bit); setag;
  compare;
  letc d(c_bit);
  write;
 }

            return 0;
}

add(int  src ,int src_len,int dst ,int dst_len,int c_bit)
{
int cnt ;
 /* clear carray bit */
 letm  d(c_bit) ; setag ;
 letc;
 write;


 for(cnt=0; cnt<src_len; cnt++)
  {
   letm d(dst+cnt) d( c_bit) d( cnt+src);
   letc d(c_bit); setag;
   compare;
   letc d(dst+cnt);
   write;

   letc d(dst+cnt) d( c_bit); setag;
   compare;
   letc d(c_bit);
   write;

   letc d(dst+cnt) d( cnt+src); setag;
   compare;
   letc d(c_bit) d( cnt+src) ;
   write;

   letc d(cnt+src); setag;
   compare;
   letc d(dst+cnt) d( cnt+src);
   write;

  }

 /*   carry propogation */

            for (; cnt < dst_len ; cnt++)
  {
   letm d(dst+cnt) d( c_bit) ;
   letc d(c_bit); setag;
   compare;
   letc d(dst+cnt);
   write;

   letmc d(dst+cnt) d( c_bit); setag;
   compare;
   letc d(c_bit);
```

```
  write;
 }

              return 0;
}

shift_2( int pos ,int len , int res ,int shift_factor)
{
int i ;
 /*   clean the result operand     */

  letm  dseq(res, res+ len + shift_factor-1) ; setag;
  letc   ;
   write ;

 /* copy  the operand from pos to res +shift_factor  using the tag
register */

  for ( i = 0; i < len ; i++ )
    {
  letmc  d( pos + i)  ; setag ;
  compare ;

  letmc  d( res + shift_factor + i);
  write ;
  }
 return 0 ;
}

sign (int pos , int len , int res , int temp )
{
int i ;
 /*   clean the result operand     */

  letm  dseq(res, res+ len-1) d(temp); setag;
  letc ;
   write ;

 /* copy  the operand from pos to res +shift_factor  using the tag
register */

  for ( i = 0; i < len ; i++ )
    {
  letm d(pos + i)  d(temp); setag ;
               letc d(pos + i) ;
  compare ;
  letmc d( res + i) d(temp) ;
  write ;

  letm  d( pos +i) d(temp); setag;
  letc  d(temp);
  compare ;
               letmc d(res+i);
  write ;
  }
 return 0 ;
```

```
}

shift_2( int pos ,int len , int res ,int shift_factor);
sign (int pos , int len , int res , int temp );
void neighbour(int  SrcPos,int  DstPos,int len,int  NbrName);
add(int  src ,int src_len,int dst ,int dst_len,int c_bit);

//enum color {RED,GREEN,BLUE };

laplacian(int src ,int len ,int dst )
{
 int j ;
// color cl;

//                neighbour(48+8*cl,0,0);
  shift_2 ( src, len , dst , 2 );   /* multply the array * 4 and put
result in */
  sign     ( src ,len , PixelSign , PixelSign + len );

          for ( j = 1 ; j <= 4 ; j++)
            {
  /* copy the neigbour */

  neighbour(PixelSign,TempNig,PIXELSIZE ,j);

  add(TempNig,len,dst,len+1+j,dst+len+1+j);
   }
  neighbour(dst+2 ,72,8,0);
  neighbour(dst+2 ,72+8,8,0);
  neighbour(dst+2 ,72+16,8,0);
  return 0;
}


shift_2( int pos ,int len , int res ,int shift_factor);
sign (int pos , int len , int res , int temp );
void neighbour(int  SrcPos,int  DstPos,int len ,int  NbrName);
add(int  src ,int src_len,int dst ,int dst_len,int c_bit);


lpf(int src,int dst,int len)
{
 int j ;
//                neighbour(48+8*cl,Pixel,PIXELSIZE,0);
  shift_2 ( src , len , dst , 2 );   /* multply the array * 4 and put
result in */
  shift_2 ( src , len , PixelSign , 1 );     /* multply the array * 4
and put result in */

          for ( j = 1 ; j <= 8; j++)
            {
      /* copy the neigbour */
      if ( j <=4)
      {
```

```
  neighbour(PixelSign,TempNig ,9,j);
  add(TempNig,PIXELSIZE+1,dst,PIXELSIZE+1+j,dst+PIXELSIZE+1+j);

     }
   else
    {
   neighbour(Pixel,TempNig,8,j);
  add(TempNig,PIXELSIZE,dst,PIXELSIZE+1+j,dst+PIXELSIZE+1+j);
    }
  }
 neighbour(dst+4 ,72,PIXELSIZE,0);
 neighbour(dst+4 ,72+8,PIXELSIZE,0);
 neighbour(dst+4 ,72+16,PIXELSIZE,0);
 print_cycles;
      return 0;
}


void neighbour(int  SrcPos,int  DstPos,int len ,int  NbrName)
{
 int i;
 /*  clear destintaion */

     letm dseq(DstPos ,DstPos+ len - 1) ; setag ;
  letc ;
  write ;


  for (i = 0; i < len ; i++)
    {

     letmc d(SrcPos + i) ; setag;
     compare;
     letmc  d(DstPos + i) ;
     switch(NbrName)
       {
 case  0:
  break;
 case   1 :
  shiftag(1) ;
  break;
 case   2:
  shiftag(-1);
  break;
 case   3:
  shiftag(128);
  break;
 case   4:
  shiftag(-128);
  break;
 case   5:
  shiftag(127) ;
  break;
 case   6:
  shiftag(-127);
```

```
  break;
 case   7:
  shiftag(129);
  break;
 case   8:
  shiftag(-129);
  break;
       }

     write ;
  }

 return;
}
```

APPENDIX J

```
/*        ASSOCIATIVE PROCESSOR IMPLEMENTATION, TO FIND                  */
/*        LINES DIRECTIONS IN IN 9X9 NEIGHBORHOOD.                       */
/*************************************************************************/
/*                                                                       */
/* IN THIS PROGRAM WE  CLASSIFY  EACH  EDGE  POINT TO ONE OF 180         */
/* DIFFERENT SEGMENTS OF LINES AND CORNERS,  THAT PRESENT AT ITS         */
/* 9X9  NEIGHBORS.                                                       */
/* THE EDGES WERE OBTAINED AT THE LOW  LEVEL PROCESS AND IS GIVEN        */
/* IN ONE BIT DEPTH.                                                     */
/* THE IMPLEMENTATION IS DONE ACCORDING TO THE FOLLOWING STEPS:          */
/* 1. REDUCE THE NUMBER OF EDGES POINTS  WHICH ARE AT VICINITY           */
/*    OF THE DISCUSSION EDGE POINT, FROM 80 (9X9-1) TO 24, BY            */
/*    GIVES  WEIGHTS TO  THE EDGE  DECISIONS, WHICH IS PROPORTIONAL      */
/*    TO  THE GEOMETRIC DISTANCE  FROM THE CENTER TO ITS NEIGHBORS.      */
/*    SO, ARRANGE THE 9X9 NEIGHBORS AS FOLLOWES:                         */
/*                                                                       */
/*         |---------|------------------------|---------|               */

/*         |         |    |                   |    |    |               */
/*         |  NW2    |----|     N2            |----| NE2 |              */
/*                                                                       */
/*         |----|    |----|----|----|----|----|    |----|               */
/*         |    |    | NW1     | N1      NE1  |    |    |               */

/*         |    |----|    |----|----|----|    |----|    |               */
/*         |         |    | NW | N  | NE |    |         |               */
/*         |         |----|----|----|----|----|         |               */
/*         |  W2     | W1 | W  | CE | E  | E1 |   E2    |               */
/*         |         |----|----|----|----|----|         |               */
/*         |         |    | SW | S  | SE |    |         |               */
/*         |    |----|    |----|----|----|    |----|    |               */
/*         |    |    | SW1     | S1      SE1  |    |    |               */
/*         |----|    |----|----|----|----|----|    |----|               */
/*         |                                                             */
/*         |  SW2    |----|     S2            |----| SE2 |              */
/*                                                                       */
/*         |---------|------------------------|---------|               */
/*                                                                       */
/*    EACH GROUP IS OBTAINED BY ORRING ALL THE EDGES POINTS IN IT.       */
/* 2. CLASSIFY THE 24 GROUPS INTO ONE OF 16 LINES WHICH GIVE HAMMING     */
/*    DISTANCE EQUAL OR LESS THAN 1 ACCORDING TO TABLE 1.                */
/*                                                                       */
/*          TABLE 1                                                      */
/*       =================                                               */
/*     LINE  0:     E  E1  E2                                            */
/*     LINE  1:     E (or NE) NE1 E2                                     */
/*     LINE  2:     NE NE1 NE2                                           */
/*     LINE  3:     NE (or N) NE1 N2                                     */
/*     LINE  4:     N N1 N2                                              */
/*     LINE  5:     N (or NW) NW1 N2                                     */
/*     LINE  6:     NW NW1 NW2                                           */
/*     LINE  7:     NW (or W) NW1 W2                                     */
```

```
/*      LINE  8:     W W1 W2                                                */
/*      LINE  9:     W (or SW) SW1 W2                                       */
/*      LINE 10:     SW SW1 SW2                                             */
/*      LINE 11:     SW (or S) SW1 S2                                       */
/*      LINE 12:     S S1 S2                                                */
/*      LINE 13:     S (or SE) SE1 S2                                       */
/*      LINE 14:     SE SE1 SE2                                             */
/*      LINE 15:     SE (or E) SE1 E2                                       */
/*                                                                          */
/* 3. MARK ONLY THOSE WHICH COMPOSE FROM 2 LINES.                           */
/****************************************************************************/
```

```
/******************* MEMORY ORGANIZATION ******************************/
/*                                                                    */
/* WE ORGANIZE THE MEMORY AS FOLLOWES:                                */
/*                                                                    */
/*|--|--|-------------------------------|------------------------|--|*/
/*|--|--|-------------------------------|------------------------|--|*/
/* M  T   G23 G22       . . .       G1 G0 L15 L14    . . .    L1 L0  D */
/* A  E                                                               */
/* R  M                                                               */
/* K  P                                                               */
/*                                                                    */
/* BIT  0     IS THE EDGE FLAG "D" ( D = 1 EDGE AT THIS POINT)        */
/* BITS 1- 16 ARE 16 ADDRESS OF THE LINES PRESENTED AT TABLE 1.      */
/* BITS 17-40 ARE THE 24 BITS OF THE REDUCTION LOGIC.                 */
/* BIT  41     IS TEMP (TEMPORARY)                                    */
/* BIT  42     IS MARK                                                */
/**********************************************************************/

/********************* MAIN PROGRAM ***********************************/

#define MEM_SIZE 400 /* 20 x 20 image size example*/
#define WORD_LENGTH 43
#include "sub.rtn"

#define  NW2 17   /* group-0  bit position */
#define  N2  18   /* group-1  bit position */
#define  NE2 19   /* group-2  bit position */
#define  NW1 20   /* group-3  bit position */
#define  N1  21   /* group-4  bit position */
#define  NE1 22   /* group-5  bit position */
#define  NW  23   /* group-6  bit position */
#define  N   24   /* group-7  bit position */
#define  NE  25   /* group-8  bit position */
#define  W2  26   /* group-9  bit position */
#define  W1  27   /* group-10 bit position */
#define  W   28   /* group-11 bit position */
#define  E   29   /* group-12 bit position */
#define  E1  30   /* group-13 bit position */
#define  E2  31   /* group-14 bit position */
```

```
#define  SW  32   /* group-15 bit position */
#define  S   33   /* group-16 bit position */
#define  SE  34   /* group-17 bit position */
#define  SW1 35   /* group-18 bit position */
#define  S1  36   /* group-19 bit position */
#define  SE1 37   /* group-20 bit position */
#define  SW2 38   /* group-21 bit position */
#define  S2  39   /* group-22 bit position */
#define  SE2 40   /* group-23 bit position */

main()

{
  int b = 20; /* long shift constant */
  int index, bit_count, seg_address, i1,i2;
  int seg_count = 0;
  int D = 0; /* edge data bit position*/
  int L0 = 1; /* first segment address bit position */
  int G0 = 17; /* "G" field first bit position */
  int TEMP = 41;
  int MARK = 42;

  static int seg[24][3] =
 {
   { E,E1,E2 } ,{ E,NE1,E2 },{ NE,NE1,NE2 },{ NE,NE1,N2},
   { N,N1,N2 },{ N,NW1,N2 },{ NW,NW1,NW2 },{ NW,NW1,W2 },
   { W,W1,W2 },{ W,SW1,W2 },{ SW,SW1,SW2 },{ SW,SW1,S2 },
   { S,S1,S2 },{ S,SE1,S2 },{ SE,SE1,SE2 },{ SE,SE1,E2 },
   { NE,NE1,E2 },{ N,NE1,N2 },{ NW,NW1,N2 },{ W,NW1,W2 },
   { SW,SW1,W2 },{ S,SW1,S2 },{ SE,SE1,S2 },{ E,SE1,E2 }
 };


  load;


/*********************** update "G" field ************************/

/**** CLEAR ****/
  letm dseq(L0,TEMP); letc; setag; write;

  /**** move "D" to "TAG" and shift 4 LINES AND 4 PIXELS DOWN ****/
  letmc d(D) d(MARK); setag; compare;
  for(index=0; index<4; index++)
    shiftag(b);
  for(index=0; index<4; index++)
    shiftag(1);


 /****** GROUPING  ******/
  letmc d(NW2); write; shiftag(-1); write;
  for(index=2;index<7;index++) { letmc d(N2); shiftag(-1); write; }
  letmc d(NE2); shiftag(-1); write; shiftag(-1); write;

  shiftag(-1);
  shiftag(-b);
```

```
}

for(index=8;index>5;index--) { letmc d(NE2); shiftag(1); write;}
for(;index>2;index--) { letmc d(N2); shiftag(1); write; }
for(;index>-1;index--) { letmc d(NW2); shiftag(1); write; }

shiftag(-b);

letmc d(W2); write;
letmc d(NW2); shiftag(-1); write;
letmc d(NW1); shiftag(-1); write;
letmc d(NW1); shiftag(-1); write;
letmc d(N1); shiftag(-1); write;
letmc d(NE1); shiftag(-1); write;
letmc d(NE1); shiftag(-1); write;
letmc d(NE2); shiftag(-1); write;
letmc d(E2); shiftag(-1); write;

shiftag(-b);

letmc d(E2); write;
letmc d(E2); shiftag(1); write;
letmc d(NE1); shiftag(1); write;
letmc d(NE); shiftag(1); write;
letmc d(N); shiftag(1); write;
letmc d(NW); shiftag(1); write;
letmc d(NW1); shiftag(1); write;
letmc d(W2); shiftag(1); write;
letmc d(W2); shiftag(1); write;

shiftag(-b);

letmc d(W2); write;
letmc d(W2); shiftag(-1); write;
letmc d(W1); shiftag(-1); write;
letmc d(W); shiftag(-1); write;
letmc d(E); shiftag(-1); shiftag(-1); write;
letmc d(E1); shiftag(-1); write;
letmc d(E2); shiftag(-1); write;
letmc d(E2); shiftag(-1); write;

shiftag(-b);

letmc d(E2); write;
letmc d(E2); shiftag(1); write;
letmc d(SE1); shiftag(1); write;
letmc d(SE); shiftag(1); write;
letmc d(S); shiftag(1); write;
letmc d(SW); shiftag(1); write;
letmc d(SW1); shiftag(1); write;
letmc d(W2); shiftag(1); write;
letmc d(W2); shiftag(1); write;

shiftag(-b);

letmc d(W2); write;
letmc d(SW2); shiftag(-1); write;
```

```
letmc d(SW1); shiftag(-1); write;
letmc d(SW1); shiftag(-1); write;
letmc d(S1); shiftag(-1); write;
letmc d(SE1); shiftag(-1); write;
letmc d(SE1); shiftag(-1); write;
letmc d(SE2); shiftag(-1); write;
letmc d(E2); shiftag(-1); write;

shiftag(-1);
shiftag(-b);

for(;index<3;index++) { letmc d(SE2); shiftag(1); write;}
for(;index<6;index++) { letmc d(S2); shiftag(1); write; }
for(;index<9;index++) { letmc d(SW2); shiftag(1); write;}

shiftag(-b);

letmc d(SW2); write; shiftag(-1); write;
for(index=6;index>1;index--)  { letmc d(S2); shiftag(-1); write;}
letmc d(SE2); shiftag(-1); write; shiftag(-1); write;


/********************* SEGMENTS CLASSIFICATION ******************/

 for(seg_count=0; seg_count<24; seg_count++)
   {
     if(seg_count>15)
       seg_address = LO + 2*(seg_count -15) - 1;
     else
seg_address = LO + seg_count;

     /*** test if hamming_distance < = 1 ****/
     /****************************************/

     letm d(D) d(seg[seg_count][0]) d(seg[seg_count][1])
d(seg_address) d(MARK);
     letc d(D) d(seg[seg_count][0]) d(seg[seg_count][1]) d(MARK);
     setag; compare;
     letc d(D) d(seg[seg_count][0]) d(seg[seg_count][1])
d(seg_address) d(MARK); write;

     letm d(D) d(seg[seg_count][0]) d(seg[seg_count][2])
d(seg_address) d(MARK);
     letc d(D) d(seg[seg_count][0]) d(seg[seg_count][2]) d(MARK);
     setag; compare;
     letc d(D) d(seg[seg_count][0]) d(seg[seg_count][2])
d(seg_address) d(MARK); write;

     letm d(D) d(seg[seg_count][1]) d(seg[seg_count][2])
d(seg_address) d(MARK);
     letc d(D) d(seg[seg_count][1]) d(seg[seg_count][2]) d(MARK);
     setag; compare;
     letc d(D) d(seg[seg_count][1]) d(seg[seg_count][2])
d(seg_address) d(MARK); write;
```

```
    }

  /** set TEMP if lines or corners were found **/
  /*********************************************/

  for(i1=L0; i1<L0+16; i1++)
    for(i2=L0; i2<L0+16; i2++)

      if(i1 != i2)
 {
   letm dseq(L0,L0+15) d(TEMP) d(MARK);
   letc d(i1) d(i2) d(MARK); setag; compare;
   letmc d(TEMP); write;

 }



 save;

print_cycles;

}
```

APPENDIX K

```
/***************************************************************************/
/*           CONTOUR LABELING BY ASSOCIATIVE PROCESSOR                     */
/***************************************************************************/

/*   This program  labels contours by a propagation  technique, and        */
/*      counts them.                                                        */
/*                                                                          */
/* The propagation algorithm is carried out as follows:                    */
/*                                                                          */
/*   1. Enter X-Y  coordinates  of all edge  points.                       */
/*   2. Each edge point is  tested against  it's 8  neighbors.             */
/*      Its label is exchanged  by the smallest one  which is              */
/*      connected to it (if any). If there is an exchange, clear           */
/*      its "temp" and set its "sf" (switch flag) bit.                     */
/*   3. Terminates process if there are no more exchanges, else            */
/*      goes back to step 2.                                                */
/*   4. The "temp" bit is counted to get the number of contours            */
/*      in the image.                                                       */

/******************** MEMORY ORGANIZATION ****************************/
/* Image size is N X N pixels, i.e. coordinates fields are 2Log2(N)        */
/* bits  in length.                                                         */
/*      2Log2(N)        2Log2(N)     1  1  1  1  1     2Log2(N)    1       */
/*   |--------------|-------------|--|--|--|--|--|-------------|--|        */
/*   |---xy_coord---|---operand---|--|--|--|--|--|----label----|--|        */
/*                                temp   sf lt gt              edge        */
/*                                   mark                                   */

/* INPUT FIELDS :                                                           */
/*          1)  xy_coord  gives position of all pixels.                     */
/*          2)  edge      indicates edge points.                            */
/* INTERMEDIATE (WORKING) FIELDS :                                          */
/*          1)  label     gives x-y coordinates of all edge points.         */
/*          2)  operand   gives label of connected edge to be tested.       */
/*          3)  lt, gt    indicate if operand is less than or greater       */
/*                        than the label field.                             */
/*          4)  sf        switch-flag indicates if label was changed in     */
/*                        current iteration.                                */
/*          5)  mark      indicates if label was ever exchanged.            */
/*          6)  temp      holds edge flag of neighbor under test.           */

/* OUTPUT FIELDS :                                                          */
/*          1) label      gives label of contours.                          */
/*     2) mark       marks contour starting points.              */
/***************************************************************************/


#define MEM_SIZE 64 /* 8 x 8 image size example */
#define WORD_LENGTH 24
#include "sub.rtn"

main()
```

```
{
  /** Initialize bit positions **/

  int edge = 0;
  int label = 1;
  int gt = 7;
  int lt = 8;
  int sf = 9;
  int mark = 10;
  int temp = 11;
  int operand = 12;
  int xy_coord = 18;

  int label_size = 6;
  int growth_threshold = 0;
  int new_condition = MEM_SIZE;

  int bit_count, growth, window_index;

  load;

  /** Clear working fields **/
  letm dseq(label,mark); letc; setag; write;

  /*** Mark and label all edge points ***/
  letmc d(edge); setag; compare;
  letmc d(mark); write;
  for(bit_count=0; bit_count<label_size; bit_count++)
    {
      letmc d(xy_coord+bit_count) d(edge); setag; compare;
      letmc d(label+bit_count); write;
    }

  while( new_condition   >  growth_threshold)
    {
      printf("%d\n", new_condition);
      letm d(sf) letc; setag; write; /*clear switch flag */

      /****** CONNECTIVITY TESTING ******/
      for(window_index=0; window_index<8; window_index++)
 {
  /** Shift "edge" and "label" into  "temp" and "operand"  **/
  letm dseq(temp,operand+label_size-1); letc; setag; write;
  for(bit_count=0; bit_count<label_size+1; bit_count++)
    {
      letmc d(edge+bit_count); setag; compare;
      letmc d(temp+bit_count);
      general_shift(window_index); write;
    }

  /** Test if "operand" < "label" **/
  letm d(gt) d(lt); letc; setag; write;
                     /* clear greater & less than flags */

  for(bit_count=label_size-1; bit_count>=0; bit_count--)
    {
```

```
      letm d(edge) d(temp) d(gt) d(lt)
 d(operand+bit_count) d(label+bit_count);
      letc d(edge) d(temp) d(operand+bit_count); setag; compare;
      letc d(edge) d(temp) d(gt) d(operand+bit_count); write;
      letc d(edge) d(temp) d(label+bit_count); setag; compare;
      letc d(edge) d(temp) d(lt) d(label+bit_count); write;
    }

  /** At all points where "lt" is set, do the following:
  1. Clear mark.
  2. Set switch flag "sf".
  3. Copy "operand" into "label".
  **/

  letmc d(lt); setag; compare;
  /* clear "label" and "mark", set switch flag */
  letm dseq(label,label+label_size-1) d(mark) d(sf); letc d(sf); write;
  /* exchange */
  for(bit_count=0; bit_count<label_size; bit_count++)
    {
      letmc d(operand+bit_count) d(lt); setag; compare;
      letmc d(label+bit_count); write;
    }
}

     /** Test for termination **/
     letmc d(sf); setag; compare;
     new_condition = countag;

   }

 letmc d(mark); setag; compare;
 /*** Display the number of contours ***/
 printf(" THERE ARE  %d CONTOURS IN THE IMAGE\n", countag);

 save;

 print_cycles;

}


/**************** GENERAL SHIFT IN 3 X 3 NEIGHBORHOOD **************/
/* This function shifts the Tag register according to the following*/
/* table:                                                          */
/*              |---------|-------|---------|                      */
/*              | 2 (b+1) | 1 (b) | 0 (b-1) |                      */
/*              |---------|-------|---------|                      */
/*              | 3  (1)  |       | 7 (-1)  |                      */
/*              |---------|-------|---------|                      */
/*              | 4 (-b+1)| 5(-b) | 6 (-b-1)|                      */
/*      |---------|-------|---------|                      */
/* where the pixel index 0-7 points to the required shift given in */
/* parentheses.                                                    */

general_shift(index)
```

```
int index;
{
  int b = 8; /* long shift */

  if(index<=2) shiftag(b);
  if(index>=4 && index<=6) shiftag(-b);
  if(index==0 || index==6 || index==7) shiftag(-1);
  if(index>=2 && index<=4) shiftag(1);
}
```

APPENDIX E

```
#include "sub.rtn"

#define Pixel          0
#define PIXELSIZE   8
#define PixelSign   Pixel + PIXELSIZE
#define Array_Res   24
#define TempNig     40

shift_2( int pos ,int len , int res ,int shift_factor);
sign (int pos , int len , int res , int temp );
void neighbour(int  SrcPos,int  DstPos,int  NbrName);
add(int  src ,int src_len,int dst ,int dst_len,int c_bit);

enum color {RED,GREEN,BLUE };

main(int ,char *argv[])
{
 int j ;
 color cl;

 printf("Runnig Asp Simulator : %s \n\n", argv[0]);
   load (24L,48L);

  for (cl = RED ; cl <= BLUE ; cl++ )
   {
                neighbour(48+8*cl,0,0);
  shift_2 ( Pixel , PIXELSIZE , Array_Res , 2 );   /* multply the array * 4 and put resul
t in */
          sign    ( Pixel , PIXELSIZE , PixelSign , PixelSign + PIXELSIZE );

          for ( j = 1 ; j <= 4 ; j++)
            {
  /* copy the neigbour */

  neighbour(PixelSign,TempNig ,j);

  add(TempNig,PIXELSIZE,Array_Res,PIXELSIZE+1+j,Array_Res+PIXELSIZE+1+j);
   }
  neighbour(Array_Res+2 ,48+8*cl,0);
    }
    save(24L,48L);
  print_cycles;
       return 0;
}

add(int  src ,int src_len,int dst ,int dst_len,int c_bit)
{
int cnt ;
 /* clear carray bit */

 letm  d(c_bit) ; setag ;
 letc;
 write;
```

```
for(cnt=0; cnt<src_len; cnt++)
 {
  letm d(dst+cnt) d( c_bit) d( cnt+src);
  letc d(c_bit); setag;
  compare;
  letc d(dst+cnt);
  write;

  letc d(dst+cnt) d( c_bit); setag;
  compare;
  letc d(c_bit);
  write;

  letc d(dst+cnt) d( cnt+src); setag;
  compare;
  letc d(c_bit) d( cnt+src) ;
  write;

  letc d(cnt+src); setag;
  compare;
  letc d(dst+cnt) d( cnt+src);
  write;

 }

 /*   carry propogation */

              for (; cnt < dst_len ; cnt++)
 {
  letm d(dst+cnt) d( c_bit) ;
  letc d(c_bit); setag;
  compare;
  letc d(dst+cnt);
  write;

  letmc d(dst+cnt) d( c_bit); setag;
  compare;
  letc d(c_bit);
  write;
 }

              return 0;
}

void neighbour(int  SrcPos,int  DstPos,int  NbrName)
{
 int i;
 /*  clear destintaion */

     letm dseq(DstPos ,DstPos+ PIXELSIZE-1) ; setag ;
   letc ;
   write ;


   for (i = 0; i < PIXELSIZE ; i++)
```

```
    {
     letmc d(SrcPos + i) ; setag;
     compare;
     letmc  d(DstPos + i) ;
     switch(NbrName)
       {
 case  0:
  break;
 case   1 :
  shiftag(1) ;
  break;
 case   2:
  shiftag(-1);
  break;
 case   3:
  shiftag(128);
  break;
 case   4:
  shiftag(-128);
  break;
       }

     write ;
   }

 return;
}

shift_2( int pos ,int len , int res ,int shift_factor)
{
int i ;
 /*   clean the result operand     */

  letm  dseq(res, res+ len + shift_factor-1) ; setag;
  letc    ;
   write ;

 /* copy  the operand from pos to res +shift_factor  using the tag register */

  for ( i = 0; i < len ; i++ )
    {
  letmc  d( pos + i)   ; setag ;
  compare ;

  letmc  d( res + shift_factor + i);
  write ;
  }
 return 0 ;
}

sign (int pos , int len , int res , int temp )
{
int i ;
 /*   clean the result operand     */
```

```
 letm  dseq(res, res+ len-1) d(temp); setag;
 letc ;
  write ;

/* copy  the operand from pos to res +shift_factor  using the tag register */

 for ( i = 0; i < len ; i++ )
   {
 letm d(pos + i)  d(temp); setag ;
               letc d(pos + i) ;
 compare ;
 letmc d( res + i) d(temp) ;
 write ;

 letm  d( pos +i) d(temp); setag;
 letc  d(temp);
 compare ;
               letmc d(res+i);
 write ;
  }
 return 0 ;
}
```

APPENDIX L

```
/**************************************************************************/
/*                                                                        */
/*               ASSOCIATIVE  SALIENCY  NETWORK                          */
/*                                                                        */
/**************************************************************************/
/*

                  *             *             *
                   \            |            /
                     \          |          /
                       E8       E1       E2
                         \      |      /
                           \    |    /
                  *-----E7--------*---------E3----*
                           /    |    \
                         /      |      \
                       E6       E5       E4
                      /         |         \
                    /           |           \
                  *             *             *


                               Memory Format
    1  1    8        8                                          8       1
   |--|--|--------|--------|--------|--|  ...  |--------|--|--------|--|
   |--|--|--------|--------|--------|--|       |--------|--|--------|--|
   mrk tmp   T2       T1       E8    sig8          E2   sig2   E1    sig1

*/


#define MEM_SIZE    64
#define WORD_LENGTH 90
#include "sub.rtn"

main()
{
  static int  sig[8] = {0, 9, 18, 27, 36, 45, 54, 63}; /* sigma bit position*/
  static int    E[8] = {1,10, 19, 28, 37, 46, 55, 64}; /* seliency measures
                                                           bit positions     */
  static int BrachConnect[8][5] = {
    { 1,0,8,1,2  }, /* neighboring braches, connecting to brach 1 */
    { 1,-1,1,2,3 }, /* neighboring braches, connecting to brach 2 */
    { 0,-1,2,3,4 }, /* neighboring braches, connecting to brach 3 */
    { -1,-1,3,4,5}, /* neighboring braches, connecting to brach 4 */
    { -1,0,4,5,6 }, /* neighboring braches, connecting to brach 5 */
    { -1,1,5,6,7 }, /* neighboring braches, connecting to brach 6 */
    { 0,1,6,7,8  }, /* neighboring braches, connecting to brach 7 */
    { 1,1,7,8,1  }  /* neighboring braches, connecting to brach 8 */
  }
```

```
  int T1 = 72; /* 8 bit temporary */
  int T2 = 80; /* 8 bit temporary */
  int tmp = 88;
  int mrk = 89;

/*************** Clear Temporary Fields *****************/
letm dseq(T1,T1+8); letc; setag; write;

/** Compute E, the salieny seasure, to every brach, connected to P **/
for(branch_cnt=0; brach_cnt<8; brach_cnt++)
  {
    shift_and_do(brach_cnt,0,T1); /* perform Ej*Fij --> T1 for curv_cnt=0 */
    for(curv_cnt=1; curv_cnt<2; curv_cnt++)
      {
 shift_and_do(brach_cnt,curv_cnt,T1); /* Ej*Fij --> T1         */
 max_field(T1,T2);                    /* maximum(T1,T2) --> T2 */
      }
    Sum_Acc(brach_cnt, T2, E);       /* SIGi + ROUi*MAX(Ej*Fij) --> Ei */
  }
}

/************* SHHIFT_AND_DO **************/
shift_and_do(bc,cc,x0)
int bc, cc, x0;
{
  int bit_cnt,long_shift,short_shift;
  int b=8;

  if(cc==0 || cc==2)  START=1;
  if(cc==1)           START=0;
  for(bit_cnt=START; bit_cnt<8; bit_cnt++)
    {
      letmc d(E[BrachConnect[bc][cc+2]]+bit_cnt); setag; compare;
      long_shift = b*Brach_connect[bc][0];
      short_shift= brach_connect[bc][1];
      if(long_shift  != 0 ) shiftag(long_shift );
      if(short_shift != 0 ) shiftag(short_shift);
      letmc d(x0+bit_cnt); write;
    }
}

/************* MAX_FIELD*************/
max_field(t0,t1)
int t0,t1;
{
  int bit_count, next_bit_t0, next_bit_t1;

  /********* Set "tmp" if t0 > t1 *********/
  letm d(tmp); letc; setag; write; /* clear "tmp" */
  for(bit_count=7; bit_count>=0; bit_count--)
 {
   next_bit_t0 = t0 + bit_count;
   next_bit_t1 = t1 + bit_count;
    letm d(tmp) d(next_bit_t0) d(next_bit_t1);
   letc d(next_bit_t0); setag; compare;
   letc d(tmp); write;
```

```
    }
  }

  /********* Copy t0 to t1 if "tmp" = 1 *********/
  letmc d(tmp); setag; compare;
  letm dseq(t1,t1+7); letc; write; /* clear "t1" field */
  for(bit_count=0; bit_count<8; bit_count++)
    {
      letmc d(t0+bit_count); setag; compare;
      letmc d(t1+bit_count); write;
    }
}

  /** Shift the Suitable Braches given in BrachConnect Array, to T1**/
  /** Compute:  T1<--T1*fij  **/
```

APPENDIX M

Associative Hough Transform for lines

```
#define WORD_LENGTH 53
#define MEM_SIZE 4
#include "sub.rtn"

#include <math.h>
#include "funlib5.h"

int bitcount,carry,theta,ro,mth1,place;

int outbitth=3;              /* Length of theta in the output          */
int outbitro=3;              /* Length of ro in the output             */

int spsin=2;                 /* Starting bit of sin(th)                */
int spcos=14;                /* Starting bit of cos(th)                */
int spro=15;                 /* Starting bit of ro                     */
int spy=24;                  /* Starting bit of y, absolute value & sign */
int spx=33;                  /* Starting bit of x, absolute value & sign */
int spth=42;                 /* Starting bit of theta                  */

int temp=23;                 /* Position of temporary bit              */
int cand=52;                 /* Position of edge point flag            */

int lenth=10;                /* Length of theta                        */
int lenx=9;                  /* Length of x and y                      */
int lensin=9;                /* Length of sine and cosine              */
int lenro=9;                 /* Length of ro, x*cos(th) and y*sin(th)  */
int histogram[thmax][romax]; /* The accumulator array                  */

/***********************************************************************/
/* |-----------------------------------------------------------------| */
/* | 1 | 10 | 9 | 9 | 1 |     8     |1| 2 |1|   6   | 2 |1 |1| 1   | */
/* |-----------------------------------------------------------------| */
/* |cand|theta| x | y |temp|  cos(th)  |guard |    sin(th)   |      | */
/* |-----------------------------------------------------------------| */
/* |cand|theta| x | y |temp| x* cos(th) |guard|  sin(th)   | guard  | */
/* |-----------------------------------------------------------------| */
/* |cand|theta| x | y | x*cos(th) 2's c |    |y*sin(th) 2's|    |temp| */
/* |-----------------------------------------------------------------| */
/* |cand|theta| x | y |       ro        | |                    |temp| */
/* |-----------------------------------------------------------------| */
/***********************************************************************/

main()
{
  int spysin=(spsin+1)+lensin-lenx;  /* Starting bit of y*sin(th) */
  int spxcos=spcos+lensin-lenx;      /* Starting bit of x*cos(th) */

  load;
  letm dseq(0,spy-1); letc; setag; write;
```

```
/* Lookup table with modified theta sharing the sine field */
  lookup2(spsin,spcos,spth,lenth,temp,spcos-1);
  letm d(temp) dseq(spsin+lensin,spcos-1); letc; setag; write;

/* Truncated multiplication of x by cos(th) */
  tr_multiplication(spx,lenx,spcos,lensin,temp);

/* Make all zero values positive */
  letm dseq(spxcos-3,spxcos+lenro-2); letc; setag; compare;
  letm d(spxcos+lenro-1); write;

/* Reset temporary and last guard bit */
  letm d(temp) d(spxcos-3); letc; setag; write;

/* Move sin(th) to its proper position */
  for (bitcount=lensin-2;bitcount>-1; bitcount--)
    {
      letm d(spsin+bitcount) d(spysin+bitcount);
      letc d(spsin+bitcount); setag; compare;
      letc d(spysin+bitcount); write;
    }

/* Truncated multiplication of y by sin(th) */
  tr_multiplication(spy,lenx,spsin+1,lensin,temp);

/* Make all zero values positive */
  letm dseq(spysin-3,spysin+lenro-2); letc; setag; compare;
  letm d(spysin+lenro-1); write;

/* Reset temporary bit */
  letm d(temp); letc; setag; write;

  twoscomp(spxcos-2,lenro+2,temp);
  letm d(temp); letc; setag; write;
  twoscomp(spysin-3,lenro+3,temp);
  letm d(temp); letc; setag; write;

  temp=0;
/* Copy sign bit */
  letmc d(spxcos+lenro-1); setag; compare;
  letmc d(spxcos+lenro); write;

/* Add to obtain ro */
  addition(spysin-2,spxcos-2,lenro+2,temp,cand);

/* Complete the addition */
  letm d(spro+lenro-1) d(temp) d(spysin+lenro-1);
  letc d(spysin+lenro-1) d(spro+lenro-1); setag; compare;
  letc d(temp) d(spysin+lenro-1); write;
  letc d(spysin+lenro-1); setag; compare;
  letc d(spro+lenro-1) d(spysin+lenro-1); write;
  letc d(temp); setag; compare;
  letc d(spro+lenro-1); write;
  letc d(temp) d(spro+lenro-1); setag; compare;
  letc d(temp); write;
```

```
/* Correct the addition */
  letm d(spro-1) d(spro-2);
  letc d(spro-1); setag; compare;
  letc d(spro-2); write;

  for (bitcount=0;bitcount<lenro;bitcount++)
    {
      letm d(spro+bitcount) d(spro-2);
      letc d(spro-2); setag; compare;
      letc d(spro+bitcount); write;
      letc d(spro-2) d(spro+bitcount); setag; compare;
      letc d(spro-2); write;
    }

/* Accumulate and read out histogram */
/* If upper bit of ro not significant shift down one place */

  place=1;
  letm d(spro+lenro-1) d(spro+lenro-2) d(cand);
  letc d(spro+lenro-1) d(cand); setag; compare;
  if (PAR.RSP)     place=0;
  letc d(spro+lenro-2) d(cand); setag; compare;
  if (PAR.RSP)     place=0;

  letm dseq(spth+lenth-outbitth,spth+lenth-1)
       dseq(spro+lenro-outbitro-place,spro+lenro-1-place) d(cand);

  for (theta=0;theta<thmax;theta++)
    {
      for (ro=0;ro<romax;ro++)
 {
   if (ro != pow2(outbitro-1)) {
   letc dvar(spth+lenth-outbitth,spth+lenth-1,theta)
        dvar(spro+lenro-outbitro-place,spro+lenro-1-place,ro) d(cand);
   setag; compare;
   histogram[theta][ro]=countag;}
 }
    }

  save;
}
```

APPENDIX N

Hough Transform for Circles

```
#define WORD_LENGTH 63
#define MEM_SIZE 4
#define xmax 128              /* pow2(outbitx0) */
#define ymax 128              /* pow2(outbity0) */

#include "sub.rtn"
#include <math.h>
#include "funlib6.h"

int x,y,bitcount;

int R=29;                     /* The radius value                              */
int lenR=5;                   /* Length of R, Rcos(th), Rsin(th)               */

int spy0=0;                   /* Starting bit of y0                            */
int spx0=9;                   /* Starting bit of x0                            */
int spsin=15;                 /* Starting bit of sine                          */
int spRsin=18;                /* Starting bit of Rsin(th)                      */
int spcos=21;                 /* Starting bit of cosine                        */
int spRcos=24;                /* Starting bit of Rcos(th)                      */
int spy=30;                   /* Starting bit of y in 2's complement           */
int spx=39;                   /* Starting bit of x in 2's complement           */
int spth=48;                  /* Starting bit of theta                         */

int temp=59;                  /* Position of temporary flag                    */
int over1=60;                 /* Position of the first overflow flag           */
int over2=61;                 /* Position of the second overflow flag          */
int cand=62;                  /* Position for the edge point flag              */

int lenth=11;                 /* Length of theta, in absolute value and sign */
int lenx=9;                   /* Length of x, y, x0, y0 in 2's complement      */
int lencos=9;                 /* Length of cos, sin                            */

int outbitx0=7;               /* Length of x0 in the output                    */
int outbity0=7;               /* Length of y0 in the output                    */
int histogram[xmax][ymax];    /* Accumulator array                             */

/*****************************************************************************/
/*-------------------------------------------------------------------------*/
/*|1 |1 |1 |1| 11  |  9  |  9  |    6     | 3 | 3 |2|1|  6    |    9    |*/
/*|-----------------------------------------------------------------------|*/
/*|c |o1|o2|T|theta|  x  |  y  |  cos(th)     |    | sin(th)  |         |*/
/*|-----------------------------------------------------------------------|*/
/*|c |o1|o2|T|theta|  x  |  y  | Rcos(th)|  sin(th)  |                   |*/
/*|-----------------------------------------------------------------------|*/
/*|c |o1|o2|T|theta|  x  |  y  | Rcos(th)|Rsin(th)|    x0     |    y0   |*/
/*-------------------------------------------------------------------------*/
/*                                                                         */
/*              c    : (cand)  flag for edge point                         */
/*              o1   : (over1) overflow for x0                             */
```

```
/*                      o2    : (over2) overflow for y0                    */
/*                      T     : (temp)  temporary flag                     */
/**************************************************************************/

main()
{
  load;
  letm dseq(0,spy-1) d(temp); letc; setag; write;

/* Load cosine and sine */
  lookup2(spx0,spcos,spth,lenth-1,temp,spx0-1);
  letm d(temp) d(spx0-1); letc; setag; write;

/* Multiplication cos(th) by R */
  r_multiplication(spcos,lencos,R,lenR,temp);

  letm dseq(spx0+lencos,spRcos-1) d(temp); letc; setag; write;

/* Transfer sine to its proper position */
  for (bitcount=lencos-2;bitcount>-1;bitcount--)
    {
      letm d(bitcount+spx0) d(spsin+bitcount);
      letc d(bitcount+spx0); setag; compare;
      letc d(spsin+bitcount); write;
    }

/* Multiplication sin(th) by R */
  r_multiplication(spsin,lencos,R,lenR,temp);


/***********************************************************/
/*                                                         */
/*           Find centers of white circles                 */
/*                                                         */
/***********************************************************/

  letm dseq(spy0,spRsin-1) d(temp); letc; setag; write;

/* Copy R*cos(th) and R*sin(th) to x0 and y0, respectively, right justified */
  for (bitcount=0;bitcount<lenR;bitcount++)
    {
      letmc d(bitcount+spRcos); setag; compare;
      letmc d(bitcount+spx0); write;
      letmc d(bitcount+spRsin); setag; compare;
      letmc d(bitcount+spy0); write;
    }

/* Copy sign of R*cosine and R*sine inverting when theta<0 */

  letmc d(spth+lenth-1); setag; compare;
  letmc dseq(spy0+lenR,spy0+lenx-1); write;

  letm d(spth+lenth-1) d(spRcos+lenR) dseq(spx0+lenR,spx0+lenx-1);
  letc d(spth+lenth-1); setag; compare;
  letc d(spth+lenth-1) dseq(spx0+lenR,spx0+lenx-1); write;
  letc d(spRcos+lenR); setag; compare;
```

```
  letc d(spRcos+lenR) dseq(spx0+lenR,spx0+lenx-1); write;

/* Make every zero value positive */

  letm dseq(spx0,spx0+lenR-1); letc; setag; compare;
  letm dseq(spx0+lenR,spx0+lenx-1); write;
  letm dseq(spy0,spy0+lenR-1); setag; compare;
  letm dseq(spy0+lenR,spx0+lenx-1); write;

  twoscomp(spx0,lenR+1,temp);
  letm d(temp); letc; setag; write;
  twoscomp(spy0,lenR+1,temp);
  letm d(temp) d(over1); letc; setag; write;

/* Look for the possible overflows of x0 and mark them */
  letm d(spx+lenx-1) d(spx0+lenx-1) d(over1);
  letc d(spx+lenx-1) d(spx0+lenx-1); setag; compare;
  letc d(over1) d(spx+lenx-1) d(spx0+lenx-1); write;
  letc; setag; compare;
  letc d(over1); write;

  addition(spx,spx0,lenx,temp,cand);

/* Find the overflows of x0 */
  letm d(over1) d(temp) d(spx0+lenx-1);
  letc d(over1) d(temp) d(spx0+lenx-1); setag; compare;
  letc d(spx0+lenx-1); write;
  letc d(over1); setag; compare;
  letc; write;

/* Look for the possible overflows of y0 and mark them */
  letm d(temp) d(over2); letc; setag; write;

  letm d(spy+lenx-1) d(spy0+lenx-1) d(over2);
  letc d(spy+lenx-1) d(spy0+lenx-1); setag; compare;
  letc d(over2) d(spy+lenx-1) d(spy0+lenx-1); write;
  letc; setag; compare;
  letc d(over2); write;

  addition(spy,spy0,lenx,temp,cand);

/* Find the overflows of y0 */
  letm d(over2) d(temp) d(spy0+lenx-1);
  letc d(over2) d(temp) d(spy0+lenx-1); setag; compare;
  letc d(spy0+lenx-1); write;
  letc d(over2); setag; compare;
  letc; write;


/* Histogram of white circle location */
letm dseq(spx0+lenx-outbitx0,spx0+lenx-1)
     dseq(spy0+lenx-outbity0,spy0+lenx-1) d(over1) d(over2) d(cand);

  for (x=0;x<xmax;x++)
    {
     for (y=0;y<ymax;y++)
```

```
 {
   letc dvar(spx0+lenx-outbitx0,spx0+lenx-1,x)
        dvar(spy0+lenx-outbity0,spy0+lenx-1,y) d(cand);
   setag; compare;
   histogram[x][y]=countag;
 }
    }

/**********************************************************/
/*                                                        */
/*          Find centers of black circles                 */
/*                                                        */
/**********************************************************/

  letm dseq(spy0,spRsin-1) d(temp); letc; setag; write;

/* Copy R*cos(th) and R*sin(th) to x0 and y0, respectively, right justified */
  for (bitcount=0;bitcount<lenR;bitcount++)
    {
      letmc d(bitcount+spRcos); setag; compare;
      letmc d(bitcount+spx0); write;
      letmc d(bitcount+spRsin); setag; compare;
      letmc d(bitcount+spy0); write;
    }

/* Copy sign of R*cosine and R*sine inverting when theta>0 */

  letm d(spth+lenth-1) dseq(spy0+lenR,spy0+lenx-1);
  letc; setag; compare;
  letc dseq(spy0+lenR,spy0+lenx-1); write;

  letm d(spth+lenth-1) d(spRcos+lenR) dseq(spx0+lenR,spx0+lenx-1);
  letc; setag; compare;
  letc dseq(spx0+lenR,spx0+lenx-1); write;
  letc d(spRcos+lenR) d(spth+lenth-1); setag; compare;
  letc d(spRcos+lenR) d(spth+lenth-1) dseq(spx0+lenR,spx0+lenx-1); write;

/* Make every zero value positive */

  letm dseq(spx0,spx0+lenR-1); letc; setag; compare;
  letm dseq(spx0+lenR,spx0+lenx-1); write;
  letm dseq(spy0,spy0+lenR-1); setag; compare;
  letm dseq(spy0+lenR,spy0+lenx-1); write;


  twoscomp(spx0,lenR+1,temp);
  letm d(temp); letc; setag; write;
  twoscomp(spy0,lenR+1,temp);
  letm d(temp) d(over1); letc; setag; write;

/* Look for the possible overflows of x0 and mark them */
  letm d(spx+lenx-1) d(spx0+lenx-1) d(over1);
  letc d(spx+lenx-1) d(spx0+lenx-1); setag; compare;
  letc d(over1) d(spx+lenx-1) d(spx0+lenx-1); write;
  letc; setag; compare;
  letc d(over1); write;
```

APPENDIX 0

```
#include "sub.rtn"

#define  COLOR_SIZE 8
#define  color 0
#define  TM      color+COLOR_SIZE
#define  CN       TM+1
#define  CL       CN+1
#define  VN        CL+1
#define  VL        VN+1
#define  S          VL+1
process(int window_index);
general_shift(int index);

main(int,char *argv[])
{
int i;
int   window_index;

 printf("Running asp simulator - %s\n",argv[0]);


 load (8,0);
 letmc d(S);setag;
 write;

 letmc dseq(color,color+COLOR_SIZE-1);setag;
 compare;

 letm d (S); letc;
 write;

 letm d(CL) d(VL);letc;setag;
 write;
 letmc d(S);setag;compare;
 letmc d(CL);write;

// while (rsp)
 for (i = 0 ; i < 6 ; i++ )
   {
  for(window_index=0 ; window_index < 8 ; window_index++)
   {
   letm d ( CN) d (VN);letc ; setag ;write;
   letmc d(CL);setag;
   compare;
   letmc d(CN);general_shift(window_index);write;
   letmc d(VL);setag;compare;
   letmc d(VN);general_shift(window_index);write;
   process(window_index);
   }
//  letm d(CL) ;letc; setag; compare;
   }
```

```
// for(window_index=0 ; window_index < 8 ; window_index++)
//  process();
 print_cycles;
 save(8,0);
 return 0;
}

process   (int window_index)
{
int i;
 for(i=0 ; i < COLOR_SIZE ; i++)
  {
  letm d(TM) ; letc : setag; write;
  letmc d(color+i); setag ; compare;
  letmc d(TM); general_shift(window_index); write;

  letm  dseq(TM,CL) d(color+i);letc d(CL) d(CN) d(TM);setag;compare;
  letmc d(VL);write;
  letm dseq(TM,CL) d(color+i);
  letc d(CL) d(CN) d(color+i);setag;compare;
  letmc d(VL);write;

  letm dseq(TM,CL) d(color+i);
  letc d(CN) d(color+i);setag;compare;
  letm d(color+i);letc;write;

  letm dseq(TM,CL) d(color+i);
  letc d(CN) d(TM);setag;compare;
  letmc d(color+i);write;

   }
 letm d(CL) d(CN) d(VL);
 letc   d(CN); setag;
 compare;
 letmc d(CL);
 write;
return 0;
}

general_shift(int index)
{
if (index ==4 || index == 0 || index==6) shiftag(128);
if (index ==5 || index == 1 || index==7) shiftag(-128);
if (index ==6 || index == 3 || index==5) shiftag(1);
if (index ==4 || index == 2 || index==7) shiftag(-1);
return 0;
}
```

APPENDIX P

```
/*************** ASP SIMULATOR *******************/

#include <stdio.h>
#define setag set_tag()
#define firsel fir_sel()
#define countag coun_tag()
#define letm let_m();
#define letc let_c();
#define letmc let_mc();
#define clearc let_c();
#define setc set_c();
#define c_to_m  mov_cm()
#define m_to_c  mov_mc()
#define d(x) del(x);
#define dseq(x1,x2) ((x2>x1)?dseq1(x1,x2):dseq1(x2,x1));
#define dvar(x1,x2,dat) (cons(x1,x2,dat));
#define load r_disk()
#define save w_disk()
#define compare comp()
#define write wr()
#define read rd()
#define BIT(k) ((1<<k))
#define OF_WORD &
#define TRUE 1
#define FALSE 0
#define EVEN_WORD(x) ( ((x&1)?0:1) )
#define SIGN(x) ( (x<0)?-1:1)
#define print_cycles printf(" %3.1f CYCLES = %4.3f usec\n", CYCLES,CYCLES*.05);
#define extern

float CYCLES = 0;
int PULSE = FALSE;
int FLAG_CYCLES = FALSE;
int space_arr[WORD_LENGTH];

struct
       {
  int COUNTS,RSP;
  unsigned A[WORD_LENGTH][MEM_SIZE];
  unsigned OUT_DAT[WORD_LENGTH];
  struct { unsigned BOOLEAN:1; }
         M_OR_C_FLAG,
         M_AND_C_FLAG,
         COMP[WORD_LENGTH],
         MASK[WORD_LENGTH],
         TAG[MEM_SIZE];
       } PAR;


setag
```

```
 {
   extern struct PAR;
   int i;

   CYCLES+=0.5;
   PULSE = FALSE;
   FLAG_CYCLES = TRUE;

   for(i=0;i<MEM_SIZE;i++)
     PAR.TAG[i].BOOLEAN = 1;
 }


shiftag(b)
int b;

       {
  extern struct PAR;
  int i;

  if (abs(b)>1) CYCLES+=8;
  else CYCLES+=0.5 ;
  PULSE = FALSE;
  FLAG_CYCLES = TRUE;

  if (b < 0)
    {
      for(i=0;i<MEM_SIZE+b; i++)
        PAR.TAG[i].BOOLEAN = PAR.TAG[i-b].BOOLEAN;
      for(i=MEM_SIZE+b;i<MEM_SIZE;i++)
        PAR.TAG[i].BOOLEAN = 0;
    }
  else
    {
      for(i=MEM_SIZE-1;i>=b;i--)
        PAR.TAG[i].BOOLEAN = PAR.TAG[i-b].BOOLEAN;
      for(i=0;i<b;i++)
        PAR.TAG[i].BOOLEAN = 0;
    }

       }

coun_tag()
{
  extern struct PAR;
  int i;
  PULSE = FALSE;
  CYCLES += 10;
  PAR.COUNTS = 0;
  for(i=0;i<MEM_SIZE;i++)
    PAR.COUNTS = PAR.COUNTS + PAR.TAG[i].BOOLEAN;
  return(PAR.COUNTS);
}
```

```
fir_sel()
{
  extern struct PAR;
  int i;
  int j = 0;
  PULSE = FALSE;
  CYCLES += 6;
  while(!PAR.TAG[j++].BOOLEAN);
  for(i=j;i<MEM_SIZE;i++)
    PAR.TAG[i].BOOLEAN = FALSE;
}

let_c()
{
  extern struct PAR;
  int i;
  FLAG_CYCLES = FALSE;
  PAR.M_OR_C_FLAG.BOOLEAN = TRUE;
  PAR.M_AND_C_FLAG.BOOLEAN = FALSE;
  for(i=0;i<WORD_LENGTH;i++)
    PAR.COMP[i].BOOLEAN = 0;
}

let_m()
{
extern struct PAR;
int i;
FLAG_CYCLES = FALSE;
PAR.M_OR_C_FLAG.BOOLEAN = FALSE;
PAR.M_AND_C_FLAG.BOOLEAN = FALSE;
for(i=0;i<WORD_LENGTH;i++)
  PAR.MASK[i].BOOLEAN = 0;
}

let_mc()
{
extern struct PAR;
int i;
FLAG_CYCLES = FALSE;
PAR.M_AND_C_FLAG.BOOLEAN = TRUE;
for(i=0;i<WORD_LENGTH;i++)
  {
    PAR.MASK[i].BOOLEAN = 0;
    PAR.COMP[i].BOOLEAN = 0;
  }
}

set_c()
{
int i;
  for(i=0;i<WORD_LENGTH;i++)
    PAR.COMP[i].BOOLEAN = 1;
}
```

```
mov_cm()
{
  extern struct PAR;
  int i;
  for(i=0;i<WORD_LENGTH;i++)
    PAR.MASK[i].BOOLEAN = PAR.COMP[i].BOOLEAN;
}

mov_mc()
{
  extern struct PAR;
  int i;
  for(i=0;i<WORD_LENGTH;i++)
    PAR.COMP[i].BOOLEAN = PAR.MASK[i].BOOLEAN;
}

del(n)
int n;
{
  extern struct PAR;
  int i;
  if(!FLAG_CYCLES && PULSE) CYCLES+=0.5;
  PULSE = FLAG_CYCLES = TRUE;
  if(PAR.M_OR_C_FLAG.BOOLEAN || PAR.M_AND_C_FLAG.BOOLEAN)
    PAR.COMP[n].BOOLEAN = TRUE;
  if(!PAR.M_OR_C_FLAG.BOOLEAN || PAR.M_AND_C_FLAG.BOOLEAN)
    PAR.MASK[n].BOOLEAN = TRUE;
}

cons(start,stop,var)
int start,stop;
unsigned var;
{
  extern struct PAR;
  unsigned i;
  if(!FLAG_CYCLES && PULSE) CYCLES+=0.5;
  PULSE = FLAG_CYCLES  = TRUE;

  for(i=start;i<=stop;i++)
    {
      if(PAR.M_OR_C_FLAG.BOOLEAN || PAR.M_AND_C_FLAG.BOOLEAN)
 if(BIT(i-start) OF_WORD var)
   PAR.COMP[i].BOOLEAN = TRUE;
      if(!PAR.M_OR_C_FLAG.BOOLEAN || PAR.M_AND_C_FLAG.BOOLEAN)
 if(BIT(i-start) OF_WORD var)
   PAR.MASK[i].BOOLEAN = TRUE;
    }
}


dseql(n1,n2)
int n1,n2;
{
  extern struct PAR;
  int i;
```

```
    if(!FLAG_CYCLES && PULSE) CYCLES+=0.5;
    PULSE = FLAG_CYCLES  = TRUE;
    if(PAR.M_OR_C_FLAG.BOOLEAN || PAR.M_AND_C_FLAG.BOOLEAN)
      for( i=n2; i>=n1; i--)
        PAR.COMP[i].BOOLEAN = TRUE;
    if(!PAR.M_OR_C_FLAG.BOOLEAN || PAR.M_AND_C_FLAG.BOOLEAN)
      for( i=n2; i>=n1; i--)
        PAR.MASK[i].BOOLEAN = TRUE;
  }

  r_disk()
  {
    extern struct PAR;
    int k,j;
    char c1;
    FILE *input_file;

    input_file = fopen("ass.inp","r");

    for(k=0; k<WORD_LENGTH-1; k++) space_arr[k] = 0;

    for(j=0;j < MEM_SIZE; j++)
      for(k=WORD_LENGTH-1;k >= 0; k--)
        {
   while( (c1 = getc(input_file)) != '0' && c1 != '1')
          space_arr[k] = 1;
   if(c1 == '0')
     PAR.A[k][j] = 0;
   if(c1=='1')
     PAR.A[k][j] = 1;
        }
  }


  w_disk()
  {
    extern struct PAR;
    int k,j;
    FILE *output_file;

    output_file = fopen("ass.out","w");
    for(k=WORD_LENGTH-1;k >=0;k--)
      {
        if(space_arr[k])
   fprintf(output_file," ");
        fprintf(output_file,"%d",PAR.COMP[k].BOOLEAN);
      }
     fprintf(output_file,"\n");
     for(k=WORD_LENGTH-1;k >=0;k--)
      {
        if(space_arr[k])
   fprintf(output_file," ");
       fprintf(output_file,"%d",PAR.MASK[k].BOOLEAN);
      }
    fprintf(output_file,"\n\n");
    for(j=0;j < MEM_SIZE; j++)
```

```
     {
       for(k=WORD_LENGTH-1;k >=0;k--)
  {
    if(space_arr[k])
      fprintf(output_file," ");
    fprintf(output_file,"%d",PAR.A[k][j]);
  }
       fprintf(output_file,"%3d",PAR.TAG[j].BOOLEAN);
       fprintf(output_file,"%5d\n",j);
     }
 fprintf(output_file,"\n\n %3.1f CYCLES\n",  CYCLES);

 }

 comp()
 {
   extern struct PAR;
   int k,j;
   unsigned or_exp;


   if(PULSE || !FLAG_CYCLES) CYCLES+=1;
   else
     CYCLES+=0.5;
   PULSE = FALSE;

   for(j=0;j<MEM_SIZE;j++)
     {
       or_exp = FALSE;
       for(k=0;k<WORD_LENGTH;k++)
  or_exp =(PAR.MASK[k].BOOLEAN)&
    (PAR.A[k][j] ^ PAR.COMP[k].BOOLEAN) | or_exp;
       PAR.TAG[j].BOOLEAN = PAR.TAG[j].BOOLEAN & (!or_exp);
     }
   PAR.RSP = FALSE;
   for(j=0;j<MEM_SIZE;j++)
     if(PAR.TAG[j].BOOLEAN) PAR.RSP = TRUE;

 }


 wr()
 {
   extern struct PAR;
   int k,j;

   if(PULSE || !FLAG_CYCLES) CYCLES+=1;
   else
     CYCLES+=0.5;
   PULSE = FALSE;

   for(j=0;j<MEM_SIZE;j++)
     for(k=0;k<WORD_LENGTH;k++)
       {
  PAR.A[k][j] =
```

```
)

  ((!PAR.TAG[j].BOOLEAN) & (PAR.A[k][j])) |
    (PAR.TAG[j].BOOLEAN &
      (
       (PAR.MASK[k].BOOLEAN & PAR.COMP[k].BOOLEAN) |
       ((!PAR.MASK[k].BOOLEAN) & PAR.A[k][j])));
     }
}

rd()
{
  extern struct PAR;
  int k,j;

  if(PULSE || !FLAG_CYCLES) CYCLES+=1;
  else
    CYCLES+=0.5;
  PULSE = FALSE;

  for(k=0; k<WORD_LENGTH; k++)
    {
      PAR.OUT_DAT[k] = FALSE;
      for(j=0; j<MEM_SIZE; j++)
 {
   PAR.OUT_DAT[k] =
     PAR.OUT_DAT[k] |
       (PAR.TAG[j].BOOLEAN & PAR.A[k][j]);
 }
    }
}
```

I claim:

1. Associative signal processing apparatus for processing an incoming signal comprising a plurality of samples, the apparatus comprising:

an array of processors, each processor including a multiplicity of content addressable memory (CAM) cells, said array forming a two dimensional array of said content addressable memory cells, each sample of an incoming signal being processed by at least one of the processors using at least one of said memory cells; and a linear register array including a plurality of registers operative to store responders arriving from the processors and to provide communication, within a single cycle, between non-adjacent processors processing non-adjacent samples.

2. Apparatus according to claim 1 wherein the register array is operative to perform at least one multicell shift operation.

3. Apparatus according to claim 1 which is operative in video real time.

4. Apparatus according to claim 1 wherein the signal comprises an image.

5. Apparatus according to claim 4 wherein the image comprises a color image.

6. Apparatus according to claim 1 wherein at least one sample is processed by two or more of the processors.

7. Apparatus according to claim 1 wherein at least one of the processors processes more than one sample.

8. Associative signal processing apparatus for processing an incoming signal comprising a plurality of samples, the apparatus comprising:

an array of processors, each processor including a multiplicity of content addressable memory (CAM) cells, said array forming a two dimensional array of said content addressable memory cells, each sample of an incoming signal being processed by at least one of the processors using at least one of said memory cells; and a linear register array including at least one resister operative to store responders arriving from the processors and to provide communication, within a single cycle, between non-adjacent processors;

an I/O buffer register including CAM cells operative to input and output a signal.

9. Apparatus according to claim 8 wherein the processor array, the register array and the I/O buffer register are arranged on a single module.

10. Apparatus according to claim 8 wherein the processor array, the register array and the I/O buffer register are arranged on a single silicon die.

11. Apparatus according to claim 10 wherein the I/O buffer register includes at least one CAM cell from each processor in said array of processors.

* * * * *